US012238725B2

(12) United States Patent
Hao et al.

(10) Patent No.: US 12,238,725 B2
(45) Date of Patent: Feb. 25, 2025

(54) MAPPING SCHEMES FOR UPLINK CONTROL TRANSMISSIONS IN WIRELESS COMMUNICATION SYSTEMS

(71) Applicant: ZTE Corporation, Guangdong (CN)

(72) Inventors: Peng Hao, Guangdong (CN); Chunli Liang, Guangdong (CN); Xianghui Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 347 days.

(21) Appl. No.: 17/877,096

(22) Filed: Jul. 29, 2022

(65) Prior Publication Data

US 2022/0400480 A1 Dec. 15, 2022

Related U.S. Application Data

(63) Continuation of application No. PCT/CN2020/090637, filed on May 15, 2020.

(51) Int. Cl.
*H04L 5/00* (2006.01)
*H04W 72/21* (2023.01)

(52) U.S. Cl.
CPC ........... *H04W 72/21* (2023.01); *H04L 5/0053* (2013.01); *H04L 5/0094* (2013.01)

(58) Field of Classification Search
CPC ..... H04W 72/21; H04L 5/0053; H04L 5/0094
USPC .......................................................... 370/329
See application file for complete search history.

(56) References Cited

U.S. PATENT DOCUMENTS

2008/0075184 A1 3/2008 Muharemovic et al.
2011/0051671 A1* 3/2011 Chung .................. H04L 5/0007 370/328
2017/0302489 A1 10/2017 Lindbom et al.
2019/0081660 A1* 3/2019 Han .................... H04L 27/2613
(Continued)

FOREIGN PATENT DOCUMENTS

CN 108781197 A 11/2018
CN 109314623 A 2/2019
(Continued)

OTHER PUBLICATIONS

Office Action for Japanese Patent Application No. 2022-546011, mailed Oct. 18, 2023 (5 pages), with English summary.
(Continued)

*Primary Examiner* — Christopher R Crompton
(74) *Attorney, Agent, or Firm* — Perkins Coie LLP

(57) ABSTRACT

Methods, systems, and devices for mapping schemes for uplink control signals in mobile communication technology are described. An exemplary method for wireless communication includes transmitting, by a wireless device over a control channel, an M-bit payload on N symbols over a plurality of subcarriers, wherein M and N are positive integers, wherein each of the N symbols is represented using a base sequence (u(n, m)) and a cyclic shift ($n_{cs}$ (n, m)) of the base sequence, wherein n=0, 1, . . . (N−1) is a non-negative integer that indexes a symbol in the N symbols, and wherein m=0, 1, . . . ($2^M$−1) is a non-negative integer that indexes a combination set in $2^M$ combination sets.

20 Claims, 9 Drawing Sheets

(56) References Cited

U.S. PATENT DOCUMENTS

2019/0141675 A1 5/2019 Blasco Serrano et al.

FOREIGN PATENT DOCUMENTS

| | | |
|---|---|---|
| CN | 109818647 A | 5/2019 |
| WO | 2018203686 A1 | 11/2018 |

OTHER PUBLICATIONS

International Search Report and Written Opinion for International Application No. PCT/CN2020/090637, mailed on Jan. 27, 2021 (7 pages).
LG Electronics, "Discussion on PUCCH design for Latency reduction," 3GPP TSG RAN WG1 Meeting #84, R1-160654, St Julian's, Malta, Feb. 15-19, 2016 (7 pages).
LG Electronics, "Support of short PUCCH over 2 OFDM symbols for NR," 3GPP TSG RAN WG1 Meeting 90bis, R1-1717958, Prague, CZ, Oct. 9-13, 2017 (3 pages).
Catt, "Other aspects of 2-symbol short PUCCH, " 3GPP TSG RAN WG1 Meeting 91, R1-1720196, Reno, USA, Nov. 27-Dec. 1, 2017 (4 pages).
Extended European Search Report for European Patent Application No. 20896462.7, mailed Feb. 8, 2023 (12 pages).

* cited by examiner

MAPPING SCHEMES FOR UPLINK CONTROL TRANSMISSIONS IN WIRELESS COMMUNICATION SYSTEMS

CROSS REFERENCE TO RELATED APPLICATIONS

This patent document is a continuation of and claims benefit of priority to International Patent Application No. PCT/CN2020/090637, filed on May 15, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for different code rates and differently sized payloads, thereby improving coverage enhancements.

SUMMARY

This document relates to methods, systems, and devices for mapping schemes for uplink control signals in mobile communication technology, including 5th Generation (5G) and New Radio (NR) communication systems.

In one exemplary aspect, a wireless communication method is disclosed. The method includes transmitting, by a wireless device over a control channel, an M-bit payload on N symbols over a plurality of subcarriers, wherein M and N are positive integers, wherein each of the N symbols is represented using a base sequence (u(n, m)) and a cyclic shift (ncs(n, m)) of the base sequence, wherein n=0, 1, . . . (N−1) is a non-negative integer that indexes a symbol in the N symbols, and wherein m=0, 1, . . . (2M−1) is a non-negative integer that indexes a combination set in 2M combination sets.

In another exemplary aspect, a wireless communication method is disclosed. The method includes receiving, by a network node from a wireless device over a control channel, an M-bit payload on N symbols over a plurality of subcarriers, and transmitting, subsequent to the receiving, one or more subsequent communications to the wireless device over a data channel, wherein M and N are positive integers, wherein each of the N symbols is represented using a base sequence (u(n, m)) and a cyclic shift ($n_{c5}$(n, m)) of the base sequence, wherein n=0, 1, . . . (N−1) is a non-negative integer that indexes a symbol in the N symbols, and wherein m=0, 1, . . . ($2^M$−1) is a non-negative integer that indexes a combination set in $2^M$ combination sets.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
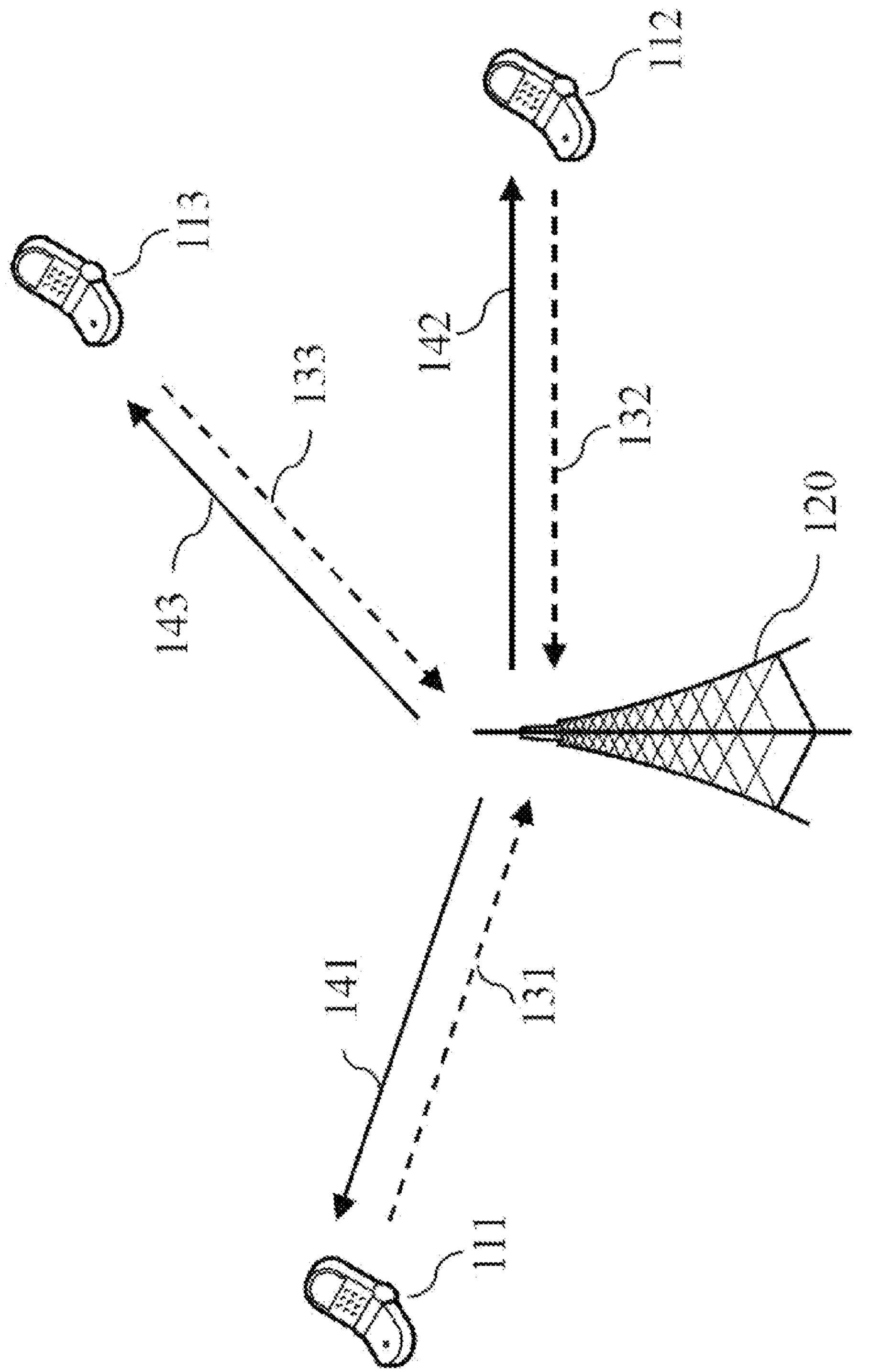
FIG. 1 shows an example of a base station (BS) and user equipment (UE) in wireless communication.
Figure 2:
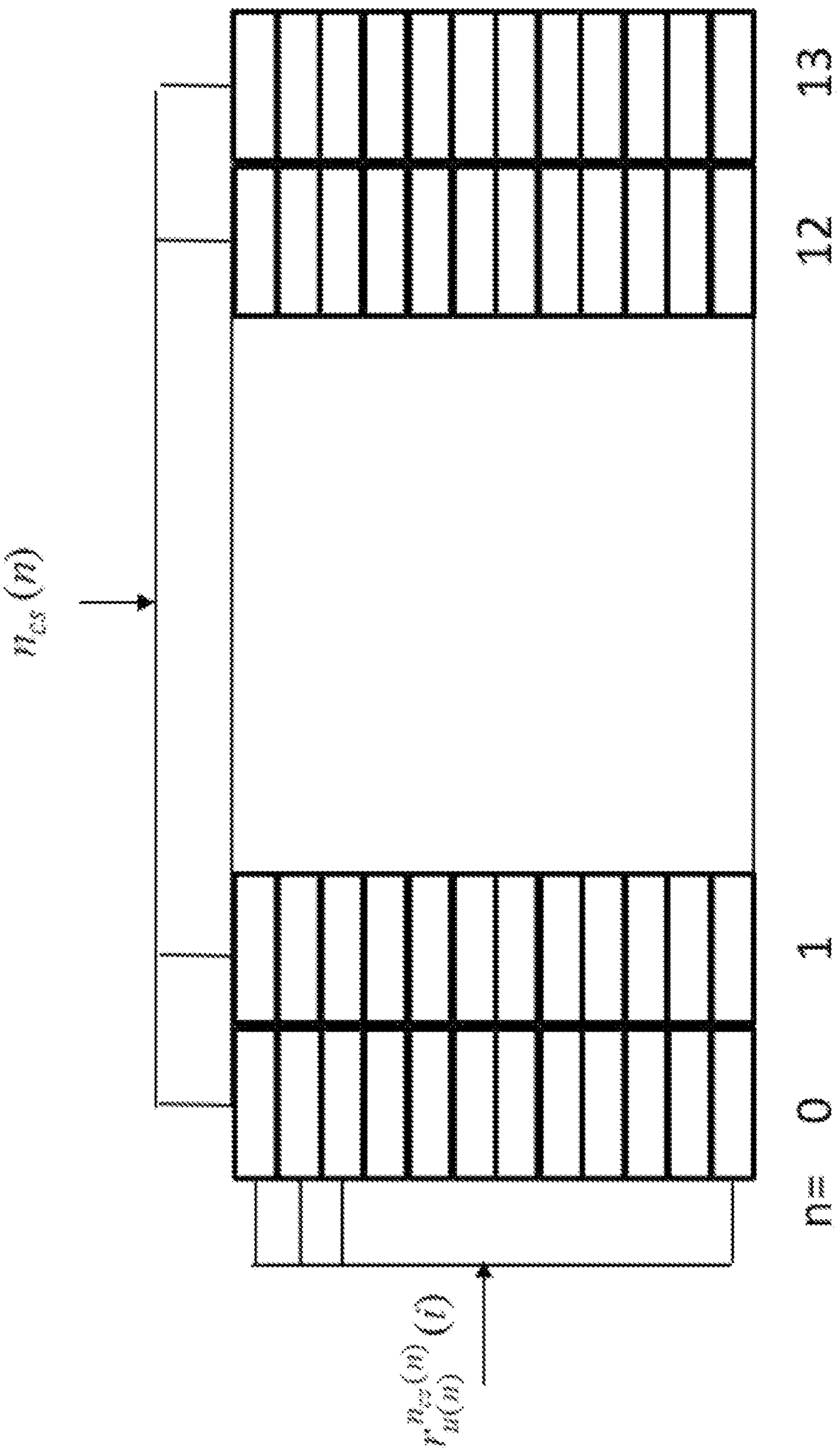
FIG. 2 shows an example of sequence generation for mapping schemes that use different cyclic shifts.

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

As fundamental building components to enable an NR system, the Physical Uplink Control Channel (PUCCH) and/or the Physical Shared Uplink Channel (PUSCH) are utilized to convey Uplink Control Information (UCI), which includes:

- HARQ-ACK (Hybrid Automated Repeat Request-Acknowledgement) feedback in response to downlink data transmission.
- Scheduling Request (SR) which is used to request resource for uplink data transmission.
- Channel State Information (CSI) report which is used for link adaptation and downlink data scheduling. More specifically, CSI report may include Channel Quality Indicator (CQI), Pre-coding Matrix Indicator (PMI), Rank Indicator (RI), Layer Indicator (LI) and beam related information.

In LTE, PUCCH is transmitted in one or more Physical Resource Blocks (PRB) at the edges of the system bandwidth, following a mirrored pattern with slot level frequency hopping within a subframe so as to maximize the frequency diversity. In NR, more flexible PUCCH structures need to be considered towards targeting different applications and use cases, especially for the support of low latency application such as URLLC.

If a UE is not transmitting on the PUSCH, and the UE is transmitting UCI in a PUCCH using, for example, the following formats:

- PUCCH format 0 if
  - the transmission is over 1 symbol or 2 symbols,
  - the number of HARQ-ACK information bits with positive or negative SR (HARQ-ACK/SR bits) is 1 or 2
- PUCCH format 1 if
  - the transmission is over 4 or more symbols,
  - the number of HARQ-ACK/SR bits is 1 or 2
- PUCCH format 2 if
  - the transmission is over 1 symbol or 2 symbols,
  - the number of UCI bits is more than 2
- PUCCH format 3 if
  - the transmission is over 4 or more symbols,
  - the number of UCI bits is more than 2,
  - the PUCCH resource does not include an orthogonal cover code
- PUCCH format 4 if
  - the transmission is over 4 or more symbols,
  - the number of UCI bits is more than 2,
  - the PUCCH resource includes an orthogonal cover code In some embodiments, for PUCCH formats supporting more than 2 bits, two coding schemes are applied depending on the payload size of the UCI, e.g., a block code based on Reed-Muller Codes is applied when the input payload size is between 3 to 11 bits, and Polar codes are used when larger than 11 bits. Since block codes are not the optimal coding scheme at low code rates for small to medium payload, embodiments of the disclosed technology advantageously provide enhanced performance in these cases, especially in coverage enhancement scenarios.

FIG. 1 shows an example of a wireless communication system (e.g., an LTE, 5G or New Radio (NR) cellular network) that includes a BS 120 and one or more user equipment (UE) 111, 112 and 113. In some embodiments, the uplink transmissions (131, 132, 133) include cyclically-shifted base sequences that constitute the mapping scheme for the uplink control transmissions. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Exemplary Embodiments that Use Different Cyclic Shifts

In some embodiments, a PUCCH format can be configured to occupy 1 resource block (RB) in the frequency-domain and 14 symbols in the time-domain. The short sequence used in the frequency-domain is a length-12 sequence. The short sequence is defined by a cyclic shift $n_{cs}$ of a base sequence $\bar{r}_u(i)$ according to:

$$r_u^{n_{cs}}(i) = e^{j\frac{2\pi i n_{cs}}{M_{ZC}}}\bar{r}_u(i),\ 0 \le i < M_{ZC} \quad \text{(Eqn. 1)}$$

Herein, $M_{ZC}$ is the length of the sequence and $M_{ZC}=12$ for 1 RB. Multiple sequences are defined from a single base sequence through different values of $n_{cs}$.

In some embodiments, the low-PAPR (peak-to-average-power ratio) sequences defined in current NR specification can be reused for the base sequence $\bar{r}_u(i)$, given by:

$$\bar{r}_u(i)=e^{j\varphi(r)\pi/4}, 0\le i\le M_{ZC}-1 \quad \text{(Eqn. 2)}$$

In an example, the value of φ(i) is given as shown in Table 1 below.

TABLE 1

Example definition of φ(i) for $M_{ZC}$ = 12

| u | φ(0), . . . , φ(11) | | | | | | | | | | | |
|---|---|---|---|---|---|---|---|---|---|---|---|---|
| 0 | −3 | 1 | −3 | −3 | −3 | 3 | −3 | −1 | 1 | 1 | 1 | −3 |
| 1 | −3 | 3 | 1 | −3 | 1 | 3 | −1 | −1 | 1 | 3 | 3 | 3 |
| 2 | −3 | 3 | 3 | 1 | −3 | 3 | −1 | 1 | 3 | −3 | 3 | −3 |
| 3 | −3 | −3 | −1 | 3 | 3 | 3 | −3 | 3 | −3 | 1 | −1 | −3 |
| 4 | −3 | −1 | −1 | 1 | 3 | 1 | 1 | −1 | 1 | −1 | −3 | 1 |
| 5 | −3 | −3 | 3 | 1 | −3 | −3 | −3 | −1 | 3 | −1 | 1 | 3 |
| 6 | 1 | −1 | 3 | −1 | −1 | −1 | −3 | −1 | 1 | 1 | 1 | −3 |
| 7 | −1 | −3 | 3 | −1 | −3 | −3 | −3 | −1 | 1 | −1 | 1 | −3 |
| 8 | −3 | −1 | 3 | 1 | −3 | −1 | −3 | 3 | 1 | 3 | 3 | 1 |
| 9 | −3 | −1 | −1 | −3 | −3 | −1 | −3 | 3 | 1 | 3 | −1 | −3 |
| 10 | −3 | 3 | −3 | 3 | 3 | −3 | −1 | −1 | 3 | 3 | 1 | −3 |
| 11 | −3 | −1 | −3 | −1 | −1 | −3 | 3 | 3 | −1 | −1 | 1 | −3 |
| 12 | −3 | −1 | 3 | −3 | −3 | −1 | −3 | 1 | −1 | −3 | 3 | 3 |
| 13 | −3 | 1 | −1 | −1 | 3 | 3 | −3 | −1 | −1 | −3 | −1 | −3 |
| 14 | 1 | 3 | −3 | 1 | 3 | 3 | 3 | 1 | −1 | 1 | −1 | 3 |
| 15 | −3 | 1 | 3 | −1 | −1 | −3 | −3 | −1 | −1 | 3 | 1 | −3 |
| 16 | −1 | −1 | −1 | −1 | 1 | −3 | −1 | 3 | 3 | −1 | −3 | 1 |
| 17 | −1 | 1 | 1 | −1 | 1 | 3 | 3 | −1 | −1 | −3 | 1 | −3 |
| 18 | −3 | 1 | 3 | 3 | −1 | −1 | −3 | 3 | 3 | −3 | 3 | −3 |
| 19 | −3 | −3 | 3 | −3 | −1 | 3 | 3 | 3 | −1 | −3 | 1 | −3 |
| 20 | 3 | 1 | 3 | 1 | 3 | −3 | −1 | 1 | 3 | 1 | −1 | −3 |
| 21 | −3 | 3 | 1 | 3 | −3 | 1 | 1 | 1 | 1 | 3 | −3 | 3 |
| 22 | −3 | 3 | 3 | 3 | −1 | −3 | −3 | −1 | −3 | 1 | 3 | −3 |
| 23 | 3 | −1 | −3 | 3 | −3 | −1 | 3 | 3 | 3 | −3 | −1 | −3 |
| 24 | −3 | −1 | 1 | −3 | 1 | 3 | 3 | 3 | −1 | −3 | 3 | 3 |
| 25 | −3 | 3 | 1 | −1 | 3 | 3 | −3 | 1 | −1 | 1 | −1 | 1 |
| 26 | −1 | 1 | 3 | −3 | 1 | −1 | 1 | −1 | −1 | −3 | 1 | −1 |
| 27 | −3 | −3 | 3 | 3 | 3 | −3 | −1 | 1 | −3 | 3 | 1 | −3 |
| 28 | 1 | −1 | 3 | 1 | 1 | −1 | −1 | −1 | 1 | 3 | −3 | 1 |
| 29 | −3 | 3 | −3 | 3 | −3 | −3 | 3 | −1 | −1 | 1 | 3 | −3 |

In some embodiments, a combination set m $\{\langle u(n,m), n_{cs}(n,m)\rangle, n=0, 1, 2, \ldots, N-1\}$ is used to represent one symbol (or bit) of information. Embodiments of the disclosed technology are configured for small to medium payload sizes, e.g., 3-11 bits, and thus, combinations based on cyclic shifts alone may be sufficient because $12^N >> 2^M$ when N=14 and M=11. Herein, u(n,m)=u(n', m), n,n'=0, 1, 2, . . . N−1, n≠n', and the combination set m can be simplified as $\{n_{cs}(n,m), n=0, 1, 2, \ldots, N-1\}$. According to some embodiments, the information that is carried on the PUCCH has a one-to-one mapping to the combination set, regardless of whether the information is expressed as a bit sequence or converted to a decimal value.

In some embodiments, different cyclic shifts are used for different time domain symbols to represent different information. As shown in FIG. 1, a sequence z(·) to be mapped over the assigned resource for PUCCH transmission can be obtained according to:

$$z(mM_{ZC}+i)=r_u^{n_{cs}(n)}(i) \quad \text{(Eqn. 3)}$$

$$i=0, 1, \ldots, M_{ZC}-1$$

$$n=0, 1, \ldots, N-1$$

Herein, N is the number of OFDM symbols used for the PUCCH format (with N=14 in this example). In some embodiments, the sequence z(·) can be mapped in a frequency-first time-second order over the assigned resource of the PUCCH. In other embodiments, it may be mapped in a time-first, frequency-second order over the assigned resource of the PUCCH.

In this manner, different uplink control information can be indicated by different combination sets (or equivalently, different CS hopping sequences $n_{cs}$ (n, m)) to generate the sequence z(·) for the PUCCH transmission.

Some embodiments of the disclosed technology define a mapping between the uplink control information and a CS hopping sequence $n_{CS}$ (n, m) used for short sequences transmitted on each time-domain symbol for the PUCCH. Given that the payload of the uplink control information varies from 3 to 11 bits, different numbers of CS hopping sequences may be needed to support the varying payload size. With regard to notation, the payload of the UCI is denoted as M bits, and the number of CS hopping sequences is assumed to be $N_{CSHop}=2^M$.

Example design criterion. In some embodiments, the CS hopping pattern (which refers to the set of CS hopping sequences) may be designed to minimize the number of identical elements in the same location (denoted as K in the following) in any pair of CS hopping sequences within the CS hopping pattern.

For example, if two CS hopping sequences within a CS hopping pattern are [10, 2, 6, 11, 10, 0, 8, 1, 11, 0, 9, 10, 9, 5] and [8, 3, 9, 1, 4, 1, 2, 10, 9, 4, 0, 1, 6, 5], then K=1 because only one element (the 14th element) in these two sequences is same. Minimizing the number of identical elements results in a lower correlation between pairs of CS hopping sequences, and advantageously results in better detection performance.

In some embodiments, the design of the CS hopping pattern for different UCI payload sizes may be based on designing a parent CS hopping pattern for the maximum payload size, and configuring the CS hopping pattern for smaller UCI payload sizes to be a subset from the parent CS hopping pattern. For example, if a UCI payload size ranging from 3 to 11 bits is to be supported, a parent CS hopping pattern for 11 bits with 2048 CS hopping sequences is designed first, and then, for smaller UCI payload sizes, the CS hopping sequences are selected from the parent CS hopping pattern. This can be achieved using either a nested or group-based selection.

Figure 3:
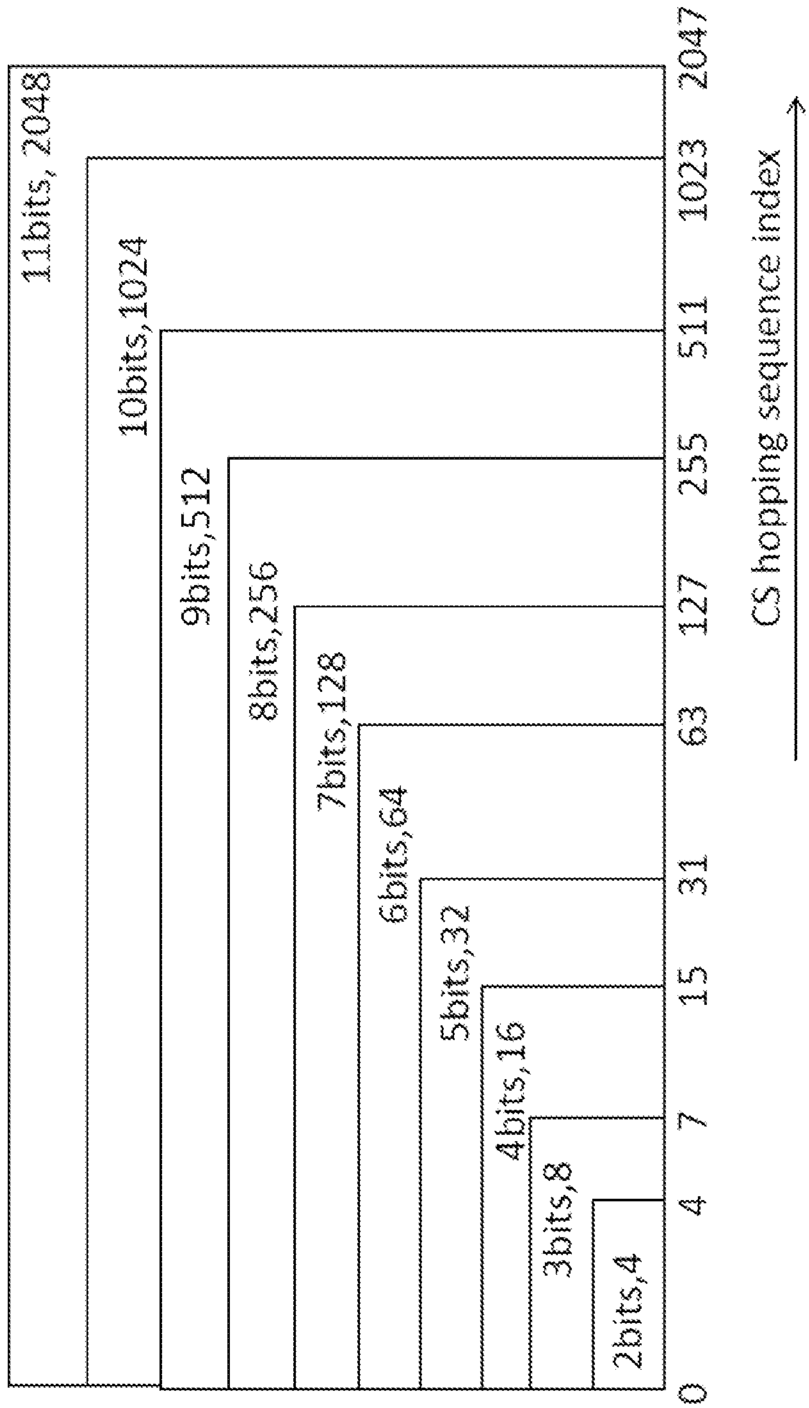
FIG. 3 shows an example of nested sequence generation.

Nested design. In some embodiments, a nested design of the CS hopping sequences selects the first $2^M$ CS hopping sequences from the CS hopping pattern to support a payload size of M bits, as shown in FIG. 3. For an example, if the UE only has 3 bits to transmit, it can select the first 8 CS hopping sequences in the CS hopping pattern for PUCCH transmission. For another example, if the UE only has 5 bits to transmit, it can select the first 32 CS hopping sequences in the CS hopping pattern for PUCCH transmission.

The selection of CS hopping sequences for smaller payload sizes is shown in Table 2.

TABLE 2

Example indices for nested design of CS hopping sequences

| M | K | $CSSeq_{index}$ |
|---|---|---|
| 2 | 0 | 0~3 |
| 3 | 0 | 0~7 |
| 4 | 1 | 0~15 |
| 5 | 2 | 0~31 |
| 6 | 2 | 0~63 |
| 7 | 3 | 0~127 |
| 8 | 3 | 0~255 |
| 9 | 4 | 0~511 |
| 10 | 4 | 0~1023 |
| 11 | 4 | 0~2047 |

In some embodiments, the CS hopping pattern for the nested design can be selected from the following two tables:

Example #1 of a nested design CS hopping pattern

| m | $n_{cs}(n)$ | | | | | | | | | | | | | |
|---|---|---|---|---|---|---|---|---|---|---|---|---|---|---|
| 0 | 6 | 1 | 11 | 10 | 0 | 10 | 10 | 5 | 7 | 0 | 1 | 3 | 9 | 0 |
| 1 | 9 | 8 | 8 | 11 | 11 | 6 | 6 | 0 | 4 | 7 | 3 | 5 | 6 | 11 |
| 2 | 7 | 9 | 10 | 7 | 1 | 0 | 7 | 9 | 6 | 11 | 7 | 6 | 1 | 7 |
| 3 | 10 | 7 | 6 | 8 | 7 | 9 | 1 | 2 | 11 | 10 | 4 | 10 | 5 | 1 |
| 4 | 2 | 10 | 0 | 6 | 10 | 5 | 2 | 1 | 10 | 9 | 6 | 1 | 7 | 9 |
| 5 | 11 | 5 | 3 | 4 | 9 | 1 | 3 | 8 | 5 | 3 | 11 | 11 | 3 | 3 |
| 6 | 4 | 6 | 1 | 9 | 2 | 11 | 4 | 3 | 9 | 6 | 2 | 9 | 0 | 5 |
| 7 | 5 | 0 | 7 | 2 | 4 | 8 | 5 | 4 | 8 | 5 | 9 | 7 | 2 | 6 |
| 8 | 1 | 8 | 2 | 7 | 7 | 3 | 8 | 1 | 3 | 8 | 8 | 11 | 11 | 2 |
| 9 | 3 | 10 | 4 | 10 | 8 | 2 | 4 | 10 | 4 | 4 | 10 | 4 | 5 | 4 |
| 10 | 3 | 11 | 6 | 11 | 2 | 4 | 11 | 6 | 2 | 8 | 5 | 2 | 3 | 7 |
| 11 | 9 | 11 | 9 | 1 | 1 | 2 | 5 | 2 | 5 | 1 | 0 | 3 | 7 | 5 |
| 12 | 3 | 2 | 11 | 2 | 9 | 0 | 0 | 2 | 1 | 2 | 6 | 9 | 4 | 8 |
| 13 | 6 | 5 | 7 | 6 | 5 | 9 | 9 | 11 | 2 | 2 | 0 | 8 | 0 | 4 |
| 14 | 8 | 3 | 11 | 1 | 10 | 4 | 7 | 7 | 0 | 3 | 10 | 7 | 10 | 2 |
| 15 | 0 | 0 | 10 | 5 | 3 | 5 | 6 | 5 | 11 | 1 | 5 | 11 | 0 | 8 |
| 16 | 8 | 8 | 4 | 2 | 8 | 4 | 8 | 4 | 10 | 7 | 2 | 9 | 9 | 7 |
| 17 | 5 | 9 | 9 | 10 | 7 | 2 | 10 | 4 | 10 | 3 | 7 | 5 | 3 | 11 |
| 18 | 5 | 1 | 1 | 3 | 0 | 0 | 11 | 0 | 3 | 3 | 10 | 6 | 0 | 4 |
| 19 | 0 | 0 | 9 | 0 | 8 | 10 | 10 | 1 | 4 | 5 | 3 | 6 | 11 | 10 |
| 20 | 5 | 4 | 3 | 8 | 0 | 6 | 3 | 10 | 10 | 8 | 5 | 1 | 10 | 10 |
| 21 | 1 | 11 | 7 | 0 | 6 | 5 | 5 | 3 | 4 | 2 | 1 | 10 | 1 | 8 |
| 22 | 4 | 5 | 8 | 3 | 4 | 2 | 2 | 5 | 0 | 0 | 5 | 10 | 4 | 9 |
| 23 | 0 | 4 | 0 | 3 | 0 | 9 | 2 | 11 | 6 | 11 | 1 | 0 | 2 | 1 |
| 24 | 10 | 6 | 4 | 3 | 11 | 10 | 11 | 8 | 1 | 6 | 1 | 8 | 5 | 3 |
| 25 | 6 | 3 | 2 | 5 | 5 | 5 | 7 | 0 | 8 | 11 | 11 | 0 | 8 | 5 |
| 26 | 7 | 5 | 5 | 3 | 7 | 8 | 6 | 9 | 1 | 7 | 8 | 2 | 9 | 0 |
| 27 | 9 | 7 | 4 | 6 | 1 | 7 | 1 | 1 | 8 | 0 | 7 | 11 | 4 | 11 |
| 28 | 0 | 11 | 11 | 6 | 10 | 7 | 4 | 0 | 2 | 4 | 8 | 6 | 8 | 3 |
| 29 | 10 | 6 | 2 | 1 | 6 | 9 | 0 | 10 | 10 | 5 | 11 | 7 | 9 | 0 |
| 30 | 2 | 7 | 9 | 0 | 2 | 9 | 8 | 6 | 6 | 9 | 9 | 5 | 4 | 6 |
| 31 | 6 | 0 | 8 | 10 | 10 | 11 | 11 | 8 | 9 | 2 | 6 | 5 | 10 | 7 |
| 32 | 9 | 4 | 5 | 4 | 2 | 3 | 1 | 7 | 5 | 9 | 10 | 2 | 2 | 4 |
| 33 | 6 | 6 | 0 | 9 | 1 | 1 | 6 | 0 | 7 | 4 | 9 | 11 | 7 | 7 |
| 34 | 9 | 2 | 7 | 9 | 11 | 1 | 7 | 6 | 3 | 9 | 6 | 7 | 8 | 3 |
| 35 | 3 | 7 | 10 | 6 | 10 | 3 | 3 | 4 | 6 | 5 | 11 | 4 | 6 | 2 |
| 36 | 1 | 4 | 3 | 2 | 11 | 8 | 6 | 7 | 0 | 11 | 2 | 11 | 4 | 5 |
| 37 | 11 | 1 | 4 | 8 | 5 | 2 | 5 | 11 | 8 | 6 | 6 | 9 | 1 | 9 |
| 38 | 5 | 2 | 10 | 8 | 4 | 10 | 8 | 3 | 2 | 2 | 11 | 0 | 7 | 11 |
| 39 | 8 | 1 | 2 | 10 | 9 | 6 | 1 | 9 | 1 | 5 | 5 | 4 | 0 | 6 |
| 40 | 5 | 8 | 3 | 9 | 2 | 5 | 11 | 11 | 5 | 5 | 7 | 4 | 8 | 1 |
| 41 | 10 | 4 | 4 | 11 | 9 | 11 | 8 | 5 | 7 | 4 | 6 | 1 | 3 | 11 |
| 42 | 2 | 0 | 2 | 3 | 0 | 7 | 8 | 4 | 2 | 6 | 4 | 3 | 1 | 8 |
| 43 | 10 | 2 | 10 | 0 | 3 | 4 | 10 | 9 | 3 | 4 | 9 | 3 | 6 | 9 |
| 44 | 5 | 7 | 1 | 9 | 9 | 8 | 8 | 1 | 10 | 1 | 3 | 2 | 6 | 3 |
| 45 | 11 | 4 | 6 | 5 | 11 | 11 | 2 | 0 | 2 | 1 | 4 | 4 | 11 | 4 |
| 46 | 4 | 5 | 2 | 11 | 6 | 0 | 3 | 7 | 11 | 6 | 9 | 0 | 7 | 4 |
| 47 | 8 | 11 | 0 | 7 | 5 | 0 | 10 | 8 | 8 | 0 | 9 | 10 | 3 | 10 |
| 48 | 0 | 1 | 3 | 6 | 6 | 1 | 2 | 6 | 11 | 8 | 7 | 3 | 5 | 2 |
| 49 | 7 | 8 | 1 | 8 | 5 | 7 | 10 | 2 | 4 | 4 | 2 | 8 | 7 | 8 |
| 50 | 2 | 6 | 4 | 5 | 3 | 6 | 5 | 2 | 10 | 2 | 4 | 2 | 8 | 11 |
| 51 | 4 | 7 | 8 | 7 | 0 | 3 | 9 | 10 | 1 | 1 | 2 | 0 | 8 | 7 |
| 52 | 6 | 10 | 5 | 11 | 4 | 6 | 11 | 3 | 7 | 3 | 4 | 8 | 11 | 1 |
| 53 | 11 | 2 | 11 | 3 | 3 | 8 | 9 | 10 | 7 | 8 | 3 | 7 | 11 | 5 |
| 54 | 9 | 5 | 0 | 2 | 2 | 6 | 8 | 3 | 3 | 4 | 0 | 4 | 1 | 0 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 55 | 10 | 10 | 7 | 7 | 10 | 7 | 6 | 7 | 7 | 10 | 1 | 2 | 6 | 6 |
| 56 | 2 | 9 | 11 | 1 | 5 | 7 | 2 | 3 | 3 | 10 | 9 | 9 | 5 | 7 |
| 57 | 5 | 10 | 8 | 10 | 1 | 1 | 0 | 6 | 2 | 0 | 3 | 9 | 0 | 1 |
| 58 | 8 | 8 | 1 | 11 | 1 | 2 | 4 | 5 | 1 | 11 | 4 | 11 | 10 | 0 |
| 59 | 9 | 9 | 1 | 4 | 3 | 1 | 11 | 11 | 4 | 11 | 5 | 1 | 9 | 6 |
| 60 | 7 | 11 | 9 | 5 | 9 | 3 | 0 | 7 | 9 | 11 | 4 | 7 | 3 | 1 |
| 61 | 1 | 9 | 0 | 4 | 8 | 8 | 9 | 2 | 8 | 6 | 7 | 3 | 10 | 4 |
| 62 | 4 | 2 | 9 | 11 | 11 | 5 | 1 | 1 | 6 | 2 | 2 | 4 | 9 | 0 |
| 63 | 3 | 1 | 10 | 11 | 5 | 7 | 9 | 5 | 5 | 7 | 7 | 0 | 11 | 10 |
| 64 | 1 | 6 | 10 | 9 | 4 | 2 | 5 | 7 | 0 | 1 | 3 | 6 | 2 | 7 |
| 65 | 5 | 9 | 3 | 6 | 9 | 7 | 4 | 2 | 3 | 7 | 1 | 2 | 7 | 5 |
| 66 | 7 | 5 | 2 | 8 | 9 | 5 | 7 | 10 | 0 | 7 | 9 | 8 | 0 | 1 |
| 67 | 8 | 6 | 10 | 2 | 3 | 10 | 4 | 8 | 8 | 8 | 4 | 4 | 9 | 2 |
| 68 | 4 | 0 | 8 | 0 | 1 | 4 | 3 | 0 | 9 | 9 | 0 | 1 | 7 | 3 |
| 69 | 1 | 11 | 1 | 5 | 11 | 0 | 3 | 10 | 0 | 10 | 7 | 1 | 9 | 3 |
| 70 | 5 | 6 | 7 | 11 | 5 | 1 | 6 | 10 | 1 | 5 | 10 | 1 | 11 | 5 |
| 71 | 4 | 3 | 7 | 3 | 3 | 3 | 5 | 1 | 6 | 3 | 6 | 10 | 2 | 7 |
| 72 | 10 | 4 | 6 | 2 | 6 | 9 | 10 | 6 | 0 | 0 | 0 | 1 | 0 | 9 |
| 73 | 0 | 10 | 9 | 5 | 2 | 10 | 3 | 4 | 3 | 7 | 10 | 0 | 4 | 9 |
| 74 | 8 | 10 | 6 | 8 | 3 | 1 | 8 | 5 | 10 | 2 | 0 | 4 | 2 | 5 |
| 75 | 9 | 6 | 6 | 1 | 6 | 0 | 5 | 11 | 2 | 10 | 1 | 9 | 0 | 2 |
| 76 | 4 | 0 | 7 | 9 | 4 | 3 | 0 | 2 | 4 | 10 | 10 | 2 | 11 | 9 |
| 77 | 3 | 6 | 8 | 8 | 5 | 8 | 3 | 6 | 3 | 8 | 10 | 10 | 6 | 8 |
| 78 | 8 | 1 | 5 | 8 | 7 | 4 | 4 | 3 | 1 | 8 | 1 | 0 | 8 | 1 |
| 79 | 0 | 11 | 11 | 9 | 3 | 1 | 11 | 5 | 9 | 10 | 1 | 8 | 6 | 10 |
| 80 | 9 | 3 | 10 | 9 | 2 | 9 | 1 | 8 | 11 | 8 | 1 | 9 | 3 | 8 |
| 81 | 4 | 11 | 1 | 3 | 6 | 10 | 9 | 5 | 7 | 10 | 8 | 11 | 1 | 7 |
| 82 | 2 | 3 | 4 | 6 | 4 | 10 | 9 | 2 | 2 | 11 | 8 | 3 | 11 | 5 |
| 83 | 1 | 9 | 2 | 0 | 2 | 1 | 10 | 7 | 11 | 1 | 8 | 7 | 4 | 11 |
| 84 | 8 | 7 | 5 | 4 | 5 | 8 | 0 | 2 | 9 | 3 | 3 | 9 | 1 | 11 |
| 85 | 0 | 7 | 5 | 9 | 7 | 4 | 2 | 8 | 4 | 6 | 4 | 5 | 2 | 3 |
| 86 | 1 | 3 | 2 | 6 | 4 | 3 | 0 | 9 | 5 | 3 | 0 | 9 | 7 | 10 |
| 87 | 8 | 4 | 6 | 7 | 7 | 6 | 11 | 7 | 6 | 3 | 2 | 1 | 1 | 3 |
| 88 | 7 | 2 | 10 | 10 | 8 | 5 | 2 | 0 | 7 | 6 | 0 | 9 | 7 | 8 |
| 89 | 9 | 8 | 3 | 9 | 6 | 9 | 2 | 10 | 2 | 9 | 2 | 11 | 11 | 6 |
| 90 | 10 | 8 | 8 | 5 | 0 | 0 | 5 | 9 | 9 | 4 | 10 | 11 | 11 | 5 |
| 91 | 0 | 11 | 1 | 4 | 5 | 7 | 0 | 9 | 6 | 9 | 11 | 1 | 0 | 2 |
| 92 | 5 | 1 | 5 | 7 | 11 | 0 | 0 | 8 | 4 | 7 | 2 | 3 | 4 | 2 |
| 93 | 11 | 7 | 6 | 3 | 10 | 1 | 8 | 4 | 3 | 4 | 5 | 5 | 9 | 11 |
| 94 | 5 | 6 | 4 | 5 | 10 | 8 | 4 | 9 | 0 | 11 | 8 | 8 | 2 | 9 |
| 95 | 4 | 5 | 2 | 10 | 4 | 5 | 10 | 9 | 6 | 11 | 3 | 1 | 10 | 8 |
| 96 | 11 | 6 | 0 | 8 | 8 | 10 | 5 | 1 | 7 | 10 | 7 | 7 | 8 | 8 |
| 97 | 7 | 3 | 6 | 8 | 1 | 11 | 3 | 1 | 4 | 8 | 6 | 7 | 0 | 6 |
| 98 | 3 | 6 | 8 | 0 | 9 | 5 | 4 | 11 | 10 | 3 | 2 | 1 | 2 | 6 |
| 99 | 2 | 8 | 11 | 2 | 6 | 10 | 7 | 7 | 3 | 5 | 6 | 4 | 3 | 11 |
| 100 | 2 | 7 | 5 | 1 | 8 | 2 | 7 | 1 | 2 | 8 | 9 | 6 | 3 | 1 |
| 101 | 4 | 10 | 4 | 6 | 6 | 2 | 8 | 11 | 3 | 2 | 9 | 6 | 4 | 10 |
| 102 | 9 | 8 | 4 | 2 | 7 | 1 | 4 | 9 | 11 | 0 | 5 | 10 | 10 | 5 |
| 103 | 3 | 3 | 1 | 1 | 0 | 11 | 4 | 8 | 11 | 11 | 9 | 6 | 6 | 7 |
| 104 | 10 | 11 | 9 | 0 | 9 | 7 | 4 | 10 | 5 | 0 | 5 | 4 | 6 | 10 |
| 105 | 3 | 0 | 6 | 3 | 9 | 5 | 1 | 10 | 8 | 5 | 1 | 5 | 8 | 9 |
| 106 | 11 | 1 | 10 | 0 | 4 | 2 | 6 | 6 | 7 | 0 | 11 | 5 | 5 | 5 |
| 107 | 2 | 2 | 3 | 8 | 5 | 5 | 3 | 9 | 8 | 3 | 4 | 2 | 7 | 4 |
| 108 | 6 | 9 | 4 | 4 | 11 | 4 | 4 | 7 | 3 | 5 | 5 | 9 | 2 | 3 |
| 109 | 6 | 10 | 1 | 3 | 11 | 7 | 1 | 3 | 6 | 10 | 0 | 10 | 8 | 10 |
| 110 | 3 | 11 | 7 | 0 | 4 | 11 | 1 | 2 | 9 | 4 | 3 | 5 | 0 | 10 |
| 111 | 9 | 6 | 9 | 3 | 2 | 8 | 0 | 4 | 7 | 10 | 11 | 5 | 7 | 3 |
| 112 | 5 | 11 | 3 | 2 | 3 | 8 | 3 | 3 | 9 | 9 | 10 | 6 | 9 | 9 |
| 113 | 1 | 5 | 3 | 3 | 8 | 4 | 1 | 5 | 10 | 2 | 10 | 7 | 11 | 10 |
| 114 | 0 | 3 | 4 | 4 | 6 | 0 | 8 | 10 | 5 | 7 | 0 | 1 | 10 | 6 |
| 115 | 2 | 2 | 3 | 0 | 4 | 9 | 6 | 4 | 11 | 1 | 0 | 3 | 2 | 3 |
| 116 | 2 | 5 | 9 | 5 | 10 | 2 | 7 | 3 | 9 | 4 | 1 | 10 | 2 | 4 |
| 117 | 4 | 9 | 5 | 6 | 2 | 10 | 3 | 10 | 1 | 4 | 0 | 10 | 9 | 4 |
| 118 | 7 | 6 | 1 | 10 | 6 | 5 | 6 | 7 | 8 | 0 | 5 | 7 | 5 | 3 |
| 119 | 11 | 0 | 3 | 7 | 7 | 11 | 1 | 1 | 7 | 3 | 5 | 3 | 10 | 4 |
| 120 | 5 | 2 | 2 | 6 | 4 | 2 | 11 | 6 | 10 | 7 | 3 | 11 | 1 | 0 |
| 121 | 5 | 3 | 11 | 4 | 6 | 1 | 5 | 1 | 1 | 10 | 9 | 11 | 4 | 1 |
| 122 | 11 | 10 | 8 | 0 | 7 | 7 | 1 | 5 | 8 | 9 | 3 | 7 | 2 | 8 |
| 123 | 2 | 0 | 8 | 9 | 2 | 10 | 8 | 10 | 11 | 3 | 11 | 8 | 6 | 2 |
| 124 | 4 | 0 | 1 | 8 | 7 | 6 | 6 | 11 | 7 | 0 | 0 | 0 | 0 | 0 |
| 125 | 11 | 1 | 8 | 9 | 6 | 6 | 10 | 4 | 3 | 1 | 2 | 10 | 0 | 10 |
| 126 | 0 | 3 | 8 | 0 | 10 | 2 | 9 | 9 | 7 | 7 | 5 | 8 | 7 | 4 |
| 127 | 10 | 5 | 1 | 0 | 0 | 6 | 7 | 1 | 1 | 2 | 7 | 4 | 11 | 1 |
| 128 | 3 | 4 | 11 | 4 | 0 | 5 | 6 | 8 | 3 | 2 | 10 | 4 | 10 | 6 |
| 129 | 4 | 5 | 0 | 4 | 10 | 9 | 6 | 6 | 9 | 5 | 8 | 8 | 5 | 3 |
| 130 | 6 | 8 | 2 | 2 | 1 | 9 | 6 | 6 | 10 | 3 | 6 | 10 | 8 | 8 |
| 131 | 0 | 8 | 4 | 1 | 4 | 8 | 1 | 6 | 0 | 7 | 9 | 3 | 8 | 4 |
| 132 | 8 | 4 | 10 | 11 | 11 | 8 | 4 | 11 | 5 | 1 | 10 | 5 | 1 | 1 |
| 133 | 9 | 7 | 7 | 0 | 8 | 3 | 2 | 1 | 0 | 4 | 4 | 7 | 6 | 4 |
| 134 | 7 | 6 | 9 | 7 | 0 | 6 | 4 | 11 | 7 | 2 | 3 | 3 | 5 | 8 |
| 135 | 11 | 3 | 4 | 5 | 11 | 1 | 10 | 4 | 0 | 2 | 6 | 6 | 5 | 6 |
| 136 | 4 | 1 | 0 | 1 | 1 | 3 | 4 | 8 | 10 | 1 | 10 | 8 | 4 | 11 |
| 137 | 6 | 9 | 6 | 8 | 0 | 3 | 4 | 2 | 0 | 3 | 3 | 6 | 3 | 6 |
| 138 | 0 | 6 | 9 | 2 | 10 | 7 | 0 | 6 | 1 | 0 | 2 | 0 | 5 | 0 |
| 139 | 3 | 9 | 1 | 5 | 1 | 6 | 1 | 6 | 3 | 4 | 2 | 3 | 11 | 2 |
| 140 | 2 | 11 | 8 | 6 | 5 | 8 | 7 | 3 | 4 | 3 | 6 | 3 | 10 | 10 |
| 141 | 0 | 1 | 5 | 5 | 4 | 11 | 6 | 3 | 6 | 5 | 10 | 2 | 1 | 3 |
| 142 | 9 | 8 | 0 | 10 | 7 | 7 | 2 | 4 | 6 | 1 | 6 | 3 | 5 | 4 |
| 143 | 1 | 5 | 11 | 7 | 8 | 1 | 0 | 2 | 3 | 4 | 9 | 0 | 2 | 6 |
| 144 | 11 | 8 | 7 | 11 | 0 | 10 | 9 | 3 | 11 | 1 | 5 | 6 | 5 | 9 |
| 145 | 7 | 0 | 2 | 4 | 8 | 2 | 11 | 11 | 11 | 3 | 10 | 0 | 4 | 3 |
| 146 | 5 | 9 | 0 | 3 | 6 | 11 | 11 | 3 | 11 | 6 | 6 | 7 | 11 | 8 |
| 147 | 10 | 0 | 1 | 1 | 2 | 7 | 4 | 0 | 8 | 2 | 6 | 10 | 3 | 6 |
| 148 | 2 | 5 | 5 | 2 | 11 | 3 | 10 | 8 | 10 | 5 | 3 | 11 | 9 | 4 |
| 149 | 4 | 10 | 8 | 2 | 0 | 9 | 4 | 2 | 8 | 4 | 11 | 1 | 6 | 1 |
| 150 | 4 | 3 | 10 | 9 | 8 | 4 | 0 | 10 | 1 | 5 | 6 | 5 | 6 | 6 |
| 151 | 10 | 0 | 1 | 10 | 1 | 0 | 0 | 7 | 7 | 3 | 4 | 5 | 4 | 10 |
| 152 | 7 | 2 | 0 | 8 | 11 | 8 | 8 | 0 | 1 | 10 | 2 | 6 | 6 | 9 |
| 153 | 3 | 7 | 5 | 5 | 3 | 0 | 6 | 7 | 4 | 0 | 3 | 4 | 7 | 7 |
| 154 | 10 | 2 | 9 | 3 | 10 | 11 | 2 | 9 | 10 | 2 | 5 | 11 | 3 | 2 |
| 155 | 11 | 2 | 0 | 5 | 0 | 4 | 9 | 2 | 2 | 2 | 1 | 11 | 9 | 3 |
| 156 | 1 | 7 | 7 | 3 | 8 | 9 | 0 | 8 | 5 | 8 | 3 | 2 | 8 | 7 |
| 157 | 11 | 11 | 1 | 9 | 9 | 11 | 9 | 0 | 11 | 5 | 10 | 3 | 7 | 0 |
| 158 | 6 | 5 | 11 | 2 | 5 | 4 | 3 | 8 | 1 | 11 | 8 | 3 | 7 | 10 |
| 159 | 9 | 2 | 6 | 5 | 4 | 7 | 11 | 11 | 7 | 6 | 2 | 0 | 2 | 10 |
| 160 | 11 | 6 | 7 | 4 | 4 | 1 | 5 | 6 | 11 | 6 | 4 | 4 | 6 | 10 |
| 161 | 6 | 9 | 0 | 7 | 3 | 6 | 0 | 7 | 2 | 9 | 0 | 6 | 7 | 11 |
| 162 | 10 | 2 | 5 | 10 | 9 | 1 | 2 | 1 | 11 | 7 | 11 | 6 | 11 | 6 |
| 163 | 3 | 1 | 0 | 8 | 4 | 1 | 4 | 5 | 8 | 5 | 2 | 11 | 3 | 8 |
| 164 | 3 | 7 | 8 | 9 | 1 | 6 | 9 | 2 | 10 | 10 | 7 | 4 | 3 | 0 |
| 165 | 7 | 10 | 6 | 11 | 10 | 10 | 7 | 0 | 10 | 10 | 5 | 3 | 8 | 4 |
| 166 | 8 | 1 | 3 | 0 | 3 | 10 | 0 | 7 | 10 | 7 | 3 | 7 | 5 | 6 |
| 167 | 11 | 5 | 6 | 6 | 5 | 8 | 0 | 6 | 0 | 4 | 1 | 6 | 11 | 7 |
| 168 | 0 | 7 | 0 | 1 | 5 | 2 | 3 | 0 | 10 | 5 | 0 | 0 | 1 | 10 |
| 169 | 1 | 5 | 1 | 9 | 10 | 4 | 5 | 1 | 7 | 11 | 9 | 8 | 9 | 11 |
| 170 | 7 | 2 | 6 | 1 | 0 | 9 | 11 | 4 | 5 | 5 | 8 | 1 | 11 | 8 |
| 171 | 7 | 9 | 7 | 4 | 9 | 2 | 10 | 0 | 5 | 9 | 8 | 4 | 10 | 2 |
| 172 | 2 | 0 | 7 | 7 | 6 | 6 | 7 | 0 | 2 | 11 | 10 | 5 | 4 | 2 |
| 173 | 3 | 9 | 9 | 2 | 11 | 1 | 5 | 9 | 7 | 8 | 4 | 9 | 11 | 7 |
| 174 | 10 | 8 | 3 | 3 | 0 | 2 | 1 | 11 | 4 | 8 | 9 | 8 | 1 | 7 |
| 175 | 10 | 3 | 11 | 9 | 11 | 3 | 10 | 11 | 8 | 1 | 8 | 8 | 8 | 8 |
| 176 | 1 | 10 | 10 | 3 | 0 | 8 | 5 | 0 | 1 | 9 | 5 | 8 | 7 | 2 |
| 177 | 4 | 11 | 2 | 11 | 3 | 6 | 7 | 2 | 4 | 8 | 1 | 6 | 4 | 6 |
| 178 | 7 | 1 | 0 | 11 | 11 | 0 | 6 | 9 | 0 | 3 | 0 | 0 | 3 | 1 |
| 179 | 7 | 4 | 11 | 0 | 5 | 1 | 4 | 9 | 0 | 6 | 6 | 2 | 0 | 10 |
| 180 | 0 | 11 | 0 | 2 | 2 | 0 | 9 | 7 | 4 | 5 | 5 | 5 | 5 | 1 |
| 181 | 7 | 10 | 3 | 7 | 2 | 6 | 5 | 0 | 4 | 3 | 7 | 10 | 9 | 10 |
| 182 | 8 | 10 | 3 | 7 | 0 | 8 | 8 | 9 | 11 | 0 | 1 | 7 | 4 | 7 |
| 183 | 10 | 4 | 1 | 6 | 1 | 4 | 9 | 5 | 4 | 9 | 9 | 7 | 8 | 5 |
| 184 | 2 | 4 | 2 | 9 | 6 | 4 | 1 | 11 | 8 | 7 | 7 | 3 | 2 | 7 |
| 185 | 2 | 10 | 9 | 11 | 8 | 6 | 6 | 2 | 5 | 9 | 2 | 7 | 0 | 7 |
| 186 | 8 | 6 | 2 | 5 | 0 | 7 | 3 | 5 | 5 | 1 | 2 | 6 | 9 | 5 |
| 187 | 8 | 4 | 9 | 3 | 2 | 2 | 6 | 11 | 9 | 9 | 8 | 3 | 8 | 9 |
| 188 | 7 | 7 | 2 | 6 | 7 | 1 | 3 | 5 | 7 | 4 | 7 | 9 | 2 | 0 |
| 189 | 8 | 8 | 9 | 2 | 9 | 5 | 0 | 0 | 2 | 6 | 11 | 1 | 10 | 10 |
| 190 | 3 | 10 | 0 | 5 | 3 | 10 | 11 | 6 | 11 | 5 | 9 | 10 | 10 | 0 |
| 191 | 9 | 3 | 2 | 0 | 7 | 10 | 8 | 8 | 4 | 10 | 7 | 0 | 9 | 4 |
| 192 | 7 | 7 | 8 | 4 | 10 | 6 | 8 | 9 | 11 | 5 | 6 | 3 | 11 | 9 |
| 193 | 7 | 1 | 3 | 1 | 9 | 4 | 10 | 6 | 2 | 11 | 6 | 1 | 9 | 4 |
| 194 | 7 | 4 | 1 | 2 | 8 | 9 | 2 | 4 | 1 | 8 | 7 | 6 | 4 | 0 |
| 195 | 8 | 11 | 3 | 10 | 10 | 3 | 11 | 10 | 0 | 6 | 8 | 3 | 6 | 0 |
| 196 | 2 | 10 | 11 | 1 | 1 | 9 | 1 | 11 | 9 | 11 | 8 | 2 | 1 | 4 |
| 197 | 0 | 6 | 6 | 11 | 1 | 5 | 8 | 2 | 9 | 6 | 10 | 6 | 1 | 0 |
| 198 | 3 | 1 | 11 | 2 | 5 | 11 | 10 | 4 | 11 | 4 | 4 | 11 | 8 | 1 |
| 199 | 5 | 0 | 9 | 5 | 11 | 4 | 8 | 8 | 6 | 8 | 10 | 10 | 5 | 5 |
| 200 | 10 | 6 | 11 | 8 | 3 | 4 | 7 | 10 | 5 | 1 | 0 | 2 | 1 | 7 |
| 201 | 4 | 8 | 5 | 10 | 0 | 11 | 9 | 4 | 9 | 9 | 4 | 4 | 6 | 6 |
| 202 | 9 | 9 | 0 | 11 | 0 | 8 | 7 | 7 | 10 | 0 | 8 | 0 | 6 | 0 |
| 203 | 2 | 9 | 8 | 8 | 10 | 4 | 8 | 0 | 6 | 6 | 3 | 9 | 8 | 10 |
| 204 | 4 | 7 | 6 | 0 | 3 | 7 | 2 | 6 | 7 | 2 | 10 | 1 | 1 | 11 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 205 | 9 | 3 | 4 | 3 | 5 | 0 | 2 | 5 | 4 | 9 | 11 | 4 | 3 | 0 |
| 206 | 1 | 1 | 4 | 11 | 1 | 8 | 11 | 10 | 8 | 4 | 8 | 7 | 8 | 2 |
| 207 | 6 | 10 | 3 | 7 | 6 | 11 | 2 | 4 | 0 | 1 | 8 | 1 | 3 | 5 |
| 208 | 11 | 10 | 11 | 8 | 2 | 3 | 3 | 6 | 4 | 11 | 2 | 1 | 11 | 3 |
| 209 | 3 | 6 | 9 | 3 | 11 | 9 | 7 | 0 | 3 | 1 | 9 | 1 | 9 | 1 |
| 210 | 0 | 9 | 3 | 9 | 1 | 5 | 4 | 0 | 11 | 10 | 4 | 1 | 11 | 11 |
| 211 | 4 | 4 | 8 | 8 | 8 | 0 | 10 | 5 | 9 | 5 | 7 | 2 | 9 | 7 |
| 212 | 10 | 1 | 4 | 7 | 7 | 7 | 5 | 1 | 10 | 5 | 10 | 5 | 0 | 8 |
| 213 | 8 | 4 | 6 | 0 | 5 | 3 | 7 | 4 | 7 | 11 | 7 | 10 | 2 | 2 |
| 214 | 0 | 7 | 4 | 2 | 10 | 11 | 9 | 8 | 5 | 4 | 1 | 9 | 4 | 5 |
| 215 | 11 | 0 | 10 | 4 | 7 | 9 | 7 | 4 | 8 | 11 | 0 | 11 | 7 | 10 |
| 216 | 10 | 4 | 11 | 1 | 8 | 5 | 5 | 5 | 5 | 3 | 8 | 11 | 2 | 10 |
| 217 | 10 | 5 | 7 | 4 | 4 | 11 | 3 | 4 | 4 | 0 | 0 | 6 | 8 | 7 |
| 218 | 6 | 5 | 1 | 0 | 8 | 8 | 11 | 7 | 3 | 9 | 4 | 2 | 3 | 9 |
| 219 | 6 | 5 | 7 | 9 | 6 | 8 | 7 | 5 | 1 | 8 | 3 | 1 | 1 | 6 |
| 220 | 0 | 5 | 10 | 8 | 9 | 1 | 0 | 0 | 8 | 0 | 0 | 2 | 4 | 2 |
| 221 | 9 | 6 | 11 | 4 | 0 | 2 | 3 | 3 | 2 | 0 | 6 | 8 | 11 | 11 |
| 222 | 7 | 5 | 7 | 10 | 2 | 0 | 11 | 5 | 10 | 10 | 0 | 2 | 5 | 11 |
| 223 | 0 | 8 | 10 | 0 | 11 | 11 | 5 | 7 | 7 | 3 | 1 | 11 | 8 | 2 |
| 224 | 8 | 6 | 6 | 4 | 2 | 0 | 7 | 3 | 6 | 4 | 5 | 11 | 6 | 6 |
| 225 | 10 | 7 | 5 | 5 | 1 | 1 | 11 | 0 | 0 | 1 | 5 | 0 | 4 | 0 |
| 226 | 5 | 11 | 5 | 4 | 0 | 9 | 5 | 0 | 11 | 11 | 7 | 7 | 10 | 5 |
| 227 | 4 | 6 | 5 | 0 | 10 | 5 | 7 | 3 | 5 | 10 | 4 | 5 | 3 | 0 |
| 228 | 1 | 9 | 4 | 8 | 5 | 6 | 8 | 4 | 2 | 10 | 10 | 8 | 10 | 1 |
| 229 | 9 | 6 | 6 | 3 | 1 | 4 | 7 | 9 | 0 | 8 | 3 | 3 | 4 | 10 |
| 230 | 9 | 4 | 6 | 6 | 5 | 1 | 6 | 3 | 9 | 2 | 9 | 0 | 3 | 3 |
| 231 | 6 | 2 | 8 | 7 | 8 | 9 | 7 | 9 | 5 | 6 | 10 | 8 | 9 | 11 |
| 232 | 6 | 3 | 5 | 6 | 7 | 10 | 0 | 5 | 0 | 5 | 5 | 2 | 5 | 2 |
| 233 | 6 | 4 | 4 | 9 | 4 | 7 | 0 | 0 | 0 | 8 | 1 | 4 | 9 | 5 |
| 234 | 1 | 5 | 8 | 4 | 2 | 1 | 2 | 0 | 6 | 2 | 4 | 3 | 1 | 7 |
| 235 | 8 | 11 | 11 | 9 | 4 | 6 | 4 | 1 | 6 | 6 | 7 | 0 | 10 | 7 |
| 236 | 8 | 7 | 7 | 2 | 10 | 9 | 5 | 5 | 6 | 10 | 10 | 3 | 3 | 3 |
| 237 | 1 | 7 | 4 | 1 | 6 | 1 | 7 | 10 | 6 | 6 | 5 | 9 | 5 | 8 |
| 238 | 7 | 0 | 5 | 9 | 4 | 1 | 5 | 8 | 5 | 0 | 1 | 1 | 1 | 0 |
| 239 | 0 | 6 | 7 | 10 | 8 | 8 | 8 | 5 | 6 | 1 | 11 | 9 | 11 | 9 |
| 240 | 2 | 0 | 6 | 0 | 8 | 0 | 3 | 8 | 0 | 3 | 8 | 4 | 10 | 8 |
| 241 | 3 | 0 | 7 | 5 | 11 | 6 | 3 | 9 | 9 | 6 | 1 | 7 | 1 | 11 |
| 242 | 7 | 0 | 4 | 11 | 1 | 3 | 2 | 5 | 10 | 5 | 9 | 9 | 1 | 1 |
| 243 | 6 | 11 | 4 | 1 | 4 | 4 | 5 | 9 | 11 | 4 | 6 | 2 | 4 | 6 |
| 244 | 3 | 4 | 3 | 1 | 7 | 0 | 9 | 6 | 6 | 9 | 0 | 8 | 6 | 11 |
| 245 | 4 | 3 | 4 | 4 | 11 | 2 | 1 | 9 | 2 | 6 | 3 | 0 | 0 | 7 |
| 246 | 11 | 1 | 5 | 10 | 1 | 1 | 1 | 3 | 9 | 10 | 2 | 7 | 7 | 9 |
| 247 | 6 | 0 | 9 | 3 | 0 | 5 | 10 | 0 | 0 | 7 | 6 | 11 | 6 | 3 |
| 248 | 0 | 8 | 2 | 4 | 2 | 2 | 0 | 1 | 5 | 10 | 6 | 7 | 3 | 7 |
| 249 | 6 | 10 | 0 | 9 | 2 | 10 | 5 | 3 | 2 | 0 | 8 | 5 | 2 | 6 |
| 250 | 4 | 9 | 4 | 4 | 2 | 5 | 7 | 8 | 9 | 1 | 9 | 2 | 7 | 8 |
| 251 | 2 | 3 | 10 | 2 | 6 | 0 | 10 | 3 | 4 | 6 | 8 | 6 | 4 | 3 |
| 252 | 9 | 10 | 10 | 10 | 0 | 4 | 3 | 1 | 3 | 6 | 3 | 2 | 2 | 6 |
| 253 | 10 | 2 | 2 | 10 | 11 | 4 | 9 | 4 | 5 | 0 | 10 | 0 | 0 | 2 |
| 254 | 1 | 6 | 0 | 8 | 7 | 11 | 1 | 10 | 3 | 0 | 6 | 9 | 7 | 3 |
| 255 | 4 | 3 | 3 | 7 | 9 | 8 | 11 | 8 | 10 | 6 | 7 | 6 | 11 | 5 |
| 256 | 1 | 2 | 9 | 0 | 7 | 11 | 11 | 2 | 5 | 10 | 9 | 7 | 7 | 2 |
| 257 | 6 | 5 | 9 | 0 | 9 | 6 | 1 | 0 | 11 | 8 | 7 | 3 | 3 | 5 |
| 258 | 2 | 5 | 8 | 10 | 3 | 2 | 5 | 7 | 1 | 3 | 1 | 9 | 5 | 9 |
| 259 | 10 | 0 | 8 | 11 | 1 | 8 | 8 | 1 | 4 | 11 | 4 | 4 | 5 | 3 |
| 260 | 5 | 8 | 2 | 10 | 9 | 5 | 2 | 10 | 1 | 9 | 0 | 7 | 1 | 3 |
| 261 | 8 | 8 | 0 | 3 | 11 | 3 | 3 | 6 | 3 | 4 | 11 | 3 | 9 | 7 |
| 262 | 9 | 10 | 6 | 8 | 11 | 9 | 3 | 6 | 0 | 7 | 7 | 5 | 5 | 4 |
| 263 | 10 | 5 | 6 | 10 | 11 | 3 | 1 | 4 | 9 | 6 | 9 | 5 | 5 | 5 |
| 264 | 8 | 5 | 10 | 6 | 1 | 1 | 11 | 6 | 7 | 0 | 9 | 6 | 6 | 8 |
| 265 | 3 | 5 | 7 | 8 | 10 | 8 | 6 | 11 | 4 | 10 | 8 | 6 | 7 | 4 |
| 266 | 3 | 5 | 0 | 9 | 2 | 4 | 10 | 10 | 11 | 0 | 7 | 11 | 5 | 9 |
| 267 | 3 | 7 | 4 | 1 | 11 | 4 | 5 | 5 | 4 | 7 | 10 | 9 | 8 | 11 |
| 268 | 8 | 2 | 0 | 7 | 3 | 8 | 4 | 3 | 7 | 5 | 11 | 3 | 3 | 2 |
| 269 | 9 | 0 | 4 | 9 | 10 | 8 | 1 | 8 | 5 | 3 | 10 | 0 | 6 | 9 |
| 270 | 1 | 0 | 10 | 1 | 11 | 7 | 2 | 4 | 10 | 9 | 7 | 7 | 10 | 10 |
| 271 | 11 | 3 | 8 | 7 | 2 | 0 | 10 | 0 | 9 | 6 | 11 | 3 | 2 | 6 |
| 272 | 11 | 0 | 9 | 3 | 1 | 1 | 11 | 7 | 1 | 11 | 4 | 0 | 9 | 9 |
| 273 | 2 | 1 | 10 | 7 | 3 | 3 | 0 | 11 | 9 | 0 | 10 | 4 | 9 | 3 |
| 274 | 2 | 3 | 3 | 3 | 3 | 2 | 7 | 0 | 1 | 7 | 7 | 4 | 3 | 8 |
| 275 | 8 | 4 | 9 | 1 | 10 | 7 | 3 | 1 | 2 | 2 | 8 | 10 | 4 | 7 |
| 276 | 2 | 9 | 9 | 6 | 0 | 6 | 4 | 1 | 8 | 3 | 5 | 4 | 2 | 5 |
| 277 | 4 | 8 | 10 | 0 | 11 | 1 | 10 | 2 | 4 | 0 | 8 | 4 | 1 | 9 |
| 278 | 9 | 6 | 8 | 10 | 4 | 0 | 4 | 3 | 3 | 2 | 11 | 6 | 3 | 8 |
| 279 | 4 | 1 | 3 | 5 | 10 | 5 | 1 | 11 | 8 | 6 | 0 | 2 | 11 | 6 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 280 | 3 | 11 | 10 | 9 | 7 | 10 | 11 | 8 | 9 | 9 | 11 | 7 | 9 | 8 |
| 281 | 7 | 3 | 1 | 0 | 5 | 2 | 7 | 10 | 9 | 2 | 8 | 7 | 3 | 9 |
| 282 | 1 | 3 | 3 | 9 | 6 | 1 | 9 | 1 | 2 | 0 | 0 | 10 | 9 | 5 |
| 283 | 6 | 1 | 1 | 5 | 3 | 11 | 5 | 5 | 1 | 8 | 6 | 4 | 6 | 7 |
| 284 | 7 | 3 | 11 | 11 | 1 | 1 | 10 | 0 | 2 | 7 | 1 | 4 | 1 | 6 |
| 285 | 8 | 6 | 6 | 1 | 11 | 2 | 0 | 8 | 9 | 11 | 10 | 11 | 2 | 8 |
| 286 | 0 | 3 | 9 | 5 | 9 | 9 | 8 | 3 | 3 | 3 | 8 | 3 | 7 | 3 |
| 287 | 11 | 11 | 1 | 6 | 6 | 7 | 10 | 3 | 10 | 11 | 11 | 9 | 8 | 4 |
| 288 | 3 | 3 | 4 | 9 | 1 | 10 | 2 | 3 | 1 | 7 | 2 | 2 | 5 | 9 |
| 289 | 3 | 4 | 5 | 0 | 9 | 9 | 2 | 7 | 3 | 5 | 3 | 9 | 10 | 0 |
| 290 | 9 | 5 | 11 | 8 | 7 | 4 | 11 | 2 | 6 | 1 | 2 | 9 | 9 | 6 |
| 291 | 8 | 6 | 8 | 5 | 9 | 9 | 3 | 8 | 1 | 0 | 6 | 0 | 4 | 6 |
| 292 | 0 | 4 | 6 | 11 | 6 | 9 | 7 | 5 | 11 | 8 | 6 | 5 | 11 | 0 |
| 293 | 8 | 9 | 11 | 3 | 1 | 4 | 6 | 10 | 8 | 7 | 6 | 0 | 2 | 9 |
| 294 | 11 | 2 | 1 | 7 | 2 | 1 | 5 | 7 | 4 | 10 | 11 | 7 | 10 | 5 |
| 295 | 3 | 5 | 9 | 0 | 8 | 2 | 10 | 5 | 7 | 3 | 10 | 8 | 9 | 2 |
| 296 | 3 | 9 | 5 | 8 | 0 | 3 | 7 | 1 | 10 | 4 | 5 | 5 | 11 | 8 |
| 297 | 1 | 7 | 9 | 9 | 10 | 2 | 3 | 11 | 4 | 4 | 11 | 2 | 7 | 8 |
| 298 | 2 | 4 | 0 | 2 | 4 | 9 | 4 | 8 | 5 | 10 | 0 | 0 | 9 | 7 |
| 299 | 6 | 0 | 5 | 1 | 8 | 4 | 1 | 11 | 7 | 1 | 3 | 8 | 4 | 7 |
| 300 | 7 | 5 | 4 | 5 | 3 | 6 | 6 | 6 | 8 | 6 | 2 | 4 | 3 | 0 |
| 301 | 7 | 10 | 11 | 1 | 6 | 8 | 0 | 9 | 11 | 4 | 10 | 5 | 3 | 11 |
| 302 | 8 | 0 | 1 | 0 | 2 | 0 | 3 | 3 | 8 | 9 | 9 | 0 | 11 | 9 |
| 303 | 7 | 4 | 10 | 7 | 1 | 5 | 1 | 6 | 5 | 2 | 11 | 8 | 10 | 11 |
| 304 | 3 | 1 | 2 | 2 | 0 | 9 | 10 | 10 | 3 | 2 | 9 | 0 | 11 | 0 |
| 305 | 11 | 10 | 8 | 4 | 4 | 5 | 9 | 5 | 1 | 8 | 1 | 11 | 5 | 0 |
| 306 | 7 | 9 | 5 | 7 | 6 | 7 | 9 | 9 | 2 | 9 | 6 | 2 | 2 | 3 |
| 307 | 2 | 9 | 4 | 11 | 8 | 4 | 11 | 0 | 11 | 4 | 11 | 0 | 5 | 8 |
| 308 | 9 | 11 | 7 | 5 | 5 | 4 | 9 | 1 | 9 | 11 | 3 | 11 | 7 | 4 |
| 309 | 0 | 3 | 3 | 5 | 10 | 7 | 2 | 5 | 7 | 8 | 11 | 6 | 2 | 7 |
| 310 | 10 | 4 | 10 | 8 | 1 | 1 | 6 | 2 | 2 | 6 | 10 | 11 | 2 | 1 |
| 311 | 10 | 7 | 8 | 9 | 9 | 4 | 7 | 6 | 1 | 5 | 9 | 7 | 2 | 11 |
| 312 | 4 | 6 | 0 | 9 | 5 | 6 | 6 | 6 | 11 | 1 | 1 | 10 | 4 | 9 |
| 313 | 0 | 11 | 7 | 6 | 9 | 7 | 9 | 8 | 10 | 5 | 6 | 0 | 6 | 2 |
| 314 | 11 | 3 | 6 | 10 | 8 | 4 | 4 | 5 | 5 | 5 | 4 | 0 | 4 | 10 |
| 315 | 1 | 1 | 2 | 7 | 5 | 8 | 4 | 10 | 10 | 9 | 11 | 2 | 6 | 9 |
| 316 | 2 | 1 | 7 | 4 | 0 | 5 | 4 | 7 | 6 | 4 | 11 | 10 | 8 | 4 |
| 317 | 1 | 8 | 0 | 0 | 7 | 0 | 5 | 8 | 7 | 9 | 6 | 7 | 6 | 10 |
| 318 | 1 | 9 | 2 | 2 | 1 | 1 | 4 | 8 | 5 | 8 | 2 | 3 | 5 | 5 |
| 319 | 3 | 5 | 6 | 3 | 7 | 10 | 7 | 1 | 3 | 3 | 6 | 11 | 0 | 5 |
| 320 | 8 | 3 | 0 | 3 | 11 | 11 | 9 | 5 | 9 | 2 | 1 | 9 | 3 | 11 |
| 321 | 3 | 2 | 0 | 7 | 10 | 0 | 1 | 4 | 2 | 6 | 2 | 10 | 11 | 8 |
| 322 | 6 | 1 | 9 | 9 | 3 | 2 | 7 | 2 | 10 | 3 | 3 | 0 | 6 | 2 |
| 323 | 9 | 11 | 2 | 4 | 9 | 7 | 9 | 11 | 6 | 6 | 5 | 5 | 11 | 5 |
| 324 | 0 | 7 | 1 | 0 | 7 | 3 | 10 | 3 | 11 | 0 | 9 | 5 | 9 | 8 |
| 325 | 4 | 10 | 5 | 2 | 9 | 5 | 3 | 11 | 0 | 2 | 11 | 3 | 3 | 9 |
| 326 | 2 | 11 | 4 | 0 | 5 | 8 | 3 | 7 | 0 | 7 | 11 | 11 | 9 | 7 |
| 327 | 10 | 5 | 10 | 10 | 3 | 11 | 0 | 9 | 7 | 11 | 5 | 9 | 8 | 4 |
| 328 | 7 | 10 | 5 | 2 | 10 | 0 | 1 | 7 | 1 | 11 | 11 | 9 | 7 | 0 |
| 329 | 10 | 0 | 4 | 4 | 10 | 2 | 6 | 4 | 0 | 2 | 3 | 3 | 4 | 5 |
| 330 | 4 | 3 | 3 | 9 | 11 | 5 | 7 | 4 | 4 | 1 | 4 | 3 | 10 | 2 |
| 331 | 0 | 6 | 5 | 1 | 2 | 3 | 10 | 10 | 5 | 2 | 11 | 0 | 4 | 7 |
| 332 | 7 | 8 | 11 | 3 | 5 | 2 | 6 | 3 | 11 | 3 | 2 | 4 | 11 | 6 |
| 333 | 5 | 5 | 2 | 6 | 1 | 10 | 6 | 4 | 4 | 7 | 0 | 10 | 0 | 3 |
| 334 | 11 | 4 | 2 | 11 | 3 | 2 | 4 | 7 | 8 | 2 | 3 | 8 | 0 | 1 |
| 335 | 11 | 4 | 11 | 6 | 3 | 5 | 8 | 6 | 9 | 6 | 0 | 8 | 3 | 6 |
| 336 | 1 | 4 | 1 | 4 | 3 | 10 | 8 | 10 | 3 | 7 | 9 | 11 | 8 | 3 |
| 337 | 5 | 7 | 9 | 1 | 3 | 7 | 3 | 10 | 6 | 3 | 1 | 7 | 2 | 9 |
| 338 | 7 | 8 | 6 | 7 | 7 | 10 | 9 | 5 | 4 | 2 | 2 | 6 | 2 | 1 |
| 339 | 11 | 1 | 1 | 0 | 4 | 10 | 10 | 4 | 5 | 7 | 6 | 2 | 10 | 2 |
| 340 | 8 | 3 | 6 | 5 | 10 | 3 | 1 | 2 | 2 | 6 | 1 | 7 | 3 | 10 |
| 341 | 7 | 0 | 0 | 0 | 10 | 11 | 11 | 4 | 8 | 8 | 7 | 11 | 6 | 9 |
| 342 | 10 | 2 | 11 | 10 | 5 | 3 | 8 | 4 | 1 | 3 | 3 | 1 | 2 | 7 |
| 343 | 11 | 10 | 2 | 3 | 5 | 6 | 8 | 7 | 5 | 2 | 5 | 9 | 10 | 2 |
| 344 | 6 | 5 | 5 | 8 | 5 | 10 | 1 | 3 | 9 | 8 | 9 | 10 | 4 | 0 |
| 345 | 11 | 3 | 4 | 1 | 1 | 6 | 6 | 5 | 2 | 9 | 2 | 5 | 4 | 6 |
| 346 | 10 | 7 | 5 | 1 | 3 | 5 | 11 | 4 | 4 | 10 | 0 | 5 | 1 | 6 |
| 347 | 2 | 10 | 6 | 6 | 9 | 6 | 5 | 7 | 4 | 0 | 10 | 8 | 5 | 6 |
| 348 | 2 | 7 | 4 | 5 | 0 | 6 | 2 | 4 | 1 | 8 | 6 | 5 | 1 | 10 |
| 349 | 11 | 4 | 0 | 6 | 1 | 11 | 9 | 2 | 8 | 10 | 11 | 10 | 2 | 2 |
| 350 | 4 | 0 | 2 | 10 | 3 | 8 | 3 | 4 | 3 | 10 | 8 | 9 | 5 | 2 |
| 351 | 10 | 7 | 3 | 8 | 10 | 3 | 4 | 9 | 5 | 8 | 3 | 5 | 5 | 0 |
| 352 | 1 | 1 | 2 | 11 | 3 | 3 | 9 | 1 | 5 | 5 | 10 | 1 | 1 | 9 |
| 353 | 8 | 3 | 5 | 9 | 0 | 5 | 10 | 6 | 7 | 1 | 11 | 2 | 2 | 1 |
| 354 | 9 | 4 | 8 | 8 | 3 | 7 | 0 | 8 | 8 | 6 | 3 | 1 | 6 | 2 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 355 | 7 | 11 | 8 | 8 | 1 | 7 | 6 | 6 | 3 | 10 | 1 | 4 | 5 | 1 |
| 356 | 6 | 8 | 3 | 7 | 3 | 5 | 10 | 11 | 8 | 11 | 10 | 6 | 2 | 4 |
| 357 | 1 | 0 | 3 | 6 | 10 | 1 | 5 | 7 | 8 | 2 | 0 | 1 | 7 | 8 |
| 358 | 6 | 11 | 6 | 1 | 1 | 9 | 10 | 10 | 6 | 4 | 10 | 9 | 0 | 4 |
| 359 | 6 | 4 | 2 | 3 | 9 | 11 | 11 | 6 | 6 | 11 | 8 | 11 | 11 | 3 |
| 360 | 5 | 11 | 10 | 7 | 11 | 6 | 9 | 1 | 7 | 2 | 6 | 1 | 3 | 7 |
| 361 | 6 | 1 | 9 | 10 | 2 | 4 | 3 | 4 | 1 | 5 | 11 | 11 | 3 | 5 |
| 362 | 4 | 4 | 6 | 7 | 5 | 7 | 5 | 1 | 3 | 11 | 6 | 3 | 5 | 1 |
| 363 | 11 | 3 | 4 | 7 | 4 | 8 | 6 | 6 | 10 | 4 | 10 | 8 | 6 | 3 |
| 364 | 9 | 5 | 7 | 11 | 5 | 2 | 8 | 2 | 0 | 10 | 4 | 5 | 1 | 11 |
| 365 | 4 | 9 | 10 | 10 | 4 | 0 | 8 | 0 | 0 | 11 | 6 | 10 | 6 | 0 |
| 366 | 3 | 0 | 7 | 9 | 5 | 5 | 0 | 1 | 10 | 0 | 4 | 6 | 9 | 6 |
| 367 | 7 | 10 | 7 | 2 | 6 | 8 | 3 | 2 | 2 | 11 | 5 | 2 | 1 | 8 |
| 368 | 9 | 4 | 0 | 0 | 0 | 1 | 11 | 10 | 10 | 3 | 4 | 8 | 0 | 3 |
| 369 | 9 | 5 | 10 | 1 | 8 | 4 | 0 | 0 | 9 | 8 | 4 | 11 | 5 | 0 |
| 370 | 6 | 0 | 3 | 11 | 5 | 4 | 2 | 1 | 10 | 11 | 6 | 10 | 10 | 11 |
| 371 | 4 | 5 | 5 | 10 | 2 | 7 | 8 | 10 | 10 | 0 | 2 | 6 | 2 | 1 |
| 372 | 10 | 0 | 11 | 7 | 8 | 9 | 3 | 6 | 5 | 2 | 9 | 10 | 4 | 8 |
| 373 | 3 | 0 | 1 | 3 | 1 | 8 | 0 | 11 | 9 | 7 | 3 | 1 | 10 | 0 |
| 374 | 10 | 10 | 5 | 11 | 7 | 11 | 2 | 2 | 8 | 5 | 7 | 10 | 1 | 8 |
| 375 | 10 | 1 | 11 | 2 | 1 | 1 | 8 | 11 | 9 | 8 | 0 | 5 | 9 | 2 |
| 376 | 9 | 8 | 3 | 2 | 9 | 8 | 8 | 3 | 4 | 1 | 5 | 5 | 8 | 8 |
| 377 | 2 | 10 | 6 | 11 | 3 | 11 | 9 | 1 | 2 | 10 | 4 | 11 | 4 | 5 |
| 378 | 11 | 11 | 5 | 8 | 1 | 8 | 1 | 2 | 7 | 9 | 9 | 1 | 2 | 5 |
| 379 | 10 | 1 | 0 | 10 | 9 | 10 | 1 | 7 | 6 | 9 | 4 | 6 | 8 | 0 |
| 380 | 1 | 4 | 0 | 3 | 5 | 5 | 7 | 0 | 10 | 8 | 5 | 6 | 2 | 7 |
| 381 | 6 | 9 | 4 | 8 | 0 | 9 | 5 | 6 | 10 | 5 | 9 | 2 | 10 | 9 |
| 382 | 8 | 6 | 0 | 2 | 0 | 2 | 9 | 4 | 11 | 6 | 11 | 6 | 6 | 11 |
| 383 | 8 | 5 | 1 | 9 | 6 | 1 | 4 | 10 | 2 | 5 | 5 | 1 | 6 | 4 |
| 384 | 7 | 1 | 8 | 4 | 3 | 4 | 7 | 10 | 8 | 0 | 8 | 8 | 5 | 0 |
| 385 | 9 | 1 | 2 | 0 | 6 | 3 | 7 | 10 | 1 | 3 | 9 | 9 | 8 | 6 |
| 386 | 9 | 3 | 4 | 5 | 4 | 4 | 4 | 0 | 3 | 8 | 0 | 5 | 10 | 4 |
| 387 | 7 | 7 | 1 | 6 | 0 | 10 | 8 | 11 | 6 | 9 | 1 | 4 | 10 | 11 |
| 388 | 5 | 4 | 9 | 5 | 4 | 5 | 4 | 9 | 4 | 6 | 7 | 1 | 7 | 3 |
| 389 | 1 | 7 | 1 | 5 | 7 | 1 | 3 | 9 | 4 | 1 | 8 | 5 | 6 | 9 |
| 390 | 5 | 10 | 1 | 10 | 8 | 11 | 10 | 0 | 4 | 10 | 2 | 10 | 11 | 7 |
| 391 | 7 | 8 | 8 | 11 | 2 | 1 | 7 | 11 | 10 | 0 | 3 | 7 | 7 | 6 |
| 392 | 2 | 2 | 10 | 10 | 11 | 10 | 1 | 11 | 1 | 4 | 1 | 0 | 10 | 0 |
| 393 | 3 | 3 | 9 | 2 | 0 | 0 | 7 | 5 | 4 | 4 | 4 | 7 | 1 | 10 |
| 394 | 3 | 9 | 3 | 3 | 8 | 6 | 5 | 10 | 7 | 3 | 9 | 1 | 2 | 8 |
| 395 | 11 | 2 | 7 | 4 | 3 | 9 | 1 | 5 | 3 | 5 | 2 | 9 | 4 | 9 |
| 396 | 9 | 4 | 4 | 11 | 6 | 5 | 11 | 0 | 6 | 0 | 9 | 4 | 11 | 7 |
| 397 | 7 | 5 | 8 | 1 | 7 | 4 | 7 | 1 | 2 | 6 | 10 | 3 | 8 | 9 |
| 398 | 1 | 9 | 8 | 0 | 11 | 9 | 9 | 11 | 9 | 9 | 7 | 0 | 3 | 9 |
| 399 | 7 | 6 | 2 | 2 | 2 | 3 | 8 | 7 | 10 | 1 | 4 | 8 | 11 | 0 |
| 400 | 3 | 4 | 0 | 8 | 2 | 5 | 7 | 11 | 6 | 1 | 7 | 9 | 10 | 11 |
| 401 | 10 | 3 | 7 | 2 | 1 | 0 | 9 | 5 | 0 | 3 | 7 | 4 | 0 | 4 |
| 402 | 10 | 6 | 5 | 7 | 5 | 5 | 9 | 4 | 0 | 11 | 1 | 9 | 11 | 0 |
| 403 | 3 | 3 | 8 | 8 | 0 | 1 | 2 | 1 | 8 | 11 | 10 | 3 | 10 | 2 |
| 404 | 10 | 1 | 6 | 9 | 0 | 10 | 3 | 3 | 2 | 2 | 5 | 11 | 0 | 8 |
| 405 | 6 | 6 | 7 | 1 | 8 | 11 | 4 | 3 | 8 | 3 | 8 | 3 | 3 | 7 |
| 406 | 0 | 6 | 1 | 6 | 10 | 0 | 0 | 1 | 5 | 1 | 8 | 5 | 7 | 2 |
| 407 | 3 | 10 | 11 | 0 | 5 | 8 | 6 | 10 | 6 | 7 | 0 | 2 | 3 | 3 |
| 408 | 5 | 2 | 3 | 9 | 0 | 8 | 6 | 3 | 3 | 6 | 6 | 8 | 6 | 4 |
| 409 | 1 | 5 | 4 | 0 | 10 | 9 | 9 | 10 | 6 | 7 | 2 | 3 | 9 | 0 |
| 410 | 8 | 8 | 9 | 4 | 5 | 5 | 2 | 8 | 7 | 0 | 2 | 5 | 11 | 5 |
| 411 | 2 | 5 | 7 | 6 | 2 | 5 | 3 | 11 | 6 | 7 | 9 | 7 | 11 | 8 |
| 412 | 8 | 3 | 3 | 6 | 8 | 8 | 1 | 0 | 0 | 10 | 8 | 10 | 0 | 10 |
| 413 | 3 | 2 | 3 | 3 | 0 | 10 | 8 | 5 | 9 | 3 | 2 | 6 | 8 | 0 |
| 414 | 5 | 8 | 2 | 11 | 1 | 11 | 3 | 0 | 3 | 2 | 10 | 9 | 10 | 7 |
| 415 | 6 | 5 | 0 | 8 | 11 | 7 | 8 | 7 | 3 | 7 | 3 | 1 | 7 | 8 |
| 416 | 3 | 6 | 5 | 0 | 7 | 7 | 11 | 1 | 8 | 5 | 9 | 1 | 11 | 11 |
| 417 | 2 | 4 | 9 | 8 | 10 | 8 | 5 | 2 | 3 | 9 | 10 | 8 | 3 | 0 |
| 418 | 1 | 11 | 5 | 5 | 9 | 4 | 0 | 6 | 5 | 10 | 8 | 6 | 1 | 6 |
| 419 | 1 | 2 | 8 | 3 | 4 | 3 | 5 | 10 | 8 | 2 | 10 | 9 | 5 | 11 |
| 420 | 2 | 1 | 11 | 2 | 8 | 1 | 6 | 9 | 1 | 4 | 3 | 7 | 11 | 8 |
| 421 | 3 | 0 | 4 | 0 | 10 | 3 | 8 | 8 | 9 | 9 | 8 | 9 | 0 | 11 |
| 422 | 1 | 4 | 4 | 6 | 3 | 9 | 4 | 4 | 5 | 3 | 1 | 11 | 10 | 5 |
| 423 | 1 | 6 | 1 | 1 | 9 | 11 | 6 | 6 | 6 | 3 | 6 | 2 | 2 | 1 |
| 424 | 5 | 9 | 6 | 0 | 3 | 5 | 1 | 3 | 10 | 7 | 4 | 10 | 10 | 9 |
| 425 | 3 | 6 | 7 | 7 | 8 | 4 | 2 | 6 | 7 | 9 | 0 | 3 | 4 | 9 |
| 426 | 2 | 4 | 3 | 0 | 7 | 6 | 2 | 10 | 8 | 6 | 11 | 10 | 0 | 4 |
| 427 | 11 | 4 | 1 | 10 | 2 | 11 | 6 | 7 | 11 | 6 | 1 | 11 | 1 | 10 |
| 428 | 7 | 0 | 5 | 0 | 11 | 6 | 2 | 1 | 8 | 0 | 4 | 0 | 10 | 3 |
| 429 | 9 | 4 | 4 | 10 | 1 | 3 | 3 | 4 | 9 | 7 | 5 | 11 | 8 | 0 |
| 430 | 0 | 0 | 7 | 3 | 6 | 3 | 0 | 0 | 1 | 9 | 7 | 11 | 8 | 1 |
| 431 | 3 | 7 | 2 | 9 | 4 | 0 | 8 | 3 | 7 | 2 | 9 | 8 | 2 | 10 |
| 432 | 5 | 9 | 1 | 1 | 10 | 6 | 10 | 3 | 1 | 6 | 10 | 3 | 5 | 10 |
| 433 | 11 | 7 | 2 | 2 | 0 | 5 | 0 | 2 | 5 | 1 | 10 | 4 | 4 | 11 |
| 434 | 7 | 1 | 4 | 3 | 10 | 0 | 3 | 2 | 9 | 10 | 6 | 1 | 11 | 8 |
| 435 | 2 | 10 | 0 | 5 | 9 | 8 | 10 | 11 | 1 | 7 | 11 | 7 | 7 | 10 |
| 436 | 4 | 0 | 5 | 5 | 0 | 0 | 0 | 8 | 8 | 8 | 1 | 6 | 9 | 11 |
| 437 | 0 | 2 | 1 | 4 | 7 | 8 | 6 | 2 | 6 | 7 | 4 | 5 | 11 | 7 |
| 438 | 1 | 1 | 10 | 7 | 4 | 2 | 9 | 9 | 10 | 4 | 1 | 4 | 4 | 10 |
| 439 | 11 | 3 | 6 | 10 | 10 | 9 | 0 | 11 | 10 | 3 | 8 | 6 | 10 | 11 |
| 440 | 3 | 6 | 11 | 1 | 0 | 7 | 9 | 9 | 9 | 7 | 1 | 3 | 3 | 1 |
| 441 | 10 | 0 | 2 | 6 | 5 | 7 | 6 | 10 | 4 | 1 | 4 | 9 | 3 | 9 |
| 442 | 0 | 9 | 8 | 5 | 2 | 11 | 8 | 10 | 2 | 7 | 9 | 4 | 7 | 10 |
| 443 | 3 | 9 | 8 | 4 | 11 | 0 | 11 | 4 | 11 | 8 | 2 | 7 | 10 | 9 |
| 444 | 1 | 6 | 2 | 3 | 10 | 3 | 3 | 3 | 7 | 5 | 7 | 8 | 4 | 1 |
| 445 | 4 | 8 | 0 | 6 | 4 | 4 | 1 | 6 | 5 | 4 | 0 | 5 | 5 | 11 |
| 446 | 7 | 6 | 4 | 9 | 5 | 11 | 11 | 5 | 4 | 11 | 0 | 10 | 8 | 5 |
| 447 | 5 | 2 | 6 | 3 | 7 | 8 | 8 | 5 | 1 | 6 | 7 | 1 | 5 | 11 |
| 448 | 8 | 0 | 7 | 8 | 8 | 1 | 1 | 9 | 4 | 7 | 1 | 1 | 0 | 3 |
| 449 | 6 | 0 | 6 | 7 | 7 | 2 | 9 | 3 | 9 | 0 | 4 | 11 | 1 | 7 |
| 450 | 9 | 1 | 1 | 1 | 0 | 7 | 6 | 3 | 2 | 8 | 8 | 4 | 7 | 2 |
| 451 | 10 | 9 | 7 | 8 | 0 | 5 | 7 | 4 | 2 | 7 | 11 | 11 | 9 | 2 |
| 452 | 10 | 10 | 10 | 6 | 5 | 9 | 10 | 7 | 8 | 7 | 10 | 6 | 6 | 0 |
| 453 | 4 | 8 | 9 | 1 | 1 | 8 | 11 | 1 | 3 | 5 | 3 | 5 | 1 | 9 |
| 454 | 7 | 8 | 4 | 5 | 6 | 5 | 10 | 1 | 9 | 5 | 4 | 10 | 6 | 8 |
| 455 | 10 | 9 | 2 | 2 | 11 | 5 | 5 | 5 | 1 | 1 | 2 | 7 | 7 | 1 |
| 456 | 9 | 3 | 0 | 9 | 7 | 4 | 7 | 4 | 0 | 9 | 8 | 2 | 2 | 8 |
| 457 | 8 | 4 | 11 | 5 | 0 | 2 | 10 | 9 | 10 | 4 | 5 | 10 | 3 | 3 |
| 458 | 11 | 11 | 8 | 9 | 4 | 0 | 0 | 7 | 8 | 2 | 6 | 5 | 1 | 3 |
| 459 | 8 | 1 | 10 | 8 | 0 | 4 | 1 | 7 | 10 | 6 | 6 | 11 | 10 | 7 |
| 460 | 11 | 0 | 11 | 2 | 7 | 7 | 10 | 11 | 6 | 11 | 9 | 3 | 0 | 5 |
| 461 | 10 | 0 | 5 | 0 | 2 | 2 | 4 | 1 | 11 | 10 | 0 | 3 | 0 | 8 |
| 462 | 0 | 0 | 4 | 7 | 7 | 4 | 4 | 10 | 3 | 0 | 11 | 1 | 5 | 11 |
| 463 | 7 | 2 | 5 | 4 | 11 | 5 | 3 | 5 | 4 | 11 | 9 | 11 | 6 | 10 |
| 464 | 4 | 1 | 11 | 8 | 11 | 2 | 11 | 5 | 5 | 1 | 6 | 10 | 5 | 3 |
| 465 | 3 | 7 | 11 | 8 | 4 | 3 | 5 | 0 | 6 | 0 | 8 | 11 | 0 | 6 |
| 466 | 1 | 1 | 1 | 7 | 6 | 3 | 4 | 8 | 9 | 8 | 4 | 9 | 10 | 1 |
| 467 | 9 | 0 | 11 | 4 | 3 | 6 | 6 | 1 | 4 | 6 | 0 | 10 | 1 | 1 |
| 468 | 10 | 4 | 1 | 7 | 9 | 8 | 3 | 4 | 6 | 5 | 1 | 6 | 0 | 1 |
| 469 | 10 | 3 | 2 | 6 | 0 | 8 | 7 | 8 | 2 | 4 | 10 | 0 | 7 | 11 |
| 470 | 3 | 3 | 7 | 6 | 10 | 1 | 10 | 0 | 8 | 0 | 4 | 5 | 0 | 5 |
| 471 | 3 | 6 | 0 | 4 | 7 | 3 | 10 | 3 | 0 | 10 | 3 | 4 | 0 | 11 |
| 472 | 4 | 4 | 8 | 5 | 10 | 11 | 4 | 11 | 7 | 3 | 7 | 10 | 6 | 10 |
| 473 | 4 | 2 | 3 | 4 | 0 | 2 | 5 | 8 | 2 | 9 | 2 | 5 | 5 | 8 |
| 474 | 11 | 7 | 9 | 5 | 4 | 6 | 2 | 1 | 10 | 5 | 1 | 1 | 3 | 1 |
| 475 | 1 | 9 | 11 | 7 | 0 | 4 | 1 | 5 | 9 | 1 | 3 | 0 | 9 | 8 |
| 476 | 8 | 6 | 2 | 7 | 6 | 6 | 4 | 6 | 4 | 1 | 6 | 0 | 7 | 10 |
| 477 | 2 | 5 | 5 | 1 | 3 | 0 | 8 | 4 | 3 | 0 | 11 | 10 | 3 | 3 |
| 478 | 10 | 6 | 0 | 3 | 2 | 11 | 5 | 6 | 4 | 9 | 7 | 1 | 7 | 6 |
| 479 | 1 | 6 | 7 | 0 | 1 | 1 | 11 | 6 | 4 | 5 | 3 | 7 | 3 | 4 |
| 480 | 1 | 1 | 6 | 4 | 0 | 6 | 7 | 8 | 5 | 1 | 11 | 4 | 5 | 7 |
| 481 | 11 | 1 | 8 | 8 | 8 | 9 | 6 | 8 | 6 | 0 | 5 | 1 | 7 | 1 |
| 482 | 0 | 3 | 7 | 5 | 3 | 5 | 3 | 7 | 5 | 4 | 0 | 4 | 3 | 2 |
| 483 | 10 | 4 | 7 | 11 | 4 | 8 | 10 | 10 | 9 | 5 | 2 | 3 | 8 | 3 |
| 484 | 0 | 2 | 7 | 3 | 10 | 8 | 11 | 9 | 7 | 10 | 10 | 9 | 0 | 10 |
| 485 | 6 | 0 | 3 | 6 | 9 | 10 | 11 | 8 | 2 | 4 | 4 | 1 | 1 | 3 |
| 486 | 5 | 8 | 8 | 5 | 4 | 3 | 11 | 6 | 7 | 9 | 10 | 4 | 3 | 3 |
| 487 | 2 | 10 | 6 | 1 | 0 | 2 | 1 | 10 | 0 | 6 | 9 | 10 | 2 | 0 |
| 488 | 4 | 2 | 6 | 4 | 3 | 7 | 3 | 11 | 11 | 7 | 0 | 6 | 3 | 0 |
| 489 | 9 | 11 | 10 | 5 | 4 | 3 | 4 | 4 | 1 | 5 | 8 | 7 | 5 | 10 |
| 490 | 5 | 0 | 7 | 3 | 4 | 1 | 3 | 0 | 7 | 1 | 2 | 1 | 4 | 4 |
| 491 | 10 | 1 | 0 | 2 | 5 | 6 | 1 | 0 | 5 | 0 | 6 | 4 | 4 | 5 |
| 492 | 7 | 3 | 5 | 4 | 0 | 7 | 1 | 5 | 6 | 0 | 7 | 5 | 7 | 8 |
| 493 | 10 | 11 | 11 | 4 | 3 | 3 | 1 | 11 | 1 | 6 | 10 | 7 | 6 | 9 |
| 494 | 9 | 6 | 5 | 11 | 8 | 10 | 10 | 10 | 10 | 1 | 2 | 11 | 3 | 9 |
| 495 | 3 | 2 | 11 | 0 | 1 | 9 | 7 | 1 | 7 | 2 | 0 | 11 | 1 | 6 |
| 496 | 5 | 6 | 3 | 5 | 9 | 8 | 0 | 11 | 9 | 6 | 5 | 0 | 5 | 7 |
| 497 | 5 | 4 | 4 | 7 | 8 | 1 | 7 | 1 | 10 | 2 | 8 | 4 | 1 | 10 |
| 498 | 11 | 9 | 7 | 11 | 1 | 7 | 1 | 8 | 0 | 3 | 8 | 11 | 7 | 2 |
| 499 | 9 | 4 | 10 | 10 | 10 | 10 | 11 | 3 | 1 | 5 | 3 | 6 | 1 | 11 |
| 500 | 10 | 5 | 11 | 5 | 4 | 3 | 6 | 9 | 4 | 4 | 11 | 9 | 4 | 11 |
| 501 | 11 | 6 | 1 | 3 | 3 | 2 | 8 | 2 | 1 | 5 | 8 | 10 | 9 | 4 |
| 502 | 7 | 3 | 4 | 9 | 8 | 7 | 6 | 11 | 10 | 1 | 3 | 3 | 11 | 1 |
| 503 | 9 | 10 | 8 | 3 | 9 | 3 | 11 | 2 | 8 | 3 | 9 | 5 | 4 | 3 |
| 504 | 6 | 1 | 3 | 2 | 7 | 5 | 11 | 9 | 8 | 2 | 1 | 4 | 6 | 11 |

-continued

| Example #1 of a nested design CS hopping pattern | | | | | | | | | | | | | | |
|---|---|---|---|---|---|---|---|---|---|---|---|---|---|---|
| m | $n_{cs}(n)$ | | | | | | | | | | | | | |
| 505 | 1 | 2 | 6 | 9 | 11 | 0 | 5 | 5 | 6 | 5 | 8 | 2 | 4 | 5 |
| 506 | 8 | 11 | 5 | 7 | 2 | 11 | 6 | 2 | 5 | 4 | 9 | 11 | 9 | 0 |
| 507 | 11 | 8 | 6 | 0 | 6 | 0 | 4 | 9 | 4 | 11 | 7 | 0 | 8 | 1 |
| 508 | 0 | 1 | 7 | 6 | 1 | 9 | 1 | 5 | 5 | 11 | 4 | 6 | 9 | 10 |
| 509 | 10 | 4 | 8 | 6 | 9 | 0 | 5 | 3 | 8 | 10 | 1 | 3 | 6 | 4 |
| 510 | 4 | 4 | 7 | 5 | 7 | 1 | 5 | 6 | 8 | 4 | 8 | 11 | 10 | 8 |
| 511 | 3 | 6 | 6 | 4 | 5 | 6 | 5 | 3 | 1 | 11 | 0 | 7 | 7 | 9 |
| 512 | 4 | 0 | 11 | 3 | 7 | 8 | 8 | 6 | 10 | 0 | 3 | 4 | 3 | 10 |
| 513 | 8 | 3 | 7 | 4 | 2 | 9 | 4 | 2 | 4 | 3 | 2 | 8 | 6 | 5 |
| 514 | 1 | 3 | 8 | 10 | 4 | 1 | 6 | 11 | 4 | 8 | 7 | 5 | 11 | 7 |
| 515 | 0 | 7 | 3 | 7 | 1 | 6 | 6 | 7 | 10 | 11 | 9 | 2 | 0 | 4 |
| 516 | 3 | 11 | 7 | 10 | 2 | 8 | 1 | 0 | 7 | 8 | 6 | 7 | 10 | 0 |
| 517 | 1 | 3 | 1 | 2 | 5 | 9 | 0 | 11 | 7 | 7 | 4 | 2 | 2 | 6 |
| 518 | 11 | 7 | 6 | 10 | 11 | 5 | 11 | 10 | 3 | 0 | 6 | 4 | 3 | 0 |
| 519 | 4 | 4 | 9 | 4 | 9 | 10 | 1 | 3 | 0 | 11 | 2 | 8 | 3 | 7 |
| 520 | 6 | 6 | 11 | 0 | 9 | 3 | 3 | 4 | 3 | 0 | 7 | 2 | 9 | 3 |
| 521 | 7 | 0 | 11 | 9 | 2 | 1 | 1 | 10 | 9 | 9 | 5 | 6 | 4 | 11 |
| 522 | 8 | 9 | 0 | 3 | 2 | 0 | 4 | 11 | 5 | 3 | 5 | 6 | 7 | 8 |
| 523 | 9 | 9 | 11 | 5 | 4 | 11 | 1 | 0 | 1 | 3 | 5 | 11 | 4 | 7 |
| 524 | 4 | 1 | 1 | 4 | 7 | 3 | 0 | 0 | 10 | 11 | 8 | 0 | 11 | 6 |
| 525 | 3 | 11 | 7 | 3 | 4 | 6 | 5 | 1 | 3 | 9 | 8 | 2 | 11 | 3 |
| 526 | 0 | 11 | 11 | 1 | 5 | 8 | 6 | 6 | 10 | 11 | 1 | 5 | 9 | 0 |
| 527 | 2 | 8 | 1 | 4 | 1 | 8 | 2 | 4 | 0 | 6 | 9 | 1 | 9 | 10 |
| 528 | 0 | 5 | 3 | 4 | 11 | 6 | 4 | 6 | 5 | 4 | 5 | 8 | 1 | 7 |
| 529 | 0 | 1 | 8 | 8 | 10 | 1 | 7 | 5 | 0 | 9 | 4 | 1 | 6 | 3 |
| 530 | 1 | 1 | 4 | 1 | 4 | 5 | 0 | 3 | 11 | 8 | 3 | 6 | 6 | 8 |
| 531 | 6 | 11 | 3 | 8 | 2 | 3 | 5 | 1 | 3 | 5 | 3 | 4 | 4 | 4 |
| 532 | 4 | 3 | 4 | 0 | 6 | 8 | 10 | 0 | 8 | 8 | 5 | 10 | 7 | 11 |
| 533 | 0 | 8 | 11 | 8 | 10 | 9 | 3 | 1 | 1 | 3 | 2 | 10 | 6 | 4 |
| 534 | 7 | 1 | 2 | 1 | 8 | 10 | 3 | 3 | 11 | 11 | 11 | 7 | 3 | 9 |
| 535 | 10 | 8 | 5 | 5 | 4 | 11 | 7 | 1 | 3 | 9 | 6 | 8 | 2 | 10 |
| 536 | 0 | 0 | 8 | 1 | 8 | 3 | 11 | 2 | 5 | 7 | 0 | 9 | 11 | 0 |
| 537 | 1 | 6 | 3 | 7 | 1 | 5 | 9 | 5 | 7 | 0 | 2 | 7 | 1 | 11 |
| 538 | 6 | 4 | 8 | 5 | 9 | 10 | 7 | 1 | 11 | 5 | 8 | 9 | 0 | 4 |
| 539 | 3 | 11 | 10 | 6 | 0 | 4 | 6 | 2 | 3 | 0 | 6 | 1 | 4 | 0 |
| 540 | 6 | 6 | 0 | 8 | 6 | 2 | 3 | 1 | 1 | 11 | 9 | 5 | 5 | 5 |
| 541 | 4 | 8 | 8 | 7 | 4 | 11 | 6 | 8 | 2 | 11 | 3 | 7 | 0 | 2 |
| 542 | 0 | 3 | 7 | 10 | 2 | 7 | 2 | 2 | 1 | 4 | 5 | 3 | 4 | 10 |
| 543 | 11 | 9 | 3 | 6 | 3 | 6 | 8 | 5 | 10 | 9 | 6 | 3 | 10 | 7 |
| 544 | 4 | 0 | 3 | 8 | 11 | 10 | 9 | 1 | 4 | 7 | 5 | 5 | 4 | 0 |
| 545 | 10 | 8 | 9 | 4 | 4 | 2 | 11 | 0 | 6 | 1 | 7 | 4 | 1 | 11 |
| 546 | 10 | 7 | 0 | 3 | 1 | 0 | 8 | 9 | 9 | 7 | 11 | 9 | 5 | 9 |
| 547 | 11 | 1 | 1 | 5 | 9 | 4 | 0 | 10 | 7 | 1 | 0 | 3 | 3 | 5 |
| 548 | 5 | 7 | 0 | 7 | 5 | 10 | 11 | 4 | 3 | 4 | 6 | 2 | 8 | 10 |
| 549 | 11 | 0 | 8 | 4 | 6 | 11 | 7 | 10 | 0 | 5 | 3 | 6 | 9 | 11 |
| 550 | 3 | 2 | 5 | 1 | 4 | 1 | 2 | 2 | 0 | 6 | 2 | 4 | 0 | 5 |
| 551 | 2 | 4 | 4 | 11 | 8 | 2 | 9 | 6 | 9 | 11 | 1 | 2 | 0 | 3 |
| 552 | 8 | 5 | 9 | 6 | 4 | 7 | 8 | 9 | 11 | 2 | 10 | 2 | 6 | 0 |
| 553 | 2 | 3 | 1 | 3 | 9 | 6 | 0 | 5 | 10 | 0 | 9 | 3 | 1 | 3 |
| 554 | 0 | 7 | 2 | 11 | 4 | 5 | 0 | 4 | 9 | 7 | 5 | 5 | 10 | 7 |
| 555 | 5 | 10 | 7 | 4 | 3 | 4 | 2 | 3 | 11 | 0 | 7 | 2 | 2 | 7 |
| 556 | 6 | 11 | 11 | 6 | 7 | 8 | 7 | 4 | 3 | 5 | 0 | 8 | 2 | 0 |
| 557 | 0 | 10 | 8 | 10 | 5 | 4 | 11 | 4 | 0 | 4 | 10 | 7 | 7 | 6 |
| 558 | 7 | 7 | 0 | 0 | 0 | 4 | 1 | 1 | 3 | 11 | 2 | 1 | 3 | 3 |
| 559 | 11 | 9 | 2 | 10 | 9 | 2 | 8 | 6 | 4 | 6 | 3 | 6 | 9 | 9 |
| 560 | 10 | 7 | 11 | 4 | 3 | 11 | 3 | 1 | 3 | 5 | 5 | 4 | 7 | 0 |
| 561 | 8 | 9 | 2 | 1 | 7 | 6 | 9 | 5 | 5 | 10 | 6 | 5 | 0 | 11 |
| 562 | 10 | 8 | 6 | 11 | 9 | 0 | 6 | 0 | 11 | 5 | 9 | 2 | 1 | 6 |
| 563 | 1 | 4 | 6 | 6 | 6 | 4 | 3 | 8 | 11 | 5 | 2 | 1 | 4 | 11 |
| 564 | 5 | 1 | 1 | 11 | 10 | 6 | 4 | 6 | 5 | 2 | 2 | 2 | 9 | 11 |
| 565 | 2 | 2 | 0 | 0 | 8 | 3 | 0 | 6 | 7 | 5 | 6 | 0 | 4 | 5 |
| 566 | 11 | 11 | 0 | 1 | 8 | 6 | 11 | 9 | 1 | 7 | 5 | 8 | 10 | 10 |
| 567 | 2 | 7 | 6 | 5 | 9 | 0 | 9 | 2 | 5 | 4 | 9 | 0 | 6 | 10 |
| 568 | 3 | 5 | 9 | 9 | 10 | 11 | 1 | 6 | 5 | 6 | 7 | 9 | 9 | 0 |
| 569 | 2 | 11 | 3 | 8 | 2 | 10 | 1 | 6 | 7 | 0 | 4 | 6 | 0 | 1 |
| 570 | 6 | 3 | 7 | 5 | 8 | 1 | 2 | 6 | 4 | 2 | 11 | 8 | 11 | 1 |
| 571 | 1 | 10 | 6 | 5 | 2 | 0 | 9 | 9 | 7 | 10 | 8 | 7 | 3 | 2 |
| 572 | 0 | 4 | 11 | 1 | 5 | 7 | 1 | 11 | 7 | 5 | 2 | 1 | 10 | 9 |
| 573 | 9 | 7 | 3 | 3 | 6 | 5 | 4 | 3 | 3 | 6 | 0 | 10 | 4 | 7 |
| 574 | 5 | 0 | 0 | 4 | 0 | 6 | 9 | 9 | 4 | 5 | 11 | 1 | 2 | 0 |
| 575 | 0 | 2 | 7 | 10 | 8 | 10 | 6 | 10 | 9 | 0 | 6 | 7 | 1 | 4 |
| 576 | 5 | 0 | 7 | 0 | 0 | 4 | 8 | 10 | 5 | 0 | 2 | 5 | 11 | 9 |
| 577 | 11 | 3 | 10 | 10 | 5 | 8 | 1 | 9 | 6 | 7 | 8 | 5 | 8 | 2 |
| 578 | 10 | 7 | 6 | 0 | 10 | 1 | 10 | 1 | 1 | 1 | 2 | 11 | 0 | 6 |
| 579 | 4 | 7 | 6 | 0 | 7 | 2 | 3 | 4 | 6 | 1 | 9 | 8 | 10 | 0 |

-continued

| Example #1 of a nested design CS hopping pattern | | | | | | | | | | | | | | |
|---|---|---|---|---|---|---|---|---|---|---|---|---|---|---|
| m | $n_{cs}(n)$ | | | | | | | | | | | | | |
| 580 | 7 | 4 | 1 | 5 | 2 | 11 | 11 | 11 | 8 | 0 | 4 | 9 | 2 | 1 |
| 581 | 6 | 9 | 0 | 6 | 7 | 9 | 9 | 1 | 7 | 11 | 5 | 0 | 4 | 3 |
| 582 | 0 | 6 | 4 | 10 | 11 | 1 | 0 | 8 | 10 | 10 | 2 | 9 | 6 | 4 |
| 583 | 3 | 5 | 9 | 7 | 0 | 10 | 1 | 7 | 6 | 1 | 10 | 11 | 1 | 1 |
| 584 | 0 | 10 | 4 | 9 | 4 | 11 | 9 | 11 | 11 | 3 | 7 | 6 | 11 | 2 |
| 585 | 2 | 4 | 5 | 5 | 10 | 1 | 9 | 3 | 11 | 9 | 2 | 0 | 0 | 1 |
| 586 | 5 | 0 | 6 | 7 | 11 | 2 | 0 | 6 | 5 | 8 | 11 | 1 | 7 | 9 |
| 587 | 11 | 11 | 8 | 4 | 2 | 4 | 9 | 2 | 11 | 0 | 0 | 10 | 6 | 11 |
| 588 | 6 | 4 | 1 | 2 | 3 | 2 | 1 | 3 | 4 | 4 | 4 | 4 | 7 | 1 |
| 589 | 10 | 0 | 4 | 9 | 8 | 10 | 9 | 11 | 0 | 4 | 10 | 2 | 2 | 7 |
| 590 | 7 | 11 | 4 | 5 | 0 | 5 | 5 | 2 | 7 | 7 | 11 | 3 | 3 | 4 |
| 591 | 10 | 10 | 9 | 8 | 7 | 2 | 10 | 0 | 2 | 2 | 8 | 7 | 6 | 5 |
| 592 | 6 | 4 | 0 | 1 | 6 | 4 | 10 | 0 | 1 | 2 | 3 | 0 | 3 | 8 |
| 593 | 8 | 1 | 0 | 6 | 6 | 8 | 0 | 1 | 9 | 4 | 2 | 4 | 7 | 10 |
| 594 | 9 | 10 | 4 | 0 | 5 | 0 | 6 | 6 | 11 | 4 | 7 | 3 | 1 | 1 |
| 595 | 9 | 7 | 6 | 7 | 4 | 7 | 3 | 2 | 2 | 9 | 1 | 6 | 10 | 7 |
| 596 | 7 | 4 | 2 | 11 | 4 | 10 | 1 | 8 | 2 | 3 | 10 | 3 | 5 | 10 |
| 597 | 10 | 5 | 1 | 9 | 6 | 7 | 9 | 1 | 0 | 10 | 4 | 9 | 7 | 2 |
| 598 | 6 | 5 | 4 | 5 | 11 | 4 | 6 | 5 | 6 | 1 | 7 | 2 | 6 | 10 |
| 599 | 9 | 0 | 9 | 8 | 0 | 5 | 3 | 3 | 11 | 2 | 7 | 0 | 8 | 5 |
| 600 | 1 | 9 | 10 | 5 | 8 | 7 | 8 | 7 | 3 | 5 | 0 | 4 | 5 | 4 |
| 601 | 10 | 11 | 10 | 9 | 0 | 7 | 8 | 8 | 5 | 1 | 7 | 9 | 1 | 3 |
| 602 | 7 | 1 | 10 | 11 | 10 | 4 | 9 | 8 | 1 | 10 | 1 | 5 | 2 | 2 |
| 603 | 4 | 2 | 2 | 0 | 2 | 11 | 9 | 11 | 2 | 1 | 6 | 0 | 5 | 4 |
| 604 | 7 | 7 | 9 | 9 | 8 | 7 | 11 | 7 | 0 | 0 | 5 | 5 | 0 | 11 |
| 605 | 7 | 1 | 4 | 11 | 4 | 6 | 2 | 8 | 3 | 7 | 5 | 4 | 8 | 11 |
| 606 | 7 | 4 | 10 | 9 | 4 | 6 | 8 | 8 | 7 | 9 | 3 | 11 | 10 | 9 |
| 607 | 1 | 8 | 6 | 10 | 1 | 11 | 8 | 8 | 1 | 7 | 3 | 3 | 10 | 1 |
| 608 | 2 | 4 | 11 | 3 | 1 | 7 | 3 | 10 | 2 | 11 | 0 | 8 | 7 | 2 |
| 609 | 10 | 11 | 10 | 9 | 6 | 4 | 4 | 0 | 3 | 11 | 11 | 10 | 2 | 5 |
| 610 | 5 | 4 | 9 | 6 | 1 | 3 | 1 | 0 | 7 | 1 | 8 | 0 | 2 | 1 |
| 611 | 8 | 7 | 5 | 11 | 7 | 5 | 1 | 6 | 11 | 0 | 0 | 0 | 11 | 11 |
| 612 | 5 | 8 | 4 | 10 | 3 | 5 | 5 | 7 | 6 | 11 | 9 | 0 | 4 | 5 |
| 613 | 2 | 7 | 1 | 2 | 3 | 5 | 11 | 3 | 5 | 8 | 2 | 9 | 10 | 3 |
| 614 | 0 | 7 | 2 | 5 | 6 | 0 | 5 | 9 | 0 | 10 | 11 | 4 | 1 | 10 |
| 615 | 7 | 2 | 2 | 2 | 6 | 9 | 6 | 1 | 2 | 1 | 7 | 4 | 3 | 1 |
| 616 | 8 | 5 | 8 | 3 | 3 | 3 | 0 | 3 | 2 | 1 | 10 | 1 | 0 | 8 |
| 617 | 6 | 7 | 1 | 6 | 7 | 1 | 7 | 0 | 0 | 8 | 10 | 3 | 11 | 1 |
| 618 | 8 | 7 | 10 | 3 | 0 | 5 | 3 | 4 | 4 | 2 | 9 | 1 | 4 | 3 |
| 619 | 7 | 0 | 3 | 5 | 6 | 7 | 3 | 0 | 2 | 8 | 2 | 9 | 0 | 1 |
| 620 | 1 | 2 | 7 | 7 | 3 | 0 | 3 | 8 | 4 | 3 | 6 | 2 | 3 | 9 |
| 621 | 1 | 1 | 3 | 9 | 3 | 1 | 8 | 11 | 7 | 10 | 9 | 0 | 11 | 1 |
| 622 | 4 | 4 | 1 | 11 | 7 | 9 | 10 | 8 | 1 | 2 | 4 | 1 | 2 | 4 |
| 623 | 4 | 1 | 3 | 7 | 7 | 6 | 7 | 6 | 9 | 7 | 5 | 10 | 2 | 3 |
| 624 | 2 | 3 | 1 | 9 | 5 | 9 | 10 | 1 | 3 | 2 | 6 | 11 | 10 | 7 |
| 625 | 5 | 8 | 11 | 10 | 4 | 10 | 6 | 9 | 5 | 6 | 8 | 7 | 9 | 5 |
| 626 | 4 | 3 | 8 | 6 | 11 | 3 | 2 | 4 | 5 | 10 | 5 | 6 | 8 | 3 |
| 627 | 5 | 10 | 9 | 3 | 5 | 0 | 11 | 4 | 10 | 1 | 0 | 8 | 4 | 2 |
| 628 | 9 | 7 | 8 | 4 | 10 | 8 | 6 | 10 | 2 | 9 | 5 | 8 | 8 | 1 |
| 629 | 6 | 3 | 6 | 6 | 9 | 0 | 11 | 11 | 4 | 7 | 5 | 3 | 8 | 5 |
| 630 | 8 | 7 | 8 | 11 | 2 | 6 | 0 | 2 | 3 | 6 | 9 | 1 | 11 | 7 |
| 631 | 4 | 0 | 5 | 7 | 5 | 11 | 8 | 0 | 4 | 5 | 0 | 2 | 6 | 11 |
| 632 | 7 | 4 | 0 | 1 | 7 | 11 | 7 | 5 | 10 | 11 | 2 | 4 | 6 | 4 |
| 633 | 2 | 0 | 8 | 10 | 2 | 8 | 2 | 3 | 0 | 0 | 10 | 0 | 3 | 11 |
| 634 | 6 | 9 | 2 | 5 | 11 | 2 | 8 | 1 | 11 | 4 | 0 | 0 | 7 | 6 |
| 635 | 8 | 6 | 5 | 2 | 5 | 6 | 2 | 9 | 7 | 10 | 1 | 11 | 2 | 4 |
| 636 | 1 | 6 | 5 | 1 | 3 | 10 | 1 | 9 | 1 | 4 | 5 | 2 | 1 | 5 |
| 637 | 9 | 11 | 2 | 7 | 9 | 11 | 2 | 9 | 4 | 0 | 1 | 0 | 10 | 2 |
| 638 | 4 | 5 | 1 | 6 | 1 | 8 | 2 | 2 | 8 | 3 | 8 | 6 | 3 | 1 |
| 639 | 11 | 4 | 11 | 1 | 4 | 11 | 8 | 10 | 8 | 3 | 2 | 5 | 7 | 5 |
| 640 | 3 | 6 | 5 | 4 | 5 | 0 | 9 | 6 | 8 | 2 | 8 | 2 | 9 | 10 |
| 641 | 10 | 0 | 8 | 8 | 5 | 7 | 1 | 7 | 11 | 5 | 5 | 4 | 8 | 7 |
| 642 | 0 | 2 | 9 | 8 | 5 | 1 | 6 | 7 | 8 | 1 | 9 | 10 | 9 | 5 |
| 643 | 3 | 9 | 8 | 7 | 10 | 2 | 5 | 6 | 5 | 0 | 5 | 4 | 8 | 5 |
| 644 | 11 | 7 | 9 | 7 | 9 | 8 | 4 | 3 | 11 | 1 | 0 | 0 | 9 | 4 |
| 645 | 1 | 10 | 7 | 10 | 7 | 0 | 6 | 0 | 8 | 7 | 10 | 1 | 5 | 9 |
| 646 | 10 | 8 | 9 | 6 | 7 | 6 | 2 | 11 | 6 | 8 | 2 | 2 | 7 | 0 |
| 647 | 8 | 8 | 0 | 3 | 10 | 1 | 0 | 11 | 9 | 10 | 9 | 2 | 0 | 2 |
| 648 | 4 | 1 | 5 | 11 | 5 | 0 | 0 | 9 | 7 | 11 | 10 | 8 | 5 | 9 |
| 649 | 0 | 8 | 4 | 7 | 0 | 7 | 1 | 4 | 6 | 6 | 1 | 8 | 6 | 2 |
| 650 | 9 | 5 | 10 | 5 | 0 | 3 | 10 | 3 | 9 | 7 | 3 | 0 | 6 | 9 |
| 651 | 2 | 2 | 6 | 11 | 9 | 1 | 4 | 9 | 1 | 6 | 1 | 8 | 4 | 9 |
| 652 | 1 | 10 | 0 | 2 | 6 | 6 | 2 | 2 | 10 | 6 | 3 | 10 | 5 | 2 |
| 653 | 2 | 3 | 10 | 3 | 11 | 7 | 0 | 8 | 6 | 1 | 5 | 4 | 6 | 11 |
| 654 | 0 | 1 | 1 | 3 | 2 | 9 | 11 | 5 | 8 | 2 | 0 | 3 | 10 | 9 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 655 | 1 | 4 | 3 | 10 | 7 | 9 | 3 | 2 | 3 | 6 | 10 | 9 | 4 | 10 |
| 656 | 11 | 6 | 1 | 0 | 11 | 5 | 9 | 10 | 8 | 4 | 1 | 0 | 2 | 5 |
| 657 | 7 | 5 | 4 | 2 | 4 | 11 | 4 | 2 | 0 | 1 | 7 | 8 | 1 | 5 |
| 658 | 3 | 1 | 2 | 1 | 11 | 11 | 11 | 10 | 10 | 6 | 5 | 11 | 2 | 4 |
| 659 | 6 | 5 | 9 | 7 | 1 | 0 | 5 | 1 | 1 | 5 | 5 | 0 | 7 | 1 |
| 660 | 11 | 3 | 9 | 2 | 10 | 3 | 8 | 6 | 2 | 2 | 3 | 5 | 1 | 5 |
| 661 | 4 | 6 | 10 | 11 | 5 | 3 | 7 | 8 | 5 | 4 | 0 | 8 | 8 | 6 |
| 662 | 3 | 1 | 2 | 8 | 11 | 6 | 3 | 1 | 0 | 2 | 8 | 9 | 7 | 8 |
| 663 | 9 | 7 | 8 | 7 | 5 | 11 | 1 | 3 | 11 | 4 | 10 | 8 | 3 | 2 |
| 664 | 0 | 1 | 4 | 6 | 3 | 2 | 10 | 5 | 3 | 7 | 11 | 9 | 2 | 2 |
| 665 | 9 | 1 | 2 | 3 | 5 | 4 | 11 | 2 | 4 | 5 | 6 | 2 | 1 | 2 |
| 666 | 7 | 10 | 4 | 2 | 1 | 1 | 7 | 7 | 2 | 5 | 0 | 1 | 8 | 3 |
| 667 | 6 | 1 | 0 | 7 | 7 | 8 | 1 | 8 | 0 | 10 | 4 | 5 | 4 | 6 |
| 668 | 4 | 8 | 7 | 11 | 5 | 9 | 7 | 5 | 7 | 5 | 7 | 6 | 10 | 3 |
| 669 | 4 | 0 | 8 | 11 | 6 | 6 | 9 | 4 | 9 | 8 | 9 | 8 | 2 | 8 |
| 670 | 11 | 0 | 1 | 9 | 3 | 5 | 10 | 5 | 0 | 4 | 9 | 7 | 9 | 1 |
| 671 | 2 | 8 | 3 | 6 | 0 | 2 | 3 | 5 | 0 | 0 | 11 | 7 | 3 | 10 |
| 672 | 7 | 9 | 1 | 8 | 10 | 10 | 4 | 7 | 7 | 3 | 6 | 0 | 1 | 8 |
| 673 | 5 | 5 | 6 | 2 | 2 | 9 | 9 | 3 | 10 | 3 | 3 | 3 | 11 | 10 |
| 674 | 1 | 9 | 6 | 0 | 6 | 10 | 1 | 8 | 3 | 3 | 9 | 5 | 6 | 0 |
| 675 | 3 | 11 | 2 | 10 | 1 | 0 | 9 | 1 | 11 | 4 | 9 | 4 | 1 | 3 |
| 676 | 2 | 5 | 4 | 2 | 6 | 3 | 2 | 5 | 0 | 9 | 8 | 3 | 5 | 6 |
| 677 | 5 | 2 | 4 | 3 | 4 | 5 | 6 | 10 | 0 | 9 | 5 | 2 | 10 | 2 |
| 678 | 7 | 2 | 9 | 0 | 1 | 8 | 10 | 3 | 10 | 9 | 3 | 8 | 0 | 5 |
| 679 | 9 | 6 | 3 | 10 | 10 | 7 | 8 | 0 | 7 | 0 | 10 | 8 | 8 | 9 |
| 680 | 1 | 3 | 11 | 1 | 5 | 3 | 3 | 3 | 10 | 6 | 5 | 1 | 0 | 6 |
| 681 | 0 | 2 | 11 | 9 | 8 | 7 | 10 | 4 | 11 | 3 | 11 | 0 | 7 | 4 |
| 682 | 4 | 8 | 11 | 4 | 4 | 5 | 0 | 11 | 2 | 4 | 7 | 8 | 6 | 7 |
| 683 | 7 | 3 | 0 | 4 | 3 | 3 | 4 | 7 | 9 | 2 | 9 | 1 | 7 | 6 |
| 684 | 5 | 10 | 3 | 1 | 11 | 2 | 3 | 11 | 5 | 0 | 2 | 3 | 9 | 6 |
| 685 | 2 | 3 | 5 | 8 | 3 | 4 | 6 | 6 | 7 | 5 | 7 | 8 | 11 | 2 |
| 686 | 8 | 6 | 3 | 7 | 10 | 7 | 11 | 11 | 6 | 8 | 6 | 7 | 10 | 4 |
| 687 | 2 | 1 | 4 | 10 | 9 | 3 | 7 | 8 | 8 | 9 | 5 | 5 | 3 | 2 |
| 688 | 4 | 7 | 3 | 4 | 0 | 4 | 1 | 4 | 1 | 7 | 4 | 6 | 7 | 5 |
| 689 | 4 | 6 | 3 | 0 | 9 | 7 | 7 | 10 | 6 | 5 | 2 | 11 | 4 | 8 |
| 690 | 4 | 7 | 0 | 3 | 10 | 2 | 4 | 10 | 4 | 7 | 7 | 7 | 8 | 2 |
| 691 | 4 | 7 | 2 | 2 | 1 | 8 | 10 | 5 | 0 | 6 | 6 | 5 | 11 | 2 |
| 692 | 0 | 4 | 8 | 11 | 10 | 1 | 1 | 9 | 9 | 6 | 11 | 4 | 5 | 2 |
| 693 | 2 | 11 | 4 | 7 | 9 | 6 | 11 | 9 | 0 | 9 | 3 | 6 | 1 | 8 |
| 694 | 5 | 9 | 7 | 7 | 8 | 11 | 9 | 5 | 2 | 6 | 3 | 8 | 6 | 0 |
| 695 | 8 | 6 | 4 | 4 | 7 | 9 | 3 | 7 | 8 | 8 | 8 | 10 | 2 | 4 |
| 696 | 5 | 5 | 10 | 10 | 2 | 2 | 2 | 6 | 3 | 10 | 5 | 1 | 9 | 2 |
| 697 | 3 | 10 | 3 | 9 | 2 | 4 | 9 | 7 | 9 | 3 | 1 | 5 | 7 | 5 |
| 698 | 8 | 8 | 11 | 4 | 4 | 4 | 10 | 3 | 5 | 5 | 6 | 10 | 0 | 6 |
| 699 | 1 | 7 | 11 | 2 | 11 | 6 | 1 | 1 | 11 | 7 | 1 | 9 | 1 | 2 |
| 700 | 4 | 6 | 9 | 2 | 6 | 8 | 11 | 3 | 5 | 2 | 8 | 3 | 11 | 4 |
| 701 | 2 | 8 | 0 | 8 | 9 | 10 | 4 | 5 | 5 | 2 | 8 | 2 | 8 | 6 |
| 702 | 6 | 8 | 10 | 9 | 11 | 3 | 9 | 8 | 1 | 3 | 5 | 7 | 10 | 6 |
| 703 | 5 | 10 | 4 | 8 | 1 | 6 | 9 | 4 | 3 | 9 | 1 | 0 | 3 | 4 |
| 704 | 9 | 10 | 0 | 8 | 8 | 1 | 0 | 10 | 3 | 11 | 3 | 4 | 10 | 10 |
| 705 | 4 | 1 | 5 | 3 | 5 | 1 | 4 | 11 | 11 | 3 | 4 | 7 | 3 | 5 |
| 706 | 4 | 2 | 6 | 7 | 5 | 8 | 2 | 9 | 8 | 10 | 2 | 5 | 10 | 11 |
| 707 | 4 | 4 | 10 | 5 | 11 | 5 | 11 | 4 | 10 | 4 | 6 | 9 | 11 | 11 |
| 708 | 9 | 11 | 11 | 5 | 8 | 11 | 6 | 5 | 9 | 0 | 10 | 4 | 0 | 11 |
| 709 | 8 | 8 | 4 | 9 | 6 | 11 | 7 | 8 | 6 | 1 | 8 | 8 | 11 | 0 |
| 710 | 10 | 7 | 2 | 10 | 6 | 2 | 7 | 3 | 9 | 2 | 11 | 1 | 11 | 7 |
| 711 | 8 | 5 | 2 | 2 | 2 | 0 | 2 | 5 | 11 | 2 | 11 | 1 | 0 | 3 |
| 712 | 6 | 10 | 4 | 4 | 1 | 9 | 11 | 10 | 11 | 9 | 4 | 11 | 1 | 5 |
| 713 | 11 | 10 | 4 | 2 | 3 | 5 | 1 | 1 | 6 | 8 | 10 | 10 | 11 | 4 |
| 714 | 4 | 9 | 5 | 3 | 6 | 3 | 4 | 7 | 8 | 11 | 11 | 3 | 10 | 3 |
| 715 | 8 | 8 | 7 | 1 | 5 | 11 | 9 | 0 | 3 | 0 | 4 | 2 | 3 | 2 |
| 716 | 0 | 0 | 9 | 5 | 2 | 2 | 1 | 6 | 0 | 11 | 3 | 1 | 10 | 1 |
| 717 | 0 | 7 | 1 | 8 | 7 | 11 | 2 | 7 | 1 | 4 | 11 | 7 | 0 | 1 |
| 718 | 5 | 5 | 9 | 8 | 4 | 9 | 6 | 8 | 7 | 8 | 9 | 11 | 2 | 2 |
| 719 | 5 | 8 | 7 | 8 | 8 | 6 | 1 | 2 | 1 | 10 | 8 | 0 | 1 | 6 |
| 720 | 10 | 6 | 10 | 4 | 2 | 0 | 5 | 4 | 7 | 5 | 4 | 0 | 10 | 4 |
| 721 | 3 | 3 | 9 | 8 | 3 | 7 | 11 | 10 | 0 | 10 | 3 | 6 | 8 | 10 |
| 722 | 8 | 7 | 7 | 3 | 6 | 11 | 10 | 7 | 1 | 8 | 4 | 6 | 6 | 3 |
| 723 | 6 | 11 | 11 | 1 | 1 | 1 | 0 | 4 | 7 | 1 | 8 | 10 | 11 | 3 |
| 724 | 2 | 0 | 0 | 9 | 3 | 7 | 5 | 10 | 6 | 9 | 4 | 10 | 9 | 5 |
| 725 | 6 | 8 | 1 | 5 | 2 | 6 | 10 | 2 | 8 | 8 | 8 | 7 | 9 | 10 |
| 726 | 0 | 11 | 3 | 7 | 3 | 3 | 4 | 8 | 11 | 9 | 0 | 5 | 1 | 3 |
| 727 | 8 | 9 | 0 | 1 | 6 | 9 | 1 | 3 | 1 | 8 | 11 | 8 | 7 | 4 |
| 728 | 8 | 9 | 6 | 0 | 10 | 6 | 5 | 11 | 5 | 8 | 8 | 10 | 9 | 1 |
| 729 | 3 | 5 | 3 | 7 | 4 | 5 | 8 | 6 | 2 | 3 | 0 | 9 | 5 | 5 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 730 | 5 | 3 | 5 | 7 | 3 | 1 | 7 | 9 | 7 | 0 | 3 | 0 | 8 | 9 |
| 731 | 7 | 11 | 0 | 4 | 10 | 8 | 3 | 9 | 5 | 4 | 1 | 10 | 10 | 3 |
| 732 | 1 | 9 | 4 | 10 | 2 | 3 | 2 | 7 | 4 | 7 | 1 | 10 | 6 | 4 |
| 733 | 10 | 2 | 1 | 0 | 0 | 11 | 10 | 7 | 9 | 11 | 0 | 10 | 4 | 2 |
| 734 | 4 | 10 | 1 | 1 | 11 | 6 | 0 | 7 | 9 | 1 | 3 | 8 | 3 | 4 |
| 735 | 3 | 9 | 7 | 8 | 9 | 4 | 6 | 4 | 9 | 2 | 1 | 3 | 11 | 10 |
| 736 | 5 | 1 | 10 | 2 | 8 | 10 | 4 | 4 | 0 | 9 | 6 | 9 | 4 | 1 |
| 737 | 1 | 7 | 2 | 7 | 4 | 4 | 6 | 0 | 6 | 2 | 1 | 2 | 8 | 8 |
| 738 | 6 | 7 | 4 | 5 | 7 | 0 | 7 | 9 | 11 | 2 | 3 | 6 | 9 | 2 |
| 739 | 5 | 5 | 8 | 11 | 5 | 6 | 2 | 2 | 2 | 2 | 1 | 10 | 7 | 1 |
| 740 | 1 | 11 | 8 | 2 | 1 | 11 | 4 | 7 | 8 | 6 | 9 | 0 | 9 | 8 |
| 741 | 1 | 6 | 9 | 8 | 4 | 11 | 9 | 2 | 4 | 7 | 4 | 8 | 0 | 11 |
| 742 | 6 | 0 | 3 | 9 | 5 | 1 | 8 | 2 | 11 | 2 | 8 | 2 | 2 | 3 |
| 743 | 6 | 3 | 6 | 10 | 8 | 5 | 9 | 8 | 8 | 4 | 9 | 1 | 5 | 7 |
| 744 | 9 | 5 | 10 | 4 | 9 | 9 | 11 | 6 | 10 | 8 | 10 | 0 | 7 | 4 |
| 745 | 0 | 9 | 3 | 3 | 0 | 1 | 1 | 6 | 8 | 11 | 5 | 7 | 4 | 4 |
| 746 | 5 | 11 | 6 | 11 | 6 | 6 | 3 | 7 | 8 | 4 | 1 | 3 | 1 | 9 |
| 747 | 10 | 9 | 5 | 11 | 6 | 10 | 5 | 11 | 1 | 11 | 6 | 11 | 11 | 10 |
| 748 | 3 | 2 | 5 | 9 | 10 | 6 | 9 | 7 | 2 | 4 | 11 | 0 | 4 | 6 |
| 749 | 10 | 11 | 5 | 10 | 7 | 3 | 5 | 6 | 2 | 8 | 10 | 4 | 1 | 0 |
| 750 | 5 | 5 | 2 | 0 | 3 | 0 | 6 | 10 | 9 | 3 | 5 | 8 | 3 | 4 |
| 751 | 1 | 7 | 7 | 2 | 2 | 11 | 4 | 0 | 6 | 9 | 3 | 10 | 0 | 9 |
| 752 | 5 | 4 | 2 | 0 | 0 | 9 | 4 | 0 | 6 | 10 | 5 | 11 | 8 | 11 |
| 753 | 5 | 2 | 11 | 7 | 4 | 7 | 4 | 11 | 9 | 1 | 6 | 11 | 8 | 1 |
| 754 | 8 | 1 | 10 | 3 | 2 | 4 | 2 | 10 | 9 | 1 | 11 | 10 | 4 | 8 |
| 755 | 11 | 4 | 4 | 9 | 7 | 0 | 2 | 11 | 9 | 7 | 0 | 5 | 11 | 5 |
| 756 | 2 | 4 | 6 | 6 | 4 | 11 | 10 | 9 | 6 | 9 | 5 | 5 | 9 | 4 |
| 757 | 11 | 7 | 7 | 1 | 10 | 3 | 3 | 0 | 8 | 2 | 9 | 8 | 8 | 4 |
| 758 | 5 | 3 | 11 | 0 | 3 | 2 | 1 | 6 | 11 | 1 | 0 | 4 | 9 | 10 |
| 759 | 8 | 1 | 0 | 7 | 3 | 1 | 5 | 10 | 2 | 4 | 7 | 2 | 5 | 8 |
| 760 | 3 | 0 | 8 | 5 | 11 | 0 | 4 | 2 | 7 | 10 | 0 | 6 | 4 | 5 |
| 761 | 5 | 6 | 1 | 10 | 0 | 10 | 4 | 6 | 9 | 10 | 10 | 7 | 6 | 0 |
| 762 | 3 | 2 | 4 | 11 | 7 | 3 | 10 | 2 | 4 | 3 | 2 | 2 | 9 | 3 |
| 763 | 9 | 9 | 10 | 10 | 6 | 6 | 2 | 4 | 8 | 6 | 8 | 4 | 11 | 1 |
| 764 | 8 | 0 | 11 | 6 | 6 | 4 | 4 | 5 | 8 | 0 | 10 | 6 | 3 | 4 |
| 765 | 3 | 2 | 10 | 3 | 6 | 9 | 2 | 11 | 11 | 4 | 4 | 10 | 6 | 2 |
| 766 | 11 | 9 | 0 | 6 | 9 | 0 | 2 | 0 | 7 | 2 | 10 | 4 | 9 | 6 |
| 767 | 2 | 9 | 6 | 8 | 1 | 1 | 3 | 8 | 10 | 10 | 7 | 6 | 8 | 3 |
| 768 | 3 | 5 | 6 | 9 | 2 | 9 | 0 | 8 | 4 | 11 | 11 | 10 | 6 | 11 |
| 769 | 9 | 2 | 1 | 1 | 2 | 11 | 9 | 10 | 3 | 5 | 2 | 1 | 8 | 1 |
| 770 | 4 | 3 | 7 | 1 | 1 | 8 | 8 | 4 | 7 | 2 | 9 | 2 | 7 | 2 |
| 771 | 5 | 8 | 2 | 4 | 7 | 9 | 8 | 6 | 5 | 1 | 5 | 3 | 4 | 9 |
| 772 | 7 | 7 | 3 | 5 | 0 | 0 | 5 | 8 | 10 | 1 | 0 | 0 | 2 | 6 |
| 773 | 1 | 9 | 7 | 9 | 10 | 1 | 2 | 4 | 5 | 11 | 1 | 4 | 7 | 6 |
| 774 | 6 | 8 | 7 | 1 | 9 | 5 | 10 | 6 | 7 | 9 | 1 | 0 | 5 | 5 |
| 775 | 10 | 6 | 0 | 5 | 11 | 4 | 0 | 1 | 1 | 7 | 5 | 6 | 9 | 8 |
| 776 | 4 | 4 | 2 | 8 | 1 | 4 | 7 | 9 | 10 | 9 | 2 | 10 | 11 | 0 |
| 777 | 9 | 3 | 2 | 7 | 11 | 8 | 7 | 4 | 3 | 6 | 1 | 10 | 9 | 6 |
| 778 | 1 | 3 | 8 | 5 | 7 | 6 | 1 | 8 | 4 | 0 | 9 | 6 | 8 | 11 |
| 779 | 5 | 9 | 9 | 6 | 3 | 0 | 5 | 8 | 1 | 10 | 2 | 1 | 5 | 6 |
| 780 | 0 | 3 | 4 | 10 | 9 | 6 | 1 | 11 | 11 | 1 | 11 | 10 | 10 | 3 |
| 781 | 1 | 2 | 3 | 4 | 9 | 0 | 11 | 11 | 9 | 9 | 8 | 6 | 7 | 11 |
| 782 | 2 | 5 | 4 | 11 | 0 | 0 | 10 | 7 | 4 | 1 | 4 | 5 | 6 | 6 |
| 783 | 8 | 5 | 9 | 0 | 9 | 2 | 8 | 4 | 8 | 11 | 2 | 1 | 7 | 11 |
| 784 | 1 | 2 | 2 | 0 | 1 | 10 | 3 | 3 | 0 | 4 | 10 | 5 | 8 | 6 |
| 785 | 1 | 11 | 6 | 11 | 8 | 5 | 6 | 5 | 11 | 6 | 8 | 8 | 10 | 2 |
| 786 | 7 | 9 | 10 | 1 | 0 | 1 | 3 | 2 | 7 | 2 | 2 | 2 | 6 | 10 |
| 787 | 9 | 0 | 0 | 6 | 1 | 9 | 8 | 5 | 11 | 6 | 8 | 11 | 8 | 4 |
| 788 | 5 | 11 | 2 | 1 | 9 | 10 | 11 | 1 | 8 | 8 | 10 | 8 | 1 | 5 |
| 789 | 8 | 3 | 3 | 8 | 11 | 10 | 4 | 0 | 9 | 5 | 10 | 1 | 10 | 7 |
| 790 | 3 | 0 | 11 | 2 | 1 | 7 | 4 | 3 | 10 | 9 | 10 | 4 | 2 | 3 |
| 791 | 9 | 2 | 2 | 6 | 7 | 10 | 4 | 6 | 8 | 2 | 9 | 7 | 10 | 7 |
| 792 | 1 | 0 | 6 | 6 | 6 | 11 | 8 | 0 | 5 | 8 | 5 | 0 | 8 | 2 |
| 793 | 3 | 11 | 0 | 6 | 9 | 7 | 2 | 5 | 5 | 8 | 4 | 3 | 0 | 1 |
| 794 | 4 | 5 | 8 | 2 | 8 | 3 | 2 | 7 | 10 | 7 | 7 | 0 | 1 | 11 |
| 795 | 0 | 3 | 6 | 4 | 10 | 7 | 5 | 0 | 3 | 6 | 7 | 4 | 4 | 9 |
| 796 | 10 | 11 | 7 | 11 | 5 | 5 | 10 | 0 | 6 | 4 | 7 | 1 | 6 | 1 |
| 797 | 8 | 1 | 9 | 4 | 8 | 4 | 11 | 1 | 0 | 11 | 7 | 10 | 11 | 1 |
| 798 | 8 | 9 | 11 | 0 | 6 | 4 | 3 | 11 | 2 | 2 | 4 | 5 | 8 | 3 |
| 799 | 2 | 11 | 5 | 4 | 11 | 10 | 7 | 11 | 0 | 11 | 4 | 2 | 4 | 8 |
| 800 | 10 | 0 | 10 | 8 | 0 | 3 | 9 | 3 | 3 | 8 | 4 | 6 | 7 | 8 |
| 801 | 2 | 9 | 10 | 7 | 7 | 11 | 1 | 10 | 4 | 2 | 0 | 5 | 9 | 2 |
| 802 | 6 | 7 | 3 | 9 | 9 | 2 | 9 | 8 | 6 | 2 | 10 | 8 | 8 | 7 |
| 803 | 8 | 7 | 11 | 10 | 11 | 3 | 3 | 7 | 10 | 9 | 6 | 8 | 6 | 10 |
| 804 | 8 | 5 | 2 | 7 | 3 | 9 | 9 | 6 | 0 | 6 | 1 | 7 | 8 | 2 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 805 | 9 | 7 | 5 | 11 | 5 | 1 | 9 | 11 | 6 | 4 | 1 | 3 | 9 | 7 |
| 806 | 0 | 5 | 3 | 0 | 9 | 8 | 6 | 8 | 4 | 7 | 2 | 9 | 1 | 6 |
| 807 | 0 | 7 | 7 | 5 | 1 | 6 | 10 | 8 | 7 | 6 | 10 | 8 | 3 | 8 |
| 808 | 3 | 6 | 5 | 4 | 1 | 3 | 2 | 8 | 7 | 11 | 6 | 1 | 6 | 0 |
| 809 | 11 | 3 | 10 | 6 | 5 | 5 | 2 | 3 | 3 | 0 | 5 | 11 | 7 | 4 |
| 810 | 6 | 11 | 11 | 10 | 1 | 6 | 2 | 6 | 2 | 7 | 6 | 3 | 4 | 7 |
| 811 | 5 | 3 | 10 | 4 | 8 | 10 | 3 | 2 | 10 | 2 | 4 | 10 | 11 | 6 |
| 812 | 0 | 7 | 6 | 5 | 11 | 6 | 6 | 11 | 4 | 2 | 7 | 11 | 1 | 5 |
| 813 | 11 | 4 | 6 | 1 | 5 | 0 | 7 | 1 | 5 | 10 | 9 | 2 | 7 | 4 |
| 814 | 10 | 8 | 7 | 0 | 7 | 1 | 5 | 4 | 0 | 1 | 3 | 1 | 8 | 9 |
| 815 | 7 | 0 | 1 | 11 | 7 | 8 | 5 | 6 | 5 | 11 | 7 | 9 | 11 | 9 |
| 816 | 9 | 10 | 10 | 5 | 10 | 11 | 1 | 7 | 4 | 1 | 8 | 8 | 1 | 8 |
| 817 | 2 | 9 | 3 | 4 | 10 | 0 | 10 | 10 | 4 | 4 | 2 | 3 | 3 | 1 |
| 818 | 1 | 2 | 8 | 8 | 1 | 10 | 9 | 11 | 3 | 11 | 11 | 1 | 1 | 10 |
| 819 | 5 | 0 | 11 | 6 | 7 | 9 | 1 | 0 | 8 | 3 | 6 | 2 | 9 | 8 |
| 820 | 1 | 10 | 1 | 4 | 0 | 11 | 4 | 2 | 4 | 6 | 0 | 5 | 7 | 0 |
| 821 | 2 | 1 | 8 | 11 | 2 | 0 | 7 | 7 | 8 | 8 | 0 | 9 | 4 | 7 |
| 822 | 8 | 5 | 8 | 7 | 3 | 7 | 6 | 0 | 11 | 9 | 6 | 8 | 9 | 6 |
| 823 | 4 | 8 | 11 | 9 | 10 | 0 | 2 | 8 | 10 | 2 | 9 | 5 | 5 | 6 |
| 824 | 9 | 1 | 8 | 9 | 11 | 5 | 0 | 4 | 6 | 4 | 7 | 0 | 1 | 8 |
| 825 | 5 | 11 | 5 | 8 | 11 | 7 | 11 | 6 | 1 | 4 | 6 | 3 | 7 | 6 |
| 826 | 2 | 0 | 2 | 7 | 9 | 5 | 4 | 10 | 9 | 10 | 2 | 10 | 4 | 10 |
| 827 | 2 | 3 | 9 | 2 | 8 | 4 | 0 | 9 | 2 | 9 | 1 | 2 | 3 | 11 |
| 828 | 3 | 10 | 7 | 4 | 1 | 6 | 8 | 10 | 10 | 11 | 11 | 6 | 11 | 11 |
| 829 | 6 | 10 | 2 | 3 | 2 | 1 | 9 | 9 | 0 | 4 | 5 | 4 | 8 | 4 |
| 830 | 6 | 0 | 5 | 8 | 4 | 1 | 0 | 9 | 2 | 10 | 2 | 0 | 10 | 7 |
| 831 | 6 | 4 | 5 | 8 | 10 | 11 | 7 | 4 | 7 | 8 | 11 | 4 | 3 | 8 |
| 832 | 0 | 3 | 5 | 4 | 7 | 1 | 7 | 11 | 8 | 10 | 6 | 4 | 1 | 4 |
| 833 | 10 | 2 | 2 | 5 | 8 | 8 | 9 | 6 | 8 | 4 | 5 | 9 | 3 | 1 |
| 834 | 7 | 3 | 0 | 8 | 4 | 2 | 5 | 5 | 2 | 9 | 5 | 9 | 10 | 1 |
| 835 | 0 | 5 | 9 | 7 | 2 | 4 | 11 | 9 | 1 | 3 | 9 | 5 | 0 | 8 |
| 836 | 2 | 1 | 10 | 1 | 11 | 8 | 8 | 0 | 9 | 9 | 6 | 3 | 0 | 8 |
| 837 | 2 | 9 | 0 | 2 | 2 | 7 | 11 | 1 | 9 | 10 | 8 | 10 | 2 | 3 |
| 838 | 9 | 7 | 7 | 5 | 7 | 7 | 4 | 8 | 8 | 10 | 0 | 2 | 0 | 3 |
| 839 | 4 | 1 | 1 | 6 | 11 | 5 | 7 | 10 | 7 | 7 | 11 | 5 | 11 | 10 |
| 840 | 0 | 7 | 0 | 10 | 5 | 1 | 2 | 3 | 7 | 6 | 7 | 10 | 6 | 1 |
| 841 | 10 | 8 | 6 | 4 | 1 | 7 | 7 | 3 | 8 | 8 | 4 | 4 | 8 | 1 |
| 842 | 7 | 4 | 3 | 5 | 7 | 4 | 9 | 2 | 0 | 8 | 4 | 3 | 10 | 6 |
| 843 | 7 | 11 | 10 | 3 | 6 | 11 | 8 | 1 | 6 | 8 | 11 | 5 | 3 | 9 |
| 844 | 7 | 3 | 5 | 7 | 3 | 4 | 8 | 2 | 11 | 7 | 10 | 1 | 6 | 4 |
| 845 | 6 | 0 | 2 | 11 | 9 | 2 | 1 | 10 | 1 | 0 | 8 | 2 | 3 | 2 |
| 846 | 10 | 0 | 7 | 4 | 11 | 11 | 2 | 5 | 2 | 8 | 6 | 0 | 2 | 1 |
| 847 | 11 | 7 | 9 | 2 | 5 | 9 | 6 | 2 | 4 | 6 | 9 | 6 | 3 | 0 |
| 848 | 10 | 5 | 1 | 7 | 4 | 1 | 2 | 3 | 8 | 6 | 3 | 11 | 7 | 7 |
| 849 | 6 | 2 | 9 | 9 | 5 | 0 | 1 | 9 | 8 | 0 | 1 | 3 | 5 | 3 |
| 850 | 5 | 6 | 3 | 8 | 2 | 9 | 5 | 5 | 5 | 10 | 9 | 9 | 7 | 11 |
| 851 | 10 | 5 | 11 | 0 | 0 | 5 | 9 | 0 | 0 | 9 | 5 | 1 | 5 | 4 |
| 852 | 1 | 9 | 10 | 11 | 5 | 9 | 4 | 0 | 1 | 4 | 3 | 5 | 9 | 0 |
| 853 | 10 | 4 | 7 | 6 | 0 | 2 | 3 | 1 | 10 | 10 | 8 | 5 | 9 | 9 |
| 854 | 9 | 5 | 4 | 10 | 3 | 7 | 7 | 3 | 0 | 5 | 4 | 8 | 4 | 0 |
| 855 | 11 | 9 | 0 | 1 | 5 | 4 | 8 | 6 | 9 | 4 | 4 | 0 | 2 | 4 |
| 856 | 0 | 11 | 4 | 10 | 9 | 4 | 0 | 2 | 8 | 3 | 6 | 7 | 11 | 11 |
| 857 | 11 | 9 | 11 | 6 | 2 | 4 | 2 | 8 | 10 | 8 | 7 | 8 | 7 | 11 |
| 858 | 2 | 9 | 0 | 5 | 7 | 5 | 4 | 6 | 4 | 7 | 10 | 3 | 0 | 0 |
| 859 | 4 | 8 | 3 | 10 | 11 | 2 | 5 | 9 | 11 | 2 | 4 | 6 | 8 | 9 |
| 860 | 5 | 7 | 10 | 1 | 2 | 8 | 11 | 2 | 1 | 1 | 11 | 0 | 11 | 10 |
| 861 | 6 | 8 | 3 | 2 | 3 | 0 | 4 | 2 | 3 | 4 | 9 | 5 | 11 | 11 |
| 862 | 11 | 1 | 0 | 0 | 11 | 9 | 1 | 10 | 4 | 2 | 6 | 10 | 8 | 11 |
| 863 | 11 | 9 | 7 | 1 | 6 | 3 | 5 | 5 | 11 | 0 | 1 | 1 | 10 | 11 |
| 864 | 6 | 4 | 2 | 4 | 6 | 3 | 3 | 1 | 7 | 1 | 11 | 6 | 11 | 4 |
| 865 | 4 | 11 | 4 | 2 | 9 | 9 | 6 | 11 | 1 | 9 | 10 | 2 | 11 | 10 |
| 866 | 5 | 2 | 6 | 8 | 6 | 11 | 1 | 10 | 6 | 9 | 3 | 4 | 1 | 8 |
| 867 | 2 | 8 | 2 | 7 | 10 | 6 | 1 | 7 | 2 | 7 | 6 | 8 | 8 | 9 |
| 868 | 0 | 3 | 2 | 2 | 9 | 6 | 11 | 0 | 2 | 2 | 0 | 11 | 6 | 6 |
| 869 | 7 | 9 | 11 | 7 | 3 | 11 | 2 | 4 | 9 | 11 | 9 | 2 | 10 | 0 |
| 870 | 6 | 11 | 9 | 5 | 8 | 11 | 10 | 8 | 5 | 11 | 9 | 2 | 2 | 3 |
| 871 | 7 | 10 | 1 | 6 | 9 | 4 | 6 | 10 | 9 | 4 | 11 | 6 | 0 | 6 |
| 872 | 5 | 0 | 5 | 8 | 9 | 7 | 5 | 5 | 8 | 8 | 11 | 0 | 5 | 10 |
| 873 | 0 | 2 | 4 | 6 | 7 | 8 | 0 | 0 | 4 | 8 | 8 | 1 | 3 | 8 |
| 874 | 1 | 10 | 10 | 11 | 1 | 10 | 0 | 4 | 0 | 0 | 11 | 6 | 10 | 5 |
| 875 | 6 | 9 | 4 | 8 | 6 | 7 | 11 | 3 | 7 | 8 | 2 | 1 | 8 | 7 |
| 876 | 2 | 6 | 10 | 0 | 6 | 8 | 9 | 9 | 1 | 0 | 8 | 9 | 0 | 7 |
| 877 | 0 | 0 | 1 | 10 | 6 | 4 | 7 | 1 | 0 | 2 | 8 | 10 | 8 | 0 |
| 878 | 10 | 7 | 7 | 4 | 2 | 10 | 3 | 10 | 11 | 1 | 7 | 5 | 3 | 5 |
| 879 | 11 | 0 | 3 | 0 | 6 | 8 | 9 | 2 | 6 | 9 | 11 | 2 | 4 | 1 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 880 | 3 | 10 | 9 | 6 | 2 | 5 | 11 | 4 | 11 | 6 | 8 | 3 | 0 | 7 |
| 881 | 6 | 8 | 5 | 8 | 8 | 7 | 9 | 6 | 0 | 6 | 7 | 9 | 1 | 7 |
| 882 | 11 | 9 | 6 | 6 | 0 | 11 | 3 | 3 | 3 | 1 | 10 | 0 | 6 | 1 |
| 883 | 6 | 11 | 2 | 9 | 4 | 4 | 10 | 10 | 3 | 6 | 3 | 3 | 9 | 1 |
| 884 | 9 | 11 | 4 | 1 | 10 | 9 | 4 | 7 | 2 | 3 | 11 | 3 | 0 | 11 |
| 885 | 1 | 7 | 6 | 8 | 0 | 6 | 0 | 1 | 7 | 6 | 5 | 11 | 7 | 9 |
| 886 | 5 | 2 | 1 | 2 | 5 | 3 | 9 | 0 | 5 | 10 | 5 | 5 | 6 | 2 |
| 887 | 4 | 1 | 6 | 1 | 0 | 6 | 2 | 9 | 3 | 4 | 1 | 2 | 6 | 3 |
| 888 | 7 | 0 | 7 | 8 | 9 | 1 | 8 | 3 | 3 | 1 | 6 | 9 | 3 | 5 |
| 889 | 9 | 8 | 4 | 2 | 10 | 10 | 7 | 1 | 9 | 11 | 0 | 3 | 4 | 1 |
| 890 | 11 | 7 | 7 | 10 | 8 | 3 | 11 | 8 | 7 | 10 | 11 | 11 | 1 | 1 |
| 891 | 2 | 6 | 1 | 10 | 2 | 9 | 9 | 4 | 10 | 11 | 4 | 7 | 4 | 1 |
| 892 | 11 | 8 | 11 | 9 | 9 | 11 | 6 | 7 | 6 | 11 | 2 | 10 | 10 | 8 |
| 893 | 7 | 9 | 8 | 7 | 5 | 8 | 5 | 1 | 10 | 6 | 2 | 10 | 4 | 2 |
| 894 | 1 | 4 | 4 | 1 | 9 | 9 | 2 | 3 | 1 | 6 | 0 | 4 | 8 | 7 |
| 895 | 2 | 6 | 1 | 4 | 4 | 11 | 0 | 6 | 7 | 8 | 3 | 5 | 3 | 11 |
| 896 | 4 | 7 | 0 | 0 | 11 | 0 | 4 | 0 | 11 | 4 | 2 | 8 | 11 | 5 |
| 897 | 10 | 3 | 8 | 3 | 8 | 1 | 5 | 7 | 9 | 1 | 8 | 0 | 3 | 6 |
| 898 | 7 | 11 | 7 | 10 | 11 | 0 | 7 | 1 | 4 | 3 | 7 | 9 | 7 | 2 |
| 899 | 8 | 0 | 3 | 6 | 8 | 0 | 2 | 10 | 5 | 6 | 3 | 8 | 5 | 8 |
| 900 | 5 | 9 | 5 | 11 | 9 | 4 | 3 | 3 | 0 | 1 | 9 | 1 | 5 | 0 |
| 901 | 8 | 1 | 7 | 10 | 3 | 7 | 10 | 11 | 4 | 10 | 5 | 9 | 10 | 8 |
| 902 | 0 | 6 | 10 | 3 | 11 | 7 | 5 | 0 | 8 | 7 | 10 | 3 | 11 | 3 |
| 903 | 5 | 11 | 8 | 11 | 8 | 10 | 11 | 3 | 3 | 9 | 5 | 3 | 6 | 11 |
| 904 | 4 | 9 | 5 | 1 | 10 | 0 | 6 | 9 | 9 | 7 | 6 | 6 | 10 | 5 |
| 905 | 7 | 5 | 10 | 0 | 1 | 2 | 0 | 3 | 4 | 5 | 10 | 10 | 10 | 1 |
| 906 | 6 | 6 | 2 | 1 | 10 | 10 | 8 | 5 | 11 | 10 | 5 | 10 | 11 | 7 |
| 907 | 9 | 8 | 1 | 10 | 4 | 11 | 1 | 1 | 2 | 5 | 0 | 0 | 1 | 4 |
| 908 | 10 | 9 | 10 | 11 | 1 | 2 | 3 | 7 | 7 | 6 | 11 | 7 | 0 | 7 |
| 909 | 9 | 2 | 10 | 4 | 4 | 2 | 7 | 1 | 4 | 3 | 8 | 4 | 0 | 0 |
| 910 | 4 | 11 | 0 | 4 | 0 | 11 | 8 | 8 | 0 | 3 | 9 | 0 | 4 | 2 |
| 911 | 0 | 2 | 6 | 6 | 2 | 5 | 11 | 0 | 10 | 9 | 2 | 9 | 5 | 6 |
| 912 | 4 | 11 | 2 | 5 | 11 | 4 | 1 | 3 | 2 | 5 | 11 | 3 | 7 | 9 |
| 913 | 3 | 10 | 8 | 7 | 0 | 1 | 0 | 0 | 0 | 10 | 11 | 2 | 9 | 0 |
| 914 | 1 | 5 | 11 | 2 | 10 | 9 | 11 | 11 | 8 | 0 | 7 | 5 | 8 | 4 |
| 915 | 6 | 0 | 2 | 7 | 10 | 10 | 3 | 0 | 7 | 9 | 3 | 0 | 0 | 2 |
| 916 | 11 | 2 | 8 | 5 | 2 | 3 | 3 | 5 | 6 | 6 | 8 | 10 | 7 | 2 |
| 917 | 7 | 11 | 6 | 3 | 5 | 3 | 7 | 6 | 11 | 9 | 4 | 11 | 5 | 8 |
| 918 | 8 | 4 | 6 | 11 | 2 | 7 | 9 | 10 | 0 | 2 | 4 | 8 | 5 | 11 |
| 919 | 4 | 8 | 2 | 7 | 8 | 3 | 7 | 10 | 7 | 0 | 6 | 10 | 0 | 11 |
| 920 | 1 | 2 | 9 | 8 | 2 | 3 | 0 | 3 | 11 | 10 | 4 | 2 | 10 | 10 |
| 921 | 8 | 6 | 6 | 7 | 3 | 0 | 5 | 7 | 3 | 9 | 10 | 5 | 4 | 4 |
| 922 | 0 | 8 | 1 | 5 | 7 | 2 | 5 | 4 | 5 | 9 | 0 | 5 | 4 | 0 |
| 923 | 5 | 11 | 4 | 6 | 4 | 1 | 7 | 10 | 9 | 3 | 4 | 0 | 11 | 0 |
| 924 | 3 | 1 | 8 | 5 | 5 | 10 | 0 | 7 | 1 | 11 | 9 | 9 | 11 | 2 |
| 925 | 9 | 5 | 4 | 7 | 0 | 2 | 10 | 8 | 3 | 4 | 7 | 7 | 5 | 5 |
| 926 | 7 | 11 | 6 | 1 | 10 | 2 | 8 | 5 | 7 | 11 | 9 | 5 | 10 | 6 |
| 927 | 8 | 2 | 1 | 8 | 4 | 5 | 10 | 6 | 1 | 8 | 9 | 8 | 10 | 10 |
| 928 | 8 | 0 | 6 | 10 | 4 | 4 | 11 | 4 | 3 | 9 | 1 | 3 | 0 | 5 |
| 929 | 0 | 11 | 10 | 0 | 10 | 1 | 6 | 1 | 5 | 4 | 6 | 2 | 6 | 1 |
| 930 | 11 | 4 | 8 | 6 | 7 | 3 | 6 | 11 | 2 | 3 | 4 | 7 | 8 | 6 |
| 931 | 1 | 3 | 9 | 10 | 6 | 8 | 1 | 3 | 7 | 4 | 4 | 9 | 9 | 11 |
| 932 | 1 | 7 | 10 | 0 | 9 | 7 | 7 | 1 | 11 | 10 | 4 | 1 | 8 | 5 |
| 933 | 0 | 5 | 2 | 10 | 7 | 11 | 6 | 3 | 2 | 10 | 2 | 4 | 9 | 5 |
| 934 | 9 | 7 | 3 | 4 | 8 | 10 | 7 | 2 | 6 | 4 | 8 | 0 | 10 | 3 |
| 935 | 1 | 11 | 9 | 4 | 10 | 2 | 4 | 8 | 10 | 2 | 2 | 1 | 8 | 1 |
| 936 | 6 | 2 | 2 | 9 | 9 | 9 | 5 | 4 | 2 | 7 | 5 | 7 | 11 | 9 |
| 937 | 1 | 7 | 3 | 11 | 5 | 2 | 3 | 7 | 8 | 9 | 10 | 5 | 3 | 3 |
| 938 | 4 | 6 | 7 | 8 | 11 | 4 | 9 | 10 | 6 | 10 | 9 | 7 | 0 | 10 |
| 939 | 5 | 1 | 10 | 6 | 2 | 11 | 6 | 0 | 2 | 10 | 11 | 9 | 6 | 9 |
| 940 | 3 | 11 | 1 | 8 | 4 | 8 | 2 | 0 | 9 | 5 | 9 | 4 | 5 | 9 |
| 941 | 2 | 1 | 9 | 9 | 6 | 5 | 9 | 8 | 11 | 11 | 8 | 6 | 3 | 4 |
| 942 | 6 | 10 | 9 | 0 | 11 | 0 | 2 | 3 | 10 | 11 | 10 | 5 | 9 | 4 |
| 943 | 0 | 9 | 0 | 8 | 11 | 10 | 11 | 4 | 1 | 1 | 8 | 4 | 1 | 0 |
| 944 | 4 | 11 | 6 | 6 | 8 | 9 | 4 | 3 | 11 | 9 | 7 | 4 | 0 | 6 |
| 945 | 6 | 4 | 10 | 8 | 5 | 8 | 0 | 7 | 7 | 0 | 9 | 0 | 7 | 1 |
| 946 | 0 | 11 | 9 | 1 | 2 | 9 | 7 | 6 | 9 | 10 | 5 | 4 | 11 | 9 |
| 947 | 9 | 0 | 8 | 2 | 3 | 6 | 10 | 6 | 9 | 11 | 11 | 4 | 6 | 7 |
| 948 | 9 | 7 | 3 | 2 | 2 | 11 | 0 | 5 | 8 | 8 | 6 | 1 | 1 | 5 |
| 949 | 6 | 5 | 10 | 5 | 7 | 7 | 8 | 11 | 1 | 9 | 4 | 11 | 11 | 6 |
| 950 | 2 | 7 | 9 | 9 | 8 | 5 | 2 | 4 | 4 | 3 | 1 | 9 | 8 | 7 |
| 951 | 0 | 4 | 7 | 11 | 1 | 0 | 9 | 11 | 11 | 10 | 3 | 11 | 8 | 10 |
| 952 | 7 | 2 | 9 | 7 | 4 | 3 | 4 | 5 | 0 | 3 | 5 | 7 | 9 | 0 |
| 953 | 2 | 1 | 3 | 7 | 9 | 4 | 8 | 4 | 1 | 4 | 0 | 4 | 10 | 11 |
| 954 | 4 | 0 | 10 | 2 | 7 | 6 | 5 | 1 | 2 | 5 | 7 | 10 | 8 | 5 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 955 | 8 | 1 | 11 | 6 | 2 | 3 | 7 | 3 | 5 | 2 | 1 | 6 | 1 | 5 |
| 956 | 9 | 7 | 9 | 8 | 11 | 0 | 10 | 9 | 5 | 5 | 0 | 7 | 1 | 8 |
| 957 | 4 | 9 | 8 | 5 | 7 | 10 | 10 | 11 | 3 | 2 | 10 | 8 | 7 | 11 |
| 958 | 9 | 11 | 1 | 1 | 8 | 6 | 10 | 8 | 11 | 4 | 11 | 5 | 11 | 0 |
| 959 | 8 | 10 | 4 | 4 | 10 | 11 | 9 | 5 | 3 | 11 | 8 | 4 | 0 | 1 |
| 960 | 10 | 9 | 2 | 2 | 4 | 8 | 4 | 7 | 8 | 3 | 1 | 6 | 8 | 10 |
| 961 | 1 | 7 | 7 | 1 | 1 | 6 | 5 | 1 | 5 | 11 | 2 | 10 | 6 | 0 |
| 962 | 8 | 9 | 4 | 5 | 0 | 10 | 11 | 9 | 7 | 11 | 6 | 7 | 6 | 1 |
| 963 | 9 | 0 | 10 | 0 | 10 | 4 | 5 | 2 | 11 | 4 | 1 | 10 | 7 | 7 |
| 964 | 4 | 0 | 0 | 6 | 6 | 9 | 3 | 4 | 1 | 7 | 6 | 3 | 0 | 11 |
| 965 | 3 | 1 | 7 | 7 | 1 | 1 | 3 | 2 | 8 | 8 | 11 | 4 | 5 | 9 |
| 966 | 10 | 7 | 7 | 5 | 0 | 9 | 3 | 5 | 7 | 7 | 3 | 4 | 11 | 6 |
| 967 | 4 | 0 | 2 | 1 | 2 | 11 | 4 | 6 | 1 | 9 | 11 | 4 | 4 | 0 |
| 968 | 7 | 5 | 8 | 6 | 11 | 0 | 8 | 10 | 1 | 11 | 8 | 4 | 2 | 5 |
| 969 | 3 | 5 | 7 | 9 | 0 | 8 | 5 | 7 | 7 | 7 | 0 | 0 | 0 | 7 |
| 970 | 5 | 4 | 0 | 5 | 9 | 1 | 1 | 10 | 5 | 7 | 3 | 9 | 2 | 11 |
| 971 | 11 | 7 | 0 | 3 | 7 | 11 | 2 | 8 | 2 | 5 | 5 | 2 | 6 | 6 |
| 972 | 5 | 6 | 11 | 1 | 8 | 0 | 4 | 5 | 7 | 6 | 2 | 10 | 5 | 1 |
| 973 | 11 | 1 | 3 | 1 | 7 | 7 | 8 | 1 | 5 | 6 | 3 | 10 | 3 | 2 |
| 974 | 3 | 11 | 11 | 1 | 7 | 11 | 11 | 3 | 6 | 8 | 8 | 0 | 5 | 0 |
| 975 | 5 | 10 | 10 | 2 | 9 | 7 | 3 | 2 | 1 | 8 | 7 | 4 | 0 | 7 |
| 976 | 1 | 7 | 10 | 11 | 7 | 3 | 8 | 10 | 8 | 5 | 5 | 8 | 10 | 10 |
| 977 | 2 | 2 | 5 | 11 | 3 | 11 | 1 | 0 | 0 | 7 | 2 | 8 | 5 | 4 |
| 978 | 9 | 11 | 9 | 3 | 2 | 9 | 8 | 3 | 1 | 6 | 6 | 9 | 6 | 2 |
| 979 | 7 | 5 | 1 | 3 | 11 | 6 | 8 | 11 | 4 | 8 | 10 | 7 | 6 | 2 |
| 980 | 5 | 1 | 7 | 2 | 4 | 7 | 2 | 3 | 7 | 4 | 1 | 9 | 8 | 2 |
| 981 | 10 | 6 | 8 | 11 | 4 | 5 | 11 | 3 | 2 | 10 | 8 | 2 | 0 | 10 |
| 982 | 0 | 9 | 8 | 2 | 11 | 7 | 4 | 3 | 9 | 2 | 5 | 2 | 10 | 2 |
| 983 | 5 | 10 | 2 | 8 | 10 | 0 | 1 | 2 | 4 | 0 | 3 | 5 | 11 | 4 |
| 984 | 7 | 11 | 5 | 11 | 6 | 10 | 6 | 10 | 5 | 6 | 4 | 0 | 8 | 11 |
| 985 | 10 | 3 | 6 | 2 | 4 | 5 | 8 | 0 | 7 | 7 | 10 | 3 | 4 | 2 |
| 986 | 8 | 9 | 8 | 11 | 11 | 2 | 2 | 11 | 2 | 5 | 9 | 3 | 10 | 8 |
| 987 | 4 | 8 | 0 | 4 | 3 | 1 | 10 | 3 | 3 | 2 | 0 | 11 | 11 | 1 |
| 988 | 8 | 10 | 10 | 6 | 8 | 3 | 0 | 6 | 5 | 1 | 2 | 10 | 10 | 4 |
| 989 | 0 | 2 | 8 | 2 | 4 | 10 | 2 | 8 | 5 | 1 | 10 | 2 | 8 | 8 |
| 990 | 2 | 5 | 9 | 1 | 6 | 8 | 1 | 1 | 8 | 0 | 6 | 2 | 11 | 0 |
| 991 | 5 | 10 | 6 | 10 | 4 | 3 | 7 | 7 | 11 | 7 | 11 | 8 | 7 | 1 |
| 992 | 4 | 7 | 0 | 10 | 9 | 11 | 11 | 5 | 3 | 3 | 1 | 6 | 10 | 8 |
| 993 | 10 | 7 | 7 | 10 | 0 | 5 | 8 | 0 | 5 | 10 | 1 | 6 | 7 | 0 |
| 994 | 11 | 3 | 5 | 10 | 10 | 0 | 10 | 9 | 5 | 2 | 9 | 9 | 9 | 3 |
| 995 | 4 | 3 | 4 | 10 | 8 | 9 | 6 | 10 | 3 | 6 | 7 | 11 | 2 | 3 |
| 996 | 10 | 11 | 0 | 10 | 4 | 10 | 4 | 0 | 11 | 2 | 5 | 0 | 5 | 2 |
| 997 | 11 | 9 | 2 | 10 | 2 | 0 | 3 | 0 | 2 | 0 | 1 | 9 | 4 | 8 |
| 998 | 6 | 1 | 11 | 8 | 7 | 8 | 5 | 10 | 9 | 11 | 11 | 6 | 10 | 3 |
| 999 | 3 | 2 | 10 | 2 | 5 | 3 | 4 | 6 | 0 | 11 | 9 | 4 | 1 | 6 |
| 1000 | 8 | 7 | 10 | 9 | 3 | 11 | 3 | 6 | 5 | 8 | 8 | 0 | 3 | 7 |
| 1001 | 0 | 4 | 2 | 0 | 3 | 10 | 10 | 9 | 5 | 8 | 2 | 7 | 2 | 4 |
| 1002 | 9 | 10 | 11 | 11 | 7 | 9 | 8 | 5 | 0 | 4 | 2 | 0 | 0 | 0 |
| 1003 | 7 | 4 | 0 | 1 | 4 | 5 | 8 | 11 | 1 | 4 | 6 | 7 | 5 | 1 |
| 1004 | 3 | 1 | 4 | 9 | 3 | 3 | 4 | 9 | 5 | 1 | 8 | 3 | 6 | 10 |
| 1005 | 1 | 10 | 5 | 8 | 1 | 11 | 5 | 0 | 10 | 5 | 11 | 9 | 9 | 6 |
| 1006 | 8 | 6 | 7 | 9 | 2 | 10 | 6 | 0 | 3 | 3 | 8 | 9 | 5 | 3 |
| 1007 | 5 | 9 | 8 | 4 | 10 | 5 | 10 | 1 | 0 | 5 | 1 | 2 | 0 | 3 |
| 1008 | 2 | 0 | 9 | 11 | 2 | 4 | 4 | 2 | 3 | 3 | 3 | 9 | 9 | 4 |
| 1009 | 8 | 11 | 4 | 0 | 0 | 5 | 6 | 1 | 1 | 11 | 3 | 9 | 2 | 7 |
| 1010 | 2 | 6 | 5 | 1 | 4 | 4 | 3 | 10 | 8 | 9 | 10 | 3 | 10 | 0 |
| 1011 | 3 | 2 | 3 | 0 | 7 | 1 | 6 | 5 | 3 | 0 | 1 | 2 | 11 | 2 |
| 1012 | 8 | 2 | 7 | 10 | 5 | 7 | 0 | 3 | 0 | 2 | 9 | 5 | 9 | 2 |
| 1013 | 10 | 3 | 2 | 7 | 2 | 0 | 7 | 7 | 1 | 9 | 2 | 11 | 10 | 9 |
| 1014 | 5 | 11 | 5 | 0 | 6 | 3 | 2 | 6 | 8 | 7 | 5 | 9 | 5 | 4 |
| 1015 | 9 | 10 | 7 | 1 | 2 | 3 | 6 | 9 | 10 | 1 | 0 | 1 | 6 | 7 |
| 1016 | 3 | 8 | 8 | 1 | 7 | 11 | 8 | 7 | 8 | 7 | 5 | 6 | 0 | 6 |
| 1017 | 11 | 11 | 0 | 11 | 2 | 9 | 3 | 1 | 5 | 0 | 7 | 0 | 3 | 4 |
| 1018 | 1 | 8 | 6 | 11 | 9 | 1 | 5 | 1 | 4 | 2 | 5 | 0 | 0 | 4 |
| 1019 | 5 | 5 | 9 | 9 | 9 | 10 | 10 | 10 | 7 | 4 | 6 | 10 | 7 | 0 |
| 1020 | 1 | 0 | 9 | 0 | 9 | 4 | 6 | 9 | 2 | 11 | 7 | 9 | 6 | 8 |
| 1021 | 6 | 9 | 10 | 8 | 4 | 10 | 3 | 5 | 8 | 7 | 0 | 3 | 2 | 1 |
| 1022 | 5 | 2 | 10 | 4 | 11 | 4 | 5 | 6 | 9 | 4 | 0 | 7 | 3 | 8 |
| 1023 | 10 | 8 | 2 | 0 | 2 | 9 | 5 | 8 | 4 | 3 | 0 | 4 | 5 | 0 |
| 1024 | 11 | 9 | 9 | 11 | 5 | 10 | 2 | 2 | 0 | 4 | 0 | 1 | 0 | 8 |
| 1025 | 7 | 9 | 1 | 5 | 2 | 0 | 1 | 7 | 2 | 6 | 10 | 6 | 10 | 3 |
| 1026 | 7 | 5 | 11 | 0 | 4 | 9 | 5 | 6 | 10 | 11 | 6 | 11 | 6 | 5 |
| 1027 | 11 | 3 | 1 | 2 | 3 | 8 | 0 | 4 | 4 | 1 | 1 | 7 | 5 | 4 |
| 1028 | 6 | 6 | 4 | 10 | 5 | 2 | 7 | 9 | 5 | 3 | 5 | 10 | 1 | 0 |
| 1029 | 6 | 5 | 5 | 7 | 1 | 2 | 1 | 4 | 7 | 4 | 10 | 3 | 6 | 6 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 1030 | 1 | 6 | 3 | 0 | 8 | 2 | 8 | 5 | 0 | 4 | 8 | 3 | 7 | 1 |
| 1031 | 10 | 3 | 10 | 8 | 3 | 9 | 1 | 6 | 2 | 0 | 3 | 2 | 6 | 3 |
| 1032 | 1 | 8 | 8 | 1 | 3 | 3 | 8 | 10 | 9 | 10 | 3 | 2 | 2 | 0 |
| 1033 | 6 | 6 | 9 | 0 | 3 | 0 | 7 | 1 | 9 | 6 | 2 | 6 | 8 | 11 |
| 1034 | 6 | 3 | 1 | 2 | 9 | 1 | 2 | 2 | 2 | 10 | 7 | 5 | 2 | 9 |
| 1035 | 3 | 8 | 6 | 10 | 10 | 1 | 2 | 4 | 2 | 0 | 0 | 11 | 10 | 9 |
| 1036 | 11 | 11 | 11 | 10 | 7 | 4 | 7 | 11 | 2 | 10 | 3 | 1 | 3 | 1 |
| 1037 | 10 | 8 | 10 | 2 | 5 | 7 | 3 | 8 | 3 | 6 | 1 | 0 | 10 | 5 |
| 1038 | 8 | 7 | 11 | 2 | 3 | 7 | 9 | 2 | 3 | 11 | 7 | 0 | 9 | 4 |
| 1039 | 8 | 1 | 5 | 4 | 6 | 6 | 3 | 6 | 6 | 6 | 0 | 7 | 6 | 5 |
| 1040 | 7 | 2 | 3 | 10 | 3 | 9 | 8 | 4 | 6 | 8 | 4 | 2 | 1 | 11 |
| 1041 | 3 | 7 | 1 | 6 | 8 | 10 | 4 | 9 | 5 | 7 | 5 | 11 | 3 | 4 |
| 1042 | 6 | 7 | 10 | 7 | 2 | 5 | 5 | 10 | 3 | 3 | 9 | 6 | 5 | 9 |
| 1043 | 8 | 10 | 1 | 9 | 8 | 4 | 4 | 2 | 6 | 2 | 6 | 8 | 0 | 2 |
| 1044 | 6 | 6 | 4 | 6 | 7 | 2 | 10 | 6 | 11 | 10 | 6 | 11 | 5 | 4 |
| 1045 | 0 | 1 | 7 | 10 | 3 | 8 | 1 | 1 | 11 | 6 | 8 | 3 | 1 | 5 |
| 1046 | 4 | 6 | 7 | 9 | 7 | 4 | 6 | 9 | 0 | 11 | 10 | 6 | 1 | 11 |
| 1047 | 6 | 1 | 2 | 5 | 10 | 7 | 4 | 1 | 9 | 6 | 11 | 11 | 0 | 0 |
| 1048 | 8 | 11 | 4 | 1 | 5 | 11 | 1 | 8 | 9 | 8 | 0 | 6 | 1 | 1 |
| 1049 | 0 | 6 | 10 | 8 | 10 | 2 | 4 | 10 | 1 | 9 | 10 | 9 | 9 | 9 |
| 1050 | 8 | 1 | 0 | 8 | 8 | 11 | 7 | 9 | 11 | 1 | 0 | 3 | 9 | 9 |
| 1051 | 0 | 8 | 11 | 8 | 8 | 8 | 11 | 3 | 8 | 9 | 6 | 4 | 7 | 2 |
| 1052 | 6 | 5 | 5 | 0 | 3 | 6 | 4 | 5 | 6 | 10 | 8 | 0 | 4 | 2 |
| 1053 | 7 | 11 | 6 | 1 | 8 | 10 | 10 | 7 | 10 | 7 | 4 | 2 | 6 | 7 |
| 1054 | 8 | 2 | 0 | 10 | 5 | 2 | 4 | 9 | 8 | 8 | 8 | 7 | 4 | 8 |
| 1055 | 2 | 2 | 3 | 7 | 4 | 3 | 1 | 1 | 10 | 10 | 3 | 9 | 3 | 7 |
| 1056 | 0 | 10 | 8 | 2 | 6 | 0 | 6 | 11 | 6 | 0 | 6 | 8 | 8 | 11 |
| 1057 | 7 | 8 | 7 | 2 | 8 | 6 | 9 | 9 | 0 | 8 | 2 | 10 | 5 | 10 |
| 1058 | 8 | 10 | 8 | 3 | 7 | 5 | 0 | 7 | 5 | 5 | 0 | 6 | 5 | 1 |
| 1059 | 2 | 2 | 11 | 5 | 5 | 11 | 10 | 10 | 1 | 10 | 10 | 2 | 9 | 8 |
| 1060 | 3 | 5 | 9 | 6 | 11 | 1 | 0 | 11 | 2 | 9 | 5 | 3 | 7 | 10 |
| 1061 | 6 | 2 | 10 | 0 | 10 | 3 | 11 | 2 | 10 | 11 | 0 | 6 | 6 | 3 |
| 1062 | 11 | 8 | 7 | 7 | 10 | 8 | 3 | 4 | 9 | 8 | 10 | 11 | 3 | 6 |
| 1063 | 0 | 0 | 11 | 1 | 7 | 3 | 9 | 7 | 2 | 2 | 7 | 5 | 3 | 9 |
| 1064 | 11 | 8 | 6 | 7 | 9 | 2 | 0 | 1 | 1 | 6 | 4 | 5 | 6 | 3 |
| 1065 | 6 | 9 | 1 | 6 | 6 | 5 | 2 | 2 | 7 | 5 | 4 | 11 | 0 | 2 |
| 1066 | 8 | 4 | 5 | 7 | 5 | 9 | 8 | 10 | 9 | 4 | 2 | 8 | 11 | 7 |
| 1067 | 1 | 8 | 11 | 0 | 0 | 3 | 11 | 7 | 4 | 6 | 9 | 9 | 2 | 3 |
| 1068 | 10 | 2 | 9 | 0 | 6 | 9 | 0 | 5 | 1 | 11 | 8 | 3 | 10 | 5 |
| 1069 | 9 | 9 | 8 | 10 | 11 | 9 | 0 | 8 | 1 | 5 | 0 | 5 | 0 | 5 |
| 1070 | 0 | 6 | 11 | 4 | 1 | 8 | 4 | 11 | 0 | 10 | 1 | 2 | 3 | 5 |
| 1071 | 0 | 5 | 1 | 10 | 7 | 5 | 5 | 11 | 3 | 5 | 7 | 2 | 6 | 8 |
| 1072 | 2 | 7 | 7 | 9 | 4 | 1 | 8 | 8 | 4 | 8 | 6 | 0 | 4 | 11 |
| 1073 | 9 | 2 | 10 | 1 | 10 | 1 | 10 | 2 | 6 | 8 | 5 | 3 | 2 | 6 |
| 1074 | 7 | 7 | 9 | 11 | 6 | 1 | 2 | 0 | 6 | 1 | 10 | 10 | 7 | 4 |
| 1075 | 10 | 8 | 9 | 3 | 6 | 1 | 4 | 3 | 10 | 11 | 2 | 6 | 0 | 10 |
| 1076 | 2 | 2 | 9 | 3 | 1 | 6 | 9 | 3 | 3 | 7 | 10 | 3 | 2 | 8 |
| 1077 | 11 | 1 | 6 | 1 | 11 | 4 | 5 | 6 | 1 | 3 | 2 | 6 | 1 | 0 |
| 1078 | 8 | 0 | 4 | 3 | 11 | 5 | 2 | 4 | 11 | 0 | 5 | 8 | 3 | 6 |
| 1079 | 2 | 0 | 5 | 7 | 10 | 2 | 3 | 10 | 3 | 1 | 5 | 6 | 1 | 4 |
| 1080 | 2 | 9 | 6 | 1 | 9 | 2 | 7 | 7 | 6 | 2 | 11 | 11 | 10 | 5 |
| 1081 | 7 | 7 | 7 | 8 | 7 | 8 | 11 | 11 | 5 | 3 | 4 | 11 | 9 | 8 |
| 1082 | 5 | 1 | 10 | 8 | 4 | 8 | 1 | 4 | 6 | 11 | 7 | 10 | 9 | 9 |
| 1083 | 10 | 5 | 10 | 5 | 2 | 9 | 3 | 9 | 0 | 2 | 2 | 7 | 10 | 0 |
| 1084 | 9 | 9 | 10 | 6 | 8 | 11 | 7 | 2 | 9 | 3 | 2 | 7 | 1 | 6 |
| 1085 | 2 | 5 | 11 | 7 | 5 | 4 | 2 | 10 | 6 | 5 | 4 | 4 | 2 | 0 |
| 1086 | 8 | 6 | 6 | 8 | 7 | 8 | 3 | 11 | 0 | 5 | 0 | 3 | 1 | 6 |
| 1087 | 5 | 10 | 9 | 1 | 11 | 10 | 0 | 1 | 2 | 11 | 4 | 4 | 6 | 9 |
| 1088 | 7 | 7 | 6 | 1 | 2 | 8 | 8 | 9 | 5 | 9 | 5 | 9 | 7 | 5 |
| 1089 | 3 | 7 | 11 | 0 | 9 | 4 | 2 | 8 | 9 | 0 | 5 | 10 | 5 | 1 |
| 1090 | 4 | 4 | 11 | 7 | 11 | 4 | 3 | 7 | 4 | 8 | 3 | 7 | 4 | 7 |
| 1091 | 10 | 10 | 8 | 3 | 3 | 1 | 7 | 8 | 0 | 7 | 9 | 11 | 5 | 10 |
| 1092 | 7 | 5 | 2 | 1 | 6 | 1 | 8 | 7 | 1 | 3 | 2 | 10 | 9 | 11 |
| 1093 | 0 | 3 | 10 | 0 | 5 | 6 | 4 | 2 | 9 | 10 | 0 | 1 | 2 | 0 |
| 1094 | 4 | 9 | 9 | 8 | 3 | 10 | 7 | 10 | 9 | 0 | 4 | 3 | 3 | 3 |
| 1095 | 8 | 10 | 11 | 3 | 6 | 10 | 5 | 2 | 9 | 0 | 4 | 8 | 10 | 10 |
| 1096 | 6 | 0 | 4 | 7 | 4 | 10 | 4 | 1 | 4 | 2 | 6 | 9 | 6 | 8 |
| 1097 | 7 | 1 | 2 | 3 | 1 | 7 | 10 | 1 | 5 | 8 | 7 | 8 | 9 | 7 |
| 1098 | 8 | 7 | 5 | 2 | 6 | 0 | 9 | 0 | 7 | 1 | 9 | 4 | 10 | 8 |
| 1099 | 3 | 10 | 3 | 5 | 1 | 5 | 3 | 2 | 1 | 9 | 8 | 2 | 6 | 0 |
| 1100 | 6 | 2 | 10 | 11 | 2 | 11 | 0 | 11 | 4 | 3 | 0 | 11 | 4 | 11 |
| 1101 | 7 | 10 | 5 | 8 | 4 | 3 | 0 | 4 | 4 | 3 | 6 | 6 | 6 | 4 |
| 1102 | 9 | 5 | 0 | 9 | 10 | 7 | 10 | 6 | 10 | 2 | 5 | 7 | 6 | 1 |
| 1103 | 0 | 2 | 5 | 6 | 11 | 11 | 10 | 9 | 9 | 0 | 3 | 2 | 11 | 7 |
| 1104 | 7 | 6 | 9 | 5 | 9 | 7 | 6 | 1 | 2 | 4 | 0 | 2 | 10 | 2 |

Example #1 of a nested design CS hopping pattern

| m | $n_{cs}(n)$ | | | | | | | | | | | | | |
|---|---|---|---|---|---|---|---|---|---|---|---|---|---|---|
| 1105 | 7 | 10 | 2 | 11 | 5 | 4 | 9 | 7 | 0 | 11 | 8 | 8 | 9 | 3 |
| 1106 | 1 | 2 | 11 | 3 | 7 | 7 | 7 | 7 | 9 | 10 | 11 | 10 | 6 | 0 |
| 1107 | 7 | 11 | 6 | 0 | 4 | 6 | 10 | 6 | 2 | 3 | 8 | 6 | 2 | 9 |
| 1108 | 6 | 3 | 3 | 9 | 9 | 11 | 1 | 7 | 10 | 3 | 6 | 4 | 4 | 10 |
| 1109 | 10 | 6 | 5 | 10 | 5 | 4 | 4 | 2 | 3 | 1 | 8 | 11 | 6 | 11 |
| 1110 | 10 | 8 | 11 | 5 | 8 | 11 | 11 | 11 | 10 | 11 | 0 | 3 | 5 | 7 |
| 1111 | 5 | 1 | 5 | 2 | 10 | 0 | 8 | 1 | 11 | 9 | 7 | 6 | 5 | 7 |
| 1112 | 6 | 5 | 1 | 11 | 6 | 0 | 6 | 6 | 7 | 4 | 3 | 9 | 10 | 10 |
| 1113 | 4 | 5 | 3 | 0 | 3 | 11 | 6 | 1 | 0 | 4 | 7 | 5 | 5 | 7 |
| 1114 | 9 | 3 | 1 | 11 | 0 | 8 | 11 | 5 | 9 | 7 | 10 | 9 | 5 | 5 |
| 1115 | 5 | 3 | 10 | 5 | 10 | 1 | 6 | 9 | 2 | 3 | 0 | 1 | 0 | 6 |
| 1116 | 10 | 10 | 2 | 5 | 6 | 6 | 9 | 1 | 6 | 5 | 2 | 0 | 5 | 5 |
| 1117 | 10 | 1 | 9 | 4 | 4 | 3 | 9 | 6 | 9 | 9 | 2 | 10 | 9 | 8 |
| 1118 | 5 | 6 | 5 | 11 | 7 | 0 | 2 | 4 | 10 | 10 | 8 | 4 | 8 | 5 |
| 1119 | 2 | 8 | 7 | 6 | 1 | 3 | 8 | 7 | 3 | 3 | 10 | 1 | 0 | 0 |
| 1120 | 5 | 5 | 10 | 7 | 1 | 5 | 7 | 5 | 8 | 7 | 8 | 11 | 4 | 5 |
| 1121 | 5 | 2 | 0 | 9 | 8 | 6 | 8 | 3 | 5 | 1 | 4 | 1 | 0 | 6 |
| 1122 | 4 | 11 | 4 | 1 | 7 | 7 | 3 | 5 | 4 | 0 | 7 | 3 | 10 | 9 |
| 1123 | 2 | 1 | 7 | 10 | 5 | 6 | 3 | 8 | 2 | 4 | 2 | 9 | 11 | 11 |
| 1124 | 4 | 11 | 9 | 0 | 8 | 6 | 2 | 5 | 6 | 11 | 3 | 4 | 5 | 1 |
| 1125 | 5 | 9 | 3 | 2 | 9 | 9 | 2 | 5 | 0 | 8 | 0 | 8 | 10 | 2 |
| 1126 | 4 | 7 | 10 | 11 | 8 | 9 | 10 | 1 | 10 | 9 | 11 | 7 | 7 | 1 |
| 1127 | 6 | 2 | 10 | 3 | 11 | 8 | 2 | 8 | 3 | 5 | 7 | 11 | 11 | 8 |
| 1128 | 4 | 6 | 6 | 7 | 1 | 3 | 5 | 9 | 11 | 1 | 5 | 9 | 11 | 8 |
| 1129 | 11 | 8 | 6 | 8 | 3 | 0 | 2 | 3 | 0 | 3 | 11 | 2 | 4 | 10 |
| 1130 | 10 | 6 | 9 | 4 | 2 | 10 | 8 | 5 | 5 | 9 | 0 | 4 | 0 | 9 |
| 1131 | 1 | 8 | 1 | 10 | 11 | 3 | 6 | 6 | 1 | 2 | 7 | 9 | 3 | 4 |
| 1132 | 5 | 5 | 0 | 11 | 10 | 3 | 0 | 0 | 7 | 3 | 11 | 11 | 10 | 9 |
| 1133 | 2 | 2 | 11 | 0 | 10 | 5 | 4 | 5 | 4 | 5 | 0 | 5 | 5 | 11 |
| 1134 | 0 | 3 | 0 | 3 | 1 | 10 | 4 | 4 | 6 | 8 | 3 | 1 | 6 | 5 |
| 1135 | 5 | 8 | 5 | 9 | 1 | 7 | 8 | 2 | 1 | 3 | 1 | 5 | 5 | 3 |
| 1136 | 10 | 4 | 9 | 5 | 1 | 6 | 2 | 3 | 11 | 1 | 9 | 11 | 6 | 6 |
| 1137 | 10 | 0 | 7 | 5 | 8 | 2 | 4 | 5 | 6 | 9 | 7 | 6 | 5 | 2 |
| 1138 | 7 | 6 | 2 | 3 | 7 | 6 | 0 | 3 | 9 | 2 | 0 | 4 | 8 | 3 |
| 1139 | 3 | 11 | 0 | 2 | 7 | 2 | 6 | 6 | 8 | 1 | 3 | 7 | 7 | 3 |
| 1140 | 7 | 4 | 3 | 2 | 3 | 1 | 3 | 0 | 1 | 1 | 4 | 7 | 2 | 5 |
| 1141 | 5 | 7 | 2 | 9 | 4 | 6 | 5 | 11 | 8 | 10 | 5 | 9 | 9 | 3 |
| 1142 | 8 | 4 | 4 | 2 | 0 | 0 | 5 | 1 | 3 | 0 | 1 | 6 | 1 | 6 |
| 1143 | 10 | 4 | 3 | 9 | 1 | 3 | 8 | 10 | 6 | 9 | 5 | 0 | 3 | 3 |
| 1144 | 10 | 3 | 9 | 0 | 0 | 0 | 11 | 7 | 11 | 2 | 6 | 1 | 6 | 8 |
| 1145 | 9 | 9 | 3 | 1 | 3 | 3 | 6 | 10 | 8 | 11 | 9 | 10 | 5 | 2 |
| 1146 | 10 | 11 | 5 | 1 | 9 | 5 | 1 | 8 | 10 | 4 | 4 | 8 | 7 | 10 |
| 1147 | 0 | 7 | 2 | 0 | 0 | 0 | 1 | 5 | 2 | 6 | 8 | 2 | 8 | 0 |
| 1148 | 3 | 11 | 4 | 6 | 7 | 5 | 5 | 6 | 10 | 9 | 1 | 6 | 2 | 1 |
| 1149 | 7 | 10 | 10 | 8 | 11 | 5 | 4 | 8 | 8 | 1 | 8 | 1 | 0 | 10 |
| 1150 | 8 | 0 | 11 | 7 | 11 | 5 | 11 | 1 | 10 | 5 | 8 | 2 | 8 | 2 |
| 1151 | 1 | 0 | 5 | 5 | 3 | 3 | 3 | 1 | 6 | 7 | 11 | 7 | 0 | 3 |
| 1152 | 9 | 1 | 0 | 6 | 2 | 0 | 9 | 10 | 6 | 3 | 3 | 11 | 9 | 2 |
| 1153 | 4 | 5 | 10 | 4 | 9 | 0 | 4 | 5 | 1 | 1 | 2 | 4 | 1 | 3 |
| 1154 | 2 | 10 | 11 | 0 | 6 | 3 | 8 | 7 | 5 | 10 | 2 | 2 | 7 | 10 |
| 1155 | 1 | 3 | 6 | 3 | 10 | 6 | 3 | 1 | 8 | 7 | 9 | 2 | 3 | 5 |
| 1156 | 4 | 10 | 0 | 11 | 11 | 5 | 6 | 11 | 8 | 8 | 6 | 10 | 10 | 7 |
| 1157 | 1 | 8 | 2 | 2 | 11 | 7 | 2 | 11 | 2 | 0 | 11 | 6 | 6 | 1 |
| 1158 | 3 | 3 | 7 | 11 | 8 | 11 | 4 | 11 | 9 | 9 | 1 | 8 | 10 | 6 |
| 1159 | 3 | 9 | 5 | 4 | 1 | 1 | 10 | 0 | 11 | 5 | 0 | 6 | 5 | 10 |
| 1160 | 10 | 8 | 3 | 8 | 1 | 7 | 6 | 5 | 10 | 7 | 5 | 6 | 11 | 9 |
| 1161 | 11 | 9 | 11 | 11 | 4 | 8 | 10 | 1 | 8 | 10 | 7 | 11 | 0 | 9 |
| 1162 | 5 | 8 | 5 | 3 | 2 | 10 | 5 | 9 | 4 | 7 | 1 | 8 | 11 | 9 |
| 1163 | 6 | 3 | 5 | 6 | 5 | 7 | 5 | 0 | 9 | 3 | 10 | 5 | 3 | 10 |
| 1164 | 10 | 6 | 9 | 6 | 8 | 9 | 6 | 2 | 10 | 0 | 1 | 2 | 2 | 4 |
| 1165 | 3 | 10 | 7 | 6 | 10 | 10 | 4 | 7 | 2 | 8 | 3 | 4 | 11 | 10 |
| 1166 | 6 | 7 | 2 | 5 | 5 | 6 | 4 | 5 | 1 | 7 | 7 | 10 | 9 | 4 |
| 1167 | 6 | 3 | 6 | 3 | 0 | 9 | 1 | 8 | 5 | 2 | 2 | 8 | 2 | 10 |
| 1168 | 3 | 9 | 9 | 6 | 8 | 3 | 9 | 10 | 3 | 4 | 1 | 11 | 10 | 1 |
| 1169 | 9 | 6 | 5 | 9 | 4 | 8 | 6 | 1 | 2 | 2 | 7 | 7 | 4 | 10 |
| 1170 | 1 | 5 | 5 | 9 | 9 | 6 | 11 | 8 | 0 | 3 | 1 | 10 | 0 | 4 |
| 1171 | 3 | 10 | 4 | 0 | 9 | 9 | 10 | 3 | 9 | 10 | 7 | 7 | 2 | 2 |
| 1172 | 0 | 3 | 6 | 2 | 8 | 0 | 1 | 4 | 10 | 2 | 1 | 6 | 7 | 1 |
| 1173 | 2 | 7 | 7 | 6 | 5 | 5 | 8 | 9 | 0 | 1 | 8 | 11 | 2 | 6 |
| 1174 | 0 | 9 | 3 | 3 | 3 | 0 | 2 | 10 | 0 | 1 | 10 | 0 | 7 | 7 |
| 1175 | 5 | 5 | 11 | 11 | 2 | 6 | 8 | 5 | 6 | 5 | 3 | 2 | 8 | 7 |
| 1176 | 5 | 0 | 2 | 3 | 8 | 7 | 2 | 3 | 1 | 0 | 9 | 1 | 7 | 10 |
| 1177 | 7 | 2 | 2 | 7 | 5 | 11 | 0 | 0 | 5 | 1 | 2 | 9 | 1 | 0 |
| 1178 | 10 | 6 | 8 | 9 | 10 | 6 | 10 | 0 | 1 | 11 | 3 | 1 | 4 | 0 |
| 1179 | 1 | 8 | 10 | 3 | 2 | 5 | 8 | 4 | 8 | 9 | 2 | 0 | 3 | 0 |

Example #1 of a nested design CS hopping pattern

| m | $n_{cs}(n)$ | | | | | | | | | | | | | |
|---|---|---|---|---|---|---|---|---|---|---|---|---|---|---|
| 1180 | 5 | 2 | 10 | 11 | 8 | 8 | 1 | 8 | 7 | 0 | 5 | 8 | 1 | 0 |
| 1181 | 2 | 7 | 6 | 3 | 11 | 8 | 5 | 6 | 10 | 6 | 8 | 7 | 8 | 6 |
| 1182 | 6 | 2 | 8 | 1 | 6 | 8 | 2 | 10 | 7 | 2 | 0 | 1 | 4 | 3 |
| 1183 | 1 | 0 | 4 | 3 | 4 | 1 | 8 | 3 | 9 | 6 | 1 | 10 | 10 | 10 |
| 1184 | 2 | 8 | 11 | 7 | 7 | 11 | 10 | 3 | 7 | 1 | 4 | 6 | 7 | 5 |
| 1185 | 2 | 9 | 1 | 8 | 9 | 8 | 8 | 8 | 3 | 8 | 0 | 1 | 1 | 9 |
| 1186 | 5 | 11 | 10 | 2 | 6 | 0 | 7 | 5 | 9 | 1 | 0 | 5 | 7 | 11 |
| 1187 | 2 | 8 | 3 | 5 | 5 | 0 | 1 | 4 | 7 | 7 | 2 | 2 | 6 | 11 |
| 1188 | 10 | 10 | 7 | 0 | 4 | 6 | 7 | 8 | 5 | 6 | 3 | 0 | 2 | 4 |
| 1189 | 5 | 10 | 4 | 9 | 6 | 8 | 2 | 9 | 6 | 10 | 11 | 6 | 7 | 8 |
| 1190 | 10 | 7 | 7 | 7 | 8 | 4 | 10 | 2 | 10 | 3 | 4 | 4 | 8 | 5 |
| 1191 | 11 | 4 | 9 | 2 | 2 | 6 | 7 | 9 | 3 | 6 | 4 | 5 | 10 | 6 |
| 1192 | 2 | 3 | 8 | 4 | 1 | 1 | 11 | 4 | 5 | 3 | 3 | 4 | 11 | 11 |
| 1193 | 8 | 4 | 6 | 5 | 1 | 4 | 8 | 0 | 3 | 5 | 7 | 11 | 7 | 1 |
| 1194 | 1 | 0 | 8 | 1 | 7 | 9 | 6 | 6 | 0 | 1 | 4 | 0 | 1 | 8 |
| 1195 | 10 | 6 | 6 | 7 | 7 | 10 | 0 | 10 | 2 | 7 | 6 | 10 | 3 | 10 |
| 1196 | 2 | 5 | 2 | 8 | 4 | 9 | 5 | 2 | 8 | 5 | 11 | 6 | 4 | 7 |
| 1197 | 2 | 9 | 0 | 5 | 4 | 4 | 11 | 5 | 5 | 6 | 4 | 1 | 3 | 5 |
| 1198 | 1 | 4 | 11 | 8 | 7 | 6 | 5 | 4 | 8 | 2 | 2 | 3 | 8 | 2 |
| 1199 | 7 | 2 | 8 | 3 | 10 | 11 | 6 | 2 | 2 | 8 | 0 | 0 | 7 | 7 |
| 1200 | 11 | 5 | 4 | 3 | 2 | 6 | 4 | 3 | 1 | 1 | 11 | 5 | 2 | 7 |
| 1201 | 7 | 6 | 7 | 10 | 6 | 2 | 1 | 3 | 5 | 6 | 6 | 11 | 4 | 1 |
| 1202 | 10 | 1 | 10 | 3 | 9 | 8 | 9 | 5 | 4 | 3 | 0 | 9 | 6 | 3 |
| 1203 | 6 | 4 | 5 | 2 | 11 | 5 | 6 | 4 | 6 | 0 | 1 | 5 | 9 | 9 |
| 1204 | 10 | 10 | 7 | 9 | 3 | 3 | 5 | 5 | 3 | 1 | 11 | 2 | 3 | 4 |
| 1205 | 0 | 0 | 10 | 4 | 5 | 11 | 3 | 7 | 10 | 8 | 3 | 3 | 10 | 8 |
| 1206 | 11 | 6 | 5 | 3 | 11 | 3 | 10 | 11 | 6 | 4 | 5 | 1 | 5 | 9 |
| 1207 | 1 | 10 | 9 | 9 | 7 | 9 | 2 | 11 | 1 | 3 | 8 | 10 | 9 | 6 |
| 1208 | 3 | 8 | 6 | 5 | 8 | 9 | 9 | 0 | 10 | 10 | 1 | 1 | 0 | 8 |
| 1209 | 6 | 1 | 7 | 7 | 11 | 3 | 4 | 4 | 6 | 11 | 5 | 11 | 6 | 7 |
| 1210 | 5 | 10 | 1 | 1 | 8 | 5 | 1 | 4 | 0 | 3 | 3 | 2 | 5 | 5 |
| 1211 | 11 | 1 | 4 | 5 | 6 | 2 | 11 | 7 | 7 | 9 | 5 | 10 | 10 | 6 |
| 1212 | 5 | 2 | 11 | 9 | 3 | 9 | 0 | 3 | 1 | 7 | 3 | 4 | 7 | 3 |
| 1213 | 7 | 2 | 0 | 1 | 9 | 0 | 2 | 2 | 8 | 4 | 8 | 10 | 8 | 0 |
| 1214 | 6 | 8 | 5 | 6 | 8 | 10 | 6 | 1 | 6 | 11 | 9 | 1 | 0 | 6 |
| 1215 | 8 | 9 | 1 | 7 | 5 | 7 | 3 | 6 | 10 | 0 | 10 | 2 | 1 | 4 |
| 1216 | 0 | 2 | 5 | 5 | 0 | 10 | 2 | 9 | 10 | 10 | 4 | 1 | 5 | 9 |
| 1217 | 8 | 6 | 5 | 0 | 7 | 11 | 10 | 7 | 7 | 6 | 5 | 4 | 9 | 10 |
| 1218 | 11 | 5 | 5 | 2 | 6 | 4 | 5 | 3 | 3 | 7 | 9 | 7 | 6 | 7 |
| 1219 | 0 | 2 | 7 | 1 | 7 | 10 | 5 | 6 | 1 | 8 | 5 | 0 | 9 | 3 |
| 1220 | 2 | 11 | 8 | 2 | 8 | 1 | 8 | 11 | 11 | 1 | 7 | 1 | 4 | 10 |
| 1221 | 2 | 8 | 8 | 11 | 10 | 9 | 0 | 1 | 0 | 9 | 0 | 6 | 3 | 6 |
| 1222 | 8 | 11 | 9 | 2 | 5 | 1 | 9 | 1 | 1 | 3 | 8 | 4 | 5 | 9 |
| 1223 | 3 | 5 | 7 | 2 | 10 | 9 | 8 | 9 | 5 | 8 | 9 | 1 | 6 | 8 |
| 1224 | 1 | 3 | 3 | 4 | 0 | 6 | 2 | 1 | 0 | 8 | 2 | 7 | 8 | 3 |
| 1225 | 9 | 2 | 11 | 5 | 1 | 7 | 5 | 9 | 3 | 7 | 6 | 5 | 9 | 6 |
| 1226 | 1 | 10 | 0 | 0 | 10 | 0 | 9 | 11 | 1 | 1 | 10 | 6 | 2 | 1 |
| 1227 | 8 | 5 | 3 | 2 | 7 | 4 | 4 | 5 | 0 | 3 | 3 | 11 | 6 | 8 |
| 1228 | 3 | 11 | 5 | 9 | 9 | 2 | 4 | 0 | 4 | 9 | 7 | 5 | 11 | 1 |
| 1229 | 4 | 3 | 11 | 11 | 2 | 4 | 5 | 9 | 4 | 6 | 10 | 4 | 9 | 1 |
| 1230 | 0 | 10 | 8 | 4 | 2 | 5 | 6 | 9 | 2 | 11 | 4 | 0 | 9 | 3 |
| 1231 | 11 | 0 | 10 | 1 | 4 | 8 | 6 | 4 | 11 | 8 | 4 | 1 | 4 | 7 |
| 1232 | 8 | 1 | 7 | 7 | 4 | 2 | 11 | 4 | 0 | 0 | 8 | 0 | 7 | 3 |
| 1233 | 0 | 4 | 5 | 11 | 2 | 8 | 3 | 9 | 2 | 1 | 6 | 10 | 7 | 11 |
| 1234 | 11 | 3 | 2 | 4 | 11 | 9 | 6 | 3 | 11 | 10 | 9 | 0 | 8 | 9 |
| 1235 | 6 | 7 | 3 | 6 | 4 | 1 | 6 | 10 | 1 | 10 | 7 | 8 | 7 | 6 |
| 1236 | 8 | 5 | 0 | 1 | 0 | 9 | 8 | 10 | 3 | 9 | 7 | 9 | 8 | 6 |
| 1237 | 1 | 5 | 0 | 0 | 5 | 8 | 10 | 5 | 5 | 11 | 9 | 6 | 8 | 9 |
| 1238 | 9 | 10 | 1 | 7 | 9 | 0 | 6 | 0 | 5 | 11 | 3 | 11 | 4 | 8 |
| 1239 | 1 | 11 | 8 | 3 | 2 | 8 | 10 | 6 | 7 | 4 | 3 | 3 | 5 | 2 |
| 1240 | 0 | 9 | 1 | 7 | 8 | 2 | 0 | 3 | 7 | 7 | 7 | 0 | 3 | 0 |
| 1241 | 4 | 10 | 10 | 7 | 5 | 6 | 5 | 3 | 6 | 2 | 11 | 5 | 4 | 3 |
| 1242 | 2 | 11 | 3 | 0 | 0 | 4 | 10 | 1 | 4 | 10 | 11 | 0 | 10 | 0 |
| 1243 | 3 | 0 | 6 | 3 | 6 | 7 | 4 | 4 | 9 | 4 | 8 | 11 | 7 | 4 |
| 1244 | 7 | 10 | 1 | 1 | 0 | 9 | 9 | 8 | 6 | 4 | 6 | 11 | 1 | 9 |
| 1245 | 9 | 5 | 2 | 4 | 6 | 11 | 10 | 8 | 0 | 9 | 5 | 2 | 7 | 7 |
| 1246 | 4 | 10 | 2 | 0 | 9 | 11 | 0 | 8 | 7 | 9 | 10 | 10 | 3 | 6 |
| 1247 | 9 | 2 | 11 | 3 | 4 | 0 | 1 | 8 | 11 | 6 | 4 | 3 | 10 | 4 |
| 1248 | 3 | 8 | 8 | 10 | 8 | 6 | 11 | 11 | 0 | 5 | 5 | 9 | 2 | 5 |
| 1249 | 8 | 9 | 8 | 2 | 4 | 11 | 3 | 1 | 7 | 5 | 2 | 8 | 9 | 9 |
| 1250 | 6 | 4 | 4 | 3 | 10 | 6 | 8 | 6 | 3 | 3 | 11 | 9 | 7 | 4 |
| 1251 | 1 | 6 | 6 | 4 | 5 | 5 | 10 | 2 | 6 | 10 | 9 | 3 | 5 | 3 |
| 1252 | 5 | 7 | 4 | 1 | 9 | 10 | 9 | 0 | 9 | 3 | 7 | 4 | 9 | 1 |
| 1253 | 6 | 4 | 0 | 6 | 0 | 5 | 5 | 8 | 5 | 1 | 5 | 1 | 6 | 8 |
| 1254 | 10 | 10 | 5 | 9 | 2 | 6 | 8 | 10 | 0 | 6 | 6 | 7 | 8 | 9 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 1255 | 3 | 9 | 9 | 10 | 6 | 1 | 11 | 2 | 6 | 6 | 11 | 0 | 6 | 11 |
| 1256 | 5 | 8 | 5 | 5 | 5 | 8 | 9 | 6 | 2 | 8 | 9 | 7 | 5 | 11 |
| 1257 | 4 | 11 | 11 | 7 | 1 | 3 | 8 | 1 | 8 | 4 | 11 | 10 | 9 | 5 |
| 1258 | 9 | 4 | 7 | 0 | 7 | 8 | 0 | 0 | 1 | 7 | 1 | 6 | 4 | 3 |
| 1259 | 3 | 6 | 3 | 7 | 2 | 11 | 2 | 1 | 1 | 6 | 11 | 6 | 5 | 2 |
| 1260 | 6 | 8 | 7 | 0 | 4 | 3 | 2 | 6 | 11 | 11 | 8 | 2 | 7 | 8 |
| 1261 | 5 | 1 | 6 | 3 | 8 | 11 | 10 | 7 | 5 | 0 | 8 | 11 | 5 | 2 |
| 1262 | 6 | 10 | 9 | 5 | 6 | 2 | 11 | 10 | 8 | 1 | 6 | 7 | 0 | 4 |
| 1263 | 0 | 9 | 6 | 5 | 6 | 4 | 10 | 10 | 6 | 11 | 8 | 6 | 11 | 5 |
| 1264 | 2 | 10 | 1 | 4 | 6 | 4 | 5 | 0 | 7 | 5 | 1 | 6 | 6 | 3 |
| 1265 | 9 | 3 | 9 | 9 | 0 | 11 | 0 | 8 | 6 | 0 | 3 | 7 | 10 | 4 |
| 1266 | 0 | 4 | 0 | 5 | 5 | 8 | 5 | 9 | 3 | 0 | 2 | 9 | 6 | 5 |
| 1267 | 4 | 1 | 11 | 1 | 4 | 6 | 11 | 1 | 1 | 11 | 4 | 7 | 4 | 6 |
| 1268 | 7 | 0 | 10 | 8 | 2 | 2 | 10 | 0 | 4 | 1 | 3 | 3 | 1 | 3 |
| 1269 | 8 | 0 | 5 | 11 | 4 | 5 | 3 | 0 | 1 | 6 | 4 | 5 | 0 | 9 |
| 1270 | 10 | 1 | 2 | 3 | 3 | 7 | 5 | 0 | 11 | 4 | 3 | 10 | 10 | 4 |
| 1271 | 0 | 6 | 5 | 2 | 3 | 4 | 3 | 0 | 10 | 11 | 2 | 5 | 8 | 8 |
| 1272 | 11 | 6 | 10 | 1 | 1 | 9 | 2 | 9 | 4 | 3 | 3 | 5 | 6 | 8 |
| 1273 | 10 | 2 | 10 | 9 | 6 | 8 | 0 | 6 | 11 | 8 | 9 | 2 | 0 | 4 |
| 1274 | 10 | 5 | 5 | 0 | 8 | 3 | 3 | 3 | 2 | 11 | 1 | 0 | 9 | 7 |
| 1275 | 0 | 0 | 10 | 10 | 1 | 8 | 5 | 4 | 2 | 2 | 3 | 11 | 9 | 11 |
| 1276 | 9 | 9 | 7 | 8 | 2 | 10 | 6 | 6 | 2 | 8 | 2 | 10 | 1 | 11 |
| 1277 | 6 | 1 | 0 | 3 | 2 | 2 | 2 | 7 | 2 | 6 | 9 | 4 | 1 | 2 |
| 1278 | 11 | 10 | 2 | 11 | 2 | 2 | 1 | 5 | 4 | 7 | 6 | 4 | 6 | 5 |
| 1279 | 5 | 5 | 6 | 9 | 7 | 2 | 2 | 4 | 1 | 5 | 10 | 6 | 0 | 10 |
| 1280 | 5 | 4 | 0 | 11 | 11 | 10 | 9 | 5 | 6 | 10 | 6 | 0 | 7 | 5 |
| 1281 | 8 | 6 | 3 | 2 | 1 | 4 | 2 | 3 | 11 | 11 | 5 | 4 | 1 | 1 |
| 1282 | 1 | 3 | 7 | 1 | 6 | 11 | 10 | 9 | 7 | 10 | 0 | 5 | 11 | 9 |
| 1283 | 10 | 10 | 2 | 5 | 0 | 5 | 0 | 3 | 4 | 11 | 1 | 3 | 2 | 2 |
| 1284 | 2 | 10 | 9 | 4 | 5 | 7 | 10 | 7 | 9 | 2 | 1 | 4 | 5 | 11 |
| 1285 | 2 | 5 | 9 | 8 | 7 | 3 | 6 | 11 | 11 | 2 | 5 | 10 | 1 | 8 |
| 1286 | 7 | 5 | 4 | 2 | 10 | 2 | 0 | 7 | 8 | 7 | 3 | 2 | 11 | 9 |
| 1287 | 5 | 2 | 1 | 5 | 1 | 10 | 5 | 10 | 10 | 3 | 5 | 10 | 2 | 5 |
| 1288 | 4 | 10 | 6 | 6 | 11 | 11 | 5 | 4 | 9 | 5 | 7 | 0 | 2 | 10 |
| 1289 | 9 | 2 | 0 | 6 | 10 | 2 | 9 | 8 | 0 | 0 | 6 | 9 | 8 | 6 |
| 1290 | 3 | 0 | 10 | 4 | 2 | 0 | 10 | 2 | 8 | 6 | 5 | 10 | 0 | 2 |
| 1291 | 7 | 10 | 5 | 9 | 8 | 4 | 2 | 0 | 5 | 8 | 3 | 10 | 3 | 11 |
| 1292 | 9 | 8 | 8 | 2 | 3 | 5 | 3 | 2 | 0 | 5 | 6 | 7 | 7 | 4 |
| 1293 | 3 | 10 | 7 | 7 | 9 | 8 | 1 | 9 | 3 | 2 | 9 | 9 | 5 | 1 |
| 1294 | 8 | 7 | 9 | 4 | 7 | 4 | 8 | 9 | 5 | 3 | 11 | 1 | 8 | 4 |
| 1295 | 9 | 5 | 8 | 6 | 9 | 0 | 7 | 11 | 6 | 1 | 0 | 1 | 5 | 1 |
| 1296 | 3 | 6 | 10 | 5 | 6 | 3 | 10 | 7 | 2 | 0 | 11 | 5 | 2 | 4 |
| 1297 | 1 | 11 | 11 | 8 | 11 | 1 | 9 | 0 | 10 | 6 | 1 | 2 | 11 | 9 |
| 1298 | 11 | 6 | 2 | 10 | 3 | 10 | 11 | 1 | 6 | 1 | 1 | 11 | 7 | 7 |
| 1299 | 11 | 10 | 3 | 7 | 11 | 10 | 5 | 2 | 10 | 9 | 3 | 11 | 1 | 11 |
| 1300 | 2 | 2 | 7 | 4 | 0 | 4 | 9 | 5 | 8 | 8 | 7 | 1 | 6 | 2 |
| 1301 | 4 | 2 | 2 | 2 | 0 | 10 | 11 | 1 | 4 | 0 | 11 | 2 | 2 | 9 |
| 1302 | 0 | 1 | 11 | 3 | 9 | 0 | 7 | 8 | 7 | 11 | 8 | 7 | 1 | 11 |
| 1303 | 7 | 8 | 1 | 10 | 6 | 6 | 0 | 10 | 5 | 11 | 3 | 5 | 0 | 7 |
| 1304 | 9 | 5 | 7 | 9 | 2 | 0 | 0 | 4 | 9 | 1 | 10 | 3 | 4 | 5 |
| 1305 | 8 | 0 | 2 | 8 | 10 | 9 | 0 | 8 | 3 | 4 | 7 | 2 | 9 | 10 |
| 1306 | 6 | 1 | 4 | 11 | 0 | 6 | 1 | 5 | 9 | 2 | 4 | 10 | 0 | 9 |
| 1307 | 2 | 4 | 6 | 4 | 1 | 4 | 1 | 8 | 4 | 0 | 6 | 10 | 1 | 8 |
| 1308 | 2 | 6 | 7 | 11 | 9 | 6 | 0 | 7 | 11 | 8 | 5 | 7 | 10 | 8 |
| 1309 | 0 | 8 | 9 | 9 | 0 | 8 | 8 | 9 | 4 | 9 | 0 | 10 | 11 | 3 |
| 1310 | 10 | 2 | 5 | 3 | 6 | 10 | 7 | 4 | 2 | 3 | 7 | 10 | 7 | 9 |
| 1311 | 4 | 5 | 7 | 2 | 5 | 11 | 0 | 7 | 4 | 3 | 8 | 7 | 2 | 3 |
| 1312 | 11 | 5 | 0 | 7 | 5 | 2 | 6 | 9 | 2 | 7 | 3 | 6 | 6 | 4 |
| 1313 | 1 | 2 | 3 | 11 | 7 | 7 | 9 | 6 | 8 | 8 | 3 | 4 | 4 | 9 |
| 1314 | 6 | 3 | 3 | 11 | 0 | 4 | 0 | 4 | 11 | 8 | 10 | 11 | 0 | 10 |
| 1315 | 0 | 3 | 0 | 9 | 1 | 0 | 5 | 10 | 10 | 4 | 10 | 3 | 8 | 9 |
| 1316 | 2 | 10 | 5 | 9 | 11 | 2 | 7 | 9 | 11 | 10 | 3 | 4 | 5 | 10 |
| 1317 | 11 | 4 | 5 | 0 | 9 | 7 | 10 | 0 | 4 | 11 | 10 | 8 | 4 | 11 |
| 1318 | 3 | 8 | 0 | 4 | 9 | 8 | 7 | 4 | 2 | 4 | 11 | 2 | 0 | 5 |
| 1319 | 6 | 3 | 3 | 4 | 4 | 3 | 5 | 5 | 6 | 11 | 4 | 8 | 5 | 5 |
| 1320 | 3 | 0 | 5 | 8 | 6 | 11 | 2 | 8 | 5 | 2 | 7 | 4 | 11 | 11 |
| 1321 | 3 | 4 | 6 | 1 | 3 | 4 | 10 | 10 | 7 | 3 | 11 | 4 | 10 | 11 |
| 1322 | 4 | 6 | 9 | 9 | 7 | 2 | 0 | 8 | 11 | 4 | 5 | 4 | 0 | 0 |
| 1323 | 9 | 2 | 3 | 2 | 9 | 6 | 1 | 5 | 7 | 11 | 10 | 11 | 7 | 1 |
| 1324 | 4 | 7 | 5 | 3 | 0 | 7 | 11 | 1 | 0 | 2 | 1 | 11 | 5 | 2 |
| 1325 | 10 | 11 | 9 | 7 | 10 | 10 | 4 | 2 | 0 | 5 | 7 | 11 | 2 | 6 |
| 1326 | 0 | 11 | 2 | 7 | 6 | 0 | 10 | 1 | 7 | 11 | 0 | 11 | 2 | 1 |
| 1327 | 9 | 1 | 9 | 8 | 11 | 4 | 2 | 11 | 9 | 8 | 5 | 1 | 0 | 11 |
| 1328 | 0 | 3 | 3 | 0 | 6 | 4 | 0 | 11 | 7 | 9 | 9 | 4 | 5 | 9 |
| 1329 | 10 | 8 | 4 | 7 | 9 | 4 | 10 | 8 | 9 | 7 | 6 | 6 | 4 | 3 |
| 1330 | 3 | 3 | 1 | 7 | 10 | 6 | 0 | 2 | 6 | 10 | 3 | 0 | 7 | 8 |
| 1331 | 6 | 9 | 11 | 4 | 7 | 6 | 6 | 9 | 3 | 8 | 8 | 6 | 0 | 7 |
| 1332 | 9 | 0 | 10 | 2 | 2 | 9 | 3 | 11 | 10 | 10 | 8 | 8 | 4 | 5 |
| 1333 | 6 | 1 | 6 | 1 | 0 | 7 | 8 | 2 | 4 | 1 | 2 | 3 | 11 | 4 |
| 1334 | 0 | 3 | 2 | 11 | 10 | 4 | 3 | 8 | 2 | 0 | 4 | 1 | 9 | 9 |
| 1335 | 0 | 6 | 0 | 1 | 8 | 4 | 1 | 7 | 11 | 8 | 9 | 2 | 2 | 11 |
| 1336 | 9 | 5 | 2 | 3 | 10 | 5 | 5 | 10 | 9 | 0 | 1 | 1 | 6 | 5 |
| 1337 | 0 | 9 | 9 | 4 | 0 | 0 | 4 | 2 | 6 | 5 | 9 | 8 | 9 | 1 |
| 1338 | 3 | 1 | 7 | 3 | 11 | 1 | 7 | 7 | 1 | 3 | 10 | 2 | 2 | 10 |
| 1339 | 5 | 11 | 0 | 6 | 2 | 7 | 0 | 2 | 1 | 10 | 3 | 6 | 10 | 0 |
| 1340 | 6 | 2 | 6 | 5 | 8 | 3 | 7 | 5 | 10 | 0 | 9 | 5 | 8 | 10 |
| 1341 | 2 | 0 | 3 | 7 | 11 | 7 | 9 | 9 | 1 | 10 | 7 | 1 | 11 | 4 |
| 1342 | 5 | 0 | 0 | 3 | 8 | 9 | 7 | 2 | 3 | 5 | 5 | 7 | 10 | 9 |
| 1343 | 8 | 0 | 8 | 0 | 0 | 8 | 7 | 5 | 8 | 1 | 4 | 3 | 7 | 6 |
| 1344 | 3 | 9 | 1 | 7 | 2 | 3 | 9 | 5 | 0 | 9 | 7 | 1 | 4 | 7 |
| 1345 | 1 | 2 | 5 | 10 | 5 | 10 | 11 | 0 | 8 | 0 | 0 | 4 | 10 | 1 |
| 1346 | 0 | 10 | 3 | 9 | 5 | 1 | 6 | 3 | 4 | 4 | 0 | 4 | 0 | 10 |
| 1347 | 11 | 9 | 5 | 9 | 8 | 1 | 7 | 3 | 1 | 9 | 10 | 9 | 4 | 2 |
| 1348 | 6 | 6 | 10 | 7 | 11 | 11 | 6 | 5 | 9 | 5 | 8 | 6 | 10 | 1 |
| 1349 | 4 | 2 | 4 | 0 | 5 | 6 | 11 | 6 | 5 | 6 | 8 | 2 | 10 | 3 |
| 1350 | 11 | 8 | 10 | 3 | 7 | 3 | 6 | 2 | 5 | 8 | 3 | 9 | 9 | 1 |
| 1351 | 1 | 11 | 1 | 0 | 8 | 7 | 1 | 4 | 5 | 4 | 4 | 11 | 4 | 3 |
| 1352 | 1 | 10 | 5 | 6 | 10 | 7 | 1 | 1 | 3 | 3 | 2 | 4 | 10 | 2 |
| 1353 | 11 | 2 | 10 | 8 | 3 | 3 | 9 | 4 | 1 | 6 | 2 | 3 | 0 | 1 |
| 1354 | 0 | 10 | 1 | 5 | 0 | 0 | 10 | 2 | 1 | 1 | 1 | 9 | 1 | 4 |
| 1355 | 7 | 11 | 9 | 11 | 3 | 1 | 6 | 3 | 0 | 2 | 5 | 1 | 10 | 7 |
| 1356 | 3 | 2 | 9 | 4 | 5 | 9 | 3 | 4 | 2 | 8 | 7 | 11 | 5 | 7 |
| 1357 | 5 | 6 | 7 | 0 | 3 | 11 | 7 | 9 | 4 | 8 | 6 | 9 | 9 | 5 |
| 1358 | 0 | 7 | 5 | 10 | 1 | 2 | 8 | 7 | 0 | 10 | 7 | 3 | 2 | 2 |
| 1359 | 3 | 10 | 1 | 1 | 1 | 0 | 7 | 5 | 5 | 5 | 1 | 10 | 2 | 2 |
| 1360 | 10 | 2 | 4 | 2 | 9 | 2 | 1 | 2 | 6 | 0 | 9 | 7 | 6 | 6 |
| 1361 | 11 | 9 | 3 | 2 | 7 | 8 | 9 | 10 | 11 | 2 | 5 | 11 | 2 | 6 |
| 1362 | 4 | 0 | 6 | 10 | 0 | 0 | 1 | 0 | 5 | 0 | 9 | 3 | 3 | 1 |
| 1363 | 7 | 7 | 9 | 7 | 7 | 0 | 10 | 4 | 8 | 9 | 2 | 9 | 6 | 3 |
| 1364 | 4 | 4 | 2 | 8 | 5 | 9 | 1 | 0 | 3 | 7 | 4 | 4 | 1 | 9 |
| 1365 | 3 | 4 | 2 | 5 | 5 | 11 | 9 | 7 | 11 | 3 | 5 | 2 | 5 | 0 |
| 1366 | 6 | 2 | 0 | 3 | 2 | 7 | 11 | 8 | 11 | 11 | 2 | 5 | 3 | 9 |
| 1367 | 5 | 10 | 2 | 3 | 1 | 2 | 5 | 1 | 7 | 6 | 4 | 6 | 4 | 6 |
| 1368 | 7 | 1 | 9 | 3 | 4 | 0 | 10 | 9 | 2 | 6 | 3 | 11 | 4 | 0 |
| 1369 | 0 | 6 | 10 | 4 | 7 | 6 | 11 | 9 | 6 | 2 | 6 | 8 | 2 | 8 |
| 1370 | 7 | 6 | 2 | 1 | 4 | 11 | 10 | 11 | 3 | 7 | 1 | 11 | 11 | 5 |
| 1371 | 4 | 3 | 11 | 2 | 2 | 7 | 1 | 8 | 2 | 10 | 2 | 7 | 8 | 4 |
| 1372 | 2 | 8 | 10 | 6 | 5 | 1 | 4 | 10 | 3 | 9 | 8 | 5 | 3 | 1 |
| 1373 | 5 | 9 | 10 | 10 | 8 | 1 | 5 | 11 | 5 | 7 | 10 | 8 | 10 | 8 |
| 1374 | 6 | 0 | 11 | 11 | 6 | 5 | 9 | 2 | 3 | 7 | 2 | 3 | 1 | 5 |
| 1375 | 8 | 10 | 0 | 8 | 9 | 10 | 0 | 7 | 8 | 6 | 7 | 0 | 3 | 9 |
| 1376 | 11 | 11 | 7 | 2 | 11 | 0 | 6 | 8 | 1 | 11 | 0 | 8 | 6 | 6 |
| 1377 | 2 | 9 | 11 | 11 | 7 | 9 | 4 | 9 | 7 | 2 | 11 | 9 | 3 | 1 |
| 1378 | 9 | 4 | 7 | 6 | 10 | 4 | 0 | 7 | 9 | 5 | 11 | 8 | 2 | 9 |
| 1379 | 5 | 7 | 10 | 11 | 0 | 0 | 4 | 6 | 10 | 0 | 1 | 10 | 3 | 9 |
| 1380 | 3 | 5 | 3 | 9 | 3 | 8 | 4 | 10 | 6 | 2 | 1 | 6 | 10 | 0 |
| 1381 | 2 | 11 | 8 | 5 | 3 | 8 | 8 | 5 | 8 | 11 | 5 | 0 | 6 | 9 |
| 1382 | 7 | 0 | 9 | 3 | 11 | 2 | 6 | 5 | 6 | 10 | 11 | 8 | 10 | 8 |
| 1383 | 8 | 6 | 8 | 9 | 1 | 1 | 10 | 4 | 0 | 8 | 8 | 7 | 1 | 2 |
| 1384 | 9 | 3 | 9 | 7 | 9 | 5 | 4 | 5 | 6 | 11 | 6 | 1 | 11 | 2 |
| 1385 | 2 | 1 | 4 | 5 | 1 | 3 | 2 | 11 | 7 | 4 | 2 | 11 | 0 | 5 |
| 1386 | 11 | 11 | 3 | 5 | 10 | 8 | 6 | 9 | 3 | 10 | 7 | 5 | 4 | 8 |
| 1387 | 9 | 2 | 8 | 11 | 11 | 2 | 9 | 10 | 5 | 4 | 4 | 6 | 11 | 0 |
| 1388 | 9 | 0 | 7 | 7 | 9 | 4 | 0 | 11 | 11 | 11 | 2 | 3 | 5 | 3 |
| 1389 | 3 | 1 | 1 | 2 | 2 | 5 | 8 | 8 | 7 | 3 | 5 | 10 | 3 | 9 |
| 1390 | 8 | 10 | 10 | 1 | 0 | 6 | 2 | 2 | 2 | 7 | 0 | 7 | 1 | 11 |
| 1391 | 8 | 0 | 6 | 5 | 1 | 10 | 4 | 7 | 7 | 8 | 1 | 2 | 2 | 0 |
| 1392 | 1 | 0 | 8 | 10 | 9 | 10 | 5 | 6 | 4 | 7 | 0 | 2 | 5 | 5 |
| 1393 | 10 | 8 | 9 | 9 | 3 | 9 | 3 | 11 | 2 | 7 | 6 | 1 | 1 | 2 |
| 1394 | 11 | 8 | 2 | 9 | 9 | 6 | 7 | 9 | 9 | 1 | 9 | 1 | 6 | 9 |
| 1395 | 5 | 1 | 1 | 7 | 5 | 4 | 10 | 9 | 1 | 1 | 5 | 7 | 2 | 7 |
| 1396 | 6 | 2 | 4 | 6 | 2 | 4 | 2 | 11 | 3 | 10 | 8 | 2 | 8 | 7 |
| 1397 | 6 | 4 | 6 | 0 | 10 | 10 | 3 | 10 | 5 | 6 | 6 | 9 | 5 | 9 |
| 1398 | 1 | 6 | 11 | 7 | 4 | 8 | 8 | 8 | 4 | 0 | 10 | 1 | 5 | 2 |
| 1399 | 11 | 0 | 4 | 8 | 10 | 0 | 11 | 9 | 2 | 7 | 10 | 10 | 7 | 0 |
| 1400 | 10 | 4 | 5 | 0 | 7 | 11 | 5 | 9 | 5 | 9 | 4 | 6 | 10 | 7 |
| 1401 | 7 | 2 | 4 | 6 | 3 | 7 | 2 | 10 | 2 | 5 | 5 | 11 | 9 | 9 |
| 1402 | 0 | 10 | 0 | 4 | 2 | 6 | 0 | 5 | 8 | 9 | 9 | 5 | 6 | 4 |
| 1403 | 4 | 1 | 0 | 11 | 10 | 8 | 0 | 2 | 11 | 6 | 4 | 9 | 6 | 2 |
| 1404 | 3 | 8 | 4 | 6 | 0 | 3 | 0 | 3 | 7 | 6 | 3 | 7 | 11 | 0 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 1405 | 8 | 11 | 9 | 6 | 6 | 5 | 7 | 11 | 8 | 9 | 3 | 8 | 1 | 3 |
| 1406 | 6 | 6 | 6 | 8 | 11 | 5 | 2 | 5 | 11 | 9 | 3 | 7 | 6 | 5 |
| 1407 | 7 | 10 | 10 | 3 | 2 | 0 | 11 | 10 | 3 | 11 | 1 | 0 | 8 | 6 |
| 1408 | 6 | 8 | 11 | 4 | 6 | 11 | 5 | 3 | 4 | 0 | 11 | 0 | 9 | 9 |
| 1409 | 3 | 2 | 9 | 5 | 4 | 2 | 0 | 0 | 8 | 7 | 8 | 5 | 2 | 2 |
| 1410 | 11 | 7 | 11 | 6 | 4 | 2 | 1 | 4 | 7 | 11 | 1 | 0 | 10 | 10 |
| 1411 | 10 | 7 | 5 | 0 | 11 | 0 | 0 | 2 | 6 | 5 | 1 | 1 | 10 | 6 |
| 1412 | 9 | 10 | 9 | 11 | 7 | 2 | 6 | 9 | 9 | 6 | 9 | 9 | 9 | 10 |
| 1413 | 3 | 4 | 0 | 6 | 4 | 5 | 3 | 3 | 9 | 0 | 8 | 6 | 4 | 2 |
| 1414 | 3 | 2 | 2 | 5 | 2 | 5 | 6 | 2 | 11 | 4 | 6 | 8 | 8 | 10 |
| 1415 | 5 | 11 | 7 | 1 | 9 | 11 | 5 | 7 | 0 | 5 | 0 | 10 | 9 | 4 |
| 1416 | 10 | 9 | 8 | 5 | 5 | 4 | 7 | 5 | 7 | 8 | 6 | 11 | 4 | 9 |
| 1417 | 6 | 7 | 8 | 1 | 3 | 6 | 5 | 8 | 2 | 4 | 3 | 8 | 9 | 9 |
| 1418 | 6 | 6 | 8 | 2 | 8 | 10 | 6 | 11 | 8 | 5 | 3 | 11 | 1 | 0 |
| 1419 | 8 | 3 | 6 | 11 | 4 | 4 | 0 | 9 | 10 | 11 | 3 | 5 | 11 | 3 |
| 1420 | 4 | 1 | 8 | 0 | 2 | 1 | 8 | 2 | 9 | 5 | 1 | 7 | 8 | 8 |
| 1421 | 8 | 2 | 9 | 6 | 3 | 0 | 9 | 7 | 6 | 1 | 11 | 6 | 11 | 3 |
| 1422 | 7 | 7 | 11 | 9 | 2 | 7 | 8 | 5 | 11 | 7 | 4 | 4 | 2 | 8 |
| 1423 | 4 | 8 | 9 | 10 | 6 | 0 | 3 | 2 | 2 | 1 | 10 | 6 | 9 | 6 |
| 1424 | 5 | 6 | 3 | 3 | 0 | 11 | 0 | 2 | 0 | 4 | 11 | 4 | 11 | 5 |
| 1425 | 11 | 10 | 3 | 1 | 4 | 8 | 4 | 2 | 5 | 10 | 6 | 7 | 8 | 0 |
| 1426 | 5 | 6 | 9 | 3 | 7 | 1 | 10 | 1 | 3 | 11 | 11 | 2 | 1 | 7 |
| 1427 | 9 | 10 | 5 | 6 | 0 | 3 | 7 | 5 | 2 | 3 | 1 | 2 | 0 | 1 |
| 1428 | 0 | 3 | 4 | 8 | 8 | 10 | 7 | 6 | 4 | 10 | 0 | 9 | 0 | 11 |
| 1429 | 11 | 6 | 2 | 11 | 3 | 6 | 10 | 9 | 11 | 9 | 7 | 5 | 5 | 2 |
| 1430 | 11 | 9 | 6 | 11 | 7 | 9 | 2 | 7 | 6 | 9 | 9 | 0 | 9 | 2 |
| 1431 | 6 | 3 | 10 | 7 | 7 | 8 | 11 | 0 | 11 | 5 | 6 | 7 | 7 | 3 |
| 1432 | 3 | 3 | 2 | 11 | 7 | 4 | 10 | 3 | 1 | 6 | 6 | 8 | 7 | 0 |
| 1433 | 5 | 1 | 9 | 11 | 5 | 10 | 8 | 0 | 6 | 7 | 11 | 6 | 1 | 2 |
| 1434 | 3 | 11 | 2 | 11 | 6 | 0 | 5 | 4 | 1 | 2 | 4 | 5 | 9 | 2 |
| 1435 | 7 | 7 | 10 | 8 | 9 | 3 | 1 | 9 | 7 | 2 | 1 | 11 | 4 | 5 |
| 1436 | 5 | 6 | 7 | 4 | 10 | 10 | 1 | 1 | 1 | 3 | 0 | 5 | 2 | 8 |
| 1437 | 2 | 4 | 5 | 10 | 4 | 6 | 10 | 5 | 1 | 0 | 4 | 4 | 8 | 8 |
| 1438 | 5 | 6 | 6 | 9 | 2 | 1 | 6 | 1 | 8 | 8 | 6 | 6 | 8 | 0 |
| 1439 | 8 | 10 | 11 | 0 | 1 | 7 | 1 | 7 | 1 | 7 | 9 | 11 | 8 | 5 |
| 1440 | 9 | 11 | 9 | 1 | 10 | 0 | 1 | 3 | 0 | 7 | 1 | 4 | 9 | 8 |
| 1441 | 7 | 0 | 0 | 9 | 4 | 3 | 7 | 5 | 9 | 8 | 6 | 8 | 3 | 7 |
| 1442 | 9 | 8 | 7 | 10 | 1 | 2 | 1 | 9 | 6 | 3 | 2 | 2 | 3 | 8 |
| 1443 | 7 | 10 | 0 | 10 | 10 | 6 | 3 | 5 | 11 | 3 | 2 | 2 | 4 | 7 |
| 1444 | 9 | 4 | 10 | 3 | 1 | 2 | 4 | 0 | 2 | 0 | 11 | 0 | 9 | 10 |
| 1445 | 2 | 10 | 9 | 1 | 2 | 1 | 11 | 8 | 7 | 1 | 1 | 2 | 9 | 1 |
| 1446 | 9 | 9 | 9 | 0 | 3 | 8 | 2 | 9 | 11 | 0 | 11 | 1 | 11 | 10 |
| 1447 | 2 | 8 | 11 | 6 | 7 | 10 | 6 | 8 | 9 | 10 | 10 | 3 | 2 | 2 |
| 1448 | 9 | 8 | 11 | 7 | 2 | 1 | 5 | 6 | 1 | 5 | 2 | 5 | 2 | 10 |
| 1449 | 5 | 8 | 2 | 9 | 2 | 2 | 5 | 10 | 10 | 2 | 2 | 2 | 7 | 4 |
| 1450 | 6 | 3 | 10 | 4 | 4 | 7 | 0 | 2 | 8 | 5 | 7 | 9 | 3 | 0 |
| 1451 | 7 | 6 | 3 | 5 | 3 | 1 | 7 | 4 | 11 | 4 | 1 | 8 | 9 | 1 |
| 1452 | 9 | 4 | 7 | 3 | 4 | 7 | 4 | 5 | 10 | 2 | 4 | 10 | 2 | 2 |
| 1453 | 9 | 9 | 7 | 7 | 6 | 5 | 3 | 9 | 3 | 5 | 5 | 3 | 11 | 6 |
| 1454 | 6 | 3 | 2 | 3 | 0 | 3 | 7 | 7 | 6 | 7 | 0 | 6 | 1 | 0 |
| 1455 | 6 | 4 | 6 | 3 | 9 | 9 | 5 | 1 | 10 | 4 | 3 | 1 | 7 | 2 |
| 1456 | 6 | 3 | 8 | 4 | 5 | 7 | 9 | 8 | 5 | 1 | 6 | 11 | 7 | 5 |
| 1457 | 9 | 10 | 6 | 2 | 0 | 11 | 6 | 10 | 5 | 7 | 8 | 3 | 0 | 10 |
| 1458 | 4 | 9 | 1 | 1 | 10 | 1 | 0 | 1 | 11 | 9 | 11 | 11 | 9 | 8 |
| 1459 | 7 | 9 | 2 | 5 | 10 | 9 | 2 | 7 | 8 | 0 | 8 | 3 | 3 | 5 |
| 1460 | 5 | 2 | 1 | 6 | 6 | 1 | 6 | 7 | 6 | 5 | 0 | 3 | 3 | 0 |
| 1461 | 0 | 9 | 8 | 10 | 9 | 3 | 0 | 5 | 3 | 8 | 8 | 4 | 9 | 4 |
| 1462 | 6 | 8 | 2 | 9 | 3 | 2 | 0 | 9 | 7 | 6 | 0 | 8 | 1 | 5 |
| 1463 | 8 | 3 | 2 | 5 | 3 | 4 | 1 | 11 | 3 | 0 | 10 | 9 | 11 | 0 |
| 1464 | 2 | 6 | 8 | 10 | 8 | 1 | 7 | 2 | 4 | 11 | 2 | 4 | 2 | 2 |
| 1465 | 7 | 4 | 10 | 4 | 9 | 1 | 11 | 8 | 6 | 5 | 2 | 10 | 5 | 2 |
| 1466 | 6 | 0 | 1 | 2 | 1 | 5 | 1 | 5 | 2 | 9 | 0 | 9 | 3 | 7 |
| 1467 | 2 | 8 | 0 | 1 | 9 | 1 | 11 | 4 | 11 | 11 | 4 | 9 | 5 | 0 |
| 1468 | 3 | 3 | 8 | 3 | 6 | 7 | 7 | 2 | 7 | 0 | 11 | 7 | 11 | 2 |
| 1469 | 9 | 4 | 2 | 8 | 6 | 10 | 8 | 2 | 11 | 8 | 0 | 11 | 3 | 10 |
| 1470 | 5 | 9 | 2 | 11 | 11 | 11 | 11 | 8 | 8 | 9 | 3 | 0 | 8 | 3 |
| 1471 | 6 | 9 | 8 | 4 | 8 | 5 | 8 | 11 | 6 | 4 | 4 | 6 | 3 | 11 |
| 1472 | 11 | 0 | 5 | 11 | 9 | 10 | 7 | 6 | 10 | 8 | 8 | 10 | 11 | 1 |
| 1473 | 3 | 5 | 1 | 11 | 1 | 7 | 7 | 0 | 4 | 10 | 9 | 11 | 3 | 11 |
| 1474 | 1 | 6 | 2 | 11 | 5 | 10 | 5 | 5 | 10 | 3 | 9 | 4 | 9 | 8 |
| 1475 | 2 | 0 | 1 | 9 | 4 | 6 | 1 | 9 | 10 | 1 | 8 | 6 | 10 | 1 |
| 1476 | 10 | 8 | 2 | 8 | 3 | 11 | 1 | 4 | 10 | 9 | 8 | 1 | 9 | 4 |
| 1477 | 1 | 8 | 7 | 8 | 4 | 0 | 0 | 5 | 8 | 1 | 1 | 8 | 11 | 4 |
| 1478 | 10 | 1 | 5 | 6 | 8 | 4 | 5 | 10 | 3 | 2 | 6 | 3 | 1 | 3 |
| 1479 | 9 | 3 | 7 | 11 | 10 | 9 | 10 | 7 | 1 | 11 | 7 | 10 | 3 | 10 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 1480 | 5 | 6 | 2 | 4 | 2 | 7 | 3 | 4 | 9 | 11 | 3 | 1 | 2 | 6 |
| 1481 | 3 | 3 | 9 | 10 | 7 | 6 | 0 | 11 | 3 | 11 | 10 | 11 | 5 | 6 |
| 1482 | 11 | 8 | 10 | 5 | 5 | 2 | 4 | 8 | 9 | 11 | 5 | 6 | 11 | 11 |
| 1483 | 7 | 11 | 4 | 6 | 8 | 4 | 3 | 1 | 7 | 8 | 10 | 2 | 9 | 3 |
| 1484 | 5 | 7 | 3 | 10 | 3 | 9 | 0 | 0 | 0 | 2 | 2 | 1 | 6 | 10 |
| 1485 | 9 | 8 | 3 | 5 | 5 | 6 | 0 | 6 | 3 | 5 | 10 | 1 | 9 | 9 |
| 1486 | 2 | 9 | 9 | 1 | 1 | 7 | 9 | 5 | 1 | 4 | 11 | 10 | 6 | 6 |
| 1487 | 3 | 9 | 1 | 11 | 11 | 3 | 4 | 10 | 6 | 5 | 4 | 7 | 1 | 5 |
| 1488 | 8 | 5 | 4 | 10 | 10 | 1 | 6 | 5 | 1 | 2 | 5 | 0 | 8 | 9 |
| 1489 | 3 | 5 | 11 | 6 | 7 | 1 | 1 | 3 | 1 | 5 | 4 | 7 | 3 | 1 |
| 1490 | 11 | 4 | 7 | 3 | 5 | 3 | 1 | 4 | 2 | 9 | 6 | 6 | 10 | 5 |
| 1491 | 6 | 0 | 0 | 11 | 4 | 6 | 2 | 5 | 0 | 4 | 10 | 6 | 6 | 2 |
| 1492 | 1 | 0 | 6 | 9 | 10 | 3 | 9 | 7 | 1 | 11 | 6 | 11 | 5 | 3 |
| 1493 | 3 | 3 | 6 | 9 | 11 | 2 | 8 | 7 | 3 | 1 | 5 | 0 | 11 | 5 |
| 1494 | 8 | 8 | 10 | 6 | 11 | 9 | 8 | 2 | 3 | 10 | 2 | 11 | 5 | 10 |
| 1495 | 1 | 5 | 2 | 10 | 11 | 0 | 11 | 6 | 2 | 3 | 9 | 11 | 8 | 10 |
| 1496 | 0 | 0 | 3 | 11 | 2 | 7 | 9 | 11 | 3 | 1 | 1 | 7 | 2 | 0 |
| 1497 | 11 | 5 | 9 | 3 | 10 | 10 | 9 | 2 | 11 | 7 | 9 | 4 | 10 | 4 |
| 1498 | 8 | 5 | 5 | 0 | 2 | 10 | 2 | 8 | 2 | 9 | 8 | 6 | 1 | 0 |
| 1499 | 8 | 2 | 0 | 4 | 1 | 11 | 5 | 4 | 10 | 1 | 2 | 2 | 10 | 3 |
| 1500 | 5 | 2 | 7 | 0 | 7 | 2 | 9 | 3 | 7 | 11 | 9 | 4 | 6 | 11 |
| 1501 | 5 | 3 | 6 | 3 | 3 | 3 | 8 | 9 | 10 | 10 | 2 | 7 | 1 | 8 |
| 1502 | 4 | 0 | 3 | 2 | 5 | 6 | 10 | 8 | 11 | 0 | 5 | 6 | 7 | 2 |
| 1503 | 3 | 11 | 3 | 4 | 6 | 5 | 11 | 5 | 0 | 7 | 6 | 5 | 1 | 4 |
| 1504 | 0 | 10 | 6 | 2 | 3 | 1 | 4 | 4 | 11 | 10 | 3 | 9 | 3 | 8 |
| 1505 | 10 | 10 | 4 | 1 | 8 | 7 | 4 | 9 | 10 | 11 | 9 | 0 | 7 | 2 |
| 1506 | 8 | 7 | 2 | 6 | 9 | 6 | 6 | 8 | 11 | 9 | 0 | 3 | 4 | 1 |
| 1507 | 7 | 2 | 8 | 2 | 0 | 5 | 4 | 9 | 1 | 7 | 0 | 6 | 10 | 3 |
| 1508 | 1 | 8 | 5 | 1 | 8 | 9 | 1 | 8 | 9 | 5 | 2 | 10 | 3 | 6 |
| 1509 | 5 | 3 | 5 | 1 | 10 | 2 | 5 | 11 | 9 | 4 | 7 | 1 | 11 | 3 |
| 1510 | 4 | 11 | 0 | 0 | 7 | 6 | 9 | 0 | 1 | 9 | 11 | 5 | 1 | 2 |
| 1511 | 1 | 11 | 1 | 3 | 4 | 7 | 7 | 5 | 4 | 7 | 2 | 4 | 9 | 6 |
| 1512 | 7 | 5 | 0 | 5 | 5 | 1 | 8 | 1 | 6 | 11 | 7 | 0 | 0 | 0 |
| 1513 | 11 | 0 | 2 | 0 | 2 | 4 | 6 | 8 | 0 | 7 | 5 | 6 | 0 | 10 |
| 1514 | 3 | 4 | 1 | 7 | 11 | 9 | 1 | 4 | 8 | 7 | 0 | 1 | 3 | 11 |
| 1515 | 4 | 2 | 9 | 3 | 5 | 4 | 10 | 0 | 7 | 8 | 9 | 5 | 8 | 0 |
| 1516 | 1 | 3 | 3 | 2 | 9 | 7 | 8 | 9 | 8 | 4 | 11 | 8 | 11 | 6 |
| 1517 | 8 | 6 | 10 | 9 | 8 | 10 | 9 | 6 | 6 | 11 | 5 | 6 | 4 | 10 |
| 1518 | 10 | 6 | 6 | 1 | 9 | 8 | 10 | 6 | 5 | 5 | 7 | 5 | 10 | 10 |
| 1519 | 0 | 2 | 5 | 0 | 5 | 8 | 7 | 1 | 3 | 5 | 5 | 10 | 5 | 7 |
| 1520 | 11 | 4 | 3 | 8 | 1 | 9 | 1 | 7 | 1 | 4 | 5 | 8 | 4 | 6 |
| 1521 | 7 | 5 | 3 | 2 | 1 | 7 | 7 | 11 | 6 | 2 | 8 | 9 | 9 | 10 |
| 1522 | 4 | 0 | 7 | 0 | 5 | 10 | 3 | 3 | 6 | 8 | 7 | 9 | 1 | 10 |
| 1523 | 1 | 11 | 5 | 3 | 3 | 1 | 4 | 8 | 7 | 6 | 10 | 6 | 2 | 0 |
| 1524 | 1 | 7 | 1 | 11 | 3 | 2 | 2 | 9 | 5 | 0 | 1 | 6 | 5 | 8 |
| 1525 | 10 | 7 | 6 | 4 | 4 | 11 | 8 | 7 | 9 | 1 | 1 | 1 | 2 | 3 |
| 1526 | 4 | 2 | 11 | 10 | 10 | 7 | 7 | 0 | 3 | 1 | 4 | 2 | 5 | 10 |
| 1527 | 11 | 9 | 5 | 1 | 5 | 6 | 7 | 4 | 0 | 1 | 8 | 7 | 9 | 7 |
| 1528 | 11 | 1 | 3 | 9 | 8 | 0 | 6 | 10 | 8 | 1 | 4 | 2 | 9 | 0 |
| 1529 | 1 | 11 | 0 | 6 | 1 | 10 | 8 | 6 | 4 | 0 | 5 | 8 | 1 | 9 |
| 1530 | 11 | 10 | 11 | 11 | 8 | 3 | 9 | 3 | 8 | 2 | 0 | 0 | 10 | 11 |
| 1531 | 7 | 4 | 1 | 0 | 1 | 2 | 3 | 1 | 3 | 3 | 1 | 9 | 11 | 11 |
| 1532 | 7 | 1 | 0 | 4 | 7 | 9 | 0 | 11 | 4 | 0 | 1 | 9 | 3 | 10 |
| 1533 | 4 | 6 | 1 | 4 | 10 | 3 | 1 | 5 | 4 | 5 | 5 | 2 | 7 | 10 |
| 1534 | 3 | 7 | 9 | 10 | 0 | 11 | 5 | 3 | 8 | 7 | 11 | 10 | 1 | 0 |
| 1535 | 6 | 5 | 0 | 7 | 11 | 6 | 3 | 2 | 7 | 6 | 2 | 8 | 8 | 3 |
| 1536 | 1 | 6 | 1 | 0 | 5 | 9 | 8 | 1 | 11 | 0 | 0 | 6 | 4 | 4 |
| 1537 | 1 | 9 | 9 | 6 | 9 | 9 | 7 | 6 | 11 | 6 | 10 | 5 | 2 | 3 |
| 1538 | 9 | 2 | 4 | 9 | 8 | 1 | 11 | 1 | 8 | 7 | 1 | 0 | 3 | 7 |
| 1539 | 3 | 8 | 2 | 0 | 2 | 7 | 11 | 3 | 0 | 8 | 1 | 3 | 6 | 8 |
| 1540 | 1 | 10 | 11 | 4 | 5 | 2 | 2 | 10 | 2 | 9 | 8 | 0 | 4 | 4 |
| 1541 | 3 | 3 | 0 | 4 | 6 | 2 | 1 | 8 | 3 | 8 | 8 | 11 | 9 | 3 |
| 1542 | 10 | 6 | 6 | 8 | 8 | 2 | 0 | 7 | 4 | 10 | 1 | 6 | 10 | 9 |
| 1543 | 1 | 7 | 7 | 7 | 0 | 5 | 11 | 4 | 11 | 3 | 7 | 7 | 2 | 1 |
| 1544 | 9 | 0 | 5 | 10 | 8 | 5 | 1 | 2 | 10 | 8 | 9 | 5 | 1 | 8 |
| 1545 | 0 | 10 | 8 | 3 | 1 | 4 | 8 | 5 | 1 | 1 | 3 | 6 | 3 | 7 |
| 1546 | 8 | 4 | 2 | 3 | 11 | 8 | 3 | 8 | 7 | 7 | 4 | 7 | 6 | 0 |
| 1547 | 6 | 3 | 6 | 0 | 2 | 7 | 3 | 5 | 2 | 5 | 10 | 4 | 11 | 3 |
| 1548 | 11 | 2 | 1 | 0 | 5 | 4 | 11 | 5 | 0 | 5 | 1 | 8 | 8 | 4 |
| 1549 | 1 | 9 | 6 | 7 | 5 | 9 | 11 | 2 | 3 | 8 | 11 | 10 | 1 | 5 |
| 1550 | 8 | 2 | 3 | 11 | 8 | 1 | 7 | 10 | 9 | 4 | 11 | 9 | 7 | 9 |
| 1551 | 1 | 6 | 0 | 11 | 3 | 0 | 0 | 10 | 1 | 8 | 11 | 4 | 0 | 6 |
| 1552 | 7 | 0 | 10 | 6 | 5 | 0 | 1 | 5 | 6 | 4 | 3 | 0 | 4 | 9 |
| 1553 | 4 | 10 | 3 | 10 | 8 | 10 | 10 | 5 | 8 | 6 | 5 | 8 | 1 | 1 |
| 1554 | 0 | 5 | 0 | 5 | 9 | 3 | 1 | 6 | 1 | 10 | 0 | 8 | 11 | 8 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 1555 | 11 | 1 | 0 | 11 | 1 | 11 | 4 | 4 | 2 | 6 | 1 | 5 | 0 | 4 |
| 1556 | 11 | 8 | 11 | 7 | 10 | 4 | 9 | 5 | 10 | 10 | 0 | 9 | 4 | 0 |
| 1557 | 2 | 7 | 5 | 6 | 8 | 11 | 0 | 3 | 5 | 10 | 0 | 1 | 4 | 9 |
| 1558 | 3 | 6 | 9 | 3 | 0 | 10 | 9 | 11 | 10 | 8 | 7 | 2 | 0 | 3 |
| 1559 | 0 | 10 | 4 | 11 | 8 | 11 | 5 | 3 | 1 | 10 | 10 | 5 | 8 | 0 |
| 1560 | 4 | 10 | 8 | 0 | 3 | 9 | 3 | 1 | 4 | 0 | 9 | 10 | 0 | 2 |
| 1561 | 5 | 7 | 3 | 11 | 11 | 11 | 7 | 3 | 2 | 11 | 7 | 11 | 9 | 10 |
| 1562 | 4 | 10 | 2 | 1 | 11 | 8 | 2 | 8 | 2 | 8 | 9 | 9 | 9 | 5 |
| 1563 | 5 | 0 | 5 | 0 | 2 | 3 | 0 | 7 | 0 | 8 | 2 | 10 | 3 | 3 |
| 1564 | 11 | 7 | 1 | 4 | 8 | 8 | 5 | 10 | 10 | 2 | 1 | 4 | 4 | 7 |
| 1565 | 8 | 3 | 4 | 7 | 1 | 11 | 0 | 5 | 0 | 7 | 4 | 3 | 11 | 7 |
| 1566 | 9 | 0 | 2 | 0 | 2 | 5 | 0 | 9 | 6 | 2 | 0 | 7 | 9 | 9 |
| 1567 | 9 | 10 | 5 | 7 | 8 | 0 | 4 | 11 | 3 | 9 | 8 | 0 | 0 | 9 |
| 1568 | 0 | 9 | 6 | 7 | 0 | 3 | 6 | 10 | 9 | 8 | 10 | 2 | 4 | 9 |
| 1569 | 2 | 8 | 3 | 4 | 3 | 11 | 11 | 5 | 11 | 8 | 10 | 8 | 11 | 6 |
| 1570 | 3 | 6 | 5 | 6 | 0 | 6 | 11 | 10 | 6 | 9 | 0 | 5 | 8 | 7 |
| 1571 | 4 | 11 | 6 | 6 | 9 | 3 | 6 | 10 | 4 | 2 | 3 | 1 | 6 | 8 |
| 1572 | 9 | 8 | 5 | 11 | 8 | 8 | 5 | 5 | 8 | 0 | 3 | 1 | 9 | 3 |
| 1573 | 11 | 4 | 9 | 6 | 8 | 8 | 10 | 7 | 2 | 8 | 7 | 0 | 6 | 2 |
| 1574 | 11 | 11 | 9 | 5 | 3 | 0 | 11 | 10 | 6 | 0 | 2 | 0 | 1 | 1 |
| 1575 | 10 | 11 | 5 | 3 | 1 | 5 | 10 | 2 | 9 | 8 | 2 | 0 | 11 | 4 |
| 1576 | 1 | 7 | 6 | 0 | 8 | 6 | 9 | 3 | 2 | 7 | 11 | 1 | 6 | 3 |
| 1577 | 11 | 8 | 6 | 3 | 3 | 4 | 6 | 7 | 8 | 10 | 7 | 3 | 3 | 11 |
| 1578 | 0 | 11 | 4 | 9 | 5 | 5 | 1 | 5 | 0 | 6 | 2 | 4 | 4 | 11 |
| 1579 | 8 | 5 | 5 | 5 | 6 | 10 | 4 | 1 | 11 | 7 | 10 | 5 | 8 | 2 |
| 1580 | 6 | 11 | 7 | 11 | 2 | 8 | 4 | 2 | 11 | 2 | 10 | 4 | 8 | 8 |
| 1581 | 0 | 2 | 1 | 5 | 4 | 4 | 1 | 7 | 7 | 11 | 5 | 9 | 5 | 8 |
| 1582 | 4 | 3 | 2 | 2 | 3 | 1 | 6 | 4 | 1 | 0 | 6 | 4 | 10 | 3 |
| 1583 | 0 | 11 | 2 | 1 | 4 | 3 | 11 | 0 | 10 | 10 | 9 | 1 | 7 | 1 |
| 1584 | 10 | 0 | 7 | 3 | 3 | 1 | 2 | 11 | 5 | 3 | 11 | 3 | 8 | 11 |
| 1585 | 0 | 5 | 4 | 3 | 6 | 4 | 6 | 2 | 5 | 10 | 10 | 11 | 7 | 9 |
| 1586 | 0 | 3 | 6 | 9 | 3 | 8 | 2 | 8 | 1 | 2 | 8 | 4 | 6 | 4 |
| 1587 | 11 | 11 | 11 | 1 | 3 | 4 | 4 | 4 | 6 | 9 | 5 | 6 | 7 | 6 |
| 1588 | 9 | 4 | 3 | 5 | 1 | 1 | 11 | 1 | 5 | 6 | 9 | 7 | 10 | 9 |
| 1589 | 0 | 11 | 1 | 0 | 11 | 8 | 7 | 0 | 2 | 9 | 3 | 0 | 6 | 10 |
| 1590 | 4 | 9 | 1 | 5 | 3 | 2 | 9 | 0 | 10 | 6 | 9 | 8 | 8 | 1 |
| 1591 | 7 | 11 | 10 | 3 | 7 | 0 | 4 | 7 | 0 | 10 | 10 | 8 | 5 | 4 |
| 1592 | 1 | 3 | 9 | 9 | 1 | 4 | 0 | 3 | 9 | 11 | 11 | 0 | 0 | 2 |
| 1593 | 8 | 10 | 5 | 6 | 7 | 8 | 7 | 11 | 9 | 11 | 9 | 5 | 6 | 7 |
| 1594 | 11 | 10 | 6 | 5 | 1 | 3 | 11 | 9 | 3 | 2 | 11 | 6 | 8 | 7 |
| 1595 | 10 | 11 | 3 | 9 | 5 | 6 | 11 | 1 | 9 | 3 | 9 | 9 | 3 | 0 |
| 1596 | 10 | 3 | 5 | 1 | 9 | 2 | 3 | 3 | 5 | 2 | 3 | 7 | 1 | 1 |
| 1597 | 4 | 7 | 11 | 6 | 9 | 5 | 0 | 7 | 3 | 10 | 9 | 10 | 7 | 3 |
| 1598 | 8 | 4 | 3 | 1 | 4 | 10 | 7 | 2 | 4 | 0 | 9 | 9 | 9 | 7 |
| 1599 | 9 | 6 | 4 | 6 | 0 | 8 | 8 | 2 | 2 | 10 | 3 | 10 | 6 | 6 |
| 1600 | 5 | 1 | 9 | 2 | 7 | 2 | 0 | 3 | 9 | 5 | 6 | 8 | 5 | 5 |
| 1601 | 8 | 8 | 10 | 6 | 5 | 8 | 1 | 8 | 10 | 3 | 11 | 4 | 2 | 4 |
| 1602 | 10 | 6 | 10 | 0 | 11 | 2 | 8 | 11 | 11 | 11 | 11 | 2 | 8 | 0 |
| 1603 | 0 | 4 | 1 | 1 | 8 | 3 | 6 | 1 | 7 | 6 | 6 | 4 | 9 | 6 |
| 1604 | 11 | 10 | 2 | 4 | 8 | 0 | 8 | 8 | 3 | 7 | 11 | 7 | 2 | 4 |
| 1605 | 7 | 7 | 6 | 5 | 5 | 9 | 1 | 3 | 4 | 1 | 5 | 3 | 0 | 7 |
| 1606 | 7 | 8 | 5 | 4 | 4 | 6 | 7 | 2 | 7 | 8 | 0 | 3 | 1 | 2 |
| 1607 | 0 | 10 | 4 | 9 | 11 | 7 | 2 | 6 | 8 | 4 | 4 | 2 | 8 | 5 |
| 1608 | 8 | 7 | 2 | 6 | 1 | 5 | 10 | 2 | 2 | 4 | 4 | 2 | 10 | 9 |
| 1609 | 6 | 2 | 7 | 3 | 3 | 10 | 5 | 4 | 3 | 4 | 0 | 6 | 0 | 6 |
| 1610 | 2 | 11 | 3 | 10 | 0 | 1 | 4 | 11 | 1 | 0 | 2 | 10 | 6 | 3 |
| 1611 | 9 | 1 | 6 | 5 | 10 | 2 | 2 | 6 | 9 | 1 | 10 | 5 | 8 | 1 |
| 1612 | 5 | 5 | 4 | 0 | 11 | 0 | 1 | 0 | 10 | 1 | 6 | 9 | 7 | 7 |
| 1613 | 0 | 6 | 9 | 9 | 3 | 3 | 11 | 11 | 8 | 9 | 2 | 3 | 4 | 5 |
| 1614 | 8 | 2 | 8 | 9 | 4 | 4 | 8 | 2 | 10 | 9 | 5 | 6 | 2 | 4 |
| 1615 | 0 | 8 | 9 | 9 | 4 | 9 | 5 | 0 | 9 | 6 | 1 | 0 | 5 | 6 |
| 1616 | 11 | 0 | 4 | 6 | 0 | 10 | 6 | 9 | 8 | 9 | 9 | 11 | 5 | 3 |
| 1617 | 7 | 3 | 2 | 10 | 6 | 2 | 10 | 5 | 0 | 1 | 8 | 0 | 2 | 4 |
| 1618 | 2 | 6 | 1 | 1 | 7 | 5 | 3 | 0 | 9 | 10 | 11 | 8 | 5 | 1 |
| 1619 | 11 | 0 | 1 | 3 | 9 | 7 | 5 | 7 | 9 | 0 | 7 | 6 | 4 | 8 |
| 1620 | 5 | 6 | 8 | 7 | 0 | 2 | 8 | 10 | 4 | 4 | 1 | 9 | 1 | 8 |
| 1621 | 5 | 1 | 5 | 8 | 9 | 2 | 9 | 2 | 0 | 11 | 6 | 5 | 2 | 8 |
| 1622 | 1 | 5 | 11 | 5 | 10 | 5 | 3 | 9 | 2 | 9 | 10 | 3 | 1 | 2 |
| 1623 | 0 | 6 | 11 | 10 | 2 | 6 | 8 | 1 | 9 | 9 | 4 | 10 | 3 | 10 |
| 1624 | 6 | 9 | 10 | 11 | 1 | 6 | 8 | 11 | 9 | 1 | 6 | 2 | 2 | 5 |
| 1625 | 6 | 7 | 3 | 10 | 4 | 6 | 10 | 4 | 11 | 9 | 3 | 10 | 11 | 11 |
| 1626 | 1 | 9 | 5 | 9 | 11 | 11 | 0 | 1 | 8 | 11 | 8 | 11 | 3 | 1 |
| 1627 | 11 | 8 | 9 | 6 | 9 | 3 | 3 | 9 | 6 | 10 | 6 | 11 | 2 | 11 |
| 1628 | 2 | 8 | 4 | 1 | 6 | 3 | 5 | 4 | 7 | 2 | 5 | 4 | 2 | 10 |
| 1629 | 1 | 1 | 0 | 9 | 3 | 9 | 11 | 9 | 11 | 2 | 3 | 1 | 2 | 5 |
| 1630 | 11 | 2 | 8 | 6 | 1 | 0 | 4 | 8 | 10 | 0 | 2 | 11 | 0 | 8 |
| 1631 | 10 | 8 | 1 | 4 | 8 | 10 | 5 | 1 | 11 | 3 | 2 | 2 | 9 | 2 |
| 1632 | 2 | 11 | 9 | 8 | 6 | 7 | 0 | 4 | 2 | 7 | 0 | 5 | 8 | 5 |
| 1633 | 2 | 8 | 11 | 0 | 1 | 2 | 11 | 1 | 1 | 4 | 7 | 0 | 0 | 10 |
| 1634 | 4 | 3 | 7 | 3 | 8 | 2 | 1 | 10 | 0 | 11 | 0 | 9 | 11 | 5 |
| 1635 | 11 | 4 | 7 | 7 | 0 | 6 | 1 | 7 | 4 | 0 | 4 | 9 | 3 | 0 |
| 1636 | 6 | 3 | 10 | 9 | 6 | 0 | 3 | 4 | 10 | 7 | 11 | 5 | 1 | 8 |
| 1637 | 7 | 2 | 11 | 5 | 6 | 3 | 7 | 11 | 5 | 3 | 6 | 3 | 11 | 2 |
| 1638 | 7 | 5 | 0 | 11 | 0 | 7 | 4 | 4 | 8 | 1 | 10 | 4 | 11 | 2 |
| 1639 | 10 | 6 | 7 | 5 | 7 | 11 | 6 | 5 | 3 | 2 | 9 | 1 | 4 | 7 |
| 1640 | 11 | 4 | 9 | 8 | 0 | 4 | 7 | 2 | 8 | 7 | 8 | 7 | 7 | 8 |
| 1641 | 1 | 7 | 3 | 3 | 6 | 3 | 11 | 6 | 5 | 5 | 4 | 3 | 2 | 6 |
| 1642 | 6 | 9 | 1 | 9 | 6 | 10 | 4 | 11 | 11 | 8 | 1 | 7 | 4 | 3 |
| 1643 | 1 | 11 | 5 | 10 | 3 | 2 | 11 | 11 | 3 | 11 | 2 | 9 | 3 | 11 |
| 1644 | 5 | 4 | 3 | 11 | 11 | 3 | 2 | 1 | 1 | 7 | 10 | 3 | 6 | 7 |
| 1645 | 7 | 7 | 11 | 10 | 3 | 0 | 4 | 0 | 9 | 8 | 7 | 5 | 8 | 9 |
| 1646 | 9 | 4 | 0 | 8 | 5 | 7 | 9 | 5 | 3 | 4 | 8 | 5 | 4 | 11 |
| 1647 | 10 | 10 | 11 | 6 | 8 | 2 | 8 | 1 | 6 | 4 | 5 | 11 | 8 | 8 |
| 1648 | 2 | 11 | 1 | 2 | 1 | 4 | 6 | 3 | 8 | 2 | 7 | 2 | 5 | 0 |
| 1649 | 11 | 2 | 7 | 2 | 8 | 7 | 3 | 6 | 10 | 9 | 4 | 1 | 7 | 7 |
| 1650 | 11 | 1 | 1 | 8 | 9 | 5 | 6 | 0 | 3 | 7 | 8 | 10 | 2 | 11 |
| 1651 | 5 | 1 | 3 | 5 | 5 | 8 | 2 | 7 | 5 | 1 | 1 | 2 | 4 | 10 |
| 1652 | 3 | 1 | 10 | 0 | 8 | 5 | 11 | 7 | 6 | 5 | 10 | 6 | 7 | 7 |
| 1653 | 2 | 7 | 5 | 0 | 1 | 7 | 5 | 8 | 2 | 0 | 2 | 3 | 10 | 10 |
| 1654 | 11 | 9 | 3 | 8 | 11 | 11 | 0 | 2 | 3 | 2 | 4 | 10 | 9 | 8 |
| 1655 | 1 | 3 | 10 | 7 | 11 | 5 | 9 | 6 | 11 | 1 | 3 | 10 | 5 | 0 |
| 1656 | 7 | 3 | 6 | 2 | 3 | 5 | 0 | 5 | 3 | 9 | 6 | 0 | 8 | 8 |
| 1657 | 2 | 6 | 1 | 8 | 9 | 3 | 2 | 11 | 1 | 9 | 9 | 6 | 8 | 4 |
| 1658 | 9 | 5 | 5 | 5 | 6 | 7 | 1 | 5 | 7 | 3 | 6 | 10 | 3 | 5 |
| 1659 | 11 | 5 | 4 | 6 | 0 | 9 | 11 | 7 | 9 | 0 | 3 | 4 | 2 | 1 |
| 1660 | 9 | 3 | 11 | 1 | 5 | 0 | 8 | 10 | 1 | 8 | 9 | 0 | 6 | 11 |
| 1661 | 1 | 1 | 0 | 1 | 8 | 1 | 1 | 6 | 6 | 7 | 10 | 4 | 6 | 9 |
| 1662 | 9 | 3 | 1 | 11 | 5 | 1 | 5 | 4 | 11 | 5 | 5 | 8 | 4 | 8 |
| 1663 | 1 | 11 | 0 | 1 | 10 | 11 | 6 | 4 | 4 | 5 | 3 | 9 | 10 | 11 |
| 1664 | 10 | 5 | 1 | 1 | 1 | 11 | 7 | 2 | 11 | 0 | 10 | 5 | 5 | 4 |
| 1665 | 2 | 11 | 7 | 8 | 2 | 9 | 2 | 5 | 1 | 1 | 2 | 2 | 10 | 7 |
| 1666 | 8 | 8 | 4 | 11 | 5 | 10 | 3 | 10 | 2 | 10 | 7 | 4 | 11 | 2 |
| 1667 | 4 | 9 | 5 | 3 | 2 | 2 | 10 | 6 | 0 | 7 | 10 | 4 | 2 | 6 |
| 1668 | 5 | 0 | 3 | 5 | 10 | 9 | 11 | 10 | 6 | 1 | 3 | 5 | 7 | 6 |
| 1669 | 7 | 0 | 2 | 0 | 10 | 1 | 7 | 11 | 7 | 6 | 2 | 4 | 11 | 7 |
| 1670 | 1 | 4 | 11 | 10 | 2 | 7 | 4 | 8 | 0 | 4 | 7 | 1 | 3 | 8 |
| 1671 | 4 | 7 | 9 | 0 | 2 | 4 | 3 | 7 | 5 | 2 | 1 | 0 | 0 | 1 |
| 1672 | 11 | 4 | 2 | 2 | 5 | 2 | 9 | 11 | 3 | 1 | 0 | 6 | 8 | 2 |
| 1673 | 4 | 8 | 1 | 2 | 2 | 2 | 0 | 9 | 6 | 7 | 5 | 9 | 4 | 11 |
| 1674 | 11 | 5 | 6 | 4 | 5 | 10 | 10 | 11 | 8 | 2 | 11 | 0 | 2 | 8 |
| 1675 | 9 | 11 | 10 | 10 | 4 | 1 | 0 | 5 | 2 | 3 | 9 | 8 | 3 | 2 |
| 1676 | 2 | 3 | 8 | 7 | 11 | 10 | 4 | 5 | 7 | 4 | 11 | 11 | 5 | 10 |
| 1677 | 4 | 2 | 1 | 4 | 8 | 11 | 1 | 4 | 8 | 10 | 1 | 9 | 6 | 0 |
| 1678 | 3 | 4 | 1 | 4 | 6 | 10 | 2 | 4 | 4 | 1 | 6 | 4 | 0 | 7 |
| 1679 | 3 | 0 | 8 | 9 | 8 | 4 | 5 | 6 | 2 | 3 | 10 | 11 | 10 | 6 |
| 1680 | 4 | 3 | 9 | 8 | 4 | 4 | 4 | 2 | 7 | 10 | 1 | 10 | 1 | 3 |
| 1681 | 4 | 10 | 4 | 9 | 0 | 9 | 11 | 3 | 10 | 1 | 5 | 9 | 9 | 10 |
| 1682 | 7 | 10 | 4 | 4 | 11 | 3 | 11 | 0 | 7 | 10 | 0 | 5 | 3 | 7 |
| 1683 | 0 | 4 | 11 | 7 | 7 | 1 | 0 | 10 | 7 | 10 | 5 | 5 | 8 | 8 |
| 1684 | 1 | 3 | 4 | 2 | 2 | 6 | 7 | 2 | 9 | 2 | 6 | 8 | 9 | 4 |
| 1685 | 0 | 4 | 8 | 8 | 8 | 2 | 0 | 2 | 10 | 1 | 4 | 5 | 0 | 10 |
| 1686 | 3 | 9 | 8 | 1 | 7 | 4 | 3 | 9 | 11 | 10 | 1 | 4 | 2 | 7 |
| 1687 | 11 | 1 | 6 | 9 | 7 | 1 | 1 | 9 | 2 | 3 | 7 | 4 | 2 | 3 |
| 1688 | 8 | 7 | 10 | 8 | 6 | 7 | 6 | 3 | 9 | 4 | 3 | 8 | 2 | 5 |
| 1689 | 8 | 0 | 0 | 11 | 7 | 2 | 8 | 3 | 10 | 7 | 1 | 5 | 6 | 6 |
| 1690 | 6 | 3 | 3 | 2 | 11 | 11 | 3 | 0 | 5 | 7 | 1 | 11 | 5 | 1 |
| 1691 | 3 | 10 | 8 | 9 | 5 | 10 | 1 | 0 | 9 | 7 | 6 | 0 | 8 | 1 |
| 1692 | 2 | 8 | 2 | 10 | 11 | 7 | 4 | 0 | 7 | 3 | 8 | 0 | 11 | 11 |
| 1693 | 0 | 6 | 2 | 7 | 7 | 8 | 4 | 8 | 1 | 5 | 9 | 11 | 8 | 0 |
| 1694 | 8 | 5 | 1 | 6 | 3 | 11 | 7 | 4 | 5 | 6 | 4 | 1 | 2 | 6 |
| 1695 | 11 | 0 | 4 | 6 | 6 | 6 | 3 | 11 | 7 | 5 | 7 | 7 | 7 | 9 |
| 1696 | 5 | 11 | 9 | 8 | 11 | 5 | 9 | 3 | 0 | 0 | 11 | 11 | 5 | 1 |
| 1697 | 4 | 2 | 1 | 5 | 2 | 4 | 2 | 1 | 2 | 7 | 3 | 8 | 1 | 5 |
| 1698 | 1 | 7 | 11 | 9 | 5 | 0 | 7 | 2 | 7 | 3 | 4 | 3 | 7 | 7 |
| 1699 | 7 | 7 | 1 | 4 | 4 | 0 | 1 | 1 | 11 | 1 | 11 | 7 | 5 | 11 |
| 1700 | 1 | 1 | 2 | 9 | 0 | 8 | 10 | 2 | 0 | 0 | 0 | 8 | 5 | 10 |
| 1701 | 1 | 3 | 7 | 5 | 9 | 8 | 10 | 1 | 2 | 8 | 4 | 4 | 2 | 0 |
| 1702 | 4 | 7 | 9 | 1 | 2 | 5 | 1 | 5 | 4 | 4 | 3 | 6 | 2 | 2 |
| 1703 | 6 | 7 | 0 | 4 | 2 | 4 | 6 | 11 | 10 | 5 | 2 | 3 | 9 | 8 |
| 1704 | 4 | 3 | 10 | 9 | 10 | 7 | 8 | 1 | 8 | 3 | 10 | 6 | 4 | 8 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 1705 | 2 | 5 | 4 | 0 | 3 | 1 | 0 | 8 | 1 | 11 | 6 | 7 | 9 | 2 |
| 1706 | 9 | 9 | 9 | 11 | 3 | 10 | 4 | 4 | 4 | 9 | 7 | 2 | 6 | 7 |
| 1707 | 4 | 3 | 11 | 7 | 9 | 7 | 9 | 6 | 4 | 3 | 1 | 1 | 0 | 9 |
| 1708 | 8 | 9 | 7 | 11 | 6 | 4 | 8 | 8 | 7 | 6 | 2 | 4 | 2 | 6 |
| 1709 | 6 | 9 | 5 | 0 | 4 | 5 | 9 | 0 | 5 | 3 | 11 | 7 | 2 | 8 |
| 1710 | 6 | 10 | 1 | 11 | 2 | 0 | 2 | 0 | 11 | 3 | 5 | 0 | 6 | 7 |
| 1711 | 10 | 11 | 1 | 11 | 10 | 11 | 7 | 6 | 3 | 7 | 5 | 0 | 4 | 5 |
| 1712 | 10 | 8 | 2 | 3 | 1 | 5 | 3 | 11 | 0 | 1 | 8 | 10 | 0 | 5 |
| 1713 | 9 | 2 | 6 | 4 | 6 | 8 | 9 | 2 | 10 | 2 | 6 | 8 | 7 | 0 |
| 1714 | 3 | 1 | 8 | 11 | 6 | 8 | 1 | 10 | 2 | 10 | 3 | 0 | 10 | 9 |
| 1715 | 1 | 1 | 3 | 8 | 5 | 6 | 11 | 7 | 3 | 4 | 7 | 3 | 0 | 7 |
| 1716 | 2 | 6 | 8 | 1 | 9 | 9 | 9 | 2 | 2 | 5 | 5 | 9 | 3 | 3 |
| 1717 | 2 | 11 | 9 | 3 | 9 | 3 | 3 | 8 | 7 | 2 | 9 | 9 | 10 | 9 |
| 1718 | 0 | 0 | 8 | 10 | 11 | 11 | 10 | 7 | 2 | 6 | 4 | 1 | 5 | 0 |
| 1719 | 8 | 8 | 1 | 7 | 6 | 11 | 8 | 11 | 5 | 9 | 7 | 3 | 3 | 8 |
| 1720 | 0 | 9 | 6 | 10 | 5 | 0 | 4 | 8 | 2 | 1 | 7 | 7 | 5 | 2 |
| 1721 | 0 | 9 | 4 | 5 | 5 | 2 | 4 | 11 | 4 | 5 | 8 | 5 | 8 | 6 |
| 1722 | 5 | 10 | 2 | 1 | 10 | 9 | 10 | 9 | 7 | 3 | 1 | 8 | 8 | 7 |
| 1723 | 2 | 1 | 3 | 6 | 11 | 0 | 11 | 2 | 10 | 8 | 11 | 6 | 8 | 1 |
| 1724 | 5 | 9 | 3 | 2 | 6 | 10 | 0 | 6 | 1 | 4 | 8 | 6 | 8 | 11 |
| 1725 | 8 | 8 | 10 | 7 | 8 | 7 | 0 | 4 | 1 | 11 | 3 | 2 | 3 | 9 |
| 1726 | 10 | 1 | 6 | 8 | 4 | 7 | 4 | 8 | 5 | 4 | 9 | 6 | 0 | 1 |
| 1727 | 1 | 5 | 2 | 6 | 0 | 7 | 5 | 5 | 6 | 8 | 6 | 8 | 11 | 9 |
| 1728 | 3 | 10 | 8 | 6 | 7 | 6 | 4 | 0 | 7 | 11 | 4 | 3 | 2 | 9 |
| 1729 | 7 | 4 | 8 | 10 | 0 | 9 | 2 | 6 | 7 | 3 | 3 | 7 | 1 | 5 |
| 1730 | 0 | 1 | 2 | 9 | 2 | 1 | 4 | 6 | 10 | 7 | 9 | 8 | 3 | 6 |
| 1731 | 4 | 5 | 7 | 0 | 0 | 7 | 11 | 10 | 2 | 11 | 8 | 10 | 3 | 11 |
| 1732 | 3 | 6 | 3 | 6 | 11 | 4 | 8 | 9 | 7 | 7 | 3 | 0 | 2 | 2 |
| 1733 | 8 | 1 | 10 | 5 | 5 | 10 | 8 | 4 | 4 | 6 | 3 | 8 | 0 | 11 |
| 1734 | 4 | 1 | 8 | 3 | 1 | 5 | 5 | 6 | 10 | 8 | 11 | 3 | 7 | 0 |
| 1735 | 6 | 11 | 11 | 3 | 3 | 2 | 10 | 1 | 10 | 0 | 9 | 7 | 10 | 4 |
| 1736 | 2 | 10 | 2 | 11 | 10 | 2 | 5 | 6 | 6 | 8 | 10 | 11 | 9 | 7 |
| 1737 | 9 | 3 | 11 | 8 | 6 | 5 | 0 | 9 | 5 | 7 | 11 | 10 | 0 | 4 |
| 1738 | 5 | 7 | 8 | 6 | 5 | 2 | 5 | 0 | 5 | 7 | 1 | 7 | 0 | 7 |
| 1739 | 9 | 10 | 5 | 10 | 1 | 0 | 2 | 0 | 6 | 2 | 1 | 8 | 11 | 10 |
| 1740 | 9 | 8 | 9 | 5 | 1 | 6 | 10 | 4 | 4 | 0 | 5 | 9 | 4 | 1 |
| 1741 | 8 | 11 | 2 | 9 | 10 | 11 | 3 | 2 | 11 | 9 | 11 | 5 | 6 | 5 |
| 1742 | 10 | 7 | 1 | 0 | 4 | 7 | 6 | 9 | 0 | 5 | 6 | 6 | 9 | 3 |
| 1743 | 9 | 8 | 0 | 11 | 1 | 2 | 10 | 1 | 11 | 8 | 1 | 6 | 2 | 2 |
| 1744 | 4 | 6 | 6 | 5 | 10 | 1 | 11 | 9 | 4 | 7 | 9 | 0 | 5 | 11 |
| 1745 | 6 | 0 | 5 | 1 | 7 | 2 | 5 | 8 | 8 | 3 | 0 | 10 | 6 | 1 |
| 1746 | 6 | 7 | 8 | 3 | 9 | 0 | 2 | 4 | 5 | 9 | 6 | 1 | 2 | 7 |
| 1747 | 7 | 9 | 7 | 6 | 8 | 3 | 2 | 3 | 6 | 0 | 6 | 0 | 5 | 6 |
| 1748 | 8 | 8 | 3 | 10 | 6 | 3 | 0 | 1 | 8 | 2 | 6 | 0 | 5 | 1 |
| 1749 | 8 | 11 | 11 | 11 | 9 | 10 | 5 | 6 | 7 | 1 | 1 | 9 | 4 | 2 |
| 1750 | 11 | 10 | 4 | 2 | 4 | 4 | 7 | 8 | 1 | 2 | 2 | 7 | 0 | 5 |
| 1751 | 9 | 5 | 4 | 0 | 1 | 3 | 4 | 2 | 7 | 5 | 1 | 6 | 11 | 9 |
| 1752 | 8 | 5 | 11 | 1 | 7 | 9 | 2 | 7 | 7 | 4 | 1 | 1 | 5 | 11 |
| 1753 | 10 | 11 | 3 | 1 | 8 | 1 | 9 | 8 | 3 | 2 | 7 | 2 | 0 | 11 |
| 1754 | 4 | 1 | 11 | 1 | 8 | 2 | 3 | 2 | 8 | 5 | 2 | 6 | 2 | 11 |
| 1755 | 2 | 8 | 7 | 10 | 6 | 9 | 9 | 6 | 5 | 9 | 10 | 8 | 8 | 10 |
| 1756 | 9 | 5 | 11 | 2 | 0 | 11 | 2 | 1 | 4 | 8 | 10 | 11 | 3 | 8 |
| 1757 | 10 | 8 | 2 | 9 | 7 | 5 | 4 | 3 | 11 | 3 | 7 | 9 | 4 | 8 |
| 1758 | 5 | 7 | 3 | 1 | 2 | 2 | 2 | 4 | 9 | 6 | 6 | 11 | 3 | 9 |
| 1759 | 4 | 6 | 11 | 2 | 0 | 3 | 1 | 0 | 3 | 9 | 1 | 8 | 0 | 8 |
| 1760 | 2 | 6 | 10 | 11 | 9 | 2 | 3 | 11 | 4 | 5 | 3 | 0 | 11 | 2 |
| 1761 | 3 | 9 | 4 | 10 | 6 | 6 | 1 | 3 | 10 | 0 | 0 | 6 | 3 | 5 |
| 1762 | 10 | 4 | 3 | 7 | 6 | 11 | 5 | 7 | 4 | 7 | 2 | 2 | 8 | 1 |
| 1763 | 2 | 0 | 6 | 4 | 1 | 5 | 6 | 11 | 5 | 10 | 5 | 8 | 2 | 9 |
| 1764 | 0 | 7 | 11 | 4 | 9 | 9 | 7 | 9 | 10 | 5 | 1 | 6 | 8 | 6 |
| 1765 | 6 | 7 | 5 | 5 | 0 | 3 | 8 | 2 | 3 | 9 | 10 | 10 | 1 | 1 |
| 1766 | 7 | 5 | 4 | 10 | 7 | 8 | 9 | 5 | 8 | 5 | 11 | 1 | 7 | 10 |
| 1767 | 8 | 2 | 3 | 0 | 9 | 3 | 10 | 0 | 0 | 2 | 11 | 4 | 8 | 8 |
| 1768 | 2 | 4 | 1 | 9 | 5 | 5 | 11 | 2 | 7 | 0 | 1 | 1 | 4 | 10 |
| 1769 | 11 | 5 | 7 | 3 | 6 | 2 | 10 | 8 | 10 | 1 | 1 | 4 | 11 | 8 |
| 1770 | 5 | 3 | 1 | 9 | 7 | 7 | 9 | 2 | 11 | 8 | 11 | 1 | 8 | 11 |
| 1771 | 0 | 2 | 6 | 8 | 1 | 9 | 5 | 0 | 7 | 11 | 10 | 5 | 6 | 7 |
| 1772 | 1 | 1 | 9 | 7 | 9 | 2 | 10 | 5 | 9 | 0 | 7 | 10 | 8 | 6 |
| 1773 | 1 | 6 | 11 | 8 | 10 | 10 | 10 | 9 | 3 | 1 | 7 | 0 | 10 | 0 |
| 1774 | 3 | 8 | 9 | 10 | 5 | 4 | 6 | 1 | 7 | 10 | 0 | 8 | 7 | 7 |
| 1775 | 7 | 2 | 1 | 8 | 7 | 2 | 4 | 4 | 10 | 2 | 10 | 11 | 7 | 3 |
| 1776 | 5 | 4 | 10 | 6 | 11 | 6 | 5 | 2 | 0 | 11 | 3 | 8 | 11 | 1 |
| 1777 | 9 | 0 | 4 | 8 | 4 | 2 | 2 | 9 | 6 | 8 | 4 | 9 | 8 | 3 |
| 1778 | 6 | 4 | 3 | 2 | 6 | 1 | 11 | 7 | 9 | 10 | 5 | 1 | 11 | 2 |
| 1779 | 3 | 6 | 1 | 6 | 4 | 4 | 11 | 8 | 0 | 10 | 2 | 11 | 11 | 9 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 1780 | 5 | 8 | 0 | 8 | 2 | 8 | 0 | 8 | 6 | 0 | 0 | 3 | 2 | 10 |
| 1781 | 10 | 2 | 6 | 10 | 8 | 0 | 4 | 3 | 4 | 8 | 5 | 1 | 7 | 11 |
| 1782 | 8 | 4 | 10 | 11 | 6 | 11 | 1 | 4 | 11 | 2 | 5 | 7 | 8 | 5 |
| 1783 | 9 | 2 | 7 | 4 | 7 | 3 | 4 | 4 | 11 | 1 | 4 | 6 | 1 | 1 |
| 1784 | 5 | 3 | 9 | 10 | 5 | 3 | 11 | 1 | 9 | 5 | 2 | 0 | 11 | 6 |
| 1785 | 10 | 6 | 8 | 4 | 0 | 9 | 9 | 8 | 7 | 10 | 7 | 3 | 2 | 7 |
| 1786 | 2 | 6 | 6 | 0 | 6 | 2 | 11 | 0 | 6 | 11 | 1 | 3 | 3 | 6 |
| 1787 | 3 | 5 | 10 | 0 | 7 | 9 | 5 | 0 | 6 | 6 | 3 | 4 | 3 | 8 |
| 1788 | 11 | 3 | 5 | 10 | 11 | 10 | 9 | 5 | 3 | 8 | 2 | 8 | 8 | 7 |
| 1789 | 1 | 10 | 0 | 1 | 0 | 10 | 6 | 11 | 2 | 4 | 9 | 8 | 3 | 8 |
| 1790 | 8 | 1 | 8 | 0 | 8 | 1 | 2 | 9 | 6 | 10 | 2 | 9 | 3 | 0 |
| 1791 | 10 | 4 | 6 | 9 | 10 | 0 | 0 | 5 | 9 | 4 | 5 | 10 | 10 | 2 |
| 1792 | 3 | 6 | 1 | 3 | 3 | 6 | 11 | 6 | 2 | 0 | 10 | 4 | 5 | 1 |
| 1793 | 6 | 4 | 10 | 9 | 3 | 9 | 2 | 5 | 2 | 3 | 7 | 9 | 5 | 1 |
| 1794 | 4 | 6 | 2 | 8 | 2 | 6 | 11 | 0 | 7 | 4 | 5 | 1 | 9 | 8 |
| 1795 | 0 | 4 | 3 | 7 | 5 | 10 | 4 | 7 | 5 | 3 | 4 | 4 | 6 | 6 |
| 1796 | 4 | 11 | 0 | 11 | 5 | 2 | 3 | 11 | 9 | 10 | 5 | 11 | 6 | 8 |
| 1797 | 9 | 6 | 1 | 6 | 2 | 11 | 1 | 11 | 11 | 7 | 6 | 6 | 9 | 11 |
| 1798 | 11 | 4 | 11 | 10 | 0 | 2 | 2 | 1 | 1 | 11 | 6 | 1 | 8 | 4 |
| 1799 | 1 | 11 | 6 | 5 | 5 | 11 | 11 | 3 | 8 | 2 | 3 | 8 | 4 | 6 |
| 1800 | 9 | 1 | 9 | 10 | 8 | 1 | 8 | 6 | 4 | 4 | 7 | 11 | 7 | 0 |
| 1801 | 0 | 7 | 4 | 0 | 8 | 5 | 8 | 2 | 8 | 11 | 8 | 5 | 5 | 9 |
| 1802 | 11 | 5 | 9 | 11 | 7 | 4 | 11 | 8 | 9 | 8 | 0 | 3 | 6 | 4 |
| 1803 | 10 | 2 | 6 | 7 | 10 | 4 | 5 | 0 | 1 | 7 | 4 | 9 | 2 | 4 |
| 1804 | 4 | 9 | 9 | 10 | 4 | 8 | 9 | 11 | 7 | 9 | 5 | 1 | 8 | 2 |
| 1805 | 6 | 2 | 4 | 0 | 5 | 1 | 5 | 2 | 4 | 7 | 4 | 1 | 4 | 1 |
| 1806 | 7 | 10 | 6 | 5 | 4 | 2 | 2 | 8 | 10 | 2 | 3 | 2 | 9 | 10 |
| 1807 | 8 | 8 | 0 | 1 | 11 | 4 | 7 | 9 | 8 | 2 | 7 | 4 | 0 | 3 |
| 1808 | 10 | 4 | 4 | 9 | 5 | 1 | 11 | 10 | 2 | 2 | 11 | 3 | 5 | 9 |
| 1809 | 9 | 5 | 0 | 7 | 6 | 8 | 3 | 7 | 8 | 3 | 7 | 5 | 2 | 2 |
| 1810 | 0 | 2 | 10 | 1 | 4 | 9 | 3 | 8 | 11 | 2 | 8 | 5 | 9 | 1 |
| 1811 | 7 | 9 | 0 | 9 | 10 | 11 | 3 | 10 | 0 | 5 | 10 | 1 | 3 | 2 |
| 1812 | 5 | 4 | 0 | 0 | 7 | 7 | 7 | 11 | 0 | 7 | 5 | 0 | 1 | 0 |
| 1813 | 8 | 9 | 1 | 6 | 7 | 5 | 11 | 8 | 2 | 11 | 1 | 8 | 3 | 0 |
| 1814 | 9 | 4 | 1 | 2 | 11 | 10 | 10 | 11 | 10 | 3 | 9 | 1 | 1 | 7 |
| 1815 | 1 | 1 | 0 | 7 | 0 | 10 | 5 | 3 | 8 | 5 | 1 | 7 | 11 | 5 |
| 1816 | 11 | 9 | 2 | 7 | 0 | 7 | 11 | 10 | 7 | 7 | 5 | 9 | 7 | 3 |
| 1817 | 3 | 0 | 8 | 6 | 6 | 0 | 6 | 1 | 3 | 3 | 11 | 10 | 5 | 9 |
| 1818 | 4 | 8 | 1 | 9 | 8 | 8 | 3 | 7 | 1 | 8 | 0 | 3 | 8 | 5 |
| 1819 | 8 | 10 | 2 | 5 | 2 | 3 | 10 | 0 | 9 | 8 | 0 | 2 | 11 | 5 |
| 1820 | 5 | 3 | 2 | 10 | 1 | 8 | 2 | 11 | 11 | 5 | 4 | 3 | 0 | 0 |
| 1821 | 0 | 11 | 1 | 11 | 1 | 3 | 1 | 10 | 3 | 8 | 3 | 8 | 3 | 6 |
| 1822 | 7 | 2 | 11 | 11 | 3 | 11 | 8 | 2 | 10 | 1 | 11 | 10 | 0 | 1 |
| 1823 | 9 | 6 | 0 | 8 | 0 | 9 | 6 | 4 | 1 | 4 | 0 | 0 | 11 | 9 |
| 1824 | 11 | 4 | 11 | 11 | 9 | 3 | 0 | 2 | 0 | 5 | 4 | 11 | 11 | 0 |
| 1825 | 3 | 6 | 11 | 2 | 1 | 11 | 7 | 0 | 2 | 0 | 5 | 7 | 7 | 5 |
| 1826 | 0 | 11 | 4 | 3 | 7 | 9 | 8 | 4 | 11 | 5 | 2 | 10 | 7 | 8 |
| 1827 | 4 | 2 | 1 | 11 | 3 | 11 | 5 | 7 | 7 | 5 | 8 | 5 | 7 | 9 |
| 1828 | 3 | 7 | 4 | 8 | 2 | 8 | 10 | 9 | 9 | 3 | 10 | 1 | 4 | 6 |
| 1829 | 0 | 7 | 9 | 0 | 6 | 5 | 3 | 9 | 7 | 8 | 3 | 2 | 6 | 11 |
| 1830 | 10 | 2 | 7 | 11 | 0 | 2 | 2 | 4 | 8 | 4 | 3 | 2 | 5 | 11 |
| 1831 | 9 | 0 | 6 | 9 | 3 | 0 | 3 | 6 | 1 | 0 | 1 | 2 | 8 | 6 |
| 1832 | 8 | 10 | 7 | 3 | 3 | 6 | 6 | 10 | 6 | 8 | 8 | 11 | 10 | 6 |
| 1833 | 9 | 11 | 1 | 6 | 1 | 2 | 2 | 8 | 1 | 8 | 10 | 0 | 5 | 7 |
| 1834 | 4 | 6 | 0 | 5 | 8 | 0 | 3 | 8 | 10 | 7 | 3 | 11 | 7 | 3 |
| 1835 | 6 | 11 | 10 | 10 | 9 | 9 | 7 | 3 | 10 | 2 | 4 | 4 | 5 | 11 |
| 1836 | 0 | 0 | 2 | 9 | 1 | 9 | 7 | 7 | 7 | 1 | 7 | 0 | 8 | 11 |
| 1837 | 6 | 5 | 8 | 3 | 0 | 4 | 0 | 2 | 9 | 6 | 7 | 0 | 4 | 1 |
| 1838 | 11 | 2 | 11 | 8 | 11 | 0 | 0 | 4 | 6 | 3 | 0 | 4 | 5 | 2 |
| 1839 | 1 | 5 | 1 | 11 | 11 | 4 | 3 | 0 | 5 | 9 | 11 | 2 | 0 | 4 |
| 1840 | 8 | 11 | 1 | 10 | 0 | 6 | 3 | 3 | 5 | 4 | 8 | 8 | 5 | 4 |
| 1841 | 9 | 4 | 2 | 4 | 7 | 0 | 5 | 0 | 5 | 4 | 11 | 5 | 7 | 6 |
| 1842 | 11 | 9 | 1 | 4 | 11 | 7 | 8 | 6 | 2 | 3 | 7 | 7 | 0 | 11 |
| 1843 | 3 | 1 | 10 | 10 | 3 | 3 | 3 | 2 | 4 | 11 | 4 | 5 | 4 | 7 |
| 1844 | 5 | 2 | 1 | 5 | 6 | 5 | 7 | 3 | 1 | 4 | 7 | 7 | 4 | 6 |
| 1845 | 4 | 9 | 9 | 1 | 0 | 10 | 10 | 6 | 6 | 6 | 7 | 10 | 11 | 8 |
| 1846 | 9 | 9 | 9 | 7 | 1 | 10 | 0 | 8 | 8 | 1 | 8 | 9 | 9 | 9 |
| 1847 | 11 | 5 | 5 | 5 | 4 | 5 | 8 | 7 | 0 | 5 | 11 | 5 | 10 | 10 |
| 1848 | 6 | 2 | 0 | 2 | 0 | 1 | 3 | 8 | 4 | 2 | 0 | 10 | 5 | 4 |
| 1849 | 5 | 5 | 4 | 8 | 9 | 11 | 3 | 1 | 5 | 6 | 1 | 3 | 7 | 2 |
| 1850 | 6 | 9 | 0 | 1 | 4 | 10 | 9 | 4 | 11 | 5 | 7 | 8 | 8 | 5 |
| 1851 | 9 | 1 | 7 | 6 | 9 | 9 | 10 | 9 | 10 | 2 | 11 | 2 | 4 | 3 |
| 1852 | 8 | 6 | 1 | 9 | 11 | 8 | 1 | 5 | 7 | 4 | 6 | 4 | 8 | 9 |
| 1853 | 10 | 9 | 11 | 8 | 0 | 8 | 10 | 3 | 11 | 5 | 8 | 9 | 11 | 1 |
| 1854 | 4 | 0 | 0 | 6 | 4 | 0 | 7 | 11 | 10 | 11 | 1 | 9 | 1 | 8 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 1855 | 11 | 2 | 3 | 3 | 4 | 6 | 3 | 6 | 6 | 0 | 6 | 6 | 1 | 6 |
| 1856 | 4 | 5 | 0 | 10 | 6 | 10 | 5 | 0 | 9 | 3 | 3 | 10 | 11 | 6 |
| 1857 | 0 | 0 | 10 | 7 | 9 | 6 | 2 | 7 | 7 | 4 | 0 | 8 | 9 | 5 |
| 1858 | 2 | 10 | 10 | 2 | 4 | 6 | 0 | 10 | 9 | 2 | 4 | 9 | 2 | 10 |
| 1859 | 5 | 3 | 4 | 9 | 7 | 6 | 4 | 5 | 3 | 6 | 4 | 7 | 9 | 2 |
| 1860 | 7 | 5 | 11 | 10 | 2 | 6 | 3 | 10 | 7 | 2 | 10 | 11 | 11 | 4 |
| 1861 | 4 | 8 | 10 | 5 | 3 | 10 | 9 | 10 | 5 | 1 | 7 | 1 | 4 | 4 |
| 1862 | 5 | 4 | 7 | 3 | 1 | 11 | 6 | 8 | 3 | 1 | 6 | 5 | 5 | 0 |
| 1863 | 11 | 5 | 8 | 1 | 7 | 9 | 4 | 0 | 4 | 8 | 11 | 2 | 11 | 10 |
| 1864 | 11 | 0 | 6 | 5 | 7 | 8 | 3 | 2 | 1 | 7 | 2 | 11 | 10 | 2 |
| 1865 | 6 | 2 | 1 | 7 | 6 | 6 | 9 | 11 | 0 | 0 | 9 | 10 | 10 | 9 |
| 1866 | 2 | 9 | 11 | 2 | 9 | 9 | 5 | 10 | 4 | 1 | 8 | 4 | 0 | 5 |
| 1867 | 6 | 1 | 0 | 10 | 9 | 5 | 9 | 9 | 9 | 8 | 10 | 0 | 10 | 10 |
| 1868 | 1 | 8 | 4 | 7 | 1 | 10 | 1 | 7 | 8 | 11 | 5 | 5 | 7 | 7 |
| 1869 | 11 | 9 | 11 | 1 | 2 | 2 | 9 | 7 | 5 | 5 | 10 | 9 | 6 | 10 |
| 1870 | 6 | 4 | 8 | 10 | 11 | 7 | 9 | 1 | 9 | 11 | 0 | 7 | 2 | 11 |
| 1871 | 0 | 5 | 10 | 7 | 10 | 9 | 4 | 5 | 3 | 2 | 3 | 10 | 0 | 7 |
| 1872 | 8 | 1 | 8 | 1 | 5 | 3 | 9 | 6 | 4 | 10 | 8 | 3 | 8 | 5 |
| 1873 | 5 | 3 | 2 | 6 | 8 | 4 | 0 | 1 | 3 | 6 | 8 | 1 | 5 | 5 |
| 1874 | 3 | 7 | 2 | 1 | 3 | 4 | 0 | 6 | 5 | 9 | 3 | 11 | 0 | 3 |
| 1875 | 9 | 6 | 3 | 4 | 6 | 1 | 1 | 0 | 2 | 1 | 7 | 2 | 6 | 0 |
| 1876 | 9 | 11 | 6 | 1 | 11 | 9 | 0 | 9 | 11 | 6 | 5 | 1 | 1 | 1 |
| 1877 | 5 | 4 | 7 | 7 | 10 | 5 | 5 | 11 | 11 | 1 | 4 | 8 | 9 | 5 |
| 1878 | 10 | 0 | 0 | 10 | 0 | 11 | 4 | 5 | 7 | 5 | 9 | 10 | 7 | 5 |
| 1879 | 1 | 8 | 7 | 4 | 9 | 1 | 6 | 2 | 10 | 0 | 4 | 11 | 4 | 11 |
| 1880 | 3 | 0 | 2 | 2 | 9 | 8 | 11 | 4 | 5 | 7 | 2 | 6 | 3 | 8 |
| 1881 | 0 | 4 | 5 | 5 | 8 | 3 | 8 | 6 | 10 | 3 | 3 | 6 | 4 | 2 |
| 1882 | 5 | 2 | 4 | 10 | 3 | 4 | 1 | 11 | 2 | 9 | 7 | 5 | 7 | 4 |
| 1883 | 10 | 5 | 3 | 1 | 2 | 6 | 1 | 11 | 10 | 3 | 2 | 11 | 5 | 2 |
| 1884 | 10 | 1 | 2 | 0 | 4 | 4 | 7 | 4 | 6 | 8 | 2 | 5 | 1 | 1 |
| 1885 | 5 | 7 | 6 | 1 | 6 | 11 | 2 | 2 | 4 | 3 | 9 | 10 | 4 | 5 |
| 1886 | 0 | 5 | 7 | 4 | 8 | 0 | 7 | 3 | 4 | 2 | 2 | 2 | 4 | 4 |
| 1887 | 5 | 6 | 10 | 0 | 4 | 5 | 0 | 8 | 1 | 6 | 9 | 2 | 6 | 5 |
| 1888 | 5 | 3 | 10 | 5 | 9 | 10 | 2 | 11 | 4 | 8 | 9 | 2 | 9 | 8 |
| 1889 | 5 | 2 | 11 | 7 | 0 | 5 | 3 | 2 | 6 | 0 | 8 | 5 | 2 | 3 |
| 1890 | 5 | 3 | 8 | 8 | 2 | 2 | 10 | 11 | 11 | 11 | 1 | 0 | 5 | 11 |
| 1891 | 3 | 11 | 4 | 7 | 0 | 11 | 3 | 11 | 2 | 3 | 4 | 4 | 7 | 1 |
| 1892 | 8 | 5 | 0 | 0 | 10 | 8 | 11 | 0 | 10 | 0 | 1 | 4 | 5 | 2 |
| 1893 | 5 | 11 | 10 | 1 | 10 | 7 | 11 | 3 | 4 | 10 | 4 | 7 | 0 | 3 |
| 1894 | 7 | 7 | 4 | 8 | 5 | 6 | 4 | 11 | 0 | 4 | 11 | 1 | 11 | 2 |
| 1895 | 1 | 2 | 3 | 2 | 2 | 2 | 4 | 3 | 5 | 5 | 1 | 0 | 7 | 4 |
| 1896 | 7 | 1 | 11 | 0 | 2 | 10 | 9 | 8 | 11 | 8 | 3 | 1 | 4 | 1 |
| 1897 | 8 | 3 | 8 | 6 | 10 | 10 | 6 | 4 | 1 | 9 | 4 | 9 | 1 | 10 |
| 1898 | 0 | 0 | 6 | 8 | 6 | 2 | 8 | 6 | 2 | 4 | 2 | 8 | 5 | 10 |
| 1899 | 7 | 1 | 6 | 6 | 8 | 8 | 5 | 11 | 4 | 6 | 0 | 1 | 2 | 4 |
| 1900 | 3 | 3 | 11 | 11 | 4 | 7 | 6 | 2 | 6 | 1 | 9 | 1 | 2 | 4 |
| 1901 | 6 | 8 | 8 | 8 | 5 | 4 | 5 | 4 | 11 | 10 | 8 | 6 | 6 | 2 |
| 1902 | 4 | 5 | 10 | 3 | 1 | 10 | 3 | 4 | 11 | 3 | 10 | 9 | 2 | 0 |
| 1903 | 7 | 7 | 8 | 5 | 8 | 2 | 6 | 4 | 3 | 5 | 10 | 7 | 8 | 5 |
| 1904 | 7 | 5 | 3 | 11 | 11 | 11 | 11 | 6 | 11 | 5 | 6 | 9 | 0 | 2 |
| 1905 | 2 | 4 | 8 | 0 | 8 | 0 | 1 | 0 | 3 | 0 | 0 | 7 | 5 | 0 |
| 1906 | 5 | 8 | 5 | 2 | 1 | 5 | 6 | 7 | 4 | 4 | 10 | 2 | 3 | 1 |
| 1907 | 11 | 10 | 7 | 2 | 10 | 4 | 6 | 3 | 0 | 9 | 11 | 10 | 8 | 3 |
| 1908 | 1 | 7 | 10 | 2 | 0 | 1 | 0 | 11 | 1 | 5 | 8 | 3 | 1 | 1 |
| 1909 | 5 | 8 | 8 | 6 | 2 | 9 | 2 | 4 | 3 | 11 | 11 | 4 | 10 | 8 |
| 1910 | 2 | 2 | 6 | 11 | 6 | 8 | 0 | 3 | 5 | 3 | 11 | 6 | 2 | 1 |
| 1911 | 9 | 9 | 6 | 9 | 5 | 10 | 5 | 0 | 10 | 1 | 11 | 1 | 10 | 0 |
| 1912 | 3 | 3 | 11 | 10 | 1 | 5 | 8 | 9 | 0 | 9 | 1 | 0 | 4 | 9 |
| 1913 | 5 | 5 | 3 | 6 | 8 | 8 | 5 | 9 | 6 | 4 | 4 | 3 | 9 | 2 |
| 1914 | 3 | 5 | 4 | 4 | 2 | 10 | 9 | 6 | 5 | 11 | 2 | 0 | 10 | 2 |
| 1915 | 5 | 8 | 3 | 1 | 6 | 10 | 4 | 10 | 0 | 7 | 11 | 0 | 0 | 8 |
| 1916 | 8 | 4 | 4 | 10 | 2 | 9 | 8 | 3 | 11 | 11 | 9 | 3 | 3 | 4 |
| 1917 | 9 | 9 | 4 | 0 | 2 | 3 | 5 | 3 | 5 | 6 | 9 | 11 | 0 | 7 |
| 1918 | 4 | 11 | 8 | 7 | 7 | 10 | 3 | 2 | 5 | 11 | 6 | 2 | 11 | 7 |
| 1919 | 2 | 1 | 6 | 6 | 7 | 5 | 6 | 7 | 7 | 6 | 6 | 9 | 0 | 3 |
| 1920 | 3 | 8 | 7 | 8 | 1 | 9 | 11 | 8 | 8 | 0 | 2 | 7 | 4 | 0 |
| 1921 | 1 | 6 | 6 | 6 | 9 | 10 | 11 | 0 | 0 | 6 | 7 | 7 | 6 | 11 |
| 1922 | 1 | 9 | 11 | 2 | 11 | 2 | 8 | 2 | 7 | 6 | 6 | 5 | 6 | 5 |
| 1923 | 4 | 6 | 11 | 4 | 2 | 8 | 1 | 3 | 10 | 7 | 9 | 1 | 1 | 1 |
| 1924 | 1 | 10 | 11 | 4 | 8 | 5 | 5 | 9 | 7 | 1 | 2 | 8 | 0 | 9 |
| 1925 | 5 | 11 | 1 | 0 | 0 | 11 | 11 | 9 | 10 | 7 | 9 | 2 | 11 | 6 |
| 1926 | 10 | 1 | 6 | 2 | 6 | 8 | 7 | 11 | 10 | 1 | 4 | 11 | 4 | 3 |
| 1927 | 5 | 6 | 5 | 4 | 3 | 8 | 11 | 7 | 0 | 1 | 10 | 9 | 6 | 2 |
| 1928 | 2 | 10 | 8 | 6 | 7 | 7 | 0 | 3 | 10 | 2 | 7 | 11 | 11 | 7 |
| 1929 | 2 | 5 | 0 | 2 | 1 | 5 | 9 | 4 | 3 | 2 | 4 | 8 | 7 | 6 |
| 1930 | 7 | 6 | 10 | 6 | 3 | 1 | 0 | 1 | 1 | 10 | 0 | 0 | 3 | 11 |
| 1931 | 7 | 4 | 6 | 8 | 11 | 5 | 9 | 7 | 5 | 3 | 10 | 10 | 8 | 9 |
| 1932 | 8 | 0 | 9 | 9 | 11 | 6 | 11 | 5 | 5 | 7 | 3 | 1 | 9 | 7 |
| 1933 | 6 | 10 | 4 | 2 | 3 | 8 | 8 | 0 | 7 | 9 | 11 | 1 | 5 | 0 |
| 1934 | 0 | 5 | 8 | 7 | 5 | 9 | 10 | 9 | 10 | 9 | 8 | 9 | 10 | 10 |
| 1935 | 3 | 0 | 1 | 7 | 4 | 9 | 9 | 8 | 4 | 5 | 4 | 3 | 8 | 6 |
| 1936 | 10 | 3 | 4 | 5 | 2 | 11 | 6 | 4 | 9 | 3 | 5 | 7 | 2 | 8 |
| 1937 | 10 | 1 | 8 | 4 | 2 | 3 | 11 | 3 | 1 | 11 | 5 | 5 | 5 | 4 |
| 1938 | 2 | 7 | 2 | 4 | 6 | 4 | 3 | 5 | 10 | 3 | 0 | 8 | 3 | 11 |
| 1939 | 2 | 0 | 2 | 10 | 7 | 0 | 8 | 2 | 0 | 5 | 3 | 7 | 5 | 1 |
| 1940 | 4 | 1 | 8 | 8 | 5 | 5 | 4 | 3 | 7 | 5 | 3 | 9 | 2 | 4 |
| 1941 | 5 | 1 | 9 | 1 | 9 | 0 | 7 | 0 | 1 | 9 | 1 | 9 | 11 | 0 |
| 1942 | 0 | 7 | 11 | 11 | 3 | 1 | 8 | 0 | 3 | 2 | 9 | 7 | 3 | 2 |
| 1943 | 9 | 3 | 6 | 5 | 1 | 0 | 0 | 11 | 8 | 5 | 0 | 4 | 6 | 7 |
| 1944 | 3 | 10 | 3 | 4 | 10 | 5 | 9 | 3 | 6 | 5 | 4 | 9 | 11 | 8 |
| 1945 | 4 | 10 | 7 | 2 | 8 | 0 | 10 | 6 | 3 | 3 | 10 | 9 | 3 | 10 |
| 1946 | 7 | 6 | 9 | 11 | 11 | 7 | 5 | 3 | 11 | 3 | 1 | 10 | 6 | 11 |
| 1947 | 10 | 2 | 11 | 9 | 1 | 2 | 2 | 2 | 5 | 2 | 10 | 1 | 10 | 9 |
| 1948 | 4 | 11 | 9 | 9 | 7 | 10 | 2 | 7 | 3 | 8 | 1 | 5 | 3 | 4 |
| 1949 | 3 | 9 | 9 | 5 | 0 | 1 | 6 | 5 | 0 | 11 | 8 | 4 | 3 | 3 |
| 1950 | 6 | 5 | 11 | 11 | 4 | 2 | 2 | 10 | 9 | 7 | 0 | 8 | 5 | 10 |
| 1951 | 0 | 7 | 4 | 1 | 10 | 0 | 2 | 10 | 3 | 3 | 4 | 11 | 6 | 10 |
| 1952 | 9 | 0 | 9 | 2 | 5 | 3 | 7 | 8 | 2 | 1 | 9 | 3 | 2 | 7 |
| 1953 | 11 | 8 | 3 | 11 | 4 | 0 | 1 | 7 | 6 | 6 | 8 | 4 | 3 | 9 |
| 1954 | 1 | 5 | 7 | 4 | 9 | 4 | 2 | 7 | 5 | 6 | 3 | 5 | 6 | 1 |
| 1955 | 11 | 7 | 11 | 11 | 7 | 10 | 6 | 1 | 1 | 0 | 2 | 8 | 1 | 3 |
| 1956 | 0 | 1 | 0 | 9 | 7 | 6 | 3 | 9 | 8 | 7 | 11 | 7 | 8 | 7 |
| 1957 | 5 | 4 | 7 | 4 | 2 | 0 | 11 | 1 | 2 | 4 | 8 | 3 | 11 | 2 |
| 1958 | 1 | 4 | 10 | 0 | 2 | 0 | 8 | 5 | 2 | 10 | 6 | 11 | 9 | 6 |
| 1959 | 6 | 1 | 1 | 3 | 6 | 1 | 5 | 9 | 6 | 2 | 7 | 7 | 7 | 1 |
| 1960 | 3 | 5 | 6 | 7 | 9 | 7 | 7 | 7 | 0 | 6 | 5 | 6 | 2 | 9 |
| 1961 | 6 | 10 | 8 | 9 | 2 | 0 | 8 | 6 | 4 | 2 | 0 | 3 | 7 | 8 |
| 1962 | 1 | 1 | 1 | 11 | 0 | 1 | 7 | 5 | 2 | 11 | 5 | 3 | 2 | 11 |
| 1963 | 2 | 8 | 7 | 11 | 3 | 0 | 1 | 6 | 10 | 10 | 11 | 5 | 10 | 2 |
| 1964 | 10 | 4 | 5 | 3 | 8 | 6 | 6 | 0 | 10 | 2 | 9 | 9 | 5 | 5 |
| 1965 | 4 | 9 | 11 | 0 | 1 | 0 | 7 | 4 | 5 | 8 | 11 | 9 | 8 | 4 |
| 1966 | 2 | 3 | 2 | 4 | 4 | 6 | 6 | 10 | 2 | 0 | 1 | 7 | 7 | 0 |
| 1967 | 2 | 9 | 10 | 5 | 1 | 10 | 7 | 4 | 2 | 9 | 9 | 0 | 11 | 3 |
| 1968 | 6 | 7 | 8 | 5 | 1 | 1 | 3 | 10 | 11 | 8 | 0 | 2 | 10 | 8 |
| 1969 | 5 | 9 | 11 | 3 | 9 | 8 | 4 | 9 | 2 | 5 | 6 | 4 | 1 | 4 |
| 1970 | 1 | 7 | 10 | 11 | 11 | 8 | 10 | 3 | 7 | 10 | 9 | 4 | 4 | 4 |
| 1971 | 9 | 5 | 8 | 0 | 1 | 8 | 1 | 9 | 9 | 10 | 4 | 10 | 8 | 4 |
| 1972 | 8 | 6 | 9 | 1 | 6 | 5 | 8 | 2 | 4 | 2 | 5 | 5 | 10 | 1 |
| 1973 | 0 | 6 | 11 | 7 | 4 | 10 | 10 | 1 | 0 | 7 | 2 | 5 | 9 | 11 |
| 1974 | 6 | 7 | 3 | 5 | 5 | 9 | 0 | 11 | 6 | 10 | 6 | 6 | 4 | 1 |
| 1975 | 5 | 9 | 5 | 11 | 5 | 3 | 1 | 1 | 11 | 6 | 3 | 4 | 0 | 1 |
| 1976 | 10 | 9 | 1 | 5 | 7 | 9 | 4 | 3 | 0 | 4 | 5 | 6 | 6 | 5 |
| 1977 | 8 | 11 | 2 | 7 | 5 | 4 | 7 | 5 | 5 | 2 | 0 | 7 | 6 | 4 |
| 1978 | 5 | 11 | 3 | 2 | 4 | 1 | 11 | 2 | 2 | 5 | 8 | 11 | 10 | 4 |
| 1979 | 7 | 7 | 6 | 11 | 1 | 5 | 6 | 1 | 7 | 5 | 0 | 5 | 9 | 10 |
| 1980 | 11 | 0 | 5 | 11 | 3 | 4 | 11 | 5 | 3 | 10 | 10 | 4 | 2 | 8 |
| 1981 | 10 | 11 | 5 | 8 | 6 | 6 | 3 | 9 | 11 | 11 | 3 | 8 | 3 | 2 |
| 1982 | 0 | 1 | 1 | 6 | 4 | 2 | 3 | 2 | 2 | 1 | 7 | 11 | 6 | 3 |
| 1983 | 0 | 10 | 10 | 11 | 4 | 1 | 7 | 2 | 1 | 9 | 0 | 6 | 5 | 8 |
| 1984 | 2 | 8 | 8 | 8 | 4 | 10 | 9 | 10 | 7 | 6 | 1 | 5 | 10 | 8 |
| 1985 | 10 | 11 | 9 | 1 | 3 | 2 | 8 | 9 | 4 | 6 | 8 | 0 | 2 | 11 |
| 1986 | 5 | 1 | 4 | 11 | 10 | 9 | 8 | 3 | 10 | 8 | 6 | 4 | 10 | 1 |
| 1987 | 10 | 5 | 7 | 11 | 9 | 10 | 0 | 3 | 5 | 10 | 6 | 8 | 9 | 3 |
| 1988 | 8 | 5 | 10 | 4 | 7 | 1 | 6 | 1 | 4 | 1 | 7 | 7 | 2 | 6 |
| 1989 | 2 | 2 | 9 | 2 | 0 | 0 | 5 | 6 | 5 | 9 | 6 | 4 | 11 | 1 |
| 1990 | 11 | 9 | 2 | 2 | 4 | 6 | 2 | 3 | 4 | 9 | 5 | 8 | 0 | 0 |
| 1991 | 4 | 1 | 10 | 4 | 0 | 8 | 5 | 11 | 3 | 10 | 3 | 3 | 11 | 10 |
| 1992 | 2 | 6 | 0 | 6 | 11 | 6 | 7 | 10 | 2 | 2 | 2 | 0 | 5 | 4 |
| 1993 | 2 | 11 | 3 | 3 | 7 | 10 | 5 | 3 | 8 | 11 | 2 | 1 | 10 | 6 |
| 1994 | 2 | 7 | 10 | 2 | 6 | 11 | 6 | 6 | 8 | 10 | 1 | 5 | 0 | 8 |
| 1995 | 2 | 5 | 3 | 5 | 10 | 10 | 10 | 4 | 0 | 1 | 5 | 11 | 8 | 10 |
| 1996 | 8 | 11 | 3 | 8 | 3 | 9 | 1 | 9 | 6 | 11 | 9 | 11 | 11 | 10 |
| 1997 | 2 | 4 | 10 | 10 | 7 | 8 | 4 | 10 | 6 | 4 | 2 | 2 | 2 | 5 |
| 1998 | 8 | 4 | 0 | 9 | 10 | 5 | 10 | 1 | 5 | 4 | 3 | 11 | 11 | 4 |
| 1999 | 10 | 7 | 9 | 8 | 8 | 5 | 1 | 8 | 8 | 8 | 11 | 7 | 10 | 6 |
| 2000 | 8 | 2 | 2 | 3 | 6 | 7 | 6 | 11 | 10 | 6 | 11 | 2 | 7 | 6 |
| 2001 | 4 | 4 | 7 | 4 | 1 | 6 | 7 | 8 | 0 | 7 | 7 | 9 | 6 | 9 |
| 2002 | 0 | 6 | 1 | 4 | 8 | 4 | 7 | 11 | 10 | 6 | 7 | 11 | 5 | 10 |
| 2003 | 11 | 4 | 7 | 9 | 9 | 1 | 10 | 2 | 1 | 3 | 5 | 6 | 7 | 1 |
| 2004 | 5 | 4 | 8 | 3 | 2 | 4 | 1 | 4 | 4 | 5 | 5 | 0 | 6 | 3 |

-continued

Example #1 of a nested design CS hopping pattern

| m | $n_{cs}(n)$ | | | | | | | | | | | | | |
|---|---|---|---|---|---|---|---|---|---|---|---|---|---|---|
| 2005 | 8 | 3 | 6 | 7 | 4 | 1 | 9 | 1 | 5 | 1 | 11 | 8 | 1 | 4 |
| 2006 | 8 | 6 | 11 | 11 | 10 | 6 | 6 | 4 | 4 | 4 | 9 | 3 | 0 | 6 |
| 2007 | 1 | 8 | 0 | 6 | 11 | 9 | 5 | 7 | 0 | 0 | 9 | 3 | 10 | 0 |
| 2008 | 5 | 8 | 11 | 3 | 10 | 3 | 1 | 3 | 10 | 0 | 1 | 11 | 8 | 3 |
| 2009 | 3 | 8 | 8 | 3 | 1 | 9 | 10 | 7 | 9 | 3 | 0 | 8 | 6 | 9 |
| 2010 | 8 | 3 | 7 | 0 | 10 | 7 | 10 | 6 | 6 | 4 | 0 | 0 | 8 | 7 |
| 2011 | 4 | 7 | 8 | 9 | 4 | 11 | 5 | 10 | 6 | 5 | 0 | 4 | 11 | 1 |
| 2012 | 8 | 8 | 8 | 4 | 0 | 3 | 7 | 0 | 11 | 5 | 2 | 4 | 4 | 0 |
| 2013 | 7 | 6 | 1 | 9 | 0 | 3 | 1 | 6 | 2 | 7 | 9 | 5 | 4 | 2 |
| 2014 | 9 | 7 | 8 | 7 | 7 | 0 | 11 | 7 | 7 | 6 | 7 | 2 | 7 | 11 |
| 2015 | 3 | 2 | 5 | 5 | 11 | 2 | 5 | 5 | 7 | 2 | 7 | 3 | 7 | 0 |
| 2016 | 2 | 7 | 2 | 4 | 11 | 8 | 1 | 0 | 6 | 11 | 10 | 1 | 6 | 5 |
| 2017 | 11 | 2 | 10 | 5 | 7 | 1 | 0 | 3 | 11 | 6 | 0 | 5 | 1 | 7 |
| 2018 | 11 | 2 | 10 | 11 | 0 | 10 | 5 | 10 | 0 | 6 | 10 | 2 | 3 | 10 |
| 2019 | 9 | 7 | 6 | 7 | 1 | 9 | 2 | 10 | 5 | 5 | 6 | 8 | 4 | 3 |
| 2020 | 0 | 2 | 10 | 2 | 6 | 4 | 11 | 9 | 5 | 8 | 5 | 10 | 4 | 1 |
| 2021 | 11 | 10 | 4 | 8 | 6 | 10 | 0 | 0 | 10 | 3 | 2 | 8 | 4 | 0 |
| 2022 | 0 | 1 | 5 | 8 | 10 | 3 | 6 | 2 | 9 | 4 | 0 | 3 | 8 | 11 |
| 2023 | 2 | 7 | 2 | 6 | 8 | 1 | 2 | 6 | 9 | 1 | 9 | 4 | 1 | 5 |
| 2024 | 3 | 9 | 10 | 11 | 3 | 6 | 3 | 8 | 3 | 10 | 3 | 10 | 1 | 4 |
| 2025 | 5 | 11 | 0 | 7 | 8 | 9 | 6 | 11 | 7 | 11 | 4 | 10 | 8 | 0 |
| 2026 | 9 | 2 | 5 | 1 | 6 | 11 | 6 | 5 | 4 | 6 | 7 | 8 | 2 | 7 |
| 2027 | 1 | 8 | 3 | 6 | 9 | 5 | 1 | 4 | 1 | 0 | 1 | 1 | 11 | 7 |
| 2028 | 6 | 9 | 2 | 10 | 0 | 8 | 3 | 3 | 6 | 6 | 4 | 5 | 10 | 10 |
| 2029 | 6 | 1 | 0 | 4 | 4 | 0 | 0 | 10 | 3 | 1 | 6 | 1 | 4 | 9 |
| 2030 | 2 | 5 | 5 | 9 | 0 | 11 | 5 | 6 | 3 | 10 | 10 | 6 | 7 | 11 |
| 2031 | 11 | 0 | 11 | 5 | 0 | 4 | 2 | 6 | 11 | 6 | 9 | 7 | 11 | 2 |
| 2032 | 0 | 10 | 2 | 7 | 6 | 10 | 7 | 2 | 6 | 6 | 10 | 4 | 0 | 4 |
| 2033 | 1 | 1 | 8 | 7 | 10 | 8 | 2 | 5 | 2 | 3 | 1 | 11 | 1 | 4 |
| 2034 | 9 | 4 | 2 | 2 | 3 | 3 | 7 | 3 | 3 | 0 | 2 | 2 | 5 | 8 |
| 2035 | 11 | 2 | 5 | 6 | 1 | 7 | 7 | 3 | 6 | 6 | 9 | 0 | 10 | 0 |
| 2036 | 7 | 11 | 8 | 10 | 11 | 2 | 9 | 3 | 1 | 9 | 9 | 2 | 9 | 7 |
| 2037 | 8 | 8 | 6 | 3 | 7 | 6 | 1 | 0 | 8 | 4 | 10 | 8 | 4 | 1 |
| 2038 | 4 | 9 | 0 | 9 | 9 | 3 | 5 | 8 | 9 | 2 | 2 | 6 | 1 | 2 |
| 2039 | 4 | 8 | 10 | 5 | 6 | 7 | 5 | 7 | 11 | 9 | 2 | 8 | 6 | 3 |
| 2040 | 5 | 6 | 8 | 11 | 1 | 7 | 4 | 5 | 4 | 3 | 6 | 8 | 0 | 7 |
| 2041 | 5 | 3 | 1 | 6 | 10 | 4 | 1 | 8 | 9 | 3 | 1 | 3 | 1 | 11 |
| 2042 | 5 | 3 | 2 | 1 | 0 | 7 | 6 | 8 | 0 | 5 | 11 | 8 | 10 | 1 |
| 2043 | 8 | 1 | 8 | 5 | 7 | 0 | 6 | 3 | 10 | 10 | 4 | 10 | 0 | 2 |
| 2044 | 8 | 7 | 6 | 9 | 6 | 2 | 1 | 9 | 8 | 10 | 0 | 11 | 8 | 6 |
| 2045 | 9 | 9 | 4 | 7 | 2 | 0 | 4 | 1 | 10 | 7 | 3 | 7 | 11 | 11 |
| 2046 | 5 | 0 | 9 | 8 | 5 | 11 | 5 | 10 | 4 | 10 | 6 | 11 | 10 | 4 |
| 2047 | 2 | 0 | 11 | 0 | 9 | 0 | 5 | 1 | 11 | 6 | 10 | 9 | 3 | 9 |

Example #2 of a nested design CS hopping pattern

| m | $n_{cs}(n)$ | | | | | | | | | | | | | |
|---|---|---|---|---|---|---|---|---|---|---|---|---|---|---|
| 0 | 9 | 10 | 1 | 10 | 7 | 1 | 3 | 6 | 11 | 11 | 1 | 11 | 11 | 5 |
| 1 | 7 | 2 | 8 | 0 | 3 | 0 | 1 | 9 | 8 | 3 | 11 | 0 | 5 | 4 |
| 2 | 10 | 3 | 9 | 2 | 11 | 4 | 2 | 3 | 7 | 5 | 4 | 9 | 7 | 6 |
| 3 | 0 | 8 | 6 | 5 | 10 | 7 | 7 | 10 | 9 | 6 | 2 | 2 | 10 | 0 |
| 4 | 3 | 5 | 3 | 8 | 1 | 8 | 9 | 8 | 4 | 7 | 5 | 1 | 9 | 8 |
| 5 | 11 | 0 | 2 | 9 | 6 | 10 | 5 | 11 | 2 | 8 | 7 | 6 | 8 | 11 |
| 6 | 6 | 11 | 4 | 4 | 2 | 3 | 11 | 7 | 5 | 2 | 9 | 3 | 1 | 7 |
| 7 | 4 | 4 | 11 | 3 | 9 | 6 | 6 | 1 | 10 | 4 | 6 | 7 | 6 | 10 |
| 8 | 8 | 9 | 0 | 11 | 11 | 5 | 4 | 9 | 1 | 2 | 1 | 4 | 8 | 3 |
| 9 | 2 | 4 | 5 | 5 | 4 | 10 | 10 | 8 | 6 | 1 | 1 | 0 | 4 | 1 |
| 10 | 6 | 9 | 8 | 6 | 0 | 9 | 0 | 5 | 6 | 6 | 3 | 1 | 0 | 2 |
| 11 | 5 | 8 | 9 | 7 | 4 | 0 | 8 | 5 | 3 | 10 | 0 | 5 | 3 | 9 |
| 12 | 5 | 6 | 7 | 8 | 0 | 3 | 3 | 11 | 1 | 9 | 10 | 0 | 10 | 10 |
| 13 | 1 | 6 | 6 | 3 | 1 | 11 | 4 | 2 | 7 | 3 | 0 | 6 | 2 | 1 |
| 14 | 8 | 0 | 7 | 10 | 5 | 7 | 0 | 0 | 10 | 5 | 11 | 3 | 4 | 8 |
| 15 | 11 | 2 | 4 | 1 | 10 | 6 | 2 | 4 | 6 | 0 | 8 | 5 | 2 | 8 |
| 16 | 11 | 10 | 0 | 7 | 6 | 9 | 3 | 1 | 8 | 10 | 5 | 2 | 0 | 7 |
| 17 | 0 | 11 | 0 | 11 | 2 | 11 | 9 | 5 | 8 | 5 | 2 | 5 | 4 | 10 |
| 18 | 10 | 11 | 11 | 0 | 10 | 9 | 6 | 8 | 11 | 2 | 0 | 4 | 2 | 11 |
| 19 | 9 | 0 | 10 | 4 | 4 | 5 | 6 | 7 | 2 | 5 | 5 | 10 | 9 | 1 |
| 20 | 0 | 1 | 0 | 2 | 8 | 3 | 0 | 6 | 3 | 10 | 8 | 0 | 9 | 3 |
| 21 | 0 | 11 | 9 | 4 | 7 | 2 | 2 | 1 | 9 | 11 | 10 | 6 | 8 | 4 |
| 22 | 1 | 4 | 0 | 8 | 3 | 10 | 2 | 0 | 11 | 7 | 9 | 6 | 10 | 2 |
| 23 | 2 | 9 | 10 | 2 | 0 | 11 | 7 | 0 | 3 | 1 | 5 | 3 | 2 | 7 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 24 | 5 | 7 | 7 | 10 | 2 | 1 | 11 | 2 | 7 | 8 | 3 | 2 | 0 | 0 |
| 25 | 3 | 10 | 1 | 1 | 1 | 6 | 10 | 3 | 1 | 5 | 7 | 8 | 8 | 10 |
| 26 | 6 | 6 | 3 | 10 | 11 | 11 | 1 | 9 | 3 | 0 | 7 | 10 | 3 | 6 |
| 27 | 9 | 1 | 7 | 1 | 6 | 5 | 1 | 10 | 7 | 10 | 2 | 8 | 4 | 2 |
| 28 | 0 | 10 | 5 | 11 | 3 | 2 | 6 | 11 | 0 | 10 | 6 | 4 | 7 | 1 |
| 29 | 1 | 1 | 1 | 7 | 2 | 9 | 6 | 10 | 6 | 7 | 11 | 7 | 1 | 4 |
| 30 | 1 | 11 | 10 | 0 | 9 | 1 | 0 | 9 | 5 | 9 | 4 | 11 | 8 | 6 |
| 31 | 9 | 7 | 6 | 6 | 8 | 8 | 8 | 0 | 9 | 8 | 8 | 9 | 5 | 10 |
| 32 | 10 | 3 | 8 | 11 | 4 | 8 | 4 | 6 | 11 | 4 | 10 | 0 | 1 | 8 |
| 33 | 9 | 5 | 8 | 1 | 1 | 7 | 2 | 1 | 10 | 8 | 9 | 2 | 1 | 6 |
| 34 | 2 | 0 | 0 | 6 | 3 | 9 | 1 | 10 | 0 | 4 | 0 | 11 | 3 | 10 |
| 35 | 8 | 6 | 0 | 0 | 2 | 10 | 8 | 11 | 9 | 6 | 11 | 8 | 11 | 1 |
| 36 | 9 | 7 | 11 | 9 | 11 | 4 | 11 | 5 | 4 | 3 | 6 | 10 | 10 | 11 |
| 37 | 6 | 5 | 5 | 7 | 8 | 1 | 10 | 4 | 0 | 3 | 5 | 7 | 2 | 10 |
| 38 | 9 | 9 | 1 | 8 | 5 | 2 | 4 | 4 | 3 | 4 | 3 | 8 | 6 | 9 |
| 39 | 6 | 2 | 9 | 0 | 1 | 7 | 3 | 3 | 5 | 0 | 10 | 7 | 9 | 9 |
| 40 | 3 | 3 | 1 | 0 | 8 | 0 | 8 | 7 | 4 | 9 | 2 | 10 | 2 | 3 |
| 41 | 10 | 2 | 4 | 11 | 8 | 10 | 0 | 2 | 9 | 11 | 5 | 4 | 10 | 9 |
| 42 | 1 | 8 | 4 | 9 | 9 | 0 | 4 | 0 | 4 | 1 | 11 | 2 | 0 | 10 |
| 43 | 7 | 6 | 2 | 11 | 9 | 5 | 9 | 4 | 0 | 11 | 10 | 3 | 9 | 7 |
| 44 | 8 | 1 | 5 | 5 | 11 | 4 | 3 | 7 | 10 | 9 | 0 | 8 | 6 | 7 |
| 45 | 5 | 5 | 2 | 5 | 8 | 3 | 7 | 1 | 8 | 1 | 11 | 9 | 7 | 5 |
| 46 | 8 | 3 | 2 | 3 | 3 | 6 | 4 | 4 | 2 | 9 | 11 | 1 | 10 | 0 |
| 47 | 10 | 2 | 3 | 6 | 10 | 5 | 10 | 11 | 1 | 7 | 4 | 11 | 11 | 4 |
| 48 | 11 | 1 | 10 | 9 | 5 | 9 | 1 | 3 | 5 | 1 | 6 | 1 | 6 | 0 |
| 49 | 0 | 9 | 6 | 6 | 5 | 10 | 1 | 2 | 2 | 0 | 10 | 5 | 11 | 3 |
| 50 | 10 | 1 | 4 | 2 | 7 | 6 | 4 | 8 | 8 | 6 | 6 | 6 | 3 | 5 |
| 51 | 7 | 7 | 11 | 7 | 6 | 11 | 6 | 0 | 0 | 6 | 1 | 8 | 8 | 5 |
| 52 | 7 | 1 | 6 | 10 | 5 | 11 | 10 | 5 | 1 | 11 | 8 | 7 | 7 | 2 |
| 53 | 4 | 9 | 11 | 10 | 10 | 5 | 5 | 5 | 5 | 1 | 7 | 2 | 1 | 5 |
| 54 | 8 | 7 | 9 | 8 | 4 | 1 | 5 | 11 | 11 | 2 | 8 | 3 | 9 | 6 |
| 55 | 4 | 5 | 3 | 3 | 7 | 9 | 11 | 6 | 9 | 9 | 2 | 8 | 5 | 11 |
| 56 | 8 | 0 | 11 | 7 | 0 | 1 | 1 | 6 | 9 | 0 | 6 | 9 | 0 | 4 |
| 57 | 3 | 3 | 4 | 7 | 3 | 9 | 11 | 11 | 1 | 3 | 1 | 9 | 9 | 9 |
| 58 | 3 | 8 | 5 | 10 | 9 | 4 | 6 | 2 | 3 | 7 | 8 | 3 | 5 | 11 |
| 59 | 3 | 0 | 6 | 3 | 7 | 0 | 0 | 10 | 8 | 1 | 3 | 4 | 11 | 7 |
| 60 | 7 | 10 | 4 | 7 | 9 | 3 | 8 | 8 | 7 | 8 | 4 | 10 | 4 | 4 |
| 61 | 11 | 4 | 1 | 2 | 7 | 7 | 10 | 2 | 4 | 8 | 0 | 5 | 7 | 7 |
| 62 | 4 | 2 | 9 | 9 | 11 | 8 | 7 | 0 | 0 | 9 | 9 | 11 | 1 | 1 |
| 63 | 1 | 7 | 2 | 9 | 10 | 7 | 8 | 2 | 6 | 4 | 9 | 0 | 11 | 9 |
| 64 | 6 | 5 | 11 | 1 | 5 | 5 | 11 | 7 | 9 | 5 | 6 | 1 | 11 | 10 |
| 65 | 6 | 10 | 1 | 4 | 4 | 8 | 4 | 9 | 1 | 10 | 5 | 1 | 5 | 4 |
| 66 | 6 | 4 | 9 | 2 | 6 | 6 | 2 | 4 | 10 | 3 | 1 | 3 | 10 | 3 |
| 67 | 0 | 4 | 4 | 8 | 1 | 0 | 11 | 10 | 6 | 7 | 7 | 10 | 4 | 7 |
| 68 | 6 | 8 | 10 | 8 | 2 | 0 | 1 | 1 | 6 | 2 | 1 | 2 | 11 | 1 |
| 69 | 4 | 5 | 3 | 9 | 6 | 3 | 8 | 7 | 4 | 8 | 1 | 3 | 6 | 10 |
| 70 | 11 | 5 | 8 | 0 | 3 | 2 | 8 | 3 | 3 | 10 | 3 | 7 | 0 | 11 |
| 71 | 7 | 4 | 6 | 2 | 2 | 5 | 6 | 6 | 8 | 2 | 3 | 7 | 0 | 3 |
| 72 | 7 | 2 | 0 | 5 | 11 | 10 | 4 | 2 | 7 | 9 | 7 | 7 | 5 | 8 |
| 73 | 3 | 2 | 3 | 8 | 9 | 4 | 5 | 0 | 11 | 6 | 0 | 9 | 0 | 1 |
| 74 | 8 | 6 | 3 | 11 | 3 | 0 | 1 | 1 | 7 | 7 | 9 | 5 | 1 | 3 |
| 75 | 1 | 11 | 11 | 2 | 3 | 5 | 9 | 5 | 6 | 10 | 11 | 9 | 9 | 0 |
| 76 | 9 | 2 | 2 | 7 | 7 | 11 | 1 | 1 | 0 | 4 | 8 | 3 | 6 | 4 |
| 77 | 10 | 10 | 5 | 0 | 4 | 11 | 10 | 0 | 8 | 4 | 11 | 7 | 0 | 6 |
| 78 | 0 | 1 | 10 | 11 | 1 | 3 | 10 | 3 | 6 | 3 | 2 | 4 | 11 | 11 |
| 79 | 0 | 2 | 0 | 10 | 6 | 6 | 8 | 3 | 4 | 4 | 5 | 11 | 4 | 9 |
| 80 | 1 | 4 | 6 | 4 | 11 | 6 | 8 | 3 | 9 | 10 | 10 | 1 | 6 | 5 |
| 81 | 9 | 3 | 1 | 4 | 9 | 9 | 9 | 0 | 8 | 6 | 8 | 6 | 7 | 2 |
| 82 | 10 | 11 | 9 | 10 | 0 | 1 | 7 | 10 | 8 | 0 | 7 | 8 | 6 | 1 |
| 83 | 8 | 10 | 8 | 9 | 10 | 0 | 3 | 8 | 6 | 3 | 8 | 9 | 3 | 2 |
| 84 | 9 | 3 | 7 | 4 | 11 | 2 | 7 | 11 | 0 | 7 | 10 | 10 | 5 | 6 |
| 85 | 2 | 1 | 7 | 3 | 2 | 0 | 3 | 9 | 5 | 2 | 8 | 10 | 6 | 11 |
| 86 | 3 | 9 | 3 | 10 | 6 | 1 | 6 | 9 | 10 | 10 | 9 | 6 | 10 | 5 |
| 87 | 5 | 5 | 3 | 6 | 4 | 11 | 5 | 0 | 5 | 11 | 4 | 4 | 1 | 10 |
| 88 | 0 | 0 | 8 | 9 | 9 | 5 | 4 | 1 | 3 | 3 | 5 | 5 | 8 | 5 |
| 89 | 1 | 5 | 5 | 3 | 10 | 2 | 3 | 1 | 4 | 3 | 3 | 3 | 8 | 3 |
| 90 | 3 | 4 | 3 | 10 | 10 | 3 | 0 | 1 | 11 | 0 | 10 | 0 | 8 | 0 |
| 91 | 6 | 1 | 9 | 11 | 0 | 4 | 9 | 10 | 5 | 4 | 5 | 4 | 8 | 7 |
| 92 | 3 | 3 | 0 | 5 | 5 | 8 | 10 | 10 | 9 | 8 | 5 | 6 | 1 | 11 |
| 93 | 10 | 8 | 7 | 7 | 7 | 3 | 5 | 9 | 3 | 9 | 1 | 1 | 1 | 3 |
| 94 | 7 | 4 | 9 | 4 | 4 | 8 | 11 | 3 | 10 | 8 | 2 | 5 | 9 | 2 |
| 95 | 11 | 6 | 9 | 1 | 9 | 9 | 10 | 0 | 7 | 2 | 4 | 4 | 6 | 1 |
| 96 | 9 | 2 | 10 | 3 | 10 | 10 | 7 | 8 | 2 | 6 | 11 | 3 | 7 | 9 |
| 97 | 6 | 7 | 3 | 0 | 11 | 8 | 6 | 8 | 6 | 11 | 6 | 3 | 8 | 10 |
| 98 | 2 | 2 | 0 | 2 | 7 | 4 | 2 | 4 | 8 | 11 | 7 | 2 | 6 | 11 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 99 | 0 | 3 | 7 | 5 | 11 | 7 | 8 | 4 | 6 | 2 | 4 | 8 | 8 | 11 |
| 100 | 1 | 9 | 4 | 5 | 9 | 11 | 10 | 6 | 7 | 11 | 1 | 8 | 5 | 6 |
| 101 | 3 | 1 | 1 | 3 | 6 | 9 | 10 | 8 | 2 | 11 | 5 | 0 | 6 | 3 |
| 102 | 1 | 5 | 7 | 2 | 2 | 2 | 11 | 4 | 1 | 1 | 1 | 1 | 7 | 1 |
| 103 | 1 | 9 | 2 | 4 | 6 | 7 | 3 | 0 | 1 | 7 | 1 | 2 | 2 | 11 |
| 104 | 6 | 7 | 7 | 0 | 7 | 9 | 8 | 7 | 11 | 0 | 9 | 8 | 7 | 8 |
| 105 | 2 | 9 | 1 | 10 | 2 | 8 | 3 | 5 | 9 | 5 | 6 | 4 | 3 | 1 |
| 106 | 4 | 7 | 1 | 11 | 5 | 3 | 6 | 0 | 3 | 2 | 0 | 6 | 11 | 8 |
| 107 | 7 | 10 | 11 | 4 | 5 | 7 | 10 | 1 | 3 | 5 | 3 | 11 | 10 | 4 |
| 108 | 4 | 2 | 2 | 11 | 10 | 0 | 0 | 7 | 11 | 3 | 6 | 8 | 2 | 7 |
| 109 | 7 | 6 | 0 | 6 | 3 | 2 | 10 | 4 | 6 | 10 | 1 | 6 | 5 | 9 |
| 110 | 6 | 11 | 7 | 6 | 0 | 10 | 2 | 6 | 8 | 11 | 9 | 4 | 11 | 0 |
| 111 | 4 | 2 | 8 | 5 | 0 | 1 | 3 | 6 | 2 | 10 | 7 | 6 | 9 | 7 |
| 112 | 3 | 10 | 9 | 10 | 2 | 2 | 0 | 8 | 6 | 4 | 1 | 4 | 10 | 4 |
| 113 | 8 | 3 | 4 | 9 | 1 | 1 | 3 | 2 | 9 | 6 | 1 | 1 | 4 | 10 |
| 114 | 11 | 7 | 9 | 3 | 1 | 11 | 5 | 1 | 8 | 0 | 3 | 1 | 7 | 11 |
| 115 | 6 | 11 | 9 | 1 | 5 | 4 | 8 | 1 | 4 | 1 | 8 | 10 | 0 | 0 |
| 116 | 7 | 5 | 2 | 6 | 2 | 10 | 4 | 3 | 10 | 1 | 10 | 6 | 3 | 4 |
| 117 | 0 | 8 | 8 | 3 | 11 | 11 | 6 | 7 | 7 | 2 | 3 | 9 | 9 | 2 |
| 118 | 1 | 6 | 5 | 1 | 11 | 2 | 5 | 2 | 11 | 1 | 10 | 7 | 9 | 4 |
| 119 | 5 | 2 | 7 | 9 | 2 | 9 | 0 | 1 | 4 | 9 | 4 | 8 | 3 | 9 |
| 120 | 2 | 10 | 9 | 3 | 5 | 8 | 11 | 11 | 8 | 5 | 5 | 10 | 8 | 8 |
| 121 | 1 | 0 | 8 | 3 | 0 | 4 | 6 | 6 | 11 | 6 | 9 | 5 | 5 | 9 |
| 122 | 5 | 3 | 2 | 1 | 0 | 5 | 8 | 9 | 2 | 4 | 2 | 9 | 1 | 6 |
| 123 | 8 | 1 | 7 | 0 | 8 | 4 | 11 | 6 | 2 | 11 | 2 | 11 | 8 | 9 |
| 124 | 7 | 11 | 2 | 1 | 6 | 2 | 3 | 9 | 5 | 8 | 5 | 1 | 10 | 9 |
| 125 | 10 | 9 | 7 | 5 | 6 | 8 | 11 | 2 | 3 | 2 | 11 | 6 | 7 | 7 |
| 126 | 5 | 8 | 9 | 0 | 0 | 7 | 6 | 8 | 0 | 5 | 8 | 0 | 0 | 2 |
| 127 | 3 | 9 | 7 | 9 | 7 | 3 | 1 | 7 | 2 | 3 | 4 | 7 | 5 | 1 |
| 128 | 2 | 6 | 11 | 6 | 7 | 7 | 1 | 4 | 2 | 1 | 5 | 1 | 1 | 8 |
| 129 | 10 | 7 | 6 | 8 | 0 | 6 | 4 | 9 | 11 | 11 | 4 | 10 | 8 | 7 |
| 130 | 11 | 5 | 10 | 4 | 4 | 0 | 1 | 6 | 10 | 0 | 3 | 6 | 2 | 9 |
| 131 | 5 | 1 | 5 | 6 | 5 | 6 | 9 | 7 | 4 | 2 | 7 | 5 | 8 | 9 |
| 132 | 0 | 8 | 2 | 4 | 5 | 9 | 4 | 5 | 1 | 0 | 4 | 0 | 6 | 8 |
| 133 | 5 | 8 | 1 | 10 | 5 | 4 | 2 | 10 | 11 | 3 | 5 | 5 | 9 | 1 |
| 134 | 2 | 1 | 6 | 8 | 2 | 4 | 8 | 0 | 0 | 0 | 6 | 1 | 2 | 3 |
| 135 | 10 | 6 | 0 | 4 | 0 | 7 | 0 | 4 | 11 | 9 | 0 | 11 | 4 | 1 |
| 136 | 7 | 11 | 1 | 6 | 1 | 7 | 11 | 3 | 7 | 7 | 11 | 3 | 0 | 5 |
| 137 | 5 | 11 | 5 | 0 | 5 | 8 | 0 | 2 | 10 | 0 | 2 | 1 | 10 | 1 |
| 138 | 3 | 6 | 4 | 11 | 4 | 5 | 6 | 9 | 5 | 6 | 0 | 0 | 4 | 11 |
| 139 | 6 | 1 | 10 | 1 | 7 | 0 | 4 | 11 | 9 | 9 | 4 | 3 | 7 | 0 |
| 140 | 2 | 4 | 7 | 0 | 3 | 1 | 10 | 7 | 4 | 6 | 6 | 2 | 1 | 4 |
| 141 | 9 | 7 | 0 | 11 | 0 | 5 | 7 | 3 | 10 | 3 | 3 | 7 | 3 | 8 |
| 142 | 5 | 0 | 1 | 7 | 2 | 2 | 1 | 4 | 10 | 6 | 5 | 0 | 5 | 0 |
| 143 | 11 | 6 | 5 | 9 | 3 | 4 | 2 | 8 | 2 | 5 | 0 | 5 | 10 | 9 |
| 144 | 3 | 5 | 2 | 8 | 0 | 5 | 1 | 11 | 3 | 5 | 4 | 2 | 2 | 5 |
| 145 | 2 | 9 | 6 | 5 | 7 | 11 | 9 | 4 | 9 | 7 | 8 | 0 | 11 | 5 |
| 146 | 8 | 11 | 5 | 8 | 10 | 2 | 11 | 3 | 2 | 6 | 8 | 8 | 5 | 4 |
| 147 | 4 | 7 | 4 | 1 | 1 | 7 | 9 | 5 | 2 | 4 | 0 | 8 | 6 | 5 |
| 148 | 3 | 6 | 0 | 9 | 2 | 7 | 11 | 2 | 2 | 0 | 8 | 4 | 8 | 6 |
| 149 | 11 | 0 | 3 | 11 | 11 | 4 | 0 | 11 | 5 | 2 | 2 | 2 | 9 | 10 |
| 150 | 7 | 5 | 2 | 3 | 11 | 8 | 3 | 11 | 6 | 4 | 8 | 4 | 5 | 0 |
| 151 | 8 | 9 | 2 | 6 | 4 | 8 | 2 | 1 | 8 | 6 | 7 | 5 | 2 | 10 |
| 152 | 10 | 7 | 10 | 2 | 3 | 7 | 1 | 7 | 0 | 5 | 10 | 6 | 8 | 8 |
| 153 | 10 | 0 | 4 | 2 | 10 | 1 | 0 | 7 | 6 | 8 | 3 | 11 | 1 | 11 |
| 154 | 0 | 6 | 0 | 8 | 9 | 1 | 2 | 10 | 1 | 11 | 3 | 1 | 11 | 8 |
| 155 | 1 | 7 | 2 | 0 | 0 | 3 | 4 | 5 | 2 | 10 | 5 | 3 | 3 | 11 |
| 156 | 1 | 0 | 2 | 9 | 4 | 4 | 9 | 9 | 9 | 7 | 4 | 1 | 7 | 3 |
| 157 | 8 | 3 | 9 | 1 | 9 | 7 | 9 | 6 | 9 | 5 | 7 | 11 | 3 | 3 |
| 158 | 8 | 10 | 9 | 5 | 0 | 3 | 5 | 7 | 7 | 11 | 2 | 5 | 0 | 5 |
| 159 | 4 | 11 | 0 | 3 | 5 | 2 | 5 | 0 | 0 | 8 | 10 | 0 | 3 | 5 |
| 160 | 0 | 11 | 2 | 2 | 11 | 0 | 10 | 11 | 2 | 3 | 0 | 1 | 9 | 1 |
| 161 | 11 | 0 | 1 | 5 | 8 | 1 | 10 | 11 | 9 | 11 | 3 | 3 | 4 | 2 |
| 162 | 4 | 9 | 5 | 8 | 1 | 6 | 8 | 8 | 11 | 2 | 3 | 11 | 10 | 10 |
| 163 | 8 | 4 | 1 | 7 | 0 | 11 | 3 | 4 | 8 | 1 | 8 | 5 | 9 | 3 |
| 164 | 4 | 4 | 11 | 5 | 7 | 8 | 8 | 9 | 0 | 5 | 3 | 10 | 5 | 2 |
| 165 | 6 | 0 | 5 | 2 | 10 | 11 | 5 | 2 | 1 | 11 | 11 | 8 | 6 | 9 |
| 166 | 6 | 7 | 10 | 3 | 5 | 6 | 0 | 2 | 5 | 7 | 7 | 4 | 5 | 3 |
| 167 | 6 | 3 | 0 | 5 | 10 | 6 | 5 | 5 | 3 | 2 | 9 | 7 | 10 | 1 |
| 168 | 7 | 11 | 10 | 7 | 7 | 4 | 2 | 6 | 6 | 6 | 2 | 0 | 3 | 3 |
| 169 | 10 | 5 | 4 | 7 | 11 | 5 | 2 | 6 | 4 | 11 | 6 | 7 | 1 | 1 |
| 170 | 1 | 6 | 10 | 11 | 5 | 9 | 0 | 4 | 3 | 0 | 5 | 5 | 7 | 11 |
| 171 | 2 | 3 | 9 | 9 | 10 | 3 | 10 | 0 | 11 | 4 | 7 | 10 | 7 | 5 |
| 172 | 1 | 4 | 2 | 7 | 8 | 2 | 1 | 10 | 4 | 5 | 7 | 1 | 9 | 6 |
| 173 | 7 | 0 | 5 | 9 | 9 | 6 | 8 | 5 | 2 | 4 | 10 | 2 | 2 | 3 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 174 | 7 | 6 | 4 | 10 | 6 | 6 | 7 | 7 | 2 | 9 | 2 | 6 | 11 | 1 |
| 175 | 6 | 7 | 2 | 1 | 8 | 1 | 2 | 5 | 11 | 1 | 7 | 0 | 8 | 2 |
| 176 | 11 | 11 | 10 | 3 | 2 | 5 | 8 | 6 | 3 | 7 | 4 | 9 | 7 | 1 |
| 177 | 5 | 4 | 11 | 1 | 7 | 5 | 7 | 5 | 1 | 2 | 8 | 11 | 6 | 7 |
| 178 | 0 | 1 | 8 | 6 | 4 | 0 | 5 | 8 | 1 | 8 | 3 | 0 | 8 | 6 |
| 179 | 2 | 9 | 9 | 0 | 8 | 6 | 5 | 2 | 5 | 10 | 5 | 5 | 4 | 4 |
| 180 | 4 | 7 | 5 | 7 | 0 | 8 | 5 | 2 | 8 | 5 | 1 | 0 | 2 | 7 |
| 181 | 4 | 6 | 1 | 0 | 4 | 2 | 10 | 2 | 5 | 9 | 9 | 9 | 10 | 0 |
| 182 | 4 | 5 | 6 | 5 | 6 | 11 | 2 | 11 | 3 | 9 | 5 | 4 | 0 | 3 |
| 183 | 8 | 6 | 7 | 1 | 8 | 8 | 6 | 0 | 3 | 7 | 3 | 2 | 9 | 6 |
| 184 | 0 | 1 | 2 | 10 | 5 | 2 | 7 | 4 | 5 | 5 | 9 | 10 | 2 | 7 |
| 185 | 7 | 1 | 8 | 4 | 1 | 6 | 0 | 7 | 9 | 0 | 5 | 11 | 3 | 2 |
| 186 | 6 | 8 | 5 | 2 | 3 | 6 | 11 | 0 | 0 | 6 | 0 | 0 | 9 | 6 |
| 187 | 11 | 1 | 3 | 5 | 3 | 10 | 10 | 5 | 10 | 5 | 5 | 4 | 5 | 10 |
| 188 | 6 | 3 | 6 | 9 | 11 | 9 | 6 | 3 | 1 | 8 | 3 | 10 | 2 | 4 |
| 189 | 6 | 3 | 11 | 11 | 1 | 3 | 3 | 4 | 10 | 5 | 4 | 0 | 6 | 5 |
| 190 | 11 | 10 | 3 | 3 | 5 | 3 | 9 | 9 | 2 | 2 | 6 | 0 | 4 | 7 |
| 191 | 9 | 11 | 11 | 6 | 2 | 11 | 2 | 2 | 5 | 7 | 3 | 8 | 10 | 8 |
| 192 | 0 | 5 | 5 | 8 | 7 | 11 | 4 | 7 | 10 | 4 | 9 | 11 | 2 | 11 |
| 193 | 8 | 7 | 1 | 9 | 6 | 11 | 0 | 10 | 4 | 10 | 7 | 7 | 0 | 0 |
| 194 | 8 | 4 | 3 | 4 | 9 | 0 | 9 | 7 | 0 | 3 | 5 | 2 | 5 | 0 |
| 195 | 3 | 0 | 5 | 3 | 11 | 8 | 7 | 5 | 10 | 6 | 1 | 7 | 4 | 5 |
| 196 | 2 | 11 | 7 | 7 | 6 | 0 | 7 | 8 | 1 | 5 | 0 | 7 | 5 | 8 |
| 197 | 4 | 8 | 11 | 2 | 1 | 2 | 5 | 9 | 4 | 0 | 9 | 11 | 0 | 9 |
| 198 | 0 | 11 | 5 | 11 | 4 | 9 | 4 | 8 | 7 | 9 | 11 | 10 | 11 | 2 |
| 199 | 7 | 0 | 3 | 1 | 8 | 10 | 7 | 10 | 3 | 4 | 9 | 6 | 1 | 8 |
| 200 | 2 | 11 | 4 | 1 | 11 | 6 | 0 | 1 | 0 | 10 | 11 | 3 | 8 | 2 |
| 201 | 11 | 4 | 6 | 3 | 5 | 1 | 3 | 0 | 5 | 4 | 0 | 3 | 10 | 4 |
| 202 | 5 | 11 | 8 | 11 | 8 | 8 | 1 | 4 | 8 | 10 | 6 | 11 | 6 | 3 |
| 203 | 2 | 8 | 1 | 1 | 11 | 10 | 3 | 4 | 7 | 4 | 1 | 2 | 0 | 6 |
| 204 | 5 | 9 | 0 | 0 | 11 | 3 | 2 | 0 | 7 | 3 | 11 | 2 | 4 | 7 |
| 205 | 1 | 0 | 7 | 10 | 10 | 0 | 10 | 10 | 1 | 2 | 10 | 5 | 0 | 6 |
| 206 | 9 | 8 | 5 | 9 | 5 | 7 | 1 | 11 | 11 | 2 | 11 | 9 | 5 | 3 |
| 207 | 3 | 8 | 11 | 5 | 4 | 11 | 4 | 3 | 11 | 0 | 6 | 4 | 3 | 2 |
| 208 | 4 | 10 | 4 | 6 | 6 | 2 | 9 | 10 | 9 | 6 | 3 | 3 | 5 | 6 |
| 209 | 8 | 3 | 10 | 2 | 4 | 9 | 3 | 1 | 3 | 2 | 2 | 6 | 1 | 4 |
| 210 | 0 | 10 | 11 | 10 | 11 | 7 | 2 | 7 | 5 | 9 | 11 | 5 | 5 | 6 |
| 211 | 1 | 10 | 3 | 5 | 8 | 3 | 3 | 2 | 5 | 6 | 10 | 6 | 11 | 6 |
| 212 | 7 | 2 | 11 | 3 | 4 | 10 | 1 | 4 | 1 | 5 | 0 | 9 | 3 | 6 |
| 213 | 11 | 11 | 9 | 10 | 1 | 10 | 6 | 11 | 5 | 4 | 4 | 5 | 3 | 5 |
| 214 | 8 | 2 | 10 | 10 | 8 | 7 | 2 | 8 | 1 | 8 | 6 | 11 | 9 | 10 |
| 215 | 6 | 0 | 8 | 9 | 7 | 6 | 10 | 3 | 8 | 9 | 2 | 7 | 1 | 2 |
| 216 | 2 | 5 | 4 | 7 | 7 | 9 | 8 | 2 | 6 | 5 | 8 | 11 | 0 | 6 |
| 217 | 6 | 2 | 7 | 4 | 4 | 1 | 8 | 4 | 2 | 7 | 6 | 0 | 0 | 3 |
| 218 | 11 | 11 | 0 | 7 | 10 | 1 | 11 | 4 | 7 | 1 | 9 | 0 | 4 | 11 |
| 219 | 11 | 9 | 0 | 6 | 9 | 2 | 4 | 6 | 5 | 3 | 6 | 7 | 9 | 2 |
| 220 | 2 | 8 | 0 | 0 | 7 | 8 | 1 | 9 | 10 | 7 | 4 | 9 | 2 | 0 |
| 221 | 9 | 3 | 8 | 11 | 1 | 10 | 8 | 5 | 6 | 0 | 11 | 6 | 4 | 3 |
| 222 | 2 | 2 | 2 | 4 | 1 | 2 | 9 | 2 | 10 | 9 | 11 | 8 | 0 | 2 |
| 223 | 2 | 8 | 8 | 10 | 9 | 8 | 11 | 3 | 11 | 10 | 9 | 8 | 4 | 7 |
| 224 | 6 | 6 | 5 | 6 | 10 | 4 | 7 | 0 | 5 | 10 | 7 | 11 | 0 | 8 |
| 225 | 10 | 5 | 9 | 10 | 8 | 0 | 9 | 7 | 10 | 6 | 8 | 9 | 11 | 7 |
| 226 | 10 | 2 | 5 | 2 | 8 | 2 | 6 | 10 | 8 | 8 | 2 | 9 | 8 | 0 |
| 227 | 0 | 5 | 11 | 7 | 2 | 5 | 3 | 3 | 11 | 2 | 1 | 5 | 10 | 9 |
| 228 | 8 | 3 | 7 | 8 | 6 | 7 | 4 | 1 | 7 | 8 | 10 | 9 | 11 | 9 |
| 229 | 1 | 5 | 4 | 6 | 1 | 0 | 7 | 4 | 11 | 6 | 0 | 4 | 3 | 3 |
| 230 | 10 | 3 | 7 | 7 | 9 | 6 | 11 | 10 | 4 | 0 | 0 | 2 | 3 | 11 |
| 231 | 11 | 4 | 6 | 11 | 8 | 8 | 7 | 10 | 1 | 7 | 11 | 5 | 2 | 9 |
| 232 | 4 | 5 | 6 | 1 | 8 | 4 | 6 | 7 | 11 | 0 | 0 | 7 | 1 | 0 |
| 233 | 4 | 11 | 6 | 2 | 3 | 3 | 8 | 3 | 1 | 11 | 5 | 6 | 1 | 1 |
| 234 | 8 | 8 | 4 | 0 | 2 | 4 | 7 | 9 | 4 | 8 | 7 | 6 | 7 | 2 |
| 235 | 9 | 6 | 2 | 0 | 6 | 10 | 2 | 9 | 6 | 1 | 2 | 2 | 7 | 8 |
| 236 | 3 | 10 | 8 | 11 | 5 | 9 | 5 | 6 | 10 | 10 | 11 | 8 | 3 | 6 |
| 237 | 7 | 7 | 8 | 3 | 9 | 7 | 7 | 8 | 0 | 10 | 7 | 9 | 1 | 10 |
| 238 | 1 | 3 | 8 | 2 | 5 | 1 | 7 | 10 | 7 | 9 | 8 | 4 | 4 | 5 |
| 239 | 7 | 8 | 2 | 11 | 7 | 10 | 11 | 11 | 7 | 3 | 3 | 5 | 11 | 10 |
| 240 | 10 | 8 | 10 | 4 | 11 | 8 | 10 | 7 | 1 | 11 | 7 | 2 | 10 | 3 |
| 241 | 8 | 4 | 3 | 6 | 8 | 7 | 4 | 5 | 6 | 7 | 8 | 7 | 8 | 1 |
| 242 | 3 | 3 | 7 | 2 | 3 | 8 | 0 | 4 | 0 | 11 | 8 | 11 | 11 | 4 |
| 243 | 8 | 5 | 8 | 1 | 7 | 9 | 0 | 9 | 4 | 11 | 0 | 9 | 9 | 10 |
| 244 | 10 | 4 | 6 | 8 | 1 | 4 | 5 | 5 | 9 | 4 | 2 | 7 | 5 | 9 |
| 245 | 4 | 10 | 0 | 7 | 3 | 5 | 2 | 4 | 10 | 9 | 10 | 10 | 8 | 10 |
| 246 | 3 | 10 | 5 | 6 | 1 | 1 | 0 | 9 | 4 | 3 | 10 | 10 | 1 | 7 |
| 247 | 9 | 9 | 4 | 10 | 11 | 11 | 9 | 10 | 8 | 4 | 4 | 9 | 1 | 3 |
| 248 | 9 | 0 | 3 | 0 | 0 | 11 | 3 | 10 | 6 | 8 | 5 | 7 | 6 | 5 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 249 | 3 | 4 | 11 | 3 | 2 | 4 | 2 | 0 | 4 | 10 | 8 | 2 | 9 | 5 |
| 250 | 10 | 8 | 3 | 9 | 3 | 1 | 5 | 10 | 10 | 6 | 4 | 3 | 8 | 9 |
| 251 | 11 | 6 | 1 | 8 | 5 | 5 | 9 | 6 | 6 | 1 | 9 | 6 | 8 | 5 |
| 252 | 1 | 2 | 6 | 1 | 4 | 11 | 0 | 8 | 3 | 6 | 9 | 10 | 9 | 5 |
| 253 | 8 | 9 | 1 | 1 | 3 | 3 | 3 | 8 | 11 | 8 | 2 | 0 | 2 | 7 |
| 254 | 3 | 2 | 3 | 5 | 2 | 3 | 9 | 5 | 6 | 3 | 3 | 8 | 7 | 3 |
| 255 | 10 | 3 | 1 | 5 | 9 | 10 | 0 | 11 | 2 | 1 | 10 | 11 | 6 | 7 |
| 256 | 7 | 9 | 3 | 0 | 1 | 1 | 4 | 0 | 5 | 8 | 0 | 4 | 11 | 9 |
| 257 | 0 | 1 | 1 | 8 | 7 | 8 | 3 | 2 | 0 | 1 | 5 | 7 | 11 | 11 |
| 258 | 1 | 1 | 10 | 4 | 5 | 11 | 4 | 8 | 11 | 7 | 8 | 9 | 0 | 7 |
| 259 | 5 | 4 | 4 | 7 | 2 | 7 | 10 | 11 | 3 | 7 | 2 | 4 | 8 | 3 |
| 260 | 5 | 4 | 11 | 7 | 8 | 11 | 8 | 1 | 2 | 3 | 7 | 8 | 1 | 3 |
| 261 | 4 | 8 | 7 | 10 | 1 | 2 | 4 | 1 | 2 | 9 | 0 | 10 | 11 | 7 |
| 262 | 5 | 0 | 9 | 10 | 8 | 8 | 5 | 9 | 4 | 9 | 10 | 8 | 9 | 10 |
| 263 | 1 | 10 | 10 | 2 | 9 | 7 | 4 | 10 | 5 | 5 | 1 | 10 | 9 | 10 |
| 264 | 0 | 4 | 9 | 1 | 0 | 11 | 10 | 9 | 0 | 10 | 7 | 5 | 10 | 6 |
| 265 | 11 | 6 | 8 | 2 | 9 | 8 | 0 | 6 | 9 | 2 | 5 | 9 | 7 | 8 |
| 266 | 0 | 8 | 7 | 9 | 6 | 10 | 0 | 4 | 2 | 7 | 4 | 1 | 10 | 8 |
| 267 | 7 | 0 | 10 | 7 | 2 | 8 | 10 | 8 | 3 | 4 | 6 | 10 | 9 | 7 |
| 268 | 5 | 7 | 10 | 4 | 4 | 6 | 5 | 11 | 6 | 8 | 9 | 4 | 4 | 5 |
| 269 | 10 | 1 | 7 | 3 | 7 | 0 | 7 | 2 | 11 | 10 | 2 | 9 | 7 | 1 |
| 270 | 6 | 9 | 8 | 3 | 10 | 10 | 0 | 0 | 3 | 9 | 8 | 8 | 4 | 6 |
| 271 | 10 | 3 | 5 | 10 | 6 | 8 | 10 | 4 | 11 | 2 | 8 | 8 | 9 | 3 |
| 272 | 2 | 4 | 7 | 11 | 4 | 2 | 1 | 4 | 11 | 9 | 6 | 7 | 4 | 0 |
| 273 | 3 | 9 | 5 | 11 | 11 | 5 | 6 | 10 | 7 | 4 | 11 | 6 | 5 | 9 |
| 274 | 10 | 5 | 9 | 9 | 10 | 10 | 4 | 1 | 2 | 2 | 3 | 5 | 2 | 10 |
| 275 | 2 | 6 | 10 | 10 | 0 | 5 | 3 | 1 | 8 | 10 | 3 | 4 | 4 | 3 |
| 276 | 3 | 1 | 10 | 4 | 7 | 9 | 2 | 0 | 1 | 2 | 0 | 0 | 5 | 0 |
| 277 | 2 | 6 | 11 | 11 | 0 | 9 | 7 | 1 | 6 | 3 | 2 | 2 | 0 | 5 |
| 278 | 4 | 8 | 7 | 6 | 5 | 7 | 1 | 3 | 5 | 4 | 2 | 0 | 7 | 11 |
| 279 | 4 | 7 | 6 | 6 | 10 | 9 | 8 | 6 | 3 | 3 | 3 | 11 | 2 | 11 |
| 280 | 6 | 8 | 4 | 10 | 4 | 9 | 1 | 5 | 7 | 4 | 11 | 4 | 1 | 0 |
| 281 | 4 | 1 | 9 | 10 | 10 | 2 | 1 | 11 | 3 | 11 | 10 | 11 | 5 | 1 |
| 282 | 1 | 3 | 11 | 3 | 0 | 1 | 3 | 11 | 7 | 8 | 5 | 11 | 0 | 2 |
| 283 | 11 | 1 | 10 | 2 | 5 | 11 | 9 | 10 | 6 | 11 | 5 | 0 | 3 | 11 |
| 284 | 11 | 3 | 4 | 3 | 0 | 2 | 0 | 6 | 8 | 10 | 11 | 2 | 6 | 10 |
| 285 | 10 | 0 | 0 | 0 | 11 | 3 | 11 | 3 | 2 | 4 | 10 | 10 | 10 | 10 |
| 286 | 9 | 11 | 6 | 0 | 9 | 10 | 10 | 1 | 10 | 4 | 3 | 6 | 2 | 7 |
| 287 | 5 | 11 | 2 | 9 | 8 | 11 | 7 | 0 | 11 | 6 | 1 | 7 | 0 | 2 |
| 288 | 8 | 10 | 7 | 11 | 11 | 0 | 8 | 5 | 1 | 3 | 4 | 1 | 1 | 8 |
| 289 | 7 | 4 | 4 | 2 | 6 | 4 | 4 | 2 | 2 | 4 | 8 | 10 | 3 | 4 |
| 290 | 6 | 1 | 1 | 3 | 0 | 6 | 2 | 7 | 6 | 1 | 8 | 10 | 4 | 10 |
| 291 | 2 | 8 | 10 | 4 | 9 | 4 | 1 | 6 | 0 | 9 | 2 | 7 | 9 | 8 |
| 292 | 0 | 0 | 11 | 10 | 10 | 10 | 1 | 2 | 8 | 6 | 9 | 3 | 8 | 8 |
| 293 | 1 | 11 | 2 | 7 | 4 | 8 | 0 | 9 | 3 | 11 | 10 | 6 | 4 | 2 |
| 294 | 0 | 6 | 2 | 3 | 9 | 10 | 0 | 3 | 10 | 8 | 8 | 9 | 9 | 0 |
| 295 | 5 | 2 | 0 | 2 | 1 | 5 | 3 | 7 | 9 | 3 | 6 | 6 | 0 | 6 |
| 296 | 11 | 8 | 6 | 6 | 0 | 0 | 6 | 11 | 8 | 4 | 3 | 6 | 6 | 4 |
| 297 | 2 | 10 | 4 | 0 | 4 | 10 | 11 | 11 | 10 | 9 | 7 | 3 | 7 | 10 |
| 298 | 6 | 6 | 11 | 4 | 10 | 3 | 1 | 2 | 4 | 8 | 8 | 11 | 6 | 6 |
| 299 | 11 | 5 | 4 | 5 | 10 | 9 | 7 | 8 | 5 | 0 | 6 | 9 | 5 | 6 |
| 300 | 0 | 9 | 11 | 8 | 10 | 9 | 0 | 3 | 4 | 9 | 2 | 5 | 11 | 4 |
| 301 | 2 | 3 | 11 | 1 | 8 | 3 | 6 | 3 | 5 | 5 | 11 | 4 | 0 | 2 |
| 302 | 1 | 7 | 0 | 7 | 5 | 3 | 1 | 0 | 8 | 7 | 1 | 1 | 0 | 4 |
| 303 | 6 | 8 | 5 | 9 | 5 | 3 | 9 | 7 | 10 | 4 | 10 | 10 | 1 | 8 |
| 304 | 9 | 7 | 1 | 10 | 2 | 9 | 7 | 1 | 11 | 3 | 4 | 4 | 4 | 10 |
| 305 | 1 | 1 | 11 | 2 | 4 | 2 | 0 | 0 | 7 | 4 | 1 | 10 | 2 | 6 |
| 306 | 11 | 7 | 11 | 8 | 10 | 9 | 6 | 5 | 3 | 11 | 10 | 0 | 10 | 5 |
| 307 | 7 | 9 | 2 | 11 | 1 | 1 | 8 | 9 | 11 | 6 | 1 | 5 | 6 | 1 |
| 308 | 5 | 11 | 7 | 1 | 3 | 9 | 7 | 6 | 2 | 2 | 6 | 4 | 8 | 10 |
| 309 | 4 | 8 | 11 | 3 | 11 | 1 | 2 | 2 | 5 | 6 | 7 | 1 | 7 | 2 |
| 310 | 2 | 8 | 4 | 0 | 0 | 6 | 2 | 5 | 11 | 1 | 2 | 7 | 11 | 7 |
| 311 | 1 | 5 | 3 | 11 | 4 | 7 | 10 | 0 | 7 | 5 | 2 | 11 | 7 | 1 |
| 312 | 11 | 11 | 2 | 11 | 6 | 6 | 3 | 6 | 2 | 4 | 10 | 3 | 3 | 0 |
| 313 | 6 | 7 | 4 | 5 | 3 | 5 | 1 | 9 | 9 | 1 | 5 | 7 | 5 | 11 |
| 314 | 4 | 3 | 1 | 0 | 2 | 7 | 1 | 9 | 9 | 7 | 0 | 4 | 1 | 8 |
| 315 | 9 | 11 | 4 | 10 | 8 | 4 | 4 | 7 | 7 | 1 | 3 | 7 | 3 | 9 |
| 316 | 0 | 9 | 4 | 3 | 2 | 8 | 7 | 0 | 10 | 0 | 3 | 10 | 9 | 4 |
| 317 | 5 | 7 | 5 | 8 | 4 | 2 | 6 | 3 | 0 | 5 | 10 | 10 | 3 | 3 |
| 318 | 3 | 0 | 7 | 8 | 6 | 0 | 5 | 5 | 9 | 10 | 8 | 0 | 8 | 0 |
| 319 | 9 | 2 | 8 | 0 | 5 | 4 | 9 | 3 | 9 | 1 | 5 | 3 | 8 | 6 |
| 320 | 9 | 0 | 2 | 5 | 0 | 9 | 5 | 4 | 7 | 0 | 7 | 3 | 11 | 10 |
| 321 | 6 | 1 | 11 | 9 | 7 | 1 | 10 | 5 | 0 | 10 | 7 | 3 | 9 | 3 |
| 322 | 10 | 5 | 8 | 3 | 3 | 11 | 6 | 9 | 4 | 10 | 5 | 0 | 7 | 3 |
| 323 | 10 | 3 | 2 | 2 | 11 | 10 | 5 | 8 | 10 | 11 | 6 | 0 | 11 | 11 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 324 | 7 | 7 | 10 | 6 | 3 | 11 | 4 | 5 | 0 | 3 | 0 | 10 | 4 | 6 |
| 325 | 11 | 8 | 8 | 7 | 6 | 10 | 9 | 7 | 8 | 1 | 4 | 9 | 4 | 0 |
| 326 | 4 | 8 | 4 | 7 | 8 | 0 | 6 | 11 | 7 | 11 | 8 | 11 | 11 | 9 |
| 327 | 4 | 1 | 5 | 6 | 1 | 6 | 11 | 11 | 0 | 11 | 11 | 2 | 7 | 4 |
| 328 | 9 | 11 | 8 | 6 | 10 | 11 | 11 | 0 | 3 | 1 | 11 | 2 | 5 | 0 |
| 329 | 2 | 1 | 6 | 4 | 4 | 9 | 3 | 4 | 6 | 6 | 8 | 1 | 3 | 10 |
| 330 | 0 | 3 | 9 | 3 | 7 | 1 | 0 | 3 | 2 | 0 | 7 | 10 | 5 | 6 |
| 331 | 11 | 4 | 7 | 11 | 10 | 10 | 4 | 1 | 11 | 11 | 8 | 8 | 1 | 5 |
| 332 | 9 | 5 | 4 | 5 | 11 | 5 | 7 | 3 | 0 | 4 | 7 | 4 | 2 | 11 |
| 333 | 8 | 1 | 7 | 5 | 4 | 1 | 6 | 7 | 4 | 7 | 1 | 3 | 10 | 9 |
| 334 | 11 | 8 | 1 | 8 | 3 | 4 | 1 | 4 | 11 | 11 | 1 | 7 | 7 | 7 |
| 335 | 10 | 2 | 0 | 6 | 6 | 8 | 5 | 5 | 2 | 10 | 5 | 7 | 1 | 6 |
| 336 | 3 | 10 | 2 | 2 | 9 | 2 | 4 | 0 | 2 | 8 | 6 | 8 | 2 | 8 |
| 337 | 1 | 1 | 3 | 9 | 11 | 7 | 5 | 6 | 11 | 11 | 1 | 4 | 6 | 7 |
| 338 | 9 | 10 | 9 | 2 | 2 | 3 | 0 | 10 | 0 | 2 | 10 | 3 | 5 | 3 |
| 339 | 6 | 1 | 0 | 4 | 8 | 4 | 3 | 5 | 10 | 4 | 7 | 10 | 11 | 10 |
| 340 | 6 | 2 | 11 | 6 | 1 | 6 | 9 | 1 | 4 | 0 | 1 | 9 | 2 | 7 |
| 341 | 2 | 4 | 0 | 4 | 2 | 4 | 0 | 7 | 1 | 4 | 5 | 4 | 0 | 6 |
| 342 | 0 | 10 | 3 | 11 | 6 | 10 | 4 | 3 | 8 | 9 | 8 | 11 | 7 | 3 |
| 343 | 4 | 3 | 9 | 7 | 0 | 9 | 1 | 8 | 4 | 10 | 7 | 9 | 3 | 0 |
| 344 | 5 | 11 | 4 | 5 | 0 | 1 | 0 | 8 | 10 | 3 | 10 | 0 | 7 | 6 |
| 345 | 4 | 6 | 2 | 4 | 1 | 11 | 2 | 0 | 7 | 4 | 6 | 11 | 7 | 6 |
| 346 | 6 | 6 | 0 | 0 | 7 | 3 | 7 | 3 | 3 | 3 | 1 | 8 | 6 | 9 |
| 347 | 3 | 6 | 11 | 4 | 11 | 3 | 9 | 1 | 1 | 10 | 1 | 6 | 4 | 4 |
| 348 | 9 | 1 | 4 | 4 | 8 | 9 | 7 | 1 | 5 | 8 | 1 | 3 | 11 | 9 |
| 349 | 2 | 5 | 0 | 9 | 5 | 1 | 5 | 6 | 3 | 4 | 6 | 2 | 11 | 7 |
| 350 | 10 | 10 | 6 | 7 | 11 | 11 | 4 | 8 | 5 | 2 | 2 | 9 | 3 | 3 |
| 351 | 4 | 11 | 3 | 11 | 3 | 5 | 8 | 11 | 10 | 7 | 8 | 8 | 4 | 6 |
| 352 | 1 | 5 | 5 | 7 | 10 | 0 | 10 | 2 | 10 | 6 | 2 | 2 | 1 | 9 |
| 353 | 8 | 11 | 6 | 0 | 6 | 2 | 2 | 4 | 3 | 7 | 1 | 1 | 9 | 0 |
| 354 | 1 | 3 | 10 | 6 | 1 | 9 | 2 | 6 | 0 | 7 | 5 | 4 | 8 | 6 |
| 355 | 5 | 11 | 7 | 8 | 3 | 1 | 2 | 5 | 10 | 5 | 7 | 10 | 0 | 7 |
| 356 | 6 | 6 | 4 | 0 | 7 | 7 | 5 | 9 | 7 | 1 | 0 | 11 | 2 | 2 |
| 357 | 0 | 1 | 7 | 5 | 10 | 8 | 0 | 2 | 6 | 5 | 7 | 5 | 1 | 5 |
| 358 | 6 | 1 | 2 | 7 | 3 | 7 | 4 | 6 | 5 | 4 | 4 | 1 | 11 | 4 |
| 359 | 0 | 4 | 7 | 1 | 2 | 6 | 2 | 4 | 11 | 11 | 4 | 9 | 11 | 10 |
| 360 | 1 | 8 | 6 | 5 | 7 | 7 | 5 | 4 | 10 | 10 | 9 | 3 | 4 | 2 |
| 361 | 1 | 10 | 11 | 8 | 0 | 8 | 11 | 6 | 10 | 7 | 10 | 2 | 4 | 6 |
| 362 | 9 | 6 | 10 | 8 | 11 | 10 | 0 | 3 | 5 | 0 | 11 | 8 | 5 | 7 |
| 363 | 7 | 5 | 8 | 8 | 5 | 10 | 9 | 0 | 6 | 3 | 4 | 11 | 5 | 11 |
| 364 | 10 | 2 | 2 | 6 | 9 | 3 | 8 | 8 | 5 | 1 | 11 | 1 | 2 | 9 |
| 365 | 3 | 8 | 6 | 1 | 2 | 3 | 1 | 4 | 8 | 10 | 11 | 5 | 7 | 8 |
| 366 | 10 | 6 | 9 | 5 | 8 | 6 | 0 | 1 | 2 | 0 | 0 | 4 | 0 | 3 |
| 367 | 7 | 8 | 3 | 9 | 0 | 7 | 10 | 1 | 2 | 7 | 6 | 8 | 11 | 6 |
| 368 | 2 | 9 | 2 | 9 | 0 | 4 | 7 | 9 | 7 | 5 | 1 | 11 | 8 | 0 |
| 369 | 5 | 4 | 2 | 5 | 1 | 7 | 4 | 2 | 0 | 1 | 4 | 7 | 10 | 9 |
| 370 | 8 | 8 | 4 | 3 | 8 | 3 | 11 | 9 | 11 | 5 | 8 | 2 | 2 | 5 |
| 371 | 2 | 8 | 8 | 6 | 1 | 7 | 3 | 8 | 5 | 6 | 11 | 11 | 5 | 8 |
| 372 | 0 | 8 | 10 | 2 | 10 | 6 | 11 | 10 | 7 | 11 | 8 | 10 | 7 | 3 |
| 373 | 9 | 11 | 9 | 0 | 6 | 7 | 7 | 2 | 2 | 6 | 3 | 5 | 8 | 0 |
| 374 | 4 | 4 | 11 | 10 | 8 | 9 | 10 | 4 | 6 | 4 | 1 | 3 | 2 | 7 |
| 375 | 9 | 10 | 2 | 9 | 8 | 0 | 1 | 10 | 8 | 7 | 8 | 6 | 5 | 9 |
| 376 | 7 | 10 | 10 | 10 | 11 | 1 | 11 | 1 | 1 | 2 | 4 | 0 | 4 | 6 |
| 377 | 8 | 6 | 5 | 3 | 11 | 9 | 9 | 3 | 11 | 3 | 1 | 0 | 10 | 11 |
| 378 | 3 | 0 | 5 | 2 | 5 | 5 | 11 | 9 | 0 | 5 | 7 | 5 | 6 | 2 |
| 379 | 2 | 4 | 6 | 1 | 1 | 4 | 8 | 1 | 6 | 6 | 0 | 4 | 7 | 5 |
| 380 | 5 | 2 | 8 | 4 | 11 | 4 | 4 | 9 | 9 | 4 | 3 | 7 | 2 | 2 |
| 381 | 7 | 0 | 1 | 0 | 9 | 10 | 4 | 10 | 10 | 5 | 0 | 0 | 4 | 1 |
| 382 | 5 | 8 | 0 | 2 | 4 | 3 | 4 | 2 | 2 | 11 | 1 | 4 | 4 | 1 |
| 383 | 0 | 3 | 10 | 0 | 8 | 7 | 5 | 11 | 1 | 10 | 11 | 1 | 3 | 5 |
| 384 | 2 | 10 | 11 | 6 | 10 | 7 | 11 | 2 | 5 | 0 | 0 | 6 | 4 | 2 |
| 385 | 7 | 5 | 5 | 8 | 3 | 7 | 0 | 8 | 7 | 6 | 6 | 0 | 0 | 10 |
| 386 | 9 | 4 | 6 | 9 | 1 | 4 | 4 | 8 | 5 | 9 | 9 | 8 | 4 | 0 |
| 387 | 1 | 1 | 6 | 3 | 4 | 2 | 8 | 6 | 1 | 2 | 8 | 3 | 5 | 8 |
| 388 | 11 | 9 | 1 | 7 | 1 | 7 | 7 | 7 | 5 | 8 | 6 | 2 | 8 | 11 |
| 389 | 4 | 8 | 3 | 10 | 4 | 8 | 9 | 11 | 5 | 2 | 4 | 6 | 2 | 1 |
| 390 | 0 | 5 | 10 | 10 | 8 | 9 | 11 | 9 | 9 | 11 | 3 | 2 | 8 | 8 |
| 391 | 1 | 0 | 9 | 4 | 9 | 10 | 11 | 8 | 3 | 2 | 11 | 10 | 6 | 10 |
| 392 | 2 | 2 | 4 | 8 | 6 | 8 | 10 | 9 | 7 | 11 | 7 | 4 | 7 | 7 |
| 393 | 7 | 3 | 7 | 8 | 10 | 8 | 1 | 10 | 4 | 8 | 1 | 0 | 0 | 3 |
| 394 | 4 | 2 | 4 | 9 | 9 | 8 | 6 | 6 | 7 | 6 | 10 | 6 | 4 | 8 |
| 395 | 10 | 10 | 7 | 11 | 0 | 7 | 4 | 2 | 10 | 8 | 7 | 10 | 10 | 6 |
| 396 | 4 | 2 | 11 | 1 | 2 | 1 | 6 | 6 | 4 | 8 | 2 | 4 | 6 | 4 |
| 397 | 1 | 1 | 11 | 9 | 3 | 0 | 2 | 9 | 1 | 8 | 10 | 2 | 1 | 4 |
| 398 | 0 | 2 | 10 | 1 | 7 | 10 | 4 | 9 | 4 | 2 | 1 | 5 | 0 | 8 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 399 | 5 | 4 | 5 | 2 | 1 | 10 | 1 | 0 | 3 | 4 | 4 | 8 | 6 | 1 |
| 400 | 0 | 7 | 5 | 0 | 8 | 10 | 6 | 6 | 7 | 9 | 6 | 8 | 3 | 0 |
| 401 | 2 | 10 | 2 | 7 | 2 | 1 | 10 | 2 | 0 | 9 | 7 | 11 | 11 | 11 |
| 402 | 0 | 6 | 3 | 5 | 0 | 5 | 8 | 8 | 9 | 10 | 5 | 9 | 10 | 1 |
| 403 | 5 | 9 | 1 | 2 | 9 | 8 | 6 | 11 | 6 | 7 | 1 | 9 | 9 | 3 |
| 404 | 11 | 11 | 11 | 7 | 9 | 8 | 6 | 3 | 1 | 6 | 2 | 10 | 10 | 7 |
| 405 | 0 | 5 | 6 | 6 | 9 | 6 | 6 | 9 | 0 | 2 | 1 | 0 | 5 | 0 |
| 406 | 0 | 4 | 5 | 5 | 2 | 1 | 8 | 10 | 1 | 0 | 6 | 11 | 7 | 5 |
| 407 | 11 | 8 | 9 | 6 | 9 | 5 | 0 | 2 | 5 | 5 | 8 | 6 | 10 | 10 |
| 408 | 2 | 5 | 10 | 10 | 1 | 11 | 5 | 5 | 11 | 9 | 8 | 3 | 11 | 1 |
| 409 | 8 | 8 | 3 | 10 | 5 | 10 | 3 | 1 | 8 | 8 | 10 | 6 | 5 | 8 |
| 410 | 11 | 2 | 10 | 9 | 2 | 3 | 6 | 2 | 8 | 0 | 0 | 11 | 11 | 5 |
| 411 | 5 | 3 | 8 | 8 | 10 | 10 | 6 | 1 | 3 | 0 | 1 | 7 | 8 | 2 |
| 412 | 7 | 1 | 3 | 7 | 0 | 3 | 9 | 10 | 2 | 1 | 7 | 1 | 7 | 4 |
| 413 | 6 | 4 | 3 | 11 | 3 | 4 | 10 | 3 | 7 | 9 | 3 | 2 | 3 | 11 |
| 414 | 0 | 2 | 4 | 8 | 4 | 4 | 1 | 4 | 3 | 9 | 5 | 1 | 9 | 4 |
| 415 | 10 | 5 | 11 | 1 | 10 | 8 | 4 | 0 | 0 | 8 | 8 | 8 | 7 | 9 |
| 416 | 9 | 8 | 6 | 10 | 9 | 1 | 6 | 0 | 11 | 5 | 6 | 10 | 7 | 0 |
| 417 | 11 | 4 | 9 | 10 | 7 | 9 | 5 | 11 | 1 | 2 | 5 | 1 | 11 | 4 |
| 418 | 0 | 7 | 6 | 6 | 8 | 2 | 0 | 7 | 7 | 1 | 11 | 4 | 8 | 11 |
| 419 | 3 | 7 | 3 | 6 | 8 | 6 | 3 | 1 | 5 | 4 | 11 | 7 | 3 | 9 |
| 420 | 8 | 2 | 7 | 7 | 3 | 4 | 8 | 4 | 6 | 5 | 10 | 9 | 10 | 5 |
| 421 | 10 | 4 | 7 | 9 | 2 | 11 | 4 | 11 | 8 | 0 | 8 | 7 | 4 | 11 |
| 422 | 8 | 2 | 5 | 0 | 9 | 2 | 2 | 7 | 2 | 10 | 6 | 10 | 3 | 9 |
| 423 | 2 | 7 | 2 | 11 | 10 | 10 | 10 | 11 | 5 | 5 | 11 | 0 | 8 | 7 |
| 424 | 7 | 6 | 5 | 2 | 10 | 1 | 2 | 8 | 9 | 0 | 2 | 4 | 1 | 4 |
| 425 | 9 | 6 | 5 | 10 | 6 | 3 | 0 | 1 | 7 | 8 | 7 | 6 | 6 | 7 |
| 426 | 6 | 4 | 11 | 0 | 2 | 5 | 10 | 0 | 7 | 0 | 4 | 8 | 11 | 3 |
| 427 | 1 | 9 | 0 | 10 | 10 | 0 | 11 | 6 | 9 | 8 | 5 | 10 | 5 | 1 |
| 428 | 3 | 1 | 5 | 6 | 4 | 2 | 3 | 5 | 6 | 0 | 1 | 5 | 11 | 0 |
| 429 | 7 | 3 | 10 | 11 | 8 | 4 | 5 | 3 | 3 | 2 | 8 | 10 | 11 | 3 |
| 430 | 6 | 0 | 4 | 4 | 3 | 8 | 5 | 3 | 5 | 6 | 8 | 10 | 6 | 5 |
| 431 | 1 | 1 | 3 | 5 | 9 | 4 | 7 | 4 | 0 | 6 | 11 | 3 | 10 | 4 |
| 432 | 5 | 5 | 0 | 11 | 7 | 6 | 3 | 2 | 9 | 2 | 9 | 5 | 6 | 11 |
| 433 | 5 | 0 | 8 | 7 | 4 | 7 | 0 | 8 | 5 | 10 | 5 | 3 | 2 | 3 |
| 434 | 7 | 8 | 1 | 5 | 10 | 0 | 8 | 8 | 8 | 5 | 4 | 6 | 1 | 6 |
| 435 | 6 | 10 | 1 | 1 | 9 | 8 | 2 | 1 | 5 | 6 | 1 | 8 | 7 | 6 |
| 436 | 5 | 3 | 3 | 11 | 2 | 7 | 5 | 3 | 0 | 7 | 4 | 11 | 4 | 5 |
| 437 | 6 | 4 | 0 | 3 | 4 | 6 | 5 | 7 | 11 | 4 | 0 | 8 | 1 | 11 |
| 438 | 3 | 3 | 6 | 7 | 6 | 3 | 3 | 9 | 11 | 0 | 4 | 4 | 5 | 3 |
| 439 | 8 | 6 | 9 | 7 | 7 | 6 | 9 | 10 | 5 | 2 | 2 | 2 | 1 | 6 |
| 440 | 8 | 8 | 9 | 1 | 1 | 2 | 4 | 0 | 1 | 10 | 8 | 9 | 8 | 6 |
| 441 | 6 | 7 | 1 | 0 | 5 | 11 | 2 | 5 | 9 | 5 | 8 | 8 | 5 | 7 |
| 442 | 8 | 11 | 8 | 6 | 2 | 5 | 7 | 11 | 7 | 11 | 1 | 10 | 1 | 8 |
| 443 | 5 | 9 | 4 | 1 | 10 | 6 | 4 | 7 | 0 | 11 | 6 | 0 | 0 | 1 |
| 444 | 9 | 4 | 7 | 7 | 1 | 3 | 0 | 5 | 8 | 11 | 11 | 1 | 11 | 9 |
| 445 | 4 | 4 | 6 | 4 | 3 | 3 | 7 | 6 | 2 | 1 | 2 | 3 | 4 | 0 |
| 446 | 0 | 3 | 11 | 1 | 3 | 2 | 7 | 9 | 10 | 6 | 0 | 10 | 0 | 0 |
| 447 | 6 | 3 | 4 | 10 | 11 | 5 | 7 | 5 | 2 | 6 | 4 | 1 | 8 | 9 |
| 448 | 6 | 2 | 6 | 8 | 0 | 9 | 11 | 10 | 11 | 1 | 11 | 2 | 9 | 3 |
| 449 | 0 | 7 | 4 | 4 | 2 | 10 | 8 | 10 | 8 | 3 | 2 | 9 | 11 | 6 |
| 450 | 10 | 5 | 10 | 9 | 9 | 4 | 10 | 7 | 3 | 3 | 4 | 8 | 3 | 8 |
| 451 | 0 | 2 | 5 | 5 | 4 | 6 | 2 | 10 | 3 | 8 | 1 | 5 | 5 | 10 |
| 452 | 3 | 2 | 8 | 0 | 2 | 8 | 2 | 9 | 6 | 8 | 4 | 11 | 4 | 1 |
| 453 | 2 | 7 | 1 | 6 | 10 | 8 | 5 | 0 | 7 | 10 | 4 | 5 | 8 | 2 |
| 454 | 5 | 0 | 7 | 3 | 9 | 5 | 6 | 5 | 3 | 0 | 11 | 0 | 4 | 4 |
| 455 | 2 | 1 | 3 | 10 | 9 | 8 | 5 | 1 | 9 | 9 | 5 | 10 | 0 | 2 |
| 456 | 11 | 3 | 7 | 1 | 7 | 9 | 11 | 9 | 8 | 7 | 11 | 5 | 11 | 11 |
| 457 | 7 | 0 | 4 | 11 | 2 | 6 | 8 | 11 | 1 | 9 | 11 | 4 | 1 | 11 |
| 458 | 2 | 5 | 6 | 8 | 8 | 5 | 4 | 4 | 4 | 1 | 7 | 1 | 4 | 7 |
| 459 | 2 | 10 | 9 | 6 | 9 | 2 | 6 | 6 | 2 | 7 | 2 | 10 | 1 | 10 |
| 460 | 7 | 7 | 11 | 11 | 10 | 8 | 11 | 4 | 2 | 8 | 0 | 3 | 8 | 4 |
| 461 | 9 | 11 | 11 | 10 | 10 | 8 | 0 | 9 | 2 | 3 | 2 | 7 | 6 | 10 |
| 462 | 7 | 6 | 11 | 1 | 1 | 1 | 7 | 2 | 6 | 0 | 11 | 1 | 8 | 11 |
| 463 | 0 | 5 | 5 | 5 | 0 | 3 | 10 | 11 | 2 | 5 | 9 | 9 | 11 | 10 |
| 464 | 11 | 11 | 1 | 3 | 9 | 4 | 3 | 5 | 1 | 2 | 5 | 8 | 8 | 6 |
| 465 | 8 | 5 | 7 | 2 | 6 | 6 | 9 | 5 | 0 | 1 | 9 | 10 | 10 | 9 |
| 466 | 10 | 3 | 8 | 10 | 6 | 5 | 3 | 0 | 0 | 5 | 1 | 7 | 10 | 10 |
| 467 | 8 | 11 | 3 | 7 | 0 | 5 | 11 | 5 | 3 | 6 | 2 | 11 | 4 | 5 |
| 468 | 2 | 3 | 3 | 11 | 1 | 9 | 8 | 7 | 10 | 8 | 10 | 7 | 10 | 11 |
| 469 | 7 | 1 | 11 | 1 | 9 | 9 | 3 | 3 | 8 | 1 | 10 | 0 | 0 | 6 |
| 470 | 9 | 5 | 8 | 4 | 5 | 2 | 4 | 8 | 2 | 11 | 9 | 4 | 7 | 2 |
| 471 | 8 | 11 | 11 | 10 | 2 | 6 | 6 | 10 | 6 | 5 | 5 | 6 | 5 | 11 |
| 472 | 6 | 2 | 0 | 1 | 0 | 11 | 8 | 0 | 5 | 2 | 9 | 6 | 6 | 0 |
| 473 | 8 | 10 | 7 | 9 | 1 | 4 | 8 | 10 | 7 | 2 | 6 | 3 | 9 | 11 |
| 474 | 3 | 11 | 9 | 10 | 4 | 9 | 1 | 10 | 4 | 1 | 4 | 7 | 10 | 3 |
| 475 | 7 | 7 | 2 | 4 | 0 | 11 | 10 | 6 | 4 | 6 | 5 | 5 | 4 | 3 |
| 476 | 3 | 7 | 10 | 3 | 9 | 9 | 8 | 7 | 0 | 9 | 5 | 1 | 4 | 1 |
| 477 | 1 | 11 | 2 | 5 | 5 | 10 | 0 | 3 | 5 | 5 | 3 | 1 | 3 | 11 |
| 478 | 11 | 10 | 2 | 11 | 3 | 9 | 3 | 5 | 6 | 2 | 7 | 9 | 5 | 11 |
| 479 | 10 | 3 | 5 | 8 | 2 | 11 | 4 | 10 | 4 | 7 | 5 | 8 | 1 | 9 |
| 480 | 8 | 4 | 3 | 0 | 10 | 5 | 5 | 5 | 10 | 10 | 3 | 9 | 7 | 11 |
| 481 | 1 | 3 | 3 | 8 | 5 | 8 | 8 | 8 | 1 | 10 | 0 | 3 | 2 | 6 |
| 482 | 6 | 6 | 11 | 9 | 6 | 7 | 7 | 10 | 11 | 7 | 9 | 4 | 1 | 9 |
| 483 | 4 | 0 | 5 | 8 | 7 | 8 | 2 | 3 | 11 | 4 | 11 | 8 | 3 | 0 |
| 484 | 7 | 10 | 9 | 7 | 4 | 10 | 6 | 10 | 7 | 3 | 5 | 6 | 6 | 2 |
| 485 | 11 | 11 | 8 | 1 | 4 | 11 | 3 | 3 | 2 | 8 | 1 | 11 | 9 | 1 |
| 486 | 1 | 5 | 2 | 6 | 7 | 3 | 9 | 7 | 0 | 9 | 2 | 5 | 3 | 6 |
| 487 | 3 | 4 | 11 | 8 | 8 | 4 | 7 | 7 | 7 | 0 | 9 | 1 | 5 | 1 |
| 488 | 4 | 6 | 1 | 0 | 9 | 5 | 0 | 3 | 8 | 5 | 11 | 1 | 2 | 6 |
| 489 | 4 | 3 | 0 | 10 | 8 | 4 | 8 | 8 | 0 | 11 | 9 | 10 | 6 | 7 |
| 490 | 0 | 9 | 4 | 9 | 8 | 6 | 10 | 11 | 0 | 0 | 10 | 3 | 6 | 10 |
| 491 | 7 | 3 | 6 | 4 | 3 | 11 | 7 | 0 | 1 | 10 | 5 | 2 | 8 | 10 |
| 492 | 10 | 9 | 1 | 0 | 3 | 11 | 2 | 4 | 1 | 8 | 7 | 9 | 11 | 11 |
| 493 | 8 | 10 | 6 | 8 | 7 | 6 | 5 | 7 | 1 | 5 | 4 | 6 | 11 | 6 |
| 494 | 11 | 2 | 2 | 3 | 7 | 7 | 10 | 8 | 8 | 1 | 10 | 8 | 0 | 4 |
| 495 | 8 | 0 | 10 | 5 | 4 | 0 | 3 | 9 | 5 | 6 | 7 | 8 | 9 | 5 |
| 496 | 10 | 1 | 10 | 0 | 5 | 2 | 5 | 7 | 0 | 2 | 11 | 4 | 11 | 2 |
| 497 | 10 | 10 | 11 | 6 | 2 | 0 | 9 | 10 | 2 | 9 | 11 | 10 | 0 | 5 |
| 498 | 6 | 2 | 7 | 6 | 10 | 3 | 7 | 5 | 9 | 2 | 1 | 0 | 3 | 11 |
| 499 | 9 | 2 | 9 | 6 | 6 | 9 | 4 | 6 | 10 | 5 | 6 | 2 | 1 | 9 |
| 500 | 11 | 7 | 5 | 1 | 2 | 2 | 5 | 1 | 0 | 10 | 5 | 6 | 11 | 6 |
| 501 | 10 | 7 | 1 | 4 | 6 | 10 | 9 | 5 | 3 | 2 | 1 | 4 | 9 | 6 |
| 502 | 6 | 9 | 11 | 7 | 11 | 11 | 0 | 11 | 11 | 3 | 8 | 2 | 11 | 11 |
| 503 | 5 | 10 | 1 | 2 | 8 | 10 | 11 | 5 | 10 | 0 | 3 | 2 | 6 | 3 |
| 504 | 3 | 4 | 3 | 5 | 11 | 4 | 2 | 9 | 9 | 11 | 11 | 9 | 6 | 8 |
| 505 | 2 | 1 | 11 | 3 | 1 | 0 | 0 | 7 | 3 | 10 | 1 | 6 | 5 | 5 |
| 506 | 4 | 1 | 1 | 0 | 0 | 9 | 9 | 11 | 11 | 7 | 2 | 10 | 5 | 2 |
| 507 | 10 | 4 | 9 | 5 | 5 | 2 | 8 | 2 | 2 | 10 | 7 | 7 | 3 | 5 |
| 508 | 6 | 3 | 6 | 2 | 8 | 8 | 4 | 9 | 5 | 6 | 7 | 0 | 11 | 9 |
| 509 | 7 | 3 | 6 | 4 | 5 | 0 | 0 | 11 | 11 | 4 | 0 | 1 | 1 | 3 |
| 510 | 6 | 2 | 8 | 2 | 4 | 10 | 11 | 6 | 5 | 0 | 2 | 11 | 11 | 2 |
| 511 | 6 | 9 | 6 | 3 | 5 | 0 | 5 | 5 | 8 | 6 | 9 | 9 | 7 | 6 |
| 512 | 4 | 10 | 2 | 6 | 0 | 7 | 6 | 3 | 4 | 9 | 9 | 4 | 9 | 2 |
| 513 | 3 | 7 | 1 | 7 | 11 | 8 | 6 | 3 | 5 | 9 | 8 | 1 | 0 | 8 |
| 514 | 10 | 11 | 1 | 5 | 11 | 1 | 4 | 1 | 5 | 4 | 8 | 5 | 10 | 1 |
| 515 | 8 | 2 | 6 | 8 | 6 | 11 | 1 | 6 | 2 | 2 | 8 | 10 | 10 | 1 |
| 516 | 7 | 1 | 4 | 8 | 8 | 4 | 10 | 3 | 11 | 5 | 3 | 3 | 9 | 8 |
| 517 | 9 | 11 | 4 | 11 | 9 | 9 | 8 | 4 | 2 | 2 | 8 | 2 | 10 | 0 |
| 518 | 1 | 7 | 10 | 0 | 3 | 5 | 11 | 2 | 4 | 0 | 11 | 10 | 2 | 7 |
| 519 | 0 | 10 | 3 | 6 | 9 | 11 | 10 | 10 | 11 | 7 | 5 | 5 | 2 | 7 |
| 520 | 0 | 5 | 9 | 6 | 0 | 2 | 7 | 2 | 4 | 6 | 5 | 0 | 10 | 8 |
| 521 | 10 | 11 | 6 | 7 | 1 | 1 | 3 | 2 | 7 | 9 | 11 | 5 | 7 | 0 |
| 522 | 10 | 3 | 5 | 7 | 10 | 3 | 9 | 0 | 4 | 8 | 9 | 7 | 11 | 0 |
| 523 | 4 | 2 | 0 | 9 | 6 | 5 | 1 | 3 | 0 | 0 | 6 | 3 | 3 | 7 |
| 524 | 1 | 2 | 10 | 11 | 6 | 0 | 7 | 11 | 1 | 10 | 7 | 10 | 1 | 1 |
| 525 | 0 | 5 | 9 | 11 | 9 | 8 | 10 | 6 | 8 | 7 | 8 | 8 | 6 | 2 |
| 526 | 0 | 11 | 11 | 9 | 9 | 4 | 9 | 9 | 8 | 0 | 10 | 8 | 10 | 0 |
| 527 | 6 | 10 | 1 | 9 | 11 | 3 | 7 | 10 | 6 | 5 | 11 | 9 | 11 | 3 |
| 528 | 7 | 2 | 3 | 7 | 9 | 5 | 6 | 5 | 4 | 11 | 7 | 4 | 10 | 3 |
| 529 | 1 | 7 | 8 | 5 | 5 | 7 | 8 | 6 | 4 | 2 | 3 | 6 | 4 | 10 |
| 530 | 8 | 11 | 6 | 3 | 3 | 6 | 1 | 10 | 3 | 0 | 0 | 5 | 4 | 8 |
| 531 | 9 | 6 | 2 | 1 | 5 | 10 | 8 | 4 | 11 | 7 | 11 | 7 | 8 | 10 |
| 532 | 1 | 10 | 2 | 11 | 4 | 6 | 1 | 3 | 1 | 7 | 9 | 10 | 3 | 8 |
| 533 | 11 | 5 | 7 | 9 | 11 | 11 | 5 | 9 | 7 | 7 | 1 | 7 | 5 | 5 |
| 534 | 3 | 7 | 10 | 11 | 9 | 2 | 11 | 2 | 8 | 4 | 4 | 2 | 10 | 11 |
| 535 | 7 | 7 | 7 | 2 | 3 | 4 | 9 | 10 | 6 | 1 | 1 | 5 | 1 | 7 |
| 536 | 2 | 5 | 0 | 1 | 9 | 11 | 6 | 10 | 7 | 6 | 3 | 2 | 6 | 10 |
| 537 | 8 | 11 | 8 | 9 | 8 | 1 | 1 | 11 | 5 | 9 | 0 | 7 | 2 | 0 |
| 538 | 3 | 7 | 5 | 6 | 10 | 11 | 2 | 9 | 8 | 2 | 2 | 8 | 8 | 11 |
| 539 | 9 | 5 | 8 | 8 | 3 | 3 | 4 | 4 | 1 | 0 | 8 | 3 | 9 | 5 |
| 540 | 4 | 7 | 1 | 10 | 8 | 11 | 1 | 7 | 9 | 6 | 4 | 11 | 8 | 6 |
| 541 | 4 | 10 | 1 | 9 | 10 | 7 | 8 | 5 | 4 | 1 | 0 | 7 | 8 | 4 |
| 542 | 3 | 11 | 11 | 6 | 11 | 2 | 8 | 11 | 4 | 6 | 9 | 1 | 4 | 11 |
| 543 | 11 | 2 | 9 | 5 | 8 | 4 | 6 | 4 | 1 | 9 | 6 | 2 | 8 | 3 |
| 544 | 9 | 6 | 11 | 11 | 5 | 8 | 5 | 3 | 3 | 9 | 10 | 11 | 3 | 2 |
| 545 | 5 | 1 | 8 | 1 | 8 | 0 | 10 | 6 | 0 | 8 | 11 | 4 | 2 | 9 |
| 546 | 9 | 8 | 2 | 9 | 3 | 0 | 8 | 7 | 6 | 10 | 4 | 8 | 10 | 3 |
| 547 | 9 | 10 | 1 | 6 | 9 | 10 | 5 | 11 | 9 | 3 | 7 | 1 | 1 | 1 |
| 548 | 0 | 0 | 5 | 6 | 1 | 11 | 8 | 11 | 2 | 7 | 3 | 7 | 0 | 9 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 549 | 1 | 10 | 3 | 3 | 2 | 8 | 10 | 11 | 9 | 0 | 6 | 7 | 11 | 9 |
| 550 | 5 | 7 | 9 | 8 | 6 | 3 | 1 | 8 | 6 | 3 | 0 | 2 | 0 | 9 |
| 551 | 7 | 5 | 10 | 4 | 4 | 3 | 3 | 4 | 9 | 7 | 0 | 10 | 5 | 5 |
| 552 | 2 | 1 | 4 | 4 | 9 | 2 | 7 | 0 | 10 | 11 | 4 | 0 | 10 | 6 |
| 553 | 3 | 9 | 0 | 10 | 7 | 5 | 9 | 1 | 6 | 9 | 1 | 1 | 11 | 9 |
| 554 | 3 | 0 | 1 | 8 | 6 | 9 | 7 | 1 | 0 | 9 | 6 | 10 | 10 | 2 |
| 555 | 7 | 6 | 0 | 0 | 0 | 11 | 6 | 3 | 5 | 8 | 6 | 10 | 8 | 7 |
| 556 | 9 | 6 | 7 | 6 | 11 | 6 | 3 | 9 | 8 | 0 | 3 | 9 | 8 | 10 |
| 557 | 6 | 0 | 0 | 7 | 7 | 1 | 6 | 5 | 1 | 11 | 4 | 2 | 3 | 1 |
| 558 | 5 | 10 | 5 | 4 | 0 | 1 | 10 | 7 | 6 | 11 | 11 | 8 | 11 | 0 |
| 559 | 2 | 1 | 9 | 0 | 6 | 5 | 7 | 11 | 5 | 3 | 9 | 6 | 5 | 3 |
| 560 | 8 | 4 | 5 | 2 | 6 | 2 | 7 | 4 | 0 | 6 | 7 | 2 | 2 | 8 |
| 561 | 2 | 5 | 5 | 3 | 2 | 6 | 11 | 0 | 3 | 2 | 9 | 8 | 2 | 9 |
| 562 | 0 | 9 | 5 | 4 | 1 | 10 | 3 | 4 | 2 | 3 | 0 | 2 | 8 | 2 |
| 563 | 4 | 8 | 3 | 10 | 6 | 6 | 10 | 6 | 6 | 7 | 0 | 4 | 3 | 10 |
| 564 | 5 | 0 | 9 | 0 | 10 | 4 | 2 | 7 | 7 | 2 | 10 | 4 | 1 | 3 |
| 565 | 3 | 7 | 4 | 2 | 1 | 1 | 6 | 0 | 4 | 11 | 1 | 7 | 7 | 8 |
| 566 | 9 | 0 | 4 | 6 | 3 | 10 | 4 | 1 | 10 | 6 | 2 | 11 | 9 | 8 |
| 567 | 7 | 0 | 4 | 1 | 11 | 1 | 5 | 10 | 4 | 1 | 6 | 1 | 0 | 5 |
| 568 | 8 | 2 | 9 | 6 | 2 | 3 | 11 | 3 | 7 | 2 | 7 | 6 | 4 | 6 |
| 569 | 9 | 8 | 10 | 8 | 6 | 0 | 8 | 0 | 0 | 8 | 3 | 6 | 0 | 0 |
| 570 | 3 | 11 | 2 | 4 | 8 | 7 | 11 | 2 | 5 | 1 | 2 | 9 | 9 | 10 |
| 571 | 4 | 2 | 1 | 9 | 7 | 10 | 7 | 10 | 7 | 10 | 5 | 2 | 10 | 4 |
| 572 | 10 | 3 | 6 | 7 | 8 | 7 | 10 | 7 | 10 | 2 | 10 | 1 | 1 | 1 |
| 573 | 4 | 0 | 7 | 11 | 4 | 10 | 8 | 8 | 2 | 4 | 2 | 8 | 9 | 9 |
| 574 | 9 | 8 | 1 | 6 | 6 | 7 | 7 | 9 | 1 | 4 | 4 | 9 | 3 | 7 |
| 575 | 8 | 6 | 2 | 7 | 2 | 8 | 8 | 8 | 6 | 10 | 7 | 7 | 6 | 9 |
| 576 | 7 | 11 | 1 | 11 | 0 | 0 | 6 | 6 | 3 | 7 | 8 | 7 | 8 | 10 |
| 577 | 3 | 8 | 10 | 7 | 0 | 6 | 5 | 11 | 4 | 0 | 7 | 5 | 5 | 7 |
| 578 | 7 | 6 | 2 | 5 | 3 | 8 | 1 | 1 | 1 | 3 | 10 | 2 | 10 | 2 |
| 579 | 10 | 1 | 10 | 3 | 2 | 7 | 3 | 6 | 7 | 1 | 5 | 5 | 1 | 3 |
| 580 | 5 | 1 | 10 | 11 | 9 | 9 | 7 | 8 | 11 | 10 | 9 | 1 | 5 | 11 |
| 581 | 5 | 7 | 8 | 10 | 6 | 1 | 2 | 8 | 2 | 2 | 1 | 1 | 5 | 1 |
| 582 | 0 | 2 | 3 | 0 | 2 | 0 | 2 | 5 | 0 | 2 | 0 | 2 | 1 | 7 |
| 583 | 0 | 9 | 10 | 1 | 4 | 4 | 2 | 2 | 4 | 11 | 2 | 3 | 7 | 11 |
| 584 | 1 | 1 | 1 | 9 | 8 | 7 | 10 | 8 | 5 | 1 | 7 | 11 | 3 | 5 |
| 585 | 9 | 0 | 0 | 1 | 3 | 6 | 9 | 6 | 9 | 3 | 9 | 4 | 7 | 0 |
| 586 | 3 | 9 | 10 | 4 | 10 | 1 | 2 | 4 | 11 | 4 | 10 | 5 | 9 | 4 |
| 587 | 5 | 4 | 1 | 4 | 8 | 3 | 2 | 8 | 7 | 6 | 5 | 8 | 3 | 8 |
| 588 | 8 | 10 | 11 | 11 | 1 | 11 | 7 | 9 | 8 | 1 | 9 | 6 | 10 | 8 |
| 589 | 3 | 5 | 11 | 0 | 11 | 7 | 5 | 0 | 10 | 3 | 5 | 0 | 8 | 6 |
| 590 | 9 | 10 | 6 | 10 | 6 | 5 | 9 | 2 | 4 | 3 | 1 | 5 | 5 | 2 |
| 591 | 9 | 11 | 3 | 1 | 0 | 10 | 2 | 1 | 3 | 10 | 0 | 10 | 5 | 9 |
| 592 | 6 | 8 | 3 | 7 | 11 | 0 | 11 | 11 | 6 | 10 | 11 | 0 | 0 | 0 |
| 593 | 8 | 3 | 4 | 8 | 8 | 1 | 9 | 8 | 2 | 0 | 3 | 9 | 1 | 7 |
| 594 | 7 | 4 | 11 | 9 | 1 | 7 | 9 | 3 | 9 | 5 | 5 | 7 | 7 | 1 |
| 595 | 6 | 0 | 4 | 6 | 8 | 8 | 10 | 4 | 9 | 10 | 11 | 8 | 0 | 11 |
| 596 | 4 | 11 | 1 | 1 | 3 | 7 | 10 | 11 | 8 | 5 | 9 | 10 | 6 | 4 |
| 597 | 9 | 8 | 5 | 5 | 2 | 1 | 1 | 7 | 2 | 8 | 8 | 8 | 0 | 1 |
| 598 | 4 | 8 | 3 | 4 | 8 | 2 | 2 | 6 | 10 | 10 | 6 | 1 | 4 | 3 |
| 599 | 4 | 8 | 10 | 3 | 6 | 7 | 7 | 1 | 5 | 9 | 1 | 6 | 8 | 5 |
| 600 | 9 | 8 | 9 | 5 | 3 | 3 | 0 | 11 | 7 | 4 | 0 | 11 | 8 | 6 |
| 601 | 5 | 0 | 11 | 6 | 6 | 5 | 2 | 7 | 10 | 4 | 11 | 1 | 8 | 8 |
| 602 | 6 | 11 | 2 | 7 | 4 | 7 | 6 | 7 | 10 | 5 | 6 | 4 | 6 | 8 |
| 603 | 2 | 11 | 0 | 7 | 8 | 8 | 3 | 0 | 5 | 9 | 4 | 8 | 4 | 9 |
| 604 | 11 | 4 | 2 | 0 | 5 | 5 | 7 | 10 | 4 | 0 | 1 | 11 | 5 | 10 |
| 605 | 1 | 3 | 9 | 8 | 0 | 6 | 0 | 5 | 0 | 9 | 9 | 2 | 0 | 5 |
| 606 | 0 | 9 | 2 | 5 | 1 | 2 | 2 | 7 | 6 | 1 | 5 | 6 | 3 | 5 |
| 607 | 9 | 10 | 10 | 5 | 2 | 5 | 2 | 0 | 10 | 6 | 3 | 11 | 2 | 1 |
| 608 | 6 | 1 | 8 | 2 | 5 | 2 | 2 | 2 | 11 | 10 | 6 | 0 | 10 | 10 |
| 609 | 8 | 3 | 10 | 6 | 3 | 2 | 4 | 8 | 3 | 11 | 5 | 2 | 3 | 5 |
| 610 | 1 | 10 | 4 | 4 | 5 | 3 | 1 | 5 | 0 | 6 | 3 | 2 | 7 | 7 |
| 611 | 8 | 2 | 9 | 3 | 3 | 7 | 6 | 2 | 7 | 7 | 10 | 1 | 6 | 11 |
| 612 | 3 | 5 | 7 | 1 | 4 | 3 | 0 | 2 | 9 | 1 | 7 | 4 | 9 | 6 |
| 613 | 10 | 0 | 10 | 5 | 1 | 4 | 8 | 0 | 11 | 5 | 2 | 0 | 6 | 0 |
| 614 | 6 | 4 | 2 | 1 | 5 | 0 | 6 | 9 | 0 | 6 | 1 | 3 | 3 | 11 |
| 615 | 4 | 7 | 5 | 4 | 9 | 2 | 0 | 2 | 10 | 8 | 5 | 10 | 8 | 5 |
| 616 | 3 | 2 | 6 | 7 | 4 | 3 | 7 | 1 | 4 | 2 | 5 | 2 | 2 | 6 |
| 617 | 6 | 0 | 2 | 5 | 4 | 11 | 6 | 3 | 3 | 3 | 10 | 9 | 11 | 7 |
| 618 | 2 | 9 | 5 | 11 | 9 | 7 | 1 | 8 | 6 | 0 | 3 | 10 | 8 | 7 |
| 619 | 4 | 0 | 8 | 9 | 1 | 1 | 8 | 3 | 11 | 7 | 7 | 3 | 2 | 4 |
| 620 | 9 | 11 | 9 | 6 | 0 | 1 | 9 | 6 | 1 | 8 | 10 | 1 | 3 | 4 |
| 621 | 4 | 10 | 5 | 8 | 3 | 7 | 1 | 6 | 5 | 8 | 7 | 3 | 3 | 9 |
| 622 | 6 | 9 | 11 | 5 | 5 | 5 | 7 | 8 | 6 | 4 | 10 | 11 | 10 | 5 |
| 623 | 11 | 1 | 3 | 2 | 0 | 2 | 0 | 4 | 0 | 8 | 6 | 5 | 9 | 1 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 624 | 10 | 2 | 11 | 6 | 11 | 9 | 3 | 8 | 0 | 3 | 10 | 11 | 8 | 2 |
| 625 | 4 | 3 | 9 | 4 | 4 | 4 | 9 | 5 | 8 | 3 | 2 | 7 | 1 | 3 |
| 626 | 7 | 6 | 3 | 11 | 7 | 10 | 5 | 2 | 4 | 4 | 4 | 9 | 0 | 6 |
| 627 | 10 | 7 | 11 | 11 | 6 | 9 | 8 | 5 | 7 | 7 | 6 | 11 | 7 | 9 |
| 628 | 11 | 8 | 8 | 4 | 9 | 1 | 3 | 10 | 4 | 8 | 4 | 0 | 2 | 4 |
| 629 | 6 | 10 | 2 | 6 | 5 | 2 | 5 | 7 | 2 | 3 | 4 | 9 | 6 | 3 |
| 630 | 7 | 0 | 9 | 11 | 5 | 2 | 3 | 5 | 8 | 0 | 8 | 4 | 10 | 6 |
| 631 | 1 | 10 | 6 | 1 | 10 | 9 | 2 | 10 | 0 | 9 | 4 | 8 | 0 | 2 |
| 632 | 0 | 4 | 6 | 1 | 7 | 7 | 3 | 0 | 9 | 8 | 6 | 10 | 0 | 9 |
| 633 | 9 | 9 | 6 | 1 | 0 | 9 | 8 | 10 | 2 | 11 | 9 | 7 | 4 | 9 |
| 634 | 8 | 8 | 9 | 9 | 11 | 7 | 0 | 10 | 1 | 9 | 6 | 5 | 4 | 5 |
| 635 | 1 | 3 | 4 | 8 | 4 | 5 | 8 | 0 | 8 | 11 | 7 | 0 | 11 | 3 |
| 636 | 3 | 3 | 0 | 4 | 9 | 0 | 7 | 10 | 4 | 3 | 10 | 7 | 6 | 5 |
| 637 | 10 | 7 | 10 | 0 | 3 | 10 | 9 | 11 | 8 | 7 | 0 | 9 | 0 | 5 |
| 638 | 11 | 6 | 8 | 8 | 8 | 10 | 4 | 9 | 8 | 10 | 8 | 0 | 3 | 1 |
| 639 | 10 | 7 | 1 | 0 | 4 | 5 | 11 | 0 | 11 | 3 | 3 | 9 | 6 | 2 |
| 640 | 8 | 7 | 1 | 11 | 2 | 8 | 2 | 2 | 8 | 11 | 2 | 6 | 5 | 4 |
| 641 | 1 | 6 | 9 | 10 | 4 | 4 | 11 | 11 | 2 | 9 | 4 | 2 | 6 | 7 |
| 642 | 6 | 6 | 5 | 8 | 7 | 2 | 6 | 8 | 9 | 1 | 11 | 3 | 4 | 5 |
| 643 | 5 | 2 | 2 | 11 | 6 | 1 | 10 | 7 | 3 | 1 | 9 | 11 | 6 | 6 |
| 644 | 6 | 4 | 11 | 1 | 11 | 0 | 5 | 10 | 9 | 3 | 3 | 9 | 1 | 2 |
| 645 | 2 | 10 | 0 | 9 | 8 | 2 | 0 | 8 | 8 | 9 | 0 | 3 | 8 | 7 |
| 646 | 3 | 1 | 8 | 3 | 9 | 3 | 3 | 6 | 3 | 6 | 6 | 6 | 8 | 0 |
| 647 | 4 | 1 | 7 | 1 | 3 | 0 | 6 | 8 | 5 | 4 | 9 | 3 | 4 | 10 |
| 648 | 10 | 4 | 7 | 11 | 3 | 8 | 3 | 1 | 5 | 9 | 7 | 0 | 9 | 4 |
| 649 | 2 | 0 | 11 | 11 | 8 | 3 | 3 | 9 | 7 | 11 | 8 | 6 | 4 | 0 |
| 650 | 11 | 9 | 2 | 10 | 4 | 10 | 9 | 2 | 1 | 10 | 11 | 4 | 7 | 1 |
| 651 | 8 | 4 | 4 | 4 | 10 | 1 | 3 | 11 | 7 | 0 | 7 | 6 | 11 | 11 |
| 652 | 5 | 8 | 7 | 11 | 1 | 5 | 2 | 11 | 11 | 1 | 8 | 3 | 2 | 3 |
| 653 | 8 | 3 | 3 | 0 | 11 | 11 | 11 | 4 | 5 | 2 | 0 | 7 | 5 | 4 |
| 654 | 8 | 2 | 10 | 2 | 6 | 0 | 6 | 3 | 2 | 11 | 4 | 0 | 5 | 0 |
| 655 | 5 | 9 | 3 | 9 | 7 | 0 | 4 | 8 | 3 | 8 | 11 | 7 | 10 | 6 |
| 656 | 5 | 1 | 8 | 11 | 2 | 1 | 11 | 10 | 5 | 0 | 7 | 9 | 3 | 10 |
| 657 | 6 | 4 | 7 | 8 | 5 | 8 | 10 | 2 | 8 | 9 | 5 | 11 | 5 | 0 |
| 658 | 11 | 2 | 0 | 8 | 1 | 7 | 0 | 1 | 2 | 4 | 9 | 9 | 0 | 0 |
| 659 | 4 | 1 | 6 | 7 | 0 | 2 | 4 | 7 | 6 | 4 | 3 | 5 | 0 | 11 |
| 660 | 3 | 5 | 11 | 5 | 10 | 2 | 9 | 4 | 8 | 2 | 7 | 9 | 6 | 9 |
| 661 | 1 | 11 | 9 | 8 | 0 | 10 | 10 | 7 | 5 | 3 | 1 | 7 | 9 | 7 |
| 662 | 9 | 11 | 1 | 2 | 6 | 5 | 3 | 7 | 3 | 6 | 8 | 1 | 2 | 7 |
| 663 | 7 | 8 | 9 | 9 | 3 | 5 | 9 | 4 | 3 | 1 | 3 | 4 | 3 | 0 |
| 664 | 11 | 6 | 11 | 11 | 5 | 6 | 2 | 7 | 11 | 0 | 0 | 3 | 9 | 6 |
| 665 | 3 | 7 | 0 | 5 | 9 | 6 | 9 | 0 | 5 | 1 | 8 | 10 | 9 | 11 |
| 666 | 4 | 1 | 8 | 6 | 7 | 10 | 5 | 2 | 11 | 11 | 7 | 6 | 3 | 9 |
| 667 | 6 | 4 | 0 | 5 | 7 | 10 | 1 | 3 | 6 | 5 | 8 | 5 | 11 | 4 |
| 668 | 1 | 8 | 8 | 1 | 8 | 7 | 1 | 1 | 7 | 0 | 7 | 5 | 2 | 1 |
| 669 | 7 | 5 | 6 | 0 | 10 | 3 | 0 | 3 | 5 | 9 | 7 | 3 | 2 | 8 |
| 670 | 0 | 4 | 7 | 0 | 9 | 7 | 1 | 0 | 6 | 4 | 7 | 4 | 9 | 0 |
| 671 | 2 | 1 | 6 | 2 | 3 | 5 | 5 | 0 | 4 | 3 | 5 | 9 | 10 | 4 |
| 672 | 4 | 7 | 8 | 2 | 7 | 8 | 7 | 7 | 1 | 8 | 2 | 6 | 4 | 2 |
| 673 | 3 | 1 | 6 | 10 | 3 | 0 | 3 | 7 | 0 | 5 | 5 | 3 | 1 | 9 |
| 674 | 2 | 3 | 1 | 1 | 9 | 1 | 0 | 5 | 3 | 0 | 2 | 2 | 1 | 9 |
| 675 | 11 | 3 | 2 | 11 | 7 | 8 | 8 | 1 | 3 | 9 | 2 | 4 | 8 | 1 |
| 676 | 3 | 4 | 8 | 8 | 3 | 8 | 2 | 2 | 2 | 1 | 3 | 0 | 0 | 8 |
| 677 | 4 | 0 | 0 | 4 | 2 | 11 | 8 | 1 | 10 | 5 | 5 | 6 | 10 | 3 |
| 678 | 5 | 6 | 11 | 10 | 1 | 4 | 2 | 6 | 9 | 7 | 7 | 8 | 11 | 9 |
| 679 | 11 | 1 | 4 | 10 | 5 | 0 | 3 | 4 | 4 | 9 | 3 | 11 | 11 | 3 |
| 680 | 1 | 9 | 10 | 9 | 7 | 9 | 6 | 5 | 3 | 6 | 1 | 10 | 8 | 7 |
| 681 | 6 | 10 | 4 | 2 | 6 | 9 | 5 | 11 | 7 | 9 | 6 | 9 | 0 | 4 |
| 682 | 11 | 2 | 9 | 9 | 0 | 4 | 1 | 6 | 9 | 6 | 11 | 0 | 2 | 0 |
| 683 | 9 | 4 | 6 | 6 | 4 | 11 | 8 | 8 | 1 | 5 | 4 | 2 | 0 | 3 |
| 684 | 11 | 9 | 8 | 8 | 1 | 1 | 9 | 7 | 0 | 5 | 0 | 11 | 2 | 7 |
| 685 | 8 | 8 | 11 | 1 | 4 | 6 | 2 | 4 | 4 | 1 | 11 | 8 | 3 | 9 |
| 686 | 4 | 10 | 11 | 3 | 8 | 0 | 7 | 8 | 3 | 6 | 10 | 7 | 3 | 1 |
| 687 | 3 | 10 | 5 | 9 | 9 | 0 | 2 | 3 | 6 | 8 | 3 | 6 | 9 | 10 |
| 688 | 5 | 8 | 11 | 0 | 10 | 8 | 10 | 5 | 8 | 4 | 10 | 3 | 7 | 1 |
| 689 | 8 | 11 | 11 | 9 | 10 | 5 | 3 | 7 | 0 | 7 | 4 | 0 | 8 | 9 |
| 690 | 2 | 0 | 8 | 8 | 3 | 2 | 7 | 7 | 7 | 3 | 7 | 6 | 9 | 8 |
| 691 | 4 | 3 | 5 | 9 | 8 | 2 | 0 | 1 | 1 | 7 | 10 | 7 | 10 | 3 |
| 692 | 5 | 2 | 1 | 11 | 5 | 7 | 11 | 9 | 7 | 6 | 7 | 2 | 1 | 9 |
| 693 | 7 | 7 | 5 | 9 | 0 | 0 | 5 | 1 | 3 | 11 | 9 | 3 | 0 | 1 |
| 694 | 10 | 0 | 8 | 2 | 7 | 11 | 4 | 5 | 10 | 7 | 11 | 10 | 11 | 3 |
| 695 | 1 | 10 | 0 | 6 | 10 | 10 | 7 | 6 | 4 | 1 | 8 | 2 | 3 | 7 |
| 696 | 3 | 7 | 10 | 7 | 6 | 5 | 8 | 6 | 5 | 0 | 0 | 11 | 6 | 10 |
| 697 | 0 | 10 | 0 | 2 | 6 | 11 | 1 | 5 | 5 | 1 | 4 | 8 | 11 | 4 |
| 698 | 9 | 9 | 7 | 11 | 4 | 2 | 5 | 8 | 0 | 3 | 8 | 4 | 6 | 11 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 699 | 5 | 5 | 4 | 7 | 4 | 4 | 9 | 9 | 11 | 8 | 11 | 11 | 9 | 11 |
| 700 | 0 | 0 | 10 | 2 | 6 | 3 | 0 | 7 | 9 | 9 | 1 | 10 | 11 | 8 |
| 701 | 4 | 10 | 3 | 1 | 2 | 11 | 0 | 6 | 3 | 2 | 8 | 8 | 8 | 7 |
| 702 | 8 | 1 | 0 | 9 | 8 | 2 | 7 | 9 | 11 | 1 | 6 | 8 | 5 | 9 |
| 703 | 4 | 9 | 7 | 5 | 1 | 1 | 11 | 1 | 10 | 11 | 2 | 5 | 1 | 8 |
| 704 | 9 | 1 | 6 | 1 | 2 | 2 | 9 | 8 | 9 | 1 | 0 | 8 | 9 | 3 |
| 705 | 10 | 0 | 8 | 6 | 8 | 4 | 8 | 5 | 0 | 9 | 6 | 4 | 5 | 6 |
| 706 | 3 | 4 | 9 | 1 | 6 | 8 | 9 | 6 | 2 | 6 | 0 | 10 | 11 | 9 |
| 707 | 3 | 3 | 8 | 3 | 7 | 10 | 3 | 8 | 4 | 11 | 11 | 1 | 0 | 1 |
| 708 | 4 | 2 | 9 | 3 | 3 | 9 | 9 | 1 | 9 | 6 | 1 | 2 | 0 | 4 |
| 709 | 5 | 2 | 1 | 10 | 5 | 5 | 8 | 3 | 0 | 9 | 3 | 1 | 5 | 10 |
| 710 | 6 | 9 | 4 | 7 | 2 | 1 | 3 | 9 | 9 | 7 | 7 | 0 | 10 | 6 |
| 711 | 3 | 6 | 9 | 4 | 3 | 11 | 10 | 8 | 0 | 0 | 2 | 10 | 9 | 3 |
| 712 | 11 | 8 | 6 | 8 | 11 | 3 | 9 | 0 | 1 | 8 | 2 | 1 | 7 | 6 |
| 713 | 3 | 6 | 3 | 9 | 5 | 5 | 0 | 4 | 2 | 6 | 9 | 10 | 6 | 10 |
| 714 | 7 | 3 | 10 | 10 | 11 | 0 | 0 | 4 | 8 | 9 | 8 | 2 | 3 | 2 |
| 715 | 9 | 4 | 4 | 11 | 4 | 7 | 11 | 2 | 0 | 0 | 6 | 5 | 11 | 1 |
| 716 | 9 | 0 | 0 | 4 | 4 | 2 | 5 | 1 | 1 | 9 | 6 | 1 | 3 | 6 |
| 717 | 9 | 8 | 8 | 0 | 7 | 0 | 2 | 7 | 5 | 7 | 9 | 5 | 6 | 9 |
| 718 | 1 | 2 | 2 | 3 | 2 | 8 | 5 | 4 | 11 | 2 | 4 | 6 | 7 | 8 |
| 719 | 6 | 0 | 1 | 7 | 11 | 10 | 3 | 8 | 8 | 9 | 5 | 4 | 7 | 10 |
| 720 | 4 | 5 | 10 | 5 | 0 | 4 | 9 | 0 | 7 | 2 | 5 | 1 | 10 | 6 |
| 721 | 9 | 7 | 5 | 7 | 1 | 6 | 5 | 5 | 3 | 7 | 7 | 8 | 4 | 11 |
| 722 | 0 | 10 | 5 | 5 | 11 | 6 | 11 | 5 | 8 | 4 | 2 | 6 | 7 | 8 |
| 723 | 8 | 3 | 8 | 5 | 3 | 11 | 3 | 10 | 10 | 10 | 2 | 10 | 5 | 5 |
| 724 | 5 | 10 | 3 | 10 | 1 | 9 | 2 | 10 | 2 | 8 | 8 | 11 | 6 | 4 |
| 725 | 9 | 10 | 3 | 0 | 1 | 10 | 10 | 7 | 11 | 10 | 8 | 2 | 10 | 2 |
| 726 | 11 | 5 | 2 | 2 | 4 | 4 | 1 | 8 | 7 | 2 | 7 | 4 | 11 | 7 |
| 727 | 3 | 4 | 7 | 7 | 10 | 6 | 3 | 8 | 10 | 4 | 0 | 5 | 0 | 0 |
| 728 | 4 | 2 | 10 | 9 | 11 | 11 | 9 | 1 | 2 | 2 | 10 | 9 | 11 | 11 |
| 729 | 11 | 2 | 10 | 2 | 11 | 9 | 9 | 8 | 8 | 7 | 9 | 10 | 1 | 7 |
| 730 | 8 | 8 | 3 | 8 | 7 | 3 | 11 | 8 | 0 | 11 | 4 | 11 | 3 | 8 |
| 731 | 9 | 0 | 1 | 5 | 2 | 9 | 4 | 2 | 9 | 10 | 9 | 10 | 0 | 6 |
| 732 | 1 | 4 | 1 | 8 | 10 | 1 | 3 | 2 | 3 | 3 | 8 | 2 | 4 | 4 |
| 733 | 7 | 6 | 5 | 3 | 5 | 4 | 10 | 10 | 1 | 1 | 11 | 4 | 8 | 1 |
| 734 | 1 | 5 | 0 | 4 | 1 | 11 | 5 | 6 | 6 | 2 | 5 | 0 | 2 | 2 |
| 735 | 2 | 5 | 6 | 5 | 9 | 8 | 10 | 4 | 5 | 11 | 0 | 6 | 3 | 4 |
| 736 | 4 | 2 | 10 | 2 | 4 | 11 | 0 | 5 | 9 | 0 | 0 | 5 | 0 | 7 |
| 737 | 2 | 8 | 6 | 6 | 8 | 2 | 7 | 10 | 4 | 9 | 9 | 7 | 3 | 3 |
| 738 | 0 | 1 | 3 | 5 | 8 | 3 | 11 | 7 | 1 | 4 | 0 | 4 | 4 | 1 |
| 739 | 2 | 1 | 7 | 7 | 0 | 6 | 1 | 0 | 9 | 8 | 2 | 0 | 3 | 9 |
| 740 | 10 | 3 | 9 | 6 | 5 | 6 | 8 | 7 | 11 | 8 | 4 | 2 | 5 | 8 |
| 741 | 5 | 2 | 2 | 0 | 3 | 8 | 3 | 8 | 2 | 0 | 6 | 5 | 11 | 8 |
| 742 | 1 | 6 | 1 | 4 | 8 | 1 | 4 | 4 | 4 | 7 | 5 | 2 | 6 | 2 |
| 743 | 2 | 8 | 4 | 10 | 0 | 3 | 1 | 3 | 2 | 11 | 0 | 2 | 5 | 6 |
| 744 | 8 | 8 | 0 | 4 | 5 | 9 | 11 | 0 | 7 | 6 | 5 | 1 | 11 | 3 |
| 745 | 10 | 11 | 9 | 2 | 2 | 4 | 3 | 7 | 9 | 10 | 11 | 7 | 8 | 10 |
| 746 | 4 | 9 | 10 | 0 | 6 | 7 | 9 | 7 | 8 | 10 | 2 | 4 | 9 | 4 |
| 747 | 6 | 10 | 11 | 10 | 7 | 0 | 6 | 1 | 11 | 7 | 5 | 10 | 8 | 4 |
| 748 | 11 | 3 | 0 | 6 | 4 | 1 | 10 | 8 | 6 | 0 | 9 | 11 | 2 | 4 |
| 749 | 10 | 5 | 10 | 8 | 5 | 7 | 2 | 1 | 6 | 9 | 5 | 8 | 9 | 7 |
| 750 | 11 | 3 | 11 | 1 | 10 | 4 | 3 | 0 | 5 | 3 | 6 | 6 | 1 | 1 |
| 751 | 2 | 2 | 3 | 10 | 0 | 11 | 11 | 4 | 1 | 4 | 9 | 3 | 1 | 2 |
| 752 | 1 | 11 | 2 | 4 | 4 | 5 | 10 | 0 | 6 | 8 | 6 | 1 | 1 | 4 |
| 753 | 8 | 2 | 0 | 3 | 4 | 4 | 9 | 2 | 0 | 5 | 3 | 11 | 8 | 4 |
| 754 | 9 | 11 | 7 | 5 | 5 | 10 | 8 | 9 | 9 | 3 | 6 | 11 | 2 | 3 |
| 755 | 0 | 0 | 3 | 0 | 2 | 6 | 0 | 4 | 10 | 9 | 10 | 11 | 2 | 5 |
| 756 | 7 | 11 | 6 | 3 | 8 | 6 | 7 | 4 | 9 | 1 | 8 | 8 | 1 | 6 |
| 757 | 0 | 4 | 8 | 8 | 9 | 11 | 7 | 2 | 10 | 0 | 1 | 6 | 11 | 9 |
| 758 | 6 | 1 | 5 | 2 | 9 | 0 | 3 | 1 | 2 | 0 | 4 | 2 | 0 | 11 |
| 759 | 4 | 7 | 5 | 6 | 4 | 3 | 0 | 4 | 1 | 9 | 3 | 2 | 5 | 0 |
| 760 | 7 | 9 | 6 | 7 | 2 | 0 | 4 | 1 | 2 | 10 | 8 | 3 | 8 | 9 |
| 761 | 10 | 6 | 1 | 8 | 4 | 1 | 11 | 9 | 8 | 8 | 6 | 4 | 5 | 3 |
| 762 | 6 | 7 | 1 | 8 | 8 | 2 | 9 | 11 | 4 | 5 | 5 | 11 | 10 | 4 |
| 763 | 11 | 11 | 10 | 5 | 7 | 3 | 1 | 10 | 3 | 4 | 1 | 4 | 11 | 2 |
| 764 | 0 | 6 | 8 | 7 | 4 | 1 | 9 | 6 | 9 | 3 | 4 | 6 | 11 | 10 |
| 765 | 0 | 1 | 9 | 10 | 3 | 7 | 8 | 5 | 9 | 3 | 8 | 9 | 3 | 5 |
| 766 | 0 | 6 | 4 | 2 | 9 | 6 | 9 | 6 | 4 | 1 | 0 | 7 | 6 | 3 |
| 767 | 7 | 5 | 6 | 3 | 3 | 9 | 10 | 2 | 3 | 8 | 2 | 11 | 6 | 5 |
| 768 | 4 | 0 | 4 | 1 | 4 | 5 | 1 | 10 | 9 | 0 | 11 | 2 | 6 | 3 |
| 769 | 2 | 11 | 8 | 3 | 10 | 6 | 8 | 10 | 4 | 5 | 2 | 3 | 9 | 0 |
| 770 | 1 | 4 | 8 | 10 | 0 | 2 | 6 | 10 | 10 | 3 | 6 | 2 | 11 | 7 |
| 771 | 3 | 7 | 7 | 2 | 1 | 9 | 4 | 11 | 0 | 8 | 11 | 10 | 3 | 10 |
| 772 | 9 | 11 | 8 | 9 | 5 | 9 | 3 | 9 | 11 | 9 | 3 | 3 | 7 | 5 |
| 773 | 6 | 0 | 9 | 1 | 5 | 5 | 6 | 11 | 8 | 8 | 10 | 2 | 4 | 9 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 774 | 7 | 8 | 8 | 11 | 6 | 7 | 8 | 0 | 10 | 1 | 0 | 2 | 10 | 9 |
| 775 | 2 | 3 | 10 | 6 | 2 | 2 | 0 | 3 | 8 | 8 | 6 | 9 | 10 | 6 |
| 776 | 7 | 0 | 4 | 5 | 6 | 11 | 0 | 5 | 11 | 4 | 5 | 9 | 9 | 9 |
| 777 | 3 | 10 | 9 | 6 | 7 | 3 | 4 | 10 | 2 | 11 | 8 | 1 | 10 | 7 |
| 778 | 3 | 11 | 8 | 8 | 5 | 4 | 0 | 5 | 6 | 4 | 8 | 2 | 1 | 7 |
| 779 | 1 | 7 | 7 | 7 | 7 | 1 | 10 | 1 | 7 | 1 | 8 | 11 | 8 | 10 |
| 780 | 6 | 1 | 6 | 0 | 0 | 10 | 7 | 8 | 7 | 3 | 2 | 5 | 8 | 1 |
| 781 | 7 | 4 | 0 | 4 | 4 | 9 | 4 | 5 | 11 | 6 | 7 | 3 | 2 | 0 |
| 782 | 9 | 2 | 3 | 4 | 0 | 4 | 2 | 11 | 11 | 0 | 1 | 1 | 8 | 7 |
| 783 | 11 | 9 | 6 | 10 | 0 | 4 | 10 | 5 | 4 | 8 | 11 | 11 | 3 | 4 |
| 784 | 5 | 8 | 6 | 8 | 7 | 0 | 1 | 6 | 5 | 5 | 6 | 8 | 1 | 2 |
| 785 | 6 | 6 | 5 | 5 | 1 | 2 | 7 | 6 | 0 | 0 | 9 | 0 | 6 | 10 |
| 786 | 5 | 3 | 8 | 11 | 5 | 3 | 10 | 7 | 2 | 10 | 8 | 9 | 2 | 8 |
| 787 | 8 | 1 | 8 | 10 | 4 | 9 | 5 | 1 | 7 | 6 | 4 | 11 | 7 | 7 |
| 788 | 3 | 1 | 0 | 9 | 9 | 0 | 10 | 2 | 7 | 9 | 6 | 0 | 11 | 1 |
| 789 | 8 | 3 | 4 | 11 | 0 | 5 | 6 | 7 | 1 | 5 | 7 | 3 | 5 | 10 |
| 790 | 11 | 9 | 7 | 4 | 11 | 10 | 1 | 5 | 9 | 2 | 2 | 9 | 1 | 7 |
| 791 | 11 | 1 | 3 | 8 | 9 | 0 | 8 | 5 | 9 | 2 | 10 | 11 | 9 | 11 |
| 792 | 0 | 8 | 3 | 7 | 1 | 2 | 5 | 3 | 5 | 3 | 5 | 8 | 10 | 10 |
| 793 | 8 | 2 | 1 | 8 | 3 | 1 | 9 | 6 | 4 | 4 | 10 | 7 | 9 | 10 |
| 794 | 0 | 4 | 2 | 3 | 3 | 10 | 5 | 1 | 2 | 10 | 5 | 2 | 2 | 8 |
| 795 | 10 | 11 | 11 | 7 | 4 | 3 | 4 | 6 | 0 | 7 | 6 | 2 | 10 | 5 |
| 796 | 1 | 10 | 3 | 11 | 7 | 7 | 6 | 2 | 8 | 11 | 0 | 3 | 3 | 0 |
| 797 | 6 | 11 | 1 | 8 | 0 | 0 | 9 | 5 | 5 | 0 | 10 | 9 | 5 | 5 |
| 798 | 4 | 10 | 11 | 11 | 6 | 3 | 0 | 2 | 3 | 0 | 9 | 9 | 1 | 10 |
| 799 | 0 | 0 | 9 | 9 | 4 | 3 | 6 | 5 | 2 | 6 | 0 | 3 | 1 | 6 |
| 800 | 10 | 4 | 4 | 0 | 5 | 3 | 9 | 4 | 10 | 1 | 3 | 8 | 4 | 5 |
| 801 | 6 | 0 | 8 | 11 | 2 | 2 | 9 | 11 | 9 | 3 | 10 | 5 | 6 | 1 |
| 802 | 5 | 9 | 10 | 10 | 1 | 3 | 4 | 3 | 8 | 7 | 9 | 0 | 4 | 4 |
| 803 | 2 | 6 | 1 | 4 | 4 | 6 | 0 | 9 | 2 | 11 | 8 | 3 | 2 | 7 |
| 804 | 5 | 0 | 6 | 0 | 11 | 5 | 1 | 2 | 3 | 8 | 3 | 6 | 1 | 1 |
| 805 | 0 | 11 | 10 | 5 | 1 | 3 | 11 | 2 | 11 | 10 | 10 | 7 | 0 | 3 |
| 806 | 11 | 7 | 11 | 4 | 11 | 2 | 8 | 9 | 6 | 4 | 8 | 9 | 8 | 1 |
| 807 | 2 | 1 | 4 | 8 | 4 | 9 | 11 | 6 | 8 | 3 | 4 | 7 | 2 | 4 |
| 808 | 0 | 4 | 10 | 10 | 2 | 11 | 7 | 3 | 0 | 1 | 4 | 0 | 9 | 11 |
| 809 | 2 | 0 | 9 | 3 | 10 | 10 | 1 | 3 | 0 | 11 | 3 | 7 | 10 | 11 |
| 810 | 10 | 5 | 5 | 0 | 1 | 1 | 3 | 3 | 0 | 11 | 8 | 4 | 10 | 5 |
| 811 | 0 | 6 | 9 | 3 | 8 | 4 | 4 | 5 | 9 | 9 | 0 | 7 | 11 | 4 |
| 812 | 9 | 4 | 8 | 2 | 8 | 10 | 5 | 10 | 10 | 2 | 1 | 11 | 1 | 0 |
| 813 | 4 | 10 | 2 | 0 | 11 | 4 | 0 | 11 | 0 | 11 | 6 | 5 | 1 | 2 |
| 814 | 5 | 8 | 11 | 11 | 11 | 4 | 3 | 5 | 0 | 6 | 0 | 9 | 11 | 5 |
| 815 | 8 | 7 | 6 | 3 | 4 | 7 | 1 | 5 | 2 | 9 | 4 | 9 | 2 | 11 |
| 816 | 9 | 5 | 10 | 3 | 6 | 6 | 1 | 0 | 2 | 1 | 1 | 9 | 5 | 4 |
| 817 | 8 | 5 | 4 | 0 | 9 | 6 | 11 | 8 | 8 | 9 | 3 | 4 | 8 | 1 |
| 818 | 4 | 9 | 3 | 3 | 1 | 0 | 10 | 4 | 8 | 1 | 4 | 11 | 2 | 9 |
| 819 | 5 | 1 | 4 | 4 | 0 | 0 | 9 | 1 | 11 | 1 | 0 | 9 | 10 | 0 |
| 820 | 7 | 6 | 2 | 1 | 0 | 1 | 11 | 7 | 3 | 6 | 0 | 7 | 0 | 4 |
| 821 | 10 | 3 | 8 | 4 | 8 | 11 | 11 | 1 | 1 | 1 | 4 | 1 | 11 | 8 |
| 822 | 9 | 8 | 2 | 7 | 0 | 6 | 3 | 10 | 0 | 3 | 0 | 4 | 1 | 3 |
| 823 | 0 | 9 | 11 | 4 | 7 | 10 | 6 | 7 | 7 | 0 | 5 | 0 | 4 | 9 |
| 824 | 8 | 1 | 2 | 6 | 10 | 11 | 0 | 11 | 1 | 5 | 10 | 4 | 7 | 9 |
| 825 | 6 | 8 | 7 | 5 | 7 | 7 | 2 | 1 | 0 | 3 | 3 | 9 | 2 | 11 |
| 826 | 8 | 8 | 5 | 1 | 8 | 9 | 7 | 2 | 9 | 9 | 2 | 6 | 0 | 10 |
| 827 | 7 | 3 | 0 | 10 | 0 | 5 | 5 | 6 | 1 | 0 | 11 | 10 | 0 | 0 |
| 828 | 7 | 2 | 8 | 0 | 7 | 10 | 3 | 2 | 0 | 10 | 6 | 11 | 2 | 0 |
| 829 | 6 | 7 | 7 | 7 | 5 | 0 | 11 | 8 | 4 | 2 | 2 | 5 | 9 | 5 |
| 830 | 1 | 6 | 5 | 0 | 1 | 8 | 2 | 7 | 3 | 9 | 5 | 9 | 9 | 1 |
| 831 | 8 | 2 | 1 | 0 | 3 | 2 | 11 | 10 | 0 | 8 | 3 | 8 | 10 | 3 |
| 832 | 7 | 0 | 3 | 8 | 6 | 5 | 3 | 0 | 9 | 2 | 5 | 10 | 1 | 3 |
| 833 | 4 | 2 | 0 | 11 | 1 | 6 | 5 | 8 | 5 | 1 | 4 | 5 | 0 | 8 |
| 834 | 6 | 8 | 1 | 9 | 9 | 6 | 11 | 1 | 9 | 8 | 3 | 3 | 3 | 5 |
| 835 | 11 | 10 | 0 | 3 | 8 | 10 | 3 | 9 | 1 | 1 | 10 | 4 | 2 | 0 |
| 836 | 10 | 6 | 0 | 3 | 4 | 8 | 1 | 10 | 8 | 2 | 9 | 3 | 10 | 7 |
| 837 | 0 | 4 | 11 | 2 | 9 | 5 | 10 | 2 | 1 | 9 | 7 | 1 | 1 | 10 |
| 838 | 8 | 9 | 5 | 3 | 2 | 1 | 6 | 8 | 11 | 9 | 5 | 8 | 7 | 4 |
| 839 | 6 | 9 | 0 | 4 | 5 | 9 | 1 | 11 | 11 | 5 | 4 | 10 | 0 | 6 |
| 840 | 4 | 9 | 11 | 9 | 5 | 6 | 4 | 3 | 7 | 6 | 2 | 4 | 2 | 5 |
| 841 | 11 | 1 | 4 | 6 | 10 | 1 | 4 | 3 | 8 | 4 | 4 | 0 | 9 | 0 |
| 842 | 11 | 8 | 8 | 5 | 7 | 5 | 0 | 4 | 6 | 3 | 5 | 8 | 9 | 6 |
| 843 | 3 | 9 | 1 | 11 | 6 | 11 | 1 | 3 | 10 | 4 | 1 | 1 | 1 | 7 |
| 844 | 1 | 6 | 9 | 9 | 7 | 9 | 10 | 3 | 1 | 3 | 10 | 6 | 7 | 8 |
| 845 | 8 | 11 | 8 | 7 | 9 | 10 | 0 | 6 | 11 | 8 | 10 | 4 | 0 | 11 |
| 846 | 9 | 9 | 7 | 11 | 5 | 1 | 6 | 1 | 8 | 10 | 4 | 3 | 2 | 1 |
| 847 | 9 | 7 | 7 | 11 | 8 | 7 | 2 | 7 | 3 | 3 | 1 | 0 | 4 | 3 |
| 848 | 7 | 3 | 9 | 2 | 0 | 7 | 4 | 0 | 11 | 1 | 3 | 5 | 5 | 1 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 849 | 2 | 7 | 0 | 7 | 9 | 7 | 3 | 1 | 6 | 5 | 10 | 3 | 5 | 10 |
| 850 | 5 | 3 | 11 | 9 | 2 | 10 | 2 | 11 | 3 | 5 | 9 | 3 | 11 | 6 |
| 851 | 1 | 0 | 3 | 9 | 6 | 1 | 1 | 0 | 10 | 3 | 3 | 5 | 2 | 7 |
| 852 | 2 | 11 | 11 | 7 | 4 | 5 | 7 | 1 | 2 | 1 | 3 | 3 | 7 | 11 |
| 853 | 6 | 2 | 1 | 3 | 7 | 8 | 7 | 11 | 9 | 8 | 7 | 9 | 6 | 7 |
| 854 | 1 | 4 | 0 | 11 | 3 | 3 | 5 | 3 | 5 | 0 | 2 | 7 | 2 | 3 |
| 855 | 4 | 9 | 6 | 7 | 3 | 2 | 6 | 0 | 9 | 3 | 9 | 2 | 5 | 2 |
| 856 | 1 | 2 | 11 | 9 | 5 | 2 | 7 | 8 | 8 | 6 | 7 | 1 | 5 | 3 |
| 857 | 6 | 2 | 0 | 3 | 5 | 3 | 4 | 11 | 6 | 2 | 5 | 4 | 11 | 9 |
| 858 | 4 | 11 | 2 | 0 | 6 | 7 | 8 | 3 | 7 | 3 | 1 | 9 | 10 | 6 |
| 859 | 4 | 3 | 0 | 9 | 11 | 6 | 3 | 7 | 8 | 3 | 1 | 8 | 7 | 4 |
| 860 | 2 | 6 | 7 | 10 | 9 | 4 | 6 | 11 | 1 | 10 | 6 | 7 | 3 | 2 |
| 861 | 1 | 5 | 7 | 2 | 8 | 6 | 8 | 0 | 11 | 5 | 5 | 7 | 11 | 5 |
| 862 | 11 | 8 | 9 | 0 | 11 | 11 | 6 | 3 | 2 | 10 | 11 | 4 | 4 | 9 |
| 863 | 7 | 7 | 0 | 1 | 11 | 2 | 2 | 6 | 5 | 0 | 3 | 2 | 7 | 4 |
| 864 | 5 | 1 | 8 | 7 | 4 | 3 | 4 | 4 | 6 | 1 | 2 | 6 | 6 | 8 |
| 865 | 7 | 3 | 7 | 7 | 8 | 10 | 7 | 2 | 11 | 3 | 11 | 8 | 11 | 7 |
| 866 | 0 | 4 | 11 | 8 | 8 | 6 | 11 | 2 | 11 | 2 | 2 | 0 | 3 | 6 |
| 867 | 7 | 10 | 3 | 1 | 3 | 5 | 4 | 4 | 7 | 4 | 11 | 7 | 6 | 11 |
| 868 | 8 | 9 | 1 | 10 | 9 | 2 | 0 | 10 | 3 | 7 | 4 | 6 | 11 | 10 |
| 869 | 11 | 4 | 10 | 11 | 7 | 1 | 6 | 11 | 9 | 10 | 11 | 0 | 5 | 10 |
| 870 | 10 | 6 | 0 | 10 | 2 | 3 | 4 | 9 | 1 | 3 | 4 | 11 | 9 | 6 |
| 871 | 8 | 1 | 6 | 1 | 9 | 7 | 11 | 0 | 3 | 6 | 10 | 4 | 2 | 2 |
| 872 | 3 | 1 | 5 | 5 | 3 | 11 | 7 | 11 | 9 | 11 | 9 | 7 | 10 | 7 |
| 873 | 5 | 4 | 5 | 9 | 5 | 2 | 8 | 0 | 9 | 5 | 1 | 6 | 2 | 0 |
| 874 | 8 | 8 | 5 | 5 | 0 | 8 | 1 | 6 | 1 | 4 | 5 | 5 | 6 | 9 |
| 875 | 2 | 11 | 3 | 4 | 8 | 8 | 1 | 6 | 2 | 5 | 0 | 9 | 10 | 5 |
| 876 | 9 | 0 | 1 | 9 | 10 | 0 | 11 | 1 | 3 | 9 | 0 | 0 | 6 | 11 |
| 877 | 6 | 9 | 6 | 11 | 10 | 6 | 9 | 9 | 10 | 8 | 0 | 11 | 5 | 3 |
| 878 | 3 | 1 | 0 | 8 | 0 | 5 | 4 | 8 | 9 | 6 | 11 | 4 | 1 | 8 |
| 879 | 5 | 6 | 10 | 0 | 10 | 5 | 1 | 6 | 7 | 10 | 0 | 5 | 5 | 7 |
| 880 | 9 | 3 | 7 | 10 | 9 | 5 | 9 | 9 | 5 | 11 | 3 | 1 | 3 | 6 |
| 881 | 6 | 7 | 9 | 1 | 9 | 3 | 10 | 1 | 3 | 7 | 10 | 1 | 11 | 5 |
| 882 | 9 | 8 | 0 | 2 | 1 | 11 | 7 | 4 | 3 | 10 | 10 | 1 | 10 | 6 |
| 883 | 8 | 4 | 9 | 11 | 2 | 11 | 10 | 1 | 11 | 3 | 5 | 10 | 3 | 8 |
| 884 | 8 | 6 | 10 | 3 | 1 | 5 | 0 | 11 | 6 | 9 | 2 | 3 | 9 | 9 |
| 885 | 1 | 9 | 9 | 10 | 3 | 10 | 7 | 8 | 2 | 7 | 1 | 11 | 3 | 6 |
| 886 | 2 | 11 | 0 | 9 | 2 | 1 | 4 | 3 | 10 | 8 | 1 | 8 | 5 | 0 |
| 887 | 11 | 1 | 3 | 4 | 1 | 6 | 4 | 6 | 4 | 9 | 11 | 10 | 5 | 8 |
| 888 | 9 | 3 | 10 | 4 | 2 | 10 | 5 | 7 | 5 | 10 | 0 | 11 | 7 | 11 |
| 889 | 3 | 4 | 1 | 2 | 7 | 10 | 8 | 11 | 3 | 7 | 10 | 2 | 0 | 2 |
| 890 | 11 | 0 | 8 | 4 | 11 | 7 | 2 | 6 | 8 | 11 | 11 | 8 | 2 | 5 |
| 891 | 10 | 3 | 3 | 3 | 10 | 6 | 1 | 4 | 6 | 1 | 3 | 6 | 3 | 1 |
| 892 | 2 | 6 | 10 | 6 | 0 | 10 | 6 | 4 | 4 | 11 | 6 | 0 | 2 | 9 |
| 893 | 8 | 10 | 4 | 10 | 4 | 5 | 1 | 2 | 3 | 10 | 9 | 0 | 2 | 7 |
| 894 | 10 | 11 | 6 | 5 | 6 | 9 | 1 | 6 | 6 | 0 | 5 | 11 | 1 | 7 |
| 895 | 7 | 1 | 4 | 5 | 2 | 0 | 9 | 5 | 1 | 7 | 9 | 1 | 3 | 10 |
| 896 | 0 | 11 | 5 | 4 | 8 | 11 | 9 | 10 | 9 | 9 | 8 | 11 | 6 | 7 |
| 897 | 5 | 6 | 4 | 3 | 10 | 0 | 8 | 4 | 9 | 7 | 10 | 1 | 0 | 7 |
| 898 | 4 | 1 | 1 | 5 | 11 | 5 | 0 | 0 | 4 | 0 | 10 | 0 | 4 | 1 |
| 899 | 3 | 1 | 2 | 9 | 7 | 11 | 0 | 6 | 7 | 1 | 0 | 9 | 8 | 8 |
| 900 | 2 | 10 | 1 | 11 | 7 | 4 | 5 | 0 | 8 | 4 | 1 | 8 | 9 | 10 |
| 901 | 10 | 1 | 8 | 8 | 2 | 0 | 9 | 6 | 10 | 2 | 0 | 6 | 5 | 4 |
| 902 | 4 | 4 | 2 | 2 | 4 | 1 | 5 | 3 | 5 | 10 | 10 | 8 | 8 | 6 |
| 903 | 11 | 9 | 11 | 2 | 11 | 1 | 11 | 10 | 3 | 3 | 10 | 3 | 3 | 9 |
| 904 | 7 | 1 | 0 | 8 | 5 | 7 | 2 | 4 | 2 | 3 | 2 | 4 | 2 | 9 |
| 905 | 5 | 8 | 3 | 0 | 10 | 9 | 2 | 2 | 1 | 9 | 11 | 0 | 8 | 5 |
| 906 | 2 | 7 | 8 | 0 | 2 | 11 | 3 | 4 | 11 | 0 | 7 | 5 | 5 | 0 |
| 907 | 0 | 10 | 10 | 1 | 9 | 3 | 6 | 9 | 3 | 9 | 2 | 6 | 10 | 1 |
| 908 | 0 | 0 | 9 | 0 | 7 | 6 | 9 | 1 | 3 | 7 | 7 | 7 | 10 | 0 |
| 909 | 10 | 5 | 6 | 11 | 3 | 1 | 8 | 11 | 0 | 4 | 1 | 9 | 2 | 7 |
| 910 | 7 | 8 | 10 | 2 | 0 | 10 | 6 | 3 | 9 | 6 | 1 | 11 | 10 | 1 |
| 911 | 3 | 5 | 4 | 0 | 1 | 10 | 2 | 4 | 5 | 1 | 11 | 6 | 5 | 10 |
| 912 | 10 | 7 | 0 | 1 | 7 | 1 | 6 | 4 | 5 | 3 | 10 | 6 | 11 | 9 |
| 913 | 0 | 6 | 5 | 4 | 6 | 8 | 5 | 7 | 11 | 8 | 6 | 4 | 3 | 8 |
| 914 | 7 | 11 | 4 | 6 | 11 | 5 | 11 | 7 | 2 | 10 | 6 | 2 | 6 | 4 |
| 915 | 8 | 8 | 8 | 3 | 2 | 2 | 10 | 3 | 1 | 11 | 0 | 4 | 11 | 0 |
| 916 | 11 | 10 | 7 | 2 | 2 | 3 | 8 | 3 | 4 | 7 | 1 | 0 | 8 | 8 |
| 917 | 0 | 3 | 2 | 4 | 3 | 1 | 5 | 9 | 7 | 5 | 3 | 8 | 5 | 11 |
| 918 | 6 | 0 | 2 | 11 | 2 | 0 | 7 | 7 | 2 | 7 | 0 | 4 | 10 | 4 |
| 919 | 6 | 5 | 3 | 2 | 1 | 6 | 7 | 10 | 8 | 2 | 10 | 8 | 0 | 10 |
| 920 | 3 | 5 | 9 | 11 | 8 | 6 | 6 | 3 | 4 | 3 | 7 | 2 | 9 | 4 |
| 921 | 10 | 1 | 9 | 4 | 10 | 8 | 7 | 5 | 0 | 5 | 6 | 1 | 11 | 0 |
| 922 | 8 | 8 | 6 | 2 | 11 | 10 | 9 | 1 | 4 | 7 | 4 | 4 | 6 | 5 |
| 923 | 7 | 0 | 5 | 4 | 6 | 7 | 2 | 2 | 6 | 10 | 3 | 9 | 11 | 2 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 924 | 8 | 0 | 11 | 8 | 8 | 9 | 0 | 8 | 1 | 1 | 5 | 4 | 6 | 5 |
| 925 | 7 | 4 | 8 | 7 | 5 | 11 | 0 | 10 | 9 | 6 | 4 | 5 | 1 | 9 |
| 926 | 0 | 11 | 1 | 6 | 9 | 7 | 5 | 1 | 2 | 2 | 6 | 11 | 3 | 11 |
| 927 | 11 | 1 | 11 | 6 | 3 | 8 | 9 | 10 | 7 | 10 | 6 | 1 | 10 | 9 |
| 928 | 1 | 4 | 8 | 0 | 10 | 10 | 8 | 9 | 5 | 1 | 6 | 8 | 6 | 2 |
| 929 | 7 | 0 | 8 | 3 | 5 | 9 | 11 | 3 | 3 | 11 | 5 | 2 | 2 | 2 |
| 930 | 0 | 1 | 7 | 2 | 5 | 4 | 3 | 11 | 11 | 0 | 9 | 7 | 5 | 4 |
| 931 | 5 | 0 | 4 | 10 | 9 | 8 | 4 | 6 | 6 | 0 | 9 | 5 | 10 | 0 |
| 932 | 0 | 6 | 6 | 2 | 2 | 2 | 5 | 9 | 0 | 9 | 3 | 4 | 10 | 7 |
| 933 | 3 | 6 | 7 | 5 | 8 | 11 | 8 | 10 | 3 | 9 | 4 | 5 | 10 | 4 |
| 934 | 4 | 0 | 11 | 4 | 3 | 6 | 11 | 8 | 1 | 5 | 3 | 1 | 1 | 7 |
| 935 | 6 | 8 | 10 | 4 | 0 | 1 | 0 | 2 | 0 | 10 | 6 | 2 | 8 | 4 |
| 936 | 2 | 4 | 6 | 3 | 8 | 5 | 9 | 1 | 5 | 2 | 5 | 0 | 8 | 2 |
| 937 | 10 | 1 | 3 | 8 | 6 | 4 | 11 | 10 | 3 | 5 | 4 | 0 | 5 | 1 |
| 938 | 7 | 10 | 2 | 2 | 11 | 6 | 2 | 9 | 3 | 10 | 7 | 7 | 4 | 7 |
| 939 | 8 | 7 | 4 | 1 | 9 | 2 | 6 | 11 | 6 | 2 | 11 | 11 | 4 | 0 |
| 940 | 7 | 11 | 7 | 3 | 4 | 0 | 5 | 0 | 5 | 9 | 9 | 7 | 11 | 7 |
| 941 | 3 | 7 | 0 | 0 | 3 | 4 | 3 | 6 | 8 | 1 | 11 | 11 | 11 | 6 |
| 942 | 4 | 2 | 9 | 8 | 9 | 10 | 11 | 5 | 9 | 7 | 4 | 4 | 11 | 0 |
| 943 | 9 | 3 | 7 | 3 | 6 | 0 | 9 | 2 | 1 | 4 | 7 | 2 | 4 | 11 |
| 944 | 11 | 8 | 5 | 10 | 9 | 3 | 0 | 7 | 8 | 9 | 9 | 7 | 2 | 5 |
| 945 | 9 | 6 | 4 | 7 | 1 | 6 | 4 | 8 | 1 | 2 | 1 | 5 | 6 | 2 |
| 946 | 1 | 1 | 2 | 9 | 1 | 8 | 11 | 3 | 2 | 2 | 6 | 8 | 8 | 3 |
| 947 | 3 | 6 | 6 | 10 | 1 | 10 | 10 | 0 | 4 | 4 | 5 | 0 | 11 | 2 |
| 948 | 0 | 8 | 11 | 4 | 1 | 8 | 0 | 11 | 10 | 4 | 4 | 4 | 9 | 7 |
| 949 | 5 | 0 | 2 | 2 | 3 | 8 | 1 | 4 | 5 | 7 | 9 | 3 | 0 | 6 |
| 950 | 1 | 2 | 7 | 3 | 9 | 0 | 1 | 8 | 10 | 7 | 8 | 0 | 2 | 2 |
| 951 | 8 | 7 | 1 | 2 | 11 | 8 | 1 | 8 | 10 | 1 | 3 | 5 | 3 | 6 |
| 952 | 2 | 10 | 5 | 4 | 3 | 10 | 10 | 9 | 9 | 8 | 4 | 9 | 9 | 11 |
| 953 | 9 | 10 | 6 | 1 | 4 | 8 | 6 | 6 | 8 | 6 | 4 | 1 | 10 | 0 |
| 954 | 6 | 5 | 6 | 4 | 4 | 10 | 2 | 10 | 9 | 10 | 2 | 4 | 4 | 10 |
| 955 | 9 | 2 | 2 | 6 | 2 | 1 | 6 | 1 | 1 | 0 | 5 | 5 | 10 | 11 |
| 956 | 10 | 8 | 9 | 3 | 4 | 5 | 11 | 8 | 7 | 1 | 9 | 7 | 0 | 1 |
| 957 | 6 | 4 | 9 | 7 | 11 | 7 | 11 | 6 | 3 | 1 | 9 | 9 | 3 | 8 |
| 958 | 0 | 3 | 3 | 10 | 7 | 5 | 6 | 2 | 7 | 1 | 1 | 9 | 6 | 7 |
| 959 | 4 | 0 | 4 | 10 | 5 | 9 | 11 | 4 | 5 | 3 | 0 | 0 | 0 | 10 |
| 960 | 7 | 3 | 1 | 9 | 11 | 3 | 8 | 7 | 9 | 1 | 9 | 0 | 10 | 1 |
| 961 | 7 | 9 | 0 | 1 | 1 | 11 | 0 | 8 | 1 | 7 | 2 | 6 | 0 | 1 |
| 962 | 8 | 11 | 2 | 0 | 6 | 9 | 10 | 8 | 0 | 6 | 8 | 3 | 7 | 10 |
| 963 | 11 | 11 | 1 | 10 | 8 | 8 | 6 | 0 | 7 | 5 | 7 | 3 | 11 | 4 |
| 964 | 1 | 8 | 9 | 6 | 2 | 6 | 4 | 7 | 3 | 7 | 9 | 11 | 8 | 7 |
| 965 | 4 | 6 | 1 | 5 | 5 | 6 | 6 | 11 | 2 | 6 | 1 | 7 | 1 | 1 |
| 966 | 10 | 0 | 1 | 2 | 6 | 3 | 11 | 5 | 1 | 1 | 2 | 6 | 0 | 11 |
| 967 | 7 | 5 | 3 | 10 | 7 | 2 | 2 | 7 | 5 | 2 | 7 | 7 | 8 | 11 |
| 968 | 5 | 8 | 7 | 2 | 11 | 6 | 6 | 8 | 1 | 7 | 3 | 6 | 11 | 8 |
| 969 | 9 | 5 | 0 | 1 | 9 | 1 | 8 | 5 | 5 | 10 | 6 | 5 | 5 | 4 |
| 970 | 7 | 11 | 10 | 9 | 3 | 2 | 4 | 10 | 8 | 2 | 11 | 3 | 7 | 3 |
| 971 | 2 | 1 | 3 | 6 | 6 | 7 | 3 | 2 | 6 | 3 | 6 | 4 | 0 | 4 |
| 972 | 11 | 9 | 0 | 8 | 9 | 5 | 11 | 9 | 7 | 7 | 5 | 8 | 3 | 4 |
| 973 | 6 | 10 | 1 | 5 | 8 | 4 | 1 | 9 | 7 | 8 | 0 | 6 | 3 | 7 |
| 974 | 5 | 8 | 11 | 2 | 6 | 11 | 5 | 1 | 6 | 5 | 6 | 3 | 6 | 11 |
| 975 | 2 | 8 | 1 | 7 | 8 | 5 | 4 | 0 | 3 | 3 | 2 | 10 | 5 | 6 |
| 976 | 7 | 1 | 6 | 6 | 7 | 5 | 9 | 0 | 8 | 10 | 8 | 10 | 2 | 7 |
| 977 | 5 | 2 | 9 | 0 | 5 | 5 | 4 | 10 | 5 | 11 | 5 | 10 | 1 | 0 |
| 978 | 4 | 3 | 10 | 0 | 1 | 5 | 3 | 5 | 1 | 4 | 4 | 5 | 4 | 0 |
| 979 | 0 | 6 | 5 | 1 | 8 | 1 | 1 | 1 | 8 | 4 | 9 | 1 | 3 | 4 |
| 980 | 1 | 0 | 8 | 11 | 2 | 8 | 1 | 0 | 2 | 1 | 2 | 3 | 11 | 2 |
| 981 | 5 | 0 | 10 | 7 | 5 | 4 | 5 | 5 | 10 | 8 | 6 | 3 | 8 | 4 |
| 982 | 8 | 10 | 1 | 0 | 7 | 3 | 10 | 1 | 4 | 0 | 10 | 4 | 2 | 11 |
| 983 | 3 | 5 | 9 | 7 | 0 | 1 | 8 | 8 | 11 | 9 | 9 | 6 | 1 | 7 |
| 984 | 3 | 10 | 3 | 4 | 0 | 11 | 7 | 1 | 10 | 7 | 9 | 4 | 0 | 4 |
| 985 | 2 | 3 | 6 | 2 | 1 | 7 | 11 | 5 | 9 | 2 | 7 | 3 | 6 | 7 |
| 986 | 3 | 0 | 2 | 4 | 1 | 8 | 3 | 11 | 7 | 11 | 10 | 7 | 8 | 10 |
| 987 | 9 | 9 | 5 | 1 | 5 | 11 | 2 | 6 | 7 | 7 | 10 | 3 | 9 | 3 |
| 988 | 0 | 6 | 8 | 1 | 10 | 7 | 10 | 5 | 6 | 3 | 1 | 1 | 7 | 6 |
| 989 | 8 | 8 | 11 | 3 | 1 | 10 | 11 | 10 | 5 | 8 | 1 | 9 | 6 | 9 |
| 990 | 4 | 8 | 2 | 2 | 9 | 8 | 2 | 10 | 3 | 5 | 10 | 11 | 6 | 3 |
| 991 | 1 | 0 | 7 | 1 | 0 | 7 | 9 | 8 | 4 | 0 | 8 | 7 | 5 | 10 |
| 992 | 3 | 9 | 5 | 11 | 1 | 11 | 2 | 2 | 5 | 10 | 0 | 7 | 6 | 6 |
| 993 | 1 | 1 | 2 | 11 | 11 | 6 | 4 | 1 | 9 | 5 | 3 | 6 | 10 | 9 |
| 994 | 11 | 5 | 6 | 10 | 10 | 8 | 10 | 7 | 0 | 7 | 1 | 2 | 11 | 8 |
| 995 | 2 | 2 | 5 | 7 | 3 | 3 | 2 | 9 | 5 | 4 | 10 | 0 | 4 | 3 |
| 996 | 5 | 11 | 1 | 9 | 2 | 6 | 0 | 6 | 1 | 4 | 9 | 10 | 2 | 11 |
| 997 | 6 | 0 | 3 | 9 | 4 | 8 | 3 | 10 | 11 | 0 | 8 | 9 | 9 | 11 |
| 998 | 0 | 7 | 9 | 0 | 1 | 4 | 7 | 4 | 3 | 4 | 2 | 5 | 11 | 8 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 999 | 11 | 11 | 0 | 0 | 2 | 2 | 6 | 10 | 11 | 7 | 10 | 3 | 4 | 2 |
| 1000 | 11 | 3 | 3 | 7 | 0 | 6 | 1 | 9 | 1 | 5 | 5 | 7 | 7 | 6 |
| 1001 | 9 | 4 | 10 | 8 | 10 | 3 | 10 | 8 | 10 | 3 | 7 | 9 | 2 | 6 |
| 1002 | 3 | 4 | 3 | 11 | 3 | 5 | 7 | 0 | 11 | 3 | 6 | 4 | 5 | 5 |
| 1003 | 8 | 9 | 2 | 11 | 7 | 9 | 3 | 3 | 8 | 4 | 3 | 7 | 8 | 5 |
| 1004 | 1 | 5 | 3 | 2 | 5 | 4 | 1 | 11 | 8 | 6 | 8 | 6 | 9 | 11 |
| 1005 | 2 | 2 | 7 | 0 | 10 | 2 | 4 | 10 | 7 | 6 | 4 | 1 | 7 | 8 |
| 1006 | 9 | 1 | 5 | 10 | 2 | 7 | 4 | 1 | 6 | 7 | 6 | 10 | 2 | 11 |
| 1007 | 1 | 6 | 6 | 6 | 10 | 7 | 9 | 8 | 11 | 2 | 5 | 10 | 7 | 9 |
| 1008 | 0 | 1 | 0 | 11 | 0 | 6 | 6 | 9 | 11 | 10 | 2 | 11 | 1 | 4 |
| 1009 | 9 | 11 | 0 | 2 | 10 | 0 | 6 | 9 | 5 | 2 | 6 | 2 | 0 | 5 |
| 1010 | 3 | 9 | 7 | 1 | 8 | 11 | 5 | 11 | 2 | 4 | 9 | 0 | 9 | 11 |
| 1011 | 9 | 9 | 2 | 8 | 10 | 7 | 7 | 11 | 4 | 3 | 4 | 3 | 9 | 11 |
| 1012 | 0 | 11 | 4 | 10 | 8 | 7 | 0 | 11 | 3 | 9 | 9 | 8 | 1 | 1 |
| 1013 | 6 | 5 | 0 | 11 | 6 | 8 | 2 | 0 | 3 | 5 | 9 | 0 | 3 | 4 |
| 1014 | 0 | 5 | 7 | 10 | 7 | 10 | 10 | 1 | 4 | 11 | 4 | 7 | 4 | 7 |
| 1015 | 10 | 11 | 5 | 10 | 0 | 4 | 3 | 4 | 3 | 11 | 6 | 9 | 4 | 7 |
| 1016 | 5 | 7 | 6 | 5 | 1 | 11 | 1 | 0 | 5 | 9 | 11 | 1 | 10 | 7 |
| 1017 | 6 | 3 | 1 | 11 | 8 | 1 | 2 | 7 | 8 | 2 | 11 | 3 | 6 | 11 |
| 1018 | 6 | 6 | 6 | 7 | 7 | 5 | 10 | 9 | 10 | 11 | 1 | 5 | 8 | 6 |
| 1019 | 5 | 9 | 9 | 6 | 0 | 8 | 7 | 3 | 1 | 10 | 2 | 2 | 1 | 0 |
| 1020 | 7 | 11 | 10 | 3 | 5 | 6 | 4 | 7 | 4 | 3 | 1 | 2 | 11 | 10 |
| 1021 | 9 | 8 | 11 | 8 | 11 | 5 | 8 | 4 | 10 | 1 | 10 | 5 | 6 | 11 |
| 1022 | 3 | 4 | 6 | 2 | 3 | 4 | 11 | 9 | 1 | 9 | 10 | 3 | 2 | 6 |
| 1023 | 3 | 2 | 7 | 1 | 3 | 8 | 8 | 10 | 4 | 3 | 2 | 2 | 7 | 9 |
| 1024 | 5 | 10 | 10 | 6 | 7 | 4 | 3 | 2 | 7 | 4 | 4 | 0 | 8 | 1 |
| 1025 | 2 | 8 | 0 | 5 | 3 | 8 | 6 | 6 | 4 | 9 | 3 | 11 | 1 | 5 |
| 1026 | 0 | 9 | 5 | 11 | 10 | 4 | 1 | 5 | 2 | 5 | 8 | 0 | 1 | 8 |
| 1027 | 3 | 6 | 0 | 10 | 3 | 1 | 7 | 5 | 1 | 7 | 0 | 10 | 5 | 2 |
| 1028 | 0 | 2 | 6 | 9 | 6 | 0 | 5 | 10 | 7 | 4 | 3 | 5 | 3 | 0 |
| 1029 | 7 | 4 | 5 | 11 | 0 | 8 | 1 | 9 | 0 | 0 | 4 | 3 | 7 | 10 |
| 1030 | 6 | 5 | 6 | 2 | 3 | 10 | 1 | 7 | 11 | 11 | 11 | 5 | 10 | 5 |
| 1031 | 11 | 4 | 9 | 7 | 5 | 0 | 2 | 1 | 7 | 9 | 9 | 2 | 2 | 0 |
| 1032 | 5 | 7 | 4 | 9 | 9 | 9 | 2 | 10 | 9 | 1 | 0 | 10 | 1 | 1 |
| 1033 | 5 | 9 | 9 | 6 | 8 | 1 | 3 | 4 | 3 | 3 | 7 | 10 | 6 | 11 |
| 1034 | 11 | 11 | 9 | 8 | 5 | 3 | 4 | 3 | 8 | 6 | 11 | 11 | 0 | 10 |
| 1035 | 6 | 1 | 7 | 9 | 3 | 2 | 10 | 0 | 8 | 8 | 0 | 5 | 2 | 11 |
| 1036 | 6 | 4 | 5 | 4 | 2 | 5 | 5 | 6 | 5 | 7 | 7 | 5 | 9 | 0 |
| 1037 | 2 | 5 | 2 | 8 | 1 | 7 | 8 | 7 | 3 | 7 | 6 | 5 | 1 | 9 |
| 1038 | 6 | 5 | 11 | 7 | 7 | 10 | 5 | 0 | 2 | 5 | 11 | 7 | 1 | 9 |
| 1039 | 1 | 10 | 8 | 5 | 11 | 11 | 2 | 8 | 1 | 4 | 1 | 0 | 0 | 10 |
| 1040 | 2 | 10 | 7 | 10 | 3 | 11 | 2 | 6 | 11 | 0 | 5 | 6 | 7 | 9 |
| 1041 | 11 | 5 | 9 | 4 | 6 | 3 | 4 | 2 | 11 | 11 | 6 | 6 | 6 | 11 |
| 1042 | 3 | 5 | 6 | 4 | 0 | 5 | 7 | 9 | 9 | 9 | 8 | 1 | 7 | 11 |
| 1043 | 3 | 4 | 4 | 1 | 4 | 6 | 3 | 5 | 7 | 7 | 9 | 9 | 6 | 6 |
| 1044 | 3 | 9 | 11 | 10 | 3 | 8 | 7 | 3 | 0 | 2 | 11 | 5 | 0 | 10 |
| 1045 | 3 | 9 | 2 | 0 | 10 | 1 | 11 | 11 | 10 | 1 | 8 | 1 | 5 | 9 |
| 1046 | 5 | 9 | 9 | 11 | 11 | 0 | 3 | 2 | 5 | 11 | 10 | 8 | 5 | 8 |
| 1047 | 11 | 5 | 3 | 9 | 10 | 10 | 3 | 8 | 8 | 5 | 2 | 7 | 11 | 11 |
| 1048 | 8 | 11 | 10 | 11 | 2 | 2 | 2 | 9 | 4 | 0 | 11 | 0 | 1 | 1 |
| 1049 | 10 | 11 | 5 | 4 | 1 | 9 | 6 | 7 | 10 | 7 | 3 | 9 | 7 | 4 |
| 1050 | 7 | 0 | 10 | 1 | 10 | 0 | 2 | 9 | 2 | 5 | 6 | 11 | 5 | 8 |
| 1051 | 10 | 5 | 8 | 5 | 11 | 8 | 3 | 7 | 9 | 0 | 4 | 10 | 11 | 11 |
| 1052 | 9 | 4 | 4 | 0 | 2 | 2 | 10 | 5 | 5 | 6 | 0 | 6 | 0 | 1 |
| 1053 | 10 | 6 | 4 | 9 | 11 | 11 | 6 | 1 | 11 | 6 | 3 | 8 | 7 | 9 |
| 1054 | 6 | 3 | 11 | 8 | 10 | 7 | 4 | 7 | 6 | 10 | 11 | 2 | 10 | 4 |
| 1055 | 11 | 0 | 6 | 4 | 2 | 7 | 5 | 3 | 3 | 5 | 0 | 4 | 3 | 9 |
| 1056 | 10 | 1 | 5 | 11 | 6 | 0 | 6 | 0 | 9 | 7 | 11 | 4 | 6 | 7 |
| 1057 | 0 | 5 | 7 | 0 | 4 | 0 | 7 | 10 | 7 | 1 | 10 | 0 | 5 | 2 |
| 1058 | 2 | 0 | 5 | 7 | 10 | 2 | 7 | 10 | 11 | 10 | 6 | 9 | 1 | 5 |
| 1059 | 2 | 11 | 9 | 11 | 5 | 5 | 2 | 5 | 0 | 2 | 2 | 10 | 7 | 4 |
| 1060 | 11 | 4 | 10 | 0 | 0 | 8 | 5 | 4 | 3 | 3 | 4 | 4 | 0 | 6 |
| 1061 | 8 | 1 | 2 | 2 | 11 | 1 | 3 | 10 | 11 | 6 | 6 | 11 | 1 | 8 |
| 1062 | 3 | 6 | 9 | 6 | 10 | 0 | 11 | 5 | 1 | 3 | 5 | 3 | 10 | 0 |
| 1063 | 5 | 6 | 1 | 1 | 2 | 5 | 6 | 8 | 5 | 10 | 1 | 2 | 11 | 2 |
| 1064 | 11 | 5 | 10 | 11 | 0 | 0 | 8 | 4 | 8 | 11 | 7 | 7 | 9 | 8 |
| 1065 | 0 | 8 | 8 | 6 | 2 | 10 | 6 | 0 | 6 | 10 | 2 | 1 | 3 | 3 |
| 1066 | 3 | 2 | 4 | 3 | 1 | 11 | 8 | 5 | 4 | 8 | 4 | 3 | 5 | 3 |
| 1067 | 7 | 7 | 5 | 4 | 0 | 8 | 11 | 8 | 7 | 3 | 8 | 2 | 5 | 8 |
| 1068 | 5 | 10 | 8 | 8 | 9 | 8 | 3 | 9 | 0 | 11 | 9 | 10 | 1 | 4 |
| 1069 | 6 | 10 | 4 | 3 | 9 | 1 | 4 | 11 | 4 | 10 | 3 | 8 | 3 | 7 |
| 1070 | 3 | 1 | 9 | 11 | 4 | 11 | 5 | 3 | 3 | 10 | 2 | 3 | 5 | 10 |
| 1071 | 1 | 9 | 5 | 9 | 5 | 0 | 7 | 2 | 0 | 4 | 5 | 5 | 9 | 6 |
| 1072 | 11 | 8 | 1 | 1 | 4 | 2 | 5 | 0 | 9 | 9 | 11 | 0 | 1 | 11 |
| 1073 | 9 | 7 | 1 | 10 | 1 | 5 | 5 | 10 | 0 | 1 | 6 | 0 | 7 | 2 |
| 1074 | 9 | 9 | 6 | 9 | 7 | 8 | 5 | 6 | 6 | 1 | 6 | 11 | 6 | 1 |
| 1075 | 6 | 8 | 2 | 10 | 0 | 8 | 0 | 0 | 1 | 11 | 1 | 10 | 3 | 10 |
| 1076 | 2 | 4 | 6 | 2 | 7 | 2 | 0 | 2 | 10 | 1 | 4 | 6 | 4 | 3 |
| 1077 | 6 | 11 | 8 | 10 | 11 | 7 | 1 | 8 | 11 | 3 | 4 | 5 | 1 | 7 |
| 1078 | 2 | 9 | 11 | 3 | 0 | 11 | 5 | 3 | 4 | 7 | 3 | 4 | 5 | 9 |
| 1079 | 0 | 6 | 5 | 5 | 5 | 0 | 1 | 7 | 5 | 6 | 5 | 3 | 5 | 7 |
| 1080 | 11 | 10 | 7 | 2 | 1 | 10 | 5 | 0 | 10 | 10 | 10 | 5 | 9 | 7 |
| 1081 | 10 | 6 | 8 | 4 | 11 | 5 | 5 | 5 | 6 | 2 | 9 | 8 | 5 | 0 |
| 1082 | 8 | 10 | 7 | 10 | 8 | 9 | 1 | 6 | 6 | 1 | 10 | 2 | 5 | 10 |
| 1083 | 5 | 3 | 2 | 5 | 9 | 0 | 0 | 8 | 4 | 6 | 3 | 3 | 11 | 0 |
| 1084 | 7 | 10 | 8 | 11 | 10 | 11 | 6 | 11 | 2 | 9 | 7 | 5 | 9 | 5 |
| 1085 | 5 | 1 | 0 | 3 | 11 | 8 | 6 | 7 | 4 | 0 | 9 | 4 | 2 | 6 |
| 1086 | 3 | 7 | 6 | 9 | 1 | 9 | 7 | 2 | 1 | 6 | 10 | 9 | 8 | 1 |
| 1087 | 3 | 0 | 10 | 10 | 2 | 6 | 6 | 2 | 11 | 2 | 6 | 5 | 1 | 1 |
| 1088 | 0 | 7 | 1 | 5 | 5 | 9 | 11 | 9 | 10 | 1 | 2 | 8 | 2 | 0 |
| 1089 | 6 | 4 | 3 | 8 | 8 | 6 | 3 | 9 | 4 | 0 | 10 | 5 | 4 | 2 |
| 1090 | 5 | 11 | 6 | 7 | 8 | 5 | 0 | 10 | 11 | 5 | 4 | 0 | 3 | 4 |
| 1091 | 10 | 2 | 2 | 1 | 2 | 5 | 6 | 3 | 10 | 5 | 9 | 1 | 8 | 7 |
| 1092 | 3 | 10 | 7 | 6 | 4 | 10 | 8 | 7 | 8 | 6 | 0 | 6 | 5 | 7 |
| 1093 | 3 | 8 | 0 | 10 | 3 | 2 | 2 | 8 | 7 | 2 | 8 | 0 | 4 | 5 |
| 1094 | 0 | 6 | 10 | 9 | 6 | 9 | 2 | 9 | 0 | 10 | 8 | 6 | 2 | 3 |
| 1095 | 10 | 8 | 8 | 11 | 8 | 1 | 10 | 5 | 2 | 8 | 9 | 5 | 8 | 10 |
| 1096 | 2 | 11 | 0 | 11 | 11 | 9 | 5 | 5 | 7 | 11 | 9 | 1 | 2 | 5 |
| 1097 | 5 | 0 | 10 | 5 | 7 | 11 | 11 | 8 | 2 | 0 | 0 | 7 | 9 | 2 |
| 1098 | 10 | 9 | 1 | 7 | 5 | 2 | 7 | 6 | 11 | 0 | 2 | 5 | 4 | 8 |
| 1099 | 11 | 5 | 3 | 1 | 10 | 0 | 1 | 3 | 3 | 11 | 1 | 5 | 8 | 0 |
| 1100 | 5 | 7 | 11 | 3 | 7 | 7 | 5 | 4 | 9 | 11 | 2 | 10 | 7 | 6 |
| 1101 | 1 | 9 | 9 | 1 | 2 | 5 | 3 | 6 | 0 | 11 | 0 | 5 | 4 | 10 |
| 1102 | 2 | 11 | 1 | 5 | 5 | 0 | 10 | 2 | 11 | 1 | 7 | 9 | 8 | 6 |
| 1103 | 8 | 10 | 2 | 3 | 7 | 11 | 9 | 8 | 5 | 7 | 0 | 11 | 10 | 10 |
| 1104 | 11 | 4 | 8 | 0 | 11 | 11 | 0 | 9 | 10 | 4 | 10 | 2 | 7 | 4 |
| 1105 | 8 | 6 | 3 | 3 | 6 | 0 | 6 | 5 | 11 | 8 | 3 | 1 | 2 | 2 |
| 1106 | 5 | 8 | 8 | 1 | 3 | 1 | 4 | 3 | 4 | 6 | 3 | 10 | 4 | 3 |
| 1107 | 9 | 7 | 2 | 8 | 9 | 0 | 3 | 1 | 1 | 9 | 9 | 6 | 7 | 3 |
| 1108 | 2 | 4 | 7 | 2 | 0 | 3 | 9 | 11 | 6 | 8 | 0 | 1 | 8 | 11 |
| 1109 | 4 | 10 | 9 | 11 | 8 | 6 | 7 | 9 | 7 | 9 | 3 | 1 | 6 | 6 |
| 1110 | 8 | 4 | 3 | 3 | 2 | 0 | 8 | 1 | 2 | 9 | 1 | 4 | 9 | 10 |
| 1111 | 9 | 10 | 7 | 5 | 6 | 0 | 11 | 9 | 11 | 6 | 8 | 4 | 0 | 8 |
| 1112 | 4 | 5 | 0 | 0 | 1 | 4 | 8 | 9 | 4 | 9 | 3 | 0 | 4 | 4 |
| 1113 | 3 | 10 | 11 | 5 | 0 | 0 | 5 | 9 | 9 | 4 | 6 | 6 | 4 | 9 |
| 1114 | 11 | 11 | 4 | 4 | 6 | 0 | 5 | 2 | 7 | 7 | 2 | 1 | 1 | 2 |
| 1115 | 10 | 7 | 7 | 2 | 9 | 4 | 3 | 2 | 2 | 6 | 2 | 3 | 6 | 8 |
| 1116 | 10 | 5 | 5 | 4 | 3 | 4 | 1 | 3 | 9 | 1 | 7 | 1 | 2 | 10 |
| 1117 | 0 | 9 | 10 | 11 | 7 | 10 | 0 | 1 | 10 | 6 | 10 | 3 | 10 | 6 |
| 1118 | 2 | 11 | 0 | 9 | 1 | 0 | 8 | 6 | 2 | 11 | 7 | 0 | 3 | 9 |
| 1119 | 1 | 0 | 0 | 8 | 8 | 6 | 3 | 10 | 11 | 10 | 11 | 4 | 5 | 1 |
| 1120 | 5 | 6 | 10 | 4 | 5 | 7 | 3 | 5 | 1 | 3 | 9 | 7 | 11 | 7 |
| 1121 | 9 | 4 | 3 | 2 | 5 | 0 | 3 | 0 | 7 | 8 | 2 | 4 | 3 | 3 |
| 1122 | 2 | 3 | 9 | 10 | 6 | 4 | 4 | 9 | 1 | 7 | 7 | 1 | 1 | 0 |
| 1123 | 8 | 1 | 1 | 11 | 6 | 10 | 5 | 8 | 11 | 0 | 10 | 10 | 7 | 0 |
| 1124 | 6 | 10 | 0 | 6 | 6 | 0 | 8 | 9 | 3 | 4 | 11 | 3 | 9 | 10 |
| 1125 | 11 | 3 | 5 | 5 | 6 | 5 | 9 | 8 | 7 | 0 | 8 | 6 | 0 | 11 |
| 1126 | 7 | 5 | 10 | 6 | 6 | 7 | 1 | 11 | 9 | 8 | 5 | 2 | 6 | 2 |
| 1127 | 7 | 7 | 1 | 7 | 9 | 6 | 2 | 10 | 7 | 9 | 2 | 11 | 9 | 9 |
| 1128 | 0 | 10 | 6 | 4 | 8 | 3 | 4 | 1 | 9 | 3 | 4 | 2 | 1 | 9 |
| 1129 | 7 | 8 | 9 | 5 | 6 | 3 | 10 | 1 | 4 | 10 | 11 | 3 | 9 | 0 |
| 1130 | 5 | 0 | 3 | 5 | 6 | 2 | 6 | 6 | 3 | 11 | 4 | 3 | 10 | 8 |
| 1131 | 2 | 0 | 9 | 3 | 1 | 11 | 9 | 10 | 7 | 10 | 9 | 0 | 4 | 8 |
| 1132 | 10 | 9 | 7 | 9 | 0 | 3 | 7 | 8 | 3 | 10 | 6 | 4 | 9 | 2 |
| 1133 | 4 | 5 | 1 | 2 | 8 | 9 | 7 | 4 | 11 | 9 | 9 | 0 | 9 | 9 |
| 1134 | 11 | 6 | 9 | 10 | 9 | 7 | 11 | 8 | 5 | 11 | 1 | 8 | 1 | 9 |
| 1135 | 10 | 10 | 0 | 5 | 5 | 5 | 1 | 5 | 10 | 5 | 0 | 3 | 6 | 9 |
| 1136 | 3 | 9 | 8 | 5 | 10 | 10 | 10 | 6 | 9 | 3 | 9 | 9 | 8 | 5 |
| 1137 | 8 | 7 | 7 | 7 | 3 | 11 | 11 | 7 | 8 | 4 | 6 | 1 | 3 | 7 |
| 1138 | 1 | 1 | 11 | 6 | 4 | 3 | 7 | 8 | 4 | 5 | 6 | 9 | 6 | 4 |
| 1139 | 0 | 1 | 4 | 0 | 9 | 11 | 1 | 4 | 10 | 8 | 9 | 7 | 1 | 10 |
| 1140 | 7 | 9 | 3 | 6 | 0 | 9 | 3 | 1 | 10 | 11 | 7 | 0 | 8 | 7 |
| 1141 | 6 | 2 | 5 | 8 | 6 | 9 | 2 | 4 | 2 | 5 | 7 | 6 | 11 | 0 |
| 1142 | 5 | 8 | 10 | 0 | 3 | 9 | 7 | 10 | 3 | 7 | 8 | 2 | 4 | 1 |
| 1143 | 1 | 5 | 10 | 5 | 3 | 7 | 6 | 5 | 9 | 4 | 9 | 11 | 0 | 8 |
| 1144 | 2 | 5 | 1 | 10 | 2 | 10 | 0 | 6 | 0 | 3 | 8 | 9 | 0 | 3 |
| 1145 | 10 | 7 | 2 | 5 | 1 | 0 | 5 | 4 | 6 | 7 | 9 | 2 | 1 | 4 |
| 1146 | 10 | 11 | 10 | 8 | 2 | 9 | 7 | 3 | 2 | 5 | 2 | 3 | 10 | 1 |
| 1147 | 8 | 9 | 7 | 0 | 10 | 10 | 3 | 3 | 6 | 0 | 0 | 0 | 7 | 6 |
| 1148 | 1 | 3 | 5 | 1 | 9 | 11 | 11 | 11 | 10 | 8 | 8 | 3 | 11 | 4 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1149 | 1 | 2 | 4 | 11 | 1 | 11 | 3 | 7 | 3 | 0 | 8 | 0 | 1 | 0 |
| 1150 | 4 | 0 | 11 | 0 | 1 | 6 | 6 | 2 | 8 | 10 | 0 | 10 | 7 | 3 |
| 1151 | 2 | 1 | 9 | 7 | 5 | 3 | 11 | 3 | 9 | 9 | 10 | 3 | 1 | 1 |
| 1152 | 11 | 5 | 11 | 5 | 3 | 9 | 5 | 5 | 8 | 8 | 1 | 5 | 1 | 1 |
| 1153 | 8 | 6 | 5 | 6 | 7 | 10 | 7 | 2 | 8 | 5 | 3 | 5 | 1 | 2 |
| 1154 | 1 | 2 | 4 | 8 | 10 | 4 | 6 | 2 | 8 | 5 | 6 | 9 | 2 | 9 |
| 1155 | 2 | 9 | 7 | 4 | 5 | 0 | 3 | 10 | 0 | 6 | 10 | 6 | 2 | 3 |
| 1156 | 8 | 7 | 3 | 5 | 0 | 11 | 10 | 5 | 5 | 4 | 3 | 2 | 11 | 8 |
| 1157 | 5 | 5 | 4 | 5 | 5 | 10 | 1 | 11 | 4 | 1 | 7 | 8 | 1 | 8 |
| 1158 | 8 | 3 | 1 | 2 | 10 | 1 | 5 | 1 | 10 | 8 | 7 | 10 | 6 | 1 |
| 1159 | 10 | 8 | 0 | 0 | 2 | 7 | 0 | 10 | 8 | 6 | 7 | 0 | 3 | 6 |
| 1160 | 3 | 6 | 11 | 7 | 7 | 0 | 4 | 0 | 0 | 9 | 7 | 10 | 6 | 1 |
| 1161 | 7 | 3 | 5 | 6 | 10 | 4 | 4 | 7 | 8 | 11 | 1 | 3 | 5 | 2 |
| 1162 | 4 | 8 | 9 | 7 | 5 | 5 | 3 | 9 | 6 | 9 | 2 | 7 | 3 | 2 |
| 1163 | 4 | 8 | 7 | 5 | 11 | 3 | 6 | 5 | 8 | 3 | 5 | 0 | 10 | 2 |
| 1164 | 11 | 4 | 3 | 0 | 2 | 9 | 7 | 8 | 0 | 8 | 9 | 7 | 3 | 4 |
| 1165 | 11 | 3 | 6 | 7 | 1 | 0 | 3 | 6 | 6 | 8 | 5 | 9 | 9 | 4 |
| 1166 | 1 | 8 | 9 | 9 | 4 | 2 | 6 | 1 | 11 | 8 | 1 | 6 | 0 | 11 |
| 1167 | 7 | 1 | 3 | 2 | 6 | 3 | 1 | 9 | 6 | 5 | 11 | 11 | 8 | 10 |
| 1168 | 2 | 2 | 3 | 9 | 8 | 9 | 9 | 3 | 6 | 9 | 8 | 9 | 4 | 8 |
| 1169 | 6 | 0 | 8 | 5 | 6 | 9 | 9 | 10 | 8 | 5 | 1 | 11 | 8 | 6 |
| 1170 | 0 | 5 | 10 | 7 | 6 | 2 | 9 | 1 | 7 | 4 | 11 | 3 | 0 | 1 |
| 1171 | 5 | 1 | 2 | 2 | 2 | 7 | 0 | 5 | 7 | 7 | 8 | 8 | 10 | 0 |
| 1172 | 10 | 0 | 11 | 11 | 7 | 4 | 2 | 11 | 0 | 10 | 4 | 6 | 3 | 11 |
| 1173 | 8 | 5 | 9 | 4 | 2 | 8 | 11 | 1 | 4 | 1 | 3 | 8 | 5 | 5 |
| 1174 | 10 | 0 | 3 | 2 | 1 | 1 | 1 | 3 | 3 | 9 | 2 | 10 | 4 | 9 |
| 1175 | 11 | 10 | 5 | 0 | 7 | 5 | 8 | 7 | 9 | 3 | 2 | 1 | 6 | 11 |
| 1176 | 2 | 9 | 0 | 1 | 1 | 4 | 10 | 10 | 9 | 10 | 11 | 5 | 11 | 7 |
| 1177 | 3 | 5 | 5 | 10 | 2 | 5 | 2 | 5 | 11 | 6 | 9 | 9 | 9 | 8 |
| 1178 | 7 | 4 | 6 | 7 | 3 | 1 | 0 | 7 | 0 | 7 | 2 | 7 | 7 | 11 |
| 1179 | 2 | 8 | 11 | 6 | 5 | 6 | 2 | 6 | 1 | 5 | 8 | 0 | 2 | 4 |
| 1180 | 8 | 3 | 6 | 2 | 9 | 4 | 4 | 10 | 10 | 3 | 8 | 11 | 0 | 7 |
| 1181 | 0 | 11 | 0 | 2 | 4 | 11 | 4 | 9 | 4 | 4 | 7 | 6 | 3 | 7 |
| 1182 | 2 | 6 | 3 | 5 | 1 | 6 | 9 | 10 | 1 | 5 | 3 | 9 | 5 | 9 |
| 1183 | 8 | 7 | 3 | 3 | 1 | 5 | 2 | 2 | 0 | 4 | 5 | 8 | 0 | 11 |
| 1184 | 4 | 11 | 10 | 0 | 9 | 11 | 4 | 1 | 7 | 11 | 7 | 5 | 9 | 3 |
| 1185 | 2 | 0 | 10 | 4 | 8 | 3 | 4 | 3 | 10 | 6 | 3 | 5 | 8 | 6 |
| 1186 | 9 | 10 | 4 | 0 | 7 | 2 | 11 | 10 | 6 | 5 | 9 | 1 | 8 | 4 |
| 1187 | 9 | 10 | 2 | 11 | 1 | 1 | 6 | 10 | 9 | 3 | 3 | 2 | 8 | 0 |
| 1188 | 7 | 10 | 9 | 3 | 2 | 0 | 1 | 4 | 4 | 10 | 2 | 10 | 5 | 2 |
| 1189 | 1 | 4 | 11 | 3 | 10 | 9 | 1 | 0 | 10 | 5 | 1 | 11 | 11 | 8 |
| 1190 | 7 | 9 | 1 | 0 | 5 | 9 | 5 | 10 | 5 | 0 | 4 | 8 | 9 | 5 |
| 1191 | 10 | 9 | 6 | 4 | 7 | 5 | 5 | 9 | 8 | 3 | 7 | 4 | 0 | 10 |
| 1192 | 10 | 6 | 2 | 8 | 1 | 6 | 10 | 11 | 10 | 6 | 2 | 4 | 6 | 6 |
| 1193 | 2 | 11 | 8 | 10 | 1 | 2 | 3 | 11 | 8 | 5 | 10 | 9 | 2 | 2 |
| 1194 | 9 | 6 | 6 | 1 | 5 | 4 | 11 | 2 | 10 | 4 | 1 | 2 | 9 | 9 |
| 1195 | 9 | 9 | 2 | 8 | 3 | 5 | 5 | 0 | 6 | 0 | 10 | 7 | 8 | 0 |
| 1196 | 9 | 9 | 0 | 8 | 3 | 9 | 9 | 1 | 4 | 2 | 11 | 11 | 6 | 2 |
| 1197 | 10 | 2 | 0 | 3 | 7 | 6 | 1 | 0 | 1 | 11 | 5 | 8 | 9 | 2 |
| 1198 | 7 | 9 | 6 | 6 | 3 | 3 | 11 | 4 | 7 | 1 | 6 | 9 | 9 | 8 |
| 1199 | 5 | 9 | 11 | 4 | 2 | 2 | 11 | 11 | 2 | 2 | 1 | 8 | 4 | 8 |
| 1200 | 6 | 11 | 9 | 5 | 3 | 7 | 5 | 8 | 0 | 9 | 0 | 2 | 11 | 8 |
| 1201 | 0 | 4 | 2 | 6 | 8 | 1 | 3 | 6 | 9 | 9 | 2 | 9 | 2 | 2 |
| 1202 | 9 | 7 | 9 | 2 | 4 | 10 | 6 | 8 | 5 | 1 | 7 | 3 | 10 | 8 |
| 1203 | 4 | 3 | 7 | 2 | 2 | 6 | 0 | 11 | 9 | 10 | 1 | 6 | 6 | 11 |
| 1204 | 0 | 5 | 7 | 5 | 7 | 5 | 9 | 11 | 10 | 8 | 3 | 0 | 9 | 9 |
| 1205 | 10 | 10 | 4 | 4 | 8 | 9 | 8 | 7 | 4 | 11 | 9 | 5 | 3 | 6 |
| 1206 | 8 | 1 | 10 | 3 | 2 | 1 | 0 | 4 | 9 | 11 | 4 | 7 | 0 | 5 |
| 1207 | 11 | 1 | 6 | 4 | 10 | 10 | 10 | 10 | 2 | 1 | 3 | 11 | 1 | 2 |
| 1208 | 11 | 9 | 6 | 5 | 8 | 0 | 4 | 8 | 11 | 7 | 0 | 6 | 4 | 8 |
| 1209 | 1 | 10 | 11 | 7 | 9 | 10 | 2 | 6 | 8 | 5 | 0 | 1 | 6 | 5 |
| 1210 | 0 | 3 | 9 | 8 | 11 | 6 | 1 | 10 | 2 | 3 | 6 | 11 | 2 | 2 |
| 1211 | 5 | 11 | 10 | 4 | 1 | 7 | 2 | 4 | 8 | 2 | 1 | 10 | 10 | 11 |
| 1212 | 8 | 9 | 4 | 7 | 5 | 0 | 8 | 6 | 5 | 10 | 1 | 10 | 11 | 5 |
| 1213 | 1 | 6 | 0 | 10 | 4 | 9 | 9 | 5 | 10 | 2 | 3 | 9 | 0 | 3 |
| 1214 | 3 | 6 | 11 | 10 | 4 | 7 | 8 | 6 | 2 | 11 | 10 | 7 | 9 | 1 |
| 1215 | 9 | 9 | 10 | 9 | 4 | 8 | 10 | 5 | 7 | 9 | 0 | 2 | 5 | 4 |
| 1216 | 1 | 6 | 10 | 8 | 9 | 6 | 3 | 2 | 7 | 1 | 7 | 10 | 10 | 2 |
| 1217 | 4 | 10 | 8 | 2 | 9 | 3 | 11 | 2 | 6 | 10 | 3 | 3 | 7 | 11 |
| 1218 | 6 | 7 | 9 | 11 | 9 | 1 | 6 | 5 | 9 | 6 | 9 | 10 | 9 | 9 |
| 1219 | 5 | 9 | 10 | 8 | 0 | 3 | 2 | 7 | 9 | 8 | 3 | 5 | 3 | 1 |
| 1220 | 8 | 3 | 1 | 7 | 3 | 4 | 10 | 2 | 1 | 2 | 8 | 2 | 6 | 0 |
| 1221 | 5 | 4 | 5 | 6 | 6 | 9 | 11 | 2 | 4 | 7 | 4 | 11 | 2 | 2 |
| 1222 | 7 | 0 | 7 | 5 | 3 | 2 | 5 | 9 | 2 | 7 | 10 | 3 | 3 | 4 |
| 1223 | 4 | 7 | 8 | 8 | 5 | 3 | 5 | 3 | 4 | 3 | 5 | 1 | 6 | 5 |
| 1224 | 2 | 6 | 6 | 11 | 4 | 7 | 1 | 9 | 3 | 4 | 9 | 2 | 6 | 10 |
| 1225 | 10 | 1 | 6 | 11 | 8 | 9 | 3 | 2 | 4 | 5 | 6 | 0 | 8 | 11 |
| 1226 | 6 | 5 | 6 | 6 | 1 | 7 | 6 | 11 | 4 | 6 | 4 | 8 | 11 | 6 |
| 1227 | 6 | 5 | 8 | 6 | 11 | 4 | 4 | 4 | 5 | 8 | 6 | 8 | 1 | 4 |
| 1228 | 8 | 4 | 9 | 5 | 9 | 4 | 6 | 0 | 4 | 5 | 9 | 4 | 1 | 8 |
| 1229 | 9 | 4 | 8 | 3 | 7 | 3 | 2 | 5 | 6 | 4 | 4 | 10 | 5 | 4 |
| 1230 | 7 | 6 | 2 | 5 | 10 | 0 | 5 | 7 | 10 | 9 | 11 | 5 | 7 | 9 |
| 1231 | 1 | 8 | 2 | 1 | 10 | 1 | 0 | 6 | 7 | 10 | 5 | 8 | 1 | 5 |
| 1232 | 8 | 4 | 10 | 10 | 10 | 11 | 8 | 6 | 4 | 8 | 0 | 8 | 2 | 8 |
| 1233 | 2 | 1 | 2 | 9 | 6 | 5 | 5 | 5 | 1 | 5 | 6 | 10 | 4 | 10 |
| 1234 | 1 | 1 | 11 | 10 | 0 | 11 | 8 | 9 | 5 | 3 | 4 | 4 | 7 | 1 |
| 1235 | 9 | 9 | 7 | 2 | 0 | 0 | 8 | 3 | 10 | 8 | 10 | 2 | 7 | 10 |
| 1236 | 3 | 3 | 5 | 10 | 4 | 7 | 7 | 7 | 7 | 3 | 2 | 4 | 0 | 7 |
| 1237 | 11 | 1 | 4 | 10 | 8 | 2 | 5 | 3 | 2 | 7 | 9 | 5 | 0 | 5 |
| 1238 | 8 | 5 | 6 | 10 | 9 | 6 | 5 | 3 | 5 | 0 | 11 | 1 | 7 | 2 |
| 1239 | 11 | 8 | 1 | 2 | 2 | 1 | 2 | 10 | 0 | 7 | 0 | 6 | 0 | 5 |
| 1240 | 0 | 5 | 7 | 11 | 6 | 5 | 5 | 8 | 3 | 11 | 7 | 6 | 5 | 1 |
| 1241 | 2 | 0 | 6 | 3 | 9 | 2 | 10 | 9 | 11 | 2 | 2 | 7 | 7 | 6 |
| 1242 | 11 | 3 | 4 | 6 | 1 | 3 | 5 | 9 | 0 | 4 | 6 | 2 | 3 | 8 |
| 1243 | 8 | 7 | 5 | 4 | 8 | 0 | 3 | 0 | 8 | 5 | 4 | 3 | 7 | 5 |
| 1244 | 7 | 3 | 3 | 3 | 4 | 3 | 11 | 1 | 10 | 4 | 9 | 10 | 3 | 3 |
| 1245 | 5 | 9 | 6 | 1 | 4 | 6 | 6 | 5 | 4 | 10 | 10 | 6 | 5 | 10 |
| 1246 | 4 | 7 | 8 | 2 | 2 | 3 | 10 | 10 | 10 | 7 | 4 | 7 | 10 | 1 |
| 1247 | 10 | 10 | 6 | 1 | 0 | 6 | 1 | 2 | 5 | 6 | 8 | 2 | 6 | 2 |
| 1248 | 5 | 6 | 3 | 7 | 7 | 1 | 3 | 10 | 4 | 7 | 8 | 8 | 7 | 5 |
| 1249 | 5 | 5 | 11 | 10 | 6 | 2 | 7 | 4 | 4 | 11 | 0 | 5 | 8 | 5 |
| 1250 | 10 | 1 | 2 | 5 | 10 | 9 | 0 | 10 | 9 | 2 | 11 | 1 | 9 | 10 |
| 1251 | 1 | 11 | 3 | 9 | 0 | 11 | 5 | 11 | 7 | 4 | 2 | 9 | 10 | 3 |
| 1252 | 7 | 7 | 10 | 8 | 4 | 4 | 9 | 0 | 10 | 7 | 10 | 0 | 2 | 10 |
| 1253 | 2 | 10 | 9 | 1 | 5 | 0 | 2 | 0 | 10 | 1 | 4 | 1 | 11 | 9 |
| 1254 | 5 | 2 | 8 | 7 | 0 | 2 | 10 | 5 | 11 | 5 | 8 | 7 | 4 | 11 |
| 1255 | 5 | 6 | 11 | 8 | 3 | 6 | 1 | 1 | 2 | 10 | 8 | 7 | 11 | 0 |
| 1256 | 7 | 10 | 0 | 11 | 5 | 5 | 11 | 2 | 6 | 6 | 4 | 6 | 2 | 10 |
| 1257 | 5 | 2 | 3 | 1 | 0 | 6 | 0 | 7 | 11 | 9 | 3 | 9 | 9 | 4 |
| 1258 | 10 | 7 | 4 | 6 | 4 | 4 | 7 | 6 | 1 | 8 | 5 | 8 | 2 | 5 |
| 1259 | 2 | 7 | 11 | 0 | 9 | 6 | 5 | 6 | 10 | 6 | 10 | 8 | 0 | 3 |
| 1260 | 2 | 6 | 9 | 5 | 7 | 1 | 7 | 0 | 7 | 11 | 11 | 10 | 11 | 7 |
| 1261 | 6 | 6 | 10 | 6 | 4 | 3 | 4 | 1 | 0 | 5 | 1 | 11 | 1 | 0 |
| 1262 | 4 | 4 | 9 | 2 | 0 | 11 | 11 | 1 | 6 | 6 | 8 | 9 | 5 | 9 |
| 1263 | 9 | 3 | 11 | 5 | 11 | 2 | 11 | 9 | 3 | 11 | 7 | 8 | 11 | 4 |
| 1264 | 0 | 10 | 2 | 5 | 6 | 5 | 10 | 2 | 3 | 7 | 6 | 2 | 8 | 8 |
| 1265 | 11 | 2 | 5 | 0 | 5 | 0 | 9 | 1 | 3 | 6 | 0 | 1 | 9 | 10 |
| 1266 | 7 | 1 | 11 | 8 | 5 | 10 | 7 | 10 | 5 | 2 | 6 | 7 | 4 | 10 |
| 1267 | 11 | 7 | 0 | 1 | 3 | 3 | 7 | 8 | 3 | 6 | 11 | 2 | 10 | 11 |
| 1268 | 5 | 10 | 2 | 1 | 11 | 4 | 9 | 4 | 4 | 8 | 7 | 4 | 0 | 10 |
| 1269 | 9 | 9 | 2 | 1 | 11 | 2 | 4 | 3 | 9 | 11 | 5 | 11 | 2 | 7 |
| 1270 | 11 | 8 | 5 | 6 | 7 | 11 | 0 | 6 | 10 | 11 | 2 | 0 | 0 | 2 |
| 1271 | 11 | 9 | 0 | 0 | 8 | 5 | 2 | 2 | 8 | 2 | 4 | 9 | 5 | 9 |
| 1272 | 3 | 3 | 4 | 6 | 5 | 0 | 6 | 1 | 2 | 8 | 9 | 8 | 0 | 2 |
| 1273 | 10 | 0 | 0 | 8 | 10 | 5 | 9 | 4 | 9 | 0 | 7 | 7 | 9 | 4 |
| 1274 | 10 | 3 | 11 | 2 | 7 | 9 | 9 | 2 | 1 | 0 | 4 | 8 | 8 | 7 |
| 1275 | 7 | 0 | 2 | 10 | 1 | 8 | 6 | 7 | 2 | 8 | 9 | 0 | 7 | 7 |
| 1276 | 11 | 6 | 5 | 9 | 0 | 3 | 3 | 0 | 0 | 1 | 3 | 3 | 1 | 11 |
| 1277 | 9 | 7 | 10 | 5 | 8 | 2 | 9 | 9 | 1 | 9 | 2 | 3 | 5 | 2 |
| 1278 | 5 | 7 | 10 | 6 | 2 | 5 | 7 | 10 | 8 | 1 | 5 | 4 | 0 | 9 |
| 1279 | 3 | 3 | 2 | 6 | 2 | 4 | 6 | 10 | 9 | 4 | 6 | 11 | 9 | 3 |
| 1280 | 8 | 5 | 5 | 11 | 6 | 3 | 5 | 10 | 8 | 6 | 2 | 3 | 3 | 11 |
| 1281 | 11 | 10 | 9 | 5 | 2 | 1 | 4 | 7 | 11 | 1 | 5 | 0 | 1 | 6 |
| 1282 | 10 | 4 | 0 | 10 | 11 | 9 | 0 | 6 | 6 | 10 | 2 | 6 | 10 | 8 |
| 1283 | 8 | 7 | 11 | 3 | 11 | 3 | 8 | 10 | 7 | 10 | 10 | 4 | 1 | 7 |
| 1284 | 9 | 2 | 5 | 2 | 8 | 8 | 7 | 2 | 6 | 7 | 0 | 3 | 3 | 5 |
| 1285 | 3 | 11 | 4 | 5 | 9 | 2 | 7 | 5 | 3 | 5 | 8 | 11 | 7 | 10 |
| 1286 | 1 | 7 | 3 | 11 | 10 | 1 | 4 | 8 | 10 | 4 | 7 | 4 | 7 | 8 |
| 1287 | 4 | 0 | 1 | 11 | 4 | 1 | 9 | 1 | 9 | 5 | 8 | 10 | 2 | 0 |
| 1288 | 9 | 2 | 10 | 6 | 0 | 4 | 9 | 9 | 6 | 4 | 11 | 8 | 1 | 5 |
| 1289 | 9 | 0 | 11 | 4 | 8 | 0 | 2 | 5 | 7 | 1 | 11 | 3 | 10 | 4 |
| 1290 | 0 | 4 | 3 | 2 | 11 | 2 | 7 | 3 | 10 | 4 | 8 | 3 | 5 | 7 |
| 1291 | 11 | 3 | 1 | 11 | 3 | 3 | 9 | 7 | 11 | 6 | 10 | 1 | 3 | 5 |
| 1292 | 3 | 2 | 10 | 1 | 3 | 5 | 10 | 6 | 6 | 7 | 6 | 0 | 9 | 2 |
| 1293 | 2 | 6 | 3 | 7 | 2 | 11 | 4 | 4 | 7 | 10 | 4 | 4 | 10 | 5 |
| 1294 | 1 | 0 | 3 | 7 | 4 | 5 | 11 | 9 | 8 | 4 | 8 | 8 | 2 | 1 |
| 1295 | 2 | 9 | 8 | 6 | 6 | 5 | 11 | 0 | 1 | 8 | 7 | 8 | 7 | 3 |
| 1296 | 2 | 4 | 7 | 3 | 1 | 3 | 1 | 2 | 2 | 5 | 2 | 4 | 1 | 3 |
| 1297 | 3 | 6 | 7 | 3 | 4 | 9 | 3 | 7 | 11 | 8 | 7 | 2 | 6 | 9 |
| 1298 | 1 | 7 | 1 | 7 | 9 | 11 | 7 | 5 | 6 | 11 | 6 | 10 | 0 | 5 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1299 | 2 | 3 | 0 | 10 | 6 | 11 | 7 | 1 | 10 | 0 | 6 | 9 | 9 | 10 |
| 1300 | 5 | 11 | 11 | 5 | 10 | 3 | 11 | 3 | 0 | 0 | 7 | 11 | 7 | 0 |
| 1301 | 6 | 11 | 5 | 9 | 11 | 1 | 9 | 9 | 3 | 10 | 4 | 0 | 11 | 2 |
| 1302 | 5 | 9 | 8 | 0 | 6 | 2 | 7 | 8 | 8 | 4 | 11 | 10 | 6 | 0 |
| 1303 | 5 | 4 | 8 | 4 | 11 | 5 | 6 | 11 | 11 | 11 | 2 | 6 | 7 | 7 |
| 1304 | 7 | 3 | 5 | 6 | 8 | 5 | 11 | 9 | 6 | 3 | 3 | 7 | 9 | 11 |
| 1305 | 8 | 2 | 7 | 7 | 5 | 11 | 5 | 3 | 4 | 6 | 9 | 11 | 11 | 8 |
| 1306 | 10 | 4 | 0 | 10 | 3 | 6 | 6 | 1 | 8 | 8 | 11 | 3 | 0 | 9 |
| 1307 | 8 | 0 | 2 | 8 | 3 | 3 | 5 | 2 | 1 | 10 | 9 | 5 | 3 | 2 |
| 1308 | 11 | 11 | 2 | 4 | 4 | 10 | 2 | 9 | 5 | 0 | 8 | 7 | 6 | 3 |
| 1309 | 7 | 8 | 7 | 6 | 7 | 1 | 5 | 11 | 1 | 1 | 0 | 8 | 6 | 8 |
| 1310 | 5 | 8 | 5 | 2 | 1 | 1 | 9 | 5 | 11 | 8 | 6 | 1 | 5 | 7 |
| 1311 | 1 | 9 | 6 | 6 | 6 | 6 | 6 | 7 | 5 | 4 | 2 | 3 | 1 | 3 |
| 1312 | 3 | 9 | 8 | 11 | 8 | 7 | 4 | 10 | 6 | 5 | 5 | 8 | 10 | 5 |
| 1313 | 2 | 10 | 5 | 6 | 10 | 11 | 10 | 3 | 3 | 3 | 8 | 3 | 6 | 5 |
| 1314 | 7 | 1 | 1 | 11 | 3 | 9 | 0 | 9 | 9 | 9 | 2 | 2 | 4 | 7 |
| 1315 | 3 | 1 | 1 | 4 | 1 | 7 | 10 | 6 | 8 | 10 | 10 | 2 | 11 | 0 |
| 1316 | 5 | 10 | 4 | 1 | 7 | 3 | 8 | 6 | 3 | 1 | 3 | 5 | 9 | 8 |
| 1317 | 5 | 8 | 5 | 3 | 4 | 6 | 2 | 3 | 2 | 3 | 4 | 1 | 11 | 6 |
| 1318 | 6 | 10 | 4 | 5 | 1 | 10 | 6 | 9 | 0 | 2 | 7 | 9 | 4 | 3 |
| 1319 | 11 | 5 | 4 | 0 | 8 | 1 | 9 | 1 | 6 | 8 | 6 | 8 | 10 | 1 |
| 1320 | 6 | 8 | 1 | 3 | 1 | 7 | 4 | 8 | 11 | 4 | 6 | 6 | 7 | 3 |
| 1321 | 7 | 8 | 3 | 3 | 3 | 11 | 4 | 2 | 4 | 5 | 10 | 8 | 5 | 0 |
| 1322 | 7 | 9 | 10 | 6 | 11 | 7 | 8 | 0 | 4 | 0 | 8 | 6 | 11 | 4 |
| 1323 | 6 | 5 | 0 | 9 | 6 | 7 | 0 | 5 | 9 | 2 | 10 | 10 | 2 | 6 |
| 1324 | 1 | 9 | 8 | 5 | 11 | 8 | 6 | 4 | 2 | 7 | 6 | 6 | 2 | 1 |
| 1325 | 3 | 1 | 10 | 0 | 1 | 6 | 6 | 8 | 7 | 8 | 1 | 11 | 0 | 5 |
| 1326 | 11 | 9 | 4 | 1 | 6 | 0 | 11 | 3 | 1 | 5 | 4 | 6 | 3 | 5 |
| 1327 | 6 | 0 | 3 | 3 | 7 | 7 | 8 | 0 | 10 | 0 | 1 | 1 | 0 | 0 |
| 1328 | 5 | 11 | 9 | 8 | 6 | 0 | 6 | 10 | 8 | 9 | 1 | 0 | 7 | 8 |
| 1329 | 9 | 10 | 7 | 7 | 8 | 1 | 4 | 6 | 3 | 10 | 0 | 4 | 8 | 4 |
| 1330 | 11 | 8 | 6 | 3 | 6 | 6 | 7 | 3 | 7 | 10 | 3 | 11 | 2 | 8 |
| 1331 | 7 | 0 | 6 | 8 | 10 | 6 | 8 | 1 | 6 | 11 | 3 | 5 | 5 | 4 |
| 1332 | 3 | 6 | 7 | 0 | 2 | 4 | 5 | 1 | 10 | 2 | 1 | 7 | 6 | 3 |
| 1333 | 5 | 1 | 0 | 2 | 10 | 5 | 1 | 10 | 1 | 4 | 9 | 7 | 7 | 0 |
| 1334 | 4 | 1 | 3 | 0 | 5 | 1 | 10 | 2 | 2 | 7 | 10 | 0 | 7 | 9 |
| 1335 | 4 | 5 | 0 | 1 | 0 | 4 | 11 | 3 | 3 | 10 | 7 | 4 | 7 | 1 |
| 1336 | 8 | 1 | 8 | 0 | 9 | 0 | 5 | 2 | 3 | 5 | 11 | 5 | 9 | 8 |
| 1337 | 8 | 4 | 4 | 6 | 7 | 4 | 8 | 4 | 4 | 3 | 11 | 7 | 9 | 0 |
| 1338 | 9 | 8 | 1 | 11 | 0 | 3 | 9 | 4 | 9 | 11 | 3 | 9 | 10 | 10 |
| 1339 | 7 | 0 | 0 | 11 | 11 | 6 | 2 | 1 | 0 | 7 | 8 | 11 | 6 | 3 |
| 1340 | 10 | 7 | 7 | 4 | 6 | 2 | 0 | 10 | 1 | 4 | 9 | 11 | 3 | 8 |
| 1341 | 11 | 8 | 6 | 1 | 6 | 0 | 10 | 9 | 10 | 3 | 11 | 8 | 4 | 7 |
| 1342 | 5 | 10 | 4 | 9 | 7 | 5 | 0 | 8 | 0 | 5 | 2 | 2 | 1 | 5 |
| 1343 | 10 | 6 | 1 | 11 | 9 | 11 | 1 | 8 | 11 | 5 | 7 | 6 | 4 | 2 |
| 1344 | 8 | 7 | 2 | 9 | 9 | 8 | 8 | 3 | 10 | 7 | 1 | 4 | 0 | 5 |
| 1345 | 8 | 9 | 6 | 8 | 11 | 0 | 2 | 3 | 3 | 11 | 6 | 3 | 11 | 3 |
| 1346 | 4 | 11 | 0 | 4 | 2 | 10 | 3 | 8 | 11 | 8 | 9 | 1 | 9 | 6 |
| 1347 | 8 | 2 | 11 | 5 | 3 | 5 | 0 | 6 | 11 | 9 | 8 | 5 | 2 | 0 |
| 1348 | 4 | 8 | 4 | 1 | 2 | 10 | 9 | 6 | 0 | 9 | 10 | 0 | 11 | 2 |
| 1349 | 7 | 0 | 5 | 3 | 8 | 2 | 3 | 2 | 5 | 11 | 1 | 10 | 3 | 7 |
| 1350 | 11 | 11 | 10 | 3 | 8 | 9 | 2 | 11 | 6 | 5 | 11 | 5 | 8 | 0 |
| 1351 | 8 | 0 | 0 | 9 | 0 | 4 | 4 | 5 | 3 | 1 | 9 | 1 | 11 | 2 |
| 1352 | 8 | 4 | 5 | 6 | 5 | 6 | 4 | 4 | 7 | 4 | 5 | 6 | 1 | 7 |
| 1353 | 8 | 2 | 10 | 1 | 10 | 8 | 0 | 10 | 11 | 1 | 1 | 10 | 6 | 6 |
| 1354 | 1 | 6 | 1 | 9 | 10 | 8 | 3 | 6 | 1 | 7 | 6 | 9 | 5 | 5 |
| 1355 | 5 | 2 | 8 | 10 | 4 | 11 | 3 | 2 | 3 | 11 | 0 | 2 | 7 | 3 |
| 1356 | 9 | 9 | 5 | 11 | 9 | 0 | 5 | 0 | 11 | 2 | 7 | 0 | 11 | 9 |
| 1357 | 7 | 1 | 10 | 7 | 4 | 7 | 10 | 7 | 11 | 6 | 0 | 9 | 7 | 10 |
| 1358 | 1 | 0 | 10 | 7 | 9 | 0 | 7 | 0 | 8 | 8 | 4 | 5 | 5 | 2 |
| 1359 | 7 | 2 | 11 | 3 | 9 | 6 | 9 | 2 | 2 | 11 | 9 | 6 | 1 | 0 |
| 1360 | 4 | 9 | 6 | 2 | 2 | 4 | 5 | 8 | 10 | 5 | 7 | 9 | 8 | 2 |
| 1361 | 1 | 6 | 6 | 0 | 5 | 8 | 0 | 6 | 2 | 3 | 10 | 4 | 8 | 7 |
| 1362 | 8 | 10 | 0 | 9 | 2 | 5 | 5 | 1 | 11 | 0 | 3 | 5 | 6 | 4 |
| 1363 | 2 | 9 | 4 | 2 | 11 | 0 | 1 | 9 | 10 | 4 | 2 | 0 | 0 | 8 |
| 1364 | 9 | 10 | 1 | 3 | 4 | 5 | 2 | 10 | 7 | 7 | 4 | 5 | 3 | 11 |
| 1365 | 9 | 3 | 0 | 9 | 4 | 2 | 1 | 5 | 4 | 0 | 5 | 9 | 8 | 5 |
| 1366 | 7 | 10 | 2 | 2 | 10 | 2 | 0 | 5 | 11 | 0 | 11 | 3 | 11 | 2 |
| 1367 | 1 | 7 | 8 | 9 | 4 | 6 | 4 | 8 | 9 | 11 | 5 | 9 | 4 | 6 |
| 1368 | 10 | 10 | 9 | 10 | 8 | 10 | 1 | 0 | 9 | 0 | 2 | 7 | 4 | 0 |
| 1369 | 5 | 9 | 3 | 8 | 4 | 4 | 5 | 2 | 8 | 0 | 5 | 10 | 10 | 7 |
| 1370 | 11 | 5 | 10 | 9 | 10 | 2 | 11 | 0 | 6 | 0 | 10 | 1 | 1 | 2 |
| 1371 | 3 | 6 | 2 | 8 | 5 | 2 | 10 | 6 | 7 | 4 | 7 | 1 | 4 | 0 |
| 1372 | 8 | 7 | 8 | 5 | 8 | 9 | 6 | 11 | 0 | 6 | 9 | 9 | 6 | 2 |
| 1373 | 8 | 0 | 5 | 6 | 9 | 7 | 1 | 1 | 1 | 11 | 4 | 7 | 7 | 8 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1374 | 8 | 2 | 1 | 5 | 7 | 5 | 6 | 8 | 0 | 3 | 6 | 10 | 4 | 4 |
| 1375 | 10 | 3 | 9 | 4 | 7 | 7 | 11 | 6 | 4 | 7 | 1 | 6 | 10 | 6 |
| 1376 | 10 | 1 | 11 | 6 | 0 | 7 | 2 | 10 | 0 | 2 | 2 | 0 | 6 | 3 |
| 1377 | 7 | 6 | 9 | 0 | 9 | 9 | 0 | 4 | 9 | 7 | 6 | 8 | 3 | 10 |
| 1378 | 0 | 3 | 7 | 6 | 11 | 1 | 7 | 0 | 8 | 10 | 9 | 5 | 10 | 9 |
| 1379 | 2 | 0 | 2 | 1 | 6 | 8 | 3 | 2 | 4 | 1 | 2 | 5 | 2 | 6 |
| 1380 | 10 | 10 | 7 | 10 | 2 | 10 | 6 | 8 | 3 | 6 | 7 | 5 | 0 | 10 |
| 1381 | 0 | 10 | 7 | 2 | 10 | 0 | 4 | 6 | 9 | 11 | 9 | 11 | 9 | 8 |
| 1382 | 6 | 7 | 2 | 3 | 10 | 1 | 4 | 4 | 7 | 2 | 2 | 11 | 2 | 3 |
| 1383 | 6 | 11 | 2 | 8 | 7 | 9 | 0 | 4 | 1 | 9 | 6 | 11 | 9 | 11 |
| 1384 | 3 | 2 | 5 | 10 | 8 | 11 | 0 | 7 | 4 | 2 | 11 | 1 | 10 | 0 |
| 1385 | 1 | 3 | 2 | 0 | 1 | 1 | 4 | 6 | 11 | 3 | 11 | 11 | 9 | 10 |
| 1386 | 4 | 0 | 2 | 4 | 0 | 3 | 4 | 6 | 9 | 2 | 8 | 11 | 11 | 1 |
| 1387 | 3 | 10 | 6 | 11 | 9 | 10 | 1 | 5 | 7 | 0 | 0 | 9 | 10 | 2 |
| 1388 | 9 | 9 | 5 | 10 | 3 | 1 | 10 | 0 | 3 | 7 | 2 | 9 | 10 | 8 |
| 1389 | 3 | 8 | 3 | 11 | 10 | 10 | 1 | 9 | 4 | 8 | 2 | 1 | 2 | 10 |
| 1390 | 2 | 11 | 4 | 0 | 10 | 5 | 10 | 7 | 11 | 11 | 10 | 11 | 3 | 8 |
| 1391 | 2 | 9 | 2 | 0 | 3 | 4 | 0 | 6 | 10 | 3 | 9 | 10 | 3 | 1 |
| 1392 | 5 | 4 | 9 | 5 | 10 | 6 | 9 | 5 | 9 | 10 | 1 | 8 | 11 | 6 |
| 1393 | 6 | 7 | 7 | 0 | 3 | 6 | 2 | 0 | 6 | 9 | 10 | 1 | 6 | 1 |
| 1394 | 4 | 11 | 4 | 0 | 4 | 9 | 3 | 9 | 10 | 3 | 5 | 10 | 4 | 8 |
| 1395 | 4 | 8 | 7 | 1 | 7 | 11 | 3 | 2 | 1 | 2 | 10 | 2 | 9 | 5 |
| 1396 | 10 | 2 | 10 | 11 | 6 | 5 | 11 | 8 | 6 | 4 | 3 | 1 | 7 | 4 |
| 1397 | 4 | 3 | 0 | 10 | 4 | 0 | 2 | 0 | 6 | 7 | 2 | 0 | 9 | 6 |
| 1398 | 1 | 9 | 4 | 0 | 11 | 7 | 3 | 1 | 11 | 9 | 9 | 10 | 8 | 10 |
| 1399 | 8 | 7 | 4 | 2 | 10 | 5 | 5 | 3 | 11 | 1 | 0 | 1 | 11 | 9 |
| 1400 | 0 | 6 | 9 | 9 | 2 | 7 | 9 | 7 | 6 | 7 | 3 | 0 | 5 | 2 |
| 1401 | 6 | 6 | 1 | 10 | 3 | 0 | 4 | 3 | 7 | 10 | 8 | 9 | 7 | 8 |
| 1402 | 3 | 0 | 4 | 4 | 8 | 10 | 0 | 6 | 0 | 4 | 1 | 7 | 5 | 1 |
| 1403 | 7 | 5 | 11 | 10 | 0 | 6 | 9 | 10 | 11 | 4 | 3 | 8 | 2 | 8 |
| 1404 | 11 | 10 | 5 | 2 | 1 | 9 | 4 | 3 | 1 | 0 | 0 | 6 | 11 | 3 |
| 1405 | 0 | 6 | 0 | 5 | 0 | 9 | 5 | 9 | 6 | 11 | 1 | 10 | 6 | 2 |
| 1406 | 9 | 11 | 5 | 0 | 0 | 7 | 8 | 7 | 8 | 2 | 4 | 0 | 1 | 10 |
| 1407 | 0 | 10 | 8 | 3 | 4 | 2 | 9 | 11 | 1 | 7 | 7 | 8 | 1 | 4 |
| 1408 | 9 | 4 | 3 | 3 | 7 | 8 | 1 | 0 | 4 | 9 | 11 | 6 | 8 | 6 |
| 1409 | 0 | 5 | 0 | 6 | 10 | 5 | 1 | 6 | 2 | 3 | 11 | 4 | 10 | 4 |
| 1410 | 5 | 3 | 2 | 4 | 8 | 6 | 4 | 3 | 4 | 4 | 4 | 6 | 7 | 11 |
| 1411 | 6 | 2 | 6 | 2 | 9 | 3 | 7 | 11 | 2 | 4 | 8 | 5 | 7 | 2 |
| 1412 | 9 | 6 | 7 | 4 | 9 | 0 | 1 | 0 | 1 | 11 | 2 | 11 | 5 | 5 |
| 1413 | 10 | 0 | 7 | 8 | 5 | 1 | 5 | 4 | 5 | 7 | 5 | 10 | 7 | 1 |
| 1414 | 9 | 0 | 3 | 1 | 10 | 7 | 3 | 8 | 7 | 7 | 3 | 6 | 2 | 2 |
| 1415 | 6 | 0 | 8 | 7 | 9 | 2 | 6 | 4 | 6 | 0 | 1 | 4 | 1 | 7 |
| 1416 | 9 | 11 | 11 | 9 | 3 | 4 | 6 | 4 | 11 | 8 | 5 | 5 | 11 | 3 |
| 1417 | 8 | 9 | 1 | 4 | 0 | 8 | 5 | 1 | 0 | 5 | 2 | 9 | 7 | 9 |
| 1418 | 11 | 6 | 10 | 11 | 10 | 1 | 5 | 10 | 7 | 5 | 6 | 9 | 9 | 1 |
| 1419 | 7 | 8 | 5 | 9 | 6 | 2 | 4 | 8 | 1 | 9 | 3 | 0 | 9 | 1 |
| 1420 | 4 | 4 | 0 | 0 | 6 | 6 | 7 | 2 | 9 | 11 | 10 | 3 | 1 | 4 |
| 1421 | 1 | 11 | 6 | 2 | 1 | 8 | 9 | 2 | 2 | 8 | 3 | 10 | 6 | 6 |
| 1422 | 4 | 10 | 11 | 5 | 4 | 0 | 3 | 4 | 1 | 8 | 4 | 4 | 11 | 7 |
| 1423 | 9 | 7 | 11 | 1 | 1 | 7 | 11 | 11 | 1 | 10 | 5 | 4 | 5 | 10 |
| 1424 | 2 | 10 | 11 | 7 | 5 | 9 | 9 | 7 | 9 | 4 | 8 | 7 | 3 | 0 |
| 1425 | 11 | 4 | 8 | 6 | 11 | 6 | 10 | 0 | 5 | 7 | 5 | 10 | 8 | 9 |
| 1426 | 11 | 2 | 0 | 7 | 11 | 1 | 10 | 2 | 4 | 3 | 2 | 8 | 9 | 3 |
| 1427 | 0 | 0 | 8 | 11 | 7 | 0 | 4 | 2 | 6 | 6 | 1 | 11 | 4 | 4 |
| 1428 | 10 | 10 | 5 | 1 | 8 | 5 | 0 | 2 | 7 | 10 | 1 | 11 | 7 | 3 |
| 1429 | 3 | 8 | 0 | 9 | 1 | 7 | 4 | 4 | 7 | 5 | 3 | 10 | 0 | 4 |
| 1430 | 8 | 5 | 0 | 8 | 8 | 10 | 8 | 7 | 7 | 8 | 7 | 2 | 3 | 11 |
| 1431 | 7 | 6 | 0 | 8 | 4 | 4 | 8 | 1 | 5 | 3 | 8 | 9 | 1 | 11 |
| 1432 | 3 | 8 | 3 | 3 | 7 | 0 | 10 | 9 | 1 | 0 | 5 | 5 | 1 | 8 |
| 1433 | 9 | 8 | 7 | 9 | 1 | 9 | 3 | 8 | 1 | 1 | 6 | 7 | 1 | 7 |
| 1434 | 10 | 9 | 5 | 8 | 2 | 10 | 7 | 5 | 8 | 10 | 10 | 1 | 8 | 11 |
| 1435 | 5 | 3 | 11 | 2 | 8 | 5 | 10 | 3 | 7 | 11 | 6 | 2 | 5 | 5 |
| 1436 | 2 | 4 | 8 | 6 | 6 | 10 | 4 | 8 | 3 | 9 | 6 | 9 | 8 | 11 |
| 1437 | 11 | 10 | 7 | 7 | 11 | 2 | 11 | 0 | 0 | 3 | 3 | 11 | 0 | 4 |
| 1438 | 8 | 2 | 9 | 8 | 10 | 6 | 6 | 9 | 1 | 8 | 11 | 10 | 1 | 2 |
| 1439 | 10 | 1 | 10 | 6 | 4 | 4 | 2 | 1 | 5 | 10 | 10 | 10 | 10 | 2 |
| 1440 | 2 | 7 | 2 | 10 | 7 | 0 | 4 | 0 | 11 | 4 | 6 | 5 | 11 | 11 |
| 1441 | 4 | 9 | 4 | 10 | 3 | 3 | 0 | 2 | 5 | 11 | 11 | 11 | 2 | 0 |
| 1442 | 1 | 7 | 3 | 4 | 2 | 2 | 3 | 0 | 4 | 6 | 11 | 8 | 6 | 0 |
| 1443 | 1 | 9 | 10 | 8 | 11 | 8 | 1 | 8 | 8 | 5 | 4 | 1 | 11 | 10 |
| 1444 | 0 | 0 | 6 | 4 | 4 | 1 | 10 | 0 | 7 | 2 | 0 | 6 | 9 | 3 |
| 1445 | 7 | 4 | 4 | 10 | 11 | 0 | 10 | 10 | 3 | 8 | 0 | 0 | 5 | 0 |
| 1446 | 3 | 9 | 9 | 2 | 11 | 2 | 2 | 11 | 10 | 7 | 0 | 8 | 8 | 10 |
| 1447 | 1 | 3 | 5 | 7 | 6 | 10 | 6 | 4 | 5 | 9 | 10 | 5 | 7 | 2 |
| 1448 | 7 | 3 | 4 | 4 | 11 | 2 | 10 | 8 | 7 | 2 | 11 | 5 | 2 | 7 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1449 | 10 | 9 | 2 | 3 | 6 | 2 | 2 | 5 | 2 | 0 | 0 | 0 | 2 | 9 |
| 1450 | 2 | 4 | 10 | 8 | 11 | 0 | 7 | 5 | 5 | 3 | 2 | 10 | 11 | 0 |
| 1451 | 8 | 5 | 4 | 9 | 11 | 0 | 2 | 0 | 9 | 10 | 8 | 5 | 5 | 11 |
| 1452 | 8 | 5 | 3 | 7 | 1 | 0 | 0 | 10 | 9 | 11 | 5 | 0 | 7 | 7 |
| 1453 | 2 | 0 | 7 | 6 | 7 | 8 | 8 | 1 | 10 | 8 | 6 | 8 | 11 | 7 |
| 1454 | 5 | 3 | 3 | 5 | 11 | 8 | 2 | 1 | 8 | 4 | 3 | 1 | 4 | 9 |
| 1455 | 6 | 0 | 7 | 2 | 5 | 11 | 2 | 3 | 2 | 4 | 1 | 7 | 4 | 6 |
| 1456 | 1 | 7 | 9 | 4 | 1 | 5 | 4 | 11 | 10 | 10 | 1 | 2 | 10 | 5 |
| 1457 | 0 | 11 | 7 | 0 | 0 | 8 | 2 | 3 | 11 | 10 | 7 | 6 | 6 | 2 |
| 1458 | 4 | 1 | 10 | 5 | 5 | 10 | 0 | 6 | 8 | 6 | 5 | 11 | 8 | 4 |
| 1459 | 0 | 1 | 8 | 7 | 5 | 2 | 8 | 9 | 2 | 7 | 11 | 6 | 5 | 11 |
| 1460 | 4 | 7 | 3 | 0 | 7 | 6 | 7 | 11 | 7 | 5 | 4 | 7 | 9 | 10 |
| 1461 | 10 | 8 | 2 | 10 | 0 | 4 | 4 | 11 | 6 | 9 | 3 | 3 | 8 | 5 |
| 1462 | 11 | 5 | 4 | 4 | 10 | 8 | 2 | 9 | 7 | 3 | 0 | 3 | 3 | 0 |
| 1463 | 8 | 3 | 9 | 8 | 8 | 0 | 0 | 1 | 10 | 11 | 1 | 6 | 3 | 0 |
| 1464 | 1 | 6 | 9 | 6 | 11 | 2 | 2 | 0 | 3 | 6 | 4 | 6 | 2 | 5 |
| 1465 | 8 | 9 | 4 | 11 | 8 | 6 | 2 | 4 | 3 | 5 | 4 | 11 | 0 | 7 |
| 1466 | 6 | 9 | 5 | 0 | 2 | 2 | 8 | 2 | 6 | 8 | 8 | 2 | 3 | 2 |
| 1467 | 11 | 1 | 6 | 0 | 5 | 10 | 2 | 9 | 1 | 4 | 9 | 8 | 0 | 6 |
| 1468 | 1 | 3 | 4 | 1 | 11 | 8 | 8 | 6 | 6 | 9 | 5 | 6 | 3 | 7 |
| 1469 | 4 | 10 | 9 | 4 | 10 | 1 | 5 | 6 | 1 | 4 | 11 | 4 | 2 | 1 |
| 1470 | 0 | 8 | 7 | 4 | 11 | 11 | 1 | 1 | 5 | 6 | 6 | 10 | 4 | 1 |
| 1471 | 9 | 10 | 8 | 7 | 5 | 7 | 8 | 1 | 5 | 11 | 6 | 1 | 9 | 8 |
| 1472 | 10 | 3 | 7 | 3 | 8 | 7 | 6 | 6 | 6 | 4 | 2 | 7 | 11 | 2 |
| 1473 | 11 | 11 | 7 | 8 | 1 | 5 | 0 | 4 | 9 | 8 | 4 | 4 | 4 | 2 |
| 1474 | 6 | 7 | 11 | 7 | 2 | 11 | 1 | 7 | 1 | 9 | 3 | 5 | 2 | 2 |
| 1475 | 9 | 7 | 8 | 5 | 10 | 0 | 10 | 3 | 0 | 11 | 5 | 8 | 3 | 1 |
| 1476 | 8 | 7 | 10 | 8 | 6 | 4 | 2 | 2 | 11 | 9 | 3 | 7 | 1 | 9 |
| 1477 | 0 | 7 | 10 | 9 | 7 | 11 | 6 | 2 | 11 | 5 | 7 | 1 | 9 | 8 |
| 1478 | 9 | 8 | 4 | 10 | 7 | 7 | 3 | 8 | 10 | 0 | 5 | 9 | 6 | 4 |
| 1479 | 7 | 4 | 4 | 1 | 5 | 0 | 4 | 1 | 11 | 2 | 10 | 7 | 11 | 8 |
| 1480 | 10 | 6 | 7 | 8 | 8 | 9 | 5 | 3 | 11 | 11 | 6 | 6 | 2 | 10 |
| 1481 | 1 | 1 | 1 | 4 | 3 | 1 | 0 | 11 | 10 | 6 | 9 | 5 | 0 | 11 |
| 1482 | 0 | 11 | 4 | 0 | 10 | 2 | 5 | 5 | 1 | 0 | 1 | 7 | 4 | 9 |
| 1483 | 4 | 8 | 5 | 0 | 8 | 11 | 8 | 11 | 1 | 6 | 1 | 4 | 2 | 10 |
| 1484 | 1 | 7 | 2 | 6 | 1 | 9 | 1 | 10 | 7 | 0 | 1 | 6 | 4 | 0 |
| 1485 | 7 | 4 | 1 | 8 | 1 | 6 | 7 | 8 | 0 | 6 | 10 | 6 | 5 | 7 |
| 1486 | 10 | 7 | 3 | 10 | 4 | 5 | 10 | 3 | 4 | 6 | 0 | 10 | 8 | 8 |
| 1487 | 6 | 5 | 1 | 0 | 10 | 2 | 6 | 2 | 2 | 2 | 2 | 6 | 8 | 6 |
| 1488 | 5 | 3 | 0 | 2 | 2 | 9 | 0 | 9 | 11 | 8 | 5 | 7 | 4 | 3 |
| 1489 | 0 | 6 | 8 | 4 | 6 | 4 | 8 | 8 | 5 | 2 | 11 | 0 | 9 | 4 |
| 1490 | 0 | 0 | 1 | 8 | 3 | 11 | 7 | 8 | 4 | 8 | 0 | 1 | 3 | 1 |
| 1491 | 7 | 1 | 10 | 0 | 7 | 8 | 0 | 1 | 4 | 2 | 9 | 7 | 9 | 9 |
| 1492 | 7 | 4 | 1 | 9 | 2 | 1 | 6 | 0 | 10 | 11 | 8 | 11 | 1 | 6 |
| 1493 | 11 | 10 | 8 | 6 | 8 | 6 | 11 | 10 | 1 | 10 | 1 | 2 | 9 | 2 |
| 1494 | 10 | 4 | 3 | 0 | 9 | 8 | 11 | 9 | 9 | 3 | 8 | 11 | 1 | 5 |
| 1495 | 11 | 3 | 9 | 0 | 5 | 8 | 3 | 8 | 10 | 2 | 4 | 7 | 7 | 10 |
| 1496 | 2 | 3 | 8 | 8 | 0 | 11 | 2 | 3 | 9 | 9 | 6 | 0 | 6 | 0 |
| 1497 | 3 | 9 | 1 | 6 | 8 | 6 | 9 | 8 | 7 | 1 | 0 | 3 | 7 | 2 |
| 1498 | 2 | 6 | 5 | 4 | 8 | 6 | 3 | 11 | 11 | 7 | 2 | 8 | 10 | 4 |
| 1499 | 3 | 6 | 8 | 8 | 0 | 10 | 7 | 3 | 6 | 11 | 0 | 3 | 4 | 8 |
| 1500 | 8 | 3 | 10 | 4 | 6 | 9 | 10 | 11 | 4 | 9 | 1 | 11 | 3 | 7 |
| 1501 | 4 | 3 | 1 | 10 | 10 | 11 | 2 | 5 | 2 | 10 | 5 | 10 | 2 | 2 |
| 1502 | 1 | 5 | 6 | 9 | 3 | 0 | 0 | 2 | 11 | 0 | 6 | 9 | 4 | 2 |
| 1503 | 0 | 8 | 8 | 6 | 10 | 2 | 11 | 9 | 9 | 2 | 6 | 5 | 1 | 6 |
| 1504 | 6 | 3 | 3 | 1 | 7 | 10 | 9 | 5 | 10 | 3 | 11 | 3 | 8 | 8 |
| 1505 | 11 | 4 | 2 | 1 | 8 | 9 | 0 | 3 | 3 | 5 | 10 | 10 | 5 | 1 |
| 1506 | 8 | 9 | 11 | 1 | 6 | 1 | 1 | 1 | 4 | 6 | 4 | 2 | 5 | 6 |
| 1507 | 7 | 11 | 7 | 8 | 4 | 8 | 11 | 5 | 6 | 1 | 11 | 1 | 4 | 8 |
| 1508 | 7 | 6 | 0 | 7 | 0 | 6 | 2 | 5 | 8 | 11 | 5 | 0 | 5 | 10 |
| 1509 | 4 | 9 | 5 | 7 | 4 | 11 | 3 | 6 | 9 | 6 | 8 | 7 | 7 | 4 |
| 1510 | 3 | 5 | 0 | 6 | 8 | 4 | 4 | 2 | 9 | 0 | 10 | 2 | 0 | 5 |
| 1511 | 10 | 1 | 8 | 11 | 1 | 4 | 3 | 4 | 8 | 3 | 1 | 3 | 3 | 1 |
| 1512 | 5 | 5 | 6 | 4 | 11 | 0 | 6 | 8 | 7 | 5 | 7 | 7 | 4 | 3 |
| 1513 | 9 | 2 | 6 | 9 | 9 | 11 | 0 | 11 | 8 | 7 | 2 | 0 | 6 | 6 |
| 1514 | 9 | 3 | 3 | 5 | 9 | 6 | 6 | 3 | 1 | 10 | 8 | 1 | 11 | 10 |
| 1515 | 1 | 9 | 3 | 3 | 9 | 2 | 2 | 7 | 4 | 8 | 10 | 4 | 4 | 7 |
| 1516 | 10 | 11 | 3 | 8 | 1 | 0 | 0 | 11 | 5 | 10 | 6 | 1 | 10 | 4 |
| 1517 | 10 | 8 | 3 | 1 | 4 | 7 | 8 | 9 | 5 | 4 | 7 | 4 | 8 | 2 |
| 1518 | 11 | 6 | 11 | 6 | 3 | 0 | 3 | 3 | 10 | 2 | 5 | 2 | 4 | 2 |
| 1519 | 2 | 11 | 4 | 9 | 9 | 0 | 5 | 11 | 6 | 6 | 1 | 5 | 2 | 1 |
| 1520 | 1 | 11 | 0 | 6 | 3 | 7 | 9 | 4 | 3 | 11 | 7 | 3 | 2 | 6 |
| 1521 | 10 | 0 | 9 | 3 | 2 | 9 | 0 | 0 | 3 | 3 | 0 | 1 | 11 | 1 |
| 1522 | 2 | 3 | 5 | 7 | 0 | 0 | 6 | 6 | 1 | 1 | 4 | 6 | 2 | 11 |
| 1523 | 4 | 5 | 5 | 9 | 4 | 6 | 10 | 1 | 5 | 4 | 2 | 5 | 11 | 4 |
| 1524 | 6 | 10 | 6 | 8 | 10 | 3 | 2 | 2 | 6 | 7 | 0 | 4 | 2 | 7 |
| 1525 | 10 | 6 | 8 | 7 | 0 | 4 | 9 | 9 | 4 | 0 | 2 | 3 | 2 | 4 |
| 1526 | 9 | 6 | 3 | 5 | 8 | 1 | 7 | 5 | 4 | 5 | 2 | 0 | 1 | 3 |
| 1527 | 8 | 11 | 3 | 8 | 2 | 7 | 7 | 4 | 1 | 4 | 8 | 6 | 4 | 0 |
| 1528 | 0 | 6 | 9 | 3 | 6 | 6 | 3 | 4 | 8 | 10 | 10 | 8 | 9 | 1 |
| 1529 | 11 | 6 | 4 | 5 | 1 | 9 | 11 | 1 | 2 | 6 | 7 | 0 | 10 | 4 |
| 1530 | 2 | 10 | 8 | 1 | 1 | 8 | 5 | 4 | 0 | 0 | 3 | 7 | 3 | 5 |
| 1531 | 10 | 2 | 5 | 9 | 3 | 7 | 11 | 11 | 5 | 1 | 5 | 6 | 11 | 7 |
| 1532 | 10 | 0 | 9 | 6 | 11 | 10 | 10 | 5 | 6 | 1 | 5 | 5 | 9 | 5 |
| 1533 | 4 | 2 | 6 | 4 | 9 | 8 | 9 | 8 | 1 | 0 | 7 | 10 | 3 | 11 |
| 1534 | 7 | 3 | 5 | 0 | 11 | 8 | 5 | 3 | 8 | 7 | 6 | 7 | 1 | 0 |
| 1535 | 9 | 6 | 11 | 3 | 3 | 3 | 10 | 7 | 3 | 2 | 3 | 1 | 0 | 0 |
| 1536 | 11 | 0 | 5 | 10 | 0 | 6 | 9 | 7 | 2 | 10 | 1 | 11 | 5 | 11 |
| 1537 | 0 | 11 | 9 | 8 | 3 | 10 | 3 | 11 | 1 | 6 | 5 | 3 | 4 | 3 |
| 1538 | 3 | 2 | 11 | 3 | 8 | 1 | 1 | 9 | 0 | 7 | 1 | 2 | 1 | 10 |
| 1539 | 4 | 5 | 1 | 0 | 5 | 3 | 11 | 1 | 11 | 8 | 5 | 11 | 0 | 0 |
| 1540 | 4 | 6 | 2 | 1 | 10 | 4 | 1 | 4 | 2 | 0 | 9 | 8 | 11 | 1 |
| 1541 | 6 | 8 | 0 | 6 | 7 | 0 | 10 | 8 | 0 | 2 | 0 | 1 | 10 | 2 |
| 1542 | 11 | 0 | 5 | 6 | 11 | 11 | 7 | 7 | 0 | 1 | 7 | 8 | 11 | 3 |
| 1543 | 3 | 10 | 4 | 7 | 2 | 4 | 6 | 5 | 11 | 3 | 2 | 2 | 2 | 10 |
| 1544 | 0 | 4 | 0 | 3 | 9 | 5 | 7 | 7 | 9 | 5 | 11 | 2 | 3 | 1 |
| 1545 | 4 | 7 | 0 | 10 | 2 | 10 | 4 | 0 | 5 | 11 | 5 | 7 | 8 | 10 |
| 1546 | 4 | 9 | 1 | 1 | 4 | 10 | 10 | 4 | 2 | 6 | 6 | 4 | 4 | 8 |
| 1547 | 4 | 9 | 7 | 4 | 5 | 4 | 0 | 3 | 9 | 11 | 0 | 8 | 4 | 4 |
| 1548 | 4 | 8 | 3 | 0 | 3 | 4 | 5 | 4 | 8 | 2 | 6 | 2 | 0 | 8 |
| 1549 | 10 | 5 | 7 | 6 | 9 | 1 | 0 | 1 | 8 | 3 | 3 | 0 | 11 | 5 |
| 1550 | 2 | 0 | 5 | 7 | 1 | 5 | 9 | 3 | 6 | 2 | 11 | 10 | 11 | 1 |
| 1551 | 6 | 9 | 10 | 2 | 9 | 5 | 8 | 4 | 1 | 10 | 9 | 10 | 2 | 8 |
| 1552 | 2 | 1 | 1 | 3 | 0 | 11 | 8 | 2 | 1 | 5 | 0 | 5 | 6 | 4 |
| 1553 | 5 | 10 | 10 | 8 | 7 | 11 | 10 | 9 | 6 | 2 | 10 | 11 | 5 | 9 |
| 1554 | 3 | 0 | 0 | 1 | 8 | 9 | 11 | 4 | 1 | 8 | 3 | 7 | 11 | 2 |
| 1555 | 0 | 0 | 0 | 0 | 5 | 7 | 10 | 5 | 5 | 7 | 9 | 11 | 9 | 10 |
| 1556 | 2 | 11 | 5 | 2 | 5 | 9 | 6 | 6 | 0 | 9 | 1 | 1 | 0 | 7 |
| 1557 | 8 | 10 | 0 | 10 | 1 | 11 | 9 | 0 | 7 | 5 | 1 | 8 | 1 | 1 |
| 1558 | 4 | 2 | 9 | 4 | 7 | 0 | 1 | 7 | 3 | 5 | 8 | 2 | 3 | 3 |
| 1559 | 7 | 4 | 8 | 10 | 7 | 4 | 9 | 4 | 8 | 4 | 9 | 6 | 4 | 9 |
| 1560 | 6 | 6 | 10 | 2 | 2 | 9 | 10 | 6 | 11 | 6 | 7 | 6 | 5 | 6 |
| 1561 | 3 | 0 | 7 | 7 | 4 | 4 | 10 | 6 | 1 | 4 | 11 | 3 | 10 | 2 |
| 1562 | 8 | 4 | 2 | 11 | 6 | 10 | 6 | 2 | 1 | 6 | 5 | 11 | 11 | 7 |
| 1563 | 1 | 3 | 7 | 8 | 6 | 2 | 10 | 7 | 2 | 9 | 11 | 0 | 4 | 6 |
| 1564 | 6 | 10 | 7 | 0 | 10 | 8 | 8 | 11 | 9 | 10 | 0 | 10 | 1 | 10 |
| 1565 | 11 | 8 | 7 | 4 | 10 | 8 | 0 | 3 | 3 | 7 | 6 | 11 | 7 | 10 |
| 1566 | 4 | 7 | 10 | 7 | 11 | 4 | 5 | 4 | 2 | 1 | 4 | 10 | 6 | 0 |
| 1567 | 0 | 3 | 4 | 11 | 5 | 10 | 4 | 0 | 0 | 0 | 1 | 2 | 2 | 5 |
| 1568 | 0 | 9 | 0 | 3 | 9 | 3 | 3 | 11 | 8 | 4 | 0 | 9 | 6 | 8 |
| 1569 | 11 | 7 | 1 | 1 | 6 | 9 | 7 | 11 | 7 | 0 | 2 | 3 | 8 | 7 |
| 1570 | 0 | 5 | 8 | 11 | 5 | 0 | 7 | 5 | 11 | 9 | 2 | 7 | 0 | 6 |
| 1571 | 1 | 2 | 4 | 6 | 5 | 6 | 2 | 11 | 9 | 8 | 2 | 10 | 10 | 6 |
| 1572 | 4 | 0 | 0 | 2 | 9 | 7 | 5 | 3 | 9 | 6 | 5 | 5 | 4 | 11 |
| 1573 | 4 | 3 | 2 | 7 | 11 | 10 | 11 | 0 | 7 | 5 | 8 | 10 | 8 | 2 |
| 1574 | 1 | 6 | 0 | 9 | 1 | 6 | 6 | 2 | 4 | 7 | 11 | 0 | 9 | 0 |
| 1575 | 3 | 1 | 4 | 0 | 8 | 5 | 5 | 11 | 9 | 1 | 10 | 10 | 8 | 4 |
| 1576 | 7 | 8 | 6 | 2 | 10 | 10 | 3 | 6 | 3 | 5 | 5 | 5 | 8 | 8 |
| 1577 | 10 | 8 | 4 | 8 | 1 | 3 | 2 | 6 | 6 | 3 | 10 | 3 | 5 | 8 |
| 1578 | 1 | 7 | 4 | 9 | 4 | 10 | 5 | 0 | 0 | 2 | 2 | 10 | 8 | 9 |
| 1579 | 2 | 4 | 1 | 5 | 6 | 8 | 8 | 8 | 11 | 3 | 9 | 5 | 10 | 5 |
| 1580 | 8 | 6 | 11 | 4 | 7 | 4 | 10 | 3 | 2 | 4 | 9 | 4 | 3 | 10 |
| 1581 | 9 | 1 | 10 | 10 | 3 | 6 | 2 | 0 | 4 | 4 | 9 | 2 | 8 | 7 |
| 1582 | 6 | 4 | 10 | 9 | 8 | 8 | 0 | 5 | 5 | 5 | 9 | 11 | 6 | 11 |
| 1583 | 8 | 10 | 8 | 0 | 2 | 7 | 2 | 6 | 5 | 6 | 5 | 7 | 10 | 7 |
| 1584 | 11 | 11 | 0 | 8 | 0 | 8 | 11 | 10 | 1 | 8 | 0 | 11 | 6 | 0 |
| 1585 | 8 | 6 | 9 | 6 | 4 | 1 | 3 | 3 | 4 | 4 | 0 | 11 | 0 | 7 |
| 1586 | 3 | 7 | 2 | 1 | 4 | 5 | 9 | 3 | 2 | 2 | 8 | 5 | 4 | 4 |
| 1587 | 9 | 1 | 11 | 8 | 2 | 6 | 8 | 7 | 2 | 4 | 7 | 6 | 7 | 10 |
| 1588 | 2 | 7 | 5 | 7 | 5 | 4 | 11 | 11 | 11 | 4 | 3 | 11 | 2 | 6 |
| 1589 | 8 | 3 | 8 | 2 | 1 | 3 | 1 | 9 | 1 | 6 | 3 | 4 | 0 | 1 |
| 1590 | 4 | 2 | 5 | 5 | 11 | 4 | 1 | 11 | 7 | 1 | 1 | 3 | 0 | 5 |
| 1591 | 0 | 10 | 6 | 9 | 0 | 1 | 11 | 4 | 2 | 4 | 8 | 10 | 9 | 5 |
| 1592 | 4 | 0 | 6 | 7 | 10 | 3 | 11 | 10 | 3 | 8 | 11 | 8 | 8 | 6 |
| 1593 | 7 | 7 | 0 | 4 | 2 | 0 | 9 | 3 | 7 | 10 | 0 | 0 | 9 | 7 |
| 1594 | 1 | 3 | 1 | 2 | 1 | 6 | 11 | 7 | 2 | 4 | 1 | 9 | 11 | 2 |
| 1595 | 10 | 7 | 11 | 0 | 8 | 2 | 1 | 8 | 5 | 0 | 5 | 1 | 3 | 10 |
| 1596 | 7 | 2 | 2 | 0 | 8 | 11 | 11 | 5 | 9 | 6 | 9 | 2 | 7 | 1 |
| 1597 | 4 | 3 | 7 | 1 | 6 | 2 | 2 | 10 | 8 | 8 | 7 | 7 | 7 | 5 |
| 1598 | 10 | 11 | 3 | 9 | 5 | 10 | 2 | 7 | 4 | 0 | 6 | 6 | 0 | 2 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1599 | 0 | 11 | 3 | 1 | 3 | 1 | 9 | 7 | 6 | 11 | 2 | 11 | 0 | 9 |
| 1600 | 1 | 4 | 1 | 0 | 6 | 5 | 1 | 11 | 8 | 9 | 3 | 10 | 4 | 8 |
| 1601 | 3 | 0 | 9 | 9 | 0 | 7 | 10 | 9 | 4 | 4 | 0 | 4 | 6 | 3 |
| 1602 | 11 | 9 | 10 | 7 | 3 | 1 | 8 | 5 | 7 | 11 | 8 | 4 | 0 | 2 |
| 1603 | 5 | 2 | 7 | 2 | 11 | 7 | 10 | 3 | 11 | 8 | 1 | 3 | 3 | 2 |
| 1604 | 11 | 0 | 10 | 8 | 10 | 7 | 0 | 5 | 0 | 6 | 2 | 1 | 6 | 7 |
| 1605 | 5 | 9 | 5 | 4 | 6 | 9 | 0 | 9 | 8 | 0 | 6 | 6 | 5 | 4 |
| 1606 | 1 | 9 | 7 | 9 | 5 | 5 | 2 | 10 | 9 | 5 | 3 | 0 | 0 | 5 |
| 1607 | 3 | 11 | 7 | 7 | 0 | 7 | 7 | 9 | 6 | 0 | 9 | 0 | 8 | 5 |
| 1608 | 8 | 7 | 5 | 4 | 5 | 1 | 0 | 5 | 1 | 2 | 0 | 9 | 0 | 9 |
| 1609 | 9 | 4 | 0 | 7 | 11 | 2 | 9 | 2 | 1 | 5 | 10 | 5 | 10 | 7 |
| 1610 | 3 | 9 | 11 | 4 | 5 | 0 | 4 | 4 | 10 | 11 | 6 | 9 | 5 | 0 |
| 1611 | 4 | 2 | 4 | 10 | 0 | 10 | 9 | 0 | 8 | 3 | 11 | 5 | 3 | 7 |
| 1612 | 5 | 2 | 4 | 11 | 1 | 8 | 6 | 1 | 6 | 9 | 3 | 7 | 0 | 11 |
| 1613 | 11 | 9 | 1 | 11 | 4 | 6 | 2 | 11 | 10 | 2 | 6 | 5 | 10 | 4 |
| 1614 | 9 | 3 | 9 | 5 | 4 | 6 | 11 | 6 | 6 | 2 | 0 | 9 | 4 | 7 |
| 1615 | 3 | 3 | 4 | 9 | 4 | 9 | 2 | 7 | 3 | 6 | 6 | 11 | 2 | 8 |
| 1616 | 7 | 10 | 0 | 1 | 8 | 2 | 7 | 3 | 0 | 2 | 2 | 9 | 9 | 5 |
| 1617 | 2 | 0 | 3 | 9 | 0 | 4 | 2 | 3 | 1 | 11 | 2 | 4 | 3 | 4 |
| 1618 | 9 | 11 | 11 | 3 | 6 | 10 | 11 | 1 | 9 | 9 | 9 | 5 | 10 | 6 |
| 1619 | 1 | 3 | 3 | 4 | 3 | 5 | 1 | 10 | 9 | 7 | 10 | 9 | 8 | 2 |
| 1620 | 2 | 4 | 5 | 10 | 11 | 9 | 1 | 7 | 9 | 3 | 11 | 3 | 9 | 4 |
| 1621 | 2 | 3 | 8 | 5 | 3 | 1 | 6 | 9 | 3 | 1 | 0 | 1 | 10 | 7 |
| 1622 | 6 | 3 | 3 | 9 | 6 | 11 | 4 | 0 | 8 | 6 | 11 | 1 | 3 | 1 |
| 1623 | 10 | 7 | 11 | 6 | 5 | 8 | 10 | 2 | 3 | 4 | 4 | 9 | 4 | 9 |
| 1624 | 5 | 6 | 1 | 2 | 5 | 11 | 8 | 1 | 4 | 4 | 11 | 9 | 2 | 1 |
| 1625 | 0 | 3 | 1 | 6 | 1 | 5 | 1 | 1 | 9 | 1 | 8 | 6 | 11 | 9 |
| 1626 | 4 | 8 | 6 | 1 | 4 | 9 | 10 | 3 | 0 | 1 | 3 | 3 | 8 | 1 |
| 1627 | 7 | 6 | 8 | 3 | 5 | 1 | 4 | 6 | 10 | 6 | 10 | 9 | 10 | 11 |
| 1628 | 5 | 10 | 10 | 11 | 3 | 10 | 3 | 4 | 5 | 10 | 11 | 5 | 4 | 9 |
| 1629 | 3 | 4 | 6 | 9 | 4 | 2 | 3 | 4 | 1 | 3 | 0 | 0 | 7 | 9 |
| 1630 | 11 | 5 | 4 | 11 | 3 | 0 | 4 | 10 | 10 | 9 | 10 | 4 | 10 | 7 |
| 1631 | 8 | 9 | 10 | 6 | 2 | 9 | 5 | 2 | 0 | 1 | 10 | 10 | 2 | 1 |
| 1632 | 5 | 4 | 5 | 10 | 9 | 10 | 11 | 3 | 6 | 6 | 2 | 2 | 8 | 11 |
| 1633 | 0 | 11 | 0 | 8 | 0 | 11 | 5 | 2 | 2 | 9 | 4 | 3 | 5 | 6 |
| 1634 | 2 | 0 | 9 | 4 | 3 | 0 | 11 | 2 | 5 | 8 | 7 | 7 | 2 | 1 |
| 1635 | 2 | 8 | 7 | 5 | 3 | 10 | 9 | 1 | 1 | 0 | 8 | 5 | 3 | 3 |
| 1636 | 7 | 10 | 7 | 0 | 5 | 6 | 3 | 11 | 3 | 8 | 11 | 2 | 9 | 3 |
| 1637 | 2 | 5 | 1 | 11 | 8 | 7 | 2 | 6 | 2 | 8 | 3 | 1 | 5 | 0 |
| 1638 | 8 | 0 | 0 | 9 | 5 | 3 | 6 | 2 | 6 | 8 | 8 | 7 | 10 | 7 |
| 1639 | 11 | 3 | 8 | 4 | 0 | 10 | 8 | 0 | 9 | 3 | 10 | 10 | 10 | 8 |
| 1640 | 5 | 7 | 3 | 6 | 9 | 1 | 8 | 5 | 7 | 1 | 2 | 6 | 3 | 7 |
| 1641 | 0 | 3 | 1 | 1 | 8 | 9 | 6 | 0 | 4 | 1 | 5 | 5 | 4 | 10 |
| 1642 | 9 | 5 | 7 | 1 | 1 | 9 | 10 | 0 | 4 | 5 | 1 | 6 | 10 | 3 |
| 1643 | 11 | 3 | 7 | 4 | 10 | 3 | 11 | 5 | 4 | 5 | 4 | 10 | 4 | 9 |
| 1644 | 6 | 10 | 6 | 10 | 3 | 10 | 3 | 3 | 9 | 2 | 3 | 1 | 8 | 6 |
| 1645 | 2 | 5 | 4 | 2 | 1 | 3 | 7 | 11 | 1 | 3 | 6 | 0 | 4 | 5 |
| 1646 | 6 | 1 | 7 | 1 | 4 | 6 | 0 | 1 | 1 | 2 | 3 | 10 | 1 | 3 |
| 1647 | 6 | 5 | 2 | 4 | 11 | 9 | 7 | 0 | 4 | 2 | 2 | 3 | 7 | 4 |
| 1648 | 9 | 2 | 5 | 3 | 8 | 3 | 6 | 5 | 10 | 9 | 10 | 4 | 9 | 1 |
| 1649 | 2 | 8 | 3 | 11 | 10 | 2 | 6 | 8 | 0 | 1 | 9 | 6 | 9 | 7 |
| 1650 | 1 | 9 | 1 | 1 | 7 | 6 | 4 | 10 | 9 | 0 | 1 | 1 | 3 | 4 |
| 1651 | 10 | 10 | 2 | 0 | 3 | 7 | 8 | 2 | 3 | 9 | 5 | 1 | 7 | 5 |
| 1652 | 6 | 5 | 0 | 5 | 9 | 11 | 10 | 9 | 1 | 5 | 5 | 10 | 4 | 9 |
| 1653 | 0 | 10 | 1 | 5 | 4 | 1 | 6 | 4 | 0 | 0 | 9 | 1 | 8 | 6 |
| 1654 | 5 | 2 | 4 | 1 | 6 | 9 | 9 | 0 | 10 | 10 | 5 | 9 | 5 | 5 |
| 1655 | 11 | 1 | 0 | 10 | 4 | 1 | 9 | 9 | 3 | 1 | 5 | 3 | 6 | 5 |
| 1656 | 8 | 0 | 2 | 3 | 4 | 11 | 10 | 10 | 4 | 0 | 3 | 3 | 3 | 6 |
| 1657 | 0 | 6 | 11 | 8 | 2 | 11 | 9 | 1 | 3 | 6 | 10 | 2 | 6 | 8 |
| 1658 | 6 | 5 | 3 | 7 | 0 | 3 | 11 | 9 | 0 | 8 | 10 | 10 | 11 | 7 |
| 1659 | 8 | 11 | 2 | 10 | 7 | 6 | 7 | 2 | 2 | 7 | 6 | 10 | 7 | 5 |
| 1660 | 8 | 0 | 4 | 3 | 3 | 4 | 1 | 9 | 5 | 2 | 4 | 11 | 11 | 9 |
| 1661 | 1 | 6 | 5 | 7 | 2 | 7 | 8 | 9 | 10 | 3 | 3 | 8 | 3 | 4 |
| 1662 | 5 | 4 | 1 | 0 | 8 | 7 | 9 | 3 | 6 | 10 | 9 | 11 | 1 | 2 |
| 1663 | 6 | 8 | 1 | 11 | 4 | 5 | 0 | 6 | 0 | 2 | 7 | 11 | 2 | 5 |
| 1664 | 1 | 9 | 5 | 5 | 10 | 9 | 9 | 1 | 7 | 10 | 10 | 0 | 3 | 1 |
| 1665 | 6 | 7 | 2 | 8 | 4 | 11 | 3 | 6 | 8 | 10 | 1 | 2 | 5 | 8 |
| 1666 | 4 | 11 | 5 | 9 | 6 | 8 | 11 | 6 | 5 | 0 | 4 | 10 | 8 | 0 |
| 1667 | 9 | 6 | 4 | 2 | 3 | 4 | 1 | 7 | 8 | 9 | 6 | 4 | 4 | 10 |
| 1668 | 9 | 5 | 1 | 3 | 11 | 4 | 9 | 8 | 8 | 2 | 2 | 5 | 5 | 8 |
| 1669 | 11 | 0 | 11 | 4 | 4 | 11 | 4 | 10 | 6 | 3 | 1 | 5 | 7 | 3 |
| 1670 | 3 | 7 | 0 | 4 | 9 | 5 | 6 | 8 | 10 | 11 | 0 | 1 | 2 | 4 |
| 1671 | 0 | 7 | 2 | 2 | 5 | 8 | 6 | 9 | 7 | 4 | 0 | 5 | 0 | 10 |
| 1672 | 3 | 11 | 4 | 2 | 4 | 2 | 2 | 6 | 11 | 9 | 3 | 10 | 9 | 3 |
| 1673 | 10 | 6 | 7 | 2 | 4 | 7 | 3 | 9 | 6 | 7 | 5 | 6 | 0 | 0 |
| 1674 | 3 | 2 | 0 | 8 | 7 | 6 | 6 | 11 | 0 | 5 | 1 | 4 | 10 | 11 |
| 1675 | 2 | 7 | 10 | 3 | 6 | 7 | 9 | 9 | 0 | 3 | 4 | 5 | 7 | 0 |
| 1676 | 4 | 0 | 10 | 6 | 5 | 0 | 9 | 9 | 11 | 0 | 9 | 3 | 6 | 1 |
| 1677 | 0 | 7 | 2 | 11 | 3 | 3 | 4 | 7 | 8 | 0 | 7 | 10 | 0 | 1 |
| 1678 | 7 | 4 | 11 | 1 | 6 | 11 | 10 | 6 | 10 | 0 | 9 | 3 | 0 | 8 |
| 1679 | 0 | 4 | 9 | 1 | 4 | 0 | 4 | 4 | 5 | 0 | 8 | 6 | 7 | 2 |
| 1680 | 7 | 5 | 11 | 0 | 7 | 9 | 1 | 5 | 3 | 10 | 4 | 1 | 7 | 6 |
| 1681 | 0 | 3 | 1 | 11 | 0 | 7 | 7 | 6 | 5 | 1 | 9 | 8 | 7 | 3 |
| 1682 | 3 | 5 | 9 | 1 | 8 | 9 | 3 | 7 | 2 | 7 | 10 | 3 | 7 | 10 |
| 1683 | 0 | 2 | 1 | 3 | 7 | 11 | 3 | 1 | 7 | 5 | 2 | 4 | 0 | 0 |
| 1684 | 8 | 9 | 8 | 4 | 10 | 4 | 7 | 5 | 8 | 2 | 5 | 5 | 4 | 1 |
| 1685 | 11 | 4 | 4 | 9 | 2 | 6 | 9 | 2 | 6 | 5 | 11 | 2 | 4 | 9 |
| 1686 | 5 | 11 | 5 | 2 | 9 | 4 | 7 | 9 | 4 | 11 | 5 | 1 | 6 | 10 |
| 1687 | 4 | 5 | 8 | 4 | 6 | 4 | 7 | 4 | 1 | 3 | 10 | 11 | 2 | 0 |
| 1688 | 10 | 7 | 0 | 5 | 9 | 4 | 10 | 11 | 10 | 0 | 7 | 6 | 8 | 3 |
| 1689 | 8 | 2 | 5 | 10 | 0 | 6 | 6 | 8 | 9 | 2 | 0 | 7 | 11 | 3 |
| 1690 | 10 | 4 | 8 | 1 | 5 | 10 | 0 | 2 | 0 | 0 | 11 | 0 | 6 | 4 |
| 1691 | 4 | 11 | 2 | 2 | 6 | 5 | 2 | 1 | 10 | 2 | 3 | 4 | 3 | 5 |
| 1692 | 9 | 2 | 2 | 0 | 3 | 3 | 5 | 7 | 0 | 6 | 1 | 6 | 9 | 7 |
| 1693 | 6 | 4 | 9 | 6 | 11 | 10 | 1 | 9 | 11 | 2 | 3 | 0 | 7 | 1 |
| 1694 | 5 | 7 | 9 | 1 | 2 | 4 | 5 | 6 | 1 | 6 | 6 | 9 | 1 | 7 |
| 1695 | 9 | 6 | 10 | 2 | 0 | 10 | 11 | 6 | 0 | 1 | 4 | 5 | 4 | 4 |
| 1696 | 2 | 4 | 2 | 7 | 10 | 1 | 2 | 7 | 2 | 3 | 10 | 1 | 0 | 5 |
| 1697 | 3 | 10 | 3 | 6 | 11 | 3 | 8 | 8 | 10 | 2 | 5 | 3 | 1 | 5 |
| 1698 | 0 | 8 | 9 | 0 | 10 | 3 | 8 | 1 | 10 | 0 | 2 | 9 | 1 | 7 |
| 1699 | 2 | 4 | 4 | 5 | 6 | 3 | 2 | 6 | 1 | 8 | 11 | 11 | 3 | 9 |
| 1700 | 0 | 8 | 4 | 7 | 11 | 9 | 1 | 10 | 8 | 2 | 0 | 8 | 6 | 9 |
| 1701 | 6 | 0 | 10 | 11 | 9 | 7 | 5 | 0 | 3 | 3 | 3 | 6 | 7 | 10 |
| 1702 | 2 | 9 | 4 | 11 | 5 | 7 | 6 | 4 | 4 | 7 | 11 | 2 | 7 | 6 |
| 1703 | 6 | 5 | 0 | 9 | 4 | 0 | 5 | 4 | 5 | 6 | 11 | 11 | 8 | 0 |
| 1704 | 4 | 6 | 7 | 3 | 2 | 2 | 2 | 11 | 1 | 3 | 5 | 2 | 8 | 7 |
| 1705 | 3 | 10 | 1 | 11 | 10 | 9 | 7 | 4 | 9 | 1 | 4 | 11 | 5 | 1 |
| 1706 | 11 | 10 | 3 | 5 | 6 | 7 | 5 | 4 | 5 | 8 | 0 | 0 | 10 | 5 |
| 1707 | 8 | 1 | 11 | 5 | 1 | 6 | 4 | 4 | 11 | 5 | 1 | 2 | 9 | 3 |
| 1708 | 9 | 1 | 4 | 11 | 11 | 8 | 9 | 5 | 2 | 3 | 11 | 0 | 0 | 4 |
| 1709 | 11 | 11 | 6 | 1 | 1 | 4 | 2 | 8 | 4 | 7 | 6 | 2 | 2 | 10 |
| 1710 | 11 | 2 | 9 | 7 | 4 | 5 | 5 | 2 | 10 | 8 | 11 | 9 | 4 | 8 |
| 1711 | 1 | 5 | 0 | 2 | 2 | 8 | 7 | 11 | 6 | 9 | 10 | 2 | 8 | 8 |
| 1712 | 2 | 2 | 0 | 3 | 8 | 10 | 9 | 11 | 3 | 0 | 4 | 6 | 10 | 7 |
| 1713 | 11 | 4 | 0 | 11 | 4 | 4 | 9 | 6 | 7 | 8 | 1 | 10 | 7 | 8 |
| 1714 | 1 | 8 | 6 | 6 | 9 | 9 | 10 | 9 | 6 | 7 | 8 | 10 | 11 | 3 |
| 1715 | 4 | 5 | 5 | 11 | 7 | 10 | 10 | 7 | 1 | 3 | 7 | 0 | 1 | 6 |
| 1716 | 1 | 1 | 5 | 8 | 10 | 5 | 8 | 3 | 5 | 4 | 0 | 10 | 10 | 11 |
| 1717 | 3 | 4 | 1 | 3 | 3 | 0 | 3 | 6 | 9 | 0 | 4 | 8 | 3 | 7 |
| 1718 | 6 | 4 | 7 | 5 | 3 | 9 | 7 | 2 | 7 | 5 | 0 | 1 | 7 | 9 |
| 1719 | 8 | 11 | 11 | 4 | 0 | 4 | 1 | 8 | 1 | 11 | 0 | 10 | 8 | 1 |
| 1720 | 10 | 7 | 9 | 6 | 11 | 3 | 4 | 2 | 9 | 8 | 0 | 4 | 7 | 2 |
| 1721 | 11 | 6 | 3 | 10 | 10 | 2 | 2 | 1 | 6 | 11 | 2 | 10 | 10 | 3 |
| 1722 | 9 | 0 | 6 | 9 | 2 | 6 | 11 | 4 | 0 | 8 | 4 | 1 | 0 | 9 |
| 1723 | 5 | 2 | 2 | 2 | 5 | 10 | 8 | 7 | 1 | 2 | 10 | 3 | 7 | 5 |
| 1724 | 6 | 2 | 8 | 1 | 3 | 2 | 3 | 10 | 1 | 7 | 0 | 11 | 4 | 7 |
| 1725 | 7 | 7 | 4 | 2 | 0 | 7 | 6 | 4 | 10 | 4 | 4 | 9 | 11 | 0 |
| 1726 | 11 | 0 | 11 | 1 | 4 | 0 | 10 | 5 | 11 | 4 | 9 | 7 | 8 | 5 |
| 1727 | 2 | 2 | 4 | 1 | 3 | 11 | 1 | 3 | 6 | 3 | 5 | 4 | 8 | 3 |
| 1728 | 7 | 0 | 1 | 1 | 5 | 11 | 1 | 0 | 6 | 2 | 7 | 1 | 7 | 10 |
| 1729 | 3 | 2 | 6 | 3 | 1 | 2 | 9 | 6 | 5 | 10 | 6 | 5 | 2 | 11 |
| 1730 | 5 | 4 | 2 | 10 | 3 | 1 | 2 | 4 | 8 | 9 | 5 | 7 | 1 | 3 |
| 1731 | 2 | 5 | 9 | 10 | 4 | 9 | 6 | 8 | 3 | 7 | 0 | 8 | 4 | 4 |
| 1732 | 3 | 10 | 1 | 1 | 3 | 7 | 0 | 5 | 7 | 11 | 4 | 6 | 4 | 8 |
| 1733 | 6 | 6 | 8 | 1 | 2 | 9 | 3 | 11 | 2 | 2 | 8 | 0 | 2 | 9 |
| 1734 | 1 | 4 | 5 | 4 | 1 | 7 | 10 | 10 | 5 | 8 | 8 | 7 | 0 | 2 |
| 1735 | 10 | 3 | 11 | 10 | 11 | 3 | 10 | 9 | 0 | 9 | 5 | 4 | 6 | 11 |
| 1736 | 3 | 5 | 4 | 5 | 0 | 11 | 1 | 2 | 7 | 7 | 11 | 11 | 8 | 1 |
| 1737 | 0 | 9 | 8 | 7 | 8 | 9 | 11 | 7 | 11 | 9 | 5 | 10 | 1 | 11 |
| 1738 | 8 | 1 | 9 | 1 | 1 | 11 | 11 | 5 | 6 | 7 | 5 | 11 | 6 | 4 |
| 1739 | 6 | 0 | 9 | 2 | 2 | 6 | 1 | 5 | 4 | 5 | 5 | 8 | 4 | 1 |
| 1740 | 4 | 5 | 3 | 8 | 9 | 2 | 8 | 4 | 3 | 9 | 8 | 9 | 11 | 2 |
| 1741 | 5 | 8 | 5 | 8 | 0 | 9 | 5 | 2 | 10 | 3 | 7 | 4 | 3 | 11 |
| 1742 | 8 | 9 | 0 | 1 | 0 | 0 | 2 | 11 | 7 | 1 | 3 | 4 | 2 | 6 |
| 1743 | 3 | 1 | 1 | 4 | 7 | 11 | 7 | 9 | 2 | 6 | 4 | 6 | 1 | 10 |
| 1744 | 5 | 10 | 8 | 5 | 8 | 7 | 7 | 3 | 9 | 3 | 8 | 6 | 2 | 4 |
| 1745 | 6 | 2 | 5 | 5 | 6 | 7 | 0 | 3 | 10 | 1 | 8 | 11 | 1 | 10 |
| 1746 | 11 | 5 | 5 | 1 | 2 | 8 | 8 | 2 | 10 | 9 | 4 | 0 | 9 | 3 |
| 1747 | 3 | 7 | 6 | 1 | 11 | 5 | 11 | 4 | 11 | 4 | 7 | 3 | 3 | 1 |
| 1748 | 5 | 5 | 9 | 3 | 5 | 1 | 6 | 5 | 6 | 5 | 0 | 1 | 7 | 5 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1749 | 10 | 5 | 11 | 9 | 6 | 8 | 0 | 3 | 8 | 10 | 0 | 2 | 10 | 2 |
| 1750 | 10 | 1 | 6 | 4 | 3 | 0 | 2 | 8 | 4 | 11 | 4 | 1 | 5 | 2 |
| 1751 | 6 | 0 | 0 | 3 | 2 | 4 | 10 | 4 | 4 | 1 | 7 | 5 | 10 | 8 |
| 1752 | 8 | 1 | 2 | 11 | 4 | 0 | 9 | 11 | 10 | 1 | 9 | 2 | 8 | 2 |
| 1753 | 9 | 3 | 3 | 8 | 4 | 1 | 0 | 9 | 0 | 2 | 1 | 8 | 7 | 9 |
| 1754 | 7 | 9 | 0 | 9 | 8 | 8 | 6 | 2 | 2 | 3 | 3 | 1 | 4 | 3 |
| 1755 | 5 | 8 | 1 | 3 | 10 | 2 | 3 | 9 | 2 | 10 | 11 | 7 | 9 | 8 |
| 1756 | 10 | 6 | 8 | 10 | 9 | 2 | 7 | 7 | 11 | 4 | 5 | 1 | 0 | 5 |
| 1757 | 9 | 5 | 9 | 6 | 7 | 4 | 10 | 11 | 0 | 6 | 7 | 9 | 0 | 4 |
| 1758 | 11 | 3 | 6 | 10 | 2 | 8 | 5 | 10 | 2 | 11 | 7 | 1 | 6 | 3 |
| 1759 | 10 | 6 | 2 | 6 | 5 | 0 | 0 | 0 | 8 | 1 | 7 | 7 | 5 | 11 |
| 1760 | 7 | 0 | 11 | 6 | 9 | 1 | 3 | 8 | 6 | 6 | 6 | 2 | 3 | 9 |
| 1761 | 3 | 9 | 9 | 5 | 11 | 5 | 8 | 0 | 9 | 1 | 4 | 2 | 7 | 0 |
| 1762 | 2 | 5 | 3 | 2 | 6 | 0 | 0 | 7 | 2 | 0 | 9 | 8 | 8 | 6 |
| 1763 | 0 | 1 | 8 | 9 | 8 | 11 | 1 | 0 | 4 | 7 | 2 | 2 | 10 | 1 |
| 1764 | 3 | 2 | 2 | 10 | 11 | 9 | 3 | 6 | 10 | 0 | 0 | 3 | 5 | 1 |
| 1765 | 10 | 4 | 2 | 10 | 5 | 6 | 2 | 8 | 0 | 5 | 6 | 5 | 4 | 6 |
| 1766 | 2 | 11 | 8 | 0 | 9 | 4 | 3 | 10 | 10 | 9 | 11 | 1 | 1 | 11 |
| 1767 | 2 | 7 | 3 | 3 | 5 | 4 | 3 | 1 | 7 | 11 | 1 | 5 | 6 | 5 |
| 1768 | 5 | 4 | 4 | 8 | 6 | 3 | 6 | 1 | 5 | 1 | 8 | 4 | 5 | 1 |
| 1769 | 10 | 1 | 1 | 9 | 10 | 6 | 8 | 11 | 6 | 2 | 4 | 9 | 0 | 0 |
| 1770 | 11 | 6 | 2 | 4 | 8 | 3 | 9 | 10 | 5 | 7 | 6 | 10 | 11 | 8 |
| 1771 | 0 | 0 | 10 | 10 | 1 | 4 | 5 | 1 | 8 | 1 | 11 | 7 | 2 | 10 |
| 1772 | 2 | 3 | 6 | 5 | 4 | 3 | 1 | 10 | 0 | 3 | 4 | 3 | 4 | 6 |
| 1773 | 9 | 9 | 9 | 7 | 6 | 8 | 6 | 7 | 11 | 7 | 4 | 11 | 0 | 4 |
| 1774 | 1 | 9 | 8 | 10 | 9 | 8 | 3 | 1 | 1 | 4 | 3 | 11 | 9 | 0 |
| 1775 | 6 | 4 | 10 | 5 | 10 | 3 | 3 | 9 | 1 | 4 | 3 | 7 | 6 | 4 |
| 1776 | 1 | 2 | 11 | 4 | 6 | 7 | 8 | 11 | 0 | 11 | 11 | 6 | 8 | 3 |
| 1777 | 9 | 7 | 2 | 3 | 2 | 2 | 1 | 11 | 3 | 6 | 7 | 10 | 10 | 9 |
| 1778 | 6 | 0 | 4 | 10 | 0 | 7 | 0 | 6 | 4 | 7 | 7 | 9 | 8 | 7 |
| 1779 | 4 | 6 | 8 | 7 | 8 | 5 | 1 | 2 | 6 | 11 | 10 | 9 | 0 | 3 |
| 1780 | 4 | 7 | 6 | 4 | 6 | 10 | 11 | 7 | 6 | 11 | 9 | 0 | 7 | 3 |
| 1781 | 8 | 4 | 7 | 1 | 1 | 0 | 7 | 3 | 7 | 8 | 5 | 5 | 10 | 5 |
| 1782 | 6 | 11 | 7 | 11 | 11 | 5 | 9 | 3 | 11 | 4 | 0 | 9 | 0 | 8 |
| 1783 | 6 | 0 | 7 | 8 | 9 | 8 | 1 | 7 | 0 | 2 | 2 | 8 | 8 | 10 |
| 1784 | 2 | 1 | 9 | 1 | 11 | 5 | 1 | 9 | 9 | 6 | 1 | 11 | 11 | 5 |
| 1785 | 4 | 5 | 11 | 8 | 5 | 8 | 2 | 5 | 5 | 11 | 2 | 11 | 8 | 1 |
| 1786 | 1 | 9 | 8 | 10 | 1 | 7 | 9 | 9 | 11 | 1 | 10 | 4 | 10 | 6 |
| 1787 | 2 | 1 | 8 | 11 | 10 | 7 | 10 | 3 | 1 | 4 | 6 | 5 | 5 | 2 |
| 1788 | 10 | 8 | 7 | 0 | 6 | 8 | 0 | 6 | 4 | 5 | 1 | 8 | 4 | 11 |
| 1789 | 2 | 11 | 9 | 8 | 7 | 2 | 5 | 3 | 6 | 10 | 3 | 2 | 7 | 3 |
| 1790 | 11 | 11 | 1 | 4 | 1 | 3 | 4 | 8 | 10 | 3 | 2 | 3 | 9 | 1 |
| 1791 | 2 | 2 | 0 | 5 | 4 | 7 | 11 | 7 | 10 | 0 | 5 | 1 | 3 | 9 |
| 1792 | 8 | 11 | 10 | 9 | 7 | 8 | 6 | 11 | 2 | 1 | 8 | 2 | 1 | 9 |
| 1793 | 3 | 1 | 8 | 2 | 0 | 4 | 11 | 1 | 7 | 5 | 5 | 6 | 9 | 10 |
| 1794 | 10 | 1 | 2 | 5 | 2 | 10 | 11 | 9 | 1 | 10 | 6 | 9 | 6 | 0 |
| 1795 | 7 | 8 | 4 | 10 | 3 | 9 | 7 | 6 | 8 | 11 | 5 | 10 | 9 | 7 |
| 1796 | 5 | 1 | 4 | 2 | 4 | 7 | 6 | 10 | 0 | 3 | 7 | 4 | 9 | 5 |
| 1797 | 9 | 2 | 7 | 1 | 9 | 2 | 11 | 4 | 2 | 4 | 5 | 9 | 4 | 4 |
| 1798 | 4 | 7 | 8 | 10 | 0 | 10 | 7 | 9 | 4 | 10 | 4 | 8 | 0 | 11 |
| 1799 | 2 | 0 | 7 | 2 | 11 | 9 | 4 | 7 | 7 | 0 | 5 | 9 | 1 | 1 |
| 1800 | 5 | 8 | 6 | 3 | 11 | 8 | 0 | 8 | 9 | 10 | 1 | 9 | 8 | 0 |
| 1801 | 8 | 1 | 8 | 5 | 10 | 6 | 11 | 0 | 10 | 8 | 6 | 3 | 0 | 10 |
| 1802 | 11 | 7 | 2 | 2 | 10 | 6 | 8 | 10 | 1 | 6 | 11 | 9 | 3 | 4 |
| 1803 | 10 | 11 | 4 | 3 | 5 | 2 | 7 | 3 | 4 | 9 | 4 | 1 | 1 | 4 |
| 1804 | 0 | 2 | 3 | 7 | 11 | 9 | 0 | 2 | 5 | 0 | 3 | 4 | 4 | 6 |
| 1805 | 10 | 4 | 1 | 11 | 11 | 2 | 1 | 9 | 3 | 1 | 5 | 11 | 0 | 3 |
| 1806 | 10 | 11 | 5 | 6 | 6 | 10 | 4 | 3 | 6 | 3 | 11 | 8 | 2 | 8 |
| 1807 | 5 | 3 | 11 | 0 | 3 | 9 | 5 | 7 | 6 | 1 | 7 | 0 | 2 | 9 |
| 1808 | 1 | 3 | 0 | 0 | 10 | 9 | 4 | 9 | 0 | 6 | 0 | 6 | 10 | 5 |
| 1809 | 11 | 7 | 4 | 1 | 0 | 4 | 0 | 10 | 9 | 5 | 2 | 11 | 0 | 11 |
| 1810 | 3 | 5 | 11 | 3 | 9 | 0 | 7 | 6 | 7 | 10 | 0 | 3 | 0 | 9 |
| 1811 | 8 | 6 | 10 | 2 | 7 | 2 | 8 | 5 | 5 | 3 | 0 | 0 | 8 | 3 |
| 1812 | 2 | 0 | 2 | 5 | 9 | 9 | 3 | 8 | 9 | 9 | 10 | 8 | 10 | 8 |
| 1813 | 4 | 11 | 4 | 7 | 6 | 4 | 1 | 7 | 5 | 5 | 1 | 1 | 7 | 1 |
| 1814 | 6 | 9 | 4 | 8 | 1 | 7 | 9 | 8 | 3 | 11 | 2 | 10 | 5 | 11 |
| 1815 | 2 | 5 | 3 | 11 | 11 | 1 | 0 | 6 | 7 | 6 | 0 | 5 | 4 | 2 |
| 1816 | 0 | 9 | 9 | 0 | 9 | 1 | 9 | 5 | 6 | 9 | 10 | 6 | 4 | 11 |
| 1817 | 1 | 1 | 7 | 6 | 7 | 0 | 0 | 7 | 1 | 6 | 7 | 1 | 2 | 0 |
| 1818 | 11 | 5 | 2 | 6 | 3 | 7 | 2 | 0 | 8 | 3 | 8 | 1 | 4 | 8 |
| 1819 | 2 | 7 | 2 | 10 | 1 | 10 | 8 | 3 | 7 | 2 | 9 | 7 | 6 | 2 |
| 1820 | 6 | 8 | 2 | 4 | 9 | 9 | 0 | 7 | 2 | 4 | 3 | 6 | 4 | 9 |
| 1821 | 2 | 2 | 3 | 9 | 2 | 3 | 7 | 8 | 1 | 7 | 5 | 10 | 6 | 9 |
| 1822 | 7 | 5 | 7 | 5 | 9 | 5 | 3 | 6 | 5 | 3 | 9 | 2 | 6 | 0 |
| 1823 | 4 | 9 | 3 | 0 | 6 | 10 | 1 | 1 | 1 | 5 | 6 | 0 | 2 | 2 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1824 | 9 | 11 | 0 | 10 | 2 | 0 | 10 | 3 | 6 | 4 | 10 | 7 | 11 | 3 |
| 1825 | 4 | 1 | 10 | 3 | 8 | 1 | 10 | 0 | 6 | 0 | 0 | 2 | 6 | 8 |
| 1826 | 2 | 11 | 4 | 6 | 5 | 7 | 0 | 10 | 10 | 11 | 0 | 7 | 11 | 5 |
| 1827 | 2 | 7 | 4 | 2 | 7 | 8 | 4 | 11 | 5 | 10 | 10 | 11 | 7 | 1 |
| 1828 | 2 | 2 | 10 | 11 | 7 | 4 | 8 | 10 | 9 | 8 | 9 | 11 | 1 | 9 |
| 1829 | 10 | 6 | 6 | 0 | 4 | 4 | 4 | 2 | 11 | 10 | 8 | 5 | 11 | 6 |
| 1830 | 11 | 9 | 3 | 5 | 7 | 7 | 9 | 6 | 2 | 0 | 7 | 2 | 2 | 10 |
| 1831 | 4 | 5 | 2 | 2 | 6 | 8 | 3 | 5 | 8 | 9 | 4 | 6 | 1 | 10 |
| 1832 | 0 | 6 | 2 | 9 | 8 | 9 | 9 | 0 | 7 | 8 | 10 | 1 | 8 | 9 |
| 1833 | 11 | 10 | 6 | 9 | 5 | 7 | 2 | 8 | 10 | 10 | 5 | 6 | 8 | 1 |
| 1834 | 3 | 11 | 5 | 3 | 4 | 11 | 4 | 1 | 0 | 1 | 0 | 0 | 0 | 10 |
| 1835 | 0 | 4 | 7 | 9 | 7 | 2 | 5 | 0 | 3 | 6 | 3 | 8 | 4 | 2 |
| 1836 | 11 | 7 | 0 | 11 | 9 | 0 | 0 | 3 | 5 | 4 | 7 | 8 | 6 | 6 |
| 1837 | 10 | 5 | 1 | 1 | 0 | 2 | 1 | 1 | 9 | 2 | 10 | 3 | 9 | 0 |
| 1838 | 8 | 9 | 11 | 11 | 4 | 4 | 9 | 7 | 2 | 7 | 6 | 7 | 11 | 7 |
| 1839 | 10 | 6 | 11 | 4 | 1 | 2 | 8 | 0 | 1 | 7 | 0 | 5 | 9 | 10 |
| 1840 | 3 | 1 | 9 | 3 | 11 | 4 | 1 | 2 | 6 | 8 | 9 | 0 | 0 | 11 |
| 1841 | 0 | 10 | 11 | 3 | 11 | 3 | 1 | 0 | 11 | 1 | 6 | 1 | 9 | 3 |
| 1842 | 4 | 5 | 5 | 4 | 3 | 11 | 4 | 10 | 3 | 0 | 4 | 7 | 5 | 6 |
| 1843 | 3 | 2 | 8 | 4 | 10 | 3 | 11 | 11 | 3 | 9 | 3 | 4 | 3 | 8 |
| 1844 | 4 | 6 | 7 | 0 | 8 | 6 | 11 | 5 | 10 | 7 | 7 | 6 | 3 | 5 |
| 1845 | 6 | 4 | 2 | 7 | 9 | 4 | 11 | 8 | 1 | 7 | 11 | 11 | 8 | 4 |
| 1846 | 0 | 5 | 8 | 4 | 7 | 8 | 6 | 5 | 0 | 8 | 11 | 9 | 8 | 5 |
| 1847 | 6 | 8 | 11 | 8 | 9 | 1 | 4 | 8 | 5 | 2 | 4 | 10 | 0 | 5 |
| 1848 | 3 | 4 | 8 | 11 | 4 | 6 | 0 | 1 | 6 | 9 | 0 | 6 | 2 | 1 |
| 1849 | 5 | 3 | 7 | 3 | 5 | 9 | 8 | 10 | 5 | 10 | 3 | 11 | 10 | 2 |
| 1850 | 2 | 6 | 0 | 2 | 0 | 2 | 8 | 9 | 3 | 0 | 8 | 1 | 5 | 5 |
| 1851 | 5 | 3 | 2 | 3 | 9 | 4 | 9 | 6 | 5 | 1 | 10 | 9 | 4 | 1 |
| 1852 | 5 | 2 | 1 | 9 | 6 | 3 | 9 | 4 | 5 | 3 | 4 | 6 | 4 | 2 |
| 1853 | 7 | 6 | 3 | 4 | 11 | 11 | 6 | 5 | 8 | 9 | 0 | 9 | 6 | 11 |
| 1854 | 7 | 8 | 5 | 1 | 8 | 3 | 3 | 6 | 6 | 0 | 6 | 4 | 6 | 5 |
| 1855 | 7 | 8 | 8 | 10 | 11 | 4 | 5 | 2 | 7 | 10 | 2 | 4 | 6 | 6 |
| 1856 | 1 | 8 | 5 | 11 | 2 | 4 | 11 | 4 | 5 | 8 | 5 | 2 | 4 | 5 |
| 1857 | 7 | 2 | 10 | 2 | 5 | 8 | 3 | 7 | 6 | 1 | 4 | 9 | 8 | 2 |
| 1858 | 2 | 4 | 3 | 6 | 4 | 8 | 0 | 6 | 3 | 0 | 11 | 4 | 2 | 3 |
| 1859 | 1 | 11 | 5 | 8 | 3 | 4 | 8 | 6 | 7 | 5 | 11 | 6 | 7 | 4 |
| 1860 | 5 | 2 | 9 | 7 | 3 | 1 | 6 | 11 | 5 | 2 | 11 | 8 | 8 | 4 |
| 1861 | 4 | 10 | 2 | 3 | 1 | 5 | 3 | 1 | 11 | 11 | 7 | 8 | 7 | 1 |
| 1862 | 0 | 9 | 3 | 2 | 8 | 4 | 7 | 1 | 11 | 6 | 6 | 5 | 7 | 0 |
| 1863 | 5 | 11 | 9 | 3 | 10 | 1 | 1 | 1 | 1 | 9 | 7 | 3 | 11 | 2 |
| 1864 | 10 | 9 | 11 | 9 | 9 | 11 | 9 | 1 | 5 | 8 | 9 | 11 | 2 | 1 |
| 1865 | 2 | 8 | 10 | 5 | 3 | 1 | 11 | 5 | 5 | 2 | 6 | 6 | 9 | 11 |
| 1866 | 5 | 4 | 7 | 11 | 7 | 9 | 9 | 0 | 2 | 4 | 11 | 1 | 3 | 3 |
| 1867 | 11 | 1 | 8 | 4 | 0 | 8 | 6 | 3 | 10 | 9 | 1 | 6 | 3 | 11 |
| 1868 | 2 | 3 | 7 | 0 | 1 | 3 | 2 | 11 | 4 | 2 | 11 | 8 | 10 | 8 |
| 1869 | 2 | 10 | 0 | 7 | 3 | 8 | 10 | 11 | 2 | 6 | 2 | 0 | 7 | 0 |
| 1870 | 3 | 6 | 4 | 7 | 5 | 5 | 9 | 3 | 7 | 5 | 5 | 2 | 3 | 8 |
| 1871 | 6 | 2 | 11 | 10 | 9 | 8 | 1 | 5 | 5 | 3 | 8 | 1 | 10 | 4 |
| 1872 | 6 | 11 | 10 | 10 | 7 | 4 | 5 | 9 | 2 | 10 | 10 | 1 | 4 | 11 |
| 1873 | 2 | 2 | 6 | 10 | 5 | 6 | 5 | 1 | 3 | 7 | 1 | 4 | 8 | 6 |
| 1874 | 6 | 10 | 8 | 3 | 2 | 5 | 7 | 2 | 11 | 5 | 5 | 11 | 9 | 2 |
| 1875 | 3 | 8 | 10 | 11 | 4 | 3 | 9 | 0 | 2 | 10 | 5 | 11 | 6 | 2 |
| 1876 | 9 | 1 | 8 | 1 | 10 | 3 | 9 | 5 | 5 | 11 | 8 | 4 | 1 | 11 |
| 1877 | 11 | 0 | 7 | 0 | 9 | 0 | 11 | 5 | 7 | 9 | 1 | 9 | 0 | 3 |
| 1878 | 0 | 10 | 4 | 6 | 10 | 8 | 11 | 8 | 3 | 8 | 7 | 9 | 11 | 8 |
| 1879 | 0 | 1 | 5 | 3 | 0 | 4 | 10 | 3 | 5 | 11 | 10 | 6 | 1 | 9 |
| 1880 | 8 | 0 | 2 | 1 | 7 | 8 | 4 | 8 | 7 | 5 | 11 | 4 | 5 | 4 |
| 1881 | 7 | 6 | 1 | 3 | 7 | 3 | 0 | 2 | 8 | 3 | 2 | 10 | 8 | 10 |
| 1882 | 6 | 1 | 5 | 0 | 2 | 9 | 11 | 0 | 9 | 5 | 10 | 9 | 4 | 8 |
| 1883 | 3 | 11 | 9 | 9 | 8 | 11 | 2 | 9 | 3 | 5 | 3 | 9 | 1 | 9 |
| 1884 | 8 | 7 | 9 | 11 | 0 | 0 | 4 | 9 | 2 | 8 | 6 | 9 | 6 | 10 |
| 1885 | 4 | 1 | 1 | 9 | 1 | 4 | 1 | 9 | 6 | 3 | 10 | 1 | 9 | 6 |
| 1886 | 10 | 0 | 3 | 3 | 11 | 2 | 4 | 0 | 0 | 1 | 2 | 4 | 8 | 8 |
| 1887 | 9 | 7 | 4 | 4 | 7 | 5 | 11 | 4 | 2 | 0 | 4 | 0 | 5 | 5 |
| 1888 | 7 | 2 | 1 | 6 | 0 | 0 | 1 | 10 | 6 | 0 | 2 | 4 | 10 | 1 |
| 1889 | 8 | 8 | 3 | 10 | 1 | 2 | 7 | 9 | 10 | 11 | 1 | 7 | 2 | 4 |
| 1890 | 11 | 11 | 4 | 9 | 0 | 6 | 6 | 5 | 0 | 7 | 7 | 11 | 10 | 8 |
| 1891 | 1 | 5 | 7 | 11 | 0 | 10 | 7 | 0 | 10 | 9 | 0 | 9 | 2 | 0 |
| 1892 | 10 | 9 | 8 | 8 | 7 | 5 | 6 | 3 | 11 | 6 | 10 | 2 | 9 | 1 |
| 1893 | 9 | 9 | 8 | 0 | 4 | 5 | 6 | 11 | 7 | 10 | 7 | 0 | 0 | 6 |
| 1894 | 5 | 10 | 5 | 9 | 9 | 6 | 6 | 4 | 1 | 0 | 5 | 8 | 0 | 5 |
| 1895 | 9 | 9 | 4 | 3 | 7 | 9 | 10 | 11 | 2 | 3 | 6 | 5 | 3 | 2 |
| 1896 | 11 | 6 | 7 | 2 | 11 | 4 | 6 | 7 | 9 | 8 | 10 | 1 | 10 | 0 |
| 1897 | 8 | 11 | 3 | 0 | 4 | 4 | 8 | 0 | 2 | 10 | 9 | 8 | 0 | 5 |
| 1898 | 7 | 1 | 1 | 10 | 9 | 5 | 8 | 7 | 10 | 7 | 7 | 11 | 6 | 8 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1899 | 9 | 11 | 9 | 10 | 8 | 3 | 3 | 10 | 1 | 10 | 9 | 9 | 0 | 0 |
| 1900 | 0 | 11 | 5 | 7 | 11 | 5 | 10 | 8 | 6 | 7 | 9 | 3 | 10 | 6 |
| 1901 | 0 | 7 | 6 | 10 | 4 | 5 | 2 | 11 | 1 | 5 | 11 | 6 | 10 | 9 |
| 1902 | 3 | 5 | 2 | 6 | 10 | 2 | 5 | 10 | 4 | 8 | 0 | 4 | 11 | 1 |
| 1903 | 9 | 3 | 10 | 10 | 0 | 7 | 0 | 7 | 9 | 4 | 5 | 6 | 2 | 0 |
| 1904 | 4 | 9 | 6 | 9 | 1 | 2 | 9 | 4 | 0 | 9 | 1 | 7 | 6 | 8 |
| 1905 | 4 | 4 | 4 | 6 | 3 | 8 | 1 | 10 | 2 | 2 | 7 | 6 | 1 | 5 |
| 1906 | 1 | 5 | 7 | 9 | 9 | 9 | 2 | 3 | 11 | 9 | 11 | 11 | 10 | 7 |
| 1907 | 5 | 5 | 0 | 8 | 10 | 11 | 1 | 0 | 11 | 0 | 2 | 0 | 5 | 8 |
| 1908 | 2 | 0 | 7 | 9 | 4 | 11 | 8 | 0 | 8 | 10 | 3 | 9 | 7 | 0 |
| 1909 | 4 | 1 | 10 | 10 | 10 | 9 | 0 | 9 | 10 | 4 | 6 | 0 | 3 | 3 |
| 1910 | 8 | 9 | 6 | 11 | 5 | 11 | 4 | 6 | 0 | 3 | 11 | 5 | 1 | 4 |
| 1911 | 10 | 3 | 3 | 10 | 0 | 7 | 9 | 11 | 3 | 3 | 10 | 2 | 9 | 4 |
| 1912 | 7 | 6 | 6 | 10 | 1 | 9 | 8 | 3 | 10 | 6 | 11 | 2 | 3 | 7 |
| 1913 | 10 | 2 | 9 | 11 | 0 | 0 | 2 | 11 | 4 | 5 | 0 | 11 | 9 | 9 |
| 1914 | 10 | 3 | 0 | 7 | 1 | 10 | 9 | 3 | 0 | 10 | 10 | 8 | 3 | 9 |
| 1915 | 7 | 2 | 4 | 2 | 2 | 9 | 0 | 4 | 7 | 3 | 9 | 3 | 8 | 8 |
| 1916 | 6 | 10 | 4 | 11 | 10 | 10 | 9 | 6 | 2 | 5 | 9 | 3 | 10 | 11 |
| 1917 | 3 | 11 | 2 | 1 | 10 | 4 | 10 | 0 | 1 | 6 | 3 | 10 | 5 | 6 |
| 1918 | 4 | 10 | 2 | 11 | 8 | 11 | 3 | 6 | 4 | 3 | 0 | 6 | 0 | 5 |
| 1919 | 0 | 3 | 8 | 7 | 2 | 4 | 0 | 2 | 2 | 8 | 1 | 8 | 3 | 10 |
| 1920 | 1 | 7 | 6 | 8 | 3 | 1 | 6 | 10 | 9 | 9 | 0 | 6 | 6 | 6 |
| 1921 | 8 | 3 | 5 | 0 | 4 | 10 | 6 | 7 | 10 | 8 | 9 | 6 | 4 | 6 |
| 1922 | 3 | 5 | 1 | 1 | 5 | 10 | 5 | 7 | 1 | 1 | 1 | 10 | 10 | 7 |
| 1923 | 8 | 9 | 6 | 7 | 10 | 0 | 9 | 0 | 6 | 6 | 7 | 6 | 0 | 7 |
| 1924 | 2 | 11 | 0 | 2 | 11 | 1 | 10 | 4 | 1 | 0 | 3 | 5 | 0 | 10 |
| 1925 | 5 | 0 | 9 | 3 | 6 | 3 | 7 | 10 | 10 | 8 | 8 | 10 | 2 | 11 |
| 1926 | 6 | 10 | 0 | 2 | 7 | 4 | 11 | 11 | 4 | 8 | 2 | 3 | 5 | 9 |
| 1927 | 8 | 4 | 6 | 1 | 0 | 4 | 9 | 4 | 2 | 10 | 4 | 0 | 1 | 4 |
| 1928 | 1 | 5 | 3 | 2 | 7 | 9 | 10 | 8 | 2 | 4 | 4 | 3 | 1 | 4 |
| 1929 | 2 | 3 | 0 | 2 | 2 | 10 | 1 | 1 | 8 | 7 | 11 | 11 | 5 | 7 |
| 1930 | 7 | 3 | 8 | 7 | 10 | 5 | 8 | 4 | 11 | 6 | 9 | 3 | 0 | 5 |
| 1931 | 6 | 10 | 8 | 8 | 5 | 6 | 8 | 6 | 0 | 5 | 7 | 7 | 0 | 1 |
| 1932 | 0 | 8 | 4 | 1 | 9 | 10 | 7 | 7 | 11 | 3 | 1 | 11 | 5 | 4 |
| 1933 | 0 | 0 | 3 | 3 | 11 | 6 | 7 | 1 | 7 | 0 | 9 | 2 | 11 | 11 |
| 1934 | 5 | 7 | 6 | 5 | 10 | 9 | 3 | 3 | 6 | 1 | 6 | 6 | 4 | 2 |
| 1935 | 9 | 5 | 1 | 2 | 9 | 6 | 3 | 11 | 0 | 9 | 11 | 3 | 11 | 6 |
| 1936 | 0 | 1 | 5 | 10 | 6 | 1 | 5 | 4 | 7 | 3 | 1 | 0 | 1 | 4 |
| 1937 | 4 | 5 | 6 | 0 | 2 | 9 | 4 | 3 | 1 | 2 | 6 | 4 | 6 | 6 |
| 1938 | 9 | 1 | 4 | 3 | 9 | 1 | 10 | 9 | 7 | 6 | 11 | 9 | 9 | 5 |
| 1939 | 2 | 0 | 4 | 5 | 0 | 2 | 11 | 0 | 4 | 4 | 3 | 10 | 3 | 1 |
| 1940 | 1 | 2 | 8 | 2 | 0 | 1 | 11 | 3 | 6 | 3 | 9 | 10 | 2 | 0 |
| 1941 | 5 | 1 | 0 | 7 | 8 | 10 | 9 | 6 | 7 | 7 | 3 | 3 | 4 | 10 |
| 1942 | 5 | 6 | 5 | 9 | 10 | 2 | 6 | 7 | 8 | 3 | 8 | 2 | 9 | 11 |
| 1943 | 6 | 6 | 9 | 11 | 8 | 5 | 5 | 0 | 1 | 7 | 6 | 1 | 0 | 11 |
| 1944 | 6 | 7 | 4 | 4 | 0 | 6 | 5 | 8 | 1 | 10 | 4 | 3 | 10 | 9 |
| 1945 | 10 | 7 | 0 | 8 | 6 | 11 | 2 | 8 | 5 | 6 | 6 | 3 | 2 | 2 |
| 1946 | 4 | 1 | 9 | 9 | 8 | 7 | 2 | 10 | 10 | 6 | 11 | 7 | 9 | 11 |
| 1947 | 2 | 10 | 4 | 7 | 11 | 6 | 6 | 3 | 8 | 0 | 9 | 7 | 5 | 3 |
| 1948 | 5 | 8 | 8 | 9 | 2 | 11 | 8 | 2 | 5 | 3 | 6 | 11 | 0 | 9 |
| 1949 | 10 | 10 | 0 | 4 | 10 | 7 | 11 | 8 | 2 | 10 | 3 | 8 | 9 | 0 |
| 1950 | 1 | 6 | 4 | 7 | 0 | 9 | 7 | 10 | 0 | 4 | 10 | 1 | 10 | 1 |
| 1951 | 3 | 11 | 1 | 7 | 7 | 9 | 0 | 3 | 7 | 4 | 7 | 0 | 10 | 9 |
| 1952 | 7 | 11 | 9 | 1 | 3 | 4 | 11 | 8 | 8 | 10 | 3 | 9 | 4 | 5 |
| 1953 | 7 | 0 | 1 | 2 | 0 | 4 | 7 | 2 | 0 | 0 | 7 | 11 | 4 | 9 |
| 1954 | 7 | 9 | 9 | 6 | 2 | 11 | 7 | 11 | 2 | 5 | 11 | 1 | 5 | 10 |
| 1955 | 7 | 10 | 9 | 9 | 1 | 8 | 9 | 6 | 7 | 11 | 4 | 2 | 2 | 7 |
| 1956 | 4 | 0 | 0 | 5 | 9 | 3 | 2 | 9 | 0 | 1 | 7 | 2 | 0 | 1 |
| 1957 | 9 | 11 | 3 | 0 | 9 | 9 | 6 | 11 | 9 | 1 | 1 | 7 | 5 | 8 |
| 1958 | 8 | 4 | 1 | 5 | 6 | 0 | 9 | 1 | 3 | 7 | 11 | 8 | 2 | 4 |
| 1959 | 11 | 2 | 1 | 0 | 0 | 6 | 3 | 0 | 3 | 11 | 1 | 0 | 6 | 8 |
| 1960 | 2 | 6 | 7 | 9 | 8 | 8 | 7 | 8 | 0 | 4 | 1 | 8 | 7 | 3 |
| 1961 | 10 | 11 | 3 | 0 | 7 | 1 | 10 | 1 | 8 | 8 | 5 | 9 | 3 | 2 |
| 1962 | 9 | 7 | 3 | 5 | 7 | 0 | 11 | 7 | 8 | 2 | 10 | 10 | 2 | 2 |
| 1963 | 10 | 11 | 2 | 5 | 6 | 10 | 9 | 0 | 4 | 9 | 8 | 2 | 5 | 9 |
| 1964 | 0 | 7 | 3 | 9 | 10 | 9 | 1 | 7 | 5 | 7 | 11 | 8 | 0 | 3 |
| 1965 | 3 | 11 | 5 | 9 | 2 | 10 | 10 | 1 | 8 | 6 | 6 | 3 | 1 | 5 |
| 1966 | 2 | 2 | 2 | 1 | 2 | 6 | 8 | 8 | 7 | 3 | 3 | 0 | 1 | 0 |
| 1967 | 11 | 5 | 1 | 3 | 6 | 0 | 0 | 2 | 5 | 1 | 10 | 5 | 3 | 9 |
| 1968 | 8 | 8 | 9 | 7 | 2 | 4 | 1 | 8 | 2 | 5 | 3 | 2 | 9 | 11 |
| 1969 | 11 | 1 | 2 | 7 | 8 | 4 | 9 | 4 | 3 | 2 | 4 | 8 | 9 | 2 |
| 1970 | 6 | 6 | 4 | 3 | 9 | 2 | 10 | 7 | 6 | 5 | 7 | 0 | 11 | 11 |
| 1971 | 1 | 6 | 6 | 1 | 11 | 0 | 11 | 1 | 5 | 7 | 2 | 1 | 10 | 11 |
| 1972 | 5 | 1 | 2 | 6 | 1 | 3 | 1 | 3 | 11 | 10 | 3 | 11 | 3 | 7 |
| 1973 | 0 | 2 | 4 | 4 | 1 | 5 | 9 | 9 | 9 | 10 | 9 | 4 | 3 | 4 |

-continued

Example #2 of a nested design CS hopping pattern

| m | $n_{cs}(n)$ | | | | | | | | | | | | | |
|---|---|---|---|---|---|---|---|---|---|---|---|---|---|---|
| 1974 | 4 | 5 | 8 | 11 | 10 | 7 | 9 | 4 | 6 | 8 | 2 | 0 | 3 | 7 |
| 1975 | 7 | 8 | 2 | 7 | 8 | 7 | 5 | 8 | 2 | 10 | 0 | 10 | 0 | 1 |
| 1976 | 5 | 5 | 8 | 11 | 1 | 0 | 5 | 7 | 0 | 4 | 9 | 1 | 7 | 10 |
| 1977 | 1 | 11 | 1 | 6 | 10 | 11 | 8 | 1 | 0 | 7 | 10 | 10 | 9 | 4 |
| 1978 | 9 | 6 | 8 | 9 | 1 | 8 | 7 | 0 | 9 | 6 | 7 | 10 | 3 | 0 |
| 1979 | 6 | 6 | 0 | 2 | 6 | 4 | 3 | 3 | 6 | 6 | 9 | 11 | 9 | 5 |
| 1980 | 0 | 3 | 11 | 7 | 5 | 6 | 0 | 0 | 6 | 2 | 6 | 4 | 0 | 8 |
| 1981 | 11 | 8 | 5 | 0 | 1 | 4 | 10 | 2 | 7 | 6 | 9 | 11 | 8 | 2 |
| 1982 | 1 | 8 | 9 | 7 | 9 | 1 | 9 | 3 | 4 | 10 | 6 | 7 | 10 | 8 |
| 1983 | 6 | 1 | 1 | 4 | 10 | 7 | 1 | 1 | 10 | 3 | 11 | 6 | 5 | 5 |
| 1984 | 9 | 1 | 9 | 1 | 11 | 10 | 5 | 7 | 7 | 2 | 9 | 6 | 8 | 4 |
| 1985 | 4 | 7 | 11 | 5 | 3 | 1 | 7 | 7 | 5 | 11 | 3 | 9 | 3 | 5 |
| 1986 | 11 | 10 | 3 | 9 | 11 | 6 | 6 | 11 | 7 | 3 | 10 | 0 | 2 | 1 |
| 1987 | 11 | 1 | 0 | 8 | 4 | 7 | 11 | 11 | 6 | 11 | 8 | 6 | 10 | 1 |
| 1988 | 11 | 7 | 7 | 2 | 8 | 5 | 11 | 3 | 0 | 9 | 8 | 3 | 10 | 11 |
| 1989 | 7 | 7 | 5 | 5 | 9 | 1 | 7 | 1 | 4 | 7 | 0 | 4 | 8 | 7 |
| 1990 | 7 | 9 | 10 | 8 | 9 | 11 | 4 | 0 | 9 | 4 | 2 | 1 | 10 | 5 |
| 1991 | 0 | 7 | 0 | 9 | 11 | 10 | 11 | 1 | 0 | 4 | 5 | 9 | 1 | 2 |
| 1992 | 0 | 7 | 10 | 5 | 11 | 8 | 7 | 11 | 3 | 9 | 6 | 0 | 6 | 6 |
| 1993 | 3 | 10 | 4 | 7 | 4 | 8 | 1 | 1 | 9 | 8 | 1 | 4 | 5 | 5 |
| 1994 | 7 | 2 | 7 | 8 | 7 | 5 | 4 | 6 | 8 | 0 | 4 | 3 | 10 | 9 |
| 1995 | 8 | 10 | 11 | 0 | 4 | 1 | 0 | 7 | 1 | 3 | 8 | 11 | 5 | 1 |
| 1996 | 0 | 8 | 2 | 5 | 0 | 10 | 4 | 1 | 7 | 8 | 9 | 4 | 7 | 6 |
| 1997 | 1 | 9 | 9 | 0 | 0 | 4 | 1 | 7 | 10 | 0 | 3 | 3 | 0 | 6 |
| 1998 | 8 | 2 | 1 | 7 | 4 | 10 | 8 | 10 | 1 | 9 | 1 | 7 | 2 | 1 |
| 1999 | 8 | 9 | 3 | 8 | 4 | 2 | 9 | 5 | 7 | 11 | 10 | 5 | 7 | 6 |
| 2000 | 7 | 11 | 11 | 5 | 9 | 9 | 2 | 7 | 7 | 8 | 5 | 7 | 2 | 10 |
| 2001 | 1 | 10 | 11 | 10 | 7 | 4 | 7 | 0 | 9 | 2 | 0 | 2 | 1 | 2 |
| 2002 | 10 | 7 | 6 | 10 | 10 | 3 | 7 | 10 | 10 | 5 | 9 | 5 | 9 | 4 |
| 2003 | 1 | 7 | 9 | 1 | 6 | 9 | 8 | 2 | 8 | 3 | 8 | 8 | 1 | 10 |
| 2004 | 9 | 11 | 0 | 1 | 7 | 2 | 6 | 2 | 0 | 4 | 11 | 10 | 1 | 8 |
| 2005 | 1 | 8 | 0 | 5 | 2 | 2 | 8 | 3 | 9 | 1 | 2 | 10 | 1 | 4 |
| 2006 | 8 | 10 | 2 | 1 | 8 | 7 | 5 | 10 | 6 | 8 | 9 | 3 | 7 | 0 |
| 2007 | 5 | 6 | 0 | 6 | 9 | 1 | 0 | 11 | 0 | 4 | 8 | 7 | 8 | 9 |
| 2008 | 5 | 1 | 7 | 7 | 9 | 10 | 6 | 2 | 2 | 5 | 5 | 2 | 10 | 6 |
| 2009 | 4 | 2 | 6 | 11 | 6 | 4 | 4 | 9 | 10 | 2 | 5 | 6 | 7 | 11 |
| 2010 | 6 | 1 | 4 | 8 | 4 | 3 | 6 | 9 | 11 | 0 | 5 | 6 | 3 | 10 |
| 2011 | 8 | 4 | 10 | 8 | 5 | 5 | 3 | 11 | 2 | 11 | 10 | 1 | 3 | 4 |
| 2012 | 0 | 3 | 10 | 3 | 0 | 2 | 5 | 5 | 6 | 6 | 4 | 11 | 2 | 3 |
| 2013 | 9 | 1 | 1 | 0 | 4 | 4 | 1 | 3 | 5 | 4 | 4 | 7 | 4 | 1 |
| 2014 | 6 | 5 | 1 | 1 | 8 | 4 | 5 | 6 | 0 | 4 | 10 | 5 | 6 | 4 |
| 2015 | 6 | 10 | 8 | 2 | 0 | 5 | 0 | 7 | 3 | 1 | 4 | 4 | 1 | 1 |
| 2016 | 6 | 7 | 6 | 11 | 2 | 11 | 0 | 10 | 2 | 1 | 4 | 8 | 7 | 5 |
| 2017 | 7 | 1 | 1 | 1 | 8 | 6 | 1 | 5 | 1 | 3 | 1 | 9 | 2 | 8 |
| 2018 | 3 | 0 | 6 | 6 | 11 | 3 | 1 | 6 | 1 | 9 | 8 | 8 | 6 | 10 |
| 2019 | 3 | 6 | 3 | 1 | 5 | 8 | 7 | 11 | 7 | 8 | 11 | 0 | 7 | 2 |
| 2020 | 7 | 10 | 10 | 0 | 10 | 7 | 2 | 2 | 0 | 2 | 8 | 5 | 3 | 10 |
| 2021 | 5 | 11 | 9 | 4 | 4 | 5 | 0 | 4 | 4 | 4 | 10 | 3 | 6 | 9 |
| 2022 | 7 | 1 | 7 | 11 | 11 | 11 | 8 | 8 | 7 | 11 | 10 | 11 | 10 | 6 |
| 2023 | 11 | 7 | 1 | 6 | 3 | 10 | 2 | 7 | 2 | 9 | 6 | 3 | 5 | 3 |
| 2024 | 0 | 3 | 8 | 1 | 3 | 0 | 8 | 1 | 0 | 4 | 4 | 2 | 9 | 1 |
| 2025 | 6 | 3 | 2 | 3 | 9 | 10 | 1 | 2 | 9 | 3 | 0 | 2 | 5 | 10 |
| 2026 | 4 | 7 | 11 | 10 | 2 | 5 | 8 | 1 | 3 | 4 | 2 | 10 | 3 | 0 |
| 2027 | 8 | 4 | 8 | 8 | 11 | 3 | 1 | 6 | 5 | 10 | 11 | 1 | 4 | 11 |
| 2028 | 4 | 11 | 7 | 4 | 5 | 6 | 8 | 10 | 2 | 1 | 7 | 5 | 11 | 11 |
| 2029 | 0 | 2 | 7 | 7 | 2 | 11 | 8 | 9 | 3 | 1 | 5 | 7 | 8 | 0 |
| 2030 | 6 | 2 | 2 | 9 | 1 | 9 | 5 | 4 | 8 | 3 | 2 | 5 | 5 | 5 |
| 2031 | 11 | 5 | 5 | 3 | 3 | 4 | 5 | 1 | 1 | 11 | 8 | 0 | 5 | 4 |
| 2032 | 11 | 8 | 11 | 9 | 8 | 7 | 11 | 0 | 9 | 7 | 0 | 11 | 2 | 3 |
| 2033 | 1 | 7 | 10 | 1 | 4 | 10 | 7 | 10 | 2 | 3 | 0 | 0 | 10 | 7 |
| 2034 | 0 | 10 | 4 | 2 | 9 | 9 | 6 | 7 | 1 | 6 | 8 | 4 | 8 | 9 |
| 2035 | 1 | 4 | 8 | 10 | 3 | 0 | 1 | 11 | 1 | 0 | 1 | 4 | 8 | 11 |
| 2036 | 3 | 8 | 8 | 7 | 10 | 2 | 1 | 10 | 7 | 9 | 5 | 3 | 8 | 4 |
| 2037 | 7 | 6 | 11 | 10 | 9 | 3 | 4 | 8 | 3 | 5 | 8 | 4 | 2 | 7 |
| 2038 | 11 | 2 | 7 | 6 | 0 | 2 | 10 | 2 | 6 | 1 | 6 | 1 | 11 | 10 |
| 2039 | 3 | 11 | 2 | 0 | 2 | 9 | 3 | 5 | 3 | 9 | 9 | 5 | 0 | 2 |
| 2040 | 10 | 4 | 11 | 9 | 8 | 3 | 0 | 11 | 4 | 4 | 11 | 6 | 1 | 5 |
| 2041 | 5 | 11 | 6 | 6 | 9 | 11 | 9 | 10 | 1 | 3 | 6 | 4 | 4 | 0 |
| 2042 | 1 | 1 | 5 | 5 | 11 | 10 | 2 | 5 | 3 | 1 | 11 | 1 | 1 | 3 |
| 2043 | 6 | 7 | 6 | 5 | 9 | 0 | 2 | 8 | 0 | 8 | 1 | 10 | 6 | 3 |
| 2044 | 1 | 3 | 6 | 5 | 2 | 4 | 3 | 1 | 7 | 6 | 4 | 10 | 2 | 8 |
| 2045 | 5 | 6 | 5 | 2 | 11 | 5 | 3 | 0 | 10 | 11 | 11 | 4 | 9 | 2 |
| 2046 | 9 | 5 | 5 | 6 | 3 | 8 | 5 | 4 | 11 | 5 | 9 | 10 | 8 | 1 |
| 2047 | 8 | 6 | 11 | 2 | 0 | 9 | 2 | 5 | 1 | 2 | 6 | 5 | 11 | 11 |

Figure 4:
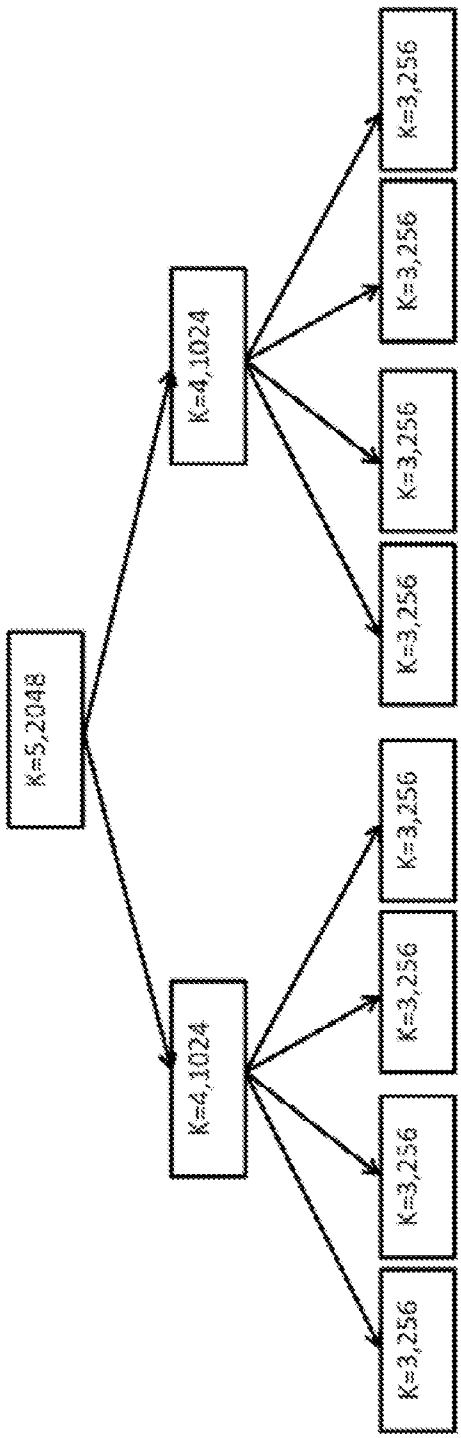
FIG. 4 shows an example of group-based sequence generation.

Group-based design. In some embodiments, a group-based design of the CS hopping sequences divides the $2^M$ combination sets into G groups, with $2^M/G$ combination sets in each of the groups, as shown in FIG. 4, wherein 2048 CS hopping sequences (with K=5) are divided into two groups of 1024 CS hopping sequences (with K=4). As further shown therein, each group can be divided into smaller subgroups, wherein each of the 1024 CS hopping sequences (with K=4) are divided into four groups of 256 CS hopping sequences (with K=3). As noted earlier, K represents the number of number of identical elements in the same location between any two CS hopping sequences.

In some embodiments, for the group-based design, different groups are allocated to different UEs to achieve UE multiplexing if the payload is smaller than 11. For an example, if two UEs have 10 bits to be transmitted, they can be allocated to the first half and last half of the CS hopping pattern, respectively. These two UEs can transmit the PUCCH on the same time-frequency resource but use different CS hopping sequences. For another example, if 8 UEs have 8 bits to be transmitted, they can be allocated to each of the subgroups with K=3 as shown in FIG. 4. In this case, since K is identical in each group/subgroup, the same performance is expected for each UE.

In some embodiments, the CS hopping pattern for the group-based design can be selected from the following six tables:

Example #1 of a Group-Based CS Hopping Pattern

Example #1 of a group-based CS hopping pattern

| m | $n_{cs}(n)$ | | | | | | | | | | | | | |
|---|---|---|---|---|---|---|---|---|---|---|---|---|---|---|
| 0 | 4 | 8 | 8 | 8 | 9 | 6 | 7 | 3 | 0 | 0 | 5 | 1 | 5 | 6 |
| 1 | 9 | 11 | 9 | 9 | 7 | 7 | 5 | 9 | 10 | 7 | 0 | 3 | 10 | 10 |
| 2 | 5 | 0 | 3 | 4 | 6 | 4 | 8 | 2 | 6 | 9 | 1 | 6 | 1 | 8 |
| 3 | 11 | 7 | 5 | 11 | 4 | 11 | 6 | 6 | 9 | 5 | 7 | 0 | 3 | 0 |
| 4 | 0 | 6 | 2 | 3 | 1 | 5 | 0 | 0 | 7 | 8 | 11 | 11 | 7 | 11 |
| 5 | 10 | 7 | 4 | 0 | 7 | 1 | 3 | 10 | 3 | 11 | 2 | 11 | 5 | 2 |
| 6 | 6 | 10 | 10 | 0 | 2 | 4 | 4 | 8 | 11 | 6 | 8 | 4 | 2 | 1 |
| 7 | 2 | 2 | 1 | 6 | 4 | 9 | 1 | 3 | 4 | 3 | 11 | 5 | 11 | 2 |
| 8 | 5 | 3 | 5 | 1 | 9 | 0 | 11 | 10 | 5 | 3 | 4 | 9 | 2 | 11 |
| 9 | 11 | 5 | 10 | 8 | 8 | 6 | 2 | 5 | 1 | 3 | 2 | 5 | 2 | 5 |
| 10 | 9 | 3 | 6 | 7 | 8 | 6 | 9 | 4 | 0 | 6 | 6 | 2 | 6 | 3 |
| 11 | 0 | 5 | 7 | 7 | 2 | 2 | 10 | 6 | 0 | 7 | 10 | 9 | 4 | 0 |
| 12 | 9 | 7 | 11 | 5 | 10 | 0 | 1 | 1 | 11 | 8 | 4 | 10 | 10 | 2 |
| 13 | 11 | 3 | 7 | 11 | 3 | 10 | 11 | 11 | 11 | 0 | 3 | 2 | 10 | 10 |
| 14 | 4 | 2 | 11 | 0 | 1 | 11 | 8 | 2 | 1 | 11 | 5 | 10 | 2 | 10 |
| 15 | 10 | 7 | 3 | 11 | 0 | 6 | 11 | 5 | 10 | 4 | 5 | 10 | 7 | 11 |
| 16 | 2 | 1 | 8 | 5 | 1 | 0 | 8 | 4 | 10 | 2 | 1 | 9 | 3 | 9 |
| 17 | 1 | 6 | 6 | 0 | 10 | 6 | 10 | 11 | 6 | 10 | 8 | 3 | 3 | 6 |
| 18 | 10 | 4 | 2 | 7 | 10 | 5 | 6 | 3 | 8 | 7 | 6 | 7 | 5 | 5 |
| 19 | 8 | 6 | 5 | 6 | 8 | 7 | 0 | 1 | 6 | 0 | 0 | 10 | 8 | 1 |
| 20 | 11 | 9 | 9 | 2 | 5 | 7 | 0 | 6 | 8 | 6 | 1 | 8 | 1 | 2 |
| 21 | 2 | 8 | 1 | 7 | 3 | 1 | 0 | 9 | 8 | 8 | 0 | 6 | 9 | 8 |
| 22 | 5 | 10 | 4 | 5 | 11 | 9 | 10 | 4 | 9 | 3 | 9 | 7 | 1 | 7 |
| 23 | 3 | 0 | 3 | 3 | 5 | 11 | 7 | 7 | 1 | 2 | 3 | 9 | 9 | 5 |
| 24 | 1 | 2 | 0 | 5 | 9 | 1 | 7 | 6 | 11 | 2 | 11 | 6 | 0 | 10 |
| 25 | 3 | 3 | 2 | 8 | 2 | 0 | 1 | 11 | 1 | 7 | 5 | 6 | 6 | 7 |
| 26 | 6 | 4 | 9 | 8 | 3 | 9 | 9 | 1 | 5 | 5 | 2 | 4 | 8 | 11 |
| 27 | 9 | 4 | 0 | 10 | 7 | 8 | 2 | 8 | 3 | 3 | 10 | 9 | 9 | 1 |
| 28 | 10 | 9 | 8 | 8 | 4 | 5 | 3 | 1 | 7 | 3 | 7 | 10 | 1 | 3 |
| 29 | 1 | 0 | 6 | 10 | 6 | 11 | 3 | 6 | 5 | 4 | 0 | 7 | 11 | 7 |
| 30 | 2 | 11 | 7 | 2 | 2 | 9 | 7 | 8 | 7 | 1 | 4 | 11 | 10 | 7 |
| 31 | 1 | 9 | 8 | 9 | 1 | 3 | 1 | 2 | 3 | 6 | 9 | 2 | 9 | 8 |
| 32 | 7 | 9 | 3 | 8 | 10 | 8 | 11 | 9 | 6 | 11 | 11 | 0 | 10 | 1 |
| 33 | 2 | 10 | 11 | 4 | 0 | 2 | 10 | 1 | 4 | 2 | 5 | 2 | 5 | 8 |
| 34 | 8 | 8 | 7 | 9 | 6 | 8 | 8 | 5 | 11 | 5 | 6 | 7 | 3 | 3 |
| 35 | 3 | 11 | 9 | 6 | 9 | 6 | 4 | 2 | 3 | 5 | 3 | 0 | 7 | 3 |
| 36 | 5 | 7 | 9 | 1 | 4 | 2 | 4 | 11 | 8 | 1 | 6 | 1 | 0 | 8 |
| 37 | 3 | 3 | 7 | 2 | 8 | 1 | 5 | 3 | 9 | 10 | 2 | 10 | 1 | 11 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 38 | 7 | 4 | 9 | 0 | 8 | 3 | 1 | 6 | 2 | 11 | 3 | 1 | 4 | 5 |
| 39 | 4 | 7 | 5 | 4 | 4 | 10 | 7 | 3 | 6 | 11 | 9 | 9 | 4 | 10 |
| 40 | 9 | 11 | 9 | 11 | 11 | 8 | 8 | 6 | 1 | 0 | 5 | 11 | 9 | 7 |
| 41 | 5 | 4 | 7 | 11 | 2 | 0 | 5 | 1 | 5 | 1 | 5 | 7 | 3 | 4 |
| 42 | 0 | 6 | 11 | 4 | 9 | 7 | 4 | 5 | 10 | 0 | 4 | 3 | 11 | 4 |
| 43 | 5 | 4 | 6 | 5 | 9 | 6 | 3 | 2 | 4 | 4 | 10 | 1 | 4 | 9 |
| 44 | 10 | 8 | 6 | 3 | 3 | 9 | 1 | 2 | 7 | 9 | 6 | 3 | 3 | 8 |
| 45 | 3 | 9 | 6 | 0 | 3 | 8 | 2 | 3 | 0 | 9 | 7 | 8 | 4 | 6 |
| 46 | 4 | 9 | 1 | 9 | 9 | 6 | 6 | 9 | 3 | 9 | 11 | 9 | 4 | 7 |
| 47 | 10 | 2 | 8 | 0 | 0 | 9 | 10 | 10 | 11 | 6 | 9 | 5 | 6 | 3 |
| 48 | 0 | 1 | 4 | 3 | 4 | 6 | 3 | 4 | 11 | 9 | 2 | 9 | 10 | 5 |
| 49 | 0 | 7 | 10 | 2 | 7 | 6 | 11 | 8 | 1 | 0 | 9 | 8 | 3 | 9 |
| 50 | 4 | 9 | 3 | 3 | 2 | 3 | 11 | 5 | 5 | 8 | 10 | 11 | 8 | 10 |
| 51 | 1 | 1 | 9 | 5 | 3 | 9 | 4 | 3 | 4 | 10 | 7 | 10 | 5 | 3 |
| 52 | 7 | 3 | 8 | 9 | 6 | 6 | 10 | 6 | 7 | 6 | 10 | 0 | 8 | 2 |
| 53 | 9 | 3 | 2 | 5 | 11 | 9 | 5 | 10 | 2 | 4 | 0 | 11 | 3 | 9 |
| 54 | 9 | 10 | 5 | 0 | 0 | 11 | 9 | 10 | 4 | 7 | 1 | 1 | 8 | 1 |
| 55 | 4 | 3 | 3 | 0 | 9 | 5 | 4 | 4 | 9 | 7 | 1 | 4 | 0 | 9 |
| 56 | 4 | 6 | 7 | 4 | 9 | 11 | 10 | 3 | 1 | 1 | 10 | 2 | 3 | 3 |
| 57 | 10 | 1 | 8 | 4 | 1 | 11 | 7 | 8 | 9 | 9 | 3 | 3 | 5 | 7 |
| 58 | 7 | 7 | 5 | 6 | 6 | 8 | 3 | 4 | 4 | 3 | 0 | 2 | 0 | 9 |
| 59 | 9 | 7 | 1 | 4 | 1 | 1 | 3 | 11 | 7 | 7 | 8 | 3 | 9 | 5 |
| 60 | 3 | 4 | 1 | 10 | 5 | 4 | 5 | 8 | 6 | 0 | 2 | 1 | 2 | 9 |
| 61 | 9 | 5 | 10 | 5 | 2 | 8 | 11 | 3 | 5 | 5 | 11 | 4 | 3 | 6 |
| 62 | 11 | 6 | 3 | 1 | 8 | 1 | 8 | 1 | 3 | 3 | 7 | 6 | 5 | 10 |
| 63 | 7 | 8 | 0 | 6 | 0 | 0 | 5 | 10 | 10 | 5 | 10 | 11 | 7 | 0 |
| 64 | 1 | 3 | 6 | 9 | 11 | 7 | 0 | 3 | 10 | 0 | 8 | 8 | 2 | 5 |
| 65 | 1 | 1 | 11 | 3 | 6 | 11 | 0 | 8 | 0 | 1 | 7 | 4 | 4 | 1 |
| 66 | 8 | 11 | 7 | 6 | 7 | 5 | 7 | 4 | 0 | 3 | 8 | 0 | 6 | 10 |
| 67 | 10 | 9 | 2 | 8 | 6 | 0 | 4 | 9 | 10 | 5 | 0 | 9 | 11 | 5 |
| 68 | 11 | 4 | 6 | 4 | 1 | 10 | 2 | 4 | 7 | 8 | 6 | 5 | 0 | 10 |
| 69 | 11 | 2 | 8 | 6 | 7 | 1 | 2 | 6 | 1 | 4 | 10 | 8 | 7 | 4 |
| 70 | 9 | 4 | 9 | 7 | 6 | 2 | 7 | 0 | 3 | 4 | 7 | 6 | 7 | 0 |
| 71 | 11 | 0 | 7 | 5 | 2 | 11 | 5 | 2 | 11 | 3 | 0 | 1 | 1 | 2 |
| 72 | 9 | 3 | 4 | 6 | 2 | 9 | 9 | 6 | 6 | 3 | 2 | 10 | 10 | 6 |
| 73 | 4 | 1 | 10 | 3 | 9 | 5 | 0 | 7 | 2 | 4 | 8 | 10 | 8 | 7 |
| 74 | 3 | 11 | 2 | 3 | 11 | 3 | 6 | 8 | 3 | 4 | 7 | 8 | 5 | 4 |
| 75 | 5 | 10 | 6 | 6 | 6 | 3 | 8 | 7 | 3 | 1 | 4 | 8 | 8 | 10 |
| 76 | 0 | 9 | 6 | 7 | 7 | 4 | 0 | 2 | 11 | 11 | 11 | 4 | 6 | 5 |
| 77 | 3 | 6 | 0 | 8 | 8 | 10 | 7 | 9 | 10 | 3 | 1 | 3 | 7 | 1 |
| 78 | 11 | 0 | 10 | 9 | 6 | 11 | 7 | 9 | 6 | 5 | 10 | 11 | 6 | 10 |
| 79 | 7 | 8 | 4 | 9 | 1 | 5 | 0 | 2 | 9 | 11 | 4 | 1 | 10 | 3 |
| 80 | 6 | 6 | 5 | 8 | 5 | 2 | 9 | 4 | 3 | 7 | 10 | 3 | 1 | 8 |
| 81 | 7 | 0 | 9 | 8 | 10 | 7 | 7 | 0 | 10 | 2 | 10 | 5 | 1 | 4 |
| 82 | 8 | 5 | 3 | 6 | 8 | 5 | 8 | 7 | 5 | 10 | 5 | 3 | 10 | 7 |
| 83 | 10 | 1 | 11 | 2 | 9 | 11 | 6 | 11 | 11 | 3 | 10 | 5 | 11 | 8 |
| 84 | 2 | 6 | 11 | 3 | 2 | 4 | 9 | 0 | 11 | 10 | 3 | 10 | 3 | 3 |
| 85 | 2 | 10 | 6 | 3 | 10 | 5 | 11 | 6 | 0 | 5 | 10 | 7 | 9 | 6 |
| 86 | 0 | 4 | 0 | 9 | 9 | 11 | 5 | 8 | 8 | 11 | 8 | 4 | 8 | 0 |
| 87 | 2 | 3 | 0 | 4 | 4 | 7 | 4 | 8 | 3 | 8 | 7 | 11 | 1 | 11 |
| 88 | 6 | 7 | 6 | 10 | 4 | 4 | 5 | 5 | 11 | 8 | 7 | 6 | 0 | 3 |
| 89 | 11 | 4 | 8 | 6 | 11 | 0 | 0 | 3 | 6 | 10 | 7 | 9 | 11 | 8 |
| 90 | 1 | 7 | 9 | 6 | 1 | 7 | 9 | 10 | 7 | 6 | 4 | 1 | 11 | 10 |
| 91 | 2 | 3 | 5 | 5 | 5 | 1 | 11 | 8 | 0 | 10 | 0 | 1 | 8 | 4 |
| 92 | 8 | 0 | 1 | 1 | 8 | 4 | 6 | 7 | 1 | 9 | 9 | 11 | 2 | 11 |
| 93 | 7 | 5 | 8 | 10 | 10 | 2 | 0 | 9 | 8 | 9 | 3 | 11 | 3 | 11 |
| 94 | 2 | 10 | 6 | 10 | 11 | 6 | 7 | 9 | 1 | 10 | 4 | 5 | 5 | 4 |
| 95 | 8 | 4 | 11 | 5 | 10 | 7 | 10 | 4 | 10 | 11 | 5 | 4 | 6 | 3 |
| 96 | 6 | 9 | 1 | 7 | 8 | 10 | 1 | 5 | 5 | 0 | 2 | 2 | 1 | 2 |
| 97 | 11 | 1 | 4 | 8 | 11 | 6 | 5 | 11 | 5 | 6 | 9 | 3 | 0 | 4 |
| 98 | 6 | 10 | 0 | 8 | 0 | 8 | 6 | 9 | 9 | 6 | 9 | 11 | 5 | 2 |
| 99 | 6 | 7 | 2 | 8 | 11 | 1 | 10 | 4 | 0 | 8 | 11 | 0 | 11 | 4 |
| 100 | 7 | 0 | 5 | 7 | 0 | 7 | 9 | 8 | 2 | 5 | 9 | 0 | 6 | 8 |
| 101 | 1 | 8 | 7 | 1 | 5 | 4 | 8 | 6 | 9 | 2 | 0 | 2 | 7 | 0 |
| 102 | 1 | 2 | 4 | 11 | 8 | 1 | 6 | 9 | 6 | 1 | 1 | 11 | 11 | 6 |
| 103 | 11 | 6 | 11 | 10 | 8 | 0 | 6 | 8 | 0 | 7 | 5 | 9 | 8 | 6 |
| 104 | 3 | 2 | 7 | 7 | 6 | 10 | 0 | 3 | 2 | 11 | 5 | 8 | 9 | 9 |
| 105 | 2 | 1 | 6 | 4 | 3 | 5 | 8 | 9 | 4 | 6 | 11 | 1 | 2 | 0 |
| 106 | 6 | 10 | 5 | 11 | 9 | 10 | 8 | 1 | 2 | 11 | 3 | 5 | 11 | 11 |
| 107 | 2 | 3 | 8 | 11 | 0 | 4 | 6 | 3 | 1 | 4 | 11 | 6 | 9 | 9 |
| 108 | 0 | 2 | 7 | 4 | 1 | 0 | 11 | 1 | 4 | 9 | 0 | 4 | 10 | 0 |
| 109 | 7 | 10 | 3 | 6 | 2 | 7 | 0 | 5 | 8 | 3 | 6 | 4 | 7 | 8 |
| 110 | 3 | 2 | 6 | 2 | 5 | 4 | 3 | 9 | 1 | 1 | 0 | 6 | 1 | 1 |
| 111 | 0 | 7 | 10 | 7 | 5 | 0 | 4 | 0 | 8 | 9 | 7 | 0 | 2 | 7 |
| 112 | 4 | 5 | 5 | 10 | 10 | 9 | 1 | 0 | 1 | 6 | 1 | 4 | 2 | 6 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 113 | 2 | 0 | 3 | 7 | 10 | 8 | 9 | 3 | 9 | 2 | 5 | 4 | 4 | 11 |
| 114 | 9 | 7 | 2 | 10 | 1 | 0 | 10 | 5 | 4 | 10 | 3 | 5 | 1 | 9 |
| 115 | 1 | 3 | 11 | 6 | 1 | 6 | 11 | 1 | 2 | 2 | 1 | 8 | 9 | 11 |
| 116 | 3 | 1 | 4 | 4 | 11 | 4 | 6 | 10 | 7 | 10 | 3 | 0 | 1 | 0 |
| 117 | 4 | 9 | 7 | 10 | 11 | 7 | 10 | 1 | 9 | 5 | 11 | 1 | 2 | 1 |
| 118 | 8 | 2 | 4 | 4 | 10 | 1 | 9 | 6 | 3 | 0 | 7 | 5 | 8 | 7 |
| 119 | 0 | 9 | 4 | 11 | 5 | 2 | 3 | 8 | 4 | 6 | 7 | 7 | 6 | 6 |
| 120 | 5 | 0 | 8 | 0 | 7 | 9 | 8 | 5 | 4 | 3 | 6 | 8 | 5 | 11 |
| 121 | 7 | 10 | 6 | 3 | 6 | 0 | 7 | 2 | 6 | 8 | 5 | 1 | 0 | 2 |
| 122 | 10 | 4 | 4 | 3 | 2 | 0 | 9 | 2 | 2 | 2 | 11 | 0 | 5 | 7 |
| 123 | 2 | 4 | 0 | 10 | 9 | 0 | 1 | 10 | 9 | 9 | 9 | 10 | 0 | 8 |
| 124 | 6 | 5 | 4 | 1 | 10 | 6 | 9 | 8 | 7 | 3 | 8 | 11 | 9 | 4 |
| 125 | 6 | 5 | 8 | 4 | 7 | 1 | 10 | 3 | 4 | 5 | 9 | 7 | 2 | 5 |
| 126 | 4 | 8 | 4 | 9 | 0 | 3 | 10 | 9 | 4 | 0 | 8 | 6 | 6 | 9 |
| 127 | 9 | 0 | 7 | 6 | 7 | 10 | 10 | 8 | 5 | 2 | 9 | 10 | 11 | 4 |
| 128 | 11 | 7 | 8 | 4 | 5 | 6 | 3 | 1 | 0 | 5 | 0 | 11 | 11 | 11 |
| 129 | 4 | 11 | 2 | 8 | 10 | 2 | 3 | 5 | 10 | 4 | 4 | 4 | 0 | 8 |
| 130 | 5 | 5 | 7 | 3 | 8 | 11 | 9 | 9 | 9 | 0 | 4 | 7 | 0 | 1 |
| 131 | 5 | 7 | 0 | 7 | 3 | 5 | 5 | 4 | 7 | 10 | 10 | 7 | 6 | 11 |
| 132 | 2 | 11 | 11 | 11 | 5 | 9 | 2 | 6 | 6 | 5 | 3 | 5 | 0 | 9 |
| 133 | 4 | 9 | 10 | 6 | 10 | 9 | 3 | 4 | 6 | 2 | 5 | 6 | 8 | 4 |
| 134 | 3 | 10 | 10 | 9 | 3 | 2 | 7 | 5 | 10 | 1 | 9 | 0 | 3 | 7 |
| 135 | 6 | 3 | 10 | 0 | 3 | 8 | 0 | 4 | 1 | 11 | 10 | 1 | 7 | 0 |
| 136 | 5 | 5 | 11 | 1 | 11 | 1 | 1 | 0 | 2 | 2 | 2 | 9 | 3 | 5 |
| 137 | 7 | 7 | 8 | 8 | 9 | 4 | 10 | 11 | 10 | 1 | 8 | 8 | 4 | 10 |
| 138 | 8 | 3 | 3 | 2 | 4 | 0 | 10 | 10 | 8 | 1 | 0 | 10 | 5 | 3 |
| 139 | 1 | 1 | 8 | 10 | 2 | 10 | 11 | 0 | 0 | 8 | 8 | 8 | 6 | 3 |
| 140 | 2 | 2 | 3 | 1 | 0 | 7 | 4 | 1 | 0 | 9 | 6 | 0 | 11 | 3 |
| 141 | 0 | 11 | 11 | 1 | 3 | 3 | 11 | 11 | 9 | 4 | 0 | 5 | 8 | 5 |
| 142 | 1 | 1 | 2 | 1 | 7 | 5 | 10 | 5 | 11 | 9 | 0 | 6 | 3 | 1 |
| 143 | 10 | 0 | 0 | 1 | 11 | 8 | 5 | 11 | 0 | 2 | 4 | 10 | 10 | 10 |
| 144 | 11 | 0 | 5 | 1 | 3 | 6 | 10 | 6 | 8 | 8 | 3 | 7 | 7 | 5 |
| 145 | 8 | 10 | 1 | 7 | 4 | 0 | 2 | 3 | 9 | 6 | 1 | 7 | 8 | 6 |
| 146 | 8 | 0 | 0 | 3 | 11 | 6 | 9 | 0 | 5 | 4 | 8 | 0 | 7 | 9 |
| 147 | 0 | 11 | 1 | 6 | 3 | 11 | 1 | 9 | 2 | 5 | 4 | 1 | 3 | 4 |
| 148 | 5 | 8 | 6 | 1 | 1 | 10 | 0 | 5 | 1 | 5 | 2 | 0 | 5 | 6 |
| 149 | 1 | 8 | 11 | 11 | 0 | 2 | 1 | 10 | 9 | 11 | 8 | 7 | 11 | 2 |
| 150 | 2 | 5 | 4 | 6 | 7 | 0 | 3 | 1 | 1 | 10 | 0 | 0 | 9 | 5 |
| 151 | 0 | 8 | 9 | 11 | 9 | 3 | 10 | 4 | 7 | 6 | 2 | 11 | 5 | 1 |
| 152 | 10 | 6 | 5 | 5 | 8 | 3 | 2 | 11 | 5 | 1 | 1 | 5 | 0 | 2 |
| 153 | 8 | 7 | 11 | 2 | 7 | 5 | 2 | 0 | 10 | 2 | 3 | 2 | 9 | 0 |
| 154 | 10 | 2 | 4 | 9 | 10 | 7 | 11 | 2 | 8 | 10 | 2 | 9 | 0 | 8 |
| 155 | 10 | 6 | 4 | 5 | 5 | 11 | 8 | 6 | 2 | 9 | 8 | 1 | 11 | 10 |
| 156 | 6 | 11 | 8 | 2 | 5 | 2 | 5 | 2 | 0 | 6 | 6 | 9 | 8 | 7 |
| 157 | 5 | 8 | 8 | 5 | 4 | 10 | 3 | 7 | 11 | 1 | 3 | 6 | 6 | 4 |
| 158 | 1 | 6 | 1 | 2 | 3 | 9 | 6 | 2 | 3 | 2 | 2 | 5 | 0 | 1 |
| 159 | 2 | 2 | 2 | 0 | 2 | 1 | 6 | 4 | 9 | 4 | 2 | 2 | 10 | 3 |
| 160 | 1 | 0 | 10 | 6 | 9 | 5 | 5 | 0 | 8 | 1 | 3 | 8 | 5 | 4 |
| 161 | 0 | 4 | 8 | 11 | 2 | 8 | 7 | 5 | 6 | 8 | 2 | 3 | 1 | 0 |
| 162 | 0 | 4 | 5 | 2 | 7 | 10 | 8 | 10 | 3 | 6 | 6 | 3 | 10 | 4 |
| 163 | 3 | 10 | 11 | 0 | 9 | 3 | 3 | 11 | 2 | 9 | 5 | 7 | 3 | 3 |
| 164 | 1 | 9 | 2 | 9 | 9 | 0 | 5 | 6 | 0 | 10 | 4 | 0 | 7 | 6 |
| 165 | 3 | 0 | 9 | 5 | 4 | 11 | 11 | 11 | 7 | 8 | 10 | 2 | 4 | 7 |
| 166 | 7 | 10 | 0 | 10 | 6 | 9 | 2 | 10 | 7 | 7 | 2 | 3 | 6 | 9 |
| 167 | 10 | 9 | 10 | 3 | 3 | 8 | 7 | 6 | 9 | 7 | 5 | 7 | 11 | 3 |
| 168 | 4 | 11 | 5 | 7 | 2 | 8 | 8 | 9 | 5 | 2 | 3 | 7 | 1 | 1 |
| 169 | 0 | 0 | 6 | 1 | 4 | 8 | 4 | 5 | 2 | 6 | 10 | 11 | 9 | 9 |
| 170 | 7 | 4 | 5 | 5 | 11 | 5 | 10 | 5 | 0 | 0 | 1 | 11 | 10 | 11 |
| 171 | 8 | 8 | 2 | 5 | 3 | 11 | 10 | 10 | 6 | 5 | 3 | 8 | 9 | 7 |
| 172 | 7 | 9 | 10 | 7 | 1 | 1 | 5 | 10 | 6 | 10 | 6 | 2 | 0 | 5 |
| 173 | 9 | 8 | 8 | 4 | 8 | 7 | 6 | 6 | 10 | 1 | 2 | 0 | 9 | 3 |
| 174 | 5 | 1 | 5 | 2 | 11 | 8 | 9 | 5 | 10 | 5 | 7 | 9 | 7 | 4 |
| 175 | 5 | 9 | 5 | 9 | 6 | 10 | 5 | 11 | 6 | 2 | 8 | 7 | 2 | 7 |
| 176 | 3 | 1 | 11 | 10 | 10 | 11 | 11 | 3 | 5 | 6 | 6 | 6 | 10 | 10 |
| 177 | 9 | 9 | 7 | 8 | 4 | 11 | 9 | 8 | 6 | 4 | 0 | 3 | 4 | 11 |
| 178 | 11 | 1 | 1 | 1 | 1 | 7 | 1 | 1 | 8 | 4 | 2 | 1 | 10 | 11 |
| 179 | 0 | 9 | 1 | 2 | 6 | 4 | 9 | 1 | 0 | 2 | 9 | 0 | 4 | 2 |
| 180 | 6 | 0 | 1 | 10 | 11 | 9 | 4 | 6 | 8 | 7 | 7 | 8 | 9 | 0 |
| 181 | 8 | 8 | 1 | 8 | 2 | 7 | 3 | 2 | 1 | 6 | 10 | 4 | 9 | 2 |
| 182 | 0 | 10 | 9 | 4 | 10 | 2 | 8 | 6 | 7 | 9 | 6 | 8 | 2 | 3 |
| 183 | 6 | 2 | 6 | 0 | 8 | 2 | 8 | 3 | 11 | 3 | 0 | 0 | 8 | 8 |
| 184 | 0 | 6 | 3 | 8 | 0 | 10 | 10 | 3 | 8 | 4 | 3 | 0 | 8 | 10 |
| 185 | 10 | 5 | 4 | 2 | 4 | 10 | 5 | 10 | 5 | 8 | 1 | 2 | 8 | 11 |
| 186 | 7 | 3 | 3 | 3 | 2 | 1 | 1 | 9 | 3 | 5 | 2 | 8 | 11 | 9 |
| 187 | 5 | 8 | 3 | 7 | 4 | 8 | 11 | 1 | 8 | 0 | 8 | 3 | 3 | 2 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 188 | 0 | 2 | 10 | 9 | 0 | 10 | 2 | 5 | 5 | 2 | 1 | 1 | 4 | 8 |
| 189 | 10 | 10 | 7 | 3 | 4 | 11 | 10 | 5 | 2 | 7 | 3 | 10 | 6 | 8 |
| 190 | 2 | 4 | 5 | 6 | 1 | 9 | 4 | 5 | 11 | 6 | 5 | 8 | 1 | 5 |
| 191 | 6 | 2 | 3 | 6 | 2 | 6 | 2 | 2 | 11 | 11 | 4 | 9 | 3 | 6 |
| 192 | 9 | 9 | 10 | 3 | 7 | 0 | 8 | 3 | 10 | 11 | 9 | 5 | 0 | 0 |
| 193 | 7 | 9 | 0 | 1 | 0 | 1 | 3 | 7 | 1 | 8 | 1 | 7 | 10 | 8 |
| 194 | 6 | 4 | 11 | 8 | 4 | 3 | 8 | 5 | 8 | 2 | 1 | 7 | 7 | 2 |
| 195 | 7 | 6 | 9 | 7 | 8 | 11 | 9 | 5 | 4 | 1 | 8 | 9 | 5 | 0 |
| 196 | 4 | 8 | 4 | 0 | 8 | 8 | 1 | 5 | 9 | 6 | 11 | 0 | 7 | 10 |
| 197 | 9 | 8 | 3 | 2 | 3 | 2 | 6 | 7 | 2 | 8 | 11 | 2 | 11 | 5 |
| 198 | 4 | 8 | 10 | 5 | 6 | 1 | 2 | 11 | 7 | 4 | 5 | 11 | 1 | 3 |
| 199 | 7 | 3 | 1 | 4 | 11 | 0 | 7 | 4 | 2 | 3 | 1 | 10 | 4 | 8 |
| 200 | 9 | 1 | 7 | 11 | 5 | 1 | 4 | 2 | 5 | 9 | 10 | 8 | 5 | 1 |
| 201 | 4 | 6 | 7 | 0 | 11 | 4 | 2 | 7 | 2 | 10 | 2 | 6 | 7 | 9 |
| 202 | 7 | 11 | 4 | 1 | 5 | 9 | 5 | 1 | 10 | 11 | 11 | 10 | 2 | 4 |
| 203 | 8 | 5 | 4 | 9 | 5 | 9 | 0 | 4 | 2 | 8 | 0 | 9 | 5 | 0 |
| 204 | 3 | 2 | 3 | 11 | 7 | 3 | 5 | 2 | 0 | 5 | 8 | 2 | 4 | 0 |
| 205 | 11 | 5 | 8 | 1 | 3 | 0 | 8 | 9 | 2 | 4 | 8 | 0 | 0 | 2 |
| 206 | 1 | 5 | 7 | 0 | 9 | 8 | 11 | 0 | 3 | 4 | 6 | 2 | 1 | 1 |
| 207 | 11 | 2 | 6 | 10 | 11 | 1 | 3 | 7 | 4 | 9 | 6 | 9 | 6 | 11 |
| 208 | 2 | 1 | 0 | 2 | 5 | 3 | 5 | 3 | 10 | 4 | 8 | 3 | 5 | 8 |
| 209 | 1 | 7 | 3 | 2 | 11 | 10 | 1 | 9 | 8 | 7 | 10 | 9 | 1 | 11 |
| 210 | 4 | 6 | 0 | 7 | 5 | 2 | 3 | 10 | 1 | 3 | 6 | 8 | 9 | 0 |
| 211 | 11 | 11 | 5 | 11 | 7 | 3 | 1 | 3 | 10 | 9 | 1 | 11 | 1 | 4 |
| 212 | 1 | 11 | 3 | 7 | 0 | 4 | 4 | 10 | 6 | 0 | 9 | 10 | 4 | 6 |
| 213 | 8 | 2 | 5 | 1 | 7 | 2 | 8 | 8 | 5 | 5 | 11 | 11 | 5 | 9 |
| 214 | 8 | 5 | 6 | 4 | 4 | 9 | 6 | 9 | 11 | 2 | 9 | 2 | 11 | 9 |
| 215 | 10 | 3 | 1 | 11 | 2 | 5 | 10 | 9 | 6 | 11 | 7 | 5 | 5 | 8 |
| 216 | 11 | 8 | 2 | 3 | 0 | 2 | 3 | 11 | 3 | 1 | 11 | 9 | 8 | 3 |
| 217 | 3 | 5 | 9 | 2 | 2 | 2 | 5 | 11 | 4 | 11 | 4 | 3 | 9 | 2 |
| 218 | 1 | 11 | 4 | 11 | 3 | 10 | 7 | 7 | 3 | 11 | 10 | 4 | 9 | 3 |
| 219 | 6 | 2 | 1 | 3 | 6 | 11 | 6 | 1 | 4 | 5 | 8 | 10 | 7 | 3 |
| 220 | 2 | 9 | 9 | 9 | 8 | 10 | 6 | 7 | 9 | 8 | 6 | 4 | 5 | 6 |
| 221 | 11 | 2 | 0 | 2 | 4 | 11 | 8 | 7 | 8 | 3 | 4 | 11 | 4 | 5 |
| 222 | 1 | 6 | 7 | 9 | 11 | 5 | 8 | 4 | 1 | 11 | 3 | 9 | 8 | 1 |
| 223 | 8 | 8 | 10 | 8 | 10 | 4 | 0 | 0 | 7 | 9 | 4 | 2 | 11 | 1 |
| 224 | 5 | 1 | 10 | 9 | 4 | 0 | 7 | 2 | 0 | 0 | 2 | 10 | 9 | 1 |
| 225 | 5 | 11 | 10 | 10 | 5 | 11 | 0 | 11 | 4 | 10 | 8 | 4 | 0 | 11 |
| 226 | 1 | 9 | 9 | 0 | 4 | 1 | 1 | 4 | 11 | 7 | 6 | 11 | 6 | 0 |
| 227 | 7 | 3 | 4 | 0 | 7 | 2 | 6 | 9 | 4 | 2 | 10 | 4 | 4 | 1 |
| 228 | 10 | 10 | 4 | 0 | 9 | 4 | 2 | 9 | 5 | 0 | 4 | 8 | 10 | 7 |
| 229 | 10 | 5 | 3 | 9 | 7 | 4 | 0 | 8 | 0 | 7 | 9 | 1 | 0 | 11 |
| 230 | 2 | 5 | 11 | 2 | 0 | 8 | 3 | 2 | 10 | 8 | 2 | 6 | 6 | 2 |
| 231 | 0 | 10 | 11 | 6 | 6 | 10 | 6 | 0 | 5 | 10 | 11 | 0 | 0 | 1 |
| 232 | 2 | 7 | 4 | 6 | 8 | 3 | 5 | 11 | 3 | 7 | 7 | 7 | 7 | 1 |
| 233 | 9 | 0 | 1 | 2 | 10 | 3 | 4 | 1 | 10 | 0 | 1 | 2 | 7 | 10 |
| 234 | 1 | 7 | 3 | 4 | 3 | 8 | 0 | 11 | 11 | 10 | 2 | 8 | 8 | 4 |
| 235 | 8 | 7 | 7 | 3 | 6 | 7 | 7 | 9 | 5 | 1 | 1 | 6 | 2 | 11 |
| 236 | 0 | 2 | 2 | 9 | 3 | 4 | 9 | 7 | 6 | 9 | 8 | 3 | 5 | 5 |
| 237 | 8 | 10 | 2 | 8 | 5 | 3 | 4 | 1 | 11 | 4 | 3 | 6 | 4 | 3 |
| 238 | 3 | 2 | 10 | 5 | 8 | 9 | 2 | 7 | 8 | 7 | 9 | 10 | 11 | 1 |
| 239 | 6 | 6 | 7 | 3 | 1 | 1 | 4 | 1 | 0 | 1 | 4 | 1 | 6 | 9 |
| 240 | 5 | 6 | 7 | 10 | 10 | 8 | 9 | 10 | 8 | 8 | 1 | 0 | 1 | 3 |
| 241 | 11 | 3 | 4 | 7 | 3 | 3 | 2 | 0 | 3 | 10 | 5 | 0 | 11 | 4 |
| 242 | 3 | 10 | 1 | 6 | 11 | 2 | 2 | 8 | 5 | 9 | 0 | 5 | 6 | 0 |
| 243 | 9 | 5 | 8 | 6 | 7 | 3 | 4 | 7 | 9 | 7 | 6 | 9 | 1 | 2 |
| 244 | 11 | 10 | 3 | 10 | 0 | 8 | 1 | 4 | 11 | 8 | 11 | 3 | 9 | 7 |
| 245 | 11 | 10 | 8 | 7 | 5 | 4 | 1 | 11 | 2 | 11 | 4 | 6 | 5 | 8 |
| 246 | 10 | 8 | 10 | 4 | 7 | 0 | 9 | 7 | 5 | 4 | 3 | 4 | 9 | 10 |
| 247 | 11 | 5 | 5 | 3 | 6 | 10 | 11 | 8 | 8 | 9 | 10 | 10 | 0 | 0 |
| 248 | 9 | 4 | 5 | 3 | 10 | 0 | 3 | 0 | 8 | 3 | 2 | 3 | 8 | 10 |
| 249 | 5 | 9 | 2 | 1 | 1 | 6 | 7 | 7 | 2 | 4 | 5 | 3 | 2 | 0 |
| 250 | 3 | 5 | 0 | 3 | 10 | 10 | 8 | 7 | 7 | 0 | 0 | 5 | 5 | 2 |
| 251 | 8 | 3 | 0 | 1 | 2 | 11 | 3 | 1 | 3 | 7 | 6 | 2 | 8 | 4 |
| 252 | 6 | 8 | 7 | 7 | 6 | 2 | 3 | 4 | 8 | 10 | 9 | 4 | 11 | 10 |
| 253 | 5 | 2 | 8 | 9 | 4 | 3 | 11 | 9 | 7 | 11 | 5 | 7 | 11 | 0 |
| 254 | 9 | 1 | 5 | 1 | 10 | 3 | 6 | 9 | 7 | 5 | 4 | 8 | 0 | 5 |
| 255 | 1 | 0 | 8 | 9 | 3 | 1 | 8 | 11 | 8 | 5 | 7 | 4 | 1 | 7 |
| 256 | 8 | 3 | 11 | 4 | 1 | 1 | 0 | 8 | 5 | 9 | 6 | 7 | 6 | 4 |
| 257 | 5 | 11 | 8 | 5 | 3 | 6 | 11 | 6 | 3 | 6 | 5 | 11 | 4 | 11 |
| 258 | 9 | 0 | 9 | 11 | 6 | 0 | 9 | 0 | 8 | 1 | 11 | 5 | 2 | 5 |
| 259 | 10 | 4 | 6 | 3 | 8 | 5 | 1 | 4 | 0 | 0 | 0 | 9 | 8 | 9 |
| 260 | 6 | 1 | 0 | 7 | 7 | 11 | 3 | 11 | 2 | 2 | 9 | 10 | 1 | 0 |
| 261 | 0 | 1 | 3 | 9 | 10 | 0 | 4 | 9 | 11 | 8 | 6 | 1 | 11 | 1 |
| 262 | 2 | 8 | 7 | 11 | 4 | 5 | 4 | 10 | 9 | 2 | 5 | 3 | 3 | 7 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 263 | 10 | 2 | 2 | 6 | 2 | 2 | 0 | 9 | 10 | 10 | 9 | 4 | 5 | 7 |
| 264 | 7 | 7 | 1 | 9 | 0 | 7 | 11 | 1 | 9 | 7 | 7 | 0 | 2 | 10 |
| 265 | 6 | 6 | 1 | 1 | 8 | 9 | 5 | 0 | 11 | 5 | 1 | 11 | 10 | 4 |
| 266 | 7 | 5 | 6 | 5 | 5 | 6 | 7 | 8 | 9 | 0 | 6 | 8 | 7 | 1 |
| 267 | 8 | 11 | 10 | 3 | 9 | 10 | 6 | 6 | 4 | 1 | 4 | 7 | 8 | 2 |
| 268 | 5 | 7 | 10 | 3 | 2 | 6 | 1 | 2 | 6 | 8 | 3 | 5 | 10 | 7 |
| 269 | 8 | 5 | 9 | 1 | 6 | 7 | 2 | 7 | 7 | 5 | 4 | 2 | 3 | 9 |
| 270 | 3 | 7 | 0 | 4 | 11 | 11 | 7 | 4 | 5 | 6 | 7 | 9 | 0 | 3 |
| 271 | 9 | 3 | 5 | 2 | 8 | 3 | 11 | 11 | 1 | 3 | 10 | 7 | 9 | 0 |
| 272 | 0 | 0 | 3 | 6 | 1 | 7 | 3 | 8 | 0 | 1 | 8 | 6 | 10 | 10 |
| 273 | 11 | 1 | 9 | 10 | 5 | 5 | 6 | 3 | 9 | 3 | 8 | 5 | 9 | 3 |
| 274 | 2 | 4 | 4 | 2 | 9 | 7 | 9 | 11 | 3 | 4 | 6 | 1 | 8 | 8 |
| 275 | 5 | 6 | 7 | 1 | 10 | 4 | 7 | 5 | 0 | 3 | 6 | 5 | 2 | 8 |
| 276 | 7 | 8 | 0 | 0 | 9 | 7 | 3 | 0 | 5 | 3 | 11 | 4 | 5 | 4 |
| 277 | 2 | 4 | 2 | 10 | 3 | 2 | 8 | 0 | 1 | 7 | 11 | 2 | 4 | 6 |
| 278 | 8 | 10 | 2 | 11 | 9 | 1 | 11 | 7 | 8 | 6 | 8 | 0 | 11 | 7 |
| 279 | 4 | 2 | 10 | 0 | 0 | 3 | 0 | 3 | 3 | 7 | 11 | 3 | 3 | 1 |
| 280 | 10 | 11 | 1 | 9 | 10 | 9 | 10 | 4 | 7 | 4 | 2 | 4 | 7 | 6 |
| 281 | 4 | 4 | 5 | 8 | 4 | 10 | 11 | 4 | 10 | 2 | 7 | 5 | 6 | 1 |
| 282 | 7 | 9 | 4 | 3 | 7 | 8 | 6 | 10 | 2 | 6 | 8 | 6 | 7 | 9 |
| 283 | 11 | 5 | 7 | 6 | 0 | 6 | 5 | 1 | 8 | 4 | 4 | 10 | 6 | 4 |
| 284 | 0 | 8 | 5 | 10 | 6 | 11 | 9 | 3 | 7 | 11 | 5 | 10 | 8 | 6 |
| 285 | 6 | 8 | 2 | 7 | 2 | 3 | 5 | 2 | 9 | 11 | 6 | 6 | 9 | 11 |
| 286 | 2 | 6 | 9 | 7 | 11 | 3 | 10 | 6 | 10 | 10 | 11 | 1 | 10 | 0 |
| 287 | 1 | 6 | 0 | 5 | 1 | 9 | 1 | 2 | 10 | 1 | 10 | 10 | 8 | 5 |
| 288 | 1 | 10 | 7 | 10 | 8 | 10 | 6 | 4 | 6 | 4 | 5 | 8 | 5 | 5 |
| 289 | 1 | 9 | 6 | 0 | 1 | 1 | 9 | 9 | 7 | 5 | 1 | 5 | 5 | 3 |
| 290 | 8 | 0 | 5 | 5 | 0 | 4 | 4 | 4 | 2 | 1 | 0 | 2 | 11 | 11 |
| 291 | 4 | 2 | 6 | 9 | 4 | 2 | 3 | 10 | 11 | 0 | 8 | 10 | 0 | 6 |
| 292 | 8 | 11 | 4 | 4 | 4 | 7 | 0 | 4 | 4 | 6 | 2 | 8 | 2 | 7 |
| 293 | 2 | 5 | 0 | 7 | 4 | 9 | 9 | 4 | 2 | 0 | 11 | 2 | 0 | 4 |
| 294 | 5 | 1 | 7 | 8 | 1 | 7 | 5 | 0 | 6 | 9 | 1 | 7 | 0 | 0 |
| 295 | 3 | 3 | 6 | 5 | 0 | 8 | 9 | 3 | 11 | 1 | 5 | 11 | 3 | 0 |
| 296 | 2 | 0 | 2 | 3 | 6 | 9 | 0 | 5 | 9 | 10 | 1 | 9 | 0 | 2 |
| 297 | 0 | 2 | 0 | 10 | 3 | 3 | 3 | 9 | 3 | 5 | 7 | 5 | 0 | 11 |
| 298 | 5 | 2 | 11 | 1 | 8 | 9 | 7 | 11 | 7 | 8 | 2 | 0 | 1 | 11 |
| 299 | 4 | 0 | 9 | 8 | 2 | 0 | 4 | 11 | 2 | 10 | 6 | 0 | 4 | 9 |
| 300 | 3 | 5 | 4 | 5 | 6 | 6 | 3 | 5 | 1 | 11 | 11 | 6 | 4 | 8 |
| 301 | 11 | 11 | 4 | 6 | 7 | 7 | 10 | 9 | 2 | 1 | 11 | 7 | 11 | 5 |
| 302 | 9 | 5 | 2 | 1 | 8 | 2 | 4 | 3 | 6 | 7 | 4 | 5 | 11 | 5 |
| 303 | 3 | 3 | 7 | 2 | 11 | 11 | 0 | 7 | 0 | 7 | 0 | 6 | 8 | 8 |
| 304 | 9 | 2 | 10 | 2 | 3 | 11 | 1 | 10 | 7 | 1 | 7 | 7 | 11 | 8 |
| 305 | 7 | 1 | 1 | 7 | 10 | 0 | 10 | 11 | 4 | 11 | 5 | 3 | 5 | 5 |
| 306 | 6 | 4 | 1 | 0 | 6 | 9 | 9 | 11 | 4 | 1 | 4 | 6 | 11 | 6 |
| 307 | 6 | 0 | 9 | 1 | 0 | 6 | 0 | 10 | 11 | 10 | 2 | 6 | 5 | 1 |
| 308 | 4 | 4 | 11 | 6 | 9 | 4 | 6 | 4 | 5 | 11 | 10 | 11 | 4 | 4 |
| 309 | 10 | 6 | 2 | 2 | 4 | 6 | 4 | 8 | 7 | 2 | 6 | 2 | 9 | 8 |
| 310 | 3 | 10 | 1 | 2 | 1 | 3 | 9 | 10 | 9 | 5 | 8 | 4 | 10 | 5 |
| 311 | 3 | 3 | 6 | 7 | 7 | 4 | 3 | 4 | 6 | 3 | 4 | 8 | 11 | 2 |
| 312 | 7 | 3 | 8 | 11 | 8 | 8 | 1 | 8 | 8 | 11 | 10 | 8 | 3 | 10 |
| 313 | 6 | 11 | 2 | 1 | 6 | 0 | 2 | 1 | 6 | 1 | 6 | 4 | 6 | 7 |
| 314 | 4 | 1 | 6 | 11 | 3 | 9 | 4 | 11 | 8 | 8 | 9 | 11 | 0 | 2 |
| 315 | 4 | 1 | 3 | 0 | 7 | 2 | 2 | 10 | 2 | 5 | 4 | 9 | 6 | 10 |
| 316 | 10 | 5 | 11 | 4 | 9 | 9 | 0 | 9 | 9 | 1 | 3 | 6 | 2 | 3 |
| 317 | 8 | 4 | 6 | 0 | 0 | 0 | 3 | 11 | 11 | 7 | 3 | 4 | 1 | 5 |
| 318 | 5 | 8 | 3 | 6 | 5 | 7 | 6 | 0 | 11 | 2 | 9 | 10 | 9 | 7 |
| 319 | 1 | 10 | 1 | 8 | 0 | 11 | 3 | 8 | 8 | 9 | 1 | 11 | 9 | 5 |
| 320 | 11 | 2 | 10 | 1 | 1 | 5 | 6 | 5 | 1 | 11 | 6 | 1 | 8 | 9 |
| 321 | 10 | 8 | 11 | 9 | 6 | 2 | 0 | 11 | 2 | 6 | 1 | 11 | 10 | 10 |
| 322 | 10 | 5 | 9 | 8 | 10 | 8 | 7 | 11 | 8 | 7 | 7 | 2 | 10 | 2 |
| 323 | 5 | 6 | 1 | 3 | 6 | 5 | 11 | 5 | 2 | 4 | 0 | 0 | 11 | 0 |
| 324 | 9 | 1 | 5 | 8 | 11 | 11 | 5 | 1 | 3 | 2 | 3 | 6 | 3 | 11 |
| 325 | 7 | 5 | 8 | 0 | 0 | 4 | 7 | 6 | 5 | 4 | 1 | 5 | 3 | 7 |
| 326 | 11 | 9 | 3 | 11 | 9 | 1 | 5 | 6 | 3 | 2 | 2 | 3 | 10 | 2 |
| 327 | 1 | 10 | 4 | 9 | 7 | 0 | 9 | 7 | 11 | 1 | 7 | 2 | 10 | 7 |
| 328 | 9 | 3 | 3 | 5 | 10 | 0 | 8 | 7 | 9 | 5 | 10 | 11 | 8 | 11 |
| 329 | 10 | 0 | 3 | 9 | 1 | 3 | 5 | 6 | 8 | 6 | 5 | 10 | 0 | 1 |
| 330 | 3 | 3 | 4 | 0 | 5 | 1 | 7 | 0 | 9 | 8 | 9 | 2 | 6 | 6 |
| 331 | 11 | 0 | 6 | 4 | 10 | 11 | 0 | 7 | 2 | 0 | 10 | 10 | 3 | 2 |
| 332 | 6 | 5 | 8 | 6 | 7 | 10 | 0 | 2 | 1 | 2 | 4 | 4 | 8 | 10 |
| 333 | 2 | 4 | 10 | 1 | 2 | 4 | 1 | 0 | 7 | 0 | 8 | 11 | 6 | 11 |
| 334 | 10 | 5 | 10 | 10 | 5 | 6 | 10 | 10 | 10 | 6 | 8 | 2 | 3 | 0 |
| 335 | 10 | 9 | 5 | 5 | 1 | 0 | 3 | 10 | 0 | 0 | 9 | 3 | 11 | 2 |
| 336 | 9 | 11 | 7 | 3 | 9 | 9 | 5 | 9 | 11 | 9 | 5 | 10 | 1 | 9 |
| 337 | 11 | 0 | 3 | 11 | 5 | 5 | 8 | 4 | 4 | 1 | 7 | 10 | 7 | 4 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 338 | 6 | 9 | 8 | 10 | 4 | 11 | 3 | 4 | 11 | 5 | 5 | 3 | 2 | 9 |
| 339 | 0 | 10 | 6 | 10 | 11 | 8 | 5 | 10 | 9 | 6 | 0 | 3 | 4 | 11 |
| 340 | 2 | 9 | 5 | 0 | 2 | 7 | 11 | 0 | 2 | 1 | 10 | 5 | 4 | 7 |
| 341 | 7 | 9 | 7 | 10 | 8 | 3 | 4 | 11 | 10 | 6 | 4 | 9 | 8 | 11 |
| 342 | 1 | 5 | 5 | 9 | 9 | 11 | 10 | 9 | 5 | 2 | 7 | 8 | 8 | 4 |
| 343 | 10 | 8 | 0 | 2 | 4 | 2 | 2 | 0 | 4 | 1 | 8 | 5 | 1 | 11 |
| 344 | 2 | 2 | 4 | 7 | 1 | 10 | 2 | 0 | 4 | 3 | 7 | 6 | 10 | 5 |
| 345 | 1 | 2 | 1 | 9 | 2 | 10 | 10 | 6 | 1 | 8 | 10 | 11 | 2 | 8 |
| 346 | 2 | 11 | 8 | 0 | 9 | 0 | 4 | 1 | 7 | 10 | 1 | 8 | 7 | 8 |
| 347 | 5 | 6 | 0 | 1 | 2 | 3 | 11 | 9 | 4 | 0 | 1 | 2 | 1 | 5 |
| 348 | 8 | 10 | 4 | 7 | 3 | 11 | 11 | 1 | 5 | 4 | 4 | 5 | 1 | 8 |
| 349 | 2 | 9 | 9 | 8 | 11 | 4 | 2 | 8 | 11 | 3 | 3 | 9 | 8 | 9 |
| 350 | 1 | 8 | 2 | 6 | 6 | 8 | 1 | 4 | 1 | 7 | 9 | 5 | 3 | 2 |
| 351 | 0 | 8 | 9 | 9 | 0 | 0 | 6 | 2 | 2 | 9 | 10 | 10 | 6 | 8 |
| 352 | 2 | 3 | 0 | 1 | 9 | 2 | 9 | 1 | 8 | 3 | 3 | 5 | 6 | 0 |
| 353 | 2 | 9 | 10 | 4 | 0 | 5 | 8 | 2 | 8 | 11 | 7 | 0 | 6 | 3 |
| 354 | 4 | 4 | 4 | 3 | 3 | 8 | 11 | 5 | 4 | 5 | 3 | 4 | 10 | 3 |
| 355 | 6 | 3 | 10 | 4 | 10 | 10 | 6 | 11 | 0 | 10 | 9 | 2 | 2 | 4 |
| 356 | 10 | 0 | 11 | 6 | 2 | 7 | 10 | 4 | 4 | 5 | 1 | 3 | 9 | 1 |
| 357 | 10 | 7 | 11 | 11 | 8 | 4 | 9 | 10 | 9 | 4 | 6 | 8 | 9 | 4 |
| 358 | 9 | 10 | 5 | 7 | 10 | 1 | 4 | 3 | 11 | 2 | 1 | 0 | 0 | 8 |
| 359 | 5 | 5 | 1 | 7 | 5 | 4 | 3 | 3 | 3 | 5 | 11 | 11 | 8 | 0 |
| 360 | 0 | 2 | 1 | 8 | 9 | 8 | 4 | 2 | 5 | 8 | 0 | 0 | 3 | 2 |
| 361 | 7 | 3 | 11 | 10 | 7 | 2 | 10 | 5 | 7 | 7 | 9 | 6 | 5 | 10 |
| 362 | 9 | 7 | 4 | 4 | 4 | 9 | 3 | 6 | 8 | 10 | 7 | 1 | 1 | 1 |
| 363 | 11 | 5 | 5 | 7 | 1 | 3 | 10 | 8 | 6 | 4 | 2 | 6 | 5 | 3 |
| 364 | 5 | 9 | 8 | 7 | 3 | 9 | 1 | 9 | 5 | 10 | 3 | 9 | 5 | 10 |
| 365 | 2 | 10 | 0 | 11 | 0 | 1 | 2 | 0 | 10 | 9 | 6 | 1 | 7 | 9 |
| 366 | 6 | 3 | 6 | 9 | 7 | 8 | 8 | 0 | 4 | 4 | 11 | 0 | 0 | 4 |
| 367 | 3 | 8 | 10 | 3 | 1 | 7 | 9 | 6 | 3 | 9 | 10 | 0 | 2 | 11 |
| 368 | 10 | 2 | 5 | 10 | 0 | 9 | 2 | 8 | 0 | 11 | 2 | 11 | 2 | 10 |
| 369 | 4 | 10 | 5 | 6 | 3 | 2 | 6 | 6 | 10 | 0 | 6 | 9 | 11 | 11 |
| 370 | 5 | 3 | 2 | 4 | 0 | 10 | 4 | 1 | 10 | 3 | 5 | 3 | 8 | 5 |
| 371 | 4 | 5 | 10 | 5 | 10 | 3 | 6 | 0 | 2 | 9 | 2 | 11 | 7 | 2 |
| 372 | 4 | 2 | 8 | 8 | 10 | 5 | 9 | 11 | 9 | 6 | 2 | 6 | 0 | 7 |
| 373 | 11 | 0 | 0 | 10 | 4 | 2 | 11 | 3 | 2 | 9 | 4 | 6 | 7 | 1 |
| 374 | 3 | 9 | 5 | 2 | 9 | 5 | 2 | 0 | 1 | 7 | 1 | 1 | 6 | 5 |
| 375 | 0 | 0 | 5 | 3 | 8 | 9 | 6 | 1 | 5 | 8 | 7 | 5 | 2 | 9 |
| 376 | 8 | 9 | 0 | 0 | 5 | 6 | 8 | 2 | 4 | 5 | 9 | 6 | 1 | 9 |
| 377 | 10 | 0 | 2 | 4 | 4 | 4 | 1 | 1 | 3 | 5 | 7 | 4 | 7 | 2 |
| 378 | 6 | 6 | 5 | 4 | 2 | 8 | 3 | 3 | 4 | 2 | 5 | 8 | 7 | 3 |
| 379 | 0 | 4 | 10 | 2 | 10 | 3 | 11 | 10 | 11 | 4 | 5 | 0 | 2 | 6 |
| 380 | 11 | 9 | 11 | 7 | 6 | 6 | 2 | 3 | 1 | 1 | 3 | 7 | 10 | 4 |
| 381 | 4 | 6 | 3 | 5 | 1 | 5 | 10 | 0 | 5 | 6 | 9 | 5 | 4 | 6 |
| 382 | 3 | 10 | 5 | 5 | 8 | 3 | 0 | 3 | 7 | 10 | 9 | 9 | 6 | 9 |
| 383 | 2 | 11 | 10 | 9 | 2 | 2 | 5 | 7 | 0 | 3 | 5 | 1 | 7 | 5 |
| 384 | 6 | 1 | 3 | 2 | 4 | 10 | 7 | 3 | 7 | 4 | 10 | 11 | 11 | 3 |
| 385 | 9 | 2 | 7 | 6 | 5 | 0 | 0 | 6 | 0 | 4 | 1 | 0 | 9 | 11 |
| 386 | 3 | 6 | 4 | 9 | 10 | 2 | 9 | 8 | 2 | 5 | 3 | 1 | 5 | 2 |
| 387 | 8 | 11 | 1 | 1 | 9 | 0 | 10 | 3 | 10 | 2 | 8 | 10 | 10 | 11 |
| 388 | 11 | 1 | 2 | 4 | 11 | 8 | 6 | 4 | 8 | 1 | 2 | 4 | 11 | 9 |
| 389 | 4 | 8 | 9 | 4 | 5 | 7 | 9 | 1 | 4 | 10 | 0 | 6 | 3 | 2 |
| 390 | 8 | 2 | 6 | 2 | 1 | 7 | 3 | 5 | 6 | 2 | 5 | 0 | 4 | 7 |
| 391 | 5 | 5 | 1 | 2 | 9 | 6 | 6 | 8 | 5 | 10 | 5 | 5 | 1 | 6 |
| 392 | 8 | 1 | 2 | 2 | 6 | 11 | 5 | 9 | 1 | 9 | 6 | 8 | 4 | 5 |
| 393 | 8 | 4 | 7 | 6 | 4 | 1 | 5 | 7 | 1 | 1 | 7 | 4 | 2 | 6 |
| 394 | 8 | 8 | 0 | 3 | 7 | 5 | 11 | 6 | 8 | 11 | 11 | 10 | 7 | 10 |
| 395 | 1 | 2 | 6 | 6 | 3 | 9 | 10 | 8 | 10 | 5 | 0 | 0 | 10 | 9 |
| 396 | 11 | 7 | 5 | 1 | 2 | 0 | 8 | 5 | 5 | 6 | 0 | 8 | 10 | 8 |
| 397 | 11 | 6 | 10 | 10 | 7 | 8 | 11 | 2 | 6 | 11 | 2 | 2 | 9 | 4 |
| 398 | 11 | 2 | 3 | 7 | 9 | 7 | 0 | 8 | 9 | 0 | 4 | 7 | 4 | 0 |
| 399 | 5 | 9 | 8 | 3 | 10 | 6 | 5 | 4 | 10 | 1 | 6 | 1 | 1 | 5 |
| 400 | 7 | 2 | 4 | 5 | 4 | 5 | 7 | 10 | 8 | 9 | 11 | 11 | 8 | 4 |
| 401 | 0 | 10 | 10 | 7 | 9 | 0 | 7 | 5 | 2 | 7 | 11 | 6 | 9 | 5 |
| 402 | 1 | 4 | 9 | 4 | 8 | 8 | 3 | 5 | 10 | 4 | 11 | 7 | 2 | 9 |
| 403 | 10 | 11 | 9 | 11 | 11 | 2 | 3 | 1 | 0 | 9 | 8 | 9 | 2 | 0 |
| 404 | 0 | 7 | 4 | 1 | 1 | 3 | 0 | 3 | 0 | 8 | 2 | 7 | 9 | 2 |
| 405 | 7 | 7 | 10 | 9 | 1 | 6 | 5 | 3 | 1 | 2 | 10 | 3 | 6 | 6 |
| 406 | 3 | 10 | 0 | 11 | 3 | 0 | 10 | 3 | 4 | 3 | 4 | 4 | 2 | 0 |
| 407 | 9 | 8 | 5 | 10 | 3 | 9 | 0 | 7 | 5 | 3 | 9 | 3 | 10 | 3 |
| 408 | 3 | 1 | 9 | 6 | 6 | 4 | 1 | 7 | 9 | 8 | 0 | 7 | 1 | 10 |
| 409 | 0 | 7 | 8 | 11 | 10 | 5 | 0 | 10 | 6 | 3 | 9 | 2 | 8 | 5 |
| 410 | 2 | 5 | 8 | 8 | 6 | 11 | 6 | 5 | 5 | 6 | 10 | 10 | 11 | 1 |
| 411 | 11 | 10 | 7 | 0 | 1 | 8 | 4 | 4 | 5 | 2 | 8 | 6 | 1 | 0 |
| 412 | 6 | 11 | 7 | 7 | 11 | 4 | 1 | 5 | 8 | 5 | 0 | 1 | 4 | 3 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 413 | 4 | 11 | 0 | 5 | 9 | 4 | 3 | 7 | 9 | 7 | 8 | 1 | 3 | 8 |
| 414 | 7 | 3 | 6 | 1 | 3 | 3 | 11 | 4 | 3 | 2 | 11 | 6 | 7 | 3 |
| 415 | 8 | 1 | 3 | 7 | 2 | 1 | 0 | 1 | 0 | 3 | 1 | 2 | 3 | 6 |
| 416 | 0 | 7 | 6 | 5 | 7 | 9 | 10 | 5 | 8 | 2 | 8 | 2 | 6 | 4 |
| 417 | 2 | 6 | 5 | 1 | 4 | 6 | 5 | 5 | 3 | 11 | 2 | 9 | 7 | 7 |
| 418 | 3 | 8 | 4 | 8 | 5 | 8 | 11 | 8 | 5 | 10 | 7 | 3 | 11 | 0 |
| 419 | 7 | 0 | 8 | 4 | 6 | 3 | 7 | 8 | 0 | 7 | 7 | 1 | 11 | 8 |
| 420 | 11 | 6 | 8 | 1 | 8 | 11 | 9 | 9 | 10 | 7 | 0 | 1 | 2 | 3 |
| 421 | 0 | 4 | 5 | 7 | 5 | 8 | 11 | 11 | 9 | 8 | 8 | 8 | 0 | 4 |
| 422 | 11 | 9 | 10 | 3 | 4 | 0 | 10 | 11 | 9 | 4 | 7 | 11 | 2 | 2 |
| 423 | 8 | 8 | 6 | 5 | 11 | 10 | 6 | 7 | 3 | 3 | 7 | 0 | 7 | 0 |
| 424 | 6 | 0 | 7 | 2 | 3 | 0 | 3 | 1 | 3 | 3 | 10 | 0 | 8 | 6 |
| 425 | 2 | 0 | 8 | 9 | 11 | 9 | 7 | 2 | 6 | 1 | 3 | 7 | 7 | 1 |
| 426 | 1 | 1 | 7 | 5 | 5 | 2 | 5 | 5 | 3 | 6 | 11 | 10 | 9 | 2 |
| 427 | 5 | 0 | 6 | 10 | 7 | 0 | 7 | 3 | 4 | 2 | 9 | 9 | 3 | 8 |
| 428 | 1 | 11 | 0 | 8 | 4 | 5 | 7 | 0 | 6 | 2 | 4 | 9 | 5 | 2 |
| 429 | 1 | 0 | 0 | 1 | 3 | 4 | 4 | 10 | 4 | 6 | 5 | 8 | 8 | 10 |
| 430 | 4 | 10 | 0 | 9 | 11 | 10 | 1 | 3 | 11 | 7 | 2 | 11 | 9 | 4 |
| 431 | 9 | 4 | 11 | 0 | 1 | 6 | 7 | 5 | 9 | 9 | 10 | 1 | 0 | 5 |
| 432 | 7 | 11 | 3 | 8 | 3 | 2 | 0 | 5 | 1 | 0 | 10 | 5 | 8 | 3 |
| 433 | 10 | 6 | 1 | 8 | 6 | 1 | 5 | 2 | 1 | 11 | 9 | 7 | 5 | 3 |
| 434 | 7 | 4 | 11 | 10 | 5 | 11 | 5 | 10 | 3 | 10 | 7 | 8 | 6 | 3 |
| 435 | 3 | 4 | 7 | 9 | 10 | 0 | 11 | 6 | 7 | 2 | 4 | 11 | 0 | 3 |
| 436 | 3 | 11 | 9 | 0 | 2 | 10 | 0 | 3 | 5 | 2 | 0 | 11 | 5 | 6 |
| 437 | 6 | 0 | 6 | 7 | 4 | 1 | 8 | 2 | 5 | 10 | 9 | 5 | 6 | 2 |
| 438 | 9 | 9 | 11 | 0 | 7 | 2 | 5 | 2 | 10 | 0 | 11 | 2 | 2 | 1 |
| 439 | 0 | 1 | 11 | 3 | 4 | 0 | 6 | 5 | 1 | 5 | 5 | 2 | 1 | 0 |
| 440 | 6 | 6 | 3 | 6 | 9 | 7 | 8 | 10 | 6 | 7 | 7 | 11 | 3 | 9 |
| 441 | 4 | 3 | 9 | 1 | 0 | 5 | 3 | 2 | 6 | 0 | 9 | 7 | 3 | 10 |
| 442 | 6 | 1 | 8 | 6 | 2 | 9 | 5 | 7 | 3 | 9 | 2 | 5 | 5 | 3 |
| 443 | 0 | 8 | 6 | 6 | 2 | 2 | 8 | 3 | 5 | 9 | 8 | 7 | 4 | 9 |
| 444 | 6 | 5 | 2 | 11 | 4 | 3 | 0 | 5 | 10 | 9 | 8 | 8 | 10 | 6 |
| 445 | 1 | 4 | 2 | 8 | 3 | 3 | 9 | 2 | 0 | 8 | 7 | 11 | 1 | 9 |
| 446 | 0 | 3 | 2 | 1 | 7 | 1 | 5 | 11 | 8 | 0 | 5 | 8 | 9 | 6 |
| 447 | 9 | 6 | 0 | 10 | 3 | 7 | 9 | 2 | 9 | 9 | 1 | 8 | 4 | 7 |
| 448 | 1 | 5 | 3 | 8 | 6 | 0 | 10 | 10 | 11 | 3 | 5 | 7 | 4 | 11 |
| 449 | 8 | 7 | 11 | 9 | 5 | 11 | 8 | 11 | 6 | 0 | 4 | 1 | 4 | 4 |
| 450 | 1 | 1 | 6 | 3 | 8 | 3 | 3 | 1 | 1 | 6 | 8 | 11 | 11 | 10 |
| 451 | 4 | 6 | 5 | 11 | 7 | 8 | 2 | 9 | 3 | 10 | 7 | 0 | 5 | 2 |
| 452 | 0 | 3 | 11 | 4 | 5 | 10 | 3 | 6 | 3 | 2 | 0 | 10 | 4 | 10 |
| 453 | 4 | 8 | 9 | 2 | 7 | 9 | 5 | 3 | 6 | 5 | 8 | 10 | 11 | 1 |
| 454 | 9 | 8 | 1 | 1 | 11 | 10 | 3 | 0 | 4 | 9 | 9 | 2 | 4 | 8 |
| 455 | 0 | 6 | 6 | 4 | 6 | 6 | 6 | 7 | 8 | 5 | 0 | 9 | 5 | 6 |
| 456 | 9 | 0 | 3 | 3 | 11 | 2 | 0 | 8 | 4 | 4 | 6 | 1 | 3 | 7 |
| 457 | 4 | 11 | 1 | 6 | 7 | 3 | 1 | 7 | 7 | 11 | 9 | 0 | 0 | 11 |
| 458 | 2 | 2 | 3 | 0 | 8 | 0 | 1 | 7 | 6 | 4 | 3 | 6 | 6 | 2 |
| 459 | 6 | 10 | 8 | 5 | 7 | 2 | 8 | 9 | 0 | 8 | 0 | 6 | 10 | 6 |
| 460 | 5 | 4 | 8 | 6 | 3 | 0 | 10 | 7 | 0 | 11 | 8 | 1 | 8 | 1 |
| 461 | 3 | 5 | 1 | 11 | 3 | 9 | 3 | 1 | 9 | 6 | 0 | 10 | 7 | 7 |
| 462 | 2 | 8 | 8 | 4 | 11 | 8 | 5 | 1 | 10 | 7 | 10 | 2 | 6 | 7 |
| 463 | 5 | 9 | 2 | 8 | 10 | 10 | 7 | 10 | 11 | 6 | 0 | 10 | 5 | 4 |
| 464 | 5 | 7 | 6 | 4 | 9 | 4 | 11 | 3 | 0 | 9 | 3 | 10 | 6 | 10 |
| 465 | 7 | 10 | 9 | 2 | 11 | 1 | 11 | 1 | 2 | 1 | 2 | 2 | 0 | 1 |
| 466 | 6 | 0 | 11 | 3 | 5 | 10 | 2 | 9 | 0 | 3 | 3 | 8 | 5 | 8 |
| 467 | 6 | 9 | 0 | 3 | 9 | 2 | 7 | 6 | 1 | 0 | 0 | 4 | 1 | 8 |
| 468 | 10 | 2 | 0 | 4 | 1 | 1 | 9 | 0 | 2 | 8 | 10 | 4 | 11 | 1 |
| 469 | 10 | 11 | 3 | 0 | 4 | 3 | 9 | 2 | 11 | 11 | 8 | 3 | 8 | 7 |
| 470 | 8 | 4 | 2 | 9 | 4 | 4 | 4 | 3 | 8 | 3 | 1 | 9 | 6 | 4 |
| 471 | 10 | 2 | 3 | 3 | 2 | 8 | 6 | 4 | 7 | 7 | 11 | 1 | 6 | 4 |
| 472 | 8 | 7 | 10 | 10 | 7 | 4 | 6 | 1 | 8 | 6 | 9 | 4 | 0 | 5 |
| 473 | 9 | 3 | 2 | 9 | 10 | 11 | 7 | 0 | 10 | 10 | 2 | 7 | 3 | 3 |
| 474 | 2 | 11 | 3 | 1 | 6 | 1 | 10 | 9 | 9 | 11 | 7 | 2 | 9 | 0 |
| 475 | 8 | 6 | 7 | 8 | 0 | 9 | 4 | 6 | 6 | 6 | 8 | 8 | 7 | 4 |
| 476 | 3 | 4 | 0 | 4 | 5 | 9 | 11 | 10 | 0 | 11 | 6 | 7 | 4 | 2 |
| 477 | 8 | 7 | 4 | 2 | 11 | 10 | 4 | 1 | 9 | 10 | 11 | 6 | 11 | 6 |
| 478 | 9 | 4 | 0 | 8 | 2 | 10 | 0 | 8 | 9 | 6 | 5 | 3 | 1 | 8 |
| 479 | 11 | 11 | 9 | 5 | 3 | 11 | 2 | 2 | 8 | 0 | 8 | 8 | 0 | 9 |
| 480 | 8 | 5 | 8 | 3 | 5 | 8 | 10 | 0 | 1 | 10 | 6 | 11 | 5 | 9 |
| 481 | 1 | 7 | 3 | 10 | 6 | 7 | 2 | 0 | 2 | 4 | 11 | 3 | 10 | 1 |
| 482 | 9 | 0 | 4 | 4 | 0 | 7 | 1 | 5 | 11 | 4 | 8 | 9 | 4 | 0 |
| 483 | 5 | 2 | 5 | 2 | 11 | 7 | 4 | 6 | 4 | 8 | 6 | 4 | 10 | 10 |
| 484 | 11 | 6 | 7 | 2 | 9 | 8 | 2 | 1 | 4 | 5 | 9 | 7 | 0 | 7 |
| 485 | 11 | 8 | 1 | 2 | 1 | 0 | 11 | 5 | 3 | 0 | 1 | 11 | 5 | 1 |
| 486 | 1 | 11 | 4 | 10 | 5 | 7 | 11 | 5 | 1 | 3 | 1 | 0 | 0 | 9 |
| 487 | 2 | 2 | 10 | 5 | 5 | 0 | 9 | 4 | 11 | 7 | 2 | 8 | 5 | 6 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 488 | 1 | 7 | 1 | 3 | 7 | 6 | 0 | 10 | 5 | 7 | 10 | 8 | 0 | 0 |
| 489 | 3 | 4 | 4 | 10 | 11 | 1 | 0 | 1 | 7 | 0 | 6 | 5 | 7 | 5 |
| 490 | 9 | 1 | 6 | 2 | 0 | 1 | 1 | 3 | 10 | 6 | 9 | 6 | 1 | 6 |
| 491 | 5 | 11 | 0 | 9 | 7 | 1 | 2 | 4 | 1 | 5 | 1 | 6 | 2 | 0 |
| 492 | 5 | 8 | 10 | 5 | 0 | 11 | 6 | 5 | 0 | 1 | 1 | 8 | 1 | 10 |
| 493 | 2 | 10 | 2 | 10 | 8 | 5 | 4 | 2 | 2 | 1 | 9 | 10 | 10 | 2 |
| 494 | 9 | 8 | 8 | 4 | 7 | 5 | 10 | 9 | 1 | 3 | 5 | 1 | 0 | 2 |
| 495 | 7 | 2 | 0 | 6 | 9 | 10 | 9 | 11 | 7 | 5 | 8 | 9 | 2 | 6 |
| 496 | 9 | 0 | 11 | 0 | 10 | 8 | 6 | 0 | 7 | 6 | 0 | 9 | 8 | 8 |
| 497 | 7 | 2 | 2 | 11 | 1 | 11 | 1 | 9 | 4 | 8 | 5 | 9 | 9 | 3 |
| 498 | 9 | 1 | 8 | 1 | 4 | 5 | 6 | 11 | 0 | 8 | 11 | 9 | 4 | 10 |
| 499 | 8 | 9 | 6 | 7 | 6 | 10 | 7 | 1 | 8 | 9 | 2 | 1 | 6 | 9 |
| 500 | 1 | 2 | 7 | 2 | 6 | 5 | 2 | 11 | 6 | 8 | 3 | 10 | 7 | 9 |
| 501 | 6 | 4 | 11 | 5 | 11 | 3 | 2 | 8 | 2 | 4 | 8 | 5 | 4 | 10 |
| 502 | 10 | 10 | 1 | 0 | 3 | 10 | 3 | 7 | 6 | 10 | 6 | 1 | 0 | 6 |
| 503 | 7 | 11 | 11 | 2 | 6 | 10 | 9 | 8 | 10 | 0 | 1 | 7 | 9 | 7 |
| 504 | 10 | 5 | 4 | 3 | 10 | 1 | 4 | 9 | 4 | 3 | 2 | 7 | 6 | 0 |
| 505 | 10 | 3 | 7 | 8 | 4 | 3 | 3 | 6 | 2 | 0 | 10 | 6 | 5 | 11 |
| 506 | 7 | 10 | 3 | 10 | 4 | 3 | 10 | 7 | 5 | 9 | 10 | 4 | 0 | 9 |
| 507 | 5 | 0 | 10 | 11 | 11 | 3 | 9 | 3 | 11 | 0 | 6 | 6 | 0 | 3 |
| 508 | 2 | 7 | 4 | 2 | 3 | 1 | 7 | 9 | 11 | 0 | 5 | 9 | 10 | 2 |
| 509 | 10 | 10 | 7 | 8 | 7 | 7 | 7 | 5 | 4 | 11 | 4 | 8 | 1 | 9 |
| 510 | 5 | 0 | 9 | 6 | 8 | 3 | 4 | 6 | 0 | 9 | 0 | 3 | 7 | 7 |
| 511 | 7 | 3 | 10 | 8 | 8 | 10 | 10 | 1 | 4 | 9 | 8 | 0 | 10 | 3 |
| 512 | 8 | 9 | 6 | 5 | 5 | 8 | 4 | 3 | 1 | 11 | 1 | 1 | 10 | 11 |
| 513 | 9 | 6 | 5 | 2 | 11 | 6 | 8 | 9 | 9 | 3 | 5 | 9 | 6 | 8 |
| 514 | 6 | 7 | 0 | 3 | 8 | 2 | 6 | 8 | 8 | 1 | 11 | 7 | 3 | 9 |
| 515 | 11 | 10 | 2 | 11 | 0 | 9 | 7 | 7 | 2 | 10 | 2 | 11 | 0 | 4 |
| 516 | 5 | 7 | 7 | 2 | 10 | 7 | 11 | 0 | 1 | 2 | 6 | 3 | 11 | 5 |
| 517 | 2 | 0 | 6 | 10 | 10 | 3 | 6 | 1 | 4 | 7 | 0 | 4 | 6 | 2 |
| 518 | 4 | 3 | 9 | 10 | 6 | 6 | 1 | 4 | 10 | 0 | 3 | 0 | 9 | 6 |
| 519 | 2 | 6 | 8 | 8 | 9 | 9 | 5 | 11 | 11 | 8 | 4 | 1 | 11 | 3 |
| 520 | 1 | 3 | 10 | 1 | 1 | 7 | 10 | 2 | 5 | 1 | 8 | 9 | 7 | 1 |
| 521 | 0 | 1 | 2 | 7 | 3 | 1 | 1 | 0 | 4 | 6 | 7 | 5 | 7 | 9 |
| 522 | 3 | 11 | 7 | 5 | 7 | 11 | 9 | 9 | 10 | 4 | 9 | 2 | 8 | 2 |
| 523 | 6 | 3 | 8 | 4 | 3 | 11 | 9 | 7 | 9 | 3 | 4 | 5 | 10 | 4 |
| 524 | 0 | 0 | 0 | 4 | 2 | 8 | 2 | 8 | 6 | 4 | 3 | 4 | 4 | 5 |
| 525 | 5 | 0 | 9 | 9 | 5 | 4 | 10 | 9 | 11 | 1 | 7 | 1 | 2 | 10 |
| 526 | 3 | 7 | 5 | 0 | 6 | 9 | 4 | 3 | 3 | 4 | 10 | 9 | 1 | 7 |
| 527 | 4 | 2 | 3 | 11 | 9 | 6 | 0 | 2 | 1 | 6 | 1 | 5 | 5 | 5 |
| 528 | 10 | 7 | 6 | 4 | 0 | 5 | 10 | 1 | 10 | 9 | 2 | 7 | 9 | 7 |
| 529 | 4 | 5 | 2 | 6 | 5 | 8 | 7 | 5 | 0 | 1 | 3 | 6 | 5 | 0 |
| 530 | 10 | 10 | 10 | 0 | 7 | 6 | 5 | 4 | 3 | 9 | 1 | 3 | 2 | 8 |
| 531 | 0 | 0 | 8 | 8 | 3 | 6 | 3 | 3 | 1 | 2 | 9 | 0 | 0 | 1 |
| 532 | 9 | 8 | 9 | 11 | 2 | 0 | 4 | 6 | 4 | 5 | 8 | 9 | 10 | 2 |
| 533 | 3 | 8 | 11 | 0 | 11 | 8 | 0 | 11 | 4 | 2 | 3 | 0 | 2 | 9 |
| 534 | 3 | 10 | 11 | 11 | 1 | 1 | 3 | 0 | 8 | 1 | 1 | 2 | 4 | 11 |
| 535 | 2 | 11 | 4 | 9 | 0 | 1 | 3 | 6 | 0 | 6 | 10 | 8 | 6 | 0 |
| 536 | 2 | 3 | 3 | 6 | 9 | 2 | 7 | 9 | 7 | 9 | 8 | 11 | 8 | 8 |
| 537 | 1 | 1 | 11 | 0 | 8 | 5 | 1 | 10 | 10 | 7 | 11 | 3 | 5 | 5 |
| 538 | 11 | 1 | 3 | 5 | 4 | 4 | 5 | 4 | 6 | 3 | 3 | 10 | 3 | 1 |
| 539 | 2 | 0 | 10 | 4 | 8 | 7 | 8 | 11 | 2 | 6 | 2 | 3 | 8 | 10 |
| 540 | 2 | 5 | 4 | 5 | 6 | 10 | 7 | 10 | 9 | 2 | 9 | 1 | 9 | 10 |
| 541 | 11 | 9 | 1 | 7 | 7 | 8 | 8 | 1 | 9 | 0 | 6 | 6 | 8 | 3 |
| 542 | 10 | 5 | 1 | 1 | 4 | 5 | 11 | 9 | 4 | 10 | 0 | 8 | 4 | 3 |
| 543 | 7 | 6 | 10 | 6 | 8 | 3 | 1 | 8 | 9 | 2 | 8 | 4 | 1 | 7 |
| 544 | 0 | 0 | 2 | 6 | 11 | 11 | 0 | 6 | 8 | 8 | 2 | 2 | 6 | 3 |
| 545 | 1 | 9 | 9 | 3 | 4 | 9 | 11 | 2 | 0 | 6 | 7 | 6 | 11 | 7 |
| 546 | 8 | 5 | 1 | 3 | 9 | 0 | 0 | 4 | 6 | 11 | 10 | 2 | 8 | 9 |
| 547 | 11 | 8 | 5 | 10 | 11 | 0 | 10 | 2 | 4 | 4 | 1 | 2 | 8 | 5 |
| 548 | 2 | 10 | 6 | 5 | 4 | 4 | 10 | 10 | 10 | 8 | 8 | 0 | 7 | 5 |
| 549 | 3 | 4 | 0 | 9 | 9 | 2 | 3 | 7 | 3 | 6 | 3 | 7 | 1 | 11 |
| 550 | 8 | 2 | 9 | 5 | 9 | 5 | 1 | 5 | 6 | 8 | 1 | 7 | 2 | 6 |
| 551 | 8 | 7 | 0 | 11 | 10 | 11 | 4 | 7 | 10 | 3 | 0 | 1 | 3 | 1 |
| 552 | 8 | 6 | 6 | 9 | 2 | 6 | 3 | 5 | 7 | 6 | 0 | 2 | 2 | 10 |
| 553 | 10 | 5 | 9 | 4 | 4 | 0 | 8 | 8 | 7 | 1 | 4 | 7 | 8 | 0 |
| 554 | 11 | 10 | 4 | 3 | 6 | 5 | 9 | 4 | 1 | 2 | 0 | 8 | 0 | 8 |
| 555 | 3 | 10 | 2 | 0 | 2 | 2 | 3 | 10 | 9 | 0 | 10 | 6 | 11 | 10 |
| 556 | 11 | 3 | 0 | 3 | 5 | 11 | 3 | 0 | 11 | 11 | 11 | 3 | 6 | 11 |
| 557 | 5 | 5 | 4 | 6 | 7 | 11 | 2 | 3 | 11 | 2 | 11 | 8 | 2 | 6 |
| 558 | 7 | 9 | 3 | 10 | 6 | 4 | 7 | 4 | 8 | 10 | 7 | 6 | 5 | 5 |
| 559 | 8 | 1 | 7 | 6 | 10 | 0 | 6 | 2 | 5 | 11 | 0 | 0 | 7 | 7 |
| 560 | 11 | 3 | 7 | 10 | 1 | 2 | 6 | 10 | 4 | 8 | 7 | 3 | 3 | 6 |
| 561 | 6 | 6 | 4 | 6 | 3 | 6 | 6 | 1 | 8 | 3 | 1 | 4 | 2 | 3 |
| 562 | 2 | 1 | 8 | 6 | 5 | 3 | 10 | 9 | 2 | 3 | 4 | 4 | 7 | 9 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 563 | 5 | 1 | 7 | 7 | 8 | 4 | 3 | 6 | 2 | 8 | 4 | 2 | 3 | 10 |
| 564 | 0 | 7 | 1 | 1 | 2 | 9 | 9 | 2 | 11 | 7 | 2 | 2 | 11 | 0 |
| 565 | 10 | 11 | 7 | 6 | 10 | 6 | 2 | 11 | 9 | 0 | 4 | 11 | 9 | 8 |
| 566 | 7 | 9 | 11 | 3 | 1 | 9 | 8 | 6 | 11 | 9 | 4 | 3 | 0 | 10 |
| 567 | 3 | 1 | 8 | 3 | 10 | 7 | 6 | 5 | 11 | 4 | 10 | 11 | 0 | 6 |
| 568 | 6 | 8 | 4 | 10 | 2 | 6 | 11 | 11 | 5 | 7 | 3 | 7 | 5 | 8 |
| 569 | 10 | 7 | 10 | 3 | 11 | 11 | 5 | 8 | 2 | 10 | 2 | 1 | 10 | 6 |
| 570 | 4 | 0 | 5 | 0 | 4 | 5 | 8 | 7 | 8 | 2 | 11 | 1 | 3 | 10 |
| 571 | 10 | 7 | 5 | 9 | 0 | 10 | 1 | 0 | 11 | 5 | 0 | 6 | 5 | 0 |
| 572 | 7 | 3 | 7 | 10 | 0 | 10 | 8 | 1 | 8 | 0 | 9 | 5 | 1 | 7 |
| 573 | 0 | 9 | 0 | 0 | 0 | 11 | 11 | 9 | 7 | 0 | 11 | 11 | 3 | 7 |
| 574 | 6 | 9 | 1 | 1 | 1 | 10 | 0 | 11 | 0 | 6 | 11 | 1 | 7 | 3 |
| 575 | 2 | 8 | 9 | 2 | 6 | 3 | 8 | 2 | 0 | 3 | 6 | 5 | 10 | 6 |
| 576 | 8 | 4 | 8 | 10 | 3 | 6 | 11 | 5 | 2 | 10 | 4 | 10 | 8 | 2 |
| 577 | 1 | 3 | 2 | 3 | 2 | 0 | 2 | 3 | 3 | 9 | 6 | 11 | 10 | 1 |
| 578 | 9 | 1 | 5 | 9 | 5 | 2 | 1 | 6 | 0 | 0 | 5 | 7 | 0 | 3 |
| 579 | 5 | 10 | 9 | 1 | 10 | 8 | 5 | 7 | 1 | 4 | 7 | 10 | 1 | 1 |
| 580 | 5 | 9 | 8 | 5 | 2 | 2 | 10 | 2 | 7 | 5 | 6 | 4 | 9 | 10 |
| 581 | 9 | 0 | 11 | 8 | 7 | 10 | 11 | 11 | 3 | 9 | 8 | 7 | 4 | 5 |
| 582 | 3 | 10 | 10 | 6 | 6 | 7 | 0 | 4 | 0 | 6 | 5 | 2 | 3 | 5 |
| 583 | 0 | 6 | 1 | 7 | 0 | 7 | 9 | 11 | 1 | 11 | 3 | 11 | 7 | 2 |
| 584 | 6 | 2 | 2 | 9 | 0 | 2 | 7 | 3 | 5 | 0 | 4 | 9 | 2 | 2 |
| 585 | 11 | 8 | 11 | 11 | 2 | 4 | 6 | 9 | 10 | 0 | 10 | 1 | 5 | 9 |
| 586 | 8 | 1 | 3 | 8 | 4 | 3 | 2 | 2 | 4 | 0 | 5 | 4 | 2 | 4 |
| 587 | 9 | 7 | 10 | 6 | 10 | 2 | 10 | 10 | 7 | 2 | 1 | 9 | 5 | 9 |
| 588 | 10 | 2 | 6 | 0 | 4 | 0 | 0 | 11 | 1 | 9 | 11 | 9 | 11 | 6 |
| 589 | 8 | 2 | 1 | 3 | 8 | 10 | 3 | 6 | 7 | 10 | 2 | 3 | 7 | 4 |
| 590 | 2 | 0 | 8 | 0 | 1 | 11 | 5 | 5 | 9 | 0 | 9 | 7 | 1 | 8 |
| 591 | 11 | 6 | 6 | 6 | 10 | 4 | 1 | 2 | 3 | 4 | 7 | 7 | 10 | 9 |
| 592 | 2 | 0 | 2 | 3 | 10 | 1 | 7 | 6 | 10 | 11 | 6 | 0 | 8 | 11 |
| 593 | 2 | 7 | 9 | 7 | 5 | 10 | 11 | 7 | 5 | 2 | 8 | 9 | 1 | 3 |
| 594 | 4 | 0 | 4 | 9 | 9 | 1 | 0 | 8 | 2 | 0 | 9 | 2 | 2 | 1 |
| 595 | 8 | 5 | 7 | 4 | 10 | 3 | 4 | 0 | 9 | 8 | 3 | 8 | 6 | 11 |
| 596 | 8 | 0 | 7 | 5 | 2 | 4 | 7 | 3 | 0 | 0 | 7 | 7 | 4 | 4 |
| 597 | 8 | 10 | 4 | 4 | 10 | 4 | 3 | 8 | 8 | 7 | 5 | 6 | 3 | 6 |
| 598 | 9 | 1 | 0 | 2 | 3 | 7 | 4 | 0 | 3 | 1 | 4 | 10 | 0 | 10 |
| 599 | 5 | 3 | 1 | 9 | 3 | 1 | 4 | 10 | 7 | 2 | 3 | 0 | 4 | 11 |
| 600 | 6 | 4 | 6 | 1 | 1 | 3 | 9 | 8 | 4 | 0 | 10 | 10 | 0 | 8 |
| 601 | 4 | 4 | 4 | 7 | 9 | 10 | 1 | 4 | 0 | 3 | 8 | 3 | 7 | 11 |
| 602 | 10 | 9 | 0 | 8 | 0 | 8 | 5 | 0 | 4 | 7 | 10 | 3 | 9 | 9 |
| 603 | 0 | 5 | 9 | 10 | 8 | 5 | 6 | 10 | 5 | 5 | 3 | 1 | 8 | 1 |
| 604 | 10 | 1 | 5 | 10 | 2 | 4 | 7 | 8 | 2 | 2 | 0 | 5 | 7 | 1 |
| 605 | 7 | 11 | 11 | 1 | 2 | 11 | 4 | 4 | 2 | 3 | 8 | 7 | 11 | 4 |
| 606 | 4 | 11 | 11 | 11 | 8 | 2 | 11 | 8 | 3 | 7 | 10 | 11 | 7 | 7 |
| 607 | 9 | 4 | 2 | 0 | 6 | 7 | 2 | 7 | 5 | 8 | 1 | 4 | 0 | 1 |
| 608 | 5 | 4 | 1 | 0 | 9 | 9 | 2 | 0 | 7 | 11 | 7 | 9 | 2 | 5 |
| 609 | 3 | 5 | 11 | 10 | 2 | 11 | 9 | 6 | 1 | 5 | 0 | 10 | 9 | 0 |
| 610 | 11 | 2 | 1 | 10 | 10 | 9 | 11 | 8 | 1 | 3 | 4 | 9 | 5 | 7 |
| 611 | 3 | 9 | 7 | 9 | 6 | 7 | 1 | 1 | 4 | 9 | 6 | 8 | 5 | 8 |
| 612 | 0 | 2 | 10 | 2 | 6 | 1 | 8 | 1 | 11 | 6 | 1 | 11 | 6 | 1 |
| 613 | 0 | 9 | 5 | 0 | 5 | 5 | 1 | 0 | 3 | 11 | 2 | 2 | 8 | 4 |
| 614 | 8 | 6 | 10 | 3 | 11 | 8 | 2 | 10 | 10 | 9 | 3 | 9 | 3 | 2 |
| 615 | 5 | 6 | 10 | 11 | 4 | 10 | 6 | 8 | 1 | 8 | 9 | 6 | 10 | 1 |
| 616 | 5 | 1 | 1 | 4 | 8 | 0 | 1 | 4 | 5 | 2 | 5 | 8 | 11 | 0 |
| 617 | 9 | 2 | 6 | 3 | 10 | 9 | 4 | 4 | 6 | 4 | 11 | 10 | 4 | 0 |
| 618 | 8 | 2 | 9 | 2 | 0 | 2 | 0 | 7 | 10 | 5 | 3 | 8 | 4 | 8 |
| 619 | 6 | 6 | 11 | 10 | 9 | 3 | 7 | 3 | 9 | 6 | 10 | 8 | 8 | 4 |
| 620 | 4 | 7 | 11 | 7 | 4 | 5 | 9 | 9 | 0 | 9 | 4 | 5 | 6 | 0 |
| 621 | 1 | 7 | 11 | 5 | 8 | 6 | 4 | 7 | 8 | 9 | 3 | 2 | 10 | 8 |
| 622 | 0 | 3 | 3 | 11 | 11 | 7 | 8 | 9 | 0 | 4 | 4 | 8 | 3 | 1 |
| 623 | 6 | 9 | 7 | 4 | 11 | 5 | 5 | 11 | 3 | 9 | 0 | 10 | 6 | 6 |
| 624 | 6 | 3 | 11 | 2 | 5 | 5 | 10 | 2 | 1 | 3 | 9 | 11 | 1 | 5 |
| 625 | 9 | 11 | 6 | 6 | 2 | 11 | 11 | 5 | 3 | 1 | 6 | 1 | 6 | 11 |
| 626 | 8 | 11 | 5 | 9 | 4 | 8 | 0 | 0 | 2 | 11 | 7 | 4 | 1 | 2 |
| 627 | 3 | 8 | 4 | 8 | 9 | 1 | 2 | 5 | 10 | 2 | 10 | 10 | 8 | 8 |
| 628 | 2 | 1 | 4 | 3 | 2 | 9 | 4 | 1 | 1 | 9 | 10 | 6 | 2 | 2 |
| 629 | 7 | 5 | 4 | 1 | 5 | 6 | 11 | 0 | 8 | 4 | 2 | 6 | 11 | 9 |
| 630 | 6 | 2 | 10 | 8 | 5 | 1 | 7 | 8 | 6 | 7 | 8 | 1 | 7 | 5 |
| 631 | 4 | 10 | 11 | 4 | 3 | 0 | 4 | 9 | 3 | 11 | 9 | 4 | 8 | 5 |
| 632 | 8 | 11 | 2 | 11 | 0 | 0 | 9 | 2 | 9 | 0 | 7 | 8 | 10 | 3 |
| 633 | 10 | 11 | 6 | 5 | 7 | 10 | 0 | 1 | 5 | 10 | 5 | 6 | 4 | 9 |
| 634 | 6 | 1 | 10 | 0 | 2 | 5 | 5 | 3 | 6 | 1 | 5 | 6 | 10 | 0 |
| 635 | 5 | 9 | 6 | 1 | 6 | 3 | 2 | 6 | 5 | 9 | 3 | 0 | 2 | 3 |
| 636 | 6 | 1 | 5 | 1 | 11 | 9 | 2 | 1 | 10 | 10 | 8 | 3 | 9 | 1 |
| 637 | 9 | 9 | 0 | 8 | 1 | 1 | 7 | 2 | 2 | 6 | 6 | 5 | 4 | 2 |
| 638 | 4 | 2 | 8 | 10 | 0 | 1 | 6 | 9 | 9 | 8 | 3 | 9 | 1 | 4 |
| 639 | 10 | 8 | 7 | 5 | 7 | 5 | 5 | 5 | 1 | 7 | 7 | 9 | 7 | 11 |
| 640 | 7 | 6 | 8 | 8 | 8 | 11 | 6 | 0 | 6 | 0 | 1 | 6 | 4 | 2 |
| 641 | 11 | 8 | 0 | 4 | 4 | 5 | 1 | 8 | 1 | 9 | 8 | 0 | 2 | 10 |
| 642 | 2 | 5 | 2 | 11 | 6 | 7 | 9 | 8 | 11 | 1 | 5 | 3 | 7 | 6 |
| 643 | 7 | 4 | 2 | 9 | 11 | 6 | 4 | 10 | 0 | 7 | 8 | 6 | 9 | 2 |
| 644 | 7 | 10 | 9 | 3 | 0 | 1 | 3 | 3 | 10 | 2 | 5 | 4 | 2 | 5 |
| 645 | 11 | 4 | 8 | 2 | 3 | 9 | 10 | 4 | 9 | 9 | 7 | 6 | 9 | 6 |
| 646 | 4 | 8 | 3 | 10 | 5 | 8 | 3 | 1 | 6 | 9 | 5 | 10 | 2 | 3 |
| 647 | 5 | 7 | 2 | 10 | 10 | 10 | 10 | 9 | 3 | 7 | 2 | 8 | 0 | 3 |
| 648 | 4 | 2 | 2 | 6 | 11 | 7 | 2 | 11 | 7 | 7 | 10 | 1 | 3 | 11 |
| 649 | 10 | 11 | 8 | 7 | 9 | 3 | 5 | 10 | 10 | 7 | 8 | 5 | 0 | 6 |
| 650 | 6 | 0 | 3 | 1 | 4 | 6 | 10 | 7 | 4 | 7 | 1 | 0 | 11 | 7 |
| 651 | 11 | 11 | 0 | 9 | 1 | 6 | 10 | 0 | 0 | 10 | 0 | 7 | 8 | 7 |
| 652 | 3 | 11 | 10 | 4 | 1 | 6 | 8 | 9 | 5 | 0 | 6 | 10 | 11 | 11 |
| 653 | 2 | 4 | 2 | 5 | 10 | 0 | 2 | 9 | 6 | 3 | 5 | 1 | 5 | 4 |
| 654 | 1 | 11 | 1 | 8 | 7 | 7 | 5 | 4 | 9 | 8 | 7 | 5 | 5 | 0 |
| 655 | 5 | 0 | 0 | 10 | 6 | 5 | 7 | 1 | 2 | 5 | 1 | 2 | 9 | 4 |
| 656 | 7 | 6 | 5 | 5 | 3 | 7 | 11 | 5 | 11 | 11 | 9 | 1 | 3 | 0 |
| 657 | 7 | 0 | 11 | 1 | 0 | 4 | 7 | 10 | 3 | 8 | 3 | 4 | 0 | 6 |
| 658 | 6 | 5 | 6 | 8 | 9 | 8 | 1 | 3 | 0 | 5 | 2 | 2 | 11 | 8 |
| 659 | 0 | 9 | 3 | 4 | 10 | 7 | 9 | 3 | 6 | 5 | 10 | 6 | 6 | 7 |
| 660 | 7 | 9 | 6 | 6 | 2 | 3 | 3 | 3 | 2 | 8 | 9 | 3 | 9 | 0 |
| 661 | 1 | 8 | 4 | 7 | 7 | 9 | 7 | 9 | 7 | 0 | 0 | 7 | 0 | 0 |
| 662 | 8 | 4 | 2 | 10 | 7 | 9 | 7 | 11 | 9 | 5 | 11 | 3 | 1 | 7 |
| 663 | 10 | 0 | 2 | 7 | 9 | 7 | 8 | 3 | 9 | 3 | 0 | 10 | 2 | 9 |
| 664 | 3 | 6 | 10 | 4 | 10 | 5 | 5 | 6 | 4 | 8 | 2 | 9 | 0 | 5 |
| 665 | 2 | 0 | 7 | 1 | 1 | 8 | 6 | 2 | 8 | 5 | 11 | 8 | 11 | 4 |
| 666 | 2 | 1 | 11 | 10 | 9 | 0 | 3 | 5 | 0 | 11 | 6 | 11 | 5 | 3 |
| 667 | 3 | 0 | 5 | 6 | 11 | 4 | 9 | 4 | 6 | 11 | 6 | 5 | 10 | 8 |
| 668 | 3 | 7 | 2 | 9 | 2 | 3 | 4 | 6 | 5 | 10 | 7 | 11 | 3 | 5 |
| 669 | 11 | 10 | 9 | 4 | 2 | 9 | 10 | 5 | 3 | 8 | 5 | 8 | 4 | 1 |
| 670 | 11 | 5 | 11 | 2 | 6 | 3 | 5 | 0 | 7 | 2 | 7 | 7 | 1 | 3 |
| 671 | 10 | 10 | 11 | 6 | 0 | 11 | 2 | 9 | 6 | 1 | 8 | 3 | 7 | 10 |
| 672 | 5 | 11 | 2 | 6 | 4 | 9 | 8 | 0 | 4 | 10 | 3 | 10 | 10 | 8 |
| 673 | 3 | 11 | 3 | 2 | 1 | 0 | 5 | 7 | 2 | 9 | 0 | 3 | 7 | 9 |
| 674 | 5 | 3 | 0 | 7 | 10 | 0 | 10 | 4 | 11 | 0 | 8 | 6 | 1 | 8 |
| 675 | 9 | 3 | 8 | 0 | 11 | 6 | 9 | 5 | 11 | 1 | 11 | 4 | 4 | 7 |
| 676 | 8 | 0 | 11 | 1 | 3 | 2 | 1 | 6 | 1 | 3 | 11 | 6 | 3 | 8 |
| 677 | 11 | 7 | 0 | 1 | 11 | 8 | 6 | 7 | 7 | 6 | 5 | 5 | 2 | 7 |
| 678 | 7 | 8 | 5 | 0 | 5 | 3 | 2 | 9 | 8 | 9 | 10 | 3 | 6 | 2 |
| 679 | 1 | 6 | 0 | 3 | 2 | 3 | 8 | 5 | 8 | 10 | 4 | 4 | 6 | 6 |
| 680 | 11 | 4 | 6 | 8 | 2 | 5 | 0 | 6 | 8 | 0 | 4 | 11 | 2 | 7 |
| 681 | 10 | 5 | 5 | 7 | 8 | 9 | 6 | 11 | 10 | 4 | 5 | 4 | 10 | 0 |
| 682 | 2 | 7 | 8 | 1 | 8 | 9 | 3 | 10 | 5 | 11 | 10 | 5 | 9 | 5 |
| 683 | 0 | 1 | 4 | 2 | 1 | 8 | 9 | 3 | 1 | 10 | 11 | 10 | 3 | 5 |
| 684 | 0 | 3 | 5 | 8 | 1 | 4 | 5 | 7 | 7 | 4 | 5 | 7 | 11 | 2 |
| 685 | 10 | 4 | 1 | 8 | 5 | 6 | 3 | 10 | 11 | 10 | 1 | 7 | 10 | 9 |
| 686 | 4 | 6 | 4 | 2 | 10 | 11 | 0 | 0 | 11 | 6 | 10 | 9 | 1 | 9 |
| 687 | 7 | 7 | 4 | 0 | 7 | 4 | 0 | 6 | 1 | 7 | 6 | 10 | 8 | 4 |
| 688 | 10 | 0 | 7 | 9 | 9 | 2 | 4 | 1 | 6 | 8 | 11 | 0 | 0 | 10 |
| 689 | 8 | 5 | 10 | 5 | 0 | 5 | 4 | 9 | 3 | 6 | 5 | 0 | 9 | 9 |
| 690 | 10 | 1 | 7 | 4 | 3 | 1 | 2 | 3 | 11 | 4 | 1 | 9 | 3 | 4 |
| 691 | 8 | 10 | 8 | 11 | 5 | 7 | 3 | 4 | 3 | 5 | 8 | 1 | 1 | 4 |
| 692 | 3 | 6 | 3 | 6 | 4 | 1 | 0 | 0 | 9 | 5 | 6 | 0 | 9 | 4 |
| 693 | 0 | 3 | 7 | 8 | 8 | 9 | 4 | 5 | 8 | 3 | 0 | 3 | 9 | 10 |
| 694 | 1 | 1 | 9 | 7 | 9 | 8 | 0 | 11 | 8 | 3 | 5 | 9 | 0 | 1 |
| 695 | 4 | 5 | 10 | 9 | 1 | 3 | 1 | 6 | 7 | 4 | 1 | 8 | 4 | 4 |
| 696 | 1 | 4 | 0 | 2 | 0 | 3 | 4 | 11 | 2 | 2 | 3 | 6 | 5 | 4 |
| 697 | 6 | 5 | 6 | 0 | 8 | 1 | 6 | 5 | 9 | 2 | 6 | 11 | 4 | 5 |
| 698 | 4 | 9 | 8 | 4 | 1 | 8 | 2 | 4 | 9 | 11 | 2 | 11 | 3 | 0 |
| 699 | 5 | 9 | 11 | 5 | 8 | 1 | 0 | 0 | 10 | 8 | 0 | 11 | 0 | 9 |
| 700 | 7 | 8 | 3 | 1 | 9 | 10 | 1 | 3 | 10 | 1 | 9 | 7 | 6 | 1 |
| 701 | 8 | 1 | 8 | 0 | 2 | 3 | 8 | 10 | 1 | 2 | 2 | 11 | 8 | 11 |
| 702 | 11 | 7 | 3 | 2 | 7 | 5 | 10 | 8 | 5 | 1 | 1 | 3 | 6 | 2 |
| 703 | 2 | 8 | 3 | 8 | 11 | 5 | 1 | 5 | 3 | 6 | 3 | 8 | 10 | 3 |
| 704 | 9 | 10 | 10 | 8 | 8 | 0 | 3 | 2 | 1 | 10 | 3 | 11 | 3 | 0 |
| 705 | 4 | 1 | 2 | 8 | 8 | 6 | 7 | 1 | 3 | 11 | 11 | 2 | 2 | 9 |
| 706 | 8 | 5 | 11 | 5 | 9 | 1 | 9 | 1 | 8 | 10 | 11 | 8 | 5 | 1 |
| 707 | 2 | 5 | 9 | 4 | 3 | 6 | 4 | 6 | 6 | 0 | 10 | 11 | 5 | 1 |
| 708 | 4 | 5 | 9 | 11 | 2 | 10 | 2 | 3 | 0 | 10 | 10 | 5 | 0 | 3 |
| 709 | 1 | 0 | 0 | 7 | 3 | 5 | 6 | 8 | 11 | 8 | 6 | 11 | 11 | 7 |
| 710 | 5 | 4 | 3 | 4 | 0 | 1 | 1 | 11 | 9 | 7 | 1 | 10 | 4 | 1 |
| 711 | 6 | 8 | 3 | 3 | 1 | 11 | 8 | 1 | 7 | 8 | 9 | 4 | 3 | 0 |
| 712 | 0 | 10 | 5 | 10 | 5 | 6 | 2 | 1 | 4 | 3 | 9 | 8 | 4 | 0 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 713 | 8 | 3 | 8 | 7 | 8 | 3 | 11 | 1 | 9 | 9 | 5 | 2 | 7 | 1 |
| 714 | 1 | 8 | 4 | 6 | 9 | 5 | 9 | 7 | 4 | 6 | 6 | 6 | 7 | 5 |
| 715 | 5 | 11 | 9 | 3 | 3 | 2 | 9 | 8 | 6 | 6 | 9 | 3 | 1 | 4 |
| 716 | 9 | 4 | 1 | 11 | 8 | 7 | 5 | 1 | 7 | 6 | 10 | 6 | 4 | 8 |
| 717 | 5 | 0 | 4 | 7 | 2 | 11 | 4 | 0 | 9 | 11 | 1 | 5 | 8 | 0 |
| 718 | 11 | 4 | 1 | 6 | 5 | 2 | 4 | 1 | 5 | 11 | 9 | 10 | 1 | 6 |
| 719 | 6 | 6 | 7 | 2 | 9 | 10 | 10 | 5 | 5 | 4 | 4 | 6 | 5 | 11 |
| 720 | 2 | 10 | 4 | 1 | 7 | 2 | 11 | 2 | 7 | 6 | 4 | 3 | 3 | 11 |
| 721 | 6 | 2 | 4 | 5 | 1 | 4 | 11 | 0 | 3 | 5 | 8 | 3 | 6 | 2 |
| 722 | 11 | 2 | 9 | 4 | 6 | 8 | 7 | 3 | 10 | 1 | 8 | 2 | 0 | 11 |
| 723 | 10 | 6 | 1 | 11 | 6 | 0 | 0 | 7 | 4 | 8 | 4 | 0 | 3 | 8 |
| 724 | 8 | 9 | 7 | 7 | 4 | 3 | 7 | 4 | 6 | 5 | 1 | 9 | 11 | 3 |
| 725 | 4 | 2 | 7 | 3 | 5 | 2 | 5 | 9 | 4 | 7 | 9 | 6 | 11 | 8 |
| 726 | 0 | 5 | 0 | 5 | 7 | 10 | 10 | 11 | 0 | 1 | 7 | 8 | 10 | 8 |
| 727 | 7 | 9 | 10 | 11 | 7 | 11 | 4 | 5 | 11 | 8 | 7 | 2 | 4 | 9 |
| 728 | 6 | 9 | 8 | 2 | 1 | 4 | 6 | 9 | 6 | 2 | 4 | 2 | 2 | 6 |
| 729 | 4 | 11 | 10 | 10 | 0 | 9 | 9 | 6 | 10 | 1 | 5 | 1 | 11 | 1 |
| 730 | 9 | 6 | 9 | 5 | 4 | 7 | 7 | 1 | 6 | 1 | 7 | 4 | 9 | 5 |
| 731 | 3 | 7 | 6 | 3 | 11 | 8 | 7 | 5 | 9 | 3 | 4 | 2 | 9 | 1 |
| 732 | 6 | 11 | 3 | 0 | 11 | 3 | 11 | 6 | 0 | 3 | 9 | 1 | 2 | 8 |
| 733 | 9 | 0 | 6 | 3 | 3 | 11 | 2 | 10 | 0 | 11 | 2 | 6 | 1 | 9 |
| 734 | 6 | 10 | 3 | 7 | 3 | 8 | 11 | 8 | 2 | 2 | 10 | 7 | 10 | 10 |
| 735 | 1 | 5 | 0 | 10 | 7 | 6 | 0 | 3 | 10 | 10 | 2 | 1 | 7 | 10 |
| 736 | 4 | 1 | 6 | 7 | 6 | 7 | 8 | 0 | 1 | 4 | 5 | 7 | 4 | 8 |
| 737 | 11 | 3 | 6 | 5 | 9 | 0 | 3 | 6 | 3 | 7 | 1 | 5 | 11 | 0 |
| 738 | 0 | 0 | 8 | 5 | 4 | 7 | 0 | 9 | 10 | 0 | 1 | 10 | 10 | 0 |
| 739 | 2 | 9 | 2 | 9 | 3 | 7 | 6 | 4 | 7 | 11 | 8 | 9 | 6 | 9 |
| 740 | 6 | 3 | 0 | 5 | 7 | 3 | 0 | 10 | 8 | 9 | 6 | 0 | 5 | 7 |
| 741 | 3 | 2 | 1 | 4 | 0 | 6 | 4 | 5 | 0 | 2 | 4 | 7 | 1 | 5 |
| 742 | 9 | 8 | 2 | 3 | 5 | 10 | 2 | 8 | 9 | 1 | 0 | 5 | 9 | 7 |
| 743 | 10 | 6 | 3 | 10 | 11 | 2 | 8 | 0 | 10 | 0 | 10 | 11 | 10 | 5 |
| 744 | 6 | 0 | 6 | 4 | 7 | 0 | 5 | 4 | 11 | 5 | 10 | 1 | 4 | 1 |
| 745 | 0 | 10 | 7 | 1 | 5 | 7 | 0 | 7 | 9 | 10 | 11 | 5 | 6 | 8 |
| 746 | 8 | 6 | 11 | 9 | 11 | 2 | 10 | 11 | 8 | 11 | 2 | 10 | 11 | 0 |
| 747 | 9 | 7 | 11 | 7 | 3 | 1 | 6 | 4 | 1 | 0 | 2 | 4 | 9 | 4 |
| 748 | 1 | 0 | 8 | 7 | 5 | 9 | 2 | 6 | 3 | 6 | 1 | 0 | 7 | 10 |
| 749 | 9 | 10 | 4 | 7 | 1 | 10 | 5 | 11 | 6 | 5 | 0 | 0 | 8 | 10 |
| 750 | 5 | 8 | 10 | 11 | 8 | 9 | 7 | 4 | 8 | 11 | 4 | 1 | 4 | 2 |
| 751 | 11 | 0 | 2 | 9 | 8 | 3 | 2 | 7 | 1 | 5 | 4 | 10 | 8 | 3 |
| 752 | 2 | 11 | 5 | 11 | 4 | 11 | 2 | 4 | 11 | 4 | 6 | 10 | 9 | 3 |
| 753 | 0 | 8 | 7 | 10 | 11 | 1 | 5 | 8 | 10 | 8 | 11 | 6 | 5 | 2 |
| 754 | 3 | 3 | 5 | 1 | 3 | 3 | 5 | 5 | 4 | 6 | 3 | 2 | 6 | 4 |
| 755 | 0 | 3 | 6 | 9 | 0 | 8 | 6 | 6 | 6 | 8 | 4 | 1 | 7 | 9 |
| 756 | 3 | 0 | 0 | 2 | 0 | 7 | 2 | 2 | 11 | 9 | 11 | 5 | 8 | 1 |
| 757 | 3 | 2 | 10 | 9 | 8 | 5 | 6 | 1 | 3 | 4 | 0 | 5 | 3 | 3 |
| 758 | 7 | 11 | 0 | 0 | 2 | 4 | 2 | 2 | 0 | 2 | 5 | 2 | 1 | 10 |
| 759 | 10 | 1 | 1 | 11 | 3 | 11 | 5 | 2 | 5 | 5 | 7 | 11 | 2 | 10 |
| 760 | 1 | 8 | 2 | 5 | 1 | 1 | 11 | 7 | 10 | 3 | 9 | 9 | 4 | 10 |
| 761 | 1 | 9 | 5 | 0 | 3 | 4 | 3 | 7 | 5 | 1 | 7 | 0 | 6 | 11 |
| 762 | 7 | 2 | 8 | 8 | 6 | 3 | 11 | 2 | 2 | 5 | 10 | 8 | 1 | 5 |
| 763 | 9 | 4 | 3 | 3 | 0 | 7 | 7 | 8 | 1 | 0 | 8 | 8 | 6 | 6 |
| 764 | 5 | 4 | 5 | 11 | 7 | 8 | 10 | 10 | 7 | 1 | 0 | 5 | 1 | 6 |
| 765 | 4 | 0 | 2 | 4 | 6 | 11 | 11 | 10 | 11 | 7 | 6 | 4 | 2 | 4 |
| 766 | 0 | 0 | 5 | 1 | 6 | 0 | 3 | 4 | 10 | 9 | 4 | 11 | 8 | 2 |
| 767 | 7 | 10 | 0 | 9 | 10 | 8 | 9 | 1 | 5 | 1 | 6 | 5 | 9 | 11 |
| 768 | 1 | 11 | 4 | 5 | 6 | 5 | 1 | 5 | 7 | 9 | 5 | 10 | 10 | 10 |
| 769 | 5 | 10 | 8 | 10 | 8 | 0 | 10 | 10 | 2 | 0 | 0 | 7 | 7 | 0 |
| 770 | 3 | 6 | 6 | 4 | 11 | 1 | 7 | 6 | 3 | 7 | 9 | 1 | 1 | 4 |
| 771 | 4 | 1 | 7 | 2 | 5 | 11 | 3 | 3 | 9 | 2 | 4 | 6 | 4 | 2 |
| 772 | 11 | 5 | 3 | 3 | 1 | 10 | 9 | 2 | 10 | 6 | 6 | 9 | 9 | 11 |
| 773 | 9 | 6 | 7 | 6 | 2 | 5 | 2 | 1 | 5 | 6 | 2 | 2 | 8 | 0 |
| 774 | 1 | 3 | 10 | 0 | 5 | 3 | 4 | 10 | 4 | 1 | 2 | 0 | 9 | 8 |
| 775 | 2 | 7 | 9 | 5 | 7 | 8 | 7 | 9 | 4 | 8 | 6 | 11 | 0 | 7 |
| 776 | 2 | 8 | 3 | 11 | 6 | 2 | 3 | 0 | 3 | 3 | 8 | 0 | 6 | 1 |
| 777 | 7 | 2 | 2 | 6 | 9 | 3 | 6 | 0 | 9 | 11 | 1 | 10 | 7 | 5 |
| 778 | 5 | 3 | 0 | 3 | 0 | 8 | 6 | 4 | 1 | 9 | 3 | 5 | 11 | 3 |
| 779 | 10 | 8 | 6 | 1 | 5 | 1 | 6 | 4 | 0 | 5 | 5 | 7 | 7 | 2 |
| 780 | 0 | 5 | 5 | 1 | 0 | 1 | 8 | 10 | 9 | 4 | 11 | 8 | 1 | 0 |
| 781 | 8 | 1 | 10 | 8 | 10 | 7 | 7 | 8 | 9 | 5 | 9 | 7 | 10 | 10 |
| 782 | 4 | 2 | 11 | 11 | 2 | 0 | 2 | 5 | 9 | 9 | 11 | 3 | 9 | 8 |
| 783 | 5 | 9 | 1 | 8 | 7 | 1 | 9 | 3 | 6 | 7 | 4 | 2 | 3 | 1 |
| 784 | 3 | 11 | 7 | 3 | 11 | 2 | 11 | 1 | 6 | 11 | 1 | 6 | 3 | 6 |
| 785 | 5 | 0 | 5 | 7 | 3 | 4 | 5 | 2 | 10 | 4 | 8 | 10 | 4 | 3 |
| 786 | 10 | 11 | 3 | 6 | 11 | 9 | 9 | 7 | 9 | 1 | 2 | 7 | 6 | 9 |
| 787 | 6 | 10 | 9 | 8 | 8 | 7 | 2 | 11 | 0 | 2 | 7 | 10 | 3 | 3 |
| 788 | 8 | 6 | 3 | 7 | 0 | 0 | 11 | 3 | 0 | 11 | 6 | 10 | 0 | 1 |
| 789 | 7 | 11 | 11 | 11 | 4 | 5 | 8 | 11 | 0 | 7 | 3 | 1 | 2 | 5 |
| 790 | 11 | 11 | 9 | 0 | 7 | 9 | 6 | 5 | 11 | 0 | 10 | 3 | 11 | 0 |
| 791 | 9 | 6 | 6 | 8 | 6 | 0 | 5 | 8 | 7 | 3 | 7 | 6 | 2 | 9 |
| 792 | 3 | 4 | 10 | 10 | 8 | 4 | 9 | 9 | 5 | 6 | 5 | 5 | 5 | 2 |
| 793 | 1 | 5 | 1 | 7 | 1 | 11 | 8 | 5 | 4 | 3 | 0 | 3 | 8 | 7 |
| 794 | 7 | 9 | 7 | 11 | 3 | 10 | 3 | 6 | 1 | 1 | 10 | 10 | 11 | 9 |
| 795 | 6 | 2 | 0 | 11 | 0 | 11 | 9 | 8 | 3 | 1 | 0 | 2 | 10 | 2 |
| 796 | 0 | 6 | 4 | 11 | 9 | 9 | 1 | 4 | 2 | 2 | 7 | 4 | 0 | 2 |
| 797 | 4 | 8 | 11 | 0 | 8 | 4 | 5 | 1 | 4 | 0 | 6 | 9 | 10 | 5 |
| 798 | 10 | 10 | 8 | 2 | 10 | 6 | 8 | 7 | 8 | 10 | 11 | 2 | 5 | 11 |
| 799 | 11 | 6 | 10 | 7 | 2 | 2 | 10 | 11 | 7 | 1 | 4 | 5 | 6 | 5 |
| 800 | 9 | 1 | 2 | 9 | 4 | 0 | 9 | 1 | 11 | 2 | 0 | 5 | 6 | 10 |
| 801 | 6 | 5 | 10 | 10 | 0 | 3 | 1 | 2 | 6 | 5 | 10 | 3 | 0 | 6 |
| 802 | 0 | 4 | 8 | 5 | 6 | 11 | 4 | 7 | 5 | 5 | 4 | 3 | 7 | 8 |
| 803 | 9 | 7 | 11 | 0 | 0 | 2 | 2 | 7 | 0 | 10 | 5 | 8 | 11 | 7 |
| 804 | 7 | 11 | 2 | 7 | 1 | 3 | 0 | 7 | 7 | 6 | 2 | 1 | 8 | 6 |
| 805 | 4 | 7 | 0 | 8 | 6 | 1 | 8 | 3 | 1 | 2 | 7 | 1 | 8 | 5 |
| 806 | 10 | 5 | 9 | 5 | 5 | 10 | 10 | 0 | 4 | 7 | 0 | 0 | 7 | 6 |
| 807 | 1 | 2 | 9 | 6 | 0 | 6 | 11 | 0 | 7 | 3 | 10 | 5 | 6 | 6 |
| 808 | 5 | 1 | 10 | 9 | 8 | 8 | 3 | 7 | 3 | 9 | 7 | 11 | 6 | 5 |
| 809 | 1 | 8 | 3 | 9 | 3 | 0 | 8 | 8 | 7 | 7 | 6 | 8 | 4 | 10 |
| 810 | 5 | 6 | 2 | 4 | 7 | 4 | 1 | 6 | 11 | 3 | 10 | 7 | 0 | 7 |
| 811 | 0 | 6 | 1 | 4 | 5 | 9 | 7 | 2 | 0 | 0 | 11 | 9 | 3 | 9 |
| 812 | 4 | 6 | 4 | 3 | 8 | 2 | 1 | 8 | 5 | 8 | 2 | 3 | 4 | 1 |
| 813 | 8 | 4 | 0 | 6 | 6 | 8 | 8 | 11 | 9 | 9 | 10 | 6 | 2 | 10 |
| 814 | 4 | 3 | 5 | 7 | 10 | 2 | 3 | 1 | 4 | 1 | 1 | 7 | 11 | 4 |
| 815 | 4 | 7 | 9 | 10 | 3 | 10 | 4 | 2 | 11 | 9 | 10 | 1 | 7 | 11 |
| 816 | 2 | 7 | 2 | 10 | 0 | 6 | 5 | 7 | 8 | 8 | 9 | 7 | 8 | 0 |
| 817 | 4 | 4 | 2 | 4 | 7 | 8 | 8 | 3 | 0 | 0 | 1 | 5 | 11 | 2 |
| 818 | 10 | 3 | 6 | 10 | 11 | 5 | 8 | 6 | 5 | 10 | 2 | 4 | 3 | 8 |
| 819 | 9 | 6 | 8 | 5 | 6 | 8 | 2 | 10 | 4 | 4 | 8 | 1 | 10 | 6 |
| 820 | 7 | 4 | 10 | 9 | 8 | 5 | 11 | 2 | 4 | 5 | 2 | 7 | 8 | 7 |
| 821 | 11 | 7 | 11 | 9 | 6 | 9 | 9 | 5 | 3 | 7 | 7 | 4 | 10 | 11 |
| 822 | 5 | 3 | 3 | 7 | 4 | 1 | 9 | 6 | 1 | 6 | 9 | 0 | 0 | 6 |
| 823 | 9 | 5 | 4 | 1 | 11 | 2 | 1 | 7 | 1 | 6 | 7 | 0 | 8 | 3 |
| 824 | 0 | 4 | 4 | 7 | 0 | 10 | 10 | 1 | 7 | 9 | 0 | 2 | 2 | 4 |
| 825 | 9 | 8 | 1 | 10 | 8 | 11 | 4 | 8 | 0 | 2 | 1 | 6 | 6 | 7 |
| 826 | 0 | 7 | 6 | 4 | 3 | 6 | 9 | 10 | 4 | 7 | 8 | 10 | 3 | 7 |
| 827 | 1 | 3 | 1 | 5 | 4 | 4 | 0 | 2 | 1 | 5 | 6 | 2 | 11 | 5 |
| 828 | 8 | 1 | 11 | 6 | 3 | 4 | 10 | 3 | 2 | 9 | 5 | 0 | 11 | 2 |
| 829 | 9 | 11 | 6 | 2 | 0 | 3 | 2 | 4 | 1 | 8 | 0 | 9 | 3 | 8 |
| 830 | 6 | 7 | 0 | 2 | 6 | 9 | 7 | 0 | 9 | 11 | 4 | 8 | 3 | 3 |
| 831 | 0 | 10 | 4 | 1 | 8 | 8 | 8 | 0 | 11 | 1 | 10 | 4 | 5 | 5 |
| 832 | 5 | 11 | 9 | 2 | 8 | 2 | 0 | 10 | 3 | 4 | 2 | 4 | 11 | 9 |
| 833 | 8 | 9 | 0 | 10 | 1 | 6 | 3 | 11 | 8 | 1 | 2 | 0 | 0 | 2 |
| 834 | 4 | 2 | 8 | 10 | 1 | 10 | 7 | 7 | 7 | 0 | 4 | 6 | 11 | 9 |
| 835 | 5 | 9 | 11 | 4 | 1 | 4 | 2 | 11 | 3 | 2 | 6 | 6 | 7 | 11 |
| 836 | 10 | 10 | 1 | 6 | 1 | 7 | 4 | 7 | 11 | 2 | 10 | 5 | 2 | 2 |
| 837 | 1 | 10 | 4 | 1 | 2 | 11 | 7 | 3 | 10 | 4 | 11 | 1 | 6 | 2 |
| 838 | 4 | 6 | 7 | 7 | 7 | 3 | 0 | 8 | 10 | 5 | 0 | 8 | 1 | 10 |
| 839 | 4 | 5 | 9 | 1 | 9 | 11 | 0 | 11 | 10 | 9 | 2 | 3 | 3 | 0 |
| 840 | 6 | 9 | 2 | 1 | 9 | 5 | 1 | 10 | 7 | 11 | 9 | 8 | 5 | 7 |
| 841 | 11 | 2 | 11 | 3 | 8 | 6 | 4 | 10 | 2 | 4 | 1 | 9 | 0 | 3 |
| 842 | 5 | 3 | 11 | 6 | 9 | 11 | 9 | 7 | 0 | 8 | 7 | 3 | 9 | 2 |
| 843 | 10 | 3 | 8 | 0 | 4 | 2 | 10 | 8 | 5 | 4 | 6 | 0 | 10 | 0 |
| 844 | 7 | 8 | 6 | 11 | 2 | 10 | 1 | 10 | 6 | 4 | 4 | 9 | 3 | 11 |
| 845 | 5 | 7 | 2 | 1 | 2 | 4 | 3 | 11 | 9 | 9 | 5 | 9 | 1 | 1 |
| 846 | 9 | 0 | 0 | 5 | 5 | 3 | 5 | 4 | 7 | 5 | 2 | 4 | 11 | 7 |
| 847 | 7 | 9 | 6 | 10 | 0 | 2 | 9 | 11 | 7 | 9 | 11 | 10 | 7 | 8 |
| 848 | 7 | 11 | 3 | 4 | 10 | 8 | 10 | 0 | 2 | 2 | 4 | 3 | 3 | 0 |
| 849 | 7 | 2 | 5 | 9 | 3 | 6 | 7 | 9 | 0 | 6 | 9 | 9 | 11 | 5 |
| 850 | 2 | 6 | 1 | 7 | 9 | 4 | 11 | 0 | 5 | 7 | 2 | 8 | 6 | 9 |
| 851 | 5 | 7 | 3 | 8 | 10 | 11 | 4 | 6 | 8 | 7 | 5 | 5 | 5 | 10 |
| 852 | 2 | 0 | 9 | 4 | 8 | 1 | 6 | 1 | 11 | 3 | 8 | 10 | 10 | 8 |
| 853 | 2 | 4 | 5 | 4 | 2 | 5 | 9 | 7 | 9 | 5 | 7 | 8 | 2 | 11 |
| 854 | 10 | 9 | 10 | 4 | 3 | 2 | 6 | 9 | 2 | 0 | 4 | 6 | 4 | 10 |
| 855 | 11 | 0 | 3 | 5 | 6 | 1 | 0 | 11 | 4 | 0 | 2 | 6 | 9 | 9 |
| 856 | 1 | 11 | 3 | 1 | 9 | 0 | 0 | 1 | 9 | 8 | 0 | 11 | 11 | 2 |
| 857 | 9 | 8 | 0 | 1 | 6 | 4 | 10 | 6 | 8 | 4 | 5 | 4 | 6 | 9 |
| 858 | 7 | 0 | 5 | 5 | 1 | 10 | 6 | 0 | 11 | 9 | 6 | 7 | 8 | 3 |
| 859 | 1 | 4 | 9 | 9 | 4 | 3 | 5 | 10 | 9 | 9 | 3 | 9 | 7 | 9 |
| 860 | 11 | 3 | 6 | 1 | 0 | 7 | 2 | 9 | 10 | 2 | 9 | 4 | 0 | 0 |
| 861 | 1 | 9 | 11 | 7 | 2 | 7 | 11 | 6 | 4 | 11 | 5 | 6 | 1 | 8 |
| 862 | 4 | 9 | 2 | 2 | 11 | 11 | 10 | 4 | 10 | 6 | 5 | 5 | 10 | 11 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 863 | 0 | 8 | 10 | 0 | 4 | 5 | 3 | 11 | 8 | 5 | 8 | 6 | 9 | 3 |
| 864 | 3 | 2 | 9 | 4 | 5 | 3 | 11 | 3 | 6 | 4 | 5 | 4 | 7 | 4 |
| 865 | 11 | 8 | 6 | 0 | 0 | 8 | 7 | 8 | 2 | 4 | 0 | 8 | 5 | 9 |
| 866 | 6 | 11 | 8 | 11 | 3 | 6 | 6 | 5 | 7 | 8 | 7 | 0 | 5 | 8 |
| 867 | 11 | 4 | 6 | 0 | 7 | 5 | 1 | 9 | 3 | 10 | 3 | 5 | 7 | 1 |
| 868 | 4 | 11 | 10 | 8 | 4 | 11 | 7 | 1 | 8 | 1 | 3 | 10 | 4 | 6 |
| 869 | 2 | 8 | 3 | 10 | 9 | 9 | 11 | 1 | 2 | 10 | 11 | 9 | 1 | 0 |
| 870 | 10 | 7 | 9 | 11 | 9 | 1 | 7 | 7 | 7 | 1 | 10 | 3 | 4 | 4 |
| 871 | 10 | 8 | 7 | 6 | 8 | 9 | 6 | 3 | 7 | 10 | 3 | 1 | 2 | 6 |
| 872 | 8 | 11 | 9 | 9 | 1 | 10 | 2 | 10 | 2 | 0 | 5 | 1 | 5 | 3 |
| 873 | 8 | 10 | 5 | 8 | 2 | 1 | 9 | 4 | 0 | 9 | 2 | 4 | 6 | 5 |
| 874 | 6 | 5 | 3 | 9 | 5 | 0 | 4 | 0 | 5 | 2 | 11 | 11 | 1 | 11 |
| 875 | 10 | 0 | 8 | 7 | 2 | 1 | 1 | 5 | 2 | 9 | 7 | 8 | 3 | 0 |
| 876 | 9 | 3 | 7 | 3 | 3 | 8 | 8 | 2 | 3 | 6 | 4 | 3 | 5 | 6 |
| 877 | 6 | 10 | 11 | 2 | 11 | 2 | 11 | 4 | 11 | 10 | 0 | 10 | 7 | 2 |
| 878 | 9 | 0 | 1 | 7 | 6 | 10 | 6 | 6 | 2 | 7 | 3 | 5 | 0 | 8 |
| 879 | 3 | 0 | 6 | 8 | 9 | 2 | 5 | 10 | 8 | 7 | 6 | 11 | 7 | 1 |
| 880 | 11 | 2 | 0 | 3 | 3 | 2 | 5 | 1 | 11 | 8 | 5 | 4 | 9 | 2 |
| 881 | 8 | 0 | 9 | 9 | 9 | 8 | 1 | 2 | 0 | 4 | 6 | 6 | 6 | 4 |
| 882 | 11 | 9 | 2 | 5 | 5 | 4 | 11 | 9 | 1 | 6 | 11 | 4 | 2 | 3 |
| 883 | 6 | 8 | 0 | 4 | 3 | 10 | 2 | 7 | 5 | 5 | 6 | 7 | 11 | 0 |
| 884 | 10 | 4 | 6 | 5 | 1 | 2 | 5 | 0 | 5 | 3 | 1 | 9 | 1 | 5 |
| 885 | 3 | 7 | 8 | 0 | 0 | 4 | 4 | 9 | 10 | 11 | 3 | 11 | 8 | 3 |
| 886 | 7 | 1 | 4 | 6 | 11 | 2 | 7 | 6 | 11 | 5 | 8 | 3 | 5 | 9 |
| 887 | 8 | 7 | 10 | 11 | 0 | 8 | 3 | 3 | 6 | 10 | 9 | 1 | 5 | 8 |
| 888 | 2 | 4 | 1 | 6 | 2 | 10 | 3 | 9 | 0 | 7 | 6 | 0 | 3 | 10 |
| 889 | 2 | 7 | 11 | 10 | 7 | 0 | 4 | 11 | 3 | 1 | 11 | 5 | 3 | 4 |
| 890 | 7 | 0 | 4 | 5 | 11 | 0 | 3 | 3 | 8 | 1 | 5 | 9 | 4 | 7 |
| 891 | 10 | 3 | 7 | 11 | 7 | 10 | 1 | 2 | 2 | 8 | 5 | 0 | 8 | 1 |
| 892 | 2 | 2 | 6 | 0 | 5 | 8 | 10 | 5 | 4 | 11 | 10 | 7 | 2 | 1 |
| 893 | 5 | 0 | 5 | 9 | 5 | 9 | 11 | 10 | 9 | 10 | 5 | 2 | 10 | 5 |
| 894 | 3 | 11 | 7 | 9 | 2 | 7 | 6 | 10 | 0 | 5 | 0 | 9 | 2 | 4 |
| 895 | 7 | 1 | 1 | 4 | 8 | 2 | 5 | 11 | 2 | 1 | 10 | 9 | 2 | 1 |
| 896 | 8 | 10 | 11 | 5 | 10 | 9 | 1 | 9 | 6 | 6 | 10 | 5 | 1 | 0 |
| 897 | 4 | 9 | 1 | 0 | 11 | 8 | 4 | 8 | 8 | 3 | 6 | 7 | 0 | 10 |
| 898 | 8 | 6 | 5 | 8 | 7 | 3 | 8 | 7 | 2 | 8 | 10 | 1 | 7 | 0 |
| 899 | 3 | 0 | 10 | 11 | 4 | 9 | 0 | 0 | 1 | 2 | 4 | 5 | 7 | 6 |
| 900 | 10 | 0 | 4 | 8 | 1 | 6 | 10 | 2 | 6 | 2 | 3 | 1 | 3 | 8 |
| 901 | 2 | 5 | 4 | 8 | 10 | 9 | 6 | 7 | 10 | 2 | 11 | 3 | 4 | 7 |
| 902 | 7 | 2 | 1 | 5 | 7 | 8 | 9 | 1 | 11 | 4 | 3 | 3 | 1 | 5 |
| 903 | 11 | 3 | 5 | 4 | 9 | 6 | 2 | 2 | 9 | 1 | 2 | 1 | 1 | 6 |
| 904 | 9 | 8 | 8 | 3 | 3 | 2 | 1 | 11 | 8 | 2 | 0 | 8 | 7 | 4 |
| 905 | 0 | 2 | 5 | 6 | 6 | 0 | 10 | 9 | 7 | 7 | 1 | 3 | 1 | 7 |
| 906 | 7 | 7 | 0 | 3 | 11 | 7 | 10 | 2 | 7 | 7 | 0 | 10 | 0 | 1 |
| 907 | 7 | 8 | 0 | 7 | 7 | 0 | 4 | 1 | 0 | 9 | 4 | 7 | 10 | 6 |
| 908 | 11 | 0 | 6 | 9 | 1 | 9 | 3 | 1 | 10 | 8 | 8 | 1 | 1 | 7 |
| 909 | 2 | 4 | 8 | 3 | 6 | 7 | 1 | 0 | 6 | 1 | 11 | 4 | 1 | 9 |
| 910 | 6 | 2 | 11 | 1 | 11 | 7 | 4 | 3 | 3 | 6 | 3 | 7 | 4 | 8 |
| 911 | 1 | 0 | 7 | 11 | 2 | 3 | 5 | 8 | 1 | 10 | 6 | 3 | 5 | 0 |
| 912 | 3 | 11 | 8 | 9 | 10 | 11 | 5 | 9 | 9 | 6 | 7 | 4 | 3 | 1 |
| 913 | 1 | 5 | 10 | 0 | 8 | 0 | 8 | 2 | 10 | 0 | 1 | 4 | 6 | 4 |
| 914 | 10 | 4 | 4 | 2 | 4 | 8 | 4 | 11 | 1 | 11 | 2 | 4 | 0 | 7 |
| 915 | 6 | 8 | 6 | 5 | 9 | 5 | 3 | 9 | 2 | 1 | 6 | 3 | 8 | 2 |
| 916 | 2 | 4 | 7 | 11 | 10 | 1 | 7 | 10 | 4 | 6 | 3 | 2 | 11 | 3 |
| 917 | 9 | 7 | 10 | 10 | 10 | 4 | 8 | 3 | 0 | 8 | 11 | 11 | 2 | 1 |
| 918 | 1 | 9 | 9 | 5 | 10 | 6 | 0 | 6 | 5 | 2 | 4 | 9 | 9 | 7 |
| 919 | 9 | 11 | 10 | 8 | 3 | 5 | 0 | 7 | 3 | 7 | 1 | 0 | 0 | 4 |
| 920 | 1 | 8 | 5 | 3 | 8 | 10 | 5 | 2 | 0 | 7 | 9 | 11 | 2 | 0 |
| 921 | 9 | 9 | 1 | 3 | 5 | 4 | 2 | 0 | 2 | 3 | 7 | 1 | 11 | 1 |
| 922 | 7 | 2 | 2 | 8 | 5 | 7 | 5 | 11 | 5 | 3 | 3 | 2 | 8 | 7 |
| 923 | 0 | 11 | 5 | 0 | 3 | 2 | 4 | 3 | 9 | 6 | 4 | 2 | 9 | 11 |
| 924 | 3 | 9 | 0 | 3 | 3 | 11 | 10 | 0 | 8 | 5 | 8 | 2 | 1 | 5 |
| 925 | 10 | 8 | 11 | 4 | 6 | 8 | 3 | 9 | 0 | 4 | 2 | 10 | 1 | 8 |
| 926 | 11 | 10 | 5 | 7 | 11 | 10 | 7 | 4 | 1 | 7 | 6 | 3 | 4 | 1 |
| 927 | 3 | 8 | 11 | 6 | 3 | 3 | 1 | 1 | 3 | 1 | 8 | 11 | 5 | 3 |
| 928 | 0 | 10 | 3 | 3 | 3 | 1 | 1 | 10 | 11 | 0 | 9 | 1 | 2 | 10 |
| 929 | 6 | 0 | 7 | 0 | 10 | 11 | 8 | 10 | 8 | 3 | 9 | 9 | 9 | 9 |
| 930 | 3 | 4 | 7 | 8 | 0 | 6 | 6 | 11 | 6 | 4 | 7 | 2 | 1 | 10 |
| 931 | 8 | 6 | 4 | 4 | 6 | 6 | 5 | 4 | 3 | 4 | 6 | 7 | 9 | 10 |
| 932 | 5 | 3 | 8 | 8 | 1 | 5 | 5 | 1 | 0 | 11 | 11 | 11 | 6 | 6 |
| 933 | 7 | 3 | 0 | 9 | 2 | 9 | 8 | 8 | 11 | 8 | 1 | 2 | 7 | 6 |
| 934 | 6 | 7 | 5 | 3 | 2 | 4 | 6 | 2 | 1 | 3 | 1 | 6 | 5 | 4 |
| 935 | 5 | 10 | 4 | 6 | 5 | 10 | 8 | 6 | 1 | 11 | 5 | 9 | 3 | 0 |
| 936 | 6 | 2 | 1 | 7 | 7 | 1 | 11 | 2 | 10 | 9 | 10 | 11 | 9 | 7 |
| 937 | 8 | 8 | 0 | 4 | 7 | 1 | 5 | 0 | 6 | 6 | 1 | 1 | 6 | 3 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 938 | 3 | 5 | 4 | 11 | 9 | 8 | 10 | 6 | 6 | 8 | 11 | 8 | 10 | 11 |
| 939 | 10 | 5 | 11 | 8 | 8 | 7 | 11 | 4 | 8 | 0 | 10 | 0 | 11 | 10 |
| 940 | 0 | 4 | 9 | 4 | 6 | 7 | 10 | 8 | 4 | 2 | 2 | 9 | 10 | 11 |
| 941 | 0 | 10 | 0 | 6 | 1 | 11 | 5 | 2 | 3 | 8 | 3 | 8 | 11 | 6 |
| 942 | 3 | 6 | 8 | 3 | 7 | 11 | 4 | 10 | 7 | 10 | 2 | 5 | 2 | 7 |
| 943 | 7 | 8 | 2 | 2 | 0 | 5 | 9 | 6 | 9 | 2 | 3 | 11 | 0 | 9 |
| 944 | 7 | 9 | 8 | 1 | 4 | 7 | 8 | 2 | 9 | 10 | 4 | 6 | 9 | 4 |
| 945 | 5 | 11 | 5 | 6 | 3 | 0 | 3 | 4 | 11 | 10 | 7 | 4 | 2 | 4 |
| 946 | 0 | 9 | 10 | 8 | 11 | 7 | 9 | 1 | 2 | 4 | 6 | 9 | 11 | 4 |
| 947 | 4 | 1 | 0 | 4 | 2 | 3 | 8 | 0 | 3 | 5 | 11 | 6 | 10 | 4 |
| 948 | 1 | 2 | 5 | 8 | 5 | 11 | 6 | 5 | 2 | 5 | 2 | 9 | 4 | 11 |
| 949 | 8 | 5 | 7 | 11 | 9 | 9 | 8 | 5 | 5 | 11 | 8 | 10 | 2 | 0 |
| 950 | 8 | 7 | 8 | 6 | 0 | 10 | 8 | 8 | 7 | 4 | 7 | 10 | 9 | 7 |
| 951 | 1 | 1 | 6 | 11 | 1 | 5 | 11 | 4 | 8 | 3 | 4 | 7 | 10 | 8 |
| 952 | 4 | 7 | 3 | 4 | 7 | 2 | 4 | 5 | 6 | 4 | 8 | 11 | 2 | 6 |
| 953 | 5 | 6 | 0 | 9 | 10 | 1 | 6 | 11 | 2 | 4 | 11 | 4 | 8 | 8 |
| 954 | 6 | 10 | 10 | 4 | 1 | 11 | 0 | 11 | 8 | 11 | 0 | 5 | 1 | 1 |
| 955 | 2 | 10 | 0 | 2 | 1 | 6 | 7 | 1 | 5 | 7 | 0 | 1 | 10 | 10 |
| 956 | 9 | 10 | 2 | 6 | 9 | 11 | 7 | 10 | 8 | 5 | 4 | 4 | 0 | 10 |
| 957 | 3 | 7 | 11 | 9 | 7 | 8 | 0 | 4 | 10 | 3 | 2 | 7 | 4 | 6 |
| 958 | 1 | 9 | 7 | 5 | 11 | 3 | 7 | 7 | 11 | 0 | 3 | 4 | 3 | 11 |
| 959 | 5 | 7 | 4 | 2 | 9 | 3 | 1 | 5 | 8 | 6 | 6 | 2 | 3 | 7 |
| 960 | 3 | 5 | 2 | 11 | 8 | 5 | 5 | 3 | 11 | 0 | 9 | 2 | 9 | 1 |
| 961 | 11 | 5 | 1 | 10 | 4 | 3 | 3 | 3 | 8 | 2 | 3 | 2 | 2 | 4 |
| 962 | 10 | 0 | 11 | 10 | 4 | 7 | 2 | 6 | 11 | 7 | 9 | 11 | 4 | 3 |
| 963 | 7 | 5 | 7 | 0 | 6 | 10 | 2 | 8 | 4 | 10 | 11 | 11 | 8 | 10 |
| 964 | 6 | 9 | 4 | 9 | 3 | 3 | 3 | 11 | 4 | 3 | 0 | 1 | 4 | 11 |
| 965 | 2 | 10 | 11 | 9 | 3 | 7 | 1 | 5 | 5 | 8 | 1 | 10 | 9 | 5 |
| 966 | 4 | 1 | 6 | 9 | 5 | 10 | 8 | 2 | 6 | 3 | 0 | 10 | 11 | 5 |
| 967 | 4 | 9 | 8 | 4 | 8 | 7 | 0 | 9 | 1 | 5 | 7 | 9 | 7 | 9 |
| 968 | 11 | 2 | 3 | 0 | 8 | 9 | 5 | 3 | 5 | 9 | 8 | 8 | 7 | 10 |
| 969 | 0 | 5 | 2 | 8 | 1 | 8 | 11 | 8 | 9 | 7 | 4 | 9 | 2 | 6 |
| 970 | 11 | 7 | 2 | 0 | 1 | 10 | 1 | 6 | 6 | 8 | 7 | 2 | 11 | 2 |
| 971 | 11 | 11 | 2 | 1 | 2 | 5 | 11 | 8 | 5 | 2 | 10 | 0 | 9 | 11 |
| 972 | 0 | 6 | 10 | 2 | 8 | 4 | 7 | 11 | 6 | 10 | 10 | 0 | 7 | 4 |
| 973 | 7 | 4 | 1 | 11 | 9 | 6 | 0 | 1 | 4 | 9 | 6 | 4 | 9 | 1 |
| 974 | 11 | 8 | 8 | 11 | 7 | 6 | 11 | 4 | 1 | 11 | 0 | 6 | 8 | 5 |
| 975 | 1 | 1 | 1 | 1 | 10 | 6 | 3 | 5 | 1 | 4 | 3 | 8 | 7 | 3 |
| 976 | 2 | 6 | 7 | 2 | 1 | 0 | 1 | 9 | 2 | 6 | 1 | 7 | 6 | 11 |
| 977 | 9 | 4 | 0 | 7 | 4 | 11 | 11 | 2 | 6 | 3 | 1 | 0 | 2 | 2 |
| 978 | 5 | 1 | 8 | 7 | 2 | 0 | 8 | 1 | 6 | 7 | 3 | 0 | 9 | 3 |
| 979 | 10 | 9 | 9 | 2 | 2 | 0 | 7 | 6 | 6 | 9 | 9 | 10 | 8 | 11 |
| 980 | 8 | 5 | 1 | 8 | 5 | 10 | 7 | 9 | 11 | 8 | 4 | 5 | 8 | 5 |
| 981 | 5 | 2 | 1 | 8 | 4 | 0 | 8 | 10 | 0 | 10 | 10 | 3 | 0 | 10 |
| 982 | 4 | 0 | 10 | 1 | 7 | 8 | 6 | 8 | 4 | 10 | 4 | 2 | 6 | 3 |
| 983 | 10 | 6 | 2 | 9 | 11 | 5 | 6 | 0 | 4 | 9 | 4 | 3 | 11 | 2 |
| 984 | 1 | 2 | 7 | 3 | 10 | 0 | 11 | 7 | 5 | 1 | 9 | 8 | 8 | 2 |
| 985 | 2 | 1 | 0 | 1 | 3 | 8 | 0 | 2 | 6 | 2 | 8 | 6 | 8 | 11 |
| 986 | 7 | 7 | 1 | 2 | 4 | 7 | 6 | 7 | 3 | 6 | 8 | 4 | 6 | 0 |
| 987 | 7 | 6 | 11 | 2 | 3 | 1 | 2 | 2 | 5 | 11 | 7 | 8 | 10 | 8 |
| 988 | 7 | 3 | 9 | 4 | 6 | 4 | 9 | 5 | 5 | 8 | 9 | 11 | 3 | 3 |
| 989 | 2 | 0 | 1 | 2 | 5 | 11 | 4 | 5 | 7 | 4 | 5 | 1 | 0 | 0 |
| 990 | 3 | 1 | 1 | 5 | 10 | 0 | 5 | 0 | 0 | 7 | 4 | 1 | 4 | 11 |
| 991 | 2 | 4 | 0 | 7 | 1 | 4 | 5 | 6 | 2 | 10 | 9 | 11 | 7 | 7 |
| 992 | 10 | 3 | 2 | 1 | 5 | 8 | 2 | 10 | 8 | 8 | 11 | 6 | 3 | 5 |
| 993 | 8 | 5 | 8 | 2 | 3 | 10 | 9 | 5 | 3 | 5 | 5 | 3 | 3 | 10 |
| 994 | 6 | 4 | 2 | 3 | 10 | 11 | 2 | 3 | 11 | 10 | 3 | 6 | 0 | 11 |
| 995 | 8 | 4 | 3 | 7 | 9 | 6 | 10 | 7 | 11 | 5 | 2 | 11 | 3 | 5 |
| 996 | 4 | 9 | 1 | 6 | 6 | 9 | 5 | 10 | 0 | 8 | 0 | 4 | 6 | 8 |
| 997 | 11 | 1 | 4 | 0 | 4 | 7 | 10 | 1 | 10 | 5 | 5 | 11 | 7 | 8 |
| 998 | 6 | 11 | 4 | 11 | 2 | 3 | 9 | 0 | 2 | 0 | 9 | 9 | 7 | 10 |
| 999 | 10 | 2 | 9 | 0 | 3 | 3 | 2 | 4 | 10 | 3 | 3 | 10 | 5 | 2 |
| 1000 | 5 | 6 | 9 | 0 | 1 | 7 | 0 | 4 | 9 | 10 | 0 | 0 | 0 | 3 |
| 1001 | 4 | 1 | 7 | 5 | 3 | 1 | 7 | 0 | 8 | 11 | 5 | 3 | 9 | 0 |
| 1002 | 5 | 7 | 11 | 11 | 11 | 10 | 2 | 6 | 7 | 0 | 8 | 4 | 1 | 5 |
| 1003 | 3 | 8 | 5 | 10 | 4 | 10 | 11 | 6 | 9 | 0 | 2 | 8 | 5 | 10 |
| 1004 | 2 | 10 | 1 | 1 | 6 | 5 | 1 | 3 | 8 | 10 | 10 | 9 | 8 | 8 |
| 1005 | 8 | 2 | 6 | 6 | 8 | 5 | 9 | 0 | 2 | 7 | 7 | 6 | 5 | 0 |
| 1006 | 0 | 3 | 4 | 10 | 0 | 4 | 2 | 7 | 2 | 5 | 3 | 10 | 10 | 11 |
| 1007 | 5 | 4 | 3 | 5 | 3 | 3 | 6 | 8 | 4 | 1 | 3 | 7 | 2 | 0 |
| 1008 | 1 | 3 | 4 | 8 | 0 | 10 | 0 | 5 | 11 | 11 | 7 | 7 | 7 | 8 |
| 1009 | 6 | 11 | 6 | 4 | 8 | 9 | 4 | 7 | 4 | 0 | 5 | 4 | 1 | 6 |
| 1010 | 10 | 3 | 10 | 3 | 6 | 0 | 6 | 11 | 10 | 8 | 6 | 8 | 1 | 6 |
| 1011 | 10 | 10 | 3 | 0 | 1 | 4 | 6 | 3 | 4 | 5 | 7 | 11 | 4 | 9 |
| 1012 | 4 | 3 | 2 | 11 | 2 | 7 | 11 | 2 | 0 | 6 | 9 | 10 | 6 | 9 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1013 | 9 | 1 | 3 | 1 | 0 | 9 | 11 | 0 | 11 | 6 | 4 | 2 | 2 | 7 |
| 1014 | 0 | 10 | 8 | 1 | 7 | 1 | 10 | 6 | 5 | 7 | 8 | 5 | 11 | 3 |
| 1015 | 5 | 5 | 11 | 2 | 10 | 7 | 10 | 7 | 4 | 4 | 4 | 5 | 0 | 4 |
| 1016 | 8 | 7 | 7 | 10 | 4 | 5 | 2 | 5 | 9 | 3 | 6 | 1 | 10 | 2 |
| 1017 | 0 | 0 | 11 | 11 | 11 | 6 | 1 | 9 | 9 | 5 | 1 | 6 | 5 | 10 |
| 1018 | 2 | 2 | 9 | 10 | 11 | 11 | 3 | 1 | 10 | 2 | 9 | 8 | 11 | 10 |
| 1019 | 4 | 5 | 6 | 3 | 3 | 4 | 5 | 7 | 6 | 1 | 1 | 2 | 7 | 8 |
| 1020 | 6 | 6 | 4 | 8 | 7 | 4 | 10 | 5 | 9 | 5 | 11 | 5 | 8 | 9 |
| 1021 | 0 | 7 | 0 | 9 | 8 | 10 | 11 | 11 | 10 | 6 | 8 | 11 | 5 | 9 |
| 1022 | 3 | 6 | 11 | 1 | 6 | 0 | 9 | 7 | 6 | 2 | 11 | 9 | 7 | 1 |
| 1023 | 3 | 1 | 9 | 9 | 7 | 4 | 4 | 11 | 1 | 5 | 9 | 8 | 6 | 1 |
| 1024 | 9 | 4 | 6 | 11 | 2 | 2 | 4 | 9 | 0 | 0 | 9 | 9 | 6 | 11 |
| 1025 | 8 | 5 | 7 | 10 | 6 | 3 | 2 | 2 | 8 | 1 | 7 | 1 | 11 | 1 |
| 1026 | 2 | 8 | 9 | 7 | 8 | 4 | 3 | 0 | 11 | 9 | 6 | 5 | 9 | 2 |
| 1027 | 4 | 1 | 10 | 1 | 4 | 0 | 7 | 3 | 1 | 6 | 8 | 6 | 5 | 8 |
| 1028 | 2 | 2 | 0 | 9 | 7 | 11 | 5 | 11 | 7 | 7 | 0 | 1 | 0 | 8 |
| 1029 | 11 | 7 | 8 | 0 | 7 | 6 | 11 | 3 | 2 | 10 | 7 | 0 | 1 | 10 |
| 1030 | 0 | 4 | 11 | 7 | 5 | 3 | 0 | 10 | 6 | 4 | 1 | 4 | 10 | 10 |
| 1031 | 3 | 6 | 8 | 5 | 5 | 1 | 6 | 9 | 4 | 5 | 10 | 11 | 8 | 1 |
| 1032 | 10 | 10 | 9 | 3 | 9 | 9 | 0 | 4 | 0 | 3 | 0 | 10 | 7 | 7 |
| 1033 | 0 | 7 | 6 | 9 | 8 | 1 | 1 | 6 | 9 | 8 | 3 | 2 | 2 | 6 |
| 1034 | 4 | 1 | 4 | 8 | 0 | 3 | 9 | 4 | 5 | 3 | 3 | 1 | 2 | 0 |
| 1035 | 7 | 4 | 2 | 3 | 4 | 7 | 4 | 4 | 8 | 7 | 10 | 2 | 10 | 1 |
| 1036 | 9 | 3 | 8 | 7 | 4 | 9 | 3 | 5 | 10 | 1 | 9 | 2 | 3 | 10 |
| 1037 | 7 | 9 | 5 | 1 | 2 | 0 | 9 | 5 | 4 | 1 | 2 | 0 | 8 | 4 |
| 1038 | 3 | 11 | 4 | 7 | 3 | 6 | 9 | 1 | 6 | 2 | 0 | 11 | 6 | 8 |
| 1039 | 5 | 2 | 10 | 5 | 1 | 3 | 9 | 5 | 3 | 8 | 1 | 2 | 6 | 11 |
| 1040 | 6 | 3 | 11 | 4 | 11 | 0 | 5 | 2 | 9 | 9 | 1 | 11 | 3 | 1 |
| 1041 | 2 | 8 | 1 | 3 | 11 | 5 | 2 | 6 | 4 | 10 | 9 | 8 | 3 | 11 |
| 1042 | 5 | 0 | 0 | 10 | 3 | 4 | 1 | 6 | 1 | 1 | 4 | 7 | 10 | 2 |
| 1043 | 2 | 11 | 11 | 2 | 5 | 4 | 6 | 5 | 3 | 7 | 3 | 0 | 5 | 0 |
| 1044 | 7 | 8 | 1 | 8 | 1 | 2 | 6 | 3 | 3 | 3 | 5 | 5 | 10 | 7 |
| 1045 | 11 | 8 | 6 | 11 | 3 | 9 | 8 | 8 | 5 | 5 | 3 | 8 | 1 | 4 |
| 1046 | 0 | 2 | 7 | 2 | 9 | 8 | 7 | 4 | 6 | 11 | 10 | 8 | 2 | 3 |
| 1047 | 6 | 10 | 2 | 6 | 0 | 6 | 6 | 10 | 1 | 1 | 9 | 9 | 7 | 1 |
| 1048 | 6 | 9 | 6 | 5 | 6 | 11 | 4 | 0 | 6 | 6 | 7 | 5 | 2 | 8 |
| 1049 | 3 | 9 | 2 | 7 | 8 | 10 | 4 | 7 | 0 | 4 | 5 | 1 | 1 | 4 |
| 1050 | 5 | 11 | 8 | 10 | 5 | 7 | 2 | 8 | 10 | 0 | 1 | 6 | 4 | 4 |
| 1051 | 3 | 4 | 6 | 0 | 9 | 3 | 8 | 2 | 10 | 11 | 11 | 2 | 8 | 0 |
| 1052 | 6 | 6 | 5 | 10 | 9 | 5 | 10 | 10 | 0 | 10 | 5 | 11 | 11 | 10 |
| 1053 | 4 | 4 | 1 | 4 | 1 | 11 | 7 | 0 | 0 | 1 | 2 | 3 | 4 | 9 |
| 1054 | 10 | 1 | 5 | 6 | 11 | 6 | 3 | 3 | 7 | 8 | 6 | 2 | 8 | 7 |
| 1055 | 2 | 5 | 3 | 1 | 2 | 1 | 8 | 7 | 2 | 11 | 3 | 7 | 6 | 10 |
| 1056 | 5 | 8 | 2 | 6 | 4 | 11 | 3 | 2 | 2 | 10 | 11 | 4 | 0 | 6 |
| 1057 | 1 | 10 | 7 | 0 | 11 | 5 | 6 | 1 | 5 | 3 | 11 | 0 | 9 | 3 |
| 1058 | 3 | 0 | 3 | 2 | 7 | 5 | 3 | 4 | 8 | 5 | 11 | 5 | 1 | 8 |
| 1059 | 9 | 6 | 10 | 7 | 6 | 2 | 9 | 10 | 7 | 6 | 2 | 7 | 1 | 7 |
| 1060 | 1 | 7 | 6 | 7 | 1 | 1 | 2 | 1 | 0 | 7 | 0 | 4 | 4 | 7 |
| 1061 | 6 | 10 | 8 | 8 | 6 | 4 | 7 | 9 | 8 | 11 | 10 | 7 | 4 | 8 |
| 1062 | 9 | 7 | 0 | 6 | 1 | 2 | 3 | 7 | 10 | 4 | 7 | 0 | 4 | 11 |
| 1063 | 10 | 2 | 11 | 2 | 0 | 0 | 3 | 6 | 9 | 6 | 3 | 4 | 10 | 11 |
| 1064 | 7 | 1 | 11 | 0 | 8 | 0 | 11 | 11 | 0 | 7 | 8 | 5 | 3 | 9 |
| 1065 | 5 | 6 | 3 | 0 | 9 | 1 | 11 | 2 | 5 | 9 | 0 | 1 | 10 | 1 |
| 1066 | 5 | 1 | 9 | 10 | 11 | 3 | 4 | 9 | 3 | 5 | 5 | 9 | 10 | 10 |
| 1067 | 5 | 1 | 1 | 4 | 6 | 2 | 2 | 0 | 1 | 8 | 1 | 1 | 10 | 3 |
| 1068 | 8 | 11 | 0 | 2 | 2 | 11 | 11 | 9 | 9 | 9 | 0 | 7 | 9 | 11 |
| 1069 | 1 | 11 | 11 | 1 | 10 | 2 | 10 | 5 | 10 | 6 | 11 | 2 | 6 | 6 |
| 1070 | 7 | 2 | 8 | 3 | 6 | 10 | 5 | 7 | 10 | 10 | 9 | 9 | 5 | 9 |
| 1071 | 2 | 5 | 9 | 11 | 0 | 7 | 11 | 10 | 11 | 0 | 4 | 7 | 5 | 3 |
| 1072 | 4 | 0 | 8 | 11 | 8 | 1 | 9 | 3 | 7 | 2 | 8 | 8 | 4 | 4 |
| 1073 | 8 | 11 | 11 | 2 | 7 | 7 | 1 | 2 | 6 | 10 | 6 | 6 | 1 | 5 |
| 1074 | 8 | 8 | 2 | 4 | 0 | 8 | 6 | 11 | 4 | 0 | 3 | 1 | 8 | 10 |
| 1075 | 7 | 10 | 3 | 0 | 9 | 11 | 4 | 0 | 1 | 3 | 4 | 8 | 1 | 0 |
| 1076 | 3 | 10 | 8 | 7 | 7 | 8 | 8 | 1 | 4 | 10 | 1 | 3 | 2 | 2 |
| 1077 | 7 | 2 | 10 | 7 | 9 | 6 | 11 | 4 | 7 | 10 | 5 | 1 | 8 | 5 |
| 1078 | 3 | 11 | 11 | 3 | 7 | 4 | 5 | 10 | 9 | 8 | 10 | 10 | 7 | 3 |
| 1079 | 4 | 5 | 6 | 5 | 0 | 10 | 3 | 4 | 0 | 6 | 1 | 6 | 8 | 9 |
| 1080 | 3 | 11 | 10 | 1 | 10 | 11 | 2 | 3 | 5 | 11 | 7 | 0 | 8 | 2 |
| 1081 | 3 | 7 | 2 | 2 | 8 | 2 | 0 | 1 | 6 | 3 | 9 | 7 | 10 | 3 |
| 1082 | 8 | 3 | 8 | 8 | 10 | 1 | 10 | 10 | 7 | 11 | 0 | 1 | 1 | 0 |
| 1083 | 0 | 5 | 4 | 8 | 5 | 1 | 5 | 5 | 8 | 9 | 8 | 11 | 6 | 3 |
| 1084 | 0 | 8 | 8 | 3 | 4 | 1 | 7 | 2 | 9 | 1 | 5 | 3 | 8 | 3 |
| 1085 | 0 | 3 | 8 | 11 | 10 | 8 | 9 | 9 | 3 | 0 | 6 | 0 | 7 | 3 |
| 1086 | 10 | 9 | 8 | 4 | 6 | 7 | 11 | 4 | 8 | 6 | 1 | 3 | 6 | 5 |
| 1087 | 9 | 10 | 3 | 1 | 4 | 0 | 9 | 8 | 7 | 10 | 3 | 8 | 2 | 3 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1088 | 10 | 11 | 9 | 5 | 3 | 10 | 9 | 9 | 7 | 7 | 2 | 5 | 9 | 4 |
| 1089 | 9 | 4 | 5 | 6 | 8 | 9 | 1 | 11 | 2 | 5 | 6 | 5 | 6 | 6 |
| 1090 | 6 | 2 | 3 | 1 | 10 | 3 | 8 | 5 | 11 | 4 | 2 | 3 | 3 | 7 |
| 1091 | 0 | 9 | 5 | 10 | 8 | 2 | 8 | 2 | 2 | 3 | 10 | 8 | 8 | 7 |
| 1092 | 1 | 3 | 4 | 1 | 5 | 4 | 9 | 4 | 11 | 8 | 0 | 3 | 10 | 10 |
| 1093 | 0 | 3 | 3 | 5 | 11 | 5 | 0 | 7 | 6 | 1 | 8 | 9 | 6 | 8 |
| 1094 | 4 | 6 | 10 | 9 | 1 | 8 | 0 | 4 | 4 | 1 | 3 | 9 | 5 | 7 |
| 1095 | 6 | 0 | 4 | 3 | 11 | 0 | 6 | 10 | 4 | 7 | 6 | 6 | 4 | 8 |
| 1096 | 10 | 5 | 7 | 4 | 3 | 4 | 9 | 11 | 2 | 2 | 9 | 7 | 1 | 3 |
| 1097 | 7 | 1 | 5 | 5 | 3 | 9 | 10 | 6 | 7 | 1 | 1 | 4 | 11 | 5 |
| 1098 | 4 | 0 | 1 | 0 | 4 | 8 | 7 | 2 | 11 | 4 | 3 | 11 | 3 | 4 |
| 1099 | 2 | 6 | 2 | 6 | 7 | 5 | 1 | 3 | 5 | 6 | 10 | 1 | 3 | 3 |
| 1100 | 0 | 10 | 11 | 8 | 8 | 6 | 5 | 6 | 4 | 5 | 7 | 7 | 8 | 10 |
| 1101 | 4 | 2 | 4 | 2 | 8 | 3 | 6 | 1 | 8 | 2 | 4 | 5 | 9 | 9 |
| 1102 | 4 | 7 | 5 | 9 | 2 | 10 | 9 | 10 | 8 | 3 | 5 | 3 | 4 | 1 |
| 1103 | 8 | 0 | 10 | 6 | 7 | 6 | 8 | 7 | 11 | 0 | 7 | 7 | 2 | 8 |
| 1104 | 1 | 4 | 6 | 8 | 10 | 10 | 7 | 11 | 5 | 10 | 7 | 1 | 4 | 1 |
| 1105 | 2 | 9 | 4 | 11 | 4 | 11 | 8 | 0 | 10 | 5 | 0 | 2 | 5 | 6 |
| 1106 | 9 | 0 | 3 | 1 | 3 | 11 | 5 | 4 | 5 | 0 | 5 | 11 | 0 | 6 |
| 1107 | 6 | 9 | 5 | 3 | 10 | 6 | 2 | 8 | 8 | 8 | 1 | 11 | 1 | 8 |
| 1108 | 0 | 1 | 6 | 9 | 6 | 4 | 2 | 8 | 11 | 2 | 7 | 10 | 1 | 11 |
| 1109 | 11 | 10 | 11 | 0 | 5 | 7 | 4 | 11 | 9 | 0 | 2 | 4 | 5 | 1 |
| 1110 | 6 | 0 | 5 | 4 | 11 | 4 | 10 | 7 | 11 | 1 | 3 | 0 | 7 | 6 |
| 1111 | 9 | 8 | 3 | 1 | 11 | 8 | 2 | 11 | 1 | 7 | 8 | 3 | 11 | 0 |
| 1112 | 3 | 6 | 7 | 2 | 3 | 11 | 0 | 9 | 1 | 10 | 7 | 9 | 11 | 0 |
| 1113 | 4 | 4 | 9 | 7 | 1 | 1 | 11 | 5 | 4 | 8 | 11 | 10 | 1 | 10 |
| 1114 | 8 | 11 | 5 | 0 | 1 | 4 | 5 | 0 | 5 | 5 | 8 | 1 | 0 | 10 |
| 1115 | 5 | 9 | 1 | 0 | 1 | 6 | 9 | 6 | 8 | 9 | 7 | 10 | 4 | 4 |
| 1116 | 2 | 7 | 10 | 7 | 10 | 1 | 5 | 2 | 5 | 1 | 8 | 6 | 2 | 5 |
| 1117 | 11 | 5 | 8 | 1 | 4 | 4 | 10 | 4 | 10 | 5 | 4 | 4 | 9 | 3 |
| 1118 | 5 | 8 | 2 | 9 | 6 | 3 | 1 | 4 | 9 | 4 | 10 | 9 | 6 | 0 |
| 1119 | 5 | 2 | 4 | 4 | 4 | 6 | 3 | 9 | 1 | 0 | 6 | 3 | 4 | 2 |
| 1120 | 7 | 11 | 9 | 4 | 5 | 11 | 2 | 1 | 0 | 5 | 11 | 9 | 6 | 5 |
| 1121 | 9 | 1 | 7 | 4 | 8 | 2 | 7 | 5 | 0 | 9 | 7 | 8 | 0 | 4 |
| 1122 | 0 | 0 | 0 | 5 | 1 | 0 | 8 | 0 | 5 | 8 | 3 | 6 | 5 | 2 |
| 1123 | 0 | 5 | 3 | 2 | 4 | 3 | 11 | 0 | 2 | 0 | 1 | 6 | 9 | 0 |
| 1124 | 9 | 0 | 9 | 11 | 0 | 10 | 0 | 8 | 6 | 11 | 0 | 8 | 11 | 2 |
| 1125 | 9 | 3 | 4 | 5 | 10 | 11 | 11 | 8 | 9 | 8 | 2 | 1 | 7 | 1 |
| 1126 | 2 | 8 | 5 | 4 | 1 | 5 | 5 | 1 | 6 | 2 | 4 | 7 | 11 | 4 |
| 1127 | 3 | 2 | 3 | 9 | 11 | 6 | 9 | 3 | 11 | 6 | 8 | 7 | 7 | 2 |
| 1128 | 2 | 4 | 1 | 7 | 0 | 2 | 1 | 6 | 10 | 3 | 4 | 4 | 11 | 9 |
| 1129 | 5 | 5 | 0 | 1 | 9 | 9 | 8 | 3 | 5 | 2 | 9 | 3 | 0 | 8 |
| 1130 | 2 | 5 | 7 | 1 | 8 | 6 | 6 | 2 | 0 | 8 | 1 | 9 | 2 | 3 |
| 1131 | 3 | 2 | 0 | 8 | 6 | 8 | 9 | 10 | 6 | 8 | 11 | 5 | 4 | 5 |
| 1132 | 10 | 7 | 3 | 10 | 3 | 10 | 11 | 7 | 9 | 0 | 8 | 4 | 2 | 7 |
| 1133 | 1 | 6 | 9 | 7 | 10 | 2 | 4 | 1 | 3 | 2 | 1 | 1 | 5 | 0 |
| 1134 | 2 | 2 | 5 | 10 | 10 | 2 | 5 | 7 | 4 | 0 | 3 | 2 | 9 | 11 |
| 1135 | 8 | 1 | 6 | 0 | 2 | 3 | 0 | 0 | 3 | 1 | 1 | 10 | 2 | 9 |
| 1136 | 2 | 10 | 0 | 0 | 1 | 5 | 4 | 8 | 11 | 10 | 0 | 5 | 8 | 6 |
| 1137 | 7 | 2 | 2 | 7 | 2 | 1 | 2 | 10 | 3 | 8 | 8 | 7 | 5 | 4 |
| 1138 | 1 | 2 | 6 | 11 | 6 | 11 | 10 | 1 | 9 | 3 | 9 | 6 | 8 | 5 |
| 1139 | 0 | 4 | 8 | 4 | 3 | 6 | 4 | 2 | 5 | 10 | 8 | 4 | 5 | 0 |
| 1140 | 8 | 2 | 2 | 9 | 9 | 3 | 7 | 1 | 2 | 6 | 5 | 2 | 11 | 4 |
| 1141 | 4 | 11 | 3 | 9 | 8 | 2 | 3 | 6 | 11 | 11 | 11 | 11 | 11 | 1 |
| 1142 | 1 | 7 | 1 | 10 | 11 | 9 | 1 | 4 | 8 | 4 | 6 | 10 | 2 | 9 |
| 1143 | 0 | 6 | 9 | 5 | 11 | 0 | 5 | 5 | 4 | 6 | 5 | 1 | 9 | 5 |
| 1144 | 6 | 4 | 9 | 11 | 7 | 9 | 6 | 7 | 1 | 3 | 7 | 1 | 1 | 6 |
| 1145 | 5 | 10 | 3 | 7 | 2 | 11 | 7 | 11 | 8 | 6 | 8 | 5 | 9 | 6 |
| 1146 | 11 | 5 | 11 | 6 | 8 | 5 | 4 | 0 | 4 | 3 | 9 | 0 | 6 | 2 |
| 1147 | 4 | 9 | 6 | 2 | 10 | 5 | 10 | 10 | 1 | 7 | 9 | 10 | 10 | 4 |
| 1148 | 9 | 6 | 1 | 2 | 7 | 4 | 11 | 11 | 7 | 2 | 4 | 2 | 5 | 1 |
| 1149 | 1 | 1 | 11 | 8 | 6 | 7 | 9 | 9 | 0 | 5 | 6 | 8 | 9 | 7 |
| 1150 | 1 | 2 | 0 | 0 | 4 | 1 | 6 | 2 | 1 | 6 | 10 | 9 | 6 | 11 |
| 1151 | 11 | 6 | 1 | 4 | 0 | 10 | 6 | 8 | 8 | 3 | 8 | 0 | 7 | 5 |
| 1152 | 9 | 5 | 11 | 7 | 2 | 8 | 7 | 2 | 1 | 11 | 11 | 1 | 10 | 2 |
| 1153 | 8 | 8 | 6 | 1 | 7 | 7 | 0 | 8 | 8 | 7 | 5 | 4 | 8 | 8 |
| 1154 | 0 | 9 | 3 | 1 | 2 | 9 | 2 | 10 | 0 | 3 | 11 | 2 | 0 | 2 |
| 1155 | 4 | 3 | 5 | 1 | 5 | 5 | 4 | 7 | 8 | 6 | 7 | 11 | 9 | 2 |
| 1156 | 0 | 0 | 7 | 4 | 8 | 8 | 3 | 7 | 3 | 5 | 4 | 3 | 3 | 7 |
| 1157 | 0 | 5 | 10 | 0 | 6 | 0 | 2 | 7 | 9 | 11 | 9 | 11 | 10 | 0 |
| 1158 | 11 | 7 | 10 | 8 | 9 | 7 | 3 | 9 | 11 | 6 | 3 | 9 | 4 | 6 |
| 1159 | 7 | 5 | 7 | 5 | 2 | 2 | 10 | 0 | 9 | 2 | 8 | 2 | 8 | 2 |
| 1160 | 10 | 3 | 10 | 2 | 2 | 2 | 0 | 3 | 1 | 0 | 4 | 11 | 1 | 2 |
| 1161 | 11 | 5 | 8 | 0 | 3 | 5 | 7 | 1 | 3 | 11 | 1 | 2 | 7 | 5 |
| 1162 | 2 | 3 | 8 | 9 | 9 | 2 | 10 | 2 | 6 | 0 | 11 | 3 | 3 | 4 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1163 | 7 | 1 | 4 | 3 | 9 | 1 | 2 | 3 | 6 | 7 | 5 | 11 | 0 | 0 |
| 1164 | 3 | 6 | 8 | 1 | 2 | 8 | 3 | 11 | 5 | 9 | 4 | 8 | 6 | 4 |
| 1165 | 5 | 4 | 3 | 8 | 7 | 10 | 1 | 6 | 11 | 4 | 9 | 2 | 1 | 11 |
| 1166 | 10 | 6 | 9 | 6 | 3 | 3 | 11 | 8 | 6 | 10 | 10 | 6 | 5 | 8 |
| 1167 | 4 | 7 | 4 | 9 | 6 | 6 | 2 | 5 | 5 | 0 | 0 | 8 | 11 | 10 |
| 1168 | 11 | 1 | 8 | 10 | 6 | 0 | 11 | 0 | 9 | 3 | 0 | 2 | 0 | 8 |
| 1169 | 6 | 4 | 1 | 6 | 3 | 10 | 10 | 2 | 7 | 5 | 10 | 9 | 4 | 10 |
| 1170 | 11 | 5 | 6 | 6 | 5 | 2 | 0 | 7 | 6 | 2 | 0 | 3 | 2 | 0 |
| 1171 | 11 | 1 | 6 | 2 | 4 | 6 | 3 | 10 | 6 | 5 | 5 | 7 | 6 | 6 |
| 1172 | 9 | 3 | 7 | 3 | 7 | 11 | 4 | 6 | 11 | 11 | 4 | 5 | 9 | 10 |
| 1173 | 5 | 3 | 10 | 7 | 7 | 6 | 4 | 10 | 6 | 9 | 11 | 9 | 5 | 3 |
| 1174 | 0 | 1 | 2 | 5 | 10 | 7 | 4 | 11 | 1 | 2 | 4 | 6 | 9 | 4 |
| 1175 | 2 | 11 | 7 | 5 | 1 | 4 | 0 | 1 | 1 | 0 | 0 | 6 | 10 | 5 |
| 1176 | 0 | 10 | 1 | 11 | 7 | 0 | 9 | 2 | 8 | 2 | 1 | 7 | 11 | 9 |
| 1177 | 3 | 3 | 11 | 3 | 3 | 8 | 11 | 4 | 1 | 1 | 0 | 2 | 8 | 6 |
| 1178 | 8 | 9 | 4 | 9 | 7 | 3 | 10 | 8 | 9 | 5 | 1 | 0 | 4 | 2 |
| 1179 | 6 | 7 | 7 | 11 | 0 | 5 | 7 | 1 | 11 | 9 | 8 | 10 | 3 | 8 |
| 1180 | 1 | 3 | 6 | 8 | 11 | 7 | 6 | 10 | 1 | 2 | 5 | 11 | 0 | 9 |
| 1181 | 6 | 3 | 0 | 6 | 6 | 1 | 5 | 1 | 2 | 1 | 7 | 3 | 1 | 9 |
| 1182 | 9 | 10 | 7 | 7 | 6 | 9 | 2 | 3 | 2 | 9 | 3 | 11 | 4 | 2 |
| 1183 | 11 | 11 | 11 | 5 | 0 | 6 | 7 | 11 | 4 | 11 | 8 | 11 | 4 | 3 |
| 1184 | 5 | 10 | 11 | 9 | 8 | 10 | 3 | 8 | 5 | 1 | 10 | 3 | 1 | 5 |
| 1185 | 6 | 2 | 6 | 4 | 1 | 6 | 1 | 6 | 4 | 11 | 4 | 1 | 6 | 7 |
| 1186 | 6 | 9 | 7 | 11 | 5 | 7 | 5 | 9 | 6 | 3 | 11 | 11 | 11 | 11 |
| 1187 | 1 | 7 | 8 | 5 | 4 | 3 | 3 | 4 | 2 | 9 | 10 | 7 | 11 | 7 |
| 1188 | 6 | 11 | 9 | 9 | 7 | 6 | 10 | 3 | 3 | 1 | 6 | 8 | 5 | 9 |
| 1189 | 8 | 9 | 8 | 1 | 1 | 10 | 1 | 9 | 5 | 4 | 0 | 6 | 8 | 7 |
| 1190 | 4 | 1 | 9 | 9 | 4 | 5 | 5 | 9 | 11 | 10 | 9 | 3 | 0 | 0 |
| 1191 | 11 | 0 | 3 | 3 | 5 | 2 | 1 | 1 | 7 | 4 | 2 | 9 | 8 | 4 |
| 1192 | 1 | 5 | 1 | 1 | 8 | 1 | 3 | 0 | 3 | 0 | 0 | 10 | 11 | 11 |
| 1193 | 11 | 0 | 5 | 3 | 7 | 3 | 3 | 3 | 0 | 0 | 0 | 3 | 9 | 9 |
| 1194 | 0 | 11 | 2 | 10 | 1 | 11 | 11 | 7 | 10 | 5 | 6 | 8 | 11 | 1 |
| 1195 | 8 | 2 | 10 | 11 | 3 | 4 | 4 | 4 | 4 | 7 | 8 | 8 | 6 | 9 |
| 1196 | 8 | 11 | 9 | 4 | 9 | 7 | 7 | 9 | 10 | 8 | 9 | 11 | 2 | 1 |
| 1197 | 5 | 10 | 0 | 5 | 4 | 4 | 8 | 11 | 6 | 5 | 2 | 1 | 1 | 7 |
| 1198 | 7 | 2 | 9 | 2 | 10 | 4 | 1 | 3 | 7 | 5 | 0 | 11 | 7 | 3 |
| 1199 | 4 | 1 | 1 | 4 | 7 | 9 | 0 | 9 | 9 | 2 | 11 | 10 | 6 | 4 |
| 1200 | 3 | 10 | 4 | 10 | 2 | 5 | 11 | 6 | 2 | 11 | 6 | 1 | 5 | 11 |
| 1201 | 8 | 0 | 10 | 2 | 6 | 9 | 10 | 1 | 10 | 5 | 6 | 1 | 7 | 9 |
| 1202 | 3 | 11 | 7 | 8 | 5 | 5 | 7 | 2 | 9 | 6 | 2 | 1 | 1 | 9 |
| 1203 | 11 | 6 | 5 | 9 | 0 | 4 | 1 | 5 | 10 | 8 | 7 | 6 | 4 | 8 |
| 1204 | 9 | 7 | 10 | 9 | 3 | 0 | 5 | 3 | 3 | 4 | 4 | 5 | 8 | 1 |
| 1205 | 2 | 0 | 10 | 6 | 10 | 8 | 7 | 4 | 9 | 3 | 1 | 0 | 11 | 6 |
| 1206 | 2 | 6 | 2 | 11 | 4 | 7 | 10 | 1 | 0 | 4 | 2 | 8 | 2 | 11 |
| 1207 | 7 | 3 | 1 | 6 | 8 | 7 | 8 | 3 | 4 | 2 | 1 | 10 | 3 | 10 |
| 1208 | 10 | 0 | 7 | 8 | 0 | 9 | 11 | 0 | 4 | 4 | 5 | 4 | 1 | 5 |
| 1209 | 4 | 0 | 9 | 1 | 9 | 10 | 9 | 2 | 9 | 5 | 7 | 10 | 10 | 9 |
| 1210 | 10 | 9 | 7 | 5 | 9 | 1 | 3 | 8 | 8 | 0 | 5 | 5 | 4 | 10 |
| 1211 | 8 | 3 | 0 | 2 | 9 | 0 | 1 | 11 | 4 | 11 | 1 | 0 | 10 | 9 |
| 1212 | 11 | 2 | 5 | 0 | 4 | 7 | 0 | 8 | 5 | 1 | 7 | 5 | 10 | 3 |
| 1213 | 6 | 11 | 4 | 0 | 2 | 2 | 3 | 9 | 8 | 1 | 8 | 0 | 1 | 7 |
| 1214 | 2 | 6 | 0 | 10 | 7 | 3 | 7 | 0 | 1 | 9 | 8 | 8 | 7 | 1 |
| 1215 | 6 | 3 | 0 | 9 | 4 | 6 | 0 | 9 | 7 | 2 | 8 | 6 | 9 | 5 |
| 1216 | 3 | 9 | 1 | 3 | 0 | 0 | 5 | 8 | 6 | 4 | 6 | 9 | 3 | 0 |
| 1217 | 8 | 7 | 11 | 5 | 2 | 5 | 5 | 8 | 1 | 6 | 0 | 8 | 0 | 7 |
| 1218 | 3 | 7 | 5 | 2 | 1 | 8 | 5 | 11 | 1 | 11 | 5 | 11 | 5 | 5 |
| 1219 | 4 | 7 | 2 | 4 | 6 | 10 | 4 | 6 | 1 | 7 | 11 | 7 | 3 | 8 |
| 1220 | 9 | 8 | 11 | 5 | 10 | 1 | 9 | 10 | 11 | 10 | 7 | 2 | 3 | 9 |
| 1221 | 8 | 6 | 6 | 1 | 6 | 10 | 4 | 1 | 7 | 8 | 10 | 0 | 0 | 3 |
| 1222 | 3 | 4 | 7 | 1 | 9 | 5 | 10 | 8 | 3 | 7 | 0 | 3 | 2 | 5 |
| 1223 | 0 | 0 | 1 | 9 | 7 | 7 | 6 | 11 | 0 | 6 | 11 | 11 | 8 | 0 |
| 1224 | 1 | 7 | 10 | 3 | 9 | 2 | 8 | 8 | 4 | 8 | 11 | 5 | 11 | 2 |
| 1225 | 4 | 5 | 1 | 0 | 2 | 9 | 3 | 6 | 6 | 8 | 4 | 1 | 2 | 10 |
| 1226 | 4 | 6 | 7 | 0 | 0 | 1 | 2 | 6 | 10 | 5 | 1 | 10 | 0 | 11 |
| 1227 | 8 | 2 | 0 | 7 | 0 | 8 | 10 | 0 | 3 | 9 | 7 | 6 | 6 | 6 |
| 1228 | 11 | 10 | 10 | 5 | 0 | 11 | 6 | 2 | 9 | 9 | 3 | 5 | 6 | 9 |
| 1229 | 1 | 5 | 8 | 2 | 1 | 8 | 2 | 10 | 11 | 1 | 1 | 0 | 0 | 8 |
| 1230 | 6 | 5 | 8 | 11 | 7 | 7 | 8 | 11 | 10 | 4 | 6 | 10 | 0 | 1 |
| 1231 | 6 | 11 | 0 | 5 | 3 | 5 | 6 | 10 | 8 | 0 | 11 | 10 | 2 | 11 |
| 1232 | 1 | 6 | 7 | 6 | 7 | 7 | 7 | 9 | 2 | 4 | 0 | 2 | 10 | 8 |
| 1233 | 4 | 2 | 2 | 1 | 5 | 10 | 11 | 4 | 6 | 1 | 4 | 0 | 1 | 1 |
| 1234 | 7 | 1 | 6 | 1 | 7 | 2 | 6 | 4 | 10 | 11 | 6 | 11 | 2 | 10 |
| 1235 | 9 | 7 | 3 | 3 | 9 | 5 | 5 | 5 | 0 | 11 | 3 | 4 | 10 | 8 |
| 1236 | 1 | 8 | 5 | 8 | 8 | 0 | 1 | 2 | 8 | 0 | 2 | 2 | 3 | 10 |
| 1237 | 10 | 9 | 11 | 6 | 11 | 7 | 2 | 5 | 5 | 3 | 4 | 9 | 5 | 6 |
| 1238 | 6 | 7 | 4 | 1 | 8 | 11 | 1 | 11 | 4 | 6 | 2 | 7 | 0 | 0 |
| 1239 | 0 | 8 | 4 | 2 | 9 | 5 | 8 | 10 | 7 | 9 | 4 | 1 | 4 | 2 |
| 1240 | 11 | 1 | 2 | 5 | 6 | 10 | 1 | 3 | 0 | 8 | 9 | 4 | 2 | 10 |
| 1241 | 2 | 10 | 2 | 8 | 3 | 0 | 0 | 7 | 9 | 7 | 7 | 3 | 1 | 2 |
| 1242 | 5 | 5 | 5 | 9 | 11 | 1 | 6 | 9 | 6 | 10 | 3 | 5 | 3 | 3 |
| 1243 | 6 | 1 | 10 | 5 | 8 | 2 | 0 | 8 | 7 | 4 | 0 | 1 | 4 | 9 |
| 1244 | 9 | 2 | 5 | 2 | 11 | 9 | 5 | 0 | 0 | 8 | 7 | 0 | 11 | 9 |
| 1245 | 4 | 8 | 7 | 3 | 2 | 6 | 10 | 1 | 2 | 7 | 1 | 0 | 7 | 0 |
| 1246 | 8 | 3 | 0 | 11 | 5 | 9 | 2 | 5 | 2 | 8 | 10 | 7 | 7 | 8 |
| 1247 | 5 | 0 | 3 | 4 | 5 | 1 | 10 | 6 | 2 | 6 | 10 | 8 | 11 | 9 |
| 1248 | 9 | 1 | 0 | 6 | 9 | 7 | 10 | 4 | 2 | 11 | 8 | 9 | 3 | 2 |
| 1249 | 8 | 0 | 2 | 8 | 8 | 10 | 8 | 6 | 8 | 9 | 3 | 9 | 10 | 5 |
| 1250 | 9 | 4 | 9 | 6 | 5 | 8 | 3 | 8 | 3 | 6 | 9 | 1 | 8 | 4 |
| 1251 | 9 | 0 | 8 | 4 | 5 | 3 | 9 | 0 | 6 | 1 | 6 | 1 | 5 | 7 |
| 1252 | 5 | 9 | 11 | 2 | 3 | 2 | 11 | 7 | 2 | 6 | 9 | 0 | 3 | 8 |
| 1253 | 5 | 9 | 11 | 3 | 10 | 11 | 6 | 1 | 0 | 10 | 10 | 7 | 11 | 1 |
| 1254 | 10 | 2 | 11 | 0 | 10 | 10 | 1 | 10 | 4 | 9 | 1 | 3 | 8 | 6 |
| 1255 | 8 | 1 | 9 | 2 | 7 | 11 | 7 | 1 | 8 | 0 | 2 | 10 | 5 | 7 |
| 1256 | 5 | 11 | 6 | 0 | 7 | 3 | 7 | 5 | 6 | 3 | 9 | 3 | 4 | 6 |
| 1257 | 3 | 3 | 0 | 1 | 11 | 3 | 7 | 6 | 9 | 10 | 6 | 7 | 0 | 4 |
| 1258 | 7 | 3 | 0 | 10 | 2 | 7 | 0 | 2 | 3 | 11 | 9 | 8 | 0 | 3 |
| 1259 | 11 | 5 | 7 | 7 | 5 | 0 | 8 | 3 | 11 | 5 | 7 | 9 | 7 | 7 |
| 1260 | 7 | 5 | 10 | 10 | 3 | 3 | 0 | 11 | 0 | 6 | 2 | 2 | 2 | 8 |
| 1261 | 7 | 11 | 8 | 10 | 0 | 11 | 3 | 5 | 8 | 4 | 7 | 7 | 5 | 6 |
| 1262 | 10 | 4 | 3 | 10 | 8 | 8 | 3 | 4 | 10 | 10 | 3 | 10 | 9 | 5 |
| 1263 | 10 | 0 | 11 | 11 | 9 | 8 | 8 | 0 | 1 | 7 | 10 | 7 | 6 | 7 |
| 1264 | 7 | 10 | 4 | 10 | 5 | 10 | 6 | 7 | 6 | 9 | 11 | 7 | 4 | 10 |
| 1265 | 6 | 11 | 8 | 7 | 11 | 11 | 4 | 2 | 2 | 7 | 4 | 1 | 7 | 5 |
| 1266 | 2 | 9 | 10 | 8 | 1 | 3 | 4 | 4 | 0 | 2 | 11 | 11 | 9 | 5 |
| 1267 | 0 | 2 | 9 | 5 | 6 | 5 | 8 | 6 | 9 | 0 | 1 | 0 | 3 | 9 |
| 1268 | 2 | 3 | 1 | 10 | 9 | 8 | 3 | 1 | 8 | 6 | 2 | 6 | 0 | 1 |
| 1269 | 3 | 9 | 10 | 0 | 4 | 5 | 0 | 7 | 7 | 9 | 6 | 0 | 7 | 1 |
| 1270 | 11 | 3 | 1 | 10 | 7 | 5 | 0 | 5 | 11 | 9 | 5 | 2 | 10 | 0 |
| 1271 | 11 | 8 | 7 | 5 | 8 | 1 | 8 | 2 | 3 | 4 | 9 | 7 | 9 | 8 |
| 1272 | 4 | 8 | 2 | 6 | 11 | 2 | 9 | 0 | 8 | 5 | 10 | 8 | 7 | 8 |
| 1273 | 11 | 4 | 8 | 6 | 11 | 4 | 6 | 7 | 2 | 0 | 1 | 8 | 10 | 7 |
| 1274 | 5 | 11 | 0 | 8 | 4 | 2 | 6 | 7 | 7 | 8 | 4 | 4 | 8 | 0 |
| 1275 | 2 | 9 | 6 | 1 | 3 | 8 | 5 | 6 | 7 | 5 | 2 | 3 | 6 | 11 |
| 1276 | 5 | 7 | 4 | 2 | 5 | 8 | 8 | 0 | 9 | 3 | 3 | 10 | 7 | 4 |
| 1277 | 6 | 0 | 4 | 5 | 0 | 4 | 0 | 6 | 10 | 2 | 5 | 9 | 2 | 4 |
| 1278 | 1 | 0 | 4 | 8 | 1 | 10 | 4 | 9 | 10 | 3 | 9 | 10 | 3 | 6 |
| 1279 | 10 | 6 | 3 | 4 | 1 | 7 | 3 | 5 | 1 | 5 | 0 | 7 | 7 | 0 |
| 1280 | 7 | 4 | 11 | 9 | 6 | 2 | 8 | 3 | 9 | 9 | 7 | 8 | 9 | 5 |
| 1281 | 2 | 5 | 10 | 8 | 10 | 7 | 1 | 5 | 0 | 11 | 0 | 6 | 0 | 9 |
| 1282 | 10 | 10 | 2 | 2 | 9 | 4 | 9 | 1 | 10 | 3 | 4 | 3 | 2 | 4 |
| 1283 | 1 | 11 | 4 | 11 | 7 | 6 | 7 | 10 | 1 | 0 | 5 | 1 | 11 | 11 |
| 1284 | 7 | 7 | 8 | 6 | 11 | 9 | 0 | 5 | 10 | 7 | 11 | 5 | 4 | 3 |
| 1285 | 11 | 2 | 0 | 9 | 5 | 9 | 1 | 0 | 6 | 0 | 3 | 4 | 7 | 7 |
| 1286 | 9 | 5 | 4 | 10 | 0 | 5 | 10 | 1 | 11 | 5 | 9 | 2 | 6 | 6 |
| 1287 | 3 | 4 | 2 | 8 | 2 | 3 | 6 | 7 | 11 | 4 | 2 | 7 | 8 | 1 |
| 1288 | 6 | 9 | 11 | 6 | 4 | 5 | 9 | 11 | 3 | 4 | 5 | 0 | 0 | 8 |
| 1289 | 1 | 1 | 8 | 3 | 9 | 1 | 4 | 6 | 4 | 2 | 8 | 7 | 10 | 5 |
| 1290 | 6 | 6 | 6 | 11 | 1 | 11 | 11 | 6 | 2 | 9 | 3 | 3 | 1 | 1 |
| 1291 | 5 | 7 | 4 | 7 | 11 | 0 | 1 | 6 | 11 | 1 | 8 | 11 | 3 | 4 |
| 1292 | 5 | 11 | 5 | 8 | 2 | 9 | 7 | 0 | 5 | 6 | 0 | 3 | 2 | 3 |
| 1293 | 9 | 7 | 11 | 0 | 2 | 0 | 2 | 9 | 10 | 2 | 6 | 0 | 5 | 2 |
| 1294 | 10 | 7 | 2 | 8 | 10 | 2 | 11 | 0 | 3 | 9 | 11 | 11 | 6 | 0 |
| 1295 | 0 | 6 | 6 | 10 | 10 | 7 | 2 | 4 | 6 | 5 | 4 | 11 | 7 | 11 |
| 1296 | 6 | 5 | 3 | 4 | 11 | 2 | 11 | 1 | 0 | 2 | 4 | 9 | 9 | 7 |
| 1297 | 0 | 1 | 7 | 6 | 3 | 3 | 2 | 3 | 5 | 10 | 11 | 7 | 1 | 10 |
| 1298 | 7 | 2 | 1 | 6 | 7 | 4 | 11 | 4 | 0 | 6 | 2 | 7 | 10 | 4 |
| 1299 | 0 | 7 | 8 | 7 | 5 | 4 | 3 | 11 | 8 | 10 | 6 | 3 | 0 | 11 |
| 1300 | 4 | 9 | 1 | 11 | 3 | 7 | 4 | 0 | 4 | 4 | 2 | 2 | 11 | 0 |
| 1301 | 2 | 6 | 9 | 5 | 4 | 8 | 2 | 0 | 8 | 0 | 1 | 7 | 6 | 6 |
| 1302 | 11 | 9 | 9 | 9 | 8 | 11 | 3 | 9 | 5 | 3 | 9 | 8 | 2 | 11 |
| 1303 | 6 | 5 | 1 | 5 | 2 | 3 | 10 | 8 | 10 | 1 | 3 | 11 | 10 | 9 |
| 1304 | 5 | 7 | 9 | 11 | 9 | 3 | 5 | 10 | 9 | 8 | 9 | 4 | 0 | 2 |
| 1305 | 3 | 3 | 0 | 2 | 10 | 10 | 3 | 2 | 10 | 5 | 8 | 0 | 0 | 5 |
| 1306 | 3 | 0 | 1 | 9 | 9 | 6 | 7 | 8 | 4 | 3 | 6 | 10 | 7 | 3 |
| 1307 | 9 | 2 | 0 | 4 | 2 | 1 | 8 | 5 | 8 | 11 | 9 | 1 | 4 | 1 |
| 1308 | 1 | 10 | 5 | 9 | 10 | 7 | 9 | 9 | 8 | 7 | 11 | 10 | 11 | 8 |
| 1309 | 10 | 4 | 7 | 5 | 0 | 7 | 5 | 8 | 9 | 2 | 10 | 0 | 2 | 11 |
| 1310 | 7 | 3 | 5 | 4 | 3 | 8 | 6 | 0 | 0 | 10 | 7 | 5 | 7 | 2 |
| 1311 | 6 | 8 | 2 | 0 | 1 | 10 | 0 | 3 | 7 | 7 | 8 | 1 | 5 | 8 |
| 1312 | 11 | 9 | 8 | 0 | 1 | 8 | 9 | 1 | 1 | 8 | 10 | 7 | 1 | 9 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1313 | 8 | 1 | 7 | 11 | 2 | 11 | 1 | 4 | 3 | 6 | 8 | 9 | 8 | 8 |
| 1314 | 9 | 4 | 9 | 2 | 5 | 0 | 11 | 5 | 2 | 7 | 10 | 11 | 10 | 7 |
| 1315 | 7 | 10 | 3 | 8 | 2 | 1 | 5 | 8 | 7 | 5 | 6 | 9 | 6 | 4 |
| 1316 | 4 | 3 | 10 | 4 | 7 | 5 | 7 | 9 | 10 | 11 | 2 | 4 | 9 | 8 |
| 1317 | 10 | 11 | 4 | 10 | 1 | 1 | 6 | 3 | 3 | 8 | 1 | 6 | 2 | 5 |
| 1318 | 7 | 10 | 4 | 4 | 1 | 0 | 1 | 5 | 6 | 4 | 0 | 10 | 11 | 1 |
| 1319 | 8 | 11 | 8 | 11 | 3 | 1 | 2 | 6 | 9 | 4 | 11 | 9 | 5 | 2 |
| 1320 | 8 | 8 | 8 | 6 | 2 | 4 | 10 | 11 | 3 | 8 | 0 | 8 | 9 | 5 |
| 1321 | 6 | 1 | 9 | 8 | 0 | 6 | 8 | 9 | 2 | 9 | 1 | 4 | 0 | 8 |
| 1322 | 1 | 8 | 10 | 3 | 10 | 7 | 7 | 7 | 11 | 9 | 1 | 2 | 7 | 3 |
| 1323 | 9 | 7 | 0 | 5 | 5 | 8 | 4 | 10 | 0 | 8 | 4 | 2 | 6 | 3 |
| 1324 | 4 | 10 | 9 | 6 | 9 | 5 | 11 | 1 | 9 | 7 | 5 | 7 | 9 | 1 |
| 1325 | 11 | 4 | 2 | 4 | 1 | 11 | 10 | 8 | 3 | 11 | 4 | 11 | 0 | 8 |
| 1326 | 6 | 9 | 3 | 1 | 9 | 4 | 6 | 3 | 2 | 1 | 3 | 6 | 9 | 11 |
| 1327 | 10 | 9 | 11 | 10 | 5 | 1 | 9 | 8 | 5 | 1 | 8 | 2 | 11 | 2 |
| 1328 | 7 | 0 | 4 | 2 | 4 | 3 | 3 | 2 | 8 | 6 | 1 | 3 | 7 | 4 |
| 1329 | 8 | 4 | 10 | 4 | 6 | 8 | 0 | 7 | 2 | 3 | 1 | 5 | 3 | 5 |
| 1330 | 10 | 9 | 9 | 5 | 3 | 2 | 6 | 1 | 4 | 5 | 9 | 3 | 5 | 7 |
| 1331 | 10 | 4 | 1 | 2 | 1 | 9 | 4 | 6 | 6 | 5 | 2 | 0 | 9 | 4 |
| 1332 | 9 | 4 | 10 | 9 | 0 | 6 | 3 | 1 | 10 | 8 | 11 | 3 | 9 | 0 |
| 1333 | 5 | 0 | 11 | 0 | 8 | 2 | 9 | 6 | 3 | 7 | 4 | 1 | 1 | 0 |
| 1334 | 8 | 11 | 8 | 2 | 6 | 9 | 0 | 2 | 11 | 9 | 4 | 10 | 11 | 6 |
| 1335 | 1 | 8 | 4 | 8 | 8 | 1 | 11 | 1 | 4 | 7 | 4 | 6 | 8 | 3 |
| 1336 | 9 | 11 | 9 | 11 | 0 | 8 | 1 | 7 | 5 | 1 | 8 | 10 | 5 | 1 |
| 1337 | 11 | 7 | 9 | 2 | 7 | 2 | 2 | 9 | 0 | 4 | 8 | 10 | 6 | 9 |
| 1338 | 10 | 4 | 4 | 5 | 7 | 0 | 2 | 7 | 8 | 8 | 0 | 11 | 0 | 2 |
| 1339 | 9 | 5 | 9 | 3 | 4 | 7 | 0 | 10 | 1 | 6 | 2 | 4 | 4 | 11 |
| 1340 | 2 | 8 | 5 | 0 | 8 | 11 | 6 | 10 | 10 | 3 | 8 | 3 | 1 | 10 |
| 1341 | 5 | 1 | 1 | 1 | 2 | 0 | 3 | 3 | 0 | 1 | 11 | 9 | 11 | 3 |
| 1342 | 0 | 6 | 2 | 5 | 3 | 10 | 9 | 1 | 3 | 11 | 3 | 10 | 8 | 1 |
| 1343 | 5 | 6 | 1 | 3 | 11 | 11 | 5 | 1 | 9 | 6 | 0 | 6 | 6 | 6 |
| 1344 | 4 | 4 | 2 | 4 | 4 | 9 | 8 | 5 | 1 | 4 | 10 | 9 | 2 | 5 |
| 1345 | 7 | 3 | 1 | 11 | 9 | 4 | 1 | 2 | 6 | 9 | 3 | 1 | 5 | 9 |
| 1346 | 0 | 4 | 1 | 6 | 8 | 8 | 9 | 9 | 8 | 9 | 5 | 4 | 10 | 7 |
| 1347 | 10 | 9 | 3 | 1 | 1 | 6 | 10 | 10 | 7 | 5 | 5 | 10 | 3 | 9 |
| 1348 | 7 | 1 | 7 | 7 | 8 | 10 | 2 | 8 | 10 | 3 | 3 | 1 | 6 | 7 |
| 1349 | 8 | 5 | 0 | 10 | 8 | 5 | 5 | 3 | 7 | 6 | 6 | 11 | 3 | 9 |
| 1350 | 0 | 8 | 0 | 4 | 5 | 10 | 10 | 5 | 5 | 2 | 11 | 8 | 2 | 2 |
| 1351 | 0 | 5 | 5 | 11 | 4 | 8 | 11 | 11 | 10 | 1 | 11 | 5 | 3 | 8 |
| 1352 | 3 | 7 | 7 | 5 | 11 | 7 | 4 | 7 | 6 | 7 | 6 | 1 | 0 | 7 |
| 1353 | 3 | 1 | 8 | 9 | 6 | 7 | 7 | 10 | 2 | 7 | 7 | 11 | 5 | 4 |
| 1354 | 5 | 6 | 0 | 8 | 1 | 9 | 0 | 7 | 4 | 2 | 5 | 1 | 6 | 1 |
| 1355 | 7 | 1 | 11 | 9 | 8 | 11 | 7 | 0 | 11 | 10 | 11 | 6 | 10 | 6 |
| 1356 | 11 | 9 | 4 | 10 | 4 | 9 | 5 | 9 | 0 | 11 | 5 | 4 | 8 | 1 |
| 1357 | 1 | 3 | 9 | 0 | 5 | 9 | 5 | 4 | 1 | 2 | 11 | 1 | 3 | 4 |
| 1358 | 6 | 5 | 9 | 7 | 1 | 0 | 0 | 0 | 6 | 1 | 1 | 3 | 7 | 5 |
| 1359 | 11 | 8 | 3 | 7 | 8 | 4 | 10 | 10 | 1 | 0 | 10 | 11 | 2 | 1 |
| 1360 | 9 | 6 | 11 | 2 | 2 | 5 | 6 | 3 | 11 | 7 | 8 | 10 | 7 | 11 |
| 1361 | 3 | 6 | 6 | 2 | 11 | 6 | 11 | 7 | 7 | 6 | 11 | 9 | 4 | 9 |
| 1362 | 1 | 10 | 1 | 4 | 11 | 10 | 7 | 0 | 9 | 11 | 8 | 7 | 1 | 3 |
| 1363 | 4 | 11 | 3 | 11 | 6 | 8 | 0 | 3 | 6 | 2 | 11 | 2 | 1 | 3 |
| 1364 | 1 | 2 | 8 | 9 | 10 | 11 | 11 | 11 | 3 | 5 | 9 | 5 | 10 | 1 |
| 1365 | 0 | 2 | 11 | 3 | 3 | 0 | 10 | 1 | 0 | 8 | 2 | 11 | 5 | 9 |
| 1366 | 3 | 11 | 0 | 3 | 2 | 2 | 1 | 9 | 1 | 2 | 9 | 11 | 11 | 3 |
| 1367 | 6 | 1 | 6 | 8 | 7 | 4 | 9 | 0 | 7 | 2 | 10 | 6 | 7 | 9 |
| 1368 | 7 | 5 | 4 | 11 | 10 | 9 | 6 | 6 | 2 | 11 | 1 | 8 | 6 | 8 |
| 1369 | 8 | 10 | 10 | 5 | 8 | 7 | 7 | 4 | 7 | 8 | 4 | 4 | 11 | 4 |
| 1370 | 1 | 11 | 0 | 1 | 7 | 8 | 11 | 1 | 9 | 4 | 8 | 2 | 4 | 10 |
| 1371 | 2 | 11 | 4 | 3 | 8 | 7 | 2 | 1 | 11 | 10 | 6 | 9 | 11 | 9 |
| 1372 | 9 | 3 | 6 | 10 | 11 | 2 | 10 | 2 | 5 | 9 | 6 | 10 | 9 | 3 |
| 1373 | 4 | 7 | 10 | 10 | 10 | 4 | 2 | 7 | 3 | 4 | 9 | 6 | 5 | 4 |
| 1374 | 9 | 5 | 5 | 11 | 8 | 11 | 8 | 3 | 1 | 8 | 3 | 10 | 6 | 5 |
| 1375 | 4 | 0 | 11 | 6 | 7 | 8 | 11 | 9 | 6 | 0 | 3 | 6 | 0 | 11 |
| 1376 | 11 | 5 | 6 | 7 | 6 | 5 | 9 | 5 | 2 | 3 | 3 | 8 | 11 | 9 |
| 1377 | 1 | 10 | 10 | 6 | 0 | 1 | 4 | 4 | 2 | 0 | 10 | 9 | 1 | 10 |
| 1378 | 3 | 0 | 2 | 10 | 10 | 9 | 3 | 10 | 9 | 2 | 1 | 10 | 1 | 0 |
| 1379 | 11 | 5 | 10 | 7 | 2 | 1 | 3 | 8 | 1 | 2 | 5 | 7 | 0 | 0 |
| 1380 | 4 | 0 | 6 | 5 | 2 | 6 | 4 | 6 | 7 | 4 | 5 | 8 | 5 | 1 |
| 1381 | 5 | 6 | 10 | 7 | 3 | 4 | 3 | 5 | 7 | 9 | 3 | 11 | 7 | 8 |
| 1382 | 4 | 6 | 11 | 5 | 1 | 0 | 3 | 8 | 11 | 8 | 11 | 7 | 4 | 5 |
| 1383 | 2 | 0 | 9 | 10 | 1 | 5 | 6 | 4 | 5 | 9 | 7 | 9 | 1 | 2 |
| 1384 | 2 | 9 | 7 | 2 | 4 | 1 | 11 | 1 | 7 | 11 | 10 | 5 | 9 | 6 |
| 1385 | 1 | 7 | 5 | 5 | 8 | 1 | 9 | 5 | 9 | 9 | 0 | 0 | 3 | 2 |
| 1386 | 9 | 2 | 4 | 8 | 3 | 10 | 7 | 4 | 7 | 10 | 11 | 9 | 2 | 7 |
| 1387 | 4 | 5 | 3 | 9 | 0 | 3 | 4 | 8 | 1 | 4 | 7 | 1 | 6 | 8 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1388 | 8 | 0 | 5 | 9 | 2 | 2 | 1 | 7 | 6 | 7 | 7 | 5 | 6 | 1 |
| 1389 | 4 | 2 | 9 | 11 | 5 | 0 | 8 | 8 | 0 | 3 | 7 | 0 | 0 | 0 |
| 1390 | 2 | 3 | 4 | 9 | 2 | 2 | 5 | 10 | 3 | 1 | 0 | 4 | 10 | 6 |
| 1391 | 11 | 2 | 7 | 8 | 7 | 5 | 4 | 9 | 9 | 1 | 4 | 11 | 7 | 5 |
| 1392 | 3 | 4 | 8 | 4 | 10 | 10 | 7 | 6 | 4 | 4 | 0 | 3 | 3 | 0 |
| 1393 | 1 | 8 | 11 | 5 | 10 | 4 | 6 | 6 | 6 | 4 | 6 | 4 | 8 | 6 |
| 1394 | 11 | 9 | 0 | 11 | 10 | 5 | 10 | 6 | 11 | 3 | 11 | 3 | 4 | 3 |
| 1395 | 9 | 8 | 9 | 5 | 3 | 6 | 9 | 2 | 2 | 8 | 8 | 6 | 1 | 6 |
| 1396 | 5 | 11 | 3 | 2 | 5 | 11 | 2 | 4 | 3 | 2 | 10 | 4 | 9 | 10 |
| 1397 | 10 | 9 | 7 | 1 | 9 | 2 | 1 | 6 | 9 | 7 | 1 | 9 | 10 | 4 |
| 1398 | 5 | 11 | 10 | 9 | 6 | 10 | 11 | 2 | 9 | 10 | 6 | 11 | 0 | 1 |
| 1399 | 2 | 0 | 4 | 9 | 11 | 1 | 11 | 11 | 10 | 10 | 2 | 7 | 4 | 2 |
| 1400 | 4 | 2 | 1 | 4 | 10 | 4 | 5 | 11 | 11 | 2 | 5 | 9 | 8 | 8 |
| 1401 | 8 | 10 | 5 | 1 | 10 | 6 | 3 | 11 | 3 | 11 | 3 | 4 | 4 | 9 |
| 1402 | 5 | 1 | 2 | 0 | 5 | 10 | 1 | 5 | 2 | 0 | 6 | 9 | 3 | 6 |
| 1403 | 7 | 9 | 10 | 10 | 6 | 7 | 6 | 6 | 3 | 2 | 10 | 10 | 7 | 7 |
| 1404 | 4 | 9 | 0 | 8 | 2 | 4 | 11 | 5 | 3 | 10 | 1 | 5 | 11 | 9 |
| 1405 | 8 | 7 | 3 | 8 | 4 | 9 | 5 | 1 | 4 | 3 | 8 | 2 | 11 | 5 |
| 1406 | 5 | 5 | 5 | 4 | 4 | 3 | 3 | 1 | 5 | 4 | 3 | 0 | 5 | 11 |
| 1407 | 9 | 8 | 5 | 3 | 10 | 11 | 11 | 0 | 4 | 0 | 0 | 0 | 5 | 8 |
| 1408 | 7 | 10 | 11 | 7 | 3 | 5 | 8 | 9 | 2 | 11 | 4 | 3 | 4 | 6 |
| 1409 | 1 | 1 | 5 | 7 | 9 | 2 | 6 | 3 | 6 | 11 | 4 | 0 | 1 | 7 |
| 1410 | 2 | 1 | 3 | 4 | 7 | 9 | 9 | 8 | 2 | 0 | 1 | 3 | 8 | 11 |
| 1411 | 11 | 6 | 0 | 8 | 6 | 1 | 9 | 2 | 11 | 0 | 1 | 0 | 2 | 8 |
| 1412 | 2 | 10 | 2 | 6 | 5 | 3 | 5 | 3 | 6 | 3 | 7 | 2 | 6 | 6 |
| 1413 | 6 | 3 | 7 | 2 | 6 | 11 | 9 | 10 | 4 | 1 | 11 | 8 | 2 | 10 |
| 1414 | 4 | 3 | 7 | 10 | 5 | 6 | 7 | 10 | 0 | 5 | 3 | 9 | 10 | 1 |
| 1415 | 8 | 10 | 4 | 3 | 6 | 11 | 9 | 2 | 0 | 8 | 10 | 3 | 8 | 7 |
| 1416 | 7 | 3 | 3 | 1 | 7 | 3 | 2 | 1 | 11 | 8 | 4 | 1 | 8 | 6 |
| 1417 | 3 | 0 | 8 | 6 | 8 | 0 | 8 | 5 | 7 | 6 | 10 | 2 | 9 | 2 |
| 1418 | 4 | 11 | 4 | 0 | 10 | 0 | 4 | 0 | 7 | 2 | 3 | 5 | 4 | 7 |
| 1419 | 1 | 6 | 6 | 2 | 0 | 8 | 0 | 11 | 8 | 4 | 9 | 0 | 2 | 7 |
| 1420 | 6 | 6 | 7 | 0 | 0 | 7 | 8 | 0 | 11 | 6 | 6 | 3 | 5 | 0 |
| 1421 | 10 | 4 | 2 | 1 | 8 | 6 | 9 | 0 | 9 | 0 | 9 | 5 | 1 | 10 |
| 1422 | 6 | 3 | 2 | 3 | 2 | 4 | 2 | 5 | 10 | 6 | 0 | 10 | 8 | 10 |
| 1423 | 8 | 2 | 1 | 11 | 5 | 10 | 4 | 1 | 10 | 9 | 6 | 6 | 10 | 11 |
| 1424 | 11 | 0 | 8 | 2 | 4 | 11 | 10 | 3 | 11 | 2 | 0 | 9 | 6 | 0 |
| 1425 | 9 | 0 | 3 | 10 | 9 | 10 | 9 | 11 | 8 | 2 | 10 | 3 | 3 | 6 |
| 1426 | 11 | 9 | 10 | 2 | 7 | 4 | 7 | 10 | 9 | 9 | 0 | 8 | 8 | 7 |
| 1427 | 5 | 2 | 11 | 8 | 1 | 1 | 2 | 11 | 9 | 7 | 7 | 5 | 2 | 4 |
| 1428 | 5 | 2 | 9 | 5 | 11 | 5 | 3 | 2 | 10 | 11 | 10 | 11 | 2 | 2 |
| 1429 | 3 | 6 | 2 | 7 | 7 | 6 | 1 | 0 | 0 | 8 | 0 | 8 | 5 | 6 |
| 1430 | 8 | 3 | 0 | 8 | 6 | 10 | 10 | 0 | 6 | 4 | 5 | 2 | 9 | 4 |
| 1431 | 6 | 0 | 1 | 7 | 3 | 3 | 7 | 1 | 8 | 5 | 4 | 2 | 2 | 1 |
| 1432 | 4 | 10 | 10 | 11 | 11 | 4 | 8 | 10 | 11 | 8 | 2 | 5 | 7 | 10 |
| 1433 | 2 | 11 | 6 | 7 | 1 | 10 | 7 | 7 | 11 | 7 | 11 | 3 | 8 | 10 |
| 1434 | 10 | 8 | 7 | 9 | 3 | 8 | 10 | 0 | 6 | 1 | 2 | 1 | 2 | 8 |
| 1435 | 0 | 3 | 11 | 3 | 0 | 11 | 1 | 3 | 3 | 4 | 3 | 8 | 4 | 0 |
| 1436 | 8 | 8 | 9 | 9 | 0 | 11 | 2 | 2 | 8 | 11 | 5 | 0 | 4 | 10 |
| 1437 | 9 | 4 | 6 | 0 | 1 | 5 | 5 | 11 | 3 | 7 | 2 | 9 | 4 | 6 |
| 1438 | 8 | 5 | 1 | 9 | 7 | 1 | 11 | 3 | 8 | 0 | 8 | 3 | 7 | 8 |
| 1439 | 4 | 4 | 8 | 5 | 4 | 8 | 1 | 10 | 7 | 7 | 9 | 6 | 8 | 10 |
| 1440 | 10 | 8 | 9 | 1 | 10 | 3 | 0 | 11 | 7 | 1 | 10 | 8 | 6 | 1 |
| 1441 | 5 | 11 | 5 | 9 | 7 | 5 | 3 | 5 | 0 | 5 | 4 | 2 | 3 | 4 |
| 1442 | 10 | 6 | 5 | 1 | 0 | 9 | 0 | 4 | 2 | 9 | 8 | 7 | 10 | 9 |
| 1443 | 3 | 2 | 4 | 7 | 4 | 11 | 1 | 7 | 2 | 3 | 6 | 2 | 10 | 10 |
| 1444 | 11 | 10 | 9 | 3 | 2 | 6 | 3 | 10 | 4 | 10 | 1 | 2 | 9 | 5 |
| 1445 | 10 | 7 | 1 | 0 | 11 | 10 | 3 | 8 | 1 | 4 | 11 | 0 | 8 | 1 |
| 1446 | 9 | 8 | 7 | 1 | 5 | 9 | 6 | 5 | 3 | 6 | 6 | 5 | 1 | 11 |
| 1447 | 1 | 5 | 3 | 0 | 11 | 6 | 1 | 11 | 6 | 4 | 10 | 7 | 10 | 0 |
| 1448 | 6 | 2 | 7 | 6 | 10 | 10 | 5 | 9 | 8 | 8 | 7 | 1 | 9 | 0 |
| 1449 | 3 | 7 | 1 | 1 | 0 | 2 | 6 | 9 | 9 | 10 | 2 | 8 | 3 | 6 |
| 1450 | 0 | 5 | 7 | 2 | 8 | 10 | 8 | 9 | 0 | 0 | 2 | 0 | 8 | 11 |
| 1451 | 2 | 2 | 6 | 9 | 0 | 1 | 9 | 4 | 4 | 3 | 0 | 11 | 9 | 4 |
| 1452 | 2 | 9 | 1 | 8 | 6 | 8 | 6 | 2 | 7 | 1 | 9 | 1 | 10 | 5 |
| 1453 | 6 | 2 | 3 | 10 | 6 | 9 | 8 | 10 | 1 | 10 | 0 | 0 | 4 | 4 |
| 1454 | 4 | 1 | 4 | 1 | 1 | 11 | 5 | 3 | 8 | 0 | 4 | 4 | 3 | 11 |
| 1455 | 5 | 6 | 8 | 3 | 8 | 6 | 6 | 11 | 1 | 2 | 2 | 2 | 0 | 7 |
| 1456 | 2 | 3 | 11 | 11 | 4 | 4 | 0 | 10 | 8 | 10 | 9 | 11 | 1 | 0 |
| 1457 | 11 | 7 | 5 | 6 | 1 | 6 | 11 | 1 | 11 | 1 | 9 | 10 | 10 | 7 |
| 1458 | 2 | 10 | 11 | 1 | 3 | 4 | 2 | 8 | 1 | 9 | 0 | 4 | 11 | 11 |
| 1459 | 1 | 11 | 2 | 0 | 9 | 5 | 0 | 2 | 5 | 0 | 7 | 7 | 4 | 9 |
| 1460 | 0 | 10 | 2 | 7 | 9 | 0 | 11 | 6 | 7 | 6 | 1 | 4 | 6 | 3 |
| 1461 | 1 | 1 | 2 | 2 | 10 | 4 | 8 | 7 | 0 | 1 | 10 | 1 | 3 | 2 |
| 1462 | 11 | 3 | 6 | 4 | 4 | 1 | 1 | 11 | 5 | 5 | 4 | 6 | 3 | 5 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1463 | 7 | 3 | 11 | 10 | 9 | 3 | 4 | 7 | 5 | 10 | 1 | 9 | 6 | 7 |
| 1464 | 3 | 6 | 5 | 6 | 3 | 2 | 2 | 2 | 10 | 6 | 5 | 6 | 7 | 3 |
| 1465 | 9 | 2 | 5 | 7 | 8 | 8 | 0 | 1 | 7 | 4 | 4 | 3 | 10 | 8 |
| 1466 | 0 | 4 | 10 | 0 | 11 | 9 | 9 | 10 | 5 | 11 | 8 | 8 | 9 | 9 |
| 1467 | 3 | 11 | 3 | 10 | 3 | 0 | 7 | 10 | 4 | 1 | 9 | 5 | 0 | 6 |
| 1468 | 3 | 2 | 2 | 3 | 11 | 10 | 2 | 10 | 11 | 3 | 5 | 4 | 2 | 6 |
| 1469 | 11 | 0 | 10 | 6 | 6 | 2 | 5 | 0 | 1 | 11 | 8 | 6 | 11 | 10 |
| 1470 | 0 | 10 | 7 | 11 | 1 | 3 | 10 | 2 | 4 | 6 | 4 | 5 | 9 | 2 |
| 1471 | 8 | 1 | 11 | 0 | 5 | 2 | 11 | 3 | 5 | 8 | 1 | 11 | 8 | 1 |
| 1472 | 5 | 4 | 9 | 4 | 7 | 11 | 8 | 11 | 5 | 0 | 5 | 4 | 1 | 4 |
| 1473 | 9 | 1 | 9 | 6 | 8 | 3 | 6 | 2 | 6 | 9 | 2 | 5 | 3 | 0 |
| 1474 | 7 | 11 | 0 | 8 | 4 | 7 | 9 | 8 | 2 | 11 | 2 | 5 | 5 | 7 |
| 1475 | 9 | 11 | 6 | 10 | 5 | 4 | 1 | 1 | 4 | 11 | 7 | 7 | 7 | 5 |
| 1476 | 3 | 9 | 6 | 4 | 0 | 7 | 10 | 2 | 7 | 0 | 7 | 6 | 1 | 2 |
| 1477 | 3 | 9 | 2 | 4 | 9 | 1 | 0 | 4 | 3 | 5 | 6 | 1 | 11 | 11 |
| 1478 | 2 | 7 | 0 | 3 | 5 | 7 | 6 | 8 | 7 | 3 | 5 | 6 | 9 | 8 |
| 1479 | 8 | 11 | 6 | 5 | 8 | 3 | 5 | 9 | 1 | 5 | 11 | 10 | 4 | 0 |
| 1480 | 5 | 5 | 2 | 6 | 0 | 4 | 1 | 0 | 5 | 3 | 11 | 5 | 10 | 5 |
| 1481 | 9 | 10 | 5 | 5 | 4 | 4 | 5 | 5 | 1 | 7 | 8 | 5 | 5 | 4 |
| 1482 | 11 | 1 | 10 | 1 | 0 | 3 | 0 | 1 | 3 | 3 | 9 | 9 | 4 | 2 |
| 1483 | 8 | 2 | 3 | 5 | 8 | 2 | 10 | 8 | 9 | 7 | 5 | 3 | 0 | 6 |
| 1484 | 3 | 7 | 9 | 4 | 3 | 5 | 1 | 6 | 10 | 0 | 3 | 5 | 11 | 5 |
| 1485 | 10 | 7 | 8 | 7 | 1 | 2 | 7 | 2 | 7 | 8 | 9 | 9 | 7 | 1 |
| 1486 | 6 | 1 | 3 | 6 | 8 | 8 | 5 | 5 | 0 | 5 | 9 | 3 | 2 | 5 |
| 1487 | 9 | 9 | 8 | 1 | 4 | 11 | 4 | 11 | 6 | 3 | 4 | 11 | 8 | 9 |
| 1488 | 1 | 0 | 11 | 4 | 4 | 6 | 8 | 8 | 10 | 6 | 7 | 5 | 8 | 9 |
| 1489 | 10 | 8 | 6 | 4 | 6 | 5 | 4 | 9 | 11 | 8 | 8 | 7 | 6 | 2 |
| 1490 | 2 | 10 | 6 | 8 | 8 | 5 | 10 | 0 | 0 | 6 | 8 | 8 | 4 | 7 |
| 1491 | 2 | 0 | 5 | 8 | 3 | 0 | 3 | 11 | 4 | 4 | 11 | 8 | 10 | 4 |
| 1492 | 7 | 4 | 3 | 10 | 0 | 4 | 6 | 9 | 7 | 6 | 4 | 2 | 0 | 10 |
| 1493 | 6 | 0 | 1 | 8 | 6 | 6 | 5 | 3 | 0 | 7 | 2 | 0 | 3 | 0 |
| 1494 | 1 | 2 | 2 | 2 | 6 | 5 | 1 | 8 | 2 | 10 | 4 | 6 | 5 | 1 |
| 1495 | 11 | 8 | 7 | 0 | 9 | 9 | 4 | 8 | 4 | 9 | 10 | 9 | 9 | 0 |
| 1496 | 3 | 5 | 4 | 6 | 3 | 9 | 4 | 3 | 3 | 2 | 4 | 1 | 10 | 2 |
| 1497 | 11 | 2 | 4 | 10 | 0 | 3 | 1 | 11 | 10 | 7 | 11 | 8 | 5 | 9 |
| 1498 | 9 | 5 | 8 | 9 | 9 | 2 | 6 | 0 | 7 | 2 | 7 | 10 | 11 | 0 |
| 1499 | 1 | 9 | 0 | 7 | 8 | 3 | 0 | 4 | 9 | 3 | 1 | 6 | 0 | 0 |
| 1500 | 10 | 1 | 2 | 0 | 4 | 0 | 5 | 4 | 11 | 6 | 7 | 8 | 7 | 5 |
| 1501 | 6 | 3 | 1 | 5 | 9 | 10 | 11 | 4 | 9 | 4 | 1 | 8 | 11 | 8 |
| 1502 | 11 | 9 | 7 | 0 | 2 | 6 | 6 | 7 | 3 | 0 | 0 | 6 | 3 | 10 |
| 1503 | 5 | 8 | 7 | 4 | 11 | 7 | 0 | 9 | 3 | 10 | 1 | 0 | 9 | 6 |
| 1504 | 10 | 7 | 0 | 7 | 2 | 11 | 0 | 8 | 4 | 9 | 6 | 4 | 4 | 6 |
| 1505 | 3 | 10 | 6 | 9 | 1 | 8 | 4 | 3 | 9 | 5 | 0 | 2 | 7 | 9 |
| 1506 | 9 | 2 | 11 | 3 | 1 | 8 | 3 | 2 | 6 | 3 | 0 | 9 | 1 | 10 |
| 1507 | 11 | 8 | 5 | 11 | 11 | 1 | 7 | 1 | 8 | 6 | 11 | 11 | 0 | 11 |
| 1508 | 4 | 8 | 10 | 7 | 8 | 8 | 4 | 8 | 8 | 10 | 2 | 8 | 1 | 9 |
| 1509 | 0 | 6 | 11 | 1 | 7 | 7 | 1 | 6 | 8 | 1 | 11 | 0 | 9 | 9 |
| 1510 | 4 | 5 | 9 | 1 | 8 | 9 | 8 | 11 | 4 | 11 | 0 | 5 | 10 | 3 |
| 1511 | 8 | 6 | 1 | 6 | 2 | 5 | 0 | 10 | 9 | 5 | 1 | 3 | 5 | 3 |
| 1512 | 3 | 0 | 10 | 11 | 2 | 8 | 0 | 6 | 5 | 6 | 2 | 6 | 10 | 0 |
| 1513 | 7 | 2 | 6 | 2 | 0 | 5 | 11 | 0 | 11 | 1 | 7 | 1 | 0 | 3 |
| 1514 | 11 | 0 | 2 | 5 | 6 | 7 | 7 | 9 | 3 | 4 | 11 | 1 | 3 | 5 |
| 1515 | 8 | 11 | 9 | 3 | 5 | 1 | 10 | 5 | 3 | 9 | 2 | 7 | 0 | 4 |
| 1516 | 7 | 5 | 2 | 7 | 7 | 4 | 7 | 7 | 7 | 5 | 8 | 10 | 1 | 11 |
| 1517 | 11 | 11 | 7 | 1 | 7 | 9 | 10 | 2 | 8 | 8 | 5 | 6 | 5 | 7 |
| 1518 | 8 | 0 | 7 | 10 | 2 | 1 | 0 | 0 | 2 | 10 | 10 | 4 | 7 | 11 |
| 1519 | 6 | 8 | 1 | 4 | 7 | 3 | 3 | 7 | 1 | 6 | 8 | 5 | 0 | 7 |
| 1520 | 4 | 4 | 10 | 2 | 11 | 11 | 4 | 9 | 3 | 0 | 0 | 10 | 4 | 1 |
| 1521 | 6 | 4 | 5 | 11 | 0 | 3 | 6 | 11 | 4 | 10 | 1 | 10 | 11 | 11 |
| 1522 | 6 | 6 | 8 | 9 | 8 | 4 | 4 | 1 | 6 | 4 | 5 | 10 | 3 | 11 |
| 1523 | 1 | 8 | 8 | 0 | 6 | 2 | 8 | 1 | 0 | 0 | 9 | 10 | 2 | 4 |
| 1524 | 4 | 4 | 4 | 7 | 9 | 7 | 10 | 0 | 10 | 6 | 4 | 7 | 8 | 5 |
| 1525 | 1 | 10 | 3 | 8 | 6 | 11 | 1 | 1 | 11 | 2 | 7 | 8 | 0 | 2 |
| 1526 | 8 | 0 | 0 | 4 | 1 | 3 | 11 | 3 | 0 | 9 | 10 | 1 | 2 | 4 |
| 1527 | 2 | 1 | 0 | 4 | 10 | 0 | 4 | 7 | 8 | 6 | 2 | 7 | 5 | 3 |
| 1528 | 7 | 10 | 0 | 11 | 6 | 2 | 3 | 7 | 4 | 7 | 10 | 6 | 1 | 6 |
| 1529 | 10 | 4 | 5 | 6 | 10 | 3 | 10 | 6 | 1 | 2 | 8 | 11 | 7 | 6 |
| 1530 | 4 | 10 | 3 | 6 | 10 | 0 | 10 | 5 | 11 | 0 | 4 | 0 | 6 | 9 |
| 1531 | 8 | 7 | 6 | 6 | 0 | 9 | 3 | 6 | 0 | 9 | 9 | 4 | 9 | 10 |
| 1532 | 2 | 7 | 8 | 3 | 10 | 8 | 10 | 1 | 2 | 5 | 3 | 1 | 0 | 10 |
| 1533 | 7 | 8 | 10 | 3 | 5 | 11 | 10 | 9 | 8 | 7 | 9 | 1 | 3 | 6 |
| 1534 | 0 | 0 | 4 | 9 | 5 | 7 | 8 | 1 | 1 | 1 | 5 | 3 | 6 | 10 |
| 1535 | 2 | 11 | 1 | 7 | 9 | 3 | 11 | 9 | 3 | 11 | 7 | 6 | 10 | 2 |
| 1536 | 4 | 6 | 2 | 10 | 3 | 11 | 6 | 7 | 3 | 7 | 2 | 4 | 10 | 8 |
| 1537 | 3 | 3 | 3 | 6 | 7 | 1 | 9 | 10 | 7 | 4 | 6 | 8 | 3 | 5 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1538 | 11 | 8 | 10 | 0 | 0 | 0 | 3 | 8 | 6 | 11 | 7 | 1 | 1 | 6 |
| 1539 | 0 | 2 | 1 | 11 | 8 | 5 | 8 | 11 | 5 | 10 | 9 | 11 | 9 | 2 |
| 1540 | 8 | 5 | 4 | 1 | 9 | 2 | 11 | 0 | 11 | 5 | 11 | 9 | 4 | 1 |
| 1541 | 11 | 0 | 6 | 9 | 11 | 9 | 1 | 5 | 4 | 6 | 2 | 3 | 6 | 9 |
| 1542 | 4 | 9 | 7 | 7 | 4 | 2 | 4 | 3 | 2 | 8 | 6 | 5 | 8 | 11 |
| 1543 | 6 | 2 | 10 | 2 | 11 | 1 | 0 | 7 | 10 | 3 | 4 | 10 | 5 | 7 |
| 1544 | 5 | 3 | 6 | 7 | 5 | 10 | 0 | 1 | 11 | 0 | 3 | 11 | 11 | 3 |
| 1545 | 0 | 3 | 8 | 2 | 5 | 5 | 4 | 8 | 4 | 7 | 5 | 2 | 3 | 7 |
| 1546 | 7 | 11 | 1 | 1 | 5 | 0 | 11 | 9 | 7 | 3 | 10 | 10 | 7 | 6 |
| 1547 | 2 | 2 | 2 | 6 | 6 | 4 | 4 | 6 | 10 | 9 | 2 | 2 | 2 | 5 |
| 1548 | 7 | 7 | 5 | 9 | 10 | 8 | 8 | 4 | 3 | 11 | 8 | 9 | 1 | 10 |
| 1549 | 6 | 6 | 11 | 4 | 3 | 8 | 2 | 4 | 6 | 0 | 6 | 3 | 9 | 9 |
| 1550 | 3 | 8 | 1 | 8 | 6 | 3 | 0 | 0 | 4 | 11 | 3 | 6 | 5 | 1 |
| 1551 | 11 | 8 | 3 | 4 | 7 | 8 | 5 | 2 | 9 | 7 | 9 | 0 | 10 | 10 |
| 1552 | 10 | 8 | 11 | 5 | 9 | 10 | 4 | 10 | 0 | 2 | 9 | 5 | 5 | 5 |
| 1553 | 7 | 3 | 4 | 7 | 4 | 1 | 11 | 8 | 0 | 1 | 1 | 7 | 1 | 8 |
| 1554 | 0 | 10 | 10 | 1 | 6 | 4 | 5 | 3 | 2 | 0 | 0 | 8 | 7 | 4 |
| 1555 | 8 | 7 | 9 | 0 | 9 | 7 | 1 | 1 | 5 | 6 | 8 | 6 | 7 | 3 |
| 1556 | 2 | 9 | 0 | 3 | 8 | 10 | 0 | 6 | 3 | 11 | 7 | 4 | 6 | 4 |
| 1557 | 7 | 6 | 3 | 11 | 10 | 3 | 11 | 6 | 9 | 4 | 5 | 5 | 4 | 4 |
| 1558 | 9 | 2 | 5 | 11 | 9 | 3 | 4 | 5 | 2 | 1 | 7 | 4 | 3 | 1 |
| 1559 | 8 | 1 | 11 | 8 | 3 | 2 | 8 | 11 | 0 | 4 | 10 | 4 | 11 | 3 |
| 1560 | 0 | 7 | 7 | 11 | 0 | 6 | 1 | 3 | 10 | 7 | 10 | 3 | 2 | 1 |
| 1561 | 8 | 4 | 9 | 6 | 0 | 10 | 7 | 3 | 1 | 11 | 3 | 7 | 9 | 5 |
| 1562 | 5 | 10 | 8 | 6 | 10 | 2 | 4 | 5 | 6 | 6 | 9 | 6 | 0 | 10 |
| 1563 | 9 | 5 | 0 | 11 | 1 | 8 | 9 | 9 | 11 | 7 | 5 | 1 | 8 | 0 |
| 1564 | 1 | 9 | 2 | 11 | 5 | 0 | 3 | 4 | 10 | 6 | 0 | 11 | 0 | 7 |
| 1565 | 8 | 9 | 8 | 4 | 6 | 11 | 10 | 5 | 2 | 10 | 3 | 9 | 10 | 7 |
| 1566 | 9 | 5 | 1 | 1 | 10 | 6 | 10 | 3 | 8 | 9 | 2 | 5 | 1 | 3 |
| 1567 | 5 | 10 | 5 | 10 | 11 | 11 | 8 | 3 | 7 | 9 | 10 | 7 | 5 | 0 |
| 1568 | 2 | 4 | 11 | 2 | 11 | 0 | 7 | 8 | 5 | 4 | 6 | 6 | 2 | 4 |
| 1569 | 1 | 11 | 9 | 5 | 6 | 7 | 3 | 11 | 11 | 2 | 6 | 4 | 1 | 8 |
| 1570 | 3 | 0 | 8 | 8 | 5 | 0 | 7 | 11 | 8 | 0 | 7 | 5 | 6 | 5 |
| 1571 | 10 | 6 | 1 | 5 | 4 | 9 | 3 | 0 | 7 | 7 | 7 | 0 | 0 | 2 |
| 1572 | 1 | 11 | 6 | 5 | 3 | 5 | 2 | 3 | 5 | 7 | 4 | 11 | 10 | 3 |
| 1573 | 5 | 4 | 4 | 3 | 5 | 4 | 9 | 11 | 10 | 0 | 9 | 8 | 8 | 11 |
| 1574 | 5 | 1 | 4 | 1 | 4 | 7 | 9 | 10 | 5 | 1 | 2 | 2 | 3 | 1 |
| 1575 | 9 | 0 | 2 | 9 | 7 | 6 | 9 | 11 | 6 | 8 | 1 | 4 | 2 | 5 |
| 1576 | 0 | 6 | 2 | 3 | 4 | 11 | 11 | 10 | 4 | 10 | 7 | 6 | 3 | 3 |
| 1577 | 10 | 3 | 0 | 0 | 9 | 2 | 6 | 5 | 0 | 0 | 0 | 1 | 0 | 3 |
| 1578 | 2 | 6 | 11 | 10 | 2 | 3 | 3 | 5 | 9 | 8 | 9 | 0 | 6 | 9 |
| 1579 | 5 | 3 | 2 | 11 | 9 | 9 | 5 | 9 | 7 | 4 | 1 | 5 | 1 | 1 |
| 1580 | 10 | 2 | 6 | 1 | 11 | 2 | 1 | 9 | 7 | 9 | 3 | 8 | 11 | 7 |
| 1581 | 6 | 9 | 3 | 3 | 11 | 10 | 4 | 3 | 5 | 9 | 9 | 10 | 10 | 9 |
| 1582 | 11 | 7 | 10 | 0 | 1 | 1 | 4 | 6 | 10 | 6 | 6 | 3 | 3 | 10 |
| 1583 | 8 | 9 | 1 | 9 | 1 | 5 | 5 | 0 | 10 | 8 | 5 | 10 | 1 | 2 |
| 1584 | 7 | 9 | 5 | 5 | 5 | 6 | 5 | 11 | 2 | 6 | 9 | 10 | 2 | 10 |
| 1585 | 7 | 0 | 4 | 3 | 9 | 2 | 8 | 9 | 5 | 2 | 4 | 6 | 3 | 4 |
| 1586 | 5 | 4 | 1 | 1 | 11 | 9 | 11 | 8 | 3 | 11 | 5 | 0 | 5 | 11 |
| 1587 | 3 | 10 | 9 | 0 | 10 | 0 | 2 | 6 | 11 | 10 | 2 | 10 | 1 | 5 |
| 1588 | 6 | 1 | 0 | 7 | 1 | 0 | 6 | 2 | 0 | 11 | 3 | 8 | 6 | 1 |
| 1589 | 7 | 0 | 8 | 0 | 10 | 6 | 1 | 3 | 9 | 8 | 8 | 10 | 11 | 8 |
| 1590 | 0 | 11 | 11 | 0 | 10 | 0 | 5 | 8 | 1 | 1 | 4 | 0 | 7 | 0 |
| 1591 | 4 | 3 | 10 | 9 | 3 | 5 | 11 | 11 | 3 | 2 | 6 | 1 | 2 | 9 |
| 1592 | 6 | 11 | 0 | 3 | 6 | 9 | 9 | 1 | 7 | 3 | 1 | 2 | 10 | 11 |
| 1593 | 3 | 3 | 8 | 0 | 8 | 3 | 11 | 10 | 5 | 0 | 10 | 4 | 1 | 7 |
| 1594 | 10 | 1 | 9 | 8 | 0 | 4 | 2 | 3 | 9 | 0 | 11 | 5 | 11 | 6 |
| 1595 | 2 | 0 | 2 | 0 | 0 | 10 | 1 | 9 | 1 | 10 | 5 | 2 | 0 | 7 |
| 1596 | 0 | 8 | 3 | 1 | 0 | 0 | 11 | 0 | 5 | 9 | 8 | 0 | 0 | 5 |
| 1597 | 1 | 4 | 7 | 2 | 10 | 0 | 6 | 4 | 1 | 11 | 11 | 2 | 11 | 11 |
| 1598 | 9 | 7 | 3 | 3 | 8 | 6 | 8 | 0 | 8 | 8 | 5 | 1 | 9 | 10 |
| 1599 | 9 | 11 | 8 | 4 | 3 | 4 | 5 | 7 | 8 | 3 | 1 | 6 | 8 | 10 |
| 1600 | 0 | 8 | 11 | 11 | 10 | 2 | 7 | 4 | 7 | 0 | 3 | 9 | 4 | 8 |
| 1601 | 1 | 1 | 7 | 3 | 2 | 3 | 5 | 3 | 4 | 0 | 1 | 1 | 8 | 2 |
| 1602 | 2 | 10 | 0 | 5 | 11 | 8 | 8 | 9 | 0 | 10 | 9 | 4 | 4 | 8 |
| 1603 | 0 | 8 | 6 | 3 | 1 | 10 | 7 | 0 | 3 | 2 | 1 | 11 | 3 | 7 |
| 1604 | 8 | 10 | 2 | 5 | 2 | 8 | 1 | 5 | 5 | 1 | 3 | 0 | 1 | 2 |
| 1605 | 11 | 10 | 7 | 4 | 4 | 4 | 9 | 6 | 5 | 0 | 6 | 1 | 6 | 0 |
| 1606 | 1 | 4 | 1 | 4 | 6 | 10 | 9 | 2 | 5 | 7 | 0 | 10 | 0 | 6 |
| 1607 | 1 | 8 | 4 | 7 | 11 | 7 | 11 | 9 | 2 | 9 | 7 | 5 | 2 | 4 |
| 1608 | 0 | 8 | 6 | 2 | 3 | 9 | 9 | 5 | 10 | 3 | 10 | 7 | 9 | 5 |
| 1609 | 2 | 4 | 10 | 0 | 9 | 8 | 5 | 0 | 6 | 6 | 9 | 2 | 5 | 11 |
| 1610 | 3 | 9 | 5 | 11 | 1 | 4 | 10 | 5 | 1 | 2 | 2 | 3 | 11 | 10 |
| 1611 | 8 | 6 | 9 | 3 | 9 | 10 | 3 | 8 | 3 | 0 | 6 | 10 | 2 | 2 |
| 1612 | 2 | 8 | 9 | 8 | 9 | 0 | 8 | 3 | 10 | 7 | 4 | 4 | 7 | 11 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1613 | 2 | 3 | 5 | 5 | 1 | 8 | 10 | 10 | 4 | 5 | 6 | 2 | 1 | 4 |
| 1614 | 3 | 1 | 2 | 9 | 11 | 0 | 4 | 5 | 5 | 7 | 0 | 9 | 8 | 11 |
| 1615 | 8 | 11 | 2 | 10 | 11 | 9 | 8 | 6 | 10 | 0 | 11 | 0 | 6 | 8 |
| 1616 | 11 | 6 | 2 | 6 | 7 | 7 | 5 | 5 | 10 | 10 | 6 | 4 | 9 | 11 |
| 1617 | 11 | 11 | 9 | 3 | 2 | 3 | 6 | 6 | 7 | 5 | 5 | 7 | 7 | 9 |
| 1618 | 7 | 0 | 10 | 8 | 4 | 5 | 5 | 10 | 10 | 5 | 11 | 0 | 0 | 7 |
| 1619 | 1 | 2 | 7 | 5 | 5 | 10 | 10 | 7 | 6 | 4 | 1 | 10 | 3 | 0 |
| 1620 | 0 | 7 | 1 | 1 | 8 | 6 | 2 | 1 | 1 | 4 | 1 | 4 | 6 | 0 |
| 1621 | 7 | 3 | 4 | 4 | 8 | 8 | 0 | 11 | 7 | 8 | 3 | 4 | 4 | 0 |
| 1622 | 3 | 7 | 1 | 7 | 2 | 9 | 2 | 9 | 2 | 11 | 9 | 2 | 8 | 9 |
| 1623 | 11 | 1 | 4 | 11 | 2 | 6 | 2 | 11 | 6 | 4 | 4 | 6 | 4 | 9 |
| 1624 | 3 | 10 | 3 | 4 | 6 | 6 | 0 | 8 | 1 | 9 | 8 | 10 | 3 | 4 |
| 1625 | 10 | 5 | 8 | 6 | 8 | 10 | 5 | 8 | 5 | 3 | 5 | 8 | 4 | 3 |
| 1626 | 9 | 7 | 2 | 11 | 6 | 11 | 7 | 5 | 4 | 6 | 4 | 1 | 11 | 8 |
| 1627 | 6 | 4 | 7 | 6 | 8 | 11 | 4 | 10 | 11 | 0 | 2 | 1 | 5 | 6 |
| 1628 | 1 | 6 | 4 | 6 | 2 | 8 | 1 | 6 | 2 | 5 | 2 | 9 | 8 | 7 |
| 1629 | 4 | 4 | 10 | 6 | 5 | 4 | 10 | 0 | 4 | 8 | 3 | 0 | 0 | 4 |
| 1630 | 10 | 5 | 2 | 2 | 10 | 8 | 11 | 1 | 1 | 8 | 9 | 9 | 8 | 2 |
| 1631 | 8 | 6 | 0 | 2 | 7 | 6 | 4 | 2 | 0 | 5 | 4 | 3 | 9 | 0 |
| 1632 | 7 | 6 | 6 | 8 | 0 | 9 | 6 | 1 | 3 | 8 | 0 | 8 | 8 | 10 |
| 1633 | 4 | 2 | 6 | 10 | 6 | 8 | 6 | 3 | 8 | 1 | 6 | 11 | 6 | 2 |
| 1634 | 6 | 11 | 2 | 1 | 3 | 5 | 4 | 0 | 3 | 10 | 3 | 9 | 6 | 4 |
| 1635 | 8 | 3 | 8 | 6 | 4 | 10 | 8 | 10 | 0 | 8 | 8 | 9 | 7 | 6 |
| 1636 | 6 | 2 | 8 | 10 | 2 | 6 | 3 | 8 | 4 | 6 | 10 | 5 | 7 | 0 |
| 1637 | 6 | 9 | 8 | 5 | 5 | 0 | 11 | 0 | 0 | 5 | 5 | 4 | 5 | 4 |
| 1638 | 3 | 8 | 0 | 6 | 4 | 6 | 6 | 4 | 4 | 1 | 10 | 1 | 4 | 7 |
| 1639 | 9 | 1 | 1 | 8 | 5 | 2 | 3 | 6 | 6 | 11 | 1 | 3 | 4 | 8 |
| 1640 | 0 | 11 | 3 | 2 | 11 | 2 | 6 | 11 | 8 | 11 | 0 | 9 | 3 | 9 |
| 1641 | 4 | 3 | 7 | 5 | 7 | 9 | 1 | 2 | 1 | 2 | 3 | 3 | 4 | 3 |
| 1642 | 10 | 0 | 0 | 6 | 2 | 9 | 11 | 11 | 3 | 5 | 3 | 2 | 3 | 4 |
| 1643 | 2 | 1 | 2 | 0 | 8 | 1 | 10 | 11 | 2 | 5 | 10 | 11 | 5 | 5 |
| 1644 | 4 | 10 | 4 | 2 | 5 | 7 | 7 | 3 | 4 | 3 | 10 | 3 | 1 | 2 |
| 1645 | 8 | 7 | 4 | 7 | 10 | 7 | 0 | 5 | 1 | 8 | 0 | 11 | 1 | 6 |
| 1646 | 7 | 10 | 6 | 11 | 5 | 5 | 2 | 2 | 3 | 4 | 8 | 2 | 0 | 5 |
| 1647 | 2 | 1 | 9 | 4 | 3 | 2 | 7 | 10 | 3 | 11 | 8 | 0 | 8 | 2 |
| 1648 | 11 | 7 | 5 | 7 | 6 | 0 | 9 | 11 | 3 | 8 | 9 | 1 | 4 | 4 |
| 1649 | 5 | 8 | 7 | 4 | 9 | 11 | 4 | 0 | 2 | 7 | 8 | 6 | 4 | 8 |
| 1650 | 0 | 4 | 3 | 8 | 4 | 1 | 7 | 11 | 6 | 3 | 2 | 6 | 0 | 8 |
| 1651 | 1 | 4 | 2 | 10 | 11 | 11 | 1 | 5 | 9 | 3 | 1 | 11 | 7 | 6 |
| 1652 | 8 | 1 | 3 | 3 | 1 | 7 | 11 | 4 | 10 | 3 | 11 | 3 | 7 | 4 |
| 1653 | 1 | 2 | 8 | 9 | 7 | 4 | 6 | 1 | 11 | 0 | 4 | 2 | 6 | 8 |
| 1654 | 4 | 11 | 11 | 6 | 6 | 7 | 10 | 10 | 8 | 9 | 10 | 9 | 8 | 1 |
| 1655 | 7 | 9 | 9 | 6 | 11 | 8 | 10 | 11 | 3 | 0 | 11 | 7 | 5 | 7 |
| 1656 | 1 | 0 | 10 | 6 | 5 | 11 | 0 | 8 | 3 | 10 | 11 | 3 | 10 | 9 |
| 1657 | 4 | 10 | 10 | 8 | 0 | 2 | 10 | 9 | 10 | 10 | 0 | 3 | 6 | 3 |
| 1658 | 4 | 7 | 0 | 7 | 0 | 5 | 2 | 7 | 9 | 1 | 4 | 4 | 1 | 2 |
| 1659 | 5 | 2 | 9 | 3 | 3 | 7 | 3 | 3 | 5 | 10 | 0 | 5 | 4 | 7 |
| 1660 | 9 | 0 | 3 | 4 | 2 | 10 | 2 | 9 | 4 | 1 | 1 | 11 | 1 | 4 |
| 1661 | 3 | 1 | 8 | 11 | 9 | 9 | 2 | 4 | 9 | 9 | 10 | 0 | 3 | 10 |
| 1662 | 10 | 10 | 2 | 7 | 0 | 5 | 5 | 6 | 0 | 2 | 7 | 9 | 11 | 0 |
| 1663 | 11 | 3 | 4 | 1 | 0 | 10 | 5 | 7 | 7 | 1 | 11 | 11 | 7 | 11 |
| 1664 | 2 | 1 | 6 | 3 | 5 | 1 | 6 | 0 | 1 | 8 | 4 | 10 | 4 | 6 |
| 1665 | 7 | 1 | 8 | 2 | 11 | 11 | 11 | 7 | 4 | 11 | 2 | 8 | 9 | 5 |
| 1666 | 7 | 5 | 1 | 11 | 1 | 3 | 3 | 0 | 1 | 9 | 9 | 7 | 2 | 5 |
| 1667 | 3 | 11 | 10 | 11 | 1 | 8 | 8 | 1 | 6 | 9 | 3 | 4 | 9 | 6 |
| 1668 | 10 | 4 | 10 | 11 | 7 | 1 | 7 | 8 | 3 | 2 | 4 | 4 | 6 | 2 |
| 1669 | 11 | 10 | 11 | 10 | 0 | 10 | 7 | 5 | 3 | 7 | 4 | 2 | 2 | 6 |
| 1670 | 7 | 11 | 4 | 9 | 3 | 6 | 10 | 10 | 11 | 4 | 7 | 3 | 2 | 7 |
| 1671 | 10 | 9 | 10 | 4 | 2 | 11 | 1 | 0 | 8 | 8 | 4 | 7 | 7 | 1 |
| 1672 | 7 | 1 | 6 | 0 | 4 | 3 | 10 | 7 | 1 | 2 | 6 | 6 | 10 | 7 |
| 1673 | 6 | 8 | 5 | 4 | 6 | 1 | 8 | 10 | 9 | 5 | 2 | 10 | 9 | 3 |
| 1674 | 9 | 3 | 8 | 2 | 0 | 9 | 7 | 1 | 0 | 10 | 6 | 5 | 9 | 8 |
| 1675 | 10 | 6 | 9 | 1 | 5 | 7 | 7 | 7 | 5 | 0 | 5 | 1 | 8 | 10 |
| 1676 | 7 | 4 | 7 | 9 | 7 | 2 | 11 | 7 | 2 | 5 | 5 | 3 | 11 | 2 |
| 1677 | 10 | 0 | 9 | 7 | 7 | 2 | 10 | 8 | 1 | 5 | 6 | 9 | 0 | 8 |
| 1678 | 8 | 5 | 3 | 3 | 6 | 0 | 1 | 6 | 4 | 7 | 0 | 11 | 11 | 10 |
| 1679 | 8 | 10 | 0 | 5 | 6 | 1 | 2 | 4 | 1 | 11 | 2 | 8 | 10 | 6 |
| 1680 | 3 | 9 | 11 | 10 | 4 | 1 | 5 | 2 | 11 | 7 | 3 | 7 | 0 | 11 |
| 1681 | 8 | 2 | 5 | 0 | 5 | 2 | 9 | 6 | 0 | 2 | 8 | 2 | 5 | 7 |
| 1682 | 5 | 4 | 7 | 3 | 11 | 1 | 3 | 1 | 11 | 2 | 7 | 2 | 7 | 1 |
| 1683 | 4 | 2 | 9 | 1 | 2 | 3 | 5 | 0 | 2 | 7 | 10 | 10 | 11 | 3 |
| 1684 | 9 | 10 | 4 | 10 | 8 | 11 | 2 | 10 | 5 | 2 | 11 | 3 | 11 | 3 |
| 1685 | 2 | 3 | 3 | 0 | 7 | 7 | 8 | 6 | 2 | 7 | 2 | 5 | 0 | 2 |
| 1686 | 6 | 2 | 7 | 3 | 3 | 10 | 1 | 6 | 9 | 1 | 8 | 8 | 0 | 3 |
| 1687 | 6 | 5 | 1 | 10 | 9 | 7 | 5 | 4 | 8 | 8 | 0 | 2 | 4 | 10 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1688 | 10 | 7 | 7 | 9 | 5 | 9 | 7 | 3 | 6 | 9 | 0 | 2 | 11 | 3 |
| 1689 | 9 | 7 | 5 | 2 | 0 | 4 | 1 | 2 | 3 | 6 | 0 | 10 | 3 | 5 |
| 1690 | 10 | 5 | 3 | 9 | 3 | 8 | 1 | 2 | 2 | 11 | 10 | 4 | 9 | 4 |
| 1691 | 8 | 10 | 5 | 9 | 5 | 8 | 0 | 9 | 4 | 4 | 5 | 11 | 2 | 9 |
| 1692 | 11 | 8 | 8 | 6 | 9 | 3 | 8 | 9 | 9 | 6 | 6 | 8 | 11 | 9 |
| 1693 | 5 | 5 | 10 | 8 | 7 | 11 | 5 | 4 | 5 | 9 | 6 | 6 | 3 | 2 |
| 1694 | 10 | 2 | 7 | 10 | 7 | 2 | 3 | 1 | 10 | 8 | 2 | 4 | 4 | 4 |
| 1695 | 9 | 1 | 0 | 9 | 0 | 10 | 5 | 10 | 9 | 4 | 6 | 1 | 5 | 10 |
| 1696 | 0 | 7 | 4 | 4 | 1 | 6 | 8 | 8 | 2 | 3 | 9 | 7 | 0 | 11 |
| 1697 | 3 | 5 | 11 | 5 | 7 | 2 | 7 | 9 | 1 | 8 | 5 | 7 | 6 | 10 |
| 1698 | 11 | 6 | 3 | 0 | 6 | 10 | 9 | 4 | 10 | 1 | 5 | 6 | 8 | 2 |
| 1699 | 9 | 4 | 7 | 8 | 10 | 7 | 5 | 2 | 7 | 7 | 5 | 8 | 9 | 9 |
| 1700 | 6 | 6 | 3 | 2 | 0 | 11 | 10 | 8 | 2 | 6 | 9 | 1 | 9 | 3 |
| 1701 | 7 | 7 | 1 | 3 | 7 | 1 | 7 | 5 | 9 | 5 | 10 | 5 | 2 | 7 |
| 1702 | 1 | 8 | 2 | 0 | 7 | 3 | 2 | 3 | 8 | 11 | 2 | 7 | 2 | 11 |
| 1703 | 11 | 2 | 1 | 9 | 1 | 8 | 0 | 10 | 8 | 7 | 0 | 8 | 9 | 5 |
| 1704 | 8 | 5 | 6 | 8 | 7 | 10 | 6 | 2 | 7 | 10 | 1 | 5 | 5 | 8 |
| 1705 | 5 | 11 | 7 | 9 | 8 | 0 | 2 | 5 | 4 | 11 | 9 | 4 | 5 | 2 |
| 1706 | 6 | 6 | 9 | 4 | 6 | 2 | 4 | 2 | 4 | 3 | 11 | 6 | 11 | 7 |
| 1707 | 2 | 5 | 5 | 9 | 11 | 5 | 2 | 11 | 2 | 3 | 0 | 6 | 7 | 7 |
| 1708 | 9 | 9 | 9 | 9 | 10 | 9 | 9 | 8 | 11 | 4 | 9 | 9 | 6 | 1 |
| 1709 | 4 | 0 | 0 | 4 | 7 | 3 | 5 | 10 | 3 | 1 | 7 | 9 | 9 | 5 |
| 1710 | 11 | 4 | 3 | 11 | 11 | 6 | 4 | 0 | 7 | 1 | 8 | 8 | 2 | 6 |
| 1711 | 4 | 11 | 2 | 6 | 1 | 5 | 0 | 6 | 1 | 4 | 6 | 5 | 0 | 3 |
| 1712 | 4 | 6 | 4 | 11 | 11 | 10 | 7 | 4 | 0 | 11 | 2 | 2 | 5 | 4 |
| 1713 | 2 | 8 | 6 | 5 | 10 | 6 | 0 | 5 | 8 | 10 | 1 | 10 | 10 | 11 |
| 1714 | 2 | 11 | 3 | 7 | 4 | 9 | 10 | 11 | 3 | 9 | 8 | 4 | 2 | 3 |
| 1715 | 5 | 7 | 10 | 10 | 1 | 2 | 10 | 2 | 0 | 7 | 8 | 0 | 11 | 6 |
| 1716 | 0 | 3 | 8 | 7 | 7 | 2 | 0 | 3 | 9 | 1 | 0 | 0 | 5 | 1 |
| 1717 | 11 | 1 | 7 | 1 | 10 | 11 | 3 | 9 | 7 | 10 | 8 | 3 | 1 | 2 |
| 1718 | 3 | 5 | 2 | 1 | 4 | 5 | 1 | 10 | 9 | 0 | 0 | 7 | 10 | 2 |
| 1719 | 5 | 0 | 3 | 0 | 4 | 4 | 1 | 1 | 0 | 11 | 11 | 8 | 5 | 10 |
| 1720 | 11 | 11 | 11 | 7 | 0 | 3 | 9 | 1 | 1 | 10 | 3 | 6 | 3 | 10 |
| 1721 | 7 | 9 | 4 | 10 | 9 | 0 | 7 | 1 | 7 | 7 | 6 | 1 | 6 | 10 |
| 1722 | 9 | 0 | 6 | 5 | 9 | 4 | 1 | 4 | 9 | 3 | 5 | 4 | 9 | 2 |
| 1723 | 0 | 0 | 3 | 11 | 3 | 8 | 10 | 6 | 10 | 9 | 4 | 10 | 6 | 10 |
| 1724 | 0 | 11 | 8 | 6 | 0 | 2 | 10 | 4 | 3 | 3 | 7 | 10 | 1 | 4 |
| 1725 | 1 | 1 | 4 | 3 | 7 | 8 | 8 | 7 | 7 | 3 | 7 | 0 | 9 | 1 |
| 1726 | 8 | 9 | 4 | 2 | 6 | 5 | 6 | 1 | 3 | 1 | 8 | 0 | 3 | 6 |
| 1727 | 10 | 5 | 11 | 3 | 2 | 2 | 2 | 8 | 2 | 4 | 3 | 1 | 1 | 1 |
| 1728 | 6 | 5 | 4 | 2 | 6 | 0 | 10 | 0 | 5 | 8 | 10 | 10 | 6 | 8 |
| 1729 | 4 | 0 | 4 | 10 | 3 | 9 | 2 | 2 | 6 | 5 | 1 | 5 | 6 | 7 |
| 1730 | 3 | 8 | 7 | 10 | 5 | 6 | 11 | 3 | 8 | 3 | 4 | 6 | 9 | 4 |
| 1731 | 0 | 0 | 8 | 7 | 4 | 8 | 6 | 5 | 11 | 11 | 1 | 4 | 8 | 6 |
| 1732 | 5 | 10 | 10 | 2 | 1 | 3 | 7 | 10 | 8 | 11 | 5 | 6 | 7 | 0 |
| 1733 | 11 | 4 | 0 | 1 | 5 | 7 | 2 | 8 | 6 | 5 | 9 | 7 | 3 | 2 |
| 1734 | 0 | 1 | 1 | 2 | 11 | 4 | 0 | 0 | 2 | 1 | 6 | 11 | 11 | 10 |
| 1735 | 11 | 10 | 11 | 2 | 1 | 6 | 9 | 0 | 0 | 6 | 11 | 5 | 10 | 1 |
| 1736 | 0 | 11 | 5 | 8 | 1 | 3 | 1 | 9 | 1 | 3 | 8 | 4 | 5 | 9 |
| 1737 | 7 | 4 | 11 | 3 | 0 | 10 | 10 | 0 | 8 | 10 | 2 | 4 | 11 | 8 |
| 1738 | 0 | 2 | 4 | 0 | 10 | 3 | 4 | 7 | 4 | 6 | 8 | 1 | 2 | 4 |
| 1739 | 4 | 11 | 6 | 2 | 8 | 4 | 0 | 8 | 0 | 9 | 9 | 2 | 6 | 9 |
| 1740 | 10 | 4 | 0 | 0 | 8 | 9 | 9 | 2 | 10 | 4 | 6 | 11 | 4 | 7 |
| 1741 | 5 | 0 | 1 | 10 | 4 | 5 | 4 | 7 | 4 | 0 | 6 | 9 | 11 | 9 |
| 1742 | 9 | 8 | 11 | 7 | 7 | 9 | 0 | 1 | 6 | 2 | 8 | 8 | 7 | 0 |
| 1743 | 6 | 8 | 2 | 3 | 0 | 7 | 6 | 2 | 5 | 8 | 1 | 7 | 9 | 0 |
| 1744 | 3 | 3 | 10 | 3 | 10 | 3 | 1 | 4 | 8 | 4 | 8 | 3 | 9 | 11 |
| 1745 | 3 | 3 | 7 | 5 | 2 | 0 | 0 | 11 | 10 | 5 | 10 | 1 | 10 | 8 |
| 1746 | 8 | 5 | 3 | 6 | 9 | 7 | 2 | 3 | 0 | 4 | 7 | 0 | 0 | 7 |
| 1747 | 4 | 11 | 5 | 0 | 8 | 6 | 10 | 7 | 5 | 8 | 2 | 8 | 3 | 11 |
| 1748 | 2 | 4 | 6 | 2 | 6 | 3 | 11 | 9 | 0 | 6 | 2 | 1 | 1 | 10 |
| 1749 | 1 | 10 | 5 | 8 | 8 | 9 | 4 | 10 | 1 | 11 | 4 | 5 | 2 | 8 |
| 1750 | 11 | 2 | 2 | 8 | 1 | 0 | 3 | 7 | 3 | 2 | 3 | 6 | 7 | 3 |
| 1751 | 9 | 3 | 7 | 0 | 4 | 8 | 3 | 9 | 2 | 5 | 3 | 10 | 2 | 6 |
| 1752 | 10 | 7 | 7 | 10 | 1 | 7 | 1 | 8 | 7 | 5 | 7 | 11 | 10 | 10 |
| 1753 | 5 | 1 | 11 | 4 | 5 | 4 | 4 | 10 | 1 | 6 | 3 | 3 | 7 | 7 |
| 1754 | 10 | 6 | 3 | 2 | 9 | 1 | 5 | 7 | 3 | 10 | 1 | 8 | 11 | 6 |
| 1755 | 9 | 0 | 7 | 1 | 1 | 11 | 4 | 7 | 9 | 6 | 10 | 2 | 6 | 0 |
| 1756 | 9 | 6 | 8 | 5 | 6 | 4 | 8 | 11 | 1 | 1 | 0 | 7 | 2 | 9 |
| 1757 | 7 | 4 | 3 | 10 | 1 | 5 | 10 | 3 | 4 | 3 | 0 | 8 | 4 | 11 |
| 1758 | 7 | 5 | 11 | 8 | 11 | 4 | 6 | 5 | 8 | 1 | 9 | 2 | 9 | 1 |
| 1759 | 11 | 5 | 2 | 5 | 8 | 8 | 6 | 3 | 4 | 9 | 10 | 6 | 10 | 11 |
| 1760 | 5 | 3 | 11 | 9 | 1 | 0 | 8 | 8 | 6 | 10 | 5 | 8 | 8 | 8 |
| 1761 | 0 | 5 | 9 | 11 | 3 | 3 | 1 | 4 | 6 | 5 | 7 | 2 | 8 | 3 |
| 1762 | 11 | 9 | 11 | 11 | 2 | 11 | 7 | 7 | 1 | 1 | 9 | 5 | 1 | 7 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1763 | 2 | 11 | 1 | 4 | 4 | 1 | 8 | 3 | 6 | 10 | 11 | 1 | 5 | 4 |
| 1764 | 11 | 1 | 3 | 5 | 5 | 5 | 3 | 5 | 9 | 5 | 6 | 6 | 0 | 1 |
| 1765 | 1 | 6 | 0 | 7 | 5 | 4 | 9 | 8 | 2 | 2 | 4 | 10 | 11 | 5 |
| 1766 | 5 | 5 | 4 | 8 | 2 | 5 | 9 | 9 | 7 | 11 | 0 | 0 | 4 | 4 |
| 1767 | 1 | 8 | 1 | 1 | 1 | 5 | 6 | 6 | 7 | 1 | 0 | 6 | 2 | 8 |
| 1768 | 8 | 11 | 1 | 10 | 2 | 4 | 2 | 7 | 11 | 6 | 5 | 11 | 4 | 5 |
| 1769 | 3 | 9 | 5 | 2 | 2 | 7 | 8 | 8 | 5 | 10 | 4 | 2 | 0 | 0 |
| 1770 | 5 | 10 | 0 | 4 | 10 | 1 | 11 | 0 | 7 | 3 | 0 | 4 | 2 | 2 |
| 1771 | 0 | 0 | 10 | 10 | 8 | 9 | 6 | 9 | 2 | 2 | 5 | 9 | 9 | 11 |
| 1772 | 6 | 10 | 7 | 7 | 9 | 3 | 8 | 6 | 10 | 8 | 5 | 11 | 5 | 5 |
| 1773 | 3 | 6 | 1 | 6 | 0 | 8 | 4 | 9 | 5 | 8 | 11 | 3 | 0 | 8 |
| 1774 | 2 | 0 | 1 | 6 | 11 | 5 | 9 | 1 | 1 | 7 | 8 | 11 | 5 | 8 |
| 1775 | 3 | 6 | 4 | 1 | 7 | 11 | 10 | 4 | 6 | 7 | 10 | 7 | 1 | 6 |
| 1776 | 7 | 6 | 0 | 2 | 9 | 5 | 8 | 3 | 8 | 0 | 7 | 9 | 10 | 1 |
| 1777 | 6 | 0 | 9 | 0 | 11 | 4 | 6 | 0 | 10 | 4 | 7 | 3 | 10 | 3 |
| 1778 | 4 | 5 | 1 | 9 | 0 | 2 | 8 | 7 | 11 | 7 | 10 | 0 | 5 | 9 |
| 1779 | 4 | 5 | 9 | 5 | 6 | 9 | 6 | 7 | 7 | 6 | 11 | 8 | 2 | 5 |
| 1780 | 2 | 9 | 2 | 5 | 11 | 5 | 6 | 2 | 6 | 2 | 11 | 5 | 8 | 10 |
| 1781 | 4 | 6 | 10 | 7 | 1 | 5 | 1 | 1 | 8 | 6 | 1 | 0 | 8 | 8 |
| 1782 | 6 | 7 | 1 | 9 | 4 | 5 | 0 | 6 | 3 | 3 | 10 | 3 | 8 | 11 |
| 1783 | 6 | 5 | 5 | 0 | 8 | 10 | 9 | 11 | 1 | 6 | 1 | 9 | 1 | 1 |
| 1784 | 9 | 8 | 4 | 6 | 5 | 4 | 3 | 3 | 5 | 4 | 5 | 10 | 7 | 1 |
| 1785 | 10 | 5 | 6 | 1 | 2 | 4 | 9 | 4 | 0 | 10 | 2 | 9 | 0 | 6 |
| 1786 | 11 | 7 | 6 | 5 | 0 | 2 | 6 | 10 | 6 | 6 | 8 | 9 | 5 | 4 |
| 1787 | 11 | 7 | 2 | 8 | 10 | 11 | 0 | 4 | 2 | 4 | 7 | 7 | 2 | 5 |
| 1788 | 10 | 10 | 10 | 9 | 6 | 3 | 2 | 11 | 4 | 8 | 11 | 9 | 3 | 11 |
| 1789 | 5 | 3 | 1 | 2 | 6 | 7 | 7 | 6 | 1 | 5 | 7 | 7 | 11 | 6 |
| 1790 | 3 | 7 | 8 | 10 | 5 | 10 | 1 | 4 | 11 | 2 | 1 | 8 | 5 | 1 |
| 1791 | 1 | 2 | 5 | 7 | 0 | 0 | 5 | 8 | 8 | 7 | 8 | 6 | 10 | 2 |
| 1792 | 3 | 6 | 11 | 11 | 1 | 3 | 9 | 7 | 10 | 6 | 7 | 2 | 0 | 4 |
| 1793 | 1 | 5 | 0 | 4 | 4 | 9 | 11 | 9 | 9 | 10 | 10 | 11 | 1 | 6 |
| 1794 | 11 | 7 | 9 | 8 | 3 | 4 | 0 | 8 | 8 | 5 | 5 | 0 | 11 | 0 |
| 1795 | 6 | 0 | 3 | 7 | 10 | 10 | 3 | 0 | 11 | 7 | 1 | 6 | 2 | 3 |
| 1796 | 10 | 3 | 8 | 10 | 8 | 0 | 10 | 6 | 4 | 2 | 6 | 3 | 8 | 9 |
| 1797 | 8 | 2 | 7 | 0 | 3 | 1 | 8 | 1 | 7 | 0 | 1 | 1 | 10 | 10 |
| 1798 | 5 | 11 | 2 | 2 | 3 | 6 | 7 | 7 | 1 | 8 | 10 | 5 | 4 | 1 |
| 1799 | 2 | 2 | 4 | 9 | 6 | 8 | 2 | 4 | 11 | 6 | 4 | 4 | 8 | 1 |
| 1800 | 4 | 11 | 3 | 8 | 7 | 8 | 6 | 1 | 2 | 3 | 6 | 8 | 7 | 4 |
| 1801 | 3 | 1 | 9 | 8 | 11 | 9 | 3 | 1 | 0 | 4 | 0 | 2 | 3 | 2 |
| 1802 | 2 | 6 | 10 | 10 | 1 | 11 | 8 | 11 | 6 | 4 | 8 | 11 | 5 | 10 |
| 1803 | 10 | 0 | 1 | 11 | 2 | 4 | 1 | 11 | 7 | 3 | 11 | 0 | 2 | 11 |
| 1804 | 3 | 2 | 2 | 6 | 6 | 11 | 8 | 2 | 3 | 7 | 5 | 3 | 4 | 0 |
| 1805 | 6 | 7 | 0 | 2 | 11 | 3 | 2 | 1 | 9 | 0 | 7 | 5 | 8 | 7 |
| 1806 | 0 | 8 | 6 | 9 | 8 | 10 | 9 | 3 | 8 | 11 | 11 | 1 | 1 | 3 |
| 1807 | 4 | 5 | 4 | 9 | 4 | 0 | 9 | 6 | 6 | 7 | 3 | 7 | 10 | 5 |
| 1808 | 7 | 5 | 8 | 3 | 11 | 10 | 4 | 11 | 1 | 1 | 10 | 8 | 7 | 2 |
| 1809 | 4 | 9 | 0 | 5 | 10 | 9 | 1 | 3 | 10 | 3 | 0 | 7 | 5 | 7 |
| 1810 | 8 | 7 | 9 | 2 | 10 | 0 | 4 | 3 | 5 | 8 | 6 | 9 | 0 | 5 |
| 1811 | 5 | 7 | 6 | 1 | 10 | 4 | 5 | 4 | 9 | 1 | 4 | 2 | 5 | 10 |
| 1812 | 8 | 0 | 8 | 8 | 1 | 5 | 1 | 5 | 4 | 5 | 4 | 9 | 4 | 10 |
| 1813 | 2 | 5 | 6 | 0 | 7 | 9 | 2 | 10 | 7 | 1 | 0 | 10 | 11 | 3 |
| 1814 | 8 | 5 | 5 | 2 | 9 | 1 | 6 | 4 | 0 | 3 | 5 | 6 | 2 | 0 |
| 1815 | 3 | 6 | 4 | 0 | 5 | 7 | 3 | 2 | 1 | 10 | 3 | 5 | 9 | 9 |
| 1816 | 6 | 8 | 2 | 1 | 8 | 2 | 10 | 4 | 3 | 0 | 1 | 0 | 0 | 2 |
| 1817 | 9 | 1 | 1 | 0 | 6 | 10 | 5 | 8 | 2 | 2 | 8 | 2 | 6 | 0 |
| 1818 | 6 | 11 | 1 | 9 | 5 | 5 | 8 | 10 | 7 | 5 | 3 | 11 | 1 | 0 |
| 1819 | 5 | 10 | 7 | 10 | 3 | 7 | 9 | 10 | 11 | 11 | 7 | 8 | 8 | 5 |
| 1820 | 4 | 9 | 5 | 8 | 11 | 10 | 8 | 7 | 6 | 6 | 9 | 3 | 8 | 6 |
| 1821 | 7 | 8 | 3 | 7 | 0 | 5 | 0 | 3 | 6 | 9 | 5 | 3 | 5 | 2 |
| 1822 | 7 | 4 | 3 | 0 | 8 | 7 | 11 | 7 | 3 | 1 | 11 | 9 | 8 | 1 |
| 1823 | 1 | 9 | 10 | 4 | 9 | 2 | 10 | 1 | 1 | 11 | 5 | 4 | 7 | 11 |
| 1824 | 11 | 1 | 5 | 9 | 1 | 7 | 11 | 2 | 4 | 6 | 8 | 7 | 1 | 8 |
| 1825 | 9 | 10 | 9 | 0 | 7 | 2 | 3 | 6 | 5 | 0 | 9 | 7 | 5 | 6 |
| 1826 | 2 | 3 | 8 | 4 | 0 | 2 | 11 | 3 | 11 | 8 | 9 | 2 | 2 | 0 |
| 1827 | 1 | 3 | 7 | 3 | 1 | 11 | 6 | 5 | 8 | 9 | 6 | 0 | 2 | 6 |
| 1828 | 3 | 1 | 11 | 10 | 9 | 6 | 11 | 9 | 6 | 9 | 2 | 10 | 6 | 9 |
| 1829 | 7 | 11 | 4 | 6 | 9 | 9 | 7 | 0 | 10 | 1 | 2 | 0 | 10 | 11 |
| 1830 | 5 | 2 | 11 | 2 | 7 | 1 | 10 | 2 | 4 | 5 | 11 | 8 | 5 | 2 |
| 1831 | 3 | 1 | 10 | 3 | 0 | 7 | 10 | 10 | 4 | 11 | 9 | 0 | 11 | 9 |
| 1832 | 1 | 10 | 11 | 0 | 11 | 2 | 8 | 9 | 3 | 4 | 6 | 11 | 6 | 5 |
| 1833 | 8 | 2 | 0 | 4 | 4 | 2 | 2 | 2 | 8 | 9 | 6 | 5 | 3 | 8 |
| 1834 | 10 | 10 | 5 | 5 | 6 | 2 | 0 | 11 | 5 | 11 | 7 | 0 | 9 | 0 |
| 1835 | 9 | 6 | 10 | 6 | 10 | 7 | 4 | 1 | 0 | 9 | 7 | 5 | 4 | 2 |
| 1836 | 11 | 3 | 10 | 10 | 1 | 6 | 1 | 7 | 0 | 3 | 10 | 10 | 8 | 11 |
| 1837 | 5 | 0 | 5 | 6 | 3 | 1 | 7 | 8 | 0 | 1 | 6 | 4 | 0 | 9 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1838 | 2 | 7 | 11 | 7 | 2 | 9 | 4 | 10 | 3 | 5 | 7 | 11 | 0 | 8 |
| 1839 | 5 | 8 | 2 | 0 | 0 | 3 | 5 | 7 | 5 | 7 | 7 | 4 | 3 | 3 |
| 1840 | 7 | 2 | 0 | 3 | 3 | 7 | 11 | 11 | 4 | 0 | 3 | 6 | 2 | 0 |
| 1841 | 6 | 4 | 1 | 3 | 2 | 3 | 4 | 0 | 7 | 10 | 6 | 3 | 3 | 2 |
| 1842 | 5 | 2 | 10 | 10 | 0 | 10 | 5 | 9 | 11 | 5 | 10 | 7 | 4 | 4 |
| 1843 | 6 | 6 | 1 | 2 | 4 | 5 | 1 | 9 | 10 | 4 | 0 | 5 | 6 | 1 |
| 1844 | 7 | 6 | 9 | 7 | 2 | 3 | 8 | 10 | 1 | 3 | 11 | 4 | 7 | 3 |
| 1845 | 2 | 9 | 9 | 6 | 6 | 0 | 9 | 6 | 0 | 3 | 11 | 1 | 6 | 9 |
| 1846 | 5 | 5 | 8 | 5 | 9 | 10 | 0 | 10 | 10 | 10 | 4 | 11 | 3 | 4 |
| 1847 | 10 | 4 | 0 | 8 | 1 | 6 | 2 | 4 | 3 | 1 | 8 | 3 | 0 | 4 |
| 1848 | 8 | 11 | 7 | 4 | 1 | 6 | 10 | 9 | 6 | 5 | 3 | 7 | 5 | 3 |
| 1849 | 7 | 6 | 7 | 9 | 4 | 7 | 7 | 11 | 9 | 3 | 4 | 8 | 4 | 1 |
| 1850 | 2 | 11 | 7 | 6 | 3 | 3 | 1 | 6 | 2 | 0 | 5 | 4 | 2 | 8 |
| 1851 | 4 | 9 | 9 | 10 | 7 | 7 | 11 | 7 | 8 | 10 | 3 | 2 | 1 | 4 |
| 1852 | 10 | 9 | 1 | 11 | 4 | 5 | 4 | 6 | 1 | 9 | 4 | 4 | 1 | 6 |
| 1853 | 1 | 3 | 1 | 5 | 5 | 0 | 6 | 11 | 3 | 10 | 4 | 8 | 5 | 11 |
| 1854 | 3 | 1 | 6 | 6 | 0 | 1 | 3 | 11 | 10 | 10 | 6 | 9 | 5 | 3 |
| 1855 | 7 | 8 | 5 | 11 | 6 | 6 | 0 | 2 | 11 | 2 | 3 | 7 | 10 | 10 |
| 1856 | 8 | 7 | 1 | 3 | 3 | 9 | 10 | 0 | 1 | 0 | 5 | 8 | 6 | 3 |
| 1857 | 5 | 8 | 4 | 3 | 6 | 9 | 1 | 5 | 7 | 10 | 7 | 8 | 5 | 6 |
| 1858 | 4 | 3 | 6 | 8 | 9 | 0 | 5 | 9 | 1 | 0 | 2 | 3 | 5 | 7 |
| 1859 | 10 | 11 | 11 | 8 | 2 | 11 | 5 | 4 | 10 | 11 | 4 | 1 | 4 | 11 |
| 1860 | 7 | 11 | 5 | 5 | 10 | 10 | 7 | 5 | 8 | 5 | 6 | 8 | 9 | 10 |
| 1861 | 4 | 3 | 0 | 6 | 10 | 2 | 0 | 7 | 0 | 10 | 2 | 6 | 3 | 1 |
| 1862 | 0 | 11 | 8 | 7 | 2 | 6 | 2 | 9 | 9 | 10 | 2 | 5 | 10 | 5 |
| 1863 | 9 | 5 | 9 | 7 | 0 | 11 | 1 | 2 | 7 | 7 | 6 | 4 | 2 | 7 |
| 1864 | 11 | 11 | 11 | 10 | 11 | 4 | 9 | 8 | 6 | 2 | 9 | 9 | 4 | 7 |
| 1865 | 9 | 10 | 6 | 9 | 2 | 4 | 10 | 9 | 11 | 9 | 3 | 6 | 3 | 5 |
| 1866 | 0 | 5 | 6 | 1 | 10 | 0 | 11 | 1 | 11 | 11 | 5 | 10 | 3 | 4 |
| 1867 | 9 | 5 | 10 | 7 | 4 | 8 | 10 | 10 | 5 | 2 | 0 | 6 | 7 | 8 |
| 1868 | 11 | 0 | 2 | 4 | 5 | 2 | 4 | 9 | 2 | 3 | 3 | 0 | 10 | 0 |
| 1869 | 0 | 10 | 5 | 3 | 3 | 5 | 4 | 4 | 1 | 5 | 2 | 7 | 3 | 1 |
| 1870 | 1 | 4 | 10 | 10 | 1 | 9 | 2 | 10 | 2 | 8 | 6 | 6 | 10 | 7 |
| 1871 | 1 | 9 | 11 | 4 | 0 | 1 | 7 | 3 | 2 | 4 | 8 | 5 | 3 | 1 |
| 1872 | 11 | 3 | 3 | 3 | 4 | 3 | 8 | 9 | 4 | 0 | 9 | 5 | 7 | 8 |
| 1873 | 10 | 9 | 9 | 5 | 8 | 4 | 8 | 4 | 3 | 8 | 5 | 2 | 3 | 6 |
| 1874 | 10 | 7 | 1 | 8 | 1 | 2 | 0 | 1 | 4 | 7 | 1 | 10 | 1 | 11 |
| 1875 | 8 | 0 | 0 | 11 | 3 | 0 | 4 | 1 | 6 | 10 | 9 | 11 | 7 | 3 |
| 1876 | 10 | 10 | 11 | 0 | 4 | 10 | 10 | 1 | 2 | 6 | 4 | 9 | 10 | 9 |
| 1877 | 5 | 3 | 7 | 10 | 11 | 3 | 0 | 4 | 2 | 8 | 11 | 2 | 1 | 9 |
| 1878 | 3 | 9 | 0 | 6 | 5 | 0 | 1 | 9 | 11 | 9 | 6 | 4 | 8 | 2 |
| 1879 | 3 | 4 | 11 | 9 | 4 | 8 | 6 | 8 | 0 | 11 | 10 | 10 | 0 | 2 |
| 1880 | 11 | 9 | 8 | 2 | 3 | 9 | 3 | 11 | 2 | 1 | 2 | 9 | 2 | 4 |
| 1881 | 4 | 0 | 8 | 1 | 9 | 9 | 2 | 5 | 11 | 6 | 3 | 7 | 0 | 3 |
| 1882 | 10 | 3 | 4 | 8 | 3 | 11 | 9 | 3 | 8 | 6 | 9 | 6 | 9 | 9 |
| 1883 | 9 | 11 | 4 | 5 | 11 | 10 | 4 | 1 | 2 | 8 | 1 | 7 | 3 | 7 |
| 1884 | 11 | 2 | 7 | 1 | 8 | 11 | 11 | 3 | 0 | 7 | 6 | 2 | 7 | 8 |
| 1885 | 5 | 9 | 3 | 0 | 9 | 7 | 7 | 5 | 7 | 2 | 2 | 11 | 9 | 0 |
| 1886 | 0 | 7 | 3 | 6 | 1 | 1 | 4 | 3 | 7 | 10 | 0 | 10 | 6 | 0 |
| 1887 | 10 | 7 | 7 | 1 | 6 | 3 | 6 | 8 | 11 | 4 | 1 | 5 | 5 | 2 |
| 1888 | 4 | 1 | 7 | 6 | 8 | 4 | 9 | 4 | 1 | 1 | 7 | 10 | 7 | 3 |
| 1889 | 9 | 2 | 6 | 10 | 4 | 6 | 4 | 2 | 10 | 10 | 7 | 8 | 0 | 10 |
| 1890 | 0 | 11 | 5 | 2 | 0 | 9 | 2 | 3 | 6 | 7 | 1 | 6 | 11 | 8 |
| 1891 | 11 | 4 | 9 | 8 | 4 | 0 | 7 | 2 | 11 | 1 | 10 | 4 | 6 | 6 |
| 1892 | 0 | 9 | 2 | 6 | 5 | 9 | 10 | 4 | 0 | 2 | 8 | 7 | 4 | 10 |
| 1893 | 11 | 5 | 11 | 6 | 10 | 3 | 7 | 2 | 2 | 5 | 0 | 7 | 4 | 11 |
| 1894 | 7 | 2 | 3 | 4 | 10 | 11 | 7 | 8 | 6 | 6 | 7 | 11 | 6 | 11 |
| 1895 | 5 | 2 | 11 | 6 | 11 | 4 | 8 | 1 | 5 | 11 | 8 | 6 | 0 | 1 |
| 1896 | 1 | 7 | 9 | 6 | 7 | 7 | 8 | 3 | 6 | 5 | 10 | 3 | 7 | 9 |
| 1897 | 3 | 7 | 0 | 11 | 10 | 7 | 9 | 0 | 0 | 2 | 8 | 1 | 7 | 8 |
| 1898 | 0 | 3 | 11 | 4 | 10 | 9 | 8 | 0 | 7 | 4 | 9 | 10 | 10 | 6 |
| 1899 | 10 | 1 | 8 | 11 | 7 | 1 | 11 | 2 | 11 | 1 | 7 | 6 | 11 | 11 |
| 1900 | 1 | 6 | 6 | 0 | 3 | 5 | 5 | 5 | 0 | 0 | 10 | 0 | 7 | 2 |
| 1901 | 11 | 9 | 10 | 0 | 5 | 4 | 8 | 0 | 10 | 2 | 1 | 5 | 2 | 2 |
| 1902 | 8 | 11 | 10 | 11 | 8 | 5 | 11 | 7 | 10 | 0 | 1 | 3 | 9 | 9 |
| 1903 | 10 | 4 | 4 | 1 | 0 | 5 | 2 | 6 | 4 | 4 | 2 | 6 | 6 | 10 |
| 1904 | 9 | 7 | 6 | 4 | 5 | 10 | 11 | 10 | 3 | 9 | 0 | 1 | 9 | 9 |
| 1905 | 3 | 8 | 10 | 9 | 7 | 6 | 5 | 5 | 2 | 4 | 8 | 9 | 4 | 5 |
| 1906 | 6 | 2 | 8 | 8 | 7 | 9 | 4 | 8 | 8 | 0 | 8 | 8 | 3 | 1 |
| 1907 | 4 | 2 | 6 | 11 | 11 | 7 | 11 | 6 | 10 | 4 | 8 | 0 | 10 | 6 |
| 1908 | 3 | 5 | 5 | 9 | 8 | 7 | 6 | 1 | 9 | 5 | 9 | 4 | 9 | 5 |
| 1909 | 5 | 2 | 9 | 5 | 7 | 6 | 2 | 6 | 6 | 3 | 0 | 2 | 8 | 8 |
| 1910 | 10 | 8 | 3 | 0 | 1 | 9 | 9 | 4 | 9 | 11 | 3 | 0 | 2 | 1 |
| 1911 | 0 | 6 | 4 | 2 | 9 | 6 | 3 | 1 | 11 | 8 | 9 | 4 | 11 | 10 |
| 1912 | 6 | 3 | 2 | 7 | 4 | 8 | 5 | 0 | 2 | 9 | 6 | 1 | 0 | 0 |

-continued

Example #1 of a group-based CS hopping pattern

| m | $n_{cs}(n)$ | | | | | | | | | | | | | |
|---|---|---|---|---|---|---|---|---|---|---|---|---|---|---|
| 1913 | 9 | 0 | 7 | 0 | 1 | 0 | 8 | 6 | 1 | 2 | 7 | 8 | 3 | 11 |
| 1914 | 7 | 10 | 2 | 2 | 2 | 6 | 9 | 11 | 7 | 7 | 9 | 11 | 5 | 7 |
| 1915 | 5 | 7 | 4 | 1 | 1 | 2 | 7 | 6 | 2 | 6 | 0 | 4 | 9 | 5 |
| 1916 | 4 | 8 | 1 | 1 | 5 | 11 | 9 | 1 | 5 | 2 | 1 | 9 | 9 | 4 |
| 1917 | 10 | 2 | 1 | 1 | 4 | 7 | 10 | 2 | 0 | 1 | 0 | 0 | 8 | 5 |
| 1918 | 11 | 10 | 11 | 5 | 11 | 8 | 3 | 6 | 7 | 3 | 4 | 1 | 7 | 1 |
| 1919 | 7 | 3 | 9 | 3 | 9 | 8 | 1 | 4 | 2 | 5 | 4 | 0 | 6 | 2 |
| 1920 | 7 | 1 | 8 | 10 | 1 | 8 | 6 | 11 | 5 | 0 | 1 | 10 | 3 | 3 |
| 1921 | 8 | 7 | 5 | 10 | 7 | 11 | 9 | 11 | 10 | 9 | 2 | 5 | 7 | 3 |
| 1922 | 0 | 1 | 10 | 9 | 2 | 11 | 10 | 5 | 7 | 3 | 6 | 5 | 0 | 10 |
| 1923 | 3 | 10 | 3 | 1 | 0 | 10 | 4 | 5 | 8 | 10 | 1 | 1 | 0 | 1 |
| 1924 | 5 | 4 | 6 | 7 | 10 | 9 | 10 | 8 | 0 | 8 | 11 | 1 | 2 | 0 |
| 1925 | 8 | 8 | 4 | 4 | 8 | 3 | 3 | 11 | 10 | 11 | 9 | 6 | 10 | 8 |
| 1926 | 8 | 5 | 2 | 7 | 9 | 6 | 4 | 6 | 9 | 1 | 6 | 3 | 11 | 6 |
| 1927 | 5 | 6 | 4 | 11 | 10 | 2 | 1 | 10 | 1 | 7 | 2 | 11 | 2 | 2 |
| 1928 | 11 | 10 | 5 | 7 | 7 | 11 | 10 | 5 | 3 | 1 | 1 | 6 | 8 | 0 |
| 1929 | 3 | 8 | 8 | 10 | 4 | 3 | 1 | 0 | 7 | 6 | 2 | 9 | 7 | 7 |
| 1930 | 8 | 8 | 8 | 3 | 10 | 9 | 2 | 2 | 6 | 4 | 2 | 1 | 9 | 9 |
| 1931 | 6 | 11 | 7 | 8 | 7 | 7 | 5 | 10 | 4 | 2 | 1 | 9 | 10 | 6 |
| 1932 | 9 | 3 | 9 | 4 | 3 | 1 | 2 | 3 | 9 | 11 | 5 | 3 | 1 | 7 |
| 1933 | 8 | 5 | 0 | 11 | 10 | 11 | 3 | 4 | 5 | 4 | 11 | 5 | 6 | 6 |
| 1934 | 11 | 4 | 9 | 3 | 11 | 2 | 9 | 7 | 9 | 7 | 6 | 7 | 8 | 0 |
| 1935 | 1 | 2 | 8 | 2 | 2 | 9 | 2 | 7 | 5 | 2 | 5 | 3 | 5 | 6 |
| 1936 | 11 | 0 | 3 | 9 | 6 | 5 | 6 | 6 | 0 | 1 | 2 | 7 | 5 | 7 |
| 1937 | 7 | 0 | 0 | 0 | 4 | 7 | 8 | 5 | 5 | 7 | 1 | 0 | 6 | 9 |
| 1938 | 7 | 2 | 11 | 8 | 6 | 0 | 3 | 4 | 2 | 10 | 6 | 10 | 11 | 6 |
| 1939 | 8 | 0 | 5 | 3 | 3 | 8 | 5 | 10 | 8 | 11 | 8 | 3 | 2 | 4 |
| 1940 | 7 | 5 | 7 | 4 | 0 | 5 | 5 | 2 | 1 | 3 | 7 | 2 | 10 | 9 |
| 1941 | 1 | 0 | 9 | 2 | 4 | 8 | 7 | 6 | 10 | 7 | 5 | 6 | 4 | 2 |
| 1942 | 1 | 4 | 0 | 11 | 0 | 6 | 1 | 8 | 0 | 9 | 5 | 8 | 10 | 5 |
| 1943 | 4 | 6 | 8 | 11 | 7 | 6 | 10 | 0 | 9 | 11 | 1 | 11 | 0 | 10 |
| 1944 | 2 | 10 | 4 | 6 | 5 | 7 | 1 | 1 | 9 | 8 | 4 | 11 | 7 | 0 |
| 1945 | 11 | 6 | 2 | 3 | 9 | 0 | 7 | 0 | 7 | 5 | 3 | 8 | 0 | 5 |
| 1946 | 2 | 4 | 1 | 5 | 3 | 0 | 7 | 4 | 2 | 2 | 2 | 1 | 8 | 5 |
| 1947 | 5 | 10 | 7 | 5 | 5 | 0 | 10 | 0 | 10 | 3 | 2 | 9 | 4 | 3 |
| 1948 | 10 | 11 | 2 | 3 | 5 | 10 | 9 | 11 | 4 | 6 | 0 | 3 | 4 | 8 |
| 1949 | 6 | 2 | 9 | 3 | 8 | 5 | 8 | 7 | 2 | 1 | 7 | 5 | 2 | 11 |
| 1950 | 4 | 6 | 6 | 11 | 4 | 2 | 7 | 5 | 5 | 2 | 3 | 10 | 11 | 11 |
| 1951 | 10 | 7 | 10 | 0 | 6 | 1 | 2 | 0 | 6 | 10 | 5 | 0 | 4 | 5 |
| 1952 | 1 | 1 | 3 | 7 | 3 | 11 | 2 | 11 | 11 | 1 | 11 | 2 | 7 | 9 |
| 1953 | 7 | 4 | 2 | 2 | 1 | 4 | 5 | 1 | 8 | 9 | 5 | 10 | 9 | 8 |
| 1954 | 5 | 8 | 9 | 11 | 10 | 1 | 10 | 9 | 2 | 3 | 6 | 7 | 9 | 1 |
| 1955 | 1 | 9 | 1 | 9 | 7 | 6 | 2 | 3 | 7 | 6 | 7 | 6 | 0 | 6 |
| 1956 | 1 | 6 | 10 | 4 | 2 | 4 | 11 | 2 | 11 | 7 | 11 | 9 | 9 | 2 |
| 1957 | 10 | 11 | 0 | 10 | 2 | 8 | 4 | 0 | 5 | 7 | 7 | 9 | 11 | 1 |
| 1958 | 11 | 2 | 7 | 3 | 6 | 4 | 2 | 0 | 3 | 3 | 10 | 11 | 10 | 4 |
| 1959 | 4 | 8 | 5 | 2 | 7 | 0 | 1 | 10 | 2 | 11 | 7 | 6 | 6 | 3 |
| 1960 | 7 | 4 | 3 | 5 | 3 | 2 | 9 | 3 | 10 | 10 | 1 | 0 | 1 | 8 |
| 1961 | 6 | 9 | 11 | 2 | 8 | 11 | 1 | 5 | 1 | 9 | 10 | 9 | 3 | 3 |
| 1962 | 2 | 8 | 0 | 10 | 11 | 7 | 3 | 2 | 11 | 5 | 4 | 9 | 6 | 8 |
| 1963 | 3 | 10 | 6 | 4 | 8 | 2 | 7 | 11 | 6 | 0 | 5 | 2 | 8 | 7 |
| 1964 | 6 | 3 | 0 | 1 | 6 | 4 | 3 | 4 | 4 | 9 | 5 | 7 | 7 | 11 |
| 1965 | 6 | 1 | 8 | 8 | 6 | 5 | 2 | 6 | 11 | 3 | 5 | 5 | 9 | 0 |
| 1966 | 0 | 2 | 4 | 5 | 2 | 4 | 9 | 10 | 9 | 3 | 3 | 8 | 1 | 6 |
| 1967 | 10 | 11 | 6 | 9 | 4 | 0 | 6 | 4 | 8 | 9 | 8 | 11 | 5 | 1 |
| 1968 | 0 | 6 | 0 | 5 | 9 | 11 | 6 | 7 | 1 | 4 | 5 | 9 | 1 | 2 |
| 1969 | 5 | 1 | 3 | 10 | 4 | 0 | 0 | 8 | 9 | 4 | 8 | 9 | 8 | 2 |
| 1970 | 4 | 1 | 2 | 7 | 2 | 2 | 6 | 0 | 10 | 4 | 1 | 2 | 6 | 4 |
| 1971 | 8 | 3 | 6 | 11 | 0 | 6 | 6 | 5 | 10 | 3 | 2 | 1 | 6 | 2 |
| 1972 | 8 | 5 | 5 | 10 | 3 | 10 | 10 | 6 | 3 | 10 | 7 | 2 | 4 | 11 |
| 1973 | 8 | 4 | 6 | 8 | 6 | 1 | 4 | 0 | 0 | 5 | 1 | 7 | 8 | 6 |
| 1974 | 0 | 10 | 6 | 2 | 0 | 5 | 9 | 7 | 5 | 10 | 4 | 0 | 6 | 11 |
| 1975 | 6 | 4 | 4 | 6 | 7 | 1 | 8 | 0 | 8 | 4 | 4 | 1 | 2 | 7 |
| 1976 | 0 | 11 | 1 | 0 | 3 | 4 | 8 | 9 | 5 | 9 | 10 | 2 | 5 | 8 |
| 1977 | 4 | 10 | 0 | 7 | 9 | 1 | 9 | 9 | 4 | 5 | 5 | 2 | 3 | 8 |
| 1978 | 0 | 4 | 2 | 11 | 9 | 8 | 4 | 5 | 4 | 11 | 11 | 9 | 10 | 4 |
| 1979 | 9 | 8 | 9 | 8 | 2 | 5 | 6 | 4 | 2 | 2 | 0 | 4 | 10 | 9 |
| 1980 | 1 | 1 | 1 | 3 | 7 | 0 | 1 | 1 | 10 | 1 | 3 | 4 | 1 | 7 |
| 1981 | 0 | 9 | 11 | 9 | 0 | 2 | 0 | 2 | 5 | 5 | 2 | 3 | 2 | 8 |
| 1982 | 7 | 1 | 11 | 11 | 8 | 1 | 8 | 4 | 9 | 6 | 2 | 4 | 4 | 2 |
| 1983 | 2 | 8 | 2 | 3 | 9 | 4 | 4 | 8 | 5 | 2 | 5 | 1 | 6 | 10 |
| 1984 | 10 | 3 | 7 | 4 | 11 | 8 | 7 | 0 | 1 | 2 | 0 | 4 | 5 | 10 |
| 1985 | 3 | 7 | 10 | 11 | 8 | 10 | 3 | 8 | 9 | 8 | 0 | 11 | 5 | 4 |
| 1986 | 1 | 3 | 2 | 1 | 3 | 10 | 2 | 2 | 2 | 3 | 1 | 10 | 5 | 4 |
| 1987 | 8 | 9 | 2 | 0 | 11 | 0 | 11 | 3 | 9 | 3 | 9 | 8 | 9 | 2 |
| 1988 | 9 | 0 | 1 | 9 | 1 | 1 | 6 | 2 | 5 | 4 | 5 | 2 | 11 | 10 |
| 1989 | 4 | 5 | 0 | 2 | 5 | 4 | 2 | 3 | 1 | 5 | 4 | 8 | 0 | 9 |
| 1990 | 2 | 8 | 9 | 11 | 7 | 8 | 6 | 8 | 3 | 8 | 8 | 5 | 11 | 8 |
| 1991 | 2 | 0 | 9 | 6 | 4 | 11 | 0 | 9 | 8 | 2 | 3 | 8 | 7 | 1 |
| 1992 | 11 | 5 | 3 | 2 | 10 | 0 | 8 | 5 | 6 | 9 | 11 | 4 | 1 | 1 |
| 1993 | 10 | 4 | 3 | 7 | 6 | 5 | 7 | 9 | 9 | 7 | 0 | 1 | 7 | 4 |
| 1994 | 1 | 5 | 2 | 9 | 11 | 11 | 11 | 10 | 0 | 11 | 3 | 4 | 11 | 10 |
| 1995 | 2 | 5 | 1 | 3 | 2 | 6 | 5 | 9 | 1 | 6 | 3 | 9 | 8 | 4 |
| 1996 | 2 | 9 | 8 | 7 | 8 | 1 | 5 | 8 | 1 | 0 | 11 | 0 | 10 | 6 |
| 1997 | 6 | 6 | 11 | 11 | 5 | 11 | 4 | 11 | 0 | 5 | 0 | 10 | 2 | 7 |
| 1998 | 6 | 0 | 1 | 11 | 5 | 2 | 11 | 5 | 8 | 11 | 10 | 1 | 5 | 5 |
| 1999 | 6 | 10 | 6 | 6 | 2 | 8 | 7 | 5 | 4 | 8 | 10 | 8 | 0 | 6 |
| 2000 | 5 | 2 | 7 | 6 | 4 | 5 | 7 | 3 | 3 | 5 | 9 | 1 | 6 | 5 |
| 2001 | 3 | 11 | 0 | 4 | 0 | 10 | 10 | 3 | 0 | 6 | 2 | 10 | 9 | 6 |
| 2002 | 3 | 1 | 4 | 6 | 9 | 10 | 10 | 6 | 1 | 3 | 10 | 6 | 8 | 4 |
| 2003 | 2 | 5 | 4 | 4 | 11 | 3 | 8 | 3 | 4 | 9 | 5 | 8 | 4 | 10 |
| 2004 | 4 | 0 | 10 | 5 | 3 | 6 | 11 | 0 | 11 | 9 | 4 | 4 | 10 | 0 |
| 2005 | 5 | 6 | 11 | 7 | 4 | 1 | 5 | 6 | 6 | 11 | 5 | 9 | 2 | 10 |
| 2006 | 9 | 3 | 8 | 1 | 11 | 7 | 5 | 3 | 7 | 10 | 10 | 9 | 3 | 5 |
| 2007 | 4 | 9 | 4 | 0 | 3 | 3 | 6 | 10 | 10 | 6 | 5 | 11 | 11 | 1 |
| 2008 | 11 | 1 | 9 | 1 | 1 | 1 | 5 | 10 | 1 | 7 | 1 | 5 | 6 | 10 |
| 2009 | 7 | 7 | 8 | 9 | 7 | 10 | 3 | 7 | 4 | 6 | 6 | 1 | 10 | 1 |
| 2010 | 9 | 0 | 10 | 2 | 9 | 3 | 9 | 4 | 4 | 7 | 4 | 10 | 0 | 5 |
| 2011 | 7 | 9 | 7 | 1 | 0 | 9 | 6 | 9 | 8 | 11 | 3 | 3 | 11 | 5 |
| 2012 | 6 | 4 | 2 | 0 | 7 | 3 | 11 | 6 | 1 | 9 | 1 | 6 | 4 | 9 |
| 2013 | 1 | 10 | 3 | 3 | 9 | 8 | 3 | 3 | 9 | 9 | 7 | 11 | 8 | 10 |
| 2014 | 1 | 2 | 11 | 10 | 9 | 4 | 4 | 0 | 7 | 8 | 0 | 7 | 5 | 8 |
| 2015 | 10 | 4 | 5 | 7 | 11 | 11 | 0 | 10 | 11 | 8 | 5 | 9 | 0 | 3 |
| 2016 | 10 | 1 | 10 | 2 | 11 | 7 | 6 | 1 | 5 | 6 | 10 | 8 | 2 | 10 |
| 2017 | 9 | 4 | 3 | 6 | 8 | 4 | 0 | 5 | 8 | 6 | 8 | 11 | 4 | 9 |
| 2018 | 5 | 4 | 11 | 1 | 10 | 0 | 0 | 2 | 10 | 2 | 7 | 6 | 9 | 7 |
| 2019 | 1 | 8 | 7 | 5 | 3 | 4 | 11 | 5 | 9 | 6 | 9 | 3 | 6 | 1 |
| 2020 | 8 | 6 | 8 | 5 | 6 | 2 | 5 | 3 | 0 | 6 | 4 | 5 | 6 | 11 |
| 2021 | 11 | 4 | 8 | 9 | 9 | 6 | 5 | 11 | 5 | 9 | 0 | 5 | 8 | 6 |
| 2022 | 7 | 10 | 5 | 9 | 10 | 5 | 10 | 1 | 10 | 4 | 10 | 1 | 5 | 6 |
| 2023 | 11 | 9 | 6 | 7 | 9 | 10 | 0 | 8 | 5 | 6 | 1 | 2 | 5 | 1 |
| 2024 | 0 | 3 | 2 | 0 | 9 | 1 | 8 | 8 | 11 | 7 | 8 | 11 | 8 | 11 |
| 2025 | 3 | 5 | 10 | 8 | 11 | 2 | 5 | 3 | 6 | 1 | 7 | 7 | 5 | 8 |
| 2026 | 10 | 3 | 3 | 8 | 5 | 1 | 3 | 11 | 11 | 9 | 10 | 1 | 3 | 7 |
| 2027 | 7 | 5 | 1 | 2 | 4 | 2 | 0 | 8 | 11 | 0 | 11 | 1 | 11 | 8 |
| 2028 | 3 | 2 | 3 | 11 | 5 | 5 | 2 | 10 | 8 | 7 | 7 | 9 | 8 | 3 |
| 2029 | 3 | 3 | 5 | 5 | 5 | 3 | 2 | 1 | 10 | 9 | 3 | 7 | 2 | 1 |
| 2030 | 9 | 9 | 3 | 7 | 3 | 0 | 0 | 7 | 4 | 10 | 4 | 7 | 9 | 10 |
| 2031 | 2 | 6 | 6 | 1 | 3 | 6 | 6 | 7 | 5 | 9 | 9 | 7 | 3 | 7 |
| 2032 | 1 | 9 | 6 | 8 | 8 | 6 | 3 | 2 | 6 | 8 | 3 | 10 | 1 | 1 |
| 2033 | 8 | 10 | 9 | 2 | 1 | 2 | 11 | 8 | 1 | 2 | 2 | 6 | 9 | 3 |
| 2034 | 8 | 10 | 1 | 4 | 11 | 3 | 2 | 6 | 2 | 7 | 3 | 3 | 9 | 4 |
| 2035 | 0 | 7 | 6 | 5 | 2 | 3 | 1 | 7 | 0 | 11 | 1 | 11 | 9 | 1 |
| 2036 | 9 | 7 | 0 | 10 | 6 | 0 | 7 | 9 | 2 | 4 | 9 | 8 | 1 | 7 |
| 2037 | 6 | 11 | 6 | 10 | 9 | 7 | 1 | 5 | 9 | 1 | 11 | 6 | 2 | 7 |
| 2038 | 11 | 6 | 7 | 5 | 7 | 4 | 4 | 4 | 7 | 4 | 6 | 6 | 11 | 10 |
| 2039 | 3 | 0 | 9 | 9 | 10 | 3 | 5 | 7 | 3 | 0 | 11 | 6 | 11 | 0 |
| 2040 | 8 | 5 | 11 | 11 | 6 | 7 | 11 | 11 | 7 | 2 | 5 | 9 | 11 | 2 |
| 2041 | 8 | 6 | 1 | 1 | 11 | 8 | 8 | 8 | 4 | 1 | 11 | 6 | 3 | 0 |
| 2042 | 0 | 0 | 4 | 8 | 7 | 9 | 7 | 6 | 5 | 11 | 7 | 10 | 1 | 7 |
| 2043 | 4 | 5 | 4 | 0 | 6 | 10 | 11 | 9 | 4 | 4 | 4 | 3 | 9 | 11 |
| 2044 | 2 | 10 | 8 | 7 | 11 | 5 | 11 | 10 | 4 | 3 | 8 | 10 | 6 | 4 |
| 2045 | 4 | 1 | 8 | 2 | 0 | 3 | 4 | 11 | 3 | 9 | 8 | 3 | 1 | 7 |
| 2046 | 8 | 8 | 11 | 8 | 0 | 6 | 7 | 0 | 9 | 0 | 4 | 0 | 9 | 7 |
| 2047 | 2 | 4 | 11 | 3 | 10 | 9 | 5 | 6 | 11 | 1 | 6 | 5 | 4 | 1 |

Example #2 of a Group-Based CS Hopping Pattern

Example #2 of a group-based CS hopping pattern

| m | $n_{cs}(n)$ | | | | | | | | | | | | | |
|---|---|---|---|---|---|---|---|---|---|---|---|---|---|---|
| 0 | 7 | 8 | 10 | 11 | 7 | 8 | 0 | 2 | 0 | 11 | 4 | 2 | 5 | 4 |
| 1 | 3 | 4 | 2 | 6 | 6 | 1 | 3 | 8 | 5 | 10 | 7 | 5 | 8 | 0 |
| 2 | 2 | 6 | 3 | 3 | 2 | 7 | 7 | 0 | 3 | 9 | 10 | 0 | 11 | 9 |
| 3 | 6 | 11 | 1 | 2 | 8 | 10 | 2 | 11 | 11 | 6 | 9 | 9 | 6 | 8 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 4 | 5 | 5 | 4 | 0 | 0 | 1 | 1 | 1 | 6 | 5 | 0 | 7 | 5 | 7 |
| 5 | 8 | 9 | 6 | 7 | 8 | 0 | 5 | 8 | 2 | 7 | 1 | 11 | 7 | 11 |
| 6 | 0 | 11 | 5 | 7 | 5 | 2 | 3 | 9 | 8 | 1 | 0 | 6 | 9 | 4 |
| 7 | 8 | 2 | 11 | 8 | 3 | 7 | 2 | 9 | 4 | 0 | 6 | 10 | 10 | 6 |
| 8 | 10 | 1 | 1 | 9 | 0 | 5 | 8 | 0 | 10 | 7 | 5 | 1 | 0 | 3 |
| 9 | 10 | 3 | 0 | 4 | 4 | 5 | 9 | 4 | 0 | 11 | 1 | 6 | 9 | 1 |
| 10 | 8 | 8 | 6 | 6 | 10 | 11 | 7 | 1 | 7 | 8 | 9 | 7 | 11 | 4 |
| 11 | 4 | 8 | 10 | 5 | 11 | 7 | 1 | 7 | 5 | 6 | 7 | 11 | 7 | 2 |
| 12 | 0 | 8 | 11 | 0 | 4 | 2 | 4 | 11 | 0 | 2 | 11 | 9 | 10 | 3 |
| 13 | 3 | 2 | 0 | 1 | 8 | 6 | 11 | 10 | 0 | 0 | 2 | 3 | 1 | 4 |
| 14 | 9 | 10 | 2 | 1 | 5 | 7 | 6 | 5 | 6 | 7 | 8 | 5 | 3 | 7 |
| 15 | 1 | 10 | 2 | 7 | 10 | 3 | 9 | 1 | 9 | 5 | 1 | 4 | 6 | 3 |
| 16 | 11 | 3 | 9 | 2 | 11 | 0 | 11 | 9 | 11 | 3 | 0 | 11 | 11 | 1 |
| 17 | 4 | 3 | 7 | 3 | 8 | 3 | 2 | 9 | 3 | 5 | 3 | 2 | 2 | 10 |
| 18 | 6 | 0 | 0 | 11 | 1 | 11 | 10 | 8 | 8 | 3 | 0 | 9 | 5 | 9 |
| 19 | 8 | 2 | 8 | 10 | 7 | 0 | 6 | 10 | 8 | 3 | 3 | 2 | 6 | 3 |
| 20 | 3 | 7 | 7 | 7 | 3 | 0 | 9 | 5 | 4 | 2 | 0 | 9 | 2 | 2 |
| 21 | 5 | 3 | 1 | 4 | 2 | 10 | 1 | 2 | 2 | 8 | 5 | 4 | 4 | 6 |
| 22 | 0 | 6 | 11 | 10 | 10 | 8 | 7 | 3 | 11 | 4 | 4 | 11 | 4 | 10 |
| 23 | 6 | 6 | 8 | 1 | 11 | 1 | 6 | 11 | 10 | 10 | 5 | 8 | 5 | 1 |
| 24 | 7 | 0 | 11 | 3 | 1 | 5 | 9 | 7 | 2 | 4 | 8 | 3 | 8 | 11 |
| 25 | 4 | 8 | 4 | 10 | 7 | 11 | 4 | 3 | 2 | 5 | 1 | 8 | 0 | 8 |
| 26 | 10 | 0 | 11 | 4 | 7 | 0 | 2 | 5 | 7 | 1 | 10 | 8 | 3 | 10 |
| 27 | 11 | 7 | 2 | 10 | 4 | 5 | 0 | 8 | 4 | 8 | 2 | 2 | 4 | 5 |
| 28 | 7 | 9 | 5 | 11 | 2 | 9 | 3 | 5 | 1 | 6 | 5 | 11 | 3 | 9 |
| 29 | 5 | 2 | 10 | 10 | 11 | 9 | 2 | 4 | 11 | 2 | 5 | 3 | 2 | 7 |
| 30 | 9 | 11 | 7 | 2 | 0 | 5 | 5 | 4 | 6 | 3 | 2 | 4 | 10 | 6 |
| 31 | 5 | 7 | 8 | 11 | 9 | 6 | 0 | 6 | 2 | 10 | 11 | 0 | 10 | 2 |
| 32 | 3 | 0 | 6 | 6 | 11 | 10 | 8 | 5 | 9 | 11 | 4 | 10 | 10 | 3 |
| 33 | 1 | 3 | 3 | 1 | 6 | 4 | 9 | 8 | 10 | 6 | 4 | 1 | 10 | 6 |
| 34 | 5 | 4 | 9 | 5 | 6 | 7 | 5 | 1 | 3 | 8 | 11 | 10 | 0 | 3 |
| 35 | 11 | 1 | 11 | 11 | 5 | 1 | 6 | 4 | 1 | 11 | 0 | 4 | 6 | 11 |
| 36 | 3 | 11 | 8 | 0 | 10 | 9 | 3 | 7 | 0 | 7 | 10 | 2 | 4 | 2 |
| 37 | 0 | 2 | 8 | 8 | 10 | 10 | 2 | 11 | 3 | 11 | 8 | 8 | 11 | 2 |
| 38 | 2 | 11 | 5 | 5 | 9 | 4 | 3 | 10 | 10 | 11 | 4 | 4 | 8 | 10 |
| 39 | 10 | 4 | 6 | 3 | 11 | 11 | 8 | 3 | 5 | 2 | 11 | 9 | 7 | 0 |
| 40 | 9 | 11 | 4 | 1 | 7 | 11 | 11 | 11 | 0 | 6 | 4 | 10 | 7 | 2 |
| 41 | 9 | 9 | 9 | 4 | 8 | 7 | 10 | 7 | 5 | 3 | 1 | 4 | 9 | 8 |
| 42 | 11 | 7 | 10 | 3 | 8 | 2 | 10 | 9 | 7 | 6 | 4 | 6 | 0 | 11 |
| 43 | 9 | 2 | 9 | 10 | 3 | 9 | 9 | 1 | 2 | 7 | 7 | 5 | 1 | 6 |
| 44 | 8 | 3 | 3 | 11 | 3 | 5 | 11 | 0 | 1 | 3 | 1 | 3 | 4 | 11 |
| 45 | 4 | 6 | 2 | 7 | 6 | 10 | 6 | 0 | 2 | 6 | 6 | 4 | 0 | 7 |
| 46 | 0 | 10 | 1 | 3 | 5 | 0 | 0 | 7 | 4 | 2 | 3 | 7 | 5 | 4 |
| 47 | 10 | 2 | 7 | 3 | 8 | 2 | 4 | 11 | 8 | 4 | 9 | 7 | 3 | 7 |
| 48 | 10 | 6 | 4 | 1 | 10 | 6 | 4 | 4 | 6 | 10 | 11 | 2 | 3 | 4 |
| 49 | 3 | 5 | 3 | 2 | 1 | 6 | 6 | 5 | 3 | 5 | 8 | 6 | 6 | 11 |
| 50 | 0 | 6 | 8 | 2 | 3 | 6 | 3 | 0 | 1 | 8 | 5 | 9 | 6 | 6 |
| 51 | 2 | 1 | 9 | 4 | 5 | 11 | 11 | 2 | 1 | 9 | 7 | 11 | 2 | 4 |
| 52 | 9 | 7 | 11 | 3 | 8 | 10 | 5 | 1 | 4 | 9 | 1 | 0 | 1 | 4 |
| 53 | 7 | 5 | 7 | 5 | 5 | 10 | 9 | 4 | 0 | 1 | 5 | 1 | 11 | 8 |
| 54 | 4 | 0 | 1 | 5 | 11 | 2 | 5 | 8 | 6 | 1 | 4 | 7 | 3 | 0 |
| 55 | 3 | 8 | 5 | 7 | 9 | 3 | 0 | 5 | 3 | 11 | 11 | 11 | 1 | 1 |
| 56 | 7 | 9 | 1 | 0 | 5 | 10 | 5 | 0 | 6 | 3 | 7 | 5 | 8 | 5 |
| 57 | 3 | 2 | 4 | 1 | 0 | 8 | 7 | 0 | 10 | 11 | 6 | 2 | 4 | 5 |
| 58 | 2 | 1 | 5 | 8 | 6 | 8 | 5 | 11 | 6 | 8 | 1 | 4 | 7 | 5 |
| 59 | 8 | 7 | 4 | 0 | 7 | 4 | 10 | 0 | 7 | 7 | 7 | 11 | 3 | 7 |
| 60 | 2 | 0 | 10 | 9 | 2 | 1 | 11 | 5 | 0 | 0 | 0 | 6 | 6 | 9 |
| 61 | 5 | 2 | 3 | 1 | 1 | 9 | 8 | 9 | 4 | 4 | 4 | 5 | 0 | 0 |
| 62 | 3 | 6 | 8 | 9 | 7 | 11 | 7 | 7 | 6 | 11 | 1 | 9 | 2 | 3 |
| 63 | 0 | 8 | 6 | 5 | 3 | 5 | 1 | 3 | 10 | 1 | 0 | 7 | 0 | 9 |
| 64 | 5 | 11 | 4 | 6 | 3 | 6 | 5 | 3 | 11 | 10 | 2 | 6 | 9 | 7 |
| 65 | 10 | 11 | 9 | 9 | 6 | 8 | 10 | 10 | 0 | 10 | 1 | 0 | 0 | 2 |
| 66 | 11 | 5 | 6 | 7 | 3 | 2 | 6 | 7 | 11 | 8 | 11 | 0 | 10 | 0 |
| 67 | 1 | 2 | 6 | 8 | 11 | 1 | 1 | 2 | 4 | 8 | 10 | 2 | 3 | 0 |
| 68 | 4 | 8 | 7 | 6 | 1 | 4 | 3 | 5 | 4 | 1 | 4 | 8 | 1 | 6 |
| 69 | 7 | 5 | 2 | 9 | 7 | 1 | 10 | 11 | 9 | 6 | 3 | 1 | 4 | 0 |
| 70 | 7 | 4 | 0 | 2 | 5 | 8 | 7 | 6 | 3 | 11 | 7 | 8 | 0 | 0 |
| 71 | 6 | 1 | 0 | 7 | 10 | 8 | 0 | 4 | 5 | 0 | 8 | 3 | 7 | 1 |
| 72 | 2 | 4 | 2 | 4 | 2 | 0 | 0 | 4 | 2 | 11 | 11 | 10 | 6 | 7 |
| 73 | 0 | 7 | 10 | 6 | 0 | 1 | 4 | 11 | 2 | 9 | 4 | 3 | 2 | 1 |
| 74 | 2 | 9 | 9 | 2 | 9 | 11 | 5 | 0 | 7 | 5 | 5 | 2 | 4 | 10 |
| 75 | 5 | 10 | 3 | 9 | 8 | 10 | 6 | 0 | 6 | 1 | 10 | 11 | 10 | 0 |
| 76 | 5 | 11 | 2 | 3 | 9 | 9 | 2 | 11 | 4 | 3 | 6 | 6 | 7 | 10 |
| 77 | 2 | 3 | 9 | 9 | 0 | 2 | 4 | 2 | 3 | 6 | 10 | 10 | 4 | 8 |
| 78 | 9 | 5 | 5 | 3 | 6 | 9 | 2 | 5 | 9 | 7 | 2 | 2 | 8 | 3 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 79 | 4 | 6 | 1 | 5 | 1 | 3 | 7 | 2 | 4 | 2 | 0 | 1 | 4 | 11 |
| 80 | 0 | 11 | 3 | 2 | 4 | 7 | 8 | 0 | 10 | 1 | 8 | 3 | 5 | 7 |
| 81 | 8 | 11 | 7 | 2 | 4 | 11 | 10 | 7 | 1 | 11 | 4 | 0 | 9 | 9 |
| 82 | 7 | 6 | 0 | 4 | 3 | 11 | 3 | 11 | 10 | 0 | 6 | 4 | 3 | 8 |
| 83 | 9 | 9 | 4 | 6 | 5 | 5 | 6 | 7 | 9 | 5 | 5 | 9 | 1 | 2 |
| 84 | 1 | 6 | 8 | 5 | 5 | 6 | 10 | 8 | 5 | 6 | 3 | 6 | 9 | 5 |
| 85 | 6 | 9 | 6 | 9 | 0 | 4 | 8 | 10 | 8 | 8 | 6 | 5 | 9 | 4 |
| 86 | 7 | 3 | 4 | 4 | 8 | 11 | 10 | 8 | 4 | 8 | 3 | 5 | 10 | 3 |
| 87 | 10 | 10 | 11 | 6 | 9 | 6 | 8 | 1 | 2 | 6 | 1 | 2 | 11 | 8 |
| 88 | 11 | 9 | 1 | 5 | 1 | 6 | 10 | 0 | 3 | 10 | 2 | 11 | 7 | 3 |
| 89 | 11 | 4 | 2 | 11 | 8 | 3 | 9 | 6 | 6 | 0 | 9 | 10 | 5 | 5 |
| 90 | 6 | 5 | 9 | 3 | 11 | 3 | 9 | 10 | 1 | 11 | 0 | 1 | 3 | 6 |
| 91 | 2 | 0 | 9 | 7 | 4 | 0 | 10 | 2 | 9 | 5 | 8 | 0 | 1 | 1 |
| 92 | 7 | 8 | 4 | 3 | 11 | 10 | 11 | 9 | 8 | 1 | 1 | 5 | 5 | 0 |
| 93 | 11 | 0 | 3 | 4 | 4 | 1 | 4 | 6 | 8 | 11 | 10 | 7 | 7 | 4 |
| 94 | 1 | 9 | 5 | 4 | 8 | 11 | 7 | 9 | 6 | 6 | 8 | 10 | 8 | 6 |
| 95 | 8 | 4 | 8 | 8 | 0 | 7 | 11 | 3 | 11 | 1 | 2 | 1 | 0 | 8 |
| 96 | 9 | 8 | 6 | 10 | 4 | 0 | 4 | 4 | 5 | 7 | 10 | 4 | 5 | 9 |
| 97 | 9 | 10 | 10 | 4 | 8 | 6 | 3 | 3 | 6 | 9 | 5 | 6 | 5 | 1 |
| 98 | 0 | 9 | 0 | 3 | 2 | 5 | 0 | 10 | 10 | 8 | 9 | 1 | 7 | 8 |
| 99 | 2 | 5 | 0 | 5 | 6 | 7 | 8 | 0 | 9 | 0 | 6 | 7 | 9 | 11 |
| 100 | 1 | 0 | 11 | 10 | 11 | 3 | 8 | 9 | 7 | 3 | 2 | 1 | 9 | 0 |
| 101 | 4 | 10 | 5 | 11 | 8 | 6 | 8 | 4 | 1 | 10 | 9 | 5 | 4 | 7 |
| 102 | 3 | 3 | 10 | 9 | 4 | 3 | 0 | 10 | 9 | 9 | 2 | 4 | 0 | 0 |
| 103 | 3 | 2 | 2 | 6 | 1 | 11 | 1 | 11 | 2 | 3 | 2 | 0 | 3 | 2 |
| 104 | 10 | 8 | 7 | 2 | 3 | 9 | 6 | 3 | 7 | 2 | 7 | 10 | 10 | 4 |
| 105 | 6 | 1 | 4 | 3 | 0 | 4 | 0 | 3 | 9 | 6 | 7 | 8 | 5 | 10 |
| 106 | 8 | 8 | 10 | 7 | 2 | 5 | 3 | 3 | 5 | 11 | 3 | 8 | 2 | 10 |
| 107 | 10 | 7 | 5 | 2 | 7 | 11 | 9 | 1 | 2 | 0 | 3 | 1 | 5 | 1 |
| 108 | 6 | 7 | 11 | 9 | 1 | 9 | 1 | 8 | 3 | 8 | 3 | 0 | 8 | 6 |
| 109 | 5 | 3 | 0 | 7 | 8 | 11 | 5 | 6 | 8 | 4 | 10 | 8 | 9 | 10 |
| 110 | 1 | 7 | 3 | 8 | 2 | 4 | 2 | 3 | 11 | 9 | 8 | 10 | 7 | 4 |
| 111 | 5 | 9 | 2 | 5 | 3 | 0 | 11 | 8 | 0 | 11 | 9 | 9 | 1 | 10 |
| 112 | 8 | 3 | 6 | 0 | 6 | 0 | 0 | 2 | 1 | 0 | 3 | 0 | 2 | 0 |
| 113 | 1 | 6 | 8 | 0 | 9 | 10 | 0 | 9 | 4 | 5 | 4 | 3 | 11 | 10 |
| 114 | 1 | 4 | 10 | 8 | 6 | 4 | 8 | 1 | 8 | 3 | 10 | 0 | 6 | 7 |
| 115 | 5 | 11 | 10 | 10 | 10 | 1 | 11 | 9 | 2 | 4 | 11 | 1 | 7 | 6 |
| 116 | 10 | 1 | 6 | 6 | 1 | 7 | 0 | 2 | 10 | 11 | 8 | 7 | 1 | 2 |
| 117 | 10 | 11 | 2 | 8 | 1 | 5 | 7 | 6 | 11 | 7 | 10 | 10 | 9 | 6 |
| 118 | 2 | 11 | 6 | 1 | 9 | 8 | 1 | 4 | 8 | 9 | 2 | 1 | 9 | 9 |
| 119 | 8 | 8 | 4 | 4 | 11 | 3 | 2 | 5 | 2 | 4 | 9 | 2 | 4 | 11 |
| 120 | 10 | 1 | 3 | 7 | 4 | 10 | 3 | 9 | 4 | 2 | 6 | 7 | 6 | 11 |
| 121 | 5 | 11 | 5 | 4 | 0 | 7 | 11 | 5 | 5 | 2 | 6 | 5 | 5 | 3 |
| 122 | 11 | 4 | 0 | 0 | 7 | 5 | 3 | 7 | 1 | 6 | 8 | 6 | 10 | 6 |
| 123 | 0 | 0 | 1 | 3 | 10 | 11 | 8 | 9 | 11 | 6 | 7 | 0 | 3 | 5 |
| 124 | 3 | 1 | 0 | 0 | 8 | 3 | 3 | 4 | 7 | 2 | 7 | 8 | 11 | 9 |
| 125 | 2 | 10 | 3 | 10 | 3 | 6 | 0 | 3 | 1 | 4 | 6 | 4 | 8 | 2 |
| 126 | 4 | 10 | 11 | 2 | 6 | 9 | 7 | 4 | 4 | 5 | 8 | 11 | 9 | 6 |
| 127 | 7 | 5 | 9 | 6 | 7 | 2 | 6 | 8 | 0 | 7 | 1 | 3 | 1 | 5 |
| 128 | 7 | 6 | 4 | 8 | 9 | 8 | 2 | 1 | 8 | 7 | 8 | 7 | 10 | 1 |
| 129 | 5 | 6 | 9 | 1 | 10 | 5 | 3 | 5 | 10 | 7 | 9 | 0 | 8 | 6 |
| 130 | 6 | 6 | 2 | 1 | 6 | 2 | 11 | 2 | 7 | 4 | 2 | 5 | 6 | 11 |
| 131 | 7 | 1 | 10 | 1 | 3 | 6 | 4 | 5 | 0 | 8 | 10 | 1 | 7 | 10 |
| 132 | 2 | 4 | 5 | 10 | 9 | 7 | 5 | 3 | 4 | 3 | 8 | 9 | 3 | 4 |
| 133 | 2 | 8 | 4 | 3 | 6 | 11 | 0 | 6 | 3 | 2 | 9 | 3 | 8 | 6 |
| 134 | 2 | 6 | 1 | 3 | 11 | 0 | 6 | 6 | 9 | 4 | 7 | 9 | 9 | 3 |
| 135 | 11 | 2 | 5 | 0 | 9 | 7 | 9 | 8 | 0 | 8 | 10 | 7 | 2 | 1 |
| 136 | 1 | 7 | 9 | 9 | 1 | 2 | 3 | 6 | 8 | 2 | 1 | 5 | 10 | 7 |
| 137 | 1 | 4 | 2 | 2 | 0 | 10 | 4 | 0 | 0 | 7 | 1 | 0 | 4 | 1 |
| 138 | 8 | 5 | 9 | 1 | 8 | 9 | 7 | 6 | 10 | 9 | 3 | 5 | 6 | 1 |
| 139 | 9 | 9 | 0 | 4 | 9 | 10 | 5 | 6 | 11 | 0 | 0 | 1 | 10 | 11 |
| 140 | 6 | 5 | 6 | 3 | 9 | 2 | 7 | 4 | 3 | 1 | 4 | 10 | 2 | 7 |
| 141 | 10 | 10 | 1 | 2 | 5 | 4 | 4 | 9 | 10 | 3 | 6 | 0 | 10 | 0 |
| 142 | 10 | 4 | 0 | 9 | 10 | 2 | 11 | 6 | 4 | 3 | 3 | 2 | 4 | 10 |
| 143 | 5 | 0 | 6 | 5 | 0 | 0 | 10 | 9 | 3 | 1 | 5 | 2 | 5 | 6 |
| 144 | 7 | 9 | 10 | 9 | 4 | 9 | 4 | 6 | 7 | 5 | 0 | 8 | 5 | 3 |
| 145 | 3 | 9 | 3 | 0 | 10 | 2 | 2 | 2 | 8 | 0 | 5 | 9 | 8 | 1 |
| 146 | 8 | 2 | 2 | 4 | 10 | 4 | 6 | 4 | 11 | 10 | 1 | 7 | 8 | 8 |
| 147 | 9 | 7 | 9 | 0 | 5 | 0 | 7 | 10 | 2 | 9 | 0 | 10 | 9 | 11 |
| 148 | 1 | 8 | 1 | 5 | 7 | 1 | 3 | 6 | 4 | 9 | 5 | 10 | 2 | 8 |
| 149 | 7 | 0 | 7 | 0 | 10 | 8 | 6 | 9 | 10 | 10 | 0 | 3 | 4 | 0 |
| 150 | 8 | 1 | 11 | 11 | 2 | 2 | 5 | 7 | 7 | 4 | 3 | 1 | 4 | 9 |
| 151 | 5 | 10 | 4 | 0 | 7 | 10 | 9 | 5 | 8 | 9 | 11 | 6 | 8 | 3 |
| 152 | 4 | 4 | 8 | 9 | 4 | 4 | 1 | 11 | 1 | 5 | 11 | 5 | 11 | 8 |
| 153 | 5 | 7 | 5 | 0 | 11 | 4 | 5 | 4 | 8 | 11 | 8 | 0 | 0 | 8 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 154 | 8 | 6 | 11 | 11 | 9 | 0 | 3 | 0 | 2 | 9 | 2 | 6 | 1 | 3 |
| 155 | 0 | 7 | 0 | 6 | 4 | 8 | 1 | 2 | 8 | 2 | 5 | 2 | 1 | 8 |
| 156 | 10 | 5 | 11 | 2 | 0 | 1 | 0 | 9 | 3 | 10 | 3 | 3 | 0 | 8 |
| 157 | 1 | 9 | 3 | 11 | 10 | 7 | 0 | 6 | 11 | 1 | 1 | 6 | 2 | 5 |
| 158 | 6 | 0 | 8 | 4 | 4 | 9 | 11 | 11 | 3 | 6 | 0 | 11 | 0 | 5 |
| 159 | 3 | 10 | 11 | 4 | 10 | 5 | 10 | 0 | 6 | 5 | 6 | 3 | 11 | 2 |
| 160 | 8 | 11 | 11 | 9 | 11 | 0 | 11 | 11 | 6 | 7 | 11 | 8 | 8 | 0 |
| 161 | 3 | 3 | 1 | 0 | 5 | 6 | 9 | 3 | 9 | 8 | 6 | 11 | 3 | 11 |
| 162 | 10 | 8 | 10 | 0 | 11 | 1 | 9 | 0 | 1 | 10 | 6 | 0 | 1 | 4 |
| 163 | 2 | 2 | 1 | 7 | 6 | 9 | 10 | 5 | 10 | 4 | 0 | 10 | 3 | 5 |
| 164 | 7 | 0 | 5 | 1 | 9 | 1 | 10 | 1 | 7 | 1 | 11 | 5 | 0 | 4 |
| 165 | 4 | 0 | 2 | 5 | 9 | 9 | 8 | 2 | 10 | 9 | 1 | 0 | 9 | 2 |
| 166 | 11 | 8 | 0 | 2 | 1 | 7 | 9 | 3 | 4 | 9 | 3 | 11 | 8 | 0 |
| 167 | 11 | 10 | 8 | 5 | 6 | 5 | 9 | 6 | 2 | 9 | 0 | 9 | 11 | 6 |
| 168 | 6 | 1 | 7 | 3 | 7 | 9 | 3 | 7 | 10 | 5 | 4 | 11 | 7 | 11 |
| 169 | 2 | 1 | 7 | 9 | 0 | 8 | 10 | 9 | 11 | 4 | 7 | 5 | 1 | 7 |
| 170 | 5 | 7 | 3 | 5 | 5 | 11 | 4 | 7 | 10 | 10 | 7 | 6 | 6 | 1 |
| 171 | 9 | 11 | 1 | 1 | 1 | 10 | 10 | 8 | 2 | 5 | 11 | 3 | 9 | 1 |
| 172 | 10 | 7 | 9 | 10 | 2 | 7 | 3 | 0 | 6 | 6 | 3 | 7 | 7 | 3 |
| 173 | 8 | 9 | 7 | 5 | 2 | 10 | 4 | 1 | 9 | 6 | 8 | 3 | 10 | 7 |
| 174 | 2 | 9 | 0 | 11 | 6 | 4 | 4 | 9 | 1 | 10 | 10 | 9 | 11 | 5 |
| 175 | 9 | 0 | 6 | 0 | 1 | 3 | 2 | 0 | 1 | 4 | 2 | 6 | 5 | 5 |
| 176 | 5 | 10 | 6 | 6 | 2 | 3 | 7 | 10 | 10 | 6 | 5 | 3 | 8 | 1 |
| 177 | 1 | 11 | 5 | 6 | 10 | 2 | 1 | 8 | 3 | 2 | 7 | 10 | 6 | 10 |
| 178 | 4 | 2 | 10 | 5 | 2 | 4 | 10 | 2 | 0 | 4 | 10 | 8 | 11 | 3 |
| 179 | 7 | 5 | 8 | 10 | 9 | 6 | 2 | 9 | 10 | 3 | 7 | 10 | 1 | 8 |
| 180 | 11 | 7 | 3 | 3 | 3 | 8 | 1 | 10 | 4 | 5 | 9 | 5 | 10 | 1 |
| 181 | 8 | 4 | 9 | 1 | 3 | 1 | 2 | 10 | 2 | 11 | 5 | 11 | 2 | 0 |
| 182 | 3 | 5 | 2 | 5 | 11 | 6 | 5 | 7 | 2 | 8 | 1 | 3 | 5 | 9 |
| 183 | 6 | 0 | 10 | 3 | 1 | 7 | 5 | 9 | 0 | 1 | 9 | 11 | 4 | 4 |
| 184 | 0 | 3 | 9 | 8 | 7 | 4 | 6 | 1 | 2 | 6 | 5 | 8 | 8 | 11 |
| 185 | 6 | 8 | 11 | 8 | 7 | 10 | 7 | 9 | 10 | 4 | 11 | 0 | 11 | 7 |
| 186 | 9 | 3 | 4 | 11 | 7 | 4 | 3 | 6 | 3 | 10 | 2 | 7 | 4 | 9 |
| 187 | 1 | 6 | 4 | 8 | 8 | 5 | 7 | 5 | 5 | 1 | 6 | 4 | 7 | 2 |
| 188 | 3 | 8 | 9 | 2 | 9 | 5 | 6 | 11 | 11 | 8 | 6 | 1 | 5 | 7 |
| 189 | 1 | 8 | 0 | 8 | 5 | 11 | 9 | 2 | 5 | 2 | 0 | 7 | 10 | 10 |
| 190 | 10 | 9 | 9 | 7 | 2 | 1 | 11 | 6 | 1 | 1 | 11 | 10 | 5 | 2 |
| 191 | 6 | 4 | 9 | 8 | 8 | 10 | 1 | 8 | 9 | 2 | 8 | 5 | 2 | 4 |
| 192 | 5 | 6 | 2 | 4 | 0 | 3 | 2 | 7 | 6 | 8 | 4 | 8 | 1 | 1 |
| 193 | 11 | 0 | 8 | 9 | 5 | 8 | 9 | 8 | 7 | 2 | 1 | 3 | 6 | 4 |
| 194 | 8 | 3 | 2 | 8 | 1 | 6 | 8 | 4 | 10 | 11 | 3 | 9 | 10 | 11 |
| 195 | 9 | 0 | 2 | 11 | 2 | 8 | 4 | 7 | 4 | 7 | 4 | 7 | 0 | 8 |
| 196 | 1 | 4 | 1 | 7 | 0 | 11 | 3 | 4 | 3 | 5 | 2 | 8 | 8 | 2 |
| 197 | 4 | 10 | 10 | 0 | 0 | 11 | 4 | 5 | 10 | 11 | 5 | 7 | 11 | 9 |
| 198 | 4 | 5 | 7 | 6 | 0 | 3 | 10 | 8 | 8 | 2 | 9 | 0 | 11 | 0 |
| 199 | 2 | 2 | 6 | 5 | 5 | 5 | 11 | 5 | 7 | 5 | 2 | 4 | 5 | 1 |
| 200 | 5 | 1 | 11 | 7 | 11 | 6 | 2 | 10 | 1 | 5 | 2 | 10 | 11 | 10 |
| 201 | 9 | 0 | 7 | 11 | 7 | 2 | 1 | 0 | 2 | 11 | 3 | 11 | 8 | 10 |
| 202 | 5 | 0 | 0 | 1 | 0 | 10 | 2 | 2 | 1 | 2 | 3 | 1 | 9 | 4 |
| 203 | 4 | 4 | 9 | 7 | 8 | 2 | 9 | 11 | 5 | 8 | 2 | 11 | 6 | 9 |
| 204 | 6 | 11 | 6 | 2 | 11 | 1 | 7 | 6 | 0 | 4 | 1 | 5 | 1 | 10 |
| 205 | 5 | 0 | 4 | 8 | 2 | 11 | 0 | 0 | 9 | 3 | 5 | 5 | 7 | 0 |
| 206 | 6 | 10 | 5 | 4 | 4 | 4 | 4 | 8 | 0 | 10 | 2 | 4 | 1 | 6 |
| 207 | 5 | 4 | 5 | 9 | 5 | 3 | 8 | 10 | 11 | 4 | 0 | 0 | 11 | 3 |
| 208 | 11 | 3 | 1 | 0 | 9 | 9 | 7 | 7 | 11 | 0 | 4 | 9 | 5 | 9 |
| 209 | 2 | 6 | 2 | 6 | 11 | 1 | 2 | 4 | 0 | 5 | 10 | 7 | 4 | 6 |
| 210 | 5 | 4 | 11 | 4 | 8 | 6 | 0 | 7 | 0 | 1 | 8 | 2 | 7 | 9 |
| 211 | 0 | 1 | 6 | 1 | 10 | 3 | 11 | 1 | 2 | 10 | 4 | 6 | 1 | 0 |
| 212 | 7 | 4 | 11 | 6 | 0 | 2 | 1 | 0 | 10 | 0 | 10 | 8 | 7 | 7 |
| 213 | 10 | 7 | 6 | 1 | 4 | 1 | 5 | 11 | 5 | 5 | 9 | 10 | 0 | 11 |
| 214 | 2 | 5 | 3 | 7 | 7 | 9 | 8 | 1 | 2 | 8 | 9 | 9 | 7 | 2 |
| 215 | 0 | 1 | 1 | 6 | 4 | 3 | 9 | 0 | 11 | 5 | 10 | 5 | 2 | 11 |
| 216 | 1 | 9 | 7 | 1 | 5 | 2 | 2 | 1 | 7 | 10 | 9 | 0 | 5 | 8 |
| 217 | 11 | 6 | 1 | 10 | 1 | 1 | 1 | 3 | 8 | 6 | 8 | 5 | 1 | 9 |
| 218 | 8 | 3 | 5 | 9 | 3 | 11 | 5 | 5 | 9 | 6 | 7 | 6 | 11 | 2 |
| 219 | 7 | 1 | 7 | 11 | 9 | 4 | 6 | 10 | 5 | 3 | 9 | 9 | 2 | 7 |
| 220 | 2 | 9 | 8 | 8 | 2 | 6 | 9 | 10 | 6 | 2 | 10 | 2 | 2 | 7 |
| 221 | 1 | 11 | 7 | 4 | 7 | 7 | 9 | 2 | 9 | 6 | 2 | 9 | 11 | 5 |
| 222 | 3 | 10 | 0 | 6 | 2 | 0 | 3 | 9 | 9 | 4 | 0 | 4 | 5 | 7 |
| 223 | 0 | 8 | 0 | 8 | 0 | 6 | 6 | 6 | 7 | 10 | 6 | 11 | 11 | 6 |
| 224 | 9 | 6 | 5 | 7 | 3 | 5 | 10 | 1 | 8 | 5 | 4 | 2 | 2 | 9 |
| 225 | 9 | 3 | 4 | 3 | 3 | 1 | 2 | 4 | 7 | 6 | 6 | 3 | 6 | 1 |
| 226 | 4 | 8 | 3 | 3 | 5 | 3 | 10 | 2 | 6 | 3 | 5 | 4 | 5 | 2 |
| 227 | 10 | 3 | 8 | 5 | 2 | 6 | 0 | 1 | 3 | 5 | 6 | 8 | 1 | 9 |
| 228 | 3 | 11 | 11 | 5 | 0 | 11 | 6 | 1 | 6 | 9 | 5 | 11 | 3 | 10 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 229 | 2 | 4 | 8 | 10 | 11 | 10 | 7 | 1 | 6 | 0 | 3 | 4 | 1 | 11 |
| 230 | 4 | 9 | 8 | 7 | 7 | 7 | 2 | 3 | 0 | 6 | 5 | 7 | 6 | 10 |
| 231 | 7 | 5 | 10 | 11 | 6 | 0 | 4 | 10 | 3 | 4 | 5 | 0 | 4 | 11 |
| 232 | 4 | 0 | 10 | 10 | 8 | 5 | 6 | 8 | 1 | 4 | 7 | 0 | 10 | 1 |
| 233 | 6 | 1 | 5 | 7 | 3 | 3 | 4 | 11 | 7 | 3 | 3 | 6 | 10 | 11 |
| 234 | 7 | 5 | 11 | 10 | 1 | 10 | 8 | 2 | 6 | 10 | 0 | 9 | 6 | 4 |
| 235 | 8 | 0 | 10 | 1 | 10 | 8 | 11 | 10 | 9 | 2 | 8 | 9 | 11 | 8 |
| 236 | 6 | 7 | 8 | 10 | 2 | 9 | 7 | 10 | 1 | 7 | 6 | 6 | 11 | 0 |
| 237 | 6 | 3 | 0 | 6 | 11 | 1 | 0 | 10 | 6 | 7 | 3 | 11 | 10 | 4 |
| 238 | 8 | 1 | 10 | 3 | 1 | 0 | 10 | 1 | 5 | 5 | 2 | 7 | 10 | 6 |
| 239 | 5 | 5 | 6 | 3 | 8 | 1 | 11 | 2 | 11 | 7 | 8 | 9 | 4 | 5 |
| 240 | 0 | 10 | 3 | 7 | 0 | 4 | 1 | 8 | 11 | 5 | 6 | 9 | 3 | 9 |
| 241 | 3 | 9 | 7 | 11 | 6 | 3 | 7 | 2 | 10 | 8 | 8 | 5 | 5 | 3 |
| 242 | 9 | 5 | 1 | 8 | 10 | 4 | 0 | 5 | 1 | 8 | 11 | 4 | 6 | 10 |
| 243 | 4 | 5 | 10 | 4 | 1 | 9 | 4 | 8 | 9 | 1 | 6 | 5 | 7 | 7 |
| 244 | 9 | 10 | 6 | 11 | 4 | 2 | 10 | 2 | 4 | 1 | 7 | 3 | 10 | 4 |
| 245 | 11 | 1 | 10 | 5 | 8 | 7 | 3 | 11 | 1 | 7 | 6 | 3 | 8 | 5 |
| 246 | 5 | 9 | 0 | 11 | 7 | 2 | 3 | 4 | 11 | 5 | 11 | 5 | 1 | 4 |
| 247 | 0 | 3 | 6 | 10 | 8 | 9 | 2 | 7 | 5 | 1 | 11 | 1 | 6 | 5 |
| 248 | 3 | 3 | 8 | 1 | 4 | 8 | 8 | 8 | 8 | 7 | 0 | 5 | 2 | 10 |
| 249 | 11 | 5 | 6 | 11 | 5 | 4 | 3 | 1 | 0 | 3 | 7 | 11 | 9 | 6 |
| 250 | 6 | 10 | 10 | 1 | 1 | 8 | 6 | 3 | 4 | 3 | 10 | 2 | 2 | 2 |
| 251 | 11 | 4 | 11 | 1 | 2 | 4 | 8 | 0 | 0 | 9 | 11 | 1 | 3 | 5 |
| 252 | 0 | 2 | 4 | 11 | 10 | 11 | 9 | 4 | 1 | 1 | 2 | 11 | 9 | 3 |
| 253 | 6 | 9 | 3 | 10 | 0 | 8 | 10 | 6 | 10 | 3 | 2 | 0 | 8 | 11 |
| 254 | 1 | 7 | 0 | 10 | 5 | 2 | 4 | 5 | 1 | 5 | 5 | 3 | 8 | 6 |
| 255 | 4 | 4 | 9 | 11 | 4 | 5 | 7 | 9 | 9 | 9 | 4 | 8 | 3 | 3 |
| 256 | 6 | 2 | 10 | 6 | 7 | 6 | 10 | 1 | 2 | 0 | 7 | 3 | 3 | 5 |
| 257 | 3 | 1 | 1 | 9 | 10 | 5 | 4 | 2 | 8 | 9 | 10 | 8 | 9 | 2 |
| 258 | 1 | 5 | 0 | 2 | 4 | 4 | 5 | 6 | 7 | 1 | 3 | 2 | 6 | 8 |
| 259 | 11 | 8 | 9 | 10 | 9 | 7 | 8 | 0 | 10 | 2 | 9 | 6 | 1 | 9 |
| 260 | 7 | 11 | 8 | 5 | 8 | 10 | 11 | 3 | 4 | 3 | 0 | 4 | 4 | 7 |
| 261 | 4 | 9 | 2 | 4 | 0 | 0 | 5 | 10 | 5 | 3 | 10 | 0 | 0 | 4 |
| 262 | 4 | 3 | 1 | 6 | 2 | 9 | 2 | 5 | 9 | 2 | 6 | 7 | 10 | 8 |
| 263 | 0 | 6 | 9 | 8 | 6 | 11 | 0 | 3 | 6 | 0 | 4 | 8 | 5 | 6 |
| 264 | 2 | 4 | 2 | 3 | 5 | 5 | 9 | 9 | 1 | 11 | 3 | 11 | 10 | 5 |
| 265 | 11 | 0 | 5 | 7 | 11 | 2 | 3 | 8 | 7 | 8 | 7 | 11 | 5 | 7 |
| 266 | 4 | 7 | 11 | 7 | 6 | 11 | 3 | 6 | 10 | 10 | 11 | 2 | 9 | 3 |
| 267 | 0 | 10 | 9 | 2 | 0 | 1 | 10 | 0 | 8 | 4 | 3 | 1 | 9 | 7 |
| 268 | 4 | 2 | 3 | 9 | 5 | 7 | 11 | 1 | 11 | 4 | 10 | 7 | 1 | 11 |
| 269 | 6 | 1 | 4 | 1 | 1 | 0 | 7 | 5 | 11 | 6 | 4 | 11 | 6 | 5 |
| 270 | 9 | 0 | 4 | 2 | 11 | 4 | 1 | 3 | 0 | 2 | 2 | 3 | 1 | 0 |
| 271 | 11 | 8 | 6 | 0 | 4 | 8 | 0 | 6 | 11 | 6 | 10 | 10 | 4 | 3 |
| 272 | 3 | 7 | 8 | 11 | 3 | 4 | 11 | 9 | 5 | 1 | 1 | 6 | 1 | 6 |
| 273 | 2 | 8 | 6 | 4 | 6 | 0 | 11 | 1 | 4 | 0 | 6 | 2 | 6 | 2 |
| 274 | 7 | 3 | 7 | 9 | 2 | 2 | 8 | 4 | 8 | 5 | 11 | 4 | 7 | 0 |
| 275 | 4 | 11 | 1 | 10 | 4 | 1 | 0 | 4 | 0 | 0 | 0 | 1 | 8 | 10 |
| 276 | 5 | 3 | 4 | 4 | 11 | 6 | 6 | 9 | 1 | 6 | 9 | 0 | 9 | 9 |
| 277 | 1 | 11 | 11 | 11 | 11 | 0 | 6 | 1 | 7 | 4 | 8 | 3 | 2 | 4 |
| 278 | 3 | 5 | 11 | 3 | 3 | 2 | 1 | 2 | 4 | 10 | 5 | 0 | 5 | 10 |
| 279 | 4 | 6 | 3 | 0 | 0 | 10 | 2 | 6 | 1 | 7 | 9 | 5 | 5 | 10 |
| 280 | 3 | 4 | 6 | 10 | 7 | 9 | 3 | 10 | 9 | 4 | 1 | 10 | 6 | 1 |
| 281 | 6 | 7 | 0 | 0 | 4 | 10 | 6 | 8 | 9 | 4 | 2 | 6 | 8 | 0 |
| 282 | 8 | 3 | 3 | 6 | 6 | 5 | 8 | 3 | 7 | 7 | 2 | 10 | 8 | 4 |
| 283 | 6 | 10 | 5 | 11 | 8 | 9 | 9 | 7 | 8 | 2 | 10 | 10 | 0 | 11 |
| 284 | 11 | 6 | 5 | 0 | 6 | 0 | 1 | 7 | 10 | 9 | 1 | 3 | 11 | 8 |
| 285 | 9 | 3 | 8 | 8 | 9 | 8 | 10 | 10 | 11 | 0 | 5 | 6 | 9 | 2 |
| 286 | 10 | 8 | 3 | 4 | 1 | 4 | 9 | 10 | 6 | 11 | 5 | 3 | 8 | 9 |
| 287 | 1 | 2 | 7 | 7 | 5 | 8 | 1 | 4 | 6 | 7 | 7 | 1 | 0 | 2 |
| 288 | 9 | 11 | 5 | 4 | 5 | 0 | 10 | 0 | 3 | 5 | 9 | 10 | 4 | 5 |
| 289 | 5 | 7 | 4 | 7 | 5 | 2 | 2 | 11 | 0 | 3 | 1 | 5 | 3 | 4 |
| 290 | 10 | 4 | 4 | 0 | 1 | 11 | 4 | 6 | 2 | 2 | 3 | 7 | 3 | 11 |
| 291 | 2 | 11 | 2 | 10 | 2 | 8 | 7 | 6 | 2 | 5 | 6 | 3 | 0 | 9 |
| 292 | 8 | 10 | 7 | 6 | 3 | 7 | 0 | 8 | 4 | 11 | 9 | 5 | 0 | 5 |
| 293 | 5 | 0 | 3 | 7 | 3 | 6 | 7 | 7 | 3 | 0 | 5 | 1 | 7 | 1 |
| 294 | 7 | 4 | 10 | 7 | 3 | 10 | 0 | 8 | 1 | 10 | 3 | 3 | 5 | 11 |
| 295 | 7 | 10 | 6 | 0 | 9 | 6 | 5 | 3 | 8 | 3 | 5 | 0 | 2 | 9 |
| 296 | 9 | 8 | 11 | 5 | 4 | 7 | 1 | 8 | 9 | 3 | 10 | 1 | 11 | 4 |
| 297 | 3 | 1 | 5 | 9 | 6 | 2 | 9 | 4 | 4 | 11 | 9 | 7 | 10 | 11 |
| 298 | 10 | 8 | 10 | 5 | 9 | 10 | 2 | 3 | 9 | 10 | 5 | 2 | 0 | 3 |
| 299 | 5 | 9 | 7 | 1 | 8 | 5 | 1 | 7 | 3 | 3 | 0 | 9 | 11 | 5 |
| 300 | 9 | 8 | 0 | 9 | 8 | 1 | 10 | 5 | 2 | 10 | 10 | 11 | 8 | 7 |
| 301 | 5 | 7 | 10 | 11 | 1 | 3 | 10 | 4 | 8 | 1 | 9 | 1 | 3 | 10 |
| 302 | 3 | 3 | 9 | 3 | 1 | 9 | 6 | 0 | 4 | 0 | 9 | 2 | 11 | 7 |
| 303 | 6 | 3 | 6 | 4 | 4 | 5 | 4 | 2 | 5 | 3 | 3 | 10 | 6 | 10 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 304 | 3 | 9 | 9 | 1 | 8 | 4 | 2 | 11 | 2 | 1 | 9 | 4 | 4 | 1 |
| 305 | 8 | 6 | 0 | 3 | 3 | 4 | 2 | 11 | 8 | 7 | 3 | 3 | 9 | 5 |
| 306 | 7 | 9 | 1 | 11 | 3 | 8 | 1 | 2 | 11 | 2 | 1 | 3 | 9 | 3 |
| 307 | 5 | 1 | 9 | 6 | 2 | 10 | 7 | 1 | 0 | 5 | 10 | 11 | 1 | 10 |
| 308 | 5 | 7 | 11 | 4 | 7 | 5 | 4 | 8 | 2 | 8 | 0 | 5 | 5 | 11 |
| 309 | 7 | 10 | 9 | 5 | 4 | 4 | 8 | 5 | 5 | 11 | 5 | 10 | 7 | 1 |
| 310 | 6 | 0 | 9 | 11 | 3 | 3 | 1 | 0 | 0 | 4 | 11 | 4 | 6 | 6 |
| 311 | 1 | 10 | 6 | 7 | 6 | 7 | 5 | 1 | 0 | 9 | 8 | 7 | 10 | 8 |
| 312 | 4 | 3 | 10 | 5 | 1 | 4 | 11 | 10 | 2 | 9 | 4 | 0 | 7 | 11 |
| 313 | 6 | 0 | 1 | 8 | 6 | 10 | 9 | 0 | 1 | 10 | 4 | 6 | 9 | 8 |
| 314 | 7 | 11 | 9 | 0 | 11 | 2 | 2 | 7 | 9 | 0 | 2 | 3 | 4 | 10 |
| 315 | 3 | 6 | 3 | 8 | 0 | 11 | 8 | 1 | 3 | 11 | 11 | 1 | 0 | 7 |
| 316 | 9 | 11 | 2 | 3 | 0 | 6 | 4 | 11 | 3 | 2 | 4 | 5 | 10 | 7 |
| 317 | 8 | 5 | 1 | 9 | 3 | 1 | 7 | 11 | 11 | 11 | 2 | 9 | 7 | 2 |
| 318 | 2 | 2 | 2 | 0 | 8 | 7 | 2 | 0 | 7 | 0 | 11 | 0 | 6 | 8 |
| 319 | 4 | 5 | 2 | 9 | 8 | 2 | 4 | 5 | 9 | 3 | 4 | 3 | 5 | 5 |
| 320 | 10 | 0 | 9 | 0 | 10 | 2 | 3 | 4 | 6 | 7 | 8 | 4 | 10 | 9 |
| 321 | 6 | 10 | 11 | 3 | 11 | 6 | 2 | 8 | 10 | 9 | 5 | 7 | 0 | 4 |
| 322 | 2 | 5 | 9 | 9 | 11 | 3 | 0 | 6 | 2 | 8 | 10 | 5 | 2 | 4 |
| 323 | 6 | 10 | 6 | 4 | 0 | 11 | 0 | 10 | 10 | 2 | 8 | 6 | 7 | 6 |
| 324 | 2 | 5 | 8 | 7 | 10 | 8 | 11 | 7 | 3 | 11 | 7 | 2 | 3 | 8 |
| 325 | 3 | 0 | 1 | 2 | 5 | 5 | 8 | 10 | 5 | 0 | 0 | 9 | 0 | 6 |
| 326 | 2 | 6 | 8 | 3 | 7 | 8 | 6 | 5 | 11 | 3 | 2 | 7 | 0 | 7 |
| 327 | 2 | 2 | 10 | 10 | 4 | 0 | 9 | 11 | 8 | 10 | 8 | 5 | 4 | 2 |
| 328 | 9 | 4 | 9 | 3 | 5 | 10 | 8 | 6 | 10 | 9 | 6 | 3 | 3 | 10 |
| 329 | 0 | 5 | 10 | 2 | 11 | 3 | 3 | 1 | 8 | 2 | 0 | 4 | 5 | 2 |
| 330 | 9 | 11 | 10 | 9 | 11 | 0 | 3 | 9 | 4 | 1 | 3 | 0 | 11 | 7 |
| 331 | 5 | 5 | 5 | 3 | 0 | 5 | 5 | 8 | 5 | 10 | 1 | 10 | 10 | 0 |
| 332 | 0 | 0 | 11 | 11 | 10 | 4 | 2 | 6 | 1 | 0 | 3 | 6 | 0 | 7 |
| 333 | 11 | 9 | 6 | 9 | 1 | 1 | 10 | 2 | 9 | 11 | 7 | 0 | 0 | 5 |
| 334 | 3 | 7 | 6 | 4 | 8 | 6 | 6 | 6 | 4 | 1 | 3 | 11 | 0 | 4 |
| 335 | 8 | 6 | 10 | 11 | 4 | 8 | 4 | 5 | 6 | 6 | 7 | 11 | 9 | 4 |
| 336 | 4 | 11 | 7 | 9 | 10 | 3 | 8 | 2 | 6 | 10 | 1 | 3 | 10 | 11 |
| 337 | 1 | 1 | 0 | 3 | 10 | 6 | 10 | 2 | 9 | 8 | 9 | 6 | 2 | 6 |
| 338 | 2 | 10 | 9 | 8 | 10 | 9 | 9 | 8 | 3 | 0 | 8 | 0 | 9 | 3 |
| 339 | 3 | 2 | 5 | 11 | 11 | 11 | 5 | 2 | 3 | 9 | 4 | 4 | 8 | 9 |
| 340 | 1 | 3 | 1 | 4 | 8 | 2 | 5 | 3 | 1 | 5 | 7 | 1 | 3 | 5 |
| 341 | 7 | 4 | 7 | 2 | 2 | 7 | 10 | 2 | 10 | 3 | 8 | 1 | 10 | 1 |
| 342 | 5 | 1 | 3 | 9 | 9 | 11 | 1 | 3 | 10 | 11 | 2 | 4 | 3 | 5 |
| 343 | 0 | 11 | 1 | 6 | 2 | 8 | 10 | 1 | 8 | 1 | 11 | 8 | 4 | 6 |
| 344 | 10 | 1 | 5 | 1 | 8 | 6 | 2 | 4 | 5 | 4 | 8 | 1 | 0 | 0 |
| 345 | 1 | 5 | 5 | 8 | 7 | 6 | 3 | 5 | 2 | 10 | 0 | 8 | 6 | 6 |
| 346 | 5 | 9 | 11 | 5 | 3 | 11 | 6 | 2 | 3 | 4 | 10 | 7 | 10 | 8 |
| 347 | 0 | 0 | 7 | 5 | 0 | 7 | 5 | 3 | 9 | 8 | 8 | 5 | 2 | 10 |
| 348 | 10 | 9 | 7 | 8 | 8 | 9 | 0 | 10 | 5 | 11 | 2 | 8 | 3 | 11 |
| 349 | 8 | 9 | 5 | 10 | 10 | 4 | 5 | 1 | 9 | 8 | 11 | 8 | 9 | 0 |
| 350 | 10 | 9 | 6 | 11 | 1 | 8 | 7 | 3 | 8 | 8 | 2 | 2 | 6 | 8 |
| 351 | 11 | 1 | 7 | 8 | 0 | 1 | 6 | 11 | 2 | 0 | 8 | 8 | 10 | 0 |
| 352 | 1 | 11 | 1 | 1 | 0 | 5 | 2 | 6 | 0 | 10 | 4 | 4 | 6 | 3 |
| 353 | 2 | 10 | 10 | 2 | 5 | 2 | 4 | 0 | 11 | 1 | 11 | 8 | 7 | 9 |
| 354 | 6 | 6 | 1 | 2 | 1 | 11 | 7 | 4 | 3 | 8 | 7 | 7 | 5 | 3 |
| 355 | 9 | 0 | 3 | 8 | 5 | 2 | 0 | 4 | 2 | 9 | 10 | 9 | 5 | 2 |
| 356 | 1 | 8 | 8 | 0 | 11 | 1 | 0 | 3 | 3 | 1 | 5 | 9 | 9 | 11 |
| 357 | 1 | 6 | 10 | 4 | 2 | 4 | 3 | 2 | 2 | 6 | 9 | 7 | 3 | 0 |
| 358 | 1 | 7 | 2 | 0 | 3 | 8 | 10 | 9 | 0 | 8 | 0 | 0 | 11 | 5 |
| 359 | 1 | 6 | 6 | 6 | 0 | 6 | 8 | 4 | 7 | 4 | 5 | 7 | 1 | 10 |
| 360 | 2 | 1 | 6 | 7 | 9 | 9 | 4 | 6 | 11 | 4 | 4 | 0 | 11 | 6 |
| 361 | 9 | 5 | 1 | 7 | 8 | 4 | 1 | 7 | 10 | 7 | 10 | 0 | 2 | 6 |
| 362 | 9 | 7 | 8 | 2 | 5 | 1 | 2 | 1 | 1 | 2 | 7 | 9 | 7 | 1 |
| 363 | 6 | 1 | 8 | 2 | 8 | 8 | 6 | 11 | 7 | 4 | 11 | 10 | 11 | 2 |
| 364 | 10 | 1 | 3 | 10 | 9 | 8 | 5 | 0 | 3 | 9 | 0 | 8 | 7 | 8 |
| 365 | 11 | 3 | 5 | 11 | 7 | 3 | 8 | 9 | 4 | 10 | 6 | 0 | 0 | 4 |
| 366 | 8 | 7 | 2 | 0 | 0 | 1 | 3 | 8 | 1 | 3 | 6 | 7 | 4 | 2 |
| 367 | 9 | 4 | 3 | 9 | 11 | 7 | 1 | 4 | 7 | 0 | 8 | 2 | 9 | 10 |
| 368 | 10 | 4 | 4 | 8 | 5 | 1 | 10 | 1 | 0 | 7 | 2 | 6 | 0 | 6 |
| 369 | 7 | 1 | 2 | 8 | 3 | 4 | 8 | 7 | 0 | 5 | 7 | 7 | 0 | 2 |
| 370 | 4 | 2 | 7 | 2 | 0 | 4 | 7 | 5 | 5 | 10 | 0 | 6 | 8 | 5 |
| 371 | 8 | 4 | 7 | 3 | 6 | 0 | 2 | 4 | 9 | 2 | 0 | 6 | 3 | 0 |
| 372 | 2 | 9 | 0 | 6 | 10 | 5 | 7 | 8 | 7 | 1 | 10 | 3 | 3 | 7 |
| 373 | 1 | 3 | 5 | 1 | 10 | 0 | 4 | 0 | 1 | 6 | 1 | 7 | 7 | 7 |
| 374 | 3 | 9 | 10 | 6 | 11 | 6 | 1 | 3 | 1 | 7 | 8 | 1 | 7 | 7 |
| 375 | 2 | 4 | 8 | 2 | 1 | 4 | 5 | 8 | 9 | 3 | 6 | 10 | 8 | 3 |
| 376 | 2 | 2 | 4 | 10 | 7 | 11 | 2 | 10 | 1 | 9 | 6 | 9 | 3 | 6 |
| 377 | 11 | 7 | 7 | 0 | 10 | 6 | 1 | 5 | 3 | 7 | 4 | 8 | 5 | 3 |
| 378 | 3 | 6 | 0 | 5 | 8 | 3 | 6 | 2 | 2 | 8 | 11 | 2 | 7 | 10 |
| 379 | 7 | 10 | 3 | 2 | 4 | 1 | 2 | 10 | 4 | 3 | 10 | 5 | 6 | 3 |
| 380 | 8 | 11 | 8 | 0 | 4 | 3 | 1 | 1 | 7 | 8 | 6 | 4 | 1 | 3 |
| 381 | 6 | 0 | 11 | 1 | 6 | 5 | 3 | 1 | 0 | 0 | 2 | 0 | 11 | 9 |
| 382 | 9 | 9 | 0 | 0 | 6 | 2 | 6 | 0 | 5 | 2 | 1 | 7 | 1 | 1 |
| 383 | 0 | 11 | 10 | 6 | 5 | 7 | 7 | 5 | 3 | 8 | 5 | 0 | 6 | 4 |
| 384 | 1 | 2 | 0 | 6 | 6 | 4 | 7 | 3 | 4 | 4 | 11 | 11 | 10 | 2 |
| 385 | 4 | 11 | 4 | 7 | 11 | 7 | 7 | 9 | 2 | 2 | 11 | 6 | 2 | 2 |
| 386 | 0 | 8 | 5 | 11 | 0 | 6 | 3 | 10 | 8 | 5 | 7 | 9 | 7 | 8 |
| 387 | 8 | 8 | 6 | 0 | 5 | 4 | 8 | 8 | 6 | 8 | 1 | 1 | 3 | 1 |
| 388 | 11 | 2 | 5 | 4 | 2 | 10 | 7 | 3 | 5 | 7 | 3 | 5 | 9 | 9 |
| 389 | 8 | 10 | 8 | 9 | 10 | 11 | 8 | 11 | 5 | 7 | 10 | 7 | 3 | 10 |
| 390 | 3 | 8 | 10 | 7 | 10 | 2 | 10 | 8 | 10 | 4 | 6 | 9 | 0 | 0 |
| 391 | 4 | 6 | 7 | 10 | 5 | 9 | 6 | 3 | 3 | 6 | 3 | 8 | 4 | 1 |
| 392 | 0 | 5 | 11 | 1 | 11 | 10 | 5 | 10 | 11 | 5 | 4 | 7 | 2 | 7 |
| 393 | 1 | 1 | 9 | 10 | 11 | 5 | 8 | 6 | 6 | 6 | 11 | 9 | 11 | 7 |
| 394 | 7 | 9 | 6 | 3 | 7 | 3 | 4 | 10 | 3 | 1 | 10 | 11 | 5 | 10 |
| 395 | 4 | 1 | 8 | 3 | 4 | 10 | 5 | 0 | 2 | 0 | 1 | 11 | 9 | 6 |
| 396 | 2 | 0 | 10 | 9 | 9 | 6 | 7 | 10 | 5 | 7 | 11 | 11 | 1 | 5 |
| 397 | 0 | 10 | 7 | 4 | 11 | 0 | 9 | 11 | 3 | 6 | 10 | 2 | 1 | 8 |
| 398 | 2 | 6 | 7 | 4 | 4 | 2 | 11 | 4 | 3 | 10 | 4 | 3 | 9 | 6 |
| 399 | 6 | 11 | 11 | 3 | 2 | 5 | 11 | 7 | 9 | 1 | 10 | 4 | 2 | 1 |
| 400 | 3 | 9 | 6 | 1 | 2 | 8 | 3 | 6 | 7 | 3 | 4 | 8 | 10 | 0 |
| 401 | 5 | 7 | 1 | 9 | 7 | 8 | 0 | 5 | 10 | 6 | 5 | 9 | 1 | 10 |
| 402 | 7 | 9 | 3 | 7 | 11 | 9 | 8 | 0 | 8 | 11 | 1 | 6 | 4 | 6 |
| 403 | 1 | 2 | 11 | 5 | 0 | 2 | 6 | 11 | 9 | 6 | 0 | 9 | 5 | 9 |
| 404 | 5 | 9 | 5 | 1 | 6 | 7 | 4 | 4 | 2 | 7 | 6 | 6 | 9 | 4 |
| 405 | 11 | 9 | 4 | 10 | 4 | 5 | 1 | 6 | 8 | 9 | 7 | 1 | 2 | 0 |
| 406 | 2 | 9 | 3 | 5 | 11 | 8 | 2 | 4 | 4 | 4 | 11 | 8 | 2 | 11 |
| 407 | 5 | 0 | 2 | 3 | 7 | 0 | 5 | 0 | 11 | 7 | 3 | 1 | 1 | 3 |
| 408 | 0 | 5 | 0 | 1 | 2 | 7 | 6 | 9 | 4 | 2 | 10 | 11 | 9 | 5 |
| 409 | 11 | 11 | 5 | 7 | 9 | 9 | 5 | 5 | 4 | 9 | 3 | 1 | 4 | 11 |
| 410 | 11 | 9 | 8 | 4 | 1 | 9 | 8 | 9 | 11 | 5 | 9 | 4 | 3 | 2 |
| 411 | 2 | 5 | 11 | 9 | 4 | 10 | 8 | 7 | 8 | 1 | 9 | 8 | 0 | 3 |
| 412 | 3 | 8 | 3 | 10 | 3 | 0 | 11 | 3 | 7 | 5 | 11 | 0 | 3 | 9 |
| 413 | 9 | 7 | 2 | 8 | 7 | 7 | 11 | 1 | 3 | 1 | 6 | 0 | 2 | 9 |
| 414 | 10 | 6 | 7 | 11 | 3 | 11 | 3 | 9 | 6 | 10 | 9 | 10 | 6 | 2 |
| 415 | 2 | 3 | 0 | 11 | 0 | 0 | 5 | 7 | 6 | 1 | 2 | 9 | 5 | 2 |
| 416 | 9 | 7 | 9 | 11 | 6 | 10 | 9 | 8 | 7 | 1 | 11 | 8 | 10 | 5 |
| 417 | 4 | 0 | 1 | 4 | 1 | 1 | 8 | 7 | 1 | 3 | 2 | 11 | 10 | 7 |
| 418 | 7 | 6 | 8 | 9 | 6 | 3 | 7 | 6 | 7 | 6 | 9 | 2 | 11 | 5 |
| 419 | 11 | 11 | 0 | 7 | 11 | 4 | 0 | 2 | 11 | 1 | 1 | 8 | 8 | 1 |
| 420 | 9 | 7 | 5 | 6 | 10 | 5 | 0 | 11 | 11 | 3 | 8 | 4 | 0 | 3 |
| 421 | 7 | 8 | 2 | 8 | 10 | 0 | 1 | 4 | 10 | 2 | 4 | 10 | 8 | 6 |
| 422 | 7 | 5 | 3 | 0 | 11 | 7 | 4 | 5 | 5 | 7 | 3 | 0 | 8 | 0 |
| 423 | 6 | 5 | 3 | 8 | 9 | 4 | 2 | 0 | 6 | 3 | 11 | 2 | 4 | 5 |
| 424 | 9 | 1 | 8 | 5 | 9 | 3 | 9 | 7 | 1 | 3 | 3 | 8 | 8 | 9 |
| 425 | 7 | 5 | 7 | 10 | 7 | 0 | 11 | 0 | 1 | 11 | 2 | 4 | 11 | 1 |
| 426 | 0 | 3 | 7 | 7 | 1 | 3 | 9 | 8 | 10 | 3 | 0 | 3 | 7 | 7 |
| 427 | 8 | 4 | 4 | 4 | 6 | 5 | 5 | 11 | 10 | 4 | 7 | 5 | 7 | 9 |
| 428 | 10 | 0 | 2 | 1 | 5 | 10 | 10 | 7 | 9 | 8 | 7 | 8 | 8 | 11 |
| 429 | 10 | 7 | 11 | 2 | 9 | 9 | 0 | 2 | 0 | 9 | 9 | 11 | 2 | 0 |
| 430 | 5 | 9 | 1 | 0 | 5 | 1 | 4 | 9 | 7 | 4 | 8 | 4 | 6 | 10 |
| 431 | 3 | 5 | 2 | 8 | 5 | 8 | 7 | 10 | 6 | 10 | 9 | 4 | 1 | 3 |
| 432 | 10 | 10 | 6 | 3 | 6 | 6 | 1 | 2 | 6 | 7 | 6 | 5 | 11 | 1 |
| 433 | 0 | 1 | 1 | 8 | 4 | 6 | 6 | 1 | 1 | 3 | 1 | 3 | 0 | 10 |
| 434 | 5 | 10 | 1 | 6 | 6 | 3 | 11 | 5 | 3 | 3 | 10 | 6 | 4 | 9 |
| 435 | 11 | 0 | 7 | 6 | 4 | 10 | 9 | 7 | 5 | 9 | 8 | 0 | 7 | 6 |
| 436 | 2 | 9 | 4 | 6 | 3 | 3 | 2 | 6 | 5 | 11 | 5 | 7 | 11 | 3 |
| 437 | 8 | 3 | 5 | 2 | 5 | 6 | 7 | 2 | 2 | 1 | 10 | 1 | 2 | 11 |
| 438 | 5 | 2 | 4 | 3 | 2 | 3 | 3 | 6 | 9 | 7 | 8 | 2 | 5 | 6 |
| 439 | 2 | 3 | 1 | 2 | 10 | 8 | 5 | 11 | 10 | 7 | 8 | 6 | 6 | 0 |
| 440 | 6 | 7 | 3 | 7 | 2 | 5 | 4 | 0 | 1 | 5 | 7 | 0 | 0 | 4 |
| 441 | 4 | 1 | 2 | 1 | 10 | 0 | 0 | 3 | 8 | 7 | 11 | 4 | 5 | 11 |
| 442 | 0 | 8 | 2 | 10 | 0 | 5 | 4 | 5 | 4 | 4 | 1 | 4 | 2 | 6 |
| 443 | 4 | 4 | 0 | 11 | 11 | 1 | 9 | 8 | 4 | 5 | 3 | 1 | 0 | 9 |
| 444 | 7 | 8 | 3 | 1 | 9 | 1 | 5 | 6 | 2 | 8 | 3 | 9 | 10 | 6 |
| 445 | 1 | 8 | 9 | 2 | 8 | 3 | 4 | 7 | 4 | 7 | 9 | 3 | 8 | 3 |
| 446 | 0 | 2 | 8 | 3 | 9 | 2 | 8 | 5 | 0 | 1 | 10 | 5 | 6 | 6 |
| 447 | 0 | 2 | 7 | 8 | 2 | 10 | 11 | 2 | 4 | 5 | 5 | 3 | 8 | 8 |
| 448 | 1 | 2 | 0 | 10 | 1 | 11 | 11 | 7 | 5 | 5 | 9 | 2 | 4 | 11 |
| 449 | 7 | 1 | 6 | 10 | 2 | 2 | 1 | 0 | 9 | 1 | 9 | 0 | 8 | 3 |
| 450 | 6 | 10 | 0 | 2 | 8 | 4 | 11 | 2 | 1 | 0 | 4 | 7 | 2 | 5 |
| 451 | 9 | 8 | 8 | 6 | 1 | 7 | 3 | 2 | 0 | 7 | 11 | 9 | 5 | 0 |
| 452 | 6 | 7 | 7 | 9 | 1 | 11 | 8 | 6 | 0 | 6 | 0 | 6 | 0 | 1 |
| 453 | 10 | 8 | 0 | 5 | 2 | 3 | 0 | 11 | 6 | 9 | 7 | 0 | 10 | 7 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 454 | 11 | 3 | 10 | 8 | 2 | 11 | 6 | 4 | 0 | 8 | 2 | 1 | 11 | 4 |
| 455 | 4 | 4 | 10 | 5 | 10 | 5 | 9 | 6 | 7 | 8 | 1 | 5 | 1 | 1 |
| 456 | 6 | 2 | 4 | 5 | 5 | 9 | 5 | 9 | 6 | 5 | 5 | 11 | 9 | 0 |
| 457 | 3 | 10 | 10 | 1 | 2 | 2 | 0 | 9 | 8 | 10 | 7 | 6 | 11 | 1 |
| 458 | 0 | 1 | 3 | 4 | 7 | 11 | 6 | 6 | 8 | 7 | 7 | 10 | 1 | 9 |
| 459 | 11 | 7 | 11 | 9 | 0 | 3 | 5 | 0 | 0 | 11 | 8 | 10 | 9 | 11 |
| 460 | 10 | 11 | 4 | 2 | 10 | 10 | 0 | 5 | 7 | 11 | 6 | 9 | 9 | 4 |
| 461 | 0 | 9 | 9 | 3 | 8 | 0 | 7 | 8 | 5 | 8 | 7 | 5 | 11 | 2 |
| 462 | 8 | 11 | 5 | 11 | 1 | 10 | 3 | 4 | 3 | 11 | 10 | 6 | 11 | 1 |
| 463 | 9 | 8 | 4 | 3 | 9 | 11 | 6 | 2 | 5 | 0 | 6 | 4 | 2 | 4 |
| 464 | 6 | 8 | 2 | 7 | 9 | 1 | 2 | 9 | 5 | 6 | 0 | 5 | 9 | 2 |
| 465 | 5 | 5 | 6 | 4 | 4 | 7 | 8 | 3 | 0 | 4 | 1 | 3 | 4 | 2 |
| 466 | 0 | 6 | 2 | 5 | 9 | 0 | 6 | 7 | 8 | 5 | 0 | 0 | 6 | 0 |
| 467 | 11 | 1 | 5 | 11 | 4 | 5 | 2 | 11 | 10 | 2 | 5 | 2 | 8 | 2 |
| 468 | 9 | 4 | 11 | 0 | 0 | 6 | 6 | 4 | 11 | 11 | 2 | 0 | 4 | 5 |
| 469 | 9 | 10 | 3 | 5 | 2 | 1 | 3 | 11 | 5 | 8 | 2 | 3 | 5 | 11 |
| 470 | 5 | 4 | 2 | 0 | 2 | 5 | 11 | 5 | 8 | 2 | 4 | 2 | 11 | 4 |
| 471 | 10 | 3 | 10 | 9 | 6 | 4 | 5 | 5 | 11 | 11 | 0 | 5 | 0 | 10 |
| 472 | 1 | 5 | 4 | 2 | 2 | 11 | 3 | 0 | 10 | 11 | 1 | 11 | 8 | 9 |
| 473 | 8 | 6 | 4 | 9 | 1 | 7 | 1 | 2 | 1 | 3 | 4 | 10 | 3 | 9 |
| 474 | 1 | 4 | 8 | 1 | 7 | 2 | 9 | 10 | 4 | 8 | 7 | 3 | 7 | 6 |
| 475 | 4 | 3 | 9 | 1 | 3 | 7 | 3 | 7 | 8 | 1 | 10 | 5 | 3 | 9 |
| 476 | 2 | 7 | 3 | 8 | 4 | 4 | 10 | 8 | 2 | 7 | 1 | 7 | 11 | 9 |
| 477 | 6 | 8 | 4 | 3 | 8 | 5 | 7 | 10 | 0 | 9 | 11 | 2 | 8 | 8 |
| 478 | 10 | 11 | 10 | 7 | 0 | 0 | 9 | 7 | 1 | 6 | 5 | 4 | 10 | 0 |
| 479 | 2 | 1 | 2 | 11 | 3 | 7 | 1 | 6 | 3 | 8 | 9 | 9 | 4 | 0 |
| 480 | 11 | 0 | 2 | 6 | 8 | 8 | 8 | 0 | 9 | 4 | 6 | 5 | 3 | 1 |
| 481 | 0 | 4 | 3 | 9 | 6 | 3 | 2 | 2 | 3 | 1 | 6 | 10 | 7 | 2 |
| 482 | 3 | 2 | 4 | 6 | 9 | 8 | 0 | 8 | 5 | 2 | 1 | 11 | 3 | 10 |
| 483 | 7 | 10 | 1 | 3 | 7 | 9 | 7 | 11 | 7 | 4 | 7 | 1 | 2 | 8 |
| 484 | 0 | 6 | 1 | 7 | 8 | 9 | 9 | 4 | 9 | 11 | 3 | 2 | 11 | 0 |
| 485 | 5 | 6 | 2 | 10 | 8 | 9 | 10 | 11 | 11 | 9 | 2 | 11 | 5 | 4 |
| 486 | 11 | 4 | 10 | 4 | 0 | 6 | 5 | 2 | 1 | 9 | 1 | 2 | 6 | 6 |
| 487 | 4 | 7 | 9 | 3 | 3 | 1 | 11 | 3 | 10 | 8 | 9 | 11 | 8 | 11 |
| 488 | 3 | 5 | 7 | 9 | 8 | 4 | 3 | 3 | 11 | 2 | 5 | 7 | 9 | 8 |
| 489 | 8 | 2 | 9 | 8 | 9 | 5 | 1 | 0 | 1 | 6 | 0 | 1 | 10 | 3 |
| 490 | 7 | 10 | 4 | 2 | 5 | 6 | 10 | 9 | 9 | 9 | 0 | 10 | 3 | 2 |
| 491 | 3 | 11 | 2 | 1 | 4 | 10 | 5 | 1 | 1 | 4 | 11 | 2 | 10 | 9 |
| 492 | 7 | 1 | 0 | 0 | 1 | 1 | 5 | 10 | 10 | 7 | 1 | 10 | 0 | 7 |
| 493 | 11 | 1 | 4 | 9 | 5 | 10 | 11 | 10 | 8 | 6 | 2 | 0 | 10 | 7 |
| 494 | 6 | 7 | 4 | 2 | 4 | 0 | 10 | 10 | 7 | 0 | 9 | 4 | 7 | 11 |
| 495 | 0 | 10 | 4 | 9 | 3 | 0 | 4 | 9 | 0 | 5 | 2 | 1 | 8 | 3 |
| 496 | 10 | 11 | 1 | 5 | 7 | 0 | 5 | 6 | 8 | 0 | 6 | 7 | 5 | 5 |
| 497 | 8 | 4 | 1 | 3 | 2 | 6 | 11 | 10 | 0 | 8 | 3 | 9 | 4 | 7 |
| 498 | 9 | 0 | 10 | 10 | 2 | 7 | 7 | 1 | 8 | 4 | 3 | 9 | 3 | 8 |
| 499 | 3 | 11 | 10 | 8 | 9 | 4 | 9 | 4 | 5 | 5 | 8 | 9 | 6 | 1 |
| 500 | 0 | 3 | 0 | 5 | 7 | 8 | 10 | 4 | 7 | 10 | 4 | 1 | 5 | 3 |
| 501 | 7 | 2 | 8 | 4 | 0 | 0 | 4 | 8 | 11 | 10 | 5 | 11 | 11 | 3 |
| 502 | 2 | 8 | 0 | 3 | 9 | 4 | 4 | 0 | 2 | 6 | 8 | 10 | 0 | 10 |
| 503 | 6 | 2 | 6 | 9 | 11 | 8 | 9 | 5 | 3 | 0 | 9 | 6 | 5 | 0 |
| 504 | 7 | 6 | 5 | 2 | 9 | 3 | 9 | 11 | 0 | 5 | 1 | 10 | 5 | 6 |
| 505 | 8 | 0 | 11 | 8 | 10 | 9 | 3 | 5 | 8 | 3 | 1 | 5 | 8 | 11 |
| 506 | 4 | 9 | 8 | 0 | 6 | 5 | 8 | 1 | 6 | 11 | 5 | 5 | 2 | 8 |
| 507 | 8 | 4 | 6 | 10 | 3 | 4 | 10 | 0 | 4 | 5 | 10 | 2 | 5 | 8 |
| 508 | 10 | 6 | 9 | 4 | 8 | 5 | 9 | 3 | 7 | 10 | 6 | 7 | 4 | 11 |
| 509 | 5 | 4 | 10 | 7 | 0 | 3 | 3 | 0 | 4 | 0 | 4 | 5 | 2 | 3 |
| 510 | 3 | 4 | 1 | 11 | 3 | 3 | 4 | 8 | 10 | 7 | 7 | 10 | 11 | 10 |
| 511 | 1 | 4 | 5 | 9 | 6 | 1 | 6 | 11 | 8 | 5 | 4 | 3 | 1 | 3 |
| 512 | 0 | 7 | 11 | 2 | 3 | 1 | 5 | 5 | 11 | 10 | 9 | 8 | 6 | 1 |
| 513 | 1 | 6 | 1 | 7 | 2 | 2 | 6 | 7 | 10 | 2 | 2 | 1 | 1 | 3 |
| 514 | 4 | 8 | 8 | 9 | 0 | 4 | 3 | 9 | 7 | 4 | 5 | 0 | 0 | 2 |
| 515 | 7 | 3 | 7 | 8 | 6 | 7 | 2 | 8 | 3 | 6 | 7 | 10 | 11 | 0 |
| 516 | 10 | 9 | 10 | 5 | 10 | 0 | 3 | 5 | 2 | 0 | 4 | 1 | 9 | 10 |
| 517 | 9 | 11 | 0 | 11 | 6 | 6 | 6 | 4 | 0 | 10 | 5 | 2 | 9 | 11 |
| 518 | 3 | 10 | 11 | 1 | 10 | 3 | 7 | 9 | 1 | 1 | 3 | 5 | 7 | 0 |
| 519 | 3 | 0 | 5 | 7 | 7 | 7 | 3 | 3 | 6 | 5 | 0 | 4 | 4 | 5 |
| 520 | 6 | 1 | 2 | 8 | 11 | 1 | 11 | 0 | 10 | 0 | 1 | 3 | 2 | 8 |
| 521 | 3 | 4 | 10 | 11 | 8 | 10 | 8 | 6 | 3 | 4 | 8 | 7 | 1 | 7 |
| 522 | 9 | 5 | 5 | 1 | 4 | 6 | 11 | 1 | 5 | 6 | 11 | 0 | 5 | 1 |
| 523 | 4 | 2 | 4 | 1 | 11 | 4 | 9 | 7 | 9 | 10 | 3 | 4 | 11 | 1 |
| 524 | 0 | 11 | 8 | 6 | 11 | 5 | 11 | 2 | 1 | 6 | 7 | 4 | 0 | 6 |
| 525 | 2 | 7 | 0 | 5 | 11 | 6 | 1 | 2 | 4 | 11 | 9 | 7 | 8 | 3 |
| 526 | 4 | 3 | 3 | 2 | 6 | 0 | 6 | 1 | 5 | 11 | 4 | 6 | 1 | 7 |
| 527 | 4 | 4 | 1 | 1 | 2 | 8 | 4 | 0 | 6 | 5 | 1 | 10 | 10 | 2 |
| 528 | 8 | 7 | 3 | 6 | 10 | 11 | 2 | 10 | 4 | 1 | 11 | 4 | 9 | 9 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 529 | 2 | 2 | 7 | 10 | 0 | 6 | 10 | 0 | 6 | 10 | 10 | 3 | 0 | 10 |
| 530 | 10 | 0 | 5 | 5 | 4 | 3 | 8 | 10 | 3 | 10 | 10 | 9 | 3 | 8 |
| 531 | 9 | 8 | 8 | 4 | 10 | 9 | 8 | 10 | 6 | 9 | 4 | 8 | 7 | 3 |
| 532 | 2 | 4 | 7 | 6 | 1 | 9 | 9 | 5 | 5 | 3 | 1 | 11 | 5 | 0 |
| 533 | 1 | 11 | 2 | 3 | 3 | 9 | 5 | 10 | 7 | 7 | 2 | 5 | 11 | 8 |
| 534 | 9 | 9 | 11 | 3 | 7 | 4 | 11 | 6 | 10 | 11 | 8 | 5 | 6 | 2 |
| 535 | 8 | 6 | 6 | 4 | 5 | 6 | 7 | 4 | 5 | 2 | 7 | 11 | 10 | 9 |
| 536 | 10 | 9 | 1 | 10 | 6 | 7 | 8 | 11 | 11 | 7 | 1 | 0 | 6 | 9 |
| 537 | 10 | 3 | 10 | 1 | 5 | 4 | 0 | 9 | 4 | 9 | 8 | 8 | 5 | 5 |
| 538 | 5 | 5 | 2 | 0 | 11 | 9 | 3 | 9 | 0 | 9 | 7 | 7 | 6 | 0 |
| 539 | 6 | 1 | 11 | 6 | 3 | 6 | 10 | 3 | 0 | 11 | 6 | 10 | 4 | 9 |
| 540 | 8 | 9 | 7 | 10 | 4 | 11 | 1 | 8 | 5 | 0 | 5 | 9 | 1 | 11 |
| 541 | 11 | 1 | 5 | 0 | 8 | 9 | 11 | 11 | 3 | 5 | 9 | 6 | 7 | 4 |
| 542 | 8 | 8 | 10 | 8 | 9 | 3 | 4 | 11 | 0 | 0 | 2 | 8 | 4 | 7 |
| 543 | 2 | 10 | 1 | 6 | 8 | 10 | 1 | 10 | 8 | 7 | 4 | 3 | 4 | 11 |
| 544 | 9 | 4 | 2 | 9 | 4 | 4 | 2 | 5 | 0 | 1 | 10 | 1 | 10 | 3 |
| 545 | 5 | 1 | 3 | 8 | 10 | 10 | 6 | 6 | 7 | 5 | 3 | 0 | 6 | 3 |
| 546 | 5 | 11 | 8 | 8 | 2 | 3 | 5 | 3 | 2 | 3 | 9 | 1 | 2 | 11 |
| 547 | 9 | 1 | 6 | 0 | 1 | 0 | 5 | 5 | 7 | 2 | 11 | 3 | 1 | 11 |
| 548 | 8 | 0 | 4 | 11 | 2 | 1 | 7 | 8 | 1 | 8 | 8 | 10 | 6 | 4 |
| 549 | 6 | 3 | 2 | 10 | 9 | 10 | 10 | 7 | 2 | 2 | 9 | 1 | 4 | 10 |
| 550 | 9 | 9 | 1 | 0 | 3 | 2 | 10 | 5 | 3 | 6 | 5 | 2 | 0 | 4 |
| 551 | 0 | 5 | 11 | 2 | 7 | 0 | 6 | 8 | 1 | 3 | 5 | 1 | 10 | 2 |
| 552 | 5 | 2 | 4 | 5 | 8 | 9 | 7 | 11 | 2 | 11 | 8 | 7 | 0 | 1 |
| 553 | 7 | 2 | 0 | 2 | 7 | 9 | 10 | 4 | 8 | 0 | 8 | 6 | 8 | 11 |
| 554 | 4 | 9 | 7 | 3 | 0 | 7 | 9 | 10 | 6 | 7 | 9 | 8 | 4 | 2 |
| 555 | 10 | 5 | 4 | 9 | 2 | 6 | 8 | 0 | 8 | 9 | 0 | 5 | 1 | 7 |
| 556 | 3 | 4 | 6 | 8 | 6 | 3 | 4 | 9 | 2 | 5 | 0 | 0 | 8 | 1 |
| 557 | 6 | 8 | 7 | 3 | 10 | 6 | 11 | 11 | 4 | 8 | 2 | 10 | 9 | 3 |
| 558 | 6 | 6 | 10 | 11 | 7 | 11 | 8 | 1 | 0 | 9 | 3 | 4 | 4 | 11 |
| 559 | 7 | 6 | 3 | 10 | 2 | 10 | 4 | 7 | 7 | 11 | 0 | 3 | 7 | 9 |
| 560 | 10 | 5 | 6 | 1 | 7 | 5 | 3 | 8 | 4 | 1 | 2 | 5 | 9 | 4 |
| 561 | 9 | 6 | 3 | 7 | 10 | 11 | 3 | 8 | 5 | 7 | 6 | 1 | 7 | 5 |
| 562 | 3 | 6 | 0 | 1 | 9 | 9 | 0 | 1 | 9 | 7 | 6 | 5 | 9 | 3 |
| 563 | 2 | 6 | 3 | 2 | 7 | 1 | 0 | 6 | 2 | 0 | 2 | 11 | 9 | 8 |
| 564 | 4 | 1 | 11 | 5 | 9 | 10 | 6 | 5 | 4 | 4 | 8 | 9 | 11 | 0 |
| 565 | 6 | 3 | 2 | 6 | 5 | 11 | 5 | 10 | 3 | 0 | 6 | 6 | 0 | 3 |
| 566 | 2 | 4 | 4 | 5 | 1 | 7 | 11 | 9 | 6 | 6 | 0 | 8 | 1 | 9 |
| 567 | 2 | 9 | 8 | 10 | 3 | 7 | 0 | 4 | 9 | 5 | 3 | 9 | 9 | 10 |
| 568 | 3 | 2 | 5 | 9 | 10 | 8 | 4 | 6 | 7 | 7 | 2 | 6 | 7 | 1 |
| 569 | 11 | 0 | 6 | 2 | 2 | 10 | 1 | 2 | 8 | 10 | 8 | 9 | 9 | 7 |
| 570 | 5 | 9 | 11 | 7 | 0 | 1 | 11 | 11 | 9 | 7 | 2 | 7 | 2 | 11 |
| 571 | 8 | 9 | 5 | 4 | 11 | 1 | 0 | 0 | 4 | 10 | 3 | 10 | 7 | 7 |
| 572 | 4 | 1 | 9 | 2 | 10 | 4 | 1 | 4 | 4 | 2 | 9 | 6 | 4 | 8 |
| 573 | 7 | 9 | 0 | 8 | 10 | 8 | 10 | 7 | 0 | 4 | 6 | 0 | 2 | 10 |
| 574 | 5 | 5 | 8 | 5 | 5 | 5 | 6 | 11 | 6 | 2 | 5 | 6 | 7 | 7 |
| 575 | 3 | 6 | 11 | 7 | 11 | 8 | 2 | 8 | 2 | 3 | 0 | 6 | 3 | 6 |
| 576 | 0 | 7 | 4 | 9 | 7 | 10 | 10 | 5 | 5 | 5 | 10 | 2 | 4 | 9 |
| 577 | 2 | 2 | 9 | 1 | 2 | 7 | 9 | 9 | 10 | 4 | 11 | 7 | 10 | 4 |
| 578 | 8 | 0 | 4 | 2 | 0 | 6 | 6 | 7 | 4 | 7 | 6 | 4 | 10 | 5 |
| 579 | 11 | 8 | 8 | 3 | 0 | 0 | 7 | 2 | 11 | 8 | 11 | 3 | 7 | 7 |
| 580 | 4 | 7 | 9 | 8 | 1 | 1 | 7 | 10 | 5 | 10 | 5 | 5 | 7 | 9 |
| 581 | 10 | 2 | 8 | 10 | 7 | 6 | 9 | 8 | 0 | 5 | 8 | 4 | 5 | 8 |
| 582 | 10 | 4 | 3 | 1 | 3 | 1 | 9 | 5 | 9 | 9 | 10 | 10 | 1 | 9 |
| 583 | 0 | 10 | 0 | 4 | 5 | 11 | 2 | 3 | 9 | 9 | 2 | 8 | 8 | 7 |
| 584 | 3 | 7 | 2 | 3 | 8 | 5 | 2 | 9 | 5 | 7 | 6 | 8 | 6 | 4 |
| 585 | 0 | 8 | 2 | 3 | 7 | 8 | 7 | 11 | 6 | 3 | 0 | 8 | 11 | 11 |
| 586 | 9 | 6 | 4 | 5 | 6 | 9 | 8 | 3 | 11 | 6 | 10 | 3 | 11 | 2 |
| 587 | 6 | 5 | 4 | 1 | 9 | 11 | 4 | 6 | 10 | 0 | 11 | 10 | 11 | 0 |
| 588 | 9 | 1 | 0 | 5 | 11 | 4 | 8 | 6 | 5 | 3 | 4 | 1 | 4 | 6 |
| 589 | 10 | 5 | 10 | 7 | 1 | 1 | 0 | 3 | 1 | 7 | 9 | 6 | 4 | 3 |
| 590 | 3 | 2 | 0 | 0 | 5 | 0 | 11 | 8 | 3 | 6 | 1 | 9 | 4 | 3 |
| 591 | 11 | 7 | 1 | 3 | 10 | 0 | 9 | 1 | 0 | 4 | 1 | 10 | 4 | 0 |
| 592 | 1 | 10 | 8 | 9 | 9 | 4 | 10 | 10 | 3 | 3 | 3 | 5 | 10 | 1 |
| 593 | 1 | 10 | 5 | 2 | 2 | 4 | 7 | 11 | 9 | 1 | 5 | 10 | 9 | 5 |
| 594 | 5 | 0 | 6 | 8 | 4 | 5 | 0 | 9 | 7 | 0 | 6 | 1 | 4 | 8 |
| 595 | 11 | 10 | 10 | 9 | 2 | 2 | 9 | 6 | 5 | 1 | 6 | 3 | 2 | 3 |
| 596 | 0 | 4 | 5 | 0 | 8 | 0 | 10 | 6 | 4 | 6 | 7 | 8 | 2 | 8 |
| 597 | 11 | 11 | 3 | 0 | 0 | 11 | 9 | 11 | 11 | 4 | 10 | 11 | 9 | 5 |
| 598 | 7 | 6 | 9 | 9 | 3 | 9 | 4 | 10 | 9 | 3 | 5 | 2 | 6 | 2 |
| 599 | 9 | 5 | 8 | 11 | 0 | 6 | 2 | 6 | 8 | 2 | 1 | 8 | 8 | 4 |
| 600 | 2 | 3 | 11 | 3 | 11 | 3 | 3 | 3 | 11 | 7 | 3 | 8 | 3 | 9 |
| 601 | 1 | 4 | 6 | 1 | 9 | 2 | 1 | 5 | 10 | 10 | 1 | 7 | 6 | 5 |
| 602 | 8 | 11 | 0 | 0 | 10 | 0 | 8 | 0 | 7 | 0 | 5 | 6 | 5 | 6 |
| 603 | 11 | 1 | 7 | 3 | 6 | 2 | 0 | 8 | 7 | 9 | 9 | 1 | 6 | 1 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 604 | 6 | 6 | 1 | 7 | 9 | 7 | 5 | 1 | 7 | 10 | 4 | 11 | 7 | 10 |
| 605 | 11 | 3 | 9 | 9 | 9 | 2 | 10 | 8 | 9 | 4 | 4 | 4 | 1 | 4 |
| 606 | 9 | 2 | 3 | 1 | 1 | 11 | 4 | 2 | 1 | 8 | 5 | 2 | 2 | 3 |
| 607 | 3 | 7 | 5 | 6 | 6 | 8 | 3 | 1 | 2 | 4 | 11 | 9 | 1 | 11 |
| 608 | 5 | 11 | 3 | 1 | 7 | 8 | 5 | 7 | 8 | 1 | 1 | 2 | 6 | 7 |
| 609 | 2 | 6 | 4 | 8 | 1 | 0 | 3 | 4 | 7 | 10 | 9 | 9 | 2 | 0 |
| 610 | 1 | 3 | 7 | 1 | 0 | 3 | 5 | 4 | 2 | 2 | 5 | 9 | 9 | 1 |
| 611 | 4 | 11 | 7 | 5 | 1 | 8 | 9 | 1 | 7 | 6 | 3 | 2 | 7 | 3 |
| 612 | 1 | 1 | 9 | 7 | 4 | 1 | 1 | 7 | 8 | 8 | 0 | 10 | 8 | 7 |
| 613 | 6 | 10 | 4 | 7 | 2 | 9 | 2 | 6 | 6 | 6 | 1 | 6 | 5 | 11 |
| 614 | 5 | 7 | 7 | 3 | 5 | 1 | 1 | 5 | 5 | 11 | 3 | 3 | 0 | 7 |
| 615 | 6 | 8 | 8 | 6 | 5 | 10 | 1 | 6 | 6 | 10 | 2 | 4 | 3 | 4 |
| 616 | 3 | 11 | 1 | 8 | 5 | 1 | 7 | 3 | 7 | 11 | 1 | 8 | 11 | 6 |
| 617 | 10 | 4 | 3 | 0 | 9 | 6 | 6 | 7 | 5 | 0 | 8 | 8 | 8 | 3 |
| 618 | 2 | 0 | 7 | 7 | 3 | 1 | 4 | 3 | 0 | 8 | 1 | 7 | 9 | 1 |
| 619 | 10 | 6 | 1 | 9 | 6 | 1 | 3 | 4 | 4 | 3 | 11 | 3 | 5 | 1 |
| 620 | 7 | 8 | 11 | 4 | 8 | 1 | 5 | 9 | 8 | 6 | 2 | 2 | 0 | 10 |
| 621 | 7 | 2 | 4 | 11 | 11 | 10 | 2 | 10 | 11 | 3 | 7 | 1 | 0 | 11 |
| 622 | 10 | 2 | 9 | 8 | 4 | 10 | 6 | 5 | 2 | 9 | 7 | 6 | 7 | 8 |
| 623 | 7 | 3 | 5 | 0 | 11 | 11 | 1 | 1 | 10 | 6 | 9 | 2 | 6 | 6 |
| 624 | 2 | 0 | 2 | 2 | 8 | 2 | 6 | 3 | 3 | 11 | 9 | 11 | 0 | 9 |
| 625 | 10 | 8 | 8 | 11 | 5 | 7 | 11 | 7 | 9 | 2 | 0 | 3 | 4 | 6 |
| 626 | 10 | 10 | 5 | 7 | 0 | 2 | 11 | 0 | 5 | 4 | 4 | 6 | 8 | 2 |
| 627 | 10 | 5 | 0 | 1 | 11 | 11 | 7 | 11 | 7 | 10 | 8 | 1 | 3 | 2 |
| 628 | 4 | 1 | 2 | 9 | 4 | 11 | 7 | 4 | 8 | 3 | 6 | 2 | 2 | 10 |
| 629 | 5 | 7 | 7 | 4 | 2 | 2 | 7 | 4 | 6 | 0 | 5 | 7 | 5 | 2 |
| 630 | 1 | 3 | 8 | 7 | 2 | 8 | 9 | 6 | 3 | 10 | 5 | 11 | 8 | 0 |
| 631 | 4 | 9 | 1 | 9 | 1 | 2 | 3 | 10 | 2 | 5 | 3 | 6 | 3 | 8 |
| 632 | 0 | 1 | 6 | 11 | 10 | 10 | 3 | 11 | 0 | 6 | 1 | 5 | 0 | 5 |
| 633 | 7 | 0 | 7 | 2 | 1 | 2 | 11 | 11 | 1 | 1 | 7 | 3 | 5 | 10 |
| 634 | 7 | 6 | 11 | 0 | 4 | 5 | 7 | 2 | 4 | 10 | 10 | 6 | 1 | 7 |
| 635 | 11 | 11 | 11 | 10 | 7 | 7 | 11 | 7 | 7 | 9 | 3 | 10 | 1 | 8 |
| 636 | 0 | 3 | 4 | 0 | 4 | 4 | 11 | 10 | 1 | 7 | 6 | 10 | 1 | 1 |
| 637 | 8 | 5 | 1 | 10 | 8 | 9 | 0 | 8 | 6 | 6 | 2 | 3 | 10 | 8 |
| 638 | 4 | 0 | 7 | 6 | 8 | 0 | 10 | 3 | 7 | 5 | 10 | 9 | 6 | 11 |
| 639 | 7 | 11 | 10 | 10 | 6 | 4 | 6 | 11 | 7 | 6 | 6 | 11 | 2 | 1 |
| 640 | 9 | 1 | 10 | 0 | 7 | 11 | 1 | 10 | 6 | 1 | 8 | 9 | 0 | 5 |
| 641 | 8 | 0 | 0 | 6 | 5 | 3 | 3 | 7 | 1 | 10 | 0 | 2 | 11 | 2 |
| 642 | 1 | 8 | 1 | 8 | 5 | 6 | 6 | 10 | 6 | 1 | 11 | 10 | 6 | 0 |
| 643 | 0 | 1 | 5 | 3 | 5 | 2 | 9 | 5 | 1 | 0 | 8 | 0 | 7 | 10 |
| 644 | 4 | 11 | 5 | 11 | 2 | 0 | 6 | 9 | 6 | 9 | 2 | 7 | 4 | 6 |
| 645 | 5 | 4 | 2 | 11 | 1 | 0 | 8 | 1 | 10 | 1 | 6 | 6 | 9 | 0 |
| 646 | 1 | 0 | 1 | 2 | 0 | 8 | 1 | 9 | 0 | 4 | 10 | 8 | 5 | 8 |
| 647 | 9 | 1 | 9 | 2 | 8 | 3 | 11 | 8 | 6 | 10 | 5 | 4 | 6 | 10 |
| 648 | 11 | 2 | 7 | 6 | 9 | 1 | 7 | 9 | 10 | 10 | 3 | 0 | 3 | 11 |
| 649 | 8 | 0 | 5 | 5 | 6 | 4 | 11 | 2 | 0 | 9 | 0 | 5 | 10 | 4 |
| 650 | 1 | 10 | 7 | 9 | 10 | 11 | 9 | 7 | 11 | 8 | 5 | 1 | 5 | 4 |
| 651 | 6 | 9 | 0 | 2 | 0 | 0 | 2 | 5 | 4 | 10 | 8 | 3 | 4 | 4 |
| 652 | 1 | 3 | 11 | 5 | 10 | 5 | 7 | 4 | 8 | 11 | 11 | 11 | 6 | 4 |
| 653 | 0 | 2 | 1 | 5 | 3 | 3 | 6 | 6 | 8 | 8 | 4 | 4 | 9 | 7 |
| 654 | 10 | 7 | 6 | 8 | 3 | 4 | 4 | 10 | 8 | 4 | 8 | 11 | 2 | 3 |
| 655 | 1 | 11 | 3 | 7 | 5 | 10 | 2 | 2 | 9 | 7 | 11 | 3 | 10 | 4 |
| 656 | 3 | 8 | 0 | 7 | 6 | 10 | 1 | 1 | 11 | 9 | 4 | 1 | 2 | 5 |
| 657 | 1 | 5 | 7 | 5 | 11 | 10 | 8 | 2 | 1 | 5 | 6 | 5 | 3 | 9 |
| 658 | 1 | 4 | 0 | 0 | 2 | 3 | 7 | 4 | 0 | 4 | 3 | 4 | 0 | 3 |
| 659 | 11 | 2 | 9 | 10 | 8 | 8 | 6 | 1 | 6 | 0 | 1 | 11 | 8 | 7 |
| 660 | 1 | 10 | 8 | 3 | 0 | 5 | 6 | 5 | 5 | 5 | 7 | 0 | 1 | 11 |
| 661 | 3 | 8 | 4 | 10 | 4 | 7 | 9 | 10 | 2 | 6 | 2 | 7 | 9 | 11 |
| 662 | 2 | 4 | 1 | 4 | 11 | 9 | 2 | 9 | 10 | 11 | 8 | 4 | 7 | 8 |
| 663 | 0 | 1 | 10 | 10 | 2 | 1 | 5 | 10 | 9 | 0 | 11 | 2 | 5 | 4 |
| 664 | 1 | 7 | 10 | 0 | 5 | 8 | 11 | 1 | 8 | 5 | 3 | 7 | 2 | 10 |
| 665 | 0 | 10 | 4 | 1 | 1 | 8 | 11 | 7 | 7 | 0 | 4 | 0 | 9 | 4 |
| 666 | 5 | 10 | 8 | 4 | 6 | 10 | 8 | 7 | 7 | 2 | 7 | 2 | 2 | 2 |
| 667 | 11 | 4 | 6 | 7 | 5 | 5 | 9 | 3 | 3 | 8 | 4 | 3 | 0 | 10 |
| 668 | 4 | 10 | 10 | 3 | 1 | 5 | 11 | 4 | 0 | 2 | 1 | 4 | 5 | 7 |
| 669 | 11 | 0 | 10 | 11 | 10 | 9 | 7 | 0 | 2 | 9 | 5 | 9 | 2 | 5 |
| 670 | 3 | 9 | 1 | 1 | 10 | 11 | 0 | 11 | 5 | 9 | 0 | 3 | 11 | 4 |
| 671 | 0 | 0 | 7 | 1 | 1 | 1 | 3 | 10 | 8 | 11 | 9 | 1 | 11 | 5 |
| 672 | 7 | 7 | 6 | 4 | 7 | 11 | 8 | 0 | 2 | 10 | 4 | 2 | 8 | 5 |
| 673 | 7 | 7 | 4 | 8 | 8 | 1 | 1 | 2 | 9 | 0 | 7 | 6 | 4 | 1 |
| 674 | 1 | 4 | 0 | 2 | 1 | 4 | 0 | 5 | 11 | 9 | 2 | 0 | 11 | 6 |
| 675 | 4 | 6 | 3 | 3 | 9 | 2 | 8 | 11 | 3 | 8 | 7 | 9 | 1 | 1 |
| 676 | 3 | 1 | 7 | 2 | 4 | 5 | 8 | 0 | 0 | 5 | 3 | 10 | 1 | 5 |
| 677 | 8 | 10 | 3 | 5 | 0 | 9 | 8 | 0 | 2 | 3 | 0 | 4 | 6 | 10 |
| 678 | 11 | 7 | 4 | 4 | 11 | 9 | 10 | 7 | 3 | 7 | 1 | 1 | 1 | 2 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 679 | 5 | 5 | 9 | 4 | 7 | 8 | 9 | 0 | 11 | 0 | 6 | 4 | 10 | 6 |
| 680 | 2 | 0 | 10 | 8 | 7 | 11 | 5 | 11 | 4 | 6 | 10 | 0 | 11 | 6 |
| 681 | 10 | 10 | 2 | 5 | 4 | 8 | 10 | 8 | 8 | 8 | 11 | 3 | 1 | 3 |
| 682 | 5 | 4 | 9 | 10 | 2 | 6 | 4 | 8 | 3 | 9 | 2 | 6 | 2 | 10 |
| 683 | 1 | 5 | 1 | 6 | 10 | 7 | 9 | 8 | 7 | 0 | 11 | 5 | 8 | 2 |
| 684 | 6 | 2 | 4 | 4 | 10 | 7 | 3 | 3 | 1 | 11 | 4 | 6 | 6 | 6 |
| 685 | 0 | 9 | 10 | 7 | 7 | 5 | 5 | 9 | 2 | 2 | 6 | 5 | 8 | 9 |
| 686 | 5 | 0 | 9 | 6 | 11 | 4 | 6 | 7 | 11 | 1 | 4 | 11 | 9 | 11 |
| 687 | 5 | 7 | 0 | 8 | 3 | 2 | 1 | 7 | 1 | 8 | 2 | 9 | 7 | 11 |
| 688 | 11 | 11 | 4 | 11 | 5 | 8 | 4 | 8 | 10 | 1 | 9 | 11 | 2 | 2 |
| 689 | 3 | 8 | 6 | 9 | 10 | 9 | 11 | 2 | 3 | 11 | 6 | 1 | 11 | 11 |
| 690 | 3 | 3 | 1 | 6 | 1 | 8 | 8 | 7 | 6 | 8 | 10 | 3 | 6 | 1 |
| 691 | 8 | 8 | 3 | 0 | 10 | 6 | 7 | 6 | 1 | 6 | 4 | 9 | 0 | 11 |
| 692 | 8 | 6 | 0 | 6 | 7 | 5 | 5 | 4 | 6 | 8 | 1 | 0 | 4 | 0 |
| 693 | 7 | 10 | 5 | 10 | 9 | 0 | 2 | 4 | 5 | 2 | 2 | 2 | 7 | 4 |
| 694 | 4 | 6 | 3 | 8 | 8 | 6 | 11 | 8 | 11 | 9 | 11 | 5 | 11 | 3 |
| 695 | 4 | 10 | 5 | 7 | 1 | 7 | 1 | 7 | 3 | 1 | 6 | 1 | 0 | 6 |
| 696 | 11 | 7 | 10 | 9 | 4 | 1 | 3 | 2 | 10 | 4 | 0 | 7 | 11 | 6 |
| 697 | 4 | 11 | 9 | 3 | 7 | 4 | 4 | 2 | 2 | 0 | 11 | 9 | 5 | 3 |
| 698 | 6 | 4 | 6 | 3 | 1 | 6 | 3 | 9 | 3 | 0 | 10 | 5 | 3 | 2 |
| 699 | 2 | 8 | 10 | 6 | 9 | 1 | 8 | 2 | 11 | 1 | 8 | 1 | 10 | 4 |
| 700 | 10 | 3 | 4 | 6 | 4 | 0 | 5 | 3 | 10 | 1 | 5 | 8 | 7 | 4 |
| 701 | 5 | 10 | 4 | 8 | 10 | 1 | 8 | 5 | 4 | 6 | 2 | 11 | 3 | 4 |
| 702 | 8 | 10 | 7 | 8 | 2 | 2 | 5 | 9 | 11 | 11 | 4 | 10 | 3 | 7 |
| 703 | 7 | 5 | 6 | 9 | 6 | 10 | 0 | 0 | 5 | 3 | 3 | 9 | 11 | 3 |
| 704 | 7 | 9 | 1 | 2 | 4 | 4 | 6 | 3 | 9 | 10 | 1 | 1 | 5 | 0 |
| 705 | 1 | 4 | 8 | 3 | 11 | 11 | 0 | 6 | 8 | 11 | 4 | 7 | 0 | 9 |
| 706 | 5 | 10 | 3 | 5 | 3 | 4 | 2 | 1 | 1 | 7 | 8 | 8 | 3 | 8 |
| 707 | 7 | 1 | 8 | 11 | 2 | 2 | 11 | 3 | 6 | 8 | 11 | 6 | 3 | 5 |
| 708 | 3 | 5 | 9 | 1 | 5 | 7 | 10 | 2 | 8 | 5 | 2 | 10 | 7 | 6 |
| 709 | 10 | 2 | 0 | 11 | 9 | 8 | 1 | 0 | 7 | 8 | 7 | 5 | 8 | 0 |
| 710 | 5 | 8 | 1 | 11 | 2 | 9 | 4 | 2 | 4 | 2 | 8 | 0 | 3 | 0 |
| 711 | 10 | 0 | 11 | 3 | 3 | 8 | 5 | 4 | 5 | 3 | 7 | 9 | 4 | 5 |
| 712 | 9 | 10 | 3 | 10 | 4 | 5 | 0 | 11 | 2 | 11 | 3 | 0 | 2 | 4 |
| 713 | 0 | 5 | 2 | 6 | 4 | 2 | 0 | 1 | 3 | 7 | 3 | 7 | 8 | 7 |
| 714 | 5 | 4 | 7 | 2 | 11 | 0 | 5 | 6 | 2 | 9 | 10 | 3 | 7 | 2 |
| 715 | 5 | 3 | 10 | 7 | 5 | 9 | 11 | 5 | 7 | 8 | 11 | 2 | 9 | 8 |
| 716 | 9 | 6 | 2 | 5 | 5 | 8 | 0 | 4 | 1 | 4 | 4 | 2 | 6 | 5 |
| 717 | 6 | 8 | 5 | 2 | 3 | 7 | 0 | 11 | 5 | 7 | 4 | 5 | 3 | 0 |
| 718 | 11 | 1 | 3 | 5 | 10 | 3 | 4 | 10 | 10 | 11 | 6 | 2 | 1 | 6 |
| 719 | 0 | 9 | 5 | 4 | 3 | 3 | 7 | 8 | 3 | 3 | 6 | 0 | 5 | 5 |
| 720 | 4 | 1 | 6 | 4 | 6 | 5 | 5 | 4 | 1 | 7 | 10 | 7 | 8 | 6 |
| 721 | 4 | 6 | 2 | 7 | 2 | 3 | 10 | 9 | 9 | 0 | 0 | 9 | 10 | 10 |
| 722 | 9 | 0 | 4 | 7 | 9 | 10 | 3 | 9 | 7 | 11 | 2 | 8 | 3 | 3 |
| 723 | 7 | 2 | 2 | 4 | 7 | 6 | 1 | 6 | 7 | 9 | 0 | 11 | 6 | 10 |
| 724 | 6 | 10 | 9 | 10 | 6 | 2 | 2 | 5 | 10 | 8 | 10 | 11 | 11 | 10 |
| 725 | 11 | 7 | 10 | 7 | 3 | 4 | 10 | 4 | 2 | 3 | 10 | 10 | 9 | 4 |
| 726 | 6 | 0 | 3 | 9 | 4 | 3 | 10 | 2 | 7 | 8 | 3 | 8 | 9 | 5 |
| 727 | 8 | 11 | 9 | 10 | 3 | 3 | 0 | 9 | 3 | 2 | 7 | 4 | 4 | 4 |
| 728 | 4 | 3 | 2 | 2 | 4 | 7 | 10 | 11 | 6 | 4 | 7 | 11 | 6 | 8 |
| 729 | 4 | 8 | 3 | 2 | 11 | 5 | 1 | 0 | 8 | 3 | 11 | 7 | 10 | 0 |
| 730 | 2 | 3 | 10 | 5 | 8 | 5 | 2 | 10 | 9 | 1 | 0 | 5 | 2 | 8 |
| 731 | 5 | 0 | 5 | 0 | 1 | 5 | 7 | 8 | 10 | 2 | 0 | 11 | 3 | 1 |
| 732 | 3 | 8 | 11 | 9 | 3 | 2 | 2 | 3 | 6 | 6 | 7 | 11 | 2 | 7 |
| 733 | 7 | 5 | 3 | 11 | 7 | 3 | 9 | 4 | 6 | 2 | 0 | 7 | 2 | 3 |
| 734 | 4 | 2 | 6 | 11 | 11 | 9 | 3 | 6 | 2 | 8 | 6 | 0 | 4 | 10 |
| 735 | 6 | 11 | 6 | 1 | 3 | 0 | 3 | 2 | 6 | 2 | 0 | 10 | 0 | 7 |
| 736 | 6 | 11 | 2 | 8 | 10 | 6 | 1 | 9 | 5 | 5 | 9 | 4 | 11 | 9 |
| 737 | 7 | 8 | 11 | 0 | 3 | 0 | 8 | 7 | 2 | 11 | 11 | 4 | 9 | 8 |
| 738 | 8 | 7 | 10 | 2 | 11 | 8 | 3 | 4 | 7 | 6 | 5 | 1 | 8 | 9 |
| 739 | 6 | 4 | 11 | 0 | 5 | 3 | 2 | 8 | 8 | 10 | 4 | 5 | 10 | 5 |
| 740 | 10 | 5 | 8 | 8 | 8 | 0 | 7 | 1 | 10 | 4 | 0 | 4 | 8 | 10 |
| 741 | 3 | 9 | 9 | 11 | 7 | 5 | 1 | 5 | 6 | 10 | 3 | 6 | 5 | 2 |
| 742 | 10 | 7 | 0 | 4 | 8 | 8 | 3 | 10 | 9 | 2 | 3 | 10 | 9 | 2 |
| 743 | 11 | 4 | 8 | 7 | 6 | 0 | 0 | 7 | 4 | 5 | 5 | 5 | 1 | 5 |
| 744 | 0 | 9 | 2 | 1 | 11 | 0 | 6 | 3 | 11 | 0 | 2 | 6 | 7 | 5 |
| 745 | 11 | 7 | 2 | 11 | 6 | 10 | 5 | 11 | 9 | 11 | 6 | 0 | 5 | 2 |
| 746 | 2 | 11 | 8 | 11 | 6 | 11 | 0 | 5 | 10 | 7 | 2 | 8 | 10 | 0 |
| 747 | 0 | 6 | 7 | 3 | 8 | 4 | 4 | 8 | 6 | 2 | 3 | 0 | 1 | 9 |
| 748 | 5 | 2 | 4 | 7 | 9 | 4 | 10 | 1 | 0 | 8 | 0 | 1 | 6 | 9 |
| 749 | 6 | 5 | 3 | 4 | 1 | 1 | 11 | 8 | 4 | 3 | 4 | 8 | 8 | 10 |
| 750 | 7 | 5 | 7 | 8 | 0 | 8 | 3 | 2 | 4 | 9 | 8 | 11 | 0 | 6 |
| 751 | 1 | 11 | 2 | 10 | 5 | 1 | 10 | 5 | 11 | 8 | 4 | 9 | 3 | 9 |
| 752 | 3 | 1 | 0 | 9 | 1 | 11 | 10 | 3 | 5 | 7 | 8 | 0 | 1 | 8 |
| 753 | 9 | 5 | 10 | 8 | 1 | 8 | 1 | 9 | 3 | 11 | 1 | 0 | 1 | 0 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 754 | 3 | 4 | 0 | 9 | 9 | 1 | 3 | 0 | 3 | 5 | 5 | 11 | 6 | 4 |
| 755 | 1 | 8 | 8 | 7 | 4 | 11 | 4 | 0 | 9 | 9 | 6 | 4 | 9 | 2 |
| 756 | 7 | 3 | 2 | 3 | 10 | 9 | 4 | 4 | 2 | 10 | 7 | 0 | 0 | 7 |
| 757 | 5 | 2 | 5 | 10 | 8 | 11 | 3 | 5 | 4 | 3 | 9 | 10 | 11 | 3 |
| 758 | 2 | 5 | 5 | 11 | 0 | 7 | 7 | 7 | 11 | 5 | 5 | 2 | 10 | 9 |
| 759 | 10 | 11 | 11 | 4 | 9 | 0 | 7 | 9 | 0 | 8 | 4 | 10 | 10 | 3 |
| 760 | 6 | 5 | 1 | 5 | 0 | 2 | 9 | 7 | 2 | 11 | 7 | 9 | 2 | 0 |
| 761 | 9 | 2 | 5 | 4 | 2 | 9 | 6 | 0 | 0 | 11 | 6 | 9 | 8 | 4 |
| 762 | 8 | 10 | 11 | 1 | 3 | 0 | 0 | 6 | 10 | 4 | 1 | 3 | 1 | 6 |
| 763 | 5 | 3 | 0 | 2 | 6 | 1 | 8 | 8 | 2 | 1 | 1 | 4 | 0 | 5 |
| 764 | 1 | 6 | 0 | 11 | 3 | 7 | 1 | 4 | 5 | 6 | 6 | 7 | 5 | 4 |
| 765 | 11 | 4 | 0 | 0 | 10 | 7 | 5 | 10 | 8 | 1 | 0 | 11 | 11 | 11 |
| 766 | 3 | 4 | 7 | 10 | 9 | 5 | 11 | 3 | 11 | 9 | 9 | 8 | 10 | 0 |
| 767 | 7 | 9 | 2 | 4 | 8 | 11 | 9 | 10 | 1 | 5 | 1 | 7 | 7 | 9 |
| 768 | 2 | 11 | 0 | 4 | 1 | 6 | 8 | 11 | 11 | 2 | 5 | 3 | 1 | 5 |
| 769 | 11 | 9 | 4 | 1 | 2 | 11 | 1 | 4 | 5 | 1 | 11 | 7 | 6 | 6 |
| 770 | 6 | 5 | 2 | 11 | 8 | 4 | 10 | 3 | 8 | 10 | 1 | 4 | 3 | 1 |
| 771 | 5 | 1 | 6 | 6 | 5 | 0 | 4 | 1 | 3 | 6 | 7 | 5 | 7 | 2 |
| 772 | 7 | 2 | 11 | 5 | 9 | 4 | 2 | 2 | 7 | 7 | 6 | 1 | 4 | 0 |
| 773 | 10 | 3 | 4 | 5 | 1 | 3 | 4 | 7 | 6 | 5 | 4 | 10 | 5 | 8 |
| 774 | 0 | 6 | 10 | 6 | 0 | 2 | 5 | 8 | 10 | 11 | 9 | 4 | 4 | 8 |
| 775 | 9 | 1 | 3 | 10 | 11 | 10 | 9 | 0 | 9 | 7 | 2 | 11 | 0 | 5 |
| 776 | 4 | 9 | 1 | 2 | 8 | 7 | 3 | 8 | 6 | 8 | 8 | 1 | 7 | 4 |
| 777 | 8 | 6 | 4 | 4 | 5 | 8 | 11 | 6 | 7 | 3 | 1 | 2 | 2 | 7 |
| 778 | 0 | 2 | 10 | 11 | 3 | 7 | 7 | 9 | 11 | 1 | 7 | 3 | 7 | 10 |
| 779 | 9 | 5 | 1 | 2 | 7 | 3 | 5 | 9 | 5 | 9 | 1 | 5 | 4 | 10 |
| 780 | 8 | 5 | 7 | 11 | 10 | 6 | 4 | 1 | 0 | 11 | 2 | 1 | 2 | 5 |
| 781 | 2 | 4 | 5 | 8 | 4 | 6 | 2 | 3 | 10 | 5 | 6 | 5 | 2 | 1 |
| 782 | 11 | 4 | 3 | 5 | 11 | 8 | 7 | 9 | 0 | 6 | 9 | 1 | 5 | 6 |
| 783 | 5 | 9 | 6 | 8 | 3 | 3 | 6 | 10 | 2 | 7 | 3 | 9 | 0 | 9 |
| 784 | 5 | 6 | 1 | 2 | 10 | 2 | 8 | 0 | 9 | 10 | 5 | 8 | 8 | 11 |
| 785 | 11 | 2 | 1 | 6 | 8 | 10 | 4 | 6 | 0 | 2 | 6 | 6 | 8 | 3 |
| 786 | 3 | 10 | 4 | 10 | 8 | 11 | 8 | 9 | 11 | 4 | 4 | 1 | 11 | 9 |
| 787 | 11 | 3 | 3 | 7 | 10 | 7 | 6 | 4 | 7 | 9 | 7 | 8 | 4 | 1 |
| 788 | 7 | 4 | 6 | 4 | 11 | 3 | 5 | 6 | 9 | 1 | 6 | 7 | 11 | 8 |
| 789 | 2 | 2 | 5 | 7 | 2 | 8 | 3 | 5 | 9 | 9 | 10 | 9 | 9 | 0 |
| 790 | 10 | 3 | 2 | 10 | 6 | 1 | 7 | 9 | 8 | 0 | 5 | 5 | 6 | 7 |
| 791 | 8 | 7 | 8 | 6 | 5 | 1 | 9 | 10 | 10 | 0 | 4 | 0 | 8 | 6 |
| 792 | 4 | 10 | 10 | 1 | 5 | 3 | 8 | 5 | 1 | 6 | 6 | 9 | 10 | 6 |
| 793 | 2 | 7 | 3 | 11 | 6 | 5 | 6 | 11 | 5 | 8 | 3 | 5 | 9 | 6 |
| 794 | 9 | 5 | 10 | 11 | 5 | 9 | 3 | 11 | 10 | 5 | 11 | 10 | 6 | 3 |
| 795 | 1 | 9 | 9 | 7 | 6 | 2 | 0 | 10 | 11 | 0 | 7 | 10 | 1 | 8 |
| 796 | 8 | 9 | 7 | 9 | 2 | 5 | 10 | 10 | 4 | 2 | 5 | 5 | 3 | 10 |
| 797 | 5 | 0 | 11 | 1 | 4 | 7 | 10 | 5 | 2 | 9 | 9 | 4 | 11 | 10 |
| 798 | 10 | 3 | 9 | 0 | 3 | 9 | 2 | 2 | 4 | 3 | 11 | 0 | 8 | 11 |
| 799 | 11 | 10 | 10 | 4 | 6 | 1 | 1 | 2 | 7 | 10 | 9 | 10 | 8 | 5 |
| 800 | 6 | 7 | 8 | 8 | 0 | 2 | 1 | 5 | 6 | 4 | 5 | 2 | 9 | 9 |
| 801 | 10 | 10 | 0 | 10 | 7 | 8 | 3 | 1 | 5 | 11 | 7 | 11 | 10 | 3 |
| 802 | 6 | 1 | 5 | 1 | 9 | 5 | 0 | 8 | 9 | 8 | 9 | 0 | 3 | 11 |
| 803 | 0 | 11 | 11 | 1 | 2 | 1 | 0 | 0 | 3 | 4 | 4 | 8 | 7 | 4 |
| 804 | 10 | 5 | 0 | 0 | 8 | 7 | 9 | 5 | 3 | 3 | 5 | 7 | 7 | 6 |
| 805 | 3 | 7 | 9 | 4 | 1 | 11 | 0 | 1 | 11 | 11 | 6 | 6 | 2 | 11 |
| 806 | 9 | 4 | 10 | 3 | 2 | 0 | 7 | 3 | 1 | 1 | 6 | 1 | 4 | 9 |
| 807 | 7 | 5 | 5 | 1 | 0 | 9 | 7 | 9 | 6 | 0 | 10 | 4 | 4 | 4 |
| 808 | 10 | 8 | 2 | 11 | 11 | 1 | 0 | 6 | 5 | 3 | 2 | 4 | 7 | 9 |
| 809 | 8 | 5 | 10 | 2 | 0 | 11 | 11 | 5 | 9 | 0 | 9 | 11 | 3 | 7 |
| 810 | 6 | 8 | 1 | 6 | 0 | 1 | 11 | 8 | 7 | 8 | 1 | 6 | 0 | 0 |
| 811 | 2 | 0 | 11 | 8 | 0 | 9 | 8 | 9 | 5 | 1 | 8 | 10 | 1 | 10 |
| 812 | 0 | 1 | 6 | 7 | 7 | 3 | 8 | 2 | 5 | 4 | 5 | 11 | 9 | 8 |
| 813 | 2 | 3 | 11 | 6 | 9 | 10 | 10 | 3 | 9 | 0 | 8 | 11 | 8 | 8 |
| 814 | 4 | 0 | 11 | 3 | 5 | 10 | 4 | 7 | 7 | 6 | 1 | 6 | 5 | 5 |
| 815 | 8 | 10 | 9 | 0 | 0 | 0 | 8 | 4 | 9 | 6 | 11 | 7 | 7 | 5 |
| 816 | 11 | 5 | 9 | 9 | 8 | 6 | 2 | 2 | 1 | 1 | 8 | 11 | 3 | 10 |
| 817 | 4 | 3 | 8 | 11 | 11 | 6 | 5 | 10 | 4 | 4 | 10 | 5 | 10 | 5 |
| 818 | 1 | 2 | 2 | 10 | 6 | 3 | 11 | 8 | 3 | 7 | 7 | 8 | 9 | 5 |
| 819 | 0 | 2 | 5 | 0 | 0 | 5 | 8 | 11 | 7 | 5 | 8 | 0 | 2 | 0 |
| 820 | 2 | 6 | 7 | 7 | 5 | 2 | 1 | 3 | 5 | 9 | 8 | 2 | 6 | 3 |
| 821 | 7 | 7 | 5 | 3 | 1 | 10 | 11 | 4 | 9 | 5 | 8 | 10 | 6 | 9 |
| 822 | 8 | 0 | 10 | 2 | 8 | 6 | 1 | 9 | 8 | 8 | 0 | 7 | 1 | 6 |
| 823 | 8 | 2 | 1 | 5 | 0 | 4 | 3 | 10 | 11 | 1 | 9 | 2 | 9 | 5 |
| 824 | 1 | 5 | 6 | 3 | 0 | 2 | 2 | 0 | 2 | 8 | 2 | 3 | 0 | 4 |
| 825 | 2 | 7 | 6 | 2 | 4 | 2 | 9 | 7 | 9 | 11 | 8 | 4 | 10 | 10 |
| 826 | 5 | 11 | 10 | 0 | 4 | 10 | 8 | 3 | 6 | 11 | 0 | 2 | 11 | 5 |
| 827 | 0 | 0 | 2 | 9 | 5 | 5 | 2 | 8 | 6 | 0 | 7 | 2 | 1 | 10 |
| 828 | 10 | 2 | 8 | 7 | 11 | 11 | 8 | 2 | 8 | 7 | 2 | 2 | 1 | 2 |
| 829 | 11 | 9 | 5 | 5 | 5 | 0 | 2 | 11 | 8 | 3 | 7 | 0 | 11 | 9 |
| 830 | 7 | 8 | 0 | 2 | 9 | 0 | 7 | 5 | 10 | 7 | 5 | 9 | 11 | 5 |
| 831 | 0 | 5 | 7 | 6 | 9 | 7 | 1 | 6 | 2 | 4 | 10 | 6 | 10 | 1 |
| 832 | 10 | 9 | 4 | 6 | 11 | 2 | 11 | 5 | 6 | 3 | 9 | 3 | 10 | 0 |
| 833 | 4 | 10 | 11 | 8 | 5 | 5 | 10 | 1 | 4 | 3 | 3 | 1 | 7 | 8 |
| 834 | 7 | 4 | 4 | 6 | 5 | 4 | 3 | 9 | 2 | 0 | 2 | 2 | 10 | 11 |
| 835 | 6 | 10 | 7 | 0 | 5 | 11 | 10 | 11 | 9 | 2 | 7 | 11 | 1 | 1 |
| 836 | 7 | 3 | 9 | 11 | 4 | 7 | 6 | 2 | 10 | 2 | 6 | 10 | 5 | 5 |
| 837 | 4 | 2 | 6 | 5 | 6 | 11 | 7 | 7 | 9 | 8 | 4 | 9 | 6 | 11 |
| 838 | 5 | 6 | 9 | 3 | 9 | 8 | 11 | 4 | 2 | 6 | 4 | 9 | 3 | 2 |
| 839 | 0 | 4 | 3 | 3 | 8 | 4 | 9 | 7 | 7 | 4 | 10 | 5 | 4 | 7 |
| 840 | 4 | 1 | 4 | 9 | 1 | 2 | 11 | 11 | 3 | 10 | 10 | 5 | 8 | 3 |
| 841 | 6 | 1 | 1 | 9 | 7 | 0 | 8 | 10 | 2 | 3 | 4 | 8 | 11 | 0 |
| 842 | 10 | 0 | 11 | 7 | 1 | 4 | 5 | 7 | 4 | 0 | 6 | 11 | 11 | 2 |
| 843 | 8 | 4 | 0 | 1 | 9 | 8 | 8 | 2 | 11 | 3 | 4 | 4 | 8 | 8 |
| 844 | 11 | 7 | 5 | 8 | 9 | 2 | 7 | 0 | 3 | 9 | 6 | 7 | 3 | 10 |
| 845 | 4 | 8 | 11 | 8 | 10 | 8 | 0 | 11 | 7 | 1 | 6 | 4 | 10 | 1 |
| 846 | 9 | 8 | 2 | 7 | 0 | 1 | 8 | 1 | 2 | 2 | 5 | 0 | 4 | 11 |
| 847 | 6 | 4 | 11 | 11 | 4 | 2 | 0 | 10 | 5 | 7 | 11 | 0 | 2 | 6 |
| 848 | 8 | 6 | 1 | 0 | 11 | 8 | 10 | 1 | 3 | 11 | 10 | 5 | 5 | 9 |
| 849 | 3 | 3 | 11 | 10 | 2 | 9 | 4 | 0 | 8 | 2 | 0 | 1 | 0 | 6 |
| 850 | 0 | 9 | 6 | 5 | 4 | 1 | 10 | 1 | 6 | 0 | 1 | 1 | 10 | 6 |
| 851 | 2 | 10 | 9 | 11 | 10 | 10 | 7 | 6 | 9 | 11 | 1 | 2 | 4 | 6 |
| 852 | 8 | 10 | 7 | 9 | 4 | 6 | 5 | 2 | 7 | 7 | 11 | 6 | 6 | 11 |
| 853 | 6 | 11 | 2 | 4 | 0 | 4 | 3 | 0 | 4 | 7 | 8 | 9 | 11 | 10 |
| 854 | 1 | 11 | 1 | 2 | 8 | 8 | 11 | 5 | 10 | 2 | 0 | 2 | 10 | 11 |
| 855 | 10 | 6 | 8 | 4 | 3 | 3 | 6 | 0 | 0 | 10 | 0 | 0 | 10 | 8 |
| 856 | 3 | 0 | 1 | 10 | 1 | 4 | 4 | 9 | 7 | 8 | 9 | 8 | 8 | 7 |
| 857 | 3 | 1 | 10 | 10 | 9 | 11 | 2 | 2 | 2 | 1 | 1 | 2 | 9 | 7 |
| 858 | 11 | 2 | 4 | 8 | 11 | 6 | 4 | 9 | 9 | 7 | 5 | 8 | 4 | 4 |
| 859 | 11 | 0 | 10 | 8 | 0 | 5 | 0 | 7 | 10 | 6 | 0 | 8 | 7 | 11 |
| 860 | 8 | 3 | 2 | 2 | 3 | 0 | 4 | 11 | 2 | 9 | 9 | 7 | 5 | 9 |
| 861 | 2 | 4 | 6 | 0 | 3 | 10 | 3 | 10 | 4 | 9 | 9 | 1 | 2 | 2 |
| 862 | 9 | 9 | 9 | 10 | 7 | 1 | 10 | 10 | 7 | 7 | 10 | 7 | 11 | 2 |
| 863 | 3 | 7 | 11 | 11 | 10 | 7 | 2 | 8 | 7 | 2 | 9 | 9 | 9 | 11 |
| 864 | 0 | 10 | 0 | 10 | 11 | 1 | 4 | 4 | 0 | 9 | 3 | 6 | 6 | 2 |
| 865 | 8 | 1 | 11 | 0 | 9 | 3 | 4 | 6 | 9 | 10 | 5 | 10 | 2 | 2 |
| 866 | 3 | 5 | 1 | 4 | 4 | 9 | 2 | 4 | 6 | 7 | 9 | 5 | 11 | 6 |
| 867 | 0 | 2 | 9 | 5 | 4 | 11 | 4 | 0 | 1 | 4 | 10 | 0 | 8 | 5 |
| 868 | 1 | 5 | 9 | 6 | 9 | 10 | 11 | 11 | 5 | 11 | 11 | 4 | 1 | 9 |
| 869 | 5 | 8 | 5 | 5 | 4 | 6 | 9 | 6 | 3 | 4 | 0 | 10 | 9 | 7 |
| 870 | 10 | 4 | 10 | 4 | 9 | 11 | 8 | 7 | 1 | 11 | 9 | 5 | 5 | 1 |
| 871 | 11 | 6 | 11 | 4 | 7 | 4 | 0 | 11 | 4 | 3 | 2 | 3 | 6 | 11 |
| 872 | 3 | 3 | 3 | 9 | 2 | 6 | 2 | 11 | 4 | 8 | 4 | 7 | 2 | 0 |
| 873 | 3 | 5 | 5 | 2 | 5 | 9 | 5 | 0 | 4 | 11 | 2 | 8 | 9 | 8 |
| 874 | 7 | 5 | 9 | 10 | 3 | 9 | 5 | 11 | 8 | 9 | 4 | 9 | 10 | 0 |
| 875 | 0 | 11 | 11 | 11 | 6 | 8 | 8 | 7 | 11 | 9 | 9 | 7 | 3 | 0 |
| 876 | 5 | 11 | 3 | 2 | 6 | 5 | 4 | 4 | 3 | 10 | 11 | 11 | 4 | 5 |
| 877 | 5 | 8 | 8 | 1 | 3 | 10 | 6 | 3 | 9 | 8 | 1 | 5 | 1 | 7 |
| 878 | 11 | 6 | 4 | 5 | 7 | 6 | 6 | 3 | 8 | 2 | 1 | 6 | 10 | 10 |
| 879 | 6 | 10 | 10 | 6 | 3 | 10 | 0 | 2 | 3 | 0 | 0 | 4 | 9 | 10 |
| 880 | 1 | 10 | 11 | 1 | 8 | 7 | 7 | 10 | 0 | 2 | 5 | 8 | 0 | 2 |
| 881 | 8 | 2 | 6 | 1 | 1 | 7 | 9 | 1 | 5 | 3 | 7 | 6 | 11 | 5 |
| 882 | 10 | 4 | 9 | 4 | 2 | 0 | 11 | 11 | 10 | 0 | 2 | 0 | 9 | 5 |
| 883 | 9 | 9 | 7 | 3 | 6 | 6 | 10 | 1 | 1 | 9 | 3 | 4 | 5 | 0 |
| 884 | 11 | 8 | 4 | 0 | 4 | 9 | 6 | 10 | 10 | 10 | 7 | 5 | 0 | 8 |
| 885 | 5 | 11 | 0 | 9 | 3 | 0 | 1 | 8 | 9 | 4 | 8 | 1 | 3 | 1 |
| 886 | 0 | 7 | 8 | 0 | 1 | 6 | 2 | 9 | 7 | 9 | 2 | 7 | 7 | 2 |
| 887 | 7 | 11 | 3 | 4 | 10 | 2 | 10 | 2 | 1 | 9 | 11 | 6 | 11 | 9 |
| 888 | 3 | 2 | 8 | 0 | 8 | 4 | 9 | 4 | 10 | 10 | 9 | 3 | 5 | 2 |
| 889 | 5 | 7 | 9 | 2 | 2 | 4 | 10 | 6 | 4 | 7 | 3 | 10 | 1 | 0 |
| 890 | 9 | 10 | 8 | 8 | 8 | 0 | 10 | 11 | 1 | 11 | 2 | 2 | 10 | 7 |
| 891 | 6 | 3 | 3 | 1 | 10 | 3 | 11 | 2 | 0 | 1 | 8 | 3 | 2 | 6 |
| 892 | 2 | 0 | 3 | 3 | 7 | 1 | 2 | 8 | 8 | 4 | 0 | 0 | 8 | 0 |
| 893 | 9 | 2 | 2 | 9 | 11 | 3 | 7 | 0 | 4 | 2 | 9 | 7 | 6 | 4 |
| 894 | 3 | 1 | 9 | 8 | 8 | 2 | 6 | 10 | 9 | 11 | 0 | 3 | 7 | 3 |
| 895 | 2 | 2 | 10 | 5 | 1 | 2 | 10 | 6 | 1 | 7 | 0 | 11 | 10 | 2 |
| 896 | 3 | 9 | 2 | 6 | 7 | 11 | 7 | 1 | 4 | 9 | 4 | 2 | 0 | 6 |
| 897 | 4 | 7 | 0 | 11 | 10 | 3 | 9 | 0 | 8 | 6 | 2 | 8 | 1 | 4 |
| 898 | 11 | 8 | 2 | 5 | 8 | 7 | 0 | 8 | 11 | 11 | 0 | 7 | 10 | 0 |
| 899 | 1 | 4 | 2 | 9 | 1 | 8 | 1 | 3 | 9 | 10 | 11 | 9 | 5 | 7 |
| 900 | 11 | 2 | 1 | 8 | 1 | 1 | 5 | 0 | 6 | 8 | 0 | 0 | 2 | 6 |
| 901 | 1 | 1 | 8 | 0 | 2 | 7 | 4 | 2 | 6 | 0 | 1 | 5 | 0 | 4 |
| 902 | 9 | 0 | 0 | 6 | 1 | 10 | 1 | 10 | 0 | 3 | 5 | 1 | 6 | 10 |
| 903 | 3 | 4 | 9 | 5 | 9 | 9 | 0 | 6 | 8 | 4 | 3 | 2 | 5 | 8 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 904 | 11 | 11 | 8 | 3 | 10 | 1 | 7 | 1 | 4 | 3 | 8 | 8 | 3 | 5 |
| 905 | 2 | 1 | 10 | 4 | 11 | 7 | 11 | 7 | 0 | 2 | 4 | 1 | 8 | 0 |
| 906 | 9 | 2 | 7 | 3 | 3 | 0 | 0 | 9 | 10 | 2 | 10 | 8 | 0 | 3 |
| 907 | 11 | 0 | 1 | 2 | 11 | 11 | 6 | 5 | 7 | 5 | 6 | 3 | 7 | 9 |
| 908 | 4 | 3 | 4 | 3 | 10 | 5 | 8 | 6 | 9 | 0 | 9 | 1 | 0 | 10 |
| 909 | 8 | 4 | 1 | 8 | 10 | 3 | 1 | 2 | 3 | 4 | 0 | 9 | 3 | 4 |
| 910 | 2 | 8 | 4 | 10 | 10 | 6 | 10 | 1 | 4 | 6 | 5 | 6 | 8 | 7 |
| 911 | 4 | 6 | 8 | 10 | 1 | 0 | 2 | 1 | 11 | 6 | 1 | 10 | 11 | 4 |
| 912 | 9 | 6 | 8 | 6 | 9 | 4 | 11 | 2 | 11 | 2 | 3 | 11 | 7 | 5 |
| 913 | 2 | 0 | 7 | 1 | 8 | 9 | 5 | 7 | 1 | 5 | 11 | 0 | 2 | 4 |
| 914 | 2 | 10 | 1 | 6 | 9 | 7 | 6 | 1 | 4 | 8 | 2 | 4 | 2 | 3 |
| 915 | 7 | 0 | 2 | 10 | 0 | 7 | 9 | 6 | 1 | 8 | 2 | 10 | 10 | 8 |
| 916 | 10 | 11 | 1 | 8 | 4 | 9 | 0 | 7 | 4 | 4 | 1 | 6 | 10 | 3 |
| 917 | 2 | 1 | 11 | 8 | 7 | 11 | 9 | 4 | 8 | 5 | 9 | 6 | 9 | 5 |
| 918 | 4 | 8 | 5 | 10 | 3 | 2 | 10 | 7 | 0 | 10 | 6 | 11 | 6 | 5 |
| 919 | 1 | 4 | 6 | 5 | 2 | 4 | 9 | 5 | 0 | 11 | 4 | 6 | 2 | 8 |
| 920 | 2 | 10 | 8 | 0 | 1 | 3 | 11 | 3 | 8 | 0 | 11 | 10 | 10 | 0 |
| 921 | 2 | 8 | 11 | 7 | 0 | 4 | 4 | 4 | 1 | 4 | 0 | 5 | 7 | 1 |
| 922 | 4 | 6 | 6 | 0 | 2 | 11 | 2 | 3 | 3 | 5 | 0 | 0 | 9 | 3 |
| 923 | 1 | 1 | 0 | 5 | 3 | 1 | 6 | 1 | 7 | 1 | 10 | 6 | 8 | 1 |
| 924 | 1 | 10 | 4 | 7 | 3 | 6 | 9 | 8 | 5 | 1 | 4 | 5 | 4 | 11 |
| 925 | 6 | 9 | 3 | 9 | 7 | 7 | 0 | 0 | 9 | 11 | 10 | 2 | 6 | 1 |
| 926 | 8 | 4 | 8 | 2 | 2 | 9 | 6 | 9 | 0 | 7 | 2 | 11 | 6 | 10 |
| 927 | 5 | 0 | 1 | 9 | 10 | 10 | 11 | 7 | 0 | 5 | 2 | 5 | 11 | 1 |
| 928 | 7 | 0 | 4 | 5 | 9 | 11 | 11 | 0 | 3 | 5 | 7 | 4 | 10 | 6 |
| 929 | 1 | 7 | 1 | 6 | 10 | 9 | 6 | 6 | 2 | 10 | 8 | 1 | 4 | 9 |
| 930 | 11 | 3 | 9 | 4 | 3 | 8 | 3 | 5 | 0 | 0 | 5 | 7 | 2 | 10 |
| 931 | 9 | 10 | 6 | 7 | 1 | 10 | 11 | 5 | 2 | 6 | 0 | 7 | 2 | 3 |
| 932 | 10 | 6 | 10 | 1 | 10 | 7 | 5 | 2 | 9 | 0 | 7 | 0 | 1 | 3 |
| 933 | 7 | 2 | 5 | 2 | 6 | 4 | 0 | 3 | 3 | 6 | 8 | 9 | 7 | 7 |
| 934 | 4 | 5 | 8 | 1 | 9 | 4 | 10 | 4 | 6 | 11 | 7 | 6 | 0 | 11 |
| 935 | 7 | 7 | 7 | 6 | 11 | 7 | 10 | 0 | 11 | 8 | 6 | 9 | 0 | 6 |
| 936 | 6 | 5 | 8 | 4 | 7 | 5 | 11 | 10 | 0 | 4 | 9 | 7 | 5 | 4 |
| 937 | 6 | 6 | 5 | 5 | 6 | 10 | 1 | 4 | 1 | 1 | 2 | 9 | 0 | 1 |
| 938 | 10 | 11 | 6 | 10 | 11 | 9 | 9 | 10 | 1 | 1 | 7 | 2 | 2 | 9 |
| 939 | 3 | 3 | 4 | 1 | 11 | 5 | 6 | 8 | 4 | 2 | 11 | 4 | 1 | 8 |
| 940 | 5 | 7 | 0 | 7 | 6 | 5 | 5 | 3 | 7 | 3 | 0 | 3 | 1 | 2 |
| 941 | 6 | 9 | 10 | 0 | 9 | 9 | 5 | 10 | 3 | 2 | 8 | 3 | 6 | 0 |
| 942 | 8 | 11 | 11 | 6 | 6 | 11 | 1 | 1 | 2 | 2 | 3 | 8 | 2 | 9 |
| 943 | 1 | 7 | 4 | 11 | 4 | 11 | 3 | 9 | 0 | 3 | 8 | 6 | 5 | 3 |
| 944 | 10 | 11 | 7 | 9 | 9 | 6 | 6 | 5 | 3 | 2 | 6 | 1 | 0 | 8 |
| 945 | 7 | 10 | 0 | 1 | 4 | 10 | 4 | 10 | 7 | 8 | 4 | 10 | 11 | 6 |
| 946 | 1 | 9 | 7 | 11 | 9 | 9 | 11 | 4 | 6 | 1 | 10 | 0 | 9 | 10 |
| 947 | 5 | 8 | 6 | 0 | 0 | 0 | 5 | 6 | 0 | 0 | 4 | 11 | 8 | 4 |
| 948 | 3 | 1 | 8 | 5 | 2 | 10 | 2 | 9 | 10 | 2 | 3 | 0 | 10 | 1 |
| 949 | 5 | 11 | 4 | 10 | 9 | 5 | 9 | 2 | 8 | 11 | 10 | 5 | 10 | 4 |
| 950 | 0 | 3 | 5 | 11 | 1 | 6 | 0 | 0 | 0 | 0 | 11 | 11 | 5 | 11 |
| 951 | 7 | 11 | 6 | 0 | 1 | 2 | 3 | 8 | 11 | 10 | 4 | 0 | 0 | 11 |
| 952 | 3 | 8 | 2 | 11 | 9 | 3 | 8 | 3 | 1 | 8 | 0 | 6 | 8 | 10 |
| 953 | 4 | 1 | 5 | 4 | 0 | 8 | 6 | 2 | 3 | 5 | 3 | 3 | 11 | 6 |
| 954 | 3 | 10 | 2 | 5 | 3 | 7 | 2 | 0 | 5 | 10 | 10 | 10 | 5 | 3 |
| 955 | 3 | 7 | 0 | 7 | 7 | 1 | 7 | 11 | 10 | 10 | 6 | 10 | 10 | 4 |
| 956 | 6 | 2 | 0 | 7 | 9 | 5 | 2 | 11 | 8 | 0 | 4 | 8 | 0 | 6 |
| 957 | 6 | 7 | 3 | 1 | 8 | 6 | 8 | 4 | 6 | 9 | 6 | 10 | 8 | 5 |
| 958 | 1 | 2 | 3 | 5 | 7 | 7 | 1 | 10 | 6 | 4 | 4 | 11 | 3 | 7 |
| 959 | 3 | 1 | 7 | 7 | 0 | 11 | 5 | 9 | 1 | 3 | 10 | 11 | 6 | 0 |
| 960 | 7 | 8 | 9 | 8 | 5 | 9 | 10 | 5 | 5 | 4 | 7 | 3 | 8 | 4 |
| 961 | 7 | 11 | 2 | 3 | 1 | 1 | 4 | 0 | 5 | 11 | 9 | 11 | 1 | 1 |
| 962 | 0 | 5 | 8 | 0 | 10 | 3 | 0 | 0 | 2 | 5 | 5 | 1 | 3 | 7 |
| 963 | 10 | 8 | 3 | 3 | 0 | 2 | 3 | 7 | 4 | 11 | 3 | 10 | 7 | 6 |
| 964 | 6 | 8 | 4 | 3 | 11 | 0 | 3 | 2 | 2 | 10 | 10 | 6 | 9 | 5 |
| 965 | 1 | 0 | 7 | 1 | 7 | 2 | 10 | 2 | 5 | 0 | 6 | 7 | 4 | 1 |
| 966 | 3 | 6 | 0 | 8 | 5 | 0 | 8 | 10 | 10 | 1 | 10 | 7 | 2 | 8 |
| 967 | 10 | 3 | 5 | 8 | 0 | 7 | 4 | 6 | 0 | 7 | 0 | 9 | 1 | 5 |
| 968 | 3 | 7 | 3 | 10 | 3 | 10 | 4 | 5 | 6 | 3 | 4 | 4 | 4 | 1 |
| 969 | 9 | 4 | 5 | 6 | 3 | 11 | 2 | 0 | 6 | 1 | 0 | 11 | 8 | 2 |
| 970 | 7 | 5 | 6 | 2 | 9 | 7 | 2 | 7 | 4 | 6 | 3 | 7 | 3 | 11 |
| 971 | 2 | 1 | 7 | 10 | 2 | 0 | 3 | 2 | 3 | 7 | 8 | 10 | 8 | 9 |
| 972 | 7 | 1 | 8 | 3 | 11 | 5 | 10 | 5 | 9 | 10 | 11 | 2 | 7 | 1 |
| 973 | 3 | 1 | 11 | 2 | 4 | 1 | 3 | 3 | 2 | 11 | 11 | 6 | 0 | 2 |
| 974 | 9 | 2 | 10 | 7 | 10 | 0 | 6 | 5 | 5 | 5 | 8 | 11 | 11 | 4 |
| 975 | 9 | 9 | 4 | 11 | 1 | 0 | 9 | 3 | 4 | 11 | 4 | 0 | 3 | 2 |
| 976 | 10 | 5 | 11 | 10 | 5 | 3 | 1 | 4 | 7 | 7 | 4 | 3 | 8 | 1 |
| 977 | 1 | 2 | 10 | 2 | 7 | 1 | 2 | 7 | 0 | 3 | 2 | 9 | 4 | 2 |
| 978 | 1 | 5 | 0 | 8 | 4 | 0 | 11 | 0 | 11 | 2 | 1 | 5 | 9 | 0 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 979 | 2 | 6 | 5 | 1 | 0 | 8 | 9 | 0 | 11 | 2 | 11 | 1 | 6 | 2 |
| 980 | 5 | 9 | 4 | 0 | 9 | 3 | 3 | 0 | 11 | 1 | 2 | 11 | 4 | 8 |
| 981 | 7 | 6 | 11 | 2 | 1 | 1 | 9 | 5 | 6 | 0 | 7 | 5 | 7 | 0 |
| 982 | 8 | 3 | 1 | 9 | 1 | 1 | 9 | 6 | 1 | 5 | 6 | 4 | 9 | 10 |
| 983 | 6 | 0 | 6 | 3 | 3 | 4 | 8 | 11 | 1 | 11 | 10 | 7 | 11 | 11 |
| 984 | 6 | 8 | 0 | 4 | 2 | 2 | 11 | 7 | 3 | 3 | 11 | 9 | 1 | 8 |
| 985 | 5 | 8 | 7 | 3 | 5 | 4 | 6 | 1 | 8 | 5 | 6 | 6 | 6 | 6 |
| 986 | 11 | 10 | 9 | 1 | 3 | 5 | 9 | 2 | 9 | 4 | 6 | 6 | 0 | 0 |
| 987 | 6 | 0 | 9 | 4 | 9 | 2 | 5 | 4 | 5 | 5 | 1 | 11 | 5 | 11 |
| 988 | 9 | 1 | 0 | 4 | 6 | 7 | 7 | 8 | 4 | 10 | 0 | 8 | 5 | 6 |
| 989 | 8 | 0 | 6 | 5 | 4 | 9 | 0 | 3 | 2 | 7 | 7 | 10 | 3 | 1 |
| 990 | 8 | 7 | 8 | 4 | 6 | 11 | 6 | 4 | 8 | 4 | 10 | 9 | 4 | 0 |
| 991 | 6 | 2 | 0 | 9 | 5 | 1 | 6 | 6 | 2 | 9 | 11 | 5 | 3 | 11 |
| 992 | 4 | 2 | 6 | 9 | 7 | 9 | 5 | 8 | 1 | 2 | 5 | 4 | 7 | 1 |
| 993 | 4 | 5 | 3 | 2 | 6 | 6 | 8 | 10 | 11 | 7 | 3 | 2 | 7 | 10 |
| 994 | 10 | 3 | 10 | 0 | 2 | 3 | 10 | 11 | 5 | 1 | 1 | 6 | 7 | 2 |
| 995 | 4 | 8 | 4 | 8 | 6 | 1 | 11 | 5 | 8 | 11 | 4 | 7 | 4 | 10 |
| 996 | 3 | 11 | 0 | 11 | 4 | 8 | 9 | 1 | 0 | 5 | 10 | 4 | 11 | 7 |
| 997 | 10 | 6 | 6 | 2 | 8 | 3 | 3 | 5 | 1 | 9 | 11 | 8 | 1 | 5 |
| 998 | 7 | 9 | 6 | 3 | 6 | 10 | 9 | 2 | 0 | 2 | 2 | 0 | 4 | 6 |
| 999 | 5 | 11 | 7 | 10 | 5 | 10 | 7 | 11 | 10 | 1 | 1 | 9 | 8 | 10 |
| 1000 | 2 | 1 | 9 | 2 | 0 | 3 | 1 | 1 | 10 | 1 | 4 | 11 | 5 | 3 |
| 1001 | 7 | 6 | 4 | 1 | 6 | 9 | 2 | 10 | 0 | 5 | 9 | 6 | 8 | 9 |
| 1002 | 2 | 10 | 5 | 9 | 11 | 4 | 7 | 2 | 5 | 10 | 3 | 9 | 0 | 10 |
| 1003 | 7 | 8 | 1 | 4 | 8 | 6 | 7 | 0 | 2 | 11 | 6 | 0 | 7 | 7 |
| 1004 | 0 | 11 | 9 | 2 | 2 | 2 | 1 | 11 | 8 | 11 | 6 | 2 | 3 | 2 |
| 1005 | 2 | 5 | 4 | 5 | 3 | 11 | 1 | 5 | 8 | 8 | 8 | 5 | 11 | 8 |
| 1006 | 10 | 9 | 10 | 1 | 3 | 8 | 1 | 1 | 3 | 7 | 2 | 10 | 2 | 4 |
| 1007 | 9 | 9 | 11 | 6 | 10 | 11 | 4 | 10 | 10 | 8 | 2 | 9 | 5 | 1 |
| 1008 | 11 | 5 | 7 | 10 | 4 | 0 | 7 | 3 | 9 | 9 | 0 | 3 | 5 | 4 |
| 1009 | 2 | 7 | 9 | 0 | 8 | 1 | 0 | 8 | 0 | 6 | 7 | 9 | 0 | 4 |
| 1010 | 0 | 9 | 5 | 7 | 8 | 10 | 4 | 2 | 3 | 6 | 9 | 1 | 3 | 1 |
| 1011 | 11 | 3 | 8 | 1 | 8 | 4 | 6 | 6 | 5 | 0 | 4 | 2 | 3 | 0 |
| 1012 | 9 | 3 | 3 | 3 | 1 | 11 | 0 | 3 | 2 | 10 | 2 | 5 | 11 | 10 |
| 1013 | 8 | 5 | 7 | 5 | 1 | 8 | 2 | 10 | 5 | 8 | 6 | 8 | 1 | 2 |
| 1014 | 3 | 0 | 6 | 0 | 5 | 11 | 0 | 4 | 8 | 1 | 5 | 8 | 0 | 10 |
| 1015 | 9 | 8 | 1 | 11 | 2 | 5 | 10 | 8 | 11 | 3 | 9 | 10 | 2 | 6 |
| 1016 | 2 | 9 | 0 | 10 | 1 | 10 | 2 | 7 | 6 | 8 | 11 | 7 | 0 | 9 |
| 1017 | 7 | 9 | 7 | 7 | 10 | 6 | 3 | 8 | 9 | 3 | 1 | 8 | 1 | 9 |
| 1018 | 11 | 3 | 7 | 2 | 0 | 2 | 2 | 5 | 11 | 11 | 10 | 0 | 1 | 3 |
| 1019 | 8 | 11 | 3 | 8 | 4 | 10 | 11 | 8 | 5 | 6 | 7 | 1 | 6 | 2 |
| 1020 | 8 | 4 | 6 | 7 | 7 | 8 | 4 | 6 | 10 | 5 | 8 | 6 | 4 | 11 |
| 1021 | 8 | 4 | 2 | 10 | 11 | 5 | 6 | 1 | 1 | 10 | 4 | 3 | 3 | 2 |
| 1022 | 8 | 3 | 0 | 1 | 0 | 10 | 5 | 3 | 0 | 10 | 10 | 7 | 3 | 11 |
| 1023 | 8 | 6 | 10 | 9 | 0 | 4 | 7 | 3 | 3 | 4 | 2 | 6 | 11 | 0 |
| 1024 | 4 | 5 | 2 | 0 | 4 | 2 | 5 | 0 | 0 | 0 | 6 | 1 | 6 | 7 |
| 1025 | 6 | 1 | 5 | 10 | 7 | 4 | 0 | 5 | 10 | 4 | 2 | 2 | 0 | 10 |
| 1026 | 10 | 4 | 6 | 11 | 11 | 5 | 6 | 8 | 7 | 1 | 11 | 11 | 2 | 6 |
| 1027 | 11 | 6 | 4 | 3 | 1 | 1 | 3 | 11 | 8 | 3 | 5 | 0 | 3 | 0 |
| 1028 | 0 | 4 | 1 | 9 | 10 | 6 | 3 | 5 | 6 | 10 | 1 | 10 | 8 | 7 |
| 1029 | 2 | 2 | 9 | 2 | 11 | 8 | 11 | 0 | 6 | 11 | 4 | 8 | 3 | 11 |
| 1030 | 1 | 10 | 1 | 2 | 6 | 3 | 10 | 10 | 7 | 9 | 6 | 3 | 0 | 2 |
| 1031 | 1 | 8 | 7 | 4 | 0 | 6 | 4 | 7 | 9 | 1 | 9 | 1 | 10 | 11 |
| 1032 | 3 | 3 | 4 | 6 | 2 | 10 | 5 | 3 | 5 | 5 | 11 | 4 | 5 | 3 |
| 1033 | 3 | 6 | 8 | 10 | 5 | 5 | 1 | 9 | 2 | 7 | 4 | 9 | 9 | 7 |
| 1034 | 11 | 11 | 1 | 7 | 3 | 11 | 1 | 6 | 5 | 6 | 9 | 2 | 7 | 5 |
| 1035 | 8 | 0 | 8 | 3 | 10 | 10 | 10 | 4 | 0 | 9 | 5 | 1 | 4 | 9 |
| 1036 | 6 | 5 | 10 | 6 | 5 | 6 | 10 | 6 | 9 | 5 | 0 | 0 | 2 | 7 |
| 1037 | 11 | 6 | 9 | 8 | 10 | 9 | 8 | 9 | 10 | 8 | 2 | 6 | 5 | 8 |
| 1038 | 4 | 11 | 8 | 8 | 2 | 9 | 9 | 2 | 6 | 1 | 5 | 11 | 10 | 4 |
| 1039 | 5 | 4 | 7 | 3 | 11 | 10 | 7 | 0 | 1 | 6 | 7 | 6 | 9 | 2 |
| 1040 | 6 | 3 | 10 | 7 | 4 | 4 | 8 | 8 | 2 | 6 | 3 | 10 | 1 | 0 |
| 1041 | 10 | 9 | 7 | 1 | 2 | 8 | 10 | 6 | 4 | 11 | 11 | 9 | 0 | 1 |
| 1042 | 9 | 11 | 3 | 2 | 0 | 11 | 3 | 5 | 1 | 11 | 5 | 6 | 5 | 6 |
| 1043 | 8 | 3 | 3 | 8 | 5 | 1 | 6 | 2 | 10 | 4 | 10 | 10 | 3 | 1 |
| 1044 | 6 | 10 | 2 | 4 | 9 | 8 | 4 | 6 | 11 | 3 | 2 | 3 | 4 | 4 |
| 1045 | 6 | 6 | 2 | 9 | 7 | 3 | 1 | 2 | 3 | 2 | 10 | 8 | 5 | 0 |
| 1046 | 4 | 1 | 0 | 7 | 11 | 0 | 8 | 11 | 7 | 7 | 1 | 2 | 10 | 1 |
| 1047 | 0 | 5 | 0 | 1 | 0 | 7 | 11 | 4 | 9 | 8 | 3 | 7 | 11 | 3 |
| 1048 | 7 | 2 | 10 | 8 | 1 | 5 | 5 | 4 | 4 | 7 | 8 | 0 | 1 | 3 |
| 1049 | 11 | 8 | 10 | 10 | 11 | 2 | 2 | 1 | 5 | 11 | 6 | 0 | 11 | 10 |
| 1050 | 1 | 11 | 10 | 5 | 4 | 3 | 11 | 11 | 0 | 7 | 2 | 5 | 7 | 9 |
| 1051 | 9 | 5 | 5 | 0 | 10 | 9 | 6 | 8 | 5 | 2 | 3 | 4 | 10 | 11 |
| 1052 | 2 | 5 | 5 | 2 | 7 | 10 | 9 | 6 | 8 | 1 | 7 | 3 | 7 | 9 |
| 1053 | 0 | 9 | 6 | 0 | 0 | 8 | 2 | 3 | 5 | 3 | 4 | 11 | 7 | 7 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 1054 | 4 | 9 | 11 | 11 | 3 | 0 | 1 | 9 | 10 | 5 | 11 | 5 | 3 | 2 |
| 1055 | 0 | 9 | 4 | 8 | 7 | 6 | 7 | 11 | 0 | 1 | 10 | 9 | 4 | 2 |
| 1056 | 7 | 3 | 11 | 5 | 10 | 11 | 5 | 7 | 3 | 4 | 3 | 8 | 11 | 7 |
| 1057 | 9 | 7 | 1 | 7 | 8 | 2 | 5 | 2 | 8 | 7 | 0 | 9 | 5 | 10 |
| 1058 | 1 | 1 | 6 | 5 | 5 | 2 | 8 | 2 | 2 | 5 | 7 | 7 | 11 | 8 |
| 1059 | 5 | 7 | 8 | 3 | 8 | 6 | 8 | 1 | 11 | 4 | 11 | 4 | 3 | 8 |
| 1060 | 5 | 10 | 9 | 1 | 7 | 3 | 9 | 3 | 2 | 10 | 4 | 10 | 10 | 8 |
| 1061 | 8 | 1 | 6 | 2 | 1 | 5 | 0 | 7 | 9 | 8 | 6 | 9 | 8 | 9 |
| 1062 | 10 | 7 | 6 | 2 | 2 | 1 | 6 | 4 | 0 | 10 | 7 | 10 | 9 | 5 |
| 1063 | 4 | 8 | 0 | 8 | 0 | 11 | 2 | 10 | 9 | 4 | 11 | 10 | 0 | 5 |
| 1064 | 4 | 0 | 2 | 3 | 6 | 2 | 8 | 9 | 7 | 10 | 5 | 9 | 5 | 2 |
| 1065 | 9 | 8 | 3 | 3 | 1 | 2 | 1 | 6 | 8 | 11 | 11 | 11 | 6 | 3 |
| 1066 | 4 | 1 | 11 | 8 | 8 | 5 | 3 | 2 | 2 | 7 | 9 | 10 | 6 | 6 |
| 1067 | 10 | 8 | 4 | 4 | 3 | 6 | 5 | 5 | 1 | 9 | 5 | 5 | 9 | 1 |
| 1068 | 7 | 0 | 6 | 7 | 4 | 5 | 1 | 1 | 10 | 3 | 5 | 9 | 6 | 5 |
| 1069 | 7 | 0 | 2 | 8 | 0 | 9 | 3 | 6 | 3 | 9 | 9 | 1 | 11 | 0 |
| 1070 | 8 | 4 | 6 | 7 | 0 | 10 | 10 | 9 | 4 | 3 | 0 | 5 | 11 | 2 |
| 1071 | 9 | 10 | 4 | 1 | 5 | 10 | 3 | 8 | 7 | 6 | 0 | 6 | 1 | 10 |
| 1072 | 1 | 1 | 2 | 4 | 4 | 8 | 11 | 1 | 9 | 0 | 8 | 10 | 2 | 0 |
| 1073 | 11 | 2 | 8 | 3 | 2 | 1 | 4 | 8 | 3 | 2 | 1 | 4 | 0 | 10 |
| 1074 | 10 | 2 | 9 | 3 | 2 | 8 | 5 | 9 | 10 | 10 | 6 | 2 | 2 | 3 |
| 1075 | 2 | 10 | 8 | 7 | 2 | 8 | 5 | 1 | 9 | 2 | 7 | 11 | 5 | 6 |
| 1076 | 10 | 2 | 10 | 0 | 2 | 7 | 7 | 6 | 0 | 5 | 8 | 3 | 10 | 0 |
| 1077 | 9 | 9 | 10 | 8 | 7 | 9 | 8 | 8 | 9 | 0 | 9 | 2 | 3 | 6 |
| 1078 | 8 | 10 | 11 | 2 | 3 | 2 | 4 | 7 | 7 | 7 | 4 | 0 | 3 | 1 |
| 1079 | 5 | 3 | 1 | 9 | 0 | 9 | 4 | 0 | 0 | 8 | 11 | 9 | 7 | 2 |
| 1080 | 8 | 5 | 4 | 7 | 6 | 11 | 1 | 11 | 2 | 9 | 10 | 4 | 9 | 6 |
| 1081 | 11 | 6 | 8 | 8 | 4 | 6 | 6 | 2 | 4 | 10 | 0 | 5 | 6 | 9 |
| 1082 | 5 | 5 | 11 | 0 | 2 | 6 | 6 | 6 | 6 | 4 | 4 | 11 | 1 | 5 |
| 1083 | 3 | 6 | 9 | 11 | 4 | 0 | 7 | 3 | 6 | 3 | 3 | 10 | 2 | 11 |
| 1084 | 2 | 11 | 4 | 9 | 9 | 9 | 1 | 10 | 8 | 4 | 10 | 3 | 8 | 5 |
| 1085 | 9 | 9 | 10 | 4 | 8 | 6 | 2 | 7 | 10 | 2 | 11 | 3 | 7 | 10 |
| 1086 | 7 | 0 | 5 | 11 | 4 | 4 | 10 | 4 | 11 | 2 | 4 | 3 | 3 | 11 |
| 1087 | 5 | 7 | 10 | 4 | 3 | 2 | 6 | 8 | 5 | 9 | 2 | 3 | 1 | 6 |
| 1088 | 8 | 0 | 7 | 10 | 10 | 3 | 5 | 10 | 11 | 0 | 9 | 5 | 1 | 4 |
| 1089 | 9 | 3 | 6 | 7 | 11 | 3 | 3 | 2 | 6 | 11 | 7 | 2 | 6 | 4 |
| 1090 | 11 | 1 | 9 | 9 | 10 | 8 | 6 | 7 | 3 | 11 | 10 | 5 | 2 | 10 |
| 1091 | 9 | 2 | 11 | 10 | 4 | 10 | 1 | 7 | 5 | 0 | 8 | 11 | 4 | 7 |
| 1092 | 8 | 6 | 0 | 11 | 6 | 10 | 9 | 11 | 0 | 0 | 8 | 0 | 1 | 8 |
| 1093 | 0 | 8 | 11 | 8 | 6 | 5 | 2 | 9 | 8 | 10 | 1 | 5 | 11 | 3 |
| 1094 | 6 | 5 | 11 | 4 | 5 | 1 | 1 | 5 | 5 | 6 | 6 | 4 | 6 | 1 |
| 1095 | 5 | 9 | 3 | 2 | 9 | 4 | 7 | 9 | 6 | 7 | 7 | 7 | 6 | 9 |
| 1096 | 6 | 9 | 3 | 0 | 7 | 1 | 6 | 10 | 11 | 10 | 4 | 5 | 4 | 3 |
| 1097 | 8 | 5 | 1 | 5 | 11 | 2 | 10 | 9 | 11 | 1 | 2 | 3 | 6 | 3 |
| 1098 | 6 | 8 | 1 | 2 | 10 | 8 | 3 | 1 | 2 | 6 | 10 | 0 | 7 | 8 |
| 1099 | 6 | 4 | 1 | 5 | 5 | 8 | 8 | 11 | 5 | 4 | 5 | 2 | 5 | 0 |
| 1100 | 2 | 10 | 7 | 1 | 9 | 11 | 10 | 9 | 5 | 2 | 2 | 10 | 8 | 9 |
| 1101 | 5 | 5 | 11 | 7 | 8 | 2 | 0 | 7 | 3 | 3 | 9 | 7 | 10 | 3 |
| 1102 | 9 | 5 | 5 | 1 | 4 | 2 | 9 | 11 | 6 | 11 | 2 | 8 | 1 | 0 |
| 1103 | 1 | 4 | 4 | 3 | 3 | 0 | 1 | 2 | 9 | 7 | 5 | 4 | 1 | 3 |
| 1104 | 0 | 2 | 1 | 10 | 5 | 4 | 4 | 2 | 1 | 7 | 3 | 6 | 2 | 8 |
| 1105 | 9 | 3 | 1 | 0 | 6 | 1 | 8 | 9 | 10 | 9 | 9 | 0 | 1 | 4 |
| 1106 | 6 | 11 | 1 | 11 | 3 | 2 | 11 | 1 | 9 | 3 | 7 | 6 | 10 | 7 |
| 1107 | 7 | 8 | 6 | 4 | 6 | 4 | 11 | 3 | 2 | 4 | 10 | 11 | 8 | 0 |
| 1108 | 10 | 5 | 2 | 5 | 9 | 4 | 0 | 4 | 4 | 2 | 1 | 5 | 11 | 1 |
| 1109 | 10 | 1 | 3 | 3 | 7 | 9 | 2 | 4 | 2 | 6 | 8 | 11 | 10 | 10 |
| 1110 | 5 | 6 | 5 | 1 | 0 | 0 | 6 | 4 | 4 | 1 | 4 | 0 | 8 | 7 |
| 1111 | 10 | 1 | 11 | 1 | 0 | 6 | 9 | 6 | 10 | 6 | 10 | 4 | 8 | 2 |
| 1112 | 4 | 4 | 5 | 8 | 0 | 1 | 4 | 1 | 6 | 9 | 4 | 8 | 6 | 10 |
| 1113 | 4 | 9 | 3 | 10 | 9 | 2 | 4 | 5 | 2 | 2 | 1 | 10 | 2 | 3 |
| 1114 | 11 | 9 | 2 | 9 | 4 | 5 | 5 | 3 | 8 | 4 | 8 | 2 | 9 | 6 |
| 1115 | 4 | 3 | 1 | 4 | 5 | 5 | 9 | 5 | 3 | 5 | 7 | 8 | 5 | 11 |
| 1116 | 3 | 1 | 9 | 0 | 9 | 11 | 3 | 0 | 5 | 1 | 8 | 8 | 6 | 2 |
| 1117 | 2 | 0 | 8 | 0 | 9 | 0 | 5 | 10 | 6 | 6 | 6 | 6 | 10 | 0 |
| 1118 | 2 | 1 | 1 | 7 | 1 | 1 | 6 | 8 | 0 | 11 | 9 | 3 | 5 | 0 |
| 1119 | 8 | 6 | 3 | 3 | 10 | 1 | 11 | 1 | 1 | 2 | 6 | 3 | 2 | 4 |
| 1120 | 9 | 7 | 4 | 2 | 8 | 0 | 11 | 10 | 9 | 6 | 1 | 1 | 6 | 7 |
| 1121 | 11 | 9 | 8 | 2 | 6 | 0 | 2 | 7 | 5 | 1 | 1 | 10 | 5 | 6 |
| 1122 | 5 | 9 | 6 | 7 | 8 | 7 | 4 | 10 | 7 | 9 | 4 | 4 | 1 | 9 |
| 1123 | 7 | 8 | 1 | 2 | 11 | 0 | 10 | 6 | 10 | 2 | 0 | 6 | 9 | 1 |
| 1124 | 3 | 8 | 6 | 5 | 8 | 6 | 2 | 0 | 0 | 0 | 4 | 6 | 0 | 2 |
| 1125 | 2 | 6 | 10 | 8 | 3 | 10 | 1 | 5 | 11 | 11 | 3 | 6 | 4 | 2 |
| 1126 | 5 | 10 | 7 | 6 | 9 | 6 | 3 | 0 | 8 | 5 | 10 | 4 | 7 | 11 |
| 1127 | 10 | 7 | 10 | 10 | 8 | 3 | 0 | 2 | 10 | 5 | 7 | 4 | 2 | 11 |
| 1128 | 5 | 2 | 0 | 0 | 4 | 11 | 10 | 0 | 11 | 8 | 3 | 4 | 0 | 9 |
| 1129 | 1 | 2 | 6 | 5 | 1 | 0 | 0 | 10 | 7 | 0 | 11 | 10 | 7 | 1 |
| 1130 | 5 | 11 | 7 | 7 | 0 | 1 | 1 | 11 | 11 | 4 | 1 | 1 | 1 | 3 |
| 1131 | 10 | 4 | 3 | 2 | 9 | 10 | 8 | 3 | 4 | 0 | 4 | 3 | 9 | 0 |
| 1132 | 4 | 0 | 7 | 6 | 3 | 9 | 9 | 9 | 2 | 4 | 0 | 8 | 6 | 8 |
| 1133 | 9 | 4 | 1 | 9 | 5 | 0 | 5 | 4 | 9 | 3 | 2 | 8 | 3 | 9 |
| 1134 | 2 | 3 | 3 | 1 | 1 | 10 | 3 | 1 | 11 | 7 | 1 | 4 | 10 | 0 |
| 1135 | 11 | 3 | 8 | 9 | 1 | 3 | 0 | 4 | 5 | 7 | 6 | 6 | 2 | 7 |
| 1136 | 1 | 1 | 2 | 11 | 8 | 0 | 3 | 3 | 8 | 6 | 2 | 11 | 4 | 5 |
| 1137 | 7 | 1 | 5 | 10 | 4 | 0 | 5 | 6 | 0 | 10 | 5 | 10 | 8 | 8 |
| 1138 | 1 | 9 | 5 | 3 | 5 | 11 | 4 | 3 | 1 | 10 | 5 | 7 | 0 | 0 |
| 1139 | 11 | 2 | 5 | 7 | 10 | 6 | 0 | 0 | 0 | 2 | 5 | 7 | 1 | 4 |
| 1140 | 8 | 3 | 7 | 6 | 7 | 4 | 6 | 7 | 7 | 10 | 8 | 4 | 9 | 7 |
| 1141 | 3 | 7 | 5 | 6 | 9 | 8 | 9 | 5 | 8 | 9 | 8 | 1 | 0 | 5 |
| 1142 | 4 | 10 | 0 | 10 | 6 | 7 | 0 | 11 | 6 | 1 | 7 | 5 | 11 | 9 |
| 1143 | 10 | 5 | 9 | 9 | 7 | 5 | 4 | 3 | 9 | 8 | 2 | 3 | 1 | 7 |
| 1144 | 2 | 0 | 0 | 2 | 3 | 6 | 10 | 1 | 10 | 0 | 4 | 2 | 10 | 6 |
| 1145 | 6 | 11 | 9 | 6 | 1 | 9 | 2 | 3 | 7 | 5 | 9 | 3 | 7 | 2 |
| 1146 | 11 | 7 | 0 | 8 | 11 | 10 | 7 | 7 | 6 | 2 | 0 | 7 | 11 | 0 |
| 1147 | 11 | 6 | 4 | 11 | 3 | 4 | 7 | 10 | 11 | 4 | 0 | 9 | 5 | 7 |
| 1148 | 7 | 10 | 4 | 5 | 4 | 7 | 4 | 4 | 1 | 1 | 1 | 2 | 10 | 0 |
| 1149 | 0 | 2 | 8 | 9 | 0 | 11 | 1 | 5 | 10 | 8 | 0 | 1 | 10 | 5 |
| 1150 | 1 | 6 | 3 | 2 | 10 | 7 | 5 | 8 | 11 | 4 | 5 | 10 | 4 | 11 |
| 1151 | 2 | 10 | 10 | 6 | 7 | 3 | 6 | 6 | 10 | 0 | 10 | 1 | 6 | 10 |
| 1152 | 7 | 6 | 2 | 0 | 10 | 5 | 0 | 9 | 5 | 3 | 6 | 7 | 0 | 1 |
| 1153 | 8 | 3 | 10 | 4 | 8 | 10 | 0 | 10 | 1 | 4 | 4 | 6 | 5 | 8 |
| 1154 | 2 | 8 | 10 | 11 | 4 | 9 | 5 | 2 | 7 | 8 | 7 | 2 | 8 | 3 |
| 1155 | 7 | 0 | 3 | 7 | 6 | 3 | 0 | 8 | 9 | 6 | 2 | 4 | 7 | 3 |
| 1156 | 4 | 9 | 2 | 7 | 2 | 8 | 11 | 9 | 8 | 1 | 3 | 4 | 4 | 11 |
| 1157 | 5 | 10 | 9 | 10 | 8 | 1 | 8 | 5 | 5 | 3 | 1 | 0 | 0 | 6 |
| 1158 | 3 | 10 | 5 | 4 | 11 | 0 | 7 | 8 | 4 | 4 | 7 | 11 | 11 | 8 |
| 1159 | 9 | 7 | 3 | 11 | 11 | 9 | 8 | 7 | 11 | 3 | 10 | 11 | 8 | 9 |
| 1160 | 5 | 6 | 9 | 7 | 5 | 0 | 9 | 10 | 1 | 2 | 5 | 8 | 6 | 10 |
| 1161 | 1 | 5 | 9 | 4 | 3 | 3 | 10 | 4 | 10 | 1 | 1 | 11 | 7 | 5 |
| 1162 | 0 | 5 | 0 | 11 | 6 | 6 | 5 | 10 | 5 | 7 | 9 | 6 | 9 | 2 |
| 1163 | 9 | 10 | 7 | 1 | 11 | 5 | 11 | 1 | 2 | 9 | 6 | 1 | 4 | 11 |
| 1164 | 5 | 5 | 10 | 4 | 10 | 8 | 8 | 2 | 3 | 0 | 3 | 11 | 5 | 2 |
| 1165 | 10 | 11 | 7 | 9 | 4 | 1 | 8 | 6 | 2 | 2 | 0 | 2 | 10 | 2 |
| 1166 | 0 | 0 | 11 | 0 | 4 | 0 | 6 | 5 | 1 | 7 | 0 | 7 | 0 | 3 |
| 1167 | 9 | 0 | 6 | 0 | 1 | 4 | 4 | 8 | 8 | 8 | 10 | 3 | 2 | 10 |
| 1168 | 5 | 9 | 2 | 3 | 4 | 8 | 0 | 11 | 7 | 5 | 1 | 7 | 3 | 4 |
| 1169 | 0 | 6 | 6 | 1 | 5 | 5 | 8 | 6 | 3 | 11 | 6 | 0 | 3 | 2 |
| 1170 | 11 | 0 | 11 | 8 | 5 | 1 | 11 | 10 | 6 | 0 | 5 | 1 | 8 | 3 |
| 1171 | 10 | 1 | 1 | 10 | 1 | 7 | 2 | 3 | 3 | 8 | 4 | 5 | 3 | 6 |
| 1172 | 6 | 6 | 1 | 6 | 4 | 7 | 10 | 7 | 4 | 9 | 5 | 4 | 3 | 8 |
| 1173 | 4 | 7 | 10 | 4 | 9 | 5 | 10 | 0 | 4 | 2 | 10 | 9 | 4 | 7 |
| 1174 | 3 | 10 | 11 | 1 | 9 | 10 | 8 | 4 | 10 | 7 | 7 | 9 | 4 | 6 |
| 1175 | 6 | 11 | 4 | 9 | 0 | 7 | 11 | 3 | 1 | 9 | 8 | 9 | 4 | 4 |
| 1176 | 3 | 3 | 11 | 6 | 4 | 5 | 0 | 11 | 6 | 6 | 0 | 2 | 7 | 7 |
| 1177 | 1 | 4 | 3 | 7 | 3 | 5 | 7 | 8 | 8 | 8 | 6 | 6 | 11 | 0 |
| 1178 | 0 | 9 | 4 | 4 | 0 | 1 | 9 | 8 | 2 | 11 | 3 | 8 | 0 | 4 |
| 1179 | 4 | 6 | 10 | 9 | 11 | 2 | 11 | 4 | 10 | 5 | 9 | 7 | 5 | 9 |
| 1180 | 7 | 4 | 8 | 9 | 6 | 4 | 9 | 5 | 7 | 9 | 3 | 6 | 7 | 4 |
| 1181 | 8 | 8 | 0 | 3 | 4 | 9 | 3 | 5 | 8 | 10 | 9 | 9 | 0 | 6 |
| 1182 | 9 | 1 | 7 | 5 | 2 | 1 | 10 | 7 | 8 | 4 | 8 | 7 | 6 | 0 |
| 1183 | 1 | 3 | 11 | 11 | 7 | 3 | 9 | 8 | 4 | 8 | 11 | 2 | 4 | 10 |
| 1184 | 5 | 4 | 1 | 6 | 2 | 2 | 3 | 11 | 0 | 7 | 6 | 7 | 4 | 5 |
| 1185 | 7 | 4 | 7 | 7 | 1 | 1 | 8 | 0 | 3 | 0 | 2 | 9 | 11 | 6 |
| 1186 | 1 | 1 | 5 | 6 | 9 | 9 | 2 | 9 | 3 | 3 | 11 | 0 | 2 | 3 |
| 1187 | 1 | 4 | 6 | 9 | 8 | 8 | 3 | 10 | 5 | 1 | 7 | 3 | 3 | 3 |
| 1188 | 0 | 3 | 8 | 10 | 4 | 3 | 7 | 3 | 7 | 9 | 11 | 5 | 10 | 1 |
| 1189 | 3 | 2 | 9 | 2 | 8 | 3 | 4 | 8 | 5 | 9 | 3 | 7 | 5 | 1 |
| 1190 | 0 | 7 | 9 | 5 | 10 | 7 | 9 | 1 | 9 | 3 | 4 | 4 | 0 | 10 |
| 1191 | 1 | 2 | 3 | 6 | 4 | 3 | 10 | 6 | 1 | 6 | 9 | 9 | 8 | 0 |
| 1192 | 4 | 10 | 6 | 4 | 7 | 0 | 11 | 4 | 8 | 6 | 4 | 2 | 3 | 4 |
| 1193 | 8 | 9 | 0 | 8 | 0 | 2 | 10 | 0 | 5 | 9 | 8 | 6 | 3 | 11 |
| 1194 | 9 | 9 | 4 | 11 | 9 | 6 | 1 | 3 | 3 | 10 | 6 | 11 | 11 | 4 |
| 1195 | 7 | 7 | 1 | 11 | 7 | 9 | 2 | 3 | 0 | 9 | 6 | 2 | 6 | 11 |
| 1196 | 6 | 7 | 0 | 9 | 6 | 4 | 5 | 9 | 8 | 3 | 7 | 10 | 4 | 8 |
| 1197 | 0 | 4 | 9 | 4 | 8 | 4 | 3 | 9 | 11 | 9 | 5 | 0 | 2 | 11 |
| 1198 | 1 | 10 | 6 | 8 | 7 | 9 | 7 | 1 | 6 | 11 | 3 | 0 | 5 | 7 |
| 1199 | 10 | 7 | 8 | 0 | 4 | 2 | 2 | 6 | 1 | 1 | 10 | 6 | 7 | 8 |
| 1200 | 0 | 9 | 7 | 10 | 3 | 9 | 11 | 5 | 11 | 6 | 11 | 11 | 11 | 11 |
| 1201 | 8 | 0 | 10 | 1 | 2 | 8 | 5 | 0 | 3 | 7 | 1 | 6 | 8 | 5 |
| 1202 | 9 | 2 | 5 | 6 | 11 | 7 | 8 | 5 | 6 | 5 | 5 | 10 | 2 | 10 |
| 1203 | 7 | 7 | 3 | 10 | 5 | 6 | 11 | 0 | 2 | 8 | 11 | 1 | 0 | 1 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 1204 | 8 | 9 | 9 | 9 | 9 | 7 | 8 | 10 | 10 | 1 | 5 | 1 | 9 | 1 |
| 1205 | 7 | 1 | 4 | 6 | 10 | 9 | 7 | 11 | 1 | 5 | 6 | 5 | 11 | 6 |
| 1206 | 6 | 8 | 7 | 5 | 11 | 10 | 10 | 5 | 0 | 7 | 6 | 10 | 1 | 6 |
| 1207 | 6 | 10 | 8 | 3 | 8 | 11 | 0 | 11 | 3 | 0 | 4 | 8 | 8 | 11 |
| 1208 | 7 | 5 | 0 | 0 | 2 | 8 | 1 | 11 | 4 | 10 | 9 | 5 | 7 | 11 |
| 1209 | 3 | 8 | 8 | 0 | 2 | 0 | 10 | 2 | 7 | 3 | 10 | 1 | 1 | 10 |
| 1210 | 5 | 2 | 1 | 11 | 7 | 5 | 10 | 2 | 5 | 11 | 9 | 11 | 3 | 1 |
| 1211 | 3 | 4 | 0 | 1 | 7 | 2 | 0 | 4 | 7 | 9 | 1 | 11 | 1 | 2 |
| 1212 | 8 | 10 | 5 | 7 | 8 | 3 | 10 | 7 | 10 | 8 | 3 | 2 | 9 | 8 |
| 1213 | 0 | 8 | 3 | 1 | 9 | 9 | 7 | 7 | 0 | 4 | 5 | 5 | 2 | 4 |
| 1214 | 2 | 10 | 3 | 0 | 0 | 4 | 6 | 11 | 2 | 4 | 9 | 4 | 2 | 8 |
| 1215 | 2 | 3 | 2 | 8 | 5 | 7 | 1 | 1 | 0 | 10 | 11 | 3 | 11 | 9 |
| 1216 | 7 | 11 | 4 | 2 | 8 | 5 | 2 | 6 | 6 | 8 | 11 | 7 | 10 | 8 |
| 1217 | 3 | 11 | 2 | 5 | 3 | 8 | 2 | 7 | 2 | 4 | 7 | 4 | 1 | 5 |
| 1218 | 10 | 10 | 9 | 7 | 6 | 1 | 10 | 2 | 3 | 10 | 0 | 6 | 3 | 0 |
| 1219 | 9 | 3 | 9 | 3 | 3 | 6 | 4 | 9 | 2 | 5 | 8 | 10 | 7 | 7 |
| 1220 | 10 | 10 | 0 | 6 | 7 | 11 | 1 | 8 | 11 | 9 | 8 | 7 | 8 | 4 |
| 1221 | 0 | 10 | 0 | 2 | 1 | 0 | 2 | 2 | 11 | 11 | 5 | 5 | 6 | 2 |
| 1222 | 0 | 8 | 3 | 6 | 5 | 6 | 4 | 3 | 6 | 3 | 8 | 9 | 1 | 6 |
| 1223 | 4 | 4 | 7 | 0 | 7 | 4 | 3 | 1 | 4 | 0 | 0 | 2 | 7 | 1 |
| 1224 | 2 | 10 | 11 | 9 | 1 | 11 | 9 | 2 | 10 | 1 | 1 | 6 | 0 | 8 |
| 1225 | 8 | 7 | 5 | 0 | 3 | 5 | 7 | 11 | 9 | 1 | 2 | 5 | 5 | 10 |
| 1226 | 9 | 2 | 6 | 8 | 10 | 2 | 9 | 7 | 11 | 9 | 11 | 1 | 2 | 8 |
| 1227 | 10 | 0 | 5 | 5 | 2 | 10 | 6 | 1 | 2 | 8 | 3 | 7 | 3 | 4 |
| 1228 | 6 | 9 | 7 | 2 | 2 | 6 | 0 | 8 | 2 | 3 | 4 | 4 | 11 | 2 |
| 1229 | 11 | 7 | 6 | 10 | 2 | 10 | 2 | 9 | 9 | 0 | 5 | 4 | 10 | 8 |
| 1230 | 2 | 2 | 0 | 11 | 5 | 7 | 3 | 4 | 2 | 11 | 2 | 10 | 0 | 2 |
| 1231 | 4 | 2 | 5 | 5 | 1 | 11 | 5 | 8 | 2 | 3 | 6 | 3 | 4 | 6 |
| 1232 | 5 | 1 | 2 | 11 | 7 | 11 | 8 | 5 | 11 | 10 | 7 | 1 | 2 | 7 |
| 1233 | 11 | 8 | 4 | 5 | 6 | 3 | 3 | 0 | 9 | 5 | 3 | 11 | 2 | 9 |
| 1234 | 3 | 9 | 2 | 7 | 6 | 4 | 10 | 11 | 5 | 6 | 11 | 1 | 10 | 8 |
| 1235 | 0 | 9 | 9 | 1 | 8 | 1 | 1 | 1 | 4 | 4 | 6 | 7 | 8 | 9 |
| 1236 | 10 | 5 | 0 | 11 | 11 | 8 | 4 | 0 | 2 | 5 | 0 | 4 | 4 | 1 |
| 1237 | 1 | 3 | 7 | 2 | 1 | 5 | 10 | 0 | 1 | 1 | 5 | 8 | 1 | 8 |
| 1238 | 2 | 1 | 6 | 4 | 4 | 3 | 2 | 8 | 6 | 9 | 0 | 9 | 11 | 11 |
| 1239 | 4 | 1 | 8 | 0 | 11 | 3 | 11 | 5 | 2 | 11 | 5 | 4 | 7 | 5 |
| 1240 | 2 | 4 | 9 | 4 | 9 | 3 | 11 | 2 | 0 | 8 | 9 | 7 | 9 | 7 |
| 1241 | 2 | 11 | 0 | 10 | 11 | 10 | 10 | 3 | 3 | 10 | 3 | 8 | 7 | 5 |
| 1242 | 2 | 6 | 11 | 9 | 3 | 9 | 5 | 1 | 3 | 5 | 0 | 0 | 7 | 10 |
| 1243 | 7 | 8 | 9 | 10 | 11 | 8 | 8 | 10 | 8 | 8 | 8 | 5 | 8 | 7 |
| 1244 | 9 | 8 | 0 | 7 | 1 | 5 | 0 | 10 | 10 | 9 | 0 | 5 | 10 | 0 |
| 1245 | 8 | 3 | 8 | 11 | 6 | 9 | 1 | 0 | 5 | 11 | 7 | 3 | 10 | 10 |
| 1246 | 10 | 3 | 7 | 9 | 0 | 8 | 11 | 1 | 3 | 3 | 2 | 4 | 6 | 8 |
| 1247 | 0 | 11 | 4 | 1 | 1 | 7 | 7 | 2 | 6 | 7 | 0 | 0 | 8 | 6 |
| 1248 | 6 | 0 | 9 | 8 | 2 | 11 | 6 | 4 | 1 | 4 | 6 | 3 | 5 | 7 |
| 1249 | 7 | 8 | 7 | 10 | 4 | 4 | 7 | 8 | 3 | 11 | 0 | 7 | 2 | 5 |
| 1250 | 10 | 11 | 10 | 8 | 2 | 0 | 3 | 5 | 5 | 8 | 6 | 5 | 1 | 8 |
| 1251 | 10 | 1 | 10 | 6 | 1 | 4 | 10 | 10 | 8 | 2 | 6 | 8 | 7 | 3 |
| 1252 | 3 | 4 | 1 | 2 | 6 | 7 | 7 | 0 | 2 | 2 | 1 | 2 | 6 | 5 |
| 1253 | 3 | 7 | 9 | 3 | 6 | 0 | 4 | 6 | 4 | 8 | 11 | 8 | 9 | 0 |
| 1254 | 8 | 7 | 2 | 5 | 11 | 0 | 0 | 8 | 1 | 10 | 5 | 2 | 1 | 7 |
| 1255 | 9 | 5 | 3 | 6 | 5 | 0 | 0 | 1 | 5 | 1 | 4 | 3 | 0 | 8 |
| 1256 | 9 | 2 | 3 | 10 | 8 | 8 | 6 | 4 | 3 | 1 | 11 | 2 | 9 | 9 |
| 1257 | 1 | 10 | 9 | 2 | 4 | 4 | 0 | 7 | 8 | 5 | 11 | 8 | 5 | 5 |
| 1258 | 3 | 3 | 6 | 9 | 3 | 10 | 7 | 11 | 8 | 7 | 8 | 8 | 8 | 4 |
| 1259 | 4 | 4 | 8 | 5 | 0 | 11 | 7 | 9 | 3 | 1 | 7 | 9 | 1 | 8 |
| 1260 | 7 | 8 | 10 | 0 | 9 | 10 | 0 | 8 | 8 | 9 | 11 | 10 | 9 | 4 |
| 1261 | 1 | 8 | 8 | 5 | 9 | 1 | 4 | 5 | 10 | 6 | 7 | 0 | 3 | 9 |
| 1262 | 8 | 1 | 4 | 2 | 0 | 3 | 9 | 9 | 7 | 2 | 9 | 11 | 4 | 0 |
| 1263 | 11 | 3 | 5 | 7 | 0 | 9 | 9 | 10 | 6 | 10 | 1 | 6 | 4 | 9 |
| 1264 | 4 | 8 | 1 | 3 | 0 | 7 | 0 | 4 | 5 | 10 | 2 | 4 | 1 | 11 |
| 1265 | 3 | 11 | 0 | 10 | 8 | 9 | 11 | 11 | 4 | 8 | 0 | 3 | 6 | 6 |
| 1266 | 11 | 0 | 0 | 1 | 8 | 4 | 9 | 1 | 8 | 10 | 11 | 1 | 7 | 7 |
| 1267 | 1 | 1 | 8 | 1 | 10 | 4 | 11 | 6 | 0 | 3 | 9 | 8 | 11 | 1 |
| 1268 | 11 | 4 | 2 | 1 | 6 | 2 | 6 | 5 | 6 | 2 | 10 | 4 | 4 | 8 |
| 1269 | 2 | 4 | 2 | 5 | 7 | 6 | 11 | 3 | 5 | 6 | 8 | 3 | 0 | 11 |
| 1270 | 3 | 7 | 11 | 10 | 0 | 9 | 9 | 2 | 7 | 4 | 6 | 7 | 11 | 1 |
| 1271 | 10 | 0 | 7 | 2 | 9 | 7 | 6 | 10 | 3 | 7 | 8 | 9 | 5 | 11 |
| 1272 | 7 | 9 | 1 | 3 | 1 | 11 | 9 | 7 | 4 | 5 | 9 | 10 | 2 | 1 |
| 1273 | 2 | 2 | 8 | 8 | 0 | 4 | 10 | 7 | 9 | 3 | 1 | 2 | 6 | 4 |
| 1274 | 0 | 0 | 10 | 10 | 0 | 4 | 5 | 1 | 6 | 5 | 2 | 9 | 4 | 3 |
| 1275 | 6 | 8 | 6 | 3 | 7 | 0 | 5 | 6 | 11 | 1 | 1 | 4 | 11 | 5 |
| 1276 | 10 | 6 | 1 | 3 | 2 | 3 | 2 | 8 | 7 | 3 | 9 | 8 | 9 | 8 |
| 1277 | 7 | 7 | 11 | 4 | 9 | 10 | 6 | 1 | 11 | 0 | 6 | 8 | 8 | 2 |
| 1278 | 4 | 3 | 7 | 3 | 6 | 3 | 3 | 6 | 10 | 4 | 1 | 7 | 8 | 11 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 1279 | 1 | 2 | 2 | 6 | 11 | 6 | 7 | 2 | 2 | 1 | 1 | 8 | 9 | 4 |
| 1280 | 6 | 6 | 4 | 1 | 1 | 10 | 0 | 3 | 2 | 6 | 1 | 10 | 0 | 2 |
| 1281 | 1 | 1 | 2 | 0 | 2 | 11 | 5 | 8 | 10 | 0 | 0 | 9 | 5 | 3 |
| 1282 | 0 | 9 | 8 | 10 | 8 | 6 | 8 | 4 | 7 | 8 | 6 | 0 | 7 | 0 |
| 1283 | 5 | 4 | 11 | 6 | 5 | 2 | 1 | 9 | 1 | 9 | 3 | 5 | 2 | 10 |
| 1284 | 4 | 3 | 5 | 5 | 4 | 7 | 2 | 1 | 0 | 5 | 10 | 11 | 9 | 1 |
| 1285 | 9 | 7 | 9 | 1 | 7 | 4 | 5 | 0 | 9 | 10 | 2 | 2 | 7 | 11 |
| 1286 | 3 | 5 | 11 | 4 | 10 | 11 | 4 | 11 | 9 | 6 | 9 | 8 | 8 | 5 |
| 1287 | 3 | 7 | 7 | 3 | 1 | 8 | 9 | 9 | 7 | 2 | 11 | 3 | 10 | 6 |
| 1288 | 3 | 2 | 1 | 9 | 8 | 1 | 0 | 0 | 6 | 5 | 8 | 1 | 4 | 3 |
| 1289 | 1 | 2 | 6 | 2 | 3 | 7 | 3 | 2 | 5 | 3 | 5 | 5 | 10 | 4 |
| 1290 | 10 | 8 | 5 | 3 | 8 | 9 | 11 | 5 | 3 | 1 | 3 | 7 | 5 | 8 |
| 1291 | 4 | 0 | 9 | 2 | 5 | 5 | 0 | 5 | 0 | 8 | 11 | 4 | 4 | 0 |
| 1292 | 2 | 10 | 8 | 0 | 11 | 4 | 1 | 3 | 9 | 9 | 4 | 1 | 1 | 9 |
| 1293 | 8 | 0 | 8 | 11 | 8 | 1 | 3 | 2 | 3 | 11 | 2 | 9 | 8 | 7 |
| 1294 | 8 | 8 | 2 | 3 | 1 | 0 | 2 | 10 | 1 | 7 | 1 | 0 | 6 | 11 |
| 1295 | 7 | 4 | 3 | 9 | 9 | 11 | 10 | 7 | 9 | 2 | 0 | 5 | 6 | 7 |
| 1296 | 1 | 4 | 7 | 1 | 11 | 8 | 6 | 3 | 11 | 5 | 6 | 11 | 5 | 10 |
| 1297 | 1 | 0 | 7 | 7 | 2 | 9 | 2 | 7 | 4 | 10 | 5 | 4 | 7 | 5 |
| 1298 | 0 | 7 | 3 | 6 | 2 | 5 | 11 | 11 | 4 | 11 | 1 | 1 | 10 | 0 |
| 1299 | 2 | 11 | 4 | 8 | 8 | 1 | 9 | 10 | 1 | 8 | 0 | 10 | 2 | 1 |
| 1300 | 0 | 9 | 6 | 8 | 6 | 8 | 5 | 2 | 4 | 0 | 11 | 10 | 4 | 9 |
| 1301 | 5 | 10 | 5 | 11 | 2 | 1 | 10 | 10 | 2 | 7 | 10 | 1 | 0 | 5 |
| 1302 | 11 | 6 | 7 | 2 | 9 | 3 | 5 | 6 | 5 | 4 | 7 | 0 | 5 | 0 |
| 1303 | 4 | 2 | 0 | 6 | 4 | 2 | 9 | 7 | 3 | 11 | 6 | 3 | 11 | 3 |
| 1304 | 5 | 4 | 9 | 8 | 11 | 7 | 11 | 4 | 10 | 1 | 0 | 0 | 10 | 2 |
| 1305 | 11 | 7 | 4 | 11 | 1 | 6 | 3 | 6 | 4 | 5 | 9 | 4 | 6 | 8 |
| 1306 | 7 | 3 | 7 | 4 | 7 | 5 | 1 | 3 | 6 | 7 | 9 | 7 | 0 | 0 |
| 1307 | 11 | 2 | 10 | 0 | 6 | 9 | 4 | 7 | 9 | 8 | 3 | 6 | 9 | 10 |
| 1308 | 10 | 6 | 0 | 7 | 5 | 8 | 7 | 1 | 9 | 5 | 11 | 2 | 3 | 3 |
| 1309 | 8 | 9 | 10 | 4 | 4 | 8 | 11 | 11 | 5 | 8 | 10 | 9 | 5 | 6 |
| 1310 | 8 | 10 | 7 | 10 | 0 | 7 | 2 | 8 | 10 | 3 | 3 | 1 | 4 | 7 |
| 1311 | 2 | 10 | 10 | 1 | 9 | 0 | 9 | 8 | 8 | 7 | 5 | 2 | 11 | 0 |
| 1312 | 4 | 5 | 4 | 0 | 3 | 3 | 1 | 4 | 8 | 3 | 3 | 8 | 6 | 11 |
| 1313 | 6 | 1 | 0 | 9 | 7 | 10 | 5 | 7 | 11 | 4 | 4 | 1 | 3 | 4 |
| 1314 | 0 | 7 | 2 | 4 | 6 | 6 | 10 | 8 | 8 | 9 | 7 | 11 | 2 | 2 |
| 1315 | 7 | 1 | 10 | 5 | 2 | 6 | 6 | 9 | 6 | 9 | 11 | 0 | 11 | 9 |
| 1316 | 3 | 1 | 1 | 8 | 11 | 4 | 10 | 10 | 3 | 6 | 3 | 9 | 11 | 10 |
| 1317 | 10 | 8 | 3 | 1 | 6 | 2 | 0 | 1 | 6 | 1 | 9 | 0 | 2 | 6 |
| 1318 | 10 | 3 | 11 | 11 | 10 | 5 | 0 | 0 | 10 | 10 | 7 | 1 | 11 | 9 |
| 1319 | 0 | 7 | 10 | 10 | 10 | 0 | 10 | 7 | 5 | 6 | 1 | 6 | 3 | 5 |
| 1320 | 4 | 5 | 11 | 5 | 2 | 4 | 2 | 7 | 6 | 11 | 8 | 2 | 10 | 2 |
| 1321 | 6 | 0 | 7 | 6 | 6 | 8 | 9 | 11 | 1 | 7 | 3 | 0 | 5 | 4 |
| 1322 | 7 | 9 | 6 | 9 | 2 | 10 | 4 | 8 | 4 | 3 | 7 | 7 | 5 | 6 |
| 1323 | 7 | 5 | 1 | 1 | 10 | 10 | 1 | 8 | 9 | 0 | 1 | 3 | 3 | 11 |
| 1324 | 4 | 10 | 10 | 0 | 0 | 1 | 3 | 4 | 1 | 0 | 10 | 6 | 1 | 7 |
| 1325 | 4 | 9 | 6 | 6 | 10 | 0 | 4 | 0 | 9 | 7 | 2 | 1 | 0 | 3 |
| 1326 | 9 | 4 | 5 | 3 | 2 | 3 | 11 | 7 | 0 | 6 | 10 | 0 | 7 | 11 |
| 1327 | 8 | 2 | 3 | 6 | 8 | 9 | 1 | 5 | 2 | 9 | 4 | 11 | 11 | 4 |
| 1328 | 8 | 11 | 5 | 3 | 2 | 6 | 10 | 11 | 10 | 0 | 8 | 4 | 4 | 10 |
| 1329 | 11 | 5 | 9 | 5 | 9 | 9 | 0 | 9 | 7 | 7 | 10 | 11 | 4 | 6 |
| 1330 | 5 | 2 | 3 | 1 | 2 | 11 | 0 | 2 | 0 | 3 | 2 | 9 | 0 | 11 |
| 1331 | 8 | 5 | 10 | 7 | 11 | 11 | 7 | 4 | 4 | 7 | 2 | 11 | 8 | 1 |
| 1332 | 5 | 4 | 4 | 10 | 2 | 3 | 7 | 9 | 4 | 5 | 0 | 8 | 3 | 4 |
| 1333 | 11 | 10 | 9 | 10 | 3 | 5 | 2 | 5 | 4 | 0 | 7 | 10 | 9 | 4 |
| 1334 | 9 | 8 | 8 | 5 | 9 | 10 | 8 | 6 | 2 | 8 | 9 | 2 | 9 | 1 |
| 1335 | 5 | 2 | 2 | 10 | 1 | 1 | 11 | 1 | 10 | 2 | 11 | 10 | 8 | 7 |
| 1336 | 11 | 4 | 4 | 0 | 5 | 10 | 1 | 11 | 6 | 6 | 8 | 3 | 7 | 3 |
| 1337 | 5 | 2 | 9 | 6 | 10 | 4 | 4 | 2 | 7 | 0 | 5 | 7 | 3 | 6 |
| 1338 | 5 | 0 | 1 | 5 | 8 | 6 | 1 | 10 | 0 | 6 | 2 | 8 | 3 | 6 |
| 1339 | 10 | 3 | 11 | 7 | 9 | 7 | 10 | 9 | 6 | 2 | 10 | 2 | 5 | 0 |
| 1340 | 7 | 11 | 9 | 10 | 3 | 3 | 8 | 3 | 5 | 4 | 10 | 1 | 10 | 3 |
| 1341 | 3 | 0 | 0 | 0 | 2 | 4 | 1 | 6 | 1 | 11 | 7 | 0 | 3 | 7 |
| 1342 | 5 | 6 | 1 | 9 | 5 | 6 | 2 | 4 | 5 | 8 | 1 | 4 | 11 | 8 |
| 1343 | 7 | 1 | 11 | 8 | 11 | 9 | 1 | 11 | 11 | 2 | 2 | 2 | 6 | 4 |
| 1344 | 1 | 2 | 0 | 1 | 4 | 7 | 11 | 3 | 8 | 10 | 10 | 0 | 6 | 8 |
| 1345 | 11 | 9 | 11 | 3 | 4 | 2 | 8 | 2 | 11 | 5 | 2 | 3 | 2 | 0 |
| 1346 | 8 | 9 | 5 | 10 | 9 | 10 | 1 | 3 | 7 | 5 | 2 | 8 | 5 | 11 |
| 1347 | 0 | 3 | 5 | 8 | 0 | 5 | 0 | 3 | 2 | 11 | 10 | 3 | 6 | 11 |
| 1348 | 4 | 7 | 5 | 1 | 6 | 10 | 8 | 10 | 10 | 10 | 3 | 10 | 8 | 4 |
| 1349 | 2 | 1 | 10 | 10 | 5 | 9 | 0 | 0 | 2 | 10 | 0 | 0 | 1 | 5 |
| 1350 | 7 | 6 | 1 | 4 | 0 | 2 | 9 | 1 | 0 | 2 | 4 | 2 | 11 | 1 |
| 1351 | 10 | 1 | 7 | 2 | 9 | 5 | 11 | 11 | 10 | 5 | 11 | 5 | 0 | 8 |
| 1352 | 2 | 10 | 1 | 7 | 2 | 2 | 8 | 5 | 1 | 3 | 8 | 4 | 8 | 0 |
| 1353 | 1 | 8 | 8 | 8 | 5 | 6 | 0 | 11 | 2 | 2 | 5 | 4 | 3 | 3 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 1354 | 9 | 3 | 7 | 2 | 8 | 3 | 6 | 7 | 4 | 1 | 3 | 10 | 6 | 2 |
| 1355 | 2 | 2 | 2 | 10 | 10 | 9 | 8 | 2 | 4 | 11 | 7 | 11 | 7 | 9 |
| 1356 | 6 | 5 | 2 | 0 | 11 | 5 | 0 | 1 | 11 | 0 | 8 | 5 | 10 | 6 |
| 1357 | 3 | 7 | 2 | 3 | 0 | 1 | 7 | 3 | 9 | 0 | 8 | 7 | 9 | 5 |
| 1358 | 4 | 11 | 9 | 0 | 0 | 8 | 9 | 5 | 9 | 6 | 6 | 5 | 2 | 4 |
| 1359 | 11 | 1 | 3 | 4 | 4 | 4 | 7 | 0 | 10 | 4 | 8 | 1 | 1 | 1 |
| 1360 | 4 | 4 | 2 | 5 | 8 | 10 | 11 | 2 | 7 | 8 | 10 | 4 | 8 | 9 |
| 1361 | 0 | 6 | 6 | 8 | 3 | 9 | 1 | 4 | 0 | 10 | 0 | 9 | 3 | 3 |
| 1362 | 0 | 4 | 10 | 11 | 7 | 2 | 4 | 11 | 5 | 0 | 11 | 8 | 0 | 2 |
| 1363 | 0 | 4 | 7 | 0 | 4 | 9 | 5 | 6 | 2 | 7 | 2 | 8 | 11 | 5 |
| 1364 | 4 | 6 | 8 | 7 | 0 | 7 | 1 | 0 | 8 | 11 | 9 | 6 | 11 | 9 |
| 1365 | 4 | 8 | 9 | 5 | 1 | 10 | 6 | 8 | 5 | 5 | 2 | 7 | 2 | 10 |
| 1366 | 10 | 8 | 1 | 10 | 9 | 4 | 7 | 3 | 8 | 3 | 9 | 4 | 1 | 2 |
| 1367 | 2 | 5 | 6 | 0 | 6 | 5 | 4 | 10 | 1 | 9 | 11 | 3 | 5 | 3 |
| 1368 | 1 | 0 | 10 | 2 | 6 | 11 | 2 | 2 | 10 | 11 | 9 | 8 | 1 | 10 |
| 1369 | 7 | 9 | 7 | 3 | 9 | 6 | 7 | 10 | 2 | 1 | 3 | 2 | 1 | 6 |
| 1370 | 5 | 11 | 8 | 7 | 1 | 4 | 6 | 11 | 8 | 9 | 6 | 7 | 5 | 4 |
| 1371 | 8 | 1 | 4 | 11 | 1 | 5 | 8 | 8 | 8 | 3 | 2 | 5 | 9 | 6 |
| 1372 | 6 | 5 | 9 | 4 | 8 | 0 | 8 | 9 | 0 | 3 | 7 | 9 | 5 | 5 |
| 1373 | 3 | 0 | 1 | 9 | 1 | 7 | 8 | 1 | 9 | 11 | 5 | 11 | 1 | 4 |
| 1374 | 2 | 6 | 4 | 9 | 5 | 11 | 7 | 7 | 1 | 0 | 10 | 1 | 9 | 9 |
| 1375 | 11 | 11 | 4 | 10 | 11 | 7 | 1 | 8 | 1 | 0 | 6 | 7 | 0 | 6 |
| 1376 | 0 | 8 | 11 | 4 | 4 | 3 | 3 | 10 | 3 | 10 | 11 | 0 | 1 | 0 |
| 1377 | 11 | 3 | 1 | 3 | 6 | 5 | 11 | 1 | 7 | 0 | 1 | 9 | 1 | 3 |
| 1378 | 9 | 2 | 0 | 4 | 7 | 1 | 4 | 6 | 5 | 9 | 6 | 0 | 7 | 6 |
| 1379 | 9 | 0 | 0 | 5 | 3 | 1 | 3 | 0 | 1 | 7 | 1 | 7 | 11 | 10 |
| 1380 | 8 | 3 | 8 | 6 | 0 | 10 | 2 | 4 | 3 | 5 | 0 | 10 | 7 | 4 |
| 1381 | 7 | 9 | 3 | 8 | 4 | 8 | 10 | 5 | 11 | 1 | 9 | 7 | 9 | 1 |
| 1382 | 3 | 9 | 9 | 4 | 3 | 6 | 0 | 2 | 11 | 10 | 5 | 9 | 6 | 8 |
| 1383 | 1 | 1 | 11 | 5 | 0 | 8 | 1 | 3 | 3 | 4 | 4 | 0 | 0 | 2 |
| 1384 | 2 | 11 | 8 | 4 | 10 | 6 | 2 | 3 | 0 | 7 | 3 | 3 | 6 | 6 |
| 1385 | 2 | 11 | 5 | 5 | 2 | 9 | 8 | 4 | 8 | 6 | 4 | 10 | 1 | 6 |
| 1386 | 3 | 6 | 11 | 0 | 3 | 5 | 10 | 0 | 4 | 6 | 4 | 11 | 5 | 1 |
| 1387 | 1 | 8 | 9 | 1 | 0 | 1 | 5 | 4 | 3 | 9 | 8 | 8 | 10 | 9 |
| 1388 | 9 | 7 | 2 | 6 | 5 | 9 | 6 | 1 | 7 | 8 | 9 | 5 | 5 | 3 |
| 1389 | 3 | 7 | 1 | 0 | 4 | 0 | 6 | 9 | 10 | 10 | 4 | 4 | 11 | 7 |
| 1390 | 7 | 4 | 10 | 5 | 9 | 1 | 11 | 5 | 11 | 10 | 6 | 1 | 1 | 11 |
| 1391 | 10 | 9 | 3 | 8 | 7 | 7 | 1 | 3 | 5 | 6 | 3 | 5 | 7 | 9 |
| 1392 | 0 | 8 | 4 | 11 | 10 | 0 | 6 | 8 | 3 | 2 | 7 | 8 | 8 | 1 |
| 1393 | 2 | 3 | 1 | 7 | 6 | 7 | 3 | 11 | 4 | 8 | 4 | 8 | 11 | 4 |
| 1394 | 0 | 1 | 1 | 1 | 6 | 10 | 2 | 7 | 1 | 7 | 7 | 5 | 7 | 1 |
| 1395 | 6 | 11 | 3 | 1 | 5 | 7 | 5 | 4 | 7 | 2 | 6 | 3 | 6 | 10 |
| 1396 | 8 | 6 | 6 | 2 | 2 | 11 | 7 | 0 | 3 | 3 | 6 | 2 | 7 | 7 |
| 1397 | 1 | 3 | 9 | 7 | 3 | 6 | 1 | 5 | 6 | 11 | 0 | 11 | 10 | 1 |
| 1398 | 2 | 3 | 6 | 7 | 1 | 2 | 10 | 1 | 7 | 9 | 5 | 1 | 7 | 2 |
| 1399 | 8 | 4 | 8 | 4 | 7 | 1 | 0 | 8 | 9 | 6 | 10 | 5 | 10 | 2 |
| 1400 | 6 | 10 | 5 | 8 | 1 | 6 | 5 | 0 | 0 | 4 | 0 | 6 | 9 | 0 |
| 1401 | 1 | 2 | 1 | 3 | 9 | 8 | 10 | 8 | 9 | 10 | 3 | 11 | 4 | 9 |
| 1402 | 2 | 0 | 5 | 1 | 5 | 4 | 8 | 8 | 11 | 8 | 8 | 7 | 0 | 7 |
| 1403 | 6 | 8 | 10 | 9 | 10 | 11 | 9 | 1 | 0 | 10 | 5 | 3 | 9 | 3 |
| 1404 | 5 | 11 | 11 | 2 | 6 | 8 | 9 | 10 | 6 | 3 | 1 | 3 | 11 | 11 |
| 1405 | 9 | 10 | 11 | 2 | 1 | 8 | 11 | 3 | 7 | 1 | 0 | 2 | 8 | 5 |
| 1406 | 5 | 9 | 0 | 1 | 11 | 1 | 4 | 7 | 8 | 2 | 2 | 3 | 1 | 2 |
| 1407 | 11 | 5 | 9 | 10 | 2 | 2 | 11 | 2 | 6 | 4 | 3 | 6 | 8 | 11 |
| 1408 | 10 | 6 | 6 | 4 | 11 | 4 | 5 | 7 | 5 | 11 | 4 | 9 | 9 | 5 |
| 1409 | 7 | 4 | 6 | 3 | 10 | 11 | 1 | 10 | 3 | 8 | 8 | 6 | 4 | 8 |
| 1410 | 4 | 10 | 6 | 2 | 11 | 5 | 2 | 0 | 5 | 4 | 1 | 3 | 6 | 1 |
| 1411 | 6 | 2 | 7 | 9 | 4 | 2 | 2 | 0 | 5 | 1 | 0 | 5 | 2 | 9 |
| 1412 | 3 | 10 | 7 | 8 | 2 | 10 | 9 | 0 | 3 | 11 | 9 | 7 | 8 | 4 |
| 1413 | 8 | 10 | 2 | 9 | 3 | 1 | 11 | 6 | 8 | 4 | 0 | 8 | 7 | 3 |
| 1414 | 5 | 9 | 2 | 5 | 10 | 4 | 8 | 5 | 1 | 9 | 0 | 8 | 11 | 11 |
| 1415 | 7 | 0 | 4 | 7 | 7 | 3 | 8 | 6 | 10 | 7 | 6 | 11 | 4 | 2 |
| 1416 | 3 | 9 | 11 | 1 | 5 | 7 | 6 | 0 | 0 | 11 | 10 | 1 | 10 | 11 |
| 1417 | 3 | 11 | 7 | 9 | 7 | 3 | 4 | 5 | 10 | 6 | 10 | 6 | 0 | 7 |
| 1418 | 9 | 2 | 7 | 7 | 4 | 8 | 6 | 6 | 8 | 3 | 4 | 1 | 8 | 1 |
| 1419 | 7 | 2 | 5 | 8 | 9 | 6 | 6 | 5 | 1 | 8 | 1 | 5 | 8 | 5 |
| 1420 | 0 | 4 | 2 | 2 | 5 | 3 | 8 | 9 | 6 | 1 | 5 | 11 | 0 | 6 |
| 1421 | 11 | 8 | 1 | 5 | 4 | 9 | 9 | 11 | 1 | 5 | 1 | 1 | 8 | 8 |
| 1422 | 8 | 11 | 6 | 9 | 11 | 9 | 2 | 8 | 2 | 10 | 11 | 10 | 9 | 10 |
| 1423 | 7 | 3 | 1 | 2 | 3 | 1 | 2 | 3 | 11 | 11 | 7 | 4 | 2 | 6 |
| 1424 | 8 | 7 | 2 | 1 | 7 | 8 | 4 | 4 | 2 | 11 | 4 | 6 | 6 | 2 |
| 1425 | 5 | 6 | 11 | 0 | 4 | 7 | 2 | 3 | 6 | 0 | 2 | 6 | 3 | 4 |
| 1426 | 8 | 0 | 4 | 7 | 3 | 7 | 4 | 5 | 11 | 1 | 8 | 6 | 5 | 3 |
| 1427 | 1 | 6 | 3 | 0 | 8 | 10 | 3 | 1 | 8 | 2 | 3 | 9 | 0 | 9 |
| 1428 | 6 | 8 | 1 | 0 | 3 | 11 | 4 | 4 | 2 | 9 | 6 | 11 | 2 | 0 |
| 1429 | 11 | 7 | 3 | 7 | 5 | 3 | 1 | 4 | 11 | 8 | 5 | 6 | 3 | 4 |
| 1430 | 3 | 2 | 4 | 9 | 0 | 0 | 2 | 6 | 4 | 7 | 10 | 2 | 3 | 10 |
| 1431 | 4 | 0 | 9 | 7 | 9 | 0 | 3 | 10 | 11 | 4 | 7 | 5 | 9 | 7 |
| 1432 | 9 | 11 | 7 | 5 | 6 | 7 | 10 | 9 | 5 | 11 | 3 | 11 | 11 | 8 |
| 1433 | 5 | 3 | 10 | 11 | 4 | 10 | 1 | 1 | 9 | 6 | 5 | 0 | 5 | 9 |
| 1434 | 11 | 5 | 5 | 6 | 6 | 0 | 3 | 5 | 3 | 10 | 6 | 9 | 10 | 10 |
| 1435 | 11 | 1 | 6 | 7 | 3 | 9 | 5 | 8 | 4 | 2 | 8 | 11 | 2 | 8 |
| 1436 | 11 | 10 | 11 | 11 | 3 | 8 | 6 | 7 | 2 | 8 | 5 | 7 | 11 | 2 |
| 1437 | 9 | 9 | 4 | 3 | 8 | 4 | 8 | 11 | 0 | 11 | 5 | 10 | 8 | 3 |
| 1438 | 10 | 5 | 0 | 6 | 5 | 6 | 2 | 10 | 7 | 6 | 8 | 10 | 4 | 11 |
| 1439 | 5 | 7 | 4 | 7 | 3 | 8 | 0 | 1 | 6 | 8 | 3 | 9 | 9 | 7 |
| 1440 | 1 | 9 | 0 | 5 | 5 | 9 | 10 | 8 | 8 | 4 | 6 | 9 | 7 | 11 |
| 1441 | 9 | 2 | 8 | 7 | 7 | 5 | 2 | 9 | 6 | 6 | 0 | 9 | 3 | 5 |
| 1442 | 0 | 3 | 0 | 0 | 7 | 9 | 11 | 2 | 10 | 5 | 8 | 7 | 6 | 10 |
| 1443 | 3 | 8 | 5 | 0 | 6 | 2 | 7 | 10 | 8 | 2 | 5 | 8 | 10 | 8 |
| 1444 | 1 | 9 | 9 | 3 | 0 | 10 | 7 | 6 | 11 | 3 | 10 | 6 | 4 | 11 |
| 1445 | 5 | 8 | 10 | 6 | 11 | 10 | 11 | 11 | 3 | 0 | 4 | 5 | 6 | 5 |
| 1446 | 0 | 5 | 11 | 3 | 8 | 2 | 7 | 0 | 2 | 9 | 0 | 6 | 7 | 8 |
| 1447 | 5 | 5 | 3 | 5 | 0 | 8 | 5 | 7 | 2 | 10 | 11 | 5 | 8 | 6 |
| 1448 | 7 | 4 | 9 | 11 | 1 | 0 | 5 | 9 | 5 | 2 | 3 | 6 | 1 | 9 |
| 1449 | 4 | 2 | 1 | 8 | 2 | 6 | 3 | 3 | 3 | 0 | 11 | 1 | 7 | 6 |
| 1450 | 7 | 5 | 2 | 3 | 7 | 7 | 3 | 3 | 10 | 4 | 5 | 3 | 11 | 1 |
| 1451 | 8 | 8 | 2 | 6 | 10 | 5 | 5 | 7 | 6 | 5 | 9 | 4 | 10 | 1 |
| 1452 | 3 | 10 | 6 | 0 | 4 | 3 | 0 | 2 | 9 | 4 | 9 | 2 | 5 | 2 |
| 1453 | 1 | 7 | 8 | 1 | 4 | 5 | 10 | 9 | 4 | 3 | 5 | 3 | 9 | 9 |
| 1454 | 1 | 0 | 8 | 10 | 1 | 2 | 9 | 5 | 5 | 9 | 1 | 8 | 8 | 1 |
| 1455 | 6 | 2 | 2 | 6 | 2 | 6 | 9 | 9 | 5 | 2 | 8 | 11 | 6 | 1 |
| 1456 | 11 | 3 | 5 | 9 | 10 | 4 | 5 | 11 | 2 | 8 | 7 | 11 | 1 | 10 |
| 1457 | 10 | 6 | 10 | 5 | 10 | 2 | 8 | 3 | 6 | 2 | 6 | 11 | 10 | 5 |
| 1458 | 3 | 7 | 8 | 8 | 10 | 2 | 3 | 0 | 11 | 5 | 6 | 8 | 9 | 6 |
| 1459 | 10 | 1 | 8 | 4 | 5 | 1 | 9 | 1 | 10 | 3 | 7 | 7 | 9 | 10 |
| 1460 | 4 | 6 | 6 | 9 | 5 | 4 | 10 | 9 | 4 | 1 | 11 | 6 | 10 | 11 |
| 1461 | 5 | 0 | 5 | 11 | 10 | 3 | 4 | 1 | 1 | 10 | 6 | 5 | 6 | 1 |
| 1462 | 6 | 0 | 4 | 10 | 9 | 6 | 5 | 2 | 9 | 3 | 10 | 0 | 0 | 3 |
| 1463 | 6 | 4 | 9 | 5 | 1 | 7 | 1 | 2 | 2 | 9 | 9 | 1 | 5 | 3 |
| 1464 | 1 | 3 | 2 | 0 | 9 | 6 | 4 | 10 | 3 | 10 | 4 | 7 | 8 | 11 |
| 1465 | 0 | 10 | 2 | 7 | 1 | 10 | 3 | 0 | 9 | 9 | 8 | 8 | 4 | 10 |
| 1466 | 8 | 5 | 7 | 0 | 1 | 10 | 7 | 3 | 9 | 3 | 11 | 9 | 2 | 0 |
| 1467 | 10 | 9 | 2 | 4 | 8 | 9 | 6 | 2 | 6 | 6 | 4 | 8 | 10 | 7 |
| 1468 | 10 | 0 | 11 | 0 | 0 | 2 | 5 | 10 | 7 | 5 | 1 | 2 | 9 | 10 |
| 1469 | 4 | 3 | 0 | 2 | 7 | 3 | 7 | 11 | 1 | 0 | 9 | 0 | 2 | 1 |
| 1470 | 2 | 8 | 2 | 4 | 3 | 0 | 1 | 0 | 4 | 4 | 2 | 10 | 2 | 5 |
| 1471 | 4 | 9 | 10 | 2 | 0 | 7 | 5 | 6 | 7 | 6 | 4 | 11 | 3 | 8 |
| 1472 | 2 | 7 | 6 | 9 | 9 | 8 | 8 | 7 | 0 | 4 | 6 | 9 | 1 | 2 |
| 1473 | 2 | 4 | 1 | 8 | 0 | 2 | 6 | 10 | 10 | 0 | 9 | 7 | 3 | 3 |
| 1474 | 6 | 1 | 6 | 4 | 11 | 7 | 9 | 6 | 9 | 2 | 9 | 4 | 3 | 9 |
| 1475 | 5 | 9 | 4 | 8 | 5 | 4 | 11 | 3 | 9 | 3 | 7 | 11 | 3 | 1 |
| 1476 | 6 | 3 | 9 | 0 | 11 | 6 | 7 | 3 | 1 | 7 | 10 | 10 | 3 | 8 |
| 1477 | 7 | 7 | 3 | 7 | 8 | 11 | 11 | 9 | 5 | 5 | 7 | 8 | 7 | 8 |
| 1478 | 9 | 5 | 0 | 1 | 6 | 0 | 9 | 6 | 4 | 1 | 8 | 7 | 5 | 1 |
| 1479 | 7 | 7 | 5 | 0 | 5 | 2 | 3 | 5 | 5 | 4 | 4 | 10 | 4 | 9 |
| 1480 | 9 | 5 | 11 | 2 | 3 | 10 | 4 | 4 | 3 | 2 | 8 | 1 | 11 | 6 |
| 1481 | 1 | 1 | 1 | 2 | 7 | 6 | 9 | 1 | 4 | 1 | 6 | 6 | 1 | 0 |
| 1482 | 4 | 2 | 3 | 8 | 11 | 2 | 5 | 11 | 8 | 9 | 7 | 0 | 4 | 5 |
| 1483 | 9 | 6 | 0 | 11 | 6 | 2 | 7 | 9 | 7 | 8 | 2 | 1 | 4 | 4 |
| 1484 | 11 | 0 | 6 | 4 | 11 | 8 | 8 | 4 | 1 | 1 | 10 | 1 | 4 | 10 |
| 1485 | 6 | 5 | 5 | 9 | 2 | 7 | 6 | 3 | 7 | 7 | 0 | 0 | 1 | 3 |
| 1486 | 9 | 2 | 7 | 10 | 5 | 0 | 4 | 7 | 10 | 4 | 7 | 4 | 10 | 4 |
| 1487 | 3 | 3 | 3 | 10 | 1 | 11 | 6 | 10 | 8 | 0 | 10 | 6 | 8 | 10 |
| 1488 | 3 | 6 | 9 | 3 | 11 | 10 | 2 | 9 | 6 | 4 | 6 | 4 | 0 | 0 |
| 1489 | 3 | 9 | 9 | 10 | 6 | 8 | 3 | 1 | 1 | 2 | 7 | 6 | 2 | 5 |
| 1490 | 1 | 4 | 0 | 0 | 1 | 2 | 11 | 11 | 2 | 1 | 3 | 10 | 9 | 0 |
| 1491 | 9 | 7 | 8 | 8 | 2 | 3 | 1 | 11 | 3 | 9 | 3 | 3 | 0 | 1 |
| 1492 | 11 | 6 | 3 | 6 | 7 | 0 | 9 | 10 | 0 | 8 | 11 | 7 | 1 | 6 |
| 1493 | 2 | 10 | 5 | 8 | 10 | 10 | 11 | 4 | 2 | 2 | 11 | 9 | 5 | 1 |
| 1494 | 0 | 8 | 5 | 6 | 3 | 5 | 9 | 9 | 11 | 7 | 11 | 6 | 0 | 10 |
| 1495 | 6 | 9 | 5 | 5 | 3 | 8 | 11 | 7 | 10 | 11 | 1 | 6 | 4 | 4 |
| 1496 | 8 | 4 | 1 | 4 | 5 | 9 | 6 | 5 | 8 | 7 | 1 | 3 | 2 | 0 |
| 1497 | 8 | 8 | 11 | 8 | 2 | 8 | 8 | 9 | 0 | 0 | 10 | 7 | 0 | 8 |
| 1498 | 11 | 5 | 0 | 10 | 10 | 11 | 6 | 5 | 10 | 11 | 5 | 1 | 6 | 0 |
| 1499 | 3 | 1 | 8 | 3 | 4 | 5 | 5 | 10 | 5 | 1 | 9 | 1 | 4 | 0 |
| 1500 | 5 | 4 | 3 | 4 | 9 | 2 | 6 | 6 | 3 | 6 | 5 | 9 | 7 | 5 |
| 1501 | 1 | 3 | 11 | 8 | 0 | 3 | 3 | 5 | 7 | 9 | 7 | 10 | 2 | 3 |
| 1502 | 7 | 10 | 0 | 4 | 5 | 10 | 0 | 9 | 11 | 11 | 2 | 11 | 9 | 3 |
| 1503 | 10 | 2 | 11 | 4 | 1 | 6 | 3 | 4 | 0 | 1 | 5 | 11 | 11 | 7 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 1504 | 2 | 7 | 0 | 8 | 10 | 5 | 10 | 6 | 7 | 11 | 8 | 4 | 11 | 4 |
| 1505 | 6 | 1 | 11 | 7 | 9 | 5 | 0 | 2 | 1 | 1 | 1 | 3 | 1 | 4 |
| 1506 | 0 | 10 | 5 | 2 | 11 | 0 | 11 | 11 | 6 | 8 | 8 | 0 | 9 | 9 |
| 1507 | 2 | 9 | 4 | 11 | 6 | 1 | 5 | 6 | 8 | 10 | 5 | 6 | 5 | 10 |
| 1508 | 11 | 2 | 0 | 8 | 9 | 4 | 11 | 8 | 6 | 9 | 11 | 3 | 10 | 10 |
| 1509 | 10 | 5 | 10 | 3 | 1 | 5 | 8 | 6 | 3 | 7 | 4 | 2 | 2 | 9 |
| 1510 | 2 | 1 | 2 | 2 | 7 | 5 | 3 | 10 | 0 | 10 | 1 | 8 | 10 | 2 |
| 1511 | 0 | 3 | 11 | 3 | 5 | 5 | 1 | 7 | 8 | 2 | 6 | 10 | 8 | 6 |
| 1512 | 2 | 9 | 6 | 11 | 7 | 11 | 9 | 11 | 6 | 5 | 0 | 4 | 1 | 7 |
| 1513 | 0 | 6 | 3 | 11 | 11 | 3 | 3 | 2 | 2 | 3 | 8 | 6 | 2 | 2 |
| 1514 | 4 | 11 | 1 | 3 | 3 | 0 | 5 | 1 | 0 | 1 | 5 | 8 | 0 | 2 |
| 1515 | 9 | 1 | 4 | 8 | 0 | 3 | 0 | 6 | 8 | 0 | 1 | 4 | 7 | 7 |
| 1516 | 3 | 4 | 11 | 3 | 7 | 11 | 2 | 6 | 5 | 3 | 2 | 10 | 9 | 7 |
| 1517 | 5 | 5 | 6 | 3 | 5 | 7 | 11 | 8 | 5 | 9 | 9 | 2 | 6 | 7 |
| 1518 | 10 | 4 | 9 | 1 | 11 | 9 | 2 | 11 | 4 | 7 | 8 | 9 | 1 | 7 |
| 1519 | 6 | 1 | 6 | 11 | 3 | 4 | 1 | 2 | 7 | 5 | 4 | 6 | 7 | 0 |
| 1520 | 6 | 10 | 2 | 5 | 10 | 11 | 2 | 8 | 9 | 8 | 4 | 0 | 2 | 4 |
| 1521 | 8 | 2 | 4 | 3 | 4 | 11 | 10 | 3 | 4 | 2 | 11 | 7 | 5 | 2 |
| 1522 | 6 | 11 | 0 | 6 | 9 | 0 | 7 | 8 | 4 | 2 | 3 | 9 | 3 | 2 |
| 1523 | 9 | 2 | 9 | 2 | 10 | 1 | 5 | 5 | 2 | 1 | 9 | 9 | 0 | 7 |
| 1524 | 3 | 6 | 4 | 6 | 4 | 5 | 4 | 1 | 0 | 4 | 2 | 0 | 6 | 11 |
| 1525 | 4 | 11 | 3 | 1 | 3 | 1 | 0 | 10 | 2 | 5 | 4 | 4 | 5 | 9 |
| 1526 | 6 | 4 | 2 | 2 | 4 | 4 | 1 | 4 | 8 | 7 | 0 | 7 | 4 | 10 |
| 1527 | 2 | 11 | 10 | 6 | 6 | 10 | 0 | 9 | 7 | 5 | 7 | 7 | 10 | 7 |
| 1528 | 2 | 6 | 0 | 4 | 1 | 8 | 4 | 2 | 8 | 11 | 0 | 8 | 2 | 8 |
| 1529 | 9 | 0 | 3 | 5 | 10 | 11 | 7 | 4 | 7 | 10 | 3 | 10 | 5 | 11 |
| 1530 | 9 | 10 | 10 | 5 | 3 | 8 | 4 | 8 | 0 | 6 | 9 | 3 | 6 | 9 |
| 1531 | 6 | 2 | 4 | 1 | 2 | 0 | 8 | 10 | 3 | 11 | 4 | 5 | 10 | 8 |
| 1532 | 4 | 3 | 2 | 9 | 11 | 1 | 9 | 2 | 4 | 9 | 8 | 3 | 3 | 4 |
| 1533 | 2 | 6 | 7 | 1 | 10 | 10 | 9 | 2 | 7 | 1 | 2 | 0 | 9 | 10 |
| 1534 | 6 | 1 | 6 | 9 | 1 | 3 | 11 | 0 | 8 | 7 | 3 | 9 | 10 | 5 |
| 1535 | 1 | 6 | 9 | 5 | 6 | 10 | 8 | 0 | 0 | 9 | 1 | 5 | 6 | 6 |
| 1536 | 4 | 2 | 8 | 1 | 9 | 9 | 5 | 6 | 3 | 7 | 4 | 10 | 6 | 2 |
| 1537 | 2 | 7 | 7 | 10 | 11 | 1 | 3 | 10 | 2 | 1 | 9 | 11 | 5 | 1 |
| 1538 | 7 | 6 | 9 | 9 | 6 | 5 | 4 | 11 | 8 | 5 | 7 | 9 | 11 | 4 |
| 1539 | 3 | 5 | 10 | 0 | 3 | 10 | 3 | 7 | 6 | 7 | 3 | 5 | 10 | 5 |
| 1540 | 6 | 0 | 11 | 6 | 3 | 8 | 6 | 1 | 11 | 11 | 7 | 1 | 9 | 3 |
| 1541 | 0 | 4 | 8 | 8 | 8 | 1 | 2 | 0 | 1 | 4 | 8 | 9 | 0 | 11 |
| 1542 | 8 | 11 | 7 | 4 | 9 | 10 | 8 | 3 | 5 | 6 | 1 | 0 | 4 | 4 |
| 1543 | 9 | 4 | 0 | 5 | 6 | 4 | 7 | 7 | 5 | 0 | 0 | 3 | 1 | 10 |
| 1544 | 3 | 0 | 9 | 11 | 8 | 7 | 7 | 4 | 9 | 9 | 9 | 0 | 7 | 7 |
| 1545 | 9 | 11 | 2 | 7 | 0 | 2 | 11 | 1 | 1 | 5 | 10 | 7 | 2 | 2 |
| 1546 | 11 | 5 | 10 | 6 | 8 | 4 | 7 | 10 | 3 | 1 | 10 | 10 | 8 | 0 |
| 1547 | 8 | 3 | 7 | 5 | 10 | 6 | 3 | 7 | 1 | 9 | 11 | 7 | 7 | 3 |
| 1548 | 2 | 8 | 5 | 1 | 5 | 2 | 11 | 0 | 6 | 6 | 6 | 10 | 5 | 4 |
| 1549 | 0 | 3 | 3 | 10 | 2 | 4 | 3 | 11 | 3 | 4 | 0 | 5 | 6 | 9 |
| 1550 | 7 | 1 | 3 | 1 | 9 | 0 | 10 | 0 | 1 | 9 | 3 | 0 | 2 | 5 |
| 1551 | 9 | 7 | 6 | 5 | 11 | 7 | 10 | 1 | 3 | 10 | 1 | 9 | 3 | 4 |
| 1552 | 4 | 8 | 6 | 3 | 6 | 8 | 2 | 9 | 0 | 9 | 9 | 4 | 2 | 1 |
| 1553 | 10 | 8 | 4 | 8 | 9 | 9 | 9 | 10 | 9 | 9 | 7 | 8 | 4 | 6 |
| 1554 | 3 | 4 | 3 | 7 | 4 | 9 | 1 | 7 | 7 | 11 | 11 | 1 | 3 | 1 |
| 1555 | 11 | 11 | 0 | 2 | 11 | 11 | 10 | 0 | 2 | 6 | 11 | 1 | 11 | 11 |
| 1556 | 2 | 0 | 11 | 11 | 11 | 5 | 11 | 9 | 0 | 4 | 10 | 2 | 11 | 10 |
| 1557 | 8 | 4 | 0 | 10 | 2 | 3 | 11 | 4 | 8 | 3 | 5 | 11 | 9 | 5 |
| 1558 | 10 | 10 | 6 | 7 | 7 | 0 | 9 | 3 | 10 | 7 | 10 | 5 | 0 | 11 |
| 1559 | 11 | 1 | 6 | 0 | 8 | 11 | 0 | 9 | 6 | 4 | 5 | 11 | 6 | 7 |
| 1560 | 9 | 9 | 3 | 7 | 3 | 1 | 5 | 4 | 4 | 0 | 9 | 8 | 8 | 4 |
| 1561 | 1 | 8 | 3 | 9 | 3 | 5 | 6 | 7 | 3 | 3 | 8 | 10 | 7 | 8 |
| 1562 | 3 | 10 | 1 | 1 | 6 | 1 | 5 | 2 | 0 | 6 | 5 | 2 | 9 | 7 |
| 1563 | 0 | 10 | 5 | 5 | 5 | 11 | 8 | 9 | 7 | 7 | 3 | 8 | 9 | 0 |
| 1564 | 1 | 9 | 11 | 8 | 8 | 11 | 3 | 11 | 8 | 3 | 4 | 1 | 5 | 2 |
| 1565 | 10 | 9 | 8 | 11 | 2 | 3 | 6 | 5 | 5 | 7 | 0 | 1 | 7 | 1 |
| 1566 | 11 | 2 | 9 | 8 | 2 | 1 | 0 | 7 | 8 | 9 | 2 | 2 | 8 | 9 |
| 1567 | 6 | 3 | 6 | 1 | 8 | 6 | 9 | 5 | 7 | 1 | 1 | 1 | 1 | 8 |
| 1568 | 3 | 2 | 11 | 0 | 2 | 4 | 7 | 5 | 10 | 8 | 6 | 9 | 11 | 11 |
| 1569 | 2 | 1 | 1 | 8 | 0 | 10 | 8 | 9 | 9 | 2 | 0 | 1 | 8 | 8 |
| 1570 | 1 | 7 | 9 | 3 | 10 | 3 | 2 | 8 | 4 | 2 | 2 | 7 | 3 | 7 |
| 1571 | 9 | 5 | 5 | 10 | 7 | 8 | 10 | 6 | 7 | 11 | 4 | 2 | 4 | 7 |
| 1572 | 4 | 0 | 10 | 9 | 10 | 2 | 0 | 2 | 8 | 0 | 1 | 8 | 4 | 8 |
| 1573 | 4 | 7 | 1 | 6 | 4 | 1 | 2 | 1 | 6 | 11 | 11 | 10 | 4 | 4 |
| 1574 | 8 | 3 | 1 | 2 | 11 | 4 | 4 | 6 | 6 | 8 | 10 | 10 | 5 | 5 |
| 1575 | 9 | 6 | 1 | 8 | 9 | 10 | 6 | 5 | 3 | 9 | 2 | 0 | 10 | 7 |
| 1576 | 4 | 8 | 3 | 2 | 8 | 8 | 3 | 2 | 7 | 4 | 4 | 3 | 10 | 11 |
| 1577 | 7 | 5 | 5 | 9 | 8 | 10 | 11 | 2 | 10 | 3 | 2 | 2 | 10 | 2 |
| 1578 | 10 | 2 | 9 | 3 | 1 | 0 | 9 | 0 | 3 | 3 | 11 | 9 | 8 | 2 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 1579 | 5 | 5 | 0 | 8 | 2 | 5 | 0 | 8 | 9 | 7 | 3 | 6 | 1 | 10 |
| 1580 | 3 | 11 | 8 | 7 | 7 | 11 | 8 | 3 | 3 | 3 | 7 | 8 | 3 | 9 |
| 1581 | 9 | 0 | 2 | 11 | 8 | 8 | 5 | 9 | 5 | 8 | 8 | 4 | 10 | 2 |
| 1582 | 11 | 7 | 5 | 4 | 0 | 7 | 10 | 5 | 2 | 0 | 0 | 2 | 7 | 0 |
| 1583 | 6 | 8 | 0 | 4 | 4 | 4 | 4 | 10 | 11 | 5 | 0 | 6 | 0 | 11 |
| 1584 | 1 | 0 | 11 | 10 | 9 | 5 | 5 | 6 | 6 | 0 | 8 | 3 | 3 | 5 |
| 1585 | 6 | 7 | 9 | 0 | 0 | 10 | 1 | 0 | 10 | 11 | 5 | 5 | 1 | 8 |
| 1586 | 9 | 6 | 8 | 10 | 4 | 7 | 9 | 10 | 5 | 10 | 3 | 0 | 0 | 2 |
| 1587 | 10 | 11 | 6 | 10 | 6 | 10 | 3 | 1 | 7 | 10 | 8 | 5 | 5 | 6 |
| 1588 | 7 | 3 | 9 | 9 | 1 | 9 | 7 | 2 | 3 | 2 | 5 | 7 | 9 | 11 |
| 1589 | 6 | 6 | 8 | 1 | 7 | 11 | 0 | 1 | 9 | 2 | 11 | 7 | 6 | 8 |
| 1590 | 2 | 5 | 1 | 10 | 6 | 8 | 9 | 2 | 10 | 8 | 3 | 4 | 6 | 6 |
| 1591 | 9 | 4 | 7 | 4 | 5 | 3 | 7 | 11 | 11 | 11 | 1 | 5 | 10 | 11 |
| 1592 | 5 | 2 | 2 | 1 | 10 | 10 | 5 | 10 | 10 | 9 | 10 | 1 | 5 | 0 |
| 1593 | 0 | 0 | 8 | 1 | 10 | 2 | 7 | 8 | 11 | 1 | 4 | 4 | 8 | 4 |
| 1594 | 11 | 4 | 8 | 1 | 1 | 0 | 1 | 1 | 8 | 5 | 0 | 4 | 2 | 9 |
| 1595 | 11 | 2 | 7 | 6 | 4 | 0 | 3 | 9 | 4 | 0 | 9 | 6 | 4 | 2 |
| 1596 | 5 | 2 | 8 | 7 | 10 | 8 | 7 | 11 | 0 | 10 | 0 | 10 | 0 | 10 |
| 1597 | 0 | 0 | 3 | 0 | 5 | 8 | 3 | 6 | 0 | 5 | 10 | 1 | 1 | 8 |
| 1598 | 8 | 0 | 9 | 9 | 4 | 0 | 1 | 8 | 6 | 7 | 6 | 1 | 11 | 9 |
| 1599 | 5 | 0 | 10 | 6 | 8 | 0 | 0 | 4 | 6 | 10 | 11 | 3 | 1 | 2 |
| 1600 | 1 | 2 | 0 | 7 | 3 | 10 | 6 | 6 | 7 | 10 | 1 | 7 | 4 | 5 |
| 1601 | 3 | 1 | 11 | 3 | 0 | 6 | 4 | 10 | 8 | 11 | 4 | 11 | 9 | 8 |
| 1602 | 9 | 9 | 9 | 6 | 2 | 2 | 2 | 10 | 9 | 10 | 4 | 8 | 5 | 5 |
| 1603 | 9 | 11 | 11 | 10 | 8 | 3 | 4 | 10 | 7 | 3 | 10 | 9 | 6 | 10 |
| 1604 | 4 | 1 | 2 | 6 | 3 | 2 | 3 | 0 | 10 | 7 | 8 | 0 | 9 | 11 |
| 1605 | 7 | 1 | 2 | 7 | 10 | 1 | 2 | 5 | 4 | 5 | 8 | 1 | 6 | 5 |
| 1606 | 0 | 6 | 2 | 11 | 2 | 10 | 5 | 5 | 7 | 11 | 1 | 5 | 2 | 10 |
| 1607 | 0 | 10 | 7 | 9 | 3 | 4 | 0 | 0 | 0 | 3 | 7 | 0 | 2 | 0 |
| 1608 | 2 | 0 | 5 | 4 | 1 | 11 | 7 | 5 | 10 | 6 | 11 | 4 | 9 | 7 |
| 1609 | 10 | 11 | 6 | 4 | 10 | 2 | 9 | 11 | 4 | 5 | 4 | 8 | 7 | 10 |
| 1610 | 7 | 8 | 8 | 8 | 5 | 2 | 8 | 7 | 0 | 1 | 2 | 6 | 10 | 0 |
| 1611 | 1 | 2 | 8 | 0 | 0 | 5 | 2 | 1 | 3 | 1 | 6 | 2 | 4 | 7 |
| 1612 | 10 | 9 | 1 | 6 | 11 | 5 | 9 | 1 | 10 | 4 | 5 | 8 | 2 | 9 |
| 1613 | 4 | 11 | 9 | 6 | 10 | 11 | 11 | 10 | 5 | 5 | 0 | 2 | 11 | 3 |
| 1614 | 3 | 8 | 0 | 1 | 1 | 7 | 8 | 10 | 4 | 3 | 9 | 9 | 9 | 3 |
| 1615 | 1 | 2 | 3 | 10 | 9 | 1 | 7 | 5 | 9 | 11 | 4 | 5 | 7 | 1 |
| 1616 | 4 | 0 | 1 | 10 | 7 | 4 | 2 | 11 | 11 | 9 | 5 | 3 | 11 | 8 |
| 1617 | 4 | 7 | 4 | 4 | 10 | 3 | 3 | 9 | 8 | 8 | 9 | 5 | 0 | 9 |
| 1618 | 11 | 8 | 2 | 1 | 7 | 6 | 5 | 9 | 2 | 5 | 11 | 8 | 4 | 5 |
| 1619 | 4 | 9 | 7 | 5 | 8 | 9 | 5 | 2 | 11 | 2 | 6 | 1 | 0 | 5 |
| 1620 | 4 | 1 | 0 | 2 | 4 | 8 | 9 | 4 | 1 | 9 | 2 | 10 | 8 | 7 |
| 1621 | 0 | 1 | 10 | 9 | 9 | 4 | 6 | 3 | 10 | 6 | 8 | 11 | 0 | 2 |
| 1622 | 8 | 6 | 3 | 5 | 6 | 6 | 1 | 9 | 8 | 7 | 10 | 2 | 6 | 8 |
| 1623 | 3 | 9 | 2 | 5 | 5 | 1 | 0 | 6 | 4 | 8 | 10 | 11 | 0 | 7 |
| 1624 | 10 | 10 | 0 | 2 | 10 | 5 | 7 | 5 | 8 | 2 | 0 | 0 | 6 | 7 |
| 1625 | 2 | 11 | 4 | 11 | 10 | 10 | 0 | 7 | 4 | 0 | 9 | 2 | 1 | 11 |
| 1626 | 11 | 5 | 8 | 11 | 7 | 1 | 10 | 8 | 0 | 9 | 8 | 8 | 2 | 3 |
| 1627 | 1 | 1 | 5 | 2 | 3 | 6 | 7 | 7 | 0 | 2 | 3 | 1 | 5 | 9 |
| 1628 | 3 | 11 | 0 | 0 | 5 | 7 | 6 | 1 | 1 | 7 | 1 | 4 | 8 | 9 |
| 1629 | 9 | 7 | 8 | 3 | 9 | 7 | 11 | 5 | 11 | 8 | 4 | 7 | 4 | 6 |
| 1630 | 9 | 8 | 11 | 9 | 1 | 2 | 5 | 7 | 10 | 5 | 7 | 1 | 8 | 11 |
| 1631 | 4 | 2 | 4 | 7 | 9 | 11 | 6 | 1 | 6 | 1 | 2 | 3 | 2 | 1 |
| 1632 | 8 | 1 | 11 | 1 | 0 | 0 | 5 | 3 | 4 | 2 | 2 | 9 | 7 | 9 |
| 1633 | 3 | 1 | 3 | 8 | 1 | 4 | 5 | 11 | 5 | 7 | 1 | 3 | 2 | 11 |
| 1634 | 11 | 8 | 9 | 7 | 1 | 10 | 4 | 4 | 0 | 0 | 4 | 10 | 5 | 7 |
| 1635 | 5 | 11 | 11 | 4 | 3 | 1 | 11 | 2 | 6 | 11 | 9 | 2 | 5 | 8 |
| 1636 | 11 | 9 | 1 | 7 | 0 | 7 | 3 | 9 | 11 | 9 | 11 | 5 | 5 | 1 |
| 1637 | 1 | 0 | 9 | 0 | 2 | 9 | 11 | 0 | 1 | 2 | 1 | 11 | 2 | 1 |
| 1638 | 1 | 8 | 7 | 11 | 7 | 4 | 11 | 5 | 3 | 4 | 9 | 9 | 3 | 2 |
| 1639 | 3 | 10 | 6 | 6 | 5 | 8 | 1 | 3 | 1 | 10 | 6 | 6 | 6 | 6 |
| 1640 | 7 | 2 | 8 | 0 | 8 | 3 | 3 | 3 | 6 | 2 | 4 | 6 | 7 | 10 |
| 1641 | 7 | 1 | 9 | 3 | 6 | 11 | 8 | 1 | 9 | 8 | 5 | 3 | 10 | 9 |
| 1642 | 7 | 11 | 10 | 9 | 11 | 10 | 8 | 5 | 11 | 4 | 8 | 9 | 7 | 1 |
| 1643 | 6 | 6 | 10 | 7 | 8 | 3 | 11 | 6 | 4 | 1 | 8 | 8 | 9 | 3 |
| 1644 | 1 | 3 | 7 | 1 | 1 | 9 | 9 | 11 | 6 | 3 | 3 | 5 | 2 | 10 |
| 1645 | 8 | 4 | 2 | 0 | 2 | 0 | 3 | 1 | 7 | 9 | 2 | 10 | 0 | 11 |
| 1646 | 4 | 10 | 4 | 6 | 11 | 8 | 5 | 9 | 9 | 6 | 3 | 1 | 7 | 10 |
| 1647 | 10 | 11 | 11 | 6 | 1 | 9 | 5 | 8 | 9 | 7 | 0 | 9 | 0 | 0 |
| 1648 | 4 | 6 | 0 | 4 | 5 | 11 | 11 | 8 | 0 | 7 | 8 | 1 | 4 | 7 |
| 1649 | 10 | 2 | 6 | 11 | 3 | 11 | 1 | 5 | 2 | 2 | 10 | 2 | 1 | 3 |
| 1650 | 3 | 5 | 7 | 4 | 8 | 9 | 4 | 6 | 8 | 4 | 5 | 10 | 2 | 6 |
| 1651 | 7 | 1 | 8 | 7 | 1 | 6 | 3 | 11 | 1 | 4 | 5 | 2 | 4 | 2 |
| 1652 | 11 | 10 | 6 | 3 | 8 | 6 | 7 | 11 | 5 | 3 | 3 | 7 | 11 | 4 |
| 1653 | 4 | 3 | 9 | 11 | 11 | 8 | 10 | 8 | 11 | 10 | 7 | 2 | 0 | 6 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 1654 | 11 | 3 | 5 | 6 | 9 | 7 | 0 | 2 | 0 | 6 | 7 | 5 | 6 | 6 |
| 1655 | 0 | 6 | 4 | 0 | 11 | 6 | 0 | 8 | 6 | 5 | 7 | 7 | 7 | 5 |
| 1656 | 10 | 2 | 10 | 1 | 7 | 10 | 11 | 7 | 4 | 6 | 11 | 11 | 7 | 6 |
| 1657 | 5 | 10 | 6 | 4 | 0 | 2 | 10 | 4 | 3 | 7 | 2 | 4 | 11 | 9 |
| 1658 | 8 | 9 | 1 | 3 | 8 | 8 | 2 | 0 | 7 | 7 | 5 | 2 | 7 | 2 |
| 1659 | 5 | 9 | 1 | 9 | 0 | 5 | 11 | 5 | 4 | 6 | 6 | 7 | 0 | 0 |
| 1660 | 9 | 7 | 2 | 1 | 3 | 9 | 4 | 2 | 1 | 1 | 0 | 1 | 3 | 11 |
| 1661 | 8 | 4 | 10 | 5 | 8 | 3 | 5 | 8 | 0 | 5 | 11 | 10 | 10 | 7 |
| 1662 | 10 | 10 | 2 | 2 | 3 | 9 | 10 | 4 | 10 | 3 | 5 | 6 | 1 | 10 |
| 1663 | 8 | 7 | 0 | 8 | 2 | 6 | 2 | 1 | 2 | 4 | 7 | 5 | 10 | 3 |
| 1664 | 8 | 11 | 7 | 6 | 4 | 6 | 5 | 11 | 3 | 1 | 3 | 3 | 10 | 5 |
| 1665 | 5 | 1 | 1 | 11 | 9 | 0 | 9 | 7 | 7 | 0 | 0 | 10 | 4 | 3 |
| 1666 | 3 | 0 | 4 | 5 | 0 | 5 | 3 | 0 | 7 | 1 | 10 | 3 | 5 | 4 |
| 1667 | 2 | 5 | 6 | 7 | 4 | 4 | 4 | 5 | 6 | 6 | 1 | 7 | 6 | 10 |
| 1668 | 0 | 8 | 10 | 2 | 2 | 11 | 4 | 8 | 9 | 4 | 2 | 0 | 11 | 8 |
| 1669 | 9 | 5 | 9 | 1 | 6 | 10 | 3 | 5 | 1 | 8 | 9 | 10 | 11 | 0 |
| 1670 | 2 | 1 | 3 | 5 | 8 | 7 | 6 | 9 | 2 | 3 | 7 | 3 | 1 | 4 |
| 1671 | 7 | 3 | 10 | 7 | 0 | 0 | 4 | 3 | 7 | 3 | 6 | 2 | 2 | 0 |
| 1672 | 8 | 4 | 11 | 11 | 10 | 9 | 4 | 3 | 11 | 6 | 8 | 7 | 11 | 7 |
| 1673 | 8 | 3 | 5 | 0 | 1 | 3 | 5 | 0 | 8 | 10 | 1 | 8 | 0 | 2 |
| 1674 | 5 | 0 | 5 | 5 | 7 | 2 | 1 | 9 | 9 | 1 | 7 | 6 | 0 | 2 |
| 1675 | 1 | 10 | 0 | 0 | 0 | 0 | 7 | 11 | 11 | 5 | 4 | 9 | 1 | 5 |
| 1676 | 8 | 6 | 0 | 7 | 9 | 0 | 4 | 9 | 0 | 1 | 0 | 4 | 8 | 6 |
| 1677 | 1 | 10 | 4 | 10 | 6 | 6 | 6 | 10 | 3 | 0 | 0 | 1 | 2 | 4 |
| 1678 | 2 | 4 | 8 | 3 | 2 | 10 | 3 | 2 | 10 | 10 | 4 | 9 | 1 | 0 |
| 1679 | 7 | 2 | 6 | 1 | 4 | 2 | 8 | 9 | 8 | 5 | 1 | 10 | 3 | 7 |
| 1680 | 11 | 6 | 2 | 3 | 0 | 4 | 11 | 11 | 9 | 11 | 9 | 8 | 6 | 6 |
| 1681 | 6 | 4 | 6 | 8 | 7 | 3 | 6 | 4 | 4 | 8 | 4 | 9 | 11 | 1 |
| 1682 | 3 | 3 | 10 | 8 | 7 | 3 | 10 | 9 | 1 | 5 | 3 | 1 | 9 | 11 |
| 1683 | 4 | 6 | 7 | 9 | 2 | 10 | 4 | 3 | 11 | 10 | 9 | 4 | 6 | 11 |
| 1684 | 8 | 2 | 5 | 9 | 8 | 7 | 7 | 1 | 7 | 11 | 6 | 6 | 6 | 0 |
| 1685 | 5 | 6 | 8 | 11 | 9 | 7 | 1 | 11 | 4 | 3 | 10 | 11 | 5 | 11 |
| 1686 | 2 | 6 | 11 | 2 | 0 | 7 | 0 | 6 | 3 | 7 | 11 | 1 | 2 | 3 |
| 1687 | 5 | 5 | 10 | 1 | 6 | 4 | 11 | 9 | 11 | 10 | 1 | 2 | 4 | 4 |
| 1688 | 5 | 2 | 4 | 5 | 5 | 5 | 8 | 3 | 5 | 9 | 8 | 10 | 8 | 2 |
| 1689 | 10 | 7 | 10 | 6 | 6 | 0 | 5 | 6 | 8 | 11 | 2 | 1 | 11 | 6 |
| 1690 | 0 | 9 | 4 | 8 | 11 | 2 | 8 | 2 | 8 | 4 | 6 | 11 | 1 | 3 |
| 1691 | 11 | 7 | 1 | 0 | 5 | 6 | 8 | 1 | 5 | 2 | 10 | 6 | 6 | 5 |
| 1692 | 11 | 2 | 3 | 1 | 5 | 9 | 6 | 3 | 1 | 0 | 7 | 7 | 9 | 1 |
| 1693 | 6 | 9 | 5 | 0 | 11 | 2 | 0 | 7 | 0 | 8 | 11 | 10 | 8 | 10 |
| 1694 | 1 | 10 | 8 | 10 | 1 | 0 | 8 | 8 | 2 | 7 | 2 | 3 | 6 | 8 |
| 1695 | 7 | 0 | 6 | 3 | 3 | 1 | 11 | 10 | 4 | 4 | 11 | 0 | 9 | 9 |
| 1696 | 2 | 7 | 3 | 3 | 10 | 2 | 1 | 4 | 6 | 4 | 1 | 0 | 1 | 1 |
| 1697 | 8 | 6 | 7 | 4 | 1 | 8 | 0 | 0 | 11 | 0 | 10 | 3 | 9 | 10 |
| 1698 | 6 | 6 | 7 | 6 | 9 | 2 | 10 | 2 | 3 | 5 | 1 | 2 | 8 | 2 |
| 1699 | 1 | 1 | 4 | 9 | 7 | 1 | 2 | 2 | 5 | 1 | 2 | 11 | 7 | 4 |
| 1700 | 9 | 3 | 2 | 11 | 5 | 7 | 10 | 3 | 10 | 2 | 2 | 8 | 6 | 7 |
| 1701 | 6 | 10 | 1 | 0 | 11 | 9 | 8 | 8 | 9 | 10 | 6 | 8 | 10 | 1 |
| 1702 | 9 | 1 | 8 | 2 | 11 | 5 | 6 | 0 | 7 | 8 | 5 | 0 | 3 | 10 |
| 1703 | 9 | 4 | 4 | 7 | 7 | 6 | 11 | 11 | 7 | 0 | 3 | 6 | 5 | 8 |
| 1704 | 11 | 4 | 9 | 9 | 0 | 6 | 5 | 0 | 11 | 7 | 3 | 4 | 3 | 2 |
| 1705 | 7 | 1 | 10 | 1 | 0 | 7 | 2 | 11 | 8 | 10 | 0 | 3 | 5 | 3 |
| 1706 | 7 | 0 | 11 | 6 | 1 | 3 | 2 | 0 | 4 | 1 | 6 | 4 | 10 | 11 |
| 1707 | 6 | 0 | 2 | 4 | 5 | 0 | 10 | 9 | 9 | 11 | 4 | 7 | 1 | 0 |
| 1708 | 4 | 5 | 1 | 8 | 3 | 9 | 7 | 6 | 5 | 8 | 8 | 11 | 11 | 9 |
| 1709 | 5 | 1 | 7 | 3 | 6 | 9 | 6 | 2 | 2 | 11 | 10 | 4 | 11 | 0 |
| 1710 | 3 | 9 | 11 | 9 | 7 | 5 | 2 | 1 | 1 | 0 | 11 | 9 | 10 | 10 |
| 1711 | 5 | 5 | 2 | 11 | 4 | 7 | 2 | 0 | 8 | 6 | 4 | 10 | 10 | 0 |
| 1712 | 5 | 1 | 1 | 4 | 8 | 3 | 1 | 4 | 1 | 8 | 7 | 2 | 2 | 0 |
| 1713 | 11 | 11 | 5 | 3 | 7 | 9 | 6 | 6 | 11 | 3 | 9 | 9 | 1 | 8 |
| 1714 | 7 | 10 | 0 | 5 | 8 | 1 | 10 | 8 | 6 | 1 | 9 | 0 | 3 | 2 |
| 1715 | 3 | 10 | 8 | 7 | 10 | 6 | 0 | 4 | 4 | 11 | 6 | 3 | 10 | 3 |
| 1716 | 10 | 6 | 2 | 11 | 1 | 11 | 2 | 6 | 5 | 5 | 5 | 0 | 8 | 6 |
| 1717 | 0 | 0 | 9 | 6 | 11 | 7 | 0 | 6 | 8 | 2 | 0 | 10 | 0 | 4 |
| 1718 | 7 | 11 | 5 | 0 | 4 | 2 | 4 | 2 | 2 | 11 | 0 | 0 | 6 | 1 |
| 1719 | 10 | 5 | 8 | 3 | 4 | 5 | 11 | 9 | 7 | 5 | 7 | 4 | 6 | 5 |
| 1720 | 5 | 8 | 5 | 1 | 11 | 9 | 3 | 1 | 5 | 4 | 2 | 1 | 9 | 6 |
| 1721 | 3 | 11 | 7 | 5 | 1 | 8 | 1 | 2 | 10 | 5 | 2 | 10 | 3 | 0 |
| 1722 | 10 | 7 | 11 | 10 | 10 | 4 | 1 | 0 | 0 | 7 | 8 | 8 | 6 | 4 |
| 1723 | 6 | 10 | 5 | 6 | 5 | 2 | 9 | 10 | 11 | 1 | 5 | 5 | 11 | 1 |
| 1724 | 8 | 5 | 6 | 5 | 0 | 9 | 7 | 10 | 4 | 6 | 7 | 4 | 5 | 11 |
| 1725 | 1 | 11 | 8 | 8 | 11 | 5 | 4 | 6 | 11 | 9 | 4 | 11 | 2 | 11 |
| 1726 | 0 | 8 | 3 | 0 | 9 | 7 | 5 | 0 | 7 | 8 | 9 | 4 | 11 | 7 |
| 1727 | 10 | 9 | 4 | 5 | 9 | 6 | 11 | 1 | 0 | 11 | 8 | 4 | 3 | 0 |
| 1728 | 4 | 7 | 4 | 9 | 5 | 6 | 1 | 6 | 11 | 6 | 4 | 2 | 8 | 0 |
| 1729 | 10 | 4 | 5 | 2 | 2 | 9 | 1 | 3 | 3 | 8 | 6 | 4 | 8 | 5 |
| 1730 | 7 | 0 | 8 | 2 | 2 | 6 | 7 | 0 | 8 | 6 | 10 | 8 | 1 | 5 |
| 1731 | 5 | 11 | 9 | 10 | 1 | 5 | 7 | 7 | 4 | 3 | 4 | 4 | 4 | 5 |
| 1732 | 9 | 3 | 11 | 2 | 5 | 2 | 2 | 5 | 3 | 0 | 9 | 3 | 9 | 8 |
| 1733 | 5 | 8 | 6 | 3 | 0 | 11 | 6 | 0 | 7 | 2 | 3 | 9 | 4 | 11 |
| 1734 | 8 | 5 | 9 | 2 | 9 | 1 | 2 | 11 | 2 | 3 | 2 | 6 | 11 | 1 |
| 1735 | 11 | 0 | 4 | 10 | 7 | 8 | 4 | 3 | 1 | 4 | 11 | 5 | 1 | 0 |
| 1736 | 7 | 4 | 11 | 3 | 9 | 8 | 0 | 9 | 10 | 11 | 11 | 6 | 0 | 7 |
| 1737 | 2 | 4 | 7 | 3 | 3 | 3 | 6 | 8 | 3 | 1 | 0 | 8 | 4 | 9 |
| 1738 | 6 | 3 | 7 | 0 | 1 | 11 | 2 | 10 | 0 | 11 | 2 | 7 | 5 | 9 |
| 1739 | 0 | 9 | 9 | 2 | 2 | 7 | 9 | 3 | 0 | 7 | 9 | 6 | 10 | 9 |
| 1740 | 5 | 6 | 4 | 9 | 0 | 0 | 3 | 2 | 11 | 2 | 7 | 6 | 10 | 3 |
| 1741 | 11 | 8 | 0 | 9 | 11 | 4 | 9 | 6 | 9 | 1 | 4 | 5 | 9 | 8 |
| 1742 | 9 | 0 | 7 | 4 | 0 | 4 | 6 | 2 | 6 | 8 | 11 | 11 | 6 | 9 |
| 1743 | 7 | 6 | 7 | 6 | 3 | 7 | 7 | 4 | 10 | 2 | 4 | 11 | 4 | 3 |
| 1744 | 4 | 0 | 2 | 2 | 10 | 11 | 4 | 7 | 3 | 9 | 7 | 6 | 2 | 6 |
| 1745 | 7 | 9 | 11 | 7 | 0 | 3 | 1 | 6 | 5 | 4 | 3 | 3 | 6 | 6 |
| 1746 | 4 | 8 | 1 | 11 | 0 | 3 | 8 | 10 | 1 | 11 | 8 | 7 | 7 | 6 |
| 1747 | 2 | 6 | 0 | 0 | 10 | 6 | 9 | 1 | 11 | 3 | 9 | 11 | 11 | 0 |
| 1748 | 4 | 1 | 6 | 11 | 0 | 6 | 10 | 3 | 9 | 5 | 6 | 3 | 3 | 1 |
| 1749 | 8 | 7 | 4 | 11 | 7 | 5 | 7 | 6 | 2 | 9 | 1 | 9 | 0 | 1 |
| 1750 | 0 | 7 | 10 | 11 | 3 | 11 | 11 | 2 | 8 | 10 | 5 | 4 | 10 | 1 |
| 1751 | 3 | 8 | 10 | 10 | 6 | 9 | 8 | 3 | 2 | 5 | 5 | 7 | 5 | 10 |
| 1752 | 6 | 9 | 8 | 1 | 5 | 5 | 9 | 4 | 2 | 9 | 7 | 2 | 7 | 3 |
| 1753 | 10 | 2 | 9 | 6 | 10 | 6 | 1 | 6 | 6 | 10 | 3 | 5 | 9 | 11 |
| 1754 | 0 | 11 | 7 | 10 | 10 | 2 | 6 | 10 | 9 | 9 | 6 | 0 | 3 | 9 |
| 1755 | 2 | 3 | 10 | 3 | 0 | 5 | 2 | 8 | 1 | 6 | 4 | 0 | 7 | 5 |
| 1756 | 0 | 11 | 7 | 11 | 9 | 1 | 4 | 4 | 1 | 0 | 5 | 3 | 6 | 8 |
| 1757 | 0 | 0 | 6 | 5 | 8 | 3 | 1 | 7 | 3 | 11 | 5 | 3 | 4 | 11 |
| 1758 | 1 | 5 | 5 | 4 | 2 | 0 | 10 | 11 | 3 | 2 | 7 | 3 | 9 | 6 |
| 1759 | 10 | 4 | 4 | 11 | 1 | 2 | 3 | 0 | 9 | 0 | 1 | 10 | 7 | 5 |
| 1760 | 11 | 3 | 2 | 0 | 6 | 1 | 1 | 3 | 9 | 3 | 0 | 5 | 4 | 11 |
| 1761 | 2 | 4 | 3 | 4 | 11 | 10 | 2 | 11 | 1 | 5 | 5 | 10 | 6 | 3 |
| 1762 | 1 | 3 | 4 | 2 | 6 | 10 | 4 | 1 | 4 | 7 | 7 | 8 | 3 | 2 |
| 1763 | 10 | 4 | 11 | 5 | 4 | 0 | 8 | 11 | 6 | 10 | 1 | 4 | 4 | 6 |
| 1764 | 1 | 0 | 10 | 5 | 11 | 10 | 3 | 3 | 10 | 3 | 0 | 6 | 3 | 3 |
| 1765 | 10 | 0 | 1 | 4 | 6 | 0 | 0 | 3 | 2 | 9 | 8 | 6 | 4 | 9 |
| 1766 | 7 | 4 | 5 | 11 | 8 | 5 | 9 | 4 | 4 | 6 | 10 | 1 | 9 | 4 |
| 1767 | 10 | 5 | 3 | 6 | 2 | 4 | 8 | 7 | 11 | 6 | 2 | 9 | 3 | 3 |
| 1768 | 6 | 2 | 10 | 10 | 6 | 1 | 6 | 0 | 0 | 3 | 10 | 3 | 3 | 6 |
| 1769 | 6 | 6 | 10 | 3 | 10 | 8 | 4 | 5 | 2 | 8 | 9 | 2 | 3 | 5 |
| 1770 | 6 | 7 | 8 | 5 | 10 | 1 | 4 | 10 | 3 | 3 | 2 | 5 | 7 | 0 |
| 1771 | 2 | 9 | 3 | 0 | 0 | 8 | 11 | 4 | 8 | 7 | 7 | 9 | 3 | 10 |
| 1772 | 2 | 10 | 7 | 3 | 6 | 1 | 9 | 4 | 7 | 5 | 8 | 6 | 2 | 11 |
| 1773 | 6 | 1 | 2 | 8 | 4 | 7 | 7 | 10 | 7 | 4 | 10 | 2 | 7 | 4 |
| 1774 | 5 | 3 | 7 | 8 | 4 | 11 | 10 | 7 | 2 | 0 | 6 | 9 | 3 | 6 |
| 1775 | 4 | 5 | 4 | 2 | 2 | 0 | 4 | 10 | 0 | 5 | 6 | 11 | 4 | 10 |
| 1776 | 3 | 4 | 0 | 9 | 8 | 0 | 6 | 3 | 0 | 0 | 5 | 5 | 7 | 3 |
| 1777 | 11 | 4 | 1 | 1 | 4 | 11 | 2 | 4 | 0 | 1 | 7 | 8 | 11 | 10 |
| 1778 | 5 | 3 | 4 | 0 | 1 | 1 | 6 | 7 | 3 | 5 | 11 | 6 | 1 | 1 |
| 1779 | 6 | 8 | 9 | 2 | 4 | 6 | 8 | 3 | 10 | 0 | 11 | 0 | 6 | 2 |
| 1780 | 4 | 4 | 1 | 2 | 7 | 0 | 1 | 7 | 4 | 10 | 10 | 8 | 6 | 7 |
| 1781 | 8 | 11 | 3 | 11 | 3 | 4 | 9 | 4 | 2 | 7 | 2 | 0 | 10 | 6 |
| 1782 | 3 | 1 | 1 | 1 | 3 | 11 | 7 | 8 | 3 | 5 | 2 | 5 | 6 | 3 |
| 1783 | 6 | 2 | 4 | 9 | 1 | 8 | 10 | 11 | 2 | 4 | 6 | 0 | 9 | 7 |
| 1784 | 2 | 11 | 6 | 0 | 9 | 5 | 10 | 7 | 9 | 10 | 2 | 6 | 2 | 8 |
| 1785 | 5 | 1 | 9 | 5 | 1 | 11 | 4 | 11 | 11 | 9 | 10 | 8 | 3 | 1 |
| 1786 | 4 | 2 | 11 | 3 | 3 | 2 | 9 | 5 | 0 | 4 | 3 | 10 | 10 | 4 |
| 1787 | 8 | 2 | 3 | 7 | 2 | 2 | 0 | 3 | 10 | 6 | 4 | 10 | 2 | 8 |
| 1788 | 10 | 10 | 5 | 7 | 6 | 5 | 6 | 8 | 4 | 9 | 1 | 2 | 5 | 2 |
| 1789 | 7 | 6 | 6 | 7 | 11 | 9 | 11 | 7 | 8 | 0 | 9 | 5 | 10 | 10 |
| 1790 | 3 | 3 | 2 | 3 | 9 | 0 | 11 | 6 | 0 | 7 | 6 | 6 | 5 | 1 |
| 1791 | 4 | 6 | 2 | 8 | 1 | 4 | 6 | 9 | 1 | 0 | 6 | 10 | 1 | 8 |
| 1792 | 2 | 1 | 0 | 8 | 9 | 1 | 1 | 9 | 7 | 7 | 3 | 9 | 6 | 11 |
| 1793 | 4 | 7 | 6 | 10 | 6 | 7 | 11 | 6 | 3 | 2 | 8 | 2 | 10 | 1 |
| 1794 | 11 | 11 | 8 | 9 | 5 | 2 | 0 | 5 | 9 | 6 | 4 | 11 | 3 | 10 |
| 1795 | 7 | 10 | 9 | 6 | 8 | 11 | 4 | 7 | 10 | 0 | 6 | 5 | 7 | 5 |
| 1796 | 1 | 8 | 11 | 4 | 7 | 10 | 10 | 0 | 9 | 0 | 2 | 7 | 6 | 3 |
| 1797 | 1 | 7 | 10 | 5 | 0 | 4 | 4 | 1 | 4 | 4 | 10 | 1 | 1 | 10 |
| 1798 | 0 | 6 | 7 | 1 | 7 | 0 | 5 | 11 | 8 | 11 | 5 | 11 | 8 | 1 |
| 1799 | 7 | 5 | 2 | 2 | 1 | 4 | 9 | 8 | 3 | 5 | 1 | 0 | 9 | 7 |
| 1800 | 9 | 9 | 1 | 9 | 10 | 8 | 1 | 10 | 0 | 3 | 11 | 3 | 1 | 7 |
| 1801 | 5 | 3 | 2 | 8 | 2 | 7 | 3 | 7 | 11 | 3 | 5 | 4 | 0 | 3 |
| 1802 | 11 | 0 | 10 | 0 | 1 | 6 | 11 | 3 | 11 | 9 | 3 | 7 | 5 | 5 |
| 1803 | 10 | 3 | 11 | 0 | 6 | 2 | 8 | 8 | 6 | 11 | 11 | 10 | 7 | 9 |

Example #2 of a group-based CS hopping pattern

| m | $n_{cs}(n)$ | | | | | | | | | | | | | |
|---|---|---|---|---|---|---|---|---|---|---|---|---|---|---|
| 1804 | 10 | 6 | 6 | 1 | 9 | 8 | 7 | 4 | 1 | 2 | 9 | 3 | 7 | 0 |
| 1805 | 1 | 1 | 4 | 10 | 4 | 2 | 9 | 11 | 10 | 6 | 7 | 1 | 0 | 5 |
| 1806 | 3 | 2 | 6 | 3 | 10 | 1 | 9 | 0 | 9 | 10 | 0 | 5 | 10 | 7 |
| 1807 | 9 | 7 | 10 | 2 | 6 | 11 | 6 | 3 | 2 | 7 | 4 | 11 | 9 | 11 |
| 1808 | 6 | 0 | 9 | 11 | 6 | 3 | 2 | 10 | 1 | 8 | 4 | 2 | 1 | 2 |
| 1809 | 1 | 5 | 5 | 4 | 0 | 1 | 2 | 2 | 1 | 5 | 11 | 4 | 8 | 0 |
| 1810 | 8 | 2 | 1 | 2 | 4 | 10 | 3 | 9 | 1 | 4 | 8 | 7 | 3 | 4 |
| 1811 | 0 | 8 | 1 | 8 | 4 | 8 | 10 | 7 | 7 | 5 | 0 | 8 | 10 | 9 |
| 1812 | 1 | 10 | 1 | 10 | 3 | 7 | 6 | 5 | 6 | 5 | 10 | 9 | 6 | 2 |
| 1813 | 6 | 10 | 4 | 4 | 10 | 5 | 5 | 4 | 5 | 10 | 5 | 8 | 2 | 2 |
| 1814 | 11 | 9 | 3 | 3 | 11 | 11 | 7 | 2 | 3 | 11 | 11 | 7 | 4 | 10 |
| 1815 | 3 | 0 | 8 | 5 | 3 | 0 | 5 | 9 | 0 | 4 | 4 | 5 | 2 | 6 |
| 1816 | 8 | 4 | 0 | 1 | 2 | 7 | 0 | 8 | 5 | 0 | 2 | 2 | 2 | 6 |
| 1817 | 9 | 2 | 7 | 9 | 2 | 9 | 3 | 5 | 3 | 1 | 10 | 10 | 4 | 1 |
| 1818 | 10 | 0 | 2 | 5 | 2 | 11 | 8 | 4 | 9 | 5 | 0 | 2 | 4 | 5 |
| 1819 | 8 | 9 | 5 | 6 | 6 | 4 | 0 | 1 | 6 | 3 | 0 | 7 | 5 | 3 |
| 1820 | 4 | 6 | 5 | 11 | 3 | 6 | 4 | 5 | 8 | 1 | 6 | 8 | 9 | 7 |
| 1821 | 10 | 1 | 8 | 7 | 11 | 5 | 7 | 5 | 5 | 9 | 3 | 5 | 11 | 3 |
| 1822 | 5 | 5 | 7 | 7 | 6 | 10 | 1 | 1 | 0 | 2 | 2 | 5 | 8 | 10 |
| 1823 | 9 | 9 | 2 | 7 | 5 | 5 | 4 | 0 | 6 | 4 | 2 | 11 | 7 | 0 |
| 1824 | 5 | 1 | 9 | 4 | 6 | 2 | 4 | 0 | 4 | 5 | 3 | 6 | 5 | 7 |
| 1825 | 8 | 5 | 7 | 10 | 9 | 1 | 8 | 6 | 4 | 9 | 9 | 10 | 0 | 3 |
| 1826 | 10 | 9 | 0 | 6 | 3 | 9 | 10 | 2 | 9 | 1 | 3 | 4 | 2 | 2 |
| 1827 | 5 | 6 | 5 | 8 | 5 | 11 | 10 | 6 | 1 | 6 | 1 | 0 | 1 | 11 |
| 1828 | 6 | 9 | 4 | 2 | 7 | 2 | 2 | 1 | 8 | 2 | 10 | 3 | 3 | 11 |
| 1829 | 8 | 3 | 6 | 0 | 10 | 4 | 10 | 5 | 4 | 2 | 9 | 9 | 8 | 10 |
| 1830 | 2 | 0 | 2 | 4 | 4 | 8 | 1 | 9 | 2 | 9 | 5 | 2 | 3 | 6 |
| 1831 | 8 | 5 | 3 | 11 | 5 | 6 | 11 | 3 | 3 | 1 | 2 | 4 | 7 | 10 |
| 1832 | 6 | 8 | 4 | 0 | 0 | 10 | 0 | 10 | 7 | 0 | 6 | 0 | 3 | 5 |
| 1833 | 9 | 9 | 0 | 8 | 9 | 5 | 3 | 3 | 2 | 8 | 1 | 4 | 5 | 8 |
| 1834 | 6 | 6 | 8 | 9 | 11 | 9 | 0 | 10 | 11 | 11 | 9 | 2 | 9 | 0 |
| 1835 | 1 | 6 | 9 | 8 | 1 | 0 | 9 | 2 | 5 | 6 | 8 | 2 | 11 | 7 |
| 1836 | 3 | 10 | 0 | 2 | 0 | 4 | 8 | 7 | 6 | 4 | 3 | 10 | 4 | 4 |
| 1837 | 0 | 0 | 2 | 1 | 7 | 3 | 2 | 0 | 0 | 6 | 3 | 5 | 11 | 7 |
| 1838 | 7 | 1 | 10 | 10 | 5 | 7 | 9 | 4 | 0 | 9 | 1 | 7 | 4 | 4 |
| 1839 | 3 | 5 | 2 | 11 | 7 | 9 | 1 | 7 | 9 | 1 | 6 | 7 | 10 | 4 |
| 1840 | 7 | 10 | 1 | 11 | 9 | 4 | 3 | 8 | 9 | 4 | 11 | 9 | 1 | 8 |
| 1841 | 4 | 5 | 0 | 9 | 10 | 7 | 9 | 3 | 8 | 5 | 7 | 6 | 3 | 5 |
| 1842 | 0 | 10 | 9 | 3 | 0 | 0 | 1 | 1 | 11 | 7 | 8 | 8 | 7 | 1 |
| 1843 | 2 | 2 | 7 | 8 | 1 | 3 | 7 | 3 | 4 | 0 | 3 | 8 | 0 | 7 |
| 1844 | 4 | 4 | 0 | 0 | 0 | 5 | 4 | 8 | 0 | 11 | 7 | 4 | 9 | 11 |
| 1845 | 6 | 8 | 8 | 3 | 6 | 5 | 4 | 4 | 9 | 7 | 9 | 7 | 11 | 7 |
| 1846 | 5 | 7 | 1 | 10 | 0 | 6 | 3 | 3 | 6 | 11 | 8 | 11 | 11 | 0 |
| 1847 | 9 | 1 | 3 | 4 | 1 | 2 | 10 | 2 | 6 | 0 | 0 | 10 | 0 | 2 |
| 1848 | 4 | 11 | 0 | 10 | 4 | 11 | 7 | 7 | 5 | 7 | 1 | 10 | 7 | 0 |
| 1849 | 8 | 0 | 10 | 8 | 0 | 2 | 6 | 4 | 2 | 3 | 3 | 10 | 11 | 6 |
| 1850 | 2 | 11 | 11 | 9 | 10 | 7 | 10 | 8 | 2 | 3 | 10 | 7 | 10 | 1 |
| 1851 | 1 | 9 | 8 | 1 | 8 | 3 | 6 | 11 | 6 | 10 | 2 | 7 | 11 | 11 |
| 1852 | 5 | 4 | 0 | 2 | 11 | 5 | 2 | 4 | 11 | 3 | 4 | 9 | 7 | 0 |
| 1853 | 11 | 10 | 3 | 7 | 5 | 8 | 0 | 2 | 1 | 9 | 9 | 10 | 11 | 11 |
| 1854 | 10 | 3 | 8 | 10 | 8 | 11 | 5 | 0 | 7 | 2 | 10 | 3 | 11 | 8 |
| 1855 | 8 | 1 | 0 | 3 | 8 | 8 | 6 | 6 | 4 | 0 | 6 | 9 | 10 | 0 |
| 1856 | 5 | 7 | 3 | 6 | 9 | 1 | 0 | 3 | 9 | 2 | 11 | 8 | 3 | 3 |
| 1857 | 6 | 1 | 7 | 5 | 7 | 5 | 5 | 1 | 2 | 1 | 8 | 0 | 0 | 9 |
| 1858 | 7 | 8 | 6 | 8 | 2 | 9 | 8 | 2 | 10 | 9 | 8 | 4 | 1 | 11 |
| 1859 | 11 | 11 | 7 | 3 | 8 | 7 | 3 | 7 | 0 | 11 | 0 | 2 | 6 | 11 |
| 1860 | 1 | 9 | 11 | 4 | 8 | 4 | 4 | 3 | 2 | 2 | 7 | 2 | 10 | 9 |
| 1861 | 4 | 0 | 7 | 3 | 8 | 1 | 0 | 8 | 10 | 10 | 3 | 6 | 9 | 0 |
| 1862 | 2 | 0 | 1 | 3 | 5 | 4 | 5 | 0 | 8 | 2 | 5 | 0 | 10 | 11 |
| 1863 | 0 | 5 | 8 | 11 | 4 | 6 | 0 | 1 | 6 | 8 | 10 | 2 | 0 | 4 |
| 1864 | 10 | 2 | 11 | 10 | 3 | 7 | 2 | 2 | 11 | 10 | 9 | 6 | 7 | 7 |
| 1865 | 9 | 8 | 4 | 8 | 4 | 1 | 4 | 11 | 1 | 11 | 8 | 0 | 5 | 2 |
| 1866 | 9 | 11 | 9 | 2 | 3 | 10 | 9 | 11 | 11 | 5 | 0 | 7 | 0 | 1 |
| 1867 | 10 | 0 | 4 | 0 | 8 | 6 | 4 | 7 | 2 | 5 | 10 | 11 | 6 | 4 |
| 1868 | 5 | 11 | 2 | 5 | 1 | 5 | 1 | 1 | 7 | 8 | 7 | 7 | 6 | 6 |
| 1869 | 4 | 11 | 3 | 11 | 6 | 0 | 10 | 4 | 6 | 8 | 1 | 9 | 8 | 7 |
| 1870 | 3 | 1 | 10 | 10 | 2 | 1 | 1 | 8 | 4 | 4 | 5 | 6 | 2 | 1 |
| 1871 | 0 | 3 | 8 | 6 | 9 | 11 | 4 | 11 | 11 | 11 | 3 | 7 | 1 | 3 |
| 1872 | 6 | 2 | 3 | 10 | 11 | 4 | 4 | 1 | 7 | 9 | 2 | 11 | 5 | 9 |
| 1873 | 4 | 4 | 4 | 4 | 1 | 8 | 2 | 5 | 1 | 7 | 3 | 11 | 11 | 8 |
| 1874 | 6 | 5 | 10 | 6 | 1 | 3 | 4 | 4 | 8 | 9 | 4 | 5 | 0 | 6 |
| 1875 | 10 | 6 | 0 | 1 | 6 | 5 | 1 | 6 | 10 | 4 | 4 | 10 | 1 | 3 |
| 1876 | 8 | 2 | 9 | 10 | 5 | 1 | 10 | 10 | 5 | 10 | 8 | 3 | 1 | 1 |
| 1877 | 7 | 3 | 7 | 6 | 11 | 1 | 11 | 10 | 1 | 9 | 5 | 6 | 11 | 5 |
| 1878 | 7 | 2 | 10 | 4 | 3 | 2 | 7 | 1 | 8 | 4 | 9 | 0 | 6 | 2 |

Example #2 of a group-based CS hopping pattern

| m | $n_{cs}(n)$ | | | | | | | | | | | | | |
|---|---|---|---|---|---|---|---|---|---|---|---|---|---|---|
| 1879 | 4 | 9 | 5 | 9 | 0 | 0 | 9 | 8 | 3 | 1 | 9 | 5 | 7 | 0 |
| 1880 | 1 | 3 | 1 | 10 | 11 | 3 | 9 | 9 | 3 | 10 | 6 | 4 | 2 | 8 |
| 1881 | 5 | 9 | 0 | 9 | 11 | 0 | 0 | 9 | 10 | 0 | 8 | 8 | 6 | 4 |
| 1882 | 11 | 3 | 0 | 3 | 8 | 10 | 2 | 10 | 11 | 8 | 1 | 5 | 0 | 6 |
| 1883 | 1 | 11 | 2 | 0 | 5 | 4 | 7 | 10 | 10 | 4 | 11 | 10 | 2 | 6 |
| 1884 | 2 | 6 | 1 | 2 | 2 | 8 | 6 | 7 | 1 | 1 | 7 | 6 | 11 | 7 |
| 1885 | 9 | 0 | 3 | 8 | 10 | 10 | 1 | 0 | 4 | 5 | 1 | 2 | 10 | 2 |
| 1886 | 2 | 9 | 0 | 0 | 6 | 9 | 2 | 11 | 7 | 0 | 5 | 1 | 11 | 7 |
| 1887 | 5 | 8 | 0 | 5 | 7 | 11 | 6 | 8 | 4 | 10 | 0 | 6 | 11 | 3 |
| 1888 | 1 | 7 | 0 | 2 | 9 | 9 | 5 | 0 | 10 | 9 | 4 | 1 | 8 | 8 |
| 1889 | 7 | 8 | 6 | 6 | 4 | 3 | 7 | 6 | 8 | 3 | 11 | 3 | 11 | 9 |
| 1890 | 6 | 3 | 4 | 3 | 3 | 7 | 4 | 3 | 6 | 3 | 1 | 0 | 9 | 10 |
| 1891 | 7 | 7 | 7 | 1 | 8 | 3 | 5 | 9 | 11 | 6 | 8 | 9 | 6 | 3 |
| 1892 | 1 | 6 | 11 | 6 | 7 | 1 | 11 | 1 | 8 | 1 | 1 | 10 | 10 | 8 |
| 1893 | 8 | 1 | 9 | 1 | 2 | 0 | 6 | 5 | 10 | 10 | 11 | 6 | 6 | 8 |
| 1894 | 4 | 11 | 10 | 7 | 8 | 4 | 8 | 2 | 4 | 5 | 11 | 3 | 0 | 8 |
| 1895 | 0 | 10 | 4 | 11 | 9 | 3 | 10 | 0 | 4 | 9 | 1 | 7 | 9 | 6 |
| 1896 | 2 | 2 | 6 | 7 | 2 | 11 | 0 | 8 | 2 | 8 | 11 | 5 | 3 | 5 |
| 1897 | 7 | 5 | 2 | 7 | 3 | 2 | 10 | 3 | 7 | 11 | 3 | 10 | 1 | 11 |
| 1898 | 3 | 8 | 10 | 2 | 5 | 4 | 1 | 5 | 0 | 1 | 0 | 2 | 5 | 6 |
| 1899 | 9 | 5 | 5 | 6 | 11 | 8 | 0 | 11 | 10 | 4 | 1 | 0 | 8 | 5 |
| 1900 | 4 | 1 | 11 | 6 | 11 | 4 | 11 | 11 | 5 | 10 | 8 | 7 | 4 | 0 |
| 1901 | 0 | 5 | 7 | 7 | 0 | 11 | 5 | 0 | 3 | 10 | 4 | 10 | 7 | 9 |
| 1902 | 6 | 2 | 9 | 4 | 9 | 9 | 6 | 1 | 9 | 3 | 0 | 1 | 7 | 0 |
| 1903 | 7 | 8 | 3 | 9 | 1 | 0 | 9 | 11 | 9 | 7 | 10 | 9 | 4 | 9 |
| 1904 | 0 | 5 | 6 | 6 | 1 | 6 | 8 | 9 | 2 | 4 | 2 | 1 | 5 | 9 |
| 1905 | 9 | 6 | 5 | 1 | 8 | 9 | 2 | 2 | 5 | 9 | 7 | 8 | 2 | 9 |
| 1906 | 7 | 4 | 4 | 9 | 6 | 3 | 6 | 0 | 5 | 8 | 10 | 5 | 5 | 11 |
| 1907 | 10 | 9 | 5 | 2 | 11 | 6 | 8 | 0 | 3 | 6 | 8 | 3 | 2 | 6 |
| 1908 | 6 | 0 | 4 | 6 | 9 | 10 | 11 | 0 | 6 | 10 | 3 | 10 | 6 | 1 |
| 1909 | 5 | 0 | 11 | 8 | 7 | 8 | 9 | 2 | 3 | 8 | 6 | 5 | 9 | 9 |
| 1910 | 6 | 4 | 10 | 8 | 7 | 6 | 7 | 8 | 5 | 9 | 5 | 10 | 8 | 10 |
| 1911 | 11 | 3 | 8 | 5 | 2 | 5 | 5 | 6 | 10 | 6 | 2 | 8 | 10 | 4 |
| 1912 | 10 | 11 | 6 | 0 | 6 | 0 | 6 | 6 | 5 | 3 | 7 | 7 | 4 | 2 |
| 1913 | 8 | 2 | 2 | 11 | 10 | 4 | 8 | 0 | 8 | 1 | 3 | 6 | 1 | 2 |
| 1914 | 4 | 4 | 9 | 5 | 7 | 8 | 10 | 0 | 8 | 3 | 9 | 4 | 7 | 4 |
| 1915 | 4 | 4 | 5 | 8 | 5 | 9 | 5 | 10 | 3 | 0 | 10 | 3 | 10 | 7 |
| 1916 | 9 | 11 | 0 | 6 | 0 | 11 | 8 | 2 | 8 | 0 | 9 | 0 | 9 | 10 |
| 1917 | 2 | 9 | 9 | 6 | 5 | 2 | 9 | 8 | 4 | 8 | 2 | 1 | 8 | 11 |
| 1918 | 2 | 7 | 11 | 8 | 7 | 7 | 8 | 10 | 8 | 4 | 0 | 8 | 11 | 6 |
| 1919 | 0 | 11 | 7 | 8 | 5 | 11 | 11 | 8 | 6 | 2 | 6 | 5 | 0 | 0 |
| 1920 | 3 | 5 | 7 | 8 | 1 | 0 | 0 | 6 | 10 | 11 | 0 | 1 | 7 | 2 |
| 1921 | 10 | 7 | 7 | 7 | 11 | 2 | 10 | 4 | 0 | 4 | 10 | 9 | 10 | 9 |
| 1922 | 8 | 8 | 1 | 5 | 3 | 1 | 1 | 0 | 3 | 2 | 9 | 11 | 9 | 7 |
| 1923 | 2 | 8 | 3 | 11 | 8 | 6 | 2 | 1 | 10 | 10 | 9 | 8 | 3 | 5 |
| 1924 | 6 | 3 | 5 | 8 | 5 | 5 | 8 | 2 | 8 | 1 | 4 | 7 | 4 | 5 |
| 1925 | 9 | 0 | 0 | 5 | 2 | 3 | 9 | 1 | 6 | 2 | 4 | 3 | 6 | 3 |
| 1926 | 5 | 3 | 3 | 3 | 11 | 3 | 5 | 11 | 10 | 7 | 4 | 2 | 9 | 7 |
| 1927 | 4 | 7 | 8 | 5 | 6 | 8 | 8 | 11 | 11 | 7 | 2 | 6 | 0 | 2 |
| 1928 | 9 | 4 | 6 | 11 | 7 | 7 | 1 | 6 | 2 | 4 | 7 | 5 | 2 | 0 |
| 1929 | 11 | 6 | 7 | 9 | 7 | 8 | 3 | 8 | 6 | 5 | 2 | 8 | 11 | 2 |
| 1930 | 11 | 1 | 5 | 6 | 0 | 11 | 1 | 3 | 5 | 8 | 10 | 11 | 3 | 9 |
| 1931 | 5 | 8 | 5 | 4 | 4 | 5 | 5 | 5 | 11 | 11 | 3 | 2 | 6 | 5 |
| 1932 | 0 | 7 | 8 | 2 | 11 | 0 | 9 | 6 | 5 | 10 | 9 | 9 | 8 | 11 |
| 1933 | 3 | 10 | 9 | 9 | 4 | 8 | 11 | 5 | 4 | 8 | 3 | 0 | 3 | 3 |
| 1934 | 2 | 11 | 2 | 3 | 0 | 2 | 9 | 3 | 2 | 1 | 1 | 3 | 4 | 3 |
| 1935 | 1 | 7 | 4 | 8 | 3 | 11 | 8 | 9 | 10 | 11 | 11 | 2 | 10 | 0 |
| 1936 | 0 | 7 | 5 | 3 | 3 | 1 | 5 | 2 | 6 | 4 | 7 | 9 | 7 | 4 |
| 1937 | 8 | 0 | 10 | 0 | 9 | 7 | 3 | 6 | 7 | 1 | 6 | 2 | 7 | 9 |
| 1938 | 6 | 7 | 0 | 8 | 0 | 4 | 3 | 11 | 0 | 10 | 2 | 3 | 6 | 5 |
| 1939 | 0 | 8 | 6 | 5 | 9 | 2 | 2 | 8 | 1 | 3 | 2 | 4 | 10 | 6 |
| 1940 | 1 | 4 | 2 | 10 | 1 | 10 | 6 | 11 | 1 | 3 | 9 | 8 | 10 | 9 |
| 1941 | 3 | 10 | 7 | 0 | 7 | 7 | 10 | 3 | 1 | 1 | 0 | 5 | 3 | 10 |
| 1942 | 9 | 4 | 8 | 8 | 8 | 10 | 10 | 7 | 8 | 10 | 10 | 10 | 3 | 3 |
| 1943 | 11 | 9 | 11 | 11 | 10 | 9 | 8 | 5 | 0 | 0 | 4 | 0 | 6 | 5 |
| 1944 | 8 | 0 | 1 | 9 | 6 | 11 | 2 | 7 | 4 | 1 | 10 | 0 | 8 | 8 |
| 1945 | 3 | 7 | 1 | 11 | 2 | 11 | 3 | 6 | 11 | 8 | 3 | 3 | 7 | 11 |
| 1946 | 7 | 1 | 0 | 0 | 5 | 3 | 8 | 5 | 11 | 7 | 0 | 5 | 1 | 8 |
| 1947 | 9 | 9 | 9 | 5 | 4 | 4 | 7 | 3 | 9 | 7 | 8 | 5 | 4 | 4 |
| 1948 | 5 | 8 | 0 | 9 | 1 | 4 | 2 | 1 | 3 | 4 | 6 | 4 | 8 | 1 |
| 1949 | 7 | 3 | 5 | 1 | 6 | 6 | 4 | 2 | 7 | 2 | 9 | 4 | 10 | 6 |
| 1950 | 3 | 6 | 6 | 4 | 6 | 9 | 4 | 10 | 6 | 7 | 10 | 0 | 7 | 2 |
| 1951 | 9 | 10 | 2 | 5 | 5 | 1 | 5 | 11 | 10 | 0 | 3 | 1 | 1 | 9 |
| 1952 | 11 | 6 | 5 | 2 | 1 | 11 | 0 | 0 | 4 | 9 | 2 | 9 | 4 | 1 |
| 1953 | 9 | 4 | 3 | 5 | 10 | 0 | 4 | 2 | 11 | 1 | 6 | 5 | 8 | 3 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 1954 | 9 | 4 | 3 | 7 | 6 | 2 | 9 | 7 | 9 | 3 | 7 | 2 | 9 | 6 |
| 1955 | 7 | 11 | 8 | 2 | 10 | 3 | 2 | 7 | 7 | 4 | 5 | 9 | 2 | 9 |
| 1956 | 8 | 1 | 6 | 7 | 5 | 4 | 5 | 4 | 9 | 10 | 10 | 1 | 9 | 3 |
| 1957 | 3 | 2 | 5 | 5 | 3 | 3 | 2 | 5 | 9 | 3 | 8 | 9 | 8 | 1 |
| 1958 | 6 | 3 | 0 | 5 | 6 | 10 | 9 | 3 | 1 | 6 | 6 | 11 | 8 | 9 |
| 1959 | 9 | 9 | 6 | 10 | 7 | 6 | 3 | 5 | 8 | 0 | 0 | 7 | 8 | 9 |
| 1960 | 3 | 0 | 10 | 1 | 5 | 3 | 8 | 11 | 9 | 0 | 10 | 8 | 7 | 0 |
| 1961 | 4 | 6 | 2 | 3 | 9 | 6 | 6 | 10 | 11 | 2 | 8 | 1 | 3 | 9 |
| 1962 | 0 | 8 | 8 | 2 | 1 | 9 | 8 | 5 | 9 | 5 | 7 | 6 | 2 | 3 |
| 1963 | 2 | 1 | 9 | 11 | 3 | 9 | 5 | 9 | 9 | 6 | 1 | 10 | 5 | 1 |
| 1964 | 8 | 7 | 5 | 5 | 7 | 10 | 11 | 3 | 0 | 8 | 7 | 10 | 4 | 3 |
| 1965 | 4 | 1 | 5 | 0 | 1 | 6 | 1 | 7 | 1 | 10 | 4 | 9 | 10 | 3 |
| 1966 | 4 | 1 | 4 | 3 | 2 | 0 | 11 | 3 | 11 | 11 | 2 | 3 | 1 | 4 |
| 1967 | 8 | 1 | 1 | 7 | 10 | 8 | 11 | 8 | 8 | 6 | 5 | 8 | 8 | 4 |
| 1968 | 11 | 7 | 9 | 7 | 1 | 7 | 8 | 6 | 2 | 10 | 10 | 3 | 3 | 2 |
| 1969 | 11 | 5 | 9 | 7 | 6 | 1 | 7 | 0 | 6 | 1 | 11 | 8 | 0 | 6 |
| 1970 | 6 | 2 | 11 | 9 | 3 | 4 | 9 | 4 | 6 | 2 | 10 | 4 | 0 | 5 |
| 1971 | 9 | 5 | 4 | 0 | 9 | 0 | 7 | 2 | 3 | 7 | 2 | 9 | 9 | 8 |
| 1972 | 2 | 11 | 11 | 5 | 8 | 0 | 6 | 11 | 7 | 9 | 3 | 0 | 9 | 3 |
| 1973 | 11 | 8 | 8 | 9 | 9 | 1 | 9 | 9 | 4 | 8 | 5 | 4 | 1 | 0 |
| 1974 | 3 | 3 | 7 | 11 | 10 | 6 | 6 | 2 | 8 | 5 | 1 | 0 | 11 | 1 |
| 1975 | 10 | 10 | 0 | 11 | 1 | 8 | 9 | 9 | 6 | 7 | 8 | 1 | 3 | 0 |
| 1976 | 10 | 0 | 11 | 4 | 4 | 9 | 10 | 1 | 8 | 11 | 6 | 3 | 0 | 7 |
| 1977 | 11 | 9 | 2 | 10 | 11 | 8 | 10 | 4 | 4 | 5 | 5 | 5 | 9 | 3 |
| 1978 | 6 | 4 | 6 | 1 | 4 | 1 | 0 | 3 | 6 | 4 | 4 | 6 | 10 | 11 |
| 1979 | 8 | 2 | 9 | 0 | 6 | 5 | 5 | 3 | 10 | 2 | 1 | 0 | 3 | 6 |
| 1980 | 1 | 0 | 7 | 11 | 1 | 4 | 1 | 6 | 7 | 3 | 5 | 3 | 0 | 4 |
| 1981 | 3 | 6 | 5 | 8 | 11 | 2 | 4 | 3 | 5 | 2 | 4 | 3 | 0 | 4 |
| 1982 | 4 | 7 | 11 | 4 | 5 | 10 | 7 | 3 | 7 | 9 | 9 | 9 | 3 | 10 |
| 1983 | 5 | 1 | 4 | 5 | 5 | 10 | 7 | 1 | 8 | 3 | 6 | 1 | 4 | 8 |
| 1984 | 2 | 7 | 9 | 3 | 2 | 6 | 3 | 8 | 0 | 9 | 9 | 0 | 4 | 6 |
| 1985 | 2 | 5 | 4 | 5 | 10 | 3 | 5 | 8 | 1 | 4 | 1 | 6 | 6 | 4 |
| 1986 | 6 | 11 | 6 | 9 | 9 | 10 | 3 | 11 | 10 | 0 | 1 | 11 | 10 | 3 |
| 1987 | 2 | 11 | 6 | 10 | 10 | 5 | 11 | 2 | 1 | 7 | 0 | 1 | 1 | 2 |
| 1988 | 11 | 7 | 11 | 1 | 3 | 1 | 10 | 5 | 5 | 7 | 10 | 5 | 8 | 6 |
| 1989 | 1 | 2 | 4 | 2 | 9 | 8 | 0 | 4 | 11 | 7 | 6 | 2 | 6 | 4 |
| 1990 | 11 | 10 | 3 | 2 | 3 | 2 | 3 | 11 | 0 | 1 | 1 | 6 | 2 | 4 |
| 1991 | 0 | 0 | 9 | 9 | 4 | 10 | 0 | 4 | 7 | 3 | 11 | 11 | 9 | 8 |
| 1992 | 5 | 10 | 4 | 1 | 8 | 9 | 9 | 4 | 9 | 8 | 8 | 11 | 1 | 5 |
| 1993 | 8 | 3 | 9 | 6 | 1 | 1 | 3 | 4 | 11 | 6 | 7 | 1 | 4 | 10 |
| 1994 | 5 | 5 | 1 | 7 | 2 | 11 | 2 | 11 | 5 | 3 | 0 | 11 | 6 | 2 |
| 1995 | 11 | 7 | 2 | 0 | 11 | 7 | 2 | 11 | 8 | 8 | 11 | 11 | 7 | 5 |
| 1996 | 3 | 4 | 4 | 10 | 0 | 1 | 11 | 10 | 3 | 6 | 4 | 4 | 4 | 6 |
| 1997 | 5 | 6 | 8 | 2 | 4 | 2 | 1 | 8 | 8 | 0 | 1 | 5 | 7 | 3 |
| 1998 | 8 | 10 | 3 | 7 | 7 | 3 | 3 | 8 | 3 | 3 | 4 | 11 | 0 | 1 |
| 1999 | 7 | 1 | 9 | 8 | 2 | 10 | 11 | 1 | 1 | 7 | 9 | 2 | 9 | 3 |
| 2000 | 10 | 9 | 8 | 1 | 0 | 0 | 2 | 9 | 7 | 8 | 3 | 6 | 4 | 10 |
| 2001 | 10 | 10 | 4 | 4 | 1 | 7 | 6 | 10 | 8 | 1 | 2 | 10 | 4 | 9 |
| 2002 | 4 | 3 | 4 | 9 | 8 | 9 | 11 | 1 | 4 | 0 | 4 | 10 | 11 | 11 |
| 2003 | 6 | 0 | 1 | 2 | 2 | 9 | 9 | 5 | 4 | 3 | 1 | 9 | 0 | 9 |
| 2004 | 1 | 0 | 5 | 8 | 6 | 7 | 7 | 4 | 11 | 10 | 10 | 7 | 1 | 9 |
| 2005 | 1 | 2 | 6 | 11 | 0 | 2 | 0 | 7 | 0 | 2 | 8 | 0 | 0 | 7 |
| 2006 | 5 | 2 | 7 | 0 | 9 | 10 | 11 | 5 | 2 | 0 | 0 | 3 | 5 | 11 |
| 2007 | 11 | 11 | 6 | 4 | 5 | 3 | 11 | 0 | 10 | 11 | 7 | 6 | 8 | 9 |
| 2008 | 5 | 3 | 10 | 0 | 3 | 9 | 4 | 6 | 3 | 2 | 7 | 10 | 0 | 8 |
| 2009 | 1 | 11 | 11 | 6 | 4 | 11 | 9 | 4 | 4 | 11 | 0 | 5 | 3 | 4 |
| 2010 | 4 | 3 | 9 | 4 | 0 | 2 | 5 | 1 | 5 | 8 | 11 | 5 | 10 | 8 |
| 2011 | 1 | 5 | 8 | 5 | 5 | 0 | 4 | 4 | 2 | 0 | 8 | 9 | 4 | 0 |
| 2012 | 10 | 5 | 5 | 0 | 4 | 11 | 7 | 11 | 0 | 8 | 9 | 6 | 11 | 6 |
| 2013 | 7 | 7 | 5 | 7 | 4 | 1 | 2 | 8 | 3 | 8 | 6 | 8 | 5 | 10 |
| 2014 | 10 | 11 | 0 | 11 | 8 | 4 | 7 | 4 | 0 | 0 | 3 | 11 | 5 | 1 |
| 2015 | 1 | 11 | 8 | 4 | 2 | 7 | 8 | 11 | 10 | 8 | 4 | 0 | 5 | 1 |
| 2016 | 7 | 6 | 3 | 4 | 2 | 1 | 10 | 4 | 7 | 3 | 2 | 6 | 3 | 6 |
| 2017 | 7 | 8 | 5 | 5 | 7 | 2 | 3 | 7 | 11 | 9 | 1 | 3 | 8 | 7 |
| 2018 | 0 | 8 | 11 | 10 | 0 | 0 | 8 | 0 | 10 | 6 | 6 | 11 | 10 | 8 |
| 2019 | 9 | 8 | 4 | 1 | 2 | 4 | 7 | 6 | 2 | 1 | 5 | 11 | 3 | 10 |
| 2020 | 2 | 10 | 8 | 6 | 1 | 10 | 1 | 5 | 5 | 10 | 11 | 2 | 0 | 5 |
| 2021 | 8 | 10 | 11 | 5 | 8 | 5 | 9 | 6 | 11 | 11 | 10 | 7 | 5 | 10 |
| 2022 | 4 | 8 | 3 | 5 | 2 | 7 | 3 | 10 | 8 | 11 | 6 | 9 | 2 | 0 |
| 2023 | 11 | 9 | 10 | 10 | 5 | 4 | 0 | 6 | 7 | 7 | 11 | 4 | 6 | 1 |
| 2024 | 6 | 5 | 10 | 7 | 0 | 9 | 1 | 3 | 6 | 0 | 9 | 1 | 6 | 8 |
| 2025 | 11 | 0 | 8 | 2 | 10 | 1 | 6 | 11 | 5 | 6 | 3 | 3 | 4 | 8 |
| 2026 | 10 | 8 | 7 | 11 | 5 | 0 | 3 | 10 | 4 | 9 | 2 | 2 | 3 | 8 |
| 2027 | 6 | 1 | 3 | 9 | 11 | 10 | 8 | 9 | 1 | 8 | 10 | 3 | 11 | 7 |
| 2028 | 4 | 5 | 5 | 6 | 8 | 4 | 6 | 0 | 9 | 11 | 7 | 11 | 7 | 7 |

-continued

Example #2 of a group-based CS hopping pattern

| m | $n_{cs}(n)$ | | | | | | | | | | | | | |
|---|---|---|---|---|---|---|---|---|---|---|---|---|---|---|
| 2029 | 3 | 4 | 4 | 1 | 6 | 11 | 10 | 3 | 0 | 10 | 3 | 1 | 2 | 0 |
| 2030 | 8 | 9 | 9 | 0 | 10 | 7 | 1 | 9 | 3 | 11 | 2 | 10 | 11 | 3 |
| 2031 | 9 | 10 | 11 | 2 | 11 | 9 | 0 | 6 | 1 | 5 | 5 | 3 | 4 | 2 |
| 2032 | 3 | 1 | 1 | 9 | 9 | 5 | 10 | 4 | 2 | 0 | 6 | 6 | 8 | 5 |
| 2033 | 0 | 0 | 0 | 6 | 7 | 4 | 0 | 5 | 1 | 8 | 8 | 9 | 2 | 5 |
| 2034 | 5 | 0 | 10 | 7 | 7 | 9 | 3 | 10 | 2 | 6 | 11 | 6 | 8 | 11 |
| 2035 | 0 | 0 | 11 | 7 | 6 | 8 | 7 | 10 | 4 | 9 | 8 | 4 | 6 | 7 |
| 2036 | 5 | 11 | 3 | 1 | 0 | 2 | 10 | 10 | 11 | 6 | 3 | 8 | 9 | 8 |
| 2037 | 2 | 9 | 2 | 6 | 4 | 0 | 2 | 3 | 0 | 2 | 9 | 10 | 0 | 1 |
| 2038 | 2 | 9 | 3 | 11 | 4 | 5 | 4 | 10 | 3 | 3 | 0 | 0 | 8 | 4 |
| 2039 | 10 | 10 | 10 | 10 | 9 | 10 | 4 | 1 | 1 | 8 | 0 | 9 | 8 | 1 |
| 2040 | 0 | 6 | 7 | 5 | 6 | 3 | 6 | 9 | 1 | 10 | 11 | 3 | 3 | 5 |
| 2041 | 8 | 7 | 8 | 10 | 3 | 4 | 10 | 7 | 3 | 0 | 5 | 0 | 0 | 0 |
| 2042 | 4 | 4 | 0 | 3 | 9 | 7 | 1 | 4 | 4 | 6 | 11 | 10 | 4 | 1 |
| 2043 | 7 | 9 | 10 | 9 | 2 | 8 | 5 | 4 | 6 | 8 | 4 | 1 | 2 | 10 |
| 2044 | 8 | 7 | 3 | 7 | 8 | 10 | 2 | 2 | 2 | 1 | 3 | 1 | 6 | 0 |
| 2045 | 3 | 8 | 8 | 3 | 0 | 7 | 3 | 8 | 1 | 0 | 7 | 11 | 8 | 2 |
| 2046 | 10 | 4 | 1 | 4 | 11 | 9 | 7 | 10 | 7 | 6 | 0 | 7 | 6 | 1 |
| 2047 | 3 | 11 | 3 | 1 | 8 | 5 | 11 | 5 | 8 | 4 | 8 | 5 | 4 | 10 |

Example #3 of a Group-Based CS Hopping Pattern

Example # 3 of a group-based CS hopping pattern

| m | $n_{cs}(n)$ | | | | | | | | | | | | | |
|---|---|---|---|---|---|---|---|---|---|---|---|---|---|---|
| 0 | 2 | 11 | 2 | 3 | 8 | 1 | 11 | 10 | 1 | 11 | 10 | 6 | 5 | 9 |
| 1 | 8 | 6 | 0 | 5 | 0 | 7 | 3 | 9 | 4 | 6 | 4 | 2 | 0 | 10 |
| 2 | 9 | 9 | 3 | 4 | 11 | 2 | 10 | 8 | 2 | 9 | 6 | 11 | 11 | 6 |
| 3 | 0 | 0 | 8 | 7 | 9 | 5 | 6 | 3 | 8 | 4 | 7 | 0 | 10 | 2 |
| 4 | 7 | 3 | 9 | 8 | 3 | 10 | 8 | 4 | 3 | 10 | 0 | 1 | 3 | 1 |
| 5 | 6 | 1 | 11 | 8 | 0 | 0 | 2 | 0 | 6 | 8 | 6 | 3 | 4 | 5 |
| 6 | 10 | 7 | 2 | 11 | 11 | 9 | 7 | 5 | 9 | 10 | 11 | 9 | 4 | 8 |
| 7 | 11 | 5 | 4 | 1 | 2 | 1 | 2 | 11 | 10 | 7 | 2 | 7 | 2 | 11 |
| 8 | 3 | 6 | 5 | 6 | 3 | 9 | 10 | 6 | 7 | 4 | 1 | 6 | 2 | 3 |
| 9 | 8 | 11 | 3 | 0 | 5 | 3 | 4 | 4 | 0 | 2 | 8 | 0 | 7 | 8 |
| 10 | 1 | 7 | 0 | 6 | 4 | 0 | 1 | 8 | 2 | 11 | 8 | 7 | 6 | 2 |
| 11 | 7 | 3 | 11 | 0 | 6 | 8 | 0 | 1 | 6 | 7 | 10 | 10 | 0 | 9 |
| 12 | 11 | 6 | 6 | 1 | 3 | 0 | 3 | 10 | 5 | 5 | 5 | 8 | 1 | 9 |
| 13 | 0 | 8 | 2 | 9 | 2 | 4 | 6 | 0 | 2 | 2 | 10 | 5 | 2 | 1 |
| 14 | 3 | 11 | 1 | 6 | 1 | 5 | 5 | 7 | 3 | 5 | 7 | 8 | 4 | 11 |
| 15 | 8 | 9 | 0 | 11 | 1 | 11 | 5 | 5 | 10 | 2 | 0 | 10 | 1 | 4 |
| 16 | 11 | 10 | 9 | 5 | 4 | 2 | 9 | 1 | 0 | 1 | 9 | 0 | 0 | 11 |
| 17 | 2 | 4 | 1 | 2 | 0 | 4 | 10 | 4 | 10 | 4 | 10 | 1 | 4 | 10 |
| 18 | 1 | 5 | 3 | 9 | 7 | 6 | 6 | 11 | 9 | 10 | 4 | 1 | 10 | 4 |
| 19 | 11 | 9 | 4 | 6 | 5 | 0 | 7 | 5 | 8 | 8 | 10 | 2 | 0 | 0 |
| 20 | 4 | 8 | 2 | 2 | 6 | 2 | 8 | 3 | 5 | 3 | 2 | 6 | 10 | 7 |
| 21 | 4 | 2 | 11 | 11 | 2 | 3 | 6 | 5 | 6 | 3 | 9 | 11 | 8 | 3 |
| 22 | 10 | 11 | 5 | 10 | 10 | 6 | 8 | 1 | 10 | 10 | 1 | 11 | 11 | 0 |
| 23 | 3 | 4 | 8 | 5 | 9 | 0 | 7 | 1 | 1 | 9 | 11 | 11 | 3 | 5 |
| 24 | 10 | 3 | 8 | 9 | 5 | 11 | 1 | 7 | 11 | 2 | 3 | 6 | 11 | 2 |
| 25 | 9 | 3 | 5 | 2 | 10 | 4 | 9 | 11 | 8 | 1 | 2 | 4 | 9 | 1 |
| 26 | 9 | 10 | 10 | 3 | 8 | 10 | 4 | 8 | 3 | 7 | 11 | 0 | 9 | 4 |
| 27 | 8 | 10 | 6 | 1 | 5 | 5 | 11 | 5 | 7 | 11 | 2 | 3 | 10 | 6 |
| 28 | 0 | 6 | 7 | 0 | 1 | 1 | 0 | 2 | 9 | 8 | 4 | 9 | 7 | 11 |
| 29 | 4 | 1 | 5 | 7 | 11 | 4 | 11 | 8 | 9 | 8 | 7 | 10 | 1 | 9 |
| 30 | 0 | 10 | 6 | 4 | 4 | 8 | 6 | 9 | 3 | 0 | 0 | 7 | 4 | 9 |
| 31 | 4 | 1 | 1 | 2 | 2 | 9 | 1 | 6 | 4 | 9 | 4 | 9 | 5 | 0 |
| 32 | 5 | 7 | 9 | 1 | 3 | 7 | 4 | 3 | 1 | 6 | 7 | 10 | 5 | 7 |
| 33 | 9 | 0 | 8 | 10 | 4 | 3 | 5 | 11 | 5 | 11 | 6 | 2 | 3 | 0 |
| 34 | 5 | 10 | 4 | 6 | 0 | 6 | 3 | 2 | 0 | 0 | 3 | 10 | 7 | 5 |
| 35 | 1 | 9 | 7 | 7 | 10 | 9 | 8 | 10 | 11 | 7 | 8 | 3 | 1 | 11 |
| 36 | 6 | 6 | 4 | 4 | 9 | 0 | 6 | 10 | 11 | 7 | 3 | 7 | 5 | 3 |
| 37 | 1 | 0 | 0 | 8 | 6 | 1 | 3 | 10 | 1 | 0 | 7 | 8 | 8 | 6 |
| 38 | 2 | 9 | 11 | 10 | 3 | 11 | 11 | 6 | 2 | 3 | 0 | 2 | 10 | 6 |
| 39 | 7 | 7 | 7 | 0 | 2 | 5 | 6 | 10 | 0 | 4 | 6 | 9 | 2 | 9 |
| 40 | 4 | 8 | 7 | 9 | 0 | 1 | 5 | 8 | 10 | 7 | 4 | 3 | 6 | 7 |
| 41 | 4 | 9 | 10 | 1 | 6 | 6 | 0 | 4 | 6 | 0 | 3 | 6 | 11 | 4 |
| 42 | 8 | 2 | 0 | 3 | 9 | 7 | 8 | 1 | 6 | 4 | 3 | 8 | 2 | 7 |
| 43 | 3 | 2 | 7 | 1 | 3 | 11 | 5 | 9 | 2 | 4 | 6 | 11 | 6 | 11 |
| 44 | 4 | 7 | 4 | 11 | 11 | 1 | 8 | 6 | 1 | 8 | 1 | 1 | 7 | 1 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 45 | 6 | 6 | 3 | 7 | 4 | 8 | 8 | 0 | 1 | 10 | 11 | 10 | 3 | 8 |
| 46 | 11 | 8 | 2 | 3 | 0 | 6 | 9 | 2 | 9 | 9 | 9 | 6 | 1 | 4 |
| 47 | 7 | 6 | 7 | 11 | 5 | 0 | 10 | 7 | 0 | 0 | 5 | 11 | 6 | 2 |
| 48 | 7 | 5 | 1 | 7 | 0 | 6 | 11 | 3 | 11 | 10 | 0 | 0 | 6 | 8 |
| 49 | 4 | 3 | 3 | 3 | 8 | 11 | 7 | 7 | 0 | 8 | 6 | 1 | 3 | 4 |
| 50 | 0 | 4 | 0 | 8 | 7 | 10 | 9 | 2 | 10 | 1 | 2 | 6 | 2 | 10 |
| 51 | 2 | 1 | 11 | 10 | 8 | 6 | 6 | 7 | 3 | 11 | 6 | 9 | 0 | 1 |
| 52 | 7 | 2 | 4 | 3 | 6 | 8 | 3 | 2 | 11 | 11 | 1 | 5 | 9 | 0 |
| 53 | 3 | 11 | 8 | 8 | 3 | 3 | 1 | 9 | 6 | 5 | 1 | 2 | 8 | 4 |
| 54 | 3 | 9 | 8 | 0 | 8 | 8 | 10 | 10 | 6 | 1 | 5 | 7 | 9 | 6 |
| 55 | 8 | 2 | 10 | 2 | 3 | 7 | 3 | 6 | 9 | 7 | 8 | 6 | 11 | 2 |
| 56 | 2 | 0 | 5 | 2 | 10 | 10 | 11 | 8 | 7 | 11 | 6 | 8 | 11 | 2 |
| 57 | 1 | 6 | 0 | 0 | 2 | 7 | 7 | 11 | 11 | 2 | 5 | 5 | 11 | 6 |
| 58 | 7 | 6 | 8 | 3 | 9 | 11 | 0 | 4 | 7 | 1 | 1 | 3 | 0 | 2 |
| 59 | 9 | 7 | 7 | 6 | 8 | 11 | 5 | 1 | 9 | 6 | 3 | 8 | 8 | 9 |
| 60 | 3 | 1 | 1 | 11 | 10 | 2 | 4 | 8 | 4 | 2 | 3 | 11 | 2 | 10 |
| 61 | 0 | 6 | 0 | 10 | 11 | 6 | 1 | 10 | 6 | 9 | 0 | 1 | 11 | 8 |
| 62 | 2 | 3 | 1 | 6 | 2 | 9 | 5 | 5 | 1 | 2 | 2 | 3 | 3 | 3 |
| 63 | 6 | 0 | 9 | 0 | 9 | 7 | 1 | 2 | 8 | 5 | 3 | 1 | 1 | 6 |
| 64 | 6 | 3 | 1 | 10 | 5 | 5 | 0 | 3 | 10 | 5 | 0 | 7 | 11 | 9 |
| 65 | 2 | 10 | 1 | 0 | 1 | 4 | 1 | 11 | 3 | 10 | 0 | 6 | 10 | 3 |
| 66 | 9 | 11 | 9 | 7 | 8 | 1 | 10 | 2 | 8 | 3 | 4 | 8 | 4 | 8 |
| 67 | 4 | 10 | 6 | 3 | 6 | 1 | 7 | 11 | 11 | 0 | 8 | 0 | 0 | 1 |
| 68 | 9 | 8 | 2 | 4 | 3 | 3 | 6 | 2 | 3 | 11 | 7 | 3 | 10 | 10 |
| 69 | 10 | 11 | 4 | 3 | 0 | 7 | 5 | 11 | 4 | 3 | 7 | 5 | 10 | 7 |
| 70 | 4 | 8 | 0 | 6 | 1 | 0 | 9 | 3 | 7 | 4 | 4 | 8 | 1 | 5 |
| 71 | 11 | 7 | 4 | 9 | 8 | 2 | 2 | 0 | 7 | 3 | 7 | 9 | 4 | 6 |
| 72 | 1 | 2 | 3 | 2 | 1 | 0 | 2 | 6 | 7 | 5 | 10 | 3 | 3 | 4 |
| 73 | 7 | 9 | 6 | 6 | 11 | 5 | 9 | 7 | 5 | 2 | 8 | 2 | 5 | 2 |
| 74 | 4 | 6 | 11 | 6 | 10 | 10 | 5 | 0 | 1 | 0 | 5 | 2 | 10 | 0 |
| 75 | 4 | 0 | 7 | 10 | 3 | 9 | 9 | 1 | 4 | 1 | 3 | 7 | 3 | 4 |
| 76 | 9 | 1 | 8 | 11 | 5 | 4 | 9 | 0 | 2 | 9 | 11 | 8 | 5 | 11 |
| 77 | 8 | 3 | 7 | 8 | 8 | 10 | 0 | 8 | 6 | 5 | 5 | 8 | 7 | 5 |
| 78 | 1 | 11 | 2 | 9 | 0 | 0 | 8 | 10 | 6 | 6 | 0 | 2 | 6 | 3 |
| 79 | 6 | 2 | 11 | 7 | 7 | 3 | 1 | 10 | 2 | 9 | 1 | 8 | 0 | 6 |
| 80 | 4 | 6 | 2 | 3 | 1 | 9 | 4 | 0 | 0 | 3 | 10 | 11 | 0 | 11 |
| 81 | 10 | 5 | 4 | 0 | 11 | 0 | 5 | 8 | 9 | 11 | 5 | 1 | 5 | 11 |
| 82 | 1 | 11 | 6 | 8 | 9 | 5 | 10 | 11 | 10 | 7 | 11 | 8 | 1 | 10 |
| 83 | 7 | 10 | 4 | 6 | 4 | 9 | 11 | 11 | 6 | 4 | 7 | 9 | 9 | 11 |
| 84 | 6 | 5 | 7 | 7 | 8 | 11 | 6 | 9 | 4 | 7 | 2 | 2 | 4 | 6 |
| 85 | 0 | 11 | 5 | 5 | 7 | 2 | 3 | 6 | 5 | 5 | 8 | 9 | 4 | 8 |
| 86 | 5 | 8 | 10 | 1 | 8 | 3 | 7 | 10 | 5 | 6 | 10 | 1 | 6 | 6 |
| 87 | 11 | 0 | 6 | 10 | 0 | 1 | 2 | 2 | 7 | 6 | 5 | 11 | 10 | 8 |
| 88 | 8 | 4 | 7 | 1 | 11 | 3 | 11 | 3 | 8 | 2 | 3 | 5 | 6 | 10 |
| 89 | 5 | 0 | 8 | 4 | 7 | 11 | 3 | 6 | 4 | 1 | 0 | 8 | 11 | 3 |
| 90 | 3 | 9 | 9 | 4 | 7 | 3 | 3 | 1 | 1 | 8 | 9 | 1 | 5 | 8 |
| 91 | 3 | 10 | 3 | 8 | 11 | 4 | 4 | 3 | 6 | 7 | 4 | 8 | 10 | 6 |
| 92 | 9 | 0 | 0 | 6 | 4 | 10 | 6 | 10 | 9 | 4 | 5 | 6 | 11 | 4 |
| 93 | 9 | 8 | 6 | 11 | 10 | 8 | 1 | 9 | 9 | 10 | 6 | 5 | 1 | 1 |
| 94 | 5 | 3 | 2 | 11 | 10 | 9 | 5 | 6 | 10 | 7 | 6 | 7 | 0 | 5 |
| 95 | 5 | 2 | 5 | 0 | 10 | 8 | 7 | 5 | 0 | 6 | 9 | 2 | 9 | 5 |
| 96 | 9 | 9 | 11 | 3 | 2 | 6 | 1 | 7 | 1 | 1 | 9 | 3 | 9 | 11 |
| 97 | 8 | 4 | 2 | 9 | 3 | 9 | 2 | 10 | 7 | 10 | 10 | 10 | 7 | 10 |
| 98 | 11 | 1 | 10 | 9 | 9 | 0 | 7 | 4 | 4 | 10 | 9 | 9 | 8 | 3 |
| 99 | 10 | 0 | 7 | 6 | 10 | 1 | 4 | 3 | 5 | 2 | 11 | 6 | 4 | 9 |
| 100 | 11 | 6 | 8 | 4 | 6 | 8 | 5 | 10 | 9 | 8 | 2 | 0 | 2 | 8 |
| 101 | 11 | 3 | 9 | 5 | 3 | 1 | 7 | 9 | 6 | 11 | 4 | 4 | 1 | 6 |
| 102 | 7 | 5 | 11 | 5 | 6 | 6 | 5 | 5 | 8 | 4 | 8 | 8 | 2 | 0 |
| 103 | 3 | 3 | 4 | 3 | 0 | 2 | 0 | 6 | 11 | 10 | 2 | 4 | 1 | 2 |
| 104 | 5 | 5 | 9 | 3 | 0 | 11 | 2 | 10 | 8 | 8 | 1 | 9 | 1 | 9 |
| 105 | 3 | 7 | 10 | 5 | 1 | 4 | 1 | 0 | 1 | 5 | 4 | 7 | 5 | 10 |
| 106 | 7 | 5 | 5 | 4 | 4 | 5 | 5 | 4 | 9 | 3 | 9 | 6 | 4 | 3 |
| 107 | 8 | 10 | 0 | 7 | 6 | 8 | 4 | 2 | 8 | 4 | 2 | 4 | 11 | 3 |
| 108 | 5 | 3 | 5 | 4 | 6 | 7 | 0 | 8 | 3 | 10 | 3 | 3 | 9 | 6 |
| 109 | 2 | 3 | 6 | 5 | 4 | 5 | 10 | 2 | 6 | 10 | 5 | 1 | 6 | 0 |
| 110 | 11 | 10 | 10 | 7 | 6 | 11 | 7 | 1 | 5 | 2 | 7 | 10 | 10 | 8 |
| 111 | 10 | 7 | 5 | 1 | 11 | 1 | 1 | 2 | 5 | 7 | 9 | 8 | 3 | 5 |
| 112 | 1 | 0 | 11 | 9 | 1 | 3 | 11 | 11 | 4 | 1 | 10 | 9 | 2 | 9 |
| 113 | 5 | 4 | 9 | 1 | 9 | 10 | 6 | 11 | 6 | 10 | 5 | 0 | 0 | 3 |
| 114 | 0 | 8 | 4 | 5 | 6 | 8 | 11 | 4 | 1 | 8 | 0 | 3 | 10 | 11 |
| 115 | 3 | 8 | 2 | 0 | 10 | 10 | 0 | 11 | 3 | 9 | 4 | 5 | 3 | 7 |
| 116 | 0 | 10 | 10 | 0 | 10 | 11 | 3 | 4 | 4 | 3 | 6 | 3 | 2 | 1 |
| 117 | 5 | 5 | 7 | 8 | 6 | 3 | 4 | 5 | 10 | 3 | 4 | 7 | 9 | 8 |
| 118 | 4 | 11 | 9 | 0 | 10 | 4 | 1 | 4 | 11 | 1 | 4 | 11 | 0 | 9 |
| 119 | 6 | 10 | 5 | 9 | 8 | 9 | 4 | 9 | 10 | 5 | 9 | 5 | 1 | 5 |
| 120 | 1 | 1 | 4 | 5 | 11 | 9 | 2 | 1 | 8 | 4 | 5 | 2 | 4 | 10 |
| 121 | 0 | 11 | 11 | 10 | 0 | 10 | 2 | 7 | 11 | 4 | 11 | 5 | 9 | 9 |
| 122 | 0 | 3 | 1 | 9 | 8 | 3 | 3 | 2 | 7 | 9 | 1 | 0 | 2 | 5 |
| 123 | 1 | 10 | 9 | 2 | 6 | 7 | 11 | 7 | 2 | 5 | 4 | 8 | 6 | 3 |
| 124 | 10 | 3 | 7 | 3 | 4 | 7 | 0 | 7 | 8 | 6 | 11 | 0 | 0 | 8 |
| 125 | 6 | 3 | 0 | 3 | 3 | 2 | 10 | 8 | 0 | 2 | 10 | 3 | 6 | 9 |
| 126 | 11 | 2 | 11 | 10 | 1 | 5 | 1 | 9 | 3 | 2 | 5 | 0 | 2 | 4 |
| 127 | 2 | 11 | 5 | 7 | 11 | 2 | 1 | 7 | 1 | 4 | 0 | 4 | 7 | 10 |
| 128 | 5 | 0 | 1 | 1 | 9 | 8 | 1 | 4 | 10 | 11 | 4 | 10 | 3 | 2 |
| 129 | 6 | 11 | 2 | 1 | 8 | 10 | 3 | 6 | 11 | 8 | 0 | 10 | 3 | 0 |
| 130 | 8 | 7 | 11 | 2 | 10 | 2 | 10 | 10 | 7 | 6 | 8 | 1 | 10 | 9 |
| 131 | 9 | 4 | 9 | 11 | 2 | 10 | 7 | 9 | 3 | 6 | 2 | 10 | 4 | 2 |
| 132 | 2 | 9 | 6 | 3 | 3 | 10 | 6 | 4 | 10 | 5 | 2 | 4 | 9 | 7 |
| 133 | 10 | 8 | 4 | 4 | 7 | 10 | 4 | 5 | 0 | 10 | 2 | 5 | 0 | 4 |
| 134 | 2 | 0 | 7 | 9 | 11 | 7 | 7 | 4 | 9 | 6 | 1 | 2 | 7 | 4 |
| 135 | 4 | 5 | 7 | 11 | 9 | 9 | 2 | 7 | 6 | 5 | 7 | 6 | 5 | 9 |
| 136 | 10 | 1 | 3 | 1 | 1 | 4 | 6 | 6 | 4 | 3 | 3 | 0 | 1 | 11 |
| 137 | 1 | 4 | 7 | 4 | 2 | 2 | 4 | 9 | 8 | 8 | 5 | 1 | 0 | 1 |
| 138 | 7 | 9 | 4 | 11 | 0 | 1 | 6 | 0 | 7 | 11 | 11 | 4 | 2 | 3 |
| 139 | 10 | 11 | 2 | 4 | 2 | 4 | 1 | 8 | 0 | 0 | 11 | 3 | 5 | 3 |
| 140 | 11 | 5 | 10 | 8 | 11 | 8 | 11 | 5 | 6 | 5 | 9 | 3 | 3 | 2 |
| 141 | 6 | 9 | 5 | 11 | 8 | 8 | 8 | 4 | 2 | 2 | 6 | 6 | 2 | 0 |
| 142 | 5 | 1 | 11 | 0 | 7 | 10 | 9 | 11 | 11 | 3 | 8 | 3 | 5 | 0 |
| 143 | 6 | 0 | 4 | 4 | 10 | 4 | 5 | 9 | 2 | 1 | 8 | 1 | 4 | 2 |
| 144 | 2 | 7 | 10 | 8 | 0 | 9 | 2 | 7 | 0 | 11 | 4 | 0 | 3 | 11 |
| 145 | 4 | 9 | 1 | 1 | 11 | 2 | 8 | 1 | 7 | 11 | 5 | 5 | 0 | 0 |
| 146 | 4 | 7 | 6 | 8 | 8 | 0 | 9 | 2 | 4 | 2 | 0 | 3 | 0 | 3 |
| 147 | 5 | 8 | 5 | 10 | 4 | 1 | 9 | 0 | 6 | 11 | 5 | 7 | 11 | 11 |
| 148 | 8 | 1 | 4 | 2 | 4 | 3 | 4 | 0 | 11 | 5 | 3 | 9 | 11 | 9 |
| 149 | 1 | 11 | 1 | 5 | 1 | 0 | 4 | 8 | 1 | 3 | 2 | 10 | 11 | 6 |
| 150 | 11 | 8 | 5 | 5 | 3 | 5 | 11 | 6 | 4 | 7 | 3 | 11 | 8 | 1 |
| 151 | 6 | 6 | 4 | 11 | 1 | 5 | 2 | 9 | 8 | 8 | 9 | 10 | 10 | 7 |
| 152 | 2 | 6 | 9 | 9 | 6 | 11 | 5 | 11 | 3 | 3 | 1 | 1 | 8 | 10 |
| 153 | 3 | 9 | 11 | 5 | 9 | 10 | 2 | 9 | 0 | 11 | 8 | 9 | 6 | 7 |
| 154 | 0 | 5 | 4 | 4 | 6 | 0 | 10 | 1 | 6 | 0 | 7 | 4 | 2 | 10 |
| 155 | 9 | 4 | 9 | 9 | 4 | 9 | 3 | 0 | 8 | 2 | 7 | 11 | 11 | 7 |
| 156 | 2 | 10 | 0 | 8 | 0 | 7 | 10 | 1 | 5 | 0 | 1 | 11 | 9 | 3 |
| 157 | 9 | 11 | 11 | 6 | 7 | 9 | 0 | 4 | 0 | 6 | 4 | 4 | 11 | 6 |
| 158 | 2 | 2 | 6 | 1 | 7 | 6 | 1 | 6 | 4 | 8 | 11 | 11 | 2 | 8 |
| 159 | 8 | 10 | 11 | 5 | 2 | 9 | 1 | 11 | 9 | 5 | 10 | 4 | 0 | 2 |
| 160 | 7 | 2 | 5 | 11 | 7 | 11 | 5 | 7 | 11 | 9 | 4 | 2 | 2 | 10 |
| 161 | 1 | 4 | 3 | 0 | 9 | 0 | 11 | 7 | 5 | 1 | 6 | 4 | 5 | 1 |
| 162 | 5 | 7 | 10 | 11 | 1 | 9 | 10 | 8 | 4 | 3 | 0 | 5 | 9 | 0 |
| 163 | 4 | 11 | 3 | 2 | 4 | 6 | 3 | 9 | 6 | 11 | 8 | 3 | 2 | 5 |
| 164 | 11 | 5 | 5 | 11 | 5 | 10 | 3 | 10 | 7 | 10 | 4 | 9 | 0 | 5 |
| 165 | 10 | 10 | 1 | 2 | 6 | 8 | 5 | 1 | 1 | 10 | 6 | 2 | 5 | 7 |
| 166 | 6 | 1 | 10 | 4 | 5 | 10 | 8 | 7 | 9 | 11 | 10 | 2 | 1 | 6 |
| 167 | 7 | 9 | 0 | 7 | 7 | 5 | 8 | 5 | 7 | 8 | 3 | 7 | 6 | 5 |
| 168 | 7 | 0 | 0 | 10 | 10 | 11 | 6 | 11 | 10 | 0 | 8 | 3 | 6 | 10 |
| 169 | 5 | 0 | 6 | 1 | 8 | 4 | 3 | 7 | 3 | 10 | 2 | 5 | 2 | 7 |
| 170 | 6 | 10 | 3 | 11 | 9 | 3 | 9 | 6 | 7 | 2 | 7 | 2 | 11 | 11 |
| 171 | 0 | 2 | 5 | 1 | 4 | 2 | 2 | 9 | 4 | 9 | 1 | 5 | 3 | 2 |
| 172 | 5 | 8 | 0 | 6 | 6 | 11 | 2 | 5 | 5 | 1 | 3 | 0 | 4 | 10 |
| 173 | 11 | 4 | 4 | 0 | 10 | 6 | 3 | 6 | 1 | 7 | 5 | 9 | 3 | 10 |
| 174 | 1 | 3 | 11 | 0 | 3 | 2 | 6 | 7 | 9 | 8 | 7 | 11 | 9 | 2 |
| 175 | 8 | 6 | 1 | 1 | 3 | 4 | 6 | 2 | 6 | 1 | 9 | 7 | 2 | 0 |
| 176 | 6 | 4 | 9 | 7 | 0 | 0 | 4 | 1 | 9 | 4 | 4 | 2 | 7 | 9 |
| 177 | 0 | 11 | 7 | 0 | 8 | 2 | 2 | 5 | 6 | 6 | 10 | 0 | 1 | 0 |
| 178 | 0 | 6 | 3 | 2 | 4 | 3 | 6 | 7 | 2 | 7 | 1 | 4 | 1 | 0 |
| 179 | 2 | 10 | 8 | 10 | 5 | 7 | 3 | 8 | 7 | 3 | 7 | 10 | 6 | 10 |
| 180 | 11 | 10 | 6 | 0 | 0 | 3 | 11 | 9 | 9 | 2 | 1 | 1 | 0 | 7 |
| 181 | 9 | 8 | 3 | 1 | 7 | 7 | 0 | 7 | 10 | 8 | 10 | 2 | 4 | 1 |
| 182 | 5 | 6 | 11 | 9 | 0 | 3 | 6 | 6 | 10 | 0 | 2 | 6 | 5 | 4 |
| 183 | 8 | 11 | 6 | 4 | 11 | 9 | 9 | 0 | 7 | 7 | 6 | 4 | 9 | 9 |
| 184 | 9 | 10 | 1 | 9 | 5 | 4 | 2 | 6 | 10 | 8 | 5 | 11 | 9 | 6 |
| 185 | 6 | 5 | 8 | 9 | 1 | 2 | 1 | 6 | 6 | 6 | 4 | 5 | 3 | 1 |
| 186 | 3 | 5 | 3 | 6 | 3 | 2 | 0 | 1 | 10 | 2 | 9 | 9 | 7 | 5 |
| 187 | 8 | 8 | 6 | 7 | 2 | 3 | 11 | 11 | 0 | 0 | 7 | 7 | 3 | 5 |
| 188 | 8 | 1 | 10 | 10 | 6 | 0 | 4 | 10 | 1 | 1 | 4 | 5 | 10 | 0 |
| 189 | 10 | 2 | 5 | 8 | 9 | 9 | 9 | 11 | 2 | 4 | 8 | 10 | 11 | 8 |
| 190 | 9 | 7 | 8 | 0 | 3 | 1 | 3 | 1 | 2 | 3 | 2 | 5 | 0 | 5 |
| 191 | 8 | 1 | 9 | 4 | 0 | 2 | 10 | 2 | 5 | 8 | 11 | 7 | 3 | 4 |
| 192 | 4 | 2 | 0 | 7 | 5 | 11 | 5 | 4 | 3 | 7 | 11 | 5 | 3 | 9 |
| 193 | 9 | 3 | 9 | 0 | 7 | 0 | 11 | 5 | 4 | 9 | 0 | 6 | 9 | 8 |
| 194 | 11 | 2 | 0 | 8 | 8 | 4 | 8 | 11 | 10 | 3 | 5 | 2 | 0 | 1 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 195 | 11 | 6 | 1 | 11 | 2 | 7 | 0 | 1 | 8 | 10 | 8 | 7 | 8 | 10 |
| 196 | 3 | 3 | 1 | 7 | 8 | 4 | 11 | 6 | 3 | 0 | 4 | 3 | 11 | 1 |
| 197 | 5 | 9 | 11 | 2 | 5 | 10 | 4 | 3 | 3 | 9 | 6 | 6 | 8 | 11 |
| 198 | 5 | 2 | 7 | 5 | 2 | 10 | 8 | 6 | 8 | 2 | 1 | 7 | 10 | 7 |
| 199 | 10 | 1 | 0 | 6 | 9 | 8 | 5 | 10 | 8 | 7 | 0 | 3 | 8 | 1 |
| 200 | 4 | 3 | 7 | 2 | 2 | 7 | 10 | 5 | 5 | 10 | 7 | 10 | 11 | 5 |
| 201 | 10 | 4 | 8 | 4 | 9 | 5 | 2 | 6 | 9 | 0 | 3 | 4 | 7 | 4 |
| 202 | 10 | 1 | 0 | 7 | 5 | 0 | 0 | 7 | 2 | 5 | 1 | 9 | 2 | 10 |
| 203 | 10 | 10 | 5 | 7 | 1 | 2 | 8 | 0 | 0 | 9 | 5 | 1 | 2 | 9 |
| 204 | 8 | 3 | 6 | 3 | 10 | 9 | 2 | 3 | 1 | 0 | 3 | 1 | 8 | 2 |
| 205 | 4 | 11 | 1 | 4 | 11 | 3 | 4 | 3 | 11 | 6 | 11 | 1 | 1 | 11 |
| 206 | 2 | 5 | 7 | 0 | 6 | 5 | 1 | 3 | 2 | 8 | 8 | 3 | 0 | 4 |
| 207 | 7 | 11 | 10 | 10 | 5 | 7 | 10 | 0 | 9 | 1 | 2 | 8 | 9 | 5 |
| 208 | 1 | 4 | 4 | 5 | 1 | 10 | 9 | 3 | 11 | 5 | 6 | 11 | 0 | 7 |
| 209 | 0 | 1 | 3 | 7 | 10 | 4 | 5 | 2 | 0 | 4 | 11 | 9 | 0 | 0 |
| 210 | 6 | 9 | 10 | 5 | 4 | 3 | 11 | 8 | 10 | 4 | 11 | 6 | 7 | 5 |
| 211 | 0 | 2 | 3 | 5 | 0 | 11 | 7 | 8 | 3 | 6 | 3 | 9 | 11 | 7 |
| 212 | 7 | 4 | 3 | 2 | 8 | 1 | 2 | 0 | 10 | 9 | 3 | 2 | 9 | 2 |
| 213 | 9 | 4 | 7 | 10 | 2 | 6 | 2 | 2 | 11 | 10 | 8 | 4 | 5 | 7 |
| 214 | 8 | 0 | 1 | 8 | 9 | 11 | 2 | 0 | 0 | 10 | 3 | 6 | 0 | 1 |
| 215 | 6 | 4 | 5 | 5 | 10 | 4 | 0 | 7 | 7 | 0 | 0 | 10 | 5 | 4 |
| 216 | 3 | 5 | 8 | 4 | 0 | 7 | 8 | 5 | 3 | 7 | 10 | 5 | 11 | 11 |
| 217 | 9 | 3 | 3 | 3 | 1 | 5 | 3 | 11 | 4 | 0 | 11 | 7 | 4 | 3 |
| 218 | 0 | 9 | 2 | 1 | 5 | 9 | 7 | 8 | 6 | 4 | 6 | 1 | 5 | 10 |
| 219 | 4 | 4 | 4 | 10 | 2 | 9 | 4 | 5 | 3 | 0 | 1 | 0 | 6 | 6 |
| 220 | 1 | 1 | 6 | 6 | 1 | 2 | 0 | 0 | 6 | 1 | 1 | 4 | 10 | 3 |
| 221 | 2 | 9 | 10 | 10 | 7 | 4 | 0 | 10 | 8 | 6 | 7 | 9 | 5 | 11 |
| 222 | 0 | 0 | 10 | 5 | 10 | 2 | 2 | 0 | 2 | 8 | 5 | 8 | 8 | 7 |
| 223 | 3 | 0 | 9 | 2 | 8 | 6 | 5 | 1 | 4 | 4 | 11 | 5 | 11 | 6 |
| 224 | 3 | 2 | 2 | 11 | 4 | 6 | 4 | 11 | 7 | 0 | 6 | 0 | 8 | 4 |
| 225 | 5 | 11 | 8 | 9 | 10 | 2 | 10 | 2 | 2 | 10 | 9 | 3 | 2 | 2 |
| 226 | 0 | 1 | 7 | 4 | 3 | 5 | 2 | 8 | 5 | 1 | 1 | 9 | 6 | 1 |
| 227 | 5 | 6 | 11 | 7 | 10 | 7 | 3 | 11 | 8 | 9 | 9 | 9 | 6 | 8 |
| 228 | 0 | 5 | 6 | 10 | 3 | 5 | 9 | 4 | 8 | 9 | 11 | 10 | 0 | 5 |
| 229 | 5 | 8 | 7 | 0 | 3 | 9 | 8 | 9 | 9 | 9 | 0 | 8 | 4 | 5 |
| 230 | 9 | 10 | 11 | 1 | 9 | 1 | 0 | 1 | 9 | 9 | 7 | 0 | 5 | 0 |
| 231 | 10 | 9 | 10 | 5 | 8 | 11 | 8 | 3 | 8 | 10 | 9 | 3 | 0 | 6 |
| 232 | 0 | 4 | 10 | 9 | 11 | 9 | 0 | 6 | 2 | 6 | 3 | 3 | 10 | 9 |
| 233 | 5 | 3 | 0 | 7 | 1 | 1 | 1 | 9 | 7 | 3 | 2 | 3 | 7 | 2 |
| 234 | 1 | 4 | 2 | 5 | 0 | 8 | 1 | 6 | 2 | 1 | 9 | 5 | 8 | 5 |
| 235 | 6 | 6 | 0 | 0 | 5 | 5 | 9 | 2 | 3 | 6 | 10 | 4 | 4 | 1 |
| 236 | 6 | 0 | 2 | 5 | 4 | 6 | 7 | 5 | 0 | 7 | 2 | 7 | 6 | 10 |
| 237 | 3 | 7 | 0 | 9 | 0 | 11 | 7 | 0 | 9 | 8 | 5 | 10 | 2 | 2 |
| 238 | 4 | 5 | 0 | 9 | 9 | 10 | 0 | 3 | 9 | 11 | 9 | 4 | 9 | 10 |
| 239 | 9 | 2 | 2 | 9 | 7 | 8 | 0 | 3 | 7 | 7 | 8 | 11 | 10 | 3 |
| 240 | 5 | 3 | 8 | 11 | 0 | 5 | 9 | 1 | 1 | 3 | 10 | 2 | 10 | 3 |
| 241 | 2 | 0 | 10 | 3 | 9 | 11 | 3 | 5 | 9 | 2 | 5 | 7 | 5 | 6 |
| 242 | 3 | 3 | 6 | 2 | 5 | 6 | 11 | 10 | 2 | 6 | 0 | 9 | 3 | 0 |
| 243 | 8 | 8 | 8 | 2 | 5 | 8 | 0 | 8 | 11 | 8 | 4 | 1 | 1 | 4 |
| 244 | 8 | 5 | 8 | 6 | 3 | 0 | 2 | 0 | 8 | 11 | 7 | 5 | 9 | 3 |
| 245 | 6 | 8 | 1 | 4 | 11 | 8 | 1 | 7 | 8 | 0 | 8 | 9 | 9 | 8 |
| 246 | 2 | 2 | 3 | 4 | 2 | 10 | 9 | 0 | 5 | 9 | 2 | 0 | 7 | 0 |
| 247 | 7 | 8 | 8 | 10 | 10 | 6 | 3 | 10 | 8 | 2 | 3 | 2 | 8 | 3 |
| 248 | 7 | 1 | 10 | 5 | 2 | 0 | 0 | 3 | 3 | 2 | 6 | 0 | 11 | 2 |
| 249 | 3 | 4 | 1 | 1 | 10 | 5 | 10 | 3 | 0 | 3 | 1 | 9 | 9 | 2 |
| 250 | 3 | 8 | 10 | 10 | 2 | 11 | 0 | 9 | 5 | 3 | 11 | 7 | 7 | 3 |
| 251 | 7 | 7 | 2 | 7 | 7 | 0 | 2 | 8 | 1 | 0 | 7 | 6 | 10 | 4 |
| 252 | 5 | 2 | 8 | 7 | 6 | 1 | 3 | 8 | 10 | 2 | 6 | 11 | 4 | 4 |
| 253 | 6 | 4 | 8 | 1 | 6 | 1 | 9 | 9 | 3 | 4 | 11 | 9 | 8 | 3 |
| 254 | 7 | 8 | 10 | 8 | 2 | 4 | 1 | 1 | 8 | 11 | 0 | 8 | 6 | 9 |
| 255 | 5 | 7 | 8 | 3 | 11 | 4 | 5 | 4 | 6 | 10 | 7 | 11 | 6 | 1 |
| 256 | 3 | 11 | 5 | 6 | 5 | 8 | 2 | 8 | 6 | 1 | 3 | 5 | 3 | 5 |
| 257 | 6 | 7 | 2 | 1 | 1 | 1 | 9 | 7 | 8 | 8 | 5 | 4 | 0 | 11 |
| 258 | 7 | 2 | 6 | 5 | 3 | 0 | 10 | 5 | 5 | 9 | 2 | 9 | 2 | 8 |
| 259 | 1 | 6 | 0 | 0 | 11 | 3 | 11 | 1 | 2 | 10 | 7 | 1 | 1 | 2 |
| 260 | 1 | 1 | 7 | 11 | 2 | 5 | 8 | 11 | 9 | 8 | 3 | 11 | 10 | 0 |
| 261 | 5 | 5 | 1 | 2 | 11 | 2 | 3 | 3 | 10 | 9 | 3 | 3 | 0 | 6 |
| 262 | 1 | 10 | 3 | 3 | 8 | 4 | 7 | 10 | 4 | 5 | 8 | 6 | 6 | 5 |
| 263 | 10 | 1 | 0 | 7 | 6 | 6 | 6 | 4 | 11 | 9 | 8 | 5 | 9 | 7 |
| 264 | 11 | 3 | 4 | 2 | 10 | 7 | 5 | 7 | 11 | 2 | 11 | 10 | 5 | 9 |
| 265 | 2 | 10 | 9 | 1 | 10 | 8 | 0 | 1 | 3 | 0 | 9 | 3 | 8 | 1 |
| 266 | 8 | 4 | 1 | 11 | 3 | 10 | 7 | 7 | 1 | 11 | 1 | 8 | 11 | 7 |
| 267 | 10 | 4 | 11 | 3 | 11 | 10 | 10 | 2 | 4 | 1 | 5 | 10 | 8 | 11 |
| 268 | 6 | 4 | 6 | 6 | 8 | 6 | 5 | 11 | 2 | 10 | 3 | 6 | 4 | 4 |
| 269 | 10 | 8 | 0 | 5 | 9 | 5 | 0 | 3 | 3 | 1 | 0 | 9 | 7 | 5 |
| 270 | 1 | 0 | 3 | 10 | 3 | 1 | 4 | 8 | 11 | 7 | 11 | 2 | 3 | 8 |
| 271 | 3 | 6 | 7 | 2 | 1 | 5 | 4 | 8 | 7 | 4 | 0 | 0 | 1 | 6 |
| 272 | 2 | 8 | 2 | 10 | 8 | 10 | 3 | 4 | 8 | 6 | 1 | 0 | 4 | 1 |
| 273 | 0 | 8 | 3 | 4 | 2 | 0 | 5 | 5 | 8 | 1 | 6 | 2 | 8 | 9 |
| 274 | 8 | 0 | 0 | 5 | 5 | 4 | 1 | 9 | 0 | 2 | 1 | 11 | 2 | 2 |
| 275 | 9 | 4 | 2 | 10 | 9 | 2 | 10 | 0 | 3 | 5 | 2 | 1 | 1 | 9 |
| 276 | 4 | 5 | 10 | 2 | 6 | 9 | 7 | 11 | 8 | 4 | 6 | 5 | 7 | 11 |
| 277 | 9 | 9 | 3 | 1 | 10 | 7 | 11 | 2 | 1 | 4 | 5 | 6 | 3 | 2 |
| 278 | 10 | 2 | 4 | 8 | 0 | 10 | 3 | 3 | 6 | 10 | 4 | 11 | 5 | 0 |
| 279 | 5 | 8 | 2 | 6 | 1 | 8 | 6 | 6 | 5 | 10 | 10 | 9 | 5 | 7 |
| 280 | 4 | 11 | 7 | 9 | 7 | 8 | 1 | 7 | 4 | 0 | 4 | 2 | 1 | 2 |
| 281 | 10 | 6 | 6 | 11 | 10 | 8 | 6 | 0 | 2 | 4 | 4 | 7 | 6 | 11 |
| 282 | 6 | 0 | 4 | 10 | 7 | 7 | 9 | 4 | 7 | 0 | 7 | 9 | 10 | 5 |
| 283 | 5 | 9 | 9 | 3 | 5 | 0 | 3 | 7 | 11 | 3 | 2 | 7 | 10 | 11 |
| 284 | 11 | 1 | 8 | 5 | 1 | 3 | 3 | 0 | 10 | 2 | 7 | 0 | 3 | 8 |
| 285 | 7 | 7 | 4 | 8 | 7 | 2 | 8 | 8 | 2 | 9 | 9 | 4 | 4 | 2 |
| 286 | 11 | 11 | 11 | 7 | 0 | 10 | 5 | 10 | 0 | 0 | 10 | 8 | 6 | 4 |
| 287 | 4 | 3 | 2 | 11 | 4 | 10 | 10 | 3 | 2 | 8 | 11 | 6 | 3 | 5 |
| 288 | 11 | 0 | 1 | 6 | 10 | 11 | 10 | 5 | 3 | 8 | 8 | 7 | 10 | 3 |
| 289 | 3 | 10 | 5 | 1 | 0 | 7 | 6 | 9 | 11 | 11 | 7 | 11 | 7 | 6 |
| 290 | 2 | 9 | 7 | 3 | 0 | 6 | 10 | 6 | 8 | 7 | 6 | 11 | 0 | 10 |
| 291 | 0 | 9 | 1 | 2 | 5 | 8 | 2 | 4 | 5 | 0 | 4 | 7 | 7 | 8 |
| 292 | 6 | 6 | 5 | 2 | 11 | 1 | 5 | 1 | 1 | 6 | 8 | 10 | 2 | 10 |
| 293 | 7 | 11 | 11 | 6 | 4 | 6 | 8 | 2 | 9 | 4 | 1 | 10 | 3 | 3 |
| 294 | 3 | 6 | 8 | 7 | 5 | 6 | 8 | 5 | 9 | 3 | 0 | 3 | 9 | 8 |
| 295 | 7 | 1 | 6 | 9 | 4 | 1 | 0 | 11 | 7 | 6 | 9 | 5 | 9 | 5 |
| 296 | 8 | 4 | 8 | 0 | 10 | 9 | 1 | 6 | 6 | 10 | 11 | 8 | 4 | 6 |
| 297 | 7 | 0 | 9 | 11 | 1 | 8 | 11 | 3 | 11 | 3 | 5 | 11 | 2 | 1 |
| 298 | 0 | 5 | 6 | 1 | 2 | 4 | 0 | 7 | 11 | 9 | 4 | 11 | 9 | 8 |
| 299 | 6 | 7 | 7 | 5 | 8 | 2 | 9 | 10 | 5 | 7 | 7 | 8 | 11 | 10 |
| 300 | 2 | 4 | 11 | 9 | 11 | 5 | 5 | 0 | 10 | 9 | 11 | 6 | 2 | 5 |
| 301 | 1 | 8 | 8 | 7 | 4 | 3 | 8 | 9 | 10 | 1 | 9 | 4 | 1 | 10 |
| 302 | 10 | 6 | 8 | 9 | 2 | 1 | 9 | 8 | 2 | 11 | 11 | 0 | 11 | 4 |
| 303 | 1 | 10 | 7 | 0 | 3 | 6 | 6 | 8 | 0 | 11 | 9 | 1 | 8 | 7 |
| 304 | 4 | 7 | 3 | 2 | 10 | 1 | 11 | 5 | 2 | 11 | 7 | 2 | 6 | 7 |
| 305 | 8 | 10 | 4 | 4 | 0 | 5 | 11 | 4 | 2 | 9 | 0 | 7 | 5 | 7 |
| 306 | 7 | 4 | 4 | 7 | 2 | 10 | 2 | 8 | 5 | 7 | 11 | 9 | 0 | 5 |
| 307 | 0 | 6 | 1 | 6 | 6 | 11 | 1 | 2 | 7 | 4 | 3 | 1 | 9 | 2 |
| 308 | 6 | 0 | 11 | 4 | 4 | 11 | 0 | 0 | 10 | 4 | 3 | 4 | 4 | 6 |
| 309 | 3 | 4 | 5 | 5 | 9 | 7 | 1 | 3 | 6 | 6 | 8 | 6 | 10 | 4 |
| 310 | 4 | 7 | 5 | 11 | 10 | 4 | 3 | 6 | 3 | 3 | 3 | 3 | 3 | 9 |
| 311 | 3 | 9 | 3 | 6 | 6 | 0 | 0 | 11 | 2 | 6 | 4 | 11 | 2 | 9 |
| 312 | 3 | 0 | 6 | 8 | 3 | 3 | 0 | 3 | 1 | 1 | 7 | 5 | 10 | 1 |
| 313 | 10 | 2 | 9 | 2 | 6 | 11 | 9 | 0 | 7 | 9 | 11 | 9 | 4 | 9 |
| 314 | 11 | 6 | 4 | 9 | 9 | 8 | 9 | 3 | 8 | 3 | 9 | 3 | 6 | 0 |
| 315 | 4 | 4 | 10 | 7 | 3 | 5 | 9 | 6 | 1 | 0 | 7 | 0 | 0 | 9 |
| 316 | 3 | 1 | 4 | 5 | 6 | 8 | 7 | 7 | 0 | 2 | 2 | 8 | 4 | 4 |
| 317 | 4 | 9 | 9 | 7 | 3 | 2 | 11 | 7 | 10 | 1 | 3 | 11 | 5 | 8 |
| 318 | 8 | 1 | 11 | 4 | 4 | 1 | 4 | 9 | 1 | 10 | 2 | 0 | 8 | 2 |
| 319 | 8 | 11 | 8 | 1 | 3 | 10 | 4 | 2 | 5 | 10 | 3 | 10 | 10 | 4 |
| 320 | 9 | 8 | 5 | 8 | 1 | 6 | 7 | 7 | 5 | 5 | 5 | 2 | 9 | 9 |
| 321 | 10 | 9 | 0 | 3 | 3 | 0 | 10 | 1 | 6 | 5 | 11 | 0 | 5 | 1 |
| 322 | 11 | 8 | 6 | 2 | 7 | 2 | 11 | 0 | 6 | 2 | 8 | 5 | 6 | 0 |
| 323 | 8 | 3 | 8 | 11 | 9 | 11 | 1 | 11 | 4 | 4 | 0 | 5 | 5 | 1 |
| 324 | 11 | 11 | 0 | 10 | 4 | 4 | 10 | 8 | 5 | 5 | 1 | 7 | 4 | 11 |
| 325 | 9 | 10 | 11 | 7 | 1 | 11 | 8 | 11 | 2 | 8 | 2 | 3 | 8 | 3 |
| 326 | 2 | 10 | 5 | 10 | 2 | 0 | 11 | 3 | 9 | 0 | 10 | 9 | 1 | 10 |
| 327 | 5 | 11 | 3 | 3 | 10 | 8 | 0 | 2 | 4 | 8 | 10 | 8 | 9 | 3 |
| 328 | 0 | 11 | 0 | 11 | 4 | 0 | 8 | 6 | 7 | 7 | 2 | 9 | 9 | 10 |
| 329 | 3 | 10 | 6 | 4 | 11 | 2 | 5 | 10 | 3 | 7 | 9 | 2 | 0 | 2 |
| 330 | 7 | 5 | 7 | 1 | 4 | 6 | 2 | 4 | 10 | 11 | 10 | 5 | 6 | 1 |
| 331 | 3 | 2 | 6 | 6 | 10 | 3 | 4 | 4 | 11 | 11 | 1 | 2 | 1 | 3 |
| 332 | 6 | 7 | 11 | 6 | 7 | 8 | 2 | 1 | 7 | 10 | 1 | 4 | 1 | 10 |
| 333 | 6 | 7 | 2 | 9 | 4 | 7 | 7 | 2 | 1 | 5 | 6 | 0 | 5 | 8 |
| 334 | 2 | 1 | 0 | 5 | 11 | 1 | 0 | 2 | 11 | 0 | 4 | 7 | 0 | 9 |
| 335 | 0 | 5 | 0 | 3 | 10 | 2 | 6 | 0 | 8 | 7 | 10 | 6 | 4 | 2 |
| 336 | 4 | 9 | 2 | 0 | 1 | 10 | 5 | 8 | 4 | 7 | 10 | 5 | 4 | 3 |
| 337 | 2 | 7 | 6 | 3 | 2 | 7 | 2 | 6 | 5 | 11 | 3 | 10 | 4 | 3 |
| 338 | 6 | 6 | 5 | 11 | 9 | 2 | 1 | 6 | 11 | 1 | 1 | 8 | 1 | 0 |
| 339 | 1 | 1 | 6 | 1 | 6 | 11 | 11 | 6 | 11 | 10 | 10 | 6 | 7 | 5 |
| 340 | 2 | 11 | 5 | 3 | 4 | 3 | 9 | 1 | 8 | 8 | 2 | 2 | 4 | 5 |
| 341 | 9 | 3 | 9 | 2 | 1 | 3 | 10 | 5 | 11 | 7 | 6 | 1 | 7 | 2 |
| 342 | 1 | 11 | 4 | 9 | 5 | 5 | 7 | 7 | 6 | 4 | 9 | 7 | 2 | 8 |
| 343 | 11 | 10 | 5 | 5 | 9 | 10 | 5 | 1 | 5 | 3 | 1 | 5 | 8 | 6 |
| 344 | 11 | 1 | 1 | 3 | 3 | 1 | 6 | 1 | 2 | 0 | 7 | 3 | 7 | 3 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 345 | 4 | 2 | 1 | 0 | 9 | 0 | 4 | 0 | 1 | 8 | 1 | 11 | 4 | 10 |
| 346 | 7 | 11 | 1 | 7 | 9 | 4 | 10 | 6 | 6 | 10 | 5 | 4 | 7 | 7 |
| 347 | 0 | 0 | 5 | 11 | 2 | 9 | 10 | 8 | 10 | 10 | 3 | 0 | 8 | 1 |
| 348 | 4 | 8 | 7 | 1 | 6 | 5 | 2 | 10 | 8 | 1 | 11 | 1 | 11 | 8 |
| 349 | 8 | 1 | 4 | 11 | 7 | 4 | 10 | 1 | 1 | 6 | 5 | 1 | 0 | 11 |
| 350 | 4 | 0 | 9 | 6 | 5 | 7 | 4 | 10 | 6 | 9 | 0 | 0 | 2 | 4 |
| 351 | 7 | 7 | 9 | 11 | 6 | 3 | 9 | 9 | 6 | 7 | 9 | 3 | 5 | 11 |
| 352 | 8 | 9 | 2 | 6 | 2 | 5 | 7 | 2 | 8 | 4 | 0 | 3 | 4 | 9 |
| 353 | 6 | 3 | 0 | 5 | 5 | 9 | 7 | 0 | 3 | 7 | 3 | 3 | 10 | 4 |
| 354 | 0 | 7 | 11 | 9 | 3 | 5 | 6 | 9 | 0 | 2 | 3 | 4 | 11 | 8 |
| 355 | 10 | 1 | 10 | 7 | 0 | 0 | 8 | 8 | 4 | 8 | 5 | 0 | 6 | 6 |
| 356 | 11 | 9 | 2 | 5 | 6 | 8 | 3 | 11 | 3 | 7 | 11 | 7 | 1 | 2 |
| 357 | 5 | 4 | 0 | 0 | 9 | 0 | 0 | 9 | 8 | 6 | 7 | 3 | 9 | 7 |
| 358 | 2 | 8 | 4 | 7 | 2 | 1 | 6 | 2 | 9 | 3 | 6 | 6 | 6 | 7 |
| 359 | 9 | 3 | 11 | 0 | 8 | 11 | 10 | 6 | 10 | 0 | 10 | 7 | 2 | 8 |
| 360 | 11 | 5 | 0 | 8 | 3 | 2 | 5 | 9 | 4 | 1 | 2 | 9 | 11 | 3 |
| 361 | 5 | 7 | 6 | 0 | 7 | 11 | 1 | 9 | 1 | 7 | 0 | 9 | 6 | 8 |
| 362 | 1 | 11 | 6 | 7 | 11 | 11 | 9 | 8 | 5 | 6 | 7 | 3 | 2 | 1 |
| 363 | 1 | 8 | 5 | 8 | 7 | 7 | 4 | 1 | 3 | 0 | 4 | 7 | 2 | 6 |
| 364 | 6 | 5 | 10 | 3 | 6 | 7 | 1 | 9 | 9 | 6 | 9 | 10 | 0 | 5 |
| 365 | 10 | 10 | 10 | 4 | 11 | 7 | 1 | 6 | 2 | 2 | 10 | 9 | 4 | 11 |
| 366 | 9 | 2 | 6 | 0 | 11 | 9 | 9 | 5 | 2 | 1 | 4 | 8 | 7 | 7 |
| 367 | 3 | 3 | 8 | 10 | 7 | 5 | 6 | 6 | 9 | 6 | 11 | 7 | 5 | 10 |
| 368 | 4 | 2 | 2 | 8 | 11 | 6 | 1 | 5 | 7 | 7 | 7 | 4 | 11 | 2 |
| 369 | 3 | 1 | 10 | 2 | 5 | 4 | 10 | 6 | 4 | 0 | 11 | 10 | 4 | 2 |
| 370 | 4 | 9 | 5 | 2 | 8 | 4 | 8 | 0 | 0 | 10 | 11 | 5 | 5 | 5 |
| 371 | 6 | 1 | 6 | 9 | 2 | 5 | 1 | 10 | 3 | 11 | 2 | 6 | 3 | 11 |
| 372 | 3 | 1 | 7 | 4 | 10 | 2 | 3 | 5 | 1 | 5 | 0 | 6 | 6 | 11 |
| 373 | 3 | 4 | 8 | 2 | 1 | 4 | 8 | 10 | 5 | 2 | 10 | 7 | 6 | 1 |
| 374 | 0 | 2 | 9 | 1 | 3 | 11 | 11 | 1 | 1 | 7 | 4 | 7 | 1 | 0 |
| 375 | 11 | 10 | 4 | 3 | 2 | 3 | 1 | 8 | 7 | 10 | 1 | 8 | 10 | 8 |
| 376 | 5 | 9 | 8 | 0 | 9 | 4 | 11 | 2 | 2 | 5 | 10 | 9 | 10 | 0 |
| 377 | 7 | 0 | 6 | 4 | 9 | 6 | 6 | 7 | 9 | 7 | 5 | 8 | 4 | 11 |
| 378 | 3 | 8 | 3 | 11 | 10 | 10 | 7 | 8 | 10 | 8 | 9 | 10 | 6 | 0 |
| 379 | 2 | 7 | 0 | 4 | 8 | 2 | 1 | 1 | 4 | 10 | 3 | 7 | 2 | 1 |
| 380 | 6 | 8 | 0 | 0 | 2 | 4 | 6 | 7 | 7 | 6 | 2 | 8 | 7 | 0 |
| 381 | 1 | 3 | 11 | 8 | 11 | 4 | 2 | 4 | 5 | 9 | 8 | 0 | 0 | 10 |
| 382 | 7 | 8 | 7 | 3 | 2 | 1 | 1 | 0 | 1 | 7 | 3 | 1 | 5 | 1 |
| 383 | 5 | 11 | 8 | 4 | 8 | 9 | 0 | 3 | 5 | 3 | 2 | 3 | 4 | 10 |
| 384 | 0 | 4 | 2 | 9 | 4 | 8 | 11 | 10 | 5 | 6 | 8 | 1 | 4 | 2 |
| 385 | 2 | 2 | 11 | 6 | 0 | 7 | 4 | 7 | 4 | 4 | 6 | 4 | 10 | 11 |
| 386 | 8 | 7 | 5 | 8 | 4 | 4 | 6 | 4 | 9 | 5 | 4 | 10 | 11 | 2 |
| 387 | 7 | 5 | 11 | 11 | 4 | 11 | 4 | 8 | 11 | 2 | 6 | 9 | 7 | 7 |
| 388 | 11 | 7 | 1 | 3 | 7 | 6 | 7 | 0 | 0 | 6 | 4 | 6 | 9 | 8 |
| 389 | 5 | 10 | 11 | 10 | 3 | 5 | 1 | 5 | 4 | 9 | 6 | 1 | 9 | 9 |
| 390 | 0 | 11 | 1 | 8 | 11 | 7 | 8 | 7 | 3 | 3 | 1 | 6 | 8 | 5 |
| 391 | 11 | 3 | 3 | 9 | 1 | 7 | 2 | 10 | 2 | 3 | 3 | 7 | 9 | 8 |
| 392 | 10 | 5 | 9 | 11 | 8 | 3 | 0 | 7 | 8 | 1 | 8 | 8 | 6 | 2 |
| 393 | 11 | 7 | 11 | 5 | 11 | 9 | 11 | 3 | 3 | 0 | 7 | 4 | 5 | 1 |
| 394 | 9 | 8 | 10 | 9 | 8 | 2 | 7 | 8 | 7 | 1 | 1 | 6 | 0 | 7 |
| 395 | 7 | 4 | 3 | 5 | 5 | 2 | 4 | 2 | 8 | 3 | 10 | 11 | 1 | 10 |
| 396 | 7 | 6 | 7 | 10 | 0 | 1 | 11 | 5 | 7 | 8 | 2 | 6 | 3 | 9 |
| 397 | 11 | 3 | 1 | 4 | 1 | 6 | 11 | 11 | 7 | 9 | 6 | 10 | 10 | 6 |
| 398 | 5 | 7 | 8 | 8 | 3 | 8 | 9 | 6 | 7 | 1 | 11 | 11 | 2 | 2 |
| 399 | 0 | 3 | 8 | 6 | 0 | 8 | 4 | 2 | 3 | 7 | 5 | 8 | 3 | 6 |
| 400 | 11 | 3 | 7 | 4 | 8 | 11 | 9 | 4 | 4 | 5 | 4 | 11 | 9 | 3 |
| 401 | 0 | 9 | 2 | 1 | 11 | 5 | 2 | 3 | 4 | 10 | 8 | 8 | 1 | 6 |
| 402 | 6 | 4 | 10 | 8 | 4 | 1 | 9 | 5 | 4 | 11 | 0 | 6 | 10 | 2 |
| 403 | 11 | 7 | 0 | 9 | 6 | 0 | 4 | 8 | 9 | 6 | 2 | 1 | 3 | 4 |
| 404 | 4 | 0 | 1 | 4 | 3 | 5 | 8 | 2 | 2 | 4 | 10 | 6 | 6 | 4 |
| 405 | 7 | 10 | 8 | 2 | 0 | 4 | 9 | 3 | 3 | 4 | 0 | 4 | 0 | 4 |
| 406 | 2 | 0 | 3 | 9 | 9 | 9 | 3 | 9 | 2 | 0 | 1 | 5 | 6 | 9 |
| 407 | 1 | 5 | 2 | 5 | 7 | 4 | 8 | 1 | 5 | 4 | 6 | 8 | 1 | 3 |
| 408 | 2 | 2 | 10 | 2 | 3 | 4 | 0 | 4 | 3 | 8 | 5 | 11 | 7 | 9 |
| 409 | 4 | 0 | 4 | 1 | 8 | 0 | 5 | 0 | 9 | 7 | 9 | 3 | 7 | 9 |
| 410 | 3 | 11 | 9 | 10 | 5 | 9 | 3 | 3 | 0 | 9 | 8 | 8 | 8 | 9 |
| 411 | 2 | 9 | 4 | 5 | 7 | 2 | 6 | 7 | 8 | 0 | 8 | 1 | 7 | 6 |
| 412 | 9 | 4 | 10 | 0 | 0 | 3 | 2 | 11 | 10 | 3 | 4 | 5 | 4 | 2 |
| 413 | 10 | 0 | 8 | 0 | 1 | 7 | 2 | 1 | 1 | 8 | 10 | 3 | 2 | 7 |
| 414 | 0 | 3 | 2 | 3 | 6 | 10 | 9 | 7 | 1 | 3 | 4 | 9 | 6 | 1 |
| 415 | 2 | 10 | 2 | 2 | 7 | 9 | 4 | 4 | 7 | 5 | 3 | 2 | 9 | 0 |
| 416 | 9 | 1 | 11 | 4 | 2 | 7 | 9 | 10 | 0 | 1 | 11 | 10 | 0 | 1 |
| 417 | 0 | 10 | 0 | 0 | 4 | 10 | 11 | 2 | 6 | 11 | 5 | 11 | 0 | 8 |
| 418 | 9 | 5 | 7 | 0 | 11 | 8 | 7 | 1 | 11 | 5 | 0 | 10 | 4 | 1 |
| 419 | 1 | 0 | 6 | 3 | 10 | 9 | 0 | 9 | 5 | 2 | 9 | 2 | 7 | 0 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 420 | 5 | 2 | 2 | 7 | 5 | 7 | 5 | 3 | 8 | 11 | 6 | 10 | 7 | 0 |
| 421 | 5 | 5 | 6 | 10 | 1 | 10 | 8 | 3 | 11 | 2 | 0 | 2 | 8 | 10 |
| 422 | 10 | 6 | 11 | 2 | 7 | 7 | 11 | 5 | 5 | 7 | 9 | 3 | 8 | 6 |
| 423 | 3 | 2 | 9 | 9 | 11 | 5 | 11 | 2 | 5 | 10 | 5 | 3 | 9 | 7 |
| 424 | 6 | 9 | 3 | 8 | 6 | 9 | 1 | 10 | 0 | 2 | 5 | 9 | 1 | 3 |
| 425 | 5 | 0 | 7 | 1 | 2 | 6 | 0 | 5 | 6 | 6 | 11 | 2 | 2 | 10 |
| 426 | 0 | 4 | 7 | 8 | 5 | 5 | 8 | 1 | 6 | 9 | 10 | 5 | 5 | 9 |
| 427 | 2 | 6 | 5 | 0 | 5 | 0 | 5 | 11 | 11 | 11 | 3 | 0 | 6 | 7 |
| 428 | 1 | 11 | 9 | 10 | 8 | 3 | 6 | 2 | 11 | 6 | 9 | 6 | 11 | 3 |
| 429 | 1 | 4 | 0 | 1 | 8 | 11 | 8 | 8 | 7 | 8 | 4 | 1 | 11 | 9 |
| 430 | 6 | 8 | 6 | 9 | 6 | 10 | 7 | 3 | 8 | 0 | 3 | 4 | 1 | 9 |
| 431 | 9 | 0 | 6 | 1 | 0 | 9 | 4 | 0 | 7 | 11 | 0 | 1 | 3 | 5 |
| 432 | 2 | 4 | 7 | 2 | 7 | 10 | 1 | 11 | 11 | 9 | 2 | 8 | 3 | 8 |
| 433 | 4 | 8 | 11 | 5 | 10 | 8 | 8 | 4 | 9 | 9 | 9 | 11 | 11 | 7 |
| 434 | 11 | 7 | 3 | 3 | 5 | 9 | 8 | 2 | 10 | 10 | 11 | 2 | 11 | 11 |
| 435 | 2 | 10 | 3 | 2 | 9 | 6 | 11 | 2 | 11 | 2 | 6 | 3 | 4 | 3 |
| 436 | 4 | 4 | 2 | 3 | 4 | 4 | 1 | 7 | 9 | 4 | 3 | 5 | 10 | 7 |
| 437 | 2 | 0 | 10 | 11 | 6 | 3 | 5 | 2 | 8 | 2 | 4 | 9 | 10 | 4 |
| 438 | 9 | 11 | 8 | 2 | 9 | 0 | 6 | 4 | 8 | 2 | 5 | 1 | 8 | 5 |
| 439 | 7 | 6 | 8 | 11 | 8 | 3 | 10 | 11 | 9 | 5 | 7 | 10 | 7 | 6 |
| 440 | 0 | 11 | 7 | 6 | 9 | 3 | 3 | 0 | 9 | 10 | 11 | 11 | 11 | 6 |
| 441 | 7 | 0 | 3 | 8 | 0 | 0 | 1 | 5 | 10 | 5 | 1 | 3 | 5 | 6 |
| 442 | 9 | 6 | 1 | 1 | 6 | 0 | 7 | 5 | 4 | 6 | 6 | 3 | 11 | 5 |
| 443 | 2 | 7 | 10 | 9 | 10 | 3 | 3 | 10 | 9 | 9 | 10 | 8 | 7 | 2 |
| 444 | 6 | 8 | 10 | 4 | 9 | 5 | 3 | 11 | 6 | 8 | 11 | 5 | 2 | 4 |
| 445 | 3 | 11 | 3 | 0 | 9 | 1 | 2 | 11 | 9 | 0 | 2 | 2 | 10 | 1 |
| 446 | 4 | 5 | 4 | 6 | 5 | 8 | 3 | 5 | 2 | 0 | 6 | 6 | 9 | 1 |
| 447 | 7 | 11 | 6 | 11 | 5 | 1 | 9 | 3 | 4 | 2 | 1 | 1 | 6 | 8 |
| 448 | 8 | 0 | 5 | 4 | 0 | 8 | 7 | 0 | 1 | 1 | 8 | 9 | 7 | 3 |
| 449 | 8 | 5 | 9 | 5 | 1 | 11 | 6 | 4 | 6 | 9 | 10 | 8 | 10 | 8 |
| 450 | 0 | 1 | 5 | 11 | 1 | 10 | 4 | 9 | 2 | 1 | 8 | 5 | 11 | 11 |
| 451 | 9 | 5 | 4 | 8 | 11 | 10 | 11 | 4 | 8 | 11 | 7 | 6 | 7 | 4 |
| 452 | 10 | 0 | 2 | 2 | 7 | 8 | 7 | 8 | 4 | 6 | 2 | 11 | 0 | 9 |
| 453 | 1 | 9 | 1 | 6 | 11 | 1 | 8 | 3 | 0 | 1 | 2 | 0 | 9 | 3 |
| 454 | 7 | 2 | 5 | 3 | 10 | 6 | 5 | 8 | 3 | 0 | 8 | 0 | 5 | 5 |
| 455 | 9 | 7 | 7 | 8 | 4 | 6 | 3 | 3 | 8 | 3 | 0 | 4 | 8 | 6 |
| 456 | 4 | 1 | 11 | 3 | 2 | 8 | 3 | 2 | 1 | 6 | 8 | 4 | 3 | 4 |
| 457 | 8 | 3 | 3 | 6 | 7 | 1 | 8 | 1 | 4 | 2 | 4 | 10 | 8 | 4 |
| 458 | 0 | 8 | 9 | 7 | 11 | 6 | 2 | 0 | 6 | 8 | 7 | 2 | 0 | 3 |
| 459 | 10 | 11 | 4 | 9 | 3 | 6 | 0 | 2 | 7 | 7 | 0 | 6 | 8 | 0 |
| 460 | 4 | 2 | 7 | 8 | 6 | 4 | 9 | 3 | 11 | 2 | 3 | 0 | 2 | 5 |
| 461 | 8 | 10 | 9 | 8 | 8 | 11 | 3 | 8 | 2 | 0 | 11 | 2 | 1 | 11 |
| 462 | 8 | 3 | 9 | 10 | 1 | 6 | 5 | 1 | 5 | 1 | 3 | 4 | 0 | 0 |
| 463 | 3 | 8 | 5 | 10 | 0 | 4 | 0 | 4 | 4 | 10 | 9 | 6 | 2 | 10 |
| 464 | 9 | 1 | 0 | 0 | 10 | 5 | 10 | 9 | 9 | 3 | 5 | 2 | 5 | 3 |
| 465 | 0 | 4 | 5 | 4 | 8 | 7 | 10 | 11 | 8 | 2 | 1 | 4 | 1 | 3 |
| 466 | 1 | 1 | 3 | 5 | 6 | 10 | 1 | 4 | 3 | 8 | 6 | 1 | 8 | 8 |
| 467 | 8 | 2 | 10 | 11 | 7 | 6 | 6 | 2 | 0 | 1 | 8 | 3 | 1 | 10 |
| 468 | 3 | 7 | 4 | 3 | 1 | 5 | 3 | 6 | 10 | 1 | 6 | 1 | 8 | 4 |
| 469 | 6 | 9 | 9 | 8 | 7 | 3 | 10 | 6 | 7 | 5 | 10 | 6 | 8 | 9 |
| 470 | 10 | 6 | 2 | 10 | 11 | 7 | 10 | 9 | 10 | 0 | 8 | 0 | 3 | 2 |
| 471 | 6 | 10 | 9 | 4 | 8 | 0 | 2 | 2 | 5 | 1 | 0 | 10 | 2 | 5 |
| 472 | 5 | 10 | 4 | 0 | 5 | 1 | 7 | 9 | 3 | 11 | 10 | 5 | 11 | 5 |
| 473 | 5 | 4 | 11 | 4 | 5 | 9 | 6 | 1 | 0 | 6 | 0 | 9 | 2 | 11 |
| 474 | 0 | 7 | 9 | 3 | 4 | 9 | 7 | 1 | 2 | 4 | 8 | 11 | 3 | 1 |
| 475 | 7 | 11 | 0 | 1 | 2 | 7 | 7 | 4 | 5 | 1 | 7 | 6 | 5 | 0 |
| 476 | 1 | 5 | 6 | 8 | 0 | 8 | 1 | 2 | 5 | 3 | 0 | 11 | 11 | 4 |
| 477 | 4 | 6 | 2 | 0 | 0 | 2 | 7 | 10 | 11 | 10 | 6 | 9 | 9 | 10 |
| 478 | 7 | 11 | 3 | 2 | 0 | 9 | 11 | 9 | 1 | 1 | 3 | 8 | 1 | 11 |
| 479 | 2 | 5 | 2 | 7 | 1 | 3 | 9 | 10 | 0 | 6 | 6 | 5 | 11 | 9 |
| 480 | 7 | 9 | 5 | 8 | 10 | 11 | 0 | 0 | 9 | 11 | 0 | 9 | 0 | 0 |
| 481 | 8 | 3 | 2 | 8 | 9 | 5 | 4 | 5 | 9 | 11 | 10 | 1 | 8 | 3 |
| 482 | 0 | 6 | 9 | 2 | 2 | 6 | 9 | 4 | 1 | 10 | 6 | 6 | 3 | 5 |
| 483 | 5 | 9 | 0 | 7 | 8 | 8 | 2 | 11 | 10 | 5 | 6 | 4 | 3 | 11 |
| 484 | 8 | 11 | 10 | 1 | 10 | 6 | 9 | 10 | 10 | 5 | 9 | 6 | 4 | 8 |
| 485 | 6 | 4 | 7 | 6 | 10 | 7 | 9 | 1 | 0 | 3 | 8 | 0 | 7 | 0 |
| 486 | 10 | 0 | 1 | 2 | 9 | 2 | 4 | 9 | 6 | 11 | 9 | 9 | 9 | 1 |
| 487 | 4 | 7 | 6 | 6 | 0 | 4 | 5 | 9 | 8 | 6 | 5 | 7 | 11 | 10 |
| 488 | 5 | 1 | 5 | 6 | 8 | 9 | 11 | 10 | 7 | 8 | 0 | 7 | 0 | 2 |
| 489 | 11 | 6 | 10 | 6 | 4 | 6 | 4 | 7 | 3 | 10 | 0 | 1 | 6 | 10 |
| 490 | 8 | 3 | 6 | 9 | 0 | 6 | 10 | 9 | 10 | 4 | 2 | 8 | 10 | 3 |
| 491 | 1 | 4 | 9 | 9 | 5 | 2 | 0 | 9 | 4 | 7 | 4 | 10 | 10 | 5 |
| 492 | 7 | 9 | 10 | 8 | 4 | 8 | 10 | 2 | 2 | 7 | 4 | 2 | 5 | 7 |
| 493 | 10 | 10 | 6 | 10 | 0 | 11 | 10 | 7 | 6 | 1 | 3 | 1 | 2 | 4 |
| 494 | 3 | 6 | 11 | 1 | 8 | 4 | 1 | 1 | 10 | 5 | 2 | 2 | 11 | 0 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 495 | 4 | 1 | 7 | 1 | 0 | 10 | 10 | 11 | 0 | 4 | 9 | 9 | 5 | 6 |
| 496 | 4 | 6 | 9 | 8 | 10 | 0 | 4 | 3 | 10 | 6 | 10 | 5 | 7 | 0 |
| 497 | 1 | 2 | 8 | 10 | 0 | 3 | 10 | 10 | 3 | 11 | 8 | 11 | 9 | 1 |
| 498 | 9 | 1 | 1 | 11 | 4 | 1 | 2 | 8 | 8 | 9 | 5 | 7 | 1 | 0 |
| 499 | 4 | 10 | 10 | 10 | 7 | 3 | 5 | 4 | 6 | 10 | 6 | 4 | 8 | 2 |
| 500 | 10 | 2 | 8 | 6 | 6 | 0 | 8 | 4 | 6 | 3 | 7 | 8 | 0 | 4 |
| 501 | 3 | 8 | 9 | 5 | 2 | 1 | 7 | 1 | 4 | 0 | 1 | 9 | 9 | 11 |
| 502 | 11 | 5 | 8 | 5 | 7 | 5 | 9 | 8 | 6 | 10 | 3 | 9 | 2 | 11 |
| 503 | 5 | 10 | 5 | 5 | 7 | 0 | 6 | 6 | 0 | 4 | 2 | 10 | 3 | 1 |
| 504 | 8 | 10 | 11 | 7 | 9 | 1 | 6 | 3 | 5 | 7 | 0 | 11 | 3 | 10 |
| 505 | 2 | 6 | 0 | 5 | 1 | 3 | 10 | 7 | 1 | 9 | 9 | 6 | 6 | 4 |
| 506 | 3 | 5 | 3 | 8 | 5 | 2 | 9 | 0 | 7 | 6 | 8 | 7 | 3 | 6 |
| 507 | 2 | 3 | 5 | 3 | 0 | 8 | 3 | 3 | 0 | 5 | 11 | 1 | 2 | 7 |
| 508 | 11 | 10 | 2 | 10 | 1 | 11 | 1 | 4 | 0 | 11 | 8 | 10 | 5 | 5 |
| 509 | 7 | 10 | 4 | 8 | 3 | 8 | 5 | 10 | 10 | 8 | 5 | 8 | 8 | 10 |
| 510 | 9 | 7 | 8 | 0 | 2 | 7 | 0 | 8 | 4 | 0 | 9 | 11 | 5 | 6 |
| 511 | 10 | 1 | 11 | 10 | 5 | 2 | 1 | 3 | 7 | 5 | 4 | 3 | 4 | 4 |
| 512 | 8 | 3 | 1 | 7 | 3 | 11 | 11 | 8 | 4 | 6 | 8 | 10 | 0 | 11 |
| 513 | 11 | 7 | 10 | 6 | 11 | 7 | 4 | 11 | 7 | 9 | 11 | 9 | 1 | 7 |
| 514 | 9 | 9 | 7 | 1 | 9 | 0 | 7 | 2 | 5 | 8 | 0 | 7 | 10 | 6 |
| 515 | 0 | 0 | 9 | 5 | 7 | 2 | 5 | 1 | 3 | 0 | 2 | 4 | 6 | 5 |
| 516 | 1 | 6 | 5 | 2 | 0 | 1 | 0 | 9 | 10 | 3 | 3 | 1 | 3 | 1 |
| 517 | 11 | 10 | 1 | 4 | 9 | 4 | 9 | 7 | 1 | 2 | 9 | 6 | 7 | 10 |
| 518 | 5 | 6 | 0 | 9 | 10 | 5 | 8 | 8 | 5 | 0 | 4 | 5 | 1 | 3 |
| 519 | 6 | 11 | 2 | 4 | 7 | 0 | 8 | 3 | 10 | 9 | 5 | 3 | 2 | 11 |
| 520 | 2 | 4 | 11 | 0 | 5 | 7 | 3 | 6 | 0 | 4 | 1 | 11 | 8 | 0 |
| 521 | 4 | 6 | 4 | 1 | 7 | 11 | 9 | 3 | 2 | 6 | 2 | 6 | 11 | 8 |
| 522 | 6 | 0 | 7 | 8 | 4 | 4 | 1 | 8 | 10 | 8 | 6 | 9 | 8 | 9 |
| 523 | 5 | 6 | 3 | 11 | 6 | 8 | 11 | 6 | 0 | 5 | 7 | 6 | 0 | 1 |
| 524 | 0 | 9 | 10 | 2 | 8 | 10 | 6 | 8 | 11 | 10 | 2 | 9 | 2 | 3 |
| 525 | 10 | 3 | 8 | 2 | 11 | 3 | 7 | 8 | 8 | 8 | 7 | 8 | 9 | 0 |
| 526 | 3 | 7 | 8 | 10 | 4 | 9 | 11 | 7 | 8 | 0 | 6 | 7 | 1 | 11 |
| 527 | 7 | 6 | 4 | 4 | 5 | 10 | 10 | 9 | 4 | 2 | 11 | 7 | 10 | 0 |
| 528 | 2 | 7 | 5 | 5 | 6 | 5 | 6 | 7 | 6 | 5 | 0 | 3 | 8 | 7 |
| 529 | 5 | 1 | 8 | 5 | 3 | 0 | 10 | 11 | 2 | 3 | 5 | 7 | 7 | 4 |
| 530 | 3 | 6 | 11 | 5 | 7 | 3 | 1 | 2 | 1 | 2 | 0 | 0 | 4 | 11 |
| 531 | 4 | 8 | 3 | 4 | 3 | 3 | 9 | 9 | 10 | 0 | 1 | 11 | 4 | 3 |
| 532 | 10 | 3 | 10 | 11 | 10 | 10 | 0 | 1 | 4 | 4 | 9 | 2 | 11 | 4 |
| 533 | 1 | 9 | 6 | 7 | 9 | 6 | 2 | 0 | 2 | 1 | 6 | 1 | 6 | 2 |
| 534 | 8 | 2 | 7 | 0 | 4 | 11 | 8 | 10 | 7 | 10 | 7 | 5 | 9 | 8 |
| 535 | 5 | 8 | 11 | 8 | 4 | 7 | 7 | 0 | 3 | 3 | 10 | 4 | 0 | 3 |
| 536 | 7 | 9 | 11 | 6 | 0 | 11 | 3 | 4 | 1 | 1 | 4 | 7 | 3 | 9 |
| 537 | 9 | 3 | 2 | 4 | 8 | 2 | 2 | 4 | 0 | 0 | 0 | 8 | 3 | 10 |
| 538 | 10 | 6 | 2 | 8 | 2 | 6 | 6 | 1 | 5 | 1 | 1 | 3 | 4 | 1 |
| 539 | 4 | 0 | 11 | 0 | 6 | 9 | 10 | 7 | 11 | 7 | 3 | 9 | 7 | 8 |
| 540 | 9 | 3 | 4 | 10 | 4 | 1 | 9 | 6 | 1 | 1 | 8 | 9 | 4 | 4 |
| 541 | 7 | 1 | 3 | 9 | 0 | 1 | 1 | 7 | 6 | 7 | 7 | 11 | 1 | 4 |
| 542 | 0 | 3 | 8 | 1 | 1 | 9 | 1 | 5 | 0 | 5 | 4 | 0 | 8 | 2 |
| 543 | 11 | 2 | 8 | 3 | 2 | 6 | 10 | 3 | 9 | 0 | 2 | 8 | 0 | 6 |
| 544 | 7 | 11 | 9 | 1 | 3 | 3 | 6 | 10 | 7 | 9 | 8 | 4 | 7 | 6 |
| 545 | 8 | 2 | 4 | 9 | 11 | 8 | 6 | 2 | 1 | 7 | 11 | 8 | 2 | 1 |
| 546 | 10 | 8 | 10 | 9 | 0 | 2 | 3 | 11 | 10 | 11 | 0 | 10 | 9 | 8 |
| 547 | 11 | 5 | 2 | 3 | 9 | 5 | 11 | 11 | 11 | 11 | 4 | 4 | 2 | 1 |
| 548 | 1 | 3 | 8 | 2 | 9 | 5 | 8 | 10 | 4 | 3 | 5 | 9 | 1 | 6 |
| 549 | 1 | 8 | 10 | 11 | 6 | 6 | 2 | 9 | 6 | 6 | 11 | 4 | 10 | 1 |
| 550 | 8 | 2 | 1 | 5 | 10 | 4 | 7 | 2 | 11 | 5 | 3 | 2 | 7 | 2 |
| 551 | 5 | 1 | 5 | 2 | 3 | 11 | 11 | 2 | 10 | 0 | 6 | 6 | 10 | 9 |
| 552 | 5 | 10 | 9 | 4 | 11 | 3 | 4 | 4 | 0 | 4 | 1 | 3 | 11 | 5 |
| 553 | 11 | 3 | 7 | 2 | 6 | 3 | 8 | 11 | 2 | 4 | 2 | 11 | 11 | 10 |
| 554 | 11 | 8 | 6 | 7 | 5 | 9 | 8 | 6 | 4 | 4 | 6 | 7 | 4 | 4 |
| 555 | 6 | 4 | 5 | 0 | 11 | 10 | 10 | 10 | 9 | 10 | 1 | 1 | 10 | 1 |
| 556 | 5 | 2 | 4 | 10 | 5 | 2 | 8 | 1 | 2 | 8 | 8 | 6 | 3 | 0 |
| 557 | 6 | 0 | 6 | 6 | 4 | 0 | 10 | 4 | 11 | 2 | 11 | 5 | 0 | 7 |
| 558 | 7 | 8 | 9 | 11 | 7 | 5 | 7 | 4 | 1 | 7 | 5 | 4 | 4 | 8 |
| 559 | 6 | 7 | 1 | 0 | 0 | 8 | 5 | 5 | 1 | 11 | 9 | 9 | 10 | 4 |
| 560 | 0 | 3 | 11 | 11 | 1 | 3 | 5 | 10 | 2 | 10 | 10 | 2 | 4 | 5 |
| 561 | 4 | 8 | 4 | 0 | 11 | 11 | 3 | 1 | 7 | 9 | 10 | 8 | 5 | 4 |
| 562 | 8 | 9 | 0 | 9 | 11 | 4 | 5 | 4 | 4 | 3 | 8 | 4 | 9 | 5 |
| 563 | 10 | 11 | 0 | 6 | 10 | 7 | 4 | 5 | 8 | 5 | 9 | 4 | 7 | 5 |
| 564 | 7 | 11 | 7 | 7 | 8 | 2 | 11 | 0 | 11 | 11 | 6 | 7 | 8 | 10 |
| 565 | 8 | 8 | 1 | 1 | 5 | 3 | 2 | 1 | 7 | 1 | 7 | 6 | 8 | 11 |
| 566 | 3 | 9 | 1 | 3 | 3 | 10 | 2 | 5 | 5 | 8 | 10 | 0 | 2 | 9 |
| 567 | 2 | 0 | 4 | 4 | 6 | 8 | 0 | 7 | 5 | 4 | 11 | 2 | 1 | 11 |
| 568 | 7 | 1 | 8 | 3 | 3 | 4 | 4 | 6 | 4 | 6 | 4 | 1 | 8 | 7 |
| 569 | 2 | 1 | 9 | 9 | 5 | 7 | 8 | 4 | 5 | 2 | 9 | 10 | 0 | 8 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 570 | 3 | 10 | 1 | 9 | 7 | 8 | 3 | 6 | 11 | 9 | 9 | 8 | 0 | 7 |
| 571 | 10 | 9 | 2 | 0 | 0 | 1 | 6 | 9 | 3 | 5 | 4 | 6 | 10 | 6 |
| 572 | 8 | 7 | 7 | 0 | 1 | 0 | 6 | 6 | 11 | 0 | 1 | 2 | 0 | 11 |
| 573 | 4 | 3 | 1 | 7 | 0 | 5 | 10 | 10 | 5 | 7 | 2 | 3 | 9 | 9 |
| 574 | 4 | 4 | 5 | 4 | 5 | 6 | 7 | 11 | 7 | 8 | 2 | 9 | 11 | 0 |
| 575 | 6 | 11 | 8 | 8 | 4 | 6 | 0 | 10 | 3 | 5 | 2 | 10 | 5 | 5 |
| 576 | 4 | 4 | 2 | 6 | 3 | 10 | 0 | 8 | 11 | 0 | 8 | 1 | 8 | 8 |
| 577 | 2 | 7 | 5 | 1 | 0 | 3 | 9 | 8 | 3 | 4 | 9 | 10 | 2 | 0 |
| 578 | 7 | 4 | 10 | 0 | 1 | 8 | 6 | 11 | 3 | 8 | 7 | 0 | 8 | 5 |
| 579 | 2 | 5 | 9 | 1 | 9 | 1 | 8 | 9 | 8 | 5 | 6 | 0 | 7 | 1 |
| 580 | 1 | 9 | 8 | 9 | 7 | 2 | 7 | 3 | 5 | 7 | 3 | 9 | 8 | 2 |
| 581 | 1 | 6 | 7 | 7 | 1 | 8 | 7 | 7 | 9 | 6 | 10 | 4 | 6 | 9 |
| 582 | 9 | 2 | 6 | 4 | 6 | 3 | 11 | 8 | 0 | 1 | 10 | 4 | 6 | 8 |
| 583 | 0 | 5 | 8 | 7 | 1 | 0 | 0 | 0 | 5 | 10 | 9 | 11 | 6 | 7 |
| 584 | 3 | 0 | 6 | 5 | 8 | 9 | 8 | 10 | 1 | 6 | 8 | 11 | 9 | 3 |
| 585 | 2 | 8 | 0 | 2 | 6 | 4 | 0 | 11 | 1 | 0 | 3 | 3 | 2 | 2 |
| 586 | 1 | 6 | 8 | 7 | 2 | 2 | 2 | 8 | 3 | 5 | 0 | 7 | 7 | 11 |
| 587 | 1 | 11 | 5 | 3 | 10 | 9 | 3 | 0 | 1 | 9 | 4 | 5 | 10 | 1 |
| 588 | 4 | 6 | 9 | 9 | 5 | 5 | 10 | 1 | 8 | 1 | 5 | 9 | 5 | 5 |
| 589 | 10 | 8 | 2 | 2 | 8 | 5 | 11 | 7 | 7 | 9 | 7 | 3 | 3 | 3 |
| 590 | 11 | 6 | 10 | 8 | 10 | 10 | 9 | 3 | 1 | 8 | 8 | 11 | 3 | 9 |
| 591 | 4 | 4 | 9 | 2 | 3 | 3 | 5 | 2 | 9 | 2 | 2 | 2 | 3 | 2 |
| 592 | 3 | 2 | 6 | 5 | 9 | 10 | 0 | 7 | 10 | 5 | 7 | 10 | 1 | 6 |
| 593 | 0 | 1 | 3 | 10 | 2 | 11 | 4 | 3 | 2 | 3 | 6 | 10 | 0 | 7 |
| 594 | 9 | 1 | 11 | 6 | 8 | 10 | 10 | 4 | 2 | 11 | 9 | 11 | 1 | 0 |
| 595 | 10 | 11 | 9 | 5 | 11 | 6 | 9 | 7 | 2 | 10 | 8 | 9 | 8 | 1 |
| 596 | 5 | 7 | 0 | 7 | 11 | 3 | 6 | 0 | 5 | 1 | 5 | 8 | 5 | 11 |
| 597 | 9 | 11 | 3 | 9 | 4 | 5 | 1 | 5 | 5 | 6 | 11 | 10 | 7 | 10 |
| 598 | 4 | 10 | 11 | 3 | 4 | 7 | 9 | 9 | 8 | 10 | 4 | 5 | 3 | 10 |
| 599 | 3 | 4 | 1 | 1 | 11 | 3 | 0 | 5 | 3 | 11 | 4 | 11 | 5 | 3 |
| 600 | 2 | 11 | 3 | 1 | 8 | 5 | 9 | 3 | 10 | 7 | 0 | 5 | 5 | 5 |
| 601 | 3 | 0 | 7 | 8 | 6 | 5 | 2 | 9 | 4 | 0 | 5 | 10 | 7 | 11 |
| 602 | 0 | 8 | 7 | 5 | 10 | 0 | 10 | 8 | 4 | 11 | 10 | 8 | 6 | 11 |
| 603 | 11 | 2 | 10 | 6 | 2 | 11 | 9 | 6 | 2 | 7 | 10 | 4 | 9 | 0 |
| 604 | 1 | 8 | 11 | 6 | 4 | 1 | 10 | 10 | 0 | 8 | 0 | 6 | 5 | 8 |
| 605 | 6 | 5 | 4 | 11 | 7 | 11 | 0 | 2 | 9 | 8 | 11 | 0 | 6 | 5 |
| 606 | 3 | 9 | 8 | 1 | 10 | 1 | 6 | 5 | 9 | 1 | 2 | 5 | 3 | 4 |
| 607 | 10 | 1 | 5 | 8 | 4 | 4 | 3 | 2 | 2 | 9 | 3 | 7 | 9 | 3 |
| 608 | 0 | 9 | 3 | 0 | 5 | 3 | 3 | 3 | 3 | 6 | 0 | 2 | 9 | 9 |
| 609 | 9 | 0 | 11 | 3 | 0 | 7 | 3 | 1 | 6 | 2 | 2 | 1 | 4 | 8 |
| 610 | 10 | 5 | 11 | 5 | 11 | 9 | 6 | 1 | 6 | 11 | 6 | 0 | 11 | 5 |
| 611 | 2 | 5 | 6 | 2 | 1 | 2 | 2 | 2 | 9 | 5 | 5 | 8 | 9 | 6 |
| 612 | 2 | 5 | 0 | 1 | 4 | 10 | 6 | 3 | 11 | 3 | 7 | 1 | 10 | 7 |
| 613 | 1 | 9 | 9 | 11 | 2 | 7 | 11 | 0 | 7 | 4 | 9 | 7 | 5 | 5 |
| 614 | 9 | 9 | 11 | 10 | 1 | 1 | 7 | 1 | 4 | 10 | 3 | 6 | 6 | 3 |
| 615 | 3 | 8 | 4 | 10 | 4 | 0 | 3 | 8 | 9 | 7 | 3 | 11 | 11 | 8 |
| 616 | 4 | 11 | 6 | 11 | 6 | 11 | 8 | 11 | 5 | 11 | 4 | 10 | 3 | 5 |
| 617 | 1 | 5 | 0 | 9 | 8 | 0 | 9 | 5 | 1 | 11 | 3 | 6 | 0 | 8 |
| 618 | 9 | 7 | 9 | 7 | 6 | 1 | 5 | 6 | 2 | 6 | 7 | 7 | 3 | 6 |
| 619 | 6 | 11 | 4 | 11 | 6 | 7 | 7 | 1 | 8 | 6 | 10 | 5 | 4 | 6 |
| 620 | 3 | 11 | 10 | 8 | 3 | 2 | 7 | 2 | 10 | 6 | 4 | 0 | 6 | 1 |
| 621 | 1 | 8 | 6 | 10 | 1 | 4 | 0 | 5 | 5 | 7 | 8 | 8 | 4 | 9 |
| 622 | 8 | 0 | 9 | 1 | 4 | 5 | 9 | 6 | 8 | 6 | 1 | 11 | 6 | 9 |
| 623 | 1 | 1 | 3 | 8 | 7 | 8 | 9 | 9 | 3 | 5 | 9 | 0 | 9 | 10 |
| 624 | 6 | 3 | 1 | 2 | 2 | 0 | 3 | 2 | 3 | 1 | 4 | 5 | 6 | 8 |
| 625 | 11 | 0 | 2 | 9 | 11 | 6 | 6 | 8 | 6 | 2 | 4 | 11 | 6 | 11 |
| 626 | 8 | 10 | 1 | 11 | 9 | 8 | 8 | 8 | 6 | 10 | 1 | 7 | 6 | 4 |
| 627 | 4 | 2 | 2 | 10 | 0 | 10 | 3 | 5 | 0 | 3 | 6 | 2 | 10 | 9 |
| 628 | 6 | 0 | 9 | 5 | 2 | 3 | 2 | 9 | 9 | 10 | 9 | 5 | 9 | 0 |
| 629 | 5 | 9 | 7 | 8 | 6 | 1 | 0 | 4 | 5 | 11 | 2 | 4 | 8 | 1 |
| 630 | 1 | 7 | 2 | 1 | 10 | 0 | 4 | 9 | 7 | 1 | 8 | 2 | 5 | 8 |
| 631 | 3 | 6 | 0 | 7 | 10 | 9 | 0 | 4 | 6 | 3 | 10 | 10 | 11 | 2 |
| 632 | 3 | 2 | 2 | 9 | 4 | 9 | 5 | 9 | 10 | 2 | 3 | 8 | 4 | 0 |
| 633 | 7 | 2 | 1 | 6 | 1 | 9 | 0 | 10 | 6 | 9 | 5 | 3 | 4 | 1 |
| 634 | 10 | 9 | 1 | 3 | 8 | 2 | 8 | 2 | 9 | 4 | 8 | 2 | 5 | 10 |
| 635 | 3 | 5 | 1 | 5 | 5 | 0 | 8 | 0 | 6 | 1 | 0 | 9 | 1 | 9 |
| 636 | 1 | 10 | 6 | 9 | 2 | 8 | 10 | 2 | 2 | 4 | 10 | 0 | 1 | 8 |
| 637 | 9 | 8 | 0 | 11 | 0 | 10 | 4 | 6 | 9 | 0 | 7 | 9 | 6 | 9 |
| 638 | 1 | 0 | 4 | 0 | 7 | 6 | 10 | 10 | 8 | 3 | 8 | 7 | 2 | 5 |
| 639 | 9 | 5 | 8 | 9 | 7 | 5 | 2 | 7 | 9 | 3 | 0 | 11 | 0 | 1 |
| 640 | 9 | 4 | 3 | 1 | 7 | 1 | 11 | 4 | 6 | 3 | 4 | 3 | 7 | 11 |
| 641 | 9 | 5 | 10 | 7 | 7 | 8 | 1 | 0 | 10 | 2 | 11 | 3 | 9 | 3 |
| 642 | 7 | 5 | 2 | 1 | 0 | 0 | 5 | 6 | 0 | 0 | 2 | 0 | 9 | 0 |
| 643 | 4 | 10 | 7 | 11 | 1 | 6 | 9 | 0 | 9 | 5 | 8 | 1 | 7 | 4 |
| 644 | 7 | 3 | 4 | 0 | 4 | 4 | 2 | 7 | 5 | 0 | 1 | 10 | 8 | 6 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 645 | 11 | 3 | 6 | 0 | 7 | 1 | 5 | 0 | 3 | 9 | 5 | 0 | 5 | 1 |
| 646 | 5 | 10 | 10 | 10 | 8 | 6 | 1 | 11 | 8 | 7 | 9 | 8 | 2 | 11 |
| 647 | 5 | 11 | 7 | 6 | 9 | 4 | 7 | 5 | 3 | 9 | 8 | 5 | 1 | 10 |
| 648 | 10 | 6 | 3 | 6 | 8 | 4 | 2 | 6 | 1 | 9 | 0 | 9 | 6 | 0 |
| 649 | 2 | 11 | 11 | 11 | 6 | 9 | 1 | 4 | 3 | 0 | 9 | 6 | 6 | 10 |
| 650 | 11 | 6 | 3 | 4 | 7 | 2 | 2 | 0 | 11 | 6 | 3 | 1 | 2 | 4 |
| 651 | 11 | 11 | 1 | 0 | 3 | 1 | 0 | 6 | 8 | 4 | 11 | 9 | 11 | 5 |
| 652 | 8 | 10 | 8 | 2 | 7 | 10 | 10 | 5 | 8 | 1 | 4 | 4 | 4 | 11 |
| 653 | 5 | 2 | 1 | 1 | 3 | 9 | 5 | 11 | 3 | 5 | 1 | 6 | 9 | 8 |
| 654 | 1 | 2 | 6 | 1 | 11 | 4 | 3 | 0 | 8 | 2 | 0 | 9 | 0 | 4 |
| 655 | 8 | 7 | 5 | 3 | 3 | 5 | 9 | 3 | 7 | 11 | 6 | 0 | 4 | 8 |
| 656 | 0 | 6 | 10 | 3 | 7 | 1 | 3 | 8 | 0 | 8 | 10 | 1 | 9 | 6 |
| 657 | 0 | 2 | 5 | 6 | 2 | 1 | 7 | 11 | 8 | 1 | 11 | 11 | 10 | 2 |
| 658 | 11 | 3 | 0 | 1 | 2 | 5 | 3 | 1 | 0 | 9 | 6 | 4 | 3 | 5 |
| 659 | 9 | 4 | 4 | 6 | 5 | 0 | 8 | 9 | 7 | 0 | 9 | 8 | 7 | 7 |
| 660 | 4 | 3 | 3 | 6 | 5 | 2 | 11 | 3 | 9 | 7 | 10 | 10 | 7 | 3 |
| 661 | 8 | 5 | 0 | 2 | 2 | 1 | 3 | 10 | 5 | 7 | 11 | 10 | 4 | 0 |
| 662 | 4 | 5 | 0 | 10 | 9 | 5 | 1 | 0 | 7 | 8 | 10 | 5 | 7 | 6 |
| 663 | 7 | 10 | 0 | 6 | 11 | 4 | 8 | 9 | 11 | 11 | 3 | 1 | 4 | 9 |
| 664 | 0 | 5 | 2 | 7 | 3 | 7 | 4 | 6 | 3 | 1 | 7 | 4 | 1 | 2 |
| 665 | 10 | 7 | 11 | 11 | 1 | 10 | 3 | 5 | 7 | 6 | 2 | 0 | 7 | 11 |
| 666 | 5 | 3 | 11 | 3 | 9 | 1 | 11 | 7 | 3 | 6 | 9 | 9 | 11 | 2 |
| 667 | 9 | 1 | 6 | 5 | 7 | 7 | 8 | 3 | 4 | 7 | 7 | 2 | 6 | 7 |
| 668 | 5 | 4 | 11 | 8 | 10 | 0 | 11 | 10 | 10 | 5 | 4 | 8 | 2 | 4 |
| 669 | 9 | 1 | 6 | 10 | 11 | 3 | 10 | 2 | 3 | 8 | 1 | 9 | 2 | 2 |
| 670 | 7 | 8 | 7 | 5 | 9 | 6 | 2 | 3 | 0 | 7 | 1 | 6 | 1 | 3 |
| 671 | 4 | 0 | 6 | 0 | 8 | 8 | 4 | 5 | 6 | 0 | 11 | 1 | 5 | 2 |
| 672 | 5 | 6 | 0 | 1 | 5 | 6 | 4 | 0 | 8 | 10 | 2 | 11 | 4 | 6 |
| 673 | 5 | 3 | 6 | 2 | 1 | 8 | 9 | 4 | 8 | 7 | 3 | 0 | 11 | 4 |
| 674 | 8 | 0 | 3 | 7 | 10 | 10 | 1 | 3 | 3 | 9 | 2 | 7 | 4 | 10 |
| 675 | 0 | 4 | 9 | 10 | 6 | 11 | 7 | 8 | 9 | 0 | 5 | 3 | 10 | 6 |
| 676 | 7 | 1 | 2 | 8 | 1 | 11 | 1 | 2 | 8 | 2 | 5 | 1 | 11 | 8 |
| 677 | 3 | 9 | 7 | 10 | 5 | 4 | 4 | 11 | 10 | 2 | 5 | 7 | 3 | 10 |
| 678 | 9 | 11 | 6 | 0 | 10 | 6 | 10 | 6 | 7 | 11 | 6 | 6 | 10 | 7 |
| 679 | 6 | 1 | 5 | 7 | 2 | 5 | 4 | 0 | 7 | 2 | 1 | 8 | 6 | 4 |
| 680 | 4 | 11 | 3 | 3 | 6 | 0 | 6 | 2 | 6 | 1 | 1 | 6 | 10 | 2 |
| 681 | 7 | 0 | 11 | 6 | 5 | 10 | 9 | 0 | 8 | 3 | 6 | 10 | 9 | 4 |
| 682 | 8 | 10 | 4 | 3 | 3 | 4 | 0 | 1 | 9 | 1 | 0 | 10 | 9 | 10 |
| 683 | 2 | 10 | 7 | 5 | 9 | 3 | 4 | 8 | 8 | 6 | 0 | 9 | 3 | 8 |
| 684 | 2 | 6 | 2 | 0 | 10 | 11 | 9 | 2 | 11 | 7 | 11 | 10 | 8 | 11 |
| 685 | 10 | 9 | 8 | 4 | 3 | 10 | 3 | 0 | 6 | 7 | 1 | 6 | 6 | 10 |
| 686 | 0 | 2 | 1 | 2 | 1 | 5 | 5 | 0 | 4 | 8 | 0 | 1 | 10 | 0 |
| 687 | 3 | 11 | 5 | 2 | 0 | 0 | 10 | 2 | 1 | 7 | 8 | 4 | 0 | 0 |
| 688 | 8 | 6 | 6 | 9 | 8 | 11 | 5 | 7 | 8 | 5 | 11 | 11 | 7 | 7 |
| 689 | 9 | 8 | 1 | 10 | 3 | 7 | 5 | 9 | 1 | 4 | 4 | 8 | 0 | 6 |
| 690 | 2 | 2 | 1 | 0 | 7 | 10 | 11 | 9 | 6 | 8 | 6 | 5 | 5 | 3 |
| 691 | 6 | 2 | 9 | 7 | 0 | 8 | 8 | 9 | 0 | 7 | 7 | 4 | 5 | 5 |
| 692 | 2 | 6 | 3 | 5 | 4 | 10 | 8 | 4 | 0 | 4 | 2 | 2 | 2 | 6 |
| 693 | 8 | 6 | 10 | 7 | 8 | 9 | 9 | 9 | 3 | 7 | 4 | 1 | 1 | 8 |
| 694 | 3 | 10 | 2 | 5 | 10 | 6 | 11 | 2 | 0 | 4 | 7 | 11 | 10 | 4 |
| 695 | 9 | 8 | 0 | 2 | 11 | 2 | 1 | 4 | 11 | 6 | 9 | 0 | 0 | 3 |
| 696 | 10 | 11 | 7 | 9 | 3 | 3 | 7 | 11 | 9 | 0 | 3 | 7 | 5 | 11 |
| 697 | 2 | 1 | 8 | 5 | 8 | 4 | 5 | 5 | 10 | 11 | 10 | 4 | 11 | 6 |
| 698 | 6 | 7 | 3 | 0 | 5 | 10 | 1 | 9 | 2 | 4 | 5 | 0 | 3 | 5 |
| 699 | 10 | 10 | 11 | 8 | 2 | 8 | 4 | 7 | 9 | 3 | 2 | 6 | 10 | 4 |
| 700 | 5 | 8 | 11 | 10 | 2 | 4 | 6 | 4 | 10 | 4 | 11 | 2 | 6 | 8 |
| 701 | 7 | 5 | 8 | 2 | 2 | 9 | 5 | 3 | 2 | 10 | 8 | 6 | 7 | 2 |
| 702 | 5 | 5 | 1 | 2 | 0 | 11 | 8 | 8 | 1 | 3 | 11 | 11 | 8 | 2 |
| 703 | 6 | 8 | 0 | 8 | 5 | 7 | 9 | 4 | 6 | 11 | 11 | 1 | 1 | 10 |
| 704 | 2 | 0 | 7 | 6 | 7 | 7 | 7 | 4 | 1 | 11 | 11 | 7 | 3 | 5 | 1 |
| 705 | 7 | 0 | 9 | 1 | 0 | 4 | 7 | 3 | 9 | 11 | 7 | 2 | 11 | 10 |
| 706 | 6 | 5 | 4 | 5 | 0 | 3 | 10 | 3 | 8 | 9 | 1 | 10 | 7 | 10 |
| 707 | 5 | 2 | 7 | 4 | 1 | 7 | 10 | 10 | 10 | 1 | 9 | 2 | 8 | 0 |
| 708 | 5 | 8 | 4 | 6 | 7 | 6 | 5 | 5 | 11 | 8 | 1 | 11 | 10 | 7 |
| 709 | 4 | 2 | 0 | 4 | 10 | 2 | 10 | 3 | 6 | 10 | 5 | 0 | 10 | 4 |
| 710 | 8 | 1 | 10 | 5 | 2 | 1 | 5 | 4 | 7 | 4 | 0 | 5 | 3 | 11 |
| 711 | 9 | 10 | 1 | 8 | 9 | 11 | 6 | 10 | 3 | 0 | 5 | 5 | 3 | 7 |
| 712 | 6 | 4 | 8 | 10 | 8 | 2 | 8 | 7 | 4 | 1 | 10 | 1 | 0 | 5 |
| 713 | 6 | 9 | 10 | 11 | 1 | 4 | 10 | 1 | 7 | 0 | 6 | 11 | 3 | 8 |
| 714 | 1 | 5 | 1 | 4 | 9 | 8 | 11 | 6 | 8 | 3 | 3 | 5 | 10 | 11 |
| 715 | 5 | 0 | 5 | 9 | 8 | 8 | 7 | 3 | 11 | 8 | 6 | 3 | 1 | 6 |
| 716 | 4 | 4 | 7 | 11 | 8 | 0 | 1 | 1 | 3 | 4 | 5 | 10 | 9 | 8 |
| 717 | 11 | 5 | 4 | 0 | 8 | 7 | 7 | 10 | 6 | 4 | 4 | 6 | 3 | 9 |
| 718 | 10 | 10 | 9 | 0 | 9 | 9 | 10 | 0 | 10 | 11 | 7 | 8 | 8 | 2 |
| 719 | 6 | 2 | 0 | 9 | 0 | 0 | 3 | 7 | 5 | 4 | 8 | 3 | 3 | 1 |
| 720 | 1 | 9 | 10 | 4 | 5 | 11 | 1 | 10 | 11 | 8 | 9 | 11 | 9 | 4 |
| 721 | 4 | 2 | 3 | 8 | 2 | 11 | 2 | 8 | 8 | 9 | 8 | 6 | 4 | 5 |
| 722 | 7 | 7 | 6 | 9 | 9 | 0 | 7 | 7 | 7 | 11 | 10 | 1 | 2 | 0 |
| 723 | 6 | 8 | 9 | 9 | 1 | 9 | 9 | 6 | 5 | 8 | 3 | 2 | 2 | 6 |
| 724 | 1 | 2 | 10 | 10 | 11 | 5 | 5 | 6 | 6 | 11 | 2 | 10 | 2 | 7 |
| 725 | 0 | 7 | 4 | 0 | 9 | 9 | 1 | 8 | 5 | 3 | 9 | 1 | 0 | 1 |
| 726 | 6 | 3 | 10 | 9 | 9 | 2 | 9 | 10 | 1 | 4 | 11 | 4 | 6 | 2 |
| 727 | 0 | 1 | 7 | 4 | 6 | 7 | 6 | 6 | 7 | 5 | 11 | 8 | 10 | 5 |
| 728 | 8 | 7 | 2 | 11 | 5 | 5 | 0 | 8 | 2 | 6 | 11 | 5 | 2 | 7 |
| 729 | 11 | 0 | 10 | 3 | 11 | 8 | 7 | 10 | 0 | 3 | 0 | 0 | 0 | 10 |
| 730 | 7 | 4 | 6 | 3 | 2 | 6 | 8 | 1 | 3 | 6 | 3 | 2 | 1 | 0 |
| 731 | 9 | 0 | 10 | 2 | 7 | 11 | 6 | 7 | 1 | 6 | 6 | 10 | 6 | 0 |
| 732 | 3 | 3 | 6 | 0 | 2 | 6 | 3 | 4 | 4 | 2 | 2 | 7 | 8 | 2 |
| 733 | 5 | 0 | 0 | 6 | 8 | 1 | 5 | 8 | 7 | 2 | 7 | 4 | 2 | 10 |
| 734 | 9 | 6 | 6 | 8 | 4 | 2 | 2 | 11 | 8 | 8 | 4 | 3 | 0 | 8 |
| 735 | 3 | 7 | 3 | 10 | 0 | 5 | 10 | 8 | 7 | 2 | 4 | 6 | 5 | 2 |
| 736 | 7 | 2 | 4 | 0 | 6 | 5 | 4 | 11 | 10 | 6 | 8 | 4 | 1 | 3 |
| 737 | 11 | 9 | 5 | 10 | 4 | 9 | 6 | 4 | 7 | 2 | 0 | 0 | 9 | 6 |
| 738 | 10 | 10 | 2 | 1 | 2 | 11 | 8 | 5 | 1 | 0 | 7 | 10 | 2 | 6 |
| 739 | 9 | 3 | 8 | 3 | 11 | 0 | 5 | 10 | 7 | 9 | 1 | 5 | 8 | 3 |
| 740 | 8 | 6 | 3 | 8 | 11 | 6 | 0 | 11 | 1 | 2 | 6 | 4 | 7 | 6 |
| 741 | 8 | 9 | 0 | 6 | 6 | 7 | 3 | 2 | 11 | 10 | 6 | 6 | 8 | 4 |
| 742 | 0 | 11 | 5 | 5 | 3 | 0 | 2 | 4 | 9 | 1 | 6 | 3 | 11 | 3 |
| 743 | 11 | 11 | 2 | 8 | 10 | 1 | 10 | 8 | 2 | 9 | 0 | 2 | 8 | 10 |
| 744 | 3 | 7 | 9 | 7 | 3 | 2 | 9 | 9 | 11 | 4 | 10 | 9 | 10 | 7 |
| 745 | 10 | 3 | 9 | 3 | 5 | 8 | 1 | 4 | 10 | 10 | 5 | 5 | 6 | 9 |
| 746 | 11 | 8 | 5 | 9 | 4 | 6 | 5 | 11 | 0 | 10 | 10 | 3 | 7 | 1 |
| 747 | 4 | 5 | 4 | 7 | 2 | 0 | 7 | 2 | 0 | 9 | 5 | 2 | 11 | 1 |
| 748 | 9 | 5 | 5 | 11 | 11 | 9 | 2 | 3 | 10 | 8 | 2 | 4 | 3 | 7 |
| 749 | 2 | 0 | 3 | 3 | 10 | 8 | 8 | 6 | 6 | 11 | 5 | 4 | 3 | 0 |
| 750 | 8 | 11 | 0 | 0 | 7 | 3 | 9 | 7 | 11 | 1 | 0 | 1 | 6 | 3 |
| 751 | 0 | 10 | 10 | 6 | 6 | 5 | 6 | 10 | 5 | 9 | 9 | 7 | 11 | 2 |
| 752 | 11 | 7 | 0 | 8 | 1 | 5 | 4 | 10 | 8 | 7 | 10 | 7 | 10 | 10 |
| 753 | 0 | 7 | 1 | 4 | 7 | 7 | 11 | 3 | 0 | 11 | 8 | 7 | 7 | 9 |
| 754 | 2 | 1 | 2 | 10 | 4 | 3 | 6 | 9 | 4 | 1 | 11 | 11 | 3 | 9 |
| 755 | 1 | 10 | 0 | 1 | 5 | 3 | 10 | 6 | 4 | 9 | 5 | 5 | 2 | 3 |
| 756 | 0 | 2 | 8 | 11 | 3 | 1 | 5 | 8 | 1 | 0 | 9 | 10 | 11 | 9 |
| 757 | 5 | 11 | 5 | 0 | 1 | 7 | 8 | 2 | 4 | 5 | 11 | 7 | 3 | 10 |
| 758 | 5 | 8 | 2 | 3 | 8 | 11 | 0 | 11 | 2 | 4 | 6 | 9 | 8 | 0 |
| 759 | 2 | 3 | 4 | 8 | 10 | 7 | 1 | 3 | 9 | 1 | 3 | 3 | 1 | 5 |
| 760 | 7 | 1 | 1 | 5 | 5 | 1 | 6 | 8 | 1 | 8 | 8 | 8 | 5 | 7 |
| 761 | 3 | 5 | 1 | 6 | 9 | 9 | 4 | 3 | 0 | 2 | 6 | 1 | 5 | 4 |
| 762 | 0 | 8 | 11 | 0 | 4 | 2 | 0 | 5 | 7 | 1 | 5 | 9 | 6 | 2 |
| 763 | 11 | 8 | 3 | 0 | 10 | 0 | 3 | 0 | 6 | 5 | 7 | 10 | 4 | 7 |
| 764 | 3 | 3 | 4 | 1 | 11 | 7 | 4 | 0 | 1 | 0 | 10 | 2 | 6 | 10 |
| 765 | 10 | 8 | 0 | 4 | 10 | 3 | 1 | 10 | 7 | 3 | 4 | 9 | 5 | 7 |
| 766 | 3 | 4 | 7 | 11 | 9 | 10 | 3 | 2 | 8 | 0 | 4 | 3 | 2 | 0 |
| 767 | 7 | 0 | 1 | 2 | 11 | 7 | 0 | 7 | 0 | 5 | 3 | 5 | 9 | 7 |
| 768 | 8 | 6 | 9 | 3 | 2 | 11 | 9 | 5 | 11 | 6 | 4 | 9 | 7 | 4 |
| 769 | 1 | 10 | 10 | 10 | 3 | 1 | 7 | 4 | 2 | 9 | 1 | 6 | 1 | 1 |
| 770 | 11 | 7 | 5 | 6 | 6 | 3 | 3 | 10 | 1 | 11 | 6 | 11 | 10 | 3 |
| 771 | 2 | 3 | 11 | 9 | 7 | 4 | 4 | 3 | 3 | 5 | 7 | 10 | 6 | 6 |
| 772 | 9 | 1 | 4 | 2 | 0 | 6 | 5 | 8 | 6 | 3 | 9 | 7 | 3 | 11 |
| 773 | 11 | 3 | 8 | 2 | 9 | 9 | 2 | 7 | 10 | 6 | 2 | 1 | 4 | 1 |
| 774 | 11 | 4 | 11 | 11 | 10 | 8 | 0 | 6 | 11 | 0 | 1 | 5 | 2 | 2 |
| 775 | 2 | 2 | 2 | 7 | 6 | 8 | 10 | 0 | 7 | 3 | 3 | 6 | 8 | 8 |
| 776 | 4 | 0 | 7 | 11 | 2 | 5 | 5 | 7 | 0 | 2 | 0 | 2 | 9 | 5 |
| 777 | 11 | 2 | 9 | 4 | 1 | 2 | 6 | 11 | 4 | 2 | 10 | 4 | 0 | 10 |
| 778 | 0 | 6 | 4 | 8 | 8 | 10 | 3 | 11 | 2 | 7 | 5 | 5 | 9 | 8 |
| 779 | 8 | 5 | 1 | 11 | 4 | 9 | 3 | 4 | 6 | 4 | 2 | 11 | 1 | 5 |
| 780 | 5 | 7 | 6 | 4 | 0 | 6 | 0 | 5 | 1 | 5 | 5 | 0 | 7 | 2 |
| 781 | 0 | 3 | 5 | 7 | 4 | 10 | 7 | 2 | 11 | 8 | 8 | 10 | 5 | 10 |
| 782 | 3 | 3 | 7 | 5 | 1 | 11 | 7 | 10 | 7 | 7 | 11 | 1 | 0 | 11 |
| 783 | 7 | 6 | 6 | 6 | 4 | 10 | 11 | 6 | 9 | 3 | 3 | 7 | 2 | 9 |
| 784 | 1 | 4 | 6 | 3 | 6 | 0 | 8 | 7 | 0 | 7 | 9 | 7 | 11 | 10 |
| 785 | 0 | 6 | 6 | 5 | 6 | 1 | 4 | 0 | 5 | 4 | 6 | 2 | 5 | 5 |
| 786 | 8 | 1 | 11 | 6 | 9 | 5 | 9 | 9 | 9 | 2 | 6 | 8 | 1 | 11 |
| 787 | 4 | 3 | 0 | 3 | 3 | 3 | 4 | 5 | 8 | 10 | 5 | 2 | 1 | 7 |
| 788 | 3 | 10 | 9 | 8 | 10 | 7 | 4 | 8 | 7 | 1 | 5 | 9 | 4 | 1 |
| 789 | 4 | 8 | 9 | 2 | 8 | 9 | 0 | 10 | 8 | 0 | 10 | 10 | 9 | 4 |
| 790 | 7 | 9 | 1 | 0 | 6 | 2 | 2 | 5 | 0 | 2 | 7 | 11 | 3 | 7 |
| 791 | 9 | 5 | 0 | 4 | 0 | 8 | 2 | 11 | 0 | 11 | 3 | 9 | 11 | 5 |
| 792 | 3 | 11 | 3 | 11 | 11 | 9 | 8 | 2 | 9 | 5 | 0 | 5 | 7 | 7 |
| 793 | 10 | 9 | 1 | 8 | 9 | 8 | 0 | 3 | 4 | 9 | 4 | 3 | 10 | 10 |
| 794 | 10 | 5 | 4 | 9 | 10 | 7 | 1 | 4 | 1 | 0 | 4 | 1 | 7 | 0 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 795 | 6 | 2 | 6 | 11 | 5 | 7 | 3 | 2 | 11 | 9 | 7 | 9 | 3 | 3 |
| 796 | 1 | 0 | 3 | 11 | 7 | 11 | 10 | 9 | 4 | 0 | 7 | 4 | 1 | 8 |
| 797 | 10 | 6 | 5 | 0 | 0 | 4 | 9 | 11 | 7 | 10 | 10 | 2 | 8 | 0 |
| 798 | 6 | 11 | 4 | 5 | 11 | 8 | 10 | 8 | 5 | 1 | 8 | 0 | 10 | 4 |
| 799 | 5 | 9 | 0 | 2 | 0 | 9 | 1 | 0 | 2 | 1 | 0 | 6 | 0 | 10 |
| 800 | 7 | 0 | 8 | 3 | 1 | 0 | 0 | 8 | 8 | 2 | 8 | 6 | 2 | 11 |
| 801 | 6 | 8 | 2 | 1 | 4 | 11 | 2 | 8 | 7 | 5 | 0 | 3 | 2 | 10 |
| 802 | 3 | 1 | 0 | 3 | 8 | 10 | 7 | 8 | 1 | 9 | 3 | 8 | 10 | 6 |
| 803 | 6 | 0 | 1 | 10 | 0 | 2 | 11 | 1 | 8 | 3 | 4 | 4 | 8 | 4 |
| 804 | 10 | 4 | 2 | 10 | 9 | 8 | 4 | 11 | 1 | 6 | 3 | 10 | 9 | 11 |
| 805 | 0 | 11 | 2 | 7 | 2 | 10 | 11 | 4 | 4 | 5 | 9 | 8 | 7 | 0 |
| 806 | 7 | 8 | 8 | 7 | 5 | 10 | 5 | 1 | 1 | 2 | 4 | 5 | 7 | 8 |
| 807 | 8 | 3 | 9 | 2 | 11 | 4 | 0 | 5 | 3 | 3 | 11 | 0 | 2 | 11 |
| 808 | 9 | 2 | 0 | 2 | 3 | 10 | 9 | 5 | 4 | 8 | 7 | 5 | 4 | 4 |
| 809 | 7 | 11 | 9 | 1 | 8 | 10 | 8 | 5 | 1 | 5 | 11 | 2 | 0 | 4 |
| 810 | 10 | 7 | 1 | 11 | 11 | 0 | 9 | 6 | 2 | 0 | 6 | 8 | 6 | 6 |
| 811 | 7 | 6 | 1 | 8 | 0 | 3 | 2 | 7 | 10 | 1 | 8 | 9 | 0 | 9 |
| 812 | 11 | 6 | 9 | 4 | 2 | 4 | 4 | 2 | 3 | 1 | 1 | 2 | 9 | 2 |
| 813 | 3 | 10 | 4 | 10 | 5 | 11 | 6 | 4 | 8 | 4 | 9 | 9 | 0 | 3 |
| 814 | 1 | 6 | 9 | 0 | 1 | 10 | 8 | 8 | 5 | 4 | 3 | 6 | 7 | 8 |
| 815 | 3 | 5 | 9 | 11 | 4 | 8 | 5 | 9 | 4 | 8 | 1 | 6 | 8 | 7 |
| 816 | 9 | 4 | 3 | 7 | 3 | 4 | 8 | 0 | 5 | 8 | 1 | 0 | 1 | 7 |
| 817 | 3 | 9 | 7 | 5 | 10 | 4 | 9 | 6 | 3 | 9 | 10 | 0 | 9 | 6 |
| 818 | 9 | 4 | 6 | 9 | 11 | 1 | 1 | 11 | 8 | 4 | 11 | 4 | 3 | 4 |
| 819 | 6 | 11 | 10 | 2 | 7 | 6 | 11 | 9 | 11 | 5 | 1 | 7 | 6 | 2 |
| 820 | 3 | 4 | 8 | 3 | 4 | 3 | 3 | 8 | 6 | 0 | 9 | 0 | 4 | 7 |
| 821 | 1 | 1 | 5 | 1 | 7 | 2 | 11 | 11 | 2 | 7 | 2 | 11 | 1 | 6 |
| 822 | 5 | 4 | 5 | 0 | 2 | 3 | 0 | 0 | 11 | 4 | 10 | 4 | 7 | 9 |
| 823 | 5 | 1 | 9 | 5 | 4 | 1 | 3 | 3 | 1 | 11 | 10 | 1 | 2 | 1 |
| 824 | 4 | 9 | 8 | 6 | 8 | 3 | 9 | 11 | 4 | 8 | 2 | 1 | 9 | 11 |
| 825 | 6 | 3 | 7 | 3 | 10 | 4 | 6 | 1 | 6 | 11 | 7 | 7 | 1 | 9 |
| 826 | 10 | 3 | 1 | 10 | 10 | 10 | 11 | 7 | 5 | 6 | 10 | 5 | 1 | 7 |
| 827 | 0 | 1 | 3 | 0 | 1 | 9 | 10 | 8 | 7 | 5 | 8 | 4 | 6 | 6 |
| 828 | 1 | 2 | 6 | 3 | 7 | 5 | 1 | 10 | 6 | 5 | 0 | 5 | 9 | 9 |
| 829 | 1 | 1 | 5 | 0 | 4 | 1 | 10 | 5 | 4 | 1 | 6 | 5 | 0 | 10 |
| 830 | 8 | 7 | 6 | 10 | 4 | 8 | 2 | 10 | 10 | 1 | 5 | 3 | 3 | 3 |
| 831 | 1 | 6 | 2 | 7 | 4 | 8 | 0 | 5 | 5 | 9 | 7 | 2 | 9 | 3 |
| 832 | 10 | 11 | 4 | 9 | 7 | 5 | 10 | 1 | 3 | 8 | 3 | 8 | 9 | 1 |
| 833 | 0 | 5 | 11 | 3 | 3 | 2 | 4 | 11 | 2 | 11 | 8 | 0 | 7 | 0 |
| 834 | 9 | 6 | 6 | 10 | 7 | 4 | 1 | 2 | 10 | 3 | 4 | 6 | 10 | 6 |
| 835 | 1 | 3 | 11 | 11 | 11 | 8 | 3 | 11 | 6 | 1 | 11 | 6 | 11 | 0 |
| 836 | 5 | 9 | 1 | 7 | 5 | 2 | 5 | 10 | 6 | 8 | 3 | 8 | 4 | 2 |
| 837 | 8 | 7 | 0 | 2 | 1 | 10 | 8 | 4 | 10 | 3 | 2 | 8 | 5 | 9 |
| 838 | 11 | 7 | 2 | 6 | 3 | 0 | 10 | 2 | 4 | 6 | 9 | 4 | 5 | 5 |
| 839 | 4 | 4 | 0 | 11 | 0 | 8 | 6 | 3 | 9 | 2 | 11 | 0 | 0 | 6 |
| 840 | 0 | 10 | 1 | 7 | 10 | 4 | 3 | 6 | 1 | 6 | 2 | 10 | 6 | 3 |
| 841 | 10 | 0 | 11 | 2 | 7 | 1 | 1 | 0 | 11 | 10 | 5 | 4 | 2 | 7 |
| 842 | 7 | 5 | 5 | 5 | 3 | 10 | 8 | 7 | 6 | 8 | 10 | 4 | 9 | 3 |
| 843 | 7 | 2 | 1 | 9 | 9 | 4 | 1 | 8 | 9 | 0 | 0 | 7 | 8 | 2 |
| 844 | 10 | 8 | 0 | 7 | 6 | 2 | 4 | 7 | 6 | 1 | 6 | 10 | 3 | 0 |
| 845 | 7 | 9 | 0 | 0 | 4 | 11 | 6 | 9 | 8 | 7 | 1 | 5 | 11 | 11 |
| 846 | 6 | 7 | 0 | 11 | 9 | 2 | 6 | 8 | 6 | 6 | 8 | 2 | 8 | 5 |
| 847 | 9 | 9 | 2 | 0 | 10 | 7 | 7 | 7 | 10 | 11 | 2 | 8 | 2 | 6 |
| 848 | 2 | 0 | 10 | 4 | 7 | 7 | 9 | 2 | 6 | 8 | 2 | 4 | 0 | 6 |
| 849 | 5 | 11 | 3 | 6 | 7 | 0 | 1 | 3 | 9 | 10 | 8 | 0 | 4 | 0 |
| 850 | 5 | 0 | 11 | 0 | 11 | 4 | 0 | 2 | 10 | 9 | 1 | 10 | 11 | 7 |
| 851 | 2 | 4 | 8 | 5 | 3 | 9 | 11 | 5 | 1 | 4 | 0 | 5 | 1 | 2 |
| 852 | 3 | 0 | 8 | 11 | 6 | 9 | 9 | 3 | 7 | 10 | 4 | 10 | 5 | 3 |
| 853 | 2 | 9 | 9 | 5 | 1 | 7 | 5 | 6 | 9 | 1 | 6 | 5 | 2 | 7 |
| 854 | 11 | 11 | 10 | 1 | 5 | 8 | 11 | 1 | 1 | 6 | 10 | 9 | 10 | 10 |
| 855 | 9 | 11 | 0 | 4 | 9 | 1 | 4 | 5 | 6 | 2 | 10 | 6 | 9 | 6 |
| 856 | 11 | 9 | 4 | 1 | 2 | 2 | 1 | 4 | 4 | 4 | 7 | 10 | 8 | 4 |
| 857 | 1 | 2 | 8 | 9 | 10 | 9 | 5 | 5 | 11 | 3 | 6 | 4 | 8 | 7 |
| 858 | 2 | 9 | 9 | 2 | 3 | 5 | 6 | 2 | 2 | 0 | 11 | 9 | 11 | 1 |
| 859 | 7 | 8 | 0 | 0 | 3 | 6 | 3 | 0 | 5 | 10 | 4 | 7 | 9 | 10 |
| 860 | 9 | 8 | 6 | 9 | 4 | 2 | 4 | 5 | 11 | 5 | 2 | 2 | 4 | 11 |
| 861 | 10 | 5 | 4 | 2 | 4 | 5 | 3 | 3 | 0 | 6 | 7 | 2 | 6 | 4 |
| 862 | 6 | 11 | 8 | 3 | 2 | 2 | 0 | 11 | 1 | 8 | 9 | 2 | 11 | 1 |
| 863 | 10 | 0 | 10 | 0 | 1 | 3 | 3 | 4 | 0 | 5 | 0 | 1 | 10 | 11 |
| 864 | 5 | 3 | 10 | 6 | 11 | 5 | 9 | 0 | 3 | 4 | 9 | 5 | 8 | 8 |
| 865 | 8 | 11 | 4 | 10 | 9 | 3 | 2 | 3 | 3 | 10 | 7 | 9 | 1 | 8 |
| 866 | 9 | 4 | 6 | 10 | 8 | 3 | 3 | 4 | 5 | 9 | 3 | 3 | 5 | 8 |
| 867 | 0 | 10 | 2 | 6 | 0 | 6 | 2 | 1 | 10 | 2 | 6 | 5 | 11 | 4 |
| 868 | 4 | 8 | 10 | 4 | 9 | 7 | 10 | 4 | 7 | 10 | 3 | 1 | 3 | 9 |
| 869 | 8 | 10 | 9 | 11 | 6 | 0 | 6 | 5 | 2 | 2 | 2 | 1 | 9 | 0 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 870 | 11 | 5 | 7 | 2 | 11 | 0 | 11 | 1 | 5 | 8 | 8 | 1 | 11 | 3 |
| 871 | 7 | 0 | 0 | 8 | 11 | 3 | 7 | 6 | 0 | 11 | 10 | 3 | 1 | 4 |
| 872 | 4 | 0 | 7 | 7 | 3 | 4 | 0 | 9 | 9 | 11 | 8 | 9 | 5 | 3 |
| 873 | 10 | 7 | 3 | 1 | 2 | 0 | 10 | 11 | 9 | 8 | 7 | 5 | 3 | 11 |
| 874 | 5 | 8 | 9 | 6 | 9 | 11 | 8 | 4 | 0 | 7 | 10 | 11 | 6 | 11 |
| 875 | 8 | 1 | 7 | 8 | 10 | 6 | 6 | 3 | 11 | 10 | 9 | 3 | 11 | 4 |
| 876 | 1 | 5 | 2 | 6 | 3 | 9 | 1 | 8 | 9 | 8 | 11 | 8 | 10 | 1 |
| 877 | 6 | 1 | 8 | 1 | 11 | 5 | 3 | 1 | 7 | 1 | 3 | 1 | 1 | 7 |
| 878 | 0 | 9 | 4 | 8 | 10 | 6 | 2 | 2 | 5 | 3 | 11 | 4 | 6 | 10 |
| 879 | 4 | 9 | 5 | 4 | 1 | 0 | 3 | 9 | 5 | 10 | 7 | 3 | 1 | 4 |
| 880 | 9 | 0 | 5 | 5 | 5 | 10 | 2 | 11 | 11 | 9 | 5 | 1 | 7 | 1 |
| 881 | 5 | 11 | 9 | 4 | 1 | 10 | 9 | 10 | 2 | 9 | 7 | 1 | 6 | 9 |
| 882 | 9 | 6 | 11 | 7 | 9 | 3 | 7 | 8 | 8 | 5 | 5 | 5 | 4 | 3 |
| 883 | 4 | 9 | 0 | 9 | 11 | 6 | 0 | 2 | 3 | 6 | 6 | 8 | 1 | 8 |
| 884 | 1 | 4 | 4 | 6 | 5 | 7 | 9 | 11 | 5 | 6 | 5 | 7 | 10 | 9 |
| 885 | 6 | 2 | 3 | 7 | 3 | 0 | 6 | 4 | 0 | 11 | 4 | 6 | 9 | 4 |
| 886 | 4 | 8 | 8 | 3 | 10 | 1 | 7 | 9 | 10 | 3 | 0 | 7 | 10 | 4 |
| 887 | 6 | 6 | 8 | 10 | 2 | 11 | 6 | 9 | 7 | 10 | 6 | 0 | 10 | 9 |
| 888 | 9 | 1 | 3 | 7 | 6 | 11 | 1 | 10 | 9 | 9 | 4 | 10 | 6 | 11 |
| 889 | 2 | 0 | 10 | 7 | 11 | 10 | 8 | 3 | 4 | 10 | 3 | 11 | 9 | 11 |
| 890 | 2 | 5 | 8 | 10 | 11 | 8 | 9 | 7 | 11 | 11 | 5 | 2 | 6 | 8 |
| 891 | 8 | 10 | 2 | 1 | 5 | 0 | 1 | 9 | 11 | 3 | 0 | 6 | 6 | 9 |
| 892 | 10 | 7 | 10 | 9 | 2 | 2 | 0 | 9 | 6 | 9 | 3 | 1 | 1 | 6 |
| 893 | 3 | 6 | 1 | 10 | 3 | 0 | 9 | 4 | 3 | 7 | 0 | 2 | 5 | 11 |
| 894 | 7 | 6 | 1 | 4 | 8 | 9 | 3 | 1 | 7 | 6 | 11 | 6 | 5 | 6 |
| 895 | 11 | 8 | 8 | 0 | 8 | 8 | 7 | 2 | 8 | 11 | 8 | 4 | 7 | 1 |
| 896 | 11 | 2 | 2 | 8 | 2 | 0 | 0 | 9 | 7 | 11 | 5 | 7 | 3 | 7 |
| 897 | 4 | 1 | 2 | 9 | 1 | 1 | 8 | 0 | 8 | 10 | 4 | 6 | 4 | 1 |
| 898 | 5 | 10 | 4 | 1 | 11 | 10 | 10 | 7 | 6 | 0 | 2 | 8 | 11 | 11 |
| 899 | 6 | 4 | 7 | 5 | 11 | 6 | 7 | 7 | 10 | 5 | 4 | 4 | 11 | 8 |
| 900 | 3 | 3 | 3 | 9 | 2 | 4 | 11 | 8 | 4 | 4 | 10 | 11 | 3 | 5 |
| 901 | 11 | 8 | 1 | 11 | 9 | 11 | 4 | 10 | 4 | 3 | 1 | 10 | 7 | 9 |
| 902 | 10 | 8 | 3 | 5 | 5 | 6 | 0 | 10 | 6 | 2 | 7 | 0 | 6 | 1 |
| 903 | 8 | 3 | 10 | 0 | 9 | 8 | 7 | 6 | 7 | 0 | 7 | 6 | 6 | 3 |
| 904 | 4 | 2 | 4 | 6 | 6 | 4 | 0 | 7 | 0 | 8 | 4 | 5 | 6 | 2 |
| 905 | 5 | 7 | 2 | 10 | 7 | 1 | 11 | 10 | 6 | 2 | 1 | 10 | 0 | 5 |
| 906 | 2 | 10 | 5 | 1 | 11 | 11 | 6 | 11 | 4 | 6 | 4 | 7 | 8 | 2 |
| 907 | 10 | 1 | 7 | 1 | 5 | 4 | 11 | 4 | 0 | 8 | 6 | 7 | 7 | 4 |
| 908 | 3 | 2 | 11 | 2 | 0 | 4 | 4 | 9 | 1 | 9 | 11 | 3 | 7 | 1 |
| 909 | 11 | 6 | 10 | 4 | 0 | 11 | 1 | 9 | 5 | 0 | 5 | 9 | 5 | 0 |
| 910 | 10 | 2 | 3 | 2 | 2 | 9 | 7 | 7 | 3 | 0 | 8 | 11 | 2 | 0 |
| 911 | 3 | 1 | 10 | 3 | 6 | 6 | 11 | 1 | 8 | 2 | 11 | 3 | 5 | 5 |
| 912 | 6 | 7 | 1 | 5 | 10 | 5 | 4 | 6 | 0 | 10 | 11 | 5 | 8 | 9 |
| 913 | 0 | 9 | 6 | 2 | 4 | 11 | 8 | 2 | 0 | 9 | 0 | 0 | 1 | 2 |
| 914 | 2 | 11 | 11 | 9 | 1 | 0 | 0 | 6 | 0 | 3 | 5 | 1 | 5 | 3 |
| 915 | 2 | 1 | 0 | 4 | 7 | 6 | 7 | 9 | 2 | 4 | 10 | 2 | 8 | 1 |
| 916 | 6 | 1 | 9 | 6 | 1 | 1 | 11 | 4 | 9 | 0 | 5 | 2 | 11 | 2 |
| 917 | 0 | 5 | 7 | 2 | 3 | 11 | 3 | 10 | 3 | 3 | 10 | 7 | 5 | 5 |
| 918 | 7 | 1 | 3 | 2 | 7 | 0 | 5 | 6 | 8 | 4 | 7 | 1 | 6 | 10 |
| 919 | 11 | 8 | 7 | 8 | 1 | 3 | 10 | 9 | 3 | 9 | 11 | 4 | 11 | 0 |
| 920 | 4 | 10 | 11 | 0 | 4 | 6 | 1 | 3 | 0 | 3 | 2 | 10 | 4 | 2 |
| 921 | 4 | 10 | 8 | 1 | 2 | 2 | 5 | 2 | 3 | 10 | 11 | 11 | 4 | 10 |
| 922 | 6 | 10 | 1 | 8 | 7 | 10 | 6 | 0 | 0 | 3 | 7 | 9 | 7 | 10 |
| 923 | 11 | 6 | 5 | 5 | 11 | 7 | 9 | 8 | 2 | 4 | 2 | 7 | 4 | 7 |
| 924 | 8 | 11 | 2 | 6 | 4 | 11 | 3 | 11 | 2 | 3 | 9 | 1 | 0 | 4 |
| 925 | 6 | 11 | 6 | 3 | 7 | 1 | 7 | 6 | 9 | 2 | 2 | 8 | 5 | 7 |
| 926 | 5 | 9 | 6 | 11 | 3 | 0 | 5 | 4 | 8 | 10 | 1 | 7 | 2 | 3 |
| 927 | 2 | 10 | 5 | 8 | 1 | 9 | 3 | 2 | 1 | 2 | 1 | 4 | 5 | 7 |
| 928 | 6 | 7 | 9 | 1 | 10 | 11 | 3 | 9 | 8 | 4 | 7 | 6 | 9 | 6 |
| 929 | 11 | 11 | 3 | 7 | 0 | 6 | 9 | 11 | 3 | 6 | 1 | 11 | 0 | 5 |
| 930 | 2 | 6 | 4 | 7 | 8 | 5 | 1 | 5 | 1 | 1 | 2 | 11 | 8 | 1 |
| 931 | 5 | 10 | 9 | 5 | 3 | 4 | 2 | 10 | 4 | 3 | 0 | 2 | 4 | 8 |
| 932 | 3 | 7 | 4 | 7 | 9 | 7 | 1 | 7 | 8 | 8 | 1 | 2 | 3 | 8 |
| 933 | 10 | 2 | 5 | 11 | 1 | 2 | 4 | 10 | 9 | 6 | 9 | 11 | 6 | 8 |
| 934 | 7 | 2 | 0 | 10 | 4 | 7 | 0 | 6 | 2 | 4 | 5 | 10 | 0 | 0 |
| 935 | 8 | 5 | 11 | 11 | 6 | 5 | 8 | 11 | 1 | 5 | 5 | 9 | 6 | 9 |
| 936 | 11 | 5 | 11 | 5 | 2 | 1 | 4 | 10 | 11 | 5 | 4 | 3 | 8 | 3 |
| 937 | 0 | 1 | 4 | 7 | 4 | 0 | 2 | 7 | 4 | 2 | 10 | 11 | 10 | 3 |
| 938 | 8 | 11 | 5 | 5 | 9 | 11 | 0 | 8 | 0 | 0 | 1 | 4 | 3 | 0 |
| 939 | 0 | 9 | 7 | 11 | 4 | 7 | 7 | 6 | 4 | 10 | 9 | 1 | 4 | 1 |
| 940 | 8 | 1 | 2 | 3 | 1 | 4 | 4 | 3 | 2 | 4 | 1 | 7 | 2 | 5 |
| 941 | 0 | 0 | 3 | 5 | 4 | 3 | 9 | 5 | 6 | 9 | 8 | 6 | 8 | 8 |
| 942 | 5 | 6 | 10 | 5 | 5 | 2 | 7 | 11 | 4 | 5 | 9 | 3 | 5 | 9 |
| 943 | 8 | 10 | 10 | 11 | 0 | 3 | 2 | 6 | 1 | 4 | 3 | 4 | 2 | 6 |
| 944 | 2 | 3 | 1 | 6 | 0 | 8 | 0 | 8 | 7 | 8 | 1 | 2 | 5 | 9 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 945 | 2 | 3 | 10 | 9 | 2 | 3 | 8 | 1 | 2 | 7 | 1 | 7 | 0 | 4 |
| 946 | 1 | 7 | 7 | 3 | 6 | 5 | 10 | 4 | 2 | 10 | 4 | 4 | 10 | 6 |
| 947 | 1 | 8 | 9 | 1 | 5 | 8 | 6 | 4 | 2 | 3 | 8 | 2 | 2 | 7 |
| 948 | 4 | 1 | 10 | 6 | 3 | 6 | 3 | 7 | 4 | 1 | 1 | 2 | 2 | 0 |
| 949 | 3 | 5 | 6 | 0 | 1 | 11 | 5 | 1 | 5 | 0 | 6 | 3 | 9 | 2 |
| 950 | 1 | 8 | 11 | 9 | 1 | 7 | 7 | 2 | 6 | 10 | 1 | 8 | 8 | 11 |
| 951 | 10 | 3 | 2 | 5 | 3 | 5 | 3 | 4 | 7 | 8 | 9 | 9 | 4 | 10 |
| 952 | 5 | 11 | 7 | 4 | 10 | 11 | 11 | 0 | 1 | 2 | 3 | 2 | 3 | 8 |
| 953 | 11 | 2 | 3 | 6 | 11 | 10 | 8 | 5 | 5 | 2 | 6 | 3 | 6 | 5 |
| 954 | 11 | 0 | 11 | 10 | 8 | 5 | 10 | 8 | 6 | 7 | 0 | 3 | 1 | 1 |
| 955 | 0 | 2 | 4 | 0 | 4 | 3 | 6 | 11 | 11 | 10 | 0 | 8 | 3 | 7 |
| 956 | 4 | 5 | 4 | 5 | 7 | 0 | 8 | 5 | 10 | 3 | 7 | 11 | 4 | 5 |
| 957 | 9 | 7 | 5 | 10 | 9 | 9 | 5 | 8 | 4 | 7 | 4 | 9 | 2 | 4 |
| 958 | 0 | 4 | 5 | 8 | 8 | 6 | 6 | 5 | 3 | 1 | 10 | 2 | 10 | 6 |
| 959 | 4 | 7 | 9 | 3 | 9 | 7 | 2 | 5 | 0 | 9 | 9 | 5 | 10 | 5 |
| 960 | 2 | 6 | 3 | 5 | 0 | 7 | 2 | 10 | 8 | 10 | 9 | 4 | 3 | 2 |
| 961 | 1 | 2 | 5 | 4 | 7 | 1 | 9 | 7 | 0 | 4 | 1 | 1 | 7 | 11 |
| 962 | 5 | 0 | 5 | 2 | 9 | 6 | 11 | 6 | 6 | 8 | 7 | 11 | 7 | 0 |
| 963 | 3 | 5 | 7 | 1 | 7 | 11 | 6 | 5 | 11 | 9 | 5 | 6 | 1 | 0 |
| 964 | 1 | 2 | 10 | 1 | 0 | 0 | 5 | 11 | 10 | 9 | 10 | 8 | 5 | 3 |
| 965 | 11 | 0 | 1 | 4 | 5 | 6 | 2 | 0 | 2 | 7 | 8 | 4 | 3 | 5 |
| 966 | 9 | 6 | 2 | 10 | 6 | 9 | 8 | 10 | 11 | 1 | 7 | 7 | 4 | 2 |
| 967 | 9 | 5 | 4 | 11 | 5 | 9 | 10 | 0 | 1 | 7 | 9 | 0 | 11 | 6 |
| 968 | 1 | 2 | 4 | 10 | 8 | 7 | 6 | 1 | 10 | 1 | 11 | 1 | 9 | 2 |
| 969 | 0 | 3 | 5 | 1 | 5 | 5 | 4 | 8 | 10 | 0 | 9 | 3 | 7 | 11 |
| 970 | 6 | 7 | 1 | 3 | 8 | 3 | 8 | 10 | 4 | 0 | 0 | 4 | 3 | 1 |
| 971 | 0 | 9 | 10 | 10 | 6 | 4 | 5 | 2 | 3 | 5 | 2 | 7 | 7 | 1 |
| 972 | 1 | 3 | 0 | 2 | 10 | 0 | 1 | 2 | 4 | 5 | 1 | 10 | 10 | 0 |
| 973 | 1 | 3 | 4 | 9 | 6 | 10 | 2 | 10 | 9 | 2 | 5 | 4 | 5 | 0 |
| 974 | 7 | 4 | 2 | 1 | 11 | 4 | 5 | 5 | 2 | 8 | 0 | 4 | 4 | 1 |
| 975 | 11 | 1 | 0 | 1 | 10 | 7 | 0 | 8 | 0 | 7 | 4 | 2 | 9 | 11 |
| 976 | 7 | 3 | 7 | 2 | 5 | 1 | 8 | 6 | 6 | 7 | 6 | 2 | 3 | 6 |
| 977 | 0 | 6 | 8 | 0 | 2 | 8 | 1 | 0 | 0 | 6 | 3 | 7 | 3 | 0 |
| 978 | 0 | 9 | 0 | 10 | 3 | 6 | 4 | 1 | 0 | 0 | 3 | 11 | 10 | 9 |
| 979 | 6 | 2 | 10 | 11 | 8 | 8 | 2 | 5 | 3 | 3 | 2 | 8 | 11 | 4 |
| 980 | 10 | 2 | 10 | 6 | 4 | 5 | 4 | 1 | 1 | 5 | 6 | 6 | 2 | 2 |
| 981 | 3 | 7 | 11 | 1 | 6 | 3 | 0 | 11 | 7 | 4 | 1 | 1 | 4 | 4 |
| 982 | 2 | 8 | 6 | 11 | 10 | 7 | 11 | 3 | 3 | 7 | 0 | 0 | 8 | 0 |
| 983 | 6 | 4 | 9 | 10 | 7 | 5 | 5 | 0 | 6 | 4 | 8 | 11 | 4 | 11 |
| 984 | 10 | 3 | 5 | 11 | 9 | 4 | 11 | 9 | 2 | 2 | 4 | 4 | 0 | 2 |
| 985 | 7 | 10 | 0 | 11 | 1 | 8 | 10 | 4 | 3 | 5 | 10 | 9 | 3 | 2 |
| 986 | 5 | 10 | 10 | 7 | 7 | 9 | 2 | 9 | 7 | 11 | 11 | 11 | 8 | 4 |
| 987 | 8 | 9 | 3 | 1 | 7 | 3 | 5 | 4 | 3 | 0 | 9 | 5 | 10 | 6 |
| 988 | 8 | 3 | 6 | 8 | 2 | 2 | 10 | 0 | 9 | 0 | 9 | 10 | 2 | 10 |
| 989 | 5 | 11 | 6 | 6 | 2 | 9 | 4 | 7 | 5 | 5 | 10 | 1 | 10 | 8 |
| 990 | 7 | 4 | 6 | 10 | 11 | 9 | 11 | 9 | 4 | 5 | 7 | 11 | 0 | 6 |
| 991 | 7 | 6 | 10 | 3 | 3 | 5 | 6 | 0 | 1 | 3 | 1 | 4 | 6 | 5 |
| 992 | 5 | 6 | 0 | 3 | 1 | 1 | 0 | 6 | 4 | 11 | 11 | 5 | 10 | 8 |
| 993 | 7 | 0 | 2 | 9 | 8 | 6 | 8 | 1 | 11 | 11 | 2 | 0 | 7 | 5 |
| 994 | 8 | 8 | 7 | 10 | 0 | 5 | 8 | 0 | 11 | 0 | 6 | 6 | 7 | 7 |
| 995 | 4 | 2 | 7 | 0 | 0 | 8 | 3 | 7 | 8 | 6 | 2 | 11 | 8 | 11 |
| 996 | 0 | 1 | 8 | 2 | 1 | 7 | 1 | 3 | 3 | 8 | 9 | 8 | 1 | 3 |
| 997 | 6 | 10 | 3 | 1 | 8 | 8 | 4 | 7 | 2 | 8 | 1 | 11 | 7 | 2 |
| 998 | 9 | 7 | 1 | 3 | 1 | 10 | 1 | 2 | 0 | 7 | 8 | 3 | 0 | 7 |
| 999 | 1 | 7 | 11 | 1 | 3 | 10 | 7 | 3 | 10 | 0 | 11 | 7 | 6 | 10 |
| 1000 | 8 | 2 | 8 | 7 | 11 | 7 | 2 | 6 | 5 | 9 | 1 | 7 | 5 | 1 |
| 1001 | 1 | 6 | 4 | 8 | 4 | 7 | 10 | 6 | 7 | 11 | 4 | 11 | 11 | 5 |
| 1002 | 2 | 5 | 3 | 8 | 5 | 3 | 7 | 8 | 4 | 2 | 11 | 1 | 2 | 2 |
| 1003 | 3 | 11 | 2 | 6 | 8 | 2 | 1 | 6 | 8 | 11 | 5 | 9 | 1 | 11 |
| 1004 | 5 | 4 | 4 | 8 | 6 | 11 | 9 | 1 | 6 | 4 | 0 | 2 | 9 | 7 |
| 1005 | 11 | 0 | 5 | 3 | 11 | 2 | 5 | 3 | 8 | 6 | 6 | 1 | 5 | 9 |
| 1006 | 7 | 4 | 8 | 0 | 7 | 7 | 9 | 10 | 9 | 7 | 11 | 6 | 1 | 8 |
| 1007 | 4 | 11 | 7 | 6 | 11 | 7 | 10 | 3 | 8 | 9 | 10 | 6 | 0 | 2 |
| 1008 | 11 | 1 | 7 | 9 | 0 | 10 | 6 | 5 | 9 | 5 | 1 | 7 | 9 | 1 |
| 1009 | 1 | 10 | 8 | 6 | 9 | 4 | 0 | 6 | 10 | 10 | 0 | 3 | 5 | 5 |
| 1010 | 9 | 4 | 10 | 8 | 3 | 6 | 10 | 3 | 2 | 5 | 6 | 8 | 4 | 10 |
| 1011 | 2 | 8 | 7 | 1 | 5 | 9 | 4 | 11 | 9 | 5 | 11 | 0 | 1 | 3 |
| 1012 | 8 | 8 | 10 | 8 | 9 | 10 | 1 | 2 | 10 | 4 | 6 | 7 | 9 | 0 |
| 1013 | 11 | 1 | 4 | 11 | 5 | 5 | 11 | 2 | 2 | 10 | 3 | 10 | 6 | 8 |
| 1014 | 2 | 4 | 11 | 8 | 5 | 11 | 8 | 5 | 9 | 11 | 8 | 10 | 11 | 1 |
| 1015 | 10 | 6 | 6 | 6 | 1 | 1 | 10 | 8 | 11 | 6 | 1 | 8 | 3 | 10 |
| 1016 | 4 | 3 | 1 | 3 | 0 | 11 | 1 | 6 | 3 | 2 | 10 | 10 | 8 | 10 |
| 1017 | 11 | 0 | 3 | 0 | 6 | 5 | 4 | 5 | 7 | 1 | 10 | 0 | 11 | 11 |
| 1018 | 8 | 6 | 0 | 6 | 8 | 2 | 11 | 10 | 0 | 2 | 2 | 2 | 10 | 4 |
| 1019 | 3 | 3 | 9 | 1 | 0 | 8 | 3 | 5 | 9 | 10 | 6 | 3 | 4 | 3 |
| 1020 | 2 | 5 | 1 | 1 | 2 | 10 | 11 | 2 | 8 | 1 | 0 | 10 | 11 | 6 |
| 1021 | 0 | 3 | 9 | 6 | 8 | 0 | 6 | 7 | 6 | 0 | 4 | 0 | 5 | 8 |
| 1022 | 8 | 4 | 0 | 1 | 8 | 4 | 1 | 7 | 1 | 7 | 10 | 0 | 3 | 3 |
| 1023 | 7 | 7 | 11 | 5 | 8 | 5 | 5 | 3 | 2 | 9 | 3 | 11 | 0 | 3 |
| 1024 | 3 | 2 | 0 | 8 | 11 | 7 | 10 | 9 | 8 | 7 | 7 | 8 | 9 | 5 |
| 1025 | 11 | 0 | 9 | 2 | 8 | 6 | 0 | 4 | 2 | 8 | 10 | 9 | 7 | 7 |
| 1026 | 0 | 7 | 5 | 5 | 9 | 0 | 5 | 3 | 11 | 10 | 1 | 6 | 4 | 2 |
| 1027 | 9 | 1 | 2 | 4 | 5 | 8 | 4 | 6 | 10 | 3 | 9 | 7 | 6 | 9 |
| 1028 | 3 | 5 | 5 | 7 | 7 | 9 | 1 | 10 | 3 | 6 | 6 | 10 | 2 | 8 |
| 1029 | 4 | 5 | 10 | 3 | 6 | 5 | 7 | 7 | 9 | 5 | 10 | 2 | 3 | 10 |
| 1030 | 7 | 1 | 8 | 11 | 2 | 6 | 3 | 5 | 5 | 7 | 6 | 3 | 10 | 6 |
| 1031 | 6 | 1 | 6 | 6 | 3 | 4 | 5 | 1 | 2 | 4 | 2 | 1 | 1 | 11 |
| 1032 | 2 | 11 | 6 | 11 | 11 | 5 | 0 | 2 | 4 | 10 | 3 | 7 | 5 | 3 |
| 1033 | 8 | 10 | 9 | 9 | 7 | 11 | 8 | 6 | 6 | 4 | 7 | 4 | 11 | 2 |
| 1034 | 1 | 6 | 3 | 6 | 10 | 11 | 0 | 8 | 0 | 9 | 6 | 6 | 8 | 0 |
| 1035 | 3 | 8 | 6 | 0 | 0 | 10 | 8 | 5 | 5 | 8 | 1 | 2 | 9 | 8 |
| 1036 | 4 | 9 | 11 | 1 | 8 | 1 | 4 | 4 | 7 | 3 | 2 | 3 | 9 | 8 |
| 1037 | 8 | 11 | 5 | 11 | 5 | 4 | 7 | 7 | 6 | 3 | 2 | 5 | 8 | 7 |
| 1038 | 1 | 11 | 10 | 11 | 0 | 7 | 5 | 6 | 1 | 7 | 5 | 1 | 6 | 0 |
| 1039 | 11 | 5 | 2 | 0 | 2 | 8 | 3 | 4 | 6 | 11 | 3 | 4 | 0 | 5 |
| 1040 | 7 | 5 | 9 | 10 | 11 | 11 | 2 | 9 | 7 | 8 | 0 | 7 | 8 | 1 |
| 1041 | 7 | 0 | 1 | 3 | 3 | 7 | 8 | 11 | 9 | 1 | 0 | 8 | 6 | 8 |
| 1042 | 5 | 4 | 6 | 7 | 1 | 6 | 6 | 3 | 6 | 2 | 7 | 8 | 4 | 8 |
| 1043 | 8 | 6 | 4 | 1 | 4 | 2 | 7 | 8 | 3 | 10 | 0 | 2 | 0 | 5 |
| 1044 | 9 | 4 | 7 | 6 | 7 | 5 | 2 | 5 | 2 | 9 | 10 | 0 | 4 | 4 |
| 1045 | 6 | 8 | 3 | 1 | 2 | 6 | 8 | 2 | 10 | 0 | 0 | 0 | 5 | 7 |
| 1046 | 4 | 8 | 6 | 10 | 11 | 9 | 10 | 7 | 1 | 11 | 5 | 6 | 2 | 6 |
| 1047 | 5 | 5 | 10 | 5 | 9 | 9 | 0 | 0 | 8 | 2 | 2 | 0 | 5 | 5 |
| 1048 | 6 | 6 | 1 | 10 | 3 | 5 | 4 | 4 | 5 | 6 | 5 | 5 | 3 | 3 |
| 1049 | 4 | 5 | 8 | 7 | 11 | 2 | 3 | 11 | 4 | 4 | 9 | 5 | 6 | 0 |
| 1050 | 8 | 6 | 2 | 5 | 6 | 4 | 11 | 2 | 11 | 11 | 10 | 1 | 11 | 8 |
| 1051 | 7 | 3 | 10 | 6 | 11 | 0 | 1 | 2 | 8 | 5 | 11 | 6 | 7 | 4 |
| 1052 | 6 | 2 | 1 | 8 | 5 | 1 | 3 | 6 | 4 | 9 | 8 | 11 | 5 | 6 |
| 1053 | 10 | 11 | 3 | 9 | 9 | 4 | 4 | 0 | 7 | 8 | 10 | 6 | 1 | 4 |
| 1054 | 7 | 6 | 8 | 3 | 10 | 3 | 6 | 4 | 10 | 4 | 4 | 11 | 2 | 4 |
| 1055 | 10 | 9 | 10 | 0 | 8 | 0 | 10 | 3 | 5 | 2 | 10 | 10 | 8 | 3 |
| 1056 | 10 | 10 | 6 | 9 | 4 | 2 | 11 | 11 | 8 | 5 | 6 | 7 | 9 | 1 |
| 1057 | 5 | 3 | 7 | 5 | 5 | 3 | 9 | 8 | 5 | 10 | 5 | 1 | 7 | 10 |
| 1058 | 6 | 9 | 1 | 11 | 2 | 10 | 7 | 11 | 0 | 11 | 7 | 6 | 4 | 11 |
| 1059 | 1 | 8 | 2 | 10 | 4 | 1 | 4 | 3 | 2 | 1 | 6 | 8 | 10 | 11 |
| 1060 | 4 | 11 | 5 | 1 | 4 | 6 | 8 | 6 | 8 | 2 | 6 | 8 | 8 | 6 |
| 1061 | 9 | 0 | 0 | 5 | 10 | 7 | 4 | 10 | 2 | 5 | 5 | 3 | 4 | 9 |
| 1062 | 11 | 11 | 11 | 8 | 1 | 3 | 0 | 9 | 7 | 4 | 6 | 3 | 10 | 5 |
| 1063 | 9 | 5 | 11 | 6 | 2 | 8 | 5 | 1 | 0 | 1 | 4 | 6 | 2 | 9 |
| 1064 | 0 | 5 | 7 | 9 | 11 | 0 | 11 | 6 | 1 | 11 | 9 | 4 | 1 | 1 |
| 1065 | 2 | 3 | 9 | 6 | 6 | 4 | 1 | 11 | 2 | 0 | 8 | 4 | 4 | 6 |
| 1066 | 1 | 10 | 0 | 5 | 4 | 9 | 4 | 6 | 8 | 6 | 4 | 1 | 1 | 4 |
| 1067 | 8 | 9 | 9 | 6 | 10 | 4 | 3 | 3 | 4 | 6 | 3 | 9 | 10 | 3 |
| 1068 | 9 | 10 | 4 | 7 | 11 | 0 | 10 | 8 | 7 | 3 | 11 | 2 | 3 | 1 |
| 1069 | 11 | 3 | 7 | 4 | 1 | 4 | 5 | 2 | 2 | 6 | 4 | 5 | 5 | 4 |
| 1070 | 7 | 8 | 9 | 3 | 11 | 6 | 9 | 8 | 8 | 10 | 7 | 10 | 2 | 9 |
| 1071 | 0 | 6 | 1 | 2 | 7 | 10 | 7 | 10 | 5 | 3 | 8 | 1 | 10 | 6 |
| 1072 | 3 | 1 | 1 | 0 | 0 | 2 | 10 | 3 | 1 | 0 | 11 | 3 | 10 | 10 |
| 1073 | 9 | 2 | 9 | 3 | 2 | 1 | 3 | 2 | 2 | 2 | 3 | 1 | 9 | 11 |
| 1074 | 0 | 7 | 8 | 2 | 5 | 1 | 0 | 2 | 0 | 3 | 3 | 3 | 11 | 10 |
| 1075 | 3 | 7 | 0 | 0 | 7 | 11 | 3 | 7 | 2 | 8 | 3 | 8 | 10 | 9 |
| 1076 | 6 | 11 | 11 | 1 | 0 | 1 | 9 | 0 | 6 | 11 | 9 | 10 | 7 | 9 |
| 1077 | 6 | 7 | 0 | 6 | 10 | 10 | 11 | 10 | 3 | 3 | 0 | 2 | 2 | 3 |
| 1078 | 8 | 5 | 11 | 9 | 5 | 8 | 7 | 11 | 8 | 11 | 11 | 3 | 6 | 10 |
| 1079 | 6 | 7 | 10 | 9 | 7 | 4 | 10 | 11 | 4 | 10 | 1 | 5 | 8 | 8 |
| 1080 | 4 | 10 | 7 | 11 | 4 | 8 | 0 | 10 | 2 | 0 | 10 | 8 | 1 | 0 |
| 1081 | 5 | 6 | 0 | 3 | 2 | 3 | 2 | 11 | 1 | 9 | 2 | 10 | 7 | 8 |
| 1082 | 8 | 11 | 3 | 0 | 11 | 5 | 5 | 10 | 0 | 9 | 10 | 2 | 9 | 11 |
| 1083 | 2 | 0 | 1 | 2 | 0 | 3 | 0 | 2 | 8 | 9 | 6 | 0 | 3 | 2 |
| 1084 | 1 | 3 | 0 | 4 | 2 | 9 | 1 | 8 | 10 | 5 | 7 | 8 | 8 | 11 |
| 1085 | 1 | 1 | 11 | 1 | 5 | 11 | 10 | 5 | 10 | 6 | 0 | 10 | 8 | 8 |
| 1086 | 6 | 8 | 9 | 2 | 9 | 8 | 3 | 1 | 4 | 2 | 11 | 2 | 0 | 7 |
| 1087 | 4 | 4 | 6 | 7 | 5 | 2 | 9 | 8 | 9 | 8 | 1 | 7 | 2 | 5 |
| 1088 | 1 | 5 | 10 | 9 | 6 | 3 | 1 | 3 | 6 | 0 | 2 | 10 | 1 | 0 |
| 1089 | 6 | 1 | 5 | 10 | 9 | 0 | 0 | 1 | 7 | 9 | 8 | 5 | 10 | 8 |
| 1090 | 5 | 6 | 7 | 6 | 3 | 2 | 8 | 2 | 0 | 5 | 8 | 10 | 3 | 7 |
| 1091 | 11 | 2 | 7 | 3 | 5 | 5 | 8 | 8 | 3 | 11 | 10 | 11 | 11 | 2 |
| 1092 | 8 | 10 | 8 | 0 | 10 | 7 | 10 | 7 | 9 | 4 | 2 | 7 | 3 | 9 |
| 1093 | 6 | 4 | 10 | 11 | 8 | 5 | 8 | 9 | 6 | 1 | 0 | 2 | 7 | 1 |
| 1094 | 4 | 2 | 3 | 7 | 9 | 5 | 10 | 9 | 7 | 11 | 4 | 4 | 8 | 7 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 1095 | 5 | 10 | 3 | 7 | 10 | 10 | 3 | 10 | 8 | 10 | 4 | 0 | 9 | 0 |
| 1096 | 9 | 8 | 0 | 11 | 4 | 6 | 1 | 3 | 3 | 4 | 5 | 11 | 0 | 1 |
| 1097 | 3 | 3 | 3 | 8 | 9 | 10 | 9 | 3 | 2 | 4 | 3 | 5 | 9 | 2 |
| 1098 | 10 | 8 | 11 | 8 | 6 | 4 | 2 | 3 | 0 | 1 | 9 | 1 | 4 | 5 |
| 1099 | 10 | 4 | 7 | 4 | 11 | 1 | 6 | 6 | 6 | 3 | 5 | 2 | 9 | 0 |
| 1100 | 10 | 5 | 2 | 6 | 11 | 7 | 0 | 8 | 5 | 1 | 11 | 10 | 4 | 6 |
| 1101 | 2 | 9 | 4 | 8 | 8 | 2 | 11 | 9 | 9 | 0 | 3 | 9 | 9 | 0 |
| 1102 | 10 | 4 | 0 | 10 | 3 | 1 | 5 | 7 | 8 | 11 | 10 | 7 | 5 | 10 |
| 1103 | 7 | 2 | 1 | 3 | 10 | 5 | 4 | 5 | 7 | 10 | 3 | 3 | 0 | 0 |
| 1104 | 10 | 0 | 2 | 10 | 6 | 2 | 6 | 1 | 3 | 4 | 5 | 5 | 1 | 5 |
| 1105 | 9 | 10 | 8 | 4 | 0 | 10 | 2 | 4 | 6 | 6 | 8 | 0 | 2 | 10 |
| 1106 | 9 | 9 | 5 | 8 | 10 | 3 | 1 | 4 | 8 | 0 | 7 | 4 | 11 | 7 |
| 1107 | 3 | 2 | 4 | 4 | 0 | 8 | 1 | 2 | 0 | 8 | 11 | 1 | 11 | 3 |
| 1108 | 9 | 4 | 3 | 0 | 4 | 8 | 6 | 1 | 10 | 9 | 6 | 4 | 11 | 2 |
| 1109 | 11 | 0 | 10 | 11 | 0 | 2 | 3 | 7 | 11 | 8 | 7 | 6 | 2 | 4 |
| 1110 | 2 | 11 | 1 | 4 | 8 | 2 | 6 | 5 | 5 | 8 | 7 | 3 | 8 | 2 |
| 1111 | 7 | 6 | 5 | 9 | 8 | 9 | 7 | 11 | 5 | 4 | 9 | 9 | 7 | 9 |
| 1112 | 0 | 6 | 7 | 2 | 1 | 9 | 9 | 6 | 4 | 2 | 2 | 5 | 11 | 11 |
| 1113 | 2 | 6 | 6 | 8 | 9 | 8 | 1 | 6 | 7 | 10 | 7 | 3 | 7 | 9 |
| 1114 | 5 | 0 | 2 | 1 | 10 | 4 | 10 | 0 | 7 | 6 | 9 | 7 | 4 | 6 |
| 1115 | 11 | 9 | 4 | 0 | 6 | 5 | 6 | 0 | 11 | 8 | 2 | 1 | 10 | 11 |
| 1116 | 3 | 11 | 9 | 7 | 3 | 5 | 2 | 3 | 5 | 5 | 0 | 0 | 10 | 11 |
| 1117 | 8 | 7 | 7 | 8 | 0 | 4 | 0 | 6 | 0 | 7 | 0 | 8 | 5 | 8 |
| 1118 | 7 | 11 | 6 | 0 | 5 | 9 | 4 | 10 | 8 | 0 | 0 | 11 | 3 | 6 |
| 1119 | 8 | 3 | 10 | 1 | 7 | 6 | 2 | 7 | 1 | 7 | 8 | 2 | 2 | 2 |
| 1120 | 0 | 2 | 10 | 7 | 11 | 3 | 11 | 8 | 10 | 7 | 8 | 3 | 8 | 4 |
| 1121 | 11 | 7 | 5 | 4 | 9 | 5 | 7 | 8 | 1 | 6 | 2 | 3 | 6 | 9 |
| 1122 | 0 | 7 | 7 | 1 | 2 | 11 | 8 | 9 | 3 | 6 | 4 | 3 | 4 | 0 |
| 1123 | 4 | 4 | 10 | 5 | 9 | 11 | 6 | 11 | 1 | 11 | 11 | 9 | 4 | 3 |
| 1124 | 6 | 1 | 7 | 10 | 0 | 3 | 7 | 6 | 2 | 5 | 7 | 10 | 9 | 4 |
| 1125 | 8 | 4 | 5 | 2 | 10 | 11 | 0 | 10 | 1 | 7 | 7 | 0 | 6 | 10 |
| 1126 | 11 | 3 | 0 | 7 | 6 | 8 | 0 | 9 | 11 | 10 | 11 | 11 | 11 | 0 |
| 1127 | 1 | 3 | 8 | 1 | 8 | 2 | 3 | 0 | 1 | 8 | 10 | 0 | 9 | 1 |
| 1128 | 3 | 4 | 10 | 5 | 11 | 7 | 9 | 5 | 4 | 5 | 9 | 11 | 2 | 1 |
| 1129 | 10 | 7 | 11 | 10 | 4 | 5 | 6 | 3 | 9 | 3 | 7 | 9 | 2 | 2 |
| 1130 | 11 | 6 | 1 | 5 | 5 | 0 | 1 | 3 | 10 | 7 | 9 | 2 | 0 | 3 |
| 1131 | 11 | 6 | 8 | 2 | 8 | 7 | 3 | 8 | 9 | 3 | 4 | 4 | 4 | 8 |
| 1132 | 7 | 0 | 6 | 9 | 2 | 5 | 9 | 0 | 2 | 9 | 5 | 8 | 11 | 6 |
| 1133 | 6 | 6 | 2 | 1 | 8 | 1 | 1 | 2 | 9 | 4 | 8 | 7 | 8 | 1 |
| 1134 | 1 | 2 | 6 | 0 | 2 | 4 | 7 | 2 | 0 | 9 | 9 | 0 | 2 | 4 |
| 1135 | 1 | 2 | 9 | 8 | 4 | 3 | 5 | 5 | 1 | 2 | 1 | 6 | 7 | 4 |
| 1136 | 1 | 4 | 6 | 10 | 5 | 4 | 4 | 4 | 3 | 5 | 4 | 4 | 4 | 2 |
| 1137 | 0 | 3 | 2 | 3 | 1 | 8 | 2 | 0 | 6 | 1 | 11 | 9 | 5 | 2 |
| 1138 | 8 | 7 | 2 | 11 | 1 | 2 | 5 | 4 | 6 | 7 | 6 | 11 | 11 | 11 |
| 1139 | 3 | 4 | 9 | 8 | 4 | 1 | 7 | 2 | 5 | 10 | 9 | 10 | 3 | 10 |
| 1140 | 6 | 6 | 8 | 4 | 4 | 3 | 9 | 11 | 7 | 2 | 5 | 7 | 0 | 2 |
| 1141 | 4 | 7 | 1 | 0 | 5 | 11 | 7 | 5 | 1 | 4 | 4 | 11 | 0 | 5 |
| 1142 | 10 | 7 | 3 | 5 | 2 | 3 | 0 | 7 | 10 | 11 | 1 | 11 | 10 | 8 |
| 1143 | 1 | 5 | 4 | 3 | 3 | 5 | 0 | 5 | 0 | 3 | 5 | 11 | 2 | 6 |
| 1144 | 10 | 1 | 4 | 8 | 4 | 0 | 1 | 5 | 11 | 1 | 2 | 10 | 11 | 2 |
| 1145 | 5 | 4 | 4 | 3 | 0 | 7 | 11 | 6 | 3 | 6 | 4 | 5 | 0 | 6 |
| 1146 | 11 | 2 | 3 | 11 | 7 | 7 | 5 | 4 | 10 | 2 | 8 | 2 | 10 | 9 |
| 1147 | 5 | 6 | 1 | 11 | 6 | 11 | 3 | 7 | 1 | 5 | 9 | 5 | 9 | 11 |
| 1148 | 0 | 6 | 0 | 1 | 7 | 0 | 4 | 0 | 10 | 6 | 11 | 0 | 11 | 10 |
| 1149 | 11 | 10 | 3 | 4 | 8 | 5 | 9 | 1 | 8 | 1 | 6 | 8 | 5 | 7 |
| 1150 | 0 | 0 | 3 | 1 | 0 | 7 | 2 | 1 | 11 | 5 | 6 | 1 | 10 | 5 |
| 1151 | 6 | 9 | 4 | 11 | 5 | 9 | 5 | 3 | 10 | 0 | 1 | 10 | 2 | 1 |
| 1152 | 2 | 11 | 11 | 5 | 4 | 7 | 9 | 4 | 5 | 1 | 8 | 9 | 9 | 7 |
| 1153 | 4 | 2 | 3 | 9 | 3 | 8 | 2 | 8 | 3 | 4 | 11 | 0 | 1 | 1 |
| 1154 | 8 | 8 | 11 | 0 | 7 | 7 | 11 | 11 | 7 | 3 | 0 | 6 | 7 | 7 |
| 1155 | 9 | 2 | 11 | 2 | 10 | 9 | 7 | 0 | 6 | 6 | 7 | 1 | 5 | 0 |
| 1156 | 2 | 9 | 4 | 5 | 3 | 10 | 5 | 7 | 4 | 6 | 11 | 2 | 11 | 8 |
| 1157 | 4 | 7 | 1 | 3 | 1 | 8 | 3 | 3 | 7 | 6 | 5 | 10 | 11 | 8 |
| 1158 | 1 | 11 | 5 | 2 | 6 | 8 | 5 | 0 | 5 | 0 | 9 | 6 | 9 | 3 |
| 1159 | 5 | 11 | 7 | 7 | 0 | 1 | 5 | 4 | 7 | 9 | 6 | 6 | 4 | 7 |
| 1160 | 11 | 5 | 7 | 3 | 7 | 3 | 10 | 7 | 8 | 2 | 11 | 9 | 8 | 11 |
| 1161 | 3 | 7 | 7 | 4 | 6 | 3 | 9 | 0 | 3 | 3 | 6 | 5 | 3 | 6 |
| 1162 | 4 | 2 | 5 | 11 | 3 | 10 | 6 | 2 | 11 | 7 | 0 | 4 | 7 | 3 |
| 1163 | 5 | 7 | 8 | 9 | 0 | 6 | 5 | 0 | 2 | 3 | 8 | 1 | 0 | 4 |
| 1164 | 6 | 9 | 9 | 4 | 4 | 7 | 4 | 2 | 2 | 11 | 1 | 11 | 6 | 5 |
| 1165 | 8 | 0 | 1 | 7 | 9 | 0 | 5 | 11 | 5 | 7 | 2 | 7 | 10 | 5 |
| 1166 | 3 | 5 | 11 | 11 | 6 | 0 | 6 | 0 | 5 | 11 | 4 | 0 | 4 | 0 |
| 1167 | 9 | 6 | 7 | 0 | 10 | 9 | 11 | 11 | 8 | 11 | 3 | 10 | 8 | 2 |
| 1168 | 9 | 8 | 5 | 2 | 9 | 10 | 10 | 6 | 0 | 1 | 3 | 10 | 6 | 11 |
| 1169 | 6 | 1 | 10 | 0 | 9 | 3 | 5 | 2 | 9 | 3 | 1 | 3 | 5 | 6 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 1170 | 7 | 10 | 6 | 6 | 6 | 3 | 8 | 10 | 10 | 6 | 7 | 9 | 6 | 5 |
| 1171 | 5 | 9 | 10 | 9 | 1 | 10 | 6 | 7 | 11 | 3 | 6 | 5 | 5 | 10 |
| 1172 | 2 | 11 | 9 | 9 | 11 | 9 | 3 | 8 | 9 | 2 | 6 | 6 | 10 | 1 |
| 1173 | 0 | 5 | 5 | 10 | 0 | 11 | 1 | 5 | 9 | 10 | 10 | 3 | 1 | 5 |
| 1174 | 2 | 6 | 9 | 4 | 5 | 11 | 11 | 1 | 7 | 6 | 2 | 8 | 9 | 4 |
| 1175 | 3 | 9 | 11 | 6 | 4 | 6 | 0 | 9 | 6 | 10 | 10 | 6 | 0 | 8 |
| 1176 | 2 | 11 | 5 | 7 | 1 | 0 | 11 | 5 | 2 | 7 | 1 | 1 | 2 | 7 |
| 1177 | 5 | 8 | 7 | 8 | 2 | 1 | 7 | 6 | 3 | 8 | 11 | 7 | 1 | 9 |
| 1178 | 4 | 1 | 9 | 10 | 3 | 8 | 9 | 4 | 11 | 3 | 10 | 6 | 8 | 5 |
| 1179 | 10 | 6 | 9 | 4 | 3 | 2 | 10 | 8 | 10 | 3 | 6 | 9 | 5 | 3 |
| 1180 | 2 | 5 | 3 | 10 | 6 | 4 | 2 | 5 | 6 | 7 | 6 | 8 | 6 | 2 |
| 1181 | 8 | 7 | 0 | 11 | 0 | 3 | 1 | 1 | 8 | 2 | 4 | 3 | 7 | 6 |
| 1182 | 5 | 6 | 3 | 11 | 11 | 2 | 9 | 5 | 6 | 0 | 1 | 6 | 4 | 6 |
| 1183 | 0 | 10 | 10 | 5 | 3 | 1 | 1 | 9 | 7 | 8 | 6 | 8 | 3 | 10 |
| 1184 | 1 | 4 | 6 | 5 | 10 | 3 | 10 | 1 | 0 | 2 | 3 | 5 | 3 | 7 |
| 1185 | 6 | 10 | 4 | 2 | 1 | 7 | 6 | 4 | 1 | 10 | 3 | 5 | 2 | 0 |
| 1186 | 4 | 9 | 10 | 7 | 8 | 2 | 2 | 6 | 8 | 6 | 0 | 11 | 4 | 9 |
| 1187 | 5 | 11 | 3 | 10 | 8 | 8 | 11 | 8 | 1 | 10 | 8 | 4 | 0 | 9 |
| 1188 | 9 | 3 | 2 | 8 | 5 | 0 | 11 | 0 | 9 | 2 | 10 | 4 | 10 | 4 |
| 1189 | 11 | 2 | 2 | 1 | 2 | 10 | 2 | 6 | 7 | 7 | 6 | 9 | 1 | 10 |
| 1190 | 1 | 3 | 0 | 7 | 0 | 4 | 9 | 2 | 4 | 7 | 3 | 2 | 0 | 1 |
| 1191 | 3 | 1 | 3 | 3 | 3 | 6 | 0 | 8 | 4 | 5 | 2 | 8 | 5 | 4 |
| 1192 | 0 | 0 | 8 | 9 | 1 | 11 | 0 | 4 | 6 | 0 | 0 | 8 | 8 | 5 |
| 1193 | 8 | 5 | 10 | 2 | 10 | 1 | 2 | 9 | 10 | 9 | 5 | 3 | 5 | 7 |
| 1194 | 1 | 3 | 7 | 3 | 0 | 1 | 2 | 10 | 9 | 8 | 4 | 3 | 2 | 8 |
| 1195 | 0 | 9 | 2 | 3 | 9 | 6 | 6 | 5 | 3 | 0 | 3 | 7 | 8 | 3 |
| 1196 | 11 | 5 | 9 | 1 | 3 | 1 | 11 | 8 | 6 | 0 | 1 | 5 | 11 | 10 |
| 1197 | 1 | 5 | 7 | 7 | 9 | 2 | 4 | 0 | 11 | 0 | 7 | 4 | 3 | 8 |
| 1198 | 1 | 9 | 8 | 2 | 7 | 6 | 4 | 7 | 4 | 5 | 7 | 1 | 7 | 1 |
| 1199 | 3 | 1 | 8 | 3 | 7 | 8 | 11 | 11 | 5 | 9 | 5 | 5 | 1 | 10 |
| 1200 | 6 | 10 | 8 | 1 | 10 | 9 | 1 | 8 | 2 | 1 | 0 | 3 | 6 | 0 |
| 1201 | 3 | 10 | 8 | 8 | 8 | 11 | 8 | 3 | 0 | 3 | 1 | 0 | 7 | 6 |
| 1202 | 3 | 2 | 0 | 3 | 6 | 9 | 7 | 3 | 4 | 8 | 8 | 6 | 7 | 1 |
| 1203 | 9 | 4 | 8 | 2 | 6 | 2 | 5 | 3 | 11 | 4 | 2 | 2 | 11 | 6 |
| 1204 | 3 | 1 | 9 | 9 | 0 | 4 | 11 | 10 | 6 | 3 | 9 | 11 | 9 | 6 |
| 1205 | 1 | 1 | 4 | 9 | 11 | 5 | 8 | 0 | 3 | 5 | 0 | 9 | 5 | 10 |
| 1206 | 10 | 5 | 1 | 7 | 3 | 0 | 2 | 7 | 0 | 9 | 3 | 5 | 0 | 4 |
| 1207 | 7 | 1 | 2 | 2 | 7 | 5 | 11 | 0 | 1 | 0 | 6 | 10 | 4 | 11 |
| 1208 | 0 | 8 | 5 | 11 | 8 | 7 | 4 | 9 | 1 | 4 | 2 | 10 | 10 | 4 |
| 1209 | 11 | 3 | 11 | 5 | 9 | 5 | 3 | 7 | 6 | 3 | 8 | 7 | 7 | 3 |
| 1210 | 11 | 9 | 10 | 7 | 10 | 3 | 7 | 10 | 1 | 11 | 9 | 5 | 0 | 2 |
| 1211 | 11 | 4 | 0 | 6 | 9 | 10 | 1 | 0 | 5 | 11 | 2 | 6 | 11 | 7 |
| 1212 | 10 | 8 | 4 | 11 | 0 | 11 | 3 | 9 | 2 | 6 | 6 | 1 | 1 | 2 |
| 1213 | 0 | 3 | 6 | 10 | 8 | 6 | 10 | 10 | 7 | 7 | 11 | 0 | 4 | 3 |
| 1214 | 7 | 6 | 3 | 1 | 7 | 10 | 0 | 9 | 6 | 2 | 2 | 10 | 9 | 3 |
| 1215 | 5 | 0 | 5 | 5 | 3 | 7 | 3 | 4 | 11 | 0 | 4 | 11 | 1 | 10 |
| 1216 | 6 | 3 | 4 | 4 | 3 | 11 | 1 | 7 | 9 | 7 | 4 | 10 | 4 | 10 |
| 1217 | 4 | 6 | 9 | 4 | 1 | 6 | 3 | 4 | 0 | 7 | 4 | 7 | 3 | 1 |
| 1218 | 10 | 3 | 10 | 8 | 1 | 8 | 9 | 11 | 9 | 11 | 8 | 0 | 3 | 1 |
| 1219 | 2 | 4 | 11 | 7 | 2 | 11 | 7 | 2 | 2 | 5 | 6 | 2 | 7 | 0 |
| 1220 | 9 | 4 | 1 | 1 | 6 | 7 | 1 | 4 | 7 | 2 | 1 | 6 | 1 | 11 |
| 1221 | 6 | 2 | 1 | 2 | 9 | 4 | 6 | 3 | 2 | 1 | 4 | 7 | 3 | 9 |
| 1222 | 11 | 4 | 2 | 11 | 11 | 9 | 8 | 11 | 1 | 5 | 3 | 8 | 11 | 4 |
| 1223 | 2 | 7 | 4 | 6 | 8 | 6 | 0 | 3 | 1 | 2 | 1 | 7 | 11 | 5 |
| 1224 | 0 | 4 | 2 | 1 | 1 | 4 | 3 | 7 | 5 | 9 | 2 | 2 | 7 | 9 |
| 1225 | 4 | 1 | 2 | 7 | 0 | 7 | 0 | 1 | 1 | 4 | 0 | 9 | 9 | 2 |
| 1226 | 4 | 3 | 4 | 4 | 2 | 0 | 0 | 9 | 4 | 3 | 3 | 1 | 7 | 9 |
| 1227 | 8 | 8 | 3 | 2 | 1 | 0 | 4 | 2 | 6 | 5 | 4 | 2 | 6 | 9 |
| 1228 | 11 | 1 | 6 | 2 | 3 | 9 | 11 | 7 | 4 | 10 | 10 | 3 | 3 | 0 |
| 1229 | 1 | 2 | 2 | 3 | 0 | 0 | 5 | 3 | 8 | 3 | 3 | 0 | 11 | 7 |
| 1230 | 3 | 10 | 6 | 10 | 7 | 8 | 1 | 0 | 4 | 2 | 0 | 9 | 3 | 1 |
| 1231 | 9 | 1 | 0 | 1 | 8 | 11 | 5 | 4 | 11 | 9 | 7 | 9 | 10 | 4 |
| 1232 | 0 | 10 | 6 | 4 | 1 | 5 | 5 | 5 | 10 | 9 | 8 | 11 | 1 | 8 |
| 1233 | 5 | 0 | 1 | 7 | 10 | 8 | 2 | 5 | 3 | 2 | 1 | 10 | 5 | 9 |
| 1234 | 5 | 1 | 9 | 11 | 4 | 5 | 6 | 9 | 10 | 7 | 3 | 8 | 6 | 7 |
| 1235 | 3 | 9 | 2 | 1 | 1 | 9 | 4 | 9 | 11 | 6 | 3 | 4 | 6 | 11 |
| 1236 | 0 | 8 | 8 | 8 | 3 | 9 | 7 | 10 | 1 | 10 | 6 | 2 | 8 | 1 |
| 1237 | 2 | 1 | 0 | 3 | 4 | 10 | 3 | 1 | 0 | 0 | 5 | 3 | 6 | 0 |
| 1238 | 8 | 9 | 5 | 0 | 4 | 6 | 9 | 0 | 5 | 9 | 0 | 11 | 2 | 0 |
| 1239 | 11 | 11 | 4 | 10 | 7 | 10 | 7 | 5 | 11 | 9 | 9 | 9 | 6 | 3 |
| 1240 | 8 | 0 | 7 | 4 | 5 | 6 | 10 | 8 | 11 | 2 | 3 | 10 | 1 | 6 |
| 1241 | 2 | 1 | 1 | 9 | 7 | 3 | 5 | 8 | 6 | 10 | 4 | 2 | 2 | 3 |
| 1242 | 6 | 1 | 11 | 0 | 2 | 9 | 4 | 8 | 3 | 2 | 8 | 10 | 11 | 7 |
| 1243 | 1 | 8 | 5 | 4 | 10 | 5 | 11 | 9 | 10 | 2 | 6 | 7 | 7 | 10 |
| 1244 | 5 | 1 | 0 | 4 | 4 | 11 | 2 | 10 | 4 | 8 | 11 | 5 | 4 | 2 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 1245 | 2 | 3 | 6 | 4 | 0 | 9 | 8 | 11 | 6 | 9 | 2 | 6 | 0 | 5 |
| 1246 | 7 | 8 | 9 | 11 | 5 | 7 | 5 | 5 | 11 | 11 | 9 | 0 | 11 | 10 |
| 1247 | 10 | 2 | 8 | 1 | 7 | 4 | 5 | 6 | 3 | 11 | 0 | 4 | 9 | 11 |
| 1248 | 8 | 7 | 6 | 5 | 9 | 6 | 11 | 9 | 8 | 1 | 9 | 11 | 6 | 3 |
| 1249 | 7 | 0 | 4 | 8 | 3 | 4 | 10 | 4 | 5 | 11 | 11 | 3 | 0 | 9 |
| 1250 | 5 | 4 | 9 | 3 | 6 | 5 | 9 | 11 | 0 | 2 | 0 | 9 | 11 | 0 |
| 1251 | 5 | 10 | 2 | 1 | 3 | 11 | 9 | 2 | 1 | 8 | 3 | 3 | 5 | 8 |
| 1252 | 4 | 4 | 11 | 4 | 9 | 8 | 8 | 0 | 9 | 0 | 0 | 5 | 8 | 11 |
| 1253 | 5 | 11 | 0 | 2 | 6 | 0 | 8 | 6 | 9 | 8 | 0 | 10 | 0 | 5 |
| 1254 | 4 | 2 | 9 | 7 | 7 | 11 | 0 | 7 | 8 | 0 | 1 | 1 | 5 | 3 |
| 1255 | 4 | 2 | 3 | 0 | 10 | 11 | 11 | 1 | 4 | 5 | 8 | 7 | 6 | 11 |
| 1256 | 6 | 5 | 11 | 1 | 4 | 4 | 8 | 5 | 4 | 1 | 7 | 11 | 1 | 4 |
| 1257 | 9 | 9 | 6 | 10 | 1 | 9 | 5 | 6 | 0 | 3 | 0 | 3 | 8 | 3 |
| 1258 | 2 | 7 | 2 | 0 | 3 | 8 | 4 | 2 | 8 | 6 | 2 | 6 | 4 | 7 |
| 1259 | 7 | 1 | 11 | 4 | 4 | 0 | 8 | 8 | 8 | 6 | 10 | 0 | 10 | 1 |
| 1260 | 8 | 7 | 4 | 3 | 3 | 9 | 8 | 0 | 10 | 9 | 10 | 4 | 8 | 3 |
| 1261 | 4 | 7 | 7 | 6 | 8 | 5 | 10 | 6 | 5 | 8 | 2 | 9 | 0 | 1 |
| 1262 | 11 | 7 | 5 | 0 | 7 | 0 | 6 | 4 | 4 | 1 | 5 | 10 | 7 | 4 |
| 1263 | 5 | 0 | 3 | 9 | 0 | 5 | 1 | 9 | 1 | 1 | 7 | 5 | 3 | 8 |
| 1264 | 5 | 3 | 9 | 0 | 9 | 8 | 4 | 10 | 3 | 11 | 5 | 9 | 9 | 4 |
| 1265 | 9 | 3 | 3 | 2 | 3 | 10 | 1 | 0 | 8 | 3 | 9 | 8 | 0 | 5 |
| 1266 | 0 | 4 | 0 | 9 | 2 | 2 | 7 | 1 | 11 | 8 | 4 | 0 | 6 | 11 |
| 1267 | 11 | 11 | 3 | 1 | 1 | 0 | 10 | 1 | 9 | 0 | 10 | 7 | 7 | 2 |
| 1268 | 9 | 5 | 8 | 3 | 0 | 9 | 4 | 9 | 2 | 11 | 9 | 2 | 5 | 8 |
| 1269 | 6 | 11 | 0 | 10 | 4 | 2 | 11 | 9 | 5 | 7 | 10 | 0 | 11 | 4 |
| 1270 | 1 | 0 | 1 | 1 | 8 | 1 | 6 | 9 | 10 | 10 | 11 | 9 | 3 | 11 |
| 1271 | 11 | 9 | 9 | 6 | 7 | 9 | 2 | 4 | 9 | 4 | 9 | 8 | 5 | 6 |
| 1272 | 3 | 0 | 7 | 11 | 1 | 3 | 4 | 3 | 9 | 9 | 2 | 7 | 2 | 7 |
| 1273 | 3 | 10 | 1 | 11 | 11 | 10 | 11 | 4 | 4 | 8 | 4 | 10 | 8 | 6 |
| 1274 | 4 | 0 | 2 | 11 | 7 | 1 | 11 | 2 | 2 | 3 | 4 | 0 | 0 | 9 |
| 1275 | 7 | 2 | 4 | 2 | 11 | 1 | 9 | 3 | 3 | 6 | 2 | 11 | 4 | 5 |
| 1276 | 0 | 7 | 4 | 0 | 0 | 5 | 4 | 7 | 1 | 7 | 6 | 0 | 9 | 6 |
| 1277 | 9 | 6 | 4 | 6 | 9 | 1 | 5 | 11 | 3 | 8 | 8 | 0 | 6 | 8 |
| 1278 | 5 | 2 | 0 | 11 | 5 | 0 | 10 | 11 | 7 | 1 | 10 | 3 | 5 | 11 |
| 1279 | 8 | 1 | 8 | 10 | 1 | 1 | 8 | 5 | 10 | 0 | 7 | 1 | 0 | 9 |
| 1280 | 1 | 6 | 5 | 2 | 5 | 10 | 6 | 1 | 8 | 2 | 10 | 9 | 11 | 9 |
| 1281 | 0 | 10 | 10 | 4 | 11 | 1 | 2 | 10 | 1 | 1 | 11 | 0 | 10 | 4 |
| 1282 | 7 | 5 | 11 | 3 | 8 | 11 | 5 | 0 | 9 | 0 | 8 | 4 | 9 | 6 |
| 1283 | 3 | 5 | 9 | 9 | 0 | 10 | 0 | 2 | 3 | 10 | 7 | 7 | 4 | 5 |
| 1284 | 1 | 11 | 10 | 3 | 7 | 0 | 11 | 8 | 0 | 6 | 2 | 8 | 1 | 8 |
| 1285 | 5 | 0 | 6 | 11 | 2 | 7 | 4 | 6 | 4 | 4 | 1 | 0 | 4 | 8 |
| 1286 | 11 | 8 | 4 | 6 | 6 | 4 | 8 | 4 | 1 | 0 | 5 | 1 | 6 | 1 |
| 1287 | 9 | 10 | 9 | 1 | 9 | 3 | 3 | 9 | 5 | 0 | 9 | 2 | 11 | 3 |
| 1288 | 6 | 4 | 4 | 0 | 11 | 5 | 10 | 11 | 10 | 9 | 9 | 5 | 5 | 6 |
| 1289 | 8 | 7 | 7 | 11 | 1 | 11 | 10 | 9 | 0 | 5 | 5 | 7 | 10 | 10 |
| 1290 | 4 | 1 | 7 | 0 | 10 | 4 | 6 | 5 | 7 | 8 | 6 | 0 | 8 | 11 |
| 1291 | 11 | 11 | 1 | 9 | 8 | 4 | 5 | 1 | 6 | 11 | 0 | 3 | 4 | 7 |
| 1292 | 4 | 4 | 1 | 5 | 3 | 6 | 0 | 0 | 3 | 3 | 11 | 10 | 7 | 11 |
| 1293 | 2 | 0 | 3 | 1 | 1 | 1 | 2 | 7 | 0 | 10 | 0 | 2 | 6 | 1 |
| 1294 | 1 | 3 | 3 | 7 | 6 | 2 | 7 | 11 | 0 | 4 | 6 | 9 | 2 | 10 |
| 1295 | 9 | 5 | 8 | 7 | 1 | 4 | 2 | 6 | 2 | 6 | 1 | 3 | 0 | 5 |
| 1296 | 6 | 9 | 11 | 9 | 11 | 11 | 11 | 8 | 1 | 10 | 3 | 3 | 3 | 10 |
| 1297 | 5 | 1 | 2 | 10 | 4 | 4 | 0 | 11 | 3 | 6 | 10 | 2 | 6 | 4 |
| 1298 | 11 | 11 | 3 | 5 | 9 | 1 | 11 | 2 | 10 | 1 | 6 | 10 | 0 | 6 |
| 1299 | 1 | 2 | 5 | 5 | 1 | 8 | 9 | 7 | 2 | 8 | 4 | 8 | 9 | 0 |
| 1300 | 0 | 2 | 9 | 0 | 5 | 6 | 11 | 10 | 11 | 7 | 3 | 2 | 9 | 8 |
| 1301 | 11 | 1 | 8 | 8 | 0 | 5 | 0 | 3 | 8 | 11 | 9 | 11 | 2 | 0 |
| 1302 | 8 | 7 | 4 | 5 | 4 | 6 | 3 | 4 | 9 | 11 | 7 | 3 | 5 | 8 |
| 1303 | 3 | 9 | 4 | 6 | 9 | 5 | 6 | 2 | 2 | 3 | 1 | 6 | 8 | 2 |
| 1304 | 1 | 5 | 0 | 6 | 5 | 7 | 3 | 5 | 10 | 8 | 7 | 2 | 10 | 2 |
| 1305 | 0 | 0 | 5 | 6 | 2 | 2 | 1 | 0 | 1 | 9 | 7 | 6 | 5 | 3 |
| 1306 | 4 | 0 | 2 | 6 | 5 | 3 | 6 | 8 | 6 | 5 | 5 | 8 | 0 | 7 |
| 1307 | 8 | 4 | 8 | 3 | 1 | 9 | 8 | 1 | 11 | 1 | 9 | 6 | 6 | 2 |
| 1308 | 8 | 9 | 9 | 9 | 2 | 8 | 4 | 11 | 6 | 2 | 6 | 2 | 1 | 6 |
| 1309 | 0 | 3 | 11 | 1 | 10 | 10 | 4 | 3 | 11 | 5 | 0 | 4 | 1 | 9 |
| 1310 | 2 | 6 | 4 | 7 | 9 | 8 | 10 | 10 | 9 | 8 | 3 | 10 | 11 | 7 |
| 1311 | 2 | 7 | 3 | 6 | 5 | 8 | 5 | 9 | 7 | 1 | 10 | 5 | 8 | 4 |
| 1312 | 7 | 7 | 2 | 4 | 8 | 7 | 2 | 3 | 4 | 9 | 7 | 10 | 11 | 1 |
| 1313 | 5 | 9 | 5 | 4 | 3 | 0 | 7 | 0 | 7 | 11 | 0 | 8 | 10 | 2 |
| 1314 | 9 | 9 | 2 | 2 | 3 | 10 | 8 | 9 | 2 | 9 | 3 | 1 | 1 | 4 |
| 1315 | 0 | 4 | 11 | 7 | 8 | 0 | 1 | 9 | 4 | 11 | 3 | 5 | 6 | 5 |
| 1316 | 2 | 6 | 6 | 8 | 8 | 9 | 4 | 5 | 3 | 3 | 0 | 7 | 10 | 4 |
| 1317 | 1 | 5 | 7 | 5 | 3 | 11 | 2 | 10 | 2 | 2 | 3 | 4 | 10 | 3 |
| 1318 | 3 | 8 | 1 | 6 | 3 | 4 | 6 | 3 | 9 | 5 | 11 | 9 | 11 | 8 |
| 1319 | 9 | 10 | 7 | 5 | 0 | 6 | 7 | 4 | 0 | 9 | 1 | 8 | 10 | 5 |
| 1320 | 4 | 6 | 7 | 5 | 4 | 10 | 9 | 3 | 8 | 4 | 9 | 8 | 7 | 4 |
| 1321 | 7 | 4 | 8 | 7 | 10 | 1 | 2 | 5 | 8 | 3 | 7 | 0 | 1 | 8 |
| 1322 | 0 | 1 | 5 | 8 | 1 | 7 | 1 | 10 | 0 | 10 | 1 | 9 | 10 | 6 |
| 1323 | 5 | 3 | 6 | 2 | 7 | 3 | 7 | 5 | 0 | 7 | 10 | 4 | 8 | 5 |
| 1324 | 5 | 4 | 0 | 0 | 11 | 1 | 9 | 1 | 9 | 0 | 3 | 1 | 3 | 5 |
| 1325 | 11 | 0 | 2 | 7 | 7 | 5 | 5 | 5 | 9 | 1 | 0 | 10 | 9 | 0 |
| 1326 | 7 | 10 | 6 | 8 | 5 | 11 | 4 | 11 | 0 | 11 | 2 | 4 | 11 | 8 |
| 1327 | 10 | 7 | 0 | 2 | 10 | 0 | 6 | 1 | 4 | 0 | 2 | 11 | 2 | 6 |
| 1328 | 5 | 5 | 6 | 0 | 4 | 1 | 6 | 10 | 11 | 10 | 1 | 6 | 1 | 11 |
| 1329 | 4 | 5 | 0 | 9 | 6 | 8 | 6 | 7 | 8 | 9 | 4 | 6 | 8 | 6 |
| 1330 | 4 | 4 | 5 | 2 | 9 | 4 | 5 | 4 | 4 | 5 | 0 | 10 | 1 | 6 |
| 1331 | 3 | 4 | 9 | 6 | 7 | 10 | 11 | 7 | 0 | 8 | 1 | 5 | 3 | 0 |
| 1332 | 11 | 9 | 6 | 10 | 5 | 11 | 8 | 3 | 5 | 2 | 3 | 7 | 6 | 6 |
| 1333 | 2 | 8 | 6 | 9 | 0 | 10 | 6 | 10 | 6 | 0 | 0 | 5 | 2 | 2 |
| 1334 | 8 | 11 | 1 | 4 | 0 | 1 | 8 | 4 | 8 | 2 | 10 | 5 | 3 | 4 |
| 1335 | 0 | 7 | 10 | 10 | 9 | 7 | 6 | 4 | 10 | 8 | 5 | 3 | 1 | 11 |
| 1336 | 7 | 8 | 10 | 1 | 9 | 0 | 9 | 9 | 3 | 8 | 6 | 5 | 5 | 9 |
| 1337 | 4 | 2 | 2 | 4 | 11 | 2 | 7 | 7 | 3 | 1 | 5 | 3 | 3 | 11 |
| 1338 | 7 | 1 | 3 | 4 | 9 | 6 | 10 | 11 | 2 | 2 | 7 | 7 | 2 | 3 |
| 1339 | 7 | 6 | 1 | 10 | 8 | 0 | 10 | 9 | 0 | 1 | 4 | 1 | 2 | 11 |
| 1340 | 6 | 0 | 7 | 9 | 0 | 7 | 10 | 3 | 7 | 10 | 11 | 2 | 11 | 11 |
| 1341 | 3 | 8 | 5 | 11 | 9 | 2 | 10 | 11 | 7 | 6 | 2 | 9 | 7 | 5 |
| 1342 | 9 | 2 | 1 | 11 | 11 | 7 | 4 | 10 | 6 | 6 | 0 | 4 | 11 | 5 |
| 1343 | 7 | 11 | 1 | 3 | 11 | 5 | 1 | 3 | 8 | 8 | 8 | 1 | 11 | 2 |
| 1344 | 1 | 1 | 3 | 10 | 5 | 2 | 6 | 7 | 9 | 6 | 2 | 0 | 4 | 0 |
| 1345 | 0 | 11 | 11 | 4 | 11 | 8 | 5 | 11 | 2 | 10 | 1 | 1 | 6 | 1 |
| 1346 | 5 | 3 | 10 | 6 | 0 | 7 | 8 | 1 | 9 | 9 | 10 | 0 | 2 | 6 |
| 1347 | 9 | 4 | 0 | 9 | 5 | 9 | 2 | 4 | 7 | 5 | 7 | 7 | 3 | 9 |
| 1348 | 7 | 9 | 4 | 10 | 2 | 2 | 11 | 6 | 11 | 7 | 5 | 10 | 7 | 10 |
| 1349 | 0 | 3 | 5 | 3 | 3 | 4 | 5 | 11 | 5 | 1 | 8 | 5 | 0 | 7 |
| 1350 | 2 | 7 | 7 | 10 | 2 | 10 | 5 | 11 | 3 | 2 | 0 | 4 | 11 | 1 |
| 1351 | 0 | 3 | 7 | 2 | 4 | 6 | 8 | 5 | 4 | 11 | 11 | 2 | 7 | 0 |
| 1352 | 1 | 9 | 11 | 3 | 0 | 4 | 6 | 9 | 11 | 9 | 1 | 7 | 6 | 10 |
| 1353 | 9 | 5 | 9 | 5 | 7 | 1 | 9 | 9 | 10 | 5 | 2 | 11 | 10 | 0 |
| 1354 | 10 | 1 | 8 | 4 | 10 | 4 | 3 | 8 | 1 | 11 | 11 | 5 | 7 | 5 |
| 1355 | 1 | 10 | 9 | 7 | 3 | 1 | 3 | 1 | 7 | 2 | 4 | 3 | 5 | 2 |
| 1356 | 2 | 1 | 6 | 2 | 8 | 6 | 6 | 8 | 1 | 1 | 9 | 0 | 9 | 7 |
| 1357 | 11 | 1 | 3 | 5 | 2 | 11 | 3 | 5 | 6 | 9 | 1 | 9 | 2 | 7 |
| 1358 | 1 | 7 | 6 | 3 | 5 | 3 | 9 | 7 | 6 | 7 | 8 | 9 | 1 | 1 |
| 1359 | 2 | 2 | 10 | 6 | 3 | 9 | 11 | 6 | 8 | 1 | 4 | 11 | 9 | 5 |
| 1360 | 9 | 7 | 1 | 8 | 4 | 9 | 7 | 0 | 11 | 5 | 5 | 0 | 0 | 4 |
| 1361 | 0 | 5 | 9 | 8 | 3 | 2 | 3 | 8 | 5 | 4 | 3 | 1 | 8 | 6 |
| 1362 | 2 | 11 | 10 | 11 | 3 | 6 | 8 | 3 | 11 | 9 | 9 | 3 | 3 | 10 |
| 1363 | 1 | 0 | 6 | 9 | 4 | 8 | 8 | 3 | 0 | 4 | 8 | 1 | 9 | 9 |
| 1364 | 3 | 0 | 4 | 0 | 2 | 9 | 2 | 1 | 4 | 7 | 3 | 5 | 0 | 7 |
| 1365 | 8 | 5 | 1 | 8 | 11 | 7 | 9 | 6 | 7 | 9 | 4 | 1 | 9 | 3 |
| 1366 | 7 | 1 | 11 | 3 | 1 | 2 | 3 | 1 | 5 | 5 | 1 | 2 | 1 | 5 |
| 1367 | 8 | 9 | 1 | 6 | 9 | 11 | 1 | 1 | 9 | 10 | 2 | 10 | 9 | 9 |
| 1368 | 1 | 1 | 1 | 0 | 10 | 5 | 7 | 2 | 5 | 1 | 1 | 11 | 9 | 9 |
| 1369 | 6 | 4 | 5 | 3 | 2 | 1 | 6 | 9 | 2 | 0 | 8 | 2 | 1 | 9 |
| 1370 | 5 | 6 | 9 | 4 | 9 | 8 | 6 | 3 | 8 | 5 | 8 | 5 | 1 | 5 |
| 1371 | 0 | 4 | 5 | 6 | 6 | 1 | 3 | 1 | 6 | 7 | 1 | 4 | 0 | 4 |
| 1372 | 6 | 3 | 8 | 10 | 8 | 3 | 7 | 0 | 11 | 3 | 2 | 2 | 6 | 7 |
| 1373 | 10 | 2 | 0 | 8 | 2 | 6 | 11 | 0 | 8 | 3 | 8 | 4 | 2 | 10 |
| 1374 | 5 | 1 | 3 | 1 | 10 | 5 | 3 | 1 | 10 | 3 | 9 | 10 | 10 | 1 |
| 1375 | 8 | 4 | 10 | 1 | 6 | 8 | 4 | 6 | 5 | 5 | 11 | 7 | 9 | 8 |
| 1376 | 11 | 10 | 11 | 3 | 7 | 5 | 3 | 6 | 0 | 10 | 6 | 5 | 11 | 11 |
| 1377 | 9 | 1 | 6 | 7 | 1 | 8 | 4 | 8 | 3 | 8 | 11 | 1 | 4 | 6 |
| 1378 | 8 | 10 | 5 | 11 | 10 | 4 | 1 | 11 | 10 | 9 | 11 | 1 | 2 | 11 |
| 1379 | 9 | 7 | 7 | 9 | 7 | 9 | 0 | 10 | 8 | 3 | 6 | 8 | 9 | 10 |
| 1380 | 9 | 1 | 0 | 0 | 6 | 8 | 5 | 9 | 4 | 4 | 6 | 10 | 7 | 5 |
| 1381 | 7 | 2 | 7 | 1 | 10 | 0 | 8 | 11 | 1 | 9 | 4 | 2 | 9 | 7 |
| 1382 | 10 | 11 | 2 | 5 | 1 | 7 | 1 | 7 | 5 | 3 | 7 | 7 | 5 | 4 |
| 1383 | 10 | 0 | 8 | 7 | 8 | 9 | 2 | 10 | 7 | 2 | 5 | 9 | 2 | 0 |
| 1384 | 5 | 2 | 2 | 10 | 0 | 5 | 5 | 10 | 4 | 7 | 5 | 6 | 10 | 3 |
| 1385 | 6 | 1 | 2 | 7 | 7 | 10 | 1 | 8 | 8 | 7 | 5 | 3 | 7 | 1 |
| 1386 | 0 | 2 | 4 | 2 | 4 | 7 | 9 | 9 | 2 | 0 | 5 | 7 | 2 | 7 |
| 1387 | 5 | 3 | 11 | 8 | 11 | 6 | 2 | 2 | 10 | 8 | 10 | 6 | 1 | 2 |
| 1388 | 7 | 5 | 8 | 1 | 3 | 0 | 11 | 5 | 4 | 4 | 2 | 6 | 10 | 5 |
| 1389 | 6 | 8 | 3 | 10 | 4 | 5 | 1 | 8 | 3 | 0 | 4 | 4 | 10 | 0 |
| 1390 | 8 | 4 | 9 | 2 | 7 | 3 | 1 | 8 | 3 | 6 | 3 | 6 | 4 | 4 |
| 1391 | 10 | 2 | 4 | 11 | 3 | 11 | 4 | 4 | 1 | 5 | 1 | 3 | 8 | 3 |
| 1392 | 11 | 8 | 4 | 8 | 1 | 6 | 3 | 3 | 4 | 9 | 0 | 2 | 10 | 11 |
| 1393 | 5 | 11 | 6 | 3 | 6 | 2 | 10 | 5 | 7 | 8 | 5 | 8 | 3 | 7 |
| 1394 | 7 | 0 | 6 | 4 | 2 | 9 | 0 | 5 | 10 | 11 | 4 | 2 | 6 | 9 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 1395 | 3 | 5 | 3 | 2 | 10 | 5 | 8 | 6 | 11 | 0 | 10 | 7 | 5 | 8 |
| 1396 | 8 | 2 | 7 | 1 | 8 | 2 | 6 | 5 | 4 | 5 | 9 | 10 | 6 | 4 |
| 1397 | 3 | 2 | 9 | 11 | 8 | 9 | 10 | 8 | 2 | 2 | 0 | 0 | 4 | 10 |
| 1398 | 2 | 10 | 5 | 5 | 8 | 4 | 9 | 2 | 6 | 4 | 3 | 4 | 8 | 10 |
| 1399 | 2 | 5 | 0 | 0 | 7 | 0 | 7 | 3 | 11 | 6 | 6 | 2 | 4 | 6 |
| 1400 | 2 | 6 | 2 | 8 | 6 | 6 | 7 | 0 | 10 | 6 | 3 | 11 | 6 | 3 |
| 1401 | 2 | 11 | 3 | 9 | 10 | 7 | 8 | 11 | 8 | 8 | 7 | 4 | 6 | 11 |
| 1402 | 11 | 8 | 8 | 11 | 7 | 8 | 8 | 0 | 4 | 8 | 3 | 0 | 8 | 9 |
| 1403 | 1 | 8 | 8 | 9 | 10 | 3 | 2 | 4 | 2 | 11 | 2 | 9 | 11 | 2 |
| 1404 | 4 | 9 | 11 | 5 | 6 | 10 | 8 | 5 | 0 | 2 | 11 | 6 | 9 | 1 |
| 1405 | 10 | 8 | 4 | 7 | 7 | 2 | 0 | 2 | 7 | 4 | 10 | 10 | 1 | 11 |
| 1406 | 2 | 7 | 3 | 0 | 11 | 1 | 3 | 6 | 11 | 5 | 9 | 11 | 11 | 2 |
| 1407 | 11 | 2 | 10 | 4 | 9 | 2 | 5 | 9 | 10 | 7 | 0 | 0 | 6 | 5 |
| 1408 | 10 | 0 | 10 | 9 | 3 | 11 | 6 | 5 | 10 | 3 | 10 | 8 | 2 | 4 |
| 1409 | 3 | 1 | 10 | 5 | 5 | 3 | 6 | 10 | 10 | 7 | 7 | 10 | 7 | 9 |
| 1410 | 8 | 2 | 0 | 6 | 3 | 3 | 0 | 5 | 2 | 7 | 11 | 1 | 3 | 0 |
| 1411 | 6 | 4 | 5 | 4 | 5 | 11 | 5 | 7 | 8 | 4 | 1 | 3 | 10 | 8 |
| 1412 | 6 | 3 | 5 | 6 | 9 | 7 | 4 | 5 | 6 | 10 | 4 | 8 | 7 | 8 |
| 1413 | 10 | 5 | 5 | 4 | 1 | 10 | 9 | 1 | 10 | 0 | 1 | 0 | 7 | 7 |
| 1414 | 1 | 5 | 9 | 4 | 5 | 0 | 8 | 2 | 1 | 0 | 6 | 4 | 11 | 0 |
| 1415 | 10 | 9 | 0 | 8 | 8 | 3 | 1 | 6 | 7 | 1 | 9 | 11 | 6 | 11 |
| 1416 | 8 | 10 | 11 | 9 | 3 | 5 | 9 | 11 | 4 | 8 | 8 | 8 | 7 | 5 |
| 1417 | 6 | 6 | 10 | 6 | 4 | 3 | 10 | 2 | 11 | 11 | 9 | 4 | 2 | 9 |
| 1418 | 3 | 9 | 5 | 0 | 10 | 4 | 4 | 2 | 8 | 2 | 9 | 5 | 6 | 3 |
| 1419 | 6 | 3 | 6 | 9 | 8 | 6 | 0 | 6 | 0 | 10 | 0 | 11 | 0 | 6 |
| 1420 | 9 | 9 | 10 | 3 | 2 | 1 | 0 | 8 | 7 | 7 | 1 | 11 | 4 | 2 |
| 1421 | 8 | 9 | 4 | 0 | 10 | 0 | 5 | 10 | 7 | 5 | 4 | 7 | 11 | 1 |
| 1422 | 1 | 10 | 3 | 0 | 5 | 7 | 8 | 1 | 11 | 3 | 0 | 8 | 1 | 4 |
| 1423 | 6 | 2 | 8 | 11 | 1 | 5 | 6 | 7 | 0 | 2 | 6 | 11 | 1 | 2 |
| 1424 | 0 | 6 | 7 | 1 | 9 | 4 | 4 | 2 | 7 | 7 | 3 | 11 | 2 | 5 |
| 1425 | 11 | 2 | 1 | 2 | 4 | 11 | 6 | 4 | 5 | 3 | 7 | 5 | 11 | 10 |
| 1426 | 10 | 5 | 1 | 0 | 9 | 0 | 1 | 4 | 6 | 7 | 11 | 0 | 8 | 8 |
| 1427 | 2 | 10 | 11 | 8 | 0 | 10 | 11 | 7 | 1 | 7 | 11 | 7 | 7 | 7 |
| 1428 | 1 | 0 | 0 | 1 | 4 | 3 | 5 | 7 | 7 | 3 | 4 | 4 | 3 | 8 |
| 1429 | 8 | 5 | 2 | 7 | 4 | 6 | 4 | 5 | 6 | 3 | 8 | 9 | 4 | 9 |
| 1430 | 6 | 7 | 2 | 6 | 11 | 2 | 4 | 1 | 5 | 3 | 3 | 5 | 10 | 0 |
| 1431 | 3 | 10 | 0 | 1 | 4 | 11 | 0 | 4 | 9 | 2 | 2 | 2 | 0 | 7 |
| 1432 | 9 | 5 | 3 | 3 | 9 | 0 | 6 | 10 | 0 | 11 | 8 | 3 | 6 | 2 |
| 1433 | 0 | 11 | 6 | 5 | 2 | 4 | 8 | 6 | 8 | 11 | 9 | 10 | 9 | 2 |
| 1434 | 11 | 6 | 9 | 7 | 1 | 1 | 1 | 11 | 6 | 8 | 10 | 7 | 10 | 9 |
| 1435 | 5 | 8 | 7 | 10 | 8 | 3 | 11 | 4 | 3 | 1 | 7 | 0 | 7 | 6 |
| 1436 | 7 | 6 | 11 | 7 | 7 | 4 | 10 | 7 | 4 | 4 | 9 | 3 | 4 | 10 |
| 1437 | 9 | 4 | 11 | 11 | 5 | 6 | 9 | 0 | 1 | 10 | 2 | 9 | 2 | 8 |
| 1438 | 2 | 5 | 1 | 5 | 10 | 9 | 10 | 1 | 4 | 5 | 0 | 8 | 9 | 1 |
| 1439 | 10 | 6 | 3 | 8 | 0 | 10 | 5 | 10 | 3 | 9 | 6 | 0 | 0 | 9 |
| 1440 | 5 | 0 | 8 | 11 | 10 | 2 | 0 | 4 | 1 | 1 | 8 | 7 | 1 | 1 |
| 1441 | 9 | 4 | 3 | 1 | 8 | 7 | 6 | 11 | 2 | 7 | 5 | 11 | 5 | 1 |
| 1442 | 1 | 7 | 7 | 7 | 6 | 1 | 11 | 3 | 9 | 6 | 1 | 11 | 8 | 1 |
| 1443 | 7 | 8 | 9 | 5 | 10 | 9 | 5 | 0 | 1 | 7 | 10 | 3 | 3 | 11 |
| 1444 | 3 | 8 | 11 | 10 | 6 | 1 | 5 | 1 | 10 | 2 | 9 | 7 | 8 | 9 |
| 1445 | 1 | 7 | 7 | 2 | 11 | 3 | 2 | 8 | 5 | 4 | 0 | 2 | 5 | 5 |
| 1446 | 11 | 7 | 2 | 11 | 10 | 2 | 7 | 8 | 9 | 4 | 9 | 4 | 7 | 3 |
| 1447 | 11 | 1 | 8 | 7 | 2 | 6 | 7 | 10 | 10 | 1 | 4 | 4 | 5 | 4 |
| 1448 | 8 | 8 | 10 | 5 | 2 | 10 | 3 | 1 | 1 | 10 | 11 | 8 | 1 | 10 |
| 1449 | 5 | 9 | 6 | 6 | 4 | 2 | 7 | 9 | 10 | 1 | 7 | 10 | 11 | 0 |
| 1450 | 5 | 9 | 2 | 10 | 5 | 9 | 10 | 2 | 11 | 10 | 0 | 5 | 3 | 5 |
| 1451 | 11 | 10 | 6 | 11 | 6 | 4 | 11 | 9 | 3 | 6 | 4 | 6 | 9 | 3 |
| 1452 | 4 | 11 | 2 | 0 | 8 | 0 | 10 | 10 | 2 | 4 | 8 | 9 | 5 | 7 |
| 1453 | 0 | 9 | 6 | 0 | 10 | 1 | 3 | 3 | 0 | 11 | 5 | 8 | 8 | 10 |
| 1454 | 4 | 7 | 11 | 10 | 3 | 7 | 1 | 6 | 5 | 9 | 9 | 2 | 7 | 8 |
| 1455 | 3 | 3 | 1 | 7 | 5 | 10 | 7 | 6 | 7 | 1 | 11 | 10 | 3 | 7 |
| 1456 | 1 | 11 | 4 | 6 | 3 | 6 | 1 | 10 | 1 | 1 | 6 | 5 | 4 | 11 |
| 1457 | 9 | 11 | 6 | 1 | 4 | 4 | 4 | 1 | 5 | 2 | 8 | 4 | 7 | 11 |
| 1458 | 10 | 11 | 11 | 2 | 8 | 11 | 0 | 2 | 11 | 7 | 9 | 9 | 0 | 2 |
| 1459 | 10 | 7 | 1 | 1 | 9 | 5 | 5 | 2 | 0 | 6 | 7 | 1 | 7 | 3 |
| 1460 | 11 | 6 | 8 | 9 | 6 | 11 | 10 | 6 | 3 | 5 | 0 | 2 | 6 | 2 |
| 1461 | 10 | 7 | 5 | 3 | 8 | 9 | 11 | 5 | 10 | 6 | 11 | 6 | 3 | 10 |
| 1462 | 8 | 2 | 3 | 10 | 7 | 5 | 4 | 3 | 5 | 4 | 9 | 9 | 1 | 5 |
| 1463 | 4 | 3 | 10 | 4 | 4 | 9 | 11 | 2 | 6 | 2 | 1 | 0 | 1 | 3 |
| 1464 | 1 | 7 | 5 | 5 | 4 | 2 | 4 | 9 | 1 | 2 | 5 | 11 | 3 | 6 |
| 1465 | 11 | 10 | 0 | 10 | 0 | 0 | 1 | 4 | 2 | 4 | 10 | 1 | 9 | 6 |
| 1466 | 5 | 10 | 4 | 4 | 3 | 6 | 9 | 5 | 8 | 0 | 10 | 9 | 9 | 1 |
| 1467 | 4 | 5 | 4 | 2 | 8 | 11 | 4 | 1 | 8 | 8 | 2 | 8 | 4 | 11 |
| 1468 | 5 | 10 | 1 | 1 | 8 | 1 | 3 | 0 | 6 | 5 | 7 | 7 | 1 | 0 |
| 1469 | 7 | 1 | 7 | 2 | 0 | 11 | 2 | 7 | 3 | 11 | 5 | 5 | 1 | 7 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 1470 | 7 | 1 | 6 | 10 | 6 | 1 | 10 | 7 | 5 | 10 | 6 | 4 | 9 | 2 |
| 1471 | 10 | 3 | 4 | 10 | 2 | 6 | 5 | 3 | 9 | 0 | 11 | 5 | 3 | 9 |
| 1472 | 6 | 6 | 10 | 11 | 7 | 10 | 3 | 10 | 2 | 5 | 10 | 6 | 6 | 3 |
| 1473 | 4 | 3 | 9 | 11 | 10 | 3 | 2 | 7 | 11 | 0 | 4 | 8 | 2 | 1 |
| 1474 | 4 | 0 | 6 | 1 | 8 | 7 | 7 | 10 | 1 | 11 | 6 | 10 | 3 | 10 |
| 1475 | 6 | 11 | 2 | 4 | 6 | 9 | 9 | 1 | 0 | 8 | 9 | 11 | 11 | 11 |
| 1476 | 3 | 8 | 6 | 4 | 11 | 8 | 9 | 6 | 1 | 6 | 0 | 10 | 4 | 0 |
| 1477 | 1 | 8 | 5 | 8 | 8 | 6 | 10 | 8 | 6 | 0 | 6 | 3 | 5 | 4 |
| 1478 | 8 | 11 | 7 | 7 | 0 | 11 | 3 | 0 | 5 | 3 | 4 | 0 | 8 | 5 |
| 1479 | 8 | 4 | 0 | 2 | 5 | 2 | 10 | 2 | 0 | 0 | 8 | 0 | 9 | 1 |
| 1480 | 10 | 6 | 11 | 11 | 9 | 3 | 11 | 4 | 9 | 11 | 0 | 1 | 6 | 4 |
| 1481 | 8 | 5 | 3 | 3 | 1 | 6 | 11 | 0 | 1 | 8 | 6 | 1 | 5 | 5 |
| 1482 | 6 | 0 | 0 | 3 | 5 | 8 | 9 | 6 | 3 | 3 | 2 | 1 | 8 | 2 |
| 1483 | 2 | 3 | 8 | 4 | 8 | 1 | 8 | 9 | 4 | 1 | 8 | 8 | 4 | 8 |
| 1484 | 3 | 9 | 5 | 9 | 1 | 5 | 7 | 10 | 9 | 8 | 2 | 0 | 1 | 10 |
| 1485 | 10 | 0 | 1 | 2 | 7 | 10 | 3 | 11 | 7 | 8 | 6 | 7 | 4 | 8 |
| 1486 | 8 | 1 | 1 | 9 | 6 | 10 | 7 | 1 | 11 | 9 | 3 | 7 | 5 | 0 |
| 1487 | 3 | 3 | 0 | 11 | 1 | 0 | 9 | 9 | 10 | 9 | 3 | 3 | 11 | 6 |
| 1488 | 3 | 0 | 10 | 8 | 7 | 2 | 11 | 4 | 2 | 10 | 6 | 11 | 7 | 4 |
| 1489 | 9 | 2 | 10 | 11 | 1 | 0 | 11 | 1 | 9 | 4 | 5 | 5 | 4 | 11 |
| 1490 | 0 | 1 | 8 | 0 | 3 | 9 | 11 | 0 | 9 | 11 | 7 | 9 | 1 | 11 |
| 1491 | 9 | 11 | 8 | 8 | 0 | 9 | 5 | 11 | 9 | 6 | 11 | 8 | 11 | 3 |
| 1492 | 2 | 3 | 1 | 2 | 11 | 5 | 9 | 7 | 9 | 3 | 1 | 3 | 2 | 4 |
| 1493 | 6 | 11 | 0 | 5 | 0 | 3 | 8 | 0 | 0 | 5 | 8 | 3 | 5 | 0 |
| 1494 | 5 | 1 | 5 | 3 | 11 | 8 | 2 | 3 | 5 | 11 | 7 | 4 | 4 | 4 |
| 1495 | 7 | 4 | 2 | 6 | 0 | 9 | 4 | 4 | 4 | 2 | 11 | 11 | 8 | 7 |
| 1496 | 7 | 3 | 11 | 2 | 2 | 9 | 10 | 4 | 8 | 1 | 3 | 4 | 3 | 0 |
| 1497 | 7 | 4 | 7 | 6 | 5 | 4 | 11 | 9 | 9 | 9 | 2 | 3 | 1 | 2 |
| 1498 | 6 | 6 | 1 | 10 | 1 | 8 | 0 | 2 | 7 | 8 | 0 | 3 | 6 | 10 |
| 1499 | 5 | 3 | 8 | 6 | 10 | 4 | 5 | 5 | 3 | 4 | 3 | 11 | 4 | 0 |
| 1500 | 1 | 1 | 3 | 6 | 0 | 11 | 1 | 9 | 10 | 4 | 11 | 3 | 0 | 3 |
| 1501 | 2 | 0 | 8 | 2 | 3 | 8 | 1 | 7 | 3 | 5 | 8 | 11 | 5 | 10 |
| 1502 | 6 | 0 | 4 | 7 | 10 | 8 | 8 | 7 | 5 | 9 | 0 | 0 | 4 | 3 |
| 1503 | 4 | 3 | 10 | 3 | 2 | 2 | 9 | 4 | 5 | 0 | 9 | 7 | 5 | 6 |
| 1504 | 6 | 6 | 7 | 9 | 9 | 0 | 5 | 0 | 10 | 9 | 2 | 4 | 4 | 0 |
| 1505 | 6 | 8 | 5 | 8 | 11 | 8 | 7 | 4 | 4 | 3 | 10 | 7 | 2 | 1 |
| 1506 | 9 | 2 | 9 | 4 | 6 | 0 | 9 | 6 | 2 | 11 | 11 | 6 | 5 | 4 |
| 1507 | 7 | 2 | 11 | 0 | 3 | 3 | 3 | 9 | 8 | 4 | 10 | 7 | 0 | 4 |
| 1508 | 4 | 8 | 7 | 11 | 9 | 1 | 0 | 2 | 5 | 8 | 5 | 6 | 3 | 8 |
| 1509 | 2 | 9 | 6 | 5 | 11 | 7 | 1 | 3 | 9 | 0 | 10 | 11 | 4 | 3 |
| 1510 | 5 | 6 | 5 | 0 | 6 | 7 | 11 | 5 | 1 | 0 | 0 | 0 | 11 | 3 |
| 1511 | 9 | 9 | 5 | 7 | 6 | 6 | 6 | 11 | 1 | 3 | 7 | 1 | 3 | 0 |
| 1512 | 5 | 7 | 8 | 11 | 7 | 9 | 4 | 3 | 3 | 7 | 2 | 5 | 5 | 6 |
| 1513 | 2 | 0 | 7 | 10 | 9 | 3 | 8 | 2 | 1 | 5 | 9 | 1 | 8 | 11 |
| 1514 | 11 | 8 | 1 | 9 | 1 | 1 | 4 | 6 | 0 | 7 | 8 | 8 | 1 | 3 |
| 1515 | 10 | 4 | 11 | 2 | 3 | 8 | 8 | 1 | 6 | 10 | 5 | 7 | 3 | 3 |
| 1516 | 9 | 6 | 8 | 0 | 8 | 5 | 7 | 7 | 7 | 8 | 3 | 5 | 4 | 4 |
| 1517 | 6 | 5 | 11 | 8 | 3 | 1 | 6 | 3 | 1 | 3 | 0 | 5 | 0 | 3 |
| 1518 | 0 | 10 | 6 | 3 | 7 | 7 | 10 | 2 | 8 | 5 | 0 | 0 | 7 | 6 |
| 1519 | 10 | 10 | 4 | 8 | 9 | 3 | 8 | 7 | 3 | 4 | 5 | 4 | 5 | 6 |
| 1520 | 2 | 7 | 4 | 7 | 1 | 7 | 9 | 11 | 11 | 4 | 11 | 6 | 0 | 8 |
| 1521 | 9 | 3 | 2 | 3 | 7 | 11 | 8 | 3 | 10 | 8 | 4 | 10 | 7 | 7 |
| 1522 | 3 | 2 | 6 | 2 | 6 | 1 | 0 | 0 | 7 | 5 | 8 | 1 | 6 | 8 |
| 1523 | 0 | 6 | 0 | 11 | 0 | 7 | 7 | 3 | 10 | 7 | 10 | 9 | 3 | 8 |
| 1524 | 5 | 0 | 7 | 3 | 6 | 9 | 6 | 9 | 6 | 1 | 3 | 3 | 5 | 3 |
| 1525 | 8 | 3 | 2 | 10 | 2 | 2 | 0 | 9 | 2 | 5 | 4 | 9 | 8 | 8 |
| 1526 | 0 | 11 | 2 | 3 | 9 | 8 | 11 | 9 | 9 | 3 | 4 | 2 | 10 | 10 |
| 1527 | 1 | 1 | 11 | 4 | 7 | 7 | 5 | 5 | 7 | 11 | 5 | 9 | 0 | 4 |
| 1528 | 10 | 4 | 10 | 9 | 2 | 2 | 2 | 3 | 3 | 10 | 8 | 6 | 0 | 0 |
| 1529 | 4 | 9 | 9 | 3 | 5 | 11 | 2 | 6 | 4 | 10 | 11 | 0 | 7 | 3 |
| 1530 | 4 | 6 | 4 | 7 | 5 | 0 | 4 | 0 | 5 | 10 | 8 | 6 | 1 | 2 |
| 1531 | 3 | 10 | 11 | 7 | 3 | 11 | 10 | 3 | 2 | 1 | 5 | 6 | 2 | 1 |
| 1532 | 6 | 7 | 9 | 2 | 2 | 0 | 9 | 8 | 11 | 10 | 10 | 1 | 6 | 0 |
| 1533 | 9 | 11 | 4 | 1 | 0 | 3 | 0 | 8 | 10 | 11 | 0 | 7 | 1 | 6 |
| 1534 | 3 | 0 | 0 | 0 | 3 | 5 | 4 | 8 | 6 | 11 | 10 | 1 | 7 | 1 |
| 1535 | 1 | 9 | 3 | 2 | 4 | 4 | 10 | 6 | 3 | 8 | 11 | 9 | 9 | 5 |
| 1536 | 11 | 4 | 0 | 10 | 10 | 7 | 11 | 1 | 3 | 2 | 6 | 11 | 8 | 4 |
| 1537 | 5 | 7 | 9 | 7 | 5 | 2 | 10 | 10 | 9 | 7 | 5 | 4 | 1 | 10 |
| 1538 | 8 | 8 | 5 | 6 | 11 | 4 | 4 | 5 | 0 | 0 | 7 | 2 | 11 | 6 |
| 1539 | 2 | 5 | 6 | 11 | 7 | 5 | 7 | 6 | 8 | 3 | 11 | 6 | 7 | 2 |
| 1540 | 6 | 10 | 4 | 8 | 1 | 10 | 2 | 0 | 10 | 4 | 4 | 0 | 10 | 3 |
| 1541 | 10 | 9 | 4 | 2 | 0 | 0 | 11 | 8 | 8 | 5 | 1 | 9 | 4 | 7 |
| 1542 | 3 | 9 | 10 | 10 | 6 | 8 | 1 | 9 | 0 | 4 | 3 | 5 | 2 | 0 |
| 1543 | 7 | 2 | 2 | 9 | 3 | 5 | 5 | 11 | 5 | 6 | 1 | 7 | 2 | 10 |
| 1544 | 2 | 1 | 7 | 5 | 3 | 2 | 0 | 4 | 1 | 11 | 0 | 2 | 4 | 5 |

Example # 3 of a group-based CS hopping pattern

| m | $n_{cs}(n)$ | | | | | | | | | | | | | |
|---|---|---|---|---|---|---|---|---|---|---|---|---|---|---|
| 1545 | 10 | 7 | 2 | 0 | 6 | 4 | 3 | 4 | 2 | 1 | 2 | 0 | 9 | 2 |
| 1546 | 1 | 0 | 10 | 4 | 1 | 11 | 3 | 8 | 8 | 0 | 5 | 4 | 3 | 9 |
| 1547 | 4 | 7 | 5 | 10 | 10 | 1 | 9 | 2 | 10 | 1 | 1 | 3 | 4 | 8 |
| 1548 | 5 | 3 | 8 | 7 | 11 | 10 | 6 | 4 | 5 | 6 | 7 | 1 | 10 | 5 |
| 1549 | 10 | 10 | 3 | 11 | 10 | 11 | 5 | 1 | 5 | 7 | 2 | 6 | 3 | 1 |
| 1550 | 6 | 11 | 11 | 10 | 5 | 6 | 5 | 2 | 1 | 4 | 7 | 4 | 7 | 5 |
| 1551 | 11 | 8 | 5 | 0 | 7 | 5 | 8 | 7 | 11 | 10 | 1 | 4 | 0 | 0 |
| 1552 | 3 | 2 | 5 | 9 | 2 | 6 | 3 | 1 | 6 | 2 | 5 | 0 | 7 | 3 |
| 1553 | 6 | 1 | 5 | 8 | 5 | 7 | 6 | 8 | 11 | 5 | 2 | 11 | 9 | 9 |
| 1554 | 1 | 0 | 9 | 5 | 9 | 7 | 9 | 1 | 7 | 6 | 0 | 1 | 6 | 7 |
| 1555 | 1 | 5 | 7 | 3 | 1 | 8 | 4 | 9 | 6 | 6 | 6 | 8 | 4 | 10 |
| 1556 | 4 | 5 | 2 | 8 | 5 | 3 | 2 | 2 | 3 | 7 | 8 | 1 | 6 | 6 |
| 1557 | 5 | 6 | 0 | 6 | 10 | 9 | 1 | 7 | 11 | 1 | 8 | 2 | 7 | 9 |
| 1558 | 3 | 7 | 6 | 11 | 1 | 3 | 6 | 0 | 7 | 0 | 3 | 10 | 9 | 4 |
| 1559 | 0 | 8 | 0 | 3 | 5 | 11 | 1 | 11 | 4 | 5 | 9 | 5 | 11 | 4 |
| 1560 | 9 | 11 | 1 | 9 | 6 | 1 | 10 | 0 | 10 | 6 | 8 | 5 | 5 | 1 |
| 1561 | 9 | 1 | 11 | 8 | 10 | 2 | 3 | 6 | 7 | 7 | 3 | 7 | 0 | 8 |
| 1562 | 10 | 2 | 1 | 2 | 11 | 8 | 10 | 5 | 2 | 3 | 11 | 11 | 1 | 3 |
| 1563 | 1 | 9 | 1 | 0 | 0 | 7 | 8 | 10 | 4 | 4 | 10 | 10 | 9 | 10 |
| 1564 | 6 | 10 | 8 | 9 | 2 | 3 | 4 | 6 | 8 | 1 | 10 | 7 | 3 | 11 |
| 1565 | 8 | 11 | 11 | 7 | 2 | 10 | 2 | 9 | 7 | 0 | 9 | 5 | 4 | 2 |
| 1566 | 11 | 5 | 1 | 4 | 4 | 2 | 11 | 6 | 0 | 8 | 2 | 4 | 6 | 7 |
| 1567 | 6 | 7 | 3 | 2 | 7 | 7 | 10 | 3 | 6 | 2 | 10 | 8 | 2 | 5 |
| 1568 | 3 | 4 | 9 | 4 | 5 | 9 | 1 | 1 | 2 | 10 | 1 | 7 | 5 | 6 |
| 1569 | 2 | 2 | 11 | 0 | 4 | 1 | 2 | 7 | 8 | 11 | 4 | 3 | 8 | 9 |
| 1570 | 0 | 3 | 10 | 1 | 4 | 9 | 8 | 4 | 3 | 1 | 0 | 9 | 11 | 6 |
| 1571 | 4 | 8 | 1 | 6 | 2 | 9 | 7 | 10 | 7 | 5 | 2 | 6 | 5 | 5 |
| 1572 | 7 | 0 | 2 | 0 | 10 | 3 | 7 | 9 | 4 | 2 | 0 | 8 | 5 | 11 |
| 1573 | 3 | 9 | 11 | 1 | 7 | 2 | 9 | 5 | 5 | 10 | 0 | 3 | 1 | 11 |
| 1574 | 9 | 8 | 7 | 10 | 10 | 6 | 6 | 0 | 2 | 0 | 11 | 11 | 4 | 10 |
| 1575 | 0 | 1 | 7 | 0 | 1 | 11 | 11 | 4 | 8 | 8 | 8 | 5 | 0 | 8 |
| 1576 | 7 | 11 | 6 | 3 | 6 | 7 | 5 | 0 | 1 | 10 | 1 | 2 | 8 | 4 |
| 1577 | 7 | 9 | 8 | 0 | 11 | 1 | 5 | 2 | 10 | 5 | 8 | 4 | 6 | 9 |
| 1578 | 0 | 9 | 11 | 2 | 6 | 2 | 2 | 1 | 2 | 3 | 3 | 9 | 3 | 2 |
| 1579 | 7 | 9 | 3 | 6 | 9 | 6 | 8 | 6 | 9 | 11 | 4 | 9 | 4 | 6 |
| 1580 | 6 | 4 | 11 | 8 | 7 | 9 | 9 | 10 | 4 | 4 | 2 | 7 | 6 | 0 |
| 1581 | 4 | 1 | 6 | 2 | 0 | 2 | 0 | 8 | 11 | 2 | 7 | 1 | 5 | 11 |
| 1582 | 0 | 4 | 3 | 10 | 4 | 0 | 3 | 2 | 7 | 6 | 7 | 8 | 10 | 10 |
| 1583 | 2 | 4 | 0 | 8 | 8 | 8 | 10 | 11 | 5 | 7 | 0 | 2 | 1 | 0 |
| 1584 | 3 | 1 | 11 | 5 | 8 | 5 | 8 | 3 | 1 | 2 | 2 | 4 | 8 | 8 |
| 1585 | 5 | 11 | 6 | 2 | 10 | 0 | 2 | 10 | 6 | 4 | 6 | 8 | 8 | 9 |
| 1586 | 0 | 8 | 9 | 5 | 4 | 5 | 4 | 7 | 0 | 9 | 11 | 3 | 5 | 5 |
| 1587 | 5 | 3 | 10 | 2 | 7 | 8 | 1 | 11 | 6 | 8 | 9 | 9 | 6 | 7 |
| 1588 | 11 | 4 | 9 | 6 | 2 | 6 | 9 | 5 | 1 | 3 | 11 | 0 | 10 | 9 |
| 1589 | 5 | 11 | 2 | 11 | 0 | 4 | 4 | 10 | 3 | 8 | 3 | 0 | 2 | 11 |
| 1590 | 2 | 9 | 2 | 5 | 8 | 0 | 4 | 7 | 3 | 2 | 1 | 8 | 9 | 9 |
| 1591 | 7 | 6 | 0 | 5 | 1 | 5 | 2 | 4 | 4 | 0 | 6 | 2 | 11 | 7 |
| 1592 | 2 | 6 | 2 | 7 | 7 | 6 | 3 | 1 | 0 | 11 | 7 | 5 | 1 | 4 |
| 1593 | 5 | 9 | 3 | 5 | 11 | 2 | 4 | 4 | 10 | 9 | 5 | 9 | 7 | 3 |
| 1594 | 0 | 0 | 10 | 2 | 5 | 6 | 8 | 8 | 7 | 4 | 1 | 6 | 6 | 8 |
| 1595 | 3 | 8 | 1 | 1 | 8 | 0 | 7 | 8 | 8 | 6 | 8 | 2 | 8 | 4 |
| 1596 | 6 | 11 | 9 | 8 | 11 | 11 | 10 | 5 | 3 | 5 | 9 | 7 | 7 | 11 |
| 1597 | 7 | 4 | 7 | 4 | 9 | 11 | 10 | 3 | 7 | 11 | 2 | 10 | 3 | 10 |
| 1598 | 4 | 4 | 10 | 3 | 8 | 4 | 4 | 0 | 8 | 5 | 5 | 6 | 2 | 0 |
| 1599 | 10 | 1 | 10 | 10 | 1 | 7 | 11 | 9 | 11 | 11 | 0 | 4 | 5 | 7 |
| 1600 | 8 | 1 | 4 | 2 | 11 | 11 | 7 | 11 | 5 | 1 | 3 | 1 | 3 | 3 |
| 1601 | 7 | 5 | 5 | 2 | 1 | 10 | 1 | 4 | 11 | 4 | 0 | 8 | 9 | 4 |
| 1602 | 11 | 6 | 2 | 6 | 5 | 9 | 10 | 11 | 9 | 9 | 1 | 0 | 4 | 7 |
| 1603 | 3 | 3 | 6 | 4 | 4 | 5 | 7 | 10 | 2 | 4 | 7 | 3 | 4 | 7 |
| 1604 | 10 | 9 | 11 | 4 | 11 | 9 | 0 | 8 | 10 | 7 | 10 | 5 | 11 | 0 |
| 1605 | 6 | 10 | 6 | 1 | 6 | 9 | 5 | 4 | 5 | 8 | 10 | 10 | 0 | 3 |
| 1606 | 6 | 7 | 0 | 6 | 6 | 4 | 7 | 5 | 9 | 9 | 6 | 4 | 0 | 0 |
| 1607 | 3 | 2 | 9 | 2 | 3 | 4 | 3 | 7 | 9 | 1 | 10 | 5 | 4 | 5 |
| 1608 | 9 | 10 | 4 | 9 | 11 | 2 | 7 | 7 | 2 | 10 | 4 | 6 | 4 | 8 |
| 1609 | 6 | 5 | 5 | 10 | 11 | 3 | 11 | 7 | 11 | 6 | 7 | 7 | 4 | 3 |
| 1610 | 5 | 5 | 1 | 10 | 10 | 11 | 4 | 7 | 10 | 7 | 0 | 10 | 2 | 0 |
| 1611 | 5 | 7 | 3 | 9 | 8 | 0 | 0 | 7 | 11 | 5 | 3 | 0 | 4 | 6 |
| 1612 | 8 | 11 | 10 | 9 | 10 | 2 | 3 | 5 | 1 | 2 | 2 | 10 | 2 | 7 |
| 1613 | 2 | 2 | 0 | 8 | 4 | 2 | 8 | 10 | 6 | 6 | 2 | 8 | 5 | 1 |
| 1614 | 3 | 6 | 9 | 3 | 10 | 4 | 2 | 5 | 1 | 7 | 5 | 2 | 9 | 3 |
| 1615 | 7 | 6 | 11 | 3 | 9 | 2 | 0 | 5 | 2 | 6 | 2 | 7 | 11 | 4 |
| 1616 | 4 | 7 | 0 | 4 | 6 | 0 | 2 | 3 | 7 | 7 | 1 | 0 | 2 | 9 |
| 1617 | 0 | 1 | 2 | 0 | 3 | 6 | 9 | 8 | 2 | 9 | 4 | 4 | 4 | 1 |
| 1618 | 2 | 8 | 10 | 7 | 1 | 5 | 3 | 9 | 1 | 7 | 3 | 11 | 10 | 3 |
| 1619 | 2 | 5 | 10 | 1 | 7 | 8 | 4 | 10 | 1 | 0 | 10 | 0 | 3 | 5 |

Example # 3 of a group-based CS hopping pattern

| m | $n_{cs}(n)$ | | | | | | | | | | | | | |
|---|---|---|---|---|---|---|---|---|---|---|---|---|---|---|
| 1620 | 5 | 4 | 7 | 2 | 10 | 9 | 0 | 4 | 3 | 9 | 1 | 4 | 9 | 11 |
| 1621 | 7 | 2 | 5 | 1 | 9 | 7 | 7 | 2 | 6 | 3 | 3 | 1 | 10 | 1 |
| 1622 | 4 | 10 | 2 | 8 | 4 | 8 | 10 | 4 | 1 | 1 | 9 | 11 | 5 | 9 |
| 1623 | 4 | 2 | 10 | 0 | 5 | 6 | 0 | 5 | 9 | 8 | 8 | 10 | 10 | 3 |
| 1624 | 6 | 3 | 1 | 3 | 10 | 7 | 9 | 9 | 2 | 11 | 2 | 10 | 4 | 6 |
| 1625 | 0 | 5 | 8 | 11 | 6 | 8 | 4 | 11 | 4 | 1 | 5 | 1 | 5 | 7 |
| 1626 | 10 | 0 | 5 | 5 | 7 | 9 | 1 | 6 | 5 | 9 | 3 | 11 | 11 | 6 |
| 1627 | 11 | 10 | 0 | 0 | 11 | 8 | 5 | 0 | 7 | 1 | 11 | 3 | 0 | 7 |
| 1628 | 7 | 8 | 4 | 2 | 5 | 1 | 1 | 0 | 9 | 3 | 10 | 2 | 2 | 9 |
| 1629 | 2 | 7 | 0 | 0 | 0 | 9 | 11 | 11 | 11 | 3 | 10 | 3 | 10 | 1 |
| 1630 | 6 | 7 | 11 | 2 | 8 | 3 | 6 | 2 | 0 | 10 | 11 | 7 | 1 | 7 |
| 1631 | 10 | 0 | 10 | 3 | 2 | 11 | 10 | 10 | 1 | 2 | 8 | 3 | 7 | 1 |
| 1632 | 3 | 3 | 4 | 5 | 6 | 4 | 6 | 11 | 8 | 6 | 0 | 8 | 0 | 1 |
| 1633 | 10 | 6 | 4 | 9 | 3 | 4 | 3 | 1 | 10 | 4 | 8 | 4 | 3 | 8 |
| 1634 | 9 | 3 | 5 | 10 | 5 | 4 | 11 | 2 | 4 | 8 | 6 | 9 | 9 | 10 |
| 1635 | 5 | 7 | 0 | 3 | 8 | 7 | 6 | 6 | 6 | 0 | 7 | 4 | 8 | 11 |
| 1636 | 1 | 8 | 11 | 1 | 3 | 3 | 6 | 7 | 1 | 1 | 9 | 10 | 11 | 1 |
| 1637 | 7 | 5 | 10 | 11 | 3 | 3 | 10 | 3 | 10 | 6 | 4 | 6 | 11 | 8 |
| 1638 | 10 | 2 | 0 | 8 | 7 | 0 | 7 | 1 | 1 | 2 | 0 | 5 | 6 | 5 |
| 1639 | 8 | 0 | 3 | 6 | 0 | 3 | 7 | 6 | 11 | 6 | 1 | 0 | 8 | 10 |
| 1640 | 1 | 11 | 1 | 6 | 11 | 2 | 8 | 11 | 10 | 8 | 1 | 11 | 2 | 8 |
| 1641 | 10 | 9 | 6 | 7 | 2 | 5 | 8 | 4 | 1 | 4 | 11 | 9 | 0 | 11 |
| 1642 | 1 | 9 | 7 | 8 | 5 | 0 | 0 | 5 | 8 | 9 | 7 | 0 | 8 | 9 |
| 1643 | 9 | 0 | 1 | 6 | 5 | 7 | 5 | 7 | 2 | 0 | 10 | 7 | 3 | 2 |
| 1644 | 4 | 6 | 7 | 4 | 2 | 10 | 6 | 8 | 7 | 10 | 7 | 7 | 6 | 3 |
| 1645 | 6 | 2 | 3 | 4 | 0 | 2 | 7 | 0 | 7 | 5 | 10 | 2 | 4 | 1 |
| 1646 | 8 | 3 | 9 | 7 | 1 | 4 | 0 | 3 | 5 | 8 | 5 | 10 | 6 | 1 |
| 1647 | 3 | 7 | 2 | 7 | 11 | 9 | 5 | 3 | 11 | 0 | 0 | 9 | 7 | 10 |
| 1648 | 11 | 9 | 0 | 8 | 6 | 1 | 8 | 9 | 8 | 8 | 1 | 7 | 3 | 3 |
| 1649 | 0 | 8 | 8 | 7 | 0 | 11 | 2 | 2 | 5 | 4 | 0 | 11 | 7 | 1 |
| 1650 | 4 | 0 | 11 | 7 | 11 | 0 | 11 | 1 | 6 | 3 | 1 | 11 | 5 | 11 |
| 1651 | 7 | 5 | 0 | 9 | 1 | 11 | 9 | 5 | 0 | 2 | 7 | 5 | 8 | 10 |
| 1652 | 1 | 10 | 6 | 5 | 9 | 5 | 4 | 8 | 11 | 4 | 5 | 10 | 8 | 1 |
| 1653 | 4 | 3 | 6 | 1 | 11 | 7 | 3 | 9 | 3 | 2 | 4 | 8 | 10 | 2 |
| 1654 | 8 | 10 | 6 | 3 | 10 | 10 | 0 | 8 | 0 | 8 | 3 | 0 | 11 | 5 |
| 1655 | 11 | 11 | 6 | 9 | 3 | 10 | 1 | 9 | 9 | 3 | 11 | 3 | 8 | 8 |
| 1656 | 9 | 9 | 9 | 3 | 4 | 3 | 9 | 11 | 3 | 7 | 6 | 6 | 10 | 8 |
| 1657 | 5 | 2 | 1 | 4 | 10 | 3 | 3 | 1 | 9 | 8 | 1 | 9 | 3 | 10 |
| 1658 | 1 | 6 | 0 | 11 | 3 | 4 | 2 | 2 | 5 | 8 | 9 | 1 | 5 | 2 |
| 1659 | 4 | 10 | 6 | 6 | 1 | 3 | 2 | 1 | 1 | 5 | 10 | 5 | 1 | 10 |
| 1660 | 9 | 4 | 3 | 9 | 7 | 0 | 9 | 8 | 1 | 1 | 4 | 11 | 8 | 7 |
| 1661 | 7 | 3 | 3 | 0 | 4 | 0 | 11 | 3 | 10 | 3 | 2 | 9 | 8 | 0 |
| 1662 | 1 | 6 | 4 | 7 | 6 | 11 | 5 | 4 | 11 | 3 | 6 | 0 | 5 | 1 |
| 1663 | 0 | 8 | 10 | 4 | 9 | 1 | 11 | 3 | 4 | 0 | 10 | 1 | 0 | 0 |
| 1664 | 8 | 6 | 3 | 0 | 8 | 2 | 1 | 9 | 6 | 9 | 9 | 4 | 0 | 8 |
| 1665 | 2 | 10 | 9 | 6 | 5 | 1 | 9 | 3 | 10 | 10 | 8 | 1 | 2 | 5 |
| 1666 | 4 | 0 | 4 | 3 | 1 | 1 | 7 | 10 | 4 | 9 | 1 | 4 | 2 | 2 |
| 1667 | 2 | 8 | 10 | 8 | 2 | 3 | 5 | 4 | 0 | 8 | 8 | 6 | 9 | 2 |
| 1668 | 5 | 1 | 8 | 10 | 7 | 10 | 0 | 5 | 4 | 11 | 4 | 6 | 9 | 6 |
| 1669 | 2 | 10 | 8 | 3 | 4 | 5 | 6 | 2 | 8 | 9 | 2 | 10 | 11 | 0 |
| 1670 | 1 | 0 | 2 | 2 | 3 | 0 | 7 | 10 | 5 | 7 | 7 | 9 | 7 | 0 |
| 1671 | 2 | 0 | 5 | 4 | 1 | 6 | 10 | 9 | 3 | 6 | 8 | 2 | 2 | 11 |
| 1672 | 1 | 11 | 2 | 6 | 10 | 3 | 0 | 4 | 8 | 1 | 4 | 3 | 6 | 3 |
| 1673 | 8 | 3 | 11 | 9 | 10 | 0 | 6 | 4 | 9 | 7 | 6 | 9 | 4 | 3 |
| 1674 | 11 | 3 | 5 | 11 | 4 | 6 | 10 | 6 | 5 | 11 | 10 | 0 | 1 | 8 |
| 1675 | 11 | 0 | 6 | 6 | 11 | 8 | 6 | 9 | 6 | 7 | 2 | 6 | 1 | 4 |
| 1676 | 4 | 7 | 8 | 1 | 6 | 5 | 8 | 11 | 3 | 0 | 3 | 11 | 1 | 5 |
| 1677 | 3 | 3 | 1 | 5 | 0 | 3 | 1 | 1 | 0 | 7 | 6 | 11 | 1 | 11 |
| 1678 | 11 | 5 | 10 | 9 | 9 | 7 | 0 | 1 | 6 | 5 | 1 | 2 | 2 | 9 |
| 1679 | 1 | 6 | 2 | 4 | 0 | 6 | 5 | 2 | 10 | 0 | 11 | 10 | 10 | 6 |
| 1680 | 4 | 0 | 3 | 2 | 0 | 7 | 3 | 10 | 0 | 8 | 0 | 11 | 11 | 9 |
| 1681 | 4 | 9 | 10 | 7 | 2 | 11 | 9 | 11 | 9 | 1 | 7 | 2 | 11 | 7 |
| 1682 | 6 | 5 | 8 | 4 | 7 | 1 | 0 | 4 | 7 | 6 | 3 | 11 | 8 | 11 |
| 1683 | 0 | 7 | 7 | 9 | 3 | 10 | 11 | 8 | 3 | 1 | 5 | 10 | 10 | 5 |
| 1684 | 7 | 11 | 8 | 4 | 1 | 4 | 11 | 0 | 3 | 0 | 7 | 8 | 6 | 2 |
| 1685 | 8 | 4 | 2 | 9 | 1 | 5 | 1 | 2 | 2 | 11 | 9 | 2 | 4 | 11 |
| 1686 | 0 | 5 | 2 | 9 | 11 | 4 | 8 | 5 | 11 | 5 | 8 | 6 | 0 | 5 |
| 1687 | 1 | 5 | 4 | 10 | 2 | 1 | 7 | 7 | 7 | 8 | 9 | 2 | 0 | 6 |
| 1688 | 3 | 8 | 2 | 0 | 6 | 2 | 6 | 6 | 9 | 7 | 9 | 6 | 5 | 0 |
| 1689 | 9 | 4 | 2 | 11 | 3 | 2 | 2 | 0 | 11 | 6 | 11 | 8 | 9 | 0 |
| 1690 | 10 | 11 | 0 | 1 | 6 | 3 | 9 | 11 | 8 | 4 | 5 | 2 | 9 | 9 |
| 1691 | 2 | 11 | 4 | 1 | 9 | 9 | 6 | 3 | 7 | 6 | 11 | 11 | 5 | 4 |
| 1692 | 6 | 11 | 10 | 6 | 7 | 0 | 3 | 4 | 6 | 9 | 0 | 1 | 4 | 10 |
| 1693 | 8 | 6 | 8 | 3 | 11 | 1 | 7 | 0 | 2 | 4 | 10 | 0 | 7 | 0 |
| 1694 | 1 | 10 | 2 | 10 | 11 | 10 | 7 | 6 | 3 | 9 | 10 | 1 | 2 | 9 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 1695 | 10 | 5 | 5 | 0 | 8 | 7 | 2 | 5 | 3 | 10 | 5 | 11 | 4 | 2 |
| 1696 | 5 | 11 | 5 | 8 | 1 | 9 | 7 | 1 | 4 | 6 | 4 | 1 | 4 | 9 |
| 1697 | 4 | 10 | 5 | 9 | 3 | 0 | 10 | 6 | 3 | 3 | 7 | 6 | 9 | 7 |
| 1698 | 11 | 10 | 10 | 4 | 7 | 7 | 1 | 10 | 3 | 3 | 8 | 5 | 1 | 3 |
| 1699 | 9 | 1 | 7 | 2 | 4 | 5 | 5 | 3 | 10 | 1 | 4 | 5 | 9 | 10 |
| 1700 | 10 | 5 | 8 | 6 | 10 | 6 | 0 | 11 | 10 | 5 | 9 | 0 | 1 | 2 |
| 1701 | 3 | 11 | 1 | 4 | 7 | 10 | 1 | 11 | 4 | 9 | 7 | 2 | 10 | 0 |
| 1702 | 2 | 4 | 1 | 5 | 4 | 11 | 2 | 9 | 2 | 1 | 0 | 6 | 0 | 4 |
| 1703 | 11 | 5 | 11 | 7 | 3 | 0 | 8 | 3 | 3 | 10 | 6 | 1 | 10 | 10 |
| 1704 | 0 | 2 | 8 | 6 | 9 | 10 | 10 | 9 | 5 | 9 | 3 | 3 | 9 | 0 |
| 1705 | 2 | 2 | 11 | 10 | 2 | 0 | 1 | 0 | 9 | 4 | 0 | 0 | 5 | 8 |
| 1706 | 0 | 2 | 10 | 3 | 2 | 2 | 5 | 7 | 4 | 4 | 3 | 11 | 1 | 9 |
| 1707 | 9 | 0 | 8 | 4 | 5 | 5 | 4 | 1 | 5 | 5 | 4 | 11 | 0 | 8 |
| 1708 | 2 | 3 | 11 | 10 | 9 | 7 | 4 | 6 | 11 | 1 | 11 | 3 | 2 | 6 |
| 1709 | 1 | 0 | 7 | 8 | 8 | 4 | 1 | 11 | 2 | 3 | 4 | 7 | 11 | 10 |
| 1710 | 0 | 8 | 4 | 11 | 2 | 2 | 0 | 6 | 8 | 10 | 6 | 0 | 0 | 3 |
| 1711 | 8 | 2 | 11 | 5 | 9 | 8 | 10 | 8 | 3 | 1 | 10 | 2 | 7 | 8 |
| 1712 | 10 | 1 | 9 | 3 | 11 | 10 | 8 | 9 | 9 | 6 | 1 | 9 | 6 | 4 |
| 1713 | 1 | 7 | 6 | 8 | 9 | 10 | 2 | 3 | 1 | 11 | 8 | 8 | 11 | 0 |
| 1714 | 5 | 6 | 3 | 8 | 1 | 3 | 10 | 7 | 2 | 10 | 7 | 8 | 0 | 11 |
| 1715 | 9 | 6 | 11 | 10 | 5 | 10 | 0 | 1 | 9 | 1 | 5 | 2 | 8 | 2 |
| 1716 | 9 | 9 | 10 | 6 | 0 | 2 | 8 | 3 | 8 | 0 | 3 | 6 | 8 | 11 |
| 1717 | 9 | 5 | 2 | 7 | 10 | 4 | 6 | 11 | 6 | 2 | 4 | 5 | 7 | 6 |
| 1718 | 7 | 7 | 7 | 0 | 6 | 6 | 2 | 2 | 11 | 9 | 11 | 5 | 8 | 5 |
| 1719 | 9 | 7 | 11 | 0 | 9 | 5 | 1 | 10 | 2 | 2 | 0 | 6 | 6 | 1 |
| 1720 | 5 | 5 | 3 | 3 | 11 | 6 | 7 | 5 | 9 | 3 | 3 | 5 | 9 | 7 |
| 1721 | 10 | 4 | 5 | 2 | 2 | 3 | 5 | 0 | 2 | 9 | 6 | 7 | 8 | 1 |
| 1722 | 10 | 2 | 0 | 5 | 5 | 8 | 11 | 2 | 0 | 11 | 1 | 6 | 8 | 11 |
| 1723 | 2 | 2 | 7 | 11 | 9 | 1 | 6 | 1 | 10 | 7 | 10 | 7 | 1 | 6 |
| 1724 | 8 | 1 | 5 | 7 | 4 | 7 | 3 | 7 | 2 | 7 | 0 | 8 | 7 | 5 |
| 1725 | 10 | 3 | 3 | 7 | 8 | 1 | 10 | 6 | 0 | 0 | 3 | 2 | 3 | 3 |
| 1726 | 7 | 3 | 5 | 5 | 6 | 1 | 0 | 8 | 2 | 9 | 9 | 0 | 3 | 7 |
| 1727 | 9 | 6 | 9 | 1 | 1 | 2 | 4 | 0 | 4 | 4 | 1 | 6 | 0 | 1 |
| 1728 | 2 | 0 | 9 | 0 | 3 | 4 | 8 | 8 | 10 | 2 | 3 | 7 | 9 | 4 |
| 1729 | 0 | 10 | 7 | 9 | 0 | 8 | 3 | 9 | 10 | 9 | 0 | 9 | 5 | 4 |
| 1730 | 1 | 4 | 1 | 1 | 3 | 10 | 10 | 3 | 11 | 7 | 5 | 5 | 4 | 6 |
| 1731 | 2 | 9 | 8 | 11 | 5 | 10 | 3 | 8 | 0 | 4 | 0 | 4 | 0 | 6 |
| 1732 | 8 | 2 | 7 | 10 | 6 | 1 | 2 | 11 | 0 | 5 | 7 | 8 | 3 | 11 |
| 1733 | 10 | 3 | 1 | 4 | 4 | 4 | 9 | 1 | 5 | 6 | 11 | 2 | 11 | 2 |
| 1734 | 7 | 10 | 9 | 10 | 9 | 2 | 6 | 11 | 1 | 10 | 0 | 11 | 7 | 2 |
| 1735 | 3 | 2 | 5 | 2 | 11 | 9 | 6 | 4 | 1 | 8 | 9 | 2 | 3 | 8 |
| 1736 | 9 | 7 | 10 | 5 | 5 | 1 | 7 | 6 | 5 | 6 | 2 | 6 | 9 | 3 |
| 1737 | 6 | 1 | 6 | 0 | 8 | 8 | 0 | 0 | 9 | 7 | 5 | 7 | 3 | 5 |
| 1738 | 9 | 0 | 9 | 1 | 2 | 0 | 11 | 5 | 8 | 0 | 4 | 8 | 1 | 6 |
| 1739 | 2 | 4 | 6 | 5 | 6 | 10 | 11 | 6 | 5 | 4 | 4 | 8 | 2 | 11 |
| 1740 | 7 | 1 | 0 | 5 | 7 | 10 | 8 | 10 | 0 | 1 | 9 | 11 | 0 | 2 |
| 1741 | 8 | 7 | 3 | 3 | 5 | 10 | 7 | 4 | 7 | 10 | 6 | 3 | 1 | 6 |
| 1742 | 3 | 0 | 8 | 5 | 5 | 6 | 2 | 2 | 8 | 10 | 3 | 0 | 2 | 4 |
| 1743 | 11 | 5 | 4 | 1 | 11 | 3 | 1 | 2 | 1 | 9 | 3 | 9 | 0 | 9 |
| 1744 | 6 | 2 | 9 | 6 | 8 | 11 | 11 | 8 | 6 | 4 | 6 | 2 | 10 | 7 |
| 1745 | 2 | 3 | 1 | 1 | 1 | 6 | 8 | 0 | 0 | 0 | 2 | 7 | 10 | 9 |
| 1746 | 7 | 6 | 6 | 5 | 9 | 4 | 3 | 9 | 1 | 9 | 7 | 6 | 4 | 11 |
| 1747 | 1 | 2 | 3 | 8 | 10 | 8 | 1 | 5 | 5 | 1 | 3 | 4 | 10 | 11 |
| 1748 | 5 | 8 | 9 | 4 | 0 | 1 | 10 | 8 | 0 | 4 | 2 | 7 | 2 | 2 |
| 1749 | 2 | 3 | 2 | 0 | 2 | 5 | 10 | 8 | 9 | 10 | 6 | 5 | 8 | 2 |
| 1750 | 0 | 4 | 8 | 7 | 3 | 7 | 7 | 11 | 2 | 3 | 9 | 10 | 9 | 3 |
| 1751 | 7 | 8 | 2 | 9 | 6 | 9 | 2 | 9 | 6 | 0 | 4 | 0 | 6 | 4 |
| 1752 | 8 | 1 | 6 | 9 | 6 | 3 | 8 | 2 | 4 | 3 | 0 | 5 | 0 | 7 |
| 1753 | 0 | 5 | 6 | 5 | 3 | 2 | 6 | 5 | 3 | 6 | 9 | 4 | 2 | 9 |
| 1754 | 7 | 7 | 11 | 11 | 5 | 9 | 2 | 6 | 3 | 5 | 5 | 3 | 11 | 11 |
| 1755 | 5 | 2 | 3 | 7 | 2 | 6 | 8 | 7 | 0 | 6 | 10 | 10 | 8 | 8 |
| 1756 | 0 | 11 | 0 | 1 | 7 | 1 | 0 | 9 | 0 | 11 | 6 | 9 | 4 | 1 |
| 1757 | 7 | 5 | 1 | 6 | 0 | 2 | 6 | 2 | 6 | 11 | 8 | 7 | 0 | 3 |
| 1758 | 11 | 7 | 4 | 2 | 3 | 2 | 4 | 4 | 7 | 8 | 8 | 10 | 2 | 1 |
| 1759 | 10 | 8 | 6 | 1 | 1 | 2 | 6 | 3 | 11 | 3 | 8 | 3 | 6 | 5 |
| 1760 | 5 | 6 | 2 | 11 | 4 | 7 | 7 | 4 | 5 | 2 | 1 | 5 | 8 | 1 |
| 1761 | 0 | 9 | 6 | 6 | 7 | 4 | 0 | 10 | 10 | 10 | 11 | 2 | 3 | 7 |
| 1762 | 4 | 6 | 1 | 8 | 6 | 6 | 11 | 8 | 6 | 2 | 10 | 9 | 8 | 2 |
| 1763 | 6 | 2 | 1 | 5 | 11 | 10 | 2 | 10 | 5 | 10 | 5 | 10 | 5 | 8 |
| 1764 | 9 | 0 | 2 | 3 | 1 | 8 | 0 | 1 | 11 | 11 | 3 | 7 | 10 | 1 |
| 1765 | 8 | 11 | 0 | 1 | 8 | 6 | 2 | 0 | 2 | 9 | 1 | 10 | 1 | 3 |
| 1766 | 10 | 8 | 8 | 10 | 9 | 8 | 1 | 5 | 6 | 9 | 8 | 10 | 4 | 4 |
| 1767 | 1 | 8 | 10 | 11 | 5 | 5 | 9 | 6 | 4 | 2 | 7 | 8 | 3 | 6 |
| 1768 | 11 | 9 | 11 | 3 | 6 | 7 | 11 | 10 | 0 | 9 | 7 | 1 | 7 | 6 |
| 1769 | 3 | 8 | 6 | 10 | 0 | 7 | 9 | 11 | 7 | 1 | 8 | 0 | 5 | 9 |
| 1770 | 11 | 8 | 1 | 0 | 10 | 0 | 11 | 2 | 1 | 4 | 9 | 3 | 2 | 6 |
| 1771 | 8 | 11 | 9 | 7 | 6 | 8 | 10 | 4 | 4 | 11 | 1 | 9 | 3 | 0 |
| 1772 | 4 | 0 | 4 | 0 | 5 | 9 | 10 | 3 | 3 | 11 | 6 | 7 | 1 | 0 |
| 1773 | 11 | 5 | 7 | 2 | 4 | 7 | 6 | 8 | 8 | 11 | 6 | 6 | 3 | 1 |
| 1774 | 5 | 4 | 8 | 5 | 4 | 10 | 9 | 7 | 10 | 0 | 8 | 7 | 4 | 10 |
| 1775 | 3 | 10 | 8 | 11 | 9 | 8 | 9 | 10 | 11 | 6 | 1 | 2 | 3 | 3 |
| 1776 | 3 | 7 | 5 | 1 | 5 | 4 | 5 | 10 | 0 | 4 | 8 | 10 | 5 | 11 |
| 1777 | 6 | 4 | 3 | 7 | 9 | 8 | 1 | 11 | 3 | 4 | 7 | 6 | 3 | 2 |
| 1778 | 10 | 6 | 11 | 9 | 0 | 7 | 4 | 3 | 1 | 6 | 3 | 8 | 6 | 2 |
| 1779 | 2 | 11 | 0 | 9 | 2 | 11 | 2 | 7 | 3 | 7 | 3 | 9 | 11 | 8 |
| 1780 | 8 | 4 | 0 | 4 | 11 | 5 | 9 | 4 | 3 | 5 | 11 | 6 | 6 | 6 |
| 1781 | 8 | 10 | 8 | 4 | 3 | 9 | 3 | 11 | 11 | 10 | 7 | 5 | 0 | 10 |
| 1782 | 8 | 4 | 8 | 1 | 0 | 1 | 11 | 10 | 1 | 10 | 9 | 1 | 1 | 7 |
| 1783 | 7 | 3 | 8 | 7 | 0 | 4 | 1 | 8 | 7 | 1 | 2 | 4 | 11 | 3 |
| 1784 | 9 | 3 | 8 | 2 | 9 | 8 | 0 | 3 | 0 | 0 | 7 | 0 | 2 | 8 |
| 1785 | 6 | 4 | 1 | 10 | 4 | 9 | 11 | 0 | 6 | 11 | 3 | 3 | 9 | 8 |
| 1786 | 7 | 2 | 1 | 3 | 8 | 3 | 0 | 6 | 4 | 3 | 9 | 2 | 4 | 2 |
| 1787 | 9 | 1 | 10 | 7 | 3 | 7 | 2 | 6 | 9 | 8 | 10 | 9 | 8 | 1 |
| 1788 | 3 | 6 | 10 | 7 | 10 | 6 | 5 | 6 | 8 | 9 | 2 | 1 | 0 | 11 |
| 1789 | 9 | 7 | 4 | 3 | 0 | 11 | 9 | 5 | 6 | 8 | 1 | 11 | 6 | 3 |
| 1790 | 9 | 8 | 2 | 0 | 2 | 11 | 9 | 0 | 0 | 5 | 0 | 10 | 3 | 9 |
| 1791 | 9 | 1 | 3 | 7 | 9 | 1 | 5 | 0 | 4 | 10 | 9 | 11 | 10 | 11 |
| 1792 | 3 | 3 | 0 | 6 | 0 | 6 | 3 | 10 | 5 | 0 | 10 | 4 | 11 | 11 |
| 1793 | 1 | 9 | 6 | 9 | 8 | 7 | 6 | 0 | 4 | 2 | 3 | 3 | 10 | 0 |
| 1794 | 9 | 7 | 1 | 7 | 10 | 5 | 0 | 7 | 3 | 3 | 5 | 9 | 8 | 7 |
| 1795 | 10 | 11 | 4 | 3 | 4 | 10 | 11 | 4 | 6 | 10 | 2 | 6 | 2 | 5 |
| 1796 | 6 | 8 | 5 | 1 | 3 | 11 | 5 | 11 | 7 | 11 | 6 | 2 | 1 | 3 |
| 1797 | 0 | 6 | 8 | 2 | 2 | 11 | 10 | 4 | 4 | 6 | 10 | 10 | 0 | 1 |
| 1798 | 0 | 0 | 6 | 1 | 7 | 9 | 9 | 8 | 2 | 8 | 8 | 9 | 9 | 4 |
| 1799 | 7 | 0 | 11 | 10 | 1 | 2 | 7 | 10 | 7 | 3 | 9 | 6 | 3 | 0 |
| 1800 | 4 | 7 | 3 | 0 | 1 | 6 | 1 | 1 | 8 | 4 | 3 | 10 | 2 | 10 |
| 1801 | 3 | 5 | 8 | 0 | 9 | 0 | 2 | 5 | 9 | 1 | 7 | 1 | 6 | 0 |
| 1802 | 5 | 0 | 4 | 11 | 11 | 8 | 0 | 6 | 0 | 11 | 5 | 8 | 6 | 11 |
| 1803 | 3 | 11 | 11 | 4 | 7 | 1 | 5 | 0 | 11 | 1 | 3 | 0 | 3 | 2 |
| 1804 | 5 | 1 | 2 | 2 | 7 | 2 | 0 | 7 | 5 | 10 | 1 | 7 | 11 | 9 |
| 1805 | 3 | 4 | 7 | 8 | 11 | 1 | 4 | 7 | 10 | 0 | 0 | 11 | 1 | 3 |
| 1806 | 2 | 3 | 1 | 3 | 4 | 2 | 4 | 3 | 11 | 9 | 4 | 11 | 10 | 2 |
| 1807 | 7 | 8 | 2 | 7 | 11 | 11 | 4 | 4 | 9 | 10 | 8 | 8 | 3 | 4 |
| 1808 | 4 | 1 | 4 | 1 | 5 | 3 | 10 | 11 | 11 | 8 | 11 | 4 | 7 | 11 |
| 1809 | 11 | 5 | 0 | 5 | 5 | 3 | 7 | 1 | 7 | 0 | 7 | 8 | 5 | 10 |
| 1810 | 7 | 8 | 6 | 6 | 0 | 8 | 10 | 3 | 8 | 6 | 9 | 2 | 10 | 7 |
| 1811 | 8 | 4 | 0 | 0 | 8 | 7 | 8 | 3 | 0 | 1 | 6 | 5 | 1 | 10 |
| 1812 | 4 | 5 | 0 | 2 | 6 | 4 | 5 | 8 | 2 | 6 | 5 | 11 | 6 | 8 |
| 1813 | 2 | 8 | 7 | 4 | 2 | 10 | 3 | 6 | 9 | 11 | 2 | 1 | 10 | 8 |
| 1814 | 11 | 0 | 2 | 8 | 0 | 10 | 10 | 9 | 0 | 2 | 10 | 5 | 2 | 3 |
| 1815 | 7 | 1 | 9 | 11 | 11 | 2 | 11 | 2 | 3 | 9 | 11 | 10 | 0 | 7 |
| 1816 | 1 | 10 | 11 | 4 | 0 | 5 | 8 | 11 | 8 | 4 | 4 | 9 | 4 | 0 |
| 1817 | 1 | 8 | 9 | 0 | 6 | 11 | 9 | 3 | 10 | 0 | 5 | 9 | 7 | 2 |
| 1818 | 1 | 4 | 10 | 8 | 1 | 3 | 8 | 6 | 3 | 7 | 9 | 2 | 0 | 5 |
| 1819 | 9 | 7 | 11 | 5 | 3 | 6 | 10 | 5 | 4 | 7 | 1 | 2 | 4 | 11 |
| 1820 | 10 | 2 | 9 | 5 | 5 | 11 | 4 | 7 | 5 | 8 | 2 | 5 | 0 | 6 |
| 1821 | 6 | 10 | 1 | 8 | 3 | 6 | 7 | 9 | 9 | 9 | 0 | 7 | 8 | 10 |
| 1822 | 8 | 3 | 5 | 5 | 2 | 0 | 6 | 2 | 0 | 6 | 8 | 1 | 8 | 7 |
| 1823 | 10 | 9 | 0 | 6 | 9 | 9 | 6 | 9 | 7 | 9 | 6 | 1 | 4 | 5 |
| 1824 | 7 | 5 | 3 | 7 | 2 | 5 | 3 | 3 | 2 | 5 | 1 | 7 | 4 | 1 |
| 1825 | 4 | 4 | 6 | 7 | 11 | 8 | 7 | 10 | 2 | 2 | 2 | 0 | 11 | 9 |
| 1826 | 0 | 0 | 11 | 11 | 6 | 10 | 2 | 7 | 1 | 6 | 0 | 3 | 5 | 10 |
| 1827 | 2 | 4 | 4 | 6 | 3 | 7 | 2 | 2 | 1 | 7 | 8 | 6 | 9 | 9 |
| 1828 | 0 | 9 | 9 | 2 | 11 | 5 | 3 | 11 | 1 | 4 | 10 | 4 | 7 | 3 |
| 1829 | 0 | 0 | 5 | 8 | 8 | 3 | 2 | 2 | 2 | 11 | 5 | 4 | 10 | 1 |
| 1830 | 8 | 5 | 4 | 6 | 7 | 2 | 8 | 6 | 3 | 1 | 2 | 1 | 7 | 4 |
| 1831 | 5 | 2 | 0 | 9 | 1 | 8 | 5 | 4 | 4 | 9 | 3 | 7 | 6 | 2 |
| 1832 | 1 | 6 | 5 | 8 | 4 | 6 | 4 | 2 | 7 | 5 | 0 | 6 | 9 | 8 |
| 1833 | 4 | 3 | 4 | 11 | 7 | 9 | 6 | 4 | 0 | 3 | 7 | 2 | 5 | 0 |
| 1834 | 8 | 8 | 6 | 0 | 1 | 0 | 8 | 8 | 9 | 3 | 9 | 8 | 8 | 11 |
| 1835 | 5 | 3 | 2 | 5 | 0 | 8 | 5 | 1 | 3 | 6 | 0 | 3 | 11 | 5 |
| 1836 | 0 | 11 | 2 | 11 | 5 | 11 | 5 | 10 | 5 | 3 | 6 | 8 | 6 | 2 |
| 1837 | 4 | 4 | 3 | 11 | 1 | 11 | 5 | 2 | 11 | 0 | 5 | 0 | 4 | 4 |
| 1838 | 1 | 2 | 11 | 7 | 1 | 0 | 7 | 8 | 2 | 0 | 0 | 10 | 0 | 1 |
| 1839 | 7 | 5 | 10 | 2 | 10 | 2 | 8 | 11 | 2 | 8 | 6 | 6 | 0 | 6 |
| 1840 | 2 | 7 | 4 | 8 | 6 | 8 | 9 | 5 | 9 | 10 | 9 | 1 | 1 | 10 |
| 1841 | 11 | 6 | 7 | 5 | 7 | 6 | 1 | 5 | 11 | 10 | 5 | 8 | 9 | 9 |
| 1842 | 7 | 3 | 4 | 5 | 2 | 5 | 1 | 5 | 3 | 7 | 10 | 6 | 6 | 0 |
| 1843 | 3 | 9 | 2 | 11 | 4 | 5 | 10 | 4 | 2 | 5 | 8 | 1 | 2 | 11 |
| 1844 | 3 | 2 | 11 | 5 | 10 | 10 | 9 | 10 | 9 | 11 | 0 | 11 | 8 | 5 |

-continued

Example # 3 of a group-based CS hopping pattern

| m | $n_{cs}(n)$ | | | | | | | | | | | | | |
|---|---|---|---|---|---|---|---|---|---|---|---|---|---|---|
| 1845 | 8 | 8 | 10 | 10 | 2 | 11 | 11 | 2 | 4 | 9 | 2 | 6 | 11 | 11 |
| 1846 | 9 | 10 | 2 | 1 | 5 | 2 | 5 | 5 | 0 | 1 | 11 | 1 | 3 | 8 |
| 1847 | 7 | 11 | 10 | 4 | 1 | 6 | 4 | 7 | 0 | 11 | 11 | 9 | 8 | 0 |
| 1848 | 4 | 2 | 6 | 11 | 8 | 7 | 2 | 7 | 7 | 8 | 9 | 7 | 11 | 8 |
| 1849 | 11 | 9 | 10 | 5 | 6 | 9 | 9 | 10 | 3 | 5 | 3 | 3 | 3 | 7 |
| 1850 | 3 | 9 | 10 | 0 | 3 | 4 | 10 | 11 | 0 | 9 | 7 | 4 | 3 | 2 |
| 1851 | 2 | 0 | 5 | 8 | 3 | 5 | 8 | 1 | 7 | 10 | 11 | 8 | 8 | 5 |
| 1852 | 7 | 6 | 3 | 11 | 3 | 8 | 9 | 7 | 10 | 10 | 3 | 10 | 10 | 2 |
| 1853 | 10 | 1 | 6 | 3 | 4 | 11 | 1 | 9 | 5 | 11 | 5 | 7 | 7 | 8 |
| 1854 | 11 | 0 | 1 | 10 | 10 | 7 | 1 | 6 | 9 | 6 | 3 | 4 | 2 | 9 |
| 1855 | 2 | 6 | 3 | 3 | 0 | 4 | 0 | 1 | 9 | 2 | 1 | 9 | 2 | 0 |
| 1856 | 2 | 10 | 7 | 4 | 9 | 9 | 5 | 0 | 8 | 10 | 11 | 7 | 2 | 9 |
| 1857 | 3 | 1 | 9 | 0 | 9 | 10 | 5 | 6 | 1 | 5 | 4 | 11 | 3 | 3 |
| 1858 | 7 | 4 | 5 | 4 | 4 | 0 | 10 | 10 | 1 | 8 | 8 | 8 | 11 | 5 |
| 1859 | 3 | 3 | 8 | 5 | 11 | 6 | 5 | 11 | 0 | 2 | 9 | 9 | 4 | 6 |
| 1860 | 6 | 4 | 6 | 3 | 10 | 0 | 1 | 0 | 7 | 3 | 6 | 1 | 9 | 1 |
| 1861 | 0 | 3 | 5 | 5 | 7 | 1 | 11 | 3 | 10 | 4 | 3 | 2 | 1 | 11 |
| 1862 | 8 | 5 | 4 | 8 | 9 | 9 | 3 | 8 | 6 | 9 | 5 | 0 | 11 | 0 |
| 1863 | 6 | 5 | 6 | 11 | 11 | 1 | 8 | 9 | 10 | 7 | 8 | 5 | 9 | 11 |
| 1864 | 4 | 2 | 9 | 8 | 2 | 0 | 1 | 4 | 0 | 5 | 11 | 4 | 1 | 5 |
| 1865 | 8 | 1 | 10 | 4 | 11 | 9 | 0 | 4 | 9 | 0 | 2 | 11 | 2 | 10 |
| 1866 | 3 | 11 | 5 | 7 | 8 | 4 | 0 | 5 | 4 | 8 | 11 | 8 | 10 | 8 |
| 1867 | 6 | 0 | 9 | 7 | 1 | 3 | 11 | 11 | 10 | 10 | 4 | 1 | 7 | 1 |
| 1868 | 2 | 0 | 3 | 5 | 8 | 10 | 10 | 3 | 4 | 3 | 6 | 9 | 10 | 6 |
| 1869 | 5 | 5 | 11 | 0 | 5 | 7 | 2 | 1 | 8 | 6 | 8 | 4 | 3 | 7 |
| 1870 | 5 | 4 | 3 | 1 | 5 | 6 | 6 | 6 | 11 | 11 | 8 | 1 | 9 | 10 |
| 1871 | 4 | 10 | 5 | 2 | 5 | 9 | 4 | 8 | 4 | 1 | 9 | 9 | 8 | 3 |
| 1872 | 11 | 9 | 8 | 7 | 3 | 7 | 0 | 1 | 10 | 6 | 5 | 5 | 6 | 10 |
| 1873 | 1 | 0 | 3 | 9 | 6 | 2 | 5 | 6 | 8 | 2 | 1 | 8 | 9 | 8 |
| 1874 | 7 | 1 | 4 | 10 | 4 | 8 | 9 | 6 | 2 | 6 | 6 | 5 | 3 | 8 |
| 1875 | 4 | 4 | 8 | 9 | 0 | 3 | 10 | 5 | 4 | 9 | 4 | 1 | 5 | 9 |
| 1876 | 8 | 5 | 11 | 3 | 7 | 3 | 5 | 10 | 5 | 4 | 1 | 5 | 2 | 1 |
| 1877 | 4 | 1 | 3 | 6 | 11 | 0 | 9 | 5 | 3 | 3 | 8 | 4 | 2 | 2 |
| 1878 | 10 | 8 | 2 | 9 | 5 | 10 | 10 | 1 | 1 | 0 | 2 | 3 | 3 | 9 |
| 1879 | 7 | 1 | 0 | 9 | 10 | 2 | 6 | 9 | 4 | 11 | 10 | 9 | 3 | 10 |
| 1880 | 6 | 10 | 5 | 0 | 5 | 1 | 9 | 10 | 8 | 8 | 11 | 6 | 5 | 10 |
| 1881 | 0 | 0 | 7 | 10 | 7 | 4 | 3 | 5 | 1 | 0 | 6 | 11 | 3 | 1 |
| 1882 | 10 | 11 | 5 | 1 | 6 | 11 | 7 | 10 | 2 | 10 | 8 | 5 | 4 | 0 |
| 1883 | 3 | 6 | 7 | 7 | 2 | 8 | 11 | 11 | 7 | 0 | 11 | 3 | 5 | 6 |
| 1884 | 1 | 8 | 11 | 4 | 6 | 6 | 2 | 8 | 7 | 10 | 10 | 11 | 3 | 11 |
| 1885 | 8 | 4 | 2 | 1 | 4 | 0 | 4 | 3 | 7 | 4 | 10 | 4 | 0 | 6 |
| 1886 | 9 | 6 | 10 | 2 | 4 | 11 | 8 | 5 | 3 | 2 | 5 | 3 | 6 | 4 |
| 1887 | 1 | 3 | 6 | 2 | 2 | 0 | 5 | 7 | 2 | 1 | 7 | 0 | 10 | 5 |
| 1888 | 10 | 8 | 6 | 4 | 9 | 3 | 4 | 1 | 2 | 3 | 6 | 4 | 0 | 10 |
| 1889 | 5 | 2 | 4 | 8 | 10 | 3 | 1 | 10 | 10 | 2 | 2 | 2 | 6 | 6 |
| 1890 | 11 | 9 | 10 | 2 | 11 | 6 | 7 | 1 | 5 | 9 | 6 | 9 | 9 | 1 |
| 1891 | 6 | 7 | 5 | 2 | 4 | 1 | 3 | 4 | 0 | 9 | 4 | 2 | 8 | 5 |
| 1892 | 9 | 7 | 8 | 8 | 9 | 1 | 10 | 3 | 3 | 4 | 11 | 10 | 7 | 4 |
| 1893 | 5 | 11 | 1 | 7 | 2 | 8 | 7 | 1 | 9 | 5 | 7 | 5 | 2 | 8 |
| 1894 | 11 | 7 | 9 | 10 | 5 | 7 | 7 | 9 | 11 | 4 | 8 | 3 | 4 | 4 |
| 1895 | 6 | 5 | 9 | 8 | 4 | 5 | 0 | 6 | 9 | 6 | 4 | 0 | 0 | 2 |
| 1896 | 11 | 11 | 4 | 0 | 3 | 3 | 9 | 1 | 4 | 11 | 4 | 6 | 8 | 3 |
| 1897 | 3 | 10 | 8 | 1 | 6 | 7 | 0 | 8 | 3 | 9 | 4 | 7 | 11 | 4 |
| 1898 | 0 | 11 | 10 | 1 | 10 | 10 | 0 | 7 | 5 | 2 | 10 | 11 | 0 | 4 |
| 1899 | 11 | 6 | 4 | 1 | 1 | 9 | 4 | 11 | 5 | 2 | 0 | 8 | 3 | 10 |
| 1900 | 9 | 5 | 3 | 11 | 5 | 4 | 0 | 2 | 0 | 5 | 7 | 10 | 1 | 3 |
| 1901 | 4 | 7 | 10 | 2 | 3 | 3 | 9 | 0 | 2 | 0 | 10 | 3 | 10 | 11 |
| 1902 | 11 | 6 | 7 | 1 | 2 | 1 | 10 | 9 | 2 | 1 | 6 | 6 | 11 | 2 |
| 1903 | 3 | 9 | 7 | 8 | 10 | 10 | 5 | 5 | 6 | 8 | 5 | 1 | 5 | 1 |
| 1904 | 11 | 9 | 11 | 4 | 0 | 10 | 6 | 6 | 10 | 8 | 8 | 2 | 1 | 6 |
| 1905 | 5 | 1 | 7 | 2 | 8 | 8 | 1 | 1 | 4 | 3 | 10 | 11 | 7 | 11 |
| 1906 | 8 | 11 | 9 | 10 | 2 | 2 | 2 | 7 | 8 | 3 | 10 | 4 | 6 | 9 |
| 1907 | 10 | 5 | 3 | 6 | 1 | 9 | 5 | 3 | 10 | 10 | 2 | 3 | 5 | 10 |
| 1908 | 7 | 3 | 2 | 6 | 6 | 10 | 7 | 9 | 3 | 4 | 11 | 2 | 9 | 8 |
| 1909 | 11 | 1 | 7 | 11 | 0 | 6 | 9 | 3 | 0 | 1 | 3 | 7 | 4 | 11 |
| 1910 | 10 | 4 | 7 | 9 | 4 | 3 | 3 | 8 | 3 | 8 | 0 | 3 | 8 | 11 |
| 1911 | 9 | 1 | 3 | 8 | 7 | 10 | 3 | 7 | 4 | 2 | 8 | 8 | 1 | 7 |
| 1912 | 2 | 0 | 11 | 3 | 5 | 2 | 11 | 2 | 10 | 8 | 0 | 7 | 4 | 11 |
| 1913 | 4 | 7 | 8 | 10 | 2 | 2 | 5 | 8 | 9 | 11 | 3 | 2 | 0 | 2 |
| 1914 | 1 | 6 | 0 | 6 | 7 | 0 | 6 | 3 | 9 | 7 | 0 | 11 | 5 | 7 |
| 1915 | 11 | 1 | 3 | 6 | 4 | 7 | 7 | 2 | 9 | 8 | 2 | 1 | 3 | 5 |
| 1916 | 1 | 10 | 4 | 2 | 3 | 3 | 2 | 6 | 10 | 5 | 11 | 10 | 4 | 8 |
| 1917 | 0 | 6 | 2 | 8 | 11 | 9 | 11 | 1 | 3 | 5 | 4 | 4 | 6 | 0 |
| 1918 | 2 | 11 | 1 | 9 | 5 | 4 | 11 | 9 | 8 | 4 | 9 | 1 | 0 | 0 |
| 1919 | 9 | 5 | 1 | 10 | 5 | 6 | 10 | 7 | 9 | 11 | 4 | 8 | 7 | 8 |
| 1920 | 4 | 11 | 0 | 3 | 0 | 0 | 7 | 3 | 1 | 9 | 7 | 7 | 0 | 3 |
| 1921 | 5 | 8 | 1 | 5 | 8 | 2 | 9 | 9 | 5 | 4 | 11 | 6 | 6 | 7 |
| 1922 | 9 | 8 | 7 | 3 | 5 | 0 | 9 | 4 | 7 | 1 | 2 | 4 | 6 | 10 |
| 1923 | 8 | 6 | 1 | 9 | 8 | 1 | 2 | 11 | 11 | 11 | 2 | 6 | 0 | 3 |
| 1924 | 2 | 4 | 1 | 0 | 1 | 0 | 0 | 5 | 10 | 8 | 3 | 11 | 3 | 9 |
| 1925 | 4 | 9 | 7 | 6 | 6 | 1 | 11 | 7 | 1 | 7 | 2 | 2 | 11 | 0 |
| 1926 | 7 | 0 | 5 | 9 | 6 | 8 | 3 | 8 | 5 | 3 | 2 | 10 | 4 | 10 |
| 1927 | 7 | 6 | 10 | 1 | 0 | 1 | 7 | 4 | 11 | 0 | 3 | 5 | 9 | 6 |
| 1928 | 5 | 9 | 11 | 2 | 4 | 11 | 5 | 9 | 0 | 0 | 2 | 1 | 10 | 3 |
| 1929 | 5 | 10 | 2 | 4 | 9 | 4 | 1 | 4 | 9 | 6 | 6 | 6 | 10 | 0 |
| 1930 | 6 | 8 | 8 | 9 | 2 | 8 | 0 | 10 | 11 | 5 | 8 | 8 | 10 | 2 |
| 1931 | 1 | 2 | 8 | 1 | 2 | 4 | 6 | 7 | 9 | 4 | 5 | 8 | 8 | 10 |
| 1932 | 9 | 8 | 10 | 3 | 7 | 6 | 7 | 2 | 2 | 7 | 9 | 5 | 10 | 9 |
| 1933 | 4 | 7 | 2 | 1 | 4 | 11 | 1 | 0 | 11 | 10 | 7 | 11 | 8 | 3 |
| 1934 | 8 | 0 | 6 | 5 | 10 | 11 | 2 | 1 | 9 | 7 | 4 | 3 | 10 | 4 |
| 1935 | 1 | 3 | 9 | 7 | 2 | 5 | 4 | 4 | 8 | 8 | 9 | 11 | 8 | 8 |
| 1936 | 9 | 10 | 11 | 8 | 4 | 7 | 4 | 5 | 10 | 11 | 6 | 5 | 5 | 6 |
| 1937 | 1 | 4 | 2 | 0 | 0 | 5 | 0 | 8 | 5 | 5 | 2 | 4 | 10 | 8 |
| 1938 | 7 | 10 | 6 | 10 | 11 | 10 | 6 | 5 | 2 | 4 | 1 | 9 | 8 | 7 |
| 1939 | 6 | 5 | 5 | 0 | 10 | 9 | 0 | 11 | 0 | 0 | 10 | 8 | 4 | 9 |
| 1940 | 7 | 6 | 9 | 0 | 7 | 11 | 4 | 8 | 1 | 11 | 6 | 7 | 6 | 10 |
| 1941 | 9 | 0 | 3 | 8 | 3 | 3 | 6 | 9 | 1 | 5 | 3 | 0 | 7 | 9 |
| 1942 | 8 | 10 | 5 | 3 | 6 | 9 | 10 | 3 | 2 | 9 | 1 | 8 | 6 | 6 |
| 1943 | 11 | 4 | 2 | 4 | 10 | 6 | 11 | 9 | 1 | 10 | 0 | 4 | 4 | 2 |
| 1944 | 0 | 9 | 5 | 5 | 0 | 9 | 1 | 8 | 7 | 3 | 4 | 0 | 5 | 8 |
| 1945 | 0 | 3 | 0 | 10 | 8 | 3 | 0 | 6 | 1 | 6 | 8 | 8 | 1 | 0 |
| 1946 | 5 | 11 | 3 | 1 | 7 | 7 | 3 | 11 | 7 | 9 | 3 | 3 | 8 | 9 |
| 1947 | 8 | 7 | 4 | 9 | 11 | 11 | 1 | 7 | 7 | 9 | 8 | 5 | 7 | 2 |
| 1948 | 9 | 3 | 0 | 9 | 2 | 0 | 3 | 0 | 7 | 10 | 1 | 2 | 7 | 6 |
| 1949 | 11 | 8 | 2 | 6 | 3 | 1 | 6 | 2 | 8 | 1 | 10 | 0 | 1 | 0 |
| 1950 | 10 | 1 | 9 | 4 | 10 | 3 | 1 | 2 | 6 | 0 | 8 | 1 | 10 | 2 |
| 1951 | 9 | 2 | 4 | 7 | 2 | 4 | 4 | 9 | 11 | 1 | 8 | 10 | 9 | 6 |
| 1952 | 6 | 0 | 2 | 7 | 4 | 9 | 6 | 7 | 7 | 5 | 9 | 2 | 10 | 4 |
| 1953 | 4 | 8 | 10 | 8 | 11 | 0 | 6 | 7 | 6 | 4 | 7 | 3 | 4 | 9 |
| 1954 | 11 | 4 | 11 | 8 | 7 | 4 | 2 | 1 | 6 | 5 | 11 | 11 | 7 | 10 |
| 1955 | 5 | 8 | 9 | 1 | 4 | 4 | 1 | 8 | 1 | 3 | 3 | 10 | 3 | 5 |
| 1956 | 2 | 3 | 11 | 10 | 3 | 3 | 11 | 9 | 7 | 2 | 5 | 9 | 6 | 3 |
| 1957 | 6 | 9 | 3 | 11 | 0 | 5 | 3 | 0 | 4 | 1 | 11 | 0 | 6 | 6 |
| 1958 | 10 | 10 | 1 | 6 | 6 | 11 | 4 | 8 | 11 | 0 | 10 | 3 | 1 | 7 |
| 1959 | 7 | 0 | 9 | 3 | 9 | 5 | 7 | 4 | 4 | 11 | 2 | 1 | 1 | 3 |
| 1960 | 7 | 9 | 10 | 6 | 2 | 4 | 1 | 0 | 5 | 10 | 4 | 1 | 0 | 11 |
| 1961 | 11 | 11 | 10 | 9 | 2 | 5 | 5 | 8 | 4 | 0 | 6 | 1 | 7 | 10 |
| 1962 | 9 | 5 | 5 | 1 | 0 | 5 | 6 | 4 | 10 | 7 | 10 | 10 | 8 | 2 |
| 1963 | 7 | 0 | 10 | 9 | 8 | 9 | 4 | 5 | 7 | 7 | 8 | 1 | 11 | 1 |
| 1964 | 3 | 5 | 9 | 11 | 7 | 7 | 11 | 1 | 4 | 7 | 7 | 0 | 2 | 4 |
| 1965 | 7 | 11 | 5 | 5 | 9 | 3 | 1 | 10 | 9 | 0 | 9 | 9 | 2 | 4 |
| 1966 | 9 | 7 | 7 | 9 | 10 | 8 | 2 | 3 | 5 | 5 | 10 | 3 | 2 | 0 |
| 1967 | 8 | 3 | 6 | 11 | 9 | 4 | 3 | 11 | 9 | 10 | 3 | 4 | 1 | 7 |
| 1968 | 5 | 9 | 11 | 6 | 5 | 3 | 9 | 2 | 6 | 2 | 11 | 3 | 11 | 4 |
| 1969 | 9 | 11 | 0 | 4 | 9 | 2 | 8 | 7 | 1 | 7 | 1 | 10 | 3 | 1 |
| 1970 | 11 | 7 | 1 | 7 | 8 | 10 | 7 | 8 | 4 | 9 | 1 | 6 | 1 | 5 |
| 1971 | 0 | 8 | 5 | 11 | 10 | 3 | 6 | 5 | 8 | 9 | 9 | 7 | 3 | 6 |
| 1972 | 2 | 6 | 10 | 10 | 10 | 1 | 4 | 0 | 6 | 4 | 4 | 4 | 3 | 7 |
| 1973 | 3 | 2 | 8 | 11 | 7 | 9 | 1 | 11 | 1 | 0 | 1 | 6 | 0 | 2 |
| 1974 | 2 | 0 | 10 | 3 | 7 | 0 | 2 | 9 | 4 | 5 | 8 | 10 | 8 | 0 |
| 1975 | 6 | 8 | 0 | 2 | 9 | 7 | 2 | 6 | 8 | 11 | 1 | 5 | 7 | 9 |
| 1976 | 8 | 8 | 5 | 10 | 0 | 9 | 7 | 5 | 6 | 2 | 11 | 4 | 9 | 3 |
| 1977 | 3 | 4 | 9 | 4 | 6 | 11 | 6 | 2 | 9 | 4 | 7 | 5 | 9 | 1 |
| 1978 | 9 | 3 | 3 | 4 | 10 | 8 | 7 | 8 | 10 | 7 | 4 | 9 | 9 | 5 |
| 1979 | 2 | 7 | 11 | 4 | 7 | 7 | 4 | 9 | 3 | 8 | 9 | 6 | 10 | 5 |
| 1980 | 7 | 2 | 8 | 4 | 5 | 11 | 3 | 0 | 7 | 1 | 9 | 11 | 1 | 9 |
| 1981 | 7 | 8 | 4 | 5 | 3 | 0 | 3 | 10 | 6 | 6 | 1 | 10 | 5 | 3 |
| 1982 | 4 | 7 | 11 | 9 | 5 | 11 | 11 | 10 | 9 | 6 | 10 | 0 | 5 | 6 |
| 1983 | 4 | 0 | 9 | 6 | 11 | 11 | 6 | 3 | 11 | 2 | 4 | 2 | 3 | 10 |
| 1984 | 2 | 10 | 0 | 6 | 10 | 6 | 10 | 4 | 7 | 2 | 8 | 3 | 10 | 10 |
| 1985 | 0 | 10 | 4 | 9 | 9 | 0 | 5 | 1 | 4 | 1 | 10 | 8 | 11 | 4 |
| 1986 | 1 | 2 | 3 | 0 | 6 | 7 | 10 | 2 | 6 | 4 | 8 | 11 | 0 | 6 |
| 1987 | 4 | 1 | 8 | 9 | 5 | 4 | 2 | 6 | 1 | 1 | 3 | 6 | 10 | 8 |
| 1988 | 0 | 4 | 1 | 0 | 2 | 1 | 5 | 11 | 5 | 9 | 11 | 1 | 11 | 0 |
| 1989 | 10 | 2 | 3 | 1 | 11 | 5 | 9 | 8 | 11 | 4 | 3 | 6 | 11 | 11 |
| 1990 | 10 | 8 | 8 | 0 | 1 | 4 | 1 | 11 | 11 | 7 | 6 | 5 | 9 | 7 |
| 1991 | 5 | 10 | 1 | 8 | 2 | 9 | 0 | 2 | 4 | 7 | 6 | 10 | 6 | 5 |
| 1992 | 5 | 0 | 4 | 4 | 1 | 4 | 11 | 2 | 8 | 1 | 2 | 11 | 8 | 7 |
| 1993 | 6 | 4 | 0 | 6 | 8 | 11 | 7 | 9 | 8 | 5 | 8 | 0 | 3 | 6 |
| 1994 | 3 | 5 | 3 | 11 | 1 | 1 | 4 | 4 | 3 | 1 | 4 | 9 | 0 | 8 |

-continued

| Example # 3 of a group-based CS hopping pattern | | | | | | | | | | | | | | |
|---|---|---|---|---|---|---|---|---|---|---|---|---|---|---|
| m | $n_{cs}(n)$ | | | | | | | | | | | | | |
| 1995 | 2 | 6 | 0 | 7 | 4 | 2 | 6 | 8 | 0 | 2 | 3 | 4 | 4 | 3 |
| 1996 | 5 | 11 | 10 | 0 | 9 | 1 | 1 | 2 | 2 | 10 | 2 | 4 | 7 | 3 |
| 1997 | 4 | 1 | 0 | 8 | 8 | 1 | 0 | 0 | 0 | 2 | 0 | 6 | 11 | 4 |
| 1998 | 9 | 10 | 1 | 6 | 4 | 1 | 8 | 11 | 4 | 5 | 9 | 4 | 7 | 10 |
| 1999 | 8 | 0 | 5 | 4 | 2 | 5 | 11 | 6 | 3 | 4 | 9 | 5 | 5 | 9 |
| 2000 | 10 | 2 | 7 | 8 | 0 | 7 | 8 | 1 | 5 | 3 | 9 | 3 | 10 | 2 |
| 2001 | 9 | 6 | 9 | 9 | 4 | 9 | 1 | 9 | 6 | 6 | 0 | 9 | 1 | 1 |
| 2002 | 10 | 5 | 10 | 5 | 11 | 4 | 3 | 3 | 9 | 3 | 5 | 6 | 7 | 9 |
| 2003 | 1 | 1 | 5 | 11 | 7 | 4 | 8 | 8 | 6 | 9 | 8 | 6 | 4 | 9 |
| 2004 | 9 | 2 | 7 | 5 | 0 | 3 | 4 | 2 | 1 | 10 | 10 | 2 | 1 | 4 |
| 2005 | 7 | 4 | 2 | 2 | 11 | 3 | 6 | 0 | 6 | 7 | 0 | 0 | 2 | 6 |
| 2006 | 8 | 11 | 8 | 2 | 8 | 5 | 11 | 3 | 6 | 6 | 8 | 2 | 3 | 8 |
| 2007 | 11 | 0 | 0 | 8 | 2 | 1 | 9 | 5 | 5 | 5 | 8 | 2 | 5 | 8 |
| 2008 | 2 | 11 | 5 | 10 | 9 | 5 | 10 | 3 | 0 | 7 | 4 | 7 | 11 | 0 |
| 2009 | 4 | 3 | 6 | 3 | 2 | 6 | 11 | 6 | 11 | 5 | 3 | 3 | 6 | 4 |
| 2010 | 10 | 10 | 7 | 7 | 1 | 1 | 1 | 3 | 8 | 9 | 7 | 9 | 7 | 5 |
| 2011 | 3 | 1 | 0 | 3 | 0 | 4 | 4 | 6 | 2 | 7 | 2 | 0 | 7 | 10 |
| 2012 | 2 | 5 | 8 | 11 | 6 | 0 | 10 | 1 | 2 | 8 | 2 | 2 | 8 | 3 |
| 2013 | 8 | 2 | 1 | 11 | 9 | 2 | 7 | 10 | 0 | 8 | 4 | 5 | 9 | 4 |
| 2014 | 3 | 0 | 3 | 7 | 9 | 6 | 8 | 1 | 2 | 1 | 0 | 2 | 3 | 11 |
| 2015 | 6 | 5 | 5 | 3 | 3 | 8 | 6 | 2 | 4 | 4 | 4 | 3 | 5 | 11 |
| 2016 | 3 | 6 | 11 | 1 | 5 | 10 | 8 | 0 | 2 | 9 | 9 | 3 | 0 | 7 |
| 2017 | 10 | 6 | 10 | 11 | 9 | 8 | 3 | 6 | 4 | 0 | 1 | 11 | 11 | 5 |
| 2018 | 3 | 7 | 4 | 3 | 8 | 10 | 10 | 0 | 8 | 6 | 7 | 0 | 11 | 9 |
| 2019 | 3 | 9 | 8 | 6 | 1 | 3 | 11 | 6 | 8 | 8 | 6 | 4 | 2 | 3 |
| 2020 | 7 | 9 | 7 | 7 | 6 | 0 | 7 | 0 | 11 | 5 | 10 | 6 | 5 | 9 |
| 2021 | 1 | 4 | 0 | 10 | 1 | 4 | 10 | 0 | 11 | 1 | 10 | 9 | 11 | 3 |
| 2022 | 8 | 5 | 5 | 6 | 11 | 11 | 2 | 8 | 4 | 5 | 6 | 8 | 2 | 5 |
| 2023 | 3 | 10 | 10 | 9 | 7 | 2 | 6 | 6 | 5 | 0 | 5 | 2 | 6 | 1 |
| 2024 | 4 | 3 | 11 | 10 | 10 | 9 | 8 | 3 | 5 | 0 | 8 | 10 | 9 | 10 |
| 2025 | 7 | 10 | 2 | 3 | 3 | 2 | 9 | 0 | 7 | 11 | 7 | 5 | 7 | 7 |
| 2026 | 3 | 5 | 2 | 3 | 8 | 11 | 3 | 11 | 7 | 10 | 0 | 10 | 6 | 11 |
| 2027 | 3 | 0 | 6 | 1 | 5 | 0 | 2 | 11 | 6 | 6 | 10 | 11 | 11 | 5 |
| 2028 | 10 | 11 | 2 | 8 | 1 | 0 | 11 | 11 | 1 | 8 | 5 | 9 | 1 | 6 |
| 2029 | 6 | 4 | 1 | 7 | 9 | 10 | 3 | 5 | 8 | 6 | 6 | 10 | 0 | 4 |
| 2030 | 0 | 7 | 11 | 6 | 1 | 2 | 9 | 6 | 10 | 9 | 1 | 9 | 8 | 9 |
| 2031 | 8 | 2 | 8 | 3 | 5 | 7 | 0 | 5 | 8 | 5 | 10 | 6 | 4 | 5 |
| 2032 | 2 | 10 | 6 | 1 | 2 | 8 | 9 | 1 | 0 | 9 | 10 | 2 | 4 | 2 |
| 2033 | 2 | 6 | 3 | 8 | 10 | 0 | 7 | 2 | 1 | 1 | 11 | 2 | 5 | 10 |
| 2034 | 0 | 1 | 6 | 7 | 3 | 10 | 10 | 9 | 6 | 1 | 1 | 8 | 0 | 9 |
| 2035 | 11 | 4 | 6 | 3 | 9 | 3 | 0 | 3 | 10 | 4 | 0 | 9 | 5 | 8 |
| 2036 | 11 | 3 | 6 | 4 | 6 | 5 | 4 | 2 | 6 | 11 | 0 | 10 | 11 | 9 |
| 2037 | 2 | 5 | 8 | 2 | 2 | 7 | 6 | 6 | 5 | 2 | 11 | 11 | 9 | 11 |
| 2038 | 8 | 8 | 0 | 6 | 4 | 8 | 11 | 0 | 11 | 0 | 1 | 7 | 2 | 4 |
| 2039 | 10 | 3 | 4 | 3 | 0 | 5 | 2 | 9 | 0 | 4 | 9 | 0 | 3 | 4 |
| 2040 | 5 | 5 | 0 | 3 | 2 | 4 | 10 | 10 | 8 | 0 | 0 | 2 | 0 | 4 |
| 2041 | 9 | 10 | 4 | 4 | 6 | 2 | 0 | 3 | 10 | 2 | 8 | 4 | 0 | 9 |
| 2042 | 8 | 10 | 11 | 10 | 9 | 11 | 1 | 9 | 1 | 3 | 7 | 2 | 0 | 1 |
| 2043 | 0 | 9 | 1 | 5 | 1 | 2 | 8 | 0 | 9 | 6 | 7 | 10 | 4 | 5 |
| 2044 | 5 | 7 | 7 | 0 | 4 | 6 | 8 | 4 | 6 | 2 | 10 | 4 | 1 | 9 |
| 2045 | 1 | 1 | 5 | 10 | 5 | 0 | 3 | 3 | 3 | 11 | 5 | 3 | 3 | 3 |
| 2046 | 8 | 0 | 2 | 3 | 4 | 1 | 2 | 4 | 10 | 2 | 7 | 0 | 6 | 2 |
| 2047 | 10 | 6 | 6 | 6 | 3 | 6 | 0 | 7 | 6 | 4 | 11 | 11 | 2 | 1 |

Example #4 of a Group-Based CS Hopping Pattern

| Example #4 of a group-based CS hopping pattern | | | | | | | | | | | | | | |
|---|---|---|---|---|---|---|---|---|---|---|---|---|---|---|
| m | $n_{cs}(n)$ | | | | | | | | | | | | | |
| 0 | 1 | 1 | 7 | 3 | 3 | 11 | 1 | 3 | 2 | 11 | 1 | 4 | 4 | 11 |
| 1 | 6 | 0 | 3 | 1 | 4 | 9 | 11 | 4 | 1 | 4 | 5 | 10 | 0 | 4 |
| 2 | 11 | 3 | 8 | 9 | 0 | 7 | 6 | 1 | 7 | 10 | 3 | 9 | 3 | 1 |
| 3 | 5 | 11 | 11 | 7 | 10 | 1 | 2 | 0 | 8 | 8 | 10 | 6 | 5 | 6 |
| 4 | 3 | 8 | 9 | 11 | 9 | 1 | 11 | 10 | 7 | 5 | 2 | 4 | 2 | 0 |
| 5 | 9 | 8 | 2 | 6 | 7 | 8 | 7 | 0 | 11 | 9 | 7 | 10 | 6 | 9 |
| 6 | 7 | 9 | 11 | 0 | 0 | 4 | 10 | 6 | 1 | 1 | 1 | 7 | 7 | 2 |
| 7 | 10 | 2 | 1 | 0 | 3 | 2 | 11 | 1 | 11 | 0 | 0 | 11 | 9 | 5 |
| 8 | 2 | 6 | 10 | 4 | 7 | 3 | 1 | 2 | 0 | 6 | 2 | 0 | 9 | 1 |
| 9 | 8 | 9 | 0 | 9 | 5 | 2 | 4 | 11 | 10 | 3 | 5 | 6 | 6 | 7 |
| 10 | 10 | 11 | 4 | 2 | 6 | 5 | 5 | 4 | 2 | 6 | 8 | 7 | 1 | 9 |

-continued

| Example #4 of a group-based CS hopping pattern | | | | | | | | | | | | | | |
|---|---|---|---|---|---|---|---|---|---|---|---|---|---|---|
| m | $n_{cs}(n)$ | | | | | | | | | | | | | |
| 11 | 11 | 3 | 1 | 5 | 4 | 10 | 3 | 9 | 2 | 3 | 8 | 11 | 0 | 8 |
| 12 | 3 | 9 | 10 | 6 | 0 | 2 | 2 | 4 | 3 | 8 | 7 | 5 | 1 | 8 |
| 13 | 6 | 5 | 6 | 1 | 11 | 7 | 4 | 9 | 8 | 6 | 7 | 7 | 8 | 7 |
| 14 | 7 | 3 | 2 | 9 | 2 | 6 | 11 | 5 | 10 | 8 | 4 | 10 | 1 | 5 |
| 15 | 9 | 1 | 1 | 5 | 0 | 0 | 5 | 5 | 5 | 7 | 5 | 4 | 5 | 5 |
| 16 | 8 | 2 | 9 | 4 | 8 | 7 | 8 | 9 | 10 | 5 | 11 | 10 | 11 | 11 |
| 17 | 10 | 1 | 5 | 8 | 7 | 1 | 0 | 7 | 9 | 9 | 0 | 6 | 0 | 4 |
| 18 | 0 | 8 | 2 | 10 | 4 | 7 | 5 | 10 | 4 | 2 | 8 | 6 | 11 | 3 |
| 19 | 1 | 10 | 8 | 2 | 11 | 10 | 9 | 6 | 6 | 0 | 8 | 10 | 6 | 10 |
| 20 | 7 | 2 | 7 | 5 | 11 | 5 | 6 | 2 | 9 | 1 | 2 | 3 | 6 | 7 |
| 21 | 9 | 9 | 6 | 11 | 4 | 4 | 8 | 8 | 10 | 8 | 0 | 9 | 2 | 3 |
| 22 | 5 | 10 | 3 | 4 | 6 | 9 | 4 | 8 | 3 | 2 | 3 | 6 | 1 | 2 |
| 23 | 0 | 8 | 5 | 9 | 1 | 6 | 1 | 2 | 8 | 11 | 10 | 5 | 7 | 8 |
| 24 | 0 | 5 | 3 | 4 | 4 | 2 | 10 | 0 | 2 | 7 | 1 | 9 | 8 | 0 |
| 25 | 2 | 4 | 10 | 3 | 3 | 1 | 9 | 0 | 11 | 10 | 3 | 5 | 8 | 3 |
| 26 | 4 | 4 | 9 | 6 | 2 | 9 | 7 | 3 | 6 | 11 | 6 | 2 | 2 | 10 |
| 27 | 0 | 9 | 6 | 6 | 7 | 0 | 3 | 1 | 9 | 1 | 9 | 8 | 5 | 10 |
| 28 | 9 | 6 | 1 | 10 | 4 | 11 | 11 | 2 | 6 | 10 | 9 | 7 | 3 | 6 |
| 29 | 10 | 7 | 9 | 5 | 8 | 2 | 6 | 10 | 0 | 11 | 1 | 8 | 5 | 2 |
| 30 | 10 | 4 | 3 | 6 | 7 | 5 | 6 | 11 | 5 | 8 | 5 | 0 | 10 | 11 |
| 31 | 2 | 10 | 8 | 11 | 0 | 4 | 3 | 3 | 3 | 7 | 2 | 2 | 8 | 7 |
| 32 | 8 | 5 | 11 | 1 | 3 | 6 | 8 | 5 | 5 | 10 | 6 | 8 | 0 | 2 |
| 33 | 1 | 6 | 0 | 6 | 10 | 5 | 0 | 1 | 8 | 7 | 4 | 4 | 0 | 2 |
| 34 | 7 | 2 | 6 | 11 | 5 | 6 | 9 | 0 | 0 | 0 | 11 | 2 | 5 | 0 |
| 35 | 8 | 1 | 2 | 0 | 8 | 9 | 10 | 4 | 10 | 11 | 10 | 6 | 2 | 3 |
| 36 | 0 | 0 | 4 | 1 | 11 | 6 | 8 | 11 | 4 | 5 | 3 | 6 | 8 | 4 |
| 37 | 0 | 0 | 3 | 5 | 0 | 4 | 6 | 0 | 7 | 6 | 11 | 2 | 1 | 11 |
| 38 | 9 | 9 | 0 | 6 | 11 | 1 | 1 | 11 | 9 | 0 | 10 | 10 | 8 | 0 |
| 39 | 7 | 6 | 3 | 10 | 5 | 3 | 4 | 0 | 10 | 2 | 0 | 10 | 2 | 9 |
| 40 | 5 | 11 | 9 | 3 | 4 | 6 | 7 | 3 | 7 | 3 | 11 | 7 | 5 | 1 |
| 41 | 9 | 8 | 5 | 10 | 8 | 9 | 1 | 0 | 3 | 7 | 1 | 8 | 1 | 1 |
| 42 | 4 | 0 | 10 | 0 | 7 | 1 | 4 | 11 | 10 | 8 | 11 | 9 | 3 | 5 |
| 43 | 9 | 6 | 3 | 0 | 6 | 8 | 10 | 10 | 8 | 5 | 2 | 0 | 7 | 3 |
| 44 | 11 | 7 | 2 | 3 | 2 | 1 | 10 | 2 | 10 | 3 | 9 | 4 | 8 | 10 |
| 45 | 11 | 8 | 11 | 8 | 10 | 8 | 9 | 7 | 3 | 8 | 7 | 2 | 3 | 11 |
| 46 | 1 | 3 | 4 | 4 | 9 | 0 | 5 | 10 | 3 | 4 | 0 | 1 | 5 | 7 |
| 47 | 7 | 3 | 5 | 3 | 5 | 0 | 11 | 7 | 7 | 11 | 10 | 3 | 11 | 11 |
| 48 | 3 | 10 | 11 | 4 | 11 | 11 | 5 | 5 | 0 | 5 | 11 | 8 | 7 | 3 |
| 49 | 11 | 11 | 2 | 6 | 3 | 5 | 6 | 5 | 4 | 5 | 3 | 4 | 5 | 7 |
| 50 | 6 | 6 | 11 | 1 | 3 | 7 | 1 | 2 | 2 | 7 | 10 | 11 | 11 | 0 |
| 51 | 3 | 10 | 11 | 6 | 8 | 6 | 1 | 10 | 1 | 0 | 0 | 5 | 4 | 7 |
| 52 | 11 | 10 | 7 | 10 | 7 | 3 | 6 | 3 | 7 | 5 | 9 | 2 | 4 | 5 |
| 53 | 0 | 3 | 5 | 8 | 4 | 7 | 0 | 11 | 6 | 8 | 9 | 3 | 2 | 8 |
| 54 | 10 | 1 | 7 | 11 | 6 | 0 | 9 | 6 | 9 | 11 | 8 | 5 | 3 | 1 |
| 55 | 10 | 8 | 10 | 7 | 10 | 2 | 10 | 3 | 10 | 5 | 0 | 7 | 11 | 2 |
| 56 | 10 | 10 | 9 | 10 | 2 | 11 | 11 | 8 | 10 | 6 | 7 | 2 | 11 | 3 |
| 57 | 3 | 0 | 1 | 5 | 4 | 9 | 5 | 11 | 9 | 8 | 6 | 2 | 10 | 1 |
| 58 | 4 | 4 | 11 | 9 | 6 | 3 | 11 | 2 | 5 | 11 | 9 | 1 | 0 | 4 |
| 59 | 6 | 0 | 8 | 7 | 2 | 8 | 1 | 9 | 9 | 2 | 8 | 11 | 1 | 6 |
| 60 | 6 | 10 | 10 | 5 | 3 | 3 | 4 | 2 | 8 | 8 | 8 | 1 | 4 | 9 |
| 61 | 8 | 0 | 0 | 7 | 5 | 4 | 9 | 7 | 1 | 0 | 3 | 8 | 1 | 4 |
| 62 | 2 | 6 | 2 | 1 | 8 | 5 | 7 | 5 | 6 | 0 | 4 | 7 | 9 | 8 |
| 63 | 2 | 6 | 8 | 9 | 3 | 0 | 8 | 5 | 4 | 2 | 8 | 3 | 4 | 5 |
| 64 | 3 | 6 | 1 | 9 | 8 | 7 | 2 | 0 | 0 | 4 | 0 | 9 | 6 | 5 |
| 65 | 0 | 7 | 3 | 8 | 9 | 3 | 8 | 7 | 11 | 0 | 9 | 11 | 1 | 3 |
| 66 | 11 | 1 | 11 | 7 | 9 | 4 | 7 | 10 | 11 | 10 | 4 | 5 | 0 | 9 |
| 67 | 5 | 7 | 9 | 10 | 10 | 7 | 2 | 5 | 6 | 1 | 3 | 0 | 0 | 10 |
| 68 | 3 | 2 | 7 | 10 | 7 | 2 | 1 | 1 | 5 | 10 | 6 | 10 | 10 | 7 |
| 69 | 11 | 10 | 7 | 8 | 6 | 10 | 5 | 11 | 8 | 4 | 4 | 11 | 5 | 3 |
| 70 | 2 | 5 | 4 | 2 | 7 | 9 | 5 | 8 | 4 | 9 | 1 | 3 | 3 | 8 |
| 71 | 9 | 11 | 7 | 10 | 3 | 5 | 1 | 4 | 0 | 1 | 0 | 5 | 11 | 4 |
| 72 | 4 | 1 | 3 | 10 | 0 | 9 | 9 | 11 | 7 | 2 | 8 | 1 | 4 | 6 |
| 73 | 2 | 5 | 11 | 2 | 9 | 7 | 1 | 4 | 10 | 8 | 9 | 9 | 0 | 1 |
| 74 | 7 | 7 | 5 | 11 | 3 | 7 | 0 | 1 | 10 | 9 | 8 | 7 | 10 | 11 |
| 75 | 3 | 5 | 7 | 6 | 11 | 8 | 8 | 1 | 9 | 7 | 0 | 0 | 7 | 8 |
| 76 | 7 | 11 | 0 | 0 | 6 | 10 | 9 | 3 | 4 | 8 | 0 | 2 | 11 | 3 |
| 77 | 2 | 0 | 2 | 11 | 10 | 10 | 5 | 9 | 3 | 3 | 11 | 7 | 6 | 5 |
| 78 | 2 | 8 | 10 | 10 | 3 | 11 | 8 | 7 | 8 | 11 | 0 | 11 | 2 | 1 |
| 79 | 4 | 0 | 4 | 11 | 0 | 7 | 9 | 5 | 2 | 5 | 5 | 9 | 0 | 3 |
| 80 | 8 | 5 | 5 | 3 | 6 | 3 | 2 | 5 | 7 | 3 | 4 | 4 | 9 | 0 |
| 81 | 5 | 0 | 11 | 5 | 1 | 2 | 9 | 11 | 10 | 0 | 4 | 11 | 2 | 8 |
| 82 | 11 | 6 | 1 | 6 | 4 | 7 | 7 | 3 | 8 | 9 | 5 | 5 | 10 | 0 |
| 83 | 1 | 7 | 3 | 1 | 5 | 6 | 9 | 9 | 4 | 6 | 4 | 5 | 9 | 9 |
| 84 | 8 | 6 | 6 | 5 | 1 | 4 | 11 | 4 | 6 | 5 | 1 | 6 | 6 | 8 |
| 85 | 6 | 7 | 7 | 6 | 10 | 10 | 1 | 7 | 11 | 2 | 3 | 7 | 10 | 2 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 86 | 10 | 1 | 6 | 1 | 6 | 9 | 3 | 0 | 0 | 3 | 10 | 11 | 8 | 5 |
| 87 | 7 | 1 | 2 | 4 | 10 | 1 | 7 | 1 | 1 | 7 | 6 | 6 | 1 | 9 |
| 88 | 3 | 4 | 7 | 0 | 8 | 0 | 7 | 6 | 7 | 3 | 1 | 9 | 10 | 4 |
| 89 | 1 | 4 | 0 | 8 | 1 | 11 | 9 | 0 | 2 | 8 | 8 | 9 | 7 | 4 |
| 90 | 8 | 5 | 0 | 10 | 4 | 11 | 6 | 4 | 5 | 6 | 1 | 1 | 4 | 10 |
| 91 | 7 | 1 | 9 | 7 | 10 | 6 | 5 | 4 | 2 | 2 | 2 | 8 | 0 | 11 |
| 92 | 6 | 7 | 1 | 0 | 2 | 6 | 3 | 0 | 7 | 3 | 2 | 6 | 2 | 6 |
| 93 | 1 | 7 | 3 | 10 | 9 | 4 | 2 | 8 | 8 | 4 | 11 | 7 | 8 | 0 |
| 94 | 5 | 6 | 0 | 7 | 6 | 8 | 3 | 5 | 10 | 11 | 11 | 2 | 5 | 7 |
| 95 | 5 | 9 | 6 | 8 | 2 | 0 | 2 | 2 | 5 | 4 | 3 | 4 | 4 | 6 |
| 96 | 6 | 2 | 1 | 4 | 6 | 8 | 0 | 7 | 1 | 9 | 6 | 0 | 8 | 7 |
| 97 | 5 | 3 | 8 | 9 | 4 | 9 | 8 | 6 | 9 | 1 | 5 | 5 | 9 | 7 |
| 98 | 8 | 10 | 2 | 5 | 5 | 6 | 0 | 1 | 9 | 8 | 11 | 0 | 9 | 7 |
| 99 | 5 | 10 | 10 | 0 | 5 | 11 | 0 | 9 | 4 | 9 | 0 | 10 | 3 | 2 |
| 100 | 5 | 5 | 6 | 0 | 6 | 11 | 1 | 5 | 11 | 5 | 6 | 1 | 1 | 8 |
| 101 | 1 | 11 | 9 | 0 | 7 | 3 | 11 | 11 | 1 | 10 | 0 | 6 | 10 | 10 |
| 102 | 2 | 1 | 0 | 3 | 10 | 3 | 5 | 7 | 9 | 10 | 5 | 9 | 10 | 6 |
| 103 | 7 | 10 | 11 | 1 | 7 | 8 | 1 | 8 | 9 | 6 | 9 | 3 | 8 | 9 |
| 104 | 0 | 2 | 10 | 9 | 0 | 3 | 10 | 8 | 6 | 2 | 5 | 4 | 9 | 8 |
| 105 | 0 | 3 | 9 | 8 | 5 | 1 | 7 | 8 | 5 | 1 | 2 | 0 | 5 | 7 |
| 106 | 7 | 7 | 6 | 9 | 8 | 11 | 1 | 1 | 6 | 4 | 3 | 6 | 5 | 7 |
| 107 | 9 | 4 | 8 | 4 | 4 | 0 | 4 | 11 | 10 | 5 | 9 | 11 | 5 | 0 |
| 108 | 7 | 4 | 9 | 0 | 5 | 9 | 2 | 10 | 5 | 8 | 10 | 4 | 6 | 9 |
| 109 | 2 | 3 | 11 | 4 | 11 | 1 | 3 | 6 | 4 | 6 | 1 | 1 | 11 | 11 |
| 110 | 0 | 4 | 7 | 9 | 9 | 5 | 6 | 5 | 6 | 9 | 10 | 8 | 11 | 9 |
| 111 | 10 | 6 | 3 | 2 | 1 | 6 | 3 | 1 | 7 | 1 | 10 | 3 | 6 | 2 |
| 112 | 1 | 6 | 1 | 11 | 9 | 6 | 11 | 9 | 3 | 8 | 10 | 11 | 4 | 1 |
| 113 | 7 | 3 | 2 | 6 | 0 | 5 | 1 | 7 | 0 | 3 | 7 | 0 | 4 | 10 |
| 114 | 1 | 6 | 11 | 8 | 11 | 9 | 8 | 2 | 1 | 2 | 6 | 5 | 1 | 11 |
| 115 | 3 | 3 | 0 | 7 | 3 | 0 | 3 | 3 | 11 | 9 | 6 | 5 | 2 | 4 |
| 116 | 5 | 3 | 0 | 4 | 0 | 3 | 4 | 1 | 4 | 7 | 7 | 5 | 8 | 5 |
| 117 | 5 | 4 | 8 | 7 | 3 | 11 | 5 | 8 | 1 | 0 | 1 | 1 | 11 | 5 |
| 118 | 0 | 0 | 8 | 7 | 8 | 11 | 11 | 1 | 4 | 7 | 2 | 0 | 10 | 3 |
| 119 | 7 | 0 | 6 | 8 | 7 | 5 | 5 | 3 | 11 | 10 | 6 | 11 | 6 | 6 |
| 120 | 4 | 8 | 2 | 3 | 6 | 6 | 4 | 9 | 9 | 5 | 5 | 7 | 3 | 8 |
| 121 | 5 | 4 | 4 | 4 | 11 | 9 | 0 | 2 | 2 | 10 | 2 | 2 | 5 | 3 |
| 122 | 5 | 8 | 11 | 4 | 5 | 8 | 5 | 2 | 6 | 4 | 10 | 9 | 1 | 10 |
| 123 | 2 | 7 | 7 | 0 | 2 | 11 | 5 | 3 | 0 | 1 | 3 | 10 | 1 | 9 |
| 124 | 4 | 2 | 8 | 10 | 11 | 4 | 2 | 10 | 10 | 1 | 9 | 2 | 3 | 11 |
| 125 | 8 | 8 | 4 | 6 | 9 | 10 | 9 | 0 | 6 | 7 | 5 | 3 | 4 | 5 |
| 126 | 4 | 4 | 5 | 0 | 0 | 10 | 0 | 9 | 11 | 10 | 9 | 8 | 7 | 9 |
| 127 | 10 | 4 | 3 | 3 | 8 | 6 | 2 | 7 | 6 | 0 | 7 | 4 | 3 | 10 |
| 128 | 0 | 11 | 10 | 10 | 11 | 6 | 6 | 9 | 11 | 1 | 4 | 9 | 0 | 8 |
| 129 | 6 | 9 | 1 | 3 | 2 | 8 | 6 | 1 | 8 | 11 | 4 | 1 | 6 | 11 |
| 130 | 11 | 2 | 11 | 2 | 10 | 2 | 3 | 11 | 7 | 7 | 5 | 8 | 5 | 1 |
| 131 | 6 | 10 | 4 | 2 | 10 | 4 | 4 | 0 | 2 | 10 | 9 | 6 | 9 | 5 |
| 132 | 9 | 3 | 11 | 2 | 8 | 3 | 3 | 9 | 8 | 10 | 7 | 3 | 2 | 3 |
| 133 | 7 | 11 | 1 | 2 | 10 | 0 | 3 | 7 | 9 | 5 | 3 | 0 | 7 | 0 |
| 134 | 8 | 3 | 7 | 5 | 6 | 9 | 10 | 11 | 2 | 6 | 0 | 8 | 11 | 6 |
| 135 | 5 | 2 | 8 | 3 | 9 | 5 | 11 | 0 | 4 | 0 | 8 | 8 | 8 | 7 |
| 136 | 11 | 11 | 7 | 1 | 9 | 2 | 0 | 2 | 0 | 11 | 10 | 7 | 10 | 6 |
| 137 | 4 | 9 | 4 | 1 | 2 | 7 | 10 | 7 | 1 | 9 | 2 | 4 | 3 | 9 |
| 138 | 1 | 3 | 11 | 11 | 4 | 10 | 4 | 8 | 6 | 6 | 3 | 4 | 5 | 5 |
| 139 | 2 | 0 | 11 | 5 | 6 | 10 | 0 | 1 | 1 | 2 | 2 | 4 | 11 | 1 |
| 140 | 11 | 7 | 0 | 9 | 2 | 3 | 2 | 1 | 1 | 1 | 6 | 8 | 10 | 2 |
| 141 | 11 | 1 | 10 | 2 | 4 | 8 | 6 | 8 | 9 | 8 | 2 | 0 | 4 | 2 |
| 142 | 6 | 9 | 11 | 11 | 7 | 9 | 0 | 2 | 0 | 0 | 8 | 4 | 6 | 2 |
| 143 | 2 | 9 | 8 | 3 | 1 | 4 | 7 | 11 | 2 | 5 | 7 | 10 | 1 | 3 |
| 144 | 6 | 5 | 9 | 5 | 0 | 8 | 2 | 4 | 4 | 11 | 5 | 9 | 10 | 9 |
| 145 | 0 | 7 | 5 | 11 | 8 | 8 | 4 | 0 | 1 | 6 | 2 | 1 | 0 | 7 |
| 146 | 6 | 0 | 6 | 10 | 8 | 7 | 3 | 10 | 10 | 9 | 3 | 4 | 7 | 5 |
| 147 | 9 | 1 | 10 | 1 | 3 | 2 | 2 | 1 | 0 | 2 | 1 | 3 | 0 | 3 |
| 148 | 8 | 8 | 0 | 11 | 1 | 3 | 7 | 3 | 3 | 11 | 4 | 10 | 10 | 1 |
| 149 | 7 | 6 | 7 | 3 | 4 | 8 | 2 | 4 | 7 | 4 | 3 | 1 | 8 | 2 |
| 150 | 0 | 2 | 5 | 6 | 10 | 11 | 9 | 6 | 4 | 1 | 6 | 1 | 4 | 0 |
| 151 | 6 | 2 | 7 | 6 | 4 | 2 | 2 | 9 | 0 | 0 | 9 | 6 | 4 | 1 |
| 152 | 0 | 6 | 5 | 7 | 2 | 1 | 6 | 1 | 11 | 2 | 5 | 10 | 11 | 10 |
| 153 | 5 | 9 | 4 | 5 | 6 | 3 | 8 | 9 | 7 | 7 | 11 | 8 | 2 | 10 |
| 154 | 3 | 10 | 7 | 1 | 2 | 9 | 3 | 10 | 9 | 5 | 4 | 9 | 6 | 6 |
| 155 | 4 | 9 | 1 | 7 | 1 | 9 | 1 | 1 | 3 | 6 | 2 | 7 | 8 | 10 |
| 156 | 11 | 9 | 8 | 3 | 7 | 1 | 11 | 10 | 3 | 9 | 4 | 7 | 9 | 5 |
| 157 | 4 | 9 | 10 | 3 | 8 | 7 | 0 | 0 | 5 | 1 | 1 | 10 | 10 | 0 |
| 158 | 3 | 3 | 5 | 2 | 3 | 4 | 5 | 5 | 8 | 11 | 5 | 0 | 4 | 0 |
| 159 | 6 | 4 | 2 | 8 | 6 | 4 | 3 | 10 | 8 | 6 | 10 | 9 | 9 | 1 |
| 160 | 9 | 7 | 5 | 4 | 1 | 11 | 10 | 8 | 7 | 11 | 7 | 7 | 6 | 5 |
| 161 | 10 | 2 | 9 | 7 | 6 | 7 | 4 | 5 | 2 | 9 | 9 | 4 | 10 | 4 |
| 162 | 9 | 5 | 1 | 8 | 11 | 4 | 4 | 0 | 1 | 1 | 4 | 8 | 11 | 6 |
| 163 | 11 | 0 | 5 | 1 | 10 | 5 | 4 | 8 | 0 | 5 | 11 | 11 | 9 | 1 |
| 164 | 7 | 3 | 1 | 6 | 6 | 1 | 6 | 2 | 10 | 4 | 10 | 11 | 3 | 4 |
| 165 | 1 | 10 | 5 | 4 | 3 | 5 | 7 | 7 | 9 | 10 | 3 | 2 | 11 | 5 |
| 166 | 0 | 1 | 3 | 2 | 7 | 11 | 8 | 1 | 0 | 3 | 11 | 4 | 11 | 6 |
| 167 | 5 | 11 | 7 | 2 | 1 | 9 | 11 | 1 | 11 | 8 | 5 | 1 | 7 | 11 |
| 168 | 9 | 9 | 9 | 4 | 3 | 3 | 9 | 3 | 3 | 5 | 5 | 7 | 1 | 6 |
| 169 | 4 | 10 | 3 | 0 | 9 | 6 | 11 | 5 | 11 | 11 | 8 | 7 | 5 | 11 |
| 170 | 9 | 5 | 8 | 11 | 2 | 10 | 7 | 4 | 5 | 9 | 8 | 2 | 7 | 8 |
| 171 | 9 | 8 | 8 | 6 | 11 | 6 | 3 | 3 | 0 | 6 | 8 | 0 | 5 | 2 |
| 172 | 10 | 8 | 6 | 5 | 7 | 7 | 2 | 2 | 9 | 5 | 7 | 9 | 7 | 11 |
| 173 | 1 | 5 | 0 | 10 | 8 | 0 | 10 | 1 | 6 | 11 | 6 | 11 | 11 | 8 |
| 174 | 5 | 2 | 0 | 11 | 7 | 10 | 6 | 10 | 9 | 7 | 3 | 8 | 4 | 9 |
| 175 | 7 | 1 | 1 | 1 | 4 | 1 | 10 | 10 | 5 | 11 | 11 | 9 | 10 | 2 |
| 176 | 8 | 11 | 6 | 5 | 4 | 11 | 5 | 6 | 3 | 2 | 11 | 4 | 1 | 0 |
| 177 | 3 | 11 | 0 | 5 | 9 | 5 | 0 | 10 | 1 | 10 | 7 | 8 | 9 | 3 |
| 178 | 4 | 6 | 11 | 3 | 0 | 9 | 5 | 9 | 5 | 8 | 2 | 3 | 9 | 7 |
| 179 | 11 | 8 | 1 | 1 | 8 | 4 | 0 | 8 | 8 | 1 | 8 | 6 | 5 | 9 |
| 180 | 0 | 9 | 0 | 7 | 9 | 4 | 5 | 9 | 3 | 7 | 8 | 9 | 3 | 11 |
| 181 | 6 | 10 | 3 | 6 | 8 | 10 | 10 | 4 | 4 | 7 | 11 | 2 | 9 | 10 |
| 182 | 11 | 6 | 9 | 5 | 11 | 7 | 10 | 1 | 11 | 7 | 7 | 6 | 5 | 3 |
| 183 | 11 | 9 | 1 | 6 | 0 | 8 | 8 | 10 | 6 | 3 | 1 | 2 | 8 | 1 |
| 184 | 6 | 8 | 0 | 1 | 0 | 4 | 2 | 2 | 11 | 6 | 4 | 1 | 3 | 4 |
| 185 | 1 | 0 | 2 | 11 | 11 | 2 | 11 | 1 | 8 | 1 | 9 | 9 | 7 | 7 |
| 186 | 8 | 7 | 3 | 9 | 2 | 5 | 11 | 6 | 7 | 2 | 9 | 3 | 5 | 9 |
| 187 | 3 | 8 | 9 | 2 | 5 | 9 | 4 | 7 | 10 | 1 | 7 | 1 | 9 | 6 |
| 188 | 4 | 8 | 6 | 8 | 10 | 6 | 3 | 6 | 10 | 7 | 11 | 10 | 10 | 10 |
| 189 | 7 | 11 | 8 | 3 | 1 | 2 | 10 | 0 | 5 | 9 | 0 | 1 | 3 | 1 |
| 190 | 11 | 11 | 2 | 4 | 7 | 11 | 2 | 6 | 8 | 11 | 8 | 8 | 8 | 4 |
| 191 | 4 | 11 | 9 | 6 | 9 | 8 | 1 | 2 | 8 | 4 | 2 | 3 | 11 | 2 |
| 192 | 2 | 5 | 8 | 0 | 1 | 5 | 6 | 10 | 0 | 0 | 10 | 2 | 0 | 6 |
| 193 | 2 | 7 | 9 | 5 | 3 | 4 | 10 | 4 | 7 | 0 | 3 | 3 | 7 | 1 |
| 194 | 1 | 8 | 8 | 7 | 9 | 7 | 3 | 4 | 11 | 1 | 3 | 11 | 6 | 7 |
| 195 | 6 | 10 | 5 | 11 | 7 | 11 | 11 | 0 | 9 | 4 | 1 | 0 | 3 | 10 |
| 196 | 3 | 1 | 4 | 7 | 7 | 8 | 2 | 6 | 0 | 1 | 9 | 7 | 9 | 0 |
| 197 | 5 | 3 | 10 | 8 | 9 | 10 | 9 | 8 | 2 | 9 | 6 | 8 | 1 | 10 |
| 198 | 11 | 8 | 10 | 2 | 8 | 7 | 11 | 5 | 2 | 2 | 11 | 8 | 9 | 7 |
| 199 | 2 | 3 | 3 | 4 | 6 | 2 | 1 | 4 | 6 | 4 | 8 | 4 | 10 | 6 |
| 200 | 4 | 8 | 6 | 5 | 3 | 8 | 6 | 3 | 5 | 0 | 2 | 11 | 3 | 3 |
| 201 | 9 | 0 | 2 | 5 | 2 | 0 | 3 | 8 | 6 | 11 | 3 | 5 | 0 | 7 |
| 202 | 5 | 10 | 5 | 10 | 10 | 4 | 8 | 10 | 11 | 7 | 10 | 4 | 11 | 8 |
| 203 | 9 | 8 | 8 | 5 | 1 | 11 | 2 | 5 | 4 | 3 | 11 | 6 | 0 | 1 |
| 204 | 10 | 2 | 4 | 4 | 5 | 7 | 10 | 3 | 8 | 2 | 4 | 1 | 0 | 6 |
| 205 | 8 | 4 | 5 | 10 | 7 | 5 | 5 | 1 | 2 | 9 | 7 | 9 | 5 | 1 |
| 206 | 10 | 1 | 9 | 6 | 10 | 0 | 8 | 3 | 1 | 9 | 7 | 3 | 9 | 7 |
| 207 | 2 | 2 | 0 | 3 | 6 | 1 | 3 | 8 | 5 | 0 | 0 | 4 | 7 | 2 |
| 208 | 2 | 9 | 5 | 9 | 10 | 7 | 11 | 8 | 2 | 6 | 6 | 7 | 3 | 2 |
| 209 | 0 | 2 | 8 | 2 | 7 | 10 | 10 | 5 | 1 | 4 | 2 | 11 | 1 | 0 |
| 210 | 5 | 11 | 5 | 1 | 3 | 8 | 9 | 10 | 7 | 6 | 8 | 2 | 2 | 4 |
| 211 | 8 | 8 | 5 | 9 | 11 | 8 | 10 | 8 | 4 | 8 | 4 | 9 | 11 | 7 |
| 212 | 6 | 3 | 1 | 7 | 0 | 10 | 1 | 11 | 7 | 9 | 11 | 3 | 6 | 0 |
| 213 | 7 | 6 | 11 | 0 | 9 | 9 | 6 | 1 | 10 | 5 | 7 | 2 | 8 | 0 |
| 214 | 11 | 7 | 6 | 10 | 3 | 6 | 5 | 8 | 11 | 7 | 3 | 2 | 3 | 4 |
| 215 | 10 | 1 | 11 | 11 | 1 | 10 | 2 | 7 | 11 | 3 | 9 | 2 | 2 | 6 |
| 216 | 2 | 0 | 6 | 2 | 2 | 8 | 0 | 3 | 8 | 5 | 0 | 8 | 5 | 4 |
| 217 | 3 | 7 | 4 | 5 | 11 | 7 | 7 | 6 | 2 | 0 | 11 | 11 | 8 | 5 |
| 218 | 5 | 5 | 7 | 1 | 7 | 5 | 10 | 7 | 10 | 2 | 0 | 3 | 9 | 0 |
| 219 | 7 | 9 | 8 | 2 | 1 | 8 | 0 | 2 | 3 | 10 | 3 | 6 | 10 | 9 |
| 220 | 2 | 2 | 3 | 8 | 5 | 8 | 11 | 2 | 7 | 9 | 7 | 7 | 0 | 0 |
| 221 | 6 | 7 | 10 | 10 | 0 | 1 | 7 | 9 | 10 | 0 | 5 | 2 | 2 | 7 |
| 222 | 1 | 4 | 6 | 7 | 1 | 1 | 1 | 7 | 1 | 1 | 4 | 4 | 10 | 3 |
| 223 | 11 | 3 | 2 | 11 | 10 | 0 | 8 | 4 | 0 | 2 | 1 | 9 | 1 | 6 |
| 224 | 6 | 1 | 2 | 7 | 4 | 4 | 8 | 2 | 7 | 1 | 7 | 2 | 5 | 2 |
| 225 | 8 | 2 | 4 | 6 | 4 | 0 | 6 | 11 | 1 | 10 | 11 | 2 | 2 | 2 |
| 226 | 1 | 5 | 3 | 1 | 2 | 11 | 0 | 10 | 7 | 8 | 5 | 7 | 4 | 3 |
| 227 | 10 | 9 | 8 | 1 | 11 | 6 | 9 | 7 | 3 | 4 | 9 | 8 | 4 | 8 |
| 228 | 7 | 7 | 10 | 8 | 6 | 4 | 5 | 7 | 2 | 7 | 1 | 5 | 4 | 7 |
| 229 | 10 | 11 | 1 | 10 | 4 | 10 | 9 | 5 | 3 | 1 | 2 | 10 | 2 | 5 |
| 230 | 5 | 3 | 2 | 10 | 8 | 8 | 9 | 2 | 11 | 1 | 11 | 3 | 4 | 1 |
| 231 | 7 | 11 | 5 | 7 | 6 | 3 | 1 | 6 | 3 | 10 | 6 | 0 | 5 | 4 |
| 232 | 7 | 1 | 11 | 8 | 3 | 10 | 8 | 8 | 0 | 1 | 4 | 1 | 6 | 8 |
| 233 | 5 | 0 | 1 | 10 | 2 | 0 | 11 | 3 | 2 | 7 | 6 | 10 | 9 | 0 |
| 234 | 10 | 9 | 7 | 4 | 5 | 3 | 6 | 7 | 4 | 0 | 2 | 9 | 5 | 11 |
| 235 | 3 | 5 | 6 | 6 | 0 | 6 | 9 | 5 | 10 | 6 | 10 | 3 | 2 | 11 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 236 | 4 | 1 | 4 | 8 | 7 | 3 | 1 | 0 | 8 | 3 | 5 | 8 | 5 | 11 |
| 237 | 1 | 11 | 10 | 0 | 3 | 1 | 3 | 7 | 0 | 4 | 7 | 7 | 1 | 7 |
| 238 | 3 | 8 | 3 | 8 | 2 | 5 | 4 | 5 | 3 | 7 | 2 | 5 | 7 | 4 |
| 239 | 0 | 6 | 9 | 11 | 9 | 11 | 0 | 4 | 10 | 3 | 3 | 5 | 9 | 10 |
| 240 | 10 | 3 | 8 | 0 | 5 | 0 | 4 | 4 | 8 | 8 | 2 | 2 | 2 | 1 |
| 241 | 8 | 11 | 6 | 7 | 9 | 5 | 10 | 2 | 9 | 8 | 1 | 10 | 3 | 9 |
| 242 | 10 | 8 | 1 | 2 | 5 | 7 | 8 | 11 | 5 | 6 | 0 | 5 | 4 | 8 |
| 243 | 10 | 11 | 6 | 0 | 10 | 8 | 7 | 4 | 4 | 0 | 9 | 5 | 7 | 10 |
| 244 | 2 | 1 | 6 | 0 | 0 | 3 | 6 | 2 | 11 | 8 | 11 | 7 | 8 | 10 |
| 245 | 9 | 9 | 0 | 5 | 10 | 9 | 10 | 0 | 1 | 4 | 6 | 3 | 6 | 10 |
| 246 | 3 | 2 | 2 | 11 | 3 | 5 | 4 | 4 | 7 | 6 | 7 | 11 | 3 | 11 |
| 247 | 11 | 2 | 10 | 3 | 11 | 11 | 1 | 7 | 1 | 3 | 2 | 6 | 11 | 4 |
| 248 | 11 | 8 | 3 | 1 | 3 | 10 | 11 | 0 | 9 | 6 | 6 | 4 | 6 | 1 |
| 249 | 8 | 8 | 7 | 2 | 10 | 6 | 0 | 9 | 6 | 6 | 1 | 11 | 2 | 0 |
| 250 | 0 | 7 | 8 | 6 | 5 | 3 | 2 | 2 | 2 | 9 | 0 | 0 | 8 | 11 |
| 251 | 9 | 7 | 7 | 1 | 0 | 7 | 11 | 8 | 5 | 2 | 10 | 6 | 8 | 10 |
| 252 | 9 | 4 | 0 | 2 | 9 | 0 | 2 | 6 | 6 | 2 | 2 | 0 | 9 | 11 |
| 253 | 1 | 10 | 4 | 8 | 8 | 0 | 3 | 5 | 5 | 9 | 9 | 0 | 6 | 9 |
| 254 | 1 | 7 | 9 | 9 | 1 | 1 | 4 | 4 | 6 | 3 | 7 | 2 | 4 | 4 |
| 255 | 7 | 8 | 9 | 2 | 10 | 10 | 7 | 5 | 0 | 10 | 8 | 4 | 3 | 3 |
| 256 | 11 | 11 | 2 | 11 | 11 | 9 | 3 | 6 | 3 | 5 | 11 | 5 | 9 | 11 |
| 257 | 10 | 0 | 4 | 3 | 2 | 3 | 7 | 1 | 2 | 0 | 10 | 1 | 7 | 3 |
| 258 | 6 | 4 | 6 | 1 | 5 | 5 | 1 | 2 | 10 | 10 | 6 | 2 | 1 | 9 |
| 259 | 5 | 2 | 10 | 9 | 9 | 8 | 5 | 0 | 0 | 11 | 3 | 0 | 11 | 5 |
| 260 | 11 | 4 | 1 | 3 | 1 | 2 | 4 | 3 | 5 | 2 | 9 | 10 | 4 | 0 |
| 261 | 1 | 1 | 9 | 0 | 1 | 4 | 6 | 5 | 10 | 4 | 0 | 11 | 9 | 2 |
| 262 | 0 | 5 | 10 | 8 | 10 | 11 | 10 | 10 | 10 | 6 | 11 | 6 | 0 | 3 |
| 263 | 7 | 7 | 8 | 2 | 5 | 7 | 7 | 3 | 6 | 11 | 5 | 9 | 9 | 6 |
| 264 | 3 | 9 | 5 | 1 | 8 | 11 | 3 | 4 | 1 | 1 | 7 | 8 | 10 | 7 |
| 265 | 8 | 8 | 0 | 1 | 4 | 9 | 8 | 11 | 6 | 7 | 9 | 4 | 3 | 10 |
| 266 | 10 | 5 | 3 | 4 | 10 | 3 | 1 | 5 | 1 | 9 | 1 | 0 | 11 | 6 |
| 267 | 8 | 0 | 0 | 4 | 11 | 11 | 1 | 9 | 8 | 10 | 5 | 5 | 10 | 3 |
| 268 | 9 | 2 | 1 | 7 | 3 | 6 | 6 | 1 | 8 | 9 | 1 | 2 | 4 | 8 |
| 269 | 10 | 0 | 6 | 5 | 9 | 0 | 11 | 4 | 0 | 6 | 5 | 11 | 1 | 7 |
| 270 | 2 | 5 | 5 | 7 | 10 | 8 | 0 | 11 | 7 | 8 | 6 | 10 | 7 | 5 |
| 271 | 4 | 11 | 11 | 8 | 8 | 10 | 8 | 10 | 4 | 11 | 9 | 11 | 4 | 5 |
| 272 | 6 | 1 | 4 | 9 | 7 | 7 | 4 | 3 | 8 | 7 | 2 | 3 | 1 | 3 |
| 273 | 6 | 1 | 5 | 3 | 4 | 10 | 9 | 8 | 10 | 2 | 10 | 5 | 3 | 4 |
| 274 | 5 | 1 | 2 | 8 | 2 | 2 | 11 | 9 | 11 | 2 | 4 | 0 | 8 | 1 |
| 275 | 2 | 9 | 6 | 9 | 6 | 2 | 1 | 9 | 0 | 8 | 0 | 3 | 3 | 10 |
| 276 | 11 | 10 | 3 | 8 | 0 | 7 | 4 | 4 | 7 | 5 | 10 | 6 | 10 | 6 |
| 277 | 1 | 3 | 5 | 7 | 2 | 0 | 2 | 10 | 9 | 0 | 2 | 8 | 2 | 2 |
| 278 | 3 | 8 | 8 | 8 | 3 | 8 | 10 | 7 | 2 | 5 | 8 | 10 | 9 | 9 |
| 279 | 0 | 2 | 11 | 5 | 11 | 1 | 11 | 0 | 11 | 9 | 8 | 3 | 7 | 6 |
| 280 | 8 | 4 | 6 | 3 | 10 | 9 | 2 | 8 | 4 | 5 | 4 | 7 | 6 | 5 |
| 281 | 0 | 10 | 4 | 11 | 10 | 6 | 8 | 7 | 2 | 11 | 4 | 0 | 3 | 11 |
| 282 | 6 | 6 | 9 | 4 | 6 | 10 | 5 | 0 | 8 | 3 | 8 | 7 | 0 | 2 |
| 283 | 7 | 9 | 1 | 3 | 11 | 3 | 8 | 7 | 11 | 6 | 6 | 9 | 6 | 7 |
| 284 | 1 | 4 | 11 | 3 | 7 | 11 | 0 | 4 | 3 | 3 | 11 | 0 | 8 | 2 |
| 285 | 1 | 11 | 1 | 2 | 2 | 7 | 10 | 9 | 0 | 9 | 7 | 6 | 7 | 5 |
| 286 | 3 | 11 | 11 | 9 | 9 | 9 | 4 | 2 | 2 | 9 | 5 | 1 | 5 | 0 |
| 287 | 1 | 0 | 10 | 5 | 6 | 3 | 9 | 10 | 5 | 1 | 1 | 7 | 6 | 4 |
| 288 | 2 | 8 | 5 | 6 | 6 | 4 | 10 | 1 | 9 | 4 | 10 | 9 | 8 | 11 |
| 289 | 10 | 10 | 9 | 4 | 4 | 4 | 9 | 7 | 4 | 8 | 3 | 6 | 4 | 0 |
| 290 | 1 | 6 | 6 | 2 | 8 | 8 | 2 | 5 | 3 | 6 | 9 | 3 | 10 | 0 |
| 291 | 11 | 3 | 10 | 5 | 9 | 1 | 8 | 9 | 4 | 10 | 6 | 6 | 2 | 11 |
| 292 | 4 | 2 | 7 | 9 | 1 | 5 | 10 | 4 | 8 | 10 | 11 | 4 | 7 | 11 |
| 293 | 8 | 6 | 7 | 10 | 0 | 2 | 7 | 8 | 2 | 8 | 5 | 6 | 1 | 2 |
| 294 | 3 | 10 | 3 | 0 | 7 | 4 | 7 | 2 | 11 | 3 | 6 | 10 | 3 | 8 |
| 295 | 1 | 3 | 5 | 8 | 3 | 9 | 0 | 6 | 4 | 10 | 11 | 4 | 4 | 10 |
| 296 | 10 | 3 | 10 | 9 | 11 | 11 | 5 | 4 | 6 | 6 | 10 | 3 | 7 | 1 |
| 297 | 8 | 4 | 6 | 7 | 3 | 2 | 7 | 10 | 7 | 2 | 3 | 8 | 9 | 10 |
| 298 | 8 | 1 | 9 | 4 | 3 | 8 | 3 | 10 | 1 | 5 | 1 | 11 | 3 | 5 |
| 299 | 4 | 5 | 4 | 2 | 0 | 3 | 6 | 11 | 11 | 6 | 0 | 0 | 3 | 9 |
| 300 | 6 | 6 | 0 | 1 | 10 | 1 | 9 | 7 | 0 | 11 | 2 | 3 | 7 | 10 |
| 301 | 10 | 2 | 9 | 5 | 5 | 1 | 5 | 10 | 9 | 4 | 0 | 2 | 11 | 8 |
| 302 | 7 | 0 | 7 | 9 | 7 | 6 | 10 | 0 | 2 | 1 | 3 | 7 | 10 | 0 |
| 303 | 9 | 0 | 9 | 11 | 1 | 5 | 7 | 7 | 8 | 0 | 3 | 5 | 3 | 6 |
| 304 | 9 | 7 | 1 | 3 | 10 | 0 | 9 | 4 | 2 | 3 | 0 | 8 | 5 | 7 |
| 305 | 0 | 6 | 10 | 11 | 2 | 0 | 4 | 7 | 6 | 2 | 8 | 6 | 2 | 7 |
| 306 | 10 | 6 | 1 | 8 | 0 | 9 | 10 | 9 | 10 | 11 | 3 | 9 | 4 | 9 |
| 307 | 6 | 3 | 0 | 3 | 1 | 7 | 8 | 8 | 2 | 3 | 4 | 4 | 10 | 9 |
| 308 | 5 | 3 | 6 | 3 | 8 | 3 | 4 | 5 | 9 | 9 | 3 | 11 | 6 | 1 |
| 309 | 3 | 10 | 0 | 8 | 6 | 0 | 6 | 6 | 7 | 8 | 8 | 0 | 8 | 5 |
| 310 | 6 | 2 | 2 | 9 | 9 | 3 | 1 | 3 | 9 | 6 | 4 | 2 | 5 | 10 |
| 311 | 9 | 2 | 4 | 0 | 2 | 9 | 4 | 9 | 5 | 9 | 6 | 10 | 11 | 10 |
| 312 | 8 | 0 | 2 | 6 | 3 | 8 | 8 | 0 | 2 | 4 | 2 | 9 | 4 | 10 |
| 313 | 6 | 0 | 11 | 2 | 3 | 3 | 6 | 9 | 1 | 7 | 6 | 2 | 9 | 11 |
| 314 | 7 | 2 | 0 | 7 | 8 | 7 | 9 | 10 | 4 | 6 | 10 | 1 | 1 | 1 |
| 315 | 5 | 11 | 2 | 4 | 0 | 7 | 0 | 0 | 0 | 7 | 6 | 8 | 5 | 1 |
| 316 | 7 | 1 | 4 | 3 | 9 | 8 | 0 | 9 | 11 | 11 | 9 | 1 | 2 | 4 |
| 317 | 7 | 4 | 8 | 10 | 3 | 5 | 6 | 11 | 7 | 6 | 10 | 6 | 7 | 4 |
| 318 | 4 | 0 | 10 | 6 | 7 | 5 | 11 | 6 | 2 | 0 | 7 | 10 | 8 | 8 |
| 319 | 4 | 7 | 2 | 7 | 4 | 8 | 4 | 3 | 3 | 9 | 11 | 1 | 11 | 8 |
| 320 | 8 | 5 | 11 | 1 | 6 | 5 | 9 | 1 | 1 | 9 | 3 | 1 | 6 | 10 |
| 321 | 11 | 0 | 11 | 3 | 4 | 1 | 7 | 5 | 0 | 7 | 2 | 7 | 11 | 0 |
| 322 | 11 | 4 | 3 | 9 | 0 | 9 | 1 | 7 | 11 | 4 | 11 | 4 | 2 | 8 |
| 323 | 11 | 4 | 3 | 4 | 9 | 2 | 6 | 5 | 0 | 0 | 7 | 3 | 8 | 2 |
| 324 | 1 | 8 | 4 | 10 | 9 | 9 | 6 | 10 | 0 | 5 | 8 | 0 | 1 | 11 |
| 325 | 9 | 7 | 11 | 1 | 0 | 11 | 4 | 3 | 2 | 10 | 1 | 0 | 3 | 3 |
| 326 | 7 | 3 | 11 | 4 | 4 | 3 | 2 | 6 | 6 | 3 | 5 | 11 | 2 | 9 |
| 327 | 2 | 4 | 7 | 10 | 0 | 0 | 2 | 9 | 5 | 0 | 6 | 3 | 7 | 8 |
| 328 | 10 | 9 | 9 | 3 | 2 | 10 | 10 | 11 | 0 | 5 | 3 | 0 | 0 | 7 |
| 329 | 9 | 6 | 8 | 0 | 4 | 8 | 8 | 1 | 1 | 1 | 10 | 4 | 10 | 6 |
| 330 | 0 | 4 | 0 | 1 | 4 | 6 | 10 | 4 | 9 | 5 | 4 | 3 | 0 | 2 |
| 331 | 4 | 7 | 10 | 4 | 9 | 5 | 2 | 1 | 7 | 1 | 5 | 7 | 11 | 10 |
| 332 | 2 | 6 | 7 | 5 | 9 | 10 | 0 | 6 | 3 | 0 | 10 | 6 | 9 | 4 |
| 333 | 0 | 1 | 11 | 0 | 4 | 5 | 3 | 1 | 10 | 3 | 4 | 8 | 4 | 8 |
| 334 | 4 | 3 | 1 | 11 | 10 | 10 | 6 | 3 | 10 | 1 | 6 | 0 | 5 | 3 |
| 335 | 7 | 5 | 4 | 7 | 0 | 5 | 10 | 6 | 5 | 0 | 5 | 1 | 11 | 11 |
| 336 | 5 | 8 | 1 | 0 | 3 | 5 | 1 | 3 | 4 | 8 | 1 | 9 | 8 | 10 |
| 337 | 6 | 11 | 11 | 11 | 3 | 8 | 11 | 11 | 10 | 6 | 1 | 7 | 5 | 8 |
| 338 | 8 | 5 | 9 | 11 | 9 | 2 | 2 | 6 | 4 | 2 | 6 | 5 | 5 | 7 |
| 339 | 0 | 2 | 10 | 10 | 0 | 6 | 1 | 5 | 8 | 4 | 8 | 10 | 6 | 4 |
| 340 | 2 | 2 | 7 | 7 | 4 | 4 | 9 | 1 | 2 | 11 | 7 | 4 | 6 | 5 |
| 341 | 2 | 4 | 2 | 7 | 8 | 2 | 8 | 7 | 11 | 11 | 1 | 2 | 11 | 4 |
| 342 | 10 | 7 | 8 | 9 | 10 | 2 | 1 | 11 | 5 | 10 | 4 | 11 | 9 | 2 |
| 343 | 6 | 8 | 3 | 0 | 2 | 11 | 8 | 7 | 4 | 5 | 10 | 1 | 5 | 0 |
| 344 | 9 | 4 | 1 | 9 | 10 | 11 | 7 | 2 | 1 | 1 | 8 | 11 | 6 | 1 |
| 345 | 7 | 7 | 4 | 8 | 1 | 5 | 5 | 10 | 9 | 2 | 10 | 10 | 5 | 2 |
| 346 | 4 | 11 | 1 | 8 | 4 | 1 | 5 | 0 | 8 | 5 | 1 | 3 | 3 | 1 |
| 347 | 8 | 7 | 10 | 6 | 8 | 1 | 4 | 2 | 11 | 7 | 0 | 9 | 6 | 3 |
| 348 | 10 | 7 | 2 | 8 | 6 | 5 | 10 | 5 | 6 | 6 | 1 | 8 | 6 | 5 |
| 349 | 0 | 4 | 2 | 6 | 2 | 11 | 0 | 8 | 5 | 9 | 7 | 8 | 0 | 0 |
| 350 | 6 | 10 | 5 | 1 | 9 | 7 | 3 | 9 | 5 | 7 | 5 | 9 | 2 | 8 |
| 351 | 3 | 3 | 7 | 7 | 3 | 1 | 7 | 11 | 3 | 4 | 1 | 10 | 11 | 2 |
| 352 | 4 | 1 | 4 | 5 | 8 | 2 | 3 | 1 | 2 | 8 | 2 | 2 | 10 | 9 |
| 353 | 3 | 3 | 0 | 5 | 0 | 3 | 11 | 9 | 8 | 9 | 9 | 8 | 1 | 2 |
| 354 | 11 | 0 | 10 | 7 | 0 | 10 | 9 | 9 | 9 | 3 | 3 | 10 | 11 | 7 |
| 355 | 6 | 2 | 8 | 11 | 1 | 2 | 5 | 7 | 9 | 9 | 1 | 9 | 7 | 9 |
| 356 | 3 | 8 | 4 | 11 | 7 | 3 | 1 | 4 | 3 | 6 | 8 | 9 | 0 | 0 |
| 357 | 7 | 0 | 3 | 1 | 0 | 8 | 2 | 3 | 6 | 4 | 0 | 5 | 7 | 1 |
| 358 | 9 | 2 | 0 | 10 | 3 | 4 | 10 | 2 | 11 | 7 | 2 | 5 | 10 | 5 |
| 359 | 5 | 0 | 5 | 11 | 2 | 11 | 3 | 1 | 0 | 6 | 9 | 3 | 6 | 6 |
| 360 | 4 | 11 | 5 | 2 | 3 | 1 | 11 | 2 | 6 | 8 | 10 | 9 | 11 | 9 |
| 361 | 7 | 8 | 10 | 1 | 10 | 3 | 3 | 8 | 1 | 8 | 0 | 3 | 1 | 0 |
| 362 | 9 | 8 | 3 | 3 | 5 | 5 | 5 | 11 | 3 | 9 | 8 | 1 | 9 | 2 |
| 363 | 0 | 8 | 7 | 9 | 4 | 11 | 4 | 3 | 11 | 0 | 0 | 5 | 2 | 0 |
| 364 | 1 | 2 | 7 | 0 | 0 | 3 | 1 | 4 | 5 | 3 | 2 | 5 | 4 | 6 |
| 365 | 6 | 8 | 4 | 11 | 5 | 4 | 7 | 11 | 1 | 10 | 2 | 4 | 7 | 6 |
| 366 | 3 | 11 | 2 | 0 | 1 | 2 | 10 | 11 | 7 | 11 | 2 | 10 | 1 | 11 |
| 367 | 11 | 6 | 11 | 7 | 6 | 6 | 10 | 2 | 3 | 5 | 0 | 2 | 1 | 5 |
| 368 | 9 | 1 | 3 | 2 | 0 | 7 | 11 | 11 | 9 | 0 | 4 | 7 | 7 | 7 |
| 369 | 10 | 8 | 4 | 0 | 5 | 1 | 2 | 0 | 8 | 6 | 9 | 7 | 6 | 4 |
| 370 | 7 | 9 | 0 | 5 | 7 | 11 | 0 | 11 | 1 | 11 | 1 | 5 | 5 | 6 |
| 371 | 9 | 11 | 0 | 5 | 11 | 2 | 5 | 7 | 10 | 7 | 0 | 0 | 2 | 2 |
| 372 | 6 | 10 | 3 | 0 | 1 | 6 | 2 | 11 | 3 | 4 | 3 | 8 | 2 | 9 |
| 373 | 1 | 7 | 5 | 1 | 0 | 0 | 7 | 0 | 8 | 4 | 4 | 3 | 5 | 11 |
| 374 | 4 | 10 | 8 | 7 | 5 | 2 | 6 | 4 | 9 | 7 | 9 | 5 | 10 | 8 |
| 375 | 5 | 7 | 9 | 8 | 7 | 2 | 3 | 4 | 9 | 8 | 8 | 6 | 6 | 7 |
| 376 | 4 | 2 | 5 | 8 | 5 | 0 | 10 | 9 | 7 | 1 | 1 | 11 | 9 | 7 |
| 377 | 0 | 5 | 5 | 11 | 11 | 5 | 1 | 1 | 6 | 7 | 7 | 7 | 3 | 4 |
| 378 | 6 | 11 | 5 | 4 | 5 | 3 | 4 | 5 | 11 | 7 | 8 | 6 | 7 | 0 |
| 379 | 11 | 2 | 11 | 10 | 7 | 10 | 8 | 6 | 9 | 0 | 0 | 0 | 6 | 3 |
| 380 | 10 | 6 | 9 | 1 | 11 | 8 | 3 | 8 | 6 | 1 | 6 | 1 | 2 | 3 |
| 381 | 2 | 11 | 6 | 9 | 3 | 1 | 9 | 8 | 10 | 11 | 5 | 0 | 10 | 11 |
| 382 | 10 | 3 | 11 | 7 | 9 | 6 | 9 | 10 | 0 | 3 | 9 | 6 | 5 | 3 |
| 383 | 4 | 11 | 7 | 8 | 11 | 2 | 3 | 8 | 5 | 9 | 4 | 7 | 5 | 4 |
| 384 | 0 | 6 | 7 | 4 | 3 | 11 | 2 | 11 | 0 | 8 | 4 | 1 | 10 | 10 |
| 385 | 5 | 6 | 3 | 5 | 6 | 2 | 2 | 8 | 5 | 3 | 9 | 0 | 3 | 7 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 386 | 6 | 3 | 6 | 2 | 11 | 4 | 10 | 3 | 2 | 5 | 6 | 5 | 3 | 7 |
| 387 | 10 | 9 | 8 | 1 | 7 | 7 | 2 | 4 | 4 | 0 | 1 | 4 | 8 | 0 |
| 388 | 11 | 0 | 9 | 11 | 8 | 11 | 6 | 9 | 3 | 4 | 7 | 4 | 5 | 9 |
| 389 | 3 | 0 | 1 | 6 | 2 | 4 | 3 | 10 | 3 | 9 | 2 | 1 | 10 | 11 |
| 390 | 5 | 2 | 6 | 0 | 2 | 4 | 0 | 0 | 3 | 2 | 5 | 11 | 0 | 9 |
| 391 | 10 | 3 | 2 | 8 | 8 | 7 | 6 | 0 | 3 | 2 | 10 | 5 | 4 | 0 |
| 392 | 11 | 1 | 1 | 4 | 8 | 0 | 0 | 6 | 6 | 10 | 1 | 3 | 7 | 11 |
| 393 | 4 | 5 | 3 | 6 | 0 | 0 | 5 | 7 | 3 | 5 | 2 | 5 | 6 | 10 |
| 394 | 0 | 3 | 1 | 0 | 7 | 2 | 11 | 5 | 0 | 9 | 2 | 4 | 5 | 9 |
| 395 | 5 | 10 | 5 | 6 | 4 | 2 | 7 | 10 | 5 | 11 | 1 | 5 | 0 | 3 |
| 396 | 2 | 5 | 3 | 10 | 11 | 4 | 11 | 9 | 2 | 3 | 9 | 6 | 4 | 6 |
| 397 | 7 | 10 | 6 | 10 | 10 | 7 | 4 | 2 | 8 | 3 | 9 | 4 | 0 | 0 |
| 398 | 9 | 4 | 11 | 0 | 3 | 6 | 5 | 7 | 6 | 1 | 4 | 7 | 9 | 4 |
| 399 | 4 | 7 | 4 | 1 | 2 | 2 | 8 | 9 | 10 | 5 | 8 | 7 | 0 | 6 |
| 400 | 5 | 0 | 11 | 5 | 5 | 9 | 11 | 8 | 7 | 7 | 0 | 9 | 8 | 9 |
| 401 | 4 | 3 | 8 | 7 | 1 | 4 | 0 | 0 | 7 | 10 | 0 | 2 | 8 | 4 |
| 402 | 1 | 5 | 9 | 10 | 7 | 9 | 9 | 1 | 11 | 3 | 10 | 2 | 10 | 0 |
| 403 | 5 | 6 | 7 | 0 | 11 | 1 | 10 | 9 | 1 | 3 | 7 | 2 | 2 | 1 |
| 404 | 0 | 11 | 3 | 2 | 4 | 9 | 7 | 0 | 9 | 2 | 0 | 4 | 4 | 5 |
| 405 | 11 | 8 | 2 | 6 | 2 | 10 | 2 | 4 | 1 | 0 | 5 | 5 | 3 | 9 |
| 406 | 7 | 1 | 7 | 2 | 5 | 9 | 1 | 7 | 7 | 0 | 8 | 6 | 1 | 5 |
| 407 | 8 | 0 | 4 | 0 | 8 | 10 | 5 | 4 | 3 | 8 | 3 | 11 | 8 | 11 |
| 408 | 0 | 3 | 6 | 4 | 1 | 1 | 11 | 1 | 3 | 0 | 7 | 9 | 4 | 10 |
| 409 | 11 | 5 | 7 | 0 | 3 | 7 | 4 | 7 | 0 | 6 | 5 | 8 | 4 | 5 |
| 410 | 11 | 9 | 2 | 7 | 1 | 1 | 10 | 9 | 2 | 7 | 1 | 1 | 10 | 6 |
| 411 | 2 | 9 | 2 | 8 | 8 | 8 | 9 | 6 | 10 | 9 | 0 | 4 | 9 | 7 |
| 412 | 9 | 3 | 0 | 8 | 6 | 6 | 8 | 5 | 10 | 0 | 2 | 6 | 3 | 1 |
| 413 | 2 | 10 | 0 | 6 | 10 | 9 | 1 | 9 | 4 | 0 | 11 | 8 | 11 | 9 |
| 414 | 9 | 8 | 9 | 5 | 7 | 0 | 3 | 0 | 10 | 10 | 5 | 9 | 3 | 4 |
| 415 | 6 | 4 | 8 | 2 | 7 | 6 | 7 | 1 | 9 | 8 | 2 | 5 | 11 | 1 |
| 416 | 6 | 11 | 1 | 4 | 11 | 5 | 11 | 9 | 6 | 0 | 11 | 1 | 6 | 1 |
| 417 | 2 | 6 | 11 | 0 | 8 | 0 | 5 | 8 | 9 | 6 | 11 | 10 | 2 | 6 |
| 418 | 4 | 7 | 7 | 3 | 9 | 4 | 1 | 5 | 1 | 7 | 0 | 3 | 0 | 11 |
| 419 | 0 | 1 | 4 | 5 | 6 | 11 | 6 | 4 | 8 | 5 | 10 | 5 | 6 | 5 |
| 420 | 2 | 4 | 10 | 0 | 7 | 10 | 4 | 6 | 7 | 4 | 4 | 2 | 2 | 11 |
| 421 | 10 | 7 | 11 | 2 | 8 | 4 | 7 | 6 | 5 | 7 | 9 | 4 | 8 | 1 |
| 422 | 8 | 5 | 11 | 4 | 5 | 11 | 0 | 3 | 4 | 1 | 7 | 3 | 9 | 9 |
| 423 | 8 | 2 | 8 | 2 | 6 | 4 | 1 | 11 | 10 | 2 | 8 | 0 | 10 | 1 |
| 424 | 0 | 10 | 2 | 5 | 1 | 3 | 7 | 10 | 10 | 7 | 3 | 4 | 5 | 11 |
| 425 | 4 | 0 | 2 | 11 | 3 | 7 | 0 | 3 | 11 | 3 | 10 | 10 | 2 | 2 |
| 426 | 5 | 9 | 3 | 6 | 1 | 4 | 4 | 9 | 7 | 8 | 2 | 0 | 5 | 8 |
| 427 | 3 | 10 | 9 | 11 | 9 | 3 | 9 | 11 | 10 | 0 | 11 | 10 | 8 | 3 |
| 428 | 7 | 2 | 2 | 3 | 6 | 4 | 3 | 1 | 7 | 7 | 3 | 2 | 2 | 6 |
| 429 | 5 | 6 | 5 | 10 | 9 | 9 | 8 | 1 | 7 | 4 | 4 | 10 | 4 | 3 |
| 430 | 2 | 1 | 9 | 10 | 4 | 7 | 5 | 6 | 1 | 11 | 6 | 10 | 10 | 9 |
| 431 | 1 | 11 | 7 | 3 | 10 | 4 | 8 | 0 | 6 | 0 | 6 | 11 | 1 | 10 |
| 432 | 3 | 8 | 5 | 7 | 4 | 10 | 0 | 3 | 5 | 3 | 4 | 0 | 6 | 6 |
| 433 | 7 | 1 | 8 | 6 | 8 | 10 | 7 | 7 | 5 | 1 | 10 | 11 | 2 | 7 |
| 434 | 3 | 6 | 8 | 11 | 2 | 5 | 6 | 9 | 0 | 5 | 11 | 9 | 3 | 2 |
| 435 | 0 | 1 | 7 | 3 | 11 | 1 | 9 | 2 | 4 | 5 | 2 | 4 | 1 | 8 |
| 436 | 9 | 6 | 9 | 7 | 11 | 11 | 1 | 6 | 9 | 8 | 3 | 4 | 7 | 8 |
| 437 | 0 | 8 | 0 | 9 | 7 | 1 | 9 | 6 | 6 | 10 | 3 | 6 | 6 | 6 |
| 438 | 6 | 7 | 11 | 9 | 10 | 0 | 10 | 1 | 0 | 0 | 1 | 1 | 0 | 9 |
| 439 | 1 | 6 | 5 | 9 | 11 | 5 | 8 | 11 | 0 | 11 | 8 | 11 | 8 | 0 |
| 440 | 1 | 5 | 8 | 6 | 5 | 8 | 3 | 5 | 0 | 2 | 4 | 7 | 9 | 10 |
| 441 | 1 | 10 | 2 | 9 | 3 | 3 | 2 | 9 | 3 | 2 | 5 | 1 | 7 | 4 |
| 442 | 9 | 8 | 0 | 6 | 0 | 6 | 4 | 7 | 8 | 8 | 11 | 9 | 7 | 0 |
| 443 | 3 | 10 | 7 | 3 | 10 | 5 | 0 | 6 | 1 | 9 | 5 | 2 | 7 | 9 |
| 444 | 1 | 9 | 2 | 10 | 6 | 11 | 10 | 3 | 1 | 10 | 8 | 7 | 4 | 9 |
| 445 | 3 | 7 | 6 | 10 | 1 | 5 | 8 | 9 | 6 | 10 | 2 | 3 | 11 | 3 |
| 446 | 2 | 8 | 9 | 11 | 1 | 10 | 5 | 11 | 5 | 8 | 9 | 3 | 11 | 4 |
| 447 | 0 | 7 | 9 | 1 | 4 | 3 | 11 | 0 | 0 | 3 | 7 | 6 | 11 | 1 |
| 448 | 8 | 1 | 6 | 8 | 0 | 0 | 8 | 3 | 9 | 1 | 10 | 9 | 1 | 4 |
| 449 | 11 | 9 | 3 | 4 | 10 | 10 | 4 | 1 | 4 | 11 | 3 | 2 | 6 | 9 |
| 450 | 2 | 11 | 3 | 5 | 10 | 3 | 10 | 3 | 4 | 2 | 4 | 11 | 8 | 0 |
| 451 | 1 | 8 | 6 | 6 | 3 | 10 | 6 | 2 | 7 | 9 | 9 | 10 | 8 | 7 |
| 452 | 8 | 8 | 1 | 2 | 9 | 1 | 3 | 1 | 4 | 4 | 0 | 0 | 9 | 4 |
| 453 | 6 | 11 | 10 | 8 | 1 | 8 | 1 | 5 | 5 | 8 | 11 | 9 | 10 | 6 |
| 454 | 3 | 2 | 4 | 4 | 10 | 0 | 11 | 4 | 6 | 2 | 3 | 10 | 9 | 3 |
| 455 | 4 | 9 | 4 | 10 | 5 | 6 | 4 | 8 | 5 | 4 | 10 | 1 | 3 | 5 |
| 456 | 7 | 0 | 11 | 6 | 10 | 7 | 1 | 0 | 10 | 10 | 1 | 3 | 2 | 5 |
| 457 | 6 | 11 | 5 | 10 | 7 | 2 | 6 | 4 | 1 | 9 | 3 | 10 | 3 | 6 |
| 458 | 7 | 11 | 2 | 11 | 4 | 4 | 4 | 11 | 4 | 4 | 4 | 8 | 6 | 4 |
| 459 | 11 | 7 | 3 | 1 | 7 | 0 | 1 | 10 | 1 | 6 | 3 | 6 | 4 | 2 |
| 460 | 9 | 6 | 0 | 9 | 4 | 9 | 3 | 0 | 4 | 3 | 1 | 10 | 2 | 7 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 461 | 1 | 9 | 10 | 3 | 3 | 8 | 7 | 6 | 1 | 6 | 3 | 1 | 1 | 6 |
| 462 | 4 | 10 | 4 | 7 | 11 | 0 | 9 | 3 | 11 | 1 | 7 | 7 | 8 | 1 |
| 463 | 6 | 0 | 7 | 2 | 1 | 6 | 11 | 10 | 7 | 10 | 7 | 11 | 3 | 3 |
| 464 | 8 | 9 | 8 | 0 | 7 | 0 | 1 | 7 | 5 | 11 | 7 | 7 | 11 | 3 |
| 465 | 2 | 3 | 6 | 10 | 9 | 8 | 1 | 2 | 1 | 2 | 1 | 7 | 7 | 7 |
| 466 | 3 | 4 | 3 | 4 | 5 | 10 | 2 | 3 | 2 | 2 | 8 | 9 | 11 | 8 |
| 467 | 8 | 1 | 8 | 5 | 10 | 10 | 0 | 2 | 8 | 9 | 0 | 3 | 4 | 1 |
| 468 | 3 | 1 | 6 | 10 | 5 | 7 | 7 | 5 | 5 | 5 | 11 | 2 | 6 | 8 |
| 469 | 4 | 9 | 5 | 9 | 4 | 6 | 6 | 10 | 4 | 7 | 5 | 2 | 8 | 6 |
| 470 | 8 | 11 | 10 | 6 | 11 | 8 | 9 | 3 | 0 | 9 | 1 | 2 | 1 | 9 |
| 471 | 9 | 11 | 9 | 6 | 0 | 1 | 2 | 1 | 5 | 6 | 8 | 8 | 10 | 10 |
| 472 | 10 | 7 | 2 | 2 | 1 | 11 | 3 | 9 | 0 | 0 | 8 | 10 | 3 | 8 |
| 473 | 0 | 5 | 11 | 3 | 2 | 7 | 5 | 3 | 3 | 7 | 0 | 11 | 5 | 6 |
| 474 | 6 | 10 | 6 | 5 | 6 | 6 | 7 | 8 | 1 | 1 | 7 | 6 | 9 | 8 |
| 475 | 8 | 9 | 10 | 10 | 9 | 5 | 4 | 5 | 3 | 10 | 4 | 8 | 1 | 0 |
| 476 | 1 | 7 | 10 | 7 | 1 | 7 | 3 | 2 | 10 | 8 | 1 | 0 | 7 | 11 |
| 477 | 0 | 9 | 11 | 2 | 2 | 9 | 8 | 8 | 8 | 0 | 3 | 7 | 2 | 10 |
| 478 | 7 | 2 | 4 | 2 | 9 | 5 | 2 | 7 | 1 | 9 | 11 | 5 | 0 | 0 |
| 479 | 9 | 3 | 4 | 7 | 8 | 1 | 11 | 3 | 5 | 2 | 11 | 3 | 3 | 4 |
| 480 | 0 | 3 | 10 | 0 | 5 | 0 | 6 | 8 | 4 | 5 | 5 | 8 | 11 | 4 |
| 481 | 10 | 11 | 8 | 6 | 8 | 9 | 1 | 1 | 10 | 5 | 9 | 10 | 7 | 6 |
| 482 | 10 | 11 | 10 | 4 | 3 | 6 | 3 | 0 | 4 | 9 | 2 | 4 | 9 | 3 |
| 483 | 3 | 6 | 10 | 8 | 5 | 0 | 7 | 3 | 0 | 4 | 9 | 5 | 4 | 10 |
| 484 | 1 | 5 | 0 | 11 | 8 | 3 | 9 | 2 | 2 | 10 | 7 | 5 | 0 | 10 |
| 485 | 11 | 9 | 6 | 11 | 10 | 0 | 6 | 10 | 5 | 9 | 11 | 11 | 7 | 10 |
| 486 | 6 | 8 | 9 | 9 | 1 | 5 | 0 | 1 | 11 | 6 | 6 | 6 | 8 | 8 |
| 487 | 0 | 0 | 8 | 11 | 1 | 0 | 1 | 8 | 11 | 4 | 9 | 0 | 1 | 5 |
| 488 | 6 | 5 | 8 | 9 | 9 | 9 | 7 | 7 | 1 | 5 | 0 | 7 | 10 | 4 |
| 489 | 10 | 0 | 3 | 8 | 7 | 2 | 5 | 1 | 6 | 11 | 9 | 7 | 0 | 8 |
| 490 | 7 | 6 | 6 | 5 | 7 | 8 | 7 | 7 | 2 | 3 | 0 | 1 | 11 | 5 |
| 491 | 2 | 7 | 6 | 6 | 4 | 11 | 3 | 4 | 11 | 4 | 6 | 7 | 4 | 6 |
| 492 | 1 | 4 | 9 | 8 | 10 | 10 | 1 | 4 | 4 | 7 | 6 | 3 | 3 | 0 |
| 493 | 8 | 7 | 2 | 10 | 2 | 9 | 7 | 7 | 4 | 1 | 6 | 9 | 8 | 8 |
| 494 | 1 | 8 | 11 | 1 | 9 | 10 | 5 | 5 | 8 | 2 | 6 | 9 | 4 | 9 |
| 495 | 6 | 5 | 2 | 3 | 11 | 11 | 2 | 7 | 6 | 4 | 9 | 2 | 0 | 2 |
| 496 | 10 | 11 | 1 | 1 | 1 | 10 | 11 | 8 | 8 | 4 | 5 | 7 | 11 | 6 |
| 497 | 2 | 11 | 9 | 10 | 5 | 6 | 1 | 10 | 11 | 8 | 7 | 5 | 8 | 2 |
| 498 | 8 | 8 | 3 | 11 | 11 | 6 | 11 | 2 | 9 | 1 | 11 | 11 | 0 | 5 |
| 499 | 5 | 4 | 10 | 9 | 8 | 4 | 11 | 1 | 7 | 10 | 8 | 4 | 10 | 7 |
| 500 | 5 | 0 | 6 | 2 | 11 | 3 | 5 | 6 | 5 | 2 | 7 | 8 | 10 | 5 |
| 501 | 9 | 0 | 10 | 4 | 1 | 8 | 6 | 2 | 9 | 2 | 5 | 3 | 2 | 0 |
| 502 | 3 | 7 | 1 | 5 | 2 | 8 | 5 | 6 | 8 | 7 | 10 | 9 | 11 | 0 |
| 503 | 3 | 6 | 5 | 9 | 0 | 4 | 9 | 10 | 6 | 8 | 6 | 7 | 0 | 7 |
| 504 | 7 | 10 | 1 | 9 | 4 | 2 | 0 | 2 | 7 | 0 | 10 | 0 | 11 | 7 |
| 505 | 5 | 5 | 8 | 8 | 7 | 3 | 10 | 8 | 8 | 11 | 6 | 1 | 10 | 1 |
| 506 | 2 | 7 | 3 | 9 | 6 | 11 | 11 | 5 | 10 | 1 | 10 | 4 | 11 | 4 |
| 507 | 5 | 5 | 2 | 5 | 5 | 10 | 6 | 7 | 8 | 8 | 7 | 10 | 1 | 8 |
| 508 | 7 | 10 | 4 | 9 | 0 | 9 | 3 | 5 | 8 | 6 | 7 | 2 | 4 | 5 |
| 509 | 1 | 7 | 1 | 4 | 0 | 10 | 8 | 10 | 11 | 8 | 3 | 4 | 9 | 4 |
| 510 | 2 | 3 | 5 | 2 | 6 | 2 | 9 | 6 | 11 | 3 | 2 | 5 | 6 | 8 |
| 511 | 8 | 7 | 6 | 3 | 11 | 10 | 6 | 1 | 11 | 3 | 11 | 6 | 2 | 9 |
| 512 | 5 | 3 | 9 | 10 | 0 | 11 | 0 | 1 | 10 | 4 | 5 | 1 | 0 | 8 |
| 513 | 3 | 6 | 0 | 5 | 1 | 3 | 3 | 11 | 0 | 5 | 3 | 7 | 10 | 5 |
| 514 | 10 | 0 | 10 | 1 | 6 | 2 | 8 | 10 | 1 | 6 | 11 | 8 | 8 | 6 |
| 515 | 11 | 7 | 8 | 4 | 4 | 9 | 5 | 3 | 2 | 8 | 4 | 10 | 6 | 4 |
| 516 | 1 | 10 | 3 | 8 | 1 | 11 | 10 | 3 | 9 | 1 | 2 | 3 | 11 | 11 |
| 517 | 3 | 0 | 5 | 3 | 8 | 5 | 9 | 4 | 11 | 2 | 5 | 4 | 6 | 3 |
| 518 | 0 | 9 | 4 | 3 | 9 | 7 | 11 | 2 | 7 | 10 | 6 | 1 | 5 | 9 |
| 519 | 2 | 7 | 2 | 2 | 8 | 6 | 0 | 0 | 4 | 6 | 9 | 7 | 7 | 2 |
| 520 | 7 | 11 | 8 | 8 | 10 | 4 | 11 | 0 | 8 | 11 | 8 | 9 | 4 | 8 |
| 521 | 11 | 3 | 7 | 9 | 11 | 5 | 2 | 5 | 9 | 7 | 6 | 5 | 8 | 1 |
| 522 | 10 | 10 | 9 | 3 | 5 | 6 | 4 | 9 | 3 | 6 | 6 | 4 | 1 | 5 |
| 523 | 8 | 10 | 0 | 0 | 9 | 1 | 3 | 7 | 8 | 3 | 10 | 10 | 5 | 1 |
| 524 | 9 | 4 | 0 | 7 | 7 | 4 | 10 | 5 | 1 | 5 | 7 | 2 | 3 | 9 |
| 525 | 0 | 8 | 2 | 10 | 6 | 6 | 9 | 3 | 6 | 0 | 2 | 0 | 10 | 7 |
| 526 | 7 | 9 | 1 | 11 | 7 | 6 | 2 | 6 | 10 | 2 | 2 | 3 | 4 | 2 |
| 527 | 4 | 7 | 10 | 6 | 4 | 4 | 6 | 7 | 6 | 9 | 8 | 8 | 3 | 11 |
| 528 | 7 | 1 | 3 | 4 | 1 | 5 | 9 | 5 | 6 | 3 | 0 | 10 | 3 | 6 |
| 529 | 5 | 2 | 8 | 7 | 6 | 2 | 2 | 1 | 3 | 11 | 4 | 6 | 11 | 10 |
| 530 | 3 | 6 | 7 | 10 | 5 | 8 | 11 | 2 | 2 | 6 | 8 | 8 | 2 | 3 |
| 531 | 11 | 4 | 4 | 5 | 6 | 0 | 6 | 9 | 3 | 3 | 3 | 9 | 9 | 6 |
| 532 | 1 | 7 | 6 | 1 | 2 | 2 | 10 | 8 | 4 | 7 | 6 | 10 | 1 | 3 |
| 533 | 6 | 9 | 6 | 3 | 3 | 10 | 5 | 8 | 9 | 8 | 7 | 3 | 0 | 5 |
| 534 | 3 | 10 | 8 | 4 | 6 | 10 | 3 | 9 | 1 | 2 | 9 | 2 | 4 | 11 |
| 535 | 8 | 8 | 1 | 10 | 5 | 9 | 7 | 10 | 1 | 8 | 3 | 1 | 3 | 0 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 536 | 2 | 3 | 8 | 8 | 2 | 8 | 5 | 11 | 6 | 5 | 11 | 4 | 0 | 11 |
| 537 | 6 | 2 | 4 | 2 | 8 | 11 | 2 | 10 | 6 | 7 | 7 | 1 | 9 | 4 |
| 538 | 5 | 1 | 8 | 1 | 10 | 3 | 4 | 2 | 9 | 0 | 7 | 7 | 1 | 11 |
| 539 | 10 | 6 | 3 | 2 | 2 | 10 | 5 | 2 | 5 | 10 | 1 | 2 | 1 | 1 |
| 540 | 11 | 5 | 7 | 6 | 4 | 2 | 4 | 2 | 4 | 2 | 2 | 11 | 7 | 9 |
| 541 | 6 | 10 | 9 | 1 | 1 | 9 | 8 | 5 | 4 | 8 | 5 | 5 | 5 | 10 |
| 542 | 0 | 5 | 9 | 7 | 11 | 6 | 5 | 10 | 11 | 3 | 3 | 10 | 4 | 9 |
| 543 | 2 | 11 | 11 | 6 | 11 | 10 | 7 | 9 | 9 | 5 | 1 | 10 | 6 | 8 |
| 544 | 0 | 0 | 3 | 1 | 7 | 3 | 7 | 8 | 2 | 1 | 4 | 2 | 2 | 10 |
| 545 | 0 | 2 | 11 | 8 | 4 | 4 | 9 | 8 | 3 | 10 | 10 | 11 | 9 | 3 |
| 546 | 0 | 2 | 7 | 11 | 2 | 9 | 10 | 6 | 11 | 8 | 11 | 7 | 10 | 1 |
| 547 | 0 | 11 | 9 | 7 | 3 | 0 | 10 | 3 | 2 | 4 | 0 | 11 | 6 | 7 |
| 548 | 11 | 3 | 4 | 0 | 9 | 11 | 1 | 8 | 7 | 11 | 9 | 6 | 7 | 8 |
| 549 | 7 | 7 | 0 | 7 | 3 | 9 | 8 | 11 | 10 | 8 | 6 | 9 | 11 | 0 |
| 550 | 7 | 6 | 10 | 8 | 6 | 0 | 9 | 8 | 11 | 0 | 11 | 9 | 6 | 11 |
| 551 | 3 | 5 | 2 | 7 | 7 | 4 | 3 | 7 | 2 | 0 | 0 | 7 | 7 | 6 |
| 552 | 1 | 9 | 6 | 8 | 8 | 5 | 1 | 6 | 1 | 11 | 2 | 9 | 2 | 10 |
| 553 | 3 | 10 | 4 | 8 | 11 | 2 | 6 | 8 | 0 | 6 | 10 | 5 | 1 | 7 |
| 554 | 3 | 3 | 1 | 4 | 9 | 11 | 5 | 2 | 4 | 3 | 2 | 2 | 2 | 2 |
| 555 | 5 | 11 | 0 | 5 | 1 | 10 | 6 | 5 | 3 | 11 | 9 | 0 | 7 | 4 |
| 556 | 5 | 4 | 1 | 8 | 5 | 7 | 9 | 4 | 9 | 6 | 11 | 11 | 11 | 10 |
| 557 | 6 | 4 | 1 | 8 | 9 | 3 | 7 | 11 | 3 | 0 | 5 | 3 | 3 | 5 |
| 558 | 9 | 8 | 4 | 5 | 5 | 11 | 10 | 1 | 10 | 0 | 1 | 2 | 6 | 0 |
| 559 | 6 | 0 | 5 | 10 | 1 | 10 | 10 | 6 | 8 | 5 | 6 | 6 | 0 | 3 |
| 560 | 4 | 11 | 5 | 9 | 6 | 5 | 0 | 7 | 2 | 2 | 2 | 1 | 9 | 7 |
| 561 | 3 | 11 | 11 | 6 | 4 | 2 | 11 | 6 | 10 | 1 | 11 | 8 | 10 | 5 |
| 562 | 5 | 8 | 10 | 0 | 7 | 0 | 7 | 9 | 6 | 2 | 7 | 4 | 4 | 0 |
| 563 | 9 | 5 | 6 | 1 | 9 | 8 | 5 | 2 | 3 | 4 | 7 | 10 | 9 | 4 |
| 564 | 6 | 4 | 6 | 7 | 10 | 5 | 11 | 3 | 3 | 4 | 3 | 5 | 0 | 1 |
| 565 | 5 | 5 | 9 | 1 | 5 | 3 | 0 | 0 | 2 | 10 | 9 | 8 | 10 | 0 |
| 566 | 2 | 2 | 4 | 7 | 4 | 6 | 7 | 4 | 8 | 2 | 11 | 6 | 10 | 7 |
| 567 | 7 | 5 | 7 | 3 | 4 | 0 | 5 | 9 | 11 | 9 | 5 | 7 | 0 | 7 |
| 568 | 3 | 8 | 10 | 1 | 2 | 6 | 6 | 11 | 2 | 8 | 1 | 6 | 6 | 7 |
| 569 | 9 | 0 | 5 | 3 | 7 | 11 | 6 | 3 | 4 | 7 | 8 | 10 | 5 | 10 |
| 570 | 3 | 3 | 1 | 0 | 6 | 7 | 8 | 7 | 2 | 10 | 11 | 3 | 1 | 1 |
| 571 | 4 | 8 | 8 | 5 | 7 | 6 | 5 | 0 | 4 | 8 | 10 | 0 | 4 | 10 |
| 572 | 9 | 0 | 9 | 9 | 2 | 4 | 8 | 6 | 4 | 2 | 0 | 8 | 0 | 0 |
| 573 | 11 | 11 | 4 | 0 | 8 | 6 | 7 | 1 | 6 | 1 | 1 | 0 | 3 | 9 |
| 574 | 2 | 0 | 1 | 9 | 10 | 7 | 7 | 6 | 6 | 0 | 9 | 0 | 2 | 3 |
| 575 | 4 | 11 | 10 | 1 | 8 | 3 | 5 | 6 | 9 | 7 | 10 | 4 | 0 | 6 |
| 576 | 10 | 8 | 6 | 10 | 1 | 3 | 9 | 0 | 4 | 6 | 4 | 9 | 1 | 8 |
| 577 | 9 | 10 | 2 | 7 | 0 | 10 | 9 | 4 | 4 | 11 | 6 | 1 | 5 | 3 |
| 578 | 5 | 7 | 9 | 6 | 4 | 10 | 9 | 10 | 3 | 7 | 0 | 4 | 10 | 7 |
| 579 | 5 | 5 | 11 | 9 | 0 | 1 | 2 | 4 | 6 | 0 | 8 | 3 | 6 | 11 |
| 580 | 11 | 4 | 0 | 10 | 2 | 11 | 11 | 11 | 4 | 7 | 11 | 6 | 4 | 9 |
| 581 | 10 | 2 | 9 | 2 | 8 | 0 | 0 | 9 | 2 | 3 | 4 | 3 | 8 | 10 |
| 582 | 6 | 2 | 9 | 2 | 0 | 3 | 11 | 1 | 3 | 1 | 1 | 11 | 2 | 2 |
| 583 | 7 | 9 | 2 | 0 | 4 | 6 | 7 | 8 | 5 | 8 | 9 | 8 | 9 | 10 |
| 584 | 2 | 9 | 0 | 3 | 3 | 8 | 1 | 5 | 2 | 4 | 6 | 2 | 2 | 8 |
| 585 | 5 | 3 | 9 | 4 | 2 | 9 | 8 | 11 | 3 | 9 | 8 | 10 | 7 | 9 |
| 586 | 6 | 7 | 5 | 6 | 9 | 5 | 11 | 1 | 4 | 5 | 4 | 2 | 7 | 11 |
| 587 | 7 | 6 | 2 | 4 | 1 | 9 | 8 | 10 | 1 | 10 | 9 | 0 | 6 | 1 |
| 588 | 3 | 4 | 10 | 2 | 10 | 0 | 4 | 0 | 9 | 4 | 6 | 8 | 10 | 6 |
| 589 | 11 | 6 | 5 | 11 | 11 | 5 | 7 | 6 | 4 | 9 | 9 | 6 | 1 | 5 |
| 590 | 8 | 3 | 7 | 10 | 10 | 4 | 6 | 7 | 7 | 3 | 2 | 6 | 6 | 10 |
| 591 | 0 | 4 | 4 | 9 | 1 | 7 | 10 | 11 | 11 | 3 | 10 | 2 | 8 | 10 |
| 592 | 4 | 10 | 11 | 9 | 4 | 7 | 1 | 1 | 5 | 2 | 8 | 5 | 1 | 8 |
| 593 | 0 | 6 | 11 | 7 | 8 | 8 | 0 | 8 | 7 | 5 | 2 | 8 | 3 | 8 |
| 594 | 0 | 4 | 8 | 2 | 4 | 5 | 3 | 2 | 5 | 1 | 6 | 0 | 11 | 2 |
| 595 | 6 | 2 | 4 | 3 | 11 | 1 | 9 | 5 | 10 | 10 | 11 | 0 | 4 | 1 |
| 596 | 8 | 9 | 7 | 8 | 11 | 4 | 1 | 10 | 9 | 9 | 1 | 3 | 9 | 6 |
| 597 | 8 | 7 | 3 | 7 | 8 | 9 | 3 | 0 | 7 | 7 | 4 | 11 | 10 | 10 |
| 598 | 1 | 6 | 1 | 1 | 3 | 4 | 10 | 0 | 10 | 8 | 4 | 5 | 8 | 8 |
| 599 | 8 | 1 | 5 | 6 | 1 | 3 | 5 | 8 | 4 | 0 | 3 | 1 | 0 | 2 |
| 600 | 9 | 10 | 1 | 2 | 1 | 1 | 10 | 10 | 0 | 0 | 6 | 7 | 9 | 1 |
| 601 | 11 | 1 | 0 | 6 | 0 | 2 | 10 | 7 | 5 | 11 | 8 | 4 | 6 | 6 |
| 602 | 9 | 5 | 4 | 5 | 4 | 2 | 5 | 6 | 6 | 10 | 4 | 5 | 8 | 11 |
| 603 | 0 | 10 | 8 | 3 | 8 | 2 | 3 | 1 | 6 | 5 | 0 | 11 | 1 | 4 |
| 604 | 11 | 5 | 2 | 1 | 10 | 6 | 6 | 3 | 0 | 1 | 8 | 5 | 2 | 8 |
| 605 | 11 | 6 | 10 | 9 | 1 | 9 | 4 | 2 | 5 | 1 | 11 | 7 | 9 | 10 |
| 606 | 6 | 7 | 2 | 11 | 4 | 0 | 3 | 7 | 7 | 11 | 5 | 1 | 4 | 5 |
| 607 | 9 | 3 | 6 | 4 | 10 | 10 | 2 | 11 | 8 | 7 | 10 | 8 | 9 | 0 |
| 608 | 9 | 1 | 11 | 10 | 2 | 9 | 11 | 0 | 6 | 11 | 2 | 4 | 5 | 2 |
| 609 | 6 | 3 | 10 | 5 | 7 | 2 | 11 | 7 | 2 | 5 | 3 | 9 | 2 | 4 |
| 610 | 9 | 7 | 11 | 11 | 5 | 8 | 8 | 9 | 9 | 4 | 9 | 7 | 3 | 11 |
| 611 | 5 | 5 | 10 | 7 | 5 | 11 | 4 | 6 | 6 | 8 | 5 | 6 | 9 | 5 |
| 612 | 10 | 2 | 2 | 9 | 8 | 6 | 5 | 3 | 8 | 9 | 10 | 10 | 3 | 3 |
| 613 | 1 | 4 | 1 | 7 | 3 | 7 | 4 | 10 | 11 | 11 | 7 | 7 | 5 | 2 |
| 614 | 6 | 4 | 3 | 9 | 11 | 0 | 6 | 0 | 10 | 7 | 9 | 3 | 2 | 4 |
| 615 | 2 | 2 | 10 | 8 | 5 | 3 | 0 | 7 | 6 | 4 | 3 | 1 | 6 | 3 |
| 616 | 11 | 4 | 8 | 11 | 9 | 6 | 8 | 8 | 10 | 10 | 8 | 1 | 8 | 4 |
| 617 | 3 | 10 | 4 | 5 | 2 | 9 | 2 | 4 | 10 | 10 | 9 | 4 | 10 | 4 |
| 618 | 8 | 3 | 0 | 7 | 10 | 3 | 7 | 10 | 6 | 6 | 6 | 3 | 5 | 8 |
| 619 | 2 | 0 | 2 | 8 | 11 | 11 | 10 | 4 | 1 | 6 | 0 | 9 | 5 | 0 |
| 620 | 4 | 9 | 6 | 11 | 0 | 4 | 7 | 9 | 0 | 11 | 9 | 10 | 8 | 2 |
| 621 | 8 | 8 | 5 | 4 | 8 | 7 | 6 | 4 | 8 | 6 | 8 | 3 | 2 | 7 |
| 622 | 8 | 2 | 4 | 10 | 6 | 8 | 4 | 4 | 5 | 1 | 5 | 4 | 5 | 8 |
| 623 | 9 | 0 | 9 | 8 | 11 | 9 | 1 | 7 | 6 | 5 | 10 | 7 | 4 | 1 |
| 624 | 1 | 2 | 2 | 2 | 2 | 7 | 6 | 7 | 10 | 3 | 5 | 5 | 9 | 3 |
| 625 | 3 | 3 | 6 | 2 | 3 | 3 | 10 | 8 | 1 | 3 | 11 | 11 | 10 | 4 |
| 626 | 6 | 1 | 3 | 3 | 2 | 2 | 1 | 9 | 1 | 8 | 10 | 9 | 11 | 2 |
| 627 | 2 | 5 | 5 | 5 | 10 | 5 | 3 | 2 | 9 | 9 | 1 | 8 | 0 | 3 |
| 628 | 4 | 5 | 7 | 10 | 8 | 3 | 3 | 3 | 0 | 10 | 1 | 0 | 8 | 1 |
| 629 | 6 | 6 | 0 | 3 | 6 | 4 | 5 | 4 | 11 | 1 | 0 | 6 | 8 | 0 |
| 630 | 7 | 9 | 7 | 5 | 5 | 11 | 9 | 10 | 8 | 3 | 4 | 0 | 4 | 3 |
| 631 | 8 | 2 | 9 | 1 | 5 | 2 | 11 | 8 | 1 | 3 | 8 | 4 | 7 | 11 |
| 632 | 3 | 6 | 7 | 4 | 7 | 6 | 7 | 0 | 5 | 11 | 11 | 3 | 5 | 9 |
| 633 | 2 | 3 | 10 | 2 | 10 | 5 | 9 | 8 | 3 | 11 | 4 | 1 | 2 | 9 |
| 634 | 7 | 5 | 10 | 11 | 2 | 3 | 7 | 0 | 3 | 8 | 2 | 11 | 11 | 3 |
| 635 | 10 | 4 | 3 | 4 | 2 | 1 | 0 | 10 | 0 | 6 | 0 | 4 | 7 | 11 |
| 636 | 8 | 10 | 10 | 11 | 7 | 5 | 2 | 9 | 11 | 5 | 0 | 8 | 9 | 10 |
| 637 | 2 | 2 | 6 | 8 | 0 | 9 | 6 | 3 | 7 | 10 | 1 | 5 | 11 | 9 |
| 638 | 10 | 4 | 9 | 9 | 6 | 11 | 10 | 10 | 7 | 8 | 9 | 10 | 11 | 0 |
| 639 | 2 | 6 | 5 | 2 | 9 | 2 | 10 | 8 | 8 | 0 | 1 | 4 | 4 | 7 |
| 640 | 11 | 6 | 2 | 6 | 8 | 10 | 1 | 11 | 7 | 3 | 4 | 9 | 1 | 7 |
| 641 | 10 | 1 | 4 | 9 | 0 | 8 | 9 | 10 | 3 | 0 | 3 | 5 | 8 | 4 |
| 642 | 4 | 6 | 3 | 7 | 1 | 4 | 2 | 10 | 0 | 3 | 8 | 5 | 11 | 0 |
| 643 | 1 | 0 | 5 | 8 | 2 | 10 | 5 | 9 | 1 | 4 | 7 | 0 | 10 | 8 |
| 644 | 10 | 7 | 6 | 0 | 6 | 6 | 0 | 6 | 0 | 10 | 4 | 1 | 2 | 0 |
| 645 | 4 | 8 | 9 | 3 | 7 | 8 | 8 | 11 | 10 | 11 | 2 | 2 | 8 | 11 |
| 646 | 4 | 5 | 6 | 2 | 6 | 7 | 2 | 9 | 3 | 5 | 10 | 0 | 2 | 5 |
| 647 | 2 | 1 | 3 | 5 | 4 | 0 | 2 | 11 | 11 | 5 | 6 | 6 | 6 | 4 |
| 648 | 11 | 9 | 10 | 8 | 5 | 1 | 2 | 2 | 1 | 10 | 10 | 3 | 7 | 0 |
| 649 | 2 | 0 | 4 | 10 | 11 | 0 | 5 | 7 | 11 | 0 | 4 | 4 | 11 | 6 |
| 650 | 8 | 1 | 3 | 4 | 9 | 4 | 4 | 3 | 10 | 4 | 5 | 0 | 7 | 9 |
| 651 | 7 | 4 | 6 | 0 | 0 | 1 | 6 | 8 | 1 | 2 | 8 | 0 | 5 | 0 |
| 652 | 6 | 1 | 0 | 6 | 5 | 9 | 7 | 6 | 2 | 2 | 2 | 9 | 8 | 3 |
| 653 | 7 | 10 | 0 | 5 | 0 | 5 | 7 | 2 | 6 | 10 | 11 | 9 | 4 | 2 |
| 654 | 3 | 11 | 8 | 10 | 10 | 0 | 2 | 1 | 4 | 9 | 10 | 2 | 1 | 3 |
| 655 | 1 | 10 | 1 | 9 | 11 | 7 | 5 | 8 | 8 | 4 | 1 | 6 | 9 | 11 |
| 656 | 11 | 11 | 8 | 9 | 8 | 8 | 4 | 0 | 11 | 8 | 5 | 8 | 1 | 2 |
| 657 | 2 | 9 | 8 | 0 | 11 | 9 | 11 | 11 | 8 | 3 | 3 | 2 | 9 | 7 |
| 658 | 2 | 0 | 3 | 11 | 6 | 10 | 11 | 3 | 0 | 7 | 7 | 11 | 2 | 6 |
| 659 | 10 | 11 | 4 | 10 | 5 | 4 | 9 | 6 | 7 | 4 | 1 | 11 | 0 | 1 |
| 660 | 4 | 10 | 2 | 8 | 11 | 3 | 4 | 5 | 7 | 8 | 6 | 10 | 3 | 4 |
| 661 | 8 | 4 | 1 | 9 | 0 | 4 | 3 | 4 | 5 | 10 | 4 | 6 | 1 | 9 |
| 662 | 3 | 8 | 11 | 1 | 7 | 7 | 10 | 8 | 6 | 0 | 5 | 5 | 11 | 1 |
| 663 | 8 | 5 | 0 | 10 | 3 | 5 | 9 | 9 | 0 | 2 | 8 | 11 | 10 | 11 |
| 664 | 10 | 5 | 8 | 1 | 5 | 7 | 8 | 6 | 9 | 2 | 3 | 3 | 2 | 4 |
| 665 | 10 | 0 | 11 | 11 | 2 | 3 | 8 | 7 | 7 | 1 | 1 | 0 | 5 | 7 |
| 666 | 10 | 1 | 11 | 6 | 11 | 11 | 6 | 10 | 8 | 4 | 7 | 9 | 7 | 2 |
| 667 | 6 | 8 | 9 | 4 | 3 | 11 | 8 | 2 | 6 | 10 | 3 | 3 | 10 | 8 |
| 668 | 1 | 0 | 6 | 8 | 0 | 2 | 7 | 11 | 6 | 8 | 0 | 1 | 9 | 7 |
| 669 | 5 | 8 | 0 | 2 | 10 | 11 | 6 | 9 | 5 | 4 | 4 | 5 | 11 | 7 |
| 670 | 1 | 7 | 0 | 0 | 4 | 5 | 6 | 9 | 10 | 0 | 1 | 7 | 5 | 9 |
| 671 | 0 | 6 | 10 | 8 | 1 | 2 | 8 | 5 | 9 | 3 | 7 | 1 | 1 | 2 |
| 672 | 1 | 7 | 5 | 3 | 6 | 1 | 1 | 3 | 8 | 0 | 5 | 1 | 8 | 1 |
| 673 | 7 | 10 | 9 | 11 | 6 | 2 | 6 | 11 | 7 | 9 | 0 | 3 | 5 | 11 |
| 674 | 1 | 4 | 5 | 10 | 9 | 8 | 6 | 9 | 9 | 8 | 0 | 8 | 6 | 5 |
| 675 | 4 | 8 | 3 | 9 | 10 | 7 | 10 | 2 | 8 | 7 | 3 | 7 | 4 | 9 |
| 676 | 4 | 1 | 5 | 5 | 9 | 10 | 1 | 7 | 3 | 10 | 11 | 5 | 11 | 6 |
| 677 | 8 | 5 | 4 | 11 | 8 | 0 | 7 | 5 | 9 | 2 | 0 | 1 | 8 | 6 |
| 678 | 1 | 1 | 4 | 8 | 11 | 6 | 4 | 11 | 3 | 7 | 7 | 8 | 0 | 10 |
| 679 | 2 | 6 | 4 | 0 | 1 | 0 | 10 | 2 | 0 | 11 | 5 | 3 | 3 | 3 |
| 680 | 4 | 4 | 7 | 6 | 7 | 1 | 9 | 1 | 1 | 6 | 5 | 7 | 4 | 8 |
| 681 | 9 | 4 | 9 | 3 | 9 | 5 | 8 | 5 | 11 | 4 | 11 | 9 | 7 | 5 |
| 682 | 6 | 0 | 6 | 11 | 7 | 1 | 9 | 0 | 5 | 5 | 9 | 11 | 10 | 7 |
| 683 | 5 | 11 | 11 | 5 | 11 | 0 | 1 | 6 | 1 | 7 | 6 | 11 | 3 | 3 |
| 684 | 7 | 11 | 6 | 2 | 6 | 2 | 1 | 4 | 5 | 3 | 1 | 9 | 8 | 3 |
| 685 | 9 | 2 | 7 | 1 | 3 | 6 | 3 | 5 | 1 | 8 | 2 | 10 | 11 | 6 |

Example #4 of a group-based CS hopping pattern

| m | $n_{cs}(n)$ | | | | | | | | | | | | | |
|---|---|---|---|---|---|---|---|---|---|---|---|---|---|---|
| 686 | 3 | 11 | 3 | 4 | 9 | 1 | 8 | 4 | 3 | 11 | 6 | 11 | 0 | 8 |
| 687 | 2 | 7 | 5 | 10 | 0 | 1 | 9 | 11 | 1 | 10 | 2 | 8 | 1 | 10 |
| 688 | 2 | 4 | 3 | 8 | 6 | 5 | 9 | 7 | 8 | 10 | 9 | 0 | 0 | 5 |
| 689 | 3 | 6 | 11 | 0 | 1 | 11 | 4 | 6 | 3 | 10 | 8 | 9 | 5 | 8 |
| 690 | 4 | 5 | 0 | 4 | 6 | 9 | 0 | 8 | 7 | 3 | 6 | 11 | 6 | 6 |
| 691 | 9 | 1 | 2 | 2 | 1 | 5 | 1 | 3 | 5 | 7 | 9 | 6 | 10 | 4 |
| 692 | 2 | 3 | 7 | 1 | 1 | 7 | 6 | 9 | 10 | 10 | 0 | 1 | 10 | 11 |
| 693 | 8 | 9 | 9 | 7 | 2 | 8 | 8 | 3 | 11 | 0 | 4 | 5 | 9 | 2 |
| 694 | 4 | 9 | 7 | 0 | 3 | 1 | 8 | 9 | 4 | 9 | 8 | 9 | 6 | 3 |
| 695 | 7 | 1 | 8 | 0 | 11 | 11 | 10 | 9 | 4 | 7 | 10 | 3 | 8 | 5 |
| 696 | 5 | 7 | 8 | 4 | 11 | 0 | 7 | 8 | 11 | 3 | 2 | 1 | 7 | 8 |
| 697 | 10 | 1 | 1 | 7 | 11 | 4 | 0 | 0 | 0 | 9 | 2 | 7 | 6 | 7 |
| 698 | 10 | 9 | 5 | 3 | 1 | 5 | 7 | 9 | 8 | 1 | 8 | 8 | 11 | 4 |
| 699 | 1 | 10 | 4 | 10 | 4 | 8 | 7 | 0 | 10 | 11 | 7 | 9 | 3 | 6 |
| 700 | 5 | 4 | 6 | 2 | 7 | 8 | 2 | 7 | 11 | 8 | 8 | 7 | 0 | 3 |
| 701 | 10 | 8 | 8 | 1 | 8 | 10 | 1 | 10 | 2 | 10 | 5 | 1 | 0 | 3 |
| 702 | 1 | 6 | 8 | 7 | 7 | 10 | 11 | 7 | 10 | 6 | 9 | 1 | 6 | 2 |
| 703 | 11 | 8 | 7 | 0 | 9 | 9 | 0 | 0 | 2 | 0 | 11 | 11 | 3 | 11 |
| 704 | 9 | 4 | 6 | 0 | 8 | 2 | 4 | 9 | 4 | 1 | 3 | 6 | 10 | 8 |
| 705 | 9 | 8 | 10 | 7 | 9 | 11 | 5 | 11 | 7 | 1 | 6 | 5 | 3 | 1 |
| 706 | 5 | 0 | 4 | 0 | 5 | 8 | 11 | 6 | 10 | 10 | 2 | 7 | 11 | 7 |
| 707 | 4 | 0 | 11 | 2 | 8 | 10 | 4 | 4 | 10 | 9 | 0 | 10 | 1 | 6 |
| 708 | 10 | 9 | 1 | 5 | 4 | 8 | 0 | 4 | 9 | 7 | 0 | 10 | 8 | 3 |
| 709 | 0 | 6 | 9 | 11 | 4 | 7 | 3 | 10 | 8 | 8 | 4 | 2 | 5 | 6 |
| 710 | 4 | 2 | 3 | 7 | 10 | 9 | 1 | 9 | 5 | 1 | 7 | 6 | 0 | 5 |
| 711 | 8 | 6 | 7 | 3 | 5 | 1 | 1 | 8 | 3 | 7 | 7 | 11 | 6 | 9 |
| 712 | 10 | 3 | 7 | 11 | 9 | 8 | 4 | 0 | 8 | 3 | 1 | 5 | 10 | 8 |
| 713 | 5 | 10 | 3 | 7 | 9 | 7 | 7 | 0 | 1 | 6 | 9 | 4 | 9 | 7 |
| 714 | 4 | 8 | 5 | 4 | 6 | 8 | 11 | 6 | 11 | 5 | 1 | 4 | 1 | 4 |
| 715 | 5 | 8 | 7 | 6 | 0 | 11 | 7 | 5 | 1 | 7 | 1 | 8 | 2 | 4 |
| 716 | 10 | 11 | 8 | 9 | 9 | 4 | 3 | 8 | 2 | 6 | 3 | 4 | 10 | 10 |
| 717 | 2 | 9 | 2 | 2 | 3 | 9 | 2 | 3 | 9 | 5 | 11 | 1 | 8 | 0 |
| 718 | 8 | 3 | 2 | 2 | 5 | 5 | 5 | 9 | 6 | 1 | 3 | 10 | 7 | 5 |
| 719 | 7 | 2 | 8 | 4 | 8 | 3 | 6 | 11 | 2 | 4 | 2 | 4 | 4 | 5 |
| 720 | 1 | 3 | 3 | 1 | 3 | 5 | 4 | 4 | 6 | 9 | 9 | 1 | 11 | 3 |
| 721 | 1 | 2 | 3 | 11 | 8 | 1 | 4 | 1 | 9 | 4 | 3 | 9 | 9 | 0 |
| 722 | 4 | 9 | 3 | 6 | 11 | 8 | 10 | 7 | 2 | 0 | 5 | 11 | 0 | 4 |
| 723 | 11 | 7 | 10 | 3 | 6 | 4 | 0 | 10 | 9 | 5 | 9 | 2 | 10 | 4 |
| 724 | 1 | 5 | 1 | 0 | 10 | 11 | 0 | 5 | 2 | 6 | 10 | 5 | 5 | 4 |
| 725 | 7 | 4 | 3 | 0 | 7 | 10 | 10 | 4 | 0 | 3 | 2 | 8 | 6 | 4 |
| 726 | 7 | 11 | 5 | 0 | 11 | 7 | 4 | 10 | 2 | 0 | 6 | 6 | 2 | 9 |
| 727 | 1 | 3 | 11 | 7 | 0 | 5 | 11 | 2 | 0 | 7 | 4 | 10 | 9 | 8 |
| 728 | 11 | 2 | 2 | 0 | 6 | 0 | 9 | 11 | 0 | 8 | 10 | 4 | 8 | 1 |
| 729 | 1 | 0 | 10 | 0 | 9 | 6 | 2 | 0 | 0 | 7 | 8 | 2 | 4 | 9 |
| 730 | 0 | 9 | 5 | 2 | 0 | 6 | 1 | 10 | 7 | 2 | 11 | 0 | 0 | 10 |
| 731 | 6 | 11 | 11 | 10 | 10 | 2 | 10 | 2 | 9 | 4 | 5 | 4 | 7 | 4 |
| 732 | 1 | 2 | 8 | 5 | 5 | 10 | 8 | 4 | 1 | 1 | 4 | 8 | 0 | 1 |
| 733 | 1 | 0 | 0 | 2 | 4 | 4 | 7 | 2 | 7 | 6 | 5 | 6 | 7 | 1 |
| 734 | 8 | 9 | 2 | 2 | 2 | 0 | 0 | 6 | 3 | 4 | 8 | 11 | 1 | 4 |
| 735 | 0 | 3 | 1 | 10 | 8 | 0 | 4 | 3 | 3 | 5 | 8 | 3 | 0 | 6 |
| 736 | 9 | 10 | 11 | 7 | 6 | 8 | 3 | 6 | 2 | 10 | 5 | 10 | 10 | 2 |
| 737 | 3 | 7 | 1 | 11 | 3 | 9 | 9 | 3 | 1 | 9 | 1 | 0 | 7 | 2 |
| 738 | 7 | 10 | 5 | 2 | 3 | 3 | 8 | 6 | 8 | 1 | 2 | 2 | 3 | 6 |
| 739 | 11 | 9 | 7 | 4 | 6 | 5 | 8 | 8 | 5 | 6 | 7 | 10 | 2 | 0 |
| 740 | 9 | 1 | 3 | 8 | 10 | 7 | 0 | 1 | 2 | 5 | 0 | 0 | 9 | 2 |
| 741 | 3 | 0 | 1 | 3 | 0 | 11 | 2 | 5 | 0 | 11 | 3 | 11 | 3 | 11 |
| 742 | 0 | 4 | 6 | 11 | 5 | 3 | 5 | 1 | 10 | 11 | 10 | 11 | 7 | 11 |
| 743 | 3 | 1 | 9 | 0 | 4 | 10 | 4 | 0 | 11 | 6 | 10 | 7 | 11 | 0 |
| 744 | 5 | 8 | 4 | 9 | 11 | 2 | 0 | 5 | 5 | 9 | 8 | 9 | 10 | 10 |
| 745 | 11 | 1 | 2 | 1 | 8 | 4 | 11 | 9 | 5 | 0 | 3 | 3 | 11 | 0 |
| 746 | 3 | 1 | 5 | 7 | 5 | 6 | 8 | 7 | 9 | 5 | 4 | 4 | 8 | 9 |
| 747 | 2 | 0 | 9 | 6 | 8 | 1 | 10 | 5 | 2 | 10 | 8 | 6 | 9 | 2 |
| 748 | 1 | 9 | 3 | 6 | 7 | 11 | 3 | 0 | 8 | 10 | 11 | 5 | 6 | 7 |
| 749 | 11 | 11 | 2 | 4 | 2 | 10 | 4 | 10 | 6 | 9 | 2 | 7 | 4 | 8 |
| 750 | 9 | 3 | 11 | 3 | 1 | 2 | 2 | 4 | 11 | 10 | 3 | 0 | 11 | 7 |
| 751 | 9 | 5 | 8 | 4 | 0 | 4 | 0 | 9 | 10 | 1 | 8 | 4 | 1 | 7 |
| 752 | 4 | 2 | 1 | 5 | 7 | 4 | 4 | 11 | 11 | 10 | 1 | 8 | 2 | 0 |
| 753 | 3 | 8 | 3 | 9 | 6 | 3 | 7 | 5 | 4 | 4 | 7 | 0 | 6 | 2 |
| 754 | 11 | 2 | 1 | 8 | 5 | 0 | 1 | 10 | 8 | 5 | 6 | 10 | 5 | 5 |
| 755 | 2 | 7 | 4 | 1 | 5 | 0 | 3 | 8 | 3 | 1 | 1 | 7 | 10 | 4 |
| 756 | 6 | 8 | 4 | 11 | 4 | 1 | 2 | 6 | 4 | 1 | 10 | 10 | 3 | 8 |
| 757 | 9 | 0 | 5 | 10 | 0 | 8 | 4 | 8 | 10 | 3 | 4 | 3 | 7 | 2 |
| 758 | 0 | 3 | 8 | 5 | 3 | 9 | 0 | 10 | 5 | 9 | 5 | 6 | 1 | 11 |
| 759 | 4 | 1 | 6 | 0 | 1 | 2 | 2 | 1 | 10 | 0 | 5 | 4 | 1 | 1 |
| 760 | 0 | 10 | 6 | 1 | 11 | 2 | 4 | 0 | 9 | 11 | 5 | 2 | 6 | 0 |

Example #4 of a group-based CS hopping pattern

| m | $n_{cs}(n)$ | | | | | | | | | | | | | |
|---|---|---|---|---|---|---|---|---|---|---|---|---|---|---|
| 761 | 6 | 11 | 7 | 7 | 4 | 7 | 10 | 9 | 5 | 6 | 2 | 3 | 3 | 2 |
| 762 | 3 | 0 | 8 | 2 | 7 | 7 | 0 | 11 | 0 | 1 | 7 | 3 | 4 | 3 |
| 763 | 1 | 4 | 5 | 1 | 2 | 9 | 4 | 5 | 3 | 2 | 1 | 11 | 3 | 6 |
| 764 | 8 | 11 | 5 | 7 | 3 | 7 | 2 | 7 | 1 | 7 | 1 | 9 | 4 | 6 |
| 765 | 4 | 1 | 8 | 9 | 7 | 1 | 2 | 9 | 7 | 4 | 11 | 6 | 10 | 0 |
| 766 | 8 | 10 | 3 | 1 | 0 | 8 | 0 | 5 | 0 | 3 | 6 | 6 | 4 | 7 |
| 767 | 4 | 5 | 11 | 1 | 3 | 9 | 5 | 4 | 11 | 6 | 4 | 2 | 7 | 5 |
| 768 | 4 | 3 | 7 | 0 | 2 | 9 | 2 | 7 | 8 | 8 | 3 | 3 | 4 | 8 |
| 769 | 1 | 0 | 3 | 6 | 4 | 10 | 8 | 6 | 9 | 7 | 6 | 8 | 5 | 4 |
| 770 | 11 | 11 | 9 | 5 | 6 | 8 | 3 | 2 | 7 | 11 | 8 | 0 | 6 | 0 |
| 771 | 10 | 8 | 2 | 4 | 9 | 1 | 9 | 4 | 11 | 3 | 1 | 7 | 2 | 11 |
| 772 | 3 | 9 | 5 | 11 | 5 | 1 | 1 | 8 | 6 | 0 | 9 | 6 | 5 | 10 |
| 773 | 7 | 4 | 4 | 2 | 11 | 7 | 3 | 7 | 4 | 7 | 2 | 9 | 10 | 2 |
| 774 | 1 | 10 | 1 | 10 | 8 | 2 | 2 | 2 | 4 | 6 | 7 | 6 | 2 | 9 |
| 775 | 5 | 7 | 6 | 4 | 1 | 4 | 6 | 3 | 8 | 5 | 4 | 4 | 9 | 5 |
| 776 | 6 | 1 | 3 | 2 | 3 | 0 | 7 | 1 | 1 | 6 | 8 | 10 | 8 | 10 |
| 777 | 2 | 9 | 10 | 7 | 0 | 11 | 0 | 6 | 5 | 10 | 10 | 2 | 3 | 9 |
| 778 | 6 | 3 | 0 | 10 | 5 | 8 | 4 | 3 | 9 | 10 | 1 | 10 | 5 | 5 |
| 779 | 7 | 6 | 6 | 0 | 3 | 8 | 11 | 0 | 1 | 9 | 5 | 6 | 4 | 1 |
| 780 | 8 | 3 | 3 | 5 | 2 | 2 | 5 | 11 | 9 | 1 | 10 | 6 | 9 | 3 |
| 781 | 8 | 3 | 11 | 1 | 7 | 11 | 6 | 4 | 0 | 11 | 0 | 7 | 3 | 7 |
| 782 | 10 | 5 | 3 | 6 | 7 | 6 | 7 | 8 | 8 | 5 | 7 | 11 | 4 | 6 |
| 783 | 11 | 0 | 8 | 9 | 1 | 9 | 3 | 1 | 1 | 8 | 9 | 6 | 11 | 7 |
| 784 | 9 | 10 | 0 | 9 | 6 | 1 | 8 | 4 | 5 | 6 | 4 | 2 | 9 | 3 |
| 785 | 0 | 1 | 4 | 8 | 10 | 3 | 9 | 3 | 0 | 7 | 8 | 7 | 11 | 9 |
| 786 | 11 | 1 | 6 | 1 | 11 | 3 | 7 | 11 | 4 | 8 | 10 | 8 | 2 | 8 |
| 787 | 7 | 8 | 10 | 1 | 8 | 9 | 10 | 0 | 11 | 1 | 9 | 11 | 9 | 2 |
| 788 | 5 | 0 | 3 | 7 | 5 | 1 | 10 | 5 | 3 | 11 | 7 | 9 | 1 | 11 |
| 789 | 3 | 2 | 11 | 11 | 1 | 0 | 0 | 9 | 10 | 11 | 6 | 9 | 2 | 5 |
| 790 | 4 | 9 | 4 | 9 | 0 | 2 | 1 | 3 | 1 | 1 | 6 | 10 | 2 | 11 |
| 791 | 8 | 6 | 5 | 7 | 10 | 0 | 3 | 5 | 4 | 5 | 6 | 11 | 8 | 3 |
| 792 | 10 | 9 | 4 | 11 | 4 | 9 | 4 | 5 | 5 | 6 | 0 | 11 | 10 | 1 |
| 793 | 1 | 0 | 7 | 4 | 11 | 7 | 9 | 10 | 2 | 2 | 4 | 3 | 3 | 1 |
| 794 | 6 | 9 | 2 | 9 | 7 | 4 | 5 | 2 | 10 | 5 | 1 | 1 | 11 | 3 |
| 795 | 3 | 4 | 10 | 5 | 3 | 6 | 9 | 2 | 10 | 3 | 11 | 2 | 7 | 8 |
| 796 | 3 | 0 | 6 | 4 | 0 | 1 | 11 | 9 | 5 | 7 | 3 | 0 | 0 | 6 |
| 797 | 8 | 7 | 1 | 5 | 9 | 5 | 6 | 0 | 2 | 4 | 9 | 10 | 11 | 8 |
| 798 | 4 | 11 | 10 | 2 | 7 | 3 | 0 | 1 | 3 | 3 | 0 | 5 | 4 | 4 |
| 799 | 5 | 9 | 8 | 7 | 11 | 10 | 8 | 0 | 4 | 1 | 0 | 3 | 7 | 0 |
| 800 | 3 | 1 | 8 | 2 | 4 | 6 | 10 | 10 | 3 | 8 | 5 | 1 | 5 | 9 |
| 801 | 2 | 5 | 1 | 9 | 8 | 10 | 4 | 7 | 9 | 11 | 11 | 0 | 8 | 8 |
| 802 | 4 | 2 | 11 | 8 | 0 | 6 | 8 | 2 | 11 | 6 | 2 | 4 | 5 | 10 |
| 803 | 6 | 4 | 3 | 4 | 5 | 6 | 1 | 6 | 5 | 4 | 0 | 7 | 6 | 3 |
| 804 | 0 | 10 | 9 | 7 | 9 | 8 | 5 | 7 | 6 | 8 | 7 | 7 | 10 | 7 |
| 805 | 11 | 6 | 5 | 6 | 4 | 3 | 8 | 9 | 2 | 4 | 11 | 4 | 11 | 2 |
| 806 | 6 | 3 | 3 | 3 | 4 | 4 | 7 | 6 | 3 | 5 | 11 | 6 | 2 | 5 |
| 807 | 1 | 5 | 7 | 8 | 7 | 7 | 6 | 9 | 0 | 3 | 9 | 11 | 11 | 2 |
| 808 | 11 | 11 | 8 | 1 | 10 | 11 | 8 | 7 | 11 | 6 | 0 | 5 | 10 | 9 |
| 809 | 4 | 0 | 11 | 1 | 8 | 4 | 9 | 11 | 6 | 8 | 3 | 5 | 10 | 3 |
| 810 | 10 | 6 | 0 | 6 | 9 | 3 | 10 | 8 | 6 | 10 | 0 | 5 | 7 | 9 |
| 811 | 10 | 7 | 0 | 11 | 11 | 7 | 10 | 7 | 5 | 4 | 3 | 2 | 3 | 5 |
| 812 | 9 | 7 | 1 | 9 | 7 | 1 | 5 | 10 | 11 | 9 | 11 | 8 | 4 | 11 |
| 813 | 1 | 3 | 0 | 3 | 6 | 9 | 9 | 0 | 1 | 2 | 7 | 1 | 11 | 2 |
| 814 | 9 | 2 | 1 | 5 | 9 | 9 | 10 | 3 | 4 | 7 | 10 | 2 | 3 | 11 |
| 815 | 11 | 2 | 11 | 5 | 4 | 7 | 5 | 4 | 0 | 10 | 3 | 1 | 2 | 8 |
| 816 | 8 | 7 | 10 | 8 | 10 | 3 | 2 | 10 | 8 | 11 | 7 | 8 | 7 | 7 |
| 817 | 0 | 4 | 4 | 3 | 0 | 1 | 5 | 9 | 9 | 2 | 4 | 2 | 1 | 5 |
| 818 | 3 | 6 | 3 | 3 | 9 | 3 | 1 | 1 | 4 | 2 | 8 | 1 | 5 | 4 |
| 819 | 3 | 9 | 0 | 3 | 2 | 0 | 5 | 0 | 8 | 9 | 2 | 10 | 5 | 8 |
| 820 | 6 | 5 | 10 | 6 | 2 | 6 | 6 | 10 | 3 | 10 | 6 | 3 | 7 | 1 |
| 821 | 9 | 3 | 5 | 5 | 6 | 10 | 0 | 5 | 2 | 1 | 4 | 10 | 8 | 4 |
| 822 | 7 | 1 | 6 | 2 | 7 | 10 | 0 | 10 | 10 | 2 | 11 | 2 | 8 | 7 |
| 823 | 4 | 6 | 10 | 2 | 8 | 11 | 5 | 7 | 0 | 6 | 6 | 7 | 6 | 11 |
| 824 | 3 | 3 | 10 | 2 | 1 | 6 | 11 | 8 | 6 | 1 | 2 | 8 | 0 | 0 |
| 825 | 2 | 8 | 1 | 5 | 8 | 5 | 7 | 2 | 5 | 2 | 8 | 4 | 1 | 11 |
| 826 | 9 | 2 | 1 | 6 | 5 | 7 | 2 | 7 | 7 | 9 | 4 | 10 | 9 | 1 |
| 827 | 0 | 11 | 8 | 7 | 9 | 2 | 4 | 3 | 7 | 11 | 3 | 3 | 2 | 9 |
| 828 | 0 | 8 | 6 | 1 | 2 | 8 | 11 | 1 | 7 | 4 | 1 | 8 | 8 | 0 |
| 829 | 4 | 2 | 2 | 4 | 3 | 9 | 11 | 10 | 3 | 0 | 5 | 3 | 8 | 3 |
| 830 | 8 | 2 | 10 | 1 | 4 | 4 | 0 | 6 | 11 | 2 | 4 | 9 | 11 | 10 |
| 831 | 6 | 0 | 1 | 0 | 1 | 1 | 8 | 0 | 1 | 7 | 1 | 7 | 8 | 3 |
| 832 | 11 | 1 | 5 | 4 | 3 | 9 | 4 | 11 | 11 | 6 | 11 | 1 | 1 | 11 |
| 833 | 9 | 7 | 7 | 7 | 6 | 0 | 1 | 11 | 4 | 10 | 8 | 7 | 0 | 8 |
| 834 | 8 | 0 | 5 | 7 | 6 | 2 | 11 | 3 | 8 | 8 | 1 | 7 | 5 | 11 |
| 835 | 10 | 0 | 7 | 1 | 11 | 5 | 7 | 7 | 0 | 10 | 1 | 9 | 6 | 10 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 836 | 5 | 11 | 6 | 1 | 0 | 0 | 2 | 10 | 6 | 9 | 5 | 0 | 11 | 9 |
| 837 | 4 | 11 | 1 | 0 | 2 | 5 | 7 | 11 | 11 | 4 | 2 | 2 | 0 | 4 |
| 838 | 4 | 8 | 2 | 11 | 8 | 0 | 1 | 2 | 4 | 8 | 0 | 10 | 6 | 5 |
| 839 | 6 | 10 | 8 | 3 | 10 | 1 | 11 | 6 | 2 | 3 | 1 | 3 | 6 | 2 |
| 840 | 0 | 0 | 1 | 7 | 2 | 7 | 5 | 4 | 7 | 3 | 6 | 9 | 0 | 10 |
| 841 | 1 | 6 | 4 | 0 | 5 | 4 | 3 | 0 | 5 | 2 | 6 | 2 | 3 | 0 |
| 842 | 5 | 9 | 9 | 5 | 2 | 3 | 4 | 7 | 5 | 8 | 10 | 9 | 0 | 4 |
| 843 | 2 | 7 | 6 | 5 | 4 | 1 | 1 | 7 | 0 | 9 | 7 | 10 | 6 | 0 |
| 844 | 3 | 1 | 10 | 0 | 9 | 7 | 3 | 3 | 9 | 6 | 9 | 11 | 7 | 6 |
| 845 | 3 | 7 | 8 | 9 | 11 | 11 | 0 | 3 | 6 | 5 | 9 | 0 | 4 | 9 |
| 846 | 0 | 3 | 7 | 7 | 7 | 3 | 4 | 2 | 1 | 8 | 2 | 5 | 6 | 11 |
| 847 | 7 | 7 | 1 | 3 | 7 | 9 | 4 | 5 | 1 | 0 | 3 | 7 | 1 | 7 |
| 848 | 11 | 0 | 0 | 1 | 9 | 0 | 3 | 5 | 7 | 0 | 1 | 4 | 1 | 1 |
| 849 | 5 | 4 | 5 | 3 | 11 | 5 | 4 | 8 | 3 | 1 | 7 | 5 | 2 | 8 |
| 850 | 4 | 0 | 9 | 9 | 5 | 3 | 0 | 4 | 6 | 11 | 8 | 4 | 8 | 7 |
| 851 | 9 | 5 | 11 | 6 | 5 | 0 | 1 | 2 | 3 | 2 | 11 | 6 | 10 | 0 |
| 852 | 9 | 7 | 9 | 4 | 8 | 6 | 3 | 6 | 9 | 9 | 10 | 1 | 8 | 9 |
| 853 | 9 | 9 | 2 | 8 | 1 | 4 | 4 | 1 | 9 | 6 | 9 | 4 | 4 | 11 |
| 854 | 10 | 0 | 9 | 10 | 9 | 4 | 5 | 1 | 3 | 2 | 5 | 0 | 6 | 1 |
| 855 | 0 | 6 | 5 | 1 | 1 | 8 | 8 | 7 | 10 | 7 | 10 | 9 | 3 | 1 |
| 856 | 3 | 8 | 10 | 6 | 11 | 7 | 5 | 6 | 10 | 4 | 7 | 4 | 2 | 7 |
| 857 | 2 | 2 | 4 | 3 | 7 | 1 | 0 | 1 | 8 | 5 | 3 | 3 | 0 | 11 |
| 858 | 5 | 11 | 10 | 11 | 2 | 9 | 3 | 9 | 9 | 10 | 0 | 1 | 1 | 8 |
| 859 | 2 | 8 | 0 | 9 | 5 | 10 | 2 | 4 | 10 | 5 | 3 | 10 | 7 | 10 |
| 860 | 0 | 8 | 11 | 6 | 10 | 9 | 0 | 11 | 4 | 4 | 10 | 3 | 10 | 6 |
| 861 | 3 | 5 | 5 | 10 | 1 | 6 | 9 | 0 | 0 | 9 | 5 | 5 | 9 | 6 |
| 862 | 10 | 10 | 11 | 5 | 2 | 0 | 6 | 11 | 1 | 3 | 1 | 10 | 1 | 9 |
| 863 | 10 | 4 | 6 | 0 | 4 | 11 | 1 | 9 | 3 | 8 | 1 | 2 | 9 | 11 |
| 864 | 1 | 2 | 2 | 10 | 3 | 1 | 7 | 3 | 7 | 8 | 0 | 5 | 5 | 0 |
| 865 | 7 | 4 | 11 | 11 | 3 | 4 | 9 | 1 | 11 | 7 | 0 | 10 | 0 | 0 |
| 866 | 8 | 11 | 8 | 5 | 5 | 9 | 2 | 3 | 11 | 5 | 8 | 4 | 5 | 1 |
| 867 | 6 | 3 | 7 | 11 | 4 | 3 | 1 | 8 | 11 | 10 | 6 | 11 | 4 | 0 |
| 868 | 6 | 4 | 6 | 8 | 9 | 11 | 9 | 2 | 8 | 2 | 7 | 5 | 10 | 6 |
| 869 | 1 | 3 | 8 | 1 | 5 | 7 | 2 | 5 | 6 | 6 | 2 | 11 | 4 | 11 |
| 870 | 1 | 5 | 3 | 7 | 6 | 10 | 7 | 9 | 11 | 4 | 1 | 1 | 7 | 1 |
| 871 | 7 | 6 | 7 | 4 | 8 | 7 | 5 | 6 | 7 | 11 | 9 | 5 | 4 | 3 |
| 872 | 2 | 9 | 9 | 9 | 10 | 0 | 7 | 10 | 7 | 1 | 4 | 6 | 4 | 7 |
| 873 | 4 | 4 | 6 | 10 | 6 | 7 | 0 | 4 | 10 | 7 | 1 | 7 | 11 | 4 |
| 874 | 11 | 4 | 4 | 0 | 5 | 5 | 9 | 10 | 0 | 11 | 1 | 1 | 1 | 7 |
| 875 | 11 | 8 | 4 | 10 | 6 | 11 | 7 | 0 | 2 | 3 | 6 | 5 | 2 | 7 |
| 876 | 8 | 4 | 9 | 4 | 5 | 4 | 4 | 0 | 0 | 5 | 2 | 5 | 10 | 10 |
| 877 | 2 | 5 | 6 | 8 | 8 | 0 | 5 | 4 | 1 | 7 | 5 | 8 | 6 | 2 |
| 878 | 3 | 11 | 10 | 9 | 3 | 2 | 6 | 11 | 8 | 2 | 9 | 7 | 2 | 10 |
| 879 | 5 | 5 | 11 | 2 | 10 | 9 | 4 | 10 | 11 | 3 | 1 | 9 | 9 | 7 |
| 880 | 2 | 4 | 0 | 6 | 1 | 8 | 10 | 3 | 2 | 9 | 2 | 0 | 6 | 1 |
| 881 | 3 | 0 | 0 | 4 | 8 | 2 | 2 | 8 | 10 | 8 | 8 | 2 | 6 | 0 |
| 882 | 6 | 4 | 9 | 10 | 10 | 10 | 3 | 1 | 5 | 11 | 10 | 5 | 4 | 2 |
| 883 | 9 | 8 | 9 | 2 | 0 | 9 | 8 | 9 | 11 | 7 | 8 | 3 | 4 | 0 |
| 884 | 6 | 7 | 9 | 0 | 11 | 9 | 5 | 4 | 8 | 6 | 1 | 11 | 6 | 0 |
| 885 | 9 | 9 | 9 | 0 | 3 | 7 | 0 | 11 | 8 | 7 | 6 | 1 | 0 | 3 |
| 886 | 5 | 5 | 5 | 0 | 1 | 10 | 3 | 11 | 10 | 3 | 8 | 6 | 5 | 4 |
| 887 | 11 | 7 | 7 | 8 | 10 | 0 | 11 | 5 | 9 | 3 | 4 | 0 | 2 | 4 |
| 888 | 0 | 2 | 0 | 7 | 5 | 4 | 6 | 5 | 0 | 6 | 1 | 0 | 6 | 3 |
| 889 | 5 | 8 | 4 | 7 | 1 | 9 | 10 | 4 | 7 | 2 | 5 | 2 | 2 | 8 |
| 890 | 0 | 9 | 7 | 0 | 8 | 1 | 6 | 6 | 2 | 2 | 6 | 6 | 7 | 11 |
| 891 | 2 | 2 | 11 | 6 | 1 | 6 | 4 | 4 | 9 | 3 | 10 | 7 | 0 | 3 |
| 892 | 11 | 3 | 6 | 3 | 3 | 2 | 3 | 7 | 0 | 0 | 9 | 11 | 5 | 11 |
| 893 | 6 | 5 | 1 | 4 | 2 | 11 | 4 | 1 | 7 | 9 | 0 | 11 | 3 | 4 |
| 894 | 7 | 4 | 9 | 1 | 4 | 7 | 0 | 3 | 2 | 4 | 10 | 6 | 9 | 8 |
| 895 | 0 | 2 | 10 | 1 | 6 | 7 | 8 | 0 | 7 | 0 | 2 | 1 | 7 | 5 |
| 896 | 2 | 6 | 4 | 8 | 10 | 7 | 8 | 8 | 3 | 4 | 9 | 8 | 9 | 6 |
| 897 | 11 | 8 | 5 | 9 | 4 | 0 | 10 | 7 | 6 | 1 | 10 | 0 | 0 | 5 |
| 898 | 1 | 3 | 2 | 5 | 0 | 5 | 3 | 8 | 1 | 5 | 8 | 9 | 3 | 6 |
| 899 | 0 | 1 | 11 | 5 | 9 | 2 | 10 | 6 | 0 | 5 | 2 | 11 | 4 | 2 |
| 900 | 0 | 11 | 0 | 3 | 0 | 10 | 7 | 1 | 11 | 10 | 6 | 7 | 3 | 6 |
| 901 | 0 | 11 | 2 | 9 | 8 | 0 | 10 | 8 | 3 | 7 | 4 | 2 | 10 | 1 |
| 902 | 2 | 9 | 11 | 0 | 10 | 9 | 8 | 3 | 6 | 8 | 7 | 11 | 5 | 4 |
| 903 | 9 | 9 | 3 | 1 | 4 | 6 | 5 | 9 | 6 | 11 | 1 | 6 | 3 | 2 |
| 904 | 4 | 11 | 9 | 8 | 10 | 7 | 7 | 5 | 8 | 2 | 10 | 10 | 8 | 5 |
| 905 | 11 | 5 | 8 | 4 | 10 | 8 | 5 | 11 | 8 | 10 | 7 | 0 | 8 | 10 |
| 906 | 1 | 11 | 10 | 11 | 0 | 5 | 10 | 5 | 6 | 4 | 10 | 6 | 10 | 2 |
| 907 | 8 | 1 | 3 | 0 | 0 | 4 | 5 | 8 | 8 | 8 | 2 | 4 | 11 | 4 |
| 908 | 10 | 3 | 5 | 9 | 8 | 1 | 11 | 4 | 8 | 10 | 6 | 5 | 1 | 6 |
| 909 | 1 | 9 | 10 | 8 | 0 | 9 | 6 | 11 | 10 | 0 | 4 | 8 | 6 | 3 |
| 910 | 2 | 5 | 2 | 11 | 9 | 7 | 8 | 3 | 5 | 0 | 6 | 4 | 11 | 10 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 911 | 10 | 5 | 10 | 5 | 5 | 2 | 11 | 5 | 4 | 4 | 11 | 7 | 4 | 5 |
| 912 | 7 | 5 | 4 | 5 | 9 | 8 | 3 | 11 | 3 | 6 | 3 | 3 | 1 | 3 |
| 913 | 10 | 9 | 0 | 2 | 7 | 6 | 6 | 5 | 11 | 10 | 2 | 1 | 8 | 5 |
| 914 | 8 | 1 | 7 | 7 | 1 | 7 | 5 | 10 | 5 | 10 | 11 | 10 | 1 | 5 |
| 915 | 10 | 2 | 2 | 10 | 8 | 5 | 3 | 5 | 10 | 7 | 9 | 1 | 0 | 10 |
| 916 | 9 | 10 | 7 | 9 | 1 | 4 | 6 | 9 | 1 | 4 | 6 | 8 | 8 | 4 |
| 917 | 0 | 11 | 2 | 3 | 1 | 8 | 6 | 4 | 2 | 1 | 8 | 11 | 9 | 3 |
| 918 | 2 | 1 | 3 | 3 | 1 | 11 | 0 | 2 | 1 | 0 | 7 | 8 | 5 | 5 |
| 919 | 2 | 0 | 7 | 10 | 2 | 4 | 3 | 5 | 8 | 11 | 11 | 10 | 3 | 3 |
| 920 | 9 | 11 | 8 | 8 | 4 | 10 | 6 | 2 | 5 | 10 | 3 | 8 | 0 | 7 |
| 921 | 4 | 1 | 6 | 4 | 8 | 8 | 9 | 7 | 7 | 1 | 4 | 9 | 7 | 9 |
| 922 | 2 | 8 | 1 | 4 | 7 | 4 | 8 | 9 | 3 | 8 | 6 | 7 | 10 | 2 |
| 923 | 1 | 6 | 8 | 11 | 7 | 9 | 0 | 4 | 8 | 4 | 2 | 7 | 7 | 5 |
| 924 | 3 | 1 | 4 | 3 | 2 | 10 | 10 | 9 | 6 | 6 | 11 | 3 | 10 | 10 |
| 925 | 10 | 7 | 7 | 3 | 4 | 8 | 3 | 10 | 6 | 8 | 2 | 9 | 1 | 0 |
| 926 | 7 | 8 | 3 | 9 | 1 | 10 | 5 | 8 | 0 | 9 | 0 | 11 | 10 | 9 |
| 927 | 9 | 2 | 1 | 4 | 11 | 0 | 1 | 0 | 2 | 11 | 3 | 1 | 1 | 10 |
| 928 | 0 | 11 | 10 | 8 | 3 | 0 | 7 | 7 | 5 | 0 | 1 | 3 | 9 | 0 |
| 929 | 6 | 9 | 5 | 8 | 6 | 1 | 9 | 7 | 4 | 4 | 8 | 10 | 2 | 2 |
| 930 | 8 | 3 | 9 | 8 | 0 | 1 | 10 | 3 | 10 | 6 | 9 | 3 | 9 | 1 |
| 931 | 5 | 4 | 7 | 2 | 0 | 2 | 9 | 11 | 2 | 1 | 0 | 9 | 4 | 5 |
| 932 | 1 | 8 | 8 | 9 | 7 | 2 | 6 | 1 | 5 | 0 | 10 | 1 | 5 | 8 |
| 933 | 0 | 2 | 6 | 10 | 11 | 10 | 3 | 8 | 7 | 5 | 5 | 7 | 1 | 3 |
| 934 | 3 | 5 | 1 | 1 | 0 | 4 | 6 | 2 | 6 | 0 | 10 | 10 | 1 | 5 |
| 935 | 5 | 7 | 3 | 2 | 5 | 5 | 8 | 4 | 10 | 1 | 2 | 0 | 8 | 9 |
| 936 | 2 | 0 | 3 | 0 | 0 | 6 | 9 | 1 | 9 | 6 | 7 | 1 | 3 | 0 |
| 937 | 10 | 4 | 6 | 11 | 8 | 2 | 9 | 10 | 1 | 3 | 2 | 0 | 3 | 4 |
| 938 | 9 | 7 | 8 | 8 | 2 | 8 | 1 | 0 | 0 | 4 | 10 | 2 | 5 | 3 |
| 939 | 7 | 10 | 6 | 10 | 4 | 9 | 6 | 1 | 9 | 10 | 8 | 3 | 9 | 6 |
| 940 | 5 | 3 | 4 | 10 | 2 | 5 | 11 | 2 | 1 | 3 | 0 | 0 | 0 | 2 |
| 941 | 3 | 2 | 11 | 2 | 6 | 10 | 9 | 7 | 7 | 6 | 9 | 6 | 8 | 0 |
| 942 | 10 | 10 | 5 | 9 | 3 | 9 | 7 | 5 | 2 | 7 | 10 | 6 | 5 | 9 |
| 943 | 11 | 10 | 6 | 7 | 11 | 1 | 6 | 6 | 10 | 6 | 5 | 9 | 5 | 9 |
| 944 | 2 | 10 | 8 | 2 | 1 | 10 | 5 | 0 | 8 | 2 | 3 | 5 | 2 | 1 |
| 945 | 4 | 5 | 0 | 10 | 9 | 10 | 0 | 6 | 2 | 4 | 8 | 0 | 4 | 0 |
| 946 | 2 | 0 | 2 | 3 | 7 | 6 | 2 | 11 | 7 | 1 | 0 | 0 | 7 | 8 |
| 947 | 10 | 3 | 10 | 10 | 10 | 6 | 10 | 4 | 5 | 7 | 11 | 11 | 6 | 7 |
| 948 | 11 | 6 | 8 | 3 | 0 | 11 | 2 | 8 | 6 | 7 | 11 | 10 | 8 | 8 |
| 949 | 4 | 10 | 2 | 3 | 5 | 11 | 6 | 3 | 11 | 4 | 4 | 1 | 1 | 0 |
| 950 | 4 | 10 | 8 | 4 | 9 | 4 | 10 | 10 | 5 | 9 | 3 | 10 | 9 | 2 |
| 951 | 8 | 10 | 1 | 2 | 6 | 8 | 1 | 7 | 3 | 10 | 0 | 2 | 2 | 10 |
| 952 | 5 | 2 | 7 | 5 | 9 | 11 | 1 | 10 | 6 | 4 | 1 | 11 | 6 | 5 |
| 953 | 8 | 8 | 2 | 0 | 4 | 4 | 11 | 9 | 0 | 6 | 7 | 8 | 1 | 9 |
| 954 | 2 | 6 | 6 | 11 | 5 | 6 | 8 | 6 | 6 | 3 | 3 | 9 | 4 | 7 |
| 955 | 7 | 11 | 3 | 5 | 10 | 2 | 1 | 5 | 2 | 7 | 5 | 2 | 6 | 10 |
| 956 | 5 | 4 | 2 | 1 | 2 | 1 | 5 | 6 | 11 | 5 | 5 | 6 | 10 | 6 |
| 957 | 3 | 8 | 5 | 0 | 0 | 3 | 4 | 2 | 8 | 5 | 0 | 2 | 9 | 3 |
| 958 | 9 | 3 | 3 | 8 | 4 | 11 | 9 | 3 | 7 | 3 | 10 | 0 | 7 | 0 |
| 959 | 0 | 11 | 3 | 1 | 9 | 10 | 2 | 11 | 9 | 8 | 11 | 9 | 0 | 11 |
| 960 | 8 | 7 | 3 | 8 | 7 | 8 | 0 | 1 | 7 | 0 | 11 | 10 | 6 | 1 |
| 961 | 1 | 7 | 4 | 7 | 8 | 3 | 11 | 8 | 9 | 11 | 0 | 9 | 5 | 1 |
| 962 | 4 | 1 | 6 | 6 | 5 | 5 | 11 | 4 | 11 | 10 | 9 | 6 | 3 | 5 |
| 963 | 6 | 11 | 5 | 11 | 8 | 4 | 2 | 5 | 0 | 3 | 6 | 3 | 0 | 5 |
| 964 | 9 | 4 | 1 | 7 | 11 | 1 | 8 | 1 | 6 | 2 | 7 | 4 | 0 | 1 |
| 965 | 2 | 8 | 7 | 1 | 1 | 3 | 10 | 6 | 0 | 6 | 11 | 6 | 5 | 7 |
| 966 | 3 | 1 | 0 | 11 | 6 | 8 | 4 | 2 | 4 | 1 | 6 | 11 | 1 | 10 |
| 967 | 1 | 5 | 1 | 2 | 11 | 3 | 10 | 8 | 5 | 5 | 4 | 4 | 6 | 2 |
| 968 | 1 | 2 | 6 | 9 | 8 | 9 | 5 | 6 | 6 | 6 | 8 | 2 | 0 | 8 |
| 969 | 7 | 7 | 11 | 10 | 6 | 5 | 6 | 8 | 4 | 2 | 6 | 1 | 4 | 5 |
| 970 | 11 | 11 | 1 | 8 | 2 | 3 | 1 | 5 | 6 | 1 | 7 | 1 | 11 | 0 |
| 971 | 1 | 2 | 0 | 4 | 10 | 6 | 4 | 5 | 5 | 5 | 9 | 6 | 1 | 6 |
| 972 | 4 | 0 | 7 | 2 | 10 | 7 | 5 | 0 | 3 | 7 | 8 | 6 | 7 | 8 |
| 973 | 0 | 7 | 0 | 0 | 6 | 1 | 2 | 11 | 3 | 5 | 2 | 3 | 5 | 0 |
| 974 | 5 | 6 | 8 | 10 | 3 | 9 | 4 | 6 | 0 | 9 | 9 | 8 | 2 | 0 |
| 975 | 8 | 0 | 9 | 2 | 5 | 11 | 1 | 2 | 2 | 3 | 1 | 8 | 3 | 8 |
| 976 | 7 | 4 | 9 | 6 | 10 | 8 | 11 | 2 | 3 | 0 | 4 | 9 | 5 | 11 |
| 977 | 0 | 11 | 4 | 6 | 4 | 10 | 1 | 9 | 1 | 9 | 10 | 0 | 4 | 3 |
| 978 | 5 | 6 | 7 | 11 | 5 | 8 | 10 | 11 | 9 | 8 | 6 | 3 | 6 | 2 |
| 979 | 8 | 2 | 7 | 4 | 1 | 0 | 7 | 2 | 8 | 7 | 1 | 6 | 0 | 1 |
| 980 | 1 | 2 | 9 | 11 | 2 | 6 | 11 | 4 | 2 | 10 | 5 | 10 | 5 | 7 |
| 981 | 5 | 9 | 9 | 7 | 7 | 5 | 1 | 9 | 8 | 4 | 5 | 4 | 1 | 10 |
| 982 | 7 | 11 | 10 | 10 | 8 | 0 | 8 | 3 | 8 | 4 | 3 | 1 | 3 | 11 |
| 983 | 4 | 8 | 9 | 1 | 3 | 2 | 0 | 7 | 5 | 2 | 11 | 5 | 7 | 1 |
| 984 | 9 | 9 | 4 | 11 | 10 | 10 | 5 | 1 | 0 | 0 | 6 | 8 | 1 | 8 |
| 985 | 7 | 0 | 1 | 8 | 3 | 11 | 5 | 6 | 2 | 5 | 4 | 0 | 1 | 11 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 986 | 6 | 10 | 11 | 3 | 1 | 9 | 1 | 10 | 0 | 1 | 2 | 10 | 10 | 4 |
| 987 | 9 | 8 | 5 | 7 | 9 | 1 | 2 | 8 | 1 | 9 | 3 | 2 | 8 | 5 |
| 988 | 8 | 0 | 0 | 0 | 6 | 6 | 7 | 9 | 6 | 0 | 8 | 10 | 9 | 6 |
| 989 | 8 | 1 | 11 | 10 | 7 | 6 | 3 | 7 | 4 | 10 | 3 | 6 | 9 | 1 |
| 990 | 8 | 9 | 4 | 2 | 3 | 10 | 11 | 9 | 5 | 3 | 9 | 2 | 6 | 4 |
| 991 | 3 | 4 | 2 | 5 | 9 | 10 | 2 | 1 | 7 | 7 | 7 | 3 | 6 | 7 |
| 992 | 3 | 0 | 6 | 1 | 4 | 10 | 4 | 11 | 3 | 11 | 4 | 10 | 4 | 7 |
| 993 | 8 | 6 | 6 | 11 | 11 | 1 | 4 | 3 | 8 | 11 | 0 | 1 | 0 | 2 |
| 994 | 9 | 10 | 5 | 3 | 6 | 7 | 9 | 1 | 3 | 11 | 2 | 9 | 0 | 9 |
| 995 | 9 | 1 | 0 | 5 | 5 | 6 | 0 | 8 | 0 | 2 | 9 | 5 | 11 | 11 |
| 996 | 2 | 2 | 9 | 1 | 2 | 11 | 9 | 6 | 3 | 7 | 2 | 0 | 9 | 2 |
| 997 | 4 | 2 | 2 | 9 | 11 | 3 | 3 | 11 | 8 | 4 | 0 | 11 | 11 | 6 |
| 998 | 9 | 3 | 2 | 1 | 9 | 2 | 11 | 0 | 2 | 8 | 0 | 3 | 9 | 6 |
| 999 | 9 | 11 | 11 | 10 | 11 | 6 | 0 | 10 | 10 | 3 | 2 | 1 | 6 | 6 |
| 1000 | 0 | 3 | 0 | 6 | 4 | 2 | 6 | 6 | 8 | 4 | 0 | 10 | 0 | 1 |
| 1001 | 4 | 3 | 1 | 6 | 3 | 6 | 9 | 7 | 2 | 7 | 6 | 4 | 2 | 5 |
| 1002 | 11 | 9 | 0 | 2 | 11 | 2 | 0 | 9 | 9 | 9 | 11 | 7 | 2 | 9 |
| 1003 | 10 | 8 | 1 | 3 | 0 | 11 | 11 | 3 | 4 | 0 | 5 | 6 | 6 | 4 |
| 1004 | 1 | 3 | 10 | 6 | 11 | 4 | 2 | 3 | 4 | 3 | 11 | 9 | 9 | 3 |
| 1005 | 6 | 11 | 4 | 5 | 0 | 11 | 10 | 11 | 7 | 1 | 9 | 8 | 8 | 9 |
| 1006 | 7 | 1 | 3 | 2 | 0 | 3 | 3 | 5 | 5 | 11 | 6 | 3 | 9 | 9 |
| 1007 | 7 | 7 | 7 | 4 | 2 | 3 | 4 | 3 | 10 | 6 | 1 | 8 | 11 | 10 |
| 1008 | 9 | 4 | 5 | 0 | 10 | 2 | 2 | 6 | 3 | 6 | 9 | 10 | 11 | 2 |
| 1009 | 9 | 11 | 0 | 8 | 7 | 1 | 4 | 6 | 8 | 0 | 5 | 11 | 2 | 8 |
| 1010 | 1 | 1 | 8 | 10 | 10 | 5 | 10 | 6 | 10 | 1 | 3 | 9 | 1 | 8 |
| 1011 | 1 | 9 | 6 | 5 | 9 | 2 | 0 | 7 | 7 | 6 | 1 | 0 | 10 | 10 |
| 1012 | 0 | 6 | 2 | 6 | 11 | 1 | 1 | 4 | 6 | 6 | 6 | 8 | 11 | 8 |
| 1013 | 5 | 0 | 3 | 5 | 8 | 10 | 4 | 10 | 8 | 5 | 9 | 3 | 11 | 2 |
| 1014 | 3 | 7 | 5 | 6 | 6 | 8 | 5 | 4 | 5 | 11 | 11 | 6 | 7 | 4 |
| 1015 | 4 | 6 | 4 | 11 | 3 | 11 | 3 | 4 | 4 | 10 | 7 | 0 | 4 | 4 |
| 1016 | 4 | 8 | 3 | 4 | 8 | 3 | 6 | 10 | 10 | 10 | 7 | 6 | 10 | 6 |
| 1017 | 6 | 10 | 5 | 4 | 7 | 6 | 3 | 5 | 8 | 0 | 4 | 8 | 11 | 11 |
| 1018 | 1 | 7 | 9 | 6 | 3 | 7 | 6 | 1 | 11 | 5 | 1 | 3 | 1 | 10 |
| 1019 | 9 | 4 | 2 | 11 | 2 | 7 | 6 | 10 | 2 | 6 | 11 | 2 | 6 | 0 |
| 1020 | 3 | 9 | 9 | 10 | 4 | 5 | 2 | 2 | 2 | 0 | 3 | 1 | 10 | 4 |
| 1021 | 2 | 10 | 0 | 0 | 11 | 3 | 7 | 6 | 8 | 10 | 9 | 3 | 8 | 4 |
| 1022 | 1 | 9 | 11 | 4 | 6 | 4 | 6 | 10 | 9 | 4 | 11 | 5 | 1 | 8 |
| 1023 | 7 | 6 | 10 | 9 | 9 | 4 | 7 | 5 | 10 | 6 | 2 | 5 | 3 | 4 |
| 1024 | 3 | 3 | 4 | 1 | 8 | 5 | 10 | 2 | 2 | 10 | 5 | 10 | 7 | 7 |
| 1025 | 9 | 10 | 9 | 9 | 6 | 9 | 11 | 4 | 4 | 11 | 11 | 11 | 6 | 1 |
| 1026 | 11 | 6 | 0 | 2 | 10 | 4 | 1 | 7 | 8 | 4 | 1 | 9 | 4 | 9 |
| 1027 | 2 | 2 | 5 | 4 | 11 | 6 | 7 | 11 | 0 | 1 | 2 | 4 | 11 | 10 |
| 1028 | 10 | 9 | 2 | 0 | 7 | 0 | 8 | 10 | 9 | 6 | 10 | 3 | 1 | 5 |
| 1029 | 2 | 10 | 8 | 11 | 10 | 2 | 9 | 9 | 2 | 8 | 6 | 5 | 1 | 0 |
| 1030 | 0 | 7 | 10 | 5 | 10 | 5 | 4 | 8 | 10 | 1 | 4 | 7 | 3 | 4 |
| 1031 | 5 | 3 | 7 | 7 | 6 | 6 | 2 | 3 | 1 | 2 | 1 | 2 | 3 | 0 |
| 1032 | 4 | 0 | 1 | 3 | 9 | 8 | 3 | 5 | 1 | 5 | 11 | 1 | 10 | 3 |
| 1033 | 6 | 10 | 4 | 4 | 2 | 0 | 2 | 1 | 3 | 9 | 4 | 1 | 9 | 9 |
| 1034 | 6 | 1 | 10 | 0 | 1 | 1 | 11 | 3 | 6 | 5 | 7 | 10 | 5 | 10 |
| 1035 | 0 | 11 | 11 | 10 | 2 | 7 | 10 | 5 | 5 | 2 | 6 | 3 | 4 | 7 |
| 1036 | 9 | 4 | 10 | 10 | 1 | 3 | 0 | 7 | 5 | 1 | 5 | 6 | 2 | 9 |
| 1037 | 2 | 0 | 10 | 7 | 0 | 7 | 8 | 0 | 8 | 0 | 1 | 0 | 10 | 6 |
| 1038 | 6 | 0 | 0 | 1 | 11 | 7 | 7 | 1 | 7 | 7 | 9 | 10 | 6 | 2 |
| 1039 | 9 | 8 | 4 | 10 | 9 | 1 | 5 | 6 | 9 | 6 | 7 | 4 | 0 | 2 |
| 1040 | 7 | 5 | 2 | 9 | 5 | 2 | 2 | 10 | 3 | 0 | 1 | 10 | 7 | 1 |
| 1041 | 5 | 1 | 7 | 4 | 11 | 8 | 6 | 9 | 11 | 4 | 9 | 0 | 5 | 5 |
| 1042 | 3 | 11 | 6 | 2 | 1 | 0 | 2 | 8 | 8 | 0 | 11 | 5 | 6 | 8 |
| 1043 | 4 | 3 | 1 | 8 | 10 | 11 | 9 | 11 | 9 | 4 | 0 | 8 | 3 | 2 |
| 1044 | 7 | 6 | 2 | 5 | 11 | 6 | 4 | 6 | 2 | 3 | 7 | 11 | 10 | 3 |
| 1045 | 8 | 10 | 3 | 6 | 11 | 4 | 5 | 7 | 7 | 3 | 3 | 5 | 8 | 5 |
| 1046 | 2 | 8 | 9 | 1 | 2 | 3 | 6 | 5 | 11 | 6 | 3 | 8 | 11 | 11 |
| 1047 | 1 | 2 | 4 | 11 | 6 | 11 | 8 | 1 | 10 | 5 | 3 | 6 | 11 | 3 |
| 1048 | 1 | 10 | 11 | 2 | 4 | 7 | 1 | 8 | 9 | 10 | 2 | 7 | 7 | 6 |
| 1049 | 11 | 9 | 7 | 6 | 2 | 5 | 0 | 11 | 8 | 2 | 7 | 6 | 7 | 10 |
| 1050 | 4 | 4 | 8 | 6 | 8 | 11 | 6 | 4 | 5 | 6 | 11 | 10 | 1 | 8 |
| 1051 | 3 | 3 | 1 | 6 | 1 | 1 | 7 | 4 | 4 | 2 | 10 | 9 | 0 | 9 |
| 1052 | 8 | 4 | 5 | 8 | 8 | 0 | 4 | 7 | 4 | 9 | 0 | 3 | 5 | 11 |
| 1053 | 9 | 7 | 4 | 2 | 7 | 2 | 0 | 2 | 7 | 8 | 3 | 0 | 10 | 4 |
| 1054 | 11 | 10 | 6 | 5 | 0 | 0 | 6 | 11 | 4 | 10 | 9 | 8 | 4 | 3 |
| 1055 | 10 | 7 | 7 | 7 | 3 | 2 | 4 | 1 | 5 | 11 | 10 | 11 | 0 | 7 |
| 1056 | 5 | 11 | 5 | 0 | 4 | 2 | 0 | 0 | 8 | 6 | 5 | 9 | 11 | 1 |
| 1057 | 1 | 8 | 9 | 5 | 0 | 11 | 9 | 0 | 5 | 1 | 7 | 9 | 5 | 0 |
| 1058 | 4 | 7 | 11 | 8 | 6 | 9 | 5 | 6 | 0 | 2 | 9 | 10 | 2 | 3 |
| 1059 | 9 | 0 | 11 | 4 | 7 | 11 | 1 | 10 | 10 | 3 | 9 | 11 | 3 | 7 |
| 1060 | 7 | 1 | 9 | 4 | 6 | 3 | 8 | 4 | 9 | 10 | 10 | 1 | 9 | 7 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1061 | 7 | 8 | 1 | 6 | 0 | 6 | 1 | 2 | 4 | 5 | 11 | 6 | 1 | 11 |
| 1062 | 11 | 8 | 7 | 2 | 10 | 9 | 9 | 4 | 6 | 9 | 3 | 6 | 1 | 3 |
| 1063 | 10 | 6 | 10 | 0 | 11 | 7 | 2 | 2 | 6 | 10 | 10 | 0 | 8 | 3 |
| 1064 | 0 | 9 | 11 | 8 | 5 | 0 | 8 | 0 | 2 | 5 | 2 | 1 | 5 | 9 |
| 1065 | 8 | 2 | 3 | 3 | 8 | 9 | 6 | 4 | 1 | 1 | 2 | 7 | 4 | 1 |
| 1066 | 10 | 9 | 3 | 4 | 9 | 8 | 1 | 7 | 9 | 11 | 5 | 10 | 4 | 1 |
| 1067 | 2 | 10 | 6 | 0 | 2 | 1 | 5 | 0 | 6 | 1 | 9 | 6 | 3 | 1 |
| 1068 | 10 | 6 | 11 | 11 | 0 | 8 | 10 | 1 | 7 | 3 | 7 | 6 | 4 | 11 |
| 1069 | 7 | 8 | 4 | 0 | 3 | 9 | 4 | 0 | 4 | 10 | 5 | 3 | 9 | 4 |
| 1070 | 6 | 4 | 1 | 6 | 9 | 10 | 8 | 8 | 10 | 3 | 2 | 9 | 3 | 10 |
| 1071 | 11 | 5 | 3 | 9 | 7 | 10 | 11 | 5 | 6 | 8 | 10 | 6 | 10 | 1 |
| 1072 | 1 | 6 | 10 | 7 | 9 | 9 | 2 | 11 | 5 | 5 | 9 | 10 | 1 | 7 |
| 1073 | 0 | 3 | 0 | 7 | 11 | 0 | 1 | 1 | 2 | 11 | 6 | 0 | 3 | 5 |
| 1074 | 9 | 0 | 6 | 5 | 5 | 10 | 7 | 9 | 2 | 5 | 8 | 7 | 10 | 0 |
| 1075 | 5 | 8 | 11 | 0 | 1 | 5 | 10 | 8 | 0 | 10 | 1 | 6 | 1 | 2 |
| 1076 | 5 | 6 | 6 | 8 | 7 | 11 | 0 | 3 | 0 | 8 | 6 | 9 | 4 | 7 |
| 1077 | 1 | 2 | 5 | 7 | 4 | 11 | 7 | 6 | 2 | 7 | 4 | 5 | 7 | 1 |
| 1078 | 10 | 10 | 4 | 9 | 10 | 8 | 6 | 1 | 10 | 10 | 0 | 11 | 8 | 6 |
| 1079 | 4 | 2 | 2 | 2 | 6 | 5 | 10 | 4 | 11 | 11 | 2 | 1 | 5 | 4 |
| 1080 | 11 | 0 | 2 | 7 | 8 | 4 | 0 | 3 | 2 | 9 | 10 | 11 | 7 | 9 |
| 1081 | 0 | 2 | 1 | 10 | 9 | 10 | 5 | 10 | 6 | 11 | 4 | 3 | 2 | 6 |
| 1082 | 0 | 9 | 11 | 9 | 3 | 5 | 0 | 9 | 5 | 0 | 5 | 11 | 9 | 2 |
| 1083 | 6 | 0 | 0 | 6 | 6 | 11 | 10 | 6 | 3 | 10 | 10 | 5 | 2 | 11 |
| 1084 | 3 | 7 | 4 | 5 | 3 | 11 | 1 | 1 | 3 | 7 | 0 | 3 | 7 | 10 |
| 1085 | 6 | 1 | 1 | 8 | 5 | 8 | 11 | 2 | 3 | 7 | 9 | 11 | 10 | 6 |
| 1086 | 6 | 3 | 8 | 4 | 2 | 7 | 3 | 11 | 10 | 6 | 3 | 9 | 8 | 8 |
| 1087 | 10 | 2 | 3 | 9 | 7 | 11 | 3 | 2 | 4 | 4 | 0 | 9 | 1 | 8 |
| 1088 | 2 | 1 | 6 | 2 | 0 | 5 | 1 | 10 | 0 | 10 | 8 | 3 | 6 | 9 |
| 1089 | 6 | 8 | 11 | 3 | 8 | 1 | 11 | 4 | 0 | 7 | 6 | 4 | 2 | 7 |
| 1090 | 11 | 7 | 7 | 10 | 9 | 11 | 2 | 6 | 7 | 2 | 6 | 9 | 10 | 5 |
| 1091 | 3 | 0 | 11 | 2 | 2 | 4 | 4 | 0 | 6 | 5 | 11 | 8 | 1 | 5 |
| 1092 | 4 | 7 | 8 | 7 | 11 | 8 | 7 | 10 | 0 | 4 | 7 | 5 | 3 | 4 |
| 1093 | 3 | 10 | 7 | 3 | 4 | 2 | 6 | 4 | 8 | 8 | 7 | 2 | 0 | 3 |
| 1094 | 8 | 11 | 6 | 11 | 3 | 7 | 9 | 11 | 5 | 5 | 7 | 0 | 3 | 3 |
| 1095 | 1 | 7 | 3 | 1 | 1 | 8 | 1 | 8 | 1 | 9 | 0 | 8 | 6 | 7 |
| 1096 | 8 | 8 | 1 | 2 | 11 | 0 | 8 | 5 | 3 | 0 | 0 | 1 | 1 | 1 |
| 1097 | 8 | 1 | 9 | 0 | 7 | 7 | 7 | 0 | 10 | 0 | 8 | 8 | 6 | 4 |
| 1098 | 3 | 4 | 4 | 7 | 3 | 5 | 3 | 3 | 1 | 11 | 3 | 9 | 6 | 3 |
| 1099 | 7 | 6 | 9 | 10 | 7 | 1 | 4 | 9 | 5 | 9 | 11 | 2 | 0 | 1 |
| 1100 | 4 | 4 | 2 | 3 | 3 | 0 | 5 | 11 | 6 | 7 | 0 | 9 | 10 | 9 |
| 1101 | 11 | 11 | 4 | 4 | 4 | 0 | 10 | 0 | 0 | 2 | 7 | 10 | 3 | 8 |
| 1102 | 4 | 11 | 10 | 9 | 9 | 2 | 7 | 2 | 4 | 3 | 10 | 8 | 11 | 10 |
| 1103 | 10 | 7 | 6 | 7 | 6 | 11 | 9 | 9 | 8 | 8 | 5 | 4 | 6 | 3 |
| 1104 | 0 | 11 | 1 | 3 | 11 | 8 | 9 | 7 | 9 | 6 | 2 | 6 | 9 | 5 |
| 1105 | 9 | 0 | 0 | 6 | 10 | 4 | 2 | 1 | 6 | 0 | 5 | 2 | 5 | 4 |
| 1106 | 5 | 6 | 11 | 5 | 9 | 5 | 5 | 5 | 9 | 5 | 5 | 8 | 8 | 6 |
| 1107 | 8 | 4 | 1 | 4 | 11 | 3 | 6 | 10 | 9 | 1 | 1 | 9 | 0 | 11 |
| 1108 | 2 | 0 | 1 | 2 | 7 | 10 | 4 | 2 | 2 | 1 | 9 | 5 | 4 | 8 |
| 1109 | 1 | 7 | 0 | 9 | 4 | 9 | 11 | 3 | 0 | 5 | 0 | 2 | 0 | 11 |
| 1110 | 1 | 1 | 9 | 9 | 9 | 4 | 0 | 9 | 8 | 9 | 1 | 7 | 3 | 8 |
| 1111 | 5 | 7 | 9 | 3 | 8 | 3 | 10 | 8 | 7 | 1 | 10 | 10 | 10 | 6 |
| 1112 | 1 | 1 | 10 | 5 | 8 | 0 | 6 | 6 | 5 | 8 | 0 | 1 | 11 | 9 |
| 1113 | 10 | 4 | 8 | 3 | 7 | 8 | 9 | 6 | 1 | 3 | 8 | 11 | 2 | 2 |
| 1114 | 10 | 11 | 9 | 2 | 8 | 4 | 4 | 11 | 11 | 4 | 9 | 11 | 11 | 6 |
| 1115 | 8 | 4 | 11 | 11 | 9 | 3 | 10 | 2 | 6 | 0 | 4 | 2 | 1 | 7 |
| 1116 | 9 | 6 | 1 | 1 | 8 | 11 | 10 | 8 | 9 | 5 | 4 | 0 | 11 | 10 |
| 1117 | 9 | 11 | 6 | 9 | 11 | 2 | 6 | 5 | 8 | 11 | 4 | 1 | 8 | 5 |
| 1118 | 7 | 1 | 11 | 3 | 10 | 4 | 3 | 10 | 3 | 5 | 3 | 5 | 6 | 2 |
| 1119 | 2 | 1 | 3 | 5 | 8 | 1 | 8 | 0 | 11 | 3 | 5 | 2 | 2 | 5 |
| 1120 | 7 | 3 | 7 | 11 | 0 | 8 | 8 | 3 | 4 | 6 | 2 | 3 | 11 | 9 |
| 1121 | 3 | 8 | 2 | 8 | 2 | 6 | 8 | 10 | 5 | 7 | 1 | 0 | 3 | 10 |
| 1122 | 7 | 4 | 8 | 8 | 4 | 4 | 4 | 10 | 11 | 1 | 7 | 10 | 9 | 10 |
| 1123 | 0 | 7 | 5 | 6 | 7 | 1 | 4 | 11 | 8 | 7 | 1 | 10 | 4 | 0 |
| 1124 | 5 | 8 | 8 | 4 | 1 | 2 | 3 | 2 | 2 | 2 | 7 | 11 | 5 | 6 |
| 1125 | 8 | 10 | 6 | 5 | 11 | 5 | 3 | 0 | 5 | 6 | 4 | 10 | 10 | 11 |
| 1126 | 8 | 5 | 2 | 6 | 6 | 6 | 9 | 9 | 0 | 3 | 9 | 2 | 7 | 7 |
| 1127 | 6 | 4 | 3 | 8 | 3 | 2 | 4 | 5 | 8 | 6 | 3 | 7 | 7 | 9 |
| 1128 | 11 | 3 | 5 | 3 | 6 | 4 | 3 | 0 | 5 | 9 | 2 | 4 | 1 | 8 |
| 1129 | 3 | 6 | 3 | 2 | 7 | 7 | 2 | 4 | 5 | 3 | 1 | 3 | 11 | 2 |
| 1130 | 2 | 5 | 2 | 10 | 7 | 3 | 7 | 8 | 1 | 11 | 8 | 0 | 0 | 10 |
| 1131 | 7 | 11 | 5 | 11 | 10 | 6 | 10 | 7 | 4 | 0 | 9 | 0 | 0 | 1 |
| 1132 | 1 | 9 | 5 | 0 | 5 | 3 | 1 | 4 | 7 | 1 | 4 | 6 | 1 | 0 |
| 1133 | 6 | 8 | 3 | 6 | 0 | 11 | 6 | 9 | 1 | 11 | 5 | 3 | 8 | 7 |
| 1134 | 1 | 7 | 2 | 9 | 7 | 7 | 6 | 5 | 3 | 7 | 7 | 11 | 5 | 7 |
| 1135 | 10 | 1 | 10 | 2 | 5 | 3 | 5 | 2 | 2 | 6 | 4 | 3 | 11 | 4 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1136 | 3 | 4 | 5 | 0 | 6 | 9 | 1 | 1 | 5 | 8 | 7 | 5 | 5 | 7 |
| 1137 | 0 | 5 | 6 | 11 | 11 | 6 | 11 | 6 | 8 | 10 | 11 | 9 | 9 | 4 |
| 1138 | 11 | 11 | 7 | 8 | 0 | 2 | 8 | 0 | 3 | 1 | 11 | 5 | 2 | 10 |
| 1139 | 9 | 9 | 5 | 10 | 1 | 5 | 4 | 2 | 9 | 7 | 6 | 9 | 9 | 6 |
| 1140 | 4 | 6 | 7 | 8 | 4 | 11 | 8 | 1 | 2 | 6 | 1 | 2 | 9 | 4 |
| 1141 | 5 | 9 | 8 | 4 | 5 | 6 | 7 | 6 | 6 | 5 | 9 | 2 | 0 | 2 |
| 1142 | 4 | 5 | 5 | 3 | 9 | 6 | 0 | 2 | 5 | 4 | 7 | 11 | 6 | 5 |
| 1143 | 5 | 1 | 4 | 7 | 10 | 2 | 3 | 4 | 7 | 7 | 2 | 6 | 8 | 5 |
| 1144 | 11 | 6 | 10 | 0 | 2 | 9 | 9 | 5 | 11 | 2 | 5 | 1 | 3 | 2 |
| 1145 | 5 | 0 | 6 | 1 | 4 | 6 | 1 | 9 | 9 | 11 | 6 | 5 | 11 | 8 |
| 1146 | 8 | 6 | 11 | 5 | 3 | 2 | 11 | 7 | 11 | 8 | 10 | 4 | 1 | 11 |
| 1147 | 5 | 4 | 3 | 6 | 3 | 7 | 1 | 7 | 11 | 1 | 1 | 8 | 3 | 4 |
| 1148 | 9 | 1 | 9 | 11 | 7 | 1 | 10 | 3 | 4 | 2 | 3 | 5 | 7 | 11 |
| 1149 | 0 | 2 | 7 | 5 | 11 | 7 | 11 | 11 | 9 | 11 | 1 | 2 | 1 | 8 |
| 1150 | 7 | 11 | 8 | 7 | 5 | 4 | 8 | 9 | 6 | 9 | 2 | 5 | 8 | 7 |
| 1151 | 4 | 6 | 8 | 5 | 4 | 3 | 10 | 0 | 8 | 1 | 3 | 1 | 1 | 2 |
| 1152 | 7 | 2 | 7 | 4 | 1 | 2 | 10 | 5 | 1 | 6 | 8 | 4 | 10 | 4 |
| 1153 | 9 | 11 | 11 | 3 | 10 | 5 | 5 | 3 | 7 | 8 | 9 | 9 | 5 | 5 |
| 1154 | 9 | 5 | 8 | 6 | 3 | 2 | 11 | 11 | 4 | 2 | 0 | 0 | 4 | 8 |
| 1155 | 5 | 2 | 2 | 4 | 5 | 1 | 5 | 5 | 3 | 2 | 10 | 5 | 6 | 8 |
| 1156 | 0 | 11 | 8 | 6 | 7 | 3 | 2 | 3 | 5 | 10 | 2 | 2 | 10 | 3 |
| 1157 | 2 | 8 | 7 | 1 | 0 | 10 | 7 | 4 | 4 | 0 | 7 | 10 | 9 | 5 |
| 1158 | 5 | 9 | 7 | 9 | 2 | 4 | 5 | 1 | 3 | 3 | 2 | 8 | 5 | 3 |
| 1159 | 4 | 5 | 11 | 11 | 4 | 5 | 3 | 0 | 0 | 0 | 11 | 7 | 0 | 10 |
| 1160 | 7 | 10 | 3 | 10 | 1 | 10 | 1 | 9 | 0 | 7 | 1 | 4 | 11 | 11 |
| 1161 | 1 | 0 | 9 | 8 | 5 | 6 | 3 | 7 | 8 | 8 | 11 | 11 | 1 | 7 |
| 1162 | 11 | 2 | 8 | 11 | 1 | 6 | 2 | 4 | 3 | 3 | 7 | 0 | 8 | 0 |
| 1163 | 6 | 9 | 11 | 8 | 6 | 4 | 1 | 5 | 4 | 10 | 7 | 2 | 8 | 4 |
| 1164 | 10 | 3 | 2 | 11 | 9 | 10 | 10 | 10 | 1 | 9 | 6 | 9 | 0 | 3 |
| 1165 | 10 | 8 | 3 | 10 | 4 | 6 | 7 | 5 | 11 | 8 | 11 | 3 | 6 | 10 |
| 1166 | 0 | 6 | 5 | 4 | 10 | 5 | 0 | 4 | 1 | 6 | 7 | 3 | 4 | 6 |
| 1167 | 6 | 7 | 1 | 2 | 3 | 5 | 8 | 11 | 2 | 10 | 4 | 4 | 9 | 6 |
| 1168 | 0 | 0 | 6 | 10 | 1 | 8 | 2 | 10 | 2 | 8 | 3 | 0 | 5 | 3 |
| 1169 | 1 | 11 | 4 | 8 | 4 | 3 | 9 | 6 | 4 | 4 | 6 | 4 | 8 | 9 |
| 1170 | 1 | 3 | 6 | 0 | 7 | 10 | 7 | 4 | 5 | 7 | 11 | 1 | 4 | 10 |
| 1171 | 0 | 10 | 11 | 11 | 8 | 9 | 9 | 3 | 11 | 10 | 3 | 4 | 6 | 9 |
| 1172 | 2 | 4 | 1 | 5 | 11 | 11 | 2 | 5 | 4 | 9 | 10 | 4 | 4 | 2 |
| 1173 | 10 | 6 | 5 | 1 | 7 | 4 | 5 | 8 | 7 | 2 | 6 | 3 | 0 | 9 |
| 1174 | 0 | 0 | 8 | 9 | 6 | 7 | 5 | 3 | 6 | 2 | 10 | 9 | 11 | 2 |
| 1175 | 9 | 3 | 2 | 3 | 6 | 0 | 11 | 10 | 10 | 10 | 8 | 6 | 7 | 11 |
| 1176 | 1 | 8 | 8 | 3 | 2 | 5 | 2 | 9 | 2 | 3 | 0 | 3 | 7 | 4 |
| 1177 | 3 | 4 | 6 | 3 | 1 | 5 | 9 | 1 | 3 | 5 | 2 | 7 | 1 | 11 |
| 1178 | 0 | 8 | 6 | 4 | 6 | 6 | 3 | 8 | 10 | 0 | 8 | 4 | 2 | 5 |
| 1179 | 10 | 7 | 8 | 0 | 8 | 0 | 5 | 9 | 0 | 11 | 8 | 1 | 8 | 1 |
| 1180 | 9 | 2 | 6 | 3 | 8 | 11 | 7 | 2 | 5 | 9 | 3 | 3 | 3 | 6 |
| 1181 | 11 | 2 | 3 | 0 | 11 | 2 | 10 | 10 | 11 | 8 | 6 | 2 | 4 | 9 |
| 1182 | 8 | 3 | 5 | 5 | 0 | 8 | 9 | 9 | 10 | 4 | 3 | 11 | 10 | 1 |
| 1183 | 7 | 6 | 5 | 9 | 2 | 11 | 11 | 9 | 3 | 1 | 7 | 0 | 3 | 11 |
| 1184 | 4 | 11 | 2 | 2 | 4 | 11 | 5 | 9 | 7 | 5 | 10 | 7 | 4 | 7 |
| 1185 | 1 | 10 | 1 | 2 | 2 | 10 | 5 | 11 | 11 | 2 | 6 | 10 | 10 | 0 |
| 1186 | 4 | 5 | 3 | 1 | 2 | 4 | 8 | 1 | 8 | 5 | 5 | 3 | 7 | 2 |
| 1187 | 5 | 5 | 8 | 5 | 1 | 1 | 6 | 10 | 10 | 7 | 9 | 3 | 1 | 0 |
| 1188 | 2 | 9 | 0 | 11 | 2 | 9 | 11 | 4 | 10 | 6 | 4 | 0 | 9 | 2 |
| 1189 | 6 | 1 | 7 | 9 | 3 | 4 | 1 | 4 | 1 | 11 | 0 | 1 | 1 | 2 |
| 1190 | 7 | 4 | 1 | 11 | 8 | 10 | 5 | 0 | 0 | 8 | 10 | 0 | 7 | 7 |
| 1191 | 10 | 10 | 5 | 5 | 11 | 2 | 8 | 2 | 10 | 9 | 6 | 8 | 7 | 5 |
| 1192 | 4 | 7 | 10 | 7 | 5 | 1 | 9 | 0 | 4 | 6 | 8 | 1 | 2 | 0 |
| 1193 | 2 | 3 | 5 | 7 | 7 | 11 | 4 | 7 | 6 | 10 | 6 | 11 | 6 | 10 |
| 1194 | 9 | 4 | 11 | 1 | 8 | 1 | 3 | 6 | 8 | 11 | 2 | 10 | 9 | 9 |
| 1195 | 0 | 3 | 4 | 8 | 0 | 4 | 2 | 11 | 1 | 1 | 10 | 1 | 10 | 8 |
| 1196 | 8 | 10 | 10 | 6 | 4 | 7 | 3 | 3 | 10 | 11 | 5 | 4 | 5 | 1 |
| 1197 | 4 | 9 | 3 | 9 | 3 | 7 | 6 | 1 | 2 | 11 | 3 | 4 | 11 | 0 |
| 1198 | 3 | 1 | 5 | 10 | 5 | 9 | 3 | 11 | 1 | 5 | 5 | 8 | 0 | 1 |
| 1199 | 7 | 2 | 0 | 5 | 4 | 0 | 9 | 7 | 5 | 4 | 5 | 0 | 6 | 10 |
| 1200 | 7 | 5 | 2 | 7 | 10 | 9 | 10 | 9 | 10 | 4 | 11 | 7 | 5 | 9 |
| 1201 | 4 | 5 | 10 | 10 | 0 | 3 | 1 | 3 | 7 | 6 | 3 | 4 | 4 | 8 |
| 1202 | 1 | 5 | 4 | 3 | 10 | 10 | 0 | 6 | 9 | 1 | 4 | 2 | 11 | 7 |
| 1203 | 2 | 3 | 5 | 9 | 3 | 3 | 5 | 0 | 10 | 7 | 1 | 2 | 5 | 11 |
| 1204 | 11 | 10 | 11 | 1 | 3 | 1 | 7 | 10 | 1 | 2 | 6 | 0 | 3 | 11 |
| 1205 | 7 | 0 | 8 | 4 | 7 | 1 | 2 | 0 | 7 | 6 | 5 | 5 | 1 | 10 |
| 1206 | 10 | 4 | 11 | 1 | 4 | 10 | 4 | 11 | 2 | 5 | 0 | 0 | 2 | 1 |
| 1207 | 6 | 9 | 9 | 3 | 0 | 2 | 2 | 3 | 0 | 6 | 9 | 8 | 8 | 6 |
| 1208 | 10 | 4 | 8 | 11 | 10 | 9 | 0 | 0 | 11 | 2 | 2 | 8 | 8 | 8 |
| 1209 | 3 | 1 | 11 | 4 | 1 | 8 | 9 | 2 | 10 | 8 | 11 | 1 | 2 | 10 |
| 1210 | 3 | 0 | 7 | 8 | 3 | 10 | 2 | 5 | 10 | 7 | 5 | 9 | 2 | 8 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1211 | 6 | 3 | 0 | 8 | 8 | 8 | 0 | 4 | 8 | 10 | 4 | 1 | 11 | 3 |
| 1212 | 8 | 6 | 0 | 10 | 6 | 9 | 0 | 10 | 7 | 2 | 0 | 7 | 5 | 4 |
| 1213 | 4 | 11 | 4 | 6 | 2 | 10 | 3 | 8 | 6 | 6 | 5 | 0 | 2 | 7 |
| 1214 | 0 | 2 | 3 | 2 | 10 | 6 | 6 | 0 | 9 | 8 | 7 | 8 | 2 | 4 |
| 1215 | 3 | 9 | 3 | 11 | 10 | 7 | 5 | 7 | 1 | 10 | 4 | 7 | 5 | 11 |
| 1216 | 2 | 9 | 5 | 5 | 3 | 4 | 6 | 6 | 6 | 4 | 5 | 7 | 4 | 7 |
| 1217 | 8 | 7 | 4 | 7 | 2 | 6 | 10 | 4 | 11 | 9 | 1 | 11 | 10 | 2 |
| 1218 | 5 | 9 | 4 | 3 | 6 | 1 | 3 | 3 | 11 | 4 | 4 | 11 | 4 | 10 |
| 1219 | 6 | 5 | 7 | 1 | 8 | 11 | 9 | 7 | 4 | 7 | 2 | 1 | 8 | 8 |
| 1220 | 3 | 11 | 7 | 11 | 6 | 0 | 3 | 11 | 2 | 7 | 8 | 10 | 9 | 10 |
| 1221 | 4 | 8 | 10 | 11 | 6 | 8 | 5 | 5 | 5 | 11 | 5 | 7 | 9 | 0 |
| 1222 | 10 | 1 | 5 | 7 | 4 | 3 | 11 | 8 | 3 | 3 | 3 | 4 | 2 | 10 |
| 1223 | 8 | 7 | 9 | 10 | 11 | 5 | 1 | 2 | 3 | 11 | 11 | 4 | 8 | 2 |
| 1224 | 11 | 3 | 9 | 6 | 9 | 6 | 4 | 5 | 1 | 4 | 2 | 7 | 8 | 4 |
| 1225 | 8 | 5 | 7 | 8 | 11 | 1 | 7 | 5 | 1 | 4 | 11 | 8 | 7 | 0 |
| 1226 | 1 | 9 | 6 | 2 | 6 | 6 | 2 | 1 | 0 | 7 | 5 | 0 | 1 | 2 |
| 1227 | 10 | 9 | 9 | 6 | 3 | 2 | 10 | 9 | 11 | 10 | 7 | 7 | 6 | 5 |
| 1228 | 9 | 6 | 6 | 1 | 5 | 8 | 4 | 5 | 6 | 8 | 5 | 3 | 2 | 11 |
| 1229 | 1 | 2 | 2 | 8 | 10 | 7 | 11 | 3 | 11 | 1 | 5 | 6 | 6 | 2 |
| 1230 | 1 | 5 | 7 | 5 | 6 | 0 | 8 | 2 | 4 | 0 | 10 | 11 | 2 | 0 |
| 1231 | 0 | 9 | 5 | 10 | 8 | 8 | 10 | 1 | 6 | 6 | 10 | 2 | 7 | 0 |
| 1232 | 8 | 10 | 10 | 1 | 10 | 0 | 11 | 1 | 6 | 7 | 1 | 3 | 3 | 7 |
| 1233 | 7 | 5 | 10 | 9 | 11 | 7 | 0 | 8 | 9 | 7 | 3 | 8 | 10 | 11 |
| 1234 | 8 | 7 | 7 | 1 | 6 | 3 | 5 | 0 | 2 | 3 | 5 | 9 | 3 | 9 |
| 1235 | 10 | 7 | 8 | 10 | 5 | 7 | 10 | 4 | 3 | 5 | 0 | 6 | 3 | 8 |
| 1236 | 2 | 0 | 8 | 4 | 1 | 5 | 11 | 8 | 5 | 4 | 4 | 2 | 11 | 9 |
| 1237 | 6 | 11 | 9 | 7 | 0 | 9 | 3 | 7 | 6 | 3 | 1 | 7 | 11 | 3 |
| 1238 | 3 | 2 | 10 | 5 | 7 | 1 | 2 | 6 | 0 | 9 | 8 | 0 | 10 | 11 |
| 1239 | 6 | 8 | 3 | 5 | 5 | 3 | 0 | 11 | 7 | 10 | 6 | 10 | 3 | 9 |
| 1240 | 0 | 7 | 2 | 1 | 11 | 8 | 3 | 0 | 4 | 1 | 3 | 4 | 7 | 6 |
| 1241 | 3 | 6 | 8 | 5 | 5 | 8 | 1 | 3 | 9 | 2 | 7 | 4 | 9 | 0 |
| 1242 | 4 | 5 | 9 | 8 | 5 | 7 | 11 | 9 | 10 | 10 | 1 | 3 | 8 | 10 |
| 1243 | 4 | 3 | 7 | 8 | 1 | 4 | 1 | 6 | 10 | 5 | 6 | 7 | 11 | 1 |
| 1244 | 6 | 8 | 7 | 0 | 7 | 6 | 11 | 9 | 5 | 2 | 0 | 8 | 11 | 6 |
| 1245 | 2 | 2 | 7 | 11 | 10 | 7 | 3 | 8 | 0 | 4 | 3 | 1 | 4 | 1 |
| 1246 | 2 | 8 | 11 | 1 | 3 | 0 | 10 | 3 | 8 | 7 | 8 | 1 | 4 | 4 |
| 1247 | 9 | 9 | 7 | 8 | 9 | 7 | 10 | 4 | 5 | 1 | 9 | 1 | 7 | 5 |
| 1248 | 6 | 6 | 2 | 11 | 3 | 10 | 6 | 2 | 6 | 11 | 2 | 11 | 9 | 11 |
| 1249 | 5 | 6 | 2 | 1 | 0 | 4 | 10 | 5 | 11 | 7 | 11 | 4 | 9 | 3 |
| 1250 | 4 | 1 | 5 | 5 | 2 | 7 | 1 | 0 | 4 | 7 | 10 | 10 | 9 | 8 |
| 1251 | 7 | 4 | 9 | 10 | 4 | 7 | 6 | 11 | 3 | 0 | 2 | 3 | 10 | 0 |
| 1252 | 10 | 3 | 11 | 2 | 3 | 10 | 0 | 5 | 7 | 11 | 8 | 8 | 5 | 9 |
| 1253 | 2 | 3 | 6 | 8 | 5 | 1 | 10 | 10 | 8 | 5 | 10 | 4 | 2 | 10 |
| 1254 | 1 | 1 | 8 | 10 | 2 | 6 | 8 | 3 | 7 | 8 | 6 | 7 | 8 | 6 |
| 1255 | 8 | 4 | 6 | 10 | 2 | 4 | 3 | 6 | 0 | 9 | 3 | 6 | 11 | 0 |
| 1256 | 11 | 7 | 6 | 8 | 10 | 1 | 3 | 1 | 5 | 2 | 8 | 6 | 4 | 6 |
| 1257 | 6 | 5 | 4 | 6 | 9 | 8 | 11 | 0 | 11 | 0 | 7 | 6 | 8 | 3 |
| 1258 | 10 | 7 | 0 | 8 | 9 | 6 | 2 | 11 | 10 | 9 | 7 | 3 | 9 | 1 |
| 1259 | 2 | 6 | 11 | 9 | 11 | 1 | 9 | 10 | 2 | 11 | 0 | 9 | 4 | 6 |
| 1260 | 1 | 4 | 3 | 10 | 6 | 2 | 11 | 2 | 3 | 3 | 1 | 6 | 0 | 5 |
| 1261 | 10 | 1 | 9 | 4 | 0 | 6 | 0 | 8 | 5 | 7 | 2 | 3 | 7 | 3 |
| 1262 | 10 | 2 | 4 | 10 | 11 | 0 | 11 | 9 | 6 | 1 | 6 | 11 | 5 | 0 |
| 1263 | 8 | 4 | 4 | 9 | 5 | 3 | 8 | 8 | 4 | 11 | 5 | 10 | 11 | 8 |
| 1264 | 2 | 11 | 0 | 7 | 1 | 11 | 6 | 11 | 11 | 2 | 11 | 1 | 0 | 7 |
| 1265 | 9 | 2 | 10 | 1 | 1 | 8 | 8 | 6 | 11 | 0 | 3 | 5 | 0 | 0 |
| 1266 | 7 | 2 | 6 | 6 | 11 | 3 | 5 | 8 | 11 | 6 | 1 | 6 | 7 | 0 |
| 1267 | 8 | 0 | 3 | 0 | 0 | 11 | 8 | 2 | 10 | 2 | 11 | 7 | 9 | 0 |
| 1268 | 3 | 6 | 4 | 7 | 11 | 6 | 8 | 7 | 7 | 4 | 8 | 3 | 2 | 7 |
| 1269 | 4 | 0 | 6 | 4 | 0 | 9 | 4 | 3 | 4 | 5 | 7 | 9 | 2 | 6 |
| 1270 | 7 | 8 | 1 | 7 | 8 | 2 | 9 | 11 | 7 | 9 | 9 | 9 | 10 | 8 |
| 1271 | 4 | 6 | 9 | 3 | 1 | 1 | 3 | 1 | 8 | 10 | 6 | 9 | 3 | 0 |
| 1272 | 3 | 2 | 10 | 6 | 3 | 11 | 10 | 2 | 7 | 1 | 9 | 2 | 9 | 1 |
| 1273 | 7 | 6 | 4 | 5 | 7 | 0 | 6 | 2 | 8 | 6 | 4 | 7 | 5 | 8 |
| 1274 | 7 | 7 | 11 | 11 | 1 | 11 | 5 | 3 | 8 | 9 | 11 | 6 | 10 | 6 |
| 1275 | 6 | 4 | 11 | 7 | 10 | 6 | 1 | 0 | 6 | 1 | 5 | 10 | 0 | 6 |
| 1276 | 7 | 11 | 6 | 1 | 2 | 8 | 1 | 7 | 7 | 2 | 10 | 9 | 1 | 4 |
| 1277 | 9 | 11 | 8 | 0 | 3 | 11 | 0 | 8 | 3 | 8 | 11 | 6 | 8 | 11 |
| 1278 | 6 | 10 | 9 | 7 | 11 | 10 | 0 | 8 | 0 | 5 | 4 | 6 | 5 | 1 |
| 1279 | 3 | 0 | 1 | 11 | 0 | 0 | 9 | 4 | 0 | 6 | 0 | 4 | 10 | 0 |
| 1280 | 2 | 0 | 3 | 10 | 7 | 1 | 11 | 11 | 1 | 9 | 10 | 5 | 3 | 2 |
| 1281 | 3 | 8 | 6 | 4 | 2 | 3 | 5 | 6 | 6 | 7 | 6 | 11 | 10 | 11 |
| 1282 | 5 | 4 | 2 | 3 | 5 | 9 | 8 | 4 | 0 | 3 | 7 | 3 | 2 | 3 |
| 1283 | 11 | 5 | 9 | 0 | 1 | 10 | 1 | 0 | 10 | 5 | 5 | 1 | 8 | 5 |
| 1284 | 0 | 7 | 10 | 11 | 3 | 6 | 6 | 7 | 2 | 4 | 8 | 4 | 1 | 1 |
| 1285 | 10 | 6 | 7 | 10 | 10 | 3 | 2 | 9 | 3 | 3 | 2 | 1 | 4 | 7 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1286 | 10 | 1 | 11 | 5 | 4 | 9 | 9 | 1 | 9 | 1 | 10 | 2 | 0 | 9 |
| 1287 | 10 | 3 | 1 | 11 | 1 | 11 | 3 | 5 | 8 | 6 | 4 | 11 | 9 | 8 |
| 1288 | 7 | 5 | 11 | 9 | 2 | 8 | 3 | 2 | 4 | 10 | 3 | 7 | 2 | 7 |
| 1289 | 4 | 10 | 5 | 1 | 10 | 7 | 11 | 4 | 9 | 0 | 0 | 6 | 5 | 6 |
| 1290 | 6 | 4 | 9 | 1 | 8 | 1 | 1 | 8 | 3 | 9 | 8 | 2 | 7 | 10 |
| 1291 | 8 | 11 | 11 | 5 | 6 | 6 | 8 | 11 | 3 | 10 | 1 | 10 | 11 | 1 |
| 1292 | 0 | 0 | 6 | 11 | 8 | 2 | 7 | 8 | 7 | 2 | 5 | 3 | 11 | 4 |
| 1293 | 3 | 5 | 5 | 6 | 2 | 9 | 7 | 3 | 11 | 4 | 1 | 10 | 1 | 3 |
| 1294 | 4 | 0 | 4 | 0 | 1 | 5 | 6 | 6 | 8 | 3 | 9 | 2 | 3 | 11 |
| 1295 | 2 | 9 | 4 | 1 | 11 | 8 | 2 | 10 | 7 | 0 | 5 | 1 | 3 | 8 |
| 1296 | 8 | 7 | 3 | 4 | 0 | 10 | 7 | 9 | 2 | 6 | 1 | 3 | 3 | 5 |
| 1297 | 9 | 0 | 0 | 4 | 8 | 3 | 10 | 3 | 0 | 6 | 4 | 5 | 8 | 7 |
| 1298 | 1 | 10 | 4 | 10 | 1 | 10 | 4 | 7 | 7 | 8 | 10 | 10 | 0 | 10 |
| 1299 | 2 | 8 | 1 | 10 | 6 | 0 | 2 | 6 | 5 | 8 | 4 | 4 | 2 | 4 |
| 1300 | 8 | 8 | 2 | 2 | 10 | 5 | 11 | 2 | 10 | 8 | 2 | 8 | 0 | 1 |
| 1301 | 11 | 7 | 0 | 10 | 4 | 6 | 5 | 1 | 7 | 10 | 7 | 11 | 5 | 6 |
| 1302 | 5 | 5 | 9 | 10 | 9 | 3 | 10 | 1 | 9 | 11 | 0 | 9 | 3 | 3 |
| 1303 | 6 | 2 | 5 | 8 | 6 | 10 | 11 | 7 | 8 | 1 | 7 | 8 | 7 | 8 |
| 1304 | 11 | 7 | 4 | 4 | 10 | 8 | 9 | 5 | 11 | 7 | 8 | 9 | 2 | 3 |
| 1305 | 5 | 6 | 7 | 8 | 7 | 5 | 1 | 8 | 5 | 0 | 3 | 7 | 3 | 0 |
| 1306 | 8 | 9 | 9 | 8 | 1 | 9 | 2 | 4 | 11 | 11 | 2 | 2 | 11 | 0 |
| 1307 | 5 | 9 | 3 | 5 | 3 | 4 | 5 | 0 | 4 | 2 | 1 | 1 | 2 | 6 |
| 1308 | 11 | 3 | 11 | 8 | 6 | 7 | 9 | 2 | 0 | 6 | 11 | 0 | 6 | 4 |
| 1309 | 6 | 10 | 9 | 5 | 3 | 11 | 3 | 10 | 1 | 11 | 9 | 6 | 0 | 4 |
| 1310 | 1 | 3 | 6 | 5 | 10 | 4 | 0 | 3 | 3 | 7 | 3 | 7 | 5 | 4 |
| 1311 | 8 | 3 | 11 | 1 | 4 | 10 | 3 | 7 | 11 | 2 | 6 | 1 | 5 | 2 |
| 1312 | 4 | 8 | 6 | 7 | 0 | 5 | 0 | 0 | 1 | 2 | 4 | 6 | 9 | 3 |
| 1313 | 10 | 2 | 1 | 6 | 3 | 7 | 0 | 11 | 6 | 10 | 9 | 1 | 1 | 11 |
| 1314 | 5 | 8 | 5 | 1 | 9 | 0 | 9 | 5 | 7 | 4 | 3 | 0 | 9 | 5 |
| 1315 | 0 | 3 | 7 | 9 | 8 | 1 | 5 | 10 | 9 | 3 | 9 | 9 | 6 | 5 |
| 1316 | 5 | 9 | 1 | 9 | 7 | 0 | 11 | 6 | 6 | 6 | 7 | 5 | 8 | 11 |
| 1317 | 7 | 8 | 7 | 3 | 6 | 5 | 7 | 8 | 0 | 4 | 10 | 3 | 10 | 11 |
| 1318 | 1 | 4 | 0 | 5 | 7 | 2 | 4 | 6 | 11 | 7 | 2 | 11 | 7 | 0 |
| 1319 | 2 | 1 | 2 | 0 | 7 | 8 | 6 | 6 | 4 | 2 | 6 | 9 | 2 | 8 |
| 1320 | 6 | 0 | 10 | 5 | 9 | 9 | 4 | 8 | 2 | 11 | 1 | 4 | 11 | 11 |
| 1321 | 2 | 4 | 6 | 9 | 1 | 10 | 4 | 11 | 5 | 2 | 6 | 8 | 9 | 11 |
| 1322 | 1 | 10 | 5 | 11 | 4 | 6 | 9 | 7 | 1 | 9 | 1 | 8 | 4 | 4 |
| 1323 | 4 | 10 | 2 | 6 | 1 | 1 | 6 | 3 | 3 | 7 | 0 | 0 | 4 | 10 |
| 1324 | 7 | 2 | 6 | 9 | 5 | 0 | 6 | 3 | 4 | 9 | 11 | 1 | 3 | 8 |
| 1325 | 1 | 2 | 8 | 10 | 11 | 3 | 7 | 1 | 11 | 2 | 2 | 0 | 2 | 2 |
| 1326 | 2 | 7 | 9 | 0 | 8 | 0 | 2 | 1 | 10 | 0 | 3 | 6 | 4 | 0 |
| 1327 | 3 | 6 | 5 | 11 | 8 | 3 | 6 | 8 | 11 | 0 | 2 | 5 | 7 | 5 |
| 1328 | 7 | 4 | 1 | 10 | 2 | 3 | 4 | 1 | 7 | 0 | 8 | 8 | 4 | 1 |
| 1329 | 9 | 7 | 5 | 4 | 9 | 9 | 3 | 4 | 0 | 10 | 11 | 2 | 1 | 4 |
| 1330 | 1 | 11 | 4 | 4 | 7 | 5 | 5 | 11 | 8 | 5 | 2 | 0 | 9 | 5 |
| 1331 | 11 | 6 | 3 | 7 | 3 | 6 | 9 | 6 | 10 | 1 | 0 | 9 | 7 | 1 |
| 1332 | 1 | 8 | 4 | 2 | 7 | 3 | 6 | 8 | 1 | 4 | 9 | 6 | 5 | 6 |
| 1333 | 9 | 4 | 4 | 6 | 10 | 8 | 4 | 4 | 0 | 11 | 6 | 7 | 5 | 7 |
| 1334 | 2 | 3 | 7 | 7 | 2 | 0 | 4 | 5 | 3 | 8 | 1 | 8 | 1 | 8 |
| 1335 | 6 | 5 | 5 | 6 | 3 | 10 | 10 | 0 | 0 | 3 | 6 | 11 | 6 | 0 |
| 1336 | 9 | 11 | 0 | 11 | 9 | 6 | 5 | 8 | 2 | 2 | 11 | 7 | 9 | 2 |
| 1337 | 8 | 0 | 8 | 3 | 2 | 3 | 11 | 5 | 6 | 4 | 11 | 3 | 6 | 1 |
| 1338 | 0 | 4 | 5 | 3 | 2 | 1 | 8 | 10 | 1 | 8 | 8 | 6 | 8 | 7 |
| 1339 | 10 | 1 | 4 | 10 | 9 | 7 | 0 | 5 | 10 | 3 | 6 | 9 | 7 | 4 |
| 1340 | 7 | 6 | 5 | 10 | 5 | 11 | 6 | 7 | 1 | 11 | 3 | 4 | 9 | 10 |
| 1341 | 11 | 5 | 2 | 0 | 9 | 8 | 8 | 3 | 6 | 6 | 4 | 0 | 9 | 1 |
| 1342 | 3 | 8 | 3 | 4 | 5 | 7 | 3 | 1 | 5 | 4 | 7 | 6 | 9 | 1 |
| 1343 | 9 | 8 | 8 | 11 | 0 | 2 | 0 | 10 | 4 | 4 | 3 | 4 | 8 | 2 |
| 1344 | 10 | 2 | 5 | 2 | 4 | 8 | 4 | 11 | 9 | 9 | 8 | 7 | 8 | 5 |
| 1345 | 5 | 1 | 4 | 9 | 1 | 9 | 1 | 10 | 10 | 1 | 3 | 4 | 6 | 3 |
| 1346 | 1 | 8 | 10 | 1 | 10 | 7 | 10 | 1 | 3 | 9 | 10 | 4 | 8 | 8 |
| 1347 | 0 | 4 | 3 | 2 | 11 | 11 | 7 | 0 | 8 | 11 | 10 | 9 | 11 | 3 |
| 1348 | 3 | 11 | 8 | 7 | 6 | 4 | 4 | 6 | 10 | 7 | 3 | 0 | 3 | 6 |
| 1349 | 2 | 6 | 8 | 10 | 1 | 4 | 5 | 5 | 9 | 4 | 9 | 6 | 7 | 8 |
| 1350 | 8 | 9 | 11 | 4 | 10 | 1 | 8 | 4 | 4 | 4 | 6 | 9 | 7 | 10 |
| 1351 | 8 | 7 | 2 | 5 | 7 | 6 | 10 | 8 | 6 | 8 | 6 | 5 | 3 | 6 |
| 1352 | 6 | 7 | 1 | 1 | 1 | 7 | 8 | 5 | 11 | 1 | 0 | 7 | 7 | 2 |
| 1353 | 5 | 0 | 7 | 3 | 10 | 6 | 0 | 3 | 10 | 5 | 10 | 0 | 2 | 5 |
| 1354 | 5 | 10 | 6 | 7 | 3 | 2 | 6 | 7 | 4 | 1 | 10 | 6 | 6 | 9 |
| 1355 | 11 | 4 | 3 | 9 | 11 | 9 | 0 | 4 | 5 | 9 | 9 | 1 | 8 | 7 |
| 1356 | 5 | 11 | 6 | 8 | 3 | 8 | 10 | 4 | 1 | 9 | 4 | 7 | 7 | 2 |
| 1357 | 9 | 1 | 9 | 6 | 8 | 10 | 11 | 2 | 10 | 4 | 7 | 7 | 3 | 9 |
| 1358 | 3 | 2 | 2 | 2 | 8 | 3 | 7 | 10 | 5 | 4 | 8 | 8 | 11 | 0 |
| 1359 | 6 | 9 | 4 | 10 | 7 | 5 | 2 | 9 | 4 | 11 | 7 | 3 | 6 | 10 |
| 1360 | 5 | 1 | 6 | 11 | 6 | 5 | 2 | 7 | 7 | 10 | 0 | 9 | 10 | 2 |
| 1361 | 3 | 6 | 6 | 5 | 9 | 6 | 9 | 11 | 1 | 8 | 9 | 2 | 8 | 10 |
| 1362 | 3 | 2 | 8 | 5 | 4 | 11 | 0 | 5 | 11 | 9 | 11 | 2 | 11 | 6 |
| 1363 | 0 | 11 | 10 | 3 | 3 | 7 | 2 | 6 | 6 | 3 | 7 | 7 | 0 | 5 |
| 1364 | 11 | 5 | 9 | 11 | 4 | 3 | 11 | 11 | 8 | 7 | 4 | 6 | 6 | 7 |
| 1365 | 1 | 6 | 0 | 2 | 8 | 11 | 9 | 5 | 4 | 2 | 11 | 11 | 5 | 11 |
| 1366 | 0 | 0 | 2 | 0 | 4 | 11 | 2 | 11 | 8 | 0 | 5 | 8 | 0 | 2 |
| 1367 | 9 | 7 | 4 | 6 | 3 | 4 | 7 | 10 | 3 | 6 | 5 | 5 | 4 | 0 |
| 1368 | 6 | 5 | 9 | 7 | 5 | 2 | 2 | 9 | 7 | 1 | 6 | 0 | 1 | 8 |
| 1369 | 2 | 5 | 8 | 2 | 5 | 6 | 3 | 3 | 2 | 3 | 11 | 4 | 5 | 10 |
| 1370 | 10 | 0 | 0 | 10 | 9 | 2 | 11 | 3 | 5 | 11 | 9 | 6 | 10 | 9 |
| 1371 | 10 | 1 | 9 | 1 | 5 | 4 | 2 | 11 | 4 | 6 | 8 | 9 | 9 | 7 |
| 1372 | 3 | 4 | 10 | 4 | 0 | 2 | 5 | 8 | 0 | 9 | 5 | 10 | 0 | 1 |
| 1373 | 10 | 4 | 9 | 7 | 10 | 4 | 6 | 6 | 1 | 10 | 10 | 4 | 1 | 0 |
| 1374 | 10 | 8 | 0 | 6 | 2 | 7 | 9 | 9 | 4 | 4 | 10 | 9 | 2 | 0 |
| 1375 | 0 | 11 | 1 | 4 | 11 | 10 | 7 | 5 | 5 | 1 | 3 | 2 | 8 | 4 |
| 1376 | 0 | 10 | 0 | 8 | 1 | 6 | 3 | 8 | 6 | 6 | 3 | 1 | 7 | 4 |
| 1377 | 0 | 3 | 11 | 6 | 0 | 3 | 6 | 4 | 6 | 1 | 6 | 0 | 2 | 0 |
| 1378 | 7 | 9 | 5 | 6 | 4 | 0 | 3 | 10 | 6 | 9 | 3 | 3 | 0 | 9 |
| 1379 | 1 | 0 | 5 | 10 | 11 | 6 | 11 | 2 | 2 | 1 | 0 | 3 | 1 | 3 |
| 1380 | 10 | 4 | 1 | 3 | 6 | 9 | 7 | 2 | 11 | 5 | 5 | 9 | 4 | 7 |
| 1381 | 9 | 8 | 7 | 5 | 9 | 10 | 11 | 1 | 6 | 1 | 3 | 10 | 10 | 6 |
| 1382 | 5 | 7 | 6 | 2 | 2 | 7 | 4 | 2 | 9 | 3 | 5 | 10 | 2 | 8 |
| 1383 | 4 | 4 | 7 | 0 | 11 | 7 | 10 | 6 | 0 | 7 | 1 | 5 | 6 | 3 |
| 1384 | 0 | 2 | 10 | 8 | 5 | 5 | 0 | 4 | 9 | 9 | 0 | 9 | 9 | 9 |
| 1385 | 0 | 1 | 9 | 3 | 11 | 11 | 10 | 11 | 5 | 10 | 0 | 3 | 6 | 8 |
| 1386 | 5 | 1 | 3 | 2 | 9 | 5 | 10 | 3 | 1 | 5 | 8 | 2 | 0 | 4 |
| 1387 | 3 | 2 | 2 | 8 | 0 | 2 | 6 | 1 | 10 | 8 | 10 | 11 | 9 | 8 |
| 1388 | 4 | 3 | 6 | 2 | 1 | 8 | 0 | 7 | 2 | 1 | 9 | 8 | 10 | 6 |
| 1389 | 7 | 1 | 0 | 3 | 0 | 1 | 6 | 6 | 9 | 11 | 4 | 8 | 7 | 11 |
| 1390 | 10 | 11 | 7 | 5 | 1 | 2 | 3 | 4 | 2 | 4 | 0 | 1 | 6 | 9 |
| 1391 | 1 | 2 | 1 | 4 | 0 | 6 | 6 | 7 | 11 | 7 | 4 | 1 | 10 | 7 |
| 1392 | 3 | 10 | 3 | 3 | 10 | 1 | 4 | 2 | 2 | 6 | 4 | 9 | 8 | 9 |
| 1393 | 11 | 4 | 9 | 5 | 6 | 5 | 6 | 3 | 7 | 7 | 6 | 5 | 2 | 11 |
| 1394 | 10 | 1 | 1 | 6 | 9 | 2 | 1 | 7 | 2 | 8 | 2 | 4 | 0 | 2 |
| 1395 | 11 | 0 | 9 | 9 | 8 | 11 | 3 | 6 | 2 | 0 | 0 | 7 | 10 | 10 |
| 1396 | 4 | 9 | 1 | 3 | 0 | 0 | 4 | 1 | 9 | 10 | 11 | 2 | 6 | 5 |
| 1397 | 10 | 10 | 0 | 1 | 3 | 9 | 2 | 3 | 7 | 2 | 3 | 8 | 4 | 3 |
| 1398 | 3 | 5 | 6 | 1 | 11 | 5 | 3 | 4 | 0 | 9 | 8 | 4 | 3 | 3 |
| 1399 | 2 | 2 | 10 | 1 | 0 | 6 | 11 | 10 | 1 | 10 | 0 | 11 | 8 | 0 |
| 1400 | 7 | 0 | 4 | 11 | 3 | 7 | 11 | 9 | 9 | 8 | 3 | 1 | 6 | 8 |
| 1401 | 1 | 5 | 2 | 1 | 6 | 9 | 10 | 7 | 9 | 6 | 5 | 1 | 11 | 0 |
| 1402 | 6 | 8 | 10 | 0 | 0 | 10 | 2 | 7 | 9 | 8 | 5 | 11 | 1 | 6 |
| 1403 | 9 | 9 | 0 | 9 | 11 | 10 | 10 | 10 | 3 | 1 | 10 | 8 | 11 | 9 |
| 1404 | 6 | 4 | 0 | 2 | 2 | 8 | 1 | 11 | 11 | 8 | 1 | 5 | 2 | 6 |
| 1405 | 3 | 3 | 2 | 4 | 9 | 9 | 0 | 7 | 8 | 2 | 8 | 7 | 0 | 11 |
| 1406 | 11 | 0 | 5 | 9 | 6 | 10 | 9 | 8 | 4 | 11 | 4 | 5 | 5 | 2 |
| 1407 | 6 | 6 | 8 | 0 | 7 | 11 | 9 | 6 | 9 | 10 | 1 | 10 | 4 | 9 |
| 1408 | 4 | 10 | 1 | 4 | 3 | 1 | 0 | 6 | 11 | 11 | 7 | 3 | 11 | 3 |
| 1409 | 3 | 6 | 0 | 2 | 6 | 7 | 4 | 9 | 0 | 0 | 4 | 1 | 10 | 3 |
| 1410 | 4 | 3 | 11 | 0 | 9 | 2 | 4 | 9 | 5 | 2 | 4 | 10 | 8 | 8 |
| 1411 | 2 | 10 | 9 | 6 | 5 | 9 | 3 | 9 | 9 | 9 | 4 | 2 | 3 | 5 |
| 1412 | 2 | 1 | 2 | 10 | 10 | 6 | 9 | 1 | 8 | 4 | 5 | 7 | 11 | 1 |
| 1413 | 1 | 11 | 10 | 6 | 6 | 5 | 8 | 5 | 4 | 7 | 4 | 7 | 6 | 9 |
| 1414 | 10 | 5 | 8 | 11 | 6 | 10 | 1 | 1 | 1 | 6 | 1 | 7 | 10 | 1 |
| 1415 | 2 | 9 | 0 | 4 | 5 | 7 | 10 | 0 | 7 | 5 | 8 | 0 | 7 | 3 |
| 1416 | 8 | 11 | 9 | 3 | 5 | 10 | 5 | 0 | 4 | 7 | 11 | 6 | 11 | 11 |
| 1417 | 9 | 1 | 4 | 0 | 5 | 3 | 8 | 7 | 0 | 2 | 0 | 1 | 4 | 1 |
| 1418 | 6 | 6 | 3 | 3 | 11 | 2 | 11 | 7 | 3 | 4 | 6 | 7 | 9 | 4 |
| 1419 | 6 | 9 | 2 | 4 | 9 | 4 | 7 | 11 | 6 | 11 | 3 | 1 | 3 | 0 |
| 1420 | 10 | 0 | 7 | 1 | 3 | 0 | 0 | 0 | 1 | 3 | 7 | 4 | 10 | 10 |
| 1421 | 7 | 5 | 5 | 2 | 7 | 5 | 9 | 10 | 11 | 5 | 4 | 4 | 2 | 1 |
| 1422 | 2 | 0 | 1 | 7 | 5 | 8 | 1 | 8 | 10 | 4 | 6 | 7 | 0 | 6 |
| 1423 | 6 | 5 | 2 | 9 | 8 | 1 | 9 | 0 | 1 | 1 | 10 | 4 | 5 | 4 |
| 1424 | 1 | 2 | 11 | 8 | 8 | 8 | 5 | 9 | 10 | 6 | 1 | 4 | 2 | 1 |
| 1425 | 3 | 0 | 10 | 7 | 10 | 4 | 7 | 4 | 2 | 3 | 8 | 2 | 9 | 2 |
| 1426 | 8 | 7 | 1 | 2 | 6 | 4 | 2 | 8 | 4 | 3 | 7 | 8 | 1 | 3 |
| 1427 | 6 | 4 | 8 | 11 | 4 | 0 | 7 | 2 | 5 | 3 | 10 | 7 | 9 | 8 |
| 1428 | 10 | 9 | 3 | 9 | 10 | 2 | 8 | 6 | 8 | 0 | 2 | 2 | 9 | 3 |
| 1429 | 5 | 4 | 10 | 4 | 5 | 11 | 9 | 0 | 10 | 0 | 6 | 11 | 9 | 4 |
| 1430 | 9 | 5 | 3 | 11 | 5 | 1 | 1 | 4 | 4 | 1 | 11 | 8 | 4 | 6 |
| 1431 | 8 | 10 | 9 | 2 | 8 | 5 | 2 | 11 | 2 | 2 | 10 | 5 | 6 | 4 |
| 1432 | 11 | 9 | 1 | 7 | 2 | 2 | 4 | 10 | 2 | 4 | 5 | 0 | 9 | 11 |
| 1433 | 0 | 1 | 5 | 11 | 7 | 3 | 8 | 6 | 5 | 1 | 5 | 7 | 1 | 11 |
| 1434 | 8 | 3 | 4 | 7 | 1 | 9 | 0 | 8 | 4 | 0 | 0 | 0 | 9 | 1 |
| 1435 | 0 | 2 | 11 | 7 | 7 | 1 | 1 | 9 | 7 | 7 | 3 | 6 | 5 | 9 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1436 | 3 | 0 | 8 | 1 | 10 | 0 | 1 | 6 | 7 | 9 | 4 | 1 | 4 | 0 |
| 1437 | 4 | 9 | 7 | 9 | 5 | 9 | 2 | 10 | 0 | 2 | 11 | 11 | 10 | 10 |
| 1438 | 4 | 8 | 8 | 7 | 3 | 3 | 3 | 7 | 3 | 5 | 5 | 2 | 10 | 5 |
| 1439 | 5 | 5 | 2 | 3 | 0 | 4 | 4 | 6 | 5 | 2 | 0 | 6 | 5 | 2 |
| 1440 | 2 | 10 | 3 | 1 | 10 | 3 | 1 | 8 | 5 | 3 | 11 | 5 | 10 | 8 |
| 1441 | 8 | 8 | 6 | 5 | 10 | 2 | 1 | 7 | 0 | 11 | 9 | 0 | 2 | 3 |
| 1442 | 2 | 11 | 4 | 3 | 4 | 10 | 9 | 11 | 0 | 8 | 3 | 11 | 5 | 3 |
| 1443 | 7 | 3 | 11 | 10 | 0 | 4 | 1 | 3 | 1 | 3 | 0 | 10 | 3 | 1 |
| 1444 | 3 | 0 | 1 | 6 | 4 | 2 | 8 | 6 | 3 | 5 | 7 | 10 | 7 | 10 |
| 1445 | 8 | 2 | 9 | 7 | 9 | 8 | 9 | 3 | 3 | 4 | 9 | 8 | 3 | 7 |
| 1446 | 6 | 7 | 3 | 9 | 9 | 7 | 9 | 4 | 7 | 6 | 2 | 9 | 4 | 11 |
| 1447 | 6 | 9 | 2 | 5 | 5 | 10 | 0 | 9 | 10 | 3 | 9 | 4 | 4 | 2 |
| 1448 | 1 | 2 | 9 | 8 | 5 | 1 | 6 | 11 | 0 | 5 | 7 | 10 | 8 | 4 |
| 1449 | 5 | 10 | 4 | 5 | 9 | 4 | 8 | 5 | 5 | 10 | 2 | 3 | 0 | 0 |
| 1450 | 6 | 0 | 2 | 1 | 10 | 9 | 5 | 10 | 3 | 0 | 3 | 9 | 2 | 7 |
| 1451 | 7 | 3 | 6 | 6 | 9 | 5 | 7 | 1 | 9 | 0 | 11 | 5 | 11 | 2 |
| 1452 | 1 | 1 | 1 | 11 | 2 | 1 | 7 | 2 | 0 | 0 | 9 | 2 | 6 | 11 |
| 1453 | 11 | 2 | 0 | 5 | 10 | 1 | 10 | 5 | 9 | 1 | 6 | 6 | 10 | 5 |
| 1454 | 6 | 3 | 10 | 11 | 8 | 8 | 3 | 9 | 3 | 7 | 0 | 8 | 8 | 5 |
| 1455 | 11 | 6 | 1 | 2 | 1 | 0 | 10 | 11 | 6 | 3 | 0 | 10 | 11 | 4 |
| 1456 | 10 | 5 | 4 | 8 | 8 | 6 | 8 | 2 | 0 | 0 | 8 | 9 | 5 | 5 |
| 1457 | 10 | 6 | 4 | 3 | 8 | 5 | 9 | 4 | 6 | 9 | 9 | 5 | 2 | 6 |
| 1458 | 8 | 10 | 7 | 3 | 0 | 11 | 10 | 10 | 9 | 9 | 3 | 5 | 4 | 7 |
| 1459 | 4 | 9 | 10 | 10 | 11 | 0 | 10 | 8 | 8 | 0 | 9 | 9 | 10 | 7 |
| 1460 | 8 | 5 | 0 | 10 | 10 | 0 | 2 | 0 | 9 | 10 | 8 | 10 | 9 | 8 |
| 1461 | 9 | 11 | 3 | 4 | 6 | 4 | 11 | 1 | 11 | 9 | 2 | 11 | 4 | 3 |
| 1462 | 3 | 9 | 3 | 7 | 1 | 0 | 5 | 3 | 7 | 8 | 5 | 5 | 7 | 9 |
| 1463 | 11 | 11 | 3 | 7 | 4 | 9 | 1 | 1 | 6 | 0 | 4 | 10 | 2 | 2 |
| 1464 | 9 | 8 | 10 | 4 | 4 | 4 | 6 | 5 | 2 | 7 | 7 | 0 | 7 | 4 |
| 1465 | 9 | 3 | 7 | 1 | 11 | 1 | 7 | 3 | 5 | 11 | 6 | 4 | 2 | 6 |
| 1466 | 0 | 11 | 0 | 0 | 6 | 7 | 0 | 1 | 8 | 11 | 8 | 6 | 2 | 8 |
| 1467 | 10 | 11 | 11 | 7 | 2 | 10 | 2 | 2 | 10 | 3 | 1 | 5 | 8 | 0 |
| 1468 | 4 | 7 | 5 | 6 | 7 | 4 | 3 | 9 | 7 | 3 | 9 | 7 | 11 | 8 |
| 1469 | 4 | 9 | 7 | 1 | 4 | 3 | 10 | 2 | 2 | 8 | 8 | 3 | 5 | 11 |
| 1470 | 1 | 1 | 8 | 0 | 9 | 1 | 10 | 8 | 7 | 3 | 7 | 11 | 10 | 9 |
| 1471 | 11 | 8 | 0 | 1 | 11 | 8 | 5 | 11 | 1 | 11 | 8 | 10 | 4 | 10 |
| 1472 | 3 | 2 | 5 | 0 | 5 | 2 | 3 | 6 | 9 | 3 | 3 | 1 | 1 | 7 |
| 1473 | 7 | 7 | 9 | 5 | 8 | 8 | 11 | 7 | 1 | 10 | 1 | 0 | 10 | 11 |
| 1474 | 5 | 6 | 10 | 11 | 1 | 1 | 8 | 8 | 8 | 11 | 10 | 2 | 1 | 9 |
| 1475 | 6 | 7 | 1 | 5 | 11 | 0 | 6 | 7 | 0 | 6 | 3 | 11 | 3 | 9 |
| 1476 | 2 | 7 | 3 | 1 | 2 | 9 | 2 | 5 | 0 | 7 | 9 | 0 | 0 | 1 |
| 1477 | 3 | 3 | 0 | 5 | 2 | 4 | 8 | 11 | 10 | 0 | 7 | 11 | 4 | 9 |
| 1478 | 7 | 1 | 1 | 7 | 9 | 11 | 10 | 1 | 0 | 6 | 5 | 10 | 7 | 5 |
| 1479 | 4 | 7 | 6 | 8 | 7 | 7 | 5 | 8 | 8 | 6 | 4 | 8 | 0 | 10 |
| 1480 | 11 | 3 | 6 | 10 | 6 | 8 | 11 | 6 | 11 | 4 | 3 | 1 | 9 | 9 |
| 1481 | 7 | 2 | 10 | 10 | 3 | 10 | 9 | 8 | 9 | 2 | 11 | 6 | 0 | 3 |
| 1482 | 5 | 5 | 7 | 5 | 10 | 11 | 6 | 7 | 3 | 0 | 11 | 8 | 10 | 1 |
| 1483 | 6 | 7 | 7 | 3 | 1 | 3 | 7 | 0 | 3 | 9 | 1 | 0 | 8 | 6 |
| 1484 | 6 | 8 | 0 | 3 | 7 | 9 | 1 | 7 | 5 | 9 | 4 | 9 | 5 | 8 |
| 1485 | 4 | 0 | 3 | 3 | 1 | 3 | 10 | 9 | 5 | 7 | 10 | 6 | 1 | 0 |
| 1486 | 5 | 3 | 1 | 6 | 7 | 7 | 7 | 2 | 10 | 7 | 1 | 6 | 7 | 6 |
| 1487 | 5 | 11 | 5 | 9 | 10 | 3 | 0 | 8 | 0 | 7 | 0 | 4 | 0 | 9 |
| 1488 | 10 | 8 | 8 | 9 | 8 | 11 | 4 | 7 | 8 | 3 | 6 | 10 | 11 | 1 |
| 1489 | 9 | 5 | 4 | 7 | 5 | 11 | 7 | 1 | 8 | 8 | 8 | 3 | 8 | 4 |
| 1490 | 7 | 5 | 0 | 0 | 0 | 11 | 10 | 4 | 1 | 4 | 10 | 0 | 0 | 6 |
| 1491 | 6 | 1 | 1 | 3 | 8 | 5 | 5 | 10 | 1 | 2 | 2 | 11 | 11 | 8 |
| 1492 | 7 | 4 | 9 | 8 | 2 | 8 | 9 | 8 | 6 | 5 | 5 | 3 | 9 | 8 |
| 1493 | 9 | 10 | 6 | 3 | 4 | 9 | 11 | 0 | 6 | 8 | 10 | 1 | 1 | 5 |
| 1494 | 9 | 6 | 2 | 2 | 1 | 1 | 0 | 4 | 5 | 10 | 4 | 5 | 6 | 11 |
| 1495 | 0 | 0 | 2 | 8 | 9 | 1 | 10 | 0 | 3 | 4 | 2 | 10 | 1 | 8 |
| 1496 | 8 | 9 | 5 | 8 | 9 | 7 | 11 | 10 | 4 | 10 | 8 | 5 | 3 | 1 |
| 1497 | 5 | 5 | 1 | 10 | 3 | 2 | 1 | 5 | 6 | 4 | 8 | 11 | 2 | 7 |
| 1498 | 11 | 8 | 8 | 6 | 6 | 9 | 2 | 9 | 6 | 5 | 2 | 0 | 5 | 9 |
| 1499 | 9 | 2 | 3 | 8 | 3 | 11 | 8 | 1 | 7 | 7 | 7 | 1 | 3 | 2 |
| 1500 | 10 | 2 | 8 | 1 | 10 | 6 | 5 | 1 | 6 | 5 | 6 | 8 | 9 | 10 |
| 1501 | 10 | 9 | 6 | 0 | 4 | 9 | 0 | 6 | 10 | 4 | 11 | 10 | 3 | 1 |
| 1502 | 8 | 2 | 7 | 10 | 11 | 1 | 0 | 7 | 3 | 7 | 5 | 3 | 0 | 8 |
| 1503 | 7 | 3 | 10 | 2 | 4 | 0 | 7 | 6 | 1 | 7 | 5 | 4 | 4 | 11 |
| 1504 | 6 | 8 | 6 | 10 | 11 | 8 | 4 | 0 | 7 | 1 | 2 | 2 | 11 | 5 |
| 1505 | 7 | 1 | 4 | 8 | 6 | 8 | 6 | 0 | 0 | 8 | 1 | 2 | 0 | 0 |
| 1506 | 8 | 1 | 9 | 9 | 4 | 0 | 6 | 9 | 0 | 1 | 8 | 5 | 11 | 6 |
| 1507 | 5 | 3 | 11 | 2 | 3 | 9 | 9 | 10 | 6 | 7 | 2 | 1 | 11 | 10 |
| 1508 | 2 | 8 | 2 | 3 | 3 | 8 | 11 | 1 | 11 | 3 | 9 | 0 | 6 | 7 |
| 1509 | 8 | 4 | 7 | 1 | 0 | 7 | 8 | 4 | 2 | 2 | 9 | 2 | 1 | 1 |
| 1510 | 11 | 10 | 7 | 6 | 8 | 3 | 11 | 8 | 4 | 8 | 6 | 11 | 8 | 4 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1511 | 5 | 8 | 9 | 8 | 8 | 6 | 1 | 0 | 7 | 8 | 0 | 8 | 4 | 8 |
| 1512 | 11 | 3 | 5 | 4 | 0 | 2 | 11 | 11 | 7 | 0 | 9 | 4 | 7 | 4 |
| 1513 | 9 | 4 | 7 | 9 | 6 | 2 | 9 | 10 | 2 | 9 | 7 | 6 | 2 | 0 |
| 1514 | 0 | 8 | 11 | 2 | 1 | 4 | 5 | 6 | 2 | 9 | 0 | 5 | 1 | 7 |
| 1515 | 7 | 10 | 9 | 4 | 0 | 6 | 10 | 0 | 0 | 10 | 9 | 7 | 11 | 2 |
| 1516 | 4 | 2 | 6 | 1 | 10 | 11 | 2 | 0 | 10 | 9 | 7 | 9 | 1 | 11 |
| 1517 | 11 | 7 | 7 | 11 | 7 | 5 | 10 | 10 | 4 | 6 | 11 | 1 | 5 | 5 |
| 1518 | 10 | 6 | 0 | 7 | 0 | 1 | 11 | 4 | 2 | 7 | 5 | 10 | 4 | 4 |
| 1519 | 1 | 6 | 1 | 5 | 10 | 8 | 8 | 2 | 7 | 1 | 1 | 9 | 9 | 8 |
| 1520 | 10 | 0 | 10 | 2 | 2 | 2 | 6 | 1 | 8 | 6 | 3 | 5 | 1 | 2 |
| 1521 | 3 | 5 | 2 | 4 | 6 | 11 | 1 | 2 | 2 | 1 | 6 | 5 | 6 | 5 |
| 1522 | 4 | 1 | 10 | 8 | 5 | 6 | 9 | 6 | 6 | 11 | 2 | 6 | 4 | 6 |
| 1523 | 7 | 11 | 5 | 4 | 3 | 7 | 1 | 2 | 11 | 6 | 9 | 2 | 5 | 10 |
| 1524 | 8 | 8 | 8 | 9 | 10 | 8 | 7 | 3 | 5 | 9 | 3 | 11 | 6 | 5 |
| 1525 | 8 | 9 | 7 | 0 | 7 | 4 | 5 | 2 | 11 | 10 | 3 | 9 | 0 | 4 |
| 1526 | 2 | 1 | 8 | 11 | 4 | 2 | 5 | 4 | 11 | 11 | 4 | 3 | 3 | 1 |
| 1527 | 1 | 7 | 0 | 0 | 3 | 2 | 3 | 9 | 3 | 10 | 6 | 3 | 0 | 2 |
| 1528 | 2 | 4 | 11 | 11 | 11 | 3 | 11 | 7 | 10 | 5 | 10 | 3 | 8 | 6 |
| 1529 | 3 | 2 | 1 | 3 | 9 | 0 | 0 | 3 | 0 | 1 | 1 | 3 | 5 | 1 |
| 1530 | 4 | 9 | 0 | 11 | 3 | 4 | 0 | 2 | 9 | 5 | 9 | 5 | 3 | 9 |
| 1531 | 7 | 3 | 0 | 9 | 7 | 0 | 8 | 4 | 11 | 8 | 0 | 3 | 5 | 4 |
| 1532 | 9 | 10 | 1 | 9 | 1 | 5 | 10 | 5 | 10 | 2 | 8 | 1 | 3 | 6 |
| 1533 | 9 | 3 | 2 | 10 | 2 | 6 | 8 | 0 | 4 | 5 | 11 | 9 | 0 | 7 |
| 1534 | 5 | 2 | 11 | 4 | 1 | 3 | 0 | 1 | 6 | 8 | 1 | 2 | 7 | 5 |
| 1535 | 7 | 7 | 4 | 8 | 7 | 10 | 8 | 1 | 2 | 4 | 10 | 7 | 6 | 3 |
| 1536 | 5 | 8 | 0 | 9 | 11 | 11 | 4 | 5 | 9 | 0 | 10 | 2 | 3 | 4 |
| 1537 | 3 | 0 | 4 | 11 | 8 | 7 | 7 | 0 | 6 | 1 | 8 | 9 | 7 | 11 |
| 1538 | 4 | 9 | 1 | 2 | 5 | 6 | 1 | 11 | 4 | 10 | 9 | 7 | 5 | 1 |
| 1539 | 1 | 11 | 3 | 4 | 4 | 0 | 0 | 3 | 7 | 7 | 4 | 11 | 1 | 5 |
| 1540 | 2 | 3 | 6 | 1 | 0 | 9 | 6 | 8 | 0 | 8 | 2 | 1 | 9 | 3 |
| 1541 | 9 | 7 | 8 | 6 | 6 | 4 | 2 | 6 | 1 | 9 | 8 | 3 | 0 | 10 |
| 1542 | 1 | 3 | 5 | 11 | 10 | 2 | 3 | 2 | 1 | 4 | 0 | 2 | 10 | 0 |
| 1543 | 6 | 0 | 10 | 2 | 7 | 4 | 10 | 4 | 10 | 7 | 3 | 10 | 8 | 3 |
| 1544 | 2 | 2 | 9 | 10 | 5 | 5 | 8 | 1 | 5 | 3 | 3 | 5 | 2 | 9 |
| 1545 | 11 | 4 | 11 | 4 | 3 | 8 | 3 | 10 | 11 | 6 | 10 | 6 | 4 | 8 |
| 1546 | 10 | 6 | 8 | 10 | 7 | 0 | 7 | 8 | 4 | 5 | 1 | 2 | 11 | 7 |
| 1547 | 0 | 4 | 7 | 7 | 6 | 7 | 0 | 3 | 0 | 4 | 7 | 7 | 7 | 7 |
| 1548 | 8 | 11 | 0 | 8 | 1 | 1 | 4 | 7 | 10 | 3 | 11 | 0 | 4 | 3 |
| 1549 | 2 | 10 | 3 | 8 | 4 | 8 | 5 | 8 | 3 | 11 | 6 | 6 | 5 | 0 |
| 1550 | 6 | 1 | 9 | 7 | 11 | 9 | 9 | 2 | 3 | 8 | 5 | 3 | 1 | 11 |
| 1551 | 11 | 5 | 0 | 7 | 2 | 9 | 7 | 6 | 5 | 7 | 2 | 6 | 11 | 4 |
| 1552 | 9 | 8 | 2 | 1 | 3 | 3 | 2 | 2 | 0 | 4 | 11 | 8 | 2 | 4 |
| 1553 | 9 | 9 | 9 | 6 | 0 | 0 | 5 | 4 | 8 | 7 | 10 | 9 | 3 | 1 |
| 1554 | 10 | 2 | 11 | 9 | 1 | 10 | 9 | 5 | 1 | 7 | 9 | 9 | 7 | 7 |
| 1555 | 4 | 10 | 8 | 8 | 2 | 4 | 10 | 2 | 9 | 4 | 1 | 0 | 1 | 6 |
| 1556 | 8 | 9 | 7 | 6 | 4 | 9 | 11 | 6 | 7 | 0 | 9 | 8 | 6 | 11 |
| 1557 | 7 | 5 | 9 | 3 | 4 | 10 | 4 | 6 | 10 | 6 | 6 | 11 | 3 | 8 |
| 1558 | 2 | 5 | 7 | 0 | 9 | 1 | 11 | 0 | 8 | 11 | 3 | 4 | 7 | 8 |
| 1559 | 8 | 4 | 0 | 4 | 7 | 4 | 9 | 9 | 6 | 2 | 4 | 3 | 6 | 2 |
| 1560 | 6 | 0 | 2 | 0 | 11 | 5 | 4 | 10 | 4 | 1 | 1 | 7 | 10 | 2 |
| 1561 | 10 | 8 | 10 | 7 | 1 | 0 | 6 | 10 | 10 | 9 | 5 | 11 | 10 | 4 |
| 1562 | 5 | 6 | 9 | 3 | 7 | 6 | 3 | 10 | 1 | 0 | 2 | 0 | 7 | 10 |
| 1563 | 2 | 7 | 11 | 6 | 1 | 7 | 7 | 7 | 3 | 10 | 7 | 8 | 9 | 8 |
| 1564 | 1 | 2 | 1 | 1 | 6 | 2 | 4 | 8 | 11 | 5 | 10 | 3 | 6 | 1 |
| 1565 | 8 | 6 | 7 | 11 | 6 | 5 | 6 | 5 | 11 | 9 | 6 | 4 | 4 | 6 |
| 1566 | 3 | 7 | 5 | 7 | 6 | 1 | 8 | 8 | 7 | 2 | 0 | 11 | 4 | 2 |
| 1567 | 6 | 1 | 10 | 4 | 1 | 2 | 2 | 11 | 0 | 3 | 0 | 4 | 6 | 7 |
| 1568 | 0 | 3 | 6 | 10 | 8 | 3 | 0 | 4 | 11 | 2 | 9 | 5 | 0 | 1 |
| 1569 | 2 | 0 | 8 | 4 | 11 | 3 | 10 | 6 | 2 | 5 | 11 | 9 | 3 | 5 |
| 1570 | 6 | 3 | 8 | 9 | 9 | 6 | 6 | 3 | 8 | 4 | 5 | 8 | 5 | 5 |
| 1571 | 9 | 2 | 7 | 7 | 10 | 3 | 10 | 1 | 4 | 1 | 2 | 3 | 9 | 0 |
| 1572 | 4 | 10 | 10 | 11 | 0 | 11 | 11 | 8 | 3 | 1 | 1 | 7 | 7 | 1 |
| 1573 | 5 | 7 | 10 | 1 | 9 | 11 | 2 | 9 | 8 | 5 | 1 | 6 | 8 | 10 |
| 1574 | 2 | 8 | 11 | 0 | 9 | 5 | 9 | 9 | 7 | 0 | 10 | 5 | 6 | 10 |
| 1575 | 10 | 6 | 8 | 5 | 9 | 4 | 3 | 7 | 0 | 8 | 11 | 3 | 7 | 3 |
| 1576 | 11 | 0 | 11 | 4 | 9 | 0 | 6 | 1 | 8 | 8 | 6 | 11 | 0 | 6 |
| 1577 | 8 | 0 | 4 | 10 | 7 | 8 | 3 | 5 | 9 | 10 | 4 | 9 | 3 | 10 |
| 1578 | 2 | 5 | 1 | 2 | 4 | 6 | 8 | 1 | 11 | 11 | 7 | 9 | 9 | 11 |
| 1579 | 0 | 5 | 6 | 9 | 8 | 4 | 7 | 3 | 6 | 0 | 2 | 8 | 2 | 9 |
| 1580 | 10 | 10 | 2 | 6 | 3 | 11 | 9 | 10 | 9 | 5 | 8 | 1 | 10 | 8 |
| 1581 | 9 | 7 | 4 | 0 | 6 | 0 | 9 | 10 | 5 | 11 | 2 | 8 | 6 | 5 |
| 1582 | 8 | 7 | 8 | 2 | 0 | 6 | 9 | 1 | 6 | 4 | 1 | 1 | 0 | 4 |
| 1583 | 10 | 10 | 2 | 2 | 9 | 6 | 6 | 6 | 11 | 1 | 9 | 2 | 6 | 4 |
| 1584 | 4 | 10 | 1 | 0 | 10 | 6 | 2 | 5 | 2 | 2 | 3 | 2 | 11 | 5 |
| 1585 | 11 | 4 | 2 | 0 | 4 | 1 | 1 | 8 | 11 | 7 | 6 | 7 | 8 | 7 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1586 | 9 | 0 | 7 | 10 | 0 | 1 | 10 | 11 | 5 | 0 | 1 | 8 | 8 | 4 |
| 1587 | 2 | 11 | 6 | 6 | 1 | 3 | 0 | 6 | 5 | 11 | 8 | 7 | 11 | 7 |
| 1588 | 11 | 11 | 1 | 10 | 9 | 5 | 1 | 8 | 6 | 9 | 10 | 6 | 5 | 5 |
| 1589 | 8 | 1 | 5 | 4 | 10 | 10 | 11 | 8 | 0 | 9 | 8 | 2 | 5 | 3 |
| 1590 | 0 | 4 | 11 | 6 | 1 | 4 | 1 | 4 | 8 | 0 | 9 | 6 | 8 | 5 |
| 1591 | 2 | 5 | 5 | 6 | 0 | 8 | 3 | 10 | 2 | 5 | 2 | 7 | 1 | 2 |
| 1592 | 5 | 7 | 11 | 8 | 10 | 5 | 7 | 5 | 4 | 9 | 1 | 5 | 5 | 1 |
| 1593 | 10 | 6 | 5 | 5 | 5 | 0 | 1 | 6 | 7 | 11 | 0 | 8 | 8 | 4 |
| 1594 | 6 | 2 | 0 | 11 | 5 | 3 | 0 | 5 | 4 | 4 | 7 | 9 | 4 | 10 |
| 1595 | 2 | 4 | 2 | 2 | 0 | 3 | 5 | 6 | 8 | 2 | 5 | 1 | 4 | 9 |
| 1596 | 3 | 3 | 6 | 0 | 10 | 11 | 11 | 4 | 7 | 6 | 4 | 3 | 6 | 3 |
| 1597 | 6 | 2 | 10 | 6 | 4 | 8 | 6 | 2 | 4 | 6 | 5 | 1 | 0 | 3 |
| 1598 | 5 | 6 | 8 | 4 | 5 | 2 | 4 | 8 | 3 | 7 | 8 | 7 | 10 | 10 |
| 1599 | 5 | 3 | 11 | 7 | 11 | 6 | 5 | 1 | 4 | 8 | 0 | 7 | 2 | 9 |
| 1600 | 8 | 4 | 1 | 9 | 5 | 5 | 6 | 7 | 5 | 6 | 8 | 0 | 8 | 2 |
| 1601 | 4 | 1 | 8 | 7 | 8 | 0 | 4 | 5 | 2 | 7 | 4 | 6 | 5 | 0 |
| 1602 | 4 | 4 | 4 | 3 | 9 | 11 | 4 | 0 | 10 | 10 | 10 | 8 | 5 | 6 |
| 1603 | 6 | 3 | 1 | 2 | 6 | 2 | 10 | 0 | 3 | 11 | 9 | 2 | 7 | 2 |
| 1604 | 10 | 4 | 3 | 3 | 2 | 4 | 6 | 8 | 9 | 3 | 3 | 9 | 5 | 9 |
| 1605 | 3 | 1 | 7 | 3 | 0 | 8 | 5 | 0 | 11 | 0 | 6 | 10 | 2 | 9 |
| 1606 | 5 | 2 | 1 | 11 | 4 | 1 | 4 | 4 | 9 | 2 | 1 | 0 | 11 | 2 |
| 1607 | 3 | 11 | 10 | 5 | 11 | 7 | 3 | 5 | 7 | 2 | 5 | 2 | 10 | 3 |
| 1608 | 8 | 7 | 11 | 10 | 0 | 10 | 11 | 10 | 8 | 8 | 5 | 7 | 10 | 8 |
| 1609 | 11 | 3 | 9 | 5 | 3 | 2 | 0 | 11 | 3 | 5 | 8 | 9 | 6 | 11 |
| 1610 | 11 | 10 | 4 | 4 | 6 | 8 | 1 | 1 | 7 | 2 | 9 | 3 | 11 | 1 |
| 1611 | 11 | 6 | 8 | 2 | 0 | 9 | 11 | 9 | 9 | 6 | 3 | 11 | 8 | 5 |
| 1612 | 8 | 7 | 3 | 11 | 3 | 5 | 7 | 3 | 10 | 7 | 8 | 6 | 2 | 7 |
| 1613 | 1 | 11 | 5 | 2 | 8 | 9 | 5 | 11 | 1 | 1 | 7 | 9 | 8 | 2 |
| 1614 | 0 | 0 | 4 | 4 | 1 | 10 | 5 | 8 | 2 | 10 | 5 | 4 | 8 | 0 |
| 1615 | 4 | 8 | 4 | 1 | 10 | 1 | 1 | 7 | 7 | 8 | 1 | 7 | 6 | 6 |
| 1616 | 7 | 2 | 9 | 11 | 11 | 7 | 0 | 10 | 3 | 1 | 11 | 0 | 2 | 3 |
| 1617 | 5 | 2 | 7 | 9 | 4 | 6 | 10 | 8 | 2 | 5 | 7 | 11 | 1 | 10 |
| 1618 | 9 | 5 | 7 | 2 | 1 | 5 | 8 | 0 | 1 | 9 | 5 | 10 | 5 | 2 |
| 1619 | 8 | 3 | 9 | 1 | 5 | 0 | 7 | 10 | 1 | 4 | 7 | 6 | 1 | 5 |
| 1620 | 0 | 8 | 9 | 8 | 7 | 0 | 3 | 11 | 7 | 11 | 4 | 1 | 0 | 3 |
| 1621 | 6 | 1 | 7 | 1 | 2 | 8 | 7 | 10 | 2 | 10 | 11 | 8 | 5 | 7 |
| 1622 | 5 | 9 | 5 | 0 | 3 | 11 | 10 | 9 | 2 | 11 | 11 | 0 | 10 | 4 |
| 1623 | 9 | 2 | 5 | 0 | 0 | 10 | 2 | 3 | 7 | 6 | 10 | 6 | 0 | 4 |
| 1624 | 1 | 3 | 2 | 5 | 2 | 10 | 6 | 4 | 7 | 0 | 0 | 4 | 0 | 8 |
| 1625 | 0 | 2 | 6 | 0 | 6 | 1 | 3 | 9 | 4 | 10 | 0 | 2 | 9 | 7 |
| 1626 | 8 | 2 | 5 | 2 | 7 | 6 | 5 | 2 | 10 | 9 | 10 | 5 | 2 | 0 |
| 1627 | 7 | 1 | 3 | 8 | 0 | 6 | 9 | 10 | 3 | 6 | 10 | 4 | 9 | 5 |
| 1628 | 10 | 0 | 5 | 0 | 0 | 2 | 6 | 7 | 11 | 10 | 6 | 0 | 3 | 1 |
| 1629 | 10 | 9 | 10 | 8 | 2 | 3 | 9 | 0 | 6 | 7 | 1 | 4 | 6 | 0 |
| 1630 | 4 | 6 | 9 | 10 | 2 | 2 | 11 | 2 | 10 | 2 | 2 | 1 | 2 | 8 |
| 1631 | 5 | 1 | 6 | 11 | 4 | 8 | 8 | 1 | 8 | 7 | 11 | 5 | 7 | 6 |
| 1632 | 1 | 8 | 1 | 9 | 0 | 9 | 7 | 7 | 3 | 0 | 6 | 5 | 0 | 0 |
| 1633 | 11 | 4 | 4 | 1 | 11 | 0 | 3 | 11 | 5 | 0 | 7 | 2 | 11 | 2 |
| 1634 | 9 | 1 | 0 | 4 | 9 | 4 | 8 | 7 | 7 | 1 | 1 | 6 | 11 | 11 |
| 1635 | 11 | 9 | 10 | 7 | 10 | 1 | 6 | 1 | 9 | 11 | 0 | 0 | 1 | 1 |
| 1636 | 8 | 0 | 4 | 5 | 0 | 1 | 9 | 6 | 11 | 5 | 8 | 5 | 9 | 6 |
| 1637 | 11 | 11 | 0 | 11 | 8 | 1 | 9 | 5 | 3 | 6 | 5 | 10 | 11 | 6 |
| 1638 | 0 | 0 | 1 | 9 | 2 | 8 | 7 | 4 | 10 | 8 | 1 | 1 | 9 | 1 |
| 1639 | 9 | 11 | 10 | 11 | 10 | 3 | 8 | 2 | 10 | 9 | 9 | 6 | 1 | 8 |
| 1640 | 1 | 3 | 5 | 4 | 9 | 10 | 2 | 6 | 4 | 5 | 3 | 11 | 9 | 2 |
| 1641 | 1 | 0 | 7 | 8 | 1 | 6 | 7 | 5 | 0 | 6 | 4 | 6 | 0 | 11 |
| 1642 | 6 | 10 | 4 | 11 | 8 | 0 | 8 | 9 | 1 | 5 | 6 | 4 | 3 | 2 |
| 1643 | 2 | 10 | 10 | 9 | 8 | 8 | 1 | 10 | 5 | 7 | 4 | 0 | 9 | 9 |
| 1644 | 9 | 3 | 0 | 2 | 0 | 8 | 8 | 2 | 9 | 11 | 8 | 5 | 6 | 1 |
| 1645 | 8 | 11 | 2 | 9 | 2 | 11 | 8 | 7 | 1 | 1 | 3 | 8 | 0 | 6 |
| 1646 | 4 | 9 | 11 | 9 | 8 | 10 | 1 | 2 | 7 | 1 | 2 | 2 | 4 | 10 |
| 1647 | 9 | 8 | 9 | 11 | 5 | 1 | 5 | 2 | 11 | 8 | 4 | 11 | 10 | 5 |
| 1648 | 7 | 11 | 2 | 8 | 0 | 0 | 4 | 3 | 0 | 11 | 0 | 9 | 11 | 10 |
| 1649 | 10 | 1 | 7 | 8 | 11 | 7 | 6 | 4 | 7 | 5 | 4 | 11 | 4 | 1 |
| 1650 | 2 | 9 | 3 | 2 | 9 | 9 | 8 | 9 | 0 | 10 | 4 | 8 | 7 | 7 |
| 1651 | 3 | 6 | 10 | 10 | 8 | 9 | 4 | 3 | 1 | 4 | 11 | 4 | 7 | 6 |
| 1652 | 3 | 10 | 2 | 11 | 11 | 5 | 8 | 3 | 9 | 2 | 3 | 10 | 1 | 4 |
| 1653 | 10 | 0 | 8 | 1 | 4 | 11 | 9 | 4 | 8 | 1 | 2 | 11 | 7 | 0 |
| 1654 | 11 | 0 | 5 | 6 | 3 | 11 | 1 | 3 | 1 | 0 | 2 | 3 | 5 | 6 |
| 1655 | 11 | 1 | 9 | 6 | 2 | 4 | 0 | 6 | 0 | 6 | 11 | 5 | 10 | 2 |
| 1656 | 0 | 9 | 2 | 3 | 3 | 6 | 0 | 7 | 9 | 8 | 0 | 10 | 5 | 10 |
| 1657 | 2 | 8 | 3 | 7 | 6 | 8 | 4 | 10 | 9 | 6 | 0 | 5 | 11 | 3 |
| 1658 | 7 | 8 | 4 | 4 | 8 | 6 | 11 | 3 | 10 | 10 | 3 | 11 | 0 | 7 |
| 1659 | 1 | 6 | 10 | 8 | 4 | 11 | 11 | 11 | 1 | 11 | 0 | 3 | 4 | 5 |
| 1660 | 1 | 9 | 9 | 6 | 7 | 10 | 10 | 5 | 6 | 11 | 2 | 10 | 5 | 2 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1661 | 1 | 3 | 10 | 9 | 3 | 7 | 3 | 8 | 2 | 1 | 9 | 10 | 4 | 2 |
| 1662 | 1 | 4 | 0 | 2 | 6 | 10 | 6 | 3 | 3 | 8 | 3 | 1 | 3 | 10 |
| 1663 | 10 | 3 | 6 | 3 | 8 | 10 | 1 | 7 | 3 | 6 | 3 | 8 | 1 | 0 |
| 1664 | 6 | 5 | 8 | 5 | 2 | 0 | 0 | 10 | 8 | 6 | 8 | 10 | 0 | 1 |
| 1665 | 2 | 5 | 6 | 7 | 10 | 0 | 2 | 4 | 8 | 5 | 7 | 1 | 10 | 5 |
| 1666 | 10 | 3 | 1 | 9 | 11 | 3 | 1 | 3 | 7 | 2 | 6 | 7 | 7 | 11 |
| 1667 | 9 | 10 | 3 | 5 | 2 | 3 | 4 | 0 | 8 | 0 | 4 | 11 | 7 | 4 |
| 1668 | 4 | 0 | 2 | 7 | 7 | 9 | 2 | 2 | 11 | 1 | 6 | 9 | 9 | 9 |
| 1669 | 10 | 8 | 11 | 10 | 7 | 11 | 10 | 1 | 2 | 0 | 9 | 1 | 2 | 6 |
| 1670 | 3 | 10 | 0 | 1 | 7 | 0 | 4 | 9 | 11 | 11 | 5 | 8 | 1 | 9 |
| 1671 | 4 | 3 | 4 | 9 | 5 | 3 | 11 | 1 | 9 | 1 | 0 | 4 | 10 | 5 |
| 1672 | 5 | 1 | 11 | 1 | 2 | 3 | 1 | 4 | 3 | 4 | 6 | 4 | 1 | 1 |
| 1673 | 0 | 6 | 4 | 6 | 9 | 7 | 6 | 3 | 9 | 6 | 1 | 5 | 9 | 9 |
| 1674 | 4 | 2 | 9 | 9 | 3 | 4 | 2 | 0 | 11 | 4 | 3 | 7 | 7 | 10 |
| 1675 | 6 | 10 | 9 | 2 | 3 | 7 | 4 | 9 | 4 | 9 | 8 | 10 | 11 | 7 |
| 1676 | 5 | 1 | 0 | 1 | 6 | 11 | 7 | 2 | 1 | 8 | 4 | 9 | 2 | 6 |
| 1677 | 11 | 7 | 11 | 0 | 11 | 3 | 11 | 8 | 6 | 4 | 9 | 9 | 9 | 11 |
| 1678 | 4 | 2 | 0 | 10 | 1 | 6 | 3 | 11 | 9 | 8 | 10 | 4 | 4 | 6 |
| 1679 | 10 | 11 | 8 | 4 | 3 | 5 | 4 | 6 | 0 | 10 | 5 | 1 | 6 | 2 |
| 1680 | 5 | 10 | 7 | 7 | 5 | 10 | 9 | 6 | 1 | 3 | 10 | 7 | 5 | 11 |
| 1681 | 8 | 1 | 11 | 0 | 1 | 11 | 4 | 8 | 9 | 2 | 0 | 3 | 0 | 10 |
| 1682 | 8 | 11 | 7 | 0 | 11 | 4 | 10 | 1 | 10 | 6 | 10 | 4 | 1 | 2 |
| 1683 | 10 | 11 | 2 | 5 | 8 | 3 | 2 | 4 | 9 | 8 | 2 | 0 | 8 | 5 |
| 1684 | 5 | 9 | 6 | 7 | 3 | 3 | 5 | 10 | 7 | 5 | 4 | 10 | 11 | 11 |
| 1685 | 5 | 8 | 1 | 0 | 6 | 10 | 8 | 4 | 4 | 1 | 8 | 8 | 3 | 11 |
| 1686 | 4 | 9 | 6 | 11 | 9 | 0 | 9 | 9 | 4 | 3 | 8 | 0 | 4 | 11 |
| 1687 | 3 | 8 | 0 | 4 | 10 | 2 | 10 | 10 | 1 | 8 | 2 | 6 | 3 | 3 |
| 1688 | 1 | 6 | 5 | 9 | 9 | 1 | 8 | 5 | 2 | 4 | 6 | 1 | 6 | 8 |
| 1689 | 11 | 3 | 2 | 10 | 0 | 0 | 0 | 0 | 1 | 10 | 10 | 0 | 8 | 2 |
| 1690 | 7 | 6 | 1 | 2 | 3 | 1 | 1 | 3 | 8 | 3 | 5 | 6 | 9 | 2 |
| 1691 | 3 | 6 | 4 | 2 | 4 | 11 | 7 | 10 | 3 | 0 | 1 | 4 | 8 | 8 |
| 1692 | 7 | 4 | 5 | 6 | 10 | 2 | 5 | 9 | 9 | 1 | 11 | 6 | 6 | 1 |
| 1693 | 2 | 10 | 4 | 0 | 11 | 2 | 0 | 4 | 1 | 7 | 5 | 7 | 4 | 3 |
| 1694 | 11 | 1 | 1 | 8 | 6 | 9 | 4 | 1 | 8 | 10 | 3 | 10 | 4 | 8 |
| 1695 | 7 | 4 | 2 | 1 | 2 | 11 | 10 | 3 | 11 | 2 | 7 | 11 | 2 | 5 |
| 1696 | 1 | 0 | 9 | 3 | 2 | 0 | 4 | 3 | 9 | 2 | 8 | 5 | 8 | 0 |
| 1697 | 1 | 8 | 3 | 5 | 8 | 5 | 8 | 8 | 1 | 7 | 3 | 1 | 7 | 1 |
| 1698 | 9 | 4 | 4 | 8 | 10 | 10 | 2 | 10 | 11 | 4 | 8 | 11 | 1 | 0 |
| 1699 | 9 | 1 | 11 | 7 | 4 | 8 | 6 | 11 | 2 | 0 | 10 | 11 | 11 | 5 |
| 1700 | 5 | 9 | 3 | 11 | 1 | 2 | 2 | 7 | 6 | 0 | 6 | 3 | 4 | 8 |
| 1701 | 1 | 5 | 5 | 5 | 10 | 0 | 5 | 3 | 6 | 3 | 9 | 3 | 9 | 3 |
| 1702 | 0 | 7 | 11 | 7 | 8 | 2 | 1 | 11 | 3 | 8 | 4 | 10 | 3 | 7 |
| 1703 | 5 | 10 | 0 | 6 | 0 | 7 | 8 | 11 | 6 | 4 | 3 | 0 | 5 | 8 |
| 1704 | 8 | 2 | 8 | 4 | 9 | 11 | 2 | 2 | 1 | 10 | 7 | 2 | 3 | 8 |
| 1705 | 3 | 7 | 4 | 4 | 7 | 2 | 1 | 5 | 8 | 9 | 11 | 1 | 6 | 11 |
| 1706 | 11 | 6 | 11 | 5 | 10 | 2 | 5 | 0 | 4 | 11 | 7 | 11 | 11 | 8 |
| 1707 | 1 | 6 | 4 | 11 | 7 | 10 | 9 | 9 | 2 | 1 | 7 | 6 | 10 | 9 |
| 1708 | 6 | 10 | 5 | 10 | 11 | 4 | 8 | 6 | 7 | 8 | 4 | 0 | 10 | 0 |
| 1709 | 4 | 1 | 2 | 6 | 6 | 7 | 1 | 1 | 10 | 3 | 2 | 5 | 8 | 11 |
| 1710 | 0 | 10 | 0 | 1 | 5 | 7 | 3 | 10 | 0 | 5 | 10 | 5 | 8 | 0 |
| 1711 | 11 | 5 | 8 | 3 | 0 | 7 | 10 | 0 | 4 | 3 | 5 | 2 | 4 | 10 |
| 1712 | 3 | 9 | 11 | 3 | 1 | 6 | 11 | 11 | 0 | 5 | 1 | 11 | 7 | 0 |
| 1713 | 5 | 0 | 9 | 4 | 3 | 9 | 11 | 8 | 9 | 3 | 10 | 8 | 7 | 2 |
| 1714 | 11 | 1 | 8 | 1 | 10 | 8 | 10 | 9 | 10 | 2 | 4 | 10 | 9 | 11 |
| 1715 | 2 | 9 | 2 | 3 | 4 | 7 | 11 | 2 | 5 | 9 | 11 | 6 | 4 | 1 |
| 1716 | 2 | 5 | 0 | 11 | 9 | 3 | 1 | 11 | 6 | 1 | 0 | 7 | 8 | 0 |
| 1717 | 11 | 7 | 10 | 11 | 4 | 10 | 0 | 4 | 5 | 4 | 6 | 10 | 0 | 9 |
| 1718 | 9 | 4 | 9 | 8 | 4 | 6 | 1 | 5 | 10 | 1 | 11 | 4 | 10 | 9 |
| 1719 | 7 | 9 | 8 | 8 | 9 | 1 | 8 | 11 | 11 | 7 | 0 | 2 | 0 | 11 |
| 1720 | 0 | 6 | 11 | 11 | 3 | 9 | 3 | 1 | 5 | 2 | 4 | 0 | 10 | 1 |
| 1721 | 10 | 4 | 1 | 7 | 0 | 7 | 1 | 5 | 9 | 11 | 4 | 3 | 0 | 5 |
| 1722 | 11 | 8 | 6 | 3 | 11 | 0 | 1 | 5 | 6 | 10 | 2 | 4 | 6 | 10 |
| 1723 | 10 | 1 | 5 | 6 | 5 | 6 | 4 | 9 | 5 | 0 | 9 | 10 | 3 | 2 |
| 1724 | 11 | 1 | 0 | 3 | 3 | 3 | 7 | 4 | 7 | 11 | 11 | 3 | 8 | 8 |
| 1725 | 11 | 10 | 8 | 7 | 5 | 11 | 4 | 10 | 11 | 10 | 11 | 9 | 2 | 1 |
| 1726 | 7 | 5 | 0 | 10 | 9 | 9 | 11 | 7 | 4 | 6 | 11 | 8 | 2 | 10 |
| 1727 | 0 | 2 | 5 | 3 | 4 | 2 | 9 | 0 | 3 | 2 | 0 | 7 | 0 | 6 |
| 1728 | 8 | 1 | 1 | 1 | 1 | 4 | 6 | 1 | 3 | 7 | 4 | 7 | 11 | 9 |
| 1729 | 8 | 3 | 0 | 2 | 8 | 10 | 10 | 8 | 5 | 7 | 5 | 11 | 0 | 5 |
| 1730 | 9 | 6 | 2 | 6 | 8 | 11 | 4 | 9 | 6 | 1 | 10 | 5 | 1 | 0 |
| 1731 | 6 | 1 | 3 | 9 | 10 | 11 | 5 | 5 | 5 | 2 | 11 | 4 | 4 | 3 |
| 1732 | 6 | 11 | 9 | 8 | 10 | 5 | 2 | 4 | 5 | 7 | 9 | 7 | 9 | 4 |
| 1733 | 0 | 7 | 10 | 6 | 11 | 3 | 7 | 9 | 9 | 2 | 4 | 11 | 5 | 6 |
| 1734 | 0 | 3 | 4 | 7 | 10 | 6 | 7 | 5 | 11 | 3 | 2 | 1 | 3 | 6 |
| 1735 | 5 | 8 | 5 | 10 | 8 | 10 | 0 | 9 | 0 | 4 | 4 | 1 | 1 | 10 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1736 | 5 | 5 | 1 | 8 | 5 | 8 | 9 | 7 | 10 | 2 | 5 | 5 | 1 | 9 |
| 1737 | 7 | 11 | 8 | 1 | 7 | 9 | 6 | 4 | 2 | 11 | 6 | 0 | 6 | 11 |
| 1738 | 1 | 9 | 7 | 0 | 8 | 4 | 3 | 11 | 5 | 3 | 5 | 3 | 10 | 7 |
| 1739 | 10 | 0 | 6 | 2 | 6 | 7 | 7 | 11 | 4 | 11 | 3 | 4 | 10 | 6 |
| 1740 | 2 | 0 | 0 | 5 | 5 | 9 | 6 | 0 | 4 | 2 | 3 | 6 | 6 | 0 |
| 1741 | 10 | 7 | 0 | 1 | 7 | 4 | 8 | 3 | 3 | 4 | 9 | 5 | 7 | 5 |
| 1742 | 8 | 6 | 3 | 11 | 4 | 10 | 1 | 0 | 3 | 3 | 10 | 2 | 11 | 4 |
| 1743 | 4 | 8 | 10 | 2 | 11 | 10 | 8 | 11 | 5 | 9 | 1 | 3 | 2 | 3 |
| 1744 | 3 | 2 | 10 | 11 | 9 | 4 | 4 | 1 | 2 | 0 | 4 | 3 | 3 | 5 |
| 1745 | 9 | 5 | 9 | 4 | 7 | 2 | 0 | 1 | 0 | 2 | 5 | 2 | 3 | 6 |
| 1746 | 6 | 6 | 11 | 9 | 5 | 9 | 0 | 8 | 11 | 8 | 9 | 8 | 11 | 0 |
| 1747 | 10 | 11 | 6 | 2 | 7 | 9 | 3 | 9 | 6 | 0 | 5 | 6 | 4 | 0 |
| 1748 | 7 | 9 | 9 | 0 | 11 | 1 | 1 | 9 | 0 | 5 | 9 | 5 | 4 | 8 |
| 1749 | 2 | 6 | 10 | 2 | 10 | 8 | 0 | 7 | 6 | 9 | 2 | 11 | 5 | 7 |
| 1750 | 7 | 2 | 1 | 8 | 8 | 8 | 2 | 6 | 5 | 3 | 10 | 8 | 3 | 10 |
| 1751 | 4 | 5 | 7 | 5 | 11 | 5 | 4 | 11 | 7 | 3 | 10 | 0 | 11 | 9 |
| 1752 | 7 | 3 | 4 | 3 | 1 | 9 | 2 | 4 | 10 | 7 | 4 | 5 | 7 | 10 |
| 1753 | 11 | 10 | 0 | 9 | 5 | 5 | 10 | 11 | 8 | 1 | 1 | 2 | 0 | 7 |
| 1754 | 2 | 8 | 7 | 5 | 7 | 7 | 5 | 5 | 11 | 7 | 11 | 5 | 3 | 8 |
| 1755 | 8 | 7 | 3 | 3 | 5 | 3 | 3 | 2 | 2 | 1 | 7 | 8 | 6 | 0 |
| 1756 | 8 | 9 | 2 | 11 | 6 | 11 | 2 | 11 | 4 | 6 | 4 | 1 | 7 | 9 |
| 1757 | 6 | 7 | 8 | 3 | 2 | 5 | 4 | 7 | 1 | 11 | 9 | 4 | 1 | 3 |
| 1758 | 2 | 8 | 0 | 6 | 3 | 6 | 9 | 0 | 1 | 10 | 6 | 10 | 1 | 1 |
| 1759 | 4 | 3 | 10 | 1 | 7 | 5 | 0 | 2 | 6 | 6 | 10 | 4 | 3 | 4 |
| 1760 | 0 | 5 | 2 | 9 | 9 | 2 | 5 | 4 | 0 | 7 | 4 | 4 | 1 | 2 |
| 1761 | 3 | 5 | 2 | 2 | 11 | 8 | 6 | 9 | 5 | 3 | 0 | 1 | 9 | 6 |
| 1762 | 6 | 5 | 1 | 8 | 3 | 1 | 3 | 4 | 6 | 0 | 10 | 2 | 8 | 1 |
| 1763 | 11 | 1 | 10 | 6 | 7 | 2 | 5 | 3 | 7 | 9 | 1 | 7 | 4 | 10 |
| 1764 | 3 | 0 | 6 | 3 | 9 | 6 | 6 | 10 | 6 | 9 | 7 | 7 | 2 | 8 |
| 1765 | 7 | 10 | 11 | 3 | 9 | 8 | 7 | 6 | 8 | 4 | 7 | 9 | 11 | 7 |
| 1766 | 3 | 4 | 9 | 2 | 2 | 5 | 2 | 3 | 8 | 9 | 4 | 2 | 10 | 1 |
| 1767 | 9 | 6 | 5 | 3 | 2 | 10 | 0 | 0 | 2 | 11 | 8 | 9 | 2 | 5 |
| 1768 | 10 | 0 | 1 | 11 | 4 | 5 | 11 | 11 | 2 | 3 | 5 | 9 | 1 | 8 |
| 1769 | 1 | 1 | 10 | 4 | 0 | 0 | 3 | 9 | 6 | 6 | 6 | 8 | 10 | 1 |
| 1770 | 9 | 3 | 8 | 7 | 10 | 0 | 9 | 8 | 6 | 2 | 3 | 0 | 7 | 10 |
| 1771 | 5 | 10 | 4 | 4 | 0 | 1 | 7 | 7 | 4 | 6 | 2 | 10 | 1 | 3 |
| 1772 | 0 | 8 | 0 | 0 | 0 | 5 | 4 | 11 | 10 | 8 | 9 | 3 | 8 | 11 |
| 1773 | 7 | 4 | 3 | 11 | 11 | 9 | 7 | 8 | 1 | 0 | 5 | 10 | 6 | 5 |
| 1774 | 0 | 4 | 8 | 1 | 5 | 1 | 5 | 6 | 10 | 1 | 6 | 9 | 5 | 3 |
| 1775 | 10 | 3 | 7 | 10 | 4 | 1 | 6 | 2 | 0 | 10 | 7 | 5 | 2 | 5 |
| 1776 | 3 | 4 | 7 | 7 | 7 | 4 | 11 | 7 | 4 | 7 | 5 | 4 | 11 | 1 |
| 1777 | 7 | 11 | 1 | 3 | 5 | 5 | 3 | 6 | 4 | 8 | 2 | 10 | 10 | 6 |
| 1778 | 0 | 7 | 6 | 0 | 5 | 11 | 1 | 2 | 1 | 9 | 1 | 4 | 11 | 4 |
| 1779 | 0 | 3 | 3 | 11 | 4 | 4 | 10 | 7 | 11 | 11 | 1 | 11 | 6 | 7 |
| 1780 | 1 | 10 | 0 | 10 | 2 | 2 | 9 | 4 | 11 | 10 | 4 | 6 | 8 | 7 |
| 1781 | 3 | 4 | 10 | 8 | 0 | 3 | 1 | 9 | 4 | 4 | 2 | 2 | 3 | 2 |
| 1782 | 6 | 11 | 1 | 5 | 9 | 3 | 0 | 0 | 1 | 3 | 0 | 3 | 2 | 8 |
| 1783 | 1 | 2 | 6 | 4 | 6 | 5 | 5 | 7 | 10 | 4 | 9 | 8 | 0 | 9 |
| 1784 | 9 | 6 | 7 | 7 | 3 | 9 | 6 | 9 | 3 | 7 | 9 | 2 | 3 | 3 |
| 1785 | 4 | 0 | 5 | 11 | 1 | 11 | 4 | 6 | 7 | 4 | 6 | 4 | 2 | 7 |
| 1786 | 10 | 6 | 0 | 5 | 1 | 7 | 8 | 5 | 10 | 5 | 8 | 4 | 2 | 10 |
| 1787 | 7 | 3 | 7 | 10 | 2 | 5 | 5 | 5 | 10 | 11 | 0 | 2 | 6 | 4 |
| 1788 | 9 | 2 | 2 | 11 | 10 | 4 | 7 | 6 | 9 | 10 | 0 | 8 | 4 | 3 |
| 1789 | 2 | 4 | 9 | 3 | 1 | 2 | 7 | 1 | 4 | 7 | 0 | 1 | 8 | 4 |
| 1790 | 11 | 3 | 3 | 1 | 1 | 7 | 1 | 2 | 11 | 8 | 8 | 10 | 0 | 8 |
| 1791 | 6 | 11 | 3 | 2 | 0 | 4 | 11 | 10 | 4 | 4 | 4 | 5 | 2 | 11 |
| 1792 | 0 | 10 | 1 | 5 | 0 | 10 | 9 | 2 | 7 | 7 | 6 | 2 | 11 | 1 |
| 1793 | 10 | 5 | 10 | 3 | 4 | 7 | 5 | 7 | 10 | 5 | 0 | 5 | 7 | 0 |
| 1794 | 3 | 11 | 3 | 8 | 8 | 0 | 1 | 4 | 6 | 10 | 11 | 0 | 0 | 9 |
| 1795 | 11 | 6 | 11 | 7 | 9 | 2 | 2 | 8 | 11 | 0 | 8 | 6 | 6 | 6 |
| 1796 | 1 | 9 | 4 | 4 | 11 | 11 | 6 | 1 | 3 | 11 | 10 | 11 | 10 | 5 |
| 1797 | 8 | 11 | 11 | 10 | 6 | 4 | 3 | 5 | 7 | 5 | 2 | 1 | 2 | 11 |
| 1798 | 3 | 2 | 9 | 9 | 7 | 8 | 9 | 0 | 4 | 9 | 1 | 11 | 8 | 3 |
| 1799 | 2 | 3 | 0 | 3 | 7 | 3 | 0 | 9 | 1 | 7 | 7 | 10 | 10 | 7 |
| 1800 | 7 | 4 | 1 | 1 | 1 | 9 | 2 | 1 | 9 | 10 | 1 | 1 | 3 | 2 |
| 1801 | 8 | 2 | 10 | 11 | 1 | 10 | 6 | 11 | 3 | 8 | 8 | 9 | 9 | 3 |
| 1802 | 2 | 6 | 4 | 8 | 0 | 3 | 8 | 11 | 4 | 3 | 4 | 3 | 1 | 1 |
| 1803 | 1 | 0 | 5 | 2 | 11 | 1 | 5 | 10 | 5 | 7 | 3 | 6 | 9 | 4 |
| 1804 | 5 | 4 | 5 | 6 | 1 | 3 | 11 | 0 | 10 | 2 | 5 | 0 | 0 | 10 |
| 1805 | 8 | 5 | 6 | 4 | 8 | 8 | 4 | 9 | 8 | 2 | 10 | 8 | 7 | 3 |
| 1806 | 2 | 11 | 10 | 0 | 5 | 2 | 7 | 3 | 5 | 0 | 7 | 11 | 0 | 2 |
| 1807 | 5 | 10 | 2 | 8 | 2 | 5 | 0 | 7 | 7 | 0 | 11 | 11 | 2 | 10 |
| 1808 | 0 | 9 | 2 | 7 | 9 | 6 | 4 | 1 | 1 | 9 | 4 | 5 | 11 | 0 |
| 1809 | 0 | 11 | 7 | 9 | 0 | 9 | 11 | 7 | 2 | 8 | 9 | 4 | 10 | 9 |
| 1810 | 7 | 8 | 3 | 0 | 11 | 1 | 6 | 6 | 11 | 4 | 8 | 7 | 11 | 10 |

-continued

Example #4 of a group-based CS hopping pattern

| m | $n_{cs}(n)$ | | | | | | | | | | | | | |
|---|---|---|---|---|---|---|---|---|---|---|---|---|---|---|
| 1811 | 4 | 6 | 2 | 0 | 8 | 2 | 6 | 7 | 2 | 1 | 3 | 9 | 4 | 7 |
| 1812 | 5 | 7 | 8 | 4 | 6 | 1 | 10 | 11 | 11 | 9 | 3 | 0 | 2 | 9 |
| 1813 | 4 | 3 | 10 | 5 | 11 | 4 | 1 | 5 | 1 | 10 | 1 | 9 | 1 | 5 |
| 1814 | 10 | 3 | 8 | 10 | 5 | 8 | 6 | 7 | 6 | 7 | 8 | 1 | 5 | 4 |
| 1815 | 6 | 1 | 7 | 6 | 7 | 5 | 8 | 2 | 11 | 2 | 8 | 5 | 4 | 0 |
| 1816 | 10 | 6 | 2 | 1 | 7 | 7 | 1 | 4 | 9 | 9 | 7 | 7 | 6 | 1 |
| 1817 | 4 | 5 | 1 | 2 | 10 | 2 | 8 | 8 | 0 | 2 | 9 | 1 | 8 | 9 |
| 1818 | 4 | 8 | 0 | 0 | 10 | 7 | 9 | 10 | 7 | 3 | 5 | 4 | 1 | 11 |
| 1819 | 0 | 9 | 8 | 1 | 8 | 5 | 1 | 0 | 10 | 0 | 1 | 2 | 10 | 4 |
| 1820 | 6 | 3 | 6 | 1 | 3 | 0 | 5 | 11 | 4 | 4 | 10 | 11 | 0 | 10 |
| 1821 | 7 | 7 | 9 | 8 | 5 | 11 | 0 | 10 | 8 | 2 | 7 | 3 | 11 | 0 |
| 1822 | 9 | 0 | 9 | 7 | 7 | 6 | 8 | 3 | 6 | 8 | 2 | 3 | 0 | 5 |
| 1823 | 11 | 10 | 8 | 9 | 11 | 9 | 5 | 9 | 0 | 3 | 5 | 10 | 7 | 2 |
| 1824 | 1 | 5 | 7 | 5 | 3 | 5 | 0 | 1 | 2 | 1 | 7 | 7 | 8 | 3 |
| 1825 | 6 | 5 | 3 | 11 | 10 | 6 | 2 | 2 | 5 | 11 | 1 | 8 | 10 | 10 |
| 1826 | 11 | 1 | 3 | 8 | 7 | 10 | 3 | 3 | 9 | 5 | 3 | 8 | 3 | 3 |
| 1827 | 9 | 3 | 1 | 6 | 11 | 7 | 11 | 4 | 6 | 0 | 3 | 4 | 3 | 7 |
| 1828 | 8 | 11 | 1 | 11 | 6 | 9 | 10 | 3 | 10 | 4 | 7 | 2 | 10 | 8 |
| 1829 | 1 | 10 | 5 | 0 | 10 | 11 | 6 | 3 | 0 | 5 | 1 | 4 | 7 | 8 |
| 1830 | 1 | 8 | 1 | 11 | 0 | 1 | 9 | 9 | 6 | 10 | 2 | 1 | 8 | 5 |
| 1831 | 0 | 4 | 9 | 5 | 11 | 10 | 5 | 7 | 1 | 4 | 9 | 10 | 5 | 0 |
| 1832 | 10 | 2 | 1 | 6 | 9 | 11 | 8 | 0 | 7 | 9 | 11 | 7 | 5 | 8 |
| 1833 | 0 | 1 | 8 | 2 | 6 | 9 | 7 | 8 | 8 | 8 | 8 | 8 | 9 | 11 |
| 1834 | 1 | 4 | 6 | 6 | 3 | 8 | 2 | 11 | 9 | 11 | 7 | 8 | 1 | 0 |
| 1835 | 9 | 7 | 9 | 1 | 1 | 7 | 0 | 3 | 1 | 5 | 3 | 1 | 4 | 6 |
| 1836 | 7 | 11 | 9 | 0 | 5 | 7 | 4 | 7 | 3 | 3 | 4 | 8 | 7 | 10 |
| 1837 | 11 | 6 | 6 | 4 | 2 | 7 | 10 | 3 | 3 | 4 | 5 | 4 | 6 | 5 |
| 1838 | 3 | 1 | 4 | 11 | 0 | 3 | 6 | 10 | 2 | 8 | 7 | 8 | 4 | 2 |
| 1839 | 10 | 9 | 0 | 2 | 5 | 3 | 2 | 10 | 1 | 1 | 0 | 1 | 9 | 3 |
| 1840 | 4 | 11 | 11 | 2 | 11 | 10 | 0 | 6 | 1 | 8 | 3 | 5 | 11 | 2 |
| 1841 | 3 | 3 | 11 | 9 | 9 | 0 | 9 | 7 | 9 | 3 | 4 | 4 | 9 | 1 |
| 1842 | 7 | 3 | 4 | 0 | 1 | 7 | 8 | 2 | 5 | 9 | 9 | 11 | 10 | 7 |
| 1843 | 11 | 6 | 5 | 11 | 4 | 1 | 2 | 10 | 10 | 3 | 4 | 9 | 2 | 9 |
| 1844 | 9 | 6 | 10 | 3 | 8 | 8 | 1 | 11 | 0 | 0 | 11 | 7 | 8 | 3 |
| 1845 | 3 | 4 | 11 | 10 | 10 | 7 | 7 | 2 | 2 | 4 | 0 | 1 | 3 | 7 |
| 1846 | 3 | 11 | 3 | 1 | 6 | 11 | 8 | 7 | 5 | 3 | 8 | 2 | 8 | 11 |
| 1847 | 1 | 5 | 0 | 8 | 6 | 4 | 8 | 8 | 3 | 11 | 2 | 3 | 11 | 7 |
| 1848 | 4 | 2 | 0 | 2 | 2 | 5 | 3 | 2 | 3 | 7 | 1 | 8 | 9 | 9 |
| 1849 | 4 | 3 | 11 | 4 | 5 | 9 | 5 | 9 | 2 | 11 | 7 | 1 | 4 | 5 |
| 1850 | 6 | 0 | 1 | 4 | 3 | 2 | 1 | 6 | 5 | 2 | 3 | 0 | 3 | 2 |
| 1851 | 0 | 1 | 0 | 8 | 2 | 1 | 11 | 9 | 5 | 3 | 6 | 1 | 2 | 2 |
| 1852 | 7 | 9 | 7 | 5 | 9 | 3 | 7 | 8 | 4 | 3 | 9 | 7 | 3 | 6 |
| 1853 | 2 | 0 | 7 | 4 | 7 | 5 | 1 | 1 | 8 | 10 | 10 | 6 | 2 | 4 |
| 1854 | 7 | 5 | 8 | 0 | 9 | 0 | 5 | 11 | 5 | 0 | 1 | 9 | 3 | 8 |
| 1855 | 8 | 6 | 0 | 3 | 2 | 6 | 8 | 0 | 8 | 2 | 6 | 4 | 11 | 9 |
| 1856 | 0 | 1 | 10 | 10 | 4 | 5 | 6 | 4 | 1 | 0 | 6 | 5 | 5 | 3 |
| 1857 | 1 | 8 | 3 | 7 | 5 | 8 | 3 | 3 | 8 | 10 | 10 | 9 | 5 | 8 |
| 1858 | 6 | 6 | 6 | 6 | 8 | 4 | 0 | 7 | 4 | 11 | 6 | 5 | 6 | 6 |
| 1859 | 7 | 1 | 0 | 6 | 4 | 10 | 4 | 8 | 9 | 8 | 9 | 4 | 1 | 1 |
| 1860 | 3 | 7 | 1 | 3 | 0 | 4 | 0 | 7 | 8 | 10 | 3 | 6 | 7 | 7 |
| 1861 | 6 | 10 | 0 | 8 | 9 | 11 | 1 | 4 | 2 | 7 | 8 | 8 | 2 | 0 |
| 1862 | 3 | 10 | 6 | 9 | 8 | 6 | 4 | 1 | 11 | 6 | 2 | 2 | 10 | 1 |
| 1863 | 11 | 2 | 3 | 6 | 2 | 0 | 7 | 7 | 2 | 9 | 7 | 11 | 3 | 1 |
| 1864 | 1 | 10 | 3 | 7 | 6 | 6 | 7 | 6 | 9 | 9 | 6 | 7 | 10 | 7 |
| 1865 | 11 | 8 | 7 | 9 | 5 | 4 | 11 | 11 | 10 | 0 | 5 | 7 | 9 | 11 |
| 1866 | 4 | 10 | 3 | 0 | 3 | 8 | 3 | 0 | 5 | 1 | 8 | 11 | 1 | 9 |
| 1867 | 0 | 9 | 4 | 11 | 7 | 11 | 5 | 10 | 6 | 5 | 11 | 4 | 6 | 4 |
| 1868 | 3 | 4 | 10 | 0 | 2 | 10 | 11 | 6 | 2 | 1 | 1 | 11 | 9 | 10 |
| 1869 | 5 | 7 | 2 | 11 | 10 | 9 | 2 | 1 | 1 | 8 | 2 | 2 | 6 | 6 |
| 1870 | 5 | 9 | 5 | 1 | 8 | 0 | 6 | 11 | 9 | 7 | 7 | 1 | 2 | 3 |
| 1871 | 5 | 10 | 1 | 10 | 9 | 4 | 2 | 10 | 0 | 1 | 11 | 9 | 1 | 2 |
| 1872 | 9 | 11 | 2 | 11 | 3 | 9 | 7 | 5 | 7 | 6 | 6 | 3 | 5 | 1 |
| 1873 | 10 | 9 | 6 | 0 | 0 | 7 | 5 | 8 | 4 | 1 | 7 | 0 | 1 | 8 |
| 1874 | 4 | 10 | 10 | 1 | 7 | 9 | 6 | 11 | 4 | 1 | 11 | 3 | 5 | 8 |
| 1875 | 0 | 6 | 1 | 8 | 6 | 4 | 9 | 6 | 1 | 5 | 4 | 11 | 5 | 5 |
| 1876 | 8 | 0 | 1 | 0 | 7 | 1 | 5 | 6 | 4 | 0 | 2 | 2 | 7 | 9 |
| 1877 | 0 | 7 | 7 | 0 | 9 | 0 | 1 | 3 | 10 | 2 | 9 | 11 | 2 | 10 |
| 1878 | 11 | 7 | 9 | 2 | 4 | 6 | 7 | 11 | 5 | 5 | 11 | 5 | 11 | 3 |
| 1879 | 3 | 1 | 2 | 8 | 10 | 11 | 11 | 7 | 8 | 9 | 2 | 9 | 10 | 5 |
| 1880 | 9 | 0 | 0 | 9 | 4 | 6 | 9 | 6 | 0 | 7 | 6 | 9 | 4 | 3 |
| 1881 | 11 | 10 | 5 | 7 | 7 | 8 | 7 | 9 | 7 | 1 | 7 | 1 | 8 | 6 |
| 1882 | 0 | 3 | 9 | 9 | 2 | 9 | 3 | 0 | 3 | 10 | 0 | 5 | 4 | 11 |
| 1883 | 11 | 9 | 4 | 1 | 0 | 3 | 4 | 3 | 7 | 9 | 8 | 10 | 7 | 5 |
| 1884 | 2 | 6 | 4 | 4 | 4 | 4 | 11 | 10 | 7 | 2 | 8 | 6 | 9 | 0 |
| 1885 | 1 | 10 | 3 | 5 | 2 | 5 | 10 | 2 | 4 | 5 | 0 | 5 | 5 | 2 |

Example #4 of a group-based CS hopping pattern

| m | $n_{cs}(n)$ | | | | | | | | | | | | | |
|---|---|---|---|---|---|---|---|---|---|---|---|---|---|---|
| 1886 | 0 | 8 | 5 | 3 | 3 | 7 | 8 | 8 | 0 | 11 | 4 | 11 | 9 | 4 |
| 1887 | 2 | 3 | 3 | 1 | 11 | 10 | 9 | 1 | 8 | 2 | 11 | 11 | 9 | 6 |
| 1888 | 9 | 5 | 11 | 5 | 1 | 3 | 10 | 9 | 6 | 2 | 2 | 7 | 11 | 11 |
| 1889 | 7 | 8 | 6 | 2 | 9 | 3 | 1 | 0 | 8 | 1 | 8 | 4 | 10 | 1 |
| 1890 | 10 | 7 | 1 | 3 | 1 | 6 | 10 | 10 | 11 | 11 | 10 | 3 | 8 | 4 |
| 1891 | 6 | 0 | 3 | 1 | 6 | 1 | 2 | 0 | 8 | 4 | 4 | 6 | 3 | 0 |
| 1892 | 7 | 5 | 3 | 8 | 3 | 5 | 6 | 0 | 10 | 3 | 9 | 1 | 7 | 8 |
| 1893 | 9 | 1 | 7 | 8 | 1 | 9 | 9 | 2 | 4 | 4 | 4 | 10 | 11 | 6 |
| 1894 | 9 | 2 | 8 | 5 | 6 | 8 | 5 | 4 | 10 | 10 | 6 | 5 | 10 | 6 |
| 1895 | 7 | 2 | 9 | 4 | 10 | 11 | 11 | 2 | 6 | 11 | 11 | 5 | 0 | 6 |
| 1896 | 6 | 6 | 7 | 9 | 0 | 0 | 4 | 0 | 5 | 4 | 3 | 1 | 9 | 7 |
| 1897 | 3 | 2 | 3 | 5 | 6 | 5 | 3 | 10 | 7 | 0 | 3 | 10 | 11 | 5 |
| 1898 | 3 | 9 | 10 | 7 | 11 | 10 | 4 | 11 | 6 | 6 | 6 | 7 | 4 | 5 |
| 1899 | 10 | 8 | 3 | 1 | 7 | 2 | 7 | 11 | 0 | 5 | 2 | 1 | 7 | 4 |
| 1900 | 3 | 7 | 9 | 11 | 1 | 9 | 10 | 0 | 9 | 0 | 9 | 8 | 9 | 10 |
| 1901 | 5 | 9 | 8 | 5 | 2 | 6 | 3 | 8 | 1 | 1 | 6 | 3 | 5 | 11 |
| 1902 | 3 | 0 | 9 | 6 | 9 | 9 | 2 | 10 | 10 | 6 | 6 | 6 | 8 | 11 |
| 1903 | 9 | 10 | 5 | 6 | 8 | 2 | 7 | 8 | 2 | 10 | 9 | 2 | 6 | 2 |
| 1904 | 9 | 8 | 8 | 8 | 9 | 10 | 5 | 5 | 0 | 5 | 10 | 6 | 2 | 5 |
| 1905 | 8 | 6 | 10 | 4 | 1 | 11 | 0 | 2 | 7 | 6 | 6 | 1 | 8 | 2 |
| 1906 | 8 | 11 | 9 | 1 | 4 | 2 | 8 | 6 | 1 | 10 | 4 | 0 | 6 | 3 |
| 1907 | 9 | 7 | 2 | 9 | 5 | 4 | 1 | 0 | 0 | 1 | 1 | 1 | 3 | 10 |
| 1908 | 6 | 8 | 10 | 3 | 7 | 3 | 4 | 3 | 2 | 3 | 6 | 0 | 9 | 3 |
| 1909 | 3 | 9 | 5 | 3 | 4 | 11 | 7 | 9 | 10 | 6 | 2 | 10 | 6 | 10 |
| 1910 | 9 | 0 | 10 | 1 | 6 | 8 | 4 | 9 | 3 | 6 | 1 | 0 | 1 | 4 |
| 1911 | 11 | 4 | 4 | 9 | 5 | 7 | 4 | 9 | 9 | 10 | 6 | 2 | 4 | 0 |
| 1912 | 4 | 1 | 2 | 7 | 0 | 11 | 0 | 10 | 0 | 0 | 9 | 0 | 5 | 7 |
| 1913 | 1 | 3 | 9 | 4 | 4 | 3 | 4 | 8 | 10 | 0 | 5 | 8 | 8 | 7 |
| 1914 | 2 | 2 | 8 | 3 | 11 | 4 | 8 | 1 | 6 | 4 | 0 | 4 | 5 | 3 |
| 1915 | 8 | 1 | 9 | 6 | 8 | 3 | 8 | 5 | 3 | 11 | 9 | 6 | 10 | 10 |
| 1916 | 7 | 0 | 7 | 1 | 11 | 2 | 4 | 11 | 10 | 8 | 0 | 8 | 0 | 0 |
| 1917 | 9 | 4 | 5 | 2 | 4 | 9 | 10 | 3 | 4 | 0 | 8 | 11 | 4 | 9 |
| 1918 | 5 | 6 | 5 | 10 | 11 | 8 | 9 | 3 | 10 | 10 | 0 | 6 | 3 | 2 |
| 1919 | 2 | 5 | 0 | 1 | 9 | 11 | 0 | 6 | 9 | 10 | 5 | 3 | 0 | 1 |
| 1920 | 7 | 11 | 5 | 5 | 9 | 8 | 0 | 6 | 2 | 7 | 11 | 10 | 1 | 11 |
| 1921 | 10 | 6 | 7 | 3 | 10 | 2 | 9 | 0 | 0 | 6 | 5 | 3 | 5 | 0 |
| 1922 | 4 | 2 | 4 | 3 | 3 | 10 | 10 | 7 | 1 | 5 | 7 | 6 | 9 | 6 |
| 1923 | 9 | 11 | 0 | 9 | 7 | 5 | 11 | 8 | 7 | 10 | 8 | 10 | 1 | 10 |
| 1924 | 8 | 0 | 3 | 7 | 7 | 5 | 0 | 5 | 0 | 4 | 8 | 4 | 9 | 11 |
| 1925 | 7 | 9 | 11 | 2 | 8 | 6 | 10 | 9 | 8 | 4 | 6 | 10 | 0 | 2 |
| 1926 | 3 | 6 | 8 | 8 | 9 | 2 | 4 | 2 | 6 | 2 | 1 | 2 | 7 | 2 |
| 1927 | 11 | 0 | 6 | 8 | 3 | 11 | 4 | 6 | 6 | 3 | 5 | 5 | 11 | 9 |
| 1928 | 2 | 5 | 10 | 4 | 6 | 9 | 3 | 10 | 4 | 4 | 5 | 11 | 3 | 11 |
| 1929 | 9 | 1 | 2 | 4 | 0 | 5 | 4 | 4 | 11 | 4 | 5 | 6 | 0 | 8 |
| 1930 | 1 | 5 | 9 | 2 | 4 | 11 | 8 | 4 | 4 | 8 | 1 | 7 | 1 | 2 |
| 1931 | 4 | 8 | 5 | 10 | 2 | 3 | 2 | 11 | 3 | 0 | 4 | 10 | 6 | 2 |
| 1932 | 10 | 8 | 10 | 7 | 10 | 9 | 0 | 4 | 3 | 1 | 4 | 0 | 4 | 0 |
| 1933 | 10 | 9 | 8 | 7 | 9 | 5 | 11 | 2 | 5 | 8 | 5 | 7 | 8 | 10 |
| 1934 | 7 | 2 | 2 | 5 | 2 | 0 | 1 | 1 | 11 | 11 | 10 | 7 | 4 | 2 |
| 1935 | 8 | 11 | 5 | 10 | 7 | 6 | 11 | 1 | 6 | 3 | 3 | 8 | 4 | 8 |
| 1936 | 5 | 5 | 8 | 7 | 2 | 4 | 9 | 3 | 0 | 8 | 4 | 1 | 9 | 0 |
| 1937 | 8 | 10 | 10 | 11 | 0 | 5 | 5 | 0 | 7 | 4 | 2 | 3 | 6 | 0 |
| 1938 | 0 | 0 | 5 | 11 | 10 | 10 | 3 | 4 | 2 | 11 | 3 | 10 | 7 | 7 |
| 1939 | 5 | 0 | 9 | 7 | 5 | 8 | 10 | 6 | 2 | 2 | 8 | 8 | 4 | 1 |
| 1940 | 7 | 4 | 2 | 0 | 0 | 2 | 11 | 3 | 10 | 9 | 4 | 4 | 6 | 11 |
| 1941 | 1 | 10 | 2 | 3 | 9 | 1 | 1 | 0 | 5 | 3 | 4 | 2 | 0 | 6 |
| 1942 | 6 | 1 | 7 | 3 | 5 | 6 | 4 | 4 | 6 | 9 | 10 | 11 | 5 | 9 |
| 1943 | 4 | 9 | 4 | 8 | 1 | 0 | 11 | 5 | 2 | 4 | 3 | 8 | 8 | 1 |
| 1944 | 0 | 3 | 1 | 8 | 4 | 8 | 2 | 1 | 2 | 4 | 7 | 3 | 0 | 7 |
| 1945 | 4 | 11 | 0 | 6 | 0 | 6 | 7 | 9 | 11 | 0 | 4 | 3 | 11 | 11 |
| 1946 | 6 | 4 | 10 | 5 | 11 | 7 | 10 | 0 | 9 | 8 | 11 | 1 | 7 | 4 |
| 1947 | 2 | 1 | 11 | 10 | 6 | 1 | 2 | 8 | 3 | 6 | 3 | 11 | 5 | 8 |
| 1948 | 7 | 11 | 3 | 6 | 2 | 1 | 9 | 8 | 8 | 1 | 10 | 10 | 8 | 3 |
| 1949 | 6 | 3 | 5 | 3 | 10 | 0 | 9 | 6 | 11 | 0 | 9 | 2 | 3 | 5 |
| 1950 | 6 | 11 | 1 | 7 | 1 | 3 | 3 | 10 | 9 | 5 | 6 | 11 | 4 | 1 |
| 1951 | 1 | 9 | 9 | 7 | 11 | 2 | 9 | 9 | 9 | 0 | 4 | 9 | 0 | 4 |
| 1952 | 4 | 7 | 6 | 10 | 0 | 4 | 10 | 3 | 9 | 2 | 8 | 7 | 0 | 2 |
| 1953 | 8 | 8 | 4 | 10 | 3 | 1 | 6 | 4 | 5 | 11 | 0 | 6 | 7 | 0 |
| 1954 | 2 | 1 | 1 | 0 | 8 | 4 | 10 | 4 | 9 | 9 | 11 | 2 | 4 | 11 |
| 1955 | 9 | 2 | 0 | 11 | 0 | 7 | 6 | 2 | 8 | 0 | 6 | 10 | 7 | 8 |
| 1956 | 11 | 5 | 11 | 6 | 1 | 7 | 6 | 8 | 7 | 4 | 10 | 5 | 4 | 4 |
| 1957 | 5 | 4 | 4 | 0 | 9 | 6 | 0 | 9 | 4 | 8 | 9 | 6 | 11 | 5 |
| 1958 | 5 | 4 | 3 | 3 | 0 | 11 | 3 | 8 | 4 | 6 | 11 | 5 | 3 | 1 |
| 1959 | 1 | 6 | 10 | 10 | 5 | 2 | 0 | 9 | 10 | 4 | 8 | 0 | 11 | 1 |
| 1960 | 3 | 7 | 7 | 6 | 5 | 6 | 2 | 0 | 3 | 11 | 4 | 4 | 0 | 3 |

Example #4 of a group-based CS hopping pattern

| m | $n_{cs}(n)$ | | | | | | | | | | | | | |
|---|---|---|---|---|---|---|---|---|---|---|---|---|---|---|
| 1961 | 0 | 0 | 11 | 6 | 11 | 4 | 9 | 9 | 5 | 1 | 7 | 8 | 6 | 7 |
| 1962 | 5 | 3 | 0 | 5 | 7 | 4 | 7 | 7 | 0 | 6 | 0 | 8 | 6 | 8 |
| 1963 | 10 | 10 | 1 | 11 | 4 | 0 | 0 | 8 | 8 | 7 | 10 | 1 | 0 | 2 |
| 1964 | 9 | 0 | 3 | 11 | 8 | 0 | 0 | 10 | 1 | 2 | 0 | 6 | 2 | 1 |
| 1965 | 8 | 11 | 6 | 4 | 4 | 10 | 5 | 5 | 9 | 3 | 8 | 3 | 10 | 9 |
| 1966 | 9 | 7 | 6 | 2 | 3 | 10 | 6 | 0 | 3 | 0 | 0 | 7 | 6 | 4 |
| 1967 | 3 | 4 | 11 | 8 | 1 | 2 | 3 | 11 | 1 | 3 | 6 | 6 | 10 | 10 |
| 1968 | 6 | 1 | 2 | 10 | 11 | 10 | 6 | 0 | 2 | 7 | 4 | 10 | 8 | 10 |
| 1969 | 1 | 5 | 4 | 4 | 2 | 2 | 9 | 11 | 7 | 7 | 7 | 10 | 4 | 6 |
| 1970 | 6 | 11 | 6 | 4 | 5 | 1 | 8 | 3 | 7 | 10 | 9 | 2 | 7 | 6 |
| 1971 | 11 | 2 | 2 | 10 | 5 | 0 | 10 | 8 | 0 | 5 | 4 | 5 | 0 | 11 |
| 1972 | 7 | 7 | 0 | 7 | 8 | 4 | 6 | 0 | 4 | 4 | 2 | 2 | 9 | 3 |
| 1973 | 8 | 5 | 7 | 9 | 3 | 4 | 3 | 6 | 8 | 4 | 8 | 5 | 6 | 1 |
| 1974 | 2 | 7 | 4 | 7 | 5 | 9 | 4 | 6 | 10 | 5 | 4 | 9 | 6 | 7 |
| 1975 | 5 | 1 | 8 | 5 | 3 | 10 | 7 | 4 | 2 | 3 | 1 | 6 | 1 | 9 |
| 1976 | 11 | 0 | 7 | 11 | 2 | 7 | 0 | 7 | 6 | 7 | 9 | 0 | 9 | 0 |
| 1977 | 5 | 11 | 7 | 0 | 3 | 1 | 6 | 2 | 6 | 0 | 1 | 0 | 4 | 6 |
| 1978 | 10 | 5 | 10 | 1 | 11 | 9 | 7 | 0 | 1 | 2 | 8 | 2 | 2 | 7 |
| 1979 | 5 | 10 | 2 | 1 | 6 | 3 | 11 | 3 | 1 | 6 | 10 | 3 | 10 | 3 |
| 1980 | 0 | 10 | 4 | 5 | 1 | 9 | 8 | 11 | 0 | 6 | 10 | 7 | 2 | 6 |
| 1981 | 0 | 0 | 7 | 2 | 2 | 0 | 10 | 9 | 9 | 8 | 10 | 9 | 3 | 6 |
| 1982 | 2 | 3 | 1 | 2 | 8 | 7 | 9 | 8 | 4 | 6 | 6 | 3 | 10 | 10 |
| 1983 | 7 | 0 | 0 | 10 | 4 | 3 | 3 | 3 | 11 | 3 | 1 | 1 | 6 | 4 |
| 1984 | 5 | 3 | 5 | 9 | 6 | 11 | 1 | 1 | 11 | 10 | 4 | 10 | 7 | 0 |
| 1985 | 11 | 1 | 1 | 9 | 7 | 3 | 10 | 7 | 8 | 3 | 10 | 11 | 1 | 6 |
| 1986 | 9 | 1 | 4 | 4 | 11 | 6 | 3 | 8 | 8 | 9 | 3 | 5 | 4 | 10 |
| 1987 | 6 | 10 | 11 | 4 | 4 | 7 | 0 | 10 | 6 | 0 | 7 | 9 | 10 | 11 |
| 1988 | 8 | 0 | 7 | 8 | 10 | 0 | 1 | 11 | 1 | 5 | 1 | 10 | 6 | 11 |
| 1989 | 4 | 9 | 6 | 11 | 7 | 5 | 4 | 2 | 10 | 11 | 4 | 11 | 5 | 1 |
| 1990 | 9 | 7 | 6 | 0 | 11 | 6 | 11 | 7 | 11 | 7 | 7 | 8 | 5 | 9 |
| 1991 | 5 | 4 | 7 | 6 | 5 | 2 | 5 | 10 | 8 | 4 | 0 | 7 | 1 | 4 |
| 1992 | 2 | 5 | 9 | 6 | 1 | 5 | 1 | 5 | 11 | 8 | 0 | 0 | 5 | 9 |
| 1993 | 0 | 9 | 11 | 3 | 2 | 11 | 2 | 7 | 11 | 4 | 3 | 1 | 10 | 11 |
| 1994 | 6 | 4 | 2 | 2 | 10 | 4 | 6 | 5 | 11 | 9 | 7 | 1 | 0 | 2 |
| 1995 | 9 | 1 | 4 | 2 | 9 | 11 | 0 | 11 | 1 | 6 | 2 | 11 | 9 | 0 |
| 1996 | 2 | 11 | 9 | 6 | 3 | 0 | 11 | 4 | 3 | 1 | 5 | 3 | 9 | 5 |
| 1997 | 0 | 8 | 2 | 4 | 4 | 1 | 5 | 1 | 11 | 1 | 0 | 8 | 9 | 6 |
| 1998 | 1 | 10 | 9 | 3 | 11 | 4 | 11 | 6 | 10 | 2 | 11 | 3 | 7 | 9 |
| 1999 | 5 | 0 | 9 | 11 | 11 | 3 | 3 | 1 | 10 | 1 | 4 | 5 | 1 | 5 |
| 2000 | 3 | 1 | 11 | 5 | 2 | 2 | 6 | 5 | 4 | 9 | 8 | 3 | 2 | 4 |
| 2001 | 10 | 6 | 0 | 9 | 8 | 1 | 3 | 1 | 1 | 3 | 8 | 3 | 8 | 8 |
| 2002 | 2 | 3 | 0 | 10 | 1 | 7 | 5 | 0 | 0 | 10 | 2 | 9 | 3 | 4 |
| 2003 | 10 | 3 | 4 | 6 | 2 | 5 | 11 | 3 | 11 | 5 | 9 | 9 | 11 | 4 |
| 2004 | 11 | 7 | 5 | 0 | 8 | 11 | 5 | 4 | 6 | 7 | 0 | 11 | 3 | 5 |
| 2005 | 6 | 3 | 8 | 6 | 11 | 3 | 8 | 6 | 8 | 7 | 1 | 7 | 2 | 1 |
| 2006 | 10 | 0 | 11 | 0 | 11 | 8 | 8 | 8 | 1 | 5 | 5 | 4 | 0 | 9 |
| 2007 | 10 | 10 | 5 | 4 | 5 | 5 | 2 | 5 | 6 | 11 | 6 | 0 | 11 | 10 |
| 2008 | 10 | 4 | 7 | 4 | 6 | 11 | 5 | 3 | 5 | 5 | 2 | 6 | 5 | 10 |
| 2009 | 0 | 2 | 4 | 7 | 3 | 0 | 5 | 9 | 10 | 9 | 0 | 3 | 8 | 8 |
| 2010 | 3 | 8 | 11 | 8 | 0 | 3 | 5 | 7 | 5 | 6 | 11 | 1 | 11 | 6 |
| 2011 | 1 | 1 | 11 | 6 | 0 | 10 | 1 | 11 | 2 | 6 | 5 | 9 | 7 | 4 |
| 2012 | 3 | 2 | 10 | 2 | 6 | 11 | 11 | 8 | 0 | 7 | 6 | 6 | 3 | 8 |
| 2013 | 5 | 6 | 10 | 6 | 10 | 5 | 2 | 3 | 2 | 1 | 8 | 1 | 7 | 11 |
| 2014 | 6 | 6 | 1 | 5 | 0 | 6 | 7 | 1 | 10 | 2 | 5 | 9 | 5 | 6 |
| 2015 | 4 | 0 | 6 | 9 | 4 | 7 | 8 | 2 | 7 | 8 | 0 | 6 | 8 | 8 |
| 2016 | 11 | 5 | 0 | 4 | 5 | 10 | 0 | 2 | 11 | 11 | 0 | 10 | 2 | 0 |
| 2017 | 1 | 9 | 0 | 3 | 6 | 0 | 6 | 7 | 10 | 1 | 6 | 2 | 1 | 1 |
| 2018 | 1 | 8 | 0 | 4 | 1 | 0 | 1 | 4 | 9 | 0 | 1 | 11 | 7 | 3 |
| 2019 | 11 | 4 | 2 | 7 | 10 | 3 | 4 | 4 | 6 | 8 | 9 | 8 | 10 | 4 |
| 2020 | 6 | 7 | 10 | 0 | 3 | 9 | 8 | 5 | 8 | 9 | 10 | 5 | 11 | 8 |
| 2021 | 6 | 2 | 4 | 2 | 11 | 9 | 10 | 10 | 2 | 3 | 9 | 9 | 0 | 1 |
| 2022 | 8 | 1 | 3 | 4 | 3 | 3 | 2 | 11 | 11 | 7 | 2 | 9 | 3 | 1 |
| 2023 | 5 | 11 | 10 | 5 | 8 | 0 | 0 | 9 | 3 | 5 | 2 | 2 | 5 | 8 |
| 2024 | 10 | 5 | 2 | 4 | 2 | 8 | 7 | 2 | 10 | 4 | 9 | 3 | 10 | 2 |
| 2025 | 8 | 10 | 6 | 7 | 4 | 0 | 10 | 2 | 3 | 6 | 9 | 7 | 7 | 0 |
| 2026 | 11 | 7 | 9 | 5 | 10 | 5 | 8 | 9 | 0 | 0 | 2 | 11 | 1 | 7 |
| 2027 | 11 | 1 | 6 | 0 | 0 | 8 | 2 | 5 | 5 | 10 | 1 | 10 | 5 | 6 |
| 2028 | 0 | 6 | 3 | 3 | 10 | 10 | 7 | 6 | 3 | 7 | 7 | 5 | 1 | 10 |
| 2029 | 7 | 3 | 11 | 9 | 0 | 1 | 4 | 8 | 7 | 5 | 1 | 9 | 10 | 0 |
| 2030 | 4 | 1 | 4 | 3 | 7 | 7 | 3 | 11 | 2 | 2 | 0 | 10 | 11 | 11 |
| 2031 | 0 | 3 | 9 | 1 | 6 | 4 | 7 | 9 | 2 | 9 | 9 | 9 | 7 | 3 |
| 2032 | 7 | 2 | 6 | 10 | 3 | 9 | 4 | 5 | 5 | 7 | 3 | 9 | 4 | 5 |
| 2033 | 6 | 8 | 0 | 11 | 3 | 0 | 3 | 3 | 6 | 8 | 11 | 7 | 10 | 7 |
| 2034 | 0 | 10 | 8 | 2 | 4 | 2 | 1 | 7 | 6 | 4 | 11 | 6 | 3 | 5 |
| 2035 | 5 | 1 | 1 | 3 | 10 | 11 | 2 | 9 | 9 | 11 | 5 | 4 | 9 | 9 |

-continued

| Example #4 of a group-based CS hopping pattern | | | | | | | | | | | | | | |
|---|---|---|---|---|---|---|---|---|---|---|---|---|---|---|
| m | $n_{cs}(n)$ | | | | | | | | | | | | | |
| 2036 | 2 | 9 | 1 | 4 | 10 | 4 | 4 | 9 | 5 | 7 | 0 | 11 | 2 | 6 |
| 2037 | 1 | 6 | 8 | 7 | 8 | 7 | 8 | 2 | 8 | 6 | 2 | 8 | 1 | 4 |
| 2038 | 8 | 10 | 0 | 2 | 5 | 8 | 9 | 1 | 5 | 11 | 3 | 2 | 5 | 2 |
| 2039 | 4 | 10 | 9 | 8 | 5 | 6 | 5 | 3 | 1 | 1 | 5 | 0 | 3 | 4 |
| 2040 | 7 | 7 | 7 | 5 | 8 | 1 | 1 | 4 | 0 | 6 | 4 | 9 | 11 | 1 |
| 2041 | 4 | 0 | 11 | 3 | 5 | 10 | 2 | 1 | 0 | 3 | 6 | 2 | 7 | 8 |
| 2042 | 4 | 2 | 1 | 5 | 2 | 6 | 4 | 6 | 6 | 4 | 4 | 2 | 1 | 10 |
| 2043 | 5 | 7 | 11 | 6 | 0 | 6 | 0 | 10 | 10 | 1 | 1 | 11 | 4 | 9 |
| 2044 | 4 | 4 | 0 | 1 | 5 | 2 | 10 | 8 | 6 | 9 | 11 | 8 | 11 | 3 |
| 2045 | 8 | 9 | 4 | 2 | 5 | 4 | 10 | 3 | 11 | 6 | 11 | 3 | 2 | 7 |
| 2046 | 7 | 8 | 2 | 10 | 4 | 6 | 2 | 9 | 9 | 2 | 10 | 0 | 2 | 11 |
| 2047 | 11 | 3 | 10 | 0 | 2 | 3 | 2 | 7 | 4 | 6 | 2 | 5 | 2 | 5 |

Example #5 of a Group-Based CS Hopping Pattern

| Example #5 of a group-based CS hopping pattern | | | | | | | | | | | | | | |
|---|---|---|---|---|---|---|---|---|---|---|---|---|---|---|
| m | $n_{cs}(n)$ | | | | | | | | | | | | | |
| 0 | 6 | 6 | 11 | 6 | 3 | 8 | 11 | 5 | 8 | 3 | 10 | 5 | 5 | 0 |
| 1 | 1 | 3 | 9 | 8 | 7 | 7 | 5 | 6 | 9 | 6 | 2 | 2 | 3 | 3 |
| 2 | 9 | 5 | 5 | 7 | 9 | 9 | 3 | 0 | 10 | 5 | 5 | 7 | 0 | 8 |
| 3 | 4 | 7 | 10 | 1 | 1 | 3 | 4 | 9 | 4 | 11 | 11 | 1 | 10 | 10 |
| 4 | 7 | 4 | 8 | 6 | 0 | 0 | 5 | 8 | 11 | 7 | 9 | 4 | 7 | 2 |
| 5 | 8 | 4 | 7 | 11 | 2 | 3 | 9 | 4 | 0 | 1 | 6 | 3 | 0 | 5 |
| 6 | 10 | 0 | 4 | 11 | 6 | 4 | 8 | 2 | 3 | 3 | 2 | 9 | 8 | 2 |
| 7 | 5 | 0 | 3 | 0 | 5 | 5 | 10 | 4 | 8 | 8 | 4 | 2 | 9 | 7 |
| 8 | 5 | 7 | 1 | 5 | 2 | 9 | 6 | 2 | 2 | 6 | 1 | 11 | 5 | 6 |
| 9 | 0 | 10 | 2 | 3 | 2 | 5 | 0 | 5 | 9 | 9 | 5 | 0 | 10 | 1 |
| 10 | 4 | 0 | 7 | 3 | 0 | 5 | 3 | 3 | 7 | 3 | 0 | 7 | 11 | 9 |
| 11 | 10 | 8 | 9 | 10 | 8 | 9 | 3 | 9 | 7 | 8 | 8 | 8 | 8 | 3 |
| 12 | 0 | 9 | 1 | 7 | 3 | 8 | 4 | 11 | 11 | 6 | 11 | 8 | 6 | 3 |
| 13 | 6 | 4 | 10 | 10 | 1 | 10 | 10 | 7 | 2 | 8 | 7 | 10 | 5 | 5 |
| 14 | 7 | 8 | 3 | 2 | 7 | 2 | 1 | 9 | 11 | 6 | 7 | 1 | 11 | 7 |
| 15 | 7 | 6 | 6 | 11 | 4 | 10 | 6 | 11 | 7 | 10 | 11 | 10 | 0 | 4 |
| 16 | 1 | 7 | 11 | 10 | 10 | 10 | 4 | 5 | 10 | 7 | 6 | 11 | 7 | 1 |
| 17 | 11 | 7 | 1 | 2 | 0 | 11 | 1 | 8 | 4 | 2 | 6 | 7 | 3 | 4 |
| 18 | 10 | 8 | 10 | 8 | 1 | 0 | 7 | 6 | 0 | 1 | 4 | 0 | 4 | 0 |
| 19 | 10 | 1 | 8 | 3 | 9 | 2 | 11 | 2 | 11 | 5 | 0 | 8 | 9 | 0 |
| 20 | 3 | 11 | 7 | 1 | 7 | 9 | 5 | 8 | 0 | 4 | 10 | 10 | 1 | 8 |
| 21 | 0 | 3 | 3 | 5 | 11 | 1 | 7 | 8 | 6 | 10 | 2 | 5 | 11 | 8 |
| 22 | 10 | 2 | 6 | 2 | 4 | 8 | 11 | 3 | 4 | 11 | 5 | 0 | 2 | 8 |
| 23 | 9 | 8 | 5 | 9 | 10 | 7 | 10 | 11 | 5 | 10 | 6 | 6 | 11 | 9 |
| 24 | 9 | 1 | 3 | 6 | 8 | 10 | 2 | 6 | 4 | 0 | 4 | 8 | 1 | 5 |
| 25 | 5 | 2 | 10 | 4 | 6 | 9 | 2 | 1 | 0 | 2 | 5 | 3 | 8 | 4 |
| 26 | 8 | 1 | 9 | 4 | 10 | 1 | 8 | 8 | 10 | 0 | 8 | 7 | 5 | 7 |
| 27 | 0 | 5 | 9 | 5 | 5 | 2 | 11 | 0 | 3 | 11 | 6 | 4 | 5 | 3 |
| 28 | 4 | 5 | 4 | 1 | 0 | 8 | 6 | 6 | 5 | 7 | 7 | 0 | 1 | 4 |
| 29 | 8 | 10 | 8 | 2 | 11 | 8 | 4 | 10 | 5 | 10 | 4 | 11 | 10 | 0 |
| 30 | 8 | 6 | 10 | 10 | 0 | 11 | 7 | 2 | 5 | 11 | 10 | 6 | 9 | 2 |
| 31 | 2 | 3 | 0 | 7 | 2 | 11 | 3 | 4 | 3 | 2 | 7 | 1 | 9 | 6 |
| 32 | 0 | 7 | 6 | 1 | 10 | 1 | 10 | 6 | 1 | 6 | 3 | 9 | 4 | 2 |
| 33 | 3 | 4 | 11 | 8 | 8 | 4 | 11 | 8 | 3 | 9 | 3 | 7 | 6 | 6 |
| 34 | 2 | 6 | 7 | 4 | 5 | 6 | 2 | 9 | 6 | 7 | 1 | 4 | 3 | 1 |
| 35 | 11 | 1 | 4 | 0 | 10 | 3 | 2 | 0 | 7 | 11 | 2 | 2 | 2 | 0 |
| 36 | 4 | 2 | 2 | 2 | 7 | 9 | 0 | 4 | 6 | 8 | 0 | 9 | 6 | 6 |
| 37 | 8 | 10 | 4 | 6 | 1 | 3 | 7 | 1 | 0 | 10 | 11 | 4 | 2 | 8 |
| 38 | 9 | 2 | 1 | 0 | 6 | 10 | 9 | 4 | 1 | 5 | 5 | 5 | 2 | 6 |
| 39 | 1 | 4 | 5 | 10 | 2 | 1 | 11 | 6 | 9 | 4 | 3 | 6 | 5 | 4 |
| 40 | 5 | 3 | 2 | 1 | 2 | 2 | 11 | 3 | 6 | 10 | 1 | 1 | 10 | 4 |
| 41 | 2 | 9 | 5 | 5 | 1 | 0 | 3 | 6 | 11 | 8 | 5 | 10 | 10 | 6 |
| 42 | 6 | 10 | 1 | 4 | 7 | 10 | 4 | 10 | 9 | 4 | 2 | 5 | 0 | 10 |
| 43 | 4 | 2 | 5 | 9 | 3 | 8 | 7 | 4 | 4 | 0 | 1 | 6 | 4 | 10 |
| 44 | 11 | 3 | 8 | 6 | 5 | 1 | 8 | 10 | 4 | 5 | 0 | 1 | 3 | 3 |
| 45 | 2 | 1 | 5 | 1 | 6 | 9 | 4 | 5 | 2 | 4 | 2 | 1 | 11 | 5 |
| 46 | 10 | 11 | 7 | 6 | 6 | 10 | 11 | 2 | 8 | 7 | 1 | 1 | 4 | 3 |
| 47 | 9 | 5 | 9 | 9 | 11 | 6 | 4 | 5 | 8 | 9 | 5 | 10 | 3 | 4 |
| 48 | 0 | 6 | 2 | 2 | 9 | 9 | 11 | 1 | 8 | 5 | 2 | 11 | 8 | 1 |
| 49 | 11 | 10 | 10 | 9 | 9 | 10 | 3 | 7 | 5 | 11 | 8 | 9 | 3 | 10 |
| 50 | 1 | 2 | 9 | 10 | 11 | 5 | 2 | 11 | 9 | 7 | 11 | 9 | 4 | 7 |
| 51 | 6 | 2 | 6 | 2 | 2 | 6 | 5 | 1 | 2 | 7 | 9 | 5 | 4 | 3 |

-continued

| Example #5 of a group-based CS hopping pattern | | | | | | | | | | | | | | |
|---|---|---|---|---|---|---|---|---|---|---|---|---|---|---|
| m | $n_{cs}(n)$ | | | | | | | | | | | | | |
| 52 | 2 | 7 | 7 | 9 | 10 | 6 | 6 | 2 | 8 | 0 | 4 | 8 | 10 | 11 |
| 53 | 7 | 9 | 0 | 2 | 2 | 11 | 9 | 9 | 10 | 10 | 1 | 4 | 4 | 5 |
| 54 | 4 | 10 | 4 | 3 | 10 | 2 | 4 | 9 | 9 | 0 | 8 | 4 | 6 | 0 |
| 55 | 9 | 4 | 6 | 7 | 9 | 2 | 2 | 4 | 0 | 3 | 7 | 6 | 5 | 9 |
| 56 | 11 | 9 | 7 | 1 | 11 | 10 | 1 | 9 | 10 | 7 | 3 | 3 | 11 | 11 |
| 57 | 4 | 8 | 8 | 7 | 0 | 7 | 11 | 10 | 2 | 3 | 5 | 6 | 7 | 8 |
| 58 | 2 | 6 | 8 | 6 | 9 | 4 | 3 | 1 | 2 | 10 | 6 | 8 | 6 | 3 |
| 59 | 4 | 1 | 10 | 6 | 7 | 11 | 6 | 4 | 3 | 1 | 3 | 2 | 7 | 10 |
| 60 | 11 | 3 | 11 | 0 | 9 | 2 | 10 | 11 | 8 | 1 | 7 | 7 | 11 | 10 |
| 61 | 0 | 5 | 8 | 0 | 7 | 1 | 0 | 0 | 11 | 3 | 8 | 3 | 0 | 4 |
| 62 | 4 | 11 | 9 | 3 | 6 | 6 | 6 | 2 | 7 | 11 | 3 | 5 | 9 | 1 |
| 63 | 7 | 5 | 1 | 3 | 5 | 1 | 5 | 2 | 5 | 5 | 11 | 9 | 6 | 1 |
| 64 | 5 | 6 | 3 | 4 | 4 | 2 | 4 | 0 | 5 | 4 | 6 | 10 | 4 | 1 |
| 65 | 9 | 5 | 11 | 7 | 8 | 8 | 10 | 8 | 9 | 2 | 11 | 4 | 1 | 2 |
| 66 | 11 | 2 | 2 | 0 | 11 | 6 | 3 | 5 | 4 | 10 | 8 | 7 | 6 | 11 |
| 67 | 11 | 1 | 11 | 4 | 7 | 6 | 9 | 8 | 7 | 9 | 0 | 3 | 7 | 2 |
| 68 | 2 | 2 | 3 | 10 | 3 | 1 | 1 | 0 | 9 | 10 | 10 | 1 | 8 | 6 |
| 69 | 0 | 9 | 7 | 11 | 2 | 9 | 2 | 7 | 8 | 2 | 0 | 6 | 7 | 6 |
| 70 | 3 | 4 | 8 | 8 | 0 | 3 | 10 | 9 | 1 | 4 | 0 | 0 | 3 | 4 |
| 71 | 3 | 4 | 6 | 7 | 6 | 10 | 3 | 5 | 5 | 8 | 2 | 11 | 0 | 6 |
| 72 | 7 | 3 | 11 | 10 | 1 | 7 | 1 | 10 | 10 | 3 | 3 | 5 | 6 | 5 |
| 73 | 0 | 2 | 8 | 9 | 1 | 9 | 9 | 5 | 2 | 1 | 3 | 8 | 4 | 4 |
| 74 | 1 | 6 | 2 | 0 | 0 | 7 | 3 | 8 | 3 | 11 | 2 | 4 | 0 | 9 |
| 75 | 10 | 7 | 5 | 11 | 4 | 2 | 10 | 9 | 3 | 8 | 0 | 5 | 11 | 5 |
| 76 | 9 | 7 | 4 | 1 | 8 | 1 | 6 | 4 | 2 | 0 | 9 | 5 | 8 | 8 |
| 77 | 11 | 2 | 4 | 9 | 3 | 7 | 10 | 2 | 3 | 5 | 11 | 4 | 9 | 5 |
| 78 | 10 | 5 | 6 | 5 | 0 | 9 | 9 | 3 | 11 | 8 | 11 | 1 | 6 | 10 |
| 79 | 1 | 1 | 10 | 11 | 2 | 5 | 1 | 3 | 1 | 10 | 2 | 11 | 0 | 10 |
| 80 | 2 | 0 | 4 | 1 | 7 | 2 | 7 | 11 | 1 | 10 | 0 | 8 | 8 | 5 |
| 81 | 2 | 2 | 6 | 5 | 1 | 4 | 9 | 11 | 10 | 6 | 9 | 9 | 2 | 0 |
| 82 | 8 | 0 | 1 | 11 | 1 | 10 | 3 | 11 | 8 | 0 | 9 | 3 | 10 | 8 |
| 83 | 11 | 5 | 10 | 5 | 4 | 5 | 6 | 11 | 0 | 0 | 5 | 8 | 6 | 9 |
| 84 | 6 | 7 | 6 | 6 | 11 | 9 | 8 | 8 | 6 | 4 | 8 | 4 | 0 | 4 |
| 85 | 10 | 8 | 11 | 0 | 11 | 1 | 5 | 5 | 6 | 8 | 6 | 4 | 1 | 5 |
| 86 | 3 | 9 | 6 | 5 | 7 | 7 | 7 | 7 | 6 | 5 | 7 | 9 | 4 | 10 |
| 87 | 1 | 7 | 8 | 8 | 0 | 6 | 8 | 11 | 4 | 9 | 2 | 11 | 4 | 5 |
| 88 | 10 | 1 | 2 | 5 | 5 | 11 | 3 | 10 | 8 | 0 | 10 | 9 | 6 | 3 |
| 89 | 11 | 5 | 5 | 2 | 8 | 4 | 0 | 9 | 9 | 8 | 10 | 3 | 10 | 7 |
| 90 | 2 | 7 | 9 | 0 | 3 | 3 | 11 | 6 | 10 | 3 | 1 | 8 | 3 | 6 |
| 91 | 4 | 6 | 0 | 3 | 8 | 9 | 3 | 10 | 6 | 10 | 10 | 10 | 4 | 7 |
| 92 | 7 | 0 | 10 | 4 | 10 | 10 | 5 | 10 | 11 | 11 | 0 | 2 | 6 | 7 |
| 93 | 2 | 2 | 9 | 7 | 4 | 8 | 9 | 2 | 0 | 9 | 0 | 2 | 9 | 3 |
| 94 | 3 | 9 | 1 | 6 | 6 | 3 | 1 | 3 | 10 | 6 | 10 | 10 | 0 | 4 |
| 95 | 11 | 5 | 7 | 3 | 5 | 11 | 7 | 4 | 2 | 6 | 4 | 1 | 8 | 5 |
| 96 | 6 | 5 | 4 | 2 | 3 | 9 | 3 | 4 | 1 | 10 | 9 | 0 | 5 | 11 |
| 97 | 6 | 11 | 0 | 0 | 3 | 3 | 9 | 10 | 3 | 0 | 0 | 4 | 8 | 2 |
| 98 | 0 | 8 | 5 | 10 | 5 | 8 | 9 | 2 | 3 | 10 | 9 | 0 | 0 | 1 |
| 99 | 8 | 1 | 6 | 2 | 5 | 7 | 6 | 5 | 6 | 11 | 9 | 10 | 3 | 5 |
| 100 | 5 | 10 | 6 | 4 | 3 | 4 | 1 | 5 | 3 | 3 | 4 | 6 | 11 | 10 |
| 101 | 2 | 1 | 1 | 11 | 3 | 1 | 11 | 5 | 1 | 6 | 6 | 3 | 2 | 9 |
| 102 | 6 | 3 | 11 | 9 | 2 | 1 | 2 | 1 | 11 | 6 | 1 | 10 | 0 | 2 |
| 103 | 7 | 4 | 9 | 5 | 6 | 1 | 2 | 3 | 2 | 6 | 6 | 6 | 10 | 1 |
| 104 | 0 | 8 | 3 | 7 | 8 | 6 | 3 | 7 | 11 | 4 | 2 | 7 | 10 | 1 |
| 105 | 7 | 7 | 4 | 0 | 6 | 6 | 0 | 10 | 6 | 5 | 2 | 0 | 1 | 10 |
| 106 | 6 | 8 | 1 | 4 | 9 | 6 | 5 | 4 | 7 | 6 | 1 | 6 | 6 | 0 |
| 107 | 9 | 7 | 8 | 3 | 5 | 0 | 11 | 8 | 7 | 9 | 10 | 9 | 0 | 11 |
| 108 | 10 | 11 | 3 | 10 | 9 | 8 | 2 | 1 | 9 | 1 | 7 | 3 | 10 | 0 |
| 109 | 5 | 4 | 11 | 2 | 0 | 5 | 8 | 0 | 0 | 9 | 4 | 1 | 2 | 8 |
| 110 | 11 | 11 | 2 | 0 | 1 | 8 | 0 | 6 | 5 | 2 | 10 | 11 | 5 | 1 |
| 111 | 4 | 8 | 0 | 3 | 7 | 7 | 2 | 9 | 1 | 1 | 4 | 3 | 8 | 6 |
| 112 | 9 | 10 | 3 | 1 | 0 | 11 | 10 | 9 | 7 | 9 | 1 | 11 | 1 | 8 |
| 113 | 4 | 3 | 5 | 10 | 4 | 10 | 7 | 5 | 2 | 11 | 4 | 0 | 3 | 3 |
| 114 | 4 | 10 | 1 | 5 | 3 | 3 | 0 | 7 | 1 | 4 | 1 | 4 | 10 | 3 |
| 115 | 3 | 0 | 7 | 2 | 9 | 11 | 5 | 1 | 10 | 9 | 0 | 9 | 10 | 10 |
| 116 | 10 | 0 | 5 | 9 | 0 | 9 | 1 | 1 | 6 | 1 | 8 | 6 | 2 | 1 |
| 117 | 3 | 7 | 3 | 2 | 8 | 7 | 4 | 7 | 2 | 2 | 3 | 11 | 2 | 2 |
| 118 | 9 | 5 | 0 | 4 | 0 | 3 | 4 | 3 | 0 | 0 | 3 | 7 | 2 | 6 |
| 119 | 10 | 5 | 2 | 2 | 5 | 10 | 11 | 6 | 7 | 10 | 3 | 5 | 7 | 2 |
| 120 | 5 | 3 | 0 | 8 | 11 | 7 | 9 | 11 | 5 | 4 | 3 | 7 | 1 | 8 |
| 121 | 1 | 9 | 0 | 1 | 6 | 4 | 5 | 11 | 2 | 3 | 1 | 3 | 9 | 7 |
| 122 | 7 | 10 | 7 | 1 | 9 | 5 | 8 | 4 | 2 | 5 | 11 | 6 | 1 | 11 |
| 123 | 10 | 4 | 3 | 4 | 7 | 11 | 9 | 5 | 4 | 3 | 1 | 5 | 2 | 11 |
| 124 | 6 | 9 | 2 | 6 | 11 | 0 | 10 | 10 | 11 | 11 | 11 | 0 | 11 | 1 |
| 125 | 5 | 0 | 4 | 9 | 2 | 5 | 9 | 5 | 11 | 7 | 7 | 4 | 5 | 8 |
| 126 | 4 | 9 | 5 | 4 | 5 | 10 | 3 | 8 | 0 | 2 | 6 | 5 | 6 | 8 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 127 | 1 | 10 | 6 | 6 | 4 | 2 | 3 | 11 | 9 | 2 | 6 | 0 | 5 | 2 |
| 128 | 0 | 3 | 5 | 3 | 8 | 11 | 11 | 5 | 1 | 7 | 11 | 1 | 7 | 10 |
| 129 | 3 | 0 | 6 | 1 | 9 | 3 | 8 | 7 | 9 | 8 | 1 | 5 | 9 | 0 |
| 130 | 4 | 1 | 2 | 11 | 2 | 9 | 7 | 5 | 0 | 0 | 7 | 8 | 9 | 7 |
| 131 | 6 | 0 | 8 | 10 | 6 | 4 | 10 | 0 | 9 | 11 | 4 | 8 | 4 | 9 |
| 132 | 9 | 9 | 2 | 2 | 10 | 3 | 6 | 10 | 9 | 7 | 7 | 10 | 7 | 7 |
| 133 | 5 | 1 | 7 | 11 | 4 | 11 | 0 | 9 | 2 | 5 | 8 | 7 | 0 | 1 |
| 134 | 2 | 8 | 7 | 10 | 8 | 0 | 0 | 7 | 1 | 3 | 4 | 2 | 0 | 10 |
| 135 | 7 | 3 | 0 | 5 | 8 | 6 | 9 | 7 | 3 | 7 | 6 | 9 | 11 | 4 |
| 136 | 1 | 6 | 9 | 6 | 3 | 5 | 1 | 7 | 7 | 5 | 1 | 3 | 11 | 2 |
| 137 | 4 | 9 | 8 | 9 | 9 | 10 | 5 | 6 | 3 | 7 | 1 | 2 | 5 | 5 |
| 138 | 4 | 0 | 3 | 10 | 11 | 4 | 11 | 7 | 4 | 7 | 9 | 7 | 1 | 2 |
| 139 | 7 | 5 | 8 | 6 | 10 | 11 | 9 | 6 | 1 | 0 | 6 | 11 | 3 | 8 |
| 140 | 6 | 8 | 7 | 8 | 8 | 9 | 1 | 0 | 5 | 0 | 6 | 9 | 7 | 8 |
| 141 | 10 | 11 | 4 | 9 | 11 | 5 | 3 | 6 | 10 | 0 | 3 | 2 | 9 | 6 |
| 142 | 2 | 5 | 6 | 8 | 5 | 5 | 8 | 1 | 0 | 10 | 8 | 6 | 10 | 0 |
| 143 | 0 | 11 | 8 | 9 | 5 | 2 | 1 | 4 | 9 | 8 | 11 | 7 | 7 | 9 |
| 144 | 5 | 11 | 9 | 8 | 7 | 8 | 6 | 9 | 6 | 4 | 5 | 6 | 8 | 10 |
| 145 | 3 | 3 | 6 | 11 | 3 | 10 | 0 | 6 | 8 | 11 | 10 | 1 | 1 | 9 |
| 146 | 8 | 5 | 2 | 5 | 10 | 0 | 0 | 2 | 2 | 8 | 3 | 0 | 8 | 9 |
| 147 | 8 | 11 | 5 | 10 | 0 | 3 | 3 | 10 | 6 | 6 | 11 | 8 | 11 | 10 |
| 148 | 7 | 8 | 4 | 4 | 5 | 4 | 0 | 0 | 10 | 1 | 0 | 11 | 7 | 9 |
| 149 | 1 | 6 | 7 | 7 | 2 | 2 | 0 | 1 | 3 | 0 | 11 | 9 | 2 | 4 |
| 150 | 6 | 6 | 4 | 10 | 8 | 7 | 11 | 0 | 1 | 4 | 0 | 4 | 2 | 7 |
| 151 | 2 | 5 | 4 | 5 | 4 | 10 | 5 | 3 | 3 | 3 | 4 | 11 | 7 | 8 |
| 152 | 7 | 10 | 0 | 7 | 9 | 3 | 1 | 2 | 11 | 1 | 5 | 5 | 8 | 9 |
| 153 | 6 | 10 | 0 | 8 | 2 | 1 | 0 | 4 | 1 | 8 | 10 | 2 | 2 | 5 |
| 154 | 7 | 9 | 1 | 0 | 1 | 9 | 4 | 3 | 0 | 11 | 7 | 11 | 1 | 2 |
| 155 | 8 | 11 | 5 | 7 | 4 | 7 | 2 | 3 | 8 | 9 | 1 | 7 | 6 | 9 |
| 156 | 1 | 9 | 10 | 11 | 3 | 3 | 10 | 10 | 8 | 9 | 9 | 5 | 9 | 3 |
| 157 | 6 | 11 | 8 | 1 | 10 | 0 | 6 | 0 | 11 | 9 | 2 | 1 | 8 | 3 |
| 158 | 1 | 0 | 2 | 7 | 8 | 5 | 2 | 10 | 1 | 3 | 9 | 10 | 8 | 0 |
| 159 | 4 | 2 | 0 | 6 | 0 | 1 | 10 | 3 | 10 | 4 | 4 | 5 | 4 | 1 |
| 160 | 3 | 8 | 2 | 11 | 10 | 11 | 11 | 6 | 4 | 7 | 5 | 3 | 4 | 6 |
| 161 | 8 | 8 | 9 | 3 | 2 | 10 | 11 | 5 | 3 | 10 | 0 | 11 | 4 | 11 |
| 162 | 3 | 9 | 11 | 1 | 11 | 9 | 3 | 10 | 2 | 1 | 6 | 7 | 7 | 9 |
| 163 | 2 | 10 | 5 | 11 | 10 | 1 | 0 | 3 | 6 | 2 | 3 | 1 | 0 | 8 |
| 164 | 4 | 9 | 5 | 8 | 8 | 8 | 9 | 1 | 11 | 11 | 2 | 2 | 7 | 11 |
| 165 | 6 | 9 | 11 | 3 | 8 | 2 | 5 | 9 | 4 | 2 | 10 | 8 | 2 | 6 |
| 166 | 10 | 6 | 11 | 7 | 4 | 3 | 10 | 7 | 1 | 10 | 3 | 7 | 9 | 7 |
| 167 | 1 | 8 | 8 | 7 | 6 | 8 | 6 | 3 | 9 | 0 | 8 | 7 | 0 | 5 |
| 168 | 8 | 4 | 8 | 11 | 11 | 7 | 2 | 1 | 7 | 0 | 0 | 1 | 2 | 1 |
| 169 | 6 | 6 | 11 | 4 | 1 | 9 | 8 | 2 | 9 | 2 | 4 | 11 | 6 | 7 |
| 170 | 1 | 8 | 4 | 2 | 4 | 5 | 11 | 2 | 3 | 2 | 1 | 5 | 1 | 4 |
| 171 | 0 | 5 | 1 | 0 | 6 | 4 | 3 | 6 | 5 | 1 | 6 | 1 | 8 | 10 |
| 172 | 5 | 0 | 0 | 1 | 8 | 3 | 10 | 8 | 10 | 5 | 7 | 9 | 8 | 6 |
| 173 | 3 | 2 | 8 | 5 | 9 | 1 | 3 | 11 | 0 | 2 | 1 | 6 | 0 | 7 |
| 174 | 11 | 4 | 3 | 11 | 10 | 10 | 1 | 2 | 6 | 8 | 8 | 2 | 10 | 3 |
| 175 | 9 | 6 | 4 | 0 | 3 | 0 | 6 | 9 | 0 | 11 | 1 | 1 | 5 | 4 |
| 176 | 7 | 2 | 9 | 9 | 8 | 4 | 8 | 4 | 8 | 3 | 7 | 0 | 10 | 6 |
| 177 | 2 | 4 | 2 | 10 | 10 | 9 | 7 | 11 | 5 | 1 | 1 | 4 | 7 | 3 |
| 178 | 11 | 8 | 4 | 6 | 0 | 9 | 11 | 11 | 6 | 7 | 4 | 9 | 10 | 0 |
| 179 | 10 | 4 | 6 | 3 | 3 | 7 | 1 | 8 | 1 | 6 | 5 | 5 | 1 | 7 |
| 180 | 8 | 7 | 7 | 2 | 6 | 7 | 1 | 6 | 11 | 8 | 10 | 4 | 4 | 10 |
| 181 | 0 | 7 | 0 | 2 | 9 | 8 | 10 | 11 | 6 | 2 | 9 | 5 | 7 | 0 |
| 182 | 0 | 3 | 7 | 9 | 6 | 0 | 10 | 4 | 0 | 10 | 8 | 1 | 6 | 7 |
| 183 | 0 | 3 | 0 | 2 | 10 | 0 | 5 | 10 | 1 | 0 | 5 | 7 | 9 | 4 |
| 184 | 1 | 0 | 11 | 2 | 1 | 6 | 6 | 3 | 1 | 9 | 6 | 2 | 9 | 9 |
| 185 | 1 | 3 | 7 | 0 | 11 | 6 | 5 | 0 | 2 | 9 | 10 | 0 | 7 | 0 |
| 186 | 2 | 6 | 6 | 10 | 6 | 5 | 5 | 3 | 8 | 9 | 6 | 10 | 8 | 11 |
| 187 | 4 | 4 | 4 | 0 | 9 | 4 | 4 | 8 | 7 | 8 | 5 | 0 | 3 | 8 |
| 188 | 2 | 0 | 10 | 3 | 2 | 8 | 9 | 0 | 4 | 5 | 10 | 6 | 1 | 7 |
| 189 | 8 | 2 | 4 | 7 | 11 | 10 | 5 | 9 | 8 | 6 | 6 | 5 | 5 | 2 |
| 190 | 9 | 1 | 1 | 9 | 6 | 8 | 8 | 10 | 7 | 4 | 11 | 3 | 3 | 7 |
| 191 | 10 | 10 | 1 | 5 | 10 | 7 | 8 | 10 | 3 | 5 | 8 | 8 | 7 | 4 |
| 192 | 0 | 6 | 5 | 1 | 2 | 6 | 9 | 0 | 5 | 6 | 0 | 5 | 9 | 11 |
| 193 | 9 | 7 | 0 | 2 | 3 | 0 | 8 | 1 | 3 | 6 | 7 | 3 | 6 | 1 |
| 194 | 7 | 0 | 9 | 5 | 7 | 0 | 11 | 5 | 7 | 2 | 3 | 2 | 11 | 0 |
| 195 | 1 | 3 | 1 | 9 | 8 | 5 | 7 | 8 | 8 | 8 | 10 | 7 | 5 | 2 |
| 196 | 0 | 8 | 11 | 4 | 11 | 0 | 4 | 0 | 2 | 7 | 8 | 6 | 5 | 6 |
| 197 | 4 | 5 | 3 | 11 | 6 | 3 | 8 | 11 | 8 | 6 | 4 | 4 | 7 | 11 |
| 198 | 0 | 6 | 3 | 8 | 0 | 5 | 0 | 10 | 0 | 6 | 9 | 3 | 5 | 5 |
| 199 | 1 | 10 | 4 | 7 | 10 | 9 | 9 | 2 | 4 | 4 | 4 | 10 | 0 | 2 |
| 200 | 3 | 11 | 11 | 3 | 4 | 11 | 3 | 0 | 6 | 0 | 1 | 1 | 1 | 0 |
| 201 | 9 | 11 | 6 | 6 | 9 | 7 | 0 | 9 | 4 | 2 | 2 | 7 | 9 | 3 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 202 | 8 | 1 | 11 | 0 | 1 | 6 | 4 | 5 | 5 | 5 | 1 | 9 | 4 | 8 |
| 203 | 3 | 3 | 8 | 10 | 1 | 4 | 6 | 4 | 1 | 0 | 1 | 3 | 7 | 1 |
| 204 | 4 | 11 | 4 | 4 | 3 | 0 | 8 | 11 | 1 | 9 | 6 | 7 | 11 | 0 |
| 205 | 5 | 5 | 4 | 4 | 1 | 6 | 11 | 1 | 4 | 3 | 10 | 1 | 1 | 1 |
| 206 | 7 | 8 | 7 | 5 | 3 | 1 | 4 | 2 | 6 | 4 | 7 | 2 | 2 | 4 |
| 207 | 6 | 7 | 5 | 3 | 6 | 6 | 2 | 7 | 3 | 2 | 7 | 2 | 10 | 7 |
| 208 | 2 | 9 | 0 | 0 | 2 | 8 | 7 | 1 | 6 | 7 | 5 | 11 | 2 | 9 |
| 209 | 10 | 10 | 8 | 8 | 3 | 2 | 8 | 7 | 0 | 7 | 6 | 5 | 3 | 11 |
| 210 | 2 | 1 | 10 | 7 | 0 | 0 | 8 | 9 | 9 | 6 | 3 | 10 | 8 | 5 |
| 211 | 8 | 8 | 0 | 11 | 7 | 0 | 0 | 3 | 3 | 11 | 8 | 5 | 3 | 2 |
| 212 | 7 | 0 | 2 | 2 | 2 | 2 | 7 | 8 | 8 | 9 | 11 | 3 | 0 | 0 |
| 213 | 0 | 1 | 10 | 8 | 8 | 1 | 6 | 9 | 10 | 10 | 6 | 1 | 9 | 0 |
| 214 | 11 | 0 | 3 | 6 | 1 | 4 | 5 | 1 | 5 | 0 | 3 | 2 | 3 | 11 |
| 215 | 10 | 2 | 2 | 5 | 8 | 2 | 5 | 8 | 5 | 6 | 0 | 4 | 8 | 1 |
| 216 | 6 | 10 | 1 | 11 | 5 | 5 | 6 | 11 | 11 | 1 | 0 | 7 | 4 | 0 |
| 217 | 7 | 6 | 5 | 3 | 11 | 3 | 7 | 11 | 0 | 9 | 4 | 5 | 1 | 6 |
| 218 | 9 | 1 | 8 | 2 | 8 | 3 | 1 | 5 | 7 | 10 | 5 | 0 | 11 | 6 |
| 219 | 8 | 0 | 9 | 8 | 0 | 1 | 9 | 7 | 3 | 5 | 7 | 5 | 6 | 5 |
| 220 | 8 | 5 | 1 | 11 | 10 | 4 | 6 | 1 | 4 | 9 | 1 | 4 | 11 | 5 |
| 221 | 2 | 7 | 11 | 10 | 1 | 8 | 5 | 4 | 11 | 6 | 2 | 7 | 4 | 4 |
| 222 | 5 | 5 | 11 | 8 | 6 | 11 | 2 | 9 | 1 | 9 | 7 | 9 | 11 | 11 |
| 223 | 9 | 6 | 0 | 4 | 4 | 11 | 1 | 8 | 9 | 5 | 10 | 8 | 5 | 3 |
| 224 | 8 | 7 | 10 | 3 | 4 | 4 | 3 | 4 | 8 | 7 | 0 | 10 | 9 | 1 |
| 225 | 5 | 2 | 11 | 4 | 3 | 7 | 7 | 11 | 8 | 11 | 8 | 8 | 10 | 7 |
| 226 | 6 | 3 | 8 | 6 | 4 | 6 | 4 | 2 | 1 | 7 | 7 | 7 | 1 | 5 |
| 227 | 11 | 8 | 4 | 7 | 10 | 1 | 8 | 3 | 5 | 6 | 9 | 3 | 9 | 4 |
| 228 | 5 | 10 | 9 | 3 | 0 | 8 | 8 | 2 | 9 | 1 | 6 | 8 | 11 | 6 |
| 229 | 3 | 0 | 2 | 9 | 11 | 3 | 2 | 6 | 7 | 2 | 8 | 4 | 10 | 9 |
| 230 | 10 | 3 | 2 | 3 | 4 | 8 | 1 | 9 | 2 | 0 | 11 | 11 | 10 | 9 |
| 231 | 0 | 11 | 1 | 1 | 3 | 7 | 2 | 9 | 7 | 7 | 9 | 5 | 10 | 5 |
| 232 | 4 | 2 | 6 | 9 | 2 | 0 | 6 | 8 | 3 | 4 | 10 | 11 | 3 | 0 |
| 233 | 4 | 3 | 0 | 4 | 6 | 1 | 11 | 9 | 7 | 5 | 5 | 11 | 6 | 10 |
| 234 | 10 | 11 | 0 | 6 | 10 | 4 | 7 | 3 | 1 | 11 | 0 | 6 | 0 | 11 |
| 235 | 11 | 3 | 7 | 9 | 10 | 4 | 2 | 5 | 10 | 2 | 11 | 9 | 5 | 3 |
| 236 | 6 | 7 | 3 | 8 | 11 | 0 | 1 | 3 | 1 | 3 | 5 | 10 | 4 | 9 |
| 237 | 2 | 3 | 1 | 4 | 8 | 8 | 3 | 11 | 10 | 11 | 6 | 10 | 1 | 5 |
| 238 | 9 | 3 | 10 | 10 | 7 | 4 | 0 | 1 | 11 | 5 | 3 | 9 | 8 | 7 |
| 239 | 9 | 10 | 11 | 0 | 10 | 4 | 3 | 1 | 0 | 8 | 10 | 7 | 4 | 1 |
| 240 | 6 | 4 | 0 | 2 | 7 | 2 | 2 | 6 | 3 | 4 | 1 | 9 | 9 | 3 |
| 241 | 3 | 1 | 3 | 7 | 1 | 5 | 10 | 0 | 7 | 2 | 7 | 5 | 8 | 3 |
| 242 | 9 | 10 | 9 | 4 | 4 | 2 | 6 | 7 | 4 | 3 | 9 | 11 | 10 | 5 |
| 243 | 8 | 9 | 10 | 7 | 5 | 1 | 5 | 7 | 6 | 0 | 2 | 11 | 9 | 11 |
| 244 | 3 | 11 | 11 | 2 | 11 | 3 | 10 | 11 | 3 | 11 | 5 | 2 | 5 | 11 |
| 245 | 3 | 5 | 9 | 0 | 2 | 2 | 1 | 8 | 10 | 2 | 4 | 5 | 9 | 10 |
| 246 | 10 | 9 | 6 | 11 | 11 | 6 | 11 | 1 | 5 | 4 | 1 | 2 | 8 | 0 |
| 247 | 3 | 5 | 10 | 2 | 3 | 11 | 7 | 5 | 9 | 7 | 2 | 4 | 11 | 1 |
| 248 | 3 | 8 | 11 | 5 | 3 | 5 | 2 | 10 | 11 | 10 | 2 | 8 | 3 | 5 |
| 249 | 4 | 9 | 1 | 8 | 3 | 0 | 5 | 0 | 8 | 2 | 4 | 3 | 3 | 2 |
| 250 | 3 | 0 | 8 | 11 | 8 | 9 | 9 | 2 | 6 | 5 | 11 | 3 | 3 | 9 |
| 251 | 5 | 1 | 1 | 2 | 8 | 9 | 4 | 0 | 4 | 7 | 10 | 4 | 8 | 11 |
| 252 | 0 | 1 | 2 | 0 | 4 | 4 | 1 | 4 | 6 | 4 | 3 | 0 | 5 | 7 |
| 253 | 11 | 0 | 0 | 10 | 2 | 7 | 4 | 6 | 3 | 1 | 9 | 10 | 2 | 10 |
| 254 | 4 | 1 | 4 | 8 | 9 | 11 | 10 | 3 | 11 | 0 | 9 | 6 | 1 | 9 |
| 255 | 3 | 6 | 2 | 10 | 2 | 6 | 2 | 3 | 2 | 1 | 2 | 2 | 5 | 8 |
| 256 | 4 | 6 | 7 | 4 | 5 | 0 | 8 | 4 | 9 | 10 | 5 | 2 | 8 | 8 |
| 257 | 11 | 1 | 5 | 5 | 10 | 6 | 6 | 10 | 10 | 5 | 10 | 5 | 9 | 6 |
| 258 | 9 | 7 | 9 | 11 | 7 | 4 | 1 | 7 | 7 | 11 | 3 | 6 | 0 | 10 |
| 259 | 8 | 11 | 0 | 3 | 9 | 11 | 5 | 0 | 2 | 3 | 6 | 4 | 10 | 4 |
| 260 | 2 | 2 | 11 | 5 | 5 | 8 | 9 | 8 | 4 | 0 | 8 | 10 | 7 | 1 |
| 261 | 6 | 0 | 0 | 9 | 0 | 2 | 2 | 9 | 8 | 11 | 0 | 5 | 8 | 0 |
| 262 | 0 | 2 | 6 | 7 | 3 | 4 | 11 | 6 | 9 | 5 | 4 | 0 | 3 | 5 |
| 263 | 5 | 3 | 10 | 8 | 6 | 8 | 0 | 11 | 3 | 6 | 7 | 0 | 0 | 7 |
| 264 | 7 | 5 | 9 | 0 | 4 | 0 | 6 | 5 | 8 | 7 | 8 | 8 | 4 | 5 |
| 265 | 10 | 4 | 5 | 3 | 8 | 8 | 4 | 7 | 4 | 4 | 3 | 3 | 9 | 11 |
| 266 | 8 | 0 | 0 | 5 | 11 | 9 | 4 | 6 | 6 | 6 | 2 | 6 | 9 | 9 |
| 267 | 10 | 0 | 4 | 1 | 3 | 11 | 0 | 5 | 10 | 5 | 8 | 6 | 6 | 7 |
| 268 | 9 | 10 | 11 | 5 | 8 | 0 | 11 | 2 | 11 | 5 | 1 | 4 | 11 | 4 |
| 269 | 3 | 4 | 10 | 6 | 7 | 5 | 7 | 11 | 11 | 10 | 8 | 3 | 11 | 8 |
| 270 | 0 | 6 | 1 | 3 | 9 | 1 | 6 | 6 | 10 | 8 | 2 | 3 | 1 | 3 |
| 271 | 8 | 11 | 4 | 4 | 2 | 8 | 0 | 7 | 6 | 11 | 10 | 9 | 7 | 6 |
| 272 | 8 | 9 | 3 | 10 | 5 | 7 | 6 | 2 | 11 | 3 | 11 | 11 | 7 | 2 |
| 273 | 0 | 7 | 8 | 2 | 5 | 3 | 3 | 9 | 4 | 3 | 5 | 7 | 6 | 7 |
| 274 | 1 | 1 | 9 | 7 | 7 | 11 | 2 | 8 | 11 | 8 | 2 | 4 | 4 | 11 |
| 275 | 3 | 8 | 7 | 8 | 0 | 2 | 9 | 1 | 10 | 2 | 10 | 0 | 5 | 11 |
| 276 | 5 | 1 | 3 | 5 | 11 | 11 | 3 | 4 | 7 | 11 | 11 | 3 | 5 | 4 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 277 | 9 | 1 | 2 | 7 | 1 | 6 | 5 | 3 | 5 | 7 | 9 | 8 | 6 | 9 |
| 278 | 7 | 10 | 3 | 5 | 4 | 9 | 2 | 9 | 9 | 9 | 10 | 7 | 0 | 11 |
| 279 | 8 | 4 | 10 | 9 | 9 | 6 | 2 | 6 | 9 | 2 | 9 | 1 | 4 | 6 |
| 280 | 2 | 11 | 5 | 0 | 7 | 11 | 10 | 7 | 1 | 6 | 9 | 2 | 6 | 8 |
| 281 | 3 | 0 | 1 | 1 | 1 | 7 | 7 | 10 | 5 | 1 | 7 | 0 | 2 | 6 |
| 282 | 1 | 3 | 5 | 11 | 2 | 2 | 5 | 9 | 7 | 4 | 10 | 2 | 4 | 1 |
| 283 | 0 | 2 | 5 | 2 | 4 | 9 | 5 | 4 | 3 | 11 | 3 | 1 | 10 | 9 |
| 284 | 11 | 4 | 2 | 8 | 4 | 9 | 1 | 7 | 10 | 1 | 5 | 11 | 1 | 8 |
| 285 | 7 | 6 | 4 | 9 | 4 | 2 | 11 | 10 | 6 | 4 | 11 | 1 | 9 | 8 |
| 286 | 11 | 3 | 7 | 4 | 10 | 9 | 7 | 6 | 4 | 7 | 9 | 10 | 3 | 4 |
| 287 | 2 | 1 | 0 | 10 | 3 | 10 | 4 | 8 | 9 | 11 | 7 | 7 | 6 | 3 |
| 288 | 0 | 9 | 4 | 5 | 0 | 4 | 9 | 0 | 3 | 4 | 5 | 3 | 4 | 10 |
| 289 | 10 | 6 | 11 | 2 | 10 | 6 | 1 | 7 | 0 | 6 | 11 | 8 | 8 | 4 |
| 290 | 6 | 4 | 8 | 11 | 7 | 8 | 6 | 1 | 1 | 3 | 7 | 4 | 5 | 6 |
| 291 | 7 | 9 | 8 | 10 | 10 | 2 | 8 | 8 | 7 | 8 | 1 | 5 | 10 | 5 |
| 292 | 11 | 6 | 9 | 1 | 1 | 11 | 2 | 11 | 3 | 0 | 3 | 0 | 1 | 1 |
| 293 | 3 | 3 | 11 | 9 | 11 | 2 | 5 | 3 | 9 | 5 | 4 | 5 | 7 | 7 |
| 294 | 1 | 5 | 10 | 11 | 11 | 11 | 5 | 3 | 10 | 9 | 8 | 7 | 1 | 11 |
| 295 | 0 | 2 | 5 | 11 | 11 | 7 | 3 | 10 | 1 | 6 | 1 | 0 | 5 | 7 |
| 296 | 6 | 5 | 4 | 4 | 5 | 5 | 6 | 5 | 4 | 2 | 7 | 6 | 11 | 3 |
| 297 | 10 | 7 | 1 | 11 | 0 | 11 | 5 | 11 | 3 | 11 | 9 | 10 | 9 | 3 |
| 298 | 6 | 10 | 9 | 3 | 1 | 4 | 1 | 11 | 6 | 2 | 2 | 2 | 8 | 0 |
| 299 | 2 | 6 | 1 | 8 | 8 | 2 | 5 | 2 | 7 | 1 | 1 | 0 | 8 | 2 |
| 300 | 4 | 3 | 10 | 2 | 4 | 10 | 10 | 0 | 8 | 4 | 0 | 6 | 8 | 9 |
| 301 | 0 | 5 | 6 | 6 | 1 | 6 | 4 | 2 | 0 | 0 | 0 | 5 | 7 | 0 |
| 302 | 7 | 9 | 0 | 4 | 0 | 1 | 5 | 6 | 1 | 10 | 8 | 3 | 5 | 0 |
| 303 | 6 | 11 | 6 | 0 | 9 | 6 | 4 | 1 | 11 | 11 | 4 | 2 | 3 | 9 |
| 304 | 1 | 4 | 7 | 2 | 9 | 0 | 4 | 11 | 0 | 3 | 6 | 0 | 1 | 11 |
| 305 | 0 | 1 | 0 | 9 | 9 | 4 | 3 | 5 | 10 | 6 | 10 | 10 | 11 | 11 |
| 306 | 5 | 6 | 7 | 0 | 5 | 7 | 5 | 0 | 11 | 0 | 7 | 8 | 1 | 7 |
| 307 | 8 | 4 | 1 | 0 | 2 | 1 | 2 | 9 | 4 | 7 | 10 | 0 | 5 | 8 |
| 308 | 3 | 2 | 7 | 10 | 6 | 10 | 8 | 10 | 7 | 9 | 10 | 8 | 4 | 4 |
| 309 | 2 | 10 | 11 | 8 | 6 | 5 | 6 | 6 | 6 | 10 | 7 | 2 | 2 | 9 |
| 310 | 11 | 0 | 2 | 9 | 6 | 6 | 7 | 11 | 3 | 9 | 1 | 7 | 10 | 4 |
| 311 | 8 | 6 | 8 | 5 | 10 | 10 | 0 | 0 | 10 | 0 | 5 | 4 | 2 | 8 |
| 312 | 0 | 1 | 9 | 6 | 11 | 3 | 0 | 2 | 5 | 11 | 6 | 2 | 3 | 2 |
| 313 | 10 | 5 | 1 | 7 | 11 | 8 | 8 | 9 | 5 | 4 | 2 | 4 | 7 | 5 |
| 314 | 9 | 6 | 11 | 8 | 0 | 3 | 3 | 0 | 6 | 1 | 4 | 4 | 7 | 3 |
| 315 | 11 | 6 | 1 | 0 | 6 | 11 | 7 | 7 | 7 | 3 | 11 | 11 | 0 | 6 |
| 316 | 4 | 11 | 11 | 9 | 5 | 2 | 4 | 0 | 0 | 11 | 3 | 8 | 0 | 11 |
| 317 | 4 | 3 | 8 | 8 | 2 | 10 | 7 | 10 | 10 | 2 | 11 | 10 | 11 | 5 |
| 318 | 0 | 7 | 6 | 9 | 7 | 8 | 9 | 8 | 11 | 1 | 9 | 9 | 9 | 10 |
| 319 | 5 | 4 | 6 | 3 | 2 | 10 | 10 | 6 | 11 | 8 | 3 | 5 | 3 | 10 |
| 320 | 5 | 1 | 6 | 5 | 8 | 9 | 10 | 1 | 9 | 4 | 2 | 8 | 6 | 2 |
| 321 | 11 | 9 | 6 | 10 | 9 | 7 | 7 | 10 | 7 | 11 | 9 | 6 | 1 | 7 |
| 322 | 0 | 0 | 3 | 8 | 0 | 1 | 2 | 5 | 1 | 3 | 4 | 9 | 0 | 8 |
| 323 | 10 | 5 | 5 | 10 | 1 | 8 | 6 | 10 | 0 | 7 | 5 | 9 | 3 | 1 |
| 324 | 5 | 4 | 8 | 6 | 4 | 6 | 1 | 4 | 7 | 4 | 8 | 2 | 8 | 10 |
| 325 | 2 | 6 | 0 | 5 | 0 | 4 | 10 | 5 | 2 | 3 | 7 | 1 | 3 | 2 |
| 326 | 1 | 0 | 8 | 4 | 8 | 6 | 11 | 11 | 5 | 2 | 0 | 0 | 3 | 10 |
| 327 | 4 | 2 | 8 | 11 | 8 | 0 | 10 | 7 | 11 | 1 | 8 | 1 | 4 | 2 |
| 328 | 8 | 2 | 2 | 0 | 3 | 4 | 9 | 3 | 8 | 6 | 0 | 8 | 7 | 4 |
| 329 | 11 | 10 | 9 | 10 | 2 | 5 | 9 | 9 | 1 | 3 | 1 | 7 | 9 | 3 |
| 330 | 11 | 3 | 7 | 2 | 1 | 5 | 4 | 1 | 6 | 6 | 10 | 3 | 11 | 3 |
| 331 | 6 | 10 | 3 | 8 | 6 | 2 | 2 | 1 | 5 | 5 | 11 | 10 | 6 | 4 |
| 332 | 10 | 2 | 2 | 5 | 5 | 6 | 10 | 0 | 9 | 8 | 1 | 11 | 1 | 5 |
| 333 | 6 | 11 | 6 | 4 | 2 | 0 | 9 | 3 | 10 | 5 | 3 | 11 | 8 | 1 |
| 334 | 2 | 4 | 4 | 2 | 0 | 10 | 11 | 4 | 10 | 1 | 8 | 9 | 5 | 4 |
| 335 | 3 | 10 | 6 | 6 | 7 | 2 | 11 | 7 | 2 | 0 | 1 | 6 | 3 | 3 |
| 336 | 6 | 2 | 11 | 1 | 4 | 3 | 1 | 8 | 2 | 9 | 1 | 6 | 1 | 7 |
| 337 | 1 | 9 | 1 | 3 | 6 | 9 | 11 | 10 | 4 | 8 | 5 | 0 | 11 | 4 |
| 338 | 8 | 1 | 3 | 6 | 11 | 2 | 8 | 6 | 10 | 1 | 0 | 9 | 6 | 3 |
| 339 | 5 | 7 | 2 | 9 | 1 | 1 | 0 | 11 | 7 | 10 | 0 | 6 | 6 | 0 |
| 340 | 3 | 11 | 5 | 10 | 9 | 4 | 0 | 2 | 4 | 10 | 6 | 9 | 2 | 0 |
| 341 | 7 | 6 | 4 | 11 | 6 | 8 | 10 | 2 | 4 | 7 | 3 | 8 | 6 | 3 |
| 342 | 10 | 2 | 9 | 0 | 8 | 3 | 7 | 1 | 10 | 1 | 7 | 2 | 7 | 5 |
| 343 | 11 | 9 | 5 | 3 | 4 | 1 | 0 | 4 | 2 | 0 | 10 | 4 | 1 | 10 |
| 344 | 11 | 8 | 1 | 4 | 0 | 10 | 6 | 0 | 8 | 6 | 5 | 1 | 1 | 6 |
| 345 | 6 | 7 | 7 | 3 | 2 | 3 | 4 | 2 | 5 | 7 | 10 | 5 | 2 | 7 |
| 346 | 1 | 5 | 6 | 1 | 10 | 4 | 2 | 7 | 1 | 10 | 8 | 0 | 8 | 8 |
| 347 | 9 | 9 | 3 | 9 | 9 | 7 | 10 | 3 | 9 | 9 | 0 | 10 | 5 | 3 |
| 348 | 7 | 11 | 11 | 8 | 7 | 9 | 6 | 10 | 7 | 5 | 0 | 7 | 6 | 1 |
| 349 | 1 | 0 | 2 | 3 | 3 | 10 | 10 | 8 | 0 | 7 | 9 | 1 | 4 | 5 |
| 350 | 0 | 11 | 3 | 7 | 1 | 0 | 9 | 1 | 8 | 7 | 5 | 7 | 5 | 2 |
| 351 | 2 | 7 | 10 | 0 | 9 | 9 | 9 | 9 | 3 | 7 | 3 | 9 | 1 | 11 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 352 | 5 | 8 | 11 | 6 | 7 | 6 | 7 | 10 | 2 | 8 | 5 | 1 | 9 | 2 |
| 353 | 5 | 8 | 9 | 1 | 6 | 7 | 3 | 11 | 9 | 8 | 11 | 10 | 10 | 0 |
| 354 | 4 | 1 | 11 | 2 | 2 | 1 | 9 | 11 | 1 | 8 | 4 | 3 | 10 | 1 |
| 355 | 9 | 11 | 10 | 3 | 8 | 1 | 4 | 9 | 7 | 8 | 4 | 7 | 0 | 5 |
| 356 | 7 | 6 | 6 | 9 | 11 | 7 | 1 | 7 | 1 | 8 | 6 | 6 | 7 | 2 |
| 357 | 0 | 8 | 4 | 0 | 4 | 2 | 1 | 9 | 0 | 1 | 2 | 6 | 0 | 2 |
| 358 | 11 | 3 | 11 | 6 | 4 | 0 | 11 | 0 | 5 | 8 | 8 | 7 | 2 | 3 |
| 359 | 10 | 11 | 7 | 0 | 3 | 8 | 1 | 4 | 4 | 10 | 8 | 4 | 11 | 6 |
| 360 | 1 | 9 | 4 | 3 | 9 | 3 | 8 | 4 | 1 | 11 | 7 | 7 | 8 | 1 |
| 361 | 4 | 10 | 11 | 3 | 2 | 4 | 5 | 4 | 4 | 3 | 0 | 6 | 0 | 5 |
| 362 | 2 | 8 | 6 | 10 | 7 | 8 | 11 | 3 | 6 | 8 | 2 | 11 | 10 | 7 |
| 363 | 3 | 7 | 3 | 0 | 6 | 3 | 6 | 2 | 3 | 1 | 1 | 6 | 11 | 1 |
| 364 | 2 | 3 | 11 | 7 | 4 | 3 | 4 | 6 | 8 | 3 | 2 | 4 | 10 | 8 |
| 365 | 9 | 6 | 2 | 6 | 9 | 2 | 7 | 9 | 7 | 6 | 3 | 10 | 2 | 9 |
| 366 | 6 | 6 | 11 | 3 | 5 | 0 | 1 | 6 | 8 | 11 | 7 | 11 | 9 | 10 |
| 367 | 9 | 11 | 1 | 5 | 6 | 3 | 7 | 9 | 9 | 11 | 6 | 1 | 11 | 8 |
| 368 | 2 | 1 | 4 | 4 | 10 | 1 | 10 | 11 | 3 | 9 | 10 | 6 | 2 | 5 |
| 369 | 2 | 4 | 6 | 11 | 6 | 9 | 10 | 4 | 5 | 6 | 7 | 3 | 10 | 0 |
| 370 | 6 | 7 | 7 | 5 | 6 | 4 | 3 | 9 | 0 | 10 | 11 | 2 | 0 | 1 |
| 371 | 0 | 0 | 3 | 6 | 2 | 0 | 8 | 3 | 6 | 2 | 8 | 0 | 10 | 5 |
| 372 | 8 | 8 | 10 | 1 | 11 | 6 | 1 | 4 | 11 | 9 | 3 | 10 | 7 | 8 |
| 373 | 1 | 11 | 11 | 7 | 6 | 2 | 8 | 4 | 8 | 2 | 0 | 1 | 1 | 7 |
| 374 | 10 | 8 | 10 | 7 | 1 | 11 | 8 | 0 | 3 | 5 | 11 | 1 | 3 | 8 |
| 375 | 5 | 2 | 0 | 9 | 2 | 3 | 8 | 0 | 10 | 9 | 2 | 4 | 3 | 1 |
| 376 | 8 | 7 | 2 | 3 | 5 | 8 | 8 | 3 | 11 | 4 | 10 | 1 | 6 | 1 |
| 377 | 9 | 9 | 2 | 6 | 5 | 6 | 9 | 5 | 1 | 2 | 2 | 4 | 10 | 0 |
| 378 | 11 | 10 | 10 | 2 | 4 | 7 | 5 | 5 | 7 | 6 | 2 | 11 | 5 | 2 |
| 379 | 10 | 1 | 2 | 3 | 6 | 0 | 9 | 1 | 5 | 2 | 3 | 1 | 2 | 6 |
| 380 | 1 | 9 | 7 | 6 | 10 | 4 | 5 | 5 | 6 | 11 | 3 | 5 | 4 | 4 |
| 381 | 8 | 9 | 11 | 6 | 2 | 11 | 3 | 6 | 9 | 4 | 10 | 4 | 11 | 9 |
| 382 | 7 | 1 | 10 | 0 | 1 | 0 | 11 | 4 | 1 | 2 | 7 | 3 | 6 | 7 |
| 383 | 9 | 2 | 8 | 2 | 6 | 11 | 0 | 5 | 4 | 11 | 4 | 11 | 8 | 3 |
| 384 | 4 | 2 | 0 | 0 | 1 | 11 | 5 | 3 | 11 | 11 | 5 | 9 | 5 | 10 |
| 385 | 5 | 3 | 4 | 1 | 1 | 3 | 8 | 11 | 11 | 4 | 9 | 5 | 4 | 6 |
| 386 | 2 | 8 | 3 | 3 | 3 | 5 | 0 | 8 | 2 | 3 | 0 | 11 | 9 | 8 |
| 387 | 11 | 10 | 8 | 7 | 4 | 5 | 0 | 8 | 0 | 1 | 7 | 9 | 4 | 7 |
| 388 | 0 | 5 | 8 | 3 | 3 | 2 | 7 | 3 | 6 | 10 | 3 | 2 | 3 | 1 |
| 389 | 5 | 11 | 8 | 2 | 6 | 9 | 5 | 3 | 8 | 3 | 9 | 6 | 2 | 1 |
| 390 | 3 | 7 | 4 | 7 | 2 | 7 | 2 | 5 | 1 | 11 | 8 | 5 | 3 | 3 |
| 391 | 11 | 5 | 3 | 10 | 3 | 11 | 4 | 10 | 11 | 2 | 1 | 2 | 5 | 11 |
| 392 | 7 | 11 | 4 | 11 | 5 | 5 | 3 | 1 | 3 | 1 | 9 | 0 | 8 | 8 |
| 393 | 3 | 6 | 3 | 8 | 1 | 0 | 5 | 6 | 1 | 9 | 11 | 1 | 1 | 5 |
| 394 | 8 | 1 | 10 | 8 | 10 | 1 | 1 | 3 | 5 | 4 | 11 | 5 | 11 | 3 |
| 395 | 0 | 11 | 7 | 0 | 5 | 10 | 3 | 7 | 9 | 4 | 1 | 3 | 2 | 0 |
| 396 | 6 | 11 | 9 | 2 | 1 | 5 | 2 | 0 | 10 | 10 | 5 | 8 | 10 | 7 |
| 397 | 9 | 3 | 9 | 3 | 0 | 7 | 11 | 5 | 9 | 0 | 9 | 6 | 8 | 5 |
| 398 | 8 | 4 | 0 | 1 | 8 | 3 | 3 | 4 | 8 | 8 | 4 | 11 | 4 | 9 |
| 399 | 7 | 10 | 9 | 9 | 0 | 0 | 10 | 8 | 3 | 5 | 4 | 6 | 0 | 3 |
| 400 | 7 | 2 | 9 | 4 | 9 | 7 | 0 | 6 | 2 | 4 | 10 | 10 | 9 | 2 |
| 401 | 0 | 1 | 6 | 8 | 10 | 7 | 9 | 6 | 8 | 0 | 10 | 3 | 8 | 7 |
| 402 | 7 | 3 | 8 | 8 | 11 | 7 | 11 | 9 | 0 | 1 | 10 | 5 | 2 | 10 |
| 403 | 7 | 10 | 3 | 2 | 0 | 1 | 4 | 1 | 7 | 1 | 7 | 4 | 9 | 10 |
| 404 | 1 | 7 | 11 | 4 | 1 | 2 | 10 | 10 | 9 | 11 | 2 | 3 | 5 | 5 |
| 405 | 4 | 4 | 7 | 0 | 10 | 2 | 10 | 8 | 1 | 7 | 6 | 11 | 8 | 7 |
| 406 | 2 | 9 | 0 | 11 | 1 | 10 | 1 | 10 | 1 | 2 | 10 | 5 | 1 | 1 |
| 407 | 1 | 2 | 4 | 10 | 2 | 4 | 2 | 1 | 2 | 2 | 4 | 8 | 1 | 2 |
| 408 | 8 | 10 | 10 | 9 | 7 | 1 | 9 | 7 | 0 | 6 | 10 | 4 | 0 | 0 |
| 409 | 7 | 7 | 1 | 1 | 11 | 8 | 11 | 1 | 6 | 5 | 5 | 7 | 4 | 11 |
| 410 | 6 | 7 | 10 | 7 | 5 | 4 | 9 | 7 | 5 | 1 | 6 | 8 | 4 | 5 |
| 411 | 9 | 11 | 9 | 4 | 10 | 11 | 6 | 4 | 0 | 5 | 2 | 9 | 2 | 8 |
| 412 | 4 | 8 | 1 | 6 | 6 | 1 | 10 | 8 | 11 | 0 | 0 | 10 | 3 | 6 |
| 413 | 10 | 5 | 2 | 7 | 0 | 1 | 11 | 8 | 6 | 7 | 8 | 0 | 0 | 7 |
| 414 | 11 | 7 | 5 | 10 | 0 | 2 | 4 | 8 | 5 | 10 | 11 | 0 | 8 | 9 |
| 415 | 4 | 3 | 11 | 1 | 7 | 10 | 1 | 5 | 9 | 7 | 5 | 4 | 4 | 10 |
| 416 | 10 | 9 | 2 | 8 | 7 | 0 | 11 | 9 | 10 | 0 | 9 | 3 | 5 | 1 |
| 417 | 5 | 2 | 3 | 2 | 7 | 0 | 6 | 4 | 4 | 10 | 10 | 10 | 1 | 7 |
| 418 | 9 | 9 | 11 | 11 | 11 | 4 | 2 | 8 | 11 | 10 | 7 | 10 | 1 | 0 |
| 419 | 4 | 9 | 10 | 9 | 6 | 3 | 11 | 5 | 8 | 1 | 7 | 8 | 1 | 10 |
| 420 | 6 | 2 | 5 | 1 | 0 | 1 | 11 | 5 | 3 | 4 | 10 | 8 | 6 | 6 |
| 421 | 3 | 9 | 5 | 2 | 10 | 9 | 0 | 11 | 9 | 5 | 1 | 8 | 3 | 11 |
| 422 | 3 | 10 | 10 | 1 | 10 | 2 | 3 | 3 | 6 | 7 | 10 | 8 | 1 | 2 |
| 423 | 7 | 8 | 10 | 3 | 9 | 3 | 6 | 9 | 8 | 0 | 9 | 10 | 11 | 4 |
| 424 | 5 | 9 | 2 | 4 | 0 | 2 | 7 | 4 | 10 | 4 | 4 | 11 | 3 | 3 |
| 425 | 5 | 4 | 4 | 11 | 8 | 2 | 8 | 0 | 6 | 3 | 10 | 0 | 11 | 10 |
| 426 | 6 | 4 | 3 | 7 | 2 | 7 | 5 | 7 | 6 | 8 | 0 | 7 | 11 | 8 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 427 | 11 | 6 | 8 | 6 | 10 | 5 | 2 | 3 | 6 | 9 | 4 | 6 | 9 | 10 |
| 428 | 1 | 5 | 4 | 9 | 9 | 0 | 9 | 9 | 6 | 8 | 5 | 11 | 6 | 9 |
| 429 | 3 | 0 | 7 | 4 | 4 | 3 | 0 | 11 | 10 | 6 | 5 | 7 | 4 | 3 |
| 430 | 6 | 0 | 10 | 8 | 2 | 7 | 4 | 4 | 8 | 5 | 1 | 1 | 5 | 9 |
| 431 | 1 | 3 | 8 | 6 | 3 | 8 | 7 | 2 | 11 | 11 | 4 | 9 | 6 | 0 |
| 432 | 1 | 11 | 5 | 4 | 11 | 1 | 8 | 7 | 2 | 10 | 2 | 10 | 0 | 3 |
| 433 | 1 | 6 | 0 | 2 | 11 | 1 | 7 | 10 | 3 | 5 | 3 | 9 | 11 | 6 |
| 434 | 4 | 7 | 4 | 8 | 8 | 6 | 11 | 2 | 4 | 8 | 8 | 3 | 0 | 6 |
| 435 | 10 | 10 | 0 | 6 | 5 | 9 | 1 | 5 | 11 | 6 | 4 | 1 | 0 | 6 |
| 436 | 9 | 4 | 9 | 7 | 0 | 0 | 1 | 9 | 2 | 1 | 11 | 5 | 9 | 1 |
| 437 | 7 | 4 | 3 | 4 | 4 | 4 | 10 | 10 | 4 | 0 | 4 | 10 | 10 | 9 |
| 438 | 11 | 4 | 1 | 2 | 11 | 10 | 5 | 11 | 4 | 9 | 11 | 2 | 7 | 1 |
| 439 | 10 | 10 | 8 | 2 | 2 | 0 | 7 | 1 | 8 | 0 | 1 | 11 | 4 | 8 |
| 440 | 0 | 2 | 11 | 3 | 8 | 10 | 2 | 11 | 7 | 4 | 2 | 10 | 11 | 6 |
| 441 | 2 | 9 | 9 | 6 | 10 | 1 | 9 | 4 | 11 | 1 | 7 | 0 | 0 | 3 |
| 442 | 1 | 7 | 0 | 8 | 1 | 11 | 3 | 8 | 2 | 0 | 9 | 11 | 3 | 0 |
| 443 | 9 | 4 | 8 | 1 | 1 | 5 | 1 | 1 | 9 | 10 | 6 | 10 | 2 | 4 |
| 444 | 11 | 2 | 0 | 11 | 11 | 10 | 9 | 1 | 7 | 5 | 9 | 11 | 10 | 5 |
| 445 | 7 | 5 | 6 | 5 | 2 | 7 | 8 | 11 | 11 | 7 | 10 | 11 | 10 | 9 |
| 446 | 4 | 4 | 1 | 7 | 8 | 4 | 5 | 9 | 3 | 6 | 8 | 11 | 2 | 10 |
| 447 | 4 | 5 | 4 | 6 | 7 | 7 | 0 | 8 | 5 | 2 | 8 | 4 | 5 | 9 |
| 448 | 2 | 3 | 9 | 10 | 7 | 2 | 10 | 0 | 9 | 1 | 8 | 10 | 9 | 11 |
| 449 | 0 | 8 | 0 | 4 | 10 | 11 | 3 | 10 | 8 | 1 | 3 | 5 | 7 | 5 |
| 450 | 5 | 10 | 1 | 10 | 6 | 3 | 2 | 4 | 3 | 7 | 3 | 5 | 8 | 2 |
| 451 | 5 | 7 | 8 | 0 | 7 | 10 | 2 | 2 | 8 | 5 | 10 | 1 | 8 | 5 |
| 452 | 3 | 1 | 8 | 1 | 4 | 0 | 8 | 5 | 3 | 3 | 3 | 11 | 0 | 4 |
| 453 | 1 | 8 | 2 | 4 | 5 | 4 | 9 | 1 | 0 | 0 | 11 | 7 | 8 | 10 |
| 454 | 10 | 4 | 4 | 9 | 10 | 4 | 1 | 2 | 5 | 10 | 9 | 11 | 5 | 5 |
| 455 | 9 | 5 | 6 | 0 | 8 | 1 | 8 | 5 | 6 | 1 | 11 | 9 | 8 | 11 |
| 456 | 10 | 0 | 7 | 3 | 8 | 2 | 6 | 10 | 1 | 8 | 11 | 4 | 6 | 9 |
| 457 | 3 | 9 | 1 | 4 | 9 | 5 | 2 | 9 | 1 | 0 | 2 | 2 | 6 | 2 |
| 458 | 9 | 3 | 4 | 0 | 11 | 9 | 3 | 7 | 8 | 6 | 8 | 9 | 10 | 1 |
| 459 | 8 | 10 | 6 | 11 | 3 | 9 | 7 | 9 | 2 | 5 | 6 | 5 | 8 | 7 |
| 460 | 11 | 7 | 2 | 5 | 2 | 1 | 10 | 1 | 4 | 3 | 11 | 10 | 2 | 11 |
| 461 | 5 | 2 | 3 | 11 | 10 | 5 | 7 | 5 | 0 | 5 | 11 | 1 | 0 | 0 |
| 462 | 2 | 5 | 9 | 6 | 2 | 8 | 0 | 1 | 3 | 3 | 9 | 3 | 11 | 5 |
| 463 | 4 | 6 | 5 | 10 | 11 | 5 | 0 | 9 | 11 | 1 | 5 | 8 | 7 | 9 |
| 464 | 10 | 7 | 10 | 5 | 2 | 8 | 4 | 3 | 9 | 9 | 4 | 9 | 11 | 2 |
| 465 | 8 | 5 | 5 | 11 | 6 | 6 | 5 | 5 | 0 | 8 | 2 | 0 | 9 | 8 |
| 466 | 3 | 11 | 1 | 0 | 4 | 4 | 11 | 5 | 10 | 9 | 9 | 0 | 9 | 2 |
| 467 | 11 | 9 | 11 | 10 | 6 | 0 | 0 | 8 | 8 | 4 | 6 | 2 | 6 | 4 |
| 468 | 0 | 9 | 2 | 3 | 4 | 4 | 5 | 1 | 9 | 1 | 8 | 2 | 6 | 3 |
| 469 | 11 | 3 | 0 | 7 | 8 | 7 | 1 | 11 | 2 | 9 | 5 | 3 | 2 | 0 |
| 470 | 0 | 11 | 1 | 10 | 11 | 4 | 7 | 0 | 11 | 8 | 10 | 6 | 10 | 1 |
| 471 | 9 | 10 | 6 | 9 | 5 | 11 | 7 | 1 | 10 | 10 | 0 | 8 | 9 | 9 |
| 472 | 10 | 6 | 5 | 1 | 11 | 9 | 9 | 8 | 7 | 9 | 7 | 4 | 11 | 1 |
| 473 | 9 | 7 | 2 | 1 | 5 | 4 | 5 | 10 | 2 | 5 | 0 | 10 | 11 | 2 |
| 474 | 9 | 8 | 2 | 7 | 3 | 0 | 7 | 4 | 9 | 0 | 7 | 9 | 10 | 2 |
| 475 | 3 | 5 | 4 | 11 | 4 | 1 | 7 | 0 | 1 | 10 | 4 | 1 | 4 | 4 |
| 476 | 7 | 11 | 5 | 3 | 3 | 9 | 7 | 2 | 10 | 3 | 8 | 8 | 0 | 10 |
| 477 | 2 | 0 | 9 | 9 | 9 | 6 | 1 | 0 | 7 | 10 | 4 | 3 | 7 | 1 |
| 478 | 11 | 4 | 7 | 3 | 10 | 5 | 11 | 0 | 8 | 11 | 0 | 0 | 5 | 2 |
| 479 | 9 | 2 | 5 | 5 | 9 | 10 | 8 | 3 | 0 | 1 | 8 | 3 | 3 | 6 |
| 480 | 1 | 8 | 6 | 3 | 11 | 3 | 2 | 5 | 3 | 4 | 1 | 1 | 10 | 10 |
| 481 | 4 | 3 | 6 | 1 | 0 | 6 | 8 | 6 | 7 | 0 | 6 | 7 | 9 | 8 |
| 482 | 1 | 8 | 1 | 11 | 8 | 9 | 6 | 5 | 10 | 3 | 11 | 2 | 2 | 7 |
| 483 | 7 | 0 | 11 | 2 | 0 | 4 | 1 | 5 | 5 | 11 | 1 | 3 | 6 | 11 |
| 484 | 10 | 9 | 9 | 7 | 11 | 1 | 10 | 1 | 0 | 9 | 4 | 8 | 3 | 10 |
| 485 | 8 | 6 | 7 | 9 | 7 | 3 | 4 | 1 | 9 | 5 | 2 | 7 | 1 | 4 |
| 486 | 3 | 5 | 3 | 1 | 8 | 9 | 8 | 1 | 4 | 11 | 10 | 5 | 2 | 5 |
| 487 | 10 | 3 | 3 | 11 | 5 | 10 | 0 | 4 | 5 | 5 | 2 | 7 | 11 | 10 |
| 488 | 6 | 0 | 6 | 6 | 8 | 8 | 0 | 0 | 7 | 7 | 5 | 0 | 6 | 11 |
| 489 | 9 | 4 | 10 | 11 | 6 | 2 | 3 | 10 | 3 | 10 | 2 | 6 | 4 | 3 |
| 490 | 0 | 4 | 1 | 10 | 3 | 7 | 3 | 5 | 2 | 5 | 0 | 9 | 4 | 0 |
| 491 | 7 | 8 | 8 | 5 | 2 | 11 | 7 | 6 | 3 | 6 | 4 | 5 | 5 | 7 |
| 492 | 7 | 0 | 3 | 7 | 11 | 6 | 10 | 3 | 2 | 6 | 1 | 5 | 0 | 0 |
| 493 | 2 | 5 | 6 | 9 | 8 | 3 | 11 | 2 | 1 | 2 | 5 | 1 | 5 | 3 |
| 494 | 5 | 0 | 0 | 3 | 10 | 6 | 9 | 2 | 9 | 3 | 2 | 10 | 7 | 3 |
| 495 | 6 | 1 | 0 | 11 | 3 | 6 | 6 | 7 | 8 | 4 | 4 | 1 | 2 | 10 |
| 496 | 4 | 9 | 1 | 2 | 2 | 2 | 6 | 9 | 5 | 2 | 5 | 9 | 9 | 11 |
| 497 | 2 | 8 | 9 | 4 | 2 | 4 | 3 | 3 | 5 | 7 | 4 | 1 | 4 | 8 |
| 498 | 7 | 7 | 6 | 1 | 10 | 9 | 5 | 0 | 0 | 3 | 7 | 1 | 7 | 5 |
| 499 | 7 | 2 | 10 | 2 | 1 | 3 | 8 | 10 | 2 | 7 | 6 | 7 | 2 | 10 |
| 500 | 4 | 9 | 7 | 7 | 4 | 8 | 0 | 7 | 1 | 5 | 9 | 0 | 2 | 9 |
| 501 | 5 | 3 | 4 | 8 | 0 | 0 | 4 | 10 | 9 | 7 | 1 | 7 | 3 | 0 |
| 502 | 2 | 11 | 2 | 9 | 8 | 5 | 6 | 9 | 5 | 4 | 6 | 10 | 10 | 2 |
| 503 | 9 | 11 | 2 | 4 | 11 | 6 | 1 | 2 | 7 | 1 | 10 | 1 | 4 | 7 |
| 504 | 3 | 5 | 7 | 1 | 9 | 2 | 4 | 0 | 5 | 5 | 9 | 3 | 3 | 10 |
| 505 | 5 | 4 | 5 | 9 | 10 | 11 | 3 | 9 | 0 | 2 | 0 | 10 | 3 | 7 |
| 506 | 4 | 5 | 9 | 10 | 5 | 8 | 7 | 11 | 10 | 9 | 3 | 5 | 4 | 0 |
| 507 | 3 | 2 | 1 | 7 | 0 | 11 | 6 | 3 | 2 | 10 | 3 | 8 | 2 | 5 |
| 508 | 6 | 10 | 5 | 8 | 1 | 0 | 7 | 7 | 3 | 8 | 9 | 9 | 7 | 11 |
| 509 | 3 | 3 | 1 | 2 | 5 | 6 | 7 | 4 | 0 | 7 | 0 | 3 | 4 | 7 |
| 510 | 7 | 2 | 2 | 6 | 5 | 11 | 4 | 2 | 4 | 9 | 9 | 6 | 2 | 2 |
| 511 | 3 | 5 | 2 | 7 | 5 | 10 | 0 | 9 | 4 | 1 | 0 | 1 | 8 | 6 |
| 512 | 5 | 3 | 10 | 7 | 9 | 0 | 9 | 11 | 11 | 8 | 6 | 9 | 9 | 1 |
| 513 | 9 | 9 | 2 | 6 | 2 | 9 | 8 | 8 | 3 | 5 | 10 | 2 | 1 | 11 |
| 514 | 8 | 0 | 0 | 10 | 11 | 1 | 1 | 10 | 10 | 2 | 9 | 8 | 10 | 7 |
| 515 | 1 | 6 | 8 | 9 | 8 | 8 | 6 | 0 | 2 | 6 | 5 | 5 | 4 | 10 |
| 516 | 7 | 9 | 3 | 5 | 9 | 3 | 0 | 3 | 6 | 7 | 8 | 4 | 4 | 9 |
| 517 | 6 | 7 | 9 | 6 | 5 | 1 | 11 | 11 | 9 | 10 | 4 | 10 | 5 | 10 |
| 518 | 2 | 11 | 6 | 1 | 4 | 5 | 0 | 7 | 2 | 11 | 6 | 2 | 5 | 7 |
| 519 | 8 | 2 | 5 | 0 | 10 | 7 | 2 | 4 | 2 | 8 | 11 | 6 | 7 | 3 |
| 520 | 7 | 8 | 2 | 3 | 1 | 6 | 3 | 11 | 4 | 6 | 7 | 0 | 7 | 2 |
| 521 | 10 | 2 | 0 | 8 | 0 | 8 | 4 | 5 | 0 | 11 | 2 | 10 | 8 | 2 |
| 522 | 4 | 6 | 8 | 4 | 5 | 11 | 9 | 6 | 3 | 11 | 10 | 3 | 2 | 1 |
| 523 | 4 | 3 | 4 | 2 | 10 | 8 | 4 | 0 | 1 | 1 | 10 | 1 | 0 | 7 |
| 524 | 11 | 8 | 6 | 0 | 7 | 8 | 10 | 11 | 5 | 3 | 1 | 10 | 1 | 6 |
| 525 | 4 | 8 | 3 | 9 | 5 | 1 | 0 | 0 | 7 | 9 | 6 | 0 | 9 | 3 |
| 526 | 8 | 2 | 7 | 4 | 2 | 0 | 5 | 8 | 4 | 9 | 3 | 3 | 6 | 9 |
| 527 | 4 | 11 | 5 | 8 | 4 | 2 | 1 | 1 | 4 | 7 | 10 | 8 | 3 | 4 |
| 528 | 5 | 4 | 7 | 1 | 3 | 8 | 8 | 2 | 2 | 0 | 1 | 4 | 6 | 2 |
| 529 | 2 | 3 | 2 | 2 | 6 | 4 | 0 | 5 | 5 | 4 | 8 | 5 | 3 | 6 |
| 530 | 0 | 6 | 11 | 11 | 11 | 2 | 10 | 8 | 6 | 6 | 9 | 11 | 9 | 6 |
| 531 | 1 | 3 | 1 | 8 | 4 | 5 | 5 | 10 | 0 | 2 | 7 | 6 | 6 | 10 |
| 532 | 6 | 7 | 2 | 9 | 9 | 5 | 8 | 3 | 5 | 11 | 5 | 11 | 8 | 8 |
| 533 | 2 | 5 | 11 | 1 | 0 | 6 | 10 | 4 | 10 | 0 | 3 | 1 | 1 | 10 |
| 534 | 6 | 8 | 10 | 3 | 7 | 9 | 1 | 3 | 11 | 1 | 11 | 4 | 10 | 5 |
| 535 | 8 | 10 | 3 | 7 | 0 | 2 | 0 | 8 | 9 | 4 | 11 | 2 | 11 | 1 |
| 536 | 7 | 1 | 1 | 11 | 3 | 11 | 10 | 2 | 0 | 3 | 2 | 1 | 5 | 7 |
| 537 | 8 | 5 | 8 | 1 | 1 | 9 | 11 | 0 | 5 | 2 | 6 | 7 | 6 | 11 |
| 538 | 11 | 10 | 6 | 8 | 11 | 3 | 8 | 1 | 7 | 6 | 11 | 7 | 7 | 10 |
| 539 | 1 | 4 | 4 | 0 | 2 | 3 | 1 | 7 | 1 | 3 | 5 | 8 | 6 | 0 |
| 540 | 7 | 3 | 8 | 9 | 7 | 11 | 2 | 9 | 8 | 10 | 8 | 7 | 10 | 8 |
| 541 | 5 | 0 | 7 | 11 | 8 | 9 | 4 | 6 | 3 | 10 | 4 | 5 | 10 | 3 |
| 542 | 3 | 5 | 7 | 3 | 1 | 7 | 9 | 4 | 9 | 9 | 2 | 8 | 3 | 7 |
| 543 | 3 | 1 | 0 | 11 | 0 | 7 | 3 | 11 | 2 | 1 | 4 | 9 | 6 | 4 |
| 544 | 10 | 1 | 9 | 9 | 8 | 11 | 5 | 4 | 6 | 9 | 11 | 9 | 0 | 1 |
| 545 | 10 | 10 | 8 | 6 | 3 | 10 | 6 | 5 | 6 | 1 | 3 | 6 | 1 | 9 |
| 546 | 0 | 0 | 11 | 7 | 7 | 3 | 7 | 4 | 4 | 2 | 11 | 10 | 3 | 9 |
| 547 | 11 | 0 | 8 | 7 | 5 | 7 | 2 | 3 | 10 | 4 | 2 | 0 | 1 | 11 |
| 548 | 7 | 8 | 10 | 5 | 0 | 5 | 7 | 7 | 9 | 2 | 9 | 9 | 1 | 8 |
| 549 | 0 | 2 | 10 | 10 | 7 | 2 | 6 | 5 | 11 | 9 | 2 | 8 | 6 | 8 |
| 550 | 10 | 0 | 7 | 10 | 9 | 10 | 6 | 8 | 9 | 2 | 2 | 5 | 8 | 1 |
| 551 | 2 | 10 | 3 | 10 | 5 | 10 | 4 | 1 | 3 | 10 | 5 | 2 | 1 | 7 |
| 552 | 0 | 4 | 1 | 5 | 6 | 6 | 9 | 9 | 1 | 4 | 9 | 9 | 7 | 2 |
| 553 | 9 | 2 | 4 | 1 | 4 | 8 | 3 | 1 | 4 | 8 | 2 | 11 | 1 | 11 |
| 554 | 0 | 11 | 4 | 8 | 6 | 11 | 5 | 1 | 11 | 1 | 4 | 3 | 5 | 1 |
| 555 | 8 | 7 | 4 | 1 | 11 | 11 | 9 | 11 | 10 | 1 | 11 | 1 | 7 | 0 |
| 556 | 9 | 3 | 11 | 3 | 6 | 9 | 2 | 6 | 1 | 6 | 0 | 3 | 2 | 7 |
| 557 | 10 | 8 | 2 | 11 | 10 | 3 | 9 | 3 | 10 | 3 | 7 | 6 | 1 | 8 |
| 558 | 1 | 0 | 6 | 7 | 2 | 4 | 0 | 9 | 0 | 9 | 6 | 6 | 11 | 2 |
| 559 | 5 | 3 | 11 | 0 | 9 | 11 | 3 | 2 | 5 | 10 | 5 | 1 | 0 | 3 |
| 560 | 3 | 7 | 9 | 9 | 10 | 8 | 9 | 0 | 6 | 2 | 0 | 0 | 2 | 4 |
| 561 | 10 | 11 | 7 | 0 | 2 | 6 | 4 | 11 | 10 | 8 | 3 | 6 | 10 | 7 |
| 562 | 11 | 5 | 2 | 4 | 7 | 3 | 8 | 5 | 8 | 5 | 3 | 0 | 5 | 5 |
| 563 | 10 | 5 | 6 | 7 | 4 | 6 | 5 | 0 | 7 | 10 | 2 | 8 | 2 | 3 |
| 564 | 2 | 9 | 8 | 8 | 4 | 3 | 3 | 5 | 5 | 9 | 11 | 0 | 6 | 9 |
| 565 | 0 | 5 | 3 | 7 | 6 | 7 | 3 | 3 | 9 | 6 | 3 | 9 | 9 | 8 |
| 566 | 6 | 9 | 11 | 3 | 7 | 8 | 7 | 6 | 5 | 7 | 4 | 7 | 4 | 1 |
| 567 | 10 | 6 | 10 | 8 | 1 | 5 | 9 | 9 | 10 | 6 | 10 | 5 | 10 | 2 |
| 568 | 9 | 10 | 9 | 10 | 4 | 1 | 7 | 3 | 0 | 0 | 10 | 10 | 11 | 3 |
| 569 | 11 | 11 | 9 | 5 | 0 | 7 | 4 | 7 | 11 | 9 | 10 | 2 | 0 | 10 |
| 570 | 1 | 3 | 4 | 5 | 5 | 7 | 8 | 10 | 7 | 9 | 2 | 5 | 2 | 1 |
| 571 | 10 | 9 | 9 | 2 | 1 | 1 | 3 | 4 | 4 | 0 | 1 | 2 | 10 | 5 |
| 572 | 3 | 11 | 5 | 8 | 9 | 11 | 11 | 4 | 3 | 4 | 1 | 10 | 4 | 2 |
| 573 | 7 | 5 | 9 | 0 | 8 | 6 | 1 | 0 | 11 | 4 | 9 | 4 | 1 | 9 |
| 574 | 2 | 2 | 6 | 1 | 5 | 7 | 1 | 6 | 6 | 7 | 0 | 0 | 11 | 0 |
| 575 | 10 | 0 | 0 | 0 | 7 | 5 | 8 | 5 | 1 | 7 | 1 | 1 | 6 | 1 |
| 576 | 8 | 11 | 6 | 3 | 10 | 9 | 3 | 2 | 11 | 11 | 5 | 6 | 11 | 0 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 577 | 11 | 4 | 2 | 5 | 4 | 0 | 2 | 11 | 9 | 10 | 8 | 6 | 8 | 7 |
| 578 | 5 | 1 | 10 | 11 | 6 | 1 | 11 | 1 | 6 | 11 | 8 | 6 | 5 | 11 |
| 579 | 0 | 3 | 3 | 3 | 11 | 4 | 4 | 9 | 11 | 0 | 6 | 2 | 7 | 6 |
| 580 | 10 | 4 | 7 | 9 | 2 | 3 | 3 | 5 | 7 | 6 | 0 | 1 | 9 | 4 |
| 581 | 10 | 3 | 9 | 10 | 6 | 5 | 6 | 7 | 4 | 10 | 0 | 6 | 3 | 2 |
| 582 | 6 | 3 | 10 | 7 | 3 | 8 | 1 | 5 | 6 | 9 | 4 | 2 | 3 | 4 |
| 583 | 8 | 1 | 4 | 5 | 9 | 8 | 2 | 4 | 11 | 7 | 2 | 3 | 9 | 8 |
| 584 | 1 | 6 | 1 | 3 | 3 | 6 | 6 | 1 | 5 | 10 | 1 | 6 | 2 | 1 |
| 585 | 8 | 9 | 10 | 9 | 1 | 4 | 7 | 11 | 11 | 9 | 10 | 1 | 5 | 5 |
| 586 | 11 | 3 | 0 | 11 | 9 | 7 | 0 | 0 | 0 | 6 | 3 | 8 | 10 | 10 |
| 587 | 3 | 6 | 10 | 1 | 0 | 0 | 10 | 11 | 8 | 10 | 9 | 7 | 2 | 11 |
| 588 | 1 | 8 | 0 | 8 | 8 | 5 | 8 | 0 | 10 | 10 | 0 | 10 | 5 | 5 |
| 589 | 2 | 4 | 6 | 6 | 8 | 0 | 6 | 7 | 8 | 8 | 11 | 3 | 1 | 6 |
| 590 | 8 | 8 | 8 | 10 | 0 | 5 | 4 | 6 | 4 | 5 | 1 | 0 | 11 | 11 |
| 591 | 0 | 6 | 9 | 1 | 8 | 7 | 10 | 10 | 4 | 9 | 7 | 1 | 5 | 4 |
| 592 | 7 | 9 | 6 | 11 | 8 | 0 | 3 | 3 | 9 | 10 | 6 | 2 | 11 | 11 |
| 593 | 5 | 11 | 4 | 5 | 7 | 1 | 6 | 3 | 5 | 5 | 4 | 4 | 11 | 7 |
| 594 | 1 | 1 | 7 | 1 | 9 | 0 | 1 | 4 | 9 | 6 | 10 | 11 | 7 | 6 |
| 595 | 3 | 10 | 0 | 6 | 11 | 4 | 0 | 1 | 8 | 4 | 0 | 3 | 8 | 8 |
| 596 | 8 | 6 | 7 | 8 | 4 | 1 | 6 | 5 | 9 | 0 | 8 | 9 | 3 | 11 |
| 597 | 5 | 5 | 11 | 10 | 4 | 11 | 10 | 5 | 3 | 8 | 9 | 4 | 10 | 4 |
| 598 | 2 | 7 | 9 | 6 | 9 | 6 | 7 | 10 | 8 | 4 | 2 | 2 | 4 | 3 |
| 599 | 3 | 4 | 10 | 8 | 11 | 1 | 2 | 4 | 4 | 8 | 4 | 5 | 3 | 0 |
| 600 | 2 | 1 | 2 | 5 | 10 | 2 | 8 | 8 | 0 | 2 | 6 | 9 | 4 | 4 |
| 601 | 7 | 2 | 11 | 9 | 10 | 11 | 6 | 3 | 4 | 8 | 7 | 9 | 6 | 0 |
| 602 | 2 | 7 | 5 | 7 | 11 | 8 | 6 | 10 | 9 | 2 | 6 | 11 | 7 | 10 |
| 603 | 6 | 2 | 0 | 7 | 10 | 2 | 1 | 0 | 5 | 8 | 3 | 0 | 9 | 7 |
| 604 | 7 | 0 | 0 | 4 | 6 | 3 | 4 | 9 | 2 | 8 | 2 | 3 | 0 | 1 |
| 605 | 9 | 8 | 5 | 2 | 9 | 10 | 3 | 7 | 11 | 7 | 10 | 6 | 1 | 7 |
| 606 | 7 | 6 | 7 | 6 | 1 | 7 | 2 | 8 | 0 | 11 | 4 | 10 | 6 | 1 |
| 607 | 8 | 6 | 3 | 2 | 2 | 5 | 7 | 8 | 10 | 0 | 6 | 0 | 1 | 4 |
| 608 | 6 | 3 | 5 | 2 | 2 | 8 | 0 | 4 | 10 | 11 | 0 | 11 | 11 | 0 |
| 609 | 11 | 1 | 10 | 6 | 0 | 6 | 3 | 3 | 3 | 3 | 8 | 0 | 9 | 0 |
| 610 | 6 | 2 | 7 | 6 | 0 | 0 | 9 | 6 | 2 | 7 | 7 | 1 | 10 | 6 |
| 611 | 9 | 0 | 3 | 5 | 9 | 4 | 6 | 1 | 2 | 11 | 9 | 1 | 9 | 7 |
| 612 | 0 | 10 | 2 | 6 | 0 | 1 | 5 | 2 | 5 | 6 | 7 | 7 | 11 | 11 |
| 613 | 1 | 9 | 1 | 3 | 9 | 10 | 2 | 7 | 6 | 5 | 9 | 8 | 10 | 6 |
| 614 | 7 | 3 | 4 | 7 | 6 | 2 | 9 | 6 | 7 | 0 | 5 | 6 | 11 | 3 |
| 615 | 8 | 10 | 5 | 5 | 4 | 4 | 5 | 10 | 10 | 11 | 11 | 3 | 1 | 11 |
| 616 | 3 | 5 | 8 | 4 | 11 | 0 | 6 | 2 | 5 | 4 | 9 | 8 | 0 | 0 |
| 617 | 9 | 6 | 11 | 8 | 10 | 1 | 9 | 8 | 11 | 4 | 2 | 1 | 4 | 9 |
| 618 | 10 | 9 | 0 | 4 | 2 | 2 | 9 | 0 | 1 | 9 | 5 | 2 | 7 | 8 |
| 619 | 7 | 11 | 7 | 0 | 11 | 4 | 7 | 3 | 0 | 6 | 2 | 3 | 3 | 9 |
| 620 | 1 | 2 | 8 | 5 | 10 | 5 | 1 | 9 | 0 | 3 | 4 | 3 | 5 | 8 |
| 621 | 6 | 11 | 4 | 10 | 4 | 11 | 4 | 11 | 2 | 4 | 8 | 0 | 6 | 5 |
| 622 | 8 | 9 | 9 | 7 | 10 | 8 | 4 | 9 | 9 | 11 | 7 | 3 | 3 | 9 |
| 623 | 4 | 4 | 3 | 3 | 2 | 0 | 10 | 1 | 1 | 4 | 2 | 6 | 1 | 3 |
| 624 | 9 | 10 | 4 | 10 | 6 | 7 | 11 | 11 | 8 | 2 | 2 | 3 | 10 | 4 |
| 625 | 1 | 0 | 2 | 6 | 4 | 11 | 3 | 3 | 11 | 9 | 2 | 10 | 7 | 6 |
| 626 | 9 | 7 | 8 | 3 | 11 | 10 | 5 | 0 | 3 | 1 | 2 | 11 | 6 | 4 |
| 627 | 11 | 1 | 4 | 7 | 8 | 1 | 11 | 9 | 4 | 1 | 11 | 2 | 1 | 7 |
| 628 | 2 | 7 | 9 | 2 | 4 | 4 | 5 | 6 | 9 | 8 | 9 | 6 | 11 | 9 |
| 629 | 1 | 0 | 10 | 7 | 3 | 2 | 5 | 6 | 9 | 11 | 3 | 7 | 10 | 0 |
| 630 | 5 | 5 | 11 | 8 | 0 | 4 | 7 | 2 | 2 | 3 | 11 | 6 | 8 | 1 |
| 631 | 1 | 0 | 11 | 1 | 8 | 10 | 11 | 4 | 1 | 7 | 2 | 8 | 0 | 11 |
| 632 | 4 | 8 | 4 | 5 | 11 | 3 | 9 | 8 | 2 | 2 | 3 | 11 | 11 | 11 |
| 633 | 11 | 9 | 3 | 1 | 5 | 2 | 4 | 6 | 0 | 8 | 11 | 9 | 2 | 6 |
| 634 | 4 | 5 | 9 | 7 | 9 | 11 | 4 | 8 | 4 | 6 | 0 | 7 | 1 | 1 |
| 635 | 2 | 0 | 3 | 8 | 0 | 10 | 10 | 0 | 6 | 9 | 10 | 10 | 10 | 4 |
| 636 | 11 | 2 | 1 | 8 | 9 | 1 | 8 | 7 | 8 | 4 | 10 | 3 | 11 | 11 |
| 637 | 9 | 9 | 9 | 5 | 2 | 0 | 10 | 4 | 10 | 6 | 9 | 8 | 8 | 9 |
| 638 | 0 | 2 | 10 | 7 | 2 | 4 | 2 | 10 | 3 | 8 | 7 | 4 | 0 | 9 |
| 639 | 1 | 3 | 6 | 6 | 11 | 1 | 11 | 7 | 11 | 7 | 0 | 4 | 2 | 9 |
| 640 | 2 | 10 | 11 | 1 | 2 | 3 | 11 | 7 | 9 | 9 | 0 | 9 | 4 | 3 |
| 641 | 6 | 4 | 11 | 9 | 10 | 0 | 0 | 4 | 11 | 3 | 6 | 7 | 5 | 10 |
| 642 | 3 | 11 | 10 | 10 | 1 | 8 | 3 | 8 | 2 | 11 | 11 | 5 | 1 | 3 |
| 643 | 9 | 10 | 10 | 11 | 3 | 11 | 4 | 6 | 6 | 0 | 9 | 9 | 8 | 10 |
| 644 | 9 | 11 | 6 | 9 | 3 | 2 | 10 | 9 | 6 | 1 | 7 | 10 | 0 | 8 |
| 645 | 10 | 9 | 5 | 6 | 4 | 5 | 0 | 2 | 6 | 3 | 4 | 10 | 11 | 2 |
| 646 | 10 | 7 | 7 | 11 | 7 | 5 | 11 | 2 | 11 | 6 | 8 | 4 | 8 | 7 |
| 647 | 8 | 5 | 5 | 5 | 6 | 8 | 1 | 1 | 9 | 3 | 5 | 1 | 4 | 3 |
| 648 | 10 | 5 | 10 | 9 | 11 | 2 | 9 | 6 | 4 | 10 | 1 | 3 | 1 | 10 |
| 649 | 7 | 1 | 4 | 11 | 9 | 2 | 5 | 5 | 8 | 10 | 9 | 5 | 6 | 1 |
| 650 | 10 | 8 | 1 | 9 | 10 | 0 | 11 | 11 | 0 | 8 | 1 | 8 | 2 | 5 |
| 651 | 6 | 6 | 8 | 7 | 10 | 3 | 8 | 2 | 4 | 5 | 6 | 3 | 8 | 0 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 652 | 9 | 0 | 6 | 4 | 6 | 6 | 10 | 1 | 3 | 4 | 3 | 4 | 11 | 5 |
| 653 | 9 | 4 | 2 | 10 | 2 | 10 | 3 | 10 | 4 | 2 | 8 | 9 | 2 | 8 |
| 654 | 9 | 9 | 0 | 1 | 4 | 7 | 4 | 5 | 8 | 5 | 4 | 7 | 7 | 7 |
| 655 | 7 | 8 | 8 | 2 | 5 | 9 | 4 | 10 | 8 | 0 | 3 | 3 | 3 | 7 |
| 656 | 1 | 11 | 0 | 2 | 0 | 2 | 5 | 5 | 10 | 3 | 5 | 11 | 4 | 9 |
| 657 | 1 | 1 | 4 | 6 | 8 | 5 | 7 | 7 | 3 | 6 | 6 | 1 | 3 | 11 |
| 658 | 9 | 4 | 6 | 2 | 11 | 5 | 9 | 11 | 8 | 5 | 0 | 6 | 6 | 3 |
| 659 | 5 | 5 | 3 | 9 | 2 | 8 | 5 | 11 | 1 | 2 | 11 | 7 | 4 | 9 |
| 660 | 4 | 2 | 4 | 6 | 1 | 4 | 1 | 1 | 9 | 6 | 1 | 7 | 10 | 7 |
| 661 | 2 | 2 | 1 | 8 | 6 | 11 | 7 | 11 | 10 | 9 | 5 | 4 | 9 | 10 |
| 662 | 6 | 10 | 9 | 11 | 7 | 3 | 10 | 2 | 5 | 8 | 0 | 11 | 10 | 9 |
| 663 | 5 | 2 | 10 | 3 | 1 | 11 | 10 | 2 | 10 | 2 | 8 | 2 | 11 | 9 |
| 664 | 9 | 5 | 2 | 1 | 10 | 7 | 11 | 4 | 0 | 4 | 5 | 11 | 9 | 0 |
| 665 | 10 | 10 | 6 | 1 | 6 | 6 | 7 | 8 | 11 | 8 | 5 | 9 | 5 | 9 |
| 666 | 1 | 7 | 4 | 8 | 7 | 0 | 3 | 9 | 5 | 11 | 10 | 7 | 9 | 11 |
| 667 | 3 | 8 | 7 | 7 | 11 | 9 | 10 | 6 | 9 | 1 | 8 | 3 | 5 | 2 |
| 668 | 6 | 0 | 6 | 9 | 1 | 7 | 3 | 2 | 6 | 5 | 10 | 11 | 2 | 3 |
| 669 | 4 | 1 | 7 | 1 | 6 | 11 | 5 | 0 | 8 | 7 | 8 | 4 | 2 | 0 |
| 670 | 8 | 5 | 11 | 2 | 8 | 1 | 4 | 3 | 11 | 5 | 5 | 8 | 7 | 1 |
| 671 | 7 | 7 | 5 | 6 | 3 | 3 | 5 | 7 | 11 | 4 | 4 | 11 | 0 | 5 |
| 672 | 11 | 1 | 3 | 3 | 2 | 1 | 6 | 3 | 10 | 9 | 9 | 10 | 4 | 2 |
| 673 | 8 | 4 | 10 | 4 | 3 | 5 | 10 | 4 | 9 | 1 | 5 | 4 | 7 | 11 |
| 674 | 11 | 7 | 1 | 4 | 8 | 5 | 5 | 6 | 6 | 6 | 2 | 0 | 10 | 8 |
| 675 | 6 | 1 | 0 | 0 | 11 | 8 | 5 | 7 | 4 | 11 | 7 | 8 | 9 | 1 |
| 676 | 1 | 4 | 7 | 10 | 5 | 8 | 11 | 3 | 10 | 11 | 4 | 2 | 7 | 9 |
| 677 | 1 | 2 | 11 | 9 | 9 | 3 | 4 | 1 | 3 | 9 | 3 | 1 | 7 | 8 |
| 678 | 4 | 5 | 4 | 10 | 3 | 9 | 1 | 7 | 7 | 8 | 4 | 6 | 2 | 9 |
| 679 | 4 | 3 | 7 | 10 | 11 | 0 | 2 | 3 | 1 | 5 | 3 | 4 | 10 | 2 |
| 680 | 5 | 6 | 7 | 9 | 0 | 9 | 0 | 10 | 11 | 4 | 3 | 0 | 0 | 2 |
| 681 | 3 | 4 | 9 | 4 | 2 | 7 | 1 | 9 | 0 | 7 | 1 | 11 | 8 | 11 |
| 682 | 5 | 9 | 5 | 8 | 2 | 7 | 6 | 6 | 10 | 0 | 2 | 6 | 2 | 8 |
| 683 | 2 | 8 | 5 | 7 | 3 | 7 | 9 | 9 | 4 | 5 | 4 | 4 | 4 | 9 |
| 684 | 5 | 11 | 2 | 4 | 4 | 8 | 6 | 0 | 3 | 3 | 3 | 2 | 9 | 9 |
| 685 | 6 | 10 | 1 | 1 | 1 | 9 | 8 | 1 | 6 | 7 | 9 | 6 | 9 | 8 |
| 686 | 10 | 4 | 9 | 5 | 11 | 4 | 4 | 6 | 7 | 2 | 4 | 10 | 6 | 5 |
| 687 | 1 | 1 | 6 | 5 | 1 | 11 | 9 | 5 | 5 | 8 | 10 | 8 | 11 | 5 |
| 688 | 5 | 0 | 3 | 3 | 6 | 7 | 7 | 0 | 11 | 2 | 0 | 5 | 6 | 5 |
| 689 | 11 | 1 | 3 | 2 | 4 | 3 | 9 | 10 | 8 | 2 | 4 | 1 | 1 | 0 |
| 690 | 7 | 0 | 5 | 8 | 8 | 3 | 2 | 2 | 8 | 6 | 3 | 2 | 4 | 6 |
| 691 | 8 | 10 | 10 | 6 | 2 | 6 | 11 | 9 | 6 | 10 | 2 | 5 | 7 | 5 |
| 692 | 0 | 8 | 8 | 7 | 1 | 2 | 7 | 10 | 0 | 11 | 8 | 1 | 8 | 10 |
| 693 | 1 | 10 | 11 | 3 | 2 | 8 | 6 | 11 | 7 | 0 | 6 | 4 | 3 | 7 |
| 694 | 2 | 11 | 3 | 11 | 3 | 10 | 2 | 6 | 1 | 4 | 7 | 0 | 4 | 6 |
| 695 | 9 | 6 | 9 | 5 | 1 | 3 | 0 | 9 | 7 | 8 | 1 | 9 | 9 | 6 |
| 696 | 10 | 9 | 4 | 2 | 7 | 9 | 6 | 11 | 7 | 9 | 11 | 11 | 1 | 10 |
| 697 | 6 | 9 | 5 | 9 | 11 | 10 | 10 | 6 | 2 | 3 | 5 | 9 | 7 | 0 |
| 698 | 11 | 3 | 1 | 7 | 0 | 10 | 7 | 2 | 7 | 11 | 6 | 4 | 5 | 11 |
| 699 | 3 | 4 | 11 | 2 | 5 | 5 | 5 | 8 | 9 | 7 | 11 | 8 | 5 | 0 |
| 700 | 0 | 7 | 2 | 2 | 4 | 11 | 10 | 2 | 7 | 5 | 11 | 9 | 3 | 3 |
| 701 | 5 | 8 | 9 | 11 | 9 | 4 | 10 | 5 | 1 | 7 | 3 | 9 | 7 | 5 |
| 702 | 7 | 0 | 4 | 1 | 9 | 6 | 4 | 10 | 4 | 3 | 1 | 4 | 10 | 6 |
| 703 | 10 | 11 | 6 | 3 | 9 | 10 | 1 | 10 | 2 | 10 | 7 | 9 | 3 | 5 |
| 704 | 10 | 7 | 11 | 0 | 6 | 2 | 0 | 2 | 2 | 2 | 7 | 5 | 4 | 0 |
| 705 | 4 | 1 | 2 | 11 | 6 | 10 | 1 | 11 | 9 | 9 | 6 | 3 | 3 | 2 |
| 706 | 2 | 2 | 1 | 0 | 3 | 2 | 0 | 3 | 3 | 8 | 9 | 10 | 5 | 6 |
| 707 | 3 | 1 | 6 | 10 | 10 | 5 | 1 | 4 | 3 | 11 | 0 | 4 | 8 | 10 |
| 708 | 0 | 0 | 9 | 2 | 10 | 0 | 11 | 8 | 5 | 3 | 4 | 4 | 4 | 2 |
| 709 | 7 | 9 | 1 | 7 | 6 | 7 | 0 | 1 | 1 | 11 | 10 | 8 | 8 | 5 |
| 710 | 6 | 5 | 3 | 2 | 3 | 7 | 2 | 1 | 10 | 8 | 1 | 1 | 3 | 5 |
| 711 | 0 | 0 | 11 | 6 | 4 | 4 | 9 | 11 | 0 | 0 | 7 | 11 | 1 | 1 |
| 712 | 11 | 9 | 2 | 6 | 3 | 11 | 11 | 11 | 0 | 11 | 0 | 7 | 0 | 8 |
| 713 | 0 | 6 | 5 | 8 | 10 | 10 | 4 | 9 | 3 | 2 | 11 | 0 | 5 | 0 |
| 714 | 9 | 11 | 7 | 1 | 7 | 4 | 9 | 7 | 6 | 9 | 1 | 7 | 11 | 11 |
| 715 | 4 | 8 | 10 | 1 | 5 | 8 | 4 | 7 | 10 | 4 | 5 | 7 | 6 | 4 |
| 716 | 6 | 10 | 5 | 10 | 11 | 9 | 7 | 9 | 1 | 10 | 7 | 11 | 3 | 4 |
| 717 | 8 | 2 | 2 | 11 | 1 | 3 | 7 | 7 | 3 | 4 | 8 | 7 | 9 | 1 |
| 718 | 4 | 10 | 11 | 4 | 10 | 4 | 11 | 2 | 1 | 6 | 3 | 10 | 5 | 9 |
| 719 | 1 | 0 | 7 | 9 | 5 | 0 | 8 | 7 | 4 | 0 | 8 | 8 | 4 | 3 |
| 720 | 10 | 4 | 9 | 2 | 9 | 2 | 1 | 1 | 5 | 6 | 8 | 3 | 0 | 9 |
| 721 | 3 | 4 | 5 | 0 | 3 | 10 | 5 | 1 | 5 | 1 | 10 | 5 | 9 | 2 |
| 722 | 11 | 0 | 9 | 0 | 4 | 6 | 0 | 8 | 9 | 11 | 1 | 8 | 7 | 8 |
| 723 | 5 | 3 | 8 | 4 | 10 | 3 | 10 | 1 | 6 | 0 | 5 | 2 | 10 | 1 |
| 724 | 8 | 7 | 1 | 5 | 8 | 0 | 3 | 1 | 7 | 1 | 8 | 5 | 1 | 4 |
| 725 | 5 | 8 | 0 | 10 | 6 | 6 | 8 | 4 | 11 | 4 | 6 | 11 | 2 | 11 |
| 726 | 6 | 5 | 1 | 10 | 2 | 0 | 4 | 8 | 0 | 0 | 11 | 1 | 0 | 2 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 727 | 7 | 10 | 6 | 1 | 11 | 1 | 3 | 2 | 1 | 1 | 4 | 0 | 1 | 5 |
| 728 | 1 | 8 | 9 | 0 | 11 | 0 | 1 | 3 | 8 | 2 | 1 | 7 | 5 | 3 |
| 729 | 4 | 2 | 10 | 11 | 4 | 7 | 6 | 8 | 8 | 10 | 5 | 9 | 11 | 5 |
| 730 | 5 | 7 | 1 | 7 | 8 | 10 | 8 | 8 | 11 | 3 | 1 | 6 | 3 | 0 |
| 731 | 1 | 9 | 3 | 4 | 8 | 10 | 0 | 0 | 8 | 1 | 3 | 9 | 8 | 2 |
| 732 | 0 | 7 | 4 | 5 | 3 | 8 | 7 | 3 | 8 | 6 | 7 | 5 | 8 | 6 |
| 733 | 1 | 8 | 6 | 11 | 2 | 10 | 7 | 10 | 9 | 6 | 0 | 0 | 0 | 1 |
| 734 | 8 | 3 | 1 | 10 | 1 | 1 | 3 | 5 | 11 | 3 | 4 | 7 | 8 | 6 |
| 735 | 11 | 10 | 11 | 9 | 1 | 5 | 5 | 0 | 2 | 8 | 0 | 4 | 7 | 6 |
| 736 | 5 | 1 | 8 | 5 | 3 | 0 | 2 | 5 | 4 | 6 | 5 | 9 | 3 | 3 |
| 737 | 0 | 5 | 10 | 11 | 6 | 8 | 10 | 11 | 2 | 4 | 10 | 2 | 10 | 10 |
| 738 | 11 | 6 | 1 | 2 | 11 | 3 | 10 | 7 | 10 | 1 | 2 | 10 | 2 | 5 |
| 739 | 9 | 9 | 11 | 11 | 2 | 6 | 1 | 2 | 9 | 0 | 5 | 5 | 5 | 4 |
| 740 | 8 | 3 | 4 | 9 | 8 | 9 | 6 | 1 | 8 | 7 | 1 | 2 | 8 | 9 |
| 741 | 5 | 7 | 10 | 9 | 8 | 2 | 2 | 7 | 2 | 7 | 9 | 10 | 6 | 7 |
| 742 | 11 | 1 | 11 | 8 | 11 | 10 | 1 | 5 | 2 | 5 | 8 | 8 | 2 | 9 |
| 743 | 0 | 3 | 8 | 0 | 8 | 7 | 8 | 6 | 8 | 2 | 0 | 4 | 9 | 11 |
| 744 | 8 | 3 | 8 | 6 | 9 | 2 | 6 | 4 | 4 | 9 | 9 | 9 | 5 | 10 |
| 745 | 5 | 5 | 3 | 6 | 11 | 6 | 0 | 9 | 3 | 7 | 7 | 8 | 6 | 2 |
| 746 | 2 | 6 | 0 | 2 | 4 | 7 | 11 | 9 | 11 | 9 | 3 | 3 | 9 | 11 |
| 747 | 2 | 0 | 8 | 2 | 2 | 5 | 4 | 0 | 5 | 8 | 7 | 2 | 8 | 5 |
| 748 | 8 | 1 | 7 | 8 | 1 | 4 | 11 | 8 | 1 | 8 | 1 | 0 | 0 | 0 |
| 749 | 3 | 8 | 9 | 1 | 3 | 10 | 6 | 6 | 0 | 6 | 2 | 10 | 7 | 4 |
| 750 | 11 | 2 | 8 | 1 | 6 | 11 | 3 | 8 | 9 | 5 | 9 | 3 | 4 | 4 |
| 751 | 0 | 1 | 0 | 4 | 5 | 9 | 8 | 1 | 4 | 9 | 6 | 4 | 0 | 7 |
| 752 | 3 | 4 | 3 | 0 | 8 | 8 | 9 | 6 | 7 | 4 | 1 | 2 | 5 | 7 |
| 753 | 6 | 5 | 7 | 10 | 6 | 1 | 5 | 9 | 6 | 1 | 3 | 0 | 7 | 10 |
| 754 | 2 | 4 | 8 | 6 | 7 | 7 | 5 | 11 | 3 | 3 | 6 | 9 | 10 | 7 |
| 755 | 11 | 4 | 8 | 10 | 11 | 9 | 0 | 6 | 6 | 9 | 10 | 8 | 1 | 3 |
| 756 | 1 | 7 | 6 | 4 | 5 | 1 | 7 | 4 | 5 | 1 | 9 | 3 | 6 | 3 |
| 757 | 4 | 10 | 1 | 0 | 0 | 7 | 1 | 6 | 4 | 1 | 7 | 5 | 7 | 7 |
| 758 | 9 | 9 | 6 | 2 | 4 | 4 | 2 | 2 | 4 | 2 | 6 | 8 | 0 | 1 |
| 759 | 5 | 10 | 4 | 2 | 5 | 11 | 2 | 8 | 6 | 4 | 7 | 6 | 7 | 2 |
| 760 | 9 | 7 | 3 | 10 | 4 | 9 | 0 | 0 | 1 | 7 | 11 | 5 | 5 | 11 |
| 761 | 4 | 0 | 1 | 3 | 5 | 3 | 8 | 9 | 11 | 10 | 7 | 4 | 9 | 2 |
| 762 | 8 | 3 | 3 | 4 | 0 | 10 | 9 | 11 | 5 | 7 | 0 | 5 | 0 | 7 |
| 763 | 11 | 8 | 11 | 2 | 4 | 1 | 6 | 1 | 3 | 1 | 6 | 6 | 6 | 6 |
| 764 | 6 | 6 | 2 | 7 | 1 | 0 | 11 | 7 | 2 | 2 | 0 | 8 | 1 | 4 |
| 765 | 6 | 4 | 5 | 7 | 9 | 0 | 6 | 8 | 7 | 7 | 3 | 2 | 2 | 11 |
| 766 | 4 | 4 | 11 | 11 | 0 | 3 | 8 | 10 | 7 | 7 | 8 | 11 | 3 | 3 |
| 767 | 3 | 6 | 2 | 1 | 8 | 6 | 5 | 9 | 1 | 3 | 0 | 3 | 6 | 3 |
| 768 | 1 | 10 | 9 | 4 | 6 | 0 | 8 | 11 | 6 | 5 | 1 | 9 | 7 | 5 |
| 769 | 3 | 8 | 1 | 11 | 4 | 1 | 0 | 10 | 7 | 1 | 5 | 5 | 10 | 9 |
| 770 | 8 | 9 | 0 | 2 | 10 | 11 | 11 | 7 | 5 | 6 | 0 | 1 | 2 | 7 |
| 771 | 0 | 0 | 4 | 3 | 5 | 8 | 4 | 1 | 3 | 7 | 8 | 10 | 4 | 11 |
| 772 | 4 | 11 | 7 | 7 | 8 | 3 | 1 | 0 | 9 | 2 | 9 | 6 | 9 | 4 |
| 773 | 4 | 1 | 9 | 5 | 11 | 4 | 7 | 9 | 11 | 6 | 11 | 0 | 4 | 3 |
| 774 | 5 | 11 | 6 | 6 | 2 | 2 | 9 | 8 | 6 | 3 | 11 | 2 | 3 | 7 |
| 775 | 11 | 3 | 3 | 1 | 9 | 10 | 2 | 5 | 6 | 0 | 6 | 10 | 0 | 0 |
| 776 | 11 | 5 | 5 | 8 | 11 | 11 | 3 | 11 | 1 | 7 | 4 | 6 | 6 | 1 |
| 777 | 2 | 7 | 8 | 10 | 2 | 6 | 1 | 5 | 10 | 11 | 7 | 4 | 4 | 2 |
| 778 | 9 | 6 | 11 | 2 | 2 | 7 | 4 | 6 | 8 | 10 | 10 | 8 | 6 | 6 |
| 779 | 2 | 2 | 5 | 10 | 8 | 8 | 5 | 7 | 9 | 5 | 5 | 10 | 11 | 8 |
| 780 | 1 | 11 | 4 | 5 | 7 | 10 | 0 | 0 | 0 | 10 | 1 | 8 | 1 | 3 |
| 781 | 10 | 4 | 0 | 6 | 1 | 6 | 0 | 7 | 7 | 5 | 2 | 9 | 3 | 11 |
| 782 | 6 | 6 | 5 | 8 | 3 | 10 | 8 | 3 | 7 | 3 | 6 | 1 | 11 | 5 |
| 783 | 1 | 6 | 8 | 3 | 7 | 7 | 11 | 1 | 4 | 1 | 9 | 2 | 5 | 0 |
| 784 | 9 | 1 | 4 | 8 | 5 | 4 | 1 | 2 | 6 | 8 | 4 | 7 | 1 | 8 |
| 785 | 3 | 2 | 10 | 6 | 6 | 9 | 4 | 5 | 3 | 9 | 1 | 4 | 5 | 3 |
| 786 | 6 | 10 | 8 | 9 | 0 | 4 | 8 | 6 | 2 | 9 | 0 | 8 | 2 | 2 |
| 787 | 7 | 2 | 2 | 9 | 11 | 7 | 2 | 10 | 9 | 3 | 2 | 8 | 9 | 10 |
| 788 | 10 | 1 | 10 | 3 | 10 | 9 | 7 | 4 | 7 | 4 | 4 | 6 | 7 | 6 |
| 789 | 0 | 6 | 6 | 5 | 4 | 11 | 4 | 9 | 10 | 11 | 2 | 9 | 8 | 9 |
| 790 | 5 | 9 | 11 | 0 | 6 | 1 | 7 | 10 | 8 | 0 | 1 | 3 | 0 | 11 |
| 791 | 1 | 0 | 2 | 5 | 4 | 2 | 2 | 4 | 2 | 6 | 3 | 11 | 6 | 2 |
| 792 | 5 | 3 | 10 | 0 | 0 | 5 | 11 | 9 | 5 | 5 | 10 | 4 | 4 | 4 |
| 793 | 4 | 7 | 9 | 11 | 8 | 10 | 2 | 8 | 5 | 11 | 10 | 2 | 10 | 1 |
| 794 | 9 | 2 | 7 | 10 | 7 | 4 | 4 | 4 | 5 | 4 | 0 | 5 | 10 | 4 |
| 795 | 4 | 9 | 7 | 11 | 0 | 1 | 6 | 5 | 0 | 4 | 11 | 7 | 5 | 5 |
| 796 | 3 | 7 | 4 | 5 | 5 | 11 | 5 | 6 | 11 | 3 | 9 | 4 | 0 | 0 |
| 797 | 7 | 0 | 0 | 1 | 3 | 0 | 3 | 0 | 0 | 1 | 10 | 11 | 9 | 7 |
| 798 | 8 | 11 | 2 | 11 | 2 | 0 | 3 | 9 | 10 | 9 | 4 | 10 | 2 | 5 |
| 799 | 1 | 9 | 10 | 1 | 1 | 1 | 0 | 6 | 10 | 3 | 8 | 0 | 2 | 10 |
| 800 | 7 | 4 | 8 | 0 | 5 | 10 | 9 | 4 | 2 | 10 | 11 | 4 | 5 | 8 |
| 801 | 11 | 0 | 6 | 4 | 7 | 1 | 2 | 6 | 3 | 2 | 11 | 1 | 8 | 8 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 802 | 10 | 8 | 6 | 0 | 11 | 6 | 6 | 3 | 3 | 10 | 5 | 11 | 11 | 4 |
| 803 | 0 | 8 | 0 | 10 | 5 | 1 | 3 | 11 | 2 | 11 | 1 | 7 | 11 | 10 |
| 804 | 6 | 8 | 6 | 4 | 1 | 3 | 4 | 8 | 11 | 0 | 7 | 6 | 4 | 5 |
| 805 | 8 | 3 | 4 | 7 | 7 | 6 | 8 | 11 | 3 | 0 | 4 | 3 | 3 | 10 |
| 806 | 10 | 0 | 8 | 4 | 5 | 1 | 5 | 11 | 11 | 0 | 10 | 10 | 7 | 9 |
| 807 | 1 | 4 | 8 | 8 | 10 | 2 | 3 | 7 | 10 | 9 | 7 | 3 | 9 | 6 |
| 808 | 2 | 3 | 2 | 1 | 6 | 0 | 9 | 8 | 3 | 8 | 0 | 6 | 10 | 7 |
| 809 | 1 | 5 | 5 | 1 | 0 | 3 | 5 | 2 | 9 | 11 | 8 | 2 | 7 | 7 |
| 810 | 6 | 9 | 9 | 7 | 1 | 8 | 3 | 0 | 8 | 8 | 6 | 6 | 11 | 10 |
| 811 | 4 | 3 | 1 | 4 | 1 | 2 | 2 | 7 | 9 | 7 | 7 | 2 | 1 | 11 |
| 812 | 10 | 4 | 8 | 1 | 2 | 6 | 8 | 1 | 1 | 2 | 3 | 7 | 7 | 0 |
| 813 | 6 | 11 | 7 | 5 | 9 | 7 | 2 | 5 | 5 | 9 | 2 | 6 | 1 | 5 |
| 814 | 7 | 6 | 0 | 5 | 5 | 10 | 1 | 11 | 6 | 3 | 2 | 0 | 6 | 11 |
| 815 | 3 | 8 | 5 | 2 | 6 | 7 | 1 | 8 | 0 | 11 | 9 | 8 | 2 | 9 |
| 816 | 2 | 8 | 0 | 5 | 9 | 8 | 11 | 2 | 7 | 7 | 8 | 2 | 6 | 5 |
| 817 | 5 | 2 | 4 | 6 | 5 | 7 | 3 | 9 | 1 | 7 | 3 | 5 | 0 | 10 |
| 818 | 2 | 10 | 10 | 0 | 8 | 11 | 0 | 10 | 5 | 8 | 4 | 0 | 6 | 2 |
| 819 | 2 | 1 | 8 | 6 | 3 | 2 | 4 | 11 | 8 | 1 | 5 | 1 | 0 | 0 |
| 820 | 4 | 10 | 11 | 11 | 4 | 5 | 2 | 3 | 8 | 5 | 9 | 5 | 1 | 10 |
| 821 | 9 | 6 | 10 | 1 | 7 | 10 | 9 | 3 | 8 | 8 | 5 | 2 | 0 | 9 |
| 822 | 7 | 9 | 7 | 6 | 8 | 2 | 10 | 2 | 10 | 9 | 2 | 0 | 3 | 8 |
| 823 | 4 | 6 | 1 | 6 | 6 | 2 | 3 | 4 | 0 | 4 | 1 | 9 | 2 | 7 |
| 824 | 5 | 8 | 8 | 1 | 4 | 3 | 2 | 9 | 6 | 6 | 10 | 6 | 11 | 9 |
| 825 | 2 | 9 | 2 | 2 | 5 | 9 | 1 | 9 | 4 | 4 | 9 | 9 | 0 | 4 |
| 826 | 10 | 9 | 10 | 4 | 2 | 11 | 2 | 3 | 6 | 11 | 11 | 0 | 9 | 9 |
| 827 | 9 | 0 | 11 | 9 | 2 | 9 | 7 | 9 | 7 | 2 | 0 | 11 | 4 | 10 |
| 828 | 1 | 7 | 3 | 10 | 5 | 9 | 9 | 11 | 8 | 3 | 7 | 10 | 8 | 3 |
| 829 | 8 | 5 | 4 | 0 | 9 | 2 | 1 | 0 | 9 | 11 | 11 | 10 | 8 | 8 |
| 830 | 5 | 2 | 2 | 8 | 6 | 9 | 6 | 10 | 5 | 11 | 4 | 2 | 4 | 5 |
| 831 | 2 | 1 | 7 | 3 | 1 | 5 | 11 | 9 | 11 | 2 | 5 | 6 | 2 | 10 |
| 832 | 11 | 5 | 0 | 3 | 4 | 6 | 7 | 8 | 4 | 2 | 2 | 0 | 5 | 6 |
| 833 | 1 | 1 | 9 | 4 | 0 | 2 | 10 | 6 | 11 | 1 | 9 | 5 | 2 | 8 |
| 834 | 5 | 3 | 7 | 3 | 1 | 1 | 3 | 3 | 9 | 10 | 8 | 11 | 9 | 1 |
| 835 | 8 | 4 | 3 | 9 | 4 | 0 | 7 | 11 | 2 | 3 | 0 | 2 | 10 | 6 |
| 836 | 6 | 7 | 0 | 11 | 7 | 0 | 7 | 8 | 8 | 9 | 9 | 8 | 11 | 4 |
| 837 | 11 | 3 | 8 | 5 | 3 | 5 | 6 | 9 | 3 | 11 | 9 | 10 | 7 | 11 |
| 838 | 6 | 7 | 9 | 10 | 4 | 9 | 10 | 7 | 3 | 6 | 6 | 0 | 1 | 6 |
| 839 | 0 | 10 | 9 | 0 | 1 | 7 | 11 | 7 | 10 | 10 | 11 | 9 | 6 | 0 |
| 840 | 6 | 0 | 0 | 1 | 4 | 5 | 1 | 10 | 1 | 4 | 5 | 9 | 3 | 10 |
| 841 | 2 | 4 | 5 | 1 | 9 | 1 | 10 | 0 | 11 | 6 | 2 | 11 | 3 | 1 |
| 842 | 11 | 8 | 0 | 10 | 1 | 2 | 5 | 9 | 8 | 4 | 11 | 4 | 9 | 2 |
| 843 | 9 | 0 | 10 | 5 | 10 | 0 | 5 | 3 | 3 | 6 | 6 | 5 | 2 | 4 |
| 844 | 3 | 7 | 9 | 8 | 2 | 2 | 8 | 7 | 8 | 0 | 2 | 9 | 5 | 2 |
| 845 | 8 | 9 | 6 | 9 | 10 | 6 | 3 | 8 | 10 | 7 | 3 | 0 | 10 | 3 |
| 846 | 11 | 8 | 10 | 6 | 9 | 5 | 1 | 6 | 8 | 7 | 10 | 5 | 3 | 8 |
| 847 | 0 | 7 | 4 | 9 | 1 | 10 | 11 | 0 | 2 | 9 | 2 | 6 | 8 | 11 |
| 848 | 0 | 0 | 1 | 3 | 1 | 11 | 2 | 8 | 0 | 9 | 1 | 0 | 11 | 3 |
| 849 | 8 | 3 | 0 | 8 | 4 | 4 | 2 | 0 | 2 | 10 | 5 | 0 | 11 | 11 |
| 850 | 10 | 1 | 1 | 5 | 4 | 10 | 10 | 5 | 6 | 2 | 4 | 4 | 5 | 10 |
| 851 | 4 | 11 | 10 | 10 | 3 | 3 | 7 | 3 | 0 | 7 | 3 | 11 | 6 | 5 |
| 852 | 7 | 2 | 2 | 11 | 0 | 4 | 4 | 0 | 6 | 6 | 8 | 4 | 11 | 6 |
| 853 | 0 | 9 | 9 | 11 | 4 | 2 | 3 | 10 | 11 | 2 | 11 | 3 | 8 | 4 |
| 854 | 9 | 3 | 1 | 11 | 0 | 0 | 10 | 6 | 4 | 3 | 8 | 3 | 10 | 11 |
| 855 | 4 | 10 | 2 | 8 | 6 | 3 | 7 | 1 | 1 | 1 | 9 | 0 | 11 | 6 |
| 856 | 6 | 3 | 7 | 0 | 2 | 11 | 4 | 8 | 9 | 6 | 6 | 9 | 5 | 4 |
| 857 | 0 | 0 | 7 | 0 | 10 | 10 | 8 | 4 | 0 | 11 | 5 | 6 | 3 | 1 |
| 858 | 2 | 7 | 3 | 3 | 7 | 3 | 9 | 0 | 9 | 0 | 3 | 8 | 4 | 10 |
| 859 | 10 | 3 | 7 | 11 | 5 | 0 | 7 | 5 | 3 | 11 | 1 | 9 | 2 | 6 |
| 860 | 6 | 4 | 5 | 2 | 5 | 4 | 3 | 5 | 8 | 9 | 8 | 11 | 7 | 11 |
| 861 | 6 | 8 | 8 | 4 | 8 | 10 | 0 | 7 | 0 | 4 | 8 | 0 | 11 | 4 |
| 862 | 8 | 6 | 5 | 11 | 5 | 4 | 0 | 6 | 7 | 7 | 9 | 10 | 8 | 7 |
| 863 | 2 | 0 | 5 | 2 | 7 | 8 | 2 | 8 | 10 | 6 | 7 | 7 | 5 | 11 |
| 864 | 9 | 2 | 11 | 7 | 5 | 6 | 0 | 4 | 8 | 1 | 8 | 6 | 9 | 3 |
| 865 | 1 | 7 | 5 | 0 | 10 | 3 | 6 | 7 | 5 | 8 | 6 | 10 | 3 | 4 |
| 866 | 0 | 2 | 3 | 6 | 11 | 3 | 5 | 0 | 4 | 8 | 9 | 11 | 5 | 8 |
| 867 | 1 | 11 | 11 | 0 | 4 | 8 | 5 | 6 | 7 | 10 | 7 | 7 | 7 | 8 |
| 868 | 11 | 7 | 7 | 2 | 0 | 7 | 7 | 0 | 7 | 7 | 1 | 0 | 0 | 1 |
| 869 | 3 | 3 | 6 | 7 | 0 | 8 | 2 | 4 | 4 | 7 | 11 | 9 | 11 | 2 |
| 870 | 0 | 4 | 0 | 8 | 2 | 6 | 4 | 8 | 2 | 1 | 8 | 8 | 0 | 7 |
| 871 | 6 | 5 | 2 | 10 | 11 | 10 | 7 | 2 | 10 | 7 | 5 | 1 | 10 | 10 |
| 872 | 11 | 1 | 1 | 0 | 0 | 0 | 4 | 1 | 2 | 2 | 5 | 2 | 8 | 2 |
| 873 | 3 | 6 | 5 | 9 | 6 | 11 | 6 | 11 | 10 | 2 | 6 | 0 | 0 | 8 |
| 874 | 0 | 2 | 8 | 0 | 11 | 8 | 9 | 7 | 11 | 0 | 4 | 5 | 1 | 3 |
| 875 | 7 | 11 | 5 | 10 | 9 | 6 | 11 | 9 | 9 | 0 | 10 | 0 | 1 | 9 |
| 876 | 5 | 11 | 0 | 3 | 5 | 7 | 0 | 10 | 3 | 6 | 11 | 11 | 5 | 3 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 877 | 7 | 7 | 1 | 5 | 9 | 4 | 4 | 3 | 5 | 8 | 11 | 7 | 5 | 7 |
| 878 | 11 | 9 | 0 | 7 | 6 | 3 | 11 | 3 | 6 | 3 | 3 | 5 | 7 | 3 |
| 879 | 4 | 6 | 0 | 4 | 2 | 4 | 9 | 7 | 2 | 4 | 6 | 6 | 10 | 6 |
| 880 | 4 | 7 | 0 | 9 | 9 | 2 | 8 | 4 | 3 | 10 | 4 | 10 | 0 | 6 |
| 881 | 5 | 4 | 2 | 2 | 4 | 1 | 8 | 6 | 4 | 11 | 3 | 4 | 11 | 1 |
| 882 | 10 | 10 | 4 | 7 | 8 | 3 | 6 | 5 | 0 | 5 | 10 | 11 | 10 | 6 |
| 883 | 8 | 1 | 6 | 0 | 7 | 2 | 0 | 1 | 4 | 5 | 6 | 3 | 11 | 9 |
| 884 | 10 | 9 | 8 | 0 | 7 | 8 | 3 | 2 | 9 | 6 | 2 | 3 | 7 | 2 |
| 885 | 5 | 3 | 4 | 10 | 9 | 8 | 7 | 8 | 1 | 5 | 0 | 2 | 5 | 9 |
| 886 | 1 | 3 | 7 | 6 | 8 | 4 | 7 | 3 | 4 | 0 | 7 | 2 | 10 | 10 |
| 887 | 1 | 9 | 8 | 6 | 0 | 0 | 0 | 5 | 4 | 2 | 0 | 10 | 6 | 7 |
| 888 | 9 | 4 | 9 | 9 | 3 | 11 | 0 | 10 | 9 | 10 | 1 | 5 | 0 | 5 |
| 889 | 8 | 7 | 8 | 4 | 7 | 7 | 4 | 2 | 7 | 3 | 4 | 4 | 6 | 4 |
| 890 | 8 | 2 | 9 | 9 | 2 | 11 | 5 | 2 | 0 | 7 | 5 | 7 | 3 | 6 |
| 891 | 7 | 0 | 1 | 7 | 3 | 9 | 1 | 8 | 3 | 8 | 8 | 1 | 6 | 4 |
| 892 | 11 | 10 | 6 | 11 | 0 | 4 | 6 | 7 | 10 | 2 | 4 | 3 | 3 | 9 |
| 893 | 3 | 5 | 10 | 1 | 6 | 6 | 2 | 0 | 4 | 0 | 7 | 8 | 7 | 1 |
| 894 | 2 | 0 | 2 | 8 | 2 | 2 | 10 | 9 | 3 | 10 | 8 | 0 | 7 | 3 |
| 895 | 7 | 11 | 8 | 1 | 3 | 6 | 10 | 7 | 5 | 5 | 1 | 8 | 8 | 5 |
| 896 | 9 | 0 | 6 | 10 | 0 | 7 | 6 | 10 | 11 | 0 | 0 | 8 | 0 | 3 |
| 897 | 3 | 5 | 11 | 0 | 3 | 8 | 0 | 11 | 0 | 8 | 0 | 4 | 9 | 0 |
| 898 | 7 | 6 | 3 | 7 | 7 | 1 | 8 | 2 | 2 | 3 | 5 | 11 | 2 | 3 |
| 899 | 10 | 4 | 9 | 11 | 6 | 8 | 0 | 9 | 6 | 0 | 6 | 7 | 2 | 2 |
| 900 | 0 | 6 | 3 | 4 | 10 | 6 | 2 | 11 | 4 | 11 | 8 | 5 | 1 | 0 |
| 901 | 1 | 2 | 11 | 2 | 3 | 10 | 10 | 4 | 11 | 4 | 11 | 3 | 7 | 7 |
| 902 | 5 | 4 | 9 | 6 | 5 | 2 | 5 | 4 | 3 | 5 | 5 | 8 | 9 | 5 |
| 903 | 5 | 9 | 11 | 10 | 3 | 11 | 9 | 2 | 6 | 1 | 8 | 9 | 5 | 2 |
| 904 | 4 | 2 | 9 | 2 | 11 | 5 | 11 | 6 | 1 | 11 | 2 | 6 | 0 | 2 |
| 905 | 6 | 10 | 2 | 7 | 10 | 11 | 9 | 7 | 7 | 5 | 1 | 4 | 9 | 1 |
| 906 | 9 | 2 | 2 | 4 | 3 | 4 | 2 | 5 | 7 | 7 | 6 | 7 | 5 | 2 |
| 907 | 5 | 1 | 10 | 8 | 5 | 3 | 7 | 6 | 9 | 9 | 11 | 10 | 2 | 11 |
| 908 | 8 | 4 | 1 | 7 | 2 | 6 | 10 | 2 | 8 | 10 | 11 | 10 | 10 | 4 |
| 909 | 3 | 0 | 9 | 5 | 1 | 0 | 8 | 9 | 9 | 4 | 0 | 3 | 10 | 1 |
| 910 | 8 | 5 | 11 | 8 | 8 | 7 | 1 | 2 | 4 | 10 | 3 | 9 | 3 | 3 |
| 911 | 6 | 6 | 2 | 5 | 10 | 2 | 10 | 1 | 11 | 7 | 4 | 8 | 0 | 5 |
| 912 | 11 | 11 | 6 | 0 | 3 | 5 | 4 | 5 | 1 | 8 | 6 | 8 | 4 | 3 |
| 913 | 9 | 1 | 4 | 10 | 7 | 1 | 9 | 10 | 7 | 7 | 9 | 0 | 2 | 11 |
| 914 | 0 | 7 | 10 | 11 | 11 | 7 | 1 | 1 | 0 | 1 | 4 | 7 | 10 | 6 |
| 915 | 4 | 5 | 7 | 7 | 4 | 5 | 7 | 9 | 6 | 3 | 6 | 1 | 6 | 7 |
| 916 | 0 | 9 | 10 | 4 | 3 | 6 | 6 | 6 | 3 | 4 | 2 | 2 | 3 | 6 |
| 917 | 2 | 4 | 1 | 0 | 11 | 1 | 11 | 4 | 5 | 0 | 9 | 1 | 11 | 5 |
| 918 | 11 | 8 | 6 | 5 | 10 | 0 | 7 | 2 | 4 | 1 | 0 | 8 | 7 | 2 |
| 919 | 4 | 8 | 6 | 1 | 0 | 9 | 3 | 1 | 8 | 3 | 1 | 5 | 6 | 1 |
| 920 | 5 | 2 | 1 | 11 | 7 | 11 | 1 | 10 | 6 | 8 | 6 | 11 | 7 | 0 |
| 921 | 9 | 8 | 4 | 3 | 9 | 1 | 11 | 6 | 0 | 3 | 6 | 8 | 4 | 1 |
| 922 | 5 | 6 | 6 | 7 | 8 | 5 | 5 | 6 | 10 | 4 | 1 | 7 | 0 | 10 |
| 923 | 1 | 0 | 0 | 9 | 11 | 11 | 4 | 3 | 1 | 10 | 10 | 3 | 4 | 8 |
| 924 | 2 | 9 | 1 | 5 | 9 | 7 | 6 | 8 | 9 | 10 | 3 | 11 | 0 | 0 |
| 925 | 11 | 6 | 10 | 11 | 2 | 1 | 8 | 0 | 5 | 1 | 1 | 4 | 6 | 0 |
| 926 | 8 | 1 | 5 | 2 | 3 | 0 | 2 | 7 | 0 | 10 | 3 | 6 | 4 | 1 |
| 927 | 9 | 10 | 11 | 10 | 1 | 8 | 0 | 2 | 5 | 3 | 7 | 1 | 1 | 9 |
| 928 | 2 | 2 | 4 | 2 | 8 | 6 | 9 | 3 | 6 | 10 | 4 | 2 | 5 | 0 |
| 929 | 0 | 3 | 5 | 4 | 4 | 1 | 7 | 3 | 10 | 1 | 3 | 6 | 2 | 11 |
| 930 | 10 | 6 | 6 | 4 | 3 | 5 | 1 | 1 | 0 | 9 | 0 | 9 | 7 | 1 |
| 931 | 0 | 1 | 7 | 4 | 11 | 10 | 4 | 6 | 1 | 3 | 6 | 11 | 10 | 9 |
| 932 | 11 | 7 | 7 | 11 | 1 | 3 | 2 | 6 | 11 | 5 | 6 | 8 | 6 | 11 |
| 933 | 6 | 3 | 11 | 5 | 8 | 11 | 10 | 7 | 2 | 3 | 11 | 7 | 4 | 9 |
| 934 | 2 | 7 | 3 | 1 | 6 | 8 | 7 | 7 | 0 | 4 | 4 | 3 | 8 | 2 |
| 935 | 9 | 9 | 5 | 0 | 5 | 11 | 10 | 1 | 8 | 7 | 2 | 1 | 11 | 4 |
| 936 | 8 | 10 | 4 | 11 | 1 | 1 | 2 | 10 | 1 | 8 | 7 | 7 | 3 | 7 |
| 937 | 7 | 11 | 6 | 4 | 1 | 8 | 3 | 5 | 7 | 9 | 5 | 4 | 0 | 9 |
| 938 | 4 | 8 | 5 | 9 | 7 | 0 | 3 | 5 | 6 | 0 | 5 | 3 | 9 | 5 |
| 939 | 9 | 10 | 6 | 2 | 3 | 2 | 9 | 0 | 11 | 6 | 8 | 7 | 1 | 5 |
| 940 | 10 | 10 | 3 | 4 | 8 | 9 | 3 | 0 | 2 | 4 | 5 | 1 | 5 | 0 |
| 941 | 5 | 1 | 5 | 7 | 2 | 8 | 1 | 9 | 8 | 9 | 10 | 3 | 5 | 3 |
| 942 | 4 | 8 | 3 | 8 | 4 | 0 | 6 | 3 | 10 | 7 | 2 | 4 | 5 | 0 |
| 943 | 3 | 1 | 11 | 5 | 4 | 11 | 1 | 1 | 1 | 7 | 3 | 2 | 10 | 8 |
| 944 | 5 | 5 | 1 | 8 | 3 | 6 | 7 | 3 | 10 | 6 | 9 | 3 | 7 | 8 |
| 945 | 7 | 7 | 10 | 10 | 11 | 5 | 5 | 4 | 4 | 4 | 3 | 8 | 11 | 7 |
| 946 | 11 | 1 | 3 | 10 | 6 | 4 | 8 | 8 | 10 | 6 | 5 | 8 | 0 | 1 |
| 947 | 11 | 4 | 2 | 6 | 9 | 11 | 10 | 8 | 5 | 4 | 4 | 10 | 9 | 7 |
| 948 | 9 | 5 | 5 | 3 | 7 | 10 | 10 | 5 | 7 | 5 | 1 | 5 | 4 | 7 |
| 949 | 11 | 8 | 10 | 3 | 3 | 8 | 5 | 10 | 2 | 0 | 2 | 9 | 0 | 7 |
| 950 | 5 | 2 | 1 | 3 | 9 | 6 | 9 | 5 | 2 | 9 | 10 | 1 | 8 | 10 |
| 951 | 1 | 8 | 5 | 6 | 10 | 7 | 2 | 10 | 7 | 2 | 7 | 9 | 8 | 2 |
| 952 | 10 | 8 | 5 | 8 | 6 | 4 | 9 | 0 | 1 | 5 | 6 | 10 | 1 | 10 |
| 953 | 9 | 11 | 1 | 7 | 10 | 5 | 1 | 11 | 5 | 9 | 1 | 11 | 4 | 2 |
| 954 | 7 | 9 | 4 | 9 | 0 | 9 | 0 | 4 | 5 | 6 | 9 | 2 | 3 | 1 |
| 955 | 3 | 8 | 9 | 8 | 8 | 6 | 3 | 4 | 2 | 5 | 7 | 6 | 3 | 8 |
| 956 | 5 | 11 | 5 | 1 | 1 | 5 | 9 | 3 | 5 | 2 | 2 | 3 | 10 | 6 |
| 957 | 6 | 8 | 10 | 1 | 10 | 4 | 6 | 11 | 4 | 6 | 11 | 2 | 9 | 8 |
| 958 | 8 | 6 | 2 | 6 | 11 | 5 | 6 | 1 | 6 | 11 | 5 | 5 | 5 | 6 |
| 959 | 7 | 1 | 2 | 10 | 4 | 7 | 0 | 3 | 3 | 4 | 0 | 9 | 7 | 5 |
| 960 | 1 | 7 | 11 | 9 | 4 | 4 | 10 | 0 | 10 | 1 | 1 | 9 | 4 | 4 |
| 961 | 0 | 4 | 3 | 11 | 9 | 9 | 1 | 3 | 7 | 5 | 7 | 4 | 2 | 8 |
| 962 | 5 | 5 | 5 | 7 | 5 | 2 | 10 | 0 | 2 | 4 | 8 | 9 | 6 | 6 |
| 963 | 9 | 8 | 8 | 9 | 11 | 9 | 8 | 5 | 11 | 11 | 2 | 0 | 10 | 11 |
| 964 | 2 | 11 | 3 | 8 | 7 | 6 | 5 | 1 | 6 | 5 | 9 | 1 | 0 | 2 |
| 965 | 3 | 0 | 7 | 6 | 10 | 9 | 6 | 7 | 7 | 3 | 3 | 3 | 6 | 8 |
| 966 | 1 | 10 | 5 | 3 | 8 | 5 | 10 | 8 | 1 | 0 | 8 | 11 | 2 | 3 |
| 967 | 3 | 9 | 11 | 5 | 0 | 3 | 4 | 4 | 7 | 10 | 5 | 6 | 2 | 7 |
| 968 | 3 | 7 | 3 | 10 | 0 | 10 | 5 | 3 | 1 | 10 | 1 | 7 | 3 | 2 |
| 969 | 4 | 2 | 11 | 3 | 0 | 2 | 9 | 10 | 10 | 1 | 5 | 2 | 6 | 6 |
| 970 | 8 | 5 | 9 | 2 | 11 | 2 | 6 | 11 | 7 | 3 | 10 | 1 | 3 | 11 |
| 971 | 1 | 10 | 6 | 2 | 9 | 11 | 2 | 2 | 3 | 0 | 5 | 9 | 6 | 11 |
| 972 | 10 | 5 | 3 | 6 | 6 | 0 | 4 | 6 | 0 | 11 | 3 | 2 | 6 | 10 |
| 973 | 4 | 10 | 1 | 4 | 7 | 9 | 0 | 8 | 4 | 9 | 4 | 11 | 9 | 1 |
| 974 | 5 | 5 | 0 | 4 | 9 | 0 | 8 | 6 | 10 | 0 | 0 | 1 | 4 | 0 |
| 975 | 11 | 5 | 1 | 7 | 10 | 9 | 3 | 4 | 11 | 0 | 2 | 2 | 1 | 9 |
| 976 | 9 | 0 | 5 | 1 | 11 | 1 | 7 | 2 | 5 | 4 | 1 | 10 | 5 | 8 |
| 977 | 7 | 4 | 3 | 9 | 10 | 11 | 8 | 5 | 10 | 4 | 10 | 4 | 8 | 4 |
| 978 | 11 | 6 | 3 | 2 | 5 | 0 | 11 | 3 | 11 | 0 | 0 | 9 | 11 | 10 |
| 979 | 4 | 8 | 5 | 3 | 9 | 2 | 7 | 8 | 11 | 8 | 3 | 7 | 7 | 4 |
| 980 | 9 | 11 | 3 | 11 | 9 | 2 | 0 | 11 | 3 | 0 | 3 | 2 | 8 | 5 |
| 981 | 7 | 9 | 6 | 1 | 5 | 3 | 9 | 11 | 3 | 5 | 10 | 5 | 3 | 4 |
| 982 | 5 | 11 | 7 | 3 | 11 | 8 | 10 | 11 | 10 | 3 | 0 | 3 | 8 | 4 |
| 983 | 6 | 8 | 11 | 10 | 5 | 5 | 4 | 0 | 3 | 2 | 0 | 3 | 6 | 2 |
| 984 | 10 | 4 | 9 | 7 | 7 | 9 | 9 | 0 | 10 | 7 | 7 | 11 | 6 | 7 |
| 985 | 3 | 5 | 11 | 7 | 2 | 6 | 9 | 6 | 7 | 11 | 6 | 9 | 8 | 5 |
| 986 | 1 | 6 | 4 | 0 | 6 | 1 | 11 | 5 | 2 | 10 | 4 | 5 | 10 | 7 |
| 987 | 6 | 2 | 0 | 3 | 6 | 3 | 0 | 11 | 9 | 7 | 0 | 10 | 3 | 9 |
| 988 | 1 | 11 | 11 | 10 | 3 | 0 | 3 | 1 | 1 | 3 | 5 | 6 | 3 | 11 |
| 989 | 6 | 1 | 10 | 4 | 4 | 0 | 3 | 5 | 9 | 7 | 9 | 1 | 6 | 3 |
| 990 | 3 | 5 | 3 | 2 | 1 | 8 | 8 | 10 | 5 | 9 | 8 | 6 | 5 | 8 |
| 991 | 5 | 10 | 7 | 10 | 10 | 3 | 3 | 8 | 8 | 4 | 4 | 7 | 2 | 8 |
| 992 | 1 | 2 | 3 | 4 | 1 | 3 | 11 | 2 | 0 | 6 | 2 | 8 | 10 | 0 |
| 993 | 3 | 4 | 10 | 2 | 7 | 11 | 3 | 3 | 7 | 4 | 9 | 7 | 4 | 10 |
| 994 | 3 | 0 | 3 | 11 | 3 | 7 | 11 | 4 | 5 | 11 | 3 | 10 | 0 | 7 |
| 995 | 7 | 11 | 0 | 6 | 6 | 5 | 8 | 10 | 4 | 10 | 9 | 7 | 1 | 0 |
| 996 | 6 | 11 | 1 | 10 | 8 | 2 | 9 | 2 | 1 | 6 | 10 | 5 | 0 | 3 |
| 997 | 6 | 0 | 11 | 0 | 9 | 9 | 2 | 4 | 4 | 3 | 4 | 0 | 2 | 4 |
| 998 | 7 | 3 | 2 | 8 | 8 | 2 | 0 | 4 | 0 | 2 | 4 | 1 | 8 | 9 |
| 999 | 6 | 5 | 7 | 9 | 3 | 6 | 11 | 1 | 0 | 1 | 8 | 10 | 8 | 9 |
| 1000 | 11 | 7 | 11 | 8 | 3 | 1 | 11 | 6 | 7 | 9 | 4 | 11 | 1 | 0 |
| 1001 | 9 | 1 | 5 | 9 | 4 | 6 | 6 | 8 | 5 | 6 | 11 | 4 | 2 | 5 |
| 1002 | 5 | 1 | 11 | 1 | 1 | 7 | 6 | 7 | 7 | 11 | 10 | 4 | 7 | 10 |
| 1003 | 3 | 9 | 9 | 10 | 9 | 2 | 7 | 1 | 3 | 1 | 10 | 4 | 4 | 1 |
| 1004 | 10 | 3 | 2 | 7 | 9 | 7 | 6 | 6 | 11 | 1 | 11 | 4 | 3 | 7 |
| 1005 | 7 | 11 | 9 | 11 | 7 | 1 | 7 | 11 | 1 | 2 | 6 | 10 | 6 | 6 |
| 1006 | 8 | 2 | 0 | 7 | 8 | 0 | 6 | 6 | 1 | 2 | 7 | 9 | 2 | 1 |
| 1007 | 10 | 10 | 6 | 2 | 6 | 3 | 10 | 7 | 5 | 7 | 11 | 2 | 0 | 8 |
| 1008 | 3 | 3 | 2 | 0 | 10 | 8 | 5 | 10 | 3 | 2 | 3 | 8 | 3 | 3 |
| 1009 | 10 | 1 | 2 | 0 | 8 | 3 | 8 | 3 | 2 | 8 | 8 | 5 | 0 | 10 |
| 1010 | 8 | 6 | 0 | 3 | 0 | 10 | 3 | 0 | 3 | 9 | 8 | 2 | 1 | 10 |
| 1011 | 3 | 0 | 8 | 9 | 1 | 5 | 0 | 6 | 5 | 0 | 11 | 5 | 6 | 4 |
| 1012 | 1 | 5 | 11 | 4 | 6 | 10 | 4 | 9 | 5 | 6 | 4 | 6 | 9 | 2 |
| 1013 | 7 | 6 | 8 | 0 | 7 | 3 | 1 | 10 | 5 | 7 | 7 | 5 | 9 | 1 |
| 1014 | 1 | 8 | 7 | 5 | 2 | 10 | 1 | 7 | 3 | 5 | 10 | 4 | 8 | 9 |
| 1015 | 4 | 9 | 5 | 11 | 7 | 6 | 5 | 6 | 9 | 1 | 7 | 6 | 4 | 0 |
| 1016 | 0 | 4 | 6 | 6 | 5 | 0 | 9 | 10 | 7 | 6 | 6 | 1 | 6 | 0 |
| 1017 | 0 | 1 | 1 | 3 | 8 | 7 | 9 | 11 | 5 | 3 | 5 | 8 | 5 | 11 |
| 1018 | 4 | 0 | 6 | 6 | 0 | 8 | 8 | 7 | 1 | 1 | 2 | 11 | 7 | 4 |
| 1019 | 2 | 5 | 10 | 10 | 7 | 3 | 3 | 6 | 2 | 10 | 0 | 6 | 9 | 6 |
| 1020 | 6 | 10 | 5 | 4 | 2 | 6 | 10 | 10 | 2 | 2 | 1 | 3 | 11 | 8 |
| 1021 | 7 | 4 | 7 | 0 | 0 | 11 | 5 | 9 | 4 | 1 | 0 | 2 | 2 | 5 |
| 1022 | 8 | 9 | 3 | 6 | 10 | 8 | 1 | 5 | 1 | 5 | 1 | 6 | 1 | 6 |
| 1023 | 2 | 0 | 9 | 6 | 5 | 10 | 8 | 3 | 4 | 8 | 11 | 10 | 8 | 2 |
| 1024 | 9 | 1 | 9 | 2 | 4 | 2 | 4 | 5 | 6 | 7 | 3 | 9 | 8 | 3 |
| 1025 | 7 | 3 | 11 | 0 | 8 | 10 | 7 | 2 | 0 | 2 | 0 | 6 | 10 | 1 |
| 1026 | 0 | 0 | 2 | 5 | 3 | 3 | 2 | 8 | 1 | 10 | 11 | 4 | 1 | 10 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1027 | 10 | 2 | 6 | 10 | 1 | 6 | 9 | 0 | 4 | 11 | 6 | 10 | 5 | 0 |
| 1028 | 0 | 6 | 7 | 1 | 0 | 9 | 8 | 5 | 11 | 1 | 7 | 7 | 7 | 8 |
| 1029 | 2 | 11 | 2 | 10 | 7 | 7 | 10 | 3 | 2 | 3 | 8 | 3 | 0 | 8 |
| 1030 | 1 | 7 | 10 | 5 | 5 | 7 | 3 | 2 | 4 | 9 | 5 | 1 | 8 | 4 |
| 1031 | 5 | 1 | 5 | 11 | 11 | 3 | 1 | 1 | 8 | 3 | 0 | 10 | 6 | 5 |
| 1032 | 8 | 9 | 8 | 4 | 8 | 5 | 6 | 4 | 6 | 8 | 11 | 3 | 6 | 4 |
| 1033 | 7 | 10 | 4 | 3 | 7 | 4 | 5 | 1 | 3 | 4 | 1 | 2 | 3 | 0 |
| 1034 | 4 | 7 | 7 | 8 | 2 | 11 | 5 | 10 | 9 | 0 | 10 | 8 | 11 | 10 |
| 1035 | 1 | 10 | 5 | 8 | 5 | 9 | 2 | 9 | 1 | 2 | 10 | 5 | 6 | 2 |
| 1036 | 8 | 0 | 9 | 6 | 0 | 8 | 2 | 7 | 4 | 8 | 9 | 9 | 2 | 0 |
| 1037 | 0 | 1 | 11 | 7 | 7 | 5 | 0 | 1 | 4 | 6 | 4 | 8 | 0 | 3 |
| 1038 | 5 | 1 | 8 | 9 | 1 | 0 | 5 | 2 | 6 | 5 | 1 | 8 | 10 | 9 |
| 1039 | 0 | 8 | 9 | 9 | 8 | 7 | 11 | 9 | 10 | 11 | 9 | 11 | 1 | 4 |
| 1040 | 5 | 5 | 10 | 2 | 0 | 5 | 10 | 1 | 7 | 8 | 2 | 1 | 7 | 7 |
| 1041 | 4 | 6 | 4 | 5 | 6 | 9 | 6 | 0 | 10 | 10 | 0 | 3 | 9 | 9 |
| 1042 | 7 | 9 | 5 | 10 | 4 | 1 | 6 | 7 | 11 | 6 | 2 | 1 | 8 | 5 |
| 1043 | 5 | 0 | 5 | 7 | 10 | 6 | 0 | 5 | 7 | 1 | 9 | 6 | 10 | 2 |
| 1044 | 9 | 7 | 11 | 7 | 6 | 4 | 10 | 5 | 2 | 9 | 2 | 0 | 3 | 10 |
| 1045 | 10 | 11 | 3 | 5 | 1 | 0 | 4 | 4 | 9 | 8 | 3 | 4 | 3 | 11 |
| 1046 | 6 | 1 | 0 | 0 | 9 | 2 | 9 | 6 | 0 | 3 | 7 | 0 | 4 | 2 |
| 1047 | 2 | 0 | 5 | 1 | 9 | 2 | 3 | 11 | 6 | 4 | 2 | 7 | 9 | 9 |
| 1048 | 4 | 4 | 1 | 10 | 3 | 4 | 0 | 11 | 9 | 1 | 6 | 1 | 4 | 1 |
| 1049 | 5 | 10 | 1 | 6 | 2 | 11 | 6 | 0 | 2 | 7 | 4 | 10 | 3 | 2 |
| 1050 | 3 | 5 | 8 | 11 | 3 | 0 | 8 | 5 | 5 | 2 | 5 | 1 | 5 | 6 |
| 1051 | 6 | 3 | 10 | 10 | 1 | 4 | 3 | 6 | 10 | 6 | 4 | 6 | 7 | 11 |
| 1052 | 8 | 5 | 6 | 6 | 4 | 5 | 7 | 5 | 3 | 9 | 7 | 4 | 0 | 1 |
| 1053 | 3 | 2 | 0 | 11 | 1 | 5 | 1 | 3 | 11 | 1 | 1 | 0 | 2 | 11 |
| 1054 | 3 | 10 | 6 | 9 | 9 | 1 | 4 | 1 | 8 | 1 | 10 | 9 | 0 | 7 |
| 1055 | 8 | 11 | 8 | 7 | 9 | 3 | 5 | 3 | 5 | 4 | 4 | 11 | 4 | 10 |
| 1056 | 2 | 2 | 5 | 6 | 11 | 1 | 8 | 9 | 0 | 7 | 6 | 9 | 1 | 8 |
| 1057 | 3 | 3 | 9 | 6 | 7 | 3 | 11 | 10 | 9 | 10 | 1 | 1 | 9 | 7 |
| 1058 | 4 | 0 | 1 | 3 | 5 | 8 | 4 | 10 | 8 | 11 | 0 | 0 | 8 | 8 |
| 1059 | 2 | 10 | 11 | 9 | 3 | 6 | 1 | 0 | 0 | 4 | 3 | 0 | 8 | 5 |
| 1060 | 9 | 8 | 4 | 2 | 8 | 0 | 1 | 11 | 2 | 3 | 5 | 6 | 4 | 7 |
| 1061 | 4 | 1 | 8 | 1 | 5 | 11 | 4 | 2 | 4 | 1 | 6 | 3 | 6 | 5 |
| 1062 | 10 | 3 | 1 | 0 | 6 | 9 | 0 | 10 | 10 | 0 | 1 | 8 | 8 | 2 |
| 1063 | 3 | 7 | 7 | 2 | 4 | 10 | 7 | 8 | 11 | 7 | 4 | 5 | 2 | 8 |
| 1064 | 7 | 3 | 2 | 7 | 2 | 2 | 2 | 5 | 7 | 4 | 8 | 4 | 0 | 4 |
| 1065 | 8 | 1 | 2 | 10 | 11 | 5 | 11 | 11 | 5 | 3 | 10 | 9 | 10 | 1 |
| 1066 | 1 | 7 | 7 | 6 | 0 | 8 | 11 | 2 | 7 | 6 | 11 | 5 | 9 | 10 |
| 1067 | 0 | 10 | 11 | 4 | 5 | 1 | 7 | 8 | 2 | 6 | 10 | 4 | 7 | 8 |
| 1068 | 11 | 2 | 8 | 6 | 0 | 4 | 8 | 1 | 7 | 11 | 3 | 0 | 2 | 5 |
| 1069 | 0 | 2 | 5 | 1 | 10 | 9 | 10 | 9 | 5 | 4 | 5 | 4 | 3 | 5 |
| 1070 | 1 | 6 | 8 | 1 | 1 | 6 | 4 | 9 | 9 | 10 | 7 | 2 | 11 | 9 |
| 1071 | 4 | 0 | 4 | 3 | 2 | 3 | 11 | 6 | 6 | 8 | 8 | 10 | 11 | 9 |
| 1072 | 2 | 7 | 3 | 11 | 1 | 11 | 3 | 1 | 5 | 11 | 7 | 1 | 10 | 9 |
| 1073 | 11 | 3 | 4 | 2 | 0 | 1 | 8 | 6 | 3 | 7 | 0 | 2 | 5 | 1 |
| 1074 | 9 | 6 | 0 | 7 | 4 | 4 | 9 | 1 | 3 | 3 | 0 | 3 | 10 | 11 |
| 1075 | 10 | 6 | 2 | 6 | 7 | 5 | 2 | 3 | 7 | 6 | 0 | 7 | 4 | 0 |
| 1076 | 11 | 4 | 2 | 2 | 5 | 6 | 10 | 10 | 10 | 3 | 7 | 11 | 3 | 9 |
| 1077 | 0 | 7 | 6 | 6 | 1 | 4 | 1 | 11 | 8 | 0 | 3 | 10 | 11 | 7 |
| 1078 | 10 | 8 | 0 | 1 | 0 | 10 | 3 | 8 | 10 | 4 | 3 | 8 | 1 | 3 |
| 1079 | 3 | 10 | 2 | 7 | 4 | 3 | 9 | 6 | 4 | 0 | 1 | 10 | 2 | 6 |
| 1080 | 8 | 6 | 4 | 8 | 6 | 3 | 2 | 7 | 3 | 7 | 10 | 8 | 10 | 4 |
| 1081 | 0 | 7 | 5 | 8 | 6 | 6 | 6 | 5 | 6 | 8 | 1 | 1 | 1 | 3 |
| 1082 | 6 | 6 | 2 | 9 | 2 | 0 | 7 | 10 | 5 | 4 | 1 | 10 | 1 | 1 |
| 1083 | 2 | 1 | 6 | 8 | 0 | 3 | 6 | 10 | 3 | 11 | 11 | 3 | 2 | 1 |
| 1084 | 10 | 3 | 10 | 3 | 7 | 2 | 8 | 4 | 8 | 3 | 5 | 3 | 5 | 9 |
| 1085 | 8 | 0 | 3 | 10 | 6 | 10 | 0 | 3 | 1 | 7 | 6 | 3 | 7 | 10 |
| 1086 | 10 | 0 | 10 | 0 | 11 | 10 | 3 | 0 | 7 | 2 | 8 | 1 | 6 | 2 |
| 1087 | 5 | 9 | 1 | 8 | 9 | 11 | 4 | 6 | 6 | 6 | 3 | 8 | 1 | 4 |
| 1088 | 3 | 10 | 3 | 1 | 6 | 5 | 7 | 0 | 9 | 11 | 5 | 10 | 0 | 8 |
| 1089 | 1 | 0 | 9 | 11 | 11 | 3 | 3 | 5 | 1 | 6 | 4 | 8 | 10 | 1 |
| 1090 | 0 | 4 | 3 | 11 | 2 | 4 | 9 | 3 | 10 | 3 | 6 | 5 | 5 | 7 |
| 1091 | 4 | 11 | 9 | 9 | 4 | 0 | 4 | 9 | 11 | 10 | 6 | 6 | 7 | 1 |
| 1092 | 6 | 4 | 1 | 3 | 7 | 0 | 6 | 0 | 5 | 10 | 3 | 11 | 6 | 10 |
| 1093 | 10 | 4 | 8 | 4 | 0 | 5 | 7 | 3 | 8 | 3 | 10 | 2 | 0 | 3 |
| 1094 | 4 | 10 | 6 | 10 | 2 | 0 | 3 | 2 | 3 | 1 | 7 | 7 | 2 | 2 |
| 1095 | 1 | 5 | 6 | 1 | 9 | 2 | 0 | 8 | 4 | 7 | 4 | 11 | 1 | 5 |
| 1096 | 7 | 6 | 9 | 5 | 10 | 8 | 9 | 6 | 0 | 9 | 8 | 5 | 8 | 5 |
| 1097 | 8 | 8 | 1 | 11 | 8 | 10 | 4 | 2 | 11 | 11 | 2 | 10 | 4 | 2 |
| 1098 | 3 | 1 | 5 | 3 | 4 | 0 | 0 | 9 | 2 | 8 | 5 | 8 | 11 | 11 |
| 1099 | 4 | 5 | 8 | 0 | 2 | 9 | 7 | 3 | 3 | 0 | 5 | 6 | 6 | 9 |
| 1100 | 1 | 5 | 3 | 5 | 7 | 1 | 7 | 11 | 0 | 8 | 11 | 6 | 5 | 8 |
| 1101 | 2 | 11 | 10 | 4 | 10 | 7 | 8 | 7 | 11 | 8 | 4 | 7 | 10 | 9 |
| 1102 | 4 | 7 | 9 | 6 | 5 | 7 | 0 | 9 | 1 | 4 | 4 | 7 | 4 | 11 |
| 1103 | 3 | 11 | 9 | 5 | 2 | 5 | 10 | 7 | 3 | 3 | 6 | 4 | 10 | 5 |
| 1104 | 4 | 9 | 6 | 4 | 2 | 8 | 4 | 0 | 10 | 4 | 1 | 5 | 0 | 6 |
| 1105 | 1 | 11 | 4 | 8 | 11 | 2 | 10 | 4 | 6 | 2 | 5 | 8 | 4 | 11 |
| 1106 | 8 | 2 | 0 | 2 | 8 | 4 | 10 | 8 | 4 | 7 | 8 | 7 | 6 | 7 |
| 1107 | 5 | 11 | 1 | 4 | 0 | 4 | 3 | 10 | 3 | 2 | 4 | 9 | 8 | 0 |
| 1108 | 6 | 2 | 3 | 2 | 6 | 10 | 2 | 2 | 2 | 5 | 8 | 11 | 4 | 9 |
| 1109 | 9 | 10 | 7 | 4 | 6 | 9 | 2 | 2 | 5 | 3 | 2 | 6 | 9 | 4 |
| 1110 | 10 | 5 | 10 | 9 | 2 | 11 | 9 | 11 | 6 | 5 | 9 | 6 | 2 | 3 |
| 1111 | 2 | 3 | 1 | 8 | 9 | 7 | 2 | 1 | 11 | 10 | 8 | 1 | 2 | 10 |
| 1112 | 1 | 11 | 7 | 9 | 6 | 2 | 6 | 10 | 4 | 6 | 8 | 2 | 10 | 8 |
| 1113 | 4 | 3 | 1 | 7 | 2 | 6 | 11 | 4 | 11 | 7 | 1 | 6 | 1 | 5 |
| 1114 | 7 | 7 | 9 | 10 | 3 | 5 | 11 | 4 | 0 | 5 | 7 | 1 | 1 | 10 |
| 1115 | 9 | 2 | 5 | 3 | 5 | 11 | 7 | 5 | 0 | 5 | 5 | 10 | 6 | 10 |
| 1116 | 9 | 0 | 1 | 8 | 3 | 9 | 6 | 4 | 2 | 1 | 10 | 3 | 7 | 0 |
| 1117 | 2 | 8 | 8 | 11 | 7 | 2 | 5 | 7 | 4 | 1 | 4 | 10 | 7 | 8 |
| 1118 | 2 | 6 | 3 | 3 | 4 | 9 | 1 | 3 | 8 | 11 | 2 | 8 | 7 | 2 |
| 1119 | 10 | 9 | 7 | 9 | 11 | 2 | 7 | 1 | 11 | 3 | 7 | 4 | 8 | 4 |
| 1120 | 11 | 0 | 2 | 1 | 5 | 10 | 5 | 11 | 3 | 11 | 3 | 4 | 7 | 0 |
| 1121 | 8 | 3 | 9 | 1 | 0 | 0 | 7 | 6 | 9 | 0 | 11 | 4 | 6 | 3 |
| 1122 | 3 | 7 | 6 | 9 | 2 | 6 | 2 | 3 | 5 | 9 | 7 | 11 | 6 | 0 |
| 1123 | 5 | 0 | 3 | 11 | 7 | 6 | 5 | 10 | 2 | 7 | 7 | 0 | 1 | 7 |
| 1124 | 6 | 8 | 0 | 0 | 4 | 9 | 2 | 11 | 9 | 7 | 2 | 2 | 0 | 7 |
| 1125 | 4 | 9 | 11 | 4 | 4 | 11 | 6 | 9 | 0 | 3 | 7 | 8 | 9 | 0 |
| 1126 | 6 | 11 | 9 | 2 | 0 | 6 | 2 | 11 | 1 | 6 | 1 | 1 | 5 | 4 |
| 1127 | 8 | 11 | 4 | 2 | 6 | 6 | 3 | 1 | 8 | 2 | 3 | 0 | 9 | 10 |
| 1128 | 8 | 7 | 2 | 9 | 3 | 3 | 9 | 2 | 9 | 4 | 9 | 5 | 7 | 8 |
| 1129 | 2 | 8 | 10 | 6 | 3 | 8 | 11 | 9 | 9 | 9 | 8 | 3 | 5 | 1 |
| 1130 | 3 | 11 | 5 | 7 | 6 | 1 | 11 | 8 | 9 | 4 | 2 | 3 | 6 | 11 |
| 1131 | 3 | 4 | 8 | 5 | 11 | 3 | 11 | 4 | 2 | 9 | 9 | 9 | 7 | 4 |
| 1132 | 9 | 10 | 6 | 0 | 4 | 8 | 10 | 1 | 9 | 5 | 8 | 5 | 7 | 10 |
| 1133 | 4 | 7 | 2 | 11 | 8 | 9 | 8 | 3 | 8 | 2 | 6 | 7 | 9 | 1 |
| 1134 | 11 | 9 | 0 | 8 | 3 | 2 | 9 | 10 | 1 | 5 | 11 | 11 | 11 | 7 |
| 1135 | 1 | 9 | 9 | 8 | 5 | 4 | 10 | 11 | 4 | 5 | 2 | 4 | 9 | 8 |
| 1136 | 0 | 8 | 9 | 8 | 1 | 10 | 3 | 2 | 5 | 7 | 11 | 2 | 5 | 6 |
| 1137 | 7 | 4 | 10 | 8 | 3 | 10 | 11 | 1 | 2 | 4 | 4 | 5 | 8 | 3 |
| 1138 | 9 | 1 | 3 | 3 | 10 | 6 | 11 | 7 | 11 | 1 | 7 | 9 | 11 | 4 |
| 1139 | 9 | 9 | 8 | 10 | 1 | 6 | 3 | 3 | 11 | 4 | 10 | 5 | 6 | 7 |
| 1140 | 4 | 1 | 5 | 6 | 9 | 9 | 4 | 0 | 5 | 11 | 7 | 2 | 1 | 3 |
| 1141 | 4 | 4 | 3 | 8 | 4 | 11 | 9 | 4 | 4 | 10 | 2 | 7 | 3 | 3 |
| 1142 | 5 | 11 | 3 | 5 | 5 | 10 | 1 | 8 | 10 | 11 | 8 | 5 | 0 | 10 |
| 1143 | 6 | 7 | 4 | 1 | 0 | 10 | 0 | 6 | 4 | 2 | 2 | 10 | 8 | 8 |
| 1144 | 5 | 5 | 0 | 3 | 9 | 6 | 10 | 3 | 9 | 1 | 5 | 8 | 0 | 5 |
| 1145 | 10 | 2 | 7 | 6 | 8 | 10 | 8 | 6 | 5 | 0 | 2 | 3 | 3 | 0 |
| 1146 | 2 | 5 | 1 | 4 | 5 | 1 | 6 | 5 | 9 | 8 | 0 | 5 | 3 | 5 |
| 1147 | 0 | 2 | 7 | 3 | 9 | 7 | 0 | 2 | 7 | 0 | 3 | 7 | 0 | 4 |
| 1148 | 6 | 2 | 4 | 3 | 11 | 5 | 4 | 1 | 9 | 0 | 7 | 11 | 10 | 11 |
| 1149 | 1 | 9 | 6 | 7 | 11 | 10 | 10 | 3 | 1 | 3 | 3 | 7 | 11 | 6 |
| 1150 | 3 | 2 | 2 | 5 | 8 | 7 | 4 | 11 | 5 | 11 | 4 | 6 | 6 | 6 |
| 1151 | 9 | 2 | 7 | 11 | 2 | 0 | 11 | 7 | 10 | 8 | 5 | 7 | 9 | 8 |
| 1152 | 7 | 9 | 11 | 1 | 11 | 8 | 0 | 7 | 7 | 9 | 1 | 0 | 5 | 4 |
| 1153 | 8 | 0 | 0 | 2 | 5 | 0 | 2 | 4 | 10 | 9 | 2 | 8 | 5 | 6 |
| 1154 | 9 | 6 | 1 | 6 | 11 | 6 | 5 | 8 | 0 | 1 | 5 | 11 | 4 | 6 |
| 1155 | 9 | 2 | 4 | 10 | 4 | 8 | 8 | 4 | 10 | 1 | 0 | 8 | 11 | 2 |
| 1156 | 6 | 6 | 9 | 0 | 10 | 0 | 8 | 3 | 11 | 11 | 0 | 4 | 9 | 4 |
| 1157 | 8 | 5 | 0 | 0 | 1 | 10 | 2 | 7 | 6 | 3 | 8 | 6 | 8 | 10 |
| 1158 | 9 | 2 | 7 | 1 | 7 | 1 | 1 | 0 | 4 | 5 | 9 | 1 | 0 | 11 |
| 1159 | 2 | 0 | 4 | 4 | 0 | 10 | 8 | 2 | 0 | 10 | 11 | 1 | 4 | 0 |
| 1160 | 11 | 1 | 2 | 4 | 10 | 9 | 0 | 10 | 0 | 8 | 8 | 1 | 5 | 3 |
| 1161 | 10 | 2 | 9 | 1 | 0 | 6 | 4 | 10 | 2 | 9 | 9 | 5 | 10 | 8 |
| 1162 | 8 | 10 | 5 | 5 | 8 | 5 | 5 | 6 | 3 | 2 | 3 | 8 | 2 | 7 |
| 1163 | 7 | 9 | 4 | 6 | 3 | 11 | 6 | 8 | 4 | 2 | 9 | 4 | 11 | 4 |
| 1164 | 11 | 5 | 0 | 5 | 7 | 10 | 9 | 6 | 9 | 10 | 4 | 9 | 3 | 1 |
| 1165 | 8 | 4 | 6 | 5 | 0 | 5 | 3 | 11 | 2 | 4 | 1 | 3 | 3 | 11 |
| 1166 | 1 | 3 | 4 | 11 | 1 | 7 | 0 | 4 | 8 | 10 | 10 | 10 | 10 | 3 |
| 1167 | 10 | 6 | 11 | 7 | 3 | 10 | 8 | 2 | 1 | 6 | 1 | 9 | 8 | 9 |
| 1168 | 8 | 2 | 11 | 7 | 2 | 7 | 4 | 3 | 3 | 8 | 6 | 2 | 1 | 0 |
| 1169 | 9 | 2 | 6 | 3 | 11 | 1 | 9 | 10 | 5 | 2 | 10 | 2 | 2 | 4 |
| 1170 | 0 | 4 | 11 | 5 | 1 | 8 | 4 | 1 | 0 | 4 | 7 | 9 | 2 | 10 |
| 1171 | 6 | 1 | 8 | 2 | 7 | 9 | 1 | 11 | 7 | 8 | 9 | 10 | 8 | 2 |
| 1172 | 9 | 5 | 7 | 3 | 9 | 8 | 5 | 9 | 10 | 7 | 2 | 10 | 4 | 0 |
| 1173 | 5 | 4 | 3 | 0 | 2 | 7 | 3 | 2 | 9 | 10 | 0 | 4 | 1 | 9 |
| 1174 | 4 | 8 | 0 | 5 | 4 | 1 | 5 | 5 | 7 | 2 | 9 | 7 | 6 | 9 |
| 1175 | 9 | 3 | 2 | 6 | 1 | 10 | 1 | 0 | 1 | 9 | 1 | 8 | 6 | 1 |
| 1176 | 1 | 3 | 8 | 5 | 3 | 6 | 5 | 4 | 1 | 5 | 5 | 5 | 0 | 8 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1177 | 7 | 1 | 0 | 5 | 10 | 2 | 10 | 5 | 3 | 0 | 0 | 1 | 11 | 8 |
| 1178 | 2 | 3 | 7 | 6 | 1 | 6 | 7 | 4 | 6 | 8 | 0 | 11 | 7 | 2 |
| 1179 | 3 | 8 | 2 | 2 | 8 | 5 | 0 | 0 | 4 | 10 | 3 | 0 | 10 | 9 |
| 1180 | 6 | 2 | 1 | 10 | 3 | 5 | 5 | 9 | 5 | 8 | 0 | 10 | 0 | 9 |
| 1181 | 11 | 11 | 6 | 7 | 10 | 8 | 1 | 1 | 11 | 2 | 6 | 1 | 3 | 7 |
| 1182 | 5 | 11 | 0 | 4 | 1 | 9 | 5 | 1 | 4 | 7 | 0 | 5 | 11 | 6 |
| 1183 | 5 | 5 | 4 | 10 | 1 | 1 | 11 | 8 | 0 | 10 | 6 | 7 | 9 | 6 |
| 1184 | 0 | 6 | 4 | 11 | 1 | 11 | 10 | 10 | 2 | 2 | 6 | 11 | 6 | 8 |
| 1185 | 0 | 5 | 0 | 1 | 11 | 11 | 8 | 0 | 10 | 6 | 1 | 2 | 11 | 0 |
| 1186 | 11 | 7 | 10 | 8 | 8 | 7 | 7 | 6 | 8 | 4 | 7 | 6 | 0 | 7 |
| 1187 | 4 | 10 | 2 | 8 | 6 | 0 | 8 | 11 | 0 | 9 | 3 | 11 | 1 | 9 |
| 1188 | 2 | 5 | 0 | 4 | 4 | 3 | 3 | 2 | 10 | 0 | 4 | 3 | 0 | 2 |
| 1189 | 9 | 7 | 8 | 4 | 5 | 0 | 7 | 11 | 6 | 0 | 0 | 0 | 9 | 0 |
| 1190 | 6 | 11 | 2 | 7 | 0 | 8 | 5 | 7 | 2 | 10 | 5 | 2 | 6 | 6 |
| 1191 | 3 | 1 | 10 | 11 | 4 | 7 | 6 | 7 | 10 | 9 | 11 | 11 | 3 | 10 |
| 1192 | 5 | 6 | 7 | 2 | 11 | 9 | 2 | 9 | 3 | 8 | 11 | 2 | 3 | 10 |
| 1193 | 8 | 1 | 11 | 0 | 8 | 0 | 2 | 10 | 3 | 10 | 5 | 4 | 7 | 2 |
| 1194 | 3 | 9 | 7 | 9 | 3 | 6 | 3 | 6 | 1 | 11 | 6 | 1 | 2 | 2 |
| 1195 | 2 | 6 | 10 | 5 | 9 | 11 | 7 | 8 | 7 | 3 | 1 | 5 | 7 | 4 |
| 1196 | 3 | 10 | 7 | 11 | 10 | 8 | 6 | 11 | 3 | 5 | 9 | 10 | 6 | 1 |
| 1197 | 9 | 0 | 10 | 0 | 8 | 5 | 11 | 3 | 2 | 7 | 9 | 4 | 11 | 6 |
| 1198 | 8 | 1 | 3 | 8 | 9 | 2 | 7 | 9 | 2 | 1 | 9 | 2 | 5 | 9 |
| 1199 | 5 | 7 | 7 | 2 | 10 | 5 | 1 | 7 | 1 | 4 | 6 | 0 | 6 | 3 |
| 1200 | 6 | 0 | 8 | 11 | 1 | 11 | 7 | 4 | 7 | 0 | 11 | 7 | 5 | 7 |
| 1201 | 1 | 6 | 6 | 10 | 11 | 5 | 1 | 5 | 10 | 5 | 2 | 5 | 2 | 3 |
| 1202 | 11 | 7 | 3 | 9 | 3 | 1 | 11 | 0 | 6 | 0 | 1 | 7 | 3 | 1 |
| 1203 | 9 | 3 | 5 | 9 | 4 | 3 | 11 | 8 | 3 | 2 | 6 | 5 | 8 | 9 |
| 1204 | 8 | 4 | 11 | 3 | 11 | 11 | 8 | 2 | 7 | 8 | 10 | 5 | 6 | 6 |
| 1205 | 7 | 0 | 2 | 0 | 8 | 4 | 10 | 7 | 6 | 10 | 7 | 5 | 4 | 5 |
| 1206 | 2 | 4 | 10 | 5 | 10 | 0 | 11 | 0 | 8 | 0 | 11 | 10 | 0 | 0 |
| 1207 | 0 | 0 | 11 | 8 | 6 | 2 | 9 | 6 | 8 | 7 | 9 | 7 | 6 | 1 |
| 1208 | 10 | 6 | 4 | 6 | 9 | 1 | 5 | 2 | 6 | 4 | 10 | 1 | 6 | 5 |
| 1209 | 4 | 4 | 5 | 1 | 7 | 5 | 11 | 6 | 0 | 7 | 5 | 3 | 8 | 4 |
| 1210 | 6 | 9 | 7 | 0 | 5 | 0 | 6 | 1 | 0 | 5 | 6 | 6 | 3 | 6 |
| 1211 | 7 | 7 | 10 | 3 | 2 | 7 | 6 | 10 | 3 | 7 | 8 | 9 | 6 | 3 |
| 1212 | 3 | 6 | 5 | 2 | 7 | 2 | 4 | 2 | 11 | 5 | 6 | 0 | 9 | 6 |
| 1213 | 0 | 10 | 6 | 11 | 11 | 5 | 5 | 4 | 4 | 11 | 0 | 0 | 3 | 1 |
| 1214 | 6 | 2 | 6 | 8 | 3 | 10 | 6 | 7 | 0 | 10 | 9 | 7 | 1 | 7 |
| 1215 | 1 | 10 | 9 | 1 | 8 | 1 | 1 | 7 | 7 | 10 | 6 | 8 | 8 | 10 |
| 1216 | 8 | 0 | 7 | 11 | 6 | 5 | 9 | 8 | 2 | 9 | 4 | 10 | 9 | 9 |
| 1217 | 5 | 1 | 9 | 4 | 7 | 8 | 9 | 4 | 1 | 0 | 9 | 4 | 5 | 10 |
| 1218 | 8 | 6 | 11 | 4 | 4 | 10 | 1 | 8 | 4 | 0 | 5 | 6 | 3 | 5 |
| 1219 | 6 | 3 | 4 | 10 | 10 | 1 | 1 | 2 | 7 | 5 | 7 | 3 | 3 | 4 |
| 1220 | 2 | 9 | 5 | 3 | 2 | 4 | 8 | 5 | 1 | 6 | 9 | 11 | 4 | 6 |
| 1221 | 10 | 4 | 9 | 3 | 10 | 1 | 10 | 8 | 9 | 6 | 1 | 2 | 4 | 10 |
| 1222 | 2 | 11 | 4 | 0 | 5 | 5 | 9 | 0 | 5 | 1 | 11 | 9 | 6 | 3 |
| 1223 | 11 | 0 | 11 | 10 | 9 | 7 | 11 | 11 | 9 | 10 | 11 | 11 | 8 | 2 |
| 1224 | 5 | 8 | 3 | 8 | 10 | 5 | 5 | 2 | 8 | 11 | 4 | 11 | 2 | 0 |
| 1225 | 10 | 1 | 0 | 9 | 2 | 9 | 10 | 1 | 0 | 1 | 11 | 7 | 3 | 9 |
| 1226 | 2 | 4 | 2 | 8 | 5 | 11 | 1 | 5 | 11 | 9 | 10 | 3 | 8 | 7 |
| 1227 | 6 | 1 | 10 | 3 | 1 | 3 | 0 | 11 | 11 | 5 | 8 | 3 | 1 | 7 |
| 1228 | 6 | 8 | 7 | 9 | 2 | 4 | 8 | 7 | 6 | 2 | 2 | 9 | 10 | 10 |
| 1229 | 7 | 0 | 11 | 4 | 8 | 9 | 3 | 5 | 5 | 9 | 9 | 9 | 1 | 8 |
| 1230 | 8 | 4 | 5 | 2 | 7 | 11 | 0 | 0 | 8 | 4 | 2 | 4 | 1 | 1 |
| 1231 | 3 | 8 | 1 | 6 | 7 | 7 | 10 | 6 | 1 | 9 | 0 | 5 | 10 | 3 |
| 1232 | 10 | 4 | 5 | 0 | 7 | 3 | 6 | 9 | 4 | 5 | 4 | 5 | 11 | 0 |
| 1233 | 4 | 3 | 7 | 0 | 10 | 3 | 9 | 5 | 8 | 8 | 7 | 9 | 9 | 5 |
| 1234 | 5 | 6 | 3 | 7 | 0 | 7 | 11 | 7 | 1 | 2 | 8 | 10 | 9 | 5 |
| 1235 | 10 | 9 | 10 | 10 | 9 | 6 | 10 | 5 | 8 | 7 | 11 | 9 | 2 | 1 |
| 1236 | 0 | 8 | 8 | 0 | 9 | 8 | 11 | 0 | 1 | 2 | 3 | 9 | 4 | 11 |
| 1237 | 9 | 4 | 3 | 1 | 11 | 3 | 2 | 0 | 6 | 2 | 2 | 3 | 5 | 5 |
| 1238 | 8 | 3 | 0 | 3 | 7 | 6 | 6 | 6 | 7 | 9 | 6 | 2 | 4 | 11 |
| 1239 | 3 | 9 | 0 | 3 | 6 | 1 | 2 | 3 | 0 | 2 | 8 | 5 | 10 | 6 |
| 1240 | 3 | 11 | 1 | 2 | 3 | 11 | 1 | 9 | 9 | 3 | 11 | 9 | 1 | 2 |
| 1241 | 11 | 0 | 8 | 3 | 1 | 2 | 1 | 0 | 0 | 6 | 2 | 4 | 0 | 6 |
| 1242 | 11 | 7 | 9 | 4 | 11 | 4 | 5 | 2 | 11 | 3 | 3 | 5 | 3 | 2 |
| 1243 | 3 | 7 | 1 | 11 | 5 | 2 | 10 | 8 | 7 | 1 | 3 | 3 | 3 | 1 |
| 1244 | 1 | 9 | 11 | 5 | 7 | 3 | 2 | 9 | 8 | 4 | 0 | 3 | 8 | 7 |
| 1245 | 11 | 10 | 6 | 0 | 1 | 0 | 11 | 10 | 11 | 4 | 4 | 3 | 10 | 5 |
| 1246 | 0 | 4 | 10 | 10 | 6 | 10 | 2 | 9 | 11 | 10 | 7 | 0 | 3 | 11 |
| 1247 | 11 | 9 | 3 | 11 | 2 | 3 | 1 | 4 | 5 | 7 | 10 | 9 | 11 | 6 |
| 1248 | 11 | 8 | 5 | 7 | 5 | 11 | 6 | 8 | 8 | 9 | 8 | 6 | 2 | 8 |
| 1249 | 9 | 10 | 3 | 8 | 0 | 3 | 0 | 7 | 4 | 4 | 5 | 1 | 7 | 2 |
| 1250 | 10 | 3 | 5 | 5 | 5 | 9 | 11 | 1 | 6 | 3 | 3 | 2 | 7 | 6 |
| 1251 | 1 | 10 | 2 | 9 | 1 | 11 | 8 | 6 | 10 | 3 | 5 | 7 | 10 | 2 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1252 | 2 | 9 | 9 | 0 | 9 | 4 | 9 | 2 | 9 | 0 | 8 | 2 | 11 | 0 |
| 1253 | 10 | 3 | 5 | 2 | 9 | 8 | 7 | 4 | 4 | 6 | 8 | 0 | 8 | 11 |
| 1254 | 5 | 0 | 3 | 9 | 8 | 11 | 4 | 8 | 4 | 3 | 11 | 10 | 2 | 1 |
| 1255 | 6 | 5 | 10 | 8 | 7 | 4 | 7 | 8 | 6 | 11 | 10 | 0 | 8 | 6 |
| 1256 | 5 | 9 | 0 | 6 | 8 | 3 | 8 | 11 | 6 | 11 | 10 | 7 | 5 | 2 |
| 1257 | 3 | 5 | 6 | 4 | 5 | 4 | 5 | 1 | 6 | 6 | 11 | 1 | 2 | 11 |
| 1258 | 4 | 5 | 1 | 9 | 6 | 2 | 7 | 5 | 1 | 2 | 10 | 8 | 2 | 0 |
| 1259 | 7 | 0 | 6 | 7 | 7 | 7 | 1 | 10 | 9 | 5 | 0 | 2 | 11 | 5 |
| 1260 | 2 | 10 | 7 | 4 | 2 | 7 | 0 | 11 | 6 | 11 | 5 | 5 | 8 | 11 |
| 1261 | 9 | 7 | 10 | 9 | 7 | 1 | 0 | 2 | 1 | 2 | 0 | 9 | 1 | 6 |
| 1262 | 11 | 6 | 10 | 9 | 6 | 5 | 1 | 7 | 6 | 11 | 11 | 2 | 4 | 9 |
| 1263 | 0 | 9 | 6 | 8 | 9 | 3 | 11 | 2 | 8 | 3 | 5 | 6 | 3 | 10 |
| 1264 | 11 | 0 | 0 | 7 | 7 | 4 | 4 | 0 | 2 | 8 | 3 | 6 | 4 | 3 |
| 1265 | 10 | 4 | 2 | 2 | 9 | 4 | 6 | 8 | 3 | 2 | 10 | 6 | 5 | 2 |
| 1266 | 0 | 2 | 3 | 10 | 4 | 9 | 3 | 10 | 6 | 5 | 3 | 10 | 2 | 11 |
| 1267 | 11 | 4 | 7 | 5 | 1 | 7 | 1 | 5 | 4 | 7 | 4 | 8 | 9 | 2 |
| 1268 | 4 | 10 | 5 | 10 | 0 | 2 | 11 | 3 | 6 | 0 | 6 | 4 | 0 | 7 |
| 1269 | 11 | 10 | 10 | 6 | 11 | 4 | 7 | 7 | 9 | 5 | 6 | 11 | 9 | 3 |
| 1270 | 8 | 9 | 7 | 7 | 3 | 9 | 1 | 11 | 8 | 1 | 1 | 4 | 6 | 6 |
| 1271 | 2 | 9 | 2 | 2 | 7 | 8 | 0 | 6 | 11 | 11 | 11 | 7 | 3 | 3 |
| 1272 | 9 | 5 | 9 | 11 | 5 | 2 | 1 | 6 | 5 | 8 | 9 | 8 | 4 | 9 |
| 1273 | 7 | 6 | 9 | 4 | 2 | 5 | 6 | 9 | 7 | 1 | 10 | 6 | 2 | 6 |
| 1274 | 11 | 2 | 3 | 8 | 11 | 6 | 1 | 8 | 7 | 0 | 11 | 1 | 9 | 8 |
| 1275 | 5 | 7 | 9 | 1 | 8 | 2 | 9 | 1 | 2 | 11 | 8 | 3 | 2 | 6 |
| 1276 | 7 | 8 | 11 | 5 | 5 | 3 | 3 | 3 | 2 | 5 | 2 | 11 | 5 | 2 |
| 1277 | 9 | 7 | 3 | 9 | 10 | 9 | 10 | 11 | 10 | 3 | 10 | 8 | 0 | 11 |
| 1278 | 3 | 6 | 3 | 6 | 10 | 7 | 5 | 1 | 5 | 3 | 9 | 7 | 8 | 8 |
| 1279 | 11 | 8 | 3 | 6 | 3 | 0 | 3 | 2 | 0 | 8 | 10 | 0 | 7 | 10 |
| 1280 | 2 | 9 | 1 | 11 | 4 | 6 | 1 | 3 | 0 | 9 | 0 | 7 | 3 | 0 |
| 1281 | 5 | 11 | 9 | 5 | 5 | 2 | 11 | 10 | 11 | 7 | 2 | 1 | 4 | 4 |
| 1282 | 1 | 6 | 0 | 6 | 2 | 9 | 5 | 8 | 10 | 2 | 6 | 9 | 9 | 2 |
| 1283 | 4 | 4 | 6 | 7 | 9 | 3 | 3 | 6 | 2 | 10 | 10 | 10 | 10 | 5 |
| 1284 | 9 | 11 | 7 | 2 | 0 | 4 | 6 | 9 | 7 | 10 | 9 | 11 | 6 | 3 |
| 1285 | 8 | 1 | 4 | 1 | 6 | 5 | 5 | 7 | 1 | 9 | 2 | 5 | 7 | 5 |
| 1286 | 11 | 8 | 5 | 0 | 0 | 2 | 7 | 0 | 5 | 5 | 0 | 4 | 9 | 10 |
| 1287 | 10 | 7 | 2 | 10 | 9 | 11 | 0 | 4 | 5 | 7 | 7 | 2 | 7 | 7 |
| 1288 | 8 | 6 | 9 | 7 | 11 | 0 | 4 | 2 | 3 | 11 | 9 | 0 | 5 | 11 |
| 1289 | 0 | 5 | 11 | 6 | 1 | 7 | 7 | 3 | 6 | 6 | 1 | 10 | 5 | 9 |
| 1290 | 3 | 0 | 1 | 10 | 8 | 9 | 11 | 6 | 1 | 1 | 4 | 0 | 8 | 10 |
| 1291 | 11 | 1 | 1 | 1 | 7 | 6 | 8 | 2 | 11 | 2 | 5 | 1 | 1 | 10 |
| 1292 | 9 | 9 | 10 | 4 | 10 | 6 | 5 | 11 | 9 | 0 | 4 | 2 | 1 | 8 |
| 1293 | 9 | 5 | 5 | 7 | 0 | 5 | 10 | 10 | 11 | 4 | 4 | 7 | 2 | 11 |
| 1294 | 0 | 5 | 2 | 9 | 3 | 11 | 3 | 0 | 11 | 8 | 3 | 8 | 10 | 10 |
| 1295 | 3 | 2 | 4 | 2 | 7 | 7 | 9 | 1 | 0 | 11 | 10 | 1 | 4 | 11 |
| 1296 | 8 | 9 | 8 | 9 | 4 | 1 | 8 | 6 | 5 | 5 | 6 | 10 | 0 | 3 |
| 1297 | 5 | 10 | 10 | 1 | 11 | 0 | 11 | 4 | 1 | 8 | 10 | 7 | 11 | 2 |
| 1298 | 4 | 10 | 8 | 6 | 3 | 4 | 6 | 8 | 2 | 9 | 5 | 7 | 8 | 11 |
| 1299 | 2 | 3 | 6 | 9 | 1 | 10 | 9 | 2 | 4 | 3 | 4 | 4 | 11 | 11 |
| 1300 | 11 | 6 | 5 | 4 | 4 | 11 | 5 | 4 | 7 | 11 | 2 | 10 | 11 | 4 |
| 1301 | 7 | 6 | 3 | 3 | 5 | 8 | 1 | 7 | 9 | 1 | 11 | 7 | 9 | 6 |
| 1302 | 11 | 5 | 4 | 8 | 1 | 9 | 9 | 11 | 7 | 9 | 5 | 2 | 0 | 2 |
| 1303 | 10 | 7 | 8 | 3 | 10 | 6 | 9 | 3 | 10 | 1 | 10 | 11 | 10 | 10 |
| 1304 | 1 | 1 | 10 | 10 | 8 | 11 | 6 | 7 | 8 | 6 | 9 | 10 | 9 | 1 |
| 1305 | 1 | 10 | 0 | 8 | 3 | 8 | 7 | 5 | 5 | 11 | 8 | 1 | 7 | 3 |
| 1306 | 9 | 0 | 9 | 9 | 4 | 2 | 3 | 8 | 0 | 6 | 9 | 6 | 1 | 2 |
| 1307 | 7 | 1 | 8 | 11 | 5 | 10 | 3 | 9 | 3 | 11 | 8 | 11 | 1 | 1 |
| 1308 | 6 | 3 | 9 | 6 | 7 | 7 | 2 | 11 | 2 | 8 | 6 | 3 | 1 | 1 |
| 1309 | 6 | 2 | 11 | 5 | 7 | 2 | 5 | 5 | 9 | 3 | 9 | 4 | 3 | 7 |
| 1310 | 6 | 10 | 9 | 1 | 4 | 4 | 4 | 0 | 5 | 2 | 11 | 11 | 4 | 6 |
| 1311 | 2 | 5 | 9 | 8 | 9 | 6 | 11 | 5 | 3 | 3 | 11 | 5 | 8 | 8 |
| 1312 | 0 | 6 | 0 | 0 | 5 | 0 | 8 | 11 | 5 | 3 | 10 | 5 | 2 | 0 |
| 1313 | 8 | 4 | 2 | 11 | 6 | 0 | 2 | 5 | 10 | 7 | 1 | 6 | 4 | 0 |
| 1314 | 8 | 0 | 3 | 4 | 10 | 4 | 6 | 10 | 5 | 4 | 10 | 6 | 3 | 7 |
| 1315 | 0 | 1 | 7 | 9 | 11 | 1 | 4 | 4 | 2 | 4 | 7 | 5 | 1 | 6 |
| 1316 | 2 | 9 | 4 | 2 | 5 | 4 | 5 | 4 | 2 | 7 | 1 | 0 | 10 | 10 |
| 1317 | 2 | 8 | 6 | 5 | 6 | 3 | 8 | 4 | 10 | 11 | 9 | 5 | 9 | 11 |
| 1318 | 0 | 0 | 4 | 8 | 4 | 5 | 10 | 5 | 0 | 3 | 1 | 11 | 9 | 9 |
| 1319 | 4 | 8 | 2 | 5 | 1 | 4 | 6 | 3 | 1 | 7 | 3 | 6 | 0 | 4 |
| 1320 | 5 | 0 | 6 | 11 | 8 | 1 | 1 | 9 | 10 | 6 | 1 | 0 | 9 | 6 |
| 1321 | 9 | 6 | 7 | 10 | 10 | 8 | 7 | 3 | 1 | 2 | 3 | 8 | 8 | 6 |
| 1322 | 1 | 3 | 5 | 7 | 9 | 1 | 4 | 9 | 2 | 9 | 4 | 1 | 3 | 2 |
| 1323 | 10 | 4 | 3 | 0 | 3 | 9 | 3 | 10 | 7 | 3 | 9 | 9 | 9 | 5 |
| 1324 | 4 | 1 | 5 | 6 | 2 | 3 | 10 | 7 | 3 | 5 | 3 | 5 | 6 | 2 |
| 1325 | 7 | 1 | 7 | 8 | 0 | 6 | 1 | 0 | 11 | 0 | 2 | 5 | 0 | 2 |
| 1326 | 5 | 2 | 6 | 10 | 8 | 5 | 6 | 2 | 7 | 3 | 7 | 2 | 4 | 3 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1327 | 7 | 0 | 8 | 9 | 8 | 5 | 8 | 1 | 3 | 3 | 10 | 4 | 3 | 10 |
| 1328 | 5 | 2 | 5 | 6 | 1 | 4 | 4 | 2 | 8 | 6 | 6 | 1 | 8 | 10 |
| 1329 | 7 | 4 | 4 | 11 | 10 | 6 | 6 | 4 | 5 | 11 | 2 | 9 | 9 | 0 |
| 1330 | 0 | 2 | 8 | 10 | 11 | 1 | 5 | 7 | 10 | 7 | 10 | 8 | 9 | 9 |
| 1331 | 0 | 3 | 1 | 10 | 1 | 0 | 0 | 10 | 1 | 6 | 8 | 3 | 0 | 0 |
| 1332 | 2 | 0 | 7 | 5 | 1 | 7 | 4 | 9 | 6 | 0 | 9 | 4 | 10 | 10 |
| 1333 | 1 | 8 | 10 | 6 | 7 | 1 | 9 | 1 | 10 | 4 | 4 | 11 | 11 | 6 |
| 1334 | 9 | 2 | 6 | 2 | 9 | 5 | 2 | 10 | 1 | 1 | 3 | 0 | 7 | 0 |
| 1335 | 3 | 3 | 0 | 3 | 8 | 8 | 1 | 4 | 5 | 2 | 4 | 11 | 0 | 11 |
| 1336 | 5 | 3 | 2 | 11 | 11 | 5 | 9 | 8 | 9 | 7 | 6 | 2 | 10 | 5 |
| 1337 | 5 | 8 | 11 | 0 | 5 | 6 | 11 | 7 | 0 | 4 | 7 | 4 | 10 | 11 |
| 1338 | 6 | 0 | 1 | 11 | 7 | 3 | 4 | 3 | 10 | 8 | 7 | 9 | 11 | 10 |
| 1339 | 2 | 7 | 9 | 0 | 6 | 8 | 10 | 3 | 9 | 8 | 11 | 1 | 3 | 4 |
| 1340 | 0 | 11 | 0 | 2 | 2 | 7 | 3 | 2 | 6 | 4 | 6 | 0 | 3 | 1 |
| 1341 | 7 | 8 | 0 | 2 | 3 | 7 | 1 | 3 | 8 | 8 | 10 | 11 | 2 | 4 |
| 1342 | 10 | 1 | 10 | 7 | 2 | 10 | 7 | 11 | 11 | 6 | 11 | 5 | 10 | 10 |
| 1343 | 1 | 11 | 8 | 6 | 2 | 8 | 1 | 3 | 6 | 8 | 9 | 4 | 1 | 6 |
| 1344 | 4 | 3 | 11 | 9 | 10 | 0 | 1 | 1 | 8 | 2 | 2 | 10 | 2 | 9 |
| 1345 | 8 | 3 | 11 | 1 | 0 | 5 | 0 | 11 | 7 | 5 | 10 | 1 | 11 | 8 |
| 1346 | 6 | 10 | 11 | 8 | 7 | 5 | 11 | 3 | 11 | 5 | 0 | 10 | 2 | 5 |
| 1347 | 9 | 4 | 3 | 2 | 4 | 1 | 11 | 10 | 9 | 8 | 1 | 11 | 10 | 6 |
| 1348 | 4 | 0 | 5 | 2 | 11 | 8 | 9 | 10 | 0 | 4 | 3 | 9 | 5 | 3 |
| 1349 | 9 | 9 | 0 | 11 | 11 | 2 | 11 | 3 | 5 | 1 | 5 | 3 | 7 | 4 |
| 1350 | 3 | 4 | 8 | 8 | 2 | 9 | 4 | 10 | 10 | 5 | 0 | 6 | 8 | 6 |
| 1351 | 10 | 8 | 11 | 7 | 9 | 6 | 3 | 11 | 4 | 1 | 3 | 6 | 6 | 1 |
| 1352 | 7 | 10 | 0 | 6 | 10 | 4 | 9 | 4 | 3 | 1 | 3 | 8 | 4 | 9 |
| 1353 | 7 | 4 | 1 | 0 | 9 | 9 | 4 | 4 | 6 | 1 | 11 | 2 | 6 | 11 |
| 1354 | 6 | 6 | 5 | 9 | 3 | 0 | 0 | 5 | 0 | 0 | 2 | 0 | 10 | 0 |
| 1355 | 9 | 11 | 4 | 5 | 2 | 7 | 0 | 8 | 1 | 8 | 1 | 6 | 11 | 8 |
| 1356 | 8 | 7 | 10 | 6 | 6 | 11 | 7 | 10 | 5 | 9 | 6 | 0 | 10 | 11 |
| 1357 | 2 | 3 | 6 | 5 | 0 | 9 | 11 | 0 | 1 | 7 | 5 | 8 | 10 | 7 |
| 1358 | 6 | 11 | 1 | 1 | 5 | 9 | 6 | 2 | 3 | 10 | 4 | 8 | 10 | 6 |
| 1359 | 5 | 4 | 9 | 11 | 8 | 10 | 0 | 2 | 3 | 4 | 0 | 1 | 2 | 0 |
| 1360 | 8 | 8 | 2 | 7 | 7 | 11 | 8 | 8 | 5 | 1 | 4 | 7 | 5 | 5 |
| 1361 | 11 | 0 | 11 | 0 | 4 | 11 | 2 | 1 | 0 | 8 | 3 | 1 | 8 | 6 |
| 1362 | 11 | 10 | 7 | 9 | 7 | 9 | 3 | 2 | 2 | 6 | 6 | 10 | 5 | 8 |
| 1363 | 3 | 5 | 9 | 9 | 10 | 8 | 1 | 2 | 1 | 11 | 10 | 2 | 11 | 10 |
| 1364 | 9 | 1 | 10 | 4 | 11 | 4 | 2 | 5 | 10 | 11 | 7 | 11 | 8 | 5 |
| 1365 | 7 | 11 | 7 | 6 | 3 | 3 | 1 | 2 | 2 | 2 | 7 | 3 | 4 | 10 |
| 1366 | 2 | 10 | 5 | 7 | 5 | 10 | 6 | 6 | 11 | 8 | 7 | 3 | 6 | 3 |
| 1367 | 6 | 10 | 7 | 10 | 3 | 0 | 10 | 0 | 8 | 7 | 1 | 8 | 5 | 5 |
| 1368 | 11 | 3 | 10 | 10 | 4 | 4 | 8 | 11 | 9 | 4 | 5 | 5 | 3 | 5 |
| 1369 | 10 | 8 | 4 | 2 | 3 | 3 | 6 | 11 | 11 | 4 | 8 | 4 | 0 | 3 |
| 1370 | 6 | 4 | 11 | 7 | 8 | 7 | 3 | 10 | 1 | 8 | 11 | 8 | 7 | 3 |
| 1371 | 7 | 2 | 5 | 0 | 7 | 3 | 5 | 6 | 10 | 0 | 8 | 6 | 6 | 4 |
| 1372 | 2 | 10 | 2 | 4 | 11 | 11 | 3 | 11 | 7 | 2 | 1 | 11 | 0 | 0 |
| 1373 | 1 | 7 | 11 | 3 | 1 | 5 | 10 | 7 | 7 | 10 | 9 | 0 | 4 | 0 |
| 1374 | 3 | 11 | 0 | 4 | 2 | 10 | 6 | 0 | 9 | 6 | 10 | 9 | 6 | 5 |
| 1375 | 9 | 5 | 0 | 9 | 1 | 7 | 8 | 6 | 7 | 2 | 8 | 8 | 6 | 8 |
| 1376 | 10 | 5 | 4 | 1 | 11 | 10 | 1 | 7 | 0 | 8 | 0 | 9 | 1 | 11 |
| 1377 | 10 | 8 | 10 | 9 | 1 | 5 | 2 | 7 | 5 | 2 | 6 | 3 | 8 | 7 |
| 1378 | 5 | 3 | 2 | 0 | 5 | 11 | 8 | 0 | 2 | 10 | 9 | 9 | 4 | 7 |
| 1379 | 6 | 10 | 7 | 2 | 0 | 5 | 7 | 1 | 0 | 9 | 11 | 9 | 1 | 4 |
| 1380 | 5 | 10 | 1 | 4 | 9 | 0 | 9 | 7 | 6 | 3 | 8 | 0 | 2 | 5 |
| 1381 | 0 | 4 | 8 | 7 | 3 | 5 | 8 | 7 | 9 | 1 | 9 | 2 | 8 | 4 |
| 1382 | 6 | 7 | 10 | 3 | 3 | 1 | 2 | 3 | 4 | 5 | 5 | 7 | 6 | 2 |
| 1383 | 7 | 11 | 6 | 2 | 7 | 0 | 8 | 9 | 9 | 7 | 5 | 10 | 7 | 6 |
| 1384 | 2 | 4 | 11 | 11 | 3 | 8 | 6 | 1 | 6 | 2 | 11 | 6 | 10 | 5 |
| 1385 | 8 | 5 | 0 | 11 | 5 | 1 | 5 | 6 | 9 | 3 | 3 | 1 | 11 | 4 |
| 1386 | 11 | 4 | 3 | 5 | 0 | 1 | 5 | 1 | 8 | 1 | 2 | 7 | 5 | 0 |
| 1387 | 2 | 7 | 2 | 3 | 1 | 10 | 11 | 8 | 9 | 11 | 5 | 10 | 8 | 1 |
| 1388 | 0 | 9 | 3 | 7 | 0 | 0 | 7 | 4 | 11 | 9 | 6 | 10 | 11 | 1 |
| 1389 | 3 | 10 | 11 | 6 | 4 | 2 | 6 | 10 | 11 | 1 | 9 | 2 | 0 | 10 |
| 1390 | 10 | 6 | 8 | 1 | 9 | 8 | 2 | 9 | 7 | 5 | 9 | 8 | 3 | 1 |
| 1391 | 5 | 11 | 4 | 3 | 3 | 2 | 7 | 11 | 3 | 11 | 10 | 10 | 2 | 9 |
| 1392 | 9 | 6 | 7 | 3 | 1 | 6 | 9 | 6 | 5 | 6 | 2 | 1 | 7 | 1 |
| 1393 | 11 | 5 | 1 | 10 | 7 | 4 | 2 | 10 | 3 | 3 | 7 | 10 | 10 | 7 |
| 1394 | 1 | 5 | 1 | 2 | 2 | 10 | 10 | 5 | 4 | 0 | 7 | 2 | 3 | 3 |
| 1395 | 9 | 7 | 4 | 7 | 6 | 0 | 11 | 1 | 9 | 6 | 0 | 4 | 1 | 3 |
| 1396 | 3 | 8 | 11 | 11 | 8 | 2 | 8 | 0 | 9 | 0 | 1 | 3 | 4 | 3 |
| 1397 | 3 | 5 | 4 | 2 | 6 | 5 | 3 | 6 | 6 | 6 | 5 | 6 | 10 | 0 |
| 1398 | 7 | 0 | 2 | 3 | 5 | 1 | 11 | 4 | 1 | 0 | 1 | 9 | 5 | 11 |
| 1399 | 10 | 6 | 6 | 4 | 10 | 1 | 2 | 0 | 1 | 9 | 11 | 4 | 9 | 5 |
| 1400 | 2 | 2 | 10 | 6 | 5 | 4 | 8 | 10 | 1 | 2 | 4 | 4 | 9 | 7 |
| 1401 | 0 | 11 | 2 | 10 | 9 | 10 | 4 | 10 | 3 | 2 | 3 | 1 | 11 | 1 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1402 | 4 | 2 | 9 | 5 | 9 | 9 | 3 | 1 | 9 | 5 | 8 | 8 | 9 | 8 |
| 1403 | 4 | 9 | 4 | 7 | 5 | 3 | 11 | 7 | 7 | 9 | 11 | 6 | 8 | 0 |
| 1404 | 5 | 8 | 8 | 9 | 5 | 7 | 9 | 0 | 4 | 6 | 0 | 11 | 3 | 5 |
| 1405 | 6 | 3 | 6 | 6 | 11 | 8 | 11 | 10 | 3 | 5 | 9 | 11 | 8 | 4 |
| 1406 | 9 | 4 | 6 | 5 | 10 | 3 | 10 | 3 | 4 | 3 | 5 | 9 | 1 | 9 |
| 1407 | 11 | 1 | 3 | 9 | 2 | 0 | 2 | 6 | 8 | 3 | 3 | 0 | 0 | 1 |
| 1408 | 5 | 8 | 9 | 4 | 9 | 3 | 7 | 10 | 0 | 1 | 6 | 9 | 3 | 9 |
| 1409 | 10 | 5 | 7 | 5 | 6 | 7 | 2 | 6 | 11 | 11 | 0 | 0 | 8 | 3 |
| 1410 | 0 | 11 | 5 | 10 | 8 | 6 | 8 | 3 | 2 | 9 | 6 | 6 | 7 | 4 |
| 1411 | 8 | 8 | 7 | 9 | 10 | 9 | 6 | 4 | 10 | 9 | 0 | 7 | 7 | 1 |
| 1412 | 3 | 3 | 7 | 11 | 6 | 11 | 11 | 10 | 2 | 11 | 10 | 3 | 5 | 2 |
| 1413 | 7 | 5 | 0 | 10 | 11 | 10 | 10 | 9 | 5 | 10 | 1 | 5 | 9 | 8 |
| 1414 | 7 | 3 | 1 | 1 | 8 | 3 | 10 | 7 | 7 | 7 | 2 | 4 | 9 | 11 |
| 1415 | 3 | 2 | 11 | 1 | 2 | 1 | 3 | 6 | 2 | 2 | 7 | 2 | 11 | 1 |
| 1416 | 10 | 9 | 11 | 9 | 0 | 11 | 4 | 10 | 8 | 0 | 0 | 4 | 5 | 1 |
| 1417 | 10 | 11 | 6 | 1 | 0 | 0 | 11 | 5 | 8 | 4 | 6 | 6 | 8 | 11 |
| 1418 | 5 | 0 | 1 | 1 | 9 | 7 | 3 | 0 | 7 | 9 | 3 | 2 | 5 | 0 |
| 1419 | 10 | 11 | 1 | 11 | 1 | 6 | 10 | 8 | 8 | 6 | 5 | 5 | 5 | 8 |
| 1420 | 6 | 0 | 5 | 2 | 6 | 3 | 1 | 4 | 4 | 7 | 2 | 1 | 3 | 1 |
| 1421 | 3 | 11 | 2 | 4 | 0 | 2 | 0 | 9 | 1 | 11 | 0 | 7 | 10 | 1 |
| 1422 | 11 | 0 | 0 | 3 | 6 | 8 | 10 | 5 | 6 | 5 | 7 | 7 | 1 | 8 |
| 1423 | 11 | 9 | 11 | 8 | 2 | 5 | 1 | 11 | 1 | 3 | 8 | 3 | 8 | 4 |
| 1424 | 6 | 3 | 0 | 8 | 10 | 10 | 5 | 3 | 3 | 6 | 11 | 6 | 9 | 7 |
| 1425 | 8 | 11 | 11 | 6 | 3 | 0 | 11 | 8 | 0 | 6 | 8 | 9 | 11 | 6 |
| 1426 | 7 | 8 | 10 | 10 | 6 | 6 | 11 | 8 | 8 | 9 | 0 | 2 | 0 | 10 |
| 1427 | 0 | 10 | 2 | 3 | 3 | 7 | 4 | 2 | 10 | 1 | 0 | 4 | 6 | 8 |
| 1428 | 3 | 11 | 9 | 8 | 6 | 3 | 6 | 4 | 7 | 1 | 4 | 4 | 1 | 8 |
| 1429 | 1 | 2 | 11 | 5 | 3 | 9 | 1 | 11 | 5 | 7 | 11 | 7 | 2 | 10 |
| 1430 | 4 | 2 | 6 | 11 | 1 | 0 | 0 | 11 | 6 | 8 | 2 | 6 | 3 | 1 |
| 1431 | 1 | 6 | 7 | 7 | 6 | 4 | 0 | 11 | 1 | 7 | 0 | 5 | 5 | 8 |
| 1432 | 10 | 9 | 4 | 11 | 10 | 9 | 10 | 2 | 10 | 5 | 3 | 0 | 1 | 7 |
| 1433 | 11 | 2 | 2 | 10 | 8 | 9 | 3 | 9 | 4 | 0 | 11 | 6 | 10 | 2 |
| 1434 | 8 | 6 | 5 | 1 | 2 | 5 | 4 | 1 | 8 | 1 | 5 | 2 | 10 | 3 |
| 1435 | 11 | 10 | 4 | 7 | 8 | 8 | 3 | 3 | 8 | 5 | 1 | 0 | 4 | 9 |
| 1436 | 6 | 9 | 8 | 3 | 10 | 11 | 11 | 4 | 9 | 4 | 8 | 4 | 7 | 2 |
| 1437 | 9 | 1 | 0 | 5 | 7 | 7 | 6 | 9 | 5 | 5 | 11 | 9 | 8 | 11 |
| 1438 | 8 | 1 | 9 | 0 | 4 | 7 | 1 | 5 | 3 | 8 | 4 | 10 | 10 | 10 |
| 1439 | 6 | 0 | 4 | 7 | 9 | 5 | 11 | 4 | 10 | 2 | 6 | 2 | 0 | 8 |
| 1440 | 0 | 11 | 1 | 0 | 9 | 8 | 8 | 5 | 4 | 5 | 2 | 11 | 5 | 10 |
| 1441 | 1 | 4 | 2 | 9 | 3 | 10 | 9 | 5 | 3 | 5 | 5 | 3 | 5 | 5 |
| 1442 | 1 | 8 | 1 | 11 | 3 | 0 | 9 | 6 | 11 | 10 | 7 | 8 | 7 | 7 |
| 1443 | 11 | 1 | 1 | 7 | 9 | 7 | 5 | 5 | 2 | 6 | 7 | 9 | 9 | 9 |
| 1444 | 10 | 7 | 1 | 2 | 1 | 10 | 2 | 9 | 0 | 1 | 2 | 1 | 9 | 9 |
| 1445 | 7 | 9 | 4 | 5 | 9 | 0 | 8 | 1 | 7 | 10 | 6 | 9 | 2 | 4 |
| 1446 | 10 | 9 | 5 | 6 | 6 | 6 | 9 | 0 | 11 | 8 | 8 | 6 | 11 | 5 |
| 1447 | 8 | 10 | 1 | 1 | 10 | 1 | 5 | 4 | 6 | 11 | 7 | 4 | 8 | 7 |
| 1448 | 0 | 11 | 6 | 1 | 5 | 3 | 4 | 9 | 5 | 9 | 8 | 9 | 5 | 8 |
| 1449 | 8 | 8 | 7 | 3 | 11 | 5 | 0 | 2 | 4 | 7 | 8 | 11 | 8 | 2 |
| 1450 | 1 | 4 | 3 | 4 | 6 | 2 | 8 | 7 | 10 | 8 | 3 | 10 | 2 | 10 |
| 1451 | 5 | 10 | 3 | 5 | 7 | 8 | 8 | 4 | 11 | 4 | 3 | 2 | 6 | 8 |
| 1452 | 4 | 6 | 2 | 11 | 5 | 3 | 1 | 5 | 2 | 6 | 0 | 2 | 5 | 4 |
| 1453 | 4 | 0 | 0 | 7 | 0 | 11 | 0 | 2 | 5 | 9 | 1 | 4 | 4 | 6 |
| 1454 | 7 | 9 | 9 | 0 | 2 | 10 | 5 | 1 | 2 | 5 | 9 | 10 | 1 | 5 |
| 1455 | 7 | 6 | 1 | 7 | 0 | 4 | 11 | 6 | 8 | 0 | 7 | 11 | 1 | 6 |
| 1456 | 3 | 2 | 4 | 3 | 6 | 6 | 8 | 9 | 5 | 7 | 1 | 2 | 6 | 9 |
| 1457 | 2 | 10 | 3 | 1 | 9 | 9 | 10 | 6 | 8 | 10 | 11 | 4 | 11 | 0 |
| 1458 | 3 | 1 | 8 | 1 | 9 | 3 | 1 | 8 | 10 | 8 | 6 | 0 | 7 | 3 |
| 1459 | 8 | 4 | 10 | 1 | 1 | 0 | 1 | 10 | 4 | 11 | 3 | 11 | 1 | 3 |
| 1460 | 6 | 1 | 5 | 7 | 2 | 5 | 2 | 0 | 4 | 10 | 1 | 10 | 4 | 4 |
| 1461 | 4 | 5 | 3 | 4 | 8 | 6 | 2 | 0 | 11 | 5 | 7 | 1 | 4 | 8 |
| 1462 | 4 | 11 | 6 | 5 | 3 | 11 | 0 | 6 | 10 | 3 | 6 | 11 | 2 | 0 |
| 1463 | 9 | 2 | 2 | 3 | 2 | 3 | 3 | 0 | 9 | 7 | 4 | 5 | 5 | 6 |
| 1464 | 6 | 7 | 0 | 9 | 0 | 7 | 10 | 10 | 6 | 1 | 10 | 3 | 9 | 0 |
| 1465 | 4 | 1 | 8 | 5 | 11 | 6 | 11 | 3 | 4 | 8 | 0 | 8 | 5 | 1 |
| 1466 | 11 | 9 | 9 | 3 | 5 | 7 | 6 | 0 | 6 | 1 | 1 | 1 | 0 | 7 |
| 1467 | 6 | 0 | 3 | 5 | 10 | 11 | 3 | 0 | 1 | 10 | 7 | 11 | 8 | 1 |
| 1468 | 1 | 9 | 9 | 11 | 3 | 2 | 0 | 4 | 4 | 3 | 8 | 6 | 5 | 6 |
| 1469 | 4 | 5 | 8 | 2 | 8 | 9 | 4 | 5 | 0 | 1 | 1 | 4 | 0 | 4 |
| 1470 | 8 | 9 | 6 | 0 | 0 | 3 | 2 | 3 | 11 | 7 | 9 | 3 | 5 | 2 |
| 1471 | 11 | 4 | 10 | 0 | 3 | 7 | 10 | 0 | 0 | 11 | 7 | 5 | 6 | 0 |
| 1472 | 9 | 7 | 1 | 5 | 10 | 5 | 9 | 11 | 11 | 11 | 3 | 5 | 11 | 1 |
| 1473 | 2 | 3 | 0 | 7 | 3 | 6 | 4 | 10 | 3 | 10 | 6 | 7 | 0 | 5 |
| 1474 | 10 | 10 | 7 | 11 | 9 | 9 | 9 | 10 | 5 | 4 | 1 | 5 | 0 | 11 |
| 1475 | 1 | 1 | 2 | 8 | 6 | 8 | 10 | 2 | 4 | 3 | 0 | 10 | 0 | 7 |
| 1476 | 2 | 4 | 7 | 8 | 8 | 9 | 0 | 3 | 5 | 3 | 3 | 10 | 11 | 3 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1477 | 4 | 1 | 5 | 4 | 0 | 8 | 1 | 8 | 9 | 6 | 7 | 8 | 11 | 7 |
| 1478 | 8 | 10 | 11 | 0 | 8 | 10 | 0 | 0 | 1 | 11 | 8 | 2 | 9 | 9 |
| 1479 | 2 | 0 | 10 | 7 | 4 | 0 | 10 | 3 | 7 | 5 | 10 | 4 | 8 | 1 |
| 1480 | 10 | 2 | 3 | 8 | 3 | 4 | 5 | 3 | 4 | 9 | 7 | 3 | 0 | 6 |
| 1481 | 2 | 2 | 4 | 1 | 1 | 3 | 2 | 5 | 2 | 0 | 2 | 11 | 0 | 6 |
| 1482 | 1 | 1 | 8 | 2 | 0 | 7 | 3 | 4 | 0 | 0 | 4 | 6 | 2 | 7 |
| 1483 | 5 | 5 | 11 | 0 | 0 | 0 | 9 | 3 | 10 | 9 | 3 | 7 | 6 | 3 |
| 1484 | 4 | 3 | 8 | 4 | 7 | 10 | 10 | 7 | 5 | 0 | 6 | 9 | 5 | 4 |
| 1485 | 7 | 3 | 2 | 8 | 4 | 2 | 11 | 1 | 5 | 5 | 3 | 6 | 4 | 8 |
| 1486 | 5 | 3 | 5 | 2 | 7 | 0 | 5 | 2 | 0 | 10 | 7 | 3 | 2 | 8 |
| 1487 | 10 | 10 | 5 | 3 | 0 | 7 | 3 | 11 | 11 | 10 | 2 | 2 | 3 | 4 |
| 1488 | 3 | 8 | 7 | 4 | 1 | 1 | 8 | 5 | 8 | 9 | 9 | 6 | 3 | 0 |
| 1489 | 3 | 4 | 6 | 1 | 5 | 11 | 2 | 8 | 9 | 3 | 0 | 2 | 3 | 11 |
| 1490 | 9 | 9 | 3 | 9 | 8 | 9 | 5 | 7 | 0 | 8 | 2 | 3 | 3 | 3 |
| 1491 | 6 | 2 | 7 | 5 | 11 | 10 | 6 | 11 | 6 | 2 | 8 | 10 | 11 | 4 |
| 1492 | 11 | 9 | 8 | 5 | 2 | 10 | 3 | 7 | 8 | 8 | 7 | 1 | 9 | 10 |
| 1493 | 8 | 1 | 3 | 5 | 11 | 8 | 6 | 6 | 2 | 10 | 4 | 7 | 2 | 2 |
| 1494 | 4 | 8 | 4 | 7 | 0 | 1 | 7 | 5 | 6 | 10 | 7 | 5 | 2 | 3 |
| 1495 | 1 | 6 | 4 | 3 | 0 | 3 | 4 | 9 | 4 | 8 | 10 | 5 | 7 | 11 |
| 1496 | 1 | 2 | 9 | 6 | 10 | 6 | 3 | 0 | 2 | 3 | 5 | 10 | 7 | 10 |
| 1497 | 2 | 3 | 2 | 1 | 8 | 2 | 5 | 10 | 0 | 0 | 8 | 8 | 1 | 1 |
| 1498 | 0 | 2 | 10 | 1 | 4 | 5 | 0 | 6 | 8 | 4 | 9 | 9 | 2 | 6 |
| 1499 | 9 | 6 | 5 | 11 | 7 | 11 | 7 | 7 | 6 | 7 | 8 | 1 | 9 | 2 |
| 1500 | 8 | 7 | 8 | 10 | 7 | 2 | 5 | 9 | 2 | 6 | 1 | 3 | 8 | 5 |
| 1501 | 10 | 11 | 9 | 5 | 8 | 0 | 0 | 11 | 0 | 1 | 9 | 7 | 7 | 3 |
| 1502 | 8 | 2 | 6 | 4 | 3 | 7 | 9 | 7 | 2 | 5 | 1 | 9 | 7 | 2 |
| 1503 | 7 | 4 | 9 | 0 | 0 | 2 | 3 | 7 | 1 | 0 | 5 | 0 | 8 | 9 |
| 1504 | 6 | 2 | 1 | 9 | 6 | 7 | 5 | 8 | 7 | 4 | 2 | 7 | 8 | 6 |
| 1505 | 10 | 3 | 4 | 3 | 1 | 11 | 4 | 6 | 0 | 7 | 11 | 6 | 2 | 2 |
| 1506 | 2 | 1 | 6 | 0 | 6 | 7 | 4 | 10 | 0 | 3 | 10 | 2 | 7 | 9 |
| 1507 | 0 | 8 | 0 | 6 | 7 | 11 | 10 | 4 | 4 | 5 | 1 | 0 | 7 | 4 |
| 1508 | 5 | 5 | 8 | 10 | 6 | 8 | 0 | 7 | 8 | 2 | 4 | 9 | 7 | 3 |
| 1509 | 2 | 11 | 5 | 3 | 8 | 4 | 9 | 1 | 9 | 7 | 7 | 7 | 3 | 9 |
| 1510 | 9 | 8 | 1 | 2 | 1 | 8 | 7 | 7 | 8 | 10 | 1 | 4 | 1 | 5 |
| 1511 | 2 | 6 | 8 | 10 | 10 | 4 | 11 | 8 | 11 | 8 | 2 | 9 | 2 | 8 |
| 1512 | 8 | 8 | 4 | 9 | 2 | 8 | 9 | 10 | 9 | 7 | 5 | 6 | 6 | 10 |
| 1513 | 3 | 2 | 3 | 6 | 11 | 2 | 7 | 11 | 8 | 8 | 5 | 5 | 9 | 6 |
| 1514 | 4 | 6 | 0 | 4 | 5 | 2 | 3 | 0 | 6 | 0 | 9 | 7 | 11 | 11 |
| 1515 | 9 | 0 | 6 | 8 | 5 | 2 | 4 | 5 | 10 | 10 | 10 | 1 | 0 | 1 |
| 1516 | 3 | 3 | 9 | 1 | 10 | 1 | 7 | 11 | 4 | 4 | 0 | 0 | 5 | 9 |
| 1517 | 7 | 1 | 9 | 3 | 4 | 10 | 11 | 6 | 4 | 7 | 6 | 0 | 11 | 7 |
| 1518 | 4 | 7 | 3 | 10 | 2 | 8 | 9 | 4 | 6 | 11 | 11 | 3 | 0 | 2 |
| 1519 | 10 | 0 | 5 | 11 | 0 | 4 | 1 | 6 | 2 | 5 | 11 | 5 | 8 | 9 |
| 1520 | 4 | 0 | 1 | 3 | 1 | 10 | 1 | 11 | 10 | 7 | 10 | 5 | 4 | 3 |
| 1521 | 11 | 3 | 10 | 0 | 2 | 11 | 0 | 9 | 10 | 2 | 11 | 0 | 7 | 8 |
| 1522 | 10 | 7 | 10 | 1 | 10 | 10 | 5 | 2 | 1 | 7 | 9 | 3 | 6 | 4 |
| 1523 | 3 | 9 | 3 | 5 | 7 | 4 | 3 | 5 | 4 | 11 | 1 | 10 | 1 | 0 |
| 1524 | 7 | 7 | 7 | 4 | 8 | 4 | 8 | 11 | 0 | 8 | 6 | 1 | 6 | 11 |
| 1525 | 2 | 10 | 8 | 2 | 1 | 4 | 0 | 7 | 7 | 3 | 0 | 3 | 9 | 6 |
| 1526 | 1 | 8 | 5 | 5 | 4 | 5 | 2 | 3 | 9 | 11 | 11 | 4 | 7 | 9 |
| 1527 | 2 | 0 | 9 | 4 | 3 | 11 | 7 | 4 | 9 | 6 | 5 | 3 | 10 | 8 |
| 1528 | 2 | 7 | 8 | 6 | 4 | 1 | 10 | 1 | 1 | 1 | 8 | 0 | 1 | 2 |
| 1529 | 5 | 4 | 11 | 9 | 11 | 6 | 4 | 5 | 9 | 6 | 4 | 0 | 4 | 9 |
| 1530 | 9 | 9 | 1 | 10 | 4 | 3 | 7 | 1 | 6 | 8 | 6 | 6 | 5 | 7 |
| 1531 | 3 | 5 | 5 | 7 | 5 | 6 | 7 | 1 | 10 | 2 | 5 | 0 | 4 | 1 |
| 1532 | 0 | 10 | 10 | 2 | 2 | 11 | 1 | 5 | 8 | 1 | 2 | 6 | 4 | 5 |
| 1533 | 0 | 7 | 4 | 11 | 8 | 8 | 0 | 9 | 7 | 10 | 4 | 4 | 5 | 7 |
| 1534 | 7 | 2 | 6 | 11 | 2 | 8 | 7 | 5 | 1 | 3 | 0 | 7 | 2 | 5 |
| 1535 | 3 | 0 | 10 | 8 | 9 | 1 | 7 | 0 | 3 | 0 | 6 | 8 | 2 | 5 |
| 1536 | 6 | 5 | 10 | 11 | 1 | 5 | 5 | 5 | 1 | 3 | 7 | 3 | 4 | 0 |
| 1537 | 4 | 6 | 7 | 7 | 8 | 9 | 6 | 8 | 4 | 11 | 3 | 1 | 1 | 4 |
| 1538 | 1 | 4 | 1 | 3 | 11 | 7 | 9 | 6 | 2 | 4 | 1 | 6 | 8 | 9 |
| 1539 | 5 | 10 | 4 | 5 | 3 | 6 | 10 | 10 | 6 | 1 | 11 | 9 | 7 | 10 |
| 1540 | 7 | 7 | 5 | 11 | 5 | 3 | 9 | 8 | 0 | 10 | 9 | 7 | 6 | 2 |
| 1541 | 0 | 11 | 0 | 4 | 3 | 1 | 1 | 11 | 8 | 10 | 2 | 3 | 1 | 8 |
| 1542 | 8 | 7 | 8 | 2 | 4 | 2 | 8 | 3 | 7 | 8 | 0 | 2 | 4 | 4 |
| 1543 | 3 | 1 | 6 | 1 | 7 | 8 | 6 | 3 | 11 | 6 | 6 | 9 | 0 | 8 |
| 1544 | 6 | 2 | 3 | 6 | 2 | 8 | 0 | 9 | 9 | 11 | 9 | 10 | 9 | 11 |
| 1545 | 0 | 3 | 4 | 8 | 10 | 7 | 11 | 4 | 3 | 8 | 6 | 4 | 11 | 11 |
| 1546 | 0 | 9 | 1 | 6 | 8 | 9 | 9 | 9 | 6 | 2 | 2 | 9 | 11 | 6 |
| 1547 | 2 | 3 | 0 | 7 | 11 | 4 | 6 | 1 | 5 | 2 | 9 | 9 | 5 | 9 |
| 1548 | 11 | 3 | 6 | 7 | 4 | 3 | 11 | 11 | 10 | 11 | 0 | 3 | 7 | 7 |
| 1549 | 10 | 6 | 3 | 10 | 5 | 10 | 11 | 5 | 6 | 8 | 7 | 0 | 10 | 10 |
| 1550 | 7 | 6 | 10 | 11 | 10 | 1 | 10 | 0 | 10 | 8 | 4 | 5 | 2 | 4 |
| 1551 | 1 | 5 | 9 | 7 | 7 | 6 | 9 | 7 | 4 | 9 | 2 | 7 | 5 | 7 |
| 1552 | 0 | 1 | 2 | 8 | 0 | 4 | 5 | 9 | 10 | 3 | 8 | 0 | 3 | 8 |
| 1553 | 1 | 4 | 3 | 2 | 10 | 5 | 4 | 8 | 10 | 1 | 5 | 8 | 11 | 6 |
| 1554 | 7 | 5 | 10 | 5 | 9 | 2 | 0 | 10 | 2 | 6 | 6 | 0 | 11 | 6 |
| 1555 | 3 | 11 | 3 | 11 | 6 | 9 | 7 | 6 | 7 | 6 | 7 | 5 | 3 | 11 |
| 1556 | 3 | 2 | 4 | 4 | 9 | 6 | 0 | 3 | 0 | 4 | 8 | 8 | 1 | 7 |
| 1557 | 2 | 3 | 8 | 10 | 3 | 5 | 3 | 5 | 0 | 6 | 11 | 11 | 8 | 3 |
| 1558 | 6 | 3 | 7 | 9 | 5 | 7 | 9 | 9 | 10 | 0 | 7 | 5 | 0 | 1 |
| 1559 | 5 | 10 | 6 | 9 | 0 | 11 | 8 | 7 | 0 | 2 | 10 | 0 | 1 | 6 |
| 1560 | 11 | 8 | 7 | 4 | 7 | 5 | 3 | 0 | 9 | 10 | 7 | 1 | 7 | 5 |
| 1561 | 0 | 9 | 4 | 1 | 4 | 1 | 3 | 8 | 2 | 11 | 5 | 11 | 2 | 0 |
| 1562 | 7 | 11 | 1 | 6 | 5 | 4 | 1 | 1 | 11 | 3 | 5 | 4 | 0 | 3 |
| 1563 | 10 | 0 | 1 | 3 | 2 | 8 | 10 | 3 | 7 | 2 | 5 | 3 | 2 | 10 |
| 1564 | 9 | 10 | 8 | 0 | 8 | 0 | 9 | 8 | 7 | 6 | 6 | 4 | 9 | 7 |
| 1565 | 6 | 4 | 5 | 7 | 4 | 11 | 10 | 5 | 6 | 7 | 10 | 10 | 0 | 8 |
| 1566 | 8 | 8 | 8 | 1 | 8 | 3 | 1 | 5 | 3 | 4 | 9 | 3 | 2 | 5 |
| 1567 | 5 | 6 | 11 | 8 | 9 | 10 | 1 | 9 | 11 | 10 | 4 | 7 | 8 | 6 |
| 1568 | 8 | 4 | 6 | 11 | 5 | 8 | 7 | 4 | 2 | 9 | 11 | 1 | 1 | 3 |
| 1569 | 11 | 7 | 0 | 10 | 0 | 2 | 7 | 6 | 11 | 2 | 5 | 7 | 7 | 1 |
| 1570 | 4 | 10 | 0 | 8 | 1 | 11 | 4 | 0 | 2 | 5 | 7 | 9 | 9 | 4 |
| 1571 | 2 | 2 | 10 | 3 | 10 | 11 | 0 | 1 | 1 | 0 | 2 | 1 | 6 | 8 |
| 1572 | 7 | 1 | 4 | 6 | 9 | 11 | 2 | 11 | 6 | 5 | 0 | 11 | 5 | 11 |
| 1573 | 4 | 9 | 10 | 0 | 7 | 9 | 2 | 8 | 0 | 7 | 8 | 11 | 4 | 8 |
| 1574 | 6 | 11 | 0 | 5 | 8 | 4 | 0 | 2 | 9 | 0 | 11 | 1 | 5 | 6 |
| 1575 | 8 | 5 | 9 | 4 | 6 | 6 | 2 | 10 | 6 | 11 | 6 | 4 | 6 | 5 |
| 1576 | 0 | 0 | 1 | 2 | 10 | 2 | 3 | 6 | 4 | 3 | 3 | 3 | 7 | 6 |
| 1577 | 8 | 11 | 0 | 2 | 6 | 7 | 5 | 5 | 0 | 1 | 7 | 6 | 5 | 3 |
| 1578 | 5 | 6 | 4 | 10 | 1 | 0 | 7 | 0 | 11 | 6 | 9 | 0 | 3 | 8 |
| 1579 | 11 | 1 | 11 | 4 | 3 | 5 | 4 | 3 | 5 | 11 | 4 | 5 | 3 | 7 |
| 1580 | 0 | 3 | 2 | 7 | 5 | 0 | 4 | 11 | 8 | 5 | 4 | 9 | 0 | 10 |
| 1581 | 1 | 6 | 11 | 10 | 4 | 1 | 6 | 6 | 8 | 7 | 8 | 0 | 5 | 3 |
| 1582 | 3 | 3 | 2 | 7 | 10 | 1 | 1 | 3 | 5 | 7 | 10 | 1 | 2 | 1 |
| 1583 | 10 | 0 | 6 | 4 | 6 | 11 | 6 | 1 | 8 | 8 | 11 | 10 | 5 | 8 |
| 1584 | 11 | 10 | 11 | 9 | 11 | 8 | 0 | 4 | 6 | 6 | 10 | 1 | 9 | 1 |
| 1585 | 9 | 0 | 11 | 6 | 6 | 10 | 7 | 6 | 10 | 4 | 4 | 9 | 10 | 9 |
| 1586 | 0 | 11 | 4 | 4 | 4 | 6 | 9 | 7 | 10 | 3 | 9 | 10 | 6 | 11 |
| 1587 | 4 | 6 | 0 | 6 | 8 | 0 | 11 | 1 | 0 | 4 | 0 | 8 | 7 | 0 |
| 1588 | 1 | 8 | 1 | 0 | 5 | 3 | 7 | 11 | 7 | 8 | 10 | 1 | 8 | 10 |
| 1589 | 9 | 6 | 8 | 4 | 11 | 8 | 8 | 4 | 8 | 2 | 8 | 7 | 3 | 9 |
| 1590 | 2 | 8 | 3 | 11 | 0 | 5 | 5 | 3 | 5 | 0 | 5 | 6 | 8 | 10 |
| 1591 | 10 | 9 | 9 | 8 | 8 | 0 | 10 | 3 | 1 | 7 | 4 | 1 | 1 | 11 |
| 1592 | 7 | 2 | 8 | 4 | 9 | 1 | 9 | 11 | 4 | 8 | 3 | 9 | 10 | 3 |
| 1593 | 9 | 1 | 7 | 6 | 0 | 0 | 5 | 8 | 8 | 10 | 3 | 6 | 11 | 0 |
| 1594 | 6 | 0 | 6 | 5 | 5 | 8 | 3 | 2 | 10 | 3 | 8 | 4 | 9 | 9 |
| 1595 | 0 | 11 | 1 | 3 | 1 | 6 | 2 | 5 | 5 | 10 | 8 | 7 | 3 | 5 |
| 1596 | 6 | 9 | 4 | 9 | 4 | 2 | 11 | 1 | 1 | 1 | 1 | 5 | 3 | 11 |
| 1597 | 7 | 5 | 3 | 10 | 3 | 3 | 6 | 3 | 5 | 3 | 0 | 3 | 5 | 4 |
| 1598 | 6 | 0 | 0 | 4 | 11 | 10 | 2 | 8 | 1 | 1 | 0 | 0 | 2 | 9 |
| 1599 | 1 | 10 | 6 | 3 | 6 | 4 | 5 | 7 | 11 | 9 | 4 | 11 | 4 | 1 |
| 1600 | 0 | 2 | 10 | 2 | 11 | 3 | 6 | 6 | 0 | 10 | 11 | 2 | 0 | 5 |
| 1601 | 5 | 3 | 0 | 6 | 8 | 6 | 3 | 6 | 1 | 3 | 1 | 11 | 1 | 4 |
| 1602 | 7 | 3 | 3 | 8 | 5 | 4 | 7 | 0 | 6 | 5 | 6 | 3 | 6 | 1 |
| 1603 | 0 | 5 | 9 | 7 | 1 | 10 | 10 | 1 | 10 | 4 | 8 | 10 | 11 | 3 |
| 1604 | 5 | 1 | 5 | 1 | 4 | 10 | 10 | 11 | 5 | 5 | 7 | 6 | 9 | 7 |
| 1605 | 0 | 7 | 3 | 11 | 10 | 8 | 11 | 7 | 8 | 9 | 0 | 8 | 10 | 1 |
| 1606 | 6 | 11 | 9 | 0 | 1 | 9 | 9 | 3 | 4 | 6 | 9 | 6 | 0 | 10 |
| 1607 | 10 | 11 | 10 | 3 | 9 | 7 | 7 | 0 | 10 | 3 | 0 | 7 | 1 | 6 |
| 1608 | 8 | 11 | 4 | 1 | 3 | 10 | 0 | 3 | 9 | 10 | 5 | 7 | 4 | 9 |
| 1609 | 2 | 3 | 11 | 11 | 11 | 1 | 0 | 10 | 9 | 4 | 4 | 8 | 6 | 6 |
| 1610 | 9 | 0 | 8 | 7 | 6 | 0 | 10 | 4 | 0 | 8 | 9 | 2 | 7 | 5 |
| 1611 | 4 | 0 | 2 | 1 | 7 | 7 | 3 | 7 | 9 | 2 | 5 | 6 | 3 | 7 |
| 1612 | 3 | 6 | 10 | 9 | 6 | 9 | 3 | 3 | 9 | 1 | 0 | 9 | 2 | 10 |
| 1613 | 7 | 4 | 7 | 7 | 10 | 7 | 0 | 7 | 2 | 7 | 11 | 9 | 10 | 7 |
| 1614 | 4 | 9 | 3 | 7 | 2 | 10 | 8 | 2 | 2 | 0 | 4 | 2 | 10 | 4 |
| 1615 | 6 | 7 | 5 | 5 | 7 | 4 | 1 | 8 | 1 | 9 | 6 | 6 | 9 | 11 |
| 1616 | 2 | 0 | 2 | 0 | 6 | 1 | 2 | 11 | 2 | 4 | 8 | 6 | 2 | 11 |
| 1617 | 11 | 4 | 4 | 1 | 0 | 8 | 0 | 5 | 11 | 7 | 1 | 3 | 11 | 3 |
| 1618 | 2 | 5 | 10 | 8 | 2 | 0 | 9 | 9 | 8 | 1 | 1 | 3 | 9 | 4 |
| 1619 | 3 | 11 | 7 | 1 | 11 | 11 | 9 | 8 | 1 | 2 | 3 | 5 | 6 | 7 |
| 1620 | 10 | 6 | 7 | 1 | 8 | 2 | 8 | 9 | 9 | 9 | 6 | 10 | 2 | 7 |
| 1621 | 4 | 11 | 11 | 7 | 1 | 8 | 8 | 8 | 7 | 10 | 0 | 3 | 0 | 1 |
| 1622 | 4 | 1 | 9 | 9 | 11 | 10 | 8 | 4 | 1 | 8 | 2 | 11 | 8 | 3 |
| 1623 | 9 | 5 | 1 | 2 | 5 | 8 | 0 | 3 | 1 | 4 | 7 | 11 | 10 | 4 |
| 1624 | 6 | 1 | 5 | 10 | 1 | 7 | 11 | 7 | 4 | 2 | 2 | 2 | 2 | 9 |
| 1625 | 2 | 1 | 6 | 1 | 8 | 9 | 7 | 8 | 0 | 5 | 9 | 5 | 5 | 0 |
| 1626 | 10 | 8 | 5 | 5 | 10 | 10 | 8 | 6 | 7 | 4 | 11 | 7 | 4 | 8 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1627 | 8 | 2 | 9 | 2 | 7 | 9 | 8 | 5 | 10 | 2 | 9 | 7 | 10 | 6 |
| 1628 | 1 | 3 | 7 | 5 | 9 | 3 | 8 | 7 | 7 | 2 | 7 | 2 | 6 | 3 |
| 1629 | 5 | 4 | 1 | 9 | 0 | 2 | 6 | 2 | 3 | 8 | 3 | 7 | 5 | 9 |
| 1630 | 10 | 2 | 6 | 2 | 6 | 4 | 7 | 11 | 3 | 0 | 6 | 0 | 3 | 9 |
| 1631 | 5 | 6 | 9 | 5 | 9 | 0 | 5 | 5 | 3 | 8 | 5 | 4 | 6 | 1 |
| 1632 | 4 | 5 | 10 | 1 | 6 | 2 | 5 | 4 | 9 | 5 | 1 | 11 | 0 | 9 |
| 1633 | 2 | 8 | 7 | 8 | 6 | 6 | 10 | 5 | 1 | 6 | 5 | 2 | 9 | 1 |
| 1634 | 11 | 5 | 1 | 4 | 9 | 5 | 11 | 10 | 7 | 5 | 3 | 11 | 9 | 1 |
| 1635 | 5 | 0 | 4 | 8 | 11 | 5 | 5 | 8 | 6 | 0 | 2 | 10 | 6 | 3 |
| 1636 | 2 | 1 | 8 | 5 | 3 | 11 | 5 | 10 | 9 | 11 | 2 | 6 | 5 | 9 |
| 1637 | 3 | 4 | 9 | 4 | 2 | 10 | 2 | 11 | 3 | 9 | 9 | 5 | 11 | 6 |
| 1638 | 2 | 6 | 11 | 3 | 6 | 7 | 0 | 7 | 10 | 10 | 10 | 4 | 2 | 5 |
| 1639 | 3 | 2 | 8 | 4 | 2 | 9 | 5 | 7 | 1 | 6 | 1 | 10 | 5 | 10 |
| 1640 | 8 | 9 | 1 | 3 | 0 | 1 | 8 | 0 | 4 | 6 | 5 | 9 | 9 | 7 |
| 1641 | 9 | 4 | 6 | 1 | 10 | 1 | 11 | 6 | 6 | 0 | 4 | 1 | 7 | 10 |
| 1642 | 5 | 1 | 11 | 10 | 9 | 5 | 7 | 2 | 4 | 4 | 1 | 4 | 1 | 2 |
| 1643 | 4 | 9 | 11 | 5 | 3 | 8 | 5 | 2 | 5 | 4 | 10 | 10 | 11 | 11 |
| 1644 | 9 | 7 | 4 | 5 | 8 | 2 | 4 | 5 | 9 | 11 | 7 | 2 | 7 | 2 |
| 1645 | 0 | 5 | 3 | 2 | 4 | 7 | 10 | 9 | 1 | 9 | 4 | 4 | 8 | 8 |
| 1646 | 3 | 0 | 5 | 8 | 3 | 4 | 4 | 10 | 11 | 1 | 8 | 4 | 4 | 7 |
| 1647 | 4 | 2 | 0 | 10 | 2 | 6 | 4 | 11 | 1 | 7 | 10 | 0 | 0 | 11 |
| 1648 | 3 | 0 | 4 | 7 | 7 | 2 | 8 | 1 | 11 | 9 | 3 | 11 | 11 | 4 |
| 1649 | 8 | 8 | 5 | 3 | 9 | 4 | 10 | 3 | 6 | 11 | 1 | 1 | 11 | 4 |
| 1650 | 6 | 7 | 1 | 8 | 2 | 10 | 0 | 2 | 6 | 1 | 5 | 11 | 3 | 2 |
| 1651 | 11 | 5 | 2 | 4 | 0 | 4 | 10 | 4 | 2 | 4 | 6 | 8 | 0 | 2 |
| 1652 | 9 | 11 | 8 | 11 | 2 | 5 | 11 | 5 | 4 | 5 | 8 | 8 | 11 | 4 |
| 1653 | 11 | 1 | 10 | 8 | 5 | 9 | 9 | 1 | 11 | 2 | 3 | 10 | 10 | 0 |
| 1654 | 9 | 7 | 10 | 6 | 3 | 8 | 9 | 2 | 4 | 0 | 6 | 2 | 2 | 3 |
| 1655 | 8 | 2 | 5 | 8 | 7 | 2 | 11 | 10 | 0 | 8 | 10 | 6 | 0 | 2 |
| 1656 | 8 | 10 | 10 | 10 | 5 | 3 | 10 | 7 | 7 | 11 | 6 | 9 | 0 | 9 |
| 1657 | 1 | 10 | 0 | 4 | 8 | 1 | 0 | 8 | 11 | 11 | 1 | 6 | 0 | 2 |
| 1658 | 2 | 5 | 11 | 1 | 4 | 10 | 2 | 4 | 3 | 1 | 11 | 7 | 5 | 5 |
| 1659 | 3 | 2 | 3 | 1 | 0 | 2 | 9 | 2 | 5 | 10 | 2 | 11 | 7 | 0 |
| 1660 | 3 | 5 | 8 | 6 | 11 | 6 | 6 | 7 | 7 | 5 | 0 | 0 | 10 | 2 |
| 1661 | 4 | 1 | 0 | 9 | 9 | 1 | 6 | 0 | 11 | 0 | 10 | 4 | 4 | 10 |
| 1662 | 10 | 0 | 9 | 8 | 11 | 9 | 0 | 4 | 0 | 4 | 0 | 6 | 3 | 4 |
| 1663 | 1 | 7 | 2 | 9 | 8 | 0 | 2 | 7 | 11 | 1 | 11 | 2 | 1 | 0 |
| 1664 | 10 | 1 | 8 | 4 | 2 | 0 | 0 | 4 | 10 | 1 | 2 | 4 | 6 | 0 |
| 1665 | 0 | 9 | 10 | 0 | 0 | 8 | 1 | 10 | 10 | 6 | 1 | 6 | 2 | 9 |
| 1666 | 11 | 6 | 2 | 10 | 1 | 3 | 10 | 8 | 3 | 2 | 1 | 4 | 9 | 3 |
| 1667 | 5 | 9 | 9 | 3 | 3 | 7 | 7 | 9 | 9 | 10 | 3 | 0 | 11 | 4 |
| 1668 | 6 | 8 | 3 | 4 | 6 | 3 | 1 | 0 | 1 | 8 | 1 | 7 | 0 | 4 |
| 1669 | 4 | 7 | 0 | 5 | 2 | 5 | 6 | 3 | 10 | 11 | 2 | 8 | 8 | 5 |
| 1670 | 3 | 9 | 2 | 7 | 1 | 2 | 6 | 0 | 6 | 2 | 8 | 3 | 7 | 11 |
| 1671 | 1 | 8 | 4 | 11 | 5 | 11 | 0 | 9 | 3 | 7 | 6 | 6 | 9 | 0 |
| 1672 | 4 | 8 | 2 | 0 | 9 | 10 | 7 | 4 | 5 | 10 | 9 | 8 | 3 | 4 |
| 1673 | 1 | 4 | 8 | 5 | 3 | 4 | 2 | 11 | 7 | 6 | 4 | 3 | 10 | 4 |
| 1674 | 10 | 4 | 9 | 5 | 1 | 6 | 5 | 3 | 8 | 11 | 11 | 11 | 11 | 7 |
| 1675 | 1 | 2 | 8 | 0 | 7 | 11 | 7 | 1 | 6 | 4 | 3 | 7 | 1 | 0 |
| 1676 | 11 | 6 | 4 | 1 | 2 | 4 | 4 | 2 | 0 | 0 | 9 | 9 | 8 | 1 |
| 1677 | 6 | 9 | 8 | 9 | 1 | 6 | 5 | 7 | 5 | 9 | 9 | 4 | 1 | 4 |
| 1678 | 0 | 1 | 3 | 10 | 7 | 11 | 1 | 8 | 3 | 10 | 10 | 5 | 4 | 2 |
| 1679 | 4 | 10 | 3 | 2 | 4 | 8 | 4 | 6 | 9 | 2 | 0 | 7 | 5 | 0 |
| 1680 | 8 | 5 | 7 | 5 | 11 | 0 | 3 | 3 | 0 | 0 | 3 | 10 | 1 | 1 |
| 1681 | 10 | 1 | 8 | 0 | 8 | 8 | 3 | 11 | 2 | 0 | 7 | 7 | 11 | 4 |
| 1682 | 0 | 8 | 4 | 10 | 4 | 9 | 5 | 9 | 8 | 6 | 7 | 7 | 4 | 1 |
| 1683 | 3 | 2 | 6 | 5 | 2 | 6 | 11 | 9 | 11 | 3 | 4 | 5 | 3 | 4 |
| 1684 | 10 | 4 | 10 | 6 | 2 | 1 | 8 | 5 | 2 | 9 | 3 | 8 | 8 | 8 |
| 1685 | 7 | 11 | 9 | 1 | 3 | 8 | 1 | 6 | 3 | 5 | 10 | 0 | 7 | 6 |
| 1686 | 10 | 10 | 4 | 11 | 10 | 3 | 4 | 7 | 5 | 1 | 10 | 3 | 3 | 2 |
| 1687 | 0 | 3 | 11 | 11 | 2 | 7 | 7 | 1 | 0 | 11 | 11 | 5 | 9 | 2 |
| 1688 | 0 | 7 | 11 | 4 | 10 | 2 | 9 | 11 | 6 | 1 | 7 | 1 | 2 | 7 |
| 1689 | 7 | 10 | 2 | 9 | 4 | 9 | 4 | 7 | 10 | 8 | 8 | 6 | 9 | 5 |
| 1690 | 7 | 1 | 11 | 3 | 10 | 7 | 2 | 3 | 3 | 6 | 2 | 3 | 8 | 1 |
| 1691 | 8 | 10 | 1 | 8 | 6 | 8 | 1 | 1 | 5 | 4 | 0 | 9 | 1 | 8 |
| 1692 | 6 | 0 | 10 | 1 | 1 | 0 | 6 | 6 | 2 | 7 | 5 | 10 | 9 | 10 |
| 1693 | 10 | 5 | 11 | 7 | 2 | 7 | 2 | 10 | 8 | 9 | 10 | 6 | 3 | 11 |
| 1694 | 8 | 1 | 3 | 9 | 9 | 11 | 11 | 5 | 4 | 9 | 5 | 6 | 7 | 0 |
| 1695 | 2 | 0 | 0 | 11 | 4 | 6 | 0 | 1 | 2 | 6 | 3 | 10 | 7 | 5 |
| 1696 | 10 | 8 | 3 | 2 | 11 | 6 | 11 | 1 | 2 | 3 | 10 | 3 | 6 | 3 |
| 1697 | 6 | 3 | 2 | 1 | 0 | 9 | 10 | 5 | 4 | 11 | 4 | 11 | 6 | 1 |
| 1698 | 3 | 10 | 0 | 3 | 5 | 5 | 10 | 2 | 8 | 7 | 11 | 6 | 4 | 4 |
| 1699 | 1 | 7 | 6 | 0 | 1 | 10 | 6 | 2 | 1 | 4 | 6 | 1 | 5 | 1 |
| 1700 | 2 | 2 | 5 | 11 | 11 | 10 | 4 | 8 | 7 | 11 | 10 | 4 | 5 | 4 |
| 1701 | 2 | 8 | 5 | 10 | 11 | 8 | 0 | 0 | 10 | 2 | 7 | 6 | 1 | 2 |
| 1702 | 9 | 0 | 7 | 5 | 4 | 5 | 10 | 6 | 8 | 6 | 10 | 3 | 6 | 7 |
| 1703 | 6 | 9 | 11 | 11 | 5 | 6 | 4 | 5 | 3 | 8 | 2 | 11 | 7 | 7 |
| 1704 | 7 | 6 | 7 | 11 | 6 | 3 | 5 | 9 | 6 | 6 | 11 | 8 | 8 | 8 |
| 1705 | 3 | 8 | 2 | 0 | 11 | 6 | 3 | 6 | 11 | 9 | 11 | 9 | 9 | 6 |
| 1706 | 11 | 1 | 2 | 2 | 11 | 0 | 1 | 7 | 0 | 11 | 1 | 7 | 6 | 10 |
| 1707 | 5 | 4 | 4 | 6 | 11 | 8 | 1 | 4 | 9 | 3 | 3 | 9 | 2 | 6 |
| 1708 | 6 | 3 | 5 | 3 | 4 | 1 | 9 | 3 | 2 | 3 | 0 | 0 | 9 | 5 |
| 1709 | 3 | 8 | 1 | 3 | 3 | 1 | 4 | 8 | 3 | 5 | 3 | 8 | 10 | 11 |
| 1710 | 11 | 4 | 5 | 4 | 1 | 9 | 7 | 10 | 3 | 11 | 5 | 3 | 4 | 10 |
| 1711 | 4 | 1 | 3 | 1 | 3 | 7 | 8 | 0 | 10 | 4 | 9 | 8 | 6 | 9 |
| 1712 | 1 | 5 | 9 | 10 | 0 | 11 | 11 | 2 | 8 | 8 | 5 | 2 | 8 | 6 |
| 1713 | 5 | 3 | 7 | 4 | 4 | 0 | 0 | 3 | 8 | 9 | 6 | 2 | 5 | 9 |
| 1714 | 1 | 0 | 2 | 2 | 9 | 2 | 1 | 9 | 8 | 0 | 2 | 5 | 11 | 11 |
| 1715 | 3 | 6 | 3 | 0 | 4 | 8 | 11 | 11 | 0 | 1 | 5 | 2 | 1 | 9 |
| 1716 | 9 | 1 | 0 | 7 | 2 | 3 | 7 | 2 | 3 | 10 | 8 | 11 | 2 | 6 |
| 1717 | 10 | 7 | 6 | 6 | 4 | 3 | 0 | 6 | 11 | 10 | 3 | 9 | 1 | 3 |
| 1718 | 1 | 2 | 1 | 7 | 8 | 6 | 7 | 6 | 8 | 2 | 4 | 10 | 6 | 8 |
| 1719 | 1 | 7 | 7 | 1 | 2 | 6 | 3 | 7 | 5 | 5 | 3 | 3 | 11 | 8 |
| 1720 | 7 | 4 | 6 | 3 | 0 | 6 | 9 | 4 | 6 | 10 | 0 | 10 | 4 | 4 |
| 1721 | 10 | 5 | 7 | 10 | 5 | 2 | 9 | 11 | 1 | 6 | 2 | 4 | 4 | 5 |
| 1722 | 11 | 10 | 8 | 0 | 6 | 1 | 6 | 0 | 9 | 9 | 3 | 3 | 11 | 6 |
| 1723 | 7 | 1 | 0 | 2 | 1 | 10 | 5 | 0 | 7 | 8 | 6 | 8 | 0 | 11 |
| 1724 | 11 | 3 | 11 | 3 | 4 | 11 | 5 | 10 | 4 | 6 | 6 | 11 | 3 | 0 |
| 1725 | 1 | 11 | 11 | 7 | 5 | 9 | 11 | 0 | 5 | 11 | 1 | 11 | 10 | 9 |
| 1726 | 0 | 5 | 7 | 10 | 8 | 5 | 2 | 4 | 4 | 3 | 6 | 5 | 8 | 9 |
| 1727 | 5 | 1 | 11 | 5 | 1 | 3 | 11 | 11 | 2 | 10 | 5 | 5 | 10 | 3 |
| 1728 | 0 | 2 | 9 | 10 | 5 | 6 | 1 | 9 | 0 | 5 | 1 | 4 | 11 | 0 |
| 1729 | 11 | 11 | 3 | 9 | 7 | 5 | 6 | 11 | 11 | 7 | 8 | 6 | 6 | 7 |
| 1730 | 11 | 3 | 5 | 5 | 6 | 6 | 1 | 2 | 8 | 1 | 1 | 5 | 8 | 5 |
| 1731 | 1 | 2 | 2 | 11 | 10 | 3 | 10 | 4 | 11 | 7 | 2 | 0 | 4 | 10 |
| 1732 | 5 | 8 | 10 | 9 | 2 | 4 | 1 | 4 | 2 | 11 | 8 | 0 | 9 | 7 |
| 1733 | 4 | 7 | 9 | 9 | 0 | 5 | 0 | 1 | 7 | 2 | 6 | 5 | 0 | 4 |
| 1734 | 5 | 0 | 9 | 11 | 3 | 1 | 8 | 1 | 7 | 7 | 2 | 2 | 2 | 2 |
| 1735 | 3 | 9 | 11 | 10 | 0 | 1 | 10 | 1 | 2 | 5 | 11 | 1 | 6 | 10 |
| 1736 | 5 | 5 | 10 | 2 | 2 | 9 | 11 | 6 | 6 | 4 | 0 | 5 | 6 | 8 |
| 1737 | 7 | 0 | 8 | 4 | 1 | 3 | 2 | 9 | 8 | 5 | 6 | 1 | 7 | 2 |
| 1738 | 1 | 5 | 6 | 0 | 11 | 9 | 8 | 10 | 2 | 3 | 11 | 4 | 10 | 8 |
| 1739 | 4 | 0 | 1 | 7 | 9 | 3 | 10 | 0 | 1 | 3 | 4 | 9 | 3 | 3 |
| 1740 | 9 | 8 | 9 | 8 | 5 | 8 | 6 | 1 | 4 | 3 | 4 | 0 | 5 | 1 |
| 1741 | 9 | 5 | 2 | 3 | 5 | 5 | 8 | 1 | 10 | 9 | 6 | 3 | 3 | 5 |
| 1742 | 3 | 7 | 9 | 0 | 8 | 4 | 3 | 0 | 5 | 6 | 8 | 10 | 3 | 1 |
| 1743 | 9 | 1 | 4 | 2 | 10 | 4 | 11 | 3 | 0 | 9 | 3 | 0 | 5 | 5 |
| 1744 | 10 | 5 | 1 | 11 | 7 | 5 | 2 | 11 | 6 | 10 | 11 | 0 | 11 | 2 |
| 1745 | 2 | 11 | 9 | 3 | 3 | 3 | 6 | 8 | 10 | 0 | 6 | 9 | 4 | 1 |
| 1746 | 3 | 0 | 0 | 6 | 5 | 0 | 9 | 11 | 2 | 2 | 1 | 1 | 3 | 1 |
| 1747 | 6 | 10 | 6 | 1 | 6 | 2 | 9 | 10 | 10 | 8 | 0 | 1 | 3 | 3 |
| 1748 | 6 | 7 | 3 | 8 | 6 | 11 | 8 | 4 | 0 | 3 | 8 | 9 | 11 | 0 |
| 1749 | 9 | 7 | 11 | 5 | 0 | 6 | 0 | 8 | 6 | 5 | 9 | 4 | 8 | 9 |
| 1750 | 7 | 6 | 2 | 2 | 9 | 6 | 8 | 2 | 1 | 1 | 4 | 10 | 9 | 10 |
| 1751 | 7 | 10 | 2 | 10 | 8 | 6 | 1 | 3 | 9 | 2 | 9 | 9 | 8 | 2 |
| 1752 | 4 | 9 | 6 | 7 | 11 | 4 | 9 | 10 | 4 | 6 | 7 | 0 | 7 | 5 |
| 1753 | 3 | 6 | 10 | 8 | 8 | 11 | 6 | 1 | 10 | 5 | 1 | 7 | 11 | 7 |
| 1754 | 9 | 7 | 9 | 7 | 2 | 1 | 11 | 0 | 1 | 1 | 6 | 3 | 8 | 0 |
| 1755 | 10 | 10 | 0 | 0 | 2 | 4 | 3 | 9 | 1 | 8 | 9 | 3 | 7 | 7 |
| 1756 | 7 | 6 | 0 | 1 | 0 | 5 | 11 | 7 | 11 | 10 | 3 | 1 | 5 | 7 |
| 1757 | 7 | 2 | 9 | 0 | 10 | 3 | 11 | 10 | 8 | 2 | 11 | 5 | 1 | 11 |
| 1758 | 5 | 11 | 2 | 5 | 7 | 5 | 4 | 0 | 3 | 1 | 0 | 10 | 3 | 4 |
| 1759 | 10 | 10 | 8 | 6 | 10 | 5 | 9 | 10 | 2 | 5 | 4 | 2 | 5 | 0 |
| 1760 | 7 | 8 | 11 | 8 | 0 | 8 | 10 | 9 | 7 | 7 | 3 | 5 | 4 | 9 |
| 1761 | 9 | 7 | 1 | 0 | 11 | 11 | 4 | 3 | 5 | 10 | 1 | 0 | 6 | 6 |
| 1762 | 11 | 5 | 8 | 7 | 10 | 1 | 3 | 2 | 6 | 3 | 9 | 7 | 0 | 3 |
| 1763 | 9 | 9 | 2 | 2 | 0 | 5 | 2 | 5 | 8 | 4 | 5 | 10 | 1 | 9 |
| 1764 | 8 | 8 | 1 | 7 | 1 | 9 | 10 | 9 | 9 | 0 | 10 | 11 | 2 | 0 |
| 1765 | 5 | 8 | 3 | 1 | 7 | 4 | 2 | 9 | 4 | 1 | 6 | 4 | 10 | 3 |
| 1766 | 2 | 5 | 6 | 3 | 2 | 11 | 1 | 2 | 5 | 7 | 7 | 10 | 1 | 3 |
| 1767 | 0 | 5 | 5 | 7 | 4 | 0 | 11 | 2 | 7 | 0 | 7 | 0 | 6 | 9 |
| 1768 | 2 | 7 | 5 | 0 | 7 | 1 | 8 | 2 | 4 | 11 | 11 | 11 | 0 | 5 |
| 1769 | 11 | 11 | 7 | 10 | 10 | 7 | 10 | 10 | 4 | 8 | 10 | 0 | 1 | 1 |
| 1770 | 7 | 9 | 9 | 2 | 8 | 11 | 8 | 7 | 3 | 0 | 1 | 5 | 0 | 0 |
| 1771 | 8 | 9 | 0 | 11 | 9 | 9 | 4 | 8 | 8 | 3 | 11 | 3 | 0 | 5 |
| 1772 | 4 | 8 | 10 | 4 | 3 | 11 | 9 | 6 | 5 | 2 | 5 | 4 | 1 | 9 |
| 1773 | 4 | 10 | 3 | 5 | 11 | 2 | 5 | 1 | 7 | 10 | 7 | 1 | 1 | 6 |
| 1774 | 0 | 6 | 6 | 6 | 4 | 6 | 2 | 4 | 2 | 5 | 10 | 6 | 0 | 6 |
| 1775 | 8 | 8 | 7 | 4 | 5 | 9 | 8 | 2 | 11 | 5 | 11 | 8 | 11 | 7 |
| 1776 | 8 | 5 | 5 | 1 | 7 | 1 | 5 | 8 | 8 | 7 | 9 | 8 | 3 | 10 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1777 | 2 | 11 | 0 | 10 | 10 | 9 | 1 | 7 | 3 | 9 | 3 | 9 | 3 | 10 |
| 1778 | 11 | 10 | 6 | 1 | 9 | 10 | 0 | 7 | 1 | 0 | 11 | 8 | 2 | 11 |
| 1779 | 2 | 7 | 0 | 7 | 0 | 1 | 4 | 8 | 0 | 8 | 4 | 0 | 11 | 8 |
| 1780 | 8 | 4 | 2 | 9 | 8 | 3 | 11 | 6 | 10 | 6 | 7 | 0 | 11 | 3 |
| 1781 | 10 | 11 | 11 | 4 | 7 | 3 | 8 | 10 | 5 | 2 | 2 | 0 | 7 | 4 |
| 1782 | 2 | 4 | 0 | 5 | 6 | 3 | 4 | 9 | 7 | 9 | 0 | 7 | 1 | 2 |
| 1783 | 0 | 6 | 9 | 5 | 11 | 4 | 3 | 8 | 8 | 4 | 10 | 9 | 10 | 5 |
| 1784 | 2 | 4 | 8 | 3 | 5 | 2 | 4 | 0 | 8 | 2 | 9 | 5 | 2 | 3 |
| 1785 | 1 | 10 | 2 | 4 | 3 | 7 | 11 | 10 | 5 | 10 | 7 | 7 | 8 | 0 |
| 1786 | 4 | 2 | 1 | 1 | 10 | 0 | 2 | 11 | 2 | 3 | 7 | 5 | 6 | 5 |
| 1787 | 0 | 1 | 5 | 6 | 5 | 5 | 4 | 4 | 7 | 10 | 8 | 3 | 9 | 11 |
| 1788 | 3 | 11 | 2 | 5 | 1 | 8 | 3 | 1 | 1 | 0 | 9 | 8 | 8 | 0 |
| 1789 | 6 | 0 | 7 | 11 | 9 | 3 | 7 | 1 | 9 | 1 | 9 | 11 | 0 | 0 |
| 1790 | 1 | 2 | 10 | 8 | 4 | 4 | 4 | 5 | 5 | 8 | 5 | 3 | 2 | 11 |
| 1791 | 7 | 4 | 4 | 9 | 11 | 10 | 7 | 8 | 5 | 9 | 6 | 7 | 7 | 7 |
| 1792 | 5 | 1 | 0 | 2 | 10 | 0 | 9 | 5 | 11 | 2 | 6 | 5 | 2 | 2 |
| 1793 | 1 | 4 | 10 | 6 | 5 | 10 | 2 | 3 | 7 | 7 | 1 | 1 | 5 | 6 |
| 1794 | 2 | 6 | 5 | 11 | 0 | 8 | 11 | 1 | 10 | 3 | 10 | 9 | 4 | 7 |
| 1795 | 8 | 8 | 7 | 10 | 4 | 1 | 1 | 9 | 3 | 10 | 0 | 8 | 9 | 3 |
| 1796 | 10 | 5 | 6 | 2 | 7 | 6 | 6 | 8 | 10 | 5 | 8 | 2 | 6 | 10 |
| 1797 | 3 | 11 | 9 | 2 | 1 | 4 | 8 | 6 | 2 | 4 | 2 | 1 | 1 | 7 |
| 1798 | 11 | 2 | 4 | 7 | 0 | 4 | 1 | 5 | 0 | 1 | 8 | 10 | 3 | 0 |
| 1799 | 11 | 8 | 1 | 2 | 11 | 9 | 2 | 2 | 1 | 6 | 4 | 6 | 0 | 5 |
| 1800 | 9 | 4 | 4 | 10 | 2 | 11 | 5 | 4 | 8 | 0 | 4 | 11 | 8 | 11 |
| 1801 | 3 | 4 | 1 | 8 | 10 | 5 | 11 | 8 | 4 | 2 | 2 | 6 | 10 | 1 |
| 1802 | 1 | 10 | 4 | 4 | 2 | 6 | 8 | 0 | 11 | 6 | 2 | 10 | 9 | 6 |
| 1803 | 2 | 9 | 11 | 8 | 8 | 11 | 7 | 10 | 7 | 6 | 2 | 2 | 2 | 7 |
| 1804 | 0 | 2 | 3 | 2 | 3 | 1 | 8 | 1 | 5 | 3 | 6 | 0 | 10 | 10 |
| 1805 | 3 | 3 | 10 | 5 | 4 | 9 | 9 | 0 | 0 | 10 | 4 | 5 | 1 | 11 |
| 1806 | 4 | 2 | 4 | 5 | 7 | 0 | 5 | 8 | 4 | 6 | 11 | 7 | 11 | 5 |
| 1807 | 4 | 11 | 10 | 11 | 0 | 3 | 9 | 2 | 6 | 5 | 5 | 1 | 0 | 1 |
| 1808 | 6 | 11 | 4 | 6 | 11 | 9 | 4 | 10 | 10 | 2 | 11 | 3 | 7 | 7 |
| 1809 | 8 | 10 | 6 | 7 | 7 | 5 | 9 | 1 | 6 | 8 | 9 | 4 | 7 | 11 |
| 1810 | 6 | 6 | 5 | 7 | 6 | 10 | 0 | 2 | 7 | 9 | 3 | 8 | 1 | 10 |
| 1811 | 0 | 6 | 8 | 1 | 10 | 5 | 7 | 2 | 6 | 7 | 6 | 11 | 4 | 6 |
| 1812 | 2 | 4 | 0 | 3 | 1 | 2 | 9 | 7 | 3 | 11 | 7 | 8 | 11 | 5 |
| 1813 | 0 | 5 | 4 | 7 | 6 | 5 | 8 | 4 | 1 | 10 | 1 | 1 | 2 | 2 |
| 1814 | 7 | 3 | 2 | 10 | 1 | 0 | 6 | 5 | 6 | 11 | 10 | 2 | 8 | 9 |
| 1815 | 4 | 7 | 5 | 0 | 3 | 5 | 5 | 11 | 8 | 7 | 1 | 6 | 9 | 9 |
| 1816 | 8 | 11 | 11 | 9 | 9 | 1 | 10 | 4 | 1 | 7 | 10 | 0 | 6 | 4 |
| 1817 | 1 | 8 | 3 | 0 | 10 | 7 | 0 | 10 | 0 | 5 | 2 | 5 | 11 | 8 |
| 1818 | 9 | 11 | 10 | 1 | 2 | 9 | 6 | 11 | 1 | 9 | 9 | 4 | 4 | 10 |
| 1819 | 0 | 9 | 3 | 9 | 5 | 5 | 3 | 3 | 10 | 0 | 8 | 8 | 3 | 4 |
| 1820 | 10 | 1 | 7 | 8 | 4 | 11 | 8 | 3 | 1 | 4 | 10 | 9 | 3 | 8 |
| 1821 | 3 | 4 | 8 | 11 | 7 | 8 | 7 | 0 | 11 | 0 | 5 | 2 | 7 | 0 |
| 1822 | 9 | 3 | 0 | 0 | 5 | 6 | 11 | 0 | 9 | 7 | 0 | 7 | 2 | 10 |
| 1823 | 5 | 10 | 6 | 1 | 1 | 3 | 5 | 3 | 4 | 5 | 10 | 3 | 9 | 3 |
| 1824 | 7 | 0 | 6 | 3 | 9 | 8 | 10 | 10 | 2 | 1 | 2 | 4 | 5 | 1 |
| 1825 | 6 | 0 | 7 | 4 | 0 | 2 | 5 | 8 | 2 | 8 | 8 | 5 | 0 | 7 |
| 1826 | 3 | 7 | 4 | 6 | 0 | 0 | 6 | 11 | 5 | 5 | 6 | 8 | 1 | 8 |
| 1827 | 7 | 1 | 1 | 5 | 10 | 10 | 0 | 1 | 5 | 8 | 7 | 10 | 8 | 0 |
| 1828 | 3 | 2 | 1 | 1 | 8 | 9 | 2 | 5 | 0 | 9 | 3 | 7 | 2 | 1 |
| 1829 | 11 | 0 | 4 | 1 | 3 | 0 | 10 | 9 | 1 | 10 | 6 | 10 | 0 | 3 |
| 1830 | 1 | 4 | 11 | 4 | 6 | 11 | 1 | 5 | 5 | 2 | 6 | 8 | 5 | 1 |
| 1831 | 8 | 10 | 1 | 10 | 10 | 4 | 2 | 2 | 4 | 0 | 9 | 7 | 3 | 6 |
| 1832 | 11 | 1 | 4 | 9 | 10 | 5 | 6 | 9 | 3 | 8 | 0 | 11 | 10 | 5 |
| 1833 | 11 | 4 | 2 | 7 | 1 | 9 | 5 | 0 | 10 | 10 | 2 | 1 | 10 | 4 |
| 1834 | 0 | 1 | 8 | 2 | 8 | 8 | 1 | 2 | 8 | 4 | 11 | 5 | 6 | 9 |
| 1835 | 9 | 4 | 0 | 9 | 8 | 8 | 3 | 10 | 6 | 5 | 4 | 2 | 10 | 2 |
| 1836 | 8 | 2 | 2 | 9 | 10 | 11 | 0 | 4 | 3 | 2 | 4 | 3 | 0 | 3 |
| 1837 | 1 | 1 | 5 | 5 | 8 | 1 | 2 | 0 | 6 | 3 | 10 | 6 | 3 | 5 |
| 1838 | 8 | 9 | 2 | 5 | 10 | 7 | 11 | 0 | 0 | 9 | 7 | 2 | 4 | 6 |
| 1839 | 7 | 4 | 1 | 6 | 2 | 5 | 6 | 6 | 10 | 0 | 0 | 0 | 4 | 7 |
| 1840 | 9 | 6 | 6 | 6 | 5 | 7 | 8 | 6 | 3 | 0 | 11 | 5 | 5 | 9 |
| 1841 | 3 | 6 | 6 | 0 | 2 | 1 | 7 | 5 | 9 | 2 | 11 | 6 | 1 | 10 |
| 1842 | 6 | 3 | 10 | 8 | 0 | 6 | 8 | 7 | 0 | 1 | 3 | 3 | 6 | 2 |
| 1843 | 10 | 7 | 4 | 5 | 11 | 8 | 10 | 0 | 3 | 6 | 9 | 6 | 4 | 9 |
| 1844 | 6 | 1 | 0 | 4 | 6 | 4 | 4 | 6 | 11 | 6 | 11 | 4 | 0 | 0 |
| 1845 | 2 | 5 | 4 | 9 | 0 | 11 | 5 | 9 | 7 | 4 | 5 | 10 | 9 | 8 |
| 1846 | 11 | 7 | 10 | 11 | 6 | 10 | 4 | 4 | 7 | 3 | 7 | 11 | 2 | 3 |
| 1847 | 5 | 1 | 11 | 11 | 9 | 9 | 6 | 10 | 1 | 8 | 5 | 2 | 11 | 6 |
| 1848 | 10 | 2 | 9 | 7 | 1 | 9 | 4 | 11 | 6 | 0 | 0 | 8 | 4 | 3 |
| 1849 | 0 | 3 | 10 | 4 | 4 | 8 | 4 | 9 | 4 | 1 | 5 | 4 | 11 | 4 |
| 1850 | 3 | 8 | 1 | 10 | 9 | 3 | 8 | 0 | 11 | 1 | 10 | 11 | 6 | 8 |
| 1851 | 4 | 3 | 3 | 0 | 4 | 2 | 2 | 5 | 4 | 9 | 0 | 11 | 1 | 7 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1852 | 0 | 4 | 7 | 7 | 3 | 0 | 1 | 3 | 3 | 9 | 11 | 3 | 3 | 2 |
| 1853 | 5 | 7 | 4 | 8 | 2 | 0 | 11 | 3 | 2 | 3 | 11 | 9 | 10 | 11 |
| 1854 | 0 | 5 | 1 | 1 | 7 | 6 | 4 | 11 | 8 | 4 | 10 | 7 | 8 | 3 |
| 1855 | 1 | 4 | 9 | 10 | 0 | 10 | 8 | 8 | 9 | 3 | 4 | 5 | 1 | 4 |
| 1856 | 0 | 2 | 7 | 8 | 10 | 7 | 6 | 1 | 11 | 11 | 1 | 11 | 5 | 8 |
| 1857 | 7 | 0 | 8 | 6 | 1 | 2 | 4 | 5 | 4 | 4 | 3 | 5 | 9 | 10 |
| 1858 | 4 | 5 | 6 | 0 | 10 | 1 | 4 | 4 | 2 | 9 | 1 | 8 | 4 | 1 |
| 1859 | 6 | 6 | 6 | 11 | 3 | 7 | 10 | 11 | 4 | 1 | 9 | 9 | 8 | 3 |
| 1860 | 10 | 1 | 1 | 9 | 4 | 6 | 1 | 5 | 5 | 1 | 2 | 11 | 11 | 11 |
| 1861 | 0 | 8 | 5 | 4 | 1 | 4 | 0 | 5 | 0 | 4 | 4 | 2 | 4 | 3 |
| 1862 | 9 | 8 | 8 | 0 | 0 | 11 | 1 | 10 | 11 | 11 | 7 | 4 | 3 | 6 |
| 1863 | 6 | 8 | 7 | 9 | 4 | 10 | 7 | 4 | 2 | 6 | 3 | 3 | 4 | 0 |
| 1864 | 5 | 9 | 5 | 8 | 11 | 0 | 2 | 7 | 9 | 4 | 6 | 7 | 4 | 7 |
| 1865 | 9 | 0 | 8 | 10 | 9 | 0 | 2 | 2 | 5 | 2 | 7 | 3 | 0 | 11 |
| 1866 | 7 | 7 | 6 | 2 | 5 | 4 | 7 | 2 | 1 | 10 | 11 | 2 | 10 | 8 |
| 1867 | 4 | 11 | 11 | 3 | 6 | 8 | 3 | 10 | 3 | 7 | 9 | 10 | 3 | 10 |
| 1868 | 3 | 10 | 11 | 5 | 5 | 11 | 7 | 5 | 3 | 10 | 3 | 9 | 3 | 4 |
| 1869 | 9 | 5 | 0 | 10 | 7 | 2 | 0 | 4 | 10 | 11 | 3 | 3 | 9 | 6 |
| 1870 | 2 | 11 | 0 | 7 | 8 | 2 | 0 | 6 | 8 | 10 | 1 | 5 | 8 | 1 |
| 1871 | 8 | 4 | 3 | 9 | 8 | 4 | 7 | 7 | 1 | 2 | 1 | 11 | 4 | 11 |
| 1872 | 6 | 10 | 4 | 8 | 11 | 7 | 3 | 5 | 9 | 3 | 10 | 6 | 5 | 2 |
| 1873 | 4 | 2 | 10 | 10 | 8 | 4 | 5 | 7 | 7 | 8 | 3 | 4 | 8 | 4 |
| 1874 | 6 | 3 | 5 | 3 | 2 | 8 | 2 | 9 | 6 | 6 | 4 | 5 | 2 | 3 |
| 1875 | 0 | 9 | 1 | 2 | 7 | 4 | 10 | 2 | 5 | 9 | 7 | 11 | 5 | 2 |
| 1876 | 10 | 8 | 3 | 8 | 11 | 8 | 9 | 2 | 5 | 8 | 8 | 9 | 9 | 7 |
| 1877 | 1 | 2 | 3 | 3 | 4 | 8 | 10 | 8 | 0 | 11 | 3 | 6 | 3 | 7 |
| 1878 | 7 | 2 | 8 | 1 | 1 | 8 | 1 | 3 | 7 | 2 | 7 | 10 | 10 | 8 |
| 1879 | 10 | 10 | 2 | 6 | 2 | 7 | 9 | 11 | 8 | 2 | 11 | 7 | 6 | 2 |
| 1880 | 8 | 8 | 0 | 3 | 2 | 6 | 5 | 10 | 1 | 1 | 0 | 10 | 10 | 7 |
| 1881 | 9 | 8 | 2 | 3 | 1 | 2 | 10 | 10 | 9 | 9 | 9 | 1 | 0 | 2 |
| 1882 | 11 | 10 | 5 | 0 | 4 | 5 | 3 | 4 | 5 | 8 | 5 | 5 | 4 | 2 |
| 1883 | 9 | 8 | 11 | 4 | 1 | 10 | 4 | 11 | 11 | 3 | 6 | 0 | 7 | 8 |
| 1884 | 5 | 4 | 0 | 1 | 0 | 5 | 9 | 9 | 6 | 1 | 2 | 0 | 3 | 10 |
| 1885 | 7 | 11 | 5 | 5 | 9 | 2 | 10 | 11 | 10 | 5 | 4 | 8 | 7 | 0 |
| 1886 | 9 | 3 | 2 | 11 | 3 | 11 | 2 | 3 | 3 | 8 | 7 | 0 | 8 | 8 |
| 1887 | 6 | 9 | 10 | 10 | 9 | 9 | 8 | 10 | 3 | 0 | 2 | 6 | 9 | 10 |
| 1888 | 8 | 11 | 10 | 4 | 8 | 5 | 7 | 1 | 2 | 1 | 6 | 7 | 2 | 8 |
| 1889 | 5 | 1 | 10 | 11 | 7 | 4 | 4 | 9 | 6 | 10 | 9 | 10 | 4 | 8 |
| 1890 | 3 | 10 | 8 | 5 | 1 | 5 | 9 | 9 | 7 | 4 | 8 | 11 | 0 | 3 |
| 1891 | 2 | 2 | 6 | 1 | 11 | 0 | 7 | 1 | 6 | 1 | 1 | 2 | 6 | 2 |
| 1892 | 3 | 1 | 9 | 6 | 6 | 4 | 3 | 9 | 4 | 5 | 10 | 11 | 8 | 10 |
| 1893 | 0 | 2 | 1 | 11 | 5 | 7 | 10 | 6 | 10 | 10 | 10 | 6 | 11 | 11 |
| 1894 | 1 | 6 | 1 | 9 | 9 | 5 | 0 | 6 | 3 | 11 | 6 | 9 | 11 | 10 |
| 1895 | 0 | 6 | 0 | 11 | 8 | 3 | 2 | 3 | 5 | 11 | 11 | 1 | 4 | 5 |
| 1896 | 1 | 3 | 5 | 6 | 3 | 2 | 9 | 2 | 9 | 1 | 0 | 3 | 10 | 9 |
| 1897 | 3 | 3 | 3 | 4 | 8 | 7 | 7 | 3 | 7 | 7 | 0 | 10 | 11 | 5 |
| 1898 | 5 | 6 | 10 | 0 | 1 | 2 | 11 | 2 | 11 | 0 | 0 | 10 | 8 | 11 |
| 1899 | 0 | 7 | 9 | 11 | 7 | 0 | 5 | 6 | 1 | 1 | 2 | 0 | 2 | 6 |
| 1900 | 11 | 8 | 1 | 8 | 7 | 2 | 11 | 9 | 8 | 7 | 8 | 8 | 11 | 6 |
| 1901 | 0 | 2 | 2 | 8 | 8 | 1 | 9 | 8 | 7 | 5 | 8 | 3 | 1 | 9 |
| 1902 | 11 | 8 | 10 | 5 | 11 | 0 | 0 | 11 | 5 | 11 | 0 | 2 | 11 | 11 |
| 1903 | 8 | 6 | 11 | 11 | 10 | 7 | 3 | 5 | 10 | 5 | 0 | 1 | 6 | 9 |
| 1904 | 1 | 9 | 8 | 11 | 0 | 7 | 0 | 9 | 7 | 11 | 9 | 3 | 7 | 9 |
| 1905 | 11 | 7 | 7 | 3 | 0 | 2 | 3 | 10 | 4 | 1 | 1 | 9 | 4 | 11 |
| 1906 | 5 | 10 | 8 | 4 | 6 | 3 | 9 | 10 | 8 | 10 | 1 | 8 | 4 | 10 |
| 1907 | 5 | 2 | 6 | 3 | 9 | 3 | 0 | 8 | 10 | 4 | 11 | 10 | 8 | 8 |
| 1908 | 2 | 0 | 1 | 7 | 8 | 6 | 5 | 7 | 0 | 4 | 9 | 1 | 11 | 7 |
| 1909 | 3 | 9 | 6 | 4 | 6 | 6 | 10 | 0 | 5 | 10 | 0 | 9 | 7 | 7 |
| 1910 | 5 | 2 | 9 | 10 | 5 | 4 | 2 | 6 | 8 | 3 | 5 | 11 | 9 | 9 |
| 1911 | 3 | 7 | 8 | 7 | 10 | 10 | 2 | 8 | 6 | 10 | 3 | 10 | 5 | 5 |
| 1912 | 0 | 9 | 7 | 7 | 7 | 8 | 11 | 1 | 2 | 5 | 8 | 7 | 10 | 0 |
| 1913 | 8 | 0 | 7 | 3 | 7 | 3 | 3 | 1 | 11 | 0 | 10 | 3 | 8 | 9 |
| 1914 | 10 | 0 | 0 | 4 | 5 | 10 | 1 | 7 | 6 | 11 | 5 | 1 | 9 | 8 |
| 1915 | 1 | 11 | 6 | 6 | 1 | 11 | 11 | 7 | 1 | 10 | 5 | 6 | 9 | 4 |
| 1916 | 2 | 5 | 4 | 3 | 10 | 2 | 0 | 0 | 11 | 7 | 8 | 6 | 7 | 10 |
| 1917 | 9 | 7 | 7 | 9 | 1 | 1 | 6 | 1 | 6 | 4 | 3 | 8 | 2 | 7 |
| 1918 | 3 | 1 | 3 | 3 | 5 | 4 | 11 | 8 | 5 | 9 | 6 | 10 | 2 | 9 |
| 1919 | 7 | 2 | 1 | 0 | 2 | 10 | 8 | 7 | 3 | 3 | 5 | 9 | 5 | 1 |
| 1920 | 10 | 9 | 6 | 11 | 10 | 0 | 3 | 7 | 0 | 7 | 2 | 4 | 7 | 4 |
| 1921 | 4 | 1 | 4 | 7 | 7 | 4 | 9 | 11 | 10 | 0 | 10 | 9 | 0 | 6 |
| 1922 | 4 | 9 | 1 | 6 | 6 | 10 | 1 | 10 | 11 | 4 | 3 | 7 | 7 | 2 |
| 1923 | 3 | 8 | 10 | 3 | 10 | 7 | 5 | 9 | 2 | 2 | 10 | 2 | 3 | 5 |
| 1924 | 6 | 7 | 2 | 0 | 2 | 3 | 8 | 8 | 4 | 2 | 9 | 0 | 2 | 0 |
| 1925 | 2 | 6 | 3 | 8 | 11 | 5 | 6 | 7 | 8 | 3 | 3 | 2 | 3 | 5 |
| 1926 | 6 | 10 | 9 | 5 | 8 | 4 | 6 | 7 | 10 | 4 | 7 | 7 | 6 | 1 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 1927 | 4 | 6 | 11 | 2 | 11 | 7 | 0 | 0 | 3 | 1 | 3 | 7 | 9 | 8 |
| 1928 | 1 | 5 | 3 | 2 | 0 | 11 | 3 | 5 | 2 | 9 | 10 | 7 | 0 | 5 |
| 1929 | 6 | 9 | 8 | 0 | 6 | 0 | 11 | 9 | 5 | 7 | 3 | 0 | 8 | 3 |
| 1930 | 11 | 6 | 8 | 7 | 10 | 9 | 9 | 4 | 5 | 5 | 7 | 9 | 7 | 10 |
| 1931 | 1 | 7 | 0 | 8 | 5 | 8 | 6 | 11 | 10 | 7 | 11 | 3 | 11 | 0 |
| 1932 | 6 | 6 | 7 | 4 | 9 | 6 | 1 | 4 | 11 | 9 | 7 | 2 | 10 | 11 |
| 1933 | 10 | 10 | 3 | 5 | 0 | 2 | 6 | 11 | 9 | 0 | 9 | 3 | 2 | 5 |
| 1934 | 9 | 5 | 11 | 7 | 4 | 7 | 1 | 7 | 2 | 11 | 8 | 5 | 4 | 4 |
| 1935 | 5 | 3 | 1 | 3 | 3 | 10 | 3 | 8 | 8 | 1 | 6 | 6 | 11 | 2 |
| 1936 | 5 | 9 | 5 | 2 | 6 | 3 | 7 | 9 | 1 | 8 | 9 | 4 | 1 | 0 |
| 1937 | 11 | 5 | 3 | 4 | 1 | 11 | 8 | 7 | 11 | 11 | 9 | 11 | 8 | 7 |
| 1938 | 0 | 4 | 2 | 1 | 4 | 3 | 1 | 1 | 7 | 7 | 5 | 5 | 7 | 7 |
| 1939 | 7 | 9 | 0 | 4 | 7 | 5 | 0 | 10 | 0 | 2 | 0 | 7 | 0 | 11 |
| 1940 | 7 | 5 | 11 | 6 | 8 | 2 | 2 | 7 | 11 | 0 | 4 | 4 | 6 | 6 |
| 1941 | 11 | 0 | 9 | 2 | 6 | 10 | 9 | 7 | 9 | 5 | 0 | 8 | 0 | 2 |
| 1942 | 10 | 2 | 2 | 3 | 9 | 0 | 6 | 7 | 1 | 9 | 0 | 3 | 6 | 0 |
| 1943 | 2 | 10 | 0 | 5 | 6 | 9 | 7 | 2 | 2 | 8 | 10 | 0 | 4 | 11 |
| 1944 | 1 | 0 | 3 | 3 | 0 | 6 | 9 | 9 | 8 | 4 | 6 | 8 | 6 | 0 |
| 1945 | 9 | 9 | 11 | 0 | 9 | 7 | 5 | 3 | 1 | 6 | 3 | 1 | 3 | 10 |
| 1946 | 10 | 11 | 5 | 1 | 3 | 1 | 6 | 7 | 4 | 11 | 1 | 10 | 10 | 7 |
| 1947 | 4 | 10 | 9 | 10 | 6 | 4 | 11 | 8 | 3 | 10 | 8 | 1 | 7 | 5 |
| 1948 | 5 | 1 | 2 | 1 | 3 | 6 | 7 | 4 | 7 | 6 | 8 | 4 | 6 | 1 |
| 1949 | 11 | 10 | 10 | 8 | 2 | 3 | 7 | 8 | 11 | 8 | 0 | 8 | 6 | 1 |
| 1950 | 7 | 3 | 9 | 0 | 9 | 9 | 1 | 9 | 7 | 3 | 8 | 0 | 1 | 10 |
| 1951 | 8 | 5 | 9 | 8 | 6 | 11 | 4 | 11 | 10 | 8 | 2 | 6 | 7 | 9 |
| 1952 | 8 | 8 | 1 | 4 | 0 | 4 | 4 | 0 | 7 | 9 | 0 | 6 | 2 | 4 |
| 1953 | 6 | 2 | 2 | 6 | 5 | 1 | 0 | 2 | 6 | 10 | 0 | 0 | 8 | 4 |
| 1954 | 10 | 3 | 4 | 6 | 8 | 3 | 0 | 8 | 9 | 11 | 5 | 8 | 3 | 10 |
| 1955 | 2 | 10 | 7 | 7 | 2 | 1 | 6 | 9 | 1 | 6 | 11 | 0 | 0 | 9 |
| 1956 | 11 | 7 | 1 | 9 | 9 | 3 | 3 | 11 | 0 | 2 | 11 | 5 | 9 | 5 |
| 1957 | 6 | 0 | 11 | 8 | 10 | 6 | 1 | 2 | 9 | 4 | 1 | 9 | 0 | 1 |
| 1958 | 4 | 0 | 9 | 5 | 8 | 2 | 8 | 3 | 6 | 6 | 4 | 3 | 5 | 10 |
| 1959 | 1 | 0 | 0 | 6 | 6 | 4 | 8 | 3 | 9 | 9 | 8 | 9 | 6 | 11 |
| 1960 | 3 | 5 | 3 | 2 | 9 | 0 | 6 | 1 | 9 | 6 | 2 | 11 | 9 | 4 |
| 1961 | 5 | 4 | 9 | 6 | 8 | 6 | 6 | 5 | 11 | 7 | 11 | 8 | 0 | 11 |
| 1962 | 3 | 0 | 7 | 11 | 11 | 6 | 4 | 4 | 3 | 2 | 1 | 6 | 11 | 2 |
| 1963 | 2 | 9 | 0 | 9 | 10 | 3 | 2 | 9 | 4 | 3 | 1 | 8 | 5 | 3 |
| 1964 | 2 | 7 | 7 | 4 | 3 | 9 | 11 | 5 | 11 | 10 | 0 | 0 | 1 | 6 |
| 1965 | 2 | 4 | 6 | 3 | 7 | 4 | 3 | 5 | 8 | 8 | 5 | 1 | 3 | 1 |
| 1966 | 5 | 5 | 8 | 10 | 3 | 1 | 1 | 11 | 4 | 3 | 8 | 2 | 11 | 5 |
| 1967 | 10 | 9 | 3 | 1 | 2 | 3 | 0 | 11 | 3 | 10 | 6 | 6 | 10 | 1 |
| 1968 | 9 | 0 | 9 | 4 | 5 | 7 | 5 | 5 | 4 | 7 | 1 | 2 | 6 | 0 |
| 1969 | 11 | 5 | 11 | 4 | 2 | 6 | 0 | 3 | 8 | 7 | 5 | 1 | 2 | 0 |
| 1970 | 7 | 11 | 8 | 9 | 11 | 11 | 3 | 0 | 3 | 9 | 5 | 5 | 2 | 6 |
| 1971 | 0 | 10 | 5 | 2 | 3 | 7 | 2 | 8 | 3 | 2 | 1 | 2 | 0 | 1 |
| 1972 | 8 | 9 | 5 | 1 | 8 | 6 | 9 | 8 | 3 | 9 | 5 | 1 | 6 | 8 |
| 1973 | 11 | 9 | 2 | 11 | 8 | 8 | 5 | 9 | 3 | 1 | 6 | 8 | 4 | 10 |
| 1974 | 5 | 11 | 11 | 3 | 2 | 5 | 5 | 0 | 7 | 2 | 3 | 5 | 7 | 11 |
| 1975 | 2 | 10 | 7 | 11 | 4 | 3 | 11 | 10 | 6 | 9 | 2 | 11 | 6 | 5 |
| 1976 | 9 | 1 | 11 | 1 | 5 | 8 | 8 | 9 | 8 | 8 | 1 | 10 | 7 | 2 |
| 1977 | 11 | 1 | 10 | 3 | 5 | 1 | 4 | 7 | 1 | 4 | 2 | 2 | 8 | 10 |
| 1978 | 7 | 9 | 4 | 8 | 1 | 1 | 2 | 4 | 5 | 5 | 1 | 5 | 8 | 4 |
| 1979 | 4 | 6 | 10 | 9 | 9 | 4 | 8 | 9 | 5 | 1 | 8 | 5 | 10 | 1 |
| 1980 | 10 | 7 | 9 | 2 | 6 | 9 | 1 | 10 | 2 | 7 | 4 | 9 | 11 | 9 |
| 1981 | 6 | 3 | 2 | 0 | 4 | 5 | 9 | 7 | 1 | 6 | 8 | 10 | 7 | 8 |
| 1982 | 9 | 3 | 10 | 10 | 6 | 3 | 9 | 1 | 2 | 6 | 9 | 11 | 10 | 2 |
| 1983 | 0 | 7 | 0 | 6 | 1 | 1 | 11 | 6 | 7 | 8 | 7 | 1 | 8 | 2 |
| 1984 | 1 | 7 | 2 | 2 | 2 | 11 | 5 | 6 | 0 | 5 | 1 | 2 | 5 | 4 |
| 1985 | 7 | 4 | 0 | 9 | 2 | 2 | 11 | 0 | 2 | 10 | 10 | 11 | 1 | 0 |
| 1986 | 8 | 4 | 11 | 7 | 6 | 6 | 7 | 1 | 4 | 10 | 7 | 3 | 11 | 0 |
| 1987 | 5 | 11 | 8 | 8 | 4 | 10 | 10 | 2 | 2 | 10 | 9 | 4 | 7 | 2 |
| 1988 | 10 | 5 | 2 | 1 | 11 | 5 | 0 | 2 | 2 | 5 | 11 | 8 | 7 | 5 |
| 1989 | 7 | 1 | 5 | 9 | 7 | 10 | 7 | 9 | 0 | 5 | 2 | 2 | 3 | 6 |
| 1990 | 2 | 11 | 10 | 7 | 6 | 11 | 3 | 9 | 0 | 2 | 8 | 7 | 4 | 3 |
| 1991 | 3 | 5 | 5 | 0 | 5 | 8 | 9 | 4 | 3 | 5 | 4 | 7 | 8 | 9 |
| 1992 | 4 | 7 | 9 | 2 | 11 | 8 | 4 | 4 | 8 | 0 | 5 | 1 | 10 | 6 |
| 1993 | 1 | 6 | 7 | 3 | 8 | 11 | 10 | 0 | 4 | 4 | 0 | 2 | 11 | 6 |
| 1994 | 5 | 8 | 2 | 7 | 2 | 7 | 3 | 1 | 5 | 3 | 7 | 8 | 0 | 7 |
| 1995 | 10 | 1 | 8 | 7 | 0 | 2 | 10 | 6 | 10 | 7 | 5 | 1 | 5 | 3 |
| 1996 | 10 | 9 | 3 | 5 | 1 | 1 | 5 | 10 | 2 | 6 | 8 | 10 | 6 | 2 |
| 1997 | 2 | 6 | 7 | 10 | 1 | 2 | 6 | 6 | 7 | 1 | 6 | 7 | 6 | 0 |
| 1998 | 8 | 6 | 6 | 2 | 3 | 10 | 5 | 0 | 2 | 3 | 4 | 6 | 6 | 0 |
| 1999 | 5 | 4 | 5 | 10 | 7 | 9 | 3 | 1 | 9 | 11 | 1 | 6 | 6 | 3 |
| 2000 | 10 | 7 | 1 | 6 | 3 | 3 | 2 | 1 | 10 | 9 | 1 | 11 | 7 | 4 |
| 2001 | 8 | 10 | 7 | 8 | 1 | 10 | 10 | 5 | 5 | 2 | 7 | 7 | 11 | 10 |

-continued

Example #5 of a group-based CS hopping pattern

| m | $n_{cs}(n)$ | | | | | | | | | | | | | |
|---|---|---|---|---|---|---|---|---|---|---|---|---|---|---|
| 2002 | 3 | 3 | 11 | 9 | 7 | 7 | 4 | 8 | 5 | 0 | 9 | 0 | 3 | 2 |
| 2003 | 4 | 1 | 0 | 9 | 1 | 9 | 7 | 10 | 9 | 3 | 7 | 6 | 2 | 8 |
| 2004 | 1 | 10 | 10 | 8 | 6 | 1 | 3 | 6 | 7 | 0 | 3 | 5 | 9 | 7 |
| 2005 | 6 | 5 | 9 | 6 | 9 | 0 | 7 | 4 | 1 | 2 | 5 | 7 | 3 | 5 |
| 2006 | 7 | 5 | 4 | 0 | 4 | 9 | 10 | 1 | 4 | 2 | 4 | 9 | 3 | 2 |
| 2007 | 11 | 6 | 5 | 2 | 5 | 1 | 10 | 1 | 8 | 0 | 3 | 4 | 6 | 11 |
| 2008 | 9 | 6 | 0 | 5 | 0 | 3 | 5 | 4 | 0 | 7 | 2 | 6 | 1 | 8 |
| 2009 | 3 | 7 | 7 | 3 | 6 | 5 | 4 | 7 | 10 | 6 | 0 | 1 | 5 | 4 |
| 2010 | 5 | 2 | 2 | 0 | 6 | 1 | 11 | 5 | 4 | 8 | 2 | 8 | 3 | 8 |
| 2011 | 6 | 3 | 7 | 10 | 5 | 8 | 5 | 6 | 4 | 10 | 2 | 9 | 1 | 2 |
| 2012 | 7 | 3 | 7 | 5 | 9 | 1 | 5 | 3 | 0 | 11 | 9 | 4 | 2 | 6 |
| 2013 | 9 | 0 | 7 | 10 | 6 | 6 | 8 | 11 | 7 | 11 | 0 | 10 | 1 | 1 |
| 2014 | 5 | 11 | 6 | 9 | 7 | 7 | 1 | 4 | 4 | 4 | 2 | 6 | 5 | 0 |
| 2015 | 7 | 11 | 2 | 6 | 10 | 0 | 3 | 10 | 8 | 3 | 6 | 0 | 5 | 5 |
| 2016 | 11 | 6 | 0 | 6 | 0 | 6 | 11 | 2 | 8 | 11 | 4 | 3 | 3 | 3 |
| 2017 | 0 | 3 | 7 | 6 | 2 | 4 | 9 | 0 | 2 | 11 | 2 | 2 | 7 | 4 |
| 2018 | 5 | 8 | 0 | 9 | 11 | 11 | 6 | 1 | 7 | 0 | 6 | 0 | 11 | 5 |
| 2019 | 10 | 6 | 9 | 1 | 4 | 1 | 11 | 3 | 11 | 3 | 4 | 7 | 2 | 2 |
| 2020 | 6 | 8 | 0 | 6 | 8 | 10 | 10 | 9 | 3 | 8 | 2 | 7 | 1 | 11 |
| 2021 | 2 | 3 | 9 | 0 | 2 | 5 | 0 | 6 | 11 | 9 | 3 | 1 | 10 | 2 |
| 2022 | 6 | 0 | 8 | 8 | 3 | 3 | 0 | 6 | 7 | 6 | 10 | 0 | 4 | 5 |
| 2023 | 4 | 3 | 1 | 5 | 1 | 11 | 7 | 1 | 1 | 5 | 4 | 11 | 6 | 9 |
| 2024 | 10 | 2 | 11 | 4 | 0 | 3 | 2 | 4 | 3 | 0 | 10 | 9 | 9 | 2 |
| 2025 | 7 | 10 | 10 | 4 | 0 | 8 | 0 | 1 | 9 | 10 | 2 | 0 | 10 | 3 |
| 2026 | 3 | 4 | 11 | 5 | 8 | 10 | 10 | 2 | 10 | 9 | 10 | 2 | 8 | 3 |
| 2027 | 11 | 11 | 6 | 0 | 5 | 10 | 8 | 0 | 1 | 5 | 1 | 0 | 11 | 5 |
| 2028 | 3 | 11 | 9 | 0 | 11 | 3 | 2 | 9 | 9 | 8 | 7 | 10 | 2 | 11 |
| 2029 | 11 | 8 | 3 | 1 | 5 | 8 | 7 | 5 | 10 | 6 | 9 | 2 | 1 | 6 |
| 2030 | 9 | 7 | 10 | 3 | 8 | 6 | 7 | 5 | 1 | 8 | 10 | 5 | 9 | 9 |
| 2031 | 10 | 0 | 6 | 7 | 8 | 0 | 2 | 0 | 8 | 6 | 8 | 11 | 10 | 3 |
| 2032 | 1 | 1 | 8 | 9 | 7 | 8 | 3 | 1 | 4 | 10 | 6 | 4 | 9 | 1 |
| 2033 | 4 | 6 | 6 | 8 | 7 | 8 | 7 | 11 | 7 | 4 | 7 | 0 | 9 | 11 |
| 2034 | 6 | 8 | 6 | 0 | 8 | 9 | 3 | 8 | 7 | 1 | 4 | 1 | 4 | 6 |
| 2035 | 6 | 1 | 1 | 11 | 11 | 1 | 9 | 7 | 9 | 0 | 5 | 4 | 3 | 3 |
| 2036 | 6 | 11 | 8 | 10 | 4 | 7 | 5 | 10 | 1 | 4 | 6 | 2 | 0 | 4 |
| 2037 | 9 | 11 | 3 | 8 | 4 | 4 | 0 | 1 | 11 | 2 | 11 | 6 | 9 | 9 |
| 2038 | 7 | 11 | 2 | 1 | 6 | 4 | 11 | 0 | 7 | 1 | 11 | 3 | 11 | 10 |
| 2039 | 1 | 4 | 4 | 2 | 4 | 7 | 4 | 11 | 11 | 5 | 3 | 11 | 4 | 10 |
| 2040 | 7 | 2 | 7 | 2 | 9 | 11 | 9 | 0 | 8 | 10 | 7 | 7 | 5 | 9 |
| 2041 | 5 | 11 | 4 | 2 | 11 | 7 | 6 | 8 | 8 | 7 | 7 | 9 | 8 | 4 |
| 2042 | 2 | 5 | 11 | 2 | 10 | 9 | 8 | 3 | 0 | 6 | 7 | 7 | 11 | 2 |
| 2043 | 1 | 10 | 0 | 11 | 4 | 0 | 1 | 0 | 4 | 0 | 7 | 4 | 8 | 11 |
| 2044 | 7 | 6 | 5 | 8 | 0 | 11 | 3 | 8 | 5 | 6 | 4 | 11 | 10 | 10 |
| 2045 | 3 | 11 | 10 | 3 | 7 | 6 | 11 | 3 | 4 | 6 | 3 | 0 | 4 | 6 |
| 2046 | 0 | 10 | 11 | 1 | 3 | 6 | 11 | 9 | 5 | 0 | 2 | 3 | 4 | 4 |
| 2047 | 9 | 4 | 5 | 6 | 10 | 1 | 5 | 7 | 5 | 6 | 0 | 5 | 0 | 0 |

Example #6 of a Group-Based CS Hopping Pattern

Example #6 of a group-based CS hopping pattern

| m | $n_{cs}(n)$ | | | | | | | | | | | | | |
|---|---|---|---|---|---|---|---|---|---|---|---|---|---|---|
| 0 | 10 | 10 | 5 | 8 | 9 | 1 | 9 | 2 | 9 | 5 | 4 | 3 | 4 | 10 |
| 1 | 9 | 5 | 2 | 4 | 1 | 8 | 4 | 1 | 11 | 4 | 2 | 0 | 11 | 0 |
| 2 | 2 | 1 | 0 | 10 | 6 | 7 | 0 | 6 | 8 | 11 | 3 | 1 | 2 | 1 |
| 3 | 7 | 2 | 1 | 6 | 5 | 5 | 10 | 7 | 10 | 3 | 1 | 2 | 3 | 11 |
| 4 | 6 | 8 | 8 | 3 | 8 | 10 | 1 | 9 | 3 | 9 | 9 | 4 | 7 | 6 |
| 5 | 5 | 0 | 11 | 4 | 11 | 3 | 9 | 11 | 6 | 9 | 5 | 10 | 9 | 2 |
| 6 | 9 | 10 | 9 | 7 | 0 | 2 | 5 | 4 | 6 | 11 | 11 | 7 | 1 | 3 |
| 7 | 0 | 3 | 8 | 2 | 9 | 0 | 3 | 7 | 4 | 0 | 8 | 9 | 0 | 1 |
| 8 | 1 | 0 | 4 | 6 | 10 | 11 | 6 | 2 | 7 | 2 | 11 | 6 | 10 | 8 |
| 9 | 8 | 4 | 11 | 0 | 2 | 4 | 7 | 8 | 11 | 2 | 7 | 7 | 7 | 7 |
| 10 | 6 | 6 | 10 | 3 | 4 | 6 | 4 | 8 | 1 | 7 | 0 | 1 | 5 | 10 |
| 11 | 0 | 7 | 4 | 7 | 4 | 7 | 10 | 9 | 9 | 2 | 9 | 8 | 9 | 4 |
| 12 | 6 | 0 | 2 | 10 | 9 | 0 | 8 | 0 | 0 | 3 | 1 | 4 | 4 | 0 |
| 13 | 7 | 8 | 7 | 4 | 3 | 2 | 2 | 11 | 0 | 8 | 2 | 6 | 6 | 8 |
| 14 | 4 | 6 | 5 | 0 | 8 | 6 | 10 | 5 | 9 | 9 | 5 | 0 | 2 | 5 |
| 15 | 10 | 7 | 5 | 1 | 7 | 7 | 6 | 1 | 2 | 10 | 6 | 1 | 3 | 8 |
| 16 | 9 | 4 | 2 | 8 | 7 | 9 | 8 | 2 | 4 | 1 | 11 | 11 | 9 | 7 |
| 17 | 2 | 10 | 3 | 7 | 4 | 10 | 9 | 3 | 7 | 0 | 7 | 11 | 10 | 2 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 18 | 10 | 11 | 0 | 9 | 1 | 11 | 5 | 5 | 1 | 3 | 4 | 10 | 6 | 3 |
| 19 | 11 | 5 | 11 | 11 | 9 | 6 | 5 | 6 | 3 | 10 | 0 | 9 | 7 | 11 |
| 20 | 3 | 7 | 11 | 4 | 10 | 9 | 5 | 8 | 5 | 8 | 3 | 2 | 8 | 0 |
| 21 | 10 | 9 | 1 | 2 | 2 | 9 | 1 | 3 | 2 | 11 | 5 | 2 | 9 | 1 |
| 22 | 9 | 9 | 6 | 0 | 4 | 5 | 6 | 10 | 10 | 9 | 11 | 1 | 7 | 9 |
| 23 | 8 | 3 | 10 | 11 | 0 | 1 | 10 | 11 | 5 | 7 | 5 | 7 | 3 | 4 |
| 24 | 7 | 8 | 10 | 6 | 9 | 4 | 11 | 3 | 9 | 4 | 3 | 9 | 9 | 2 |
| 25 | 3 | 1 | 9 | 3 | 4 | 8 | 7 | 2 | 9 | 6 | 2 | 5 | 2 | 3 |
| 26 | 6 | 5 | 0 | 6 | 3 | 7 | 10 | 0 | 4 | 0 | 6 | 6 | 8 | 9 |
| 27 | 6 | 2 | 9 | 8 | 7 | 3 | 10 | 6 | 1 | 2 | 8 | 10 | 7 | 5 |
| 28 | 1 | 7 | 6 | 6 | 0 | 3 | 4 | 11 | 9 | 11 | 1 | 11 | 5 | 7 |
| 29 | 11 | 6 | 3 | 9 | 4 | 3 | 3 | 7 | 10 | 4 | 10 | 3 | 1 | 6 |
| 30 | 1 | 4 | 10 | 9 | 1 | 3 | 8 | 6 | 0 | 9 | 7 | 5 | 3 | 1 |
| 31 | 11 | 11 | 9 | 5 | 1 | 5 | 1 | 11 | 5 | 0 | 9 | 2 | 11 | 9 |
| 32 | 0 | 4 | 7 | 7 | 3 | 1 | 8 | 3 | 5 | 11 | 1 | 1 | 11 | 5 |
| 33 | 4 | 2 | 0 | 10 | 10 | 10 | 6 | 0 | 11 | 1 | 2 | 5 | 0 | 11 |
| 34 | 7 | 11 | 4 | 3 | 6 | 9 | 3 | 10 | 1 | 6 | 5 | 9 | 3 | 0 |
| 35 | 8 | 1 | 3 | 2 | 7 | 4 | 10 | 1 | 10 | 8 | 9 | 4 | 4 | 3 |
| 36 | 8 | 1 | 4 | 7 | 9 | 4 | 7 | 0 | 7 | 6 | 4 | 9 | 10 | 9 |
| 37 | 4 | 2 | 10 | 6 | 2 | 11 | 3 | 1 | 3 | 8 | 3 | 6 | 11 | 10 |
| 38 | 7 | 11 | 8 | 2 | 3 | 8 | 7 | 8 | 10 | 1 | 0 | 8 | 10 | 11 |
| 39 | 9 | 1 | 0 | 3 | 4 | 11 | 3 | 6 | 3 | 3 | 1 | 7 | 0 | 6 |
| 40 | 6 | 5 | 11 | 3 | 10 | 9 | 0 | 3 | 8 | 4 | 7 | 11 | 5 | 6 |
| 41 | 11 | 4 | 3 | 8 | 5 | 1 | 0 | 0 | 0 | 4 | 4 | 9 | 7 | 3 |
| 42 | 7 | 7 | 0 | 3 | 1 | 11 | 10 | 7 | 6 | 6 | 0 | 1 | 2 | 5 |
| 43 | 8 | 1 | 5 | 8 | 6 | 10 | 9 | 11 | 11 | 6 | 8 | 8 | 3 | 2 |
| 44 | 6 | 11 | 1 | 5 | 6 | 0 | 10 | 10 | 11 | 4 | 2 | 8 | 1 | 9 |
| 45 | 11 | 3 | 9 | 6 | 6 | 9 | 10 | 5 | 2 | 3 | 10 | 4 | 8 | 4 |
| 46 | 6 | 3 | 0 | 7 | 6 | 1 | 3 | 6 | 4 | 2 | 5 | 4 | 5 | 3 |
| 47 | 5 | 4 | 5 | 3 | 3 | 3 | 0 | 1 | 10 | 8 | 5 | 1 | 6 | 11 |
| 48 | 2 | 8 | 10 | 7 | 5 | 4 | 3 | 9 | 11 | 5 | 2 | 8 | 5 | 0 |
| 49 | 0 | 5 | 5 | 10 | 0 | 11 | 9 | 8 | 5 | 11 | 10 | 9 | 0 | 3 |
| 50 | 11 | 8 | 0 | 0 | 6 | 2 | 8 | 1 | 4 | 8 | 3 | 0 | 4 | 7 |
| 51 | 4 | 4 | 5 | 1 | 0 | 2 | 7 | 11 | 4 | 1 | 8 | 3 | 4 | 5 |
| 52 | 2 | 8 | 2 | 7 | 6 | 5 | 5 | 2 | 4 | 9 | 9 | 6 | 8 | 1 |
| 53 | 8 | 11 | 4 | 11 | 0 | 6 | 7 | 3 | 2 | 8 | 9 | 1 | 9 | 2 |
| 54 | 5 | 0 | 2 | 5 | 2 | 10 | 4 | 11 | 7 | 5 | 4 | 7 | 6 | 0 |
| 55 | 9 | 11 | 6 | 6 | 8 | 4 | 1 | 6 | 3 | 10 | 2 | 3 | 5 | 4 |
| 56 | 3 | 8 | 2 | 8 | 9 | 2 | 3 | 2 | 1 | 3 | 7 | 9 | 11 | 6 |
| 57 | 9 | 1 | 7 | 11 | 11 | 5 | 0 | 1 | 7 | 5 | 8 | 8 | 11 | 7 |
| 58 | 3 | 4 | 9 | 0 | 2 | 7 | 2 | 11 | 2 | 6 | 4 | 2 | 4 | 11 |
| 59 | 1 | 10 | 11 | 3 | 7 | 0 | 1 | 11 | 4 | 7 | 5 | 4 | 0 | 10 |
| 60 | 9 | 2 | 8 | 8 | 8 | 7 | 8 | 6 | 5 | 6 | 5 | 7 | 4 | 1 |
| 61 | 10 | 11 | 9 | 11 | 3 | 11 | 2 | 10 | 9 | 11 | 1 | 7 | 9 | 10 |
| 62 | 11 | 9 | 11 | 1 | 11 | 3 | 1 | 2 | 3 | 4 | 9 | 11 | 3 | 0 |
| 63 | 8 | 0 | 2 | 3 | 0 | 7 | 6 | 1 | 4 | 9 | 5 | 5 | 11 | 7 |
| 64 | 5 | 2 | 1 | 5 | 9 | 9 | 6 | 11 | 6 | 11 | 6 | 9 | 7 | 7 |
| 65 | 11 | 1 | 6 | 4 | 3 | 5 | 6 | 5 | 9 | 0 | 1 | 10 | 6 | 6 |
| 66 | 2 | 3 | 1 | 9 | 1 | 6 | 2 | 9 | 1 | 2 | 10 | 2 | 3 | 4 |
| 67 | 6 | 9 | 0 | 2 | 11 | 5 | 2 | 1 | 4 | 1 | 1 | 1 | 6 | 8 |
| 68 | 2 | 11 | 7 | 6 | 7 | 3 | 9 | 2 | 10 | 11 | 8 | 7 | 11 | 11 |
| 69 | 10 | 5 | 7 | 1 | 5 | 0 | 11 | 2 | 1 | 10 | 10 | 3 | 0 | 4 |
| 70 | 5 | 9 | 8 | 1 | 1 | 0 | 6 | 2 | 6 | 8 | 8 | 5 | 5 | 9 |
| 71 | 10 | 0 | 0 | 0 | 0 | 6 | 5 | 11 | 11 | 8 | 8 | 9 | 0 | 6 |
| 72 | 1 | 9 | 4 | 2 | 2 | 4 | 0 | 5 | 8 | 8 | 2 | 6 | 3 | 4 |
| 73 | 7 | 3 | 6 | 5 | 6 | 10 | 2 | 4 | 8 | 7 | 10 | 6 | 11 | 5 |
| 74 | 5 | 10 | 11 | 11 | 2 | 10 | 7 | 9 | 0 | 4 | 1 | 4 | 3 | 4 |
| 75 | 4 | 4 | 8 | 10 | 10 | 8 | 5 | 3 | 6 | 5 | 6 | 6 | 11 | 0 |
| 76 | 6 | 9 | 2 | 2 | 1 | 8 | 6 | 6 | 5 | 0 | 11 | 8 | 1 | 4 |
| 77 | 3 | 7 | 3 | 8 | 6 | 5 | 0 | 5 | 10 | 7 | 11 | 8 | 1 | 1 |
| 78 | 9 | 11 | 0 | 1 | 3 | 10 | 3 | 0 | 10 | 8 | 4 | 0 | 11 | 4 |
| 79 | 7 | 8 | 5 | 9 | 11 | 11 | 7 | 7 | 5 | 8 | 4 | 5 | 9 | 10 |
| 80 | 10 | 3 | 2 | 10 | 8 | 4 | 6 | 2 | 2 | 6 | 9 | 9 | 1 | 5 |
| 81 | 7 | 3 | 8 | 5 | 10 | 8 | 0 | 0 | 7 | 11 | 2 | 3 | 3 | 8 |
| 82 | 4 | 11 | 9 | 4 | 8 | 10 | 8 | 7 | 11 | 9 | 4 | 6 | 9 | 0 |
| 83 | 3 | 0 | 4 | 9 | 11 | 2 | 9 | 4 | 9 | 2 | 6 | 7 | 8 | 10 |
| 84 | 3 | 6 | 1 | 5 | 5 | 4 | 8 | 1 | 9 | 1 | 0 | 0 | 8 | 8 |
| 85 | 11 | 5 | 9 | 3 | 1 | 4 | 5 | 5 | 4 | 5 | 6 | 3 | 9 | 2 |
| 86 | 8 | 4 | 0 | 1 | 3 | 6 | 6 | 3 | 7 | 7 | 11 | 3 | 6 | 3 |
| 87 | 6 | 7 | 10 | 2 | 6 | 0 | 9 | 7 | 9 | 7 | 7 | 5 | 11 | 3 |
| 88 | 1 | 3 | 3 | 10 | 2 | 10 | 8 | 1 | 6 | 11 | 8 | 2 | 1 | 11 |
| 89 | 8 | 10 | 8 | 10 | 7 | 10 | 0 | 9 | 1 | 11 | 10 | 11 | 5 | 5 |
| 90 | 1 | 5 | 1 | 10 | 4 | 7 | 5 | 4 | 0 | 9 | 9 | 4 | 11 | 11 |
| 91 | 0 | 7 | 0 | 1 | 5 | 5 | 7 | 1 | 3 | 3 | 5 | 4 | 9 | 9 |
| 92 | 0 | 5 | 11 | 5 | 1 | 1 | 7 | 10 | 2 | 0 | 0 | 10 | 2 | 4 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 93 | 5 | 8 | 4 | 7 | 7 | 0 | 3 | 8 | 0 | 2 | 7 | 3 | 2 | 2 |
| 94 | 2 | 7 | 8 | 8 | 7 | 10 | 10 | 5 | 4 | 6 | 7 | 9 | 6 | 9 |
| 95 | 8 | 6 | 2 | 7 | 11 | 2 | 11 | 6 | 3 | 1 | 0 | 1 | 11 | 3 |
| 96 | 0 | 0 | 9 | 9 | 5 | 0 | 4 | 4 | 3 | 6 | 2 | 2 | 7 | 1 |
| 97 | 6 | 10 | 5 | 4 | 6 | 0 | 6 | 9 | 5 | 3 | 5 | 11 | 8 | 1 |
| 98 | 5 | 11 | 0 | 9 | 4 | 7 | 3 | 11 | 8 | 1 | 2 | 11 | 10 | 0 |
| 99 | 0 | 10 | 5 | 11 | 5 | 7 | 5 | 5 | 10 | 8 | 2 | 7 | 2 | 6 |
| 100 | 10 | 4 | 0 | 4 | 8 | 3 | 3 | 10 | 3 | 6 | 6 | 1 | 4 | 4 |
| 101 | 4 | 3 | 8 | 2 | 11 | 10 | 1 | 5 | 1 | 1 | 3 | 3 | 8 | 3 |
| 102 | 5 | 10 | 2 | 4 | 8 | 7 | 5 | 4 | 3 | 0 | 10 | 3 | 8 | 10 |
| 103 | 9 | 6 | 10 | 1 | 6 | 11 | 2 | 4 | 0 | 4 | 8 | 5 | 6 | 2 |
| 104 | 9 | 1 | 1 | 11 | 4 | 3 | 6 | 4 | 5 | 2 | 4 | 11 | 6 | 10 |
| 105 | 1 | 2 | 10 | 7 | 6 | 4 | 10 | 0 | 2 | 11 | 1 | 5 | 7 | 8 |
| 106 | 11 | 4 | 3 | 5 | 9 | 8 | 9 | 8 | 10 | 8 | 3 | 10 | 2 | 2 |
| 107 | 8 | 7 | 2 | 5 | 4 | 8 | 10 | 6 | 6 | 5 | 7 | 2 | 3 | 7 |
| 108 | 10 | 9 | 7 | 9 | 0 | 4 | 8 | 10 | 7 | 3 | 6 | 11 | 2 | 1 |
| 109 | 4 | 2 | 5 | 8 | 2 | 1 | 6 | 6 | 6 | 3 | 7 | 1 | 2 | 3 |
| 110 | 6 | 9 | 6 | 9 | 10 | 6 | 3 | 2 | 11 | 1 | 5 | 0 | 7 | 7 |
| 111 | 2 | 5 | 9 | 7 | 2 | 2 | 4 | 10 | 2 | 1 | 10 | 5 | 9 | 7 |
| 112 | 9 | 0 | 7 | 8 | 1 | 9 | 4 | 10 | 0 | 10 | 9 | 8 | 7 | 4 |
| 113 | 0 | 8 | 6 | 0 | 7 | 7 | 11 | 7 | 3 | 3 | 10 | 0 | 5 | 11 |
| 114 | 10 | 6 | 3 | 1 | 11 | 10 | 9 | 0 | 6 | 7 | 1 | 4 | 7 | 7 |
| 115 | 6 | 8 | 11 | 0 | 5 | 8 | 10 | 0 | 3 | 6 | 7 | 10 | 1 | 8 |
| 116 | 7 | 8 | 11 | 8 | 0 | 3 | 8 | 2 | 6 | 0 | 6 | 7 | 0 | 4 |
| 117 | 8 | 9 | 3 | 10 | 8 | 5 | 7 | 7 | 3 | 5 | 3 | 7 | 2 | 6 |
| 118 | 2 | 8 | 11 | 3 | 10 | 0 | 4 | 4 | 9 | 10 | 3 | 3 | 10 | 3 |
| 119 | 7 | 1 | 7 | 8 | 10 | 4 | 11 | 9 | 6 | 6 | 1 | 4 | 8 | 1 |
| 120 | 9 | 8 | 3 | 4 | 10 | 4 | 9 | 5 | 0 | 4 | 5 | 11 | 2 | 11 |
| 121 | 1 | 4 | 8 | 11 | 7 | 9 | 11 | 8 | 8 | 3 | 9 | 5 | 8 | 9 |
| 122 | 3 | 2 | 0 | 3 | 8 | 3 | 6 | 7 | 8 | 9 | 8 | 9 | 8 | 10 |
| 123 | 9 | 0 | 1 | 9 | 8 | 4 | 6 | 0 | 8 | 1 | 7 | 1 | 11 | 6 |
| 124 | 0 | 10 | 6 | 10 | 11 | 3 | 7 | 8 | 2 | 1 | 5 | 11 | 1 | 6 |
| 125 | 8 | 0 | 9 | 6 | 11 | 10 | 0 | 6 | 9 | 8 | 3 | 4 | 10 | 11 |
| 126 | 11 | 11 | 7 | 0 | 3 | 5 | 9 | 4 | 6 | 6 | 5 | 3 | 2 | 8 |
| 127 | 9 | 0 | 8 | 5 | 1 | 3 | 1 | 8 | 11 | 5 | 1 | 1 | 4 | 2 |
| 128 | 2 | 4 | 0 | 3 | 9 | 0 | 6 | 9 | 11 | 0 | 4 | 10 | 3 | 7 |
| 129 | 10 | 0 | 6 | 2 | 4 | 4 | 8 | 5 | 11 | 2 | 1 | 5 | 9 | 9 |
| 130 | 5 | 6 | 10 | 11 | 10 | 6 | 6 | 4 | 11 | 11 | 10 | 6 | 4 | 9 |
| 131 | 1 | 0 | 9 | 7 | 7 | 6 | 10 | 3 | 6 | 6 | 3 | 3 | 9 | 10 |
| 132 | 4 | 8 | 7 | 6 | 4 | 9 | 10 | 7 | 8 | 7 | 4 | 9 | 0 | 6 |
| 133 | 11 | 3 | 7 | 9 | 5 | 10 | 7 | 6 | 4 | 6 | 3 | 6 | 0 | 2 |
| 134 | 2 | 1 | 10 | 0 | 11 | 1 | 4 | 7 | 5 | 0 | 9 | 0 | 1 | 7 |
| 135 | 0 | 11 | 8 | 6 | 4 | 2 | 7 | 10 | 6 | 9 | 1 | 9 | 6 | 7 |
| 136 | 0 | 4 | 6 | 11 | 8 | 10 | 9 | 1 | 4 | 5 | 3 | 1 | 10 | 1 |
| 137 | 9 | 8 | 11 | 1 | 2 | 9 | 5 | 1 | 9 | 2 | 2 | 11 | 1 | 1 |
| 138 | 0 | 3 | 5 | 2 | 3 | 8 | 11 | 9 | 7 | 5 | 3 | 2 | 4 | 5 |
| 139 | 7 | 9 | 2 | 0 | 0 | 9 | 3 | 11 | 3 | 5 | 11 | 4 | 11 | 11 |
| 140 | 6 | 3 | 4 | 2 | 0 | 2 | 11 | 4 | 11 | 10 | 2 | 1 | 5 | 6 |
| 141 | 8 | 7 | 10 | 2 | 7 | 9 | 2 | 2 | 11 | 2 | 8 | 1 | 2 | 4 |
| 142 | 5 | 1 | 4 | 6 | 10 | 10 | 4 | 10 | 5 | 4 | 6 | 8 | 11 | 11 |
| 143 | 6 | 1 | 6 | 6 | 3 | 0 | 7 | 4 | 10 | 2 | 5 | 2 | 0 | 5 |
| 144 | 8 | 9 | 5 | 5 | 8 | 10 | 11 | 9 | 6 | 10 | 2 | 10 | 0 | 8 |
| 145 | 5 | 9 | 6 | 11 | 1 | 6 | 2 | 8 | 3 | 9 | 1 | 10 | 2 | 3 |
| 146 | 8 | 10 | 6 | 2 | 6 | 1 | 3 | 4 | 2 | 4 | 7 | 7 | 8 | 11 |
| 147 | 2 | 5 | 10 | 9 | 0 | 5 | 0 | 0 | 9 | 4 | 2 | 1 | 8 | 11 |
| 148 | 1 | 2 | 5 | 0 | 3 | 2 | 5 | 10 | 4 | 0 | 9 | 5 | 10 | 0 |
| 149 | 5 | 0 | 4 | 1 | 6 | 1 | 10 | 3 | 3 | 3 | 11 | 10 | 3 | 1 |
| 150 | 6 | 2 | 9 | 2 | 2 | 6 | 1 | 1 | 0 | 10 | 11 | 3 | 3 | 0 |
| 151 | 5 | 8 | 3 | 0 | 9 | 10 | 1 | 2 | 8 | 2 | 5 | 6 | 5 | 7 |
| 152 | 4 | 6 | 6 | 5 | 8 | 2 | 6 | 3 | 7 | 0 | 4 | 2 | 5 | 11 |
| 153 | 0 | 2 | 11 | 10 | 4 | 7 | 0 | 1 | 5 | 5 | 2 | 0 | 3 | 9 |
| 154 | 10 | 10 | 6 | 3 | 8 | 0 | 11 | 1 | 7 | 11 | 0 | 10 | 2 | 2 |
| 155 | 4 | 0 | 4 | 11 | 1 | 9 | 6 | 4 | 2 | 1 | 0 | 4 | 3 | 7 |
| 156 | 4 | 5 | 7 | 5 | 8 | 1 | 9 | 9 | 8 | 8 | 9 | 11 | 6 | 10 |
| 157 | 7 | 1 | 4 | 6 | 8 | 3 | 5 | 8 | 8 | 3 | 2 | 7 | 4 | 5 |
| 158 | 0 | 9 | 9 | 8 | 6 | 1 | 4 | 9 | 5 | 10 | 6 | 7 | 9 | 6 |
| 159 | 11 | 9 | 10 | 2 | 10 | 1 | 7 | 10 | 11 | 8 | 9 | 7 | 11 | 8 |
| 160 | 6 | 11 | 2 | 0 | 8 | 4 | 3 | 3 | 6 | 1 | 10 | 5 | 6 | 2 |
| 161 | 11 | 6 | 2 | 7 | 9 | 6 | 1 | 10 | 1 | 5 | 8 | 2 | 1 | 5 |
| 162 | 11 | 5 | 5 | 8 | 3 | 8 | 3 | 4 | 1 | 1 | 9 | 6 | 6 | 3 |
| 163 | 5 | 11 | 9 | 7 | 9 | 8 | 3 | 1 | 7 | 11 | 5 | 5 | 8 | 1 |
| 164 | 2 | 3 | 2 | 5 | 3 | 3 | 7 | 5 | 0 | 7 | 9 | 10 | 4 | 11 |
| 165 | 2 | 6 | 8 | 4 | 0 | 6 | 8 | 2 | 2 | 7 | 4 | 3 | 8 | 5 |
| 166 | 11 | 1 | 5 | 10 | 7 | 4 | 11 | 8 | 9 | 1 | 11 | 3 | 11 | 0 |
| 167 | 9 | 2 | 6 | 4 | 3 | 9 | 3 | 11 | 2 | 2 | 3 | 5 | 3 | 3 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 168 | 1 | 1 | 7 | 7 | 6 | 0 | 8 | 9 | 0 | 7 | 9 | 2 | 5 | 9 |
| 169 | 6 | 4 | 7 | 5 | 4 | 11 | 11 | 8 | 9 | 11 | 7 | 6 | 10 | 11 |
| 170 | 11 | 4 | 10 | 6 | 11 | 3 | 10 | 8 | 5 | 5 | 8 | 9 | 5 | 9 |
| 171 | 2 | 1 | 9 | 1 | 0 | 10 | 11 | 5 | 2 | 5 | 11 | 0 | 2 | 8 |
| 172 | 10 | 9 | 9 | 3 | 4 | 9 | 0 | 7 | 10 | 0 | 0 | 8 | 11 | 0 |
| 173 | 2 | 3 | 5 | 6 | 10 | 8 | 1 | 1 | 4 | 2 | 4 | 8 | 6 | 2 |
| 174 | 4 | 10 | 0 | 2 | 7 | 6 | 1 | 8 | 3 | 2 | 0 | 11 | 11 | 1 |
| 175 | 0 | 6 | 3 | 0 | 11 | 0 | 7 | 10 | 8 | 11 | 3 | 8 | 10 | 10 |
| 176 | 1 | 11 | 1 | 3 | 11 | 10 | 4 | 4 | 10 | 11 | 6 | 5 | 2 | 0 |
| 177 | 3 | 11 | 5 | 10 | 4 | 6 | 9 | 1 | 0 | 3 | 0 | 5 | 9 | 6 |
| 178 | 2 | 0 | 1 | 0 | 4 | 5 | 10 | 1 | 7 | 4 | 10 | 7 | 0 | 1 |
| 179 | 7 | 0 | 3 | 4 | 5 | 11 | 2 | 10 | 8 | 5 | 0 | 3 | 8 | 9 |
| 180 | 11 | 7 | 8 | 3 | 10 | 11 | 9 | 3 | 0 | 11 | 11 | 8 | 6 | 7 |
| 181 | 3 | 1 | 10 | 2 | 3 | 1 | 1 | 5 | 4 | 2 | 7 | 6 | 7 | 10 |
| 182 | 3 | 2 | 8 | 7 | 11 | 1 | 9 | 2 | 7 | 10 | 0 | 8 | 7 | 5 |
| 183 | 1 | 0 | 4 | 11 | 11 | 5 | 8 | 10 | 5 | 10 | 1 | 0 | 0 | 6 |
| 184 | 9 | 0 | 1 | 2 | 10 | 5 | 11 | 11 | 1 | 10 | 6 | 10 | 4 | 3 |
| 185 | 1 | 8 | 3 | 1 | 2 | 6 | 6 | 9 | 8 | 6 | 10 | 1 | 8 | 5 |
| 186 | 2 | 11 | 9 | 10 | 11 | 2 | 8 | 9 | 10 | 6 | 11 | 8 | 6 | 10 |
| 187 | 5 | 11 | 6 | 8 | 9 | 11 | 8 | 6 | 1 | 8 | 11 | 0 | 3 | 9 |
| 188 | 6 | 3 | 3 | 8 | 1 | 7 | 5 | 8 | 7 | 0 | 0 | 2 | 7 | 8 |
| 189 | 10 | 7 | 11 | 0 | 10 | 7 | 8 | 9 | 8 | 11 | 5 | 4 | 1 | 3 |
| 190 | 2 | 2 | 6 | 5 | 1 | 0 | 4 | 6 | 5 | 4 | 7 | 6 | 6 | 2 |
| 191 | 11 | 1 | 4 | 10 | 0 | 0 | 1 | 9 | 3 | 11 | 7 | 5 | 8 | 7 |
| 192 | 1 | 8 | 11 | 9 | 8 | 2 | 3 | 3 | 2 | 5 | 3 | 4 | 1 | 9 |
| 193 | 2 | 6 | 1 | 6 | 4 | 1 | 7 | 8 | 3 | 8 | 11 | 0 | 7 | 2 |
| 194 | 0 | 6 | 7 | 5 | 0 | 8 | 3 | 3 | 8 | 10 | 5 | 3 | 4 | 3 |
| 195 | 9 | 7 | 1 | 6 | 11 | 7 | 3 | 3 | 7 | 9 | 2 | 1 | 9 | 3 |
| 196 | 7 | 4 | 10 | 4 | 0 | 11 | 5 | 9 | 7 | 9 | 2 | 2 | 2 | 2 |
| 197 | 8 | 2 | 1 | 4 | 1 | 8 | 7 | 0 | 6 | 7 | 0 | 5 | 9 | 1 |
| 198 | 10 | 2 | 7 | 11 | 6 | 7 | 1 | 8 | 2 | 7 | 3 | 9 | 6 | 0 |
| 199 | 10 | 7 | 1 | 10 | 9 | 10 | 5 | 10 | 10 | 7 | 0 | 6 | 4 | 2 |
| 200 | 3 | 1 | 4 | 11 | 9 | 5 | 3 | 6 | 9 | 7 | 3 | 6 | 5 | 8 |
| 201 | 9 | 3 | 3 | 1 | 0 | 8 | 10 | 7 | 0 | 10 | 11 | 6 | 11 | 9 |
| 202 | 7 | 10 | 3 | 0 | 3 | 3 | 4 | 3 | 4 | 3 | 10 | 2 | 0 | 8 |
| 203 | 5 | 6 | 9 | 4 | 2 | 11 | 0 | 8 | 10 | 6 | 7 | 9 | 5 | 1 |
| 204 | 10 | 9 | 8 | 3 | 2 | 6 | 10 | 1 | 5 | 3 | 8 | 4 | 10 | 5 |
| 205 | 8 | 7 | 11 | 11 | 8 | 1 | 2 | 7 | 10 | 1 | 6 | 11 | 8 | 1 |
| 206 | 7 | 4 | 5 | 9 | 9 | 4 | 1 | 2 | 6 | 9 | 10 | 1 | 7 | 8 |
| 207 | 0 | 11 | 7 | 4 | 9 | 3 | 8 | 5 | 2 | 10 | 10 | 2 | 7 | 7 |
| 208 | 0 | 1 | 2 | 9 | 7 | 3 | 10 | 4 | 4 | 3 | 1 | 5 | 10 | 4 |
| 209 | 7 | 11 | 6 | 3 | 1 | 8 | 8 | 9 | 2 | 0 | 7 | 3 | 4 | 6 |
| 210 | 8 | 3 | 0 | 7 | 2 | 5 | 8 | 2 | 0 | 4 | 2 | 10 | 9 | 2 |
| 211 | 2 | 6 | 11 | 2 | 8 | 7 | 5 | 7 | 1 | 11 | 1 | 10 | 5 | 0 |
| 212 | 10 | 3 | 7 | 10 | 1 | 11 | 4 | 9 | 4 | 8 | 8 | 3 | 11 | 8 |
| 213 | 0 | 9 | 6 | 5 | 9 | 2 | 1 | 4 | 0 | 9 | 0 | 8 | 3 | 6 |
| 214 | 5 | 2 | 6 | 8 | 11 | 6 | 5 | 7 | 9 | 7 | 2 | 7 | 9 | 0 |
| 215 | 9 | 11 | 7 | 10 | 2 | 8 | 10 | 5 | 1 | 7 | 6 | 4 | 5 | 8 |
| 216 | 10 | 6 | 8 | 4 | 2 | 7 | 4 | 7 | 6 | 2 | 11 | 0 | 9 | 6 |
| 217 | 3 | 9 | 2 | 11 | 7 | 8 | 7 | 10 | 6 | 10 | 4 | 3 | 8 | 0 |
| 218 | 1 | 4 | 11 | 5 | 5 | 5 | 11 | 5 | 7 | 6 | 5 | 9 | 4 | 2 |
| 219 | 4 | 9 | 8 | 0 | 9 | 7 | 8 | 11 | 4 | 2 | 10 | 1 | 2 | 0 |
| 220 | 8 | 10 | 0 | 10 | 5 | 0 | 1 | 10 | 7 | 10 | 1 | 7 | 3 | 9 |
| 221 | 4 | 1 | 3 | 9 | 3 | 7 | 2 | 8 | 11 | 6 | 3 | 4 | 11 | 5 |
| 222 | 10 | 6 | 2 | 9 | 2 | 10 | 6 | 3 | 0 | 9 | 6 | 10 | 0 | 9 |
| 223 | 3 | 10 | 3 | 11 | 6 | 11 | 11 | 6 | 11 | 9 | 4 | 10 | 4 | 4 |
| 224 | 1 | 1 | 4 | 3 | 1 | 2 | 0 | 10 | 6 | 2 | 10 | 10 | 5 | 2 |
| 225 | 2 | 2 | 8 | 5 | 6 | 5 | 3 | 3 | 0 | 6 | 1 | 0 | 10 | 10 |
| 226 | 11 | 5 | 8 | 7 | 7 | 9 | 5 | 7 | 9 | 9 | 3 | 8 | 0 | 8 |
| 227 | 0 | 9 | 1 | 1 | 9 | 3 | 4 | 3 | 8 | 6 | 8 | 0 | 1 | 2 |
| 228 | 4 | 1 | 2 | 0 | 6 | 11 | 2 | 9 | 9 | 0 | 6 | 11 | 0 | 8 |
| 229 | 0 | 2 | 10 | 11 | 1 | 8 | 9 | 5 | 3 | 2 | 4 | 2 | 0 | 11 |
| 230 | 4 | 10 | 7 | 3 | 2 | 5 | 2 | 0 | 10 | 5 | 2 | 0 | 7 | 0 |
| 231 | 4 | 7 | 5 | 11 | 10 | 1 | 8 | 8 | 1 | 0 | 10 | 10 | 10 | 8 |
| 232 | 1 | 6 | 5 | 3 | 10 | 2 | 2 | 5 | 2 | 4 | 4 | 9 | 0 | 8 |
| 233 | 9 | 5 | 1 | 3 | 6 | 2 | 7 | 6 | 9 | 0 | 9 | 0 | 5 | 10 |
| 234 | 1 | 5 | 9 | 5 | 11 | 11 | 1 | 1 | 3 | 5 | 5 | 0 | 10 | 5 |
| 235 | 5 | 6 | 6 | 10 | 7 | 4 | 3 | 0 | 1 | 9 | 0 | 6 | 1 | 7 |
| 236 | 5 | 9 | 5 | 4 | 9 | 2 | 5 | 0 | 2 | 6 | 3 | 6 | 2 | 5 |
| 237 | 4 | 9 | 5 | 8 | 1 | 5 | 1 | 1 | 8 | 4 | 6 | 5 | 1 | 11 |
| 238 | 2 | 8 | 3 | 10 | 5 | 9 | 11 | 7 | 6 | 1 | 7 | 1 | 6 | 4 |
| 239 | 3 | 4 | 11 | 6 | 4 | 1 | 6 | 0 | 1 | 7 | 10 | 8 | 3 | 11 |
| 240 | 11 | 0 | 6 | 8 | 7 | 0 | 1 | 2 | 10 | 9 | 1 | 9 | 10 | 1 |
| 241 | 8 | 3 | 2 | 11 | 10 | 11 | 5 | 1 | 9 | 4 | 11 | 9 | 5 | 9 |
| 242 | 0 | 3 | 0 | 4 | 7 | 4 | 9 | 4 | 2 | 1 | 4 | 10 | 5 | 9 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 243 | 4 | 10 | 2 | 5 | 6 | 4 | 4 | 7 | 1 | 1 | 2 | 1 | 4 | 1 |
| 244 | 0 | 1 | 11 | 10 | 10 | 6 | 1 | 6 | 6 | 1 | 9 | 2 | 10 | 8 |
| 245 | 6 | 5 | 4 | 4 | 6 | 3 | 2 | 2 | 7 | 4 | 6 | 9 | 2 | 7 |
| 246 | 11 | 7 | 8 | 1 | 2 | 4 | 4 | 5 | 10 | 10 | 10 | 11 | 10 | 10 |
| 247 | 3 | 10 | 1 | 1 | 9 | 8 | 2 | 4 | 6 | 3 | 5 | 10 | 10 | 11 |
| 248 | 11 | 10 | 3 | 2 | 0 | 9 | 4 | 0 | 5 | 0 | 2 | 5 | 9 | 5 |
| 249 | 7 | 2 | 4 | 8 | 0 | 9 | 1 | 0 | 4 | 2 | 1 | 0 | 1 | 9 |
| 250 | 7 | 5 | 9 | 7 | 5 | 5 | 7 | 5 | 0 | 10 | 0 | 11 | 5 | 8 |
| 251 | 3 | 2 | 11 | 1 | 5 | 11 | 0 | 9 | 2 | 2 | 11 | 1 | 5 | 4 |
| 252 | 7 | 1 | 11 | 9 | 2 | 1 | 10 | 0 | 11 | 0 | 4 | 1 | 5 | 1 |
| 253 | 10 | 2 | 4 | 6 | 7 | 2 | 0 | 5 | 3 | 1 | 7 | 8 | 10 | 5 |
| 254 | 1 | 11 | 2 | 4 | 0 | 1 | 2 | 3 | 1 | 2 | 3 | 10 | 4 | 7 |
| 255 | 11 | 11 | 5 | 2 | 1 | 6 | 11 | 3 | 10 | 4 | 5 | 7 | 5 | 7 |
| 256 | 11 | 2 | 6 | 2 | 2 | 3 | 10 | 3 | 5 | 7 | 5 | 1 | 8 | 5 |
| 257 | 6 | 0 | 7 | 6 | 3 | 9 | 9 | 6 | 1 | 1 | 11 | 11 | 2 | 2 |
| 258 | 8 | 11 | 11 | 8 | 7 | 7 | 11 | 4 | 9 | 2 | 6 | 3 | 5 | 8 |
| 259 | 2 | 8 | 0 | 10 | 10 | 1 | 4 | 11 | 8 | 4 | 7 | 4 | 1 | 9 |
| 260 | 11 | 3 | 1 | 3 | 9 | 2 | 2 | 5 | 10 | 9 | 7 | 0 | 11 | 7 |
| 261 | 1 | 1 | 5 | 9 | 11 | 8 | 8 | 11 | 3 | 5 | 4 | 9 | 8 | 3 |
| 262 | 9 | 10 | 4 | 2 | 5 | 10 | 5 | 10 | 9 | 6 | 0 | 0 | 2 | 9 |
| 263 | 8 | 6 | 4 | 6 | 4 | 6 | 0 | 3 | 4 | 0 | 8 | 10 | 3 | 4 |
| 264 | 0 | 9 | 8 | 4 | 1 | 1 | 8 | 7 | 11 | 6 | 3 | 5 | 0 | 7 |
| 265 | 5 | 11 | 2 | 10 | 5 | 3 | 1 | 1 | 2 | 4 | 1 | 0 | 7 | 5 |
| 266 | 0 | 7 | 6 | 1 | 5 | 1 | 3 | 0 | 5 | 5 | 9 | 11 | 3 | 6 |
| 267 | 5 | 5 | 3 | 2 | 3 | 11 | 0 | 1 | 4 | 11 | 4 | 5 | 5 | 2 |
| 268 | 9 | 2 | 7 | 1 | 0 | 10 | 4 | 4 | 3 | 1 | 1 | 2 | 0 | 8 |
| 269 | 3 | 1 | 3 | 10 | 7 | 1 | 5 | 8 | 6 | 6 | 2 | 11 | 5 | 1 |
| 270 | 7 | 5 | 2 | 6 | 6 | 7 | 4 | 5 | 10 | 6 | 11 | 9 | 8 | 11 |
| 271 | 3 | 0 | 11 | 0 | 11 | 4 | 4 | 3 | 6 | 4 | 9 | 1 | 2 | 3 |
| 272 | 8 | 4 | 9 | 9 | 10 | 9 | 10 | 1 | 7 | 3 | 7 | 10 | 2 | 10 |
| 273 | 7 | 8 | 6 | 7 | 4 | 10 | 11 | 6 | 11 | 4 | 9 | 3 | 11 | 10 |
| 274 | 4 | 0 | 0 | 9 | 6 | 2 | 11 | 6 | 5 | 3 | 6 | 6 | 9 | 0 |
| 275 | 6 | 10 | 9 | 2 | 8 | 1 | 9 | 2 | 10 | 9 | 2 | 7 | 10 | 5 |
| 276 | 5 | 2 | 3 | 5 | 11 | 0 | 3 | 6 | 8 | 0 | 1 | 10 | 11 | 7 |
| 277 | 3 | 9 | 10 | 3 | 4 | 6 | 8 | 9 | 3 | 4 | 6 | 2 | 1 | 6 |
| 278 | 8 | 0 | 6 | 3 | 6 | 9 | 2 | 7 | 3 | 0 | 4 | 3 | 0 | 9 |
| 279 | 2 | 6 | 5 | 11 | 10 | 4 | 6 | 6 | 3 | 9 | 6 | 3 | 7 | 5 |
| 280 | 6 | 4 | 11 | 8 | 11 | 8 | 5 | 2 | 0 | 3 | 10 | 8 | 11 | 4 |
| 281 | 10 | 11 | 4 | 7 | 9 | 1 | 7 | 6 | 9 | 9 | 5 | 8 | 1 | 11 |
| 282 | 1 | 10 | 8 | 11 | 7 | 11 | 6 | 7 | 1 | 4 | 2 | 4 | 6 | 8 |
| 283 | 5 | 0 | 8 | 4 | 0 | 5 | 6 | 8 | 7 | 2 | 0 | 9 | 3 | 9 |
| 284 | 10 | 4 | 2 | 3 | 10 | 3 | 5 | 9 | 8 | 1 | 3 | 5 | 3 | 2 |
| 285 | 2 | 8 | 7 | 7 | 8 | 6 | 2 | 5 | 7 | 8 | 0 | 1 | 7 | 6 |
| 286 | 9 | 3 | 10 | 6 | 1 | 4 | 3 | 9 | 5 | 11 | 8 | 4 | 8 | 7 |
| 287 | 2 | 1 | 11 | 2 | 9 | 9 | 8 | 1 | 0 | 1 | 2 | 6 | 9 | 8 |
| 288 | 1 | 9 | 11 | 9 | 4 | 0 | 9 | 7 | 2 | 0 | 10 | 6 | 4 | 2 |
| 289 | 6 | 7 | 2 | 7 | 1 | 2 | 7 | 8 | 11 | 7 | 7 | 1 | 2 | 8 |
| 290 | 8 | 7 | 0 | 3 | 0 | 3 | 1 | 4 | 4 | 8 | 7 | 8 | 4 | 1 |
| 291 | 1 | 4 | 3 | 6 | 11 | 4 | 0 | 7 | 10 | 10 | 3 | 11 | 9 | 5 |
| 292 | 1 | 1 | 10 | 8 | 8 | 10 | 6 | 0 | 8 | 10 | 10 | 5 | 10 | 0 |
| 293 | 8 | 3 | 7 | 11 | 2 | 0 | 7 | 0 | 5 | 1 | 2 | 3 | 1 | 1 |
| 294 | 3 | 9 | 0 | 2 | 5 | 7 | 7 | 9 | 5 | 0 | 5 | 0 | 10 | 1 |
| 295 | 5 | 0 | 10 | 10 | 4 | 4 | 2 | 0 | 8 | 7 | 8 | 3 | 3 | 5 |
| 296 | 6 | 9 | 11 | 1 | 4 | 1 | 2 | 6 | 7 | 3 | 2 | 3 | 2 | 8 |
| 297 | 10 | 11 | 5 | 0 | 11 | 3 | 0 | 5 | 4 | 2 | 4 | 0 | 4 | 11 |
| 298 | 10 | 9 | 9 | 7 | 3 | 11 | 11 | 0 | 1 | 4 | 8 | 6 | 2 | 4 |
| 299 | 7 | 1 | 0 | 5 | 8 | 7 | 11 | 0 | 4 | 5 | 4 | 7 | 2 | 7 |
| 300 | 6 | 2 | 0 | 9 | 3 | 3 | 6 | 3 | 11 | 11 | 1 | 2 | 7 | 9 |
| 301 | 11 | 3 | 7 | 4 | 7 | 1 | 3 | 8 | 4 | 11 | 0 | 7 | 7 | 10 |
| 302 | 3 | 3 | 0 | 6 | 9 | 9 | 4 | 8 | 3 | 0 | 3 | 8 | 3 | 8 |
| 303 | 5 | 9 | 7 | 8 | 5 | 5 | 4 | 8 | 9 | 0 | 8 | 6 | 5 | 0 |
| 304 | 2 | 8 | 11 | 0 | 9 | 7 | 9 | 10 | 10 | 9 | 10 | 4 | 6 | 6 |
| 305 | 4 | 6 | 4 | 5 | 10 | 0 | 9 | 11 | 5 | 10 | 5 | 8 | 2 | 9 |
| 306 | 9 | 9 | 7 | 5 | 6 | 3 | 9 | 2 | 6 | 1 | 10 | 9 | 9 | 6 |
| 307 | 4 | 10 | 10 | 4 | 8 | 9 | 1 | 1 | 11 | 7 | 0 | 5 | 4 | 6 |
| 308 | 4 | 2 | 5 | 0 | 0 | 8 | 0 | 3 | 10 | 1 | 11 | 1 | 10 | 1 |
| 309 | 5 | 5 | 5 | 0 | 4 | 5 | 10 | 8 | 1 | 8 | 4 | 4 | 11 | 5 |
| 310 | 1 | 7 | 2 | 7 | 7 | 8 | 9 | 6 | 10 | 0 | 0 | 7 | 9 | 6 |
| 311 | 0 | 10 | 1 | 5 | 2 | 6 | 7 | 0 | 9 | 2 | 7 | 11 | 0 | 0 |
| 312 | 11 | 1 | 6 | 5 | 2 | 0 | 8 | 8 | 7 | 10 | 8 | 11 | 6 | 7 |
| 313 | 8 | 9 | 4 | 1 | 3 | 9 | 9 | 8 | 5 | 3 | 0 | 1 | 0 | 1 |
| 314 | 7 | 2 | 11 | 4 | 1 | 11 | 0 | 4 | 11 | 3 | 5 | 11 | 7 | 10 |
| 315 | 7 | 10 | 10 | 0 | 8 | 5 | 5 | 11 | 2 | 1 | 1 | 3 | 10 | 3 |
| 316 | 0 | 3 | 0 | 4 | 0 | 3 | 6 | 6 | 9 | 3 | 11 | 0 | 1 | 10 |
| 317 | 11 | 8 | 2 | 1 | 1 | 9 | 7 | 3 | 1 | 4 | 1 | 3 | 4 | 4 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 318 | 7 | 8 | 5 | 7 | 8 | 8 | 7 | 1 | 0 | 9 | 10 | 2 | 4 | 0 |
| 319 | 6 | 7 | 1 | 10 | 2 | 11 | 1 | 11 | 8 | 5 | 0 | 10 | 10 | 4 |
| 320 | 9 | 4 | 3 | 1 | 9 | 11 | 2 | 1 | 5 | 7 | 2 | 10 | 0 | 7 |
| 321 | 2 | 10 | 6 | 7 | 8 | 1 | 8 | 0 | 0 | 10 | 6 | 8 | 5 | 3 |
| 322 | 0 | 4 | 9 | 4 | 3 | 2 | 10 | 0 | 8 | 11 | 2 | 3 | 8 | 11 |
| 323 | 10 | 8 | 4 | 11 | 6 | 8 | 6 | 10 | 4 | 5 | 2 | 2 | 7 | 7 |
| 324 | 3 | 11 | 11 | 0 | 7 | 6 | 1 | 7 | 7 | 11 | 3 | 8 | 11 | 5 |
| 325 | 8 | 2 | 1 | 10 | 6 | 5 | 9 | 5 | 8 | 3 | 11 | 6 | 7 | 7 |
| 326 | 10 | 1 | 4 | 4 | 4 | 2 | 8 | 3 | 10 | 4 | 2 | 1 | 0 | 2 |
| 327 | 11 | 10 | 0 | 8 | 2 | 6 | 2 | 10 | 0 | 3 | 9 | 1 | 5 | 1 |
| 328 | 8 | 7 | 3 | 7 | 4 | 4 | 11 | 1 | 3 | 3 | 11 | 2 | 8 | 8 |
| 329 | 0 | 4 | 9 | 5 | 4 | 11 | 1 | 2 | 4 | 9 | 11 | 2 | 5 | 4 |
| 330 | 4 | 0 | 8 | 8 | 3 | 7 | 0 | 7 | 9 | 4 | 7 | 11 | 7 | 11 |
| 331 | 11 | 11 | 3 | 0 | 2 | 1 | 4 | 2 | 0 | 8 | 11 | 3 | 4 | 5 |
| 332 | 4 | 10 | 8 | 1 | 1 | 2 | 2 | 11 | 10 | 2 | 9 | 7 | 6 | 2 |
| 333 | 9 | 5 | 3 | 0 | 5 | 7 | 1 | 9 | 1 | 3 | 6 | 9 | 5 | 4 |
| 334 | 6 | 4 | 10 | 6 | 10 | 11 | 2 | 11 | 6 | 10 | 6 | 9 | 8 | 8 |
| 335 | 0 | 2 | 1 | 8 | 7 | 10 | 11 | 11 | 5 | 10 | 9 | 1 | 1 | 4 |
| 336 | 10 | 7 | 3 | 3 | 6 | 0 | 4 | 9 | 7 | 7 | 1 | 0 | 9 | 4 |
| 337 | 10 | 7 | 10 | 4 | 10 | 6 | 0 | 7 | 2 | 1 | 7 | 7 | 8 | 4 |
| 338 | 10 | 11 | 2 | 6 | 11 | 9 | 10 | 4 | 7 | 0 | 9 | 7 | 1 | 0 |
| 339 | 7 | 7 | 11 | 8 | 7 | 2 | 8 | 7 | 4 | 5 | 5 | 1 | 8 | 0 |
| 340 | 8 | 0 | 1 | 5 | 7 | 11 | 1 | 0 | 10 | 7 | 3 | 4 | 7 | 9 |
| 341 | 3 | 5 | 8 | 11 | 4 | 2 | 0 | 4 | 7 | 8 | 11 | 5 | 3 | 1 |
| 342 | 4 | 4 | 10 | 4 | 9 | 6 | 10 | 3 | 1 | 6 | 1 | 4 | 3 | 1 |
| 343 | 4 | 11 | 9 | 6 | 7 | 8 | 0 | 1 | 2 | 5 | 10 | 9 | 2 | 11 |
| 344 | 7 | 5 | 8 | 1 | 9 | 8 | 1 | 9 | 11 | 11 | 5 | 0 | 2 | 2 |
| 345 | 3 | 3 | 1 | 0 | 10 | 3 | 11 | 11 | 6 | 1 | 8 | 6 | 6 | 0 |
| 346 | 8 | 7 | 8 | 0 | 11 | 0 | 3 | 3 | 3 | 10 | 6 | 3 | 6 | 11 |
| 347 | 5 | 6 | 9 | 8 | 8 | 0 | 4 | 9 | 4 | 1 | 0 | 2 | 8 | 5 |
| 348 | 9 | 3 | 0 | 11 | 2 | 10 | 0 | 8 | 4 | 9 | 1 | 5 | 6 | 6 |
| 349 | 11 | 7 | 0 | 4 | 11 | 5 | 3 | 4 | 5 | 2 | 3 | 10 | 10 | 2 |
| 350 | 0 | 11 | 2 | 4 | 10 | 8 | 1 | 2 | 9 | 8 | 8 | 6 | 8 | 2 |
| 351 | 8 | 2 | 10 | 3 | 5 | 5 | 4 | 0 | 11 | 9 | 9 | 10 | 10 | 1 |
| 352 | 0 | 8 | 7 | 5 | 10 | 5 | 0 | 9 | 4 | 10 | 4 | 11 | 1 | 6 |
| 353 | 9 | 2 | 9 | 10 | 4 | 2 | 3 | 2 | 2 | 11 | 5 | 1 | 6 | 8 |
| 354 | 3 | 4 | 8 | 8 | 6 | 1 | 10 | 8 | 10 | 2 | 8 | 3 | 11 | 3 |
| 355 | 2 | 11 | 5 | 3 | 5 | 10 | 6 | 11 | 6 | 2 | 3 | 8 | 2 | 10 |
| 356 | 11 | 7 | 11 | 0 | 0 | 4 | 11 | 6 | 0 | 2 | 5 | 9 | 6 | 4 |
| 357 | 5 | 2 | 2 | 9 | 0 | 6 | 2 | 1 | 6 | 2 | 8 | 7 | 11 | 8 |
| 358 | 11 | 6 | 10 | 8 | 9 | 3 | 11 | 5 | 6 | 11 | 4 | 11 | 3 | 3 |
| 359 | 9 | 9 | 11 | 10 | 1 | 11 | 6 | 10 | 5 | 2 | 0 | 2 | 4 | 3 |
| 360 | 0 | 5 | 9 | 2 | 8 | 9 | 3 | 6 | 5 | 4 | 5 | 9 | 11 | 11 |
| 361 | 5 | 4 | 7 | 0 | 10 | 0 | 6 | 8 | 8 | 5 | 6 | 7 | 2 | 3 |
| 362 | 6 | 3 | 5 | 4 | 8 | 2 | 1 | 10 | 6 | 6 | 4 | 2 | 11 | 8 |
| 363 | 5 | 5 | 10 | 7 | 0 | 4 | 5 | 2 | 5 | 4 | 10 | 11 | 1 | 8 |
| 364 | 5 | 3 | 8 | 1 | 5 | 6 | 10 | 10 | 2 | 1 | 2 | 6 | 4 | 6 |
| 365 | 2 | 8 | 6 | 4 | 6 | 2 | 9 | 9 | 1 | 2 | 11 | 0 | 10 | 5 |
| 366 | 11 | 1 | 9 | 9 | 4 | 10 | 0 | 9 | 1 | 7 | 2 | 6 | 8 | 9 |
| 367 | 11 | 8 | 10 | 0 | 6 | 10 | 3 | 0 | 7 | 11 | 11 | 1 | 0 | 11 |
| 368 | 6 | 8 | 11 | 5 | 8 | 6 | 8 | 4 | 10 | 2 | 8 | 5 | 4 | 2 |
| 369 | 7 | 10 | 11 | 3 | 8 | 1 | 0 | 5 | 1 | 7 | 9 | 9 | 6 | 1 |
| 370 | 8 | 5 | 5 | 7 | 8 | 1 | 0 | 3 | 3 | 4 | 0 | 4 | 2 | 7 |
| 371 | 3 | 6 | 5 | 9 | 7 | 9 | 5 | 0 | 10 | 10 | 7 | 8 | 10 | 6 |
| 372 | 7 | 11 | 7 | 6 | 11 | 10 | 11 | 9 | 3 | 7 | 7 | 1 | 5 | 2 |
| 373 | 0 | 4 | 6 | 1 | 8 | 4 | 4 | 11 | 2 | 0 | 4 | 4 | 9 | 7 |
| 374 | 4 | 5 | 11 | 6 | 10 | 5 | 3 | 11 | 11 | 0 | 10 | 0 | 11 | 1 |
| 375 | 2 | 2 | 4 | 3 | 5 | 1 | 10 | 1 | 4 | 5 | 8 | 9 | 1 | 0 |
| 376 | 4 | 4 | 1 | 7 | 5 | 5 | 7 | 7 | 3 | 11 | 11 | 10 | 11 | 4 |
| 377 | 0 | 6 | 7 | 8 | 9 | 2 | 5 | 11 | 11 | 4 | 2 | 9 | 10 | 5 |
| 378 | 7 | 0 | 0 | 3 | 0 | 10 | 8 | 3 | 9 | 11 | 4 | 9 | 10 | 4 |
| 379 | 6 | 11 | 8 | 7 | 6 | 6 | 3 | 5 | 9 | 0 | 6 | 5 | 2 | 4 |
| 380 | 4 | 11 | 9 | 1 | 2 | 3 | 10 | 10 | 0 | 9 | 0 | 11 | 0 | 3 |
| 381 | 9 | 7 | 5 | 2 | 9 | 3 | 5 | 9 | 7 | 4 | 7 | 1 | 11 | 10 |
| 382 | 1 | 3 | 7 | 11 | 8 | 4 | 9 | 10 | 9 | 9 | 3 | 0 | 3 | 2 |
| 383 | 4 | 10 | 1 | 4 | 4 | 4 | 10 | 8 | 9 | 1 | 3 | 2 | 1 | 7 |
| 384 | 2 | 3 | 3 | 1 | 2 | 4 | 6 | 4 | 1 | 8 | 8 | 10 | 11 | 6 |
| 385 | 1 | 5 | 7 | 4 | 10 | 11 | 5 | 6 | 2 | 7 | 0 | 2 | 1 | 5 |
| 386 | 6 | 4 | 10 | 2 | 0 | 2 | 8 | 5 | 2 | 0 | 3 | 7 | 4 | 10 |
| 387 | 8 | 2 | 9 | 5 | 9 | 7 | 2 | 3 | 5 | 3 | 4 | 0 | 1 | 0 |
| 388 | 10 | 6 | 9 | 7 | 0 | 8 | 6 | 9 | 9 | 11 | 7 | 4 | 0 | 6 |
| 389 | 4 | 8 | 8 | 1 | 2 | 7 | 5 | 2 | 3 | 1 | 4 | 8 | 3 | 10 |
| 390 | 3 | 9 | 7 | 10 | 3 | 8 | 8 | 6 | 11 | 2 | 10 | 7 | 3 | 9 |
| 391 | 4 | 8 | 0 | 9 | 7 | 5 | 6 | 2 | 1 | 6 | 5 | 3 | 5 | 5 |
| 392 | 4 | 9 | 10 | 0 | 7 | 7 | 10 | 9 | 2 | 10 | 11 | 5 | 8 | 10 |
| 393 | 5 | 4 | 8 | 8 | 11 | 9 | 2 | 10 | 6 | 8 | 11 | 2 | 6 | 10 |
| 394 | 4 | 0 | 6 | 10 | 11 | 6 | 4 | 5 | 10 | 3 | 4 | 10 | 11 | 1 |
| 395 | 7 | 10 | 4 | 1 | 3 | 6 | 11 | 1 | 1 | 0 | 4 | 8 | 11 | 9 |
| 396 | 1 | 1 | 4 | 11 | 2 | 1 | 2 | 4 | 1 | 10 | 4 | 2 | 9 | 4 |
| 397 | 6 | 3 | 3 | 2 | 10 | 7 | 3 | 4 | 8 | 9 | 10 | 5 | 8 | 3 |
| 398 | 3 | 4 | 6 | 9 | 0 | 7 | 11 | 7 | 2 | 9 | 6 | 1 | 6 | 1 |
| 399 | 3 | 11 | 4 | 8 | 4 | 7 | 7 | 0 | 8 | 5 | 3 | 6 | 9 | 9 |
| 400 | 4 | 8 | 7 | 11 | 3 | 9 | 11 | 3 | 3 | 2 | 5 | 0 | 8 | 1 |
| 401 | 6 | 5 | 6 | 11 | 5 | 10 | 0 | 11 | 10 | 7 | 4 | 11 | 10 | 0 |
| 402 | 11 | 0 | 11 | 8 | 0 | 0 | 2 | 1 | 1 | 5 | 10 | 4 | 7 | 10 |
| 403 | 8 | 6 | 7 | 9 | 3 | 0 | 5 | 4 | 6 | 5 | 8 | 5 | 8 | 10 |
| 404 | 4 | 11 | 11 | 5 | 6 | 9 | 7 | 11 | 2 | 6 | 4 | 1 | 1 | 3 |
| 405 | 3 | 9 | 2 | 0 | 9 | 10 | 5 | 3 | 4 | 8 | 6 | 7 | 7 | 8 |
| 406 | 9 | 3 | 4 | 10 | 4 | 8 | 1 | 4 | 7 | 9 | 8 | 7 | 4 | 10 |
| 407 | 3 | 0 | 3 | 3 | 8 | 2 | 3 | 2 | 3 | 10 | 2 | 6 | 7 | 7 |
| 408 | 8 | 2 | 3 | 7 | 10 | 9 | 5 | 2 | 4 | 2 | 5 | 7 | 0 | 5 |
| 409 | 1 | 0 | 4 | 7 | 3 | 10 | 6 | 8 | 3 | 0 | 5 | 11 | 6 | 5 |
| 410 | 0 | 3 | 6 | 6 | 2 | 9 | 5 | 2 | 0 | 10 | 1 | 1 | 2 | 0 |
| 411 | 8 | 4 | 5 | 10 | 1 | 10 | 7 | 10 | 8 | 6 | 9 | 4 | 8 | 5 |
| 412 | 7 | 2 | 2 | 11 | 9 | 3 | 11 | 0 | 3 | 6 | 2 | 8 | 9 | 6 |
| 413 | 11 | 9 | 10 | 5 | 2 | 11 | 9 | 4 | 11 | 6 | 1 | 0 | 1 | 4 |
| 414 | 2 | 3 | 3 | 11 | 1 | 6 | 7 | 11 | 10 | 11 | 0 | 0 | 9 | 9 |
| 415 | 10 | 7 | 9 | 9 | 5 | 10 | 2 | 8 | 8 | 9 | 10 | 0 | 3 | 8 |
| 416 | 1 | 6 | 8 | 4 | 0 | 7 | 11 | 5 | 1 | 8 | 10 | 5 | 1 | 11 |
| 417 | 1 | 0 | 5 | 2 | 8 | 6 | 4 | 0 | 0 | 5 | 1 | 11 | 1 | 10 |
| 418 | 10 | 2 | 1 | 7 | 8 | 6 | 3 | 0 | 5 | 1 | 4 | 2 | 9 | 9 |
| 419 | 6 | 1 | 6 | 9 | 7 | 5 | 7 | 10 | 9 | 11 | 10 | 4 | 3 | 1 |
| 420 | 3 | 4 | 11 | 7 | 6 | 10 | 0 | 0 | 0 | 5 | 7 | 10 | 4 | 7 |
| 421 | 2 | 9 | 11 | 10 | 6 | 8 | 1 | 11 | 1 | 0 | 1 | 11 | 0 | 6 |
| 422 | 3 | 11 | 7 | 8 | 2 | 4 | 6 | 2 | 7 | 4 | 6 | 0 | 6 | 10 |
| 423 | 10 | 5 | 0 | 10 | 7 | 4 | 8 | 7 | 6 | 8 | 10 | 2 | 11 | 2 |
| 424 | 11 | 7 | 2 | 5 | 1 | 3 | 0 | 7 | 8 | 10 | 11 | 9 | 0 | 3 |
| 425 | 2 | 0 | 1 | 4 | 4 | 10 | 2 | 2 | 0 | 0 | 11 | 8 | 8 | 0 |
| 426 | 1 | 3 | 7 | 1 | 9 | 7 | 3 | 2 | 11 | 6 | 9 | 2 | 6 | 7 |
| 427 | 10 | 1 | 4 | 1 | 7 | 10 | 3 | 11 | 8 | 6 | 6 | 9 | 9 | 10 |
| 428 | 10 | 2 | 1 | 2 | 3 | 4 | 5 | 9 | 11 | 8 | 2 | 7 | 1 | 3 |
| 429 | 10 | 2 | 8 | 11 | 5 | 2 | 11 | 3 | 1 | 7 | 0 | 10 | 7 | 3 |
| 430 | 6 | 5 | 2 | 0 | 11 | 10 | 6 | 7 | 2 | 3 | 7 | 2 | 0 | 1 |
| 431 | 1 | 10 | 2 | 11 | 9 | 0 | 2 | 6 | 4 | 5 | 8 | 1 | 3 | 11 |
| 432 | 5 | 11 | 8 | 11 | 2 | 5 | 1 | 3 | 0 | 5 | 2 | 7 | 5 | 11 |
| 433 | 9 | 11 | 2 | 6 | 8 | 0 | 7 | 10 | 1 | 6 | 10 | 6 | 10 | 6 |
| 434 | 3 | 6 | 7 | 11 | 2 | 1 | 8 | 9 | 8 | 9 | 11 | 8 | 2 | 0 |
| 435 | 3 | 10 | 1 | 9 | 1 | 5 | 0 | 1 | 9 | 0 | 11 | 3 | 6 | 10 |
| 436 | 7 | 4 | 10 | 11 | 3 | 10 | 8 | 2 | 5 | 8 | 9 | 0 | 7 | 9 |
| 437 | 9 | 6 | 9 | 8 | 1 | 4 | 10 | 4 | 8 | 0 | 3 | 8 | 5 | 1 |
| 438 | 0 | 8 | 2 | 4 | 3 | 5 | 11 | 5 | 2 | 4 | 0 | 8 | 0 | 0 |
| 439 | 10 | 5 | 4 | 2 | 2 | 10 | 9 | 5 | 11 | 1 | 10 | 10 | 7 | 11 |
| 440 | 10 | 4 | 2 | 10 | 7 | 5 | 0 | 0 | 5 | 3 | 5 | 0 | 8 | 3 |
| 441 | 9 | 8 | 9 | 11 | 11 | 7 | 4 | 4 | 2 | 4 | 8 | 11 | 3 | 5 |
| 442 | 7 | 0 | 2 | 5 | 10 | 1 | 3 | 10 | 6 | 1 | 0 | 11 | 10 | 5 |
| 443 | 2 | 5 | 4 | 3 | 11 | 6 | 5 | 6 | 6 | 1 | 4 | 6 | 5 | 4 |
| 444 | 9 | 9 | 3 | 5 | 11 | 1 | 0 | 5 | 11 | 9 | 7 | 4 | 10 | 2 |
| 445 | 8 | 3 | 5 | 4 | 11 | 11 | 9 | 5 | 2 | 9 | 9 | 7 | 6 | 3 |
| 446 | 1 | 10 | 0 | 7 | 1 | 5 | 11 | 8 | 8 | 11 | 8 | 0 | 7 | 6 |
| 447 | 11 | 2 | 10 | 10 | 3 | 2 | 10 | 11 | 7 | 10 | 4 | 7 | 2 | 6 |
| 448 | 9 | 9 | 4 | 11 | 1 | 2 | 5 | 1 | 3 | 11 | 9 | 11 | 5 | 11 |
| 449 | 2 | 4 | 0 | 9 | 2 | 5 | 9 | 9 | 10 | 5 | 1 | 11 | 8 | 8 |
| 450 | 1 | 1 | 9 | 0 | 4 | 9 | 9 | 4 | 0 | 8 | 7 | 9 | 1 | 7 |
| 451 | 10 | 2 | 0 | 6 | 4 | 0 | 8 | 11 | 2 | 2 | 11 | 8 | 1 | 1 |
| 452 | 1 | 8 | 10 | 2 | 5 | 9 | 2 | 3 | 10 | 10 | 0 | 4 | 11 | 10 |
| 453 | 2 | 11 | 1 | 2 | 4 | 7 | 8 | 3 | 3 | 3 | 8 | 9 | 11 | 5 |
| 454 | 0 | 1 | 1 | 3 | 11 | 3 | 5 | 3 | 11 | 0 | 11 | 10 | 2 | 6 |
| 455 | 4 | 0 | 7 | 7 | 7 | 4 | 1 | 9 | 0 | 8 | 5 | 10 | 9 | 11 |
| 456 | 6 | 11 | 2 | 5 | 3 | 11 | 5 | 7 | 3 | 9 | 3 | 10 | 8 | 0 |
| 457 | 0 | 6 | 1 | 1 | 9 | 7 | 6 | 1 | 0 | 5 | 11 | 5 | 4 | 4 |
| 458 | 0 | 11 | 0 | 11 | 8 | 11 | 0 | 9 | 0 | 0 | 9 | 2 | 0 | 2 |
| 459 | 0 | 9 | 7 | 2 | 3 | 7 | 6 | 10 | 7 | 7 | 8 | 4 | 0 | 8 |
| 460 | 5 | 1 | 7 | 3 | 8 | 2 | 7 | 1 | 2 | 3 | 3 | 9 | 9 | 4 |
| 461 | 10 | 5 | 5 | 11 | 2 | 3 | 4 | 4 | 5 | 0 | 6 | 6 | 2 | 2 |
| 462 | 1 | 3 | 6 | 0 | 9 | 8 | 6 | 5 | 6 | 7 | 2 | 5 | 2 | 5 |
| 463 | 2 | 6 | 9 | 6 | 1 | 1 | 9 | 10 | 7 | 3 | 6 | 2 | 9 | 11 |
| 464 | 5 | 11 | 6 | 8 | 3 | 6 | 11 | 2 | 6 | 9 | 10 | 4 | 4 | 2 |
| 465 | 11 | 5 | 4 | 6 | 0 | 4 | 7 | 3 | 7 | 3 | 3 | 8 | 7 | 7 |
| 466 | 11 | 5 | 7 | 2 | 1 | 8 | 2 | 7 | 9 | 5 | 5 | 11 | 10 | 4 |
| 467 | 11 | 9 | 1 | 11 | 11 | 3 | 8 | 11 | 8 | 8 | 1 | 7 | 9 | 5 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 468 | 5 | 4 | 7 | 6 | 0 | 7 | 5 | 11 | 1 | 7 | 5 | 0 | 4 | 0 |
| 469 | 2 | 2 | 2 | 9 | 9 | 9 | 7 | 5 | 10 | 8 | 5 | 5 | 5 | 1 |
| 470 | 1 | 1 | 1 | 10 | 1 | 7 | 1 | 3 | 2 | 7 | 6 | 8 | 8 | 2 |
| 471 | 2 | 5 | 10 | 2 | 2 | 3 | 3 | 8 | 1 | 6 | 11 | 8 | 4 | 3 |
| 472 | 1 | 11 | 0 | 1 | 7 | 0 | 9 | 2 | 3 | 7 | 6 | 11 | 7 | 4 |
| 473 | 6 | 11 | 1 | 8 | 5 | 1 | 2 | 2 | 4 | 6 | 9 | 5 | 9 | 3 |
| 474 | 8 | 6 | 0 | 2 | 5 | 9 | 8 | 6 | 11 | 11 | 3 | 3 | 6 | 2 |
| 475 | 7 | 1 | 2 | 4 | 6 | 0 | 7 | 2 | 5 | 9 | 1 | 10 | 3 | 5 |
| 476 | 7 | 5 | 5 | 5 | 11 | 4 | 8 | 8 | 0 | 2 | 11 | 6 | 3 | 10 |
| 477 | 6 | 0 | 5 | 0 | 1 | 0 | 5 | 7 | 7 | 7 | 6 | 4 | 5 | 6 |
| 478 | 5 | 9 | 3 | 10 | 9 | 2 | 9 | 5 | 6 | 10 | 1 | 3 | 4 | 8 |
| 479 | 9 | 1 | 6 | 10 | 2 | 3 | 3 | 5 | 11 | 8 | 9 | 0 | 9 | 0 |
| 480 | 7 | 7 | 3 | 2 | 4 | 2 | 6 | 8 | 9 | 6 | 6 | 4 | 7 | 11 |
| 481 | 0 | 8 | 5 | 10 | 3 | 10 | 10 | 4 | 10 | 7 | 5 | 10 | 9 | 3 |
| 482 | 9 | 3 | 2 | 2 | 11 | 0 | 10 | 3 | 10 | 2 | 4 | 5 | 3 | 9 |
| 483 | 3 | 5 | 5 | 7 | 6 | 11 | 9 | 7 | 1 | 10 | 5 | 5 | 1 | 0 |
| 484 | 0 | 4 | 4 | 3 | 7 | 11 | 5 | 10 | 1 | 2 | 6 | 1 | 11 | 7 |
| 485 | 1 | 3 | 11 | 4 | 5 | 10 | 4 | 6 | 7 | 4 | 10 | 8 | 5 | 6 |
| 486 | 6 | 7 | 7 | 5 | 6 | 8 | 7 | 10 | 1 | 8 | 6 | 7 | 6 | 0 |
| 487 | 8 | 5 | 2 | 9 | 4 | 4 | 3 | 6 | 0 | 6 | 4 | 7 | 7 | 2 |
| 488 | 1 | 6 | 11 | 9 | 1 | 3 | 10 | 10 | 9 | 10 | 2 | 1 | 2 | 7 |
| 489 | 8 | 10 | 4 | 9 | 11 | 7 | 10 | 9 | 1 | 9 | 0 | 3 | 3 | 6 |
| 490 | 2 | 5 | 7 | 8 | 10 | 7 | 0 | 2 | 3 | 0 | 2 | 5 | 4 | 8 |
| 491 | 8 | 0 | 3 | 6 | 10 | 8 | 11 | 8 | 10 | 1 | 1 | 3 | 3 | 10 |
| 492 | 0 | 10 | 11 | 7 | 11 | 2 | 2 | 9 | 9 | 4 | 4 | 5 | 5 | 7 |
| 493 | 7 | 5 | 10 | 11 | 0 | 1 | 1 | 8 | 6 | 10 | 7 | 10 | 0 | 11 |
| 494 | 9 | 6 | 8 | 11 | 7 | 6 | 2 | 1 | 11 | 10 | 5 | 9 | 1 | 1 |
| 495 | 6 | 6 | 9 | 0 | 2 | 8 | 11 | 0 | 7 | 0 | 5 | 0 | 3 | 9 |
| 496 | 9 | 8 | 1 | 4 | 1 | 0 | 0 | 11 | 4 | 5 | 3 | 4 | 2 | 0 |
| 497 | 11 | 11 | 11 | 9 | 6 | 8 | 5 | 9 | 11 | 1 | 0 | 4 | 4 | 0 |
| 498 | 4 | 6 | 11 | 8 | 1 | 7 | 6 | 3 | 11 | 1 | 9 | 6 | 1 | 6 |
| 499 | 10 | 1 | 7 | 0 | 6 | 4 | 4 | 0 | 11 | 3 | 7 | 3 | 6 | 9 |
| 500 | 6 | 9 | 5 | 8 | 8 | 7 | 4 | 1 | 1 | 11 | 7 | 9 | 2 | 9 |
| 501 | 3 | 10 | 9 | 2 | 5 | 3 | 8 | 0 | 2 | 7 | 4 | 4 | 1 | 4 |
| 502 | 8 | 6 | 6 | 1 | 0 | 5 | 7 | 2 | 4 | 7 | 2 | 6 | 6 | 10 |
| 503 | 9 | 10 | 8 | 7 | 2 | 9 | 1 | 5 | 8 | 6 | 7 | 3 | 1 | 5 |
| 504 | 1 | 8 | 8 | 3 | 10 | 10 | 10 | 11 | 0 | 5 | 10 | 6 | 3 | 5 |
| 505 | 4 | 7 | 11 | 11 | 4 | 7 | 10 | 0 | 10 | 8 | 7 | 0 | 5 | 3 |
| 506 | 5 | 0 | 11 | 9 | 9 | 1 | 8 | 10 | 5 | 11 | 7 | 8 | 8 | 2 |
| 507 | 9 | 2 | 1 | 6 | 11 | 2 | 1 | 8 | 5 | 7 | 11 | 7 | 10 | 11 |
| 508 | 6 | 1 | 10 | 7 | 3 | 10 | 5 | 10 | 0 | 2 | 8 | 3 | 5 | 11 |
| 509 | 3 | 5 | 9 | 11 | 9 | 6 | 9 | 9 | 9 | 3 | 9 | 7 | 4 | 7 |
| 510 | 4 | 10 | 8 | 3 | 9 | 4 | 6 | 4 | 5 | 0 | 7 | 1 | 9 | 4 |
| 511 | 5 | 10 | 6 | 6 | 1 | 11 | 4 | 3 | 6 | 5 | 11 | 10 | 0 | 5 |
| 512 | 5 | 10 | 3 | 2 | 0 | 10 | 8 | 1 | 7 | 2 | 6 | 10 | 4 | 6 |
| 513 | 2 | 3 | 9 | 4 | 3 | 9 | 1 | 10 | 8 | 5 | 11 | 5 | 7 | 0 |
| 514 | 6 | 11 | 6 | 1 | 1 | 11 | 10 | 8 | 11 | 10 | 1 | 2 | 5 | 7 |
| 515 | 10 | 1 | 2 | 10 | 2 | 5 | 2 | 3 | 2 | 0 | 7 | 1 | 11 | 4 |
| 516 | 9 | 4 | 8 | 5 | 7 | 4 | 7 | 11 | 5 | 3 | 4 | 9 | 6 | 8 |
| 517 | 5 | 9 | 10 | 9 | 11 | 6 | 3 | 4 | 10 | 5 | 0 | 2 | 6 | 1 |
| 518 | 4 | 7 | 5 | 6 | 6 | 1 | 0 | 6 | 10 | 11 | 8 | 5 | 8 | 6 |
| 519 | 3 | 5 | 4 | 10 | 11 | 8 | 10 | 0 | 3 | 11 | 9 | 4 | 9 | 3 |
| 520 | 8 | 0 | 11 | 0 | 9 | 9 | 10 | 6 | 4 | 8 | 10 | 0 | 11 | 2 |
| 521 | 6 | 10 | 7 | 11 | 2 | 8 | 4 | 5 | 8 | 3 | 3 | 9 | 8 | 6 |
| 522 | 11 | 7 | 7 | 9 | 0 | 11 | 2 | 5 | 2 | 10 | 5 | 6 | 3 | 5 |
| 523 | 11 | 2 | 4 | 6 | 9 | 9 | 3 | 9 | 11 | 10 | 6 | 4 | 0 | 9 |
| 524 | 9 | 2 | 3 | 2 | 6 | 4 | 4 | 7 | 8 | 5 | 9 | 8 | 11 | 11 |
| 525 | 8 | 4 | 2 | 8 | 5 | 2 | 8 | 8 | 11 | 3 | 8 | 4 | 8 | 4 |
| 526 | 10 | 3 | 5 | 8 | 1 | 0 | 9 | 4 | 0 | 6 | 11 | 7 | 2 | 6 |
| 527 | 10 | 1 | 10 | 4 | 4 | 1 | 3 | 6 | 6 | 1 | 4 | 9 | 1 | 3 |
| 528 | 0 | 11 | 10 | 4 | 2 | 0 | 9 | 7 | 10 | 4 | 9 | 10 | 8 | 7 |
| 529 | 10 | 6 | 0 | 5 | 10 | 3 | 7 | 8 | 2 | 6 | 3 | 0 | 8 | 7 |
| 530 | 7 | 6 | 2 | 11 | 4 | 5 | 1 | 4 | 10 | 6 | 1 | 6 | 5 | 5 |
| 531 | 0 | 0 | 1 | 2 | 10 | 7 | 2 | 6 | 8 | 4 | 11 | 1 | 9 | 5 |
| 532 | 6 | 5 | 4 | 0 | 6 | 0 | 3 | 3 | 2 | 9 | 0 | 6 | 10 | 0 |
| 533 | 5 | 9 | 1 | 8 | 4 | 2 | 7 | 9 | 2 | 4 | 7 | 8 | 5 | 9 |
| 534 | 9 | 7 | 11 | 3 | 5 | 4 | 6 | 2 | 3 | 8 | 11 | 6 | 4 | 6 |
| 535 | 2 | 9 | 1 | 4 | 9 | 6 | 0 | 1 | 1 | 11 | 4 | 11 | 9 | 7 |
| 536 | 3 | 3 | 7 | 2 | 7 | 5 | 7 | 7 | 6 | 8 | 6 | 0 | 5 | 4 |
| 537 | 0 | 10 | 0 | 8 | 1 | 3 | 0 | 0 | 7 | 1 | 4 | 8 | 11 | 2 |
| 538 | 1 | 10 | 5 | 3 | 4 | 9 | 5 | 10 | 1 | 3 | 10 | 11 | 0 | 4 |
| 539 | 3 | 11 | 2 | 9 | 6 | 4 | 6 | 10 | 11 | 7 | 7 | 11 | 7 | 5 |
| 540 | 8 | 11 | 10 | 10 | 4 | 4 | 8 | 5 | 9 | 6 | 2 | 2 | 0 | 0 |
| 541 | 1 | 6 | 11 | 3 | 0 | 10 | 11 | 4 | 0 | 1 | 2 | 4 | 10 | 2 |
| 542 | 7 | 7 | 3 | 6 | 2 | 7 | 4 | 4 | 5 | 1 | 0 | 10 | 1 | 0 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 543 | 1 | 4 | 6 | 7 | 10 | 2 | 10 | 7 | 7 | 0 | 2 | 6 | 6 | 3 |
| 544 | 11 | 11 | 2 | 0 | 10 | 2 | 11 | 3 | 4 | 2 | 1 | 8 | 3 | 1 |
| 545 | 11 | 3 | 6 | 4 | 0 | 3 | 3 | 2 | 7 | 9 | 3 | 3 | 9 | 11 |
| 546 | 1 | 11 | 3 | 8 | 7 | 5 | 2 | 5 | 7 | 11 | 0 | 3 | 2 | 10 |
| 547 | 4 | 8 | 8 | 5 | 3 | 3 | 3 | 4 | 8 | 3 | 2 | 10 | 2 | 2 |
| 548 | 3 | 8 | 0 | 4 | 10 | 6 | 6 | 1 | 4 | 6 | 8 | 8 | 7 | 0 |
| 549 | 11 | 7 | 5 | 7 | 6 | 7 | 8 | 2 | 7 | 2 | 7 | 0 | 0 | 8 |
| 550 | 4 | 8 | 4 | 2 | 5 | 6 | 11 | 2 | 7 | 5 | 1 | 5 | 7 | 9 |
| 551 | 11 | 10 | 11 | 0 | 11 | 5 | 8 | 7 | 1 | 4 | 11 | 2 | 4 | 10 |
| 552 | 4 | 2 | 3 | 5 | 4 | 0 | 1 | 4 | 11 | 1 | 11 | 0 | 7 | 9 |
| 553 | 5 | 4 | 4 | 2 | 4 | 5 | 11 | 0 | 11 | 0 | 9 | 11 | 8 | 11 |
| 554 | 10 | 4 | 11 | 2 | 3 | 11 | 4 | 0 | 2 | 9 | 6 | 9 | 11 | 0 |
| 555 | 7 | 7 | 0 | 9 | 11 | 11 | 6 | 1 | 3 | 2 | 7 | 7 | 1 | 7 |
| 556 | 2 | 1 | 3 | 10 | 1 | 6 | 10 | 10 | 5 | 4 | 10 | 11 | 8 | 0 |
| 557 | 9 | 3 | 2 | 9 | 5 | 8 | 2 | 11 | 4 | 10 | 4 | 10 | 10 | 1 |
| 558 | 1 | 7 | 2 | 1 | 8 | 11 | 0 | 4 | 8 | 11 | 7 | 4 | 7 | 1 |
| 559 | 10 | 8 | 1 | 3 | 0 | 5 | 7 | 10 | 3 | 0 | 0 | 9 | 8 | 1 |
| 560 | 5 | 1 | 5 | 7 | 7 | 1 | 1 | 5 | 5 | 11 | 11 | 11 | 0 | 7 |
| 561 | 2 | 9 | 5 | 1 | 2 | 4 | 11 | 0 | 5 | 1 | 5 | 1 | 9 | 8 |
| 562 | 7 | 4 | 0 | 8 | 7 | 10 | 5 | 11 | 9 | 0 | 3 | 5 | 2 | 1 |
| 563 | 6 | 11 | 7 | 7 | 0 | 4 | 6 | 1 | 5 | 9 | 8 | 1 | 5 | 9 |
| 564 | 6 | 10 | 1 | 9 | 10 | 11 | 3 | 9 | 5 | 7 | 7 | 6 | 0 | 6 |
| 565 | 0 | 2 | 5 | 3 | 2 | 9 | 1 | 9 | 9 | 0 | 0 | 2 | 2 | 10 |
| 566 | 7 | 6 | 1 | 4 | 6 | 2 | 4 | 8 | 10 | 10 | 4 | 5 | 3 | 4 |
| 567 | 0 | 5 | 4 | 1 | 1 | 9 | 9 | 10 | 0 | 9 | 2 | 0 | 9 | 9 |
| 568 | 11 | 0 | 10 | 11 | 11 | 7 | 5 | 8 | 0 | 6 | 0 | 3 | 10 | 5 |
| 569 | 8 | 5 | 3 | 8 | 8 | 10 | 7 | 4 | 4 | 2 | 2 | 1 | 11 | 4 |
| 570 | 5 | 4 | 4 | 10 | 7 | 11 | 6 | 4 | 0 | 11 | 8 | 9 | 3 | 6 |
| 571 | 0 | 1 | 0 | 11 | 6 | 8 | 2 | 11 | 5 | 1 | 6 | 0 | 1 | 5 |
| 572 | 7 | 4 | 10 | 5 | 5 | 3 | 0 | 10 | 2 | 7 | 2 | 7 | 5 | 11 |
| 573 | 9 | 11 | 2 | 1 | 6 | 3 | 8 | 6 | 9 | 11 | 0 | 1 | 3 | 4 |
| 574 | 7 | 8 | 6 | 0 | 5 | 10 | 0 | 5 | 1 | 1 | 8 | 4 | 2 | 7 |
| 575 | 10 | 4 | 8 | 6 | 11 | 6 | 7 | 8 | 4 | 0 | 1 | 6 | 9 | 6 |
| 576 | 4 | 8 | 11 | 6 | 9 | 0 | 8 | 3 | 5 | 6 | 2 | 7 | 6 | 11 |
| 577 | 1 | 9 | 6 | 7 | 8 | 0 | 1 | 11 | 3 | 6 | 10 | 11 | 2 | 8 |
| 578 | 5 | 10 | 4 | 1 | 8 | 5 | 6 | 10 | 3 | 2 | 4 | 5 | 6 | 8 |
| 579 | 3 | 7 | 9 | 0 | 5 | 6 | 11 | 1 | 10 | 0 | 7 | 9 | 2 | 6 |
| 580 | 4 | 7 | 3 | 10 | 0 | 3 | 5 | 6 | 1 | 5 | 1 | 4 | 0 | 5 |
| 581 | 4 | 6 | 5 | 11 | 9 | 6 | 5 | 0 | 11 | 1 | 6 | 11 | 3 | 0 |
| 582 | 11 | 7 | 2 | 8 | 8 | 5 | 1 | 6 | 0 | 7 | 3 | 5 | 11 | 7 |
| 583 | 4 | 3 | 7 | 8 | 10 | 8 | 7 | 3 | 8 | 7 | 0 | 11 | 10 | 9 |
| 584 | 3 | 1 | 3 | 0 | 3 | 0 | 10 | 11 | 11 | 2 | 1 | 1 | 1 | 6 |
| 585 | 2 | 10 | 2 | 10 | 3 | 6 | 4 | 2 | 2 | 1 | 1 | 7 | 5 | 2 |
| 586 | 9 | 10 | 6 | 4 | 2 | 6 | 4 | 10 | 3 | 7 | 11 | 4 | 1 | 10 |
| 587 | 4 | 6 | 11 | 9 | 11 | 8 | 7 | 5 | 7 | 5 | 10 | 1 | 4 | 6 |
| 588 | 9 | 4 | 10 | 9 | 3 | 9 | 7 | 6 | 3 | 7 | 1 | 2 | 2 | 0 |
| 589 | 8 | 6 | 7 | 3 | 1 | 1 | 9 | 11 | 8 | 7 | 7 | 9 | 7 | 2 |
| 590 | 7 | 0 | 7 | 0 | 6 | 11 | 2 | 7 | 5 | 7 | 9 | 1 | 10 | 1 |
| 591 | 10 | 4 | 3 | 7 | 4 | 5 | 0 | 11 | 9 | 4 | 6 | 3 | 0 | 8 |
| 592 | 2 | 1 | 9 | 0 | 9 | 7 | 3 | 11 | 7 | 3 | 9 | 3 | 7 | 8 |
| 593 | 11 | 0 | 10 | 8 | 7 | 1 | 9 | 1 | 3 | 0 | 8 | 6 | 9 | 3 |
| 594 | 11 | 2 | 9 | 1 | 2 | 11 | 6 | 5 | 5 | 0 | 7 | 8 | 4 | 11 |
| 595 | 9 | 8 | 11 | 7 | 0 | 5 | 10 | 8 | 4 | 2 | 3 | 2 | 7 | 11 |
| 596 | 6 | 6 | 11 | 11 | 6 | 7 | 2 | 0 | 6 | 10 | 0 | 8 | 0 | 2 |
| 597 | 10 | 1 | 8 | 0 | 11 | 9 | 6 | 11 | 10 | 7 | 11 | 8 | 5 | 4 |
| 598 | 11 | 2 | 4 | 2 | 0 | 7 | 0 | 7 | 9 | 7 | 0 | 6 | 1 | 2 |
| 599 | 8 | 6 | 8 | 5 | 1 | 4 | 8 | 10 | 0 | 11 | 1 | 11 | 1 | 7 |
| 600 | 9 | 10 | 6 | 6 | 0 | 0 | 2 | 0 | 0 | 8 | 5 | 10 | 6 | 0 |
| 601 | 3 | 11 | 10 | 5 | 11 | 0 | 6 | 3 | 1 | 8 | 5 | 0 | 1 | 11 |
| 602 | 11 | 4 | 0 | 5 | 1 | 1 | 5 | 3 | 2 | 8 | 1 | 2 | 9 | 8 |
| 603 | 1 | 2 | 0 | 9 | 5 | 10 | 3 | 1 | 6 | 9 | 5 | 9 | 5 | 4 |
| 604 | 1 | 9 | 2 | 10 | 6 | 6 | 11 | 7 | 11 | 10 | 11 | 3 | 10 | 11 |
| 605 | 7 | 3 | 4 | 9 | 6 | 0 | 1 | 1 | 1 | 5 | 1 | 1 | 8 | 4 |
| 606 | 9 | 4 | 8 | 6 | 9 | 3 | 6 | 3 | 10 | 9 | 7 | 3 | 0 | 2 |
| 607 | 11 | 4 | 7 | 10 | 6 | 3 | 2 | 9 | 3 | 5 | 10 | 10 | 6 | 11 |
| 608 | 0 | 11 | 5 | 2 | 9 | 1 | 11 | 1 | 5 | 2 | 0 | 6 | 11 | 0 |
| 609 | 0 | 6 | 10 | 5 | 2 | 7 | 10 | 4 | 4 | 5 | 8 | 3 | 0 | 11 |
| 610 | 5 | 2 | 11 | 0 | 4 | 9 | 9 | 5 | 7 | 9 | 4 | 8 | 8 | 3 |
| 611 | 4 | 3 | 3 | 7 | 9 | 7 | 6 | 10 | 1 | 9 | 11 | 6 | 10 | 7 |
| 612 | 2 | 5 | 3 | 2 | 4 | 9 | 2 | 6 | 1 | 8 | 3 | 7 | 10 | 10 |
| 613 | 9 | 6 | 3 | 3 | 5 | 5 | 1 | 3 | 11 | 4 | 3 | 1 | 2 | 0 |
| 614 | 11 | 11 | 4 | 3 | 4 | 10 | 6 | 1 | 2 | 5 | 11 | 2 | 10 | 5 |
| 615 | 2 | 8 | 5 | 9 | 3 | 2 | 0 | 2 | 5 | 11 | 0 | 0 | 4 | 3 |
| 616 | 1 | 3 | 8 | 8 | 8 | 11 | 4 | 8 | 6 | 0 | 6 | 1 | 8 | 2 |
| 617 | 4 | 10 | 4 | 11 | 0 | 11 | 4 | 1 | 4 | 10 | 7 | 3 | 6 | 2 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 618 | 9 | 8 | 7 | 10 | 8 | 0 | 6 | 2 | 11 | 0 | 1 | 2 | 10 | 4 |
| 619 | 3 | 3 | 0 | 10 | 10 | 1 | 2 | 9 | 10 | 9 | 0 | 9 | 4 | 5 |
| 620 | 5 | 6 | 1 | 3 | 3 | 10 | 5 | 7 | 5 | 6 | 5 | 6 | 8 | 3 |
| 621 | 6 | 2 | 2 | 9 | 9 | 11 | 9 | 7 | 4 | 5 | 1 | 7 | 2 | 10 |
| 622 | 10 | 8 | 2 | 1 | 4 | 7 | 10 | 8 | 0 | 11 | 5 | 5 | 9 | 2 |
| 623 | 0 | 3 | 10 | 7 | 0 | 1 | 11 | 7 | 1 | 3 | 2 | 8 | 4 | 9 |
| 624 | 9 | 0 | 0 | 11 | 5 | 1 | 0 | 6 | 0 | 10 | 2 | 0 | 4 | 8 |
| 625 | 7 | 11 | 7 | 1 | 6 | 8 | 9 | 11 | 4 | 0 | 10 | 7 | 8 | 3 |
| 626 | 6 | 10 | 9 | 6 | 1 | 10 | 5 | 0 | 2 | 2 | 11 | 11 | 7 | 7 |
| 627 | 6 | 5 | 10 | 4 | 0 | 5 | 11 | 11 | 8 | 8 | 5 | 9 | 5 | 10 |
| 628 | 6 | 7 | 0 | 6 | 0 | 9 | 1 | 6 | 9 | 4 | 10 | 3 | 9 | 9 |
| 629 | 7 | 4 | 1 | 7 | 3 | 8 | 4 | 5 | 7 | 8 | 8 | 2 | 5 | 10 |
| 630 | 2 | 1 | 7 | 2 | 0 | 0 | 7 | 8 | 9 | 9 | 5 | 4 | 9 | 10 |
| 631 | 10 | 3 | 4 | 3 | 2 | 8 | 0 | 6 | 9 | 8 | 11 | 9 | 11 | 7 |
| 632 | 10 | 11 | 8 | 0 | 3 | 4 | 11 | 2 | 7 | 6 | 4 | 10 | 9 | 7 |
| 633 | 2 | 6 | 3 | 9 | 10 | 3 | 4 | 0 | 4 | 8 | 7 | 10 | 3 | 3 |
| 634 | 3 | 0 | 8 | 1 | 10 | 11 | 1 | 2 | 8 | 3 | 10 | 2 | 8 | 11 |
| 635 | 9 | 0 | 7 | 5 | 4 | 10 | 10 | 11 | 3 | 11 | 2 | 10 | 11 | 6 |
| 636 | 2 | 6 | 9 | 1 | 2 | 5 | 7 | 7 | 8 | 2 | 8 | 2 | 3 | 7 |
| 637 | 10 | 5 | 11 | 1 | 8 | 8 | 7 | 7 | 2 | 11 | 11 | 7 | 1 | 8 |
| 638 | 5 | 0 | 11 | 4 | 7 | 2 | 6 | 10 | 10 | 0 | 10 | 7 | 2 | 0 |
| 639 | 6 | 11 | 4 | 8 | 2 | 2 | 11 | 5 | 10 | 5 | 8 | 0 | 1 | 3 |
| 640 | 4 | 10 | 9 | 10 | 10 | 7 | 11 | 11 | 9 | 11 | 4 | 0 | 3 | 5 |
| 641 | 6 | 0 | 10 | 3 | 11 | 8 | 11 | 5 | 1 | 9 | 4 | 6 | 7 | 8 |
| 642 | 3 | 9 | 5 | 6 | 1 | 8 | 5 | 7 | 6 | 6 | 9 | 9 | 1 | 10 |
| 643 | 8 | 0 | 9 | 7 | 3 | 5 | 2 | 2 | 11 | 1 | 6 | 5 | 10 | 3 |
| 644 | 6 | 2 | 4 | 3 | 10 | 0 | 8 | 11 | 3 | 3 | 3 | 5 | 7 | 5 |
| 645 | 1 | 9 | 6 | 8 | 7 | 1 | 3 | 9 | 4 | 7 | 3 | 0 | 10 | 0 |
| 646 | 2 | 5 | 0 | 6 | 8 | 4 | 10 | 1 | 3 | 9 | 1 | 11 | 10 | 1 |
| 647 | 7 | 8 | 11 | 0 | 1 | 6 | 6 | 9 | 0 | 5 | 7 | 6 | 5 | 11 |
| 648 | 9 | 9 | 1 | 1 | 6 | 2 | 3 | 10 | 5 | 6 | 3 | 11 | 11 | 1 |
| 649 | 5 | 10 | 9 | 2 | 3 | 8 | 10 | 4 | 0 | 10 | 10 | 11 | 1 | 1 |
| 650 | 6 | 1 | 4 | 5 | 8 | 8 | 6 | 1 | 7 | 4 | 7 | 0 | 9 | 1 |
| 651 | 3 | 9 | 3 | 0 | 0 | 6 | 9 | 3 | 7 | 6 | 11 | 2 | 3 | 4 |
| 652 | 5 | 7 | 5 | 5 | 5 | 2 | 5 | 1 | 0 | 7 | 10 | 8 | 7 | 8 |
| 653 | 6 | 8 | 6 | 11 | 0 | 1 | 5 | 7 | 2 | 6 | 4 | 4 | 11 | 2 |
| 654 | 4 | 0 | 6 | 5 | 0 | 5 | 5 | 10 | 5 | 8 | 3 | 1 | 4 | 7 |
| 655 | 5 | 5 | 9 | 9 | 11 | 1 | 6 | 9 | 6 | 4 | 10 | 5 | 11 | 4 |
| 656 | 4 | 1 | 6 | 4 | 5 | 9 | 9 | 7 | 6 | 3 | 1 | 11 | 11 | 5 |
| 657 | 2 | 10 | 1 | 11 | 1 | 2 | 8 | 7 | 8 | 0 | 5 | 5 | 11 | 8 |
| 658 | 4 | 5 | 9 | 3 | 11 | 2 | 1 | 7 | 10 | 8 | 8 | 7 | 5 | 1 |
| 659 | 11 | 1 | 9 | 7 | 10 | 10 | 6 | 3 | 11 | 11 | 9 | 10 | 9 | 2 |
| 660 | 6 | 4 | 8 | 9 | 5 | 4 | 10 | 5 | 3 | 4 | 9 | 1 | 0 | 11 |
| 661 | 7 | 7 | 8 | 10 | 9 | 6 | 3 | 7 | 7 | 7 | 10 | 0 | 3 | 6 |
| 662 | 0 | 4 | 5 | 1 | 10 | 0 | 7 | 3 | 0 | 0 | 3 | 9 | 11 | 11 |
| 663 | 3 | 7 | 5 | 2 | 8 | 8 | 10 | 3 | 11 | 4 | 2 | 5 | 6 | 5 |
| 664 | 11 | 1 | 1 | 0 | 11 | 1 | 7 | 6 | 4 | 5 | 6 | 11 | 2 | 11 |
| 665 | 6 | 2 | 7 | 3 | 7 | 2 | 5 | 4 | 9 | 10 | 9 | 11 | 11 | 8 |
| 666 | 2 | 10 | 7 | 5 | 7 | 4 | 0 | 3 | 7 | 2 | 10 | 5 | 8 | 10 |
| 667 | 1 | 1 | 8 | 2 | 10 | 4 | 0 | 3 | 6 | 10 | 7 | 7 | 1 | 8 |
| 668 | 7 | 4 | 1 | 2 | 10 | 3 | 9 | 2 | 5 | 6 | 10 | 4 | 4 | 0 |
| 669 | 8 | 10 | 1 | 11 | 9 | 10 | 9 | 0 | 3 | 4 | 3 | 0 | 6 | 5 |
| 670 | 8 | 7 | 11 | 4 | 6 | 10 | 4 | 2 | 1 | 11 | 5 | 2 | 6 | 9 |
| 671 | 2 | 9 | 9 | 3 | 3 | 4 | 8 | 6 | 10 | 10 | 9 | 6 | 10 | 7 |
| 672 | 6 | 8 | 3 | 4 | 7 | 0 | 9 | 6 | 9 | 5 | 2 | 8 | 3 | 2 |
| 673 | 11 | 0 | 0 | 3 | 1 | 4 | 8 | 2 | 1 | 3 | 0 | 8 | 3 | 0 |
| 674 | 11 | 10 | 5 | 7 | 11 | 4 | 3 | 10 | 4 | 1 | 8 | 4 | 3 | 6 |
| 675 | 9 | 5 | 7 | 2 | 11 | 3 | 11 | 3 | 4 | 3 | 3 | 11 | 5 | 5 |
| 676 | 11 | 1 | 9 | 6 | 5 | 3 | 3 | 4 | 9 | 4 | 1 | 6 | 3 | 10 |
| 677 | 0 | 0 | 8 | 8 | 0 | 11 | 7 | 9 | 11 | 6 | 4 | 11 | 4 | 3 |
| 678 | 4 | 6 | 7 | 7 | 1 | 10 | 0 | 9 | 6 | 10 | 6 | 2 | 4 | 10 |
| 679 | 1 | 0 | 4 | 10 | 2 | 3 | 4 | 9 | 2 | 2 | 9 | 2 | 0 | 1 |
| 680 | 1 | 9 | 2 | 6 | 5 | 1 | 6 | 5 | 9 | 5 | 10 | 10 | 7 | 3 |
| 681 | 8 | 8 | 3 | 0 | 6 | 3 | 0 | 1 | 0 | 10 | 6 | 7 | 8 | 9 |
| 682 | 5 | 8 | 10 | 1 | 6 | 2 | 1 | 8 | 1 | 4 | 6 | 10 | 1 | 3 |
| 683 | 6 | 4 | 11 | 5 | 4 | 6 | 4 | 3 | 3 | 10 | 3 | 11 | 3 | 7 |
| 684 | 2 | 6 | 8 | 7 | 3 | 7 | 9 | 6 | 0 | 1 | 3 | 2 | 0 | 5 |
| 685 | 0 | 3 | 2 | 5 | 9 | 1 | 8 | 4 | 6 | 11 | 10 | 0 | 6 | 10 |
| 686 | 10 | 7 | 0 | 5 | 1 | 10 | 4 | 4 | 10 | 0 | 9 | 3 | 3 | 5 |
| 687 | 9 | 2 | 0 | 7 | 10 | 5 | 5 | 7 | 0 | 3 | 10 | 4 | 2 | 6 |
| 688 | 8 | 9 | 2 | 10 | 11 | 10 | 7 | 1 | 1 | 7 | 8 | 5 | 3 | 10 |
| 689 | 8 | 3 | 0 | 9 | 3 | 0 | 3 | 5 | 8 | 2 | 6 | 0 | 9 | 8 |
| 690 | 9 | 1 | 11 | 1 | 7 | 11 | 5 | 9 | 6 | 7 | 1 | 3 | 9 | 9 |
| 691 | 0 | 10 | 5 | 5 | 10 | 9 | 3 | 0 | 3 | 5 | 6 | 5 | 4 | 7 |
| 692 | 2 | 7 | 4 | 8 | 5 | 11 | 10 | 9 | 5 | 9 | 11 | 5 | 2 | 11 |
| 693 | 3 | 5 | 8 | 3 | 2 | 7 | 7 | 6 | 1 | 6 | 6 | 10 | 7 | 9 |
| 694 | 1 | 9 | 0 | 4 | 7 | 9 | 10 | 8 | 2 | 8 | 7 | 1 | 4 | 11 |
| 695 | 11 | 8 | 7 | 6 | 8 | 11 | 11 | 10 | 9 | 2 | 9 | 3 | 4 | 7 |
| 696 | 11 | 3 | 3 | 3 | 7 | 8 | 10 | 0 | 6 | 9 | 5 | 7 | 8 | 6 |
| 697 | 1 | 0 | 3 | 4 | 11 | 9 | 3 | 7 | 0 | 7 | 8 | 10 | 6 | 8 |
| 698 | 5 | 7 | 3 | 11 | 6 | 3 | 7 | 4 | 7 | 8 | 8 | 3 | 10 | 2 |
| 699 | 2 | 9 | 10 | 3 | 10 | 10 | 0 | 4 | 4 | 7 | 5 | 9 | 2 | 5 |
| 700 | 3 | 0 | 6 | 9 | 1 | 2 | 7 | 0 | 0 | 10 | 8 | 1 | 9 | 2 |
| 701 | 5 | 9 | 5 | 9 | 7 | 10 | 0 | 11 | 3 | 2 | 9 | 3 | 10 | 9 |
| 702 | 4 | 2 | 6 | 2 | 2 | 4 | 5 | 6 | 4 | 2 | 4 | 11 | 10 | 6 |
| 703 | 3 | 11 | 1 | 11 | 9 | 9 | 10 | 2 | 1 | 2 | 11 | 2 | 2 | 8 |
| 704 | 10 | 5 | 1 | 6 | 7 | 9 | 5 | 11 | 1 | 4 | 4 | 6 | 1 | 11 |
| 705 | 4 | 2 | 2 | 1 | 3 | 5 | 10 | 10 | 9 | 5 | 8 | 8 | 10 | 1 |
| 706 | 7 | 6 | 1 | 10 | 2 | 9 | 2 | 1 | 4 | 3 | 3 | 2 | 6 | 3 |
| 707 | 0 | 4 | 1 | 0 | 5 | 4 | 2 | 8 | 0 | 7 | 4 | 3 | 1 | 9 |
| 708 | 8 | 0 | 11 | 2 | 1 | 11 | 11 | 5 | 8 | 10 | 0 | 7 | 10 | 6 |
| 709 | 7 | 5 | 3 | 5 | 8 | 2 | 8 | 10 | 3 | 3 | 5 | 9 | 0 | 3 |
| 710 | 4 | 3 | 9 | 5 | 5 | 4 | 4 | 0 | 11 | 0 | 8 | 2 | 0 | 8 |
| 711 | 8 | 11 | 5 | 3 | 0 | 8 | 2 | 0 | 2 | 11 | 1 | 0 | 11 | 11 |
| 712 | 5 | 9 | 5 | 6 | 3 | 6 | 8 | 5 | 1 | 3 | 6 | 7 | 8 | 5 |
| 713 | 11 | 2 | 8 | 6 | 2 | 0 | 4 | 0 | 8 | 11 | 4 | 0 | 2 | 3 |
| 714 | 1 | 8 | 2 | 7 | 2 | 4 | 1 | 6 | 8 | 1 | 9 | 9 | 4 | 0 |
| 715 | 0 | 5 | 0 | 1 | 10 | 2 | 4 | 6 | 2 | 8 | 5 | 8 | 6 | 4 |
| 716 | 8 | 6 | 10 | 7 | 3 | 6 | 11 | 8 | 2 | 0 | 9 | 3 | 1 | 8 |
| 717 | 9 | 8 | 1 | 8 | 5 | 4 | 5 | 10 | 10 | 9 | 1 | 10 | 5 | 8 |
| 718 | 4 | 11 | 11 | 8 | 9 | 4 | 9 | 9 | 8 | 11 | 6 | 1 | 11 | 1 |
| 719 | 5 | 2 | 6 | 2 | 6 | 7 | 10 | 2 | 3 | 6 | 2 | 9 | 5 | 10 |
| 720 | 8 | 6 | 0 | 6 | 6 | 1 | 10 | 7 | 6 | 1 | 11 | 7 | 5 | 0 |
| 721 | 8 | 7 | 9 | 7 | 1 | 11 | 8 | 11 | 1 | 8 | 4 | 3 | 9 | 1 |
| 722 | 3 | 7 | 8 | 11 | 0 | 5 | 4 | 0 | 2 | 4 | 9 | 7 | 7 | 4 |
| 723 | 0 | 1 | 2 | 3 | 8 | 5 | 6 | 9 | 10 | 8 | 6 | 9 | 3 | 11 |
| 724 | 6 | 7 | 1 | 0 | 4 | 0 | 0 | 8 | 6 | 6 | 11 | 10 | 4 | 1 |
| 725 | 10 | 2 | 11 | 9 | 7 | 10 | 1 | 2 | 0 | 3 | 7 | 7 | 9 | 3 |
| 726 | 1 | 1 | 2 | 6 | 1 | 5 | 7 | 2 | 3 | 4 | 9 | 8 | 2 | 7 |
| 727 | 2 | 0 | 0 | 5 | 5 | 8 | 4 | 7 | 9 | 2 | 4 | 11 | 5 | 9 |
| 728 | 5 | 3 | 10 | 9 | 2 | 7 | 4 | 3 | 7 | 9 | 9 | 4 | 4 | 4 |
| 729 | 0 | 8 | 0 | 10 | 4 | 11 | 7 | 0 | 4 | 0 | 2 | 10 | 1 | 10 |
| 730 | 2 | 2 | 11 | 11 | 11 | 11 | 3 | 0 | 3 | 1 | 10 | 10 | 5 | 1 |
| 731 | 7 | 5 | 7 | 8 | 5 | 9 | 10 | 1 | 9 | 2 | 6 | 9 | 7 | 10 |
| 732 | 4 | 5 | 10 | 1 | 0 | 8 | 6 | 4 | 1 | 6 | 3 | 2 | 8 | 2 |
| 733 | 4 | 1 | 1 | 8 | 6 | 8 | 11 | 5 | 0 | 3 | 5 | 3 | 0 | 2 |
| 734 | 0 | 2 | 6 | 11 | 9 | 2 | 0 | 2 | 8 | 4 | 1 | 6 | 8 | 1 |
| 735 | 3 | 2 | 8 | 4 | 3 | 1 | 5 | 1 | 3 | 9 | 7 | 4 | 6 | 11 |
| 736 | 5 | 8 | 7 | 2 | 5 | 7 | 0 | 1 | 11 | 8 | 7 | 3 | 11 | 3 |
| 737 | 7 | 10 | 0 | 3 | 9 | 7 | 11 | 6 | 6 | 7 | 1 | 5 | 4 | 2 |
| 738 | 11 | 5 | 8 | 1 | 11 | 7 | 9 | 1 | 7 | 11 | 1 | 9 | 11 | 0 |
| 739 | 4 | 11 | 8 | 3 | 10 | 3 | 7 | 0 | 11 | 4 | 11 | 4 | 5 | 10 |
| 740 | 2 | 1 | 6 | 5 | 9 | 6 | 11 | 6 | 8 | 2 | 6 | 8 | 0 | 4 |
| 741 | 7 | 11 | 11 | 0 | 8 | 8 | 8 | 4 | 8 | 9 | 2 | 0 | 3 | 7 |
| 742 | 4 | 2 | 10 | 2 | 8 | 10 | 11 | 8 | 6 | 11 | 8 | 7 | 6 | 7 |
| 743 | 9 | 5 | 8 | 10 | 10 | 10 | 9 | 10 | 5 | 1 | 9 | 6 | 2 | 10 |
| 744 | 0 | 5 | 11 | 7 | 3 | 11 | 3 | 4 | 11 | 10 | 7 | 8 | 8 | 8 |
| 745 | 2 | 3 | 1 | 8 | 8 | 9 | 6 | 4 | 11 | 10 | 0 | 3 | 9 | 5 |
| 746 | 7 | 3 | 2 | 2 | 11 | 6 | 4 | 9 | 8 | 8 | 2 | 11 | 7 | 6 |
| 747 | 9 | 8 | 6 | 8 | 8 | 8 | 11 | 11 | 2 | 5 | 0 | 6 | 8 | 6 |
| 748 | 4 | 4 | 2 | 8 | 10 | 9 | 3 | 6 | 1 | 10 | 5 | 6 | 7 | 1 |
| 749 | 5 | 3 | 8 | 6 | 6 | 6 | 9 | 7 | 0 | 9 | 8 | 1 | 7 | 7 |
| 750 | 9 | 5 | 4 | 11 | 9 | 11 | 6 | 7 | 9 | 8 | 4 | 10 | 8 | 11 |
| 751 | 8 | 4 | 9 | 1 | 11 | 1 | 9 | 6 | 11 | 9 | 11 | 8 | 0 | 6 |
| 752 | 3 | 1 | 7 | 2 | 1 | 7 | 5 | 5 | 7 | 1 | 2 | 1 | 8 | 7 |
| 753 | 7 | 9 | 3 | 11 | 4 | 1 | 5 | 1 | 8 | 10 | 10 | 9 | 9 | 0 |
| 754 | 10 | 0 | 3 | 11 | 3 | 2 | 1 | 5 | 6 | 0 | 3 | 2 | 10 | 7 |
| 755 | 9 | 0 | 5 | 1 | 8 | 0 | 8 | 8 | 10 | 8 | 10 | 8 | 5 | 5 |
| 756 | 1 | 4 | 7 | 9 | 8 | 8 | 9 | 2 | 10 | 2 | 7 | 1 | 6 | 9 |
| 757 | 8 | 11 | 8 | 10 | 1 | 7 | 4 | 2 | 10 | 5 | 0 | 1 | 11 | 10 |
| 758 | 6 | 1 | 10 | 1 | 9 | 5 | 9 | 0 | 2 | 3 | 2 | 2 | 10 | 6 |
| 759 | 9 | 9 | 10 | 11 | 2 | 9 | 11 | 2 | 9 | 4 | 6 | 5 | 11 | 5 |
| 760 | 7 | 10 | 8 | 4 | 3 | 7 | 10 | 3 | 10 | 4 | 8 | 9 | 2 | 9 |
| 761 | 3 | 11 | 9 | 7 | 4 | 9 | 4 | 11 | 6 | 3 | 2 | 4 | 5 | 7 |
| 762 | 8 | 1 | 0 | 9 | 2 | 2 | 1 | 9 | 7 | 11 | 3 | 10 | 7 | 0 |
| 763 | 11 | 6 | 1 | 7 | 9 | 0 | 6 | 0 | 5 | 8 | 0 | 4 | 7 | 1 |
| 764 | 6 | 6 | 6 | 8 | 3 | 4 | 10 | 3 | 5 | 8 | 10 | 7 | 9 | 4 |
| 765 | 7 | 3 | 9 | 2 | 8 | 11 | 0 | 6 | 4 | 6 | 9 | 8 | 3 | 3 |
| 766 | 10 | 11 | 10 | 6 | 8 | 3 | 2 | 2 | 1 | 0 | 2 | 11 | 6 | 10 |
| 767 | 4 | 6 | 0 | 0 | 2 | 1 | 11 | 5 | 3 | 10 | 9 | 8 | 11 | 4 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 768 | 10 | 10 | 11 | 7 | 3 | 10 | 2 | 7 | 3 | 7 | 3 | 2 | 11 | 6 |
| 769 | 1 | 11 | 7 | 1 | 5 | 7 | 11 | 6 | 6 | 3 | 2 | 1 | 7 | 0 |
| 770 | 11 | 3 | 1 | 11 | 11 | 6 | 9 | 2 | 2 | 10 | 11 | 6 | 0 | 1 |
| 771 | 6 | 9 | 5 | 5 | 9 | 5 | 0 | 3 | 9 | 6 | 0 | 10 | 6 | 4 |
| 772 | 9 | 7 | 3 | 9 | 6 | 9 | 1 | 0 | 0 | 11 | 1 | 4 | 3 | 2 |
| 773 | 4 | 0 | 9 | 7 | 2 | 1 | 11 | 9 | 5 | 1 | 11 | 4 | 5 | 9 |
| 774 | 4 | 4 | 4 | 0 | 7 | 4 | 7 | 5 | 3 | 0 | 10 | 3 | 2 | 3 |
| 775 | 2 | 7 | 9 | 8 | 8 | 2 | 3 | 6 | 7 | 5 | 7 | 10 | 10 | 3 |
| 776 | 2 | 8 | 10 | 1 | 11 | 9 | 1 | 5 | 11 | 3 | 5 | 2 | 11 | 4 |
| 777 | 3 | 2 | 6 | 3 | 4 | 1 | 2 | 4 | 6 | 1 | 3 | 11 | 0 | 10 |
| 778 | 8 | 10 | 10 | 4 | 9 | 8 | 0 | 8 | 7 | 8 | 11 | 11 | 8 | 9 |
| 779 | 10 | 11 | 9 | 8 | 9 | 6 | 6 | 11 | 8 | 8 | 0 | 2 | 1 | 7 |
| 780 | 9 | 4 | 5 | 11 | 0 | 0 | 9 | 3 | 11 | 7 | 10 | 4 | 9 | 7 |
| 781 | 7 | 11 | 1 | 9 | 1 | 2 | 1 | 10 | 7 | 10 | 5 | 11 | 1 | 11 |
| 782 | 6 | 4 | 9 | 4 | 8 | 5 | 4 | 4 | 1 | 2 | 5 | 6 | 3 | 6 |
| 783 | 10 | 6 | 0 | 9 | 0 | 8 | 3 | 1 | 10 | 2 | 0 | 10 | 8 | 10 |
| 784 | 1 | 2 | 3 | 1 | 9 | 10 | 10 | 4 | 5 | 5 | 6 | 9 | 6 | 6 |
| 785 | 7 | 3 | 1 | 0 | 10 | 4 | 0 | 9 | 0 | 3 | 0 | 8 | 9 | 2 |
| 786 | 10 | 0 | 3 | 9 | 11 | 1 | 5 | 7 | 1 | 0 | 7 | 6 | 2 | 5 |
| 787 | 8 | 10 | 8 | 8 | 8 | 0 | 1 | 7 | 4 | 3 | 6 | 6 | 4 | 7 |
| 788 | 3 | 7 | 5 | 2 | 5 | 4 | 4 | 8 | 3 | 9 | 8 | 9 | 10 | 9 |
| 789 | 3 | 8 | 9 | 4 | 1 | 0 | 5 | 0 | 7 | 3 | 1 | 3 | 6 | 5 |
| 790 | 11 | 5 | 4 | 11 | 9 | 7 | 8 | 5 | 7 | 7 | 5 | 1 | 10 | 6 |
| 791 | 2 | 2 | 2 | 1 | 7 | 1 | 9 | 3 | 8 | 8 | 2 | 6 | 8 | 8 |
| 792 | 3 | 7 | 11 | 0 | 1 | 5 | 7 | 2 | 4 | 6 | 4 | 0 | 7 | 1 |
| 793 | 0 | 1 | 11 | 1 | 8 | 5 | 11 | 3 | 7 | 9 | 11 | 8 | 9 | 5 |
| 794 | 9 | 0 | 8 | 10 | 5 | 3 | 9 | 5 | 6 | 0 | 11 | 8 | 11 | 11 |
| 795 | 5 | 10 | 6 | 0 | 7 | 2 | 10 | 1 | 6 | 11 | 4 | 8 | 6 | 7 |
| 796 | 5 | 1 | 7 | 2 | 4 | 7 | 4 | 10 | 1 | 6 | 0 | 7 | 1 | 1 |
| 797 | 0 | 2 | 0 | 4 | 0 | 2 | 10 | 8 | 11 | 9 | 3 | 7 | 5 | 3 |
| 798 | 0 | 5 | 4 | 3 | 0 | 6 | 11 | 4 | 3 | 11 | 8 | 10 | 1 | 1 |
| 799 | 3 | 8 | 1 | 6 | 10 | 3 | 7 | 4 | 2 | 7 | 9 | 1 | 3 | 3 |
| 800 | 4 | 11 | 1 | 8 | 7 | 11 | 3 | 0 | 4 | 9 | 2 | 9 | 5 | 5 |
| 801 | 5 | 8 | 10 | 0 | 2 | 3 | 5 | 7 | 10 | 1 | 10 | 7 | 7 | 2 |
| 802 | 8 | 2 | 11 | 2 | 0 | 9 | 7 | 9 | 3 | 4 | 0 | 1 | 6 | 8 |
| 803 | 2 | 10 | 9 | 10 | 6 | 10 | 8 | 10 | 4 | 0 | 2 | 3 | 3 | 4 |
| 804 | 3 | 4 | 0 | 11 | 11 | 11 | 10 | 9 | 9 | 4 | 7 | 8 | 3 | 10 |
| 805 | 8 | 4 | 3 | 2 | 3 | 8 | 1 | 10 | 2 | 5 | 9 | 10 | 0 | 4 |
| 806 | 9 | 6 | 3 | 4 | 7 | 2 | 0 | 9 | 5 | 6 | 9 | 6 | 7 | 0 |
| 807 | 8 | 10 | 9 | 4 | 2 | 4 | 6 | 6 | 9 | 7 | 10 | 1 | 3 | 0 |
| 808 | 4 | 0 | 6 | 11 | 3 | 10 | 7 | 1 | 0 | 3 | 10 | 9 | 1 | 7 |
| 809 | 9 | 6 | 0 | 0 | 9 | 9 | 11 | 1 | 2 | 4 | 11 | 3 | 5 | 7 |
| 810 | 9 | 9 | 2 | 9 | 1 | 3 | 9 | 0 | 8 | 6 | 0 | 11 | 10 | 10 |
| 811 | 2 | 3 | 4 | 10 | 3 | 11 | 2 | 11 | 9 | 2 | 3 | 1 | 4 | 9 |
| 812 | 9 | 10 | 7 | 7 | 6 | 10 | 11 | 2 | 5 | 2 | 8 | 10 | 10 | 3 |
| 813 | 3 | 6 | 2 | 7 | 3 | 1 | 0 | 1 | 1 | 7 | 1 | 6 | 10 | 3 |
| 814 | 3 | 11 | 11 | 9 | 1 | 1 | 0 | 8 | 0 | 11 | 2 | 9 | 0 | 0 |
| 815 | 5 | 1 | 3 | 10 | 8 | 0 | 5 | 3 | 0 | 1 | 3 | 10 | 6 | 9 |
| 816 | 11 | 11 | 8 | 5 | 11 | 11 | 8 | 11 | 3 | 7 | 2 | 3 | 1 | 10 |
| 817 | 10 | 0 | 9 | 0 | 10 | 11 | 8 | 4 | 11 | 5 | 6 | 10 | 3 | 0 |
| 818 | 11 | 8 | 0 | 9 | 9 | 7 | 2 | 10 | 5 | 1 | 11 | 10 | 3 | 3 |
| 819 | 5 | 3 | 3 | 5 | 0 | 6 | 1 | 2 | 6 | 4 | 2 | 5 | 10 | 10 |
| 820 | 2 | 0 | 3 | 3 | 9 | 5 | 1 | 5 | 0 | 8 | 0 | 0 | 8 | 5 |
| 821 | 6 | 6 | 8 | 9 | 6 | 1 | 6 | 11 | 10 | 6 | 1 | 11 | 6 | 11 |
| 822 | 9 | 2 | 3 | 3 | 1 | 10 | 2 | 3 | 2 | 2 | 5 | 2 | 8 | 9 |
| 823 | 2 | 9 | 0 | 0 | 5 | 9 | 2 | 0 | 7 | 7 | 1 | 10 | 11 | 0 |
| 824 | 10 | 7 | 5 | 9 | 4 | 2 | 4 | 5 | 9 | 7 | 3 | 5 | 4 | 5 |
| 825 | 1 | 5 | 7 | 5 | 2 | 9 | 2 | 2 | 4 | 9 | 2 | 8 | 11 | 2 |
| 826 | 1 | 5 | 2 | 4 | 11 | 2 | 3 | 3 | 3 | 9 | 9 | 11 | 0 | 10 |
| 827 | 6 | 6 | 6 | 2 | 4 | 4 | 9 | 6 | 8 | 10 | 5 | 4 | 8 | 10 |
| 828 | 1 | 11 | 10 | 10 | 7 | 5 | 1 | 6 | 2 | 8 | 9 | 6 | 6 | 6 |
| 829 | 1 | 11 | 0 | 11 | 10 | 7 | 0 | 10 | 4 | 2 | 0 | 4 | 2 | 4 |
| 830 | 11 | 4 | 7 | 1 | 9 | 11 | 6 | 2 | 2 | 11 | 10 | 7 | 9 | 0 |
| 831 | 11 | 3 | 0 | 6 | 1 | 1 | 11 | 9 | 11 | 7 | 10 | 10 | 10 | 1 |
| 832 | 9 | 4 | 9 | 6 | 3 | 7 | 1 | 8 | 9 | 8 | 7 | 9 | 8 | 6 |
| 833 | 10 | 11 | 8 | 10 | 8 | 1 | 11 | 4 | 5 | 4 | 3 | 5 | 1 | 8 |
| 834 | 9 | 11 | 11 | 2 | 7 | 1 | 2 | 6 | 6 | 4 | 8 | 0 | 11 | 3 |
| 835 | 0 | 3 | 11 | 9 | 5 | 8 | 5 | 1 | 5 | 7 | 6 | 2 | 6 | 11 |
| 836 | 3 | 4 | 1 | 4 | 7 | 7 | 11 | 1 | 3 | 10 | 0 | 5 | 0 | 5 |
| 837 | 7 | 9 | 3 | 11 | 5 | 8 | 11 | 8 | 4 | 7 | 3 | 8 | 0 | 7 |
| 838 | 2 | 7 | 4 | 6 | 4 | 5 | 2 | 7 | 10 | 5 | 9 | 9 | 6 | 5 |
| 839 | 3 | 2 | 4 | 7 | 9 | 2 | 3 | 8 | 6 | 11 | 9 | 2 | 4 | 4 |
| 840 | 8 | 7 | 1 | 7 | 8 | 3 | 5 | 9 | 8 | 9 | 1 | 8 | 1 | 9 |
| 841 | 3 | 4 | 3 | 6 | 5 | 9 | 5 | 10 | 11 | 8 | 1 | 5 | 4 | 3 |
| 842 | 2 | 10 | 3 | 8 | 0 | 3 | 10 | 10 | 6 | 1 | 3 | 0 | 9 | 1 |
| 843 | 4 | 1 | 9 | 10 | 1 | 0 | 2 | 10 | 11 | 5 | 7 | 0 | 5 | 10 |
| 844 | 8 | 8 | 4 | 11 | 5 | 1 | 8 | 0 | 9 | 2 | 1 | 2 | 3 | 8 |
| 845 | 1 | 11 | 3 | 7 | 10 | 6 | 3 | 7 | 2 | 6 | 4 | 11 | 10 | 1 |
| 846 | 7 | 4 | 1 | 3 | 7 | 3 | 10 | 7 | 11 | 8 | 3 | 9 | 7 | 7 |
| 847 | 4 | 5 | 11 | 7 | 10 | 8 | 5 | 9 | 7 | 3 | 7 | 5 | 7 | 3 |
| 848 | 5 | 7 | 0 | 9 | 7 | 11 | 7 | 10 | 11 | 7 | 9 | 0 | 6 | 2 |
| 849 | 10 | 5 | 10 | 6 | 11 | 7 | 6 | 5 | 2 | 8 | 8 | 8 | 7 | 10 |
| 850 | 6 | 5 | 5 | 1 | 7 | 8 | 8 | 7 | 0 | 4 | 8 | 8 | 9 | 11 |
| 851 | 4 | 9 | 7 | 1 | 11 | 11 | 4 | 11 | 10 | 4 | 5 | 1 | 8 | 6 |
| 852 | 5 | 1 | 5 | 8 | 6 | 11 | 6 | 7 | 3 | 4 | 9 | 10 | 5 | 4 |
| 853 | 1 | 4 | 2 | 0 | 1 | 9 | 10 | 9 | 10 | 11 | 6 | 10 | 5 | 3 |
| 854 | 3 | 3 | 6 | 6 | 7 | 2 | 9 | 4 | 5 | 4 | 2 | 4 | 11 | 1 |
| 855 | 6 | 10 | 11 | 6 | 10 | 3 | 6 | 7 | 0 | 2 | 0 | 9 | 5 | 1 |
| 856 | 11 | 7 | 2 | 11 | 3 | 0 | 1 | 0 | 5 | 4 | 5 | 2 | 2 | 11 |
| 857 | 7 | 10 | 4 | 10 | 4 | 7 | 3 | 6 | 1 | 2 | 10 | 2 | 8 | 7 |
| 858 | 6 | 4 | 3 | 5 | 3 | 10 | 9 | 0 | 7 | 3 | 8 | 5 | 11 | 1 |
| 859 | 2 | 2 | 7 | 1 | 6 | 3 | 6 | 1 | 11 | 0 | 9 | 5 | 1 | 5 |
| 860 | 2 | 6 | 5 | 10 | 3 | 7 | 3 | 9 | 6 | 4 | 9 | 0 | 10 | 11 |
| 861 | 7 | 3 | 1 | 4 | 4 | 5 | 3 | 5 | 9 | 11 | 9 | 3 | 5 | 0 |
| 862 | 9 | 2 | 2 | 5 | 2 | 0 | 4 | 5 | 10 | 7 | 0 | 2 | 7 | 6 |
| 863 | 2 | 4 | 8 | 11 | 6 | 2 | 10 | 6 | 1 | 6 | 10 | 5 | 4 | 6 |
| 864 | 11 | 6 | 7 | 8 | 10 | 11 | 3 | 7 | 8 | 5 | 11 | 2 | 7 | 8 |
| 865 | 10 | 8 | 7 | 5 | 9 | 5 | 1 | 1 | 1 | 0 | 8 | 4 | 0 | 10 |
| 866 | 7 | 9 | 11 | 10 | 6 | 0 | 0 | 4 | 3 | 9 | 0 | 4 | 5 | 9 |
| 867 | 9 | 8 | 7 | 10 | 3 | 6 | 8 | 7 | 3 | 10 | 7 | 8 | 1 | 0 |
| 868 | 7 | 9 | 0 | 11 | 11 | 2 | 6 | 5 | 1 | 1 | 2 | 6 | 9 | 9 |
| 869 | 9 | 9 | 8 | 3 | 2 | 5 | 3 | 7 | 9 | 9 | 5 | 9 | 4 | 11 |
| 870 | 1 | 3 | 0 | 3 | 8 | 3 | 8 | 4 | 10 | 3 | 5 | 3 | 7 | 4 |
| 871 | 5 | 1 | 6 | 1 | 5 | 2 | 7 | 7 | 4 | 10 | 11 | 5 | 7 | 6 |
| 872 | 11 | 0 | 2 | 0 | 4 | 9 | 1 | 11 | 11 | 10 | 3 | 1 | 9 | 10 |
| 873 | 5 | 6 | 6 | 6 | 11 | 1 | 1 | 9 | 8 | 2 | 8 | 1 | 0 | 11 |
| 874 | 0 | 2 | 7 | 3 | 11 | 8 | 1 | 7 | 1 | 6 | 10 | 8 | 3 | 3 |
| 875 | 0 | 11 | 4 | 6 | 11 | 11 | 9 | 3 | 9 | 10 | 4 | 2 | 11 | 6 |
| 876 | 5 | 6 | 5 | 4 | 2 | 10 | 2 | 10 | 7 | 11 | 0 | 2 | 0 | 4 |
| 877 | 0 | 4 | 6 | 11 | 2 | 11 | 8 | 3 | 10 | 8 | 0 | 6 | 6 | 0 |
| 878 | 8 | 3 | 1 | 3 | 5 | 0 | 10 | 4 | 1 | 2 | 7 | 11 | 1 | 5 |
| 879 | 4 | 3 | 0 | 7 | 0 | 10 | 4 | 7 | 5 | 8 | 0 | 6 | 3 | 11 |
| 880 | 11 | 11 | 0 | 2 | 2 | 2 | 5 | 0 | 5 | 3 | 8 | 11 | 0 | 9 |
| 881 | 2 | 9 | 2 | 4 | 0 | 0 | 1 | 9 | 2 | 10 | 1 | 9 | 1 | 4 |
| 882 | 9 | 7 | 4 | 5 | 8 | 0 | 0 | 1 | 11 | 3 | 9 | 7 | 8 | 10 |
| 883 | 2 | 7 | 7 | 7 | 6 | 8 | 10 | 8 | 0 | 3 | 0 | 11 | 2 | 4 |
| 884 | 0 | 0 | 0 | 0 | 2 | 0 | 1 | 9 | 6 | 9 | 7 | 0 | 6 | 8 |
| 885 | 7 | 0 | 5 | 2 | 6 | 7 | 10 | 7 | 2 | 5 | 8 | 4 | 4 | 2 |
| 886 | 3 | 4 | 10 | 9 | 4 | 6 | 4 | 1 | 4 | 1 | 9 | 3 | 11 | 1 |
| 887 | 10 | 3 | 2 | 0 | 9 | 8 | 11 | 7 | 0 | 9 | 4 | 2 | 8 | 4 |
| 888 | 8 | 5 | 10 | 0 | 8 | 2 | 11 | 10 | 5 | 9 | 7 | 3 | 11 | 0 |
| 889 | 7 | 10 | 8 | 8 | 10 | 4 | 5 | 1 | 2 | 5 | 3 | 11 | 6 | 4 |
| 890 | 7 | 6 | 5 | 7 | 11 | 3 | 0 | 11 | 9 | 11 | 11 | 7 | 2 | 9 |
| 891 | 4 | 9 | 6 | 5 | 6 | 7 | 7 | 6 | 10 | 1 | 11 | 8 | 2 | 5 |
| 892 | 7 | 2 | 7 | 8 | 7 | 5 | 9 | 10 | 10 | 9 | 0 | 8 | 4 | 7 |
| 893 | 10 | 0 | 7 | 0 | 11 | 6 | 0 | 8 | 0 | 1 | 11 | 5 | 11 | 8 |
| 894 | 6 | 10 | 8 | 3 | 6 | 9 | 10 | 2 | 7 | 3 | 3 | 2 | 5 | 9 |
| 895 | 6 | 3 | 11 | 5 | 7 | 3 | 3 | 1 | 7 | 6 | 4 | 6 | 8 | 9 |
| 896 | 1 | 7 | 1 | 10 | 6 | 2 | 5 | 11 | 2 | 3 | 5 | 5 | 5 | 1 |
| 897 | 8 | 5 | 5 | 0 | 9 | 11 | 4 | 6 | 11 | 0 | 2 | 9 | 1 | 8 |
| 898 | 1 | 8 | 9 | 4 | 5 | 10 | 10 | 9 | 9 | 0 | 11 | 7 | 1 | 2 |
| 899 | 11 | 1 | 1 | 5 | 0 | 11 | 4 | 6 | 1 | 9 | 10 | 10 | 11 | 3 |
| 900 | 8 | 10 | 2 | 2 | 2 | 1 | 7 | 3 | 7 | 10 | 8 | 3 | 9 | 6 |
| 901 | 3 | 9 | 10 | 3 | 0 | 1 | 3 | 8 | 7 | 0 | 1 | 5 | 5 | 8 |
| 902 | 11 | 9 | 8 | 0 | 0 | 7 | 0 | 1 | 8 | 4 | 8 | 7 | 4 | 6 |
| 903 | 0 | 8 | 8 | 11 | 7 | 4 | 0 | 10 | 10 | 0 | 6 | 5 | 9 | 11 |
| 904 | 7 | 5 | 6 | 0 | 3 | 3 | 2 | 2 | 3 | 1 | 11 | 3 | 6 | 1 |
| 905 | 9 | 5 | 2 | 4 | 0 | 7 | 8 | 0 | 10 | 5 | 4 | 8 | 6 | 2 |
| 906 | 0 | 8 | 10 | 0 | 1 | 8 | 4 | 4 | 8 | 0 | 8 | 1 | 2 | 9 |
| 907 | 3 | 5 | 3 | 2 | 8 | 7 | 9 | 1 | 8 | 7 | 3 | 0 | 2 | 8 |
| 908 | 5 | 9 | 1 | 10 | 3 | 9 | 0 | 2 | 11 | 5 | 8 | 9 | 9 | 11 |
| 909 | 11 | 4 | 10 | 0 | 3 | 9 | 6 | 5 | 1 | 9 | 9 | 9 | 3 | 5 |
| 910 | 9 | 0 | 9 | 10 | 9 | 8 | 6 | 6 | 3 | 1 | 5 | 0 | 7 | 4 |
| 911 | 7 | 2 | 2 | 2 | 4 | 0 | 3 | 10 | 0 | 0 | 7 | 4 | 6 | 3 |
| 912 | 4 | 2 | 3 | 6 | 8 | 3 | 6 | 2 | 2 | 10 | 1 | 0 | 11 | 2 |
| 913 | 9 | 3 | 11 | 7 | 7 | 10 | 10 | 0 | 2 | 1 | 9 | 8 | 0 | 5 |
| 914 | 1 | 7 | 2 | 11 | 5 | 5 | 7 | 9 | 11 | 1 | 3 | 6 | 4 | 4 |
| 915 | 6 | 8 | 2 | 4 | 0 | 4 | 9 | 1 | 6 | 0 | 9 | 2 | 10 | 1 |
| 916 | 1 | 1 | 10 | 3 | 6 | 7 | 11 | 10 | 0 | 10 | 3 | 8 | 4 | 6 |
| 917 | 1 | 4 | 7 | 2 | 6 | 10 | 0 | 3 | 11 | 4 | 4 | 2 | 0 | 0 |

Example #6 of a group-based CS hopping pattern

| m | $n_{cs}(n)$ | | | | | | | | | | | | | |
|---|---|---|---|---|---|---|---|---|---|---|---|---|---|---|
| 918 | 7 | 1 | 9 | 1 | 2 | 9 | 10 | 6 | 8 | 4 | 1 | 4 | 9 | 8 |
| 919 | 8 | 5 | 6 | 2 | 0 | 6 | 1 | 11 | 7 | 1 | 10 | 6 | 3 | 2 |
| 920 | 11 | 10 | 1 | 6 | 2 | 4 | 1 | 2 | 6 | 6 | 5 | 8 | 8 | 4 |
| 921 | 1 | 10 | 7 | 6 | 5 | 8 | 2 | 5 | 0 | 1 | 7 | 7 | 9 | 10 |
| 922 | 7 | 1 | 5 | 6 | 5 | 10 | 0 | 0 | 5 | 9 | 4 | 3 | 4 | 4 |
| 923 | 5 | 4 | 5 | 7 | 8 | 1 | 3 | 8 | 2 | 9 | 2 | 6 | 9 | 10 |
| 924 | 3 | 0 | 10 | 11 | 5 | 3 | 6 | 9 | 8 | 10 | 5 | 10 | 5 | 6 |
| 925 | 1 | 10 | 5 | 7 | 4 | 11 | 4 | 1 | 7 | 6 | 11 | 0 | 9 | 0 |
| 926 | 2 | 6 | 8 | 2 | 7 | 8 | 6 | 0 | 4 | 1 | 6 | 7 | 2 | 2 |
| 927 | 5 | 6 | 5 | 3 | 7 | 7 | 9 | 2 | 1 | 0 | 4 | 5 | 3 | 9 |
| 928 | 4 | 10 | 4 | 5 | 4 | 9 | 0 | 10 | 2 | 11 | 3 | 9 | 10 | 2 |
| 929 | 10 | 2 | 11 | 10 | 6 | 11 | 2 | 8 | 1 | 1 | 9 | 3 | 7 | 11 |
| 930 | 4 | 0 | 0 | 8 | 4 | 3 | 2 | 5 | 1 | 10 | 8 | 9 | 2 | 0 |
| 931 | 6 | 6 | 0 | 1 | 11 | 6 | 8 | 6 | 7 | 9 | 4 | 2 | 4 | 1 |
| 932 | 6 | 5 | 9 | 3 | 9 | 1 | 3 | 11 | 6 | 10 | 8 | 4 | 2 | 2 |
| 933 | 2 | 1 | 1 | 8 | 7 | 4 | 4 | 9 | 3 | 11 | 4 | 2 | 4 | 0 |
| 934 | 2 | 3 | 7 | 1 | 10 | 5 | 4 | 10 | 6 | 11 | 1 | 9 | 3 | 9 |
| 935 | 6 | 11 | 10 | 11 | 8 | 9 | 3 | 7 | 10 | 7 | 11 | 9 | 9 | 9 |
| 936 | 8 | 0 | 0 | 3 | 6 | 8 | 9 | 5 | 5 | 5 | 3 | 7 | 3 | 1 |
| 937 | 8 | 8 | 5 | 8 | 11 | 7 | 11 | 3 | 1 | 5 | 11 | 11 | 10 | 0 |
| 938 | 3 | 7 | 2 | 8 | 9 | 9 | 11 | 11 | 9 | 7 | 9 | 10 | 0 | 9 |
| 939 | 10 | 8 | 6 | 9 | 2 | 6 | 9 | 0 | 6 | 2 | 5 | 5 | 5 | 3 |
| 940 | 8 | 1 | 6 | 2 | 10 | 1 | 5 | 6 | 5 | 11 | 9 | 5 | 2 | 0 |
| 941 | 0 | 3 | 6 | 3 | 3 | 9 | 3 | 10 | 4 | 1 | 7 | 7 | 10 | 9 |
| 942 | 4 | 1 | 1 | 3 | 9 | 11 | 7 | 8 | 6 | 4 | 4 | 8 | 7 | 8 |
| 943 | 7 | 6 | 4 | 8 | 11 | 9 | 6 | 8 | 7 | 10 | 10 | 8 | 6 | 8 |
| 944 | 0 | 7 | 7 | 10 | 1 | 4 | 2 | 3 | 5 | 9 | 6 | 4 | 2 | 6 |
| 945 | 2 | 9 | 4 | 6 | 6 | 4 | 10 | 10 | 2 | 2 | 7 | 6 | 0 | 10 |
| 946 | 11 | 2 | 10 | 6 | 3 | 8 | 0 | 10 | 8 | 3 | 10 | 3 | 6 | 8 |
| 947 | 5 | 3 | 9 | 1 | 8 | 6 | 9 | 0 | 5 | 6 | 1 | 7 | 8 | 0 |
| 948 | 5 | 11 | 2 | 8 | 9 | 7 | 10 | 5 | 11 | 9 | 8 | 11 | 6 | 1 |
| 949 | 3 | 2 | 8 | 10 | 8 | 9 | 4 | 6 | 6 | 9 | 0 | 0 | 3 | 0 |
| 950 | 0 | 6 | 9 | 2 | 1 | 8 | 11 | 2 | 6 | 6 | 11 | 10 | 11 | 8 |
| 951 | 10 | 2 | 11 | 5 | 5 | 4 | 6 | 4 | 4 | 10 | 2 | 1 | 0 | 5 |
| 952 | 2 | 2 | 5 | 4 | 10 | 10 | 8 | 5 | 3 | 2 | 11 | 1 | 11 | 7 |
| 953 | 5 | 2 | 11 | 11 | 8 | 4 | 10 | 11 | 9 | 6 | 5 | 3 | 11 | 3 |
| 954 | 11 | 5 | 8 | 9 | 5 | 5 | 4 | 6 | 9 | 3 | 11 | 4 | 10 | 7 |
| 955 | 6 | 2 | 9 | 4 | 4 | 3 | 1 | 8 | 4 | 4 | 10 | 4 | 4 | 11 |
| 956 | 11 | 7 | 6 | 4 | 3 | 4 | 7 | 7 | 6 | 5 | 2 | 3 | 4 | 0 |
| 957 | 5 | 3 | 7 | 4 | 3 | 0 | 4 | 2 | 0 | 10 | 4 | 4 | 5 | 5 |
| 958 | 6 | 1 | 10 | 7 | 10 | 0 | 7 | 2 | 7 | 0 | 0 | 0 | 8 | 6 |
| 959 | 5 | 5 | 10 | 6 | 5 | 0 | 2 | 8 | 10 | 3 | 6 | 5 | 0 | 0 |
| 960 | 0 | 10 | 4 | 1 | 7 | 8 | 7 | 2 | 10 | 5 | 1 | 2 | 0 | 2 |
| 961 | 4 | 11 | 5 | 2 | 3 | 5 | 6 | 7 | 8 | 7 | 7 | 3 | 3 | 1 |
| 962 | 7 | 9 | 8 | 3 | 5 | 2 | 8 | 2 | 0 | 11 | 7 | 1 | 7 | 1 |
| 963 | 11 | 1 | 11 | 7 | 11 | 0 | 4 | 4 | 6 | 1 | 1 | 7 | 7 | 0 |
| 964 | 10 | 10 | 4 | 6 | 10 | 0 | 11 | 9 | 8 | 10 | 9 | 0 | 4 | 0 |
| 965 | 2 | 8 | 11 | 6 | 3 | 10 | 8 | 8 | 11 | 5 | 4 | 4 | 2 | 3 |
| 966 | 3 | 2 | 8 | 5 | 1 | 4 | 1 | 7 | 3 | 8 | 11 | 7 | 2 | 4 |
| 967 | 2 | 0 | 11 | 7 | 5 | 7 | 2 | 3 | 9 | 11 | 2 | 0 | 6 | 2 |
| 968 | 1 | 4 | 9 | 3 | 0 | 4 | 2 | 1 | 9 | 4 | 6 | 6 | 11 | 4 |
| 969 | 8 | 9 | 11 | 8 | 4 | 1 | 8 | 3 | 3 | 7 | 9 | 7 | 8 | 3 |
| 970 | 9 | 3 | 9 | 2 | 8 | 3 | 2 | 1 | 1 | 5 | 0 | 5 | 9 | 7 |
| 971 | 1 | 11 | 11 | 2 | 1 | 0 | 8 | 2 | 10 | 8 | 1 | 4 | 8 | 11 |
| 972 | 3 | 8 | 4 | 9 | 6 | 4 | 2 | 2 | 8 | 8 | 8 | 8 | 4 | 1 |
| 973 | 1 | 9 | 5 | 11 | 0 | 10 | 7 | 2 | 7 | 2 | 2 | 7 | 7 | 11 |
| 974 | 9 | 8 | 0 | 8 | 1 | 8 | 7 | 8 | 1 | 11 | 10 | 4 | 1 | 5 |
| 975 | 9 | 10 | 9 | 5 | 10 | 6 | 5 | 5 | 4 | 1 | 1 | 9 | 2 | 8 |
| 976 | 0 | 11 | 2 | 1 | 8 | 10 | 2 | 11 | 1 | 3 | 7 | 7 | 1 | 11 |
| 977 | 0 | 10 | 10 | 2 | 11 | 6 | 0 | 0 | 1 | 11 | 9 | 1 | 7 | 4 |
| 978 | 10 | 7 | 1 | 1 | 4 | 7 | 0 | 6 | 5 | 0 | 1 | 9 | 2 | 10 |
| 979 | 6 | 10 | 0 | 1 | 1 | 5 | 9 | 4 | 3 | 6 | 7 | 9 | 0 | 5 |
| 980 | 8 | 11 | 7 | 9 | 5 | 2 | 7 | 0 | 2 | 5 | 6 | 7 | 5 | 7 |
| 981 | 3 | 10 | 1 | 10 | 0 | 6 | 1 | 5 | 0 | 5 | 6 | 3 | 7 | 3 |
| 982 | 11 | 6 | 3 | 7 | 10 | 8 | 2 | 4 | 3 | 10 | 10 | 4 | 3 | 4 |
| 983 | 9 | 4 | 3 | 11 | 8 | 1 | 10 | 2 | 3 | 0 | 8 | 11 | 0 | 8 |
| 984 | 1 | 6 | 5 | 5 | 1 | 1 | 2 | 0 | 8 | 1 | 5 | 0 | 6 | 7 |
| 985 | 4 | 4 | 3 | 4 | 6 | 0 | 0 | 11 | 6 | 0 | 2 | 9 | 6 | 7 |
| 986 | 1 | 6 | 11 | 3 | 9 | 5 | 4 | 0 | 3 | 2 | 7 | 8 | 11 | 11 |
| 987 | 8 | 8 | 8 | 9 | 2 | 11 | 2 | 9 | 4 | 5 | 7 | 4 | 9 | 4 |
| 988 | 7 | 5 | 10 | 9 | 6 | 10 | 7 | 4 | 6 | 4 | 9 | 11 | 2 | 6 |
| 989 | 4 | 0 | 7 | 9 | 2 | 8 | 6 | 4 | 9 | 11 | 4 | 6 | 11 | 3 |
| 990 | 1 | 2 | 4 | 9 | 0 | 0 | 5 | 6 | 10 | 9 | 8 | 11 | 9 | 2 |
| 991 | 3 | 1 | 0 | 8 | 10 | 10 | 8 | 2 | 8 | 1 | 6 | 4 | 5 | 2 |
| 992 | 8 | 0 | 4 | 1 | 1 | 4 | 7 | 6 | 11 | 11 | 0 | 10 | 4 | 10 |

Example #6 of a group-based CS hopping pattern

| m | $n_{cs}(n)$ | | | | | | | | | | | | | |
|---|---|---|---|---|---|---|---|---|---|---|---|---|---|---|
| 993 | 0 | 0 | 11 | 11 | 4 | 5 | 9 | 6 | 0 | 4 | 6 | 11 | 10 | 6 |
| 994 | 6 | 9 | 9 | 7 | 2 | 2 | 0 | 11 | 1 | 9 | 6 | 0 | 7 | 10 |
| 995 | 6 | 1 | 0 | 10 | 11 | 3 | 10 | 4 | 8 | 10 | 0 | 6 | 11 | 7 |
| 996 | 2 | 0 | 6 | 9 | 10 | 0 | 9 | 7 | 9 | 4 | 0 | 8 | 1 | 8 |
| 997 | 0 | 7 | 8 | 9 | 3 | 7 | 5 | 3 | 4 | 10 | 3 | 0 | 1 | 3 |
| 998 | 10 | 6 | 8 | 7 | 10 | 10 | 1 | 6 | 11 | 0 | 5 | 1 | 5 | 9 |
| 999 | 0 | 4 | 2 | 6 | 7 | 9 | 4 | 7 | 6 | 2 | 2 | 8 | 2 | 5 |
| 1000 | 9 | 11 | 11 | 3 | 0 | 11 | 7 | 5 | 4 | 3 | 11 | 11 | 8 | 0 |
| 1001 | 10 | 6 | 9 | 10 | 2 | 0 | 8 | 5 | 3 | 4 | 10 | 7 | 0 | 5 |
| 1002 | 4 | 3 | 4 | 5 | 1 | 2 | 5 | 3 | 6 | 7 | 8 | 0 | 8 | 6 |
| 1003 | 6 | 11 | 6 | 0 | 0 | 10 | 7 | 0 | 9 | 6 | 1 | 8 | 10 | 3 |
| 1004 | 9 | 1 | 5 | 11 | 10 | 5 | 2 | 10 | 2 | 8 | 11 | 11 | 1 | 2 |
| 1005 | 4 | 2 | 11 | 4 | 2 | 0 | 6 | 10 | 8 | 6 | 8 | 10 | 1 | 9 |
| 1006 | 4 | 0 | 1 | 7 | 11 | 3 | 1 | 0 | 7 | 6 | 9 | 3 | 4 | 7 |
| 1007 | 1 | 6 | 11 | 2 | 11 | 7 | 11 | 11 | 5 | 7 | 4 | 6 | 9 | 4 |
| 1008 | 6 | 7 | 5 | 9 | 2 | 11 | 3 | 6 | 2 | 2 | 8 | 3 | 11 | 0 |
| 1009 | 7 | 0 | 5 | 7 | 1 | 2 | 9 | 1 | 4 | 2 | 1 | 10 | 7 | 7 |
| 1010 | 11 | 2 | 5 | 2 | 11 | 5 | 9 | 8 | 7 | 3 | 9 | 0 | 5 | 6 |
| 1011 | 0 | 1 | 6 | 2 | 6 | 5 | 0 | 9 | 2 | 6 | 10 | 3 | 10 | 7 |
| 1012 | 6 | 0 | 8 | 8 | 11 | 10 | 11 | 10 | 2 | 2 | 1 | 7 | 1 | 5 |
| 1013 | 9 | 4 | 0 | 0 | 8 | 5 | 3 | 11 | 4 | 10 | 0 | 2 | 6 | 9 |
| 1014 | 5 | 9 | 3 | 3 | 10 | 2 | 11 | 11 | 11 | 4 | 0 | 2 | 3 | 2 |
| 1015 | 11 | 5 | 11 | 5 | 2 | 8 | 9 | 11 | 5 | 4 | 10 | 1 | 5 | 7 |
| 1016 | 10 | 1 | 4 | 1 | 3 | 3 | 9 | 4 | 1 | 8 | 3 | 4 | 5 | 11 |
| 1017 | 0 | 5 | 1 | 8 | 11 | 0 | 11 | 6 | 6 | 4 | 3 | 4 | 3 | 9 |
| 1018 | 6 | 3 | 8 | 11 | 7 | 7 | 5 | 2 | 6 | 8 | 5 | 3 | 4 | 7 |
| 1019 | 7 | 10 | 1 | 7 | 9 | 0 | 8 | 3 | 11 | 1 | 6 | 1 | 2 | 4 |
| 1020 | 7 | 8 | 6 | 1 | 8 | 5 | 10 | 2 | 5 | 3 | 10 | 1 | 2 | 3 |
| 1021 | 6 | 2 | 1 | 11 | 1 | 1 | 3 | 1 | 9 | 8 | 6 | 0 | 1 | 6 |
| 1022 | 9 | 5 | 1 | 6 | 3 | 2 | 11 | 9 | 10 | 2 | 1 | 11 | 2 | 4 |
| 1023 | 5 | 8 | 0 | 6 | 2 | 6 | 11 | 6 | 1 | 6 | 2 | 0 | 0 | 7 |
| 1024 | 6 | 10 | 6 | 5 | 8 | 10 | 7 | 4 | 10 | 5 | 7 | 6 | 9 | 10 |
| 1025 | 4 | 6 | 3 | 2 | 7 | 11 | 4 | 3 | 11 | 0 | 10 | 9 | 0 | 7 |
| 1026 | 11 | 7 | 4 | 10 | 2 | 2 | 2 | 1 | 9 | 6 | 5 | 10 | 1 | 2 |
| 1027 | 10 | 1 | 0 | 11 | 0 | 6 | 10 | 2 | 4 | 2 | 0 | 8 | 5 | 11 |
| 1028 | 7 | 3 | 8 | 4 | 8 | 1 | 11 | 0 | 6 | 9 | 9 | 4 | 8 | 9 |
| 1029 | 1 | 11 | 7 | 10 | 5 | 10 | 6 | 11 | 2 | 4 | 4 | 11 | 6 | 3 |
| 1030 | 11 | 2 | 2 | 1 | 5 | 11 | 5 | 6 | 0 | 1 | 6 | 6 | 5 | 5 |
| 1031 | 0 | 11 | 4 | 5 | 0 | 9 | 4 | 6 | 1 | 8 | 1 | 3 | 10 | 0 |
| 1032 | 5 | 2 | 9 | 0 | 4 | 1 | 9 | 9 | 2 | 5 | 3 | 7 | 0 | 4 |
| 1033 | 5 | 8 | 10 | 9 | 2 | 11 | 0 | 11 | 8 | 3 | 11 | 0 | 2 | 10 |
| 1034 | 0 | 3 | 11 | 8 | 9 | 5 | 1 | 10 | 9 | 0 | 3 | 8 | 4 | 1 |
| 1035 | 10 | 0 | 6 | 1 | 1 | 8 | 5 | 7 | 5 | 3 | 0 | 10 | 2 | 7 |
| 1036 | 2 | 7 | 9 | 7 | 9 | 8 | 7 | 4 | 11 | 9 | 11 | 1 | 6 | 4 |
| 1037 | 8 | 6 | 0 | 7 | 8 | 8 | 10 | 6 | 5 | 6 | 5 | 3 | 0 | 9 |
| 1038 | 7 | 5 | 0 | 4 | 7 | 2 | 5 | 9 | 4 | 0 | 7 | 7 | 9 | 8 |
| 1039 | 7 | 6 | 5 | 8 | 0 | 5 | 3 | 2 | 2 | 5 | 9 | 6 | 7 | 7 |
| 1040 | 0 | 8 | 2 | 6 | 11 | 0 | 2 | 1 | 1 | 7 | 0 | 7 | 5 | 3 |
| 1041 | 5 | 11 | 7 | 6 | 2 | 1 | 8 | 10 | 3 | 1 | 0 | 6 | 8 | 1 |
| 1042 | 9 | 6 | 3 | 1 | 9 | 5 | 11 | 8 | 4 | 10 | 1 | 10 | 5 | 8 |
| 1043 | 7 | 1 | 4 | 0 | 1 | 9 | 11 | 9 | 7 | 4 | 5 | 1 | 6 | 10 |
| 1044 | 3 | 8 | 1 | 4 | 7 | 6 | 9 | 10 | 11 | 11 | 6 | 11 | 4 | 9 |
| 1045 | 8 | 8 | 7 | 10 | 0 | 0 | 11 | 0 | 10 | 8 | 11 | 2 | 11 | 7 |
| 1046 | 4 | 3 | 10 | 10 | 4 | 9 | 7 | 4 | 3 | 7 | 4 | 7 | 7 | 11 |
| 1047 | 5 | 5 | 6 | 9 | 5 | 5 | 11 | 2 | 6 | 6 | 7 | 8 | 10 | 4 |
| 1048 | 5 | 3 | 6 | 4 | 1 | 4 | 3 | 5 | 0 | 4 | 10 | 3 | 1 | 2 |
| 1049 | 6 | 4 | 11 | 3 | 7 | 2 | 6 | 8 | 8 | 2 | 5 | 0 | 6 | 11 |
| 1050 | 2 | 8 | 0 | 3 | 6 | 11 | 5 | 2 | 10 | 5 | 2 | 10 | 4 | 0 |
| 1051 | 5 | 0 | 8 | 10 | 7 | 8 | 0 | 2 | 4 | 7 | 2 | 6 | 1 | 3 |
| 1052 | 9 | 1 | 2 | 0 | 10 | 7 | 0 | 7 | 11 | 5 | 7 | 5 | 2 | 9 |
| 1053 | 0 | 9 | 5 | 5 | 3 | 4 | 8 | 11 | 4 | 6 | 9 | 1 | 9 | 3 |
| 1054 | 10 | 10 | 7 | 9 | 4 | 4 | 6 | 9 | 8 | 11 | 10 | 1 | 4 | 8 |
| 1055 | 1 | 6 | 5 | 5 | 9 | 2 | 9 | 7 | 7 | 2 | 10 | 4 | 11 | 9 |
| 1056 | 10 | 4 | 3 | 5 | 6 | 5 | 8 | 6 | 2 | 7 | 7 | 7 | 1 | 6 |
| 1057 | 2 | 1 | 9 | 8 | 1 | 6 | 6 | 1 | 6 | 8 | 1 | 10 | 9 | 3 |
| 1058 | 8 | 10 | 4 | 7 | 6 | 2 | 3 | 8 | 0 | 0 | 6 | 1 | 10 | 7 |
| 1059 | 3 | 5 | 6 | 11 | 0 | 7 | 7 | 3 | 9 | 0 | 5 | 2 | 2 | 3 |
| 1060 | 4 | 10 | 11 | 5 | 1 | 6 | 2 | 3 | 9 | 10 | 11 | 7 | 8 | 4 |
| 1061 | 11 | 8 | 5 | 2 | 3 | 10 | 0 | 8 | 11 | 1 | 7 | 2 | 4 | 7 |
| 1062 | 2 | 10 | 6 | 4 | 9 | 6 | 10 | 3 | 3 | 3 | 6 | 5 | 5 | 8 |
| 1063 | 6 | 6 | 3 | 3 | 9 | 1 | 5 | 3 | 8 | 8 | 4 | 4 | 1 | 10 |
| 1064 | 4 | 9 | 8 | 4 | 1 | 2 | 10 | 0 | 9 | 1 | 6 | 1 | 11 | 0 |
| 1065 | 5 | 10 | 3 | 3 | 8 | 11 | 10 | 7 | 5 | 4 | 9 | 4 | 10 | 0 |
| 1066 | 11 | 1 | 1 | 11 | 8 | 5 | 1 | 4 | 5 | 3 | 0 | 1 | 0 | 6 |
| 1067 | 4 | 6 | 1 | 11 | 1 | 4 | 3 | 2 | 7 | 3 | 8 | 11 | 4 | 10 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1068 | 7 | 4 | 2 | 8 | 8 | 10 | 7 | 3 | 6 | 4 | 8 | 9 | 6 | 4 |
| 1069 | 7 | 9 | 3 | 7 | 10 | 0 | 7 | 4 | 7 | 7 | 9 | 9 | 5 | 1 |
| 1070 | 8 | 7 | 0 | 6 | 11 | 5 | 5 | 3 | 8 | 9 | 9 | 0 | 2 | 5 |
| 1071 | 3 | 0 | 5 | 10 | 8 | 6 | 11 | 10 | 6 | 8 | 10 | 0 | 7 | 8 |
| 1072 | 3 | 11 | 4 | 2 | 7 | 0 | 6 | 9 | 1 | 11 | 11 | 6 | 6 | 4 |
| 1073 | 6 | 9 | 4 | 8 | 11 | 4 | 10 | 6 | 4 | 7 | 6 | 3 | 5 | 7 |
| 1074 | 3 | 7 | 10 | 1 | 0 | 8 | 2 | 9 | 1 | 5 | 0 | 9 | 11 | 8 |
| 1075 | 3 | 3 | 2 | 8 | 6 | 3 | 3 | 4 | 4 | 0 | 11 | 3 | 8 | 11 |
| 1076 | 2 | 4 | 8 | 3 | 3 | 8 | 8 | 6 | 8 | 9 | 3 | 10 | 5 | 3 |
| 1077 | 8 | 3 | 5 | 9 | 10 | 4 | 8 | 3 | 2 | 8 | 4 | 5 | 7 | 0 |
| 1078 | 8 | 7 | 3 | 1 | 0 | 7 | 4 | 1 | 7 | 2 | 2 | 8 | 9 | 7 |
| 1079 | 11 | 9 | 6 | 3 | 7 | 9 | 1 | 4 | 6 | 10 | 5 | 5 | 2 | 7 |
| 1080 | 0 | 9 | 5 | 1 | 5 | 2 | 10 | 2 | 11 | 4 | 1 | 10 | 3 | 6 |
| 1081 | 10 | 7 | 9 | 10 | 8 | 3 | 10 | 7 | 4 | 1 | 4 | 10 | 9 | 6 |
| 1082 | 5 | 8 | 1 | 6 | 8 | 8 | 5 | 8 | 11 | 10 | 8 | 5 | 9 | 0 |
| 1083 | 9 | 0 | 6 | 0 | 9 | 9 | 3 | 6 | 9 | 1 | 11 | 6 | 8 | 3 |
| 1084 | 8 | 5 | 9 | 4 | 7 | 9 | 4 | 7 | 9 | 6 | 0 | 0 | 5 | 4 |
| 1085 | 0 | 11 | 0 | 0 | 10 | 6 | 9 | 3 | 3 | 2 | 8 | 1 | 4 | 3 |
| 1086 | 7 | 10 | 4 | 4 | 5 | 0 | 6 | 6 | 11 | 2 | 4 | 9 | 0 | 10 |
| 1087 | 2 | 4 | 11 | 10 | 5 | 7 | 4 | 11 | 6 | 7 | 0 | 7 | 8 | 1 |
| 1088 | 5 | 7 | 1 | 1 | 4 | 2 | 3 | 11 | 10 | 4 | 5 | 7 | 4 | 3 |
| 1089 | 9 | 0 | 2 | 4 | 6 | 8 | 7 | 2 | 2 | 11 | 6 | 2 | 8 | 7 |
| 1090 | 11 | 0 | 9 | 7 | 2 | 5 | 3 | 5 | 7 | 4 | 4 | 11 | 11 | 1 |
| 1091 | 8 | 6 | 6 | 3 | 9 | 6 | 4 | 5 | 11 | 10 | 3 | 11 | 9 | 5 |
| 1092 | 8 | 10 | 10 | 6 | 4 | 7 | 3 | 3 | 4 | 1 | 2 | 5 | 4 | 11 |
| 1093 | 4 | 0 | 4 | 8 | 7 | 3 | 1 | 7 | 6 | 1 | 3 | 9 | 8 | 5 |
| 1094 | 10 | 11 | 3 | 6 | 10 | 5 | 0 | 0 | 1 | 10 | 5 | 1 | 9 | 10 |
| 1095 | 11 | 1 | 3 | 6 | 11 | 8 | 6 | 1 | 3 | 4 | 2 | 3 | 4 | 0 |
| 1096 | 8 | 11 | 7 | 2 | 9 | 4 | 10 | 5 | 0 | 9 | 11 | 0 | 8 | 10 |
| 1097 | 10 | 6 | 7 | 9 | 2 | 11 | 3 | 2 | 1 | 0 | 2 | 5 | 5 | 6 |
| 1098 | 0 | 8 | 8 | 7 | 8 | 10 | 7 | 10 | 3 | 3 | 4 | 11 | 5 | 2 |
| 1099 | 10 | 8 | 0 | 0 | 7 | 3 | 0 | 11 | 9 | 7 | 8 | 5 | 10 | 11 |
| 1100 | 10 | 4 | 4 | 11 | 7 | 1 | 7 | 7 | 2 | 4 | 6 | 0 | 9 | 9 |
| 1101 | 6 | 8 | 11 | 5 | 8 | 7 | 0 | 2 | 2 | 9 | 2 | 8 | 8 | 11 |
| 1102 | 7 | 4 | 6 | 6 | 3 | 10 | 0 | 11 | 7 | 9 | 6 | 1 | 10 | 8 |
| 1103 | 7 | 10 | 4 | 9 | 2 | 7 | 11 | 1 | 5 | 11 | 9 | 5 | 2 | 3 |
| 1104 | 5 | 2 | 7 | 5 | 5 | 8 | 2 | 9 | 3 | 4 | 9 | 1 | 1 | 7 |
| 1105 | 0 | 10 | 5 | 11 | 9 | 6 | 8 | 9 | 5 | 11 | 11 | 8 | 1 | 6 |
| 1106 | 2 | 10 | 10 | 0 | 2 | 3 | 9 | 8 | 3 | 0 | 1 | 11 | 9 | 4 |
| 1107 | 9 | 8 | 11 | 11 | 11 | 11 | 5 | 5 | 0 | 3 | 9 | 2 | 9 | 6 |
| 1108 | 6 | 11 | 0 | 10 | 11 | 1 | 2 | 7 | 0 | 10 | 5 | 4 | 4 | 6 |
| 1109 | 3 | 7 | 7 | 11 | 6 | 0 | 0 | 1 | 6 | 2 | 10 | 1 | 5 | 10 |
| 1110 | 0 | 6 | 4 | 3 | 0 | 8 | 9 | 2 | 5 | 0 | 3 | 0 | 2 | 11 |
| 1111 | 3 | 0 | 8 | 1 | 6 | 7 | 10 | 11 | 0 | 10 | 5 | 9 | 10 | 5 |
| 1112 | 1 | 0 | 0 | 8 | 10 | 1 | 4 | 1 | 2 | 11 | 4 | 8 | 11 | 10 |
| 1113 | 6 | 5 | 8 | 6 | 10 | 7 | 8 | 9 | 8 | 7 | 4 | 11 | 6 | 8 |
| 1114 | 8 | 11 | 4 | 7 | 1 | 6 | 1 | 9 | 9 | 7 | 10 | 0 | 9 | 6 |
| 1115 | 9 | 7 | 1 | 9 | 7 | 1 | 4 | 9 | 8 | 0 | 3 | 11 | 5 | 2 |
| 1116 | 1 | 1 | 8 | 2 | 2 | 10 | 11 | 9 | 10 | 5 | 1 | 2 | 10 | 4 |
| 1117 | 7 | 5 | 10 | 5 | 3 | 2 | 9 | 6 | 3 | 11 | 4 | 8 | 6 | 2 |
| 1118 | 10 | 8 | 7 | 3 | 4 | 2 | 2 | 10 | 0 | 7 | 7 | 0 | 2 | 4 |
| 1119 | 9 | 6 | 11 | 1 | 8 | 10 | 0 | 11 | 8 | 2 | 8 | 11 | 0 | 0 |
| 1120 | 0 | 5 | 1 | 1 | 4 | 10 | 0 | 3 | 0 | 3 | 2 | 10 | 11 | 4 |
| 1121 | 7 | 5 | 8 | 5 | 10 | 6 | 6 | 11 | 10 | 8 | 10 | 3 | 4 | 11 |
| 1122 | 4 | 5 | 8 | 2 | 8 | 5 | 0 | 8 | 4 | 3 | 5 | 4 | 6 | 5 |
| 1123 | 9 | 2 | 9 | 2 | 1 | 5 | 2 | 3 | 3 | 11 | 1 | 3 | 4 | 5 |
| 1124 | 9 | 10 | 0 | 11 | 11 | 3 | 4 | 11 | 2 | 5 | 10 | 10 | 6 | 9 |
| 1125 | 9 | 1 | 9 | 1 | 7 | 0 | 3 | 0 | 3 | 0 | 7 | 9 | 10 | 3 |
| 1126 | 1 | 4 | 5 | 2 | 4 | 3 | 5 | 2 | 8 | 6 | 5 | 3 | 10 | 3 |
| 1127 | 4 | 2 | 1 | 2 | 10 | 9 | 9 | 8 | 8 | 5 | 7 | 8 | 3 | 10 |
| 1128 | 8 | 7 | 10 | 5 | 8 | 0 | 0 | 9 | 4 | 10 | 6 | 0 | 7 | 4 |
| 1129 | 1 | 8 | 7 | 9 | 6 | 1 | 8 | 1 | 11 | 9 | 11 | 9 | 3 | 2 |
| 1130 | 11 | 9 | 6 | 9 | 10 | 2 | 2 | 6 | 8 | 3 | 0 | 6 | 3 | 4 |
| 1131 | 3 | 8 | 1 | 8 | 11 | 9 | 11 | 7 | 2 | 0 | 9 | 8 | 5 | 8 |
| 1132 | 6 | 2 | 1 | 7 | 5 | 3 | 6 | 4 | 0 | 6 | 10 | 11 | 1 | 8 |
| 1133 | 7 | 2 | 7 | 0 | 9 | 1 | 4 | 4 | 6 | 7 | 7 | 1 | 11 | 8 |
| 1134 | 1 | 10 | 5 | 10 | 11 | 7 | 6 | 3 | 10 | 5 | 9 | 4 | 0 | 2 |
| 1135 | 9 | 11 | 1 | 7 | 9 | 11 | 1 | 0 | 4 | 4 | 7 | 4 | 4 | 4 |
| 1136 | 8 | 2 | 6 | 11 | 11 | 7 | 9 | 11 | 11 | 2 | 11 | 1 | 7 | 11 |
| 1137 | 10 | 4 | 9 | 0 | 11 | 10 | 5 | 4 | 3 | 3 | 1 | 9 | 7 | 1 |
| 1138 | 4 | 8 | 1 | 6 | 10 | 11 | 11 | 9 | 9 | 3 | 2 | 4 | 0 | 9 |
| 1139 | 6 | 6 | 11 | 9 | 0 | 0 | 6 | 0 | 4 | 10 | 4 | 5 | 4 | 5 |
| 1140 | 3 | 2 | 7 | 5 | 2 | 4 | 9 | 7 | 10 | 10 | 2 | 2 | 6 | 1 |
| 1141 | 2 | 0 | 5 | 7 | 1 | 7 | 0 | 9 | 10 | 0 | 7 | 6 | 8 | 4 |
| 1142 | 9 | 3 | 9 | 5 | 0 | 5 | 8 | 7 | 11 | 6 | 3 | 11 | 6 | 10 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1143 | 8 | 4 | 1 | 5 | 5 | 9 | 2 | 3 | 4 | 7 | 10 | 6 | 2 | 10 |
| 1144 | 9 | 6 | 9 | 7 | 11 | 1 | 0 | 10 | 0 | 5 | 2 | 1 | 8 | 10 |
| 1145 | 3 | 4 | 11 | 1 | 9 | 1 | 8 | 7 | 10 | 6 | 8 | 6 | 3 | 4 |
| 1146 | 9 | 11 | 10 | 9 | 6 | 0 | 1 | 4 | 11 | 3 | 4 | 8 | 11 | 0 |
| 1147 | 1 | 9 | 6 | 6 | 5 | 6 | 4 | 4 | 8 | 11 | 7 | 2 | 1 | 3 |
| 1148 | 1 | 11 | 7 | 4 | 1 | 7 | 5 | 4 | 8 | 8 | 0 | 0 | 0 | 8 |
| 1149 | 0 | 7 | 5 | 10 | 2 | 1 | 0 | 8 | 1 | 7 | 1 | 4 | 11 | 11 |
| 1150 | 3 | 5 | 0 | 3 | 1 | 10 | 4 | 8 | 7 | 6 | 9 | 7 | 7 | 2 |
| 1151 | 4 | 1 | 2 | 11 | 7 | 1 | 9 | 8 | 0 | 1 | 4 | 5 | 1 | 4 |
| 1152 | 1 | 3 | 5 | 9 | 4 | 10 | 2 | 0 | 11 | 11 | 2 | 7 | 9 | 10 |
| 1153 | 2 | 9 | 4 | 11 | 8 | 2 | 7 | 9 | 11 | 6 | 4 | 5 | 7 | 1 |
| 1154 | 10 | 0 | 10 | 3 | 7 | 2 | 4 | 9 | 1 | 9 | 10 | 2 | 10 | 9 |
| 1155 | 4 | 5 | 2 | 7 | 4 | 4 | 9 | 5 | 11 | 7 | 0 | 4 | 11 | 8 |
| 1156 | 9 | 1 | 4 | 4 | 6 | 4 | 2 | 0 | 10 | 3 | 0 | 4 | 2 | 5 |
| 1157 | 3 | 9 | 11 | 8 | 0 | 9 | 6 | 4 | 5 | 9 | 7 | 11 | 11 | 0 |
| 1158 | 1 | 9 | 0 | 7 | 3 | 5 | 7 | 5 | 0 | 2 | 1 | 8 | 10 | 0 |
| 1159 | 11 | 2 | 8 | 2 | 5 | 1 | 3 | 7 | 6 | 3 | 2 | 3 | 2 | 10 |
| 1160 | 0 | 8 | 10 | 4 | 1 | 4 | 6 | 1 | 7 | 6 | 4 | 5 | 11 | 4 |
| 1161 | 0 | 4 | 10 | 9 | 8 | 11 | 10 | 0 | 9 | 8 | 7 | 11 | 6 | 6 |
| 1162 | 3 | 8 | 6 | 0 | 4 | 0 | 4 | 2 | 9 | 4 | 6 | 7 | 6 | 0 |
| 1163 | 11 | 1 | 9 | 0 | 5 | 9 | 5 | 1 | 8 | 7 | 3 | 11 | 1 | 11 |
| 1164 | 8 | 11 | 5 | 6 | 4 | 3 | 1 | 0 | 6 | 5 | 4 | 6 | 1 | 2 |
| 1165 | 6 | 11 | 9 | 11 | 1 | 9 | 1 | 10 | 1 | 1 | 6 | 8 | 0 | 9 |
| 1166 | 2 | 11 | 9 | 0 | 2 | 2 | 7 | 3 | 5 | 7 | 5 | 9 | 10 | 7 |
| 1167 | 1 | 0 | 11 | 2 | 11 | 6 | 2 | 6 | 1 | 2 | 9 | 11 | 4 | 1 |
| 1168 | 2 | 8 | 3 | 11 | 4 | 6 | 3 | 4 | 4 | 10 | 8 | 1 | 2 | 2 |
| 1169 | 6 | 9 | 2 | 1 | 7 | 6 | 2 | 8 | 2 | 8 | 9 | 10 | 0 | 5 |
| 1170 | 5 | 11 | 11 | 4 | 10 | 5 | 6 | 2 | 5 | 1 | 2 | 4 | 6 | 2 |
| 1171 | 2 | 7 | 5 | 11 | 3 | 9 | 5 | 10 | 7 | 10 | 4 | 9 | 5 | 4 |
| 1172 | 1 | 3 | 9 | 6 | 6 | 2 | 6 | 11 | 7 | 1 | 8 | 2 | 9 | 7 |
| 1173 | 5 | 1 | 0 | 1 | 6 | 1 | 6 | 4 | 0 | 7 | 8 | 0 | 7 | 9 |
| 1174 | 4 | 8 | 11 | 1 | 4 | 4 | 7 | 8 | 5 | 9 | 3 | 0 | 4 | 6 |
| 1175 | 0 | 2 | 11 | 3 | 3 | 11 | 4 | 7 | 0 | 5 | 3 | 5 | 1 | 7 |
| 1176 | 0 | 11 | 3 | 10 | 10 | 3 | 7 | 10 | 10 | 4 | 0 | 7 | 1 | 9 |
| 1177 | 7 | 2 | 9 | 6 | 5 | 10 | 8 | 2 | 9 | 6 | 4 | 10 | 8 | 0 |
| 1178 | 7 | 2 | 4 | 7 | 6 | 5 | 8 | 7 | 1 | 8 | 8 | 5 | 5 | 11 |
| 1179 | 6 | 11 | 0 | 8 | 10 | 7 | 7 | 5 | 9 | 9 | 3 | 3 | 0 | 2 |
| 1180 | 7 | 7 | 8 | 7 | 9 | 9 | 0 | 8 | 0 | 6 | 3 | 6 | 5 | 9 |
| 1181 | 10 | 1 | 3 | 3 | 0 | 3 | 7 | 3 | 0 | 5 | 1 | 1 | 11 | 2 |
| 1182 | 11 | 2 | 3 | 6 | 6 | 4 | 3 | 10 | 10 | 9 | 3 | 10 | 11 | 4 |
| 1183 | 11 | 3 | 8 | 8 | 10 | 6 | 7 | 7 | 3 | 11 | 5 | 5 | 1 | 1 |
| 1184 | 5 | 0 | 2 | 7 | 11 | 10 | 4 | 0 | 6 | 10 | 6 | 4 | 2 | 11 |
| 1185 | 7 | 3 | 3 | 5 | 1 | 8 | 9 | 2 | 0 | 3 | 6 | 1 | 0 | 4 |
| 1186 | 9 | 8 | 1 | 1 | 10 | 1 | 10 | 11 | 6 | 11 | 0 | 6 | 9 | 7 |
| 1187 | 0 | 10 | 2 | 0 | 8 | 0 | 1 | 0 | 2 | 9 | 1 | 1 | 11 | 5 |
| 1188 | 9 | 0 | 5 | 7 | 2 | 9 | 9 | 3 | 8 | 3 | 6 | 7 | 7 | 9 |
| 1189 | 11 | 1 | 10 | 3 | 1 | 6 | 5 | 5 | 2 | 1 | 7 | 8 | 6 | 8 |
| 1190 | 5 | 9 | 2 | 10 | 7 | 4 | 8 | 1 | 8 | 10 | 3 | 8 | 11 | 9 |
| 1191 | 6 | 5 | 10 | 10 | 1 | 5 | 9 | 2 | 7 | 9 | 10 | 3 | 2 | 3 |
| 1192 | 0 | 7 | 8 | 0 | 11 | 10 | 8 | 8 | 4 | 8 | 2 | 5 | 10 | 8 |
| 1193 | 1 | 8 | 4 | 7 | 0 | 4 | 6 | 4 | 3 | 4 | 1 | 7 | 0 | 6 |
| 1194 | 11 | 4 | 3 | 7 | 1 | 1 | 10 | 3 | 7 | 1 | 3 | 3 | 10 | 6 |
| 1195 | 6 | 3 | 4 | 7 | 3 | 11 | 0 | 3 | 8 | 10 | 8 | 8 | 6 | 5 |
| 1196 | 2 | 3 | 8 | 4 | 10 | 0 | 8 | 10 | 9 | 5 | 7 | 6 | 0 | 7 |
| 1197 | 3 | 10 | 8 | 9 | 3 | 1 | 5 | 2 | 5 | 5 | 3 | 3 | 7 | 9 |
| 1198 | 6 | 0 | 0 | 2 | 1 | 11 | 8 | 1 | 3 | 0 | 11 | 2 | 2 | 8 |
| 1199 | 2 | 1 | 3 | 4 | 4 | 2 | 11 | 11 | 2 | 7 | 9 | 11 | 7 | 5 |
| 1200 | 7 | 6 | 6 | 1 | 5 | 4 | 1 | 1 | 5 | 5 | 1 | 8 | 1 | 5 |
| 1201 | 10 | 3 | 4 | 5 | 6 | 4 | 4 | 10 | 8 | 5 | 5 | 0 | 3 | 1 |
| 1202 | 6 | 6 | 1 | 8 | 11 | 11 | 8 | 2 | 10 | 2 | 0 | 0 | 9 | 2 |
| 1203 | 6 | 11 | 7 | 5 | 3 | 3 | 11 | 1 | 7 | 1 | 5 | 7 | 11 | 0 |
| 1204 | 6 | 3 | 3 | 11 | 7 | 5 | 11 | 9 | 9 | 1 | 7 | 1 | 3 | 3 |
| 1205 | 0 | 7 | 7 | 3 | 3 | 8 | 6 | 4 | 6 | 8 | 4 | 2 | 7 | 6 |
| 1206 | 8 | 7 | 4 | 2 | 4 | 11 | 8 | 6 | 0 | 11 | 8 | 10 | 0 | 0 |
| 1207 | 8 | 10 | 9 | 6 | 7 | 11 | 2 | 10 | 8 | 5 | 1 | 4 | 7 | 8 |
| 1208 | 5 | 4 | 8 | 6 | 0 | 0 | 11 | 4 | 9 | 9 | 0 | 0 | 1 | 2 |
| 1209 | 6 | 4 | 2 | 0 | 9 | 8 | 9 | 6 | 7 | 10 | 9 | 1 | 9 | 1 |
| 1210 | 6 | 5 | 6 | 2 | 4 | 3 | 4 | 7 | 3 | 7 | 1 | 6 | 3 | 9 |
| 1211 | 11 | 9 | 10 | 11 | 11 | 8 | 11 | 6 | 10 | 10 | 10 | 11 | 8 | 5 |
| 1212 | 10 | 1 | 7 | 1 | 3 | 9 | 7 | 10 | 9 | 1 | 9 | 10 | 3 | 8 |
| 1213 | 3 | 8 | 8 | 0 | 8 | 7 | 2 | 1 | 4 | 11 | 10 | 2 | 3 | 1 |
| 1214 | 1 | 11 | 5 | 11 | 7 | 1 | 0 | 6 | 4 | 8 | 8 | 10 | 7 | 7 |
| 1215 | 11 | 3 | 9 | 4 | 2 | 7 | 1 | 2 | 10 | 1 | 0 | 9 | 3 | 11 |
| 1216 | 7 | 11 | 9 | 3 | 3 | 3 | 9 | 10 | 2 | 2 | 1 | 2 | 2 | 7 |
| 1217 | 0 | 7 | 11 | 8 | 1 | 0 | 11 | 7 | 11 | 6 | 5 | 3 | 7 | 11 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1218 | 1 | 0 | 0 | 5 | 9 | 7 | 1 | 5 | 1 | 3 | 8 | 0 | 6 | 11 |
| 1219 | 5 | 1 | 6 | 10 | 4 | 8 | 6 | 6 | 1 | 9 | 5 | 8 | 3 | 8 |
| 1220 | 4 | 1 | 6 | 8 | 7 | 6 | 2 | 4 | 10 | 7 | 2 | 11 | 3 | 6 |
| 1221 | 7 | 0 | 8 | 2 | 7 | 0 | 2 | 3 | 5 | 8 | 6 | 8 | 8 | 10 |
| 1222 | 0 | 5 | 3 | 7 | 7 | 7 | 8 | 7 | 4 | 2 | 6 | 6 | 0 | 2 |
| 1223 | 2 | 2 | 10 | 11 | 10 | 9 | 10 | 3 | 0 | 11 | 8 | 2 | 1 | 11 |
| 1224 | 6 | 0 | 7 | 0 | 2 | 8 | 10 | 7 | 8 | 9 | 1 | 5 | 0 | 0 |
| 1225 | 6 | 1 | 8 | 6 | 8 | 1 | 2 | 5 | 7 | 0 | 2 | 0 | 11 | 4 |
| 1226 | 2 | 9 | 2 | 2 | 1 | 0 | 11 | 5 | 8 | 7 | 4 | 1 | 4 | 7 |
| 1227 | 9 | 4 | 8 | 5 | 5 | 5 | 0 | 9 | 1 | 2 | 2 | 10 | 3 | 2 |
| 1228 | 3 | 10 | 9 | 5 | 5 | 2 | 8 | 8 | 5 | 9 | 8 | 7 | 0 | 1 |
| 1229 | 11 | 2 | 4 | 9 | 4 | 0 | 8 | 9 | 4 | 1 | 9 | 8 | 10 | 2 |
| 1230 | 4 | 5 | 5 | 3 | 3 | 3 | 6 | 2 | 0 | 10 | 6 | 8 | 8 | 1 |
| 1231 | 6 | 3 | 2 | 2 | 5 | 6 | 7 | 1 | 1 | 6 | 1 | 4 | 7 | 7 |
| 1232 | 4 | 0 | 5 | 4 | 9 | 6 | 0 | 4 | 2 | 9 | 8 | 3 | 10 | 1 |
| 1233 | 7 | 3 | 11 | 1 | 4 | 3 | 2 | 2 | 7 | 0 | 7 | 2 | 5 | 9 |
| 1234 | 4 | 5 | 4 | 2 | 11 | 1 | 4 | 0 | 7 | 9 | 2 | 5 | 5 | 0 |
| 1235 | 3 | 1 | 5 | 10 | 1 | 2 | 7 | 6 | 11 | 0 | 11 | 7 | 10 | 5 |
| 1236 | 9 | 4 | 8 | 6 | 4 | 10 | 1 | 5 | 3 | 1 | 10 | 2 | 6 | 5 |
| 1237 | 5 | 8 | 11 | 1 | 5 | 8 | 9 | 5 | 4 | 5 | 10 | 11 | 7 | 11 |
| 1238 | 8 | 5 | 6 | 0 | 10 | 2 | 1 | 11 | 5 | 4 | 4 | 0 | 8 | 9 |
| 1239 | 4 | 6 | 10 | 10 | 5 | 2 | 11 | 11 | 10 | 0 | 6 | 4 | 9 | 6 |
| 1240 | 10 | 4 | 5 | 8 | 9 | 11 | 7 | 8 | 0 | 10 | 4 | 11 | 2 | 7 |
| 1241 | 0 | 10 | 2 | 1 | 0 | 11 | 6 | 8 | 3 | 6 | 5 | 8 | 4 | 9 |
| 1242 | 3 | 10 | 9 | 10 | 3 | 10 | 3 | 3 | 11 | 2 | 5 | 0 | 5 | 0 |
| 1243 | 9 | 5 | 8 | 2 | 9 | 2 | 4 | 10 | 2 | 2 | 4 | 3 | 0 | 4 |
| 1244 | 11 | 5 | 1 | 1 | 9 | 3 | 6 | 6 | 6 | 0 | 3 | 5 | 7 | 3 |
| 1245 | 1 | 2 | 11 | 9 | 8 | 8 | 9 | 8 | 2 | 6 | 11 | 2 | 5 | 6 |
| 1246 | 2 | 10 | 11 | 4 | 0 | 3 | 5 | 9 | 10 | 1 | 8 | 2 | 0 | 5 |
| 1247 | 1 | 9 | 6 | 0 | 4 | 4 | 0 | 10 | 11 | 0 | 9 | 3 | 4 | 11 |
| 1248 | 2 | 4 | 5 | 4 | 7 | 3 | 2 | 11 | 3 | 11 | 3 | 8 | 3 | 0 |
| 1249 | 3 | 4 | 3 | 2 | 11 | 2 | 3 | 5 | 5 | 11 | 0 | 5 | 3 | 11 |
| 1250 | 5 | 5 | 0 | 0 | 0 | 10 | 2 | 10 | 0 | 0 | 11 | 1 | 3 | 5 |
| 1251 | 5 | 1 | 7 | 7 | 10 | 3 | 10 | 8 | 1 | 4 | 2 | 11 | 7 | 10 |
| 1252 | 5 | 9 | 10 | 6 | 10 | 2 | 5 | 4 | 4 | 5 | 6 | 10 | 8 | 10 |
| 1253 | 6 | 11 | 3 | 9 | 0 | 4 | 9 | 11 | 8 | 1 | 1 | 9 | 9 | 11 |
| 1254 | 6 | 10 | 10 | 9 | 7 | 10 | 4 | 5 | 0 | 7 | 11 | 3 | 4 | 4 |
| 1255 | 0 | 5 | 5 | 8 | 2 | 8 | 7 | 9 | 11 | 2 | 8 | 2 | 5 | 9 |
| 1256 | 10 | 5 | 3 | 8 | 11 | 4 | 0 | 5 | 7 | 8 | 1 | 2 | 10 | 5 |
| 1257 | 8 | 8 | 8 | 10 | 9 | 10 | 1 | 2 | 5 | 10 | 7 | 10 | 2 | 1 |
| 1258 | 3 | 1 | 7 | 0 | 3 | 0 | 8 | 9 | 2 | 10 | 0 | 4 | 9 | 11 |
| 1259 | 2 | 3 | 6 | 6 | 2 | 11 | 11 | 8 | 4 | 4 | 4 | 6 | 3 | 6 |
| 1260 | 4 | 2 | 2 | 9 | 7 | 0 | 10 | 10 | 7 | 0 | 0 | 6 | 2 | 11 |
| 1261 | 8 | 6 | 1 | 1 | 0 | 10 | 5 | 9 | 9 | 11 | 6 | 7 | 8 | 1 |
| 1262 | 0 | 1 | 1 | 7 | 6 | 6 | 3 | 11 | 9 | 10 | 9 | 3 | 11 | 9 |
| 1263 | 1 | 7 | 1 | 3 | 9 | 0 | 3 | 10 | 1 | 7 | 6 | 5 | 9 | 7 |
| 1264 | 0 | 3 | 0 | 0 | 2 | 1 | 10 | 0 | 7 | 3 | 10 | 8 | 2 | 7 |
| 1265 | 4 | 4 | 5 | 0 | 9 | 4 | 1 | 10 | 10 | 4 | 1 | 2 | 5 | 2 |
| 1266 | 0 | 1 | 10 | 2 | 9 | 4 | 8 | 2 | 6 | 10 | 1 | 9 | 6 | 5 |
| 1267 | 8 | 7 | 2 | 4 | 2 | 8 | 1 | 0 | 3 | 0 | 11 | 7 | 5 | 0 |
| 1268 | 6 | 2 | 2 | 3 | 0 | 10 | 1 | 5 | 10 | 3 | 9 | 9 | 11 | 3 |
| 1269 | 8 | 2 | 8 | 8 | 4 | 5 | 2 | 10 | 1 | 6 | 4 | 7 | 10 | 7 |
| 1270 | 4 | 4 | 9 | 5 | 3 | 9 | 11 | 2 | 11 | 4 | 4 | 3 | 9 | 5 |
| 1271 | 3 | 5 | 5 | 9 | 8 | 3 | 7 | 11 | 2 | 3 | 7 | 1 | 1 | 7 |
| 1272 | 3 | 9 | 3 | 0 | 9 | 7 | 9 | 0 | 1 | 4 | 2 | 10 | 10 | 3 |
| 1273 | 1 | 6 | 3 | 0 | 1 | 0 | 3 | 6 | 3 | 8 | 9 | 2 | 3 | 6 |
| 1274 | 4 | 9 | 6 | 7 | 3 | 1 | 6 | 7 | 2 | 8 | 11 | 3 | 6 | 2 |
| 1275 | 6 | 7 | 10 | 11 | 0 | 11 | 11 | 3 | 3 | 9 | 2 | 10 | 10 | 1 |
| 1276 | 7 | 0 | 11 | 6 | 3 | 1 | 4 | 3 | 10 | 2 | 11 | 4 | 7 | 5 |
| 1277 | 0 | 7 | 6 | 9 | 6 | 4 | 11 | 8 | 3 | 5 | 10 | 11 | 2 | 0 |
| 1278 | 9 | 2 | 6 | 2 | 2 | 10 | 6 | 11 | 4 | 1 | 0 | 5 | 1 | 10 |
| 1279 | 5 | 8 | 9 | 3 | 10 | 9 | 11 | 4 | 1 | 2 | 3 | 9 | 11 | 6 |
| 1280 | 9 | 9 | 10 | 1 | 1 | 4 | 7 | 11 | 11 | 1 | 5 | 6 | 1 | 3 |
| 1281 | 1 | 2 | 4 | 10 | 4 | 8 | 4 | 2 | 6 | 2 | 6 | 11 | 4 | 5 |
| 1282 | 11 | 5 | 6 | 4 | 2 | 6 | 5 | 8 | 1 | 0 | 10 | 10 | 0 | 1 |
| 1283 | 5 | 8 | 3 | 2 | 5 | 10 | 1 | 3 | 10 | 11 | 9 | 8 | 7 | 0 |
| 1284 | 7 | 6 | 8 | 8 | 9 | 7 | 6 | 9 | 9 | 4 | 0 | 3 | 5 | 6 |
| 1285 | 0 | 10 | 7 | 10 | 6 | 7 | 1 | 6 | 3 | 5 | 11 | 9 | 9 | 7 |
| 1286 | 6 | 0 | 9 | 2 | 4 | 3 | 2 | 5 | 4 | 9 | 7 | 10 | 6 | 4 |
| 1287 | 3 | 1 | 2 | 11 | 6 | 9 | 8 | 10 | 0 | 9 | 8 | 4 | 8 | 3 |
| 1288 | 8 | 11 | 1 | 9 | 3 | 5 | 0 | 11 | 4 | 3 | 2 | 11 | 5 | 9 |
| 1289 | 10 | 3 | 1 | 6 | 5 | 4 | 2 | 1 | 8 | 2 | 8 | 5 | 11 | 2 |
| 1290 | 1 | 7 | 8 | 5 | 0 | 8 | 0 | 5 | 3 | 1 | 5 | 4 | 5 | 1 |
| 1291 | 4 | 4 | 7 | 11 | 8 | 8 | 9 | 7 | 11 | 6 | 8 | 10 | 1 | 11 |
| 1292 | 5 | 11 | 4 | 8 | 7 | 9 | 10 | 2 | 2 | 0 | 10 | 0 | 3 | 4 |
| 1293 | 9 | 3 | 10 | 4 | 4 | 7 | 11 | 7 | 9 | 3 | 10 | 7 | 3 | 7 |
| 1294 | 6 | 1 | 3 | 0 | 0 | 9 | 0 | 6 | 7 | 0 | 7 | 9 | 0 | 2 |
| 1295 | 2 | 3 | 6 | 2 | 4 | 1 | 5 | 6 | 11 | 1 | 6 | 8 | 11 | 9 |
| 1296 | 1 | 1 | 7 | 0 | 1 | 10 | 3 | 8 | 9 | 11 | 3 | 5 | 11 | 5 |
| 1297 | 7 | 2 | 8 | 1 | 1 | 5 | 3 | 0 | 2 | 10 | 10 | 8 | 6 | 10 |
| 1298 | 11 | 7 | 7 | 4 | 3 | 11 | 4 | 3 | 2 | 7 | 3 | 1 | 2 | 10 |
| 1299 | 5 | 3 | 7 | 3 | 0 | 0 | 6 | 0 | 7 | 2 | 6 | 1 | 1 | 0 |
| 1300 | 2 | 5 | 5 | 0 | 3 | 0 | 7 | 11 | 10 | 0 | 4 | 3 | 7 | 5 |
| 1301 | 4 | 0 | 0 | 10 | 2 | 7 | 11 | 0 | 6 | 7 | 9 | 3 | 6 | 0 |
| 1302 | 10 | 4 | 2 | 7 | 5 | 1 | 9 | 3 | 2 | 3 | 11 | 6 | 4 | 1 |
| 1303 | 10 | 1 | 1 | 5 | 10 | 1 | 7 | 9 | 5 | 1 | 1 | 2 | 6 | 5 |
| 1304 | 2 | 11 | 0 | 9 | 0 | 11 | 3 | 5 | 11 | 6 | 11 | 6 | 2 | 2 |
| 1305 | 5 | 7 | 1 | 2 | 11 | 5 | 11 | 7 | 6 | 2 | 5 | 6 | 9 | 10 |
| 1306 | 3 | 5 | 10 | 10 | 0 | 10 | 3 | 2 | 4 | 5 | 4 | 1 | 10 | 10 |
| 1307 | 6 | 10 | 10 | 9 | 3 | 7 | 3 | 9 | 1 | 8 | 9 | 8 | 8 | 5 |
| 1308 | 2 | 10 | 1 | 1 | 8 | 4 | 6 | 5 | 9 | 11 | 2 | 2 | 3 | 4 |
| 1309 | 7 | 5 | 7 | 8 | 6 | 6 | 7 | 7 | 4 | 8 | 6 | 8 | 2 | 3 |
| 1310 | 8 | 11 | 9 | 5 | 11 | 11 | 7 | 6 | 7 | 11 | 9 | 0 | 11 | 1 |
| 1311 | 10 | 8 | 0 | 0 | 10 | 7 | 5 | 8 | 4 | 10 | 0 | 6 | 7 | 3 |
| 1312 | 1 | 8 | 0 | 7 | 4 | 10 | 8 | 11 | 0 | 8 | 4 | 2 | 1 | 4 |
| 1313 | 11 | 0 | 7 | 11 | 7 | 0 | 3 | 1 | 8 | 8 | 5 | 2 | 0 | 9 |
| 1314 | 2 | 5 | 10 | 4 | 11 | 9 | 2 | 4 | 8 | 6 | 6 | 9 | 4 | 8 |
| 1315 | 1 | 5 | 11 | 2 | 9 | 4 | 9 | 2 | 1 | 5 | 11 | 3 | 9 | 8 |
| 1316 | 11 | 7 | 5 | 9 | 7 | 0 | 5 | 0 | 6 | 6 | 6 | 4 | 4 | 3 |
| 1317 | 6 | 4 | 2 | 9 | 6 | 2 | 5 | 10 | 8 | 11 | 1 | 6 | 1 | 7 |
| 1318 | 2 | 8 | 2 | 8 | 0 | 8 | 9 | 0 | 10 | 4 | 0 | 9 | 1 | 1 |
| 1319 | 9 | 10 | 11 | 2 | 1 | 3 | 0 | 11 | 10 | 8 | 3 | 0 | 11 | 7 |
| 1320 | 3 | 3 | 3 | 3 | 11 | 9 | 9 | 8 | 9 | 9 | 5 | 6 | 3 | 4 |
| 1321 | 9 | 5 | 9 | 11 | 4 | 1 | 9 | 1 | 4 | 3 | 4 | 9 | 7 | 3 |
| 1322 | 3 | 1 | 11 | 6 | 1 | 3 | 10 | 4 | 3 | 11 | 8 | 7 | 7 | 8 |
| 1323 | 2 | 0 | 6 | 0 | 11 | 3 | 11 | 2 | 8 | 10 | 7 | 2 | 2 | 5 |
| 1324 | 9 | 10 | 8 | 9 | 4 | 8 | 8 | 0 | 0 | 2 | 7 | 1 | 8 | 2 |
| 1325 | 7 | 7 | 10 | 11 | 6 | 3 | 6 | 10 | 10 | 3 | 9 | 5 | 5 | 8 |
| 1326 | 0 | 9 | 0 | 4 | 0 | 3 | 7 | 7 | 10 | 10 | 10 | 6 | 11 | 1 |
| 1327 | 8 | 9 | 1 | 9 | 10 | 0 | 1 | 8 | 0 | 0 | 8 | 9 | 8 | 5 |
| 1328 | 4 | 5 | 5 | 10 | 10 | 9 | 10 | 9 | 0 | 8 | 7 | 11 | 9 | 2 |
| 1329 | 8 | 6 | 4 | 11 | 4 | 2 | 0 | 9 | 0 | 3 | 0 | 7 | 6 | 10 |
| 1330 | 11 | 9 | 4 | 7 | 8 | 10 | 11 | 2 | 6 | 1 | 10 | 1 | 1 | 7 |
| 1331 | 1 | 10 | 6 | 10 | 10 | 5 | 5 | 6 | 10 | 7 | 2 | 3 | 4 | 8 |
| 1332 | 11 | 2 | 2 | 9 | 1 | 1 | 4 | 11 | 1 | 5 | 5 | 1 | 5 | 11 |
| 1333 | 7 | 7 | 1 | 6 | 5 | 11 | 5 | 9 | 11 | 7 | 11 | 8 | 3 | 3 |
| 1334 | 1 | 2 | 10 | 3 | 2 | 0 | 11 | 8 | 0 | 1 | 7 | 11 | 2 | 9 |
| 1335 | 10 | 0 | 2 | 0 | 5 | 4 | 8 | 6 | 3 | 11 | 4 | 1 | 5 | 10 |
| 1336 | 5 | 6 | 10 | 1 | 1 | 6 | 11 | 5 | 4 | 4 | 11 | 0 | 0 | 1 |
| 1337 | 5 | 1 | 5 | 0 | 0 | 6 | 6 | 3 | 5 | 4 | 0 | 2 | 9 | 7 |
| 1338 | 3 | 2 | 11 | 6 | 8 | 11 | 1 | 9 | 10 | 8 | 7 | 6 | 10 | 0 |
| 1339 | 4 | 0 | 6 | 5 | 11 | 5 | 6 | 4 | 6 | 5 | 8 | 10 | 8 | 2 |
| 1340 | 4 | 6 | 2 | 11 | 6 | 4 | 9 | 6 | 9 | 8 | 7 | 3 | 3 | 1 |
| 1341 | 1 | 9 | 0 | 0 | 9 | 11 | 4 | 7 | 8 | 6 | 0 | 5 | 9 | 11 |
| 1342 | 8 | 10 | 6 | 8 | 5 | 10 | 10 | 2 | 1 | 4 | 3 | 8 | 9 | 7 |
| 1343 | 9 | 2 | 10 | 5 | 6 | 10 | 1 | 1 | 7 | 9 | 1 | 11 | 9 | 2 |
| 1344 | 6 | 0 | 3 | 8 | 1 | 5 | 3 | 6 | 8 | 3 | 8 | 0 | 9 | 7 |
| 1345 | 5 | 8 | 7 | 2 | 11 | 7 | 7 | 4 | 9 | 10 | 10 | 4 | 4 | 2 |
| 1346 | 11 | 9 | 1 | 0 | 11 | 5 | 6 | 8 | 11 | 4 | 7 | 4 | 0 | 9 |
| 1347 | 5 | 3 | 1 | 0 | 1 | 1 | 8 | 10 | 10 | 9 | 1 | 0 | 1 | 9 |
| 1348 | 4 | 4 | 9 | 1 | 6 | 5 | 10 | 5 | 11 | 8 | 9 | 7 | 2 | 9 |
| 1349 | 1 | 10 | 2 | 7 | 2 | 6 | 3 | 3 | 9 | 6 | 8 | 8 | 7 | 11 |
| 1350 | 7 | 8 | 4 | 9 | 10 | 3 | 2 | 3 | 11 | 10 | 4 | 3 | 4 | 4 |
| 1351 | 6 | 5 | 11 | 8 | 0 | 1 | 8 | 4 | 1 | 6 | 4 | 8 | 5 | 1 |
| 1352 | 2 | 7 | 11 | 4 | 3 | 10 | 10 | 4 | 0 | 4 | 9 | 6 | 0 | 1 |
| 1353 | 1 | 6 | 10 | 7 | 7 | 9 | 9 | 5 | 10 | 3 | 2 | 2 | 8 | 3 |
| 1354 | 11 | 0 | 11 | 5 | 6 | 2 | 9 | 3 | 5 | 11 | 7 | 0 | 7 | 3 |
| 1355 | 1 | 6 | 1 | 10 | 6 | 4 | 10 | 1 | 11 | 4 | 10 | 6 | 5 | 11 |
| 1356 | 8 | 3 | 5 | 5 | 8 | 0 | 6 | 11 | 0 | 4 | 5 | 5 | 6 | 1 |
| 1357 | 2 | 8 | 11 | 6 | 6 | 0 | 10 | 7 | 11 | 3 | 6 | 10 | 9 | 7 |
| 1358 | 9 | 8 | 3 | 5 | 6 | 2 | 11 | 9 | 8 | 0 | 4 | 7 | 8 | 0 |
| 1359 | 7 | 3 | 6 | 8 | 1 | 2 | 9 | 3 | 3 | 10 | 11 | 5 | 10 | 7 |
| 1360 | 4 | 9 | 8 | 7 | 4 | 7 | 5 | 3 | 10 | 11 | 11 | 9 | 10 | 3 |
| 1361 | 5 | 0 | 9 | 1 | 7 | 11 | 7 | 10 | 9 | 3 | 11 | 5 | 10 | 4 |
| 1362 | 6 | 10 | 5 | 6 | 9 | 2 | 1 | 1 | 2 | 3 | 10 | 1 | 6 | 6 |
| 1363 | 2 | 9 | 6 | 5 | 7 | 10 | 8 | 2 | 11 | 3 | 0 | 0 | 0 | 6 |
| 1364 | 2 | 4 | 3 | 2 | 0 | 4 | 2 | 8 | 9 | 2 | 9 | 1 | 8 | 8 |
| 1365 | 11 | 0 | 10 | 6 | 9 | 1 | 8 | 11 | 3 | 9 | 9 | 4 | 0 | 0 |
| 1366 | 8 | 0 | 10 | 2 | 1 | 4 | 2 | 7 | 6 | 0 | 6 | 7 | 11 | 1 |
| 1367 | 9 | 7 | 0 | 0 | 3 | 7 | 3 | 4 | 11 | 11 | 6 | 11 | 3 | 4 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1368 | 3 | 0 | 7 | 5 | 9 | 4 | 6 | 6 | 2 | 2 | 9 | 6 | 2 | 5 |
| 1369 | 11 | 10 | 10 | 1 | 9 | 10 | 4 | 4 | 5 | 1 | 4 | 11 | 8 | 11 |
| 1370 | 10 | 1 | 7 | 5 | 2 | 9 | 2 | 8 | 6 | 6 | 4 | 3 | 10 | 6 |
| 1371 | 9 | 0 | 5 | 4 | 5 | 2 | 1 | 8 | 7 | 6 | 9 | 5 | 0 | 10 |
| 1372 | 5 | 2 | 1 | 1 | 8 | 6 | 7 | 2 | 8 | 7 | 10 | 9 | 5 | 0 |
| 1373 | 10 | 3 | 2 | 0 | 3 | 11 | 7 | 0 | 4 | 5 | 5 | 4 | 8 | 2 |
| 1374 | 6 | 11 | 1 | 4 | 5 | 10 | 0 | 0 | 10 | 8 | 8 | 6 | 1 | 5 |
| 1375 | 11 | 3 | 8 | 0 | 6 | 3 | 4 | 2 | 0 | 2 | 9 | 10 | 11 | 0 |
| 1376 | 11 | 8 | 6 | 10 | 5 | 4 | 3 | 5 | 11 | 7 | 5 | 10 | 7 | 6 |
| 1377 | 1 | 11 | 10 | 6 | 8 | 0 | 3 | 9 | 2 | 2 | 5 | 10 | 11 | 8 |
| 1378 | 10 | 2 | 6 | 11 | 7 | 4 | 6 | 0 | 7 | 4 | 3 | 9 | 8 | 10 |
| 1379 | 11 | 7 | 7 | 10 | 0 | 8 | 8 | 6 | 7 | 10 | 1 | 0 | 4 | 6 |
| 1380 | 10 | 0 | 8 | 3 | 0 | 6 | 3 | 7 | 9 | 0 | 7 | 3 | 9 | 8 |
| 1381 | 6 | 7 | 3 | 11 | 3 | 3 | 8 | 8 | 1 | 9 | 3 | 7 | 9 | 11 |
| 1382 | 3 | 3 | 4 | 8 | 9 | 7 | 5 | 11 | 6 | 11 | 2 | 6 | 11 | 10 |
| 1383 | 7 | 9 | 0 | 8 | 3 | 8 | 8 | 1 | 1 | 5 | 8 | 3 | 8 | 9 |
| 1384 | 6 | 11 | 5 | 3 | 10 | 5 | 5 | 11 | 9 | 5 | 10 | 5 | 11 | 7 |
| 1385 | 9 | 11 | 0 | 5 | 10 | 3 | 10 | 1 | 5 | 3 | 11 | 4 | 1 | 11 |
| 1386 | 8 | 8 | 4 | 7 | 7 | 9 | 7 | 0 | 11 | 1 | 11 | 7 | 7 | 2 |
| 1387 | 4 | 9 | 3 | 11 | 9 | 5 | 1 | 4 | 4 | 9 | 10 | 2 | 1 | 9 |
| 1388 | 2 | 9 | 11 | 5 | 4 | 5 | 5 | 5 | 8 | 9 | 8 | 4 | 3 | 0 |
| 1389 | 11 | 6 | 6 | 2 | 11 | 11 | 10 | 1 | 2 | 1 | 9 | 3 | 3 | 3 |
| 1390 | 1 | 2 | 5 | 6 | 4 | 1 | 7 | 6 | 5 | 10 | 2 | 4 | 2 | 4 |
| 1391 | 0 | 2 | 5 | 2 | 7 | 8 | 10 | 8 | 9 | 8 | 6 | 7 | 1 | 11 |
| 1392 | 0 | 8 | 1 | 8 | 3 | 2 | 5 | 0 | 5 | 8 | 5 | 0 | 9 | 6 |
| 1393 | 8 | 1 | 0 | 1 | 5 | 1 | 0 | 1 | 9 | 5 | 7 | 4 | 6 | 0 |
| 1394 | 10 | 4 | 6 | 3 | 6 | 1 | 8 | 10 | 9 | 4 | 0 | 10 | 11 | 11 |
| 1395 | 5 | 6 | 8 | 7 | 6 | 8 | 1 | 0 | 5 | 7 | 9 | 2 | 3 | 4 |
| 1396 | 0 | 1 | 10 | 4 | 2 | 3 | 4 | 0 | 1 | 7 | 5 | 5 | 7 | 2 |
| 1397 | 7 | 11 | 1 | 7 | 2 | 0 | 5 | 6 | 6 | 10 | 7 | 2 | 8 | 1 |
| 1398 | 4 | 8 | 10 | 11 | 5 | 1 | 7 | 8 | 7 | 8 | 0 | 1 | 6 | 8 |
| 1399 | 2 | 8 | 6 | 8 | 10 | 4 | 2 | 1 | 0 | 9 | 1 | 7 | 2 | 10 |
| 1400 | 0 | 10 | 2 | 9 | 9 | 5 | 11 | 1 | 11 | 1 | 8 | 4 | 9 | 2 |
| 1401 | 7 | 2 | 6 | 11 | 2 | 7 | 7 | 4 | 2 | 9 | 1 | 0 | 0 | 4 |
| 1402 | 5 | 1 | 11 | 7 | 2 | 8 | 9 | 4 | 9 | 1 | 3 | 0 | 8 | 10 |
| 1403 | 5 | 6 | 9 | 7 | 2 | 1 | 6 | 1 | 11 | 0 | 6 | 3 | 0 | 8 |
| 1404 | 8 | 11 | 7 | 0 | 7 | 6 | 9 | 10 | 5 | 0 | 5 | 5 | 1 | 0 |
| 1405 | 11 | 7 | 0 | 4 | 4 | 9 | 6 | 9 | 6 | 1 | 5 | 11 | 7 | 8 |
| 1406 | 11 | 1 | 6 | 1 | 7 | 7 | 4 | 7 | 1 | 9 | 9 | 9 | 1 | 6 |
| 1407 | 3 | 10 | 7 | 3 | 1 | 0 | 8 | 3 | 4 | 9 | 4 | 5 | 6 | 8 |
| 1408 | 10 | 1 | 9 | 7 | 3 | 7 | 9 | 2 | 0 | 7 | 1 | 11 | 7 | 8 |
| 1409 | 4 | 3 | 3 | 6 | 0 | 7 | 9 | 3 | 1 | 1 | 0 | 4 | 7 | 9 |
| 1410 | 4 | 3 | 9 | 1 | 2 | 8 | 3 | 3 | 10 | 3 | 7 | 2 | 4 | 0 |
| 1411 | 1 | 3 | 0 | 1 | 11 | 3 | 0 | 8 | 4 | 8 | 6 | 11 | 9 | 10 |
| 1412 | 0 | 6 | 9 | 2 | 5 | 10 | 4 | 10 | 8 | 10 | 6 | 5 | 8 | 9 |
| 1413 | 6 | 5 | 9 | 4 | 6 | 8 | 11 | 3 | 4 | 11 | 0 | 4 | 3 | 2 |
| 1414 | 9 | 7 | 4 | 6 | 8 | 8 | 7 | 10 | 8 | 4 | 3 | 5 | 0 | 3 |
| 1415 | 9 | 1 | 2 | 1 | 4 | 11 | 11 | 1 | 8 | 9 | 6 | 3 | 11 | 1 |
| 1416 | 7 | 4 | 9 | 4 | 1 | 4 | 9 | 0 | 5 | 4 | 2 | 1 | 5 | 9 |
| 1417 | 4 | 8 | 9 | 6 | 2 | 4 | 8 | 10 | 7 | 2 | 5 | 4 | 1 | 10 |
| 1418 | 0 | 11 | 8 | 11 | 4 | 10 | 2 | 4 | 7 | 5 | 3 | 4 | 11 | 3 |
| 1419 | 9 | 7 | 4 | 10 | 9 | 3 | 1 | 11 | 5 | 2 | 10 | 8 | 10 | 8 |
| 1420 | 10 | 10 | 7 | 0 | 9 | 6 | 8 | 1 | 8 | 5 | 2 | 7 | 7 | 1 |
| 1421 | 10 | 6 | 3 | 6 | 5 | 0 | 10 | 2 | 6 | 6 | 11 | 0 | 6 | 9 |
| 1422 | 8 | 2 | 11 | 3 | 5 | 11 | 2 | 8 | 2 | 10 | 0 | 9 | 0 | 1 |
| 1423 | 0 | 0 | 7 | 3 | 10 | 5 | 1 | 9 | 2 | 4 | 5 | 3 | 3 | 2 |
| 1424 | 1 | 6 | 11 | 7 | 10 | 5 | 2 | 3 | 7 | 4 | 9 | 4 | 9 | 6 |
| 1425 | 7 | 7 | 2 | 7 | 4 | 2 | 1 | 3 | 8 | 1 | 10 | 7 | 9 | 4 |
| 1426 | 5 | 9 | 6 | 6 | 0 | 6 | 10 | 9 | 10 | 2 | 3 | 9 | 2 | 9 |
| 1427 | 8 | 0 | 2 | 8 | 2 | 0 | 8 | 3 | 5 | 5 | 9 | 6 | 11 | 4 |
| 1428 | 0 | 3 | 2 | 9 | 0 | 9 | 0 | 9 | 9 | 6 | 10 | 10 | 6 | 3 |
| 1429 | 4 | 5 | 9 | 7 | 4 | 11 | 10 | 4 | 8 | 2 | 1 | 1 | 5 | 5 |
| 1430 | 7 | 1 | 9 | 2 | 8 | 1 | 8 | 0 | 8 | 1 | 8 | 6 | 0 | 2 |
| 1431 | 9 | 1 | 5 | 10 | 11 | 0 | 10 | 5 | 2 | 6 | 2 | 6 | 8 | 5 |
| 1432 | 2 | 7 | 4 | 10 | 3 | 0 | 6 | 7 | 3 | 7 | 0 | 0 | 6 | 3 |
| 1433 | 3 | 0 | 4 | 0 | 3 | 6 | 10 | 5 | 1 | 6 | 0 | 10 | 5 | 6 |
| 1434 | 1 | 4 | 4 | 5 | 3 | 5 | 3 | 8 | 4 | 5 | 11 | 6 | 0 | 0 |
| 1435 | 6 | 5 | 9 | 10 | 1 | 2 | 2 | 1 | 1 | 4 | 8 | 7 | 4 | 0 |
| 1436 | 4 | 9 | 3 | 2 | 5 | 11 | 9 | 2 | 7 | 4 | 7 | 7 | 2 | 4 |
| 1437 | 1 | 5 | 2 | 8 | 10 | 2 | 6 | 9 | 6 | 0 | 6 | 4 | 6 | 9 |
| 1438 | 1 | 1 | 10 | 8 | 3 | 4 | 0 | 10 | 8 | 11 | 11 | 10 | 8 | 4 |
| 1439 | 9 | 9 | 11 | 0 | 7 | 1 | 1 | 6 | 10 | 6 | 10 | 9 | 4 | 6 |
| 1440 | 2 | 1 | 8 | 5 | 0 | 2 | 4 | 2 | 4 | 11 | 3 | 6 | 6 | 9 |
| 1441 | 1 | 4 | 11 | 8 | 2 | 7 | 8 | 6 | 11 | 3 | 3 | 5 | 7 | 9 |
| 1442 | 5 | 9 | 3 | 1 | 3 | 8 | 0 | 7 | 6 | 0 | 4 | 8 | 3 | 3 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1443 | 6 | 5 | 2 | 9 | 11 | 3 | 9 | 6 | 10 | 1 | 2 | 10 | 7 | 10 |
| 1444 | 4 | 6 | 3 | 9 | 2 | 0 | 0 | 9 | 3 | 9 | 3 | 6 | 8 | 2 |
| 1445 | 1 | 11 | 7 | 9 | 8 | 9 | 2 | 0 | 3 | 7 | 3 | 8 | 1 | 4 |
| 1446 | 11 | 4 | 6 | 3 | 4 | 4 | 0 | 4 | 3 | 6 | 2 | 6 | 6 | 4 |
| 1447 | 3 | 9 | 9 | 10 | 7 | 5 | 0 | 3 | 8 | 4 | 2 | 9 | 6 | 7 |
| 1448 | 8 | 11 | 6 | 4 | 1 | 5 | 4 | 10 | 7 | 2 | 7 | 1 | 3 | 4 |
| 1449 | 0 | 3 | 1 | 4 | 1 | 8 | 2 | 2 | 11 | 8 | 3 | 3 | 5 | 8 |
| 1450 | 4 | 11 | 4 | 10 | 10 | 1 | 0 | 6 | 1 | 0 | 3 | 7 | 2 | 6 |
| 1451 | 7 | 6 | 2 | 2 | 8 | 9 | 1 | 2 | 3 | 9 | 6 | 0 | 10 | 10 |
| 1452 | 8 | 4 | 6 | 10 | 0 | 3 | 6 | 9 | 4 | 0 | 1 | 2 | 7 | 1 |
| 1453 | 7 | 10 | 0 | 3 | 5 | 6 | 11 | 11 | 7 | 10 | 5 | 2 | 9 | 3 |
| 1454 | 1 | 5 | 1 | 9 | 4 | 9 | 7 | 10 | 11 | 6 | 7 | 5 | 3 | 0 |
| 1455 | 0 | 8 | 0 | 10 | 8 | 9 | 9 | 3 | 9 | 11 | 1 | 9 | 8 | 11 |
| 1456 | 4 | 10 | 6 | 2 | 10 | 1 | 9 | 5 | 9 | 6 | 11 | 0 | 5 | 3 |
| 1457 | 7 | 1 | 5 | 9 | 10 | 11 | 7 | 5 | 3 | 5 | 0 | 8 | 7 | 9 |
| 1458 | 6 | 4 | 8 | 11 | 1 | 6 | 6 | 2 | 5 | 9 | 7 | 9 | 4 | 5 |
| 1459 | 10 | 2 | 4 | 7 | 0 | 2 | 0 | 6 | 4 | 6 | 11 | 1 | 8 | 11 |
| 1460 | 9 | 9 | 5 | 7 | 9 | 1 | 3 | 7 | 5 | 4 | 8 | 11 | 1 | 0 |
| 1461 | 2 | 11 | 11 | 3 | 7 | 6 | 4 | 11 | 4 | 4 | 1 | 1 | 10 | 8 |
| 1462 | 10 | 5 | 0 | 6 | 1 | 5 | 11 | 5 | 10 | 0 | 7 | 4 | 5 | 11 |
| 1463 | 7 | 4 | 0 | 4 | 6 | 1 | 2 | 6 | 7 | 6 | 7 | 11 | 10 | 7 |
| 1464 | 4 | 9 | 7 | 8 | 9 | 9 | 4 | 0 | 0 | 11 | 4 | 10 | 0 | 5 |
| 1465 | 5 | 8 | 8 | 6 | 4 | 2 | 0 | 7 | 1 | 4 | 1 | 11 | 2 | 5 |
| 1466 | 2 | 3 | 10 | 2 | 8 | 9 | 10 | 7 | 4 | 10 | 5 | 1 | 0 | 3 |
| 1467 | 7 | 0 | 3 | 9 | 4 | 9 | 6 | 5 | 1 | 7 | 1 | 3 | 0 | 1 |
| 1468 | 6 | 4 | 1 | 0 | 8 | 11 | 2 | 4 | 1 | 0 | 11 | 10 | 8 | 7 |
| 1469 | 2 | 11 | 6 | 7 | 1 | 10 | 11 | 9 | 1 | 8 | 11 | 11 | 11 | 11 |
| 1470 | 5 | 6 | 0 | 5 | 2 | 10 | 9 | 2 | 8 | 2 | 2 | 10 | 10 | 11 |
| 1471 | 2 | 10 | 6 | 4 | 6 | 11 | 8 | 8 | 6 | 8 | 5 | 3 | 9 | 5 |
| 1472 | 5 | 6 | 5 | 0 | 11 | 9 | 4 | 2 | 7 | 1 | 5 | 8 | 4 | 6 |
| 1473 | 0 | 11 | 5 | 0 | 1 | 1 | 11 | 8 | 2 | 5 | 9 | 10 | 4 | 2 |
| 1474 | 6 | 3 | 7 | 10 | 5 | 1 | 3 | 9 | 3 | 0 | 6 | 6 | 5 | 4 |
| 1475 | 3 | 10 | 5 | 1 | 4 | 1 | 4 | 8 | 11 | 2 | 1 | 3 | 10 | 10 |
| 1476 | 3 | 9 | 10 | 0 | 10 | 8 | 2 | 0 | 5 | 3 | 8 | 8 | 7 | 6 |
| 1477 | 8 | 10 | 9 | 2 | 9 | 6 | 5 | 0 | 1 | 2 | 5 | 9 | 3 | 5 |
| 1478 | 3 | 9 | 9 | 1 | 11 | 4 | 5 | 10 | 10 | 7 | 3 | 0 | 0 | 2 |
| 1479 | 10 | 4 | 0 | 11 | 9 | 0 | 11 | 8 | 3 | 4 | 5 | 7 | 10 | 2 |
| 1480 | 0 | 9 | 7 | 6 | 1 | 7 | 5 | 1 | 7 | 10 | 7 | 3 | 1 | 5 |
| 1481 | 7 | 6 | 9 | 5 | 0 | 3 | 2 | 4 | 10 | 7 | 8 | 1 | 2 | 11 |
| 1482 | 8 | 3 | 8 | 11 | 9 | 4 | 7 | 5 | 11 | 4 | 4 | 1 | 3 | 7 |
| 1483 | 9 | 8 | 6 | 8 | 8 | 10 | 6 | 7 | 5 | 11 | 10 | 10 | 5 | 9 |
| 1484 | 3 | 11 | 8 | 10 | 2 | 11 | 7 | 0 | 10 | 2 | 4 | 11 | 9 | 11 |
| 1485 | 1 | 7 | 1 | 2 | 8 | 11 | 1 | 11 | 7 | 6 | 3 | 2 | 7 | 5 |
| 1486 | 10 | 3 | 0 | 2 | 7 | 7 | 10 | 0 | 1 | 11 | 7 | 10 | 9 | 1 |
| 1487 | 1 | 11 | 10 | 0 | 4 | 4 | 4 | 3 | 1 | 8 | 3 | 9 | 5 | 9 |
| 1488 | 10 | 4 | 4 | 10 | 7 | 7 | 3 | 1 | 10 | 0 | 8 | 11 | 6 | 10 |
| 1489 | 9 | 2 | 3 | 3 | 9 | 7 | 0 | 10 | 11 | 10 | 5 | 0 | 10 | 6 |
| 1490 | 1 | 6 | 6 | 3 | 6 | 6 | 7 | 9 | 6 | 5 | 9 | 5 | 4 | 10 |
| 1491 | 3 | 1 | 1 | 1 | 2 | 10 | 1 | 7 | 8 | 3 | 1 | 6 | 7 | 3 |
| 1492 | 6 | 3 | 11 | 4 | 8 | 3 | 5 | 5 | 7 | 5 | 6 | 7 | 10 | 2 |
| 1493 | 0 | 5 | 7 | 4 | 5 | 0 | 9 | 5 | 0 | 0 | 1 | 2 | 2 | 6 |
| 1494 | 2 | 4 | 0 | 7 | 2 | 4 | 10 | 11 | 1 | 10 | 1 | 4 | 7 | 0 |
| 1495 | 9 | 5 | 9 | 3 | 5 | 0 | 6 | 6 | 5 | 9 | 11 | 11 | 8 | 7 |
| 1496 | 0 | 7 | 0 | 2 | 10 | 2 | 0 | 2 | 11 | 5 | 4 | 7 | 0 | 2 |
| 1497 | 11 | 5 | 0 | 8 | 5 | 1 | 1 | 0 | 5 | 10 | 0 | 7 | 4 | 10 |
| 1498 | 11 | 7 | 8 | 5 | 8 | 6 | 10 | 9 | 8 | 9 | 11 | 2 | 11 | 10 |
| 1499 | 10 | 1 | 4 | 4 | 10 | 8 | 5 | 3 | 1 | 2 | 8 | 0 | 10 | 11 |
| 1500 | 2 | 3 | 9 | 2 | 1 | 3 | 8 | 4 | 2 | 4 | 0 | 2 | 8 | 10 |
| 1501 | 7 | 5 | 5 | 7 | 3 | 1 | 2 | 2 | 1 | 9 | 2 | 1 | 3 | 3 |
| 1502 | 3 | 2 | 7 | 7 | 0 | 11 | 11 | 1 | 7 | 7 | 9 | 10 | 7 | 7 |
| 1503 | 3 | 8 | 9 | 0 | 6 | 9 | 6 | 0 | 6 | 10 | 3 | 5 | 10 | 1 |
| 1504 | 10 | 11 | 2 | 1 | 8 | 7 | 8 | 5 | 6 | 1 | 6 | 10 | 8 | 0 |
| 1505 | 7 | 3 | 7 | 1 | 7 | 10 | 11 | 6 | 1 | 7 | 8 | 0 | 3 | 0 |
| 1506 | 2 | 11 | 5 | 11 | 11 | 4 | 7 | 3 | 0 | 3 | 11 | 8 | 0 | 0 |
| 1507 | 2 | 1 | 8 | 9 | 5 | 9 | 11 | 11 | 3 | 2 | 6 | 5 | 2 | 11 |
| 1508 | 11 | 10 | 3 | 2 | 2 | 0 | 3 | 7 | 11 | 1 | 10 | 7 | 5 | 5 |
| 1509 | 6 | 9 | 2 | 10 | 8 | 10 | 0 | 10 | 3 | 7 | 7 | 2 | 7 | 0 |
| 1510 | 8 | 8 | 3 | 8 | 5 | 6 | 4 | 6 | 0 | 6 | 6 | 4 | 3 | 1 |
| 1511 | 4 | 6 | 3 | 3 | 10 | 2 | 4 | 1 | 2 | 8 | 6 | 2 | 2 | 0 |
| 1512 | 6 | 2 | 0 | 4 | 7 | 0 | 4 | 3 | 7 | 8 | 4 | 0 | 9 | 0 |
| 1513 | 10 | 11 | 11 | 7 | 9 | 3 | 7 | 10 | 3 | 6 | 9 | 9 | 2 | 3 |
| 1514 | 3 | 8 | 11 | 7 | 5 | 5 | 5 | 10 | 2 | 0 | 5 | 7 | 6 | 11 |
| 1515 | 1 | 0 | 9 | 11 | 6 | 2 | 11 | 4 | 9 | 10 | 2 | 9 | 1 | 8 |
| 1516 | 10 | 8 | 7 | 6 | 7 | 5 | 4 | 2 | 11 | 8 | 2 | 8 | 11 | 10 |
| 1517 | 1 | 1 | 1 | 6 | 9 | 7 | 5 | 0 | 10 | 5 | 10 | 11 | 8 | 9 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1518 | 4 | 7 | 2 | 8 | 11 | 7 | 1 | 5 | 3 | 10 | 8 | 8 | 1 | 3 |
| 1519 | 1 | 2 | 8 | 1 | 5 | 0 | 8 | 3 | 6 | 7 | 3 | 4 | 3 | 7 |
| 1520 | 6 | 8 | 5 | 6 | 3 | 8 | 2 | 3 | 0 | 0 | 8 | 11 | 5 | 1 |
| 1521 | 0 | 7 | 10 | 5 | 5 | 8 | 8 | 10 | 4 | 0 | 4 | 10 | 1 | 5 |
| 1522 | 3 | 4 | 4 | 11 | 2 | 4 | 11 | 4 | 10 | 1 | 6 | 3 | 4 | 3 |
| 1523 | 10 | 0 | 8 | 9 | 9 | 2 | 9 | 5 | 8 | 8 | 3 | 11 | 8 | 6 |
| 1524 | 0 | 5 | 2 | 7 | 10 | 11 | 1 | 10 | 5 | 3 | 3 | 10 | 0 | 0 |
| 1525 | 8 | 7 | 2 | 3 | 2 | 5 | 5 | 4 | 1 | 3 | 4 | 1 | 9 | 8 |
| 1526 | 9 | 2 | 0 | 11 | 8 | 4 | 3 | 8 | 5 | 5 | 7 | 2 | 11 | 7 |
| 1527 | 7 | 2 | 11 | 10 | 7 | 4 | 3 | 6 | 4 | 11 | 0 | 3 | 2 | 9 |
| 1528 | 1 | 4 | 4 | 3 | 11 | 9 | 11 | 3 | 1 | 6 | 1 | 2 | 1 | 2 |
| 1529 | 5 | 4 | 11 | 10 | 11 | 1 | 4 | 7 | 8 | 5 | 7 | 9 | 0 | 3 |
| 1530 | 8 | 8 | 0 | 11 | 1 | 3 | 6 | 11 | 8 | 11 | 6 | 1 | 2 | 6 |
| 1531 | 4 | 5 | 2 | 0 | 9 | 3 | 3 | 1 | 6 | 9 | 1 | 9 | 3 | 8 |
| 1532 | 3 | 7 | 4 | 6 | 7 | 5 | 2 | 6 | 3 | 1 | 1 | 11 | 9 | 0 |
| 1533 | 6 | 6 | 5 | 7 | 6 | 4 | 6 | 7 | 2 | 1 | 0 | 7 | 8 | 9 |
| 1534 | 9 | 0 | 7 | 9 | 2 | 2 | 10 | 11 | 10 | 4 | 10 | 1 | 1 | 9 |
| 1535 | 6 | 2 | 10 | 9 | 11 | 0 | 0 | 2 | 5 | 4 | 8 | 1 | 0 | 7 |
| 1536 | 11 | 4 | 0 | 5 | 1 | 8 | 3 | 1 | 10 | 10 | 11 | 0 | 10 | 9 |
| 1537 | 9 | 8 | 1 | 11 | 8 | 7 | 6 | 2 | 4 | 6 | 4 | 6 | 0 | 0 |
| 1538 | 2 | 2 | 6 | 1 | 3 | 1 | 2 | 9 | 5 | 2 | 8 | 5 | 8 | 4 |
| 1539 | 4 | 10 | 7 | 6 | 4 | 2 | 4 | 8 | 6 | 3 | 0 | 9 | 1 | 8 |
| 1540 | 1 | 7 | 8 | 9 | 11 | 0 | 0 | 7 | 9 | 11 | 9 | 10 | 11 | 10 |
| 1541 | 2 | 1 | 10 | 11 | 0 | 4 | 9 | 11 | 6 | 11 | 2 | 0 | 7 | 6 |
| 1542 | 8 | 2 | 4 | 0 | 7 | 9 | 1 | 3 | 4 | 5 | 7 | 3 | 11 | 11 |
| 1543 | 1 | 6 | 11 | 5 | 7 | 2 | 11 | 2 | 5 | 1 | 6 | 8 | 5 | 7 |
| 1544 | 10 | 5 | 9 | 2 | 5 | 6 | 5 | 3 | 3 | 6 | 10 | 5 | 9 | 2 |
| 1545 | 5 | 9 | 6 | 4 | 5 | 9 | 0 | 0 | 3 | 11 | 11 | 1 | 7 | 8 |
| 1546 | 2 | 6 | 11 | 0 | 4 | 3 | 5 | 1 | 1 | 5 | 9 | 6 | 6 | 10 |
| 1547 | 5 | 4 | 1 | 4 | 10 | 7 | 10 | 11 | 5 | 5 | 9 | 8 | 11 | 1 |
| 1548 | 9 | 5 | 3 | 9 | 2 | 8 | 2 | 4 | 6 | 10 | 5 | 7 | 9 | 8 |
| 1549 | 6 | 11 | 5 | 4 | 4 | 0 | 3 | 7 | 3 | 8 | 2 | 3 | 6 | 7 |
| 1550 | 11 | 9 | 7 | 8 | 6 | 8 | 11 | 8 | 1 | 1 | 1 | 10 | 7 | 0 |
| 1551 | 9 | 7 | 7 | 9 | 5 | 11 | 7 | 5 | 5 | 0 | 6 | 1 | 10 | 0 |
| 1552 | 3 | 5 | 3 | 5 | 10 | 9 | 8 | 9 | 7 | 4 | 2 | 8 | 7 | 4 |
| 1553 | 7 | 9 | 10 | 0 | 8 | 2 | 6 | 7 | 0 | 5 | 11 | 7 | 3 | 1 |
| 1554 | 5 | 2 | 10 | 3 | 2 | 7 | 7 | 7 | 1 | 11 | 4 | 9 | 8 | 11 |
| 1555 | 1 | 0 | 3 | 7 | 7 | 10 | 2 | 3 | 10 | 9 | 8 | 1 | 1 | 2 |
| 1556 | 0 | 3 | 4 | 6 | 7 | 3 | 3 | 11 | 11 | 0 | 9 | 2 | 4 | 6 |
| 1557 | 5 | 8 | 9 | 10 | 8 | 4 | 1 | 9 | 1 | 8 | 6 | 1 | 9 | 10 |
| 1558 | 0 | 4 | 10 | 3 | 6 | 4 | 10 | 4 | 7 | 2 | 11 | 10 | 9 | 5 |
| 1559 | 11 | 10 | 5 | 5 | 5 | 1 | 5 | 7 | 4 | 0 | 1 | 4 | 8 | 1 |
| 1560 | 10 | 11 | 10 | 5 | 4 | 7 | 4 | 6 | 2 | 9 | 11 | 1 | 4 | 10 |
| 1561 | 6 | 0 | 1 | 7 | 0 | 2 | 1 | 6 | 5 | 10 | 3 | 6 | 10 | 3 |
| 1562 | 11 | 3 | 11 | 11 | 6 | 10 | 0 | 7 | 3 | 4 | 10 | 7 | 4 | 11 |
| 1563 | 6 | 11 | 1 | 0 | 2 | 5 | 11 | 1 | 6 | 6 | 6 | 11 | 3 | 6 |
| 1564 | 9 | 4 | 8 | 1 | 9 | 9 | 7 | 0 | 8 | 6 | 2 | 0 | 4 | 11 |
| 1565 | 3 | 11 | 11 | 4 | 8 | 11 | 10 | 8 | 11 | 1 | 4 | 9 | 3 | 5 |
| 1566 | 10 | 11 | 6 | 10 | 11 | 11 | 1 | 3 | 7 | 7 | 1 | 8 | 5 | 9 |
| 1567 | 8 | 8 | 7 | 7 | 5 | 7 | 8 | 4 | 11 | 4 | 0 | 10 | 5 | 9 |
| 1568 | 3 | 10 | 5 | 3 | 7 | 10 | 0 | 8 | 8 | 11 | 6 | 6 | 9 | 0 |
| 1569 | 6 | 6 | 9 | 1 | 3 | 11 | 3 | 10 | 4 | 7 | 5 | 10 | 9 | 1 |
| 1570 | 9 | 1 | 9 | 2 | 4 | 1 | 0 | 4 | 10 | 4 | 9 | 8 | 1 | 5 |
| 1571 | 2 | 10 | 3 | 2 | 1 | 6 | 6 | 10 | 7 | 10 | 0 | 3 | 6 | 1 |
| 1572 | 10 | 3 | 2 | 10 | 1 | 6 | 2 | 1 | 4 | 1 | 2 | 1 | 0 | 11 |
| 1573 | 3 | 3 | 2 | 0 | 3 | 4 | 9 | 5 | 8 | 9 | 9 | 11 | 1 | 7 |
| 1574 | 8 | 2 | 5 | 10 | 5 | 6 | 0 | 11 | 10 | 7 | 11 | 3 | 0 | 9 |
| 1575 | 2 | 10 | 10 | 9 | 6 | 8 | 0 | 5 | 9 | 9 | 6 | 5 | 0 | 9 |
| 1576 | 11 | 8 | 3 | 6 | 11 | 7 | 8 | 0 | 5 | 1 | 8 | 1 | 8 | 6 |
| 1577 | 10 | 10 | 0 | 6 | 0 | 7 | 6 | 4 | 1 | 2 | 4 | 3 | 1 | 3 |
| 1578 | 6 | 8 | 2 | 4 | 9 | 10 | 6 | 4 | 8 | 6 | 3 | 10 | 3 | 5 |
| 1579 | 7 | 6 | 6 | 6 | 7 | 2 | 10 | 4 | 8 | 6 | 5 | 1 | 7 | 4 |
| 1580 | 5 | 3 | 11 | 10 | 1 | 9 | 9 | 0 | 7 | 6 | 5 | 9 | 10 | 5 |
| 1581 | 11 | 2 | 0 | 8 | 9 | 0 | 7 | 10 | 3 | 9 | 2 | 11 | 3 | 10 |
| 1582 | 5 | 4 | 3 | 10 | 10 | 1 | 9 | 3 | 10 | 0 | 4 | 10 | 9 | 4 |
| 1583 | 2 | 5 | 9 | 7 | 9 | 9 | 1 | 7 | 0 | 2 | 9 | 5 | 1 | 10 |
| 1584 | 10 | 2 | 8 | 7 | 10 | 7 | 6 | 5 | 3 | 3 | 1 | 8 | 6 | 4 |
| 1585 | 1 | 10 | 10 | 5 | 10 | 10 | 7 | 11 | 8 | 10 | 11 | 2 | 0 | 1 |
| 1586 | 10 | 1 | 5 | 9 | 0 | 3 | 8 | 10 | 3 | 2 | 2 | 2 | 4 | 5 |
| 1587 | 9 | 3 | 1 | 4 | 3 | 5 | 3 | 10 | 5 | 2 | 0 | 6 | 1 | 8 |
| 1588 | 4 | 0 | 9 | 2 | 6 | 5 | 4 | 0 | 6 | 4 | 11 | 2 | 7 | 3 |
| 1589 | 10 | 7 | 7 | 3 | 9 | 0 | 9 | 1 | 9 | 4 | 11 | 9 | 1 | 3 |
| 1590 | 3 | 4 | 6 | 4 | 7 | 8 | 8 | 5 | 0 | 7 | 0 | 8 | 6 | 10 |
| 1591 | 10 | 9 | 4 | 6 | 9 | 10 | 0 | 3 | 0 | 1 | 1 | 9 | 0 | 10 |
| 1592 | 0 | 11 | 9 | 1 | 11 | 8 | 3 | 0 | 9 | 2 | 6 | 6 | 11 | 5 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1593 | 4 | 6 | 9 | 7 | 8 | 6 | 4 | 4 | 0 | 3 | 3 | 3 | 3 | 11 |
| 1594 | 3 | 4 | 2 | 4 | 10 | 4 | 1 | 6 | 3 | 3 | 2 | 0 | 8 | 5 |
| 1595 | 3 | 1 | 11 | 0 | 9 | 2 | 7 | 3 | 3 | 8 | 7 | 10 | 4 | 4 |
| 1596 | 1 | 9 | 1 | 0 | 0 | 6 | 1 | 4 | 4 | 8 | 5 | 11 | 6 | 4 |
| 1597 | 2 | 4 | 4 | 8 | 0 | 10 | 7 | 1 | 3 | 2 | 3 | 7 | 10 | 7 |
| 1598 | 7 | 1 | 2 | 6 | 1 | 2 | 11 | 10 | 5 | 11 | 0 | 0 | 9 | 0 |
| 1599 | 11 | 0 | 4 | 9 | 3 | 3 | 7 | 2 | 5 | 10 | 1 | 5 | 11 | 8 |
| 1600 | 8 | 2 | 1 | 9 | 8 | 1 | 3 | 8 | 9 | 9 | 10 | 1 | 3 | 1 |
| 1601 | 4 | 2 | 8 | 4 | 8 | 11 | 2 | 11 | 8 | 8 | 1 | 11 | 1 | 1 |
| 1602 | 8 | 1 | 3 | 1 | 2 | 1 | 5 | 10 | 2 | 0 | 8 | 3 | 2 | 3 |
| 1603 | 11 | 4 | 2 | 3 | 3 | 10 | 10 | 10 | 6 | 0 | 10 | 11 | 10 | 0 |
| 1604 | 8 | 0 | 3 | 4 | 6 | 4 | 6 | 1 | 3 | 9 | 10 | 8 | 0 | 3 |
| 1605 | 2 | 11 | 2 | 2 | 10 | 4 | 8 | 8 | 0 | 11 | 10 | 3 | 11 | 3 |
| 1606 | 1 | 4 | 9 | 10 | 9 | 3 | 3 | 9 | 11 | 7 | 3 | 9 | 8 | 11 |
| 1607 | 10 | 7 | 3 | 10 | 7 | 11 | 4 | 2 | 3 | 5 | 6 | 3 | 3 | 6 |
| 1608 | 7 | 11 | 4 | 4 | 5 | 5 | 2 | 10 | 3 | 10 | 6 | 10 | 10 | 5 |
| 1609 | 1 | 2 | 0 | 0 | 8 | 6 | 11 | 9 | 7 | 2 | 1 | 6 | 2 | 5 |
| 1610 | 2 | 3 | 4 | 10 | 6 | 2 | 5 | 2 | 2 | 8 | 11 | 0 | 7 | 9 |
| 1611 | 7 | 8 | 8 | 4 | 4 | 8 | 9 | 0 | 11 | 0 | 3 | 8 | 11 | 7 |
| 1612 | 10 | 3 | 8 | 6 | 3 | 0 | 7 | 1 | 6 | 3 | 3 | 6 | 2 | 0 |
| 1613 | 10 | 8 | 6 | 2 | 9 | 3 | 4 | 3 | 1 | 3 | 11 | 10 | 6 | 6 |
| 1614 | 4 | 10 | 5 | 1 | 0 | 3 | 1 | 1 | 11 | 10 | 8 | 9 | 7 | 4 |
| 1615 | 11 | 2 | 6 | 8 | 11 | 6 | 1 | 1 | 11 | 4 | 6 | 0 | 2 | 1 |
| 1616 | 7 | 3 | 9 | 9 | 9 | 1 | 5 | 5 | 0 | 8 | 5 | 10 | 10 | 8 |
| 1617 | 6 | 4 | 5 | 4 | 6 | 11 | 4 | 2 | 0 | 3 | 8 | 9 | 9 | 9 |
| 1618 | 6 | 10 | 0 | 8 | 5 | 2 | 8 | 2 | 11 | 1 | 10 | 6 | 2 | 0 |
| 1619 | 3 | 3 | 4 | 11 | 4 | 9 | 4 | 1 | 7 | 8 | 3 | 11 | 8 | 2 |
| 1620 | 10 | 5 | 10 | 1 | 10 | 10 | 6 | 6 | 9 | 2 | 10 | 0 | 5 | 6 |
| 1621 | 6 | 6 | 7 | 3 | 2 | 8 | 0 | 5 | 6 | 1 | 8 | 1 | 2 | 5 |
| 1622 | 8 | 6 | 1 | 0 | 1 | 8 | 11 | 11 | 0 | 3 | 11 | 4 | 1 | 3 |
| 1623 | 9 | 10 | 6 | 11 | 11 | 4 | 11 | 7 | 0 | 6 | 2 | 11 | 10 | 7 |
| 1624 | 0 | 0 | 8 | 1 | 7 | 8 | 10 | 1 | 7 | 5 | 0 | 5 | 7 | 1 |
| 1625 | 5 | 0 | 6 | 10 | 6 | 10 | 8 | 7 | 9 | 10 | 4 | 11 | 7 | 1 |
| 1626 | 3 | 7 | 4 | 3 | 1 | 11 | 6 | 8 | 4 | 8 | 10 | 3 | 1 | 7 |
| 1627 | 0 | 10 | 8 | 4 | 5 | 11 | 7 | 3 | 0 | 4 | 3 | 7 | 0 | 2 |
| 1628 | 3 | 4 | 1 | 2 | 3 | 6 | 4 | 8 | 10 | 11 | 4 | 4 | 10 | 7 |
| 1629 | 8 | 7 | 6 | 7 | 10 | 5 | 4 | 8 | 9 | 5 | 3 | 8 | 7 | 2 |
| 1630 | 1 | 1 | 8 | 2 | 6 | 8 | 7 | 8 | 5 | 8 | 4 | 0 | 0 | 3 |
| 1631 | 6 | 5 | 1 | 11 | 9 | 11 | 10 | 3 | 10 | 7 | 6 | 4 | 0 | 3 |
| 1632 | 7 | 7 | 11 | 5 | 0 | 7 | 9 | 5 | 1 | 7 | 2 | 5 | 4 | 4 |
| 1633 | 8 | 9 | 9 | 1 | 6 | 2 | 7 | 7 | 8 | 3 | 7 | 11 | 5 | 10 |
| 1634 | 5 | 8 | 1 | 5 | 0 | 3 | 2 | 0 | 2 | 1 | 7 | 0 | 10 | 0 |
| 1635 | 1 | 10 | 11 | 4 | 3 | 9 | 2 | 11 | 2 | 0 | 4 | 0 | 2 | 8 |
| 1636 | 8 | 9 | 5 | 11 | 9 | 0 | 0 | 2 | 5 | 0 | 10 | 0 | 9 | 2 |
| 1637 | 0 | 9 | 8 | 9 | 1 | 6 | 4 | 1 | 3 | 7 | 11 | 6 | 11 | 6 |
| 1638 | 10 | 2 | 5 | 5 | 10 | 3 | 3 | 9 | 10 | 6 | 6 | 11 | 11 | 3 |
| 1639 | 5 | 9 | 4 | 5 | 2 | 2 | 9 | 8 | 11 | 8 | 9 | 6 | 11 | 10 |
| 1640 | 9 | 3 | 10 | 7 | 9 | 4 | 10 | 6 | 2 | 5 | 2 | 2 | 1 | 2 |
| 1641 | 9 | 7 | 10 | 6 | 11 | 9 | 6 | 7 | 11 | 0 | 8 | 5 | 6 | 11 |
| 1642 | 7 | 6 | 8 | 9 | 5 | 5 | 8 | 0 | 7 | 7 | 8 | 3 | 1 | 0 |
| 1643 | 1 | 0 | 2 | 6 | 2 | 5 | 7 | 9 | 0 | 0 | 10 | 7 | 7 | 8 |
| 1644 | 7 | 6 | 7 | 5 | 6 | 4 | 7 | 11 | 9 | 6 | 2 | 6 | 8 | 10 |
| 1645 | 0 | 10 | 4 | 2 | 6 | 9 | 0 | 7 | 2 | 2 | 7 | 2 | 6 | 4 |
| 1646 | 11 | 0 | 0 | 10 | 7 | 11 | 6 | 10 | 4 | 0 | 8 | 8 | 11 | 5 |
| 1647 | 4 | 2 | 11 | 8 | 1 | 10 | 10 | 9 | 10 | 3 | 4 | 1 | 6 | 11 |
| 1648 | 11 | 8 | 10 | 1 | 8 | 9 | 1 | 6 | 10 | 11 | 3 | 7 | 2 | 2 |
| 1649 | 2 | 9 | 6 | 7 | 5 | 11 | 3 | 6 | 1 | 9 | 7 | 5 | 4 | 7 |
| 1650 | 2 | 2 | 0 | 3 | 4 | 9 | 2 | 8 | 8 | 3 | 10 | 2 | 6 | 9 |
| 1651 | 4 | 6 | 1 | 7 | 2 | 1 | 10 | 5 | 4 | 4 | 2 | 9 | 6 | 0 |
| 1652 | 11 | 1 | 1 | 9 | 11 | 0 | 10 | 8 | 8 | 10 | 11 | 7 | 5 | 4 |
| 1653 | 11 | 8 | 6 | 3 | 4 | 5 | 10 | 2 | 10 | 2 | 7 | 3 | 5 | 6 |
| 1654 | 0 | 1 | 6 | 5 | 9 | 10 | 10 | 10 | 2 | 6 | 4 | 7 | 4 | 8 |
| 1655 | 9 | 11 | 4 | 5 | 0 | 6 | 0 | 8 | 7 | 6 | 4 | 10 | 2 | 4 |
| 1656 | 3 | 0 | 8 | 3 | 11 | 3 | 5 | 4 | 5 | 9 | 9 | 2 | 0 | 11 |
| 1657 | 6 | 6 | 5 | 11 | 10 | 8 | 3 | 4 | 9 | 0 | 11 | 7 | 7 | 10 |
| 1658 | 8 | 11 | 11 | 11 | 7 | 10 | 10 | 3 | 2 | 2 | 0 | 10 | 10 | 6 |
| 1659 | 6 | 7 | 11 | 0 | 9 | 1 | 2 | 10 | 9 | 5 | 4 | 2 | 10 | 11 |
| 1660 | 1 | 3 | 4 | 1 | 1 | 7 | 3 | 4 | 7 | 9 | 11 | 4 | 5 | 1 |
| 1661 | 9 | 1 | 3 | 8 | 4 | 0 | 7 | 11 | 1 | 1 | 6 | 4 | 6 | 8 |
| 1662 | 8 | 11 | 6 | 2 | 5 | 7 | 11 | 9 | 0 | 10 | 9 | 9 | 6 | 8 |
| 1663 | 8 | 7 | 5 | 0 | 8 | 4 | 3 | 0 | 5 | 8 | 3 | 7 | 8 | 4 |
| 1664 | 6 | 7 | 11 | 3 | 3 | 5 | 1 | 0 | 11 | 1 | 0 | 10 | 6 | 10 |
| 1665 | 5 | 10 | 8 | 10 | 7 | 3 | 2 | 5 | 10 | 3 | 5 | 5 | 3 | 7 |
| 1666 | 4 | 4 | 7 | 7 | 8 | 2 | 6 | 2 | 8 | 11 | 7 | 5 | 10 | 2 |
| 1667 | 9 | 2 | 0 | 10 | 3 | 8 | 4 | 0 | 9 | 9 | 0 | 9 | 9 | 7 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1668 | 5 | 10 | 0 | 5 | 4 | 9 | 3 | 2 | 4 | 7 | 9 | 7 | 5 | 2 |
| 1669 | 6 | 10 | 2 | 10 | 0 | 7 | 4 | 6 | 7 | 4 | 6 | 11 | 5 | 11 |
| 1670 | 0 | 1 | 3 | 11 | 6 | 2 | 3 | 3 | 6 | 1 | 5 | 6 | 8 | 7 |
| 1671 | 3 | 3 | 7 | 7 | 6 | 5 | 2 | 11 | 5 | 7 | 4 | 8 | 5 | 0 |
| 1672 | 11 | 11 | 1 | 7 | 5 | 9 | 7 | 3 | 9 | 5 | 0 | 11 | 4 | 5 |
| 1673 | 3 | 7 | 9 | 11 | 3 | 3 | 2 | 2 | 2 | 8 | 2 | 8 | 0 | 6 |
| 1674 | 7 | 9 | 11 | 1 | 4 | 0 | 9 | 3 | 4 | 4 | 6 | 0 | 3 | 5 |
| 1675 | 10 | 6 | 0 | 4 | 4 | 1 | 1 | 11 | 5 | 9 | 1 | 9 | 8 | 6 |
| 1676 | 9 | 4 | 6 | 0 | 1 | 11 | 1 | 0 | 6 | 3 | 5 | 2 | 0 | 1 |
| 1677 | 1 | 3 | 1 | 2 | 0 | 3 | 11 | 5 | 6 | 7 | 10 | 2 | 11 | 2 |
| 1678 | 8 | 9 | 7 | 6 | 9 | 9 | 9 | 4 | 1 | 3 | 8 | 2 | 3 | 7 |
| 1679 | 2 | 1 | 11 | 8 | 10 | 10 | 0 | 2 | 6 | 6 | 0 | 6 | 11 | 4 |
| 1680 | 6 | 3 | 0 | 3 | 7 | 4 | 8 | 4 | 5 | 0 | 1 | 5 | 6 | 3 |
| 1681 | 5 | 10 | 7 | 6 | 11 | 0 | 11 | 3 | 3 | 2 | 8 | 8 | 2 | 4 |
| 1682 | 7 | 0 | 10 | 9 | 8 | 0 | 7 | 6 | 6 | 0 | 5 | 3 | 4 | 11 |
| 1683 | 2 | 1 | 1 | 3 | 3 | 0 | 9 | 9 | 7 | 1 | 4 | 8 | 0 | 9 |
| 1684 | 4 | 10 | 6 | 10 | 1 | 11 | 5 | 11 | 3 | 11 | 7 | 6 | 8 | 3 |
| 1685 | 0 | 0 | 2 | 9 | 9 | 7 | 6 | 8 | 10 | 7 | 7 | 0 | 1 | 8 |
| 1686 | 0 | 8 | 4 | 0 | 5 | 8 | 1 | 5 | 6 | 10 | 2 | 9 | 3 | 9 |
| 1687 | 7 | 4 | 11 | 10 | 4 | 7 | 5 | 10 | 3 | 3 | 11 | 11 | 2 | 6 |
| 1688 | 9 | 5 | 2 | 3 | 11 | 2 | 3 | 11 | 4 | 7 | 8 | 9 | 11 | 9 |
| 1689 | 8 | 4 | 0 | 1 | 0 | 5 | 9 | 7 | 11 | 11 | 1 | 1 | 11 | 3 |
| 1690 | 10 | 9 | 2 | 11 | 8 | 3 | 8 | 7 | 5 | 9 | 0 | 3 | 5 | 8 |
| 1691 | 1 | 5 | 6 | 8 | 8 | 3 | 3 | 6 | 2 | 10 | 9 | 7 | 0 | 5 |
| 1692 | 2 | 4 | 7 | 0 | 7 | 5 | 7 | 0 | 10 | 9 | 9 | 5 | 2 | 8 |
| 1693 | 10 | 9 | 5 | 2 | 10 | 2 | 4 | 4 | 2 | 10 | 10 | 6 | 1 | 7 |
| 1694 | 1 | 6 | 5 | 11 | 5 | 3 | 5 | 6 | 0 | 2 | 0 | 0 | 2 | 11 |
| 1695 | 11 | 10 | 2 | 2 | 11 | 5 | 9 | 2 | 6 | 11 | 0 | 8 | 0 | 2 |
| 1696 | 3 | 5 | 0 | 10 | 7 | 9 | 11 | 11 | 1 | 9 | 10 | 11 | 4 | 1 |
| 1697 | 1 | 11 | 3 | 3 | 4 | 11 | 8 | 1 | 9 | 5 | 7 | 1 | 9 | 11 |
| 1698 | 3 | 7 | 2 | 6 | 0 | 6 | 5 | 3 | 7 | 10 | 5 | 8 | 11 | 0 |
| 1699 | 4 | 7 | 5 | 9 | 2 | 10 | 8 | 11 | 2 | 7 | 0 | 7 | 2 | 2 |
| 1700 | 0 | 5 | 7 | 3 | 0 | 11 | 5 | 7 | 11 | 0 | 0 | 8 | 0 | 4 |
| 1701 | 1 | 10 | 9 | 4 | 2 | 6 | 0 | 5 | 1 | 3 | 0 | 7 | 10 | 3 |
| 1702 | 3 | 1 | 9 | 6 | 2 | 8 | 8 | 6 | 6 | 11 | 1 | 3 | 5 | 1 |
| 1703 | 6 | 8 | 8 | 7 | 7 | 11 | 11 | 7 | 8 | 5 | 9 | 9 | 2 | 2 |
| 1704 | 5 | 1 | 9 | 5 | 7 | 10 | 11 | 7 | 4 | 3 | 10 | 1 | 11 | 0 |
| 1705 | 3 | 3 | 2 | 8 | 1 | 0 | 11 | 2 | 10 | 5 | 7 | 8 | 3 | 1 |
| 1706 | 1 | 2 | 7 | 4 | 1 | 9 | 11 | 10 | 9 | 3 | 7 | 9 | 4 | 10 |
| 1707 | 3 | 9 | 10 | 2 | 6 | 1 | 8 | 2 | 7 | 1 | 3 | 0 | 1 | 1 |
| 1708 | 2 | 8 | 2 | 8 | 3 | 6 | 1 | 11 | 1 | 10 | 9 | 2 | 10 | 11 |
| 1709 | 3 | 10 | 11 | 10 | 10 | 1 | 0 | 1 | 5 | 10 | 1 | 1 | 4 | 7 |
| 1710 | 4 | 9 | 5 | 3 | 11 | 4 | 11 | 9 | 4 | 8 | 11 | 2 | 3 | 8 |
| 1711 | 1 | 9 | 0 | 9 | 7 | 1 | 7 | 1 | 10 | 4 | 0 | 4 | 5 | 3 |
| 1712 | 3 | 2 | 8 | 2 | 10 | 8 | 5 | 11 | 2 | 7 | 8 | 1 | 9 | 8 |
| 1713 | 0 | 11 | 6 | 2 | 2 | 4 | 2 | 6 | 5 | 9 | 3 | 2 | 3 | 5 |
| 1714 | 0 | 5 | 8 | 10 | 9 | 5 | 9 | 9 | 4 | 6 | 11 | 10 | 0 | 7 |
| 1715 | 6 | 6 | 10 | 2 | 0 | 9 | 5 | 10 | 5 | 5 | 2 | 4 | 2 | 8 |
| 1716 | 9 | 0 | 3 | 4 | 5 | 6 | 9 | 6 | 9 | 8 | 5 | 0 | 11 | 9 |
| 1717 | 4 | 1 | 0 | 8 | 6 | 7 | 8 | 10 | 7 | 8 | 9 | 1 | 7 | 7 |
| 1718 | 4 | 2 | 8 | 0 | 2 | 10 | 3 | 10 | 1 | 1 | 5 | 0 | 0 | 8 |
| 1719 | 5 | 5 | 3 | 1 | 3 | 3 | 10 | 10 | 8 | 4 | 6 | 2 | 11 | 6 |
| 1720 | 11 | 3 | 1 | 6 | 4 | 8 | 5 | 10 | 6 | 4 | 7 | 10 | 6 | 5 |
| 1721 | 0 | 6 | 4 | 7 | 11 | 0 | 5 | 2 | 8 | 6 | 0 | 9 | 1 | 5 |
| 1722 | 5 | 11 | 9 | 5 | 8 | 11 | 6 | 1 | 6 | 4 | 2 | 7 | 8 | 9 |
| 1723 | 5 | 11 | 4 | 0 | 2 | 9 | 7 | 4 | 10 | 3 | 2 | 10 | 7 | 0 |
| 1724 | 4 | 5 | 4 | 1 | 11 | 0 | 9 | 1 | 2 | 5 | 9 | 4 | 8 | 9 |
| 1725 | 7 | 7 | 4 | 3 | 10 | 0 | 10 | 0 | 5 | 9 | 4 | 6 | 7 | 0 |
| 1726 | 10 | 10 | 11 | 6 | 11 | 4 | 4 | 9 | 10 | 9 | 5 | 7 | 8 | 2 |
| 1727 | 6 | 1 | 4 | 10 | 5 | 11 | 8 | 9 | 6 | 5 | 8 | 11 | 10 | 7 |
| 1728 | 7 | 8 | 5 | 11 | 4 | 5 | 5 | 9 | 8 | 11 | 9 | 10 | 8 | 9 |
| 1729 | 10 | 0 | 5 | 5 | 2 | 5 | 11 | 0 | 7 | 9 | 2 | 4 | 0 | 7 |
| 1730 | 8 | 4 | 10 | 7 | 7 | 3 | 1 | 6 | 1 | 1 | 4 | 11 | 5 | 8 |
| 1731 | 6 | 2 | 7 | 9 | 11 | 6 | 7 | 11 | 4 | 5 | 3 | 2 | 9 | 5 |
| 1732 | 1 | 3 | 8 | 11 | 3 | 2 | 9 | 9 | 10 | 10 | 0 | 1 | 4 | 1 |
| 1733 | 7 | 10 | 1 | 3 | 11 | 1 | 5 | 6 | 3 | 5 | 0 | 7 | 11 | 10 |
| 1734 | 5 | 0 | 3 | 5 | 1 | 6 | 5 | 3 | 11 | 11 | 2 | 9 | 5 | 8 |
| 1735 | 11 | 11 | 0 | 6 | 0 | 2 | 2 | 11 | 0 | 8 | 10 | 0 | 0 | 11 |
| 1736 | 8 | 2 | 3 | 8 | 2 | 3 | 11 | 3 | 8 | 6 | 3 | 0 | 5 | 0 |
| 1737 | 2 | 7 | 9 | 11 | 7 | 4 | 6 | 5 | 5 | 5 | 0 | 4 | 9 | 9 |
| 1738 | 6 | 0 | 4 | 5 | 2 | 0 | 5 | 5 | 1 | 2 | 5 | 2 | 9 | 0 |
| 1739 | 0 | 3 | 0 | 0 | 8 | 10 | 9 | 6 | 2 | 4 | 3 | 5 | 9 | 10 |
| 1740 | 0 | 6 | 10 | 9 | 10 | 2 | 11 | 0 | 1 | 2 | 1 | 1 | 10 | 8 |
| 1741 | 7 | 7 | 3 | 4 | 1 | 4 | 4 | 8 | 8 | 0 | 7 | 6 | 10 | 1 |
| 1742 | 9 | 7 | 2 | 6 | 3 | 10 | 4 | 5 | 4 | 8 | 11 | 6 | 5 | 3 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1743 | 2 | 5 | 2 | 6 | 1 | 11 | 10 | 2 | 9 | 1 | 9 | 11 | 4 | 9 |
| 1744 | 8 | 2 | 1 | 5 | 11 | 2 | 4 | 1 | 1 | 0 | 5 | 10 | 4 | 9 |
| 1745 | 1 | 8 | 5 | 5 | 6 | 1 | 10 | 11 | 9 | 7 | 1 | 11 | 6 |
| 1746 | 2 | 9 | 8 | 10 | 10 | 10 | 10 | 6 | 5 | 11 | 6 | 4 | 8 | 2 |
| 1747 | 1 | 5 | 7 | 9 | 8 | 4 | 5 | 5 | 7 | 1 | 10 | 9 | 7 | 3 |
| 1748 | 8 | 0 | 2 | 2 | 3 | 9 | 2 | 6 | 8 | 8 | 0 | 10 | 7 | 11 |
| 1749 | 5 | 1 | 3 | 7 | 1 | 11 | 0 | 9 | 2 | 2 | 1 | 7 | 9 | 1 |
| 1750 | 10 | 11 | 7 | 8 | 10 | 5 | 10 | 4 | 10 | 1 | 3 | 2 | 10 | 1 |
| 1751 | 6 | 8 | 1 | 10 | 6 | 0 | 11 | 3 | 5 | 9 | 5 | 5 | 1 | 5 |
| 1752 | 5 | 2 | 5 | 1 | 8 | 2 | 8 | 6 | 7 | 6 | 8 | 8 | 6 | 9 |
| 1753 | 11 | 7 | 2 | 5 | 4 | 11 | 4 | 10 | 11 | 3 | 1 | 5 | 7 | 7 |
| 1754 | 7 | 6 | 9 | 8 | 11 | 11 | 9 | 7 | 2 | 8 | 7 | 7 | 4 | 0 |
| 1755 | 8 | 5 | 8 | 10 | 4 | 4 | 6 | 3 | 7 | 2 | 3 | 2 | 2 | 8 |
| 1756 | 11 | 0 | 11 | 4 | 3 | 2 | 5 | 8 | 4 | 3 | 6 | 3 | 6 | 4 |
| 1757 | 2 | 3 | 6 | 5 | 1 | 7 | 1 | 11 | 2 | 5 | 10 | 5 | 2 | 6 |
| 1758 | 11 | 3 | 7 | 1 | 2 | 6 | 8 | 1 | 9 | 7 | 10 | 5 | 10 | 8 |
| 1759 | 9 | 1 | 4 | 8 | 11 | 1 | 2 | 6 | 11 | 2 | 11 | 6 | 3 | 9 |
| 1760 | 8 | 7 | 4 | 8 | 11 | 10 | 11 | 5 | 10 | 11 | 2 | 3 | 9 | 5 |
| 1761 | 11 | 11 | 3 | 11 | 10 | 3 | 4 | 4 | 6 | 2 | 1 | 9 | 6 | 2 |
| 1762 | 5 | 11 | 11 | 8 | 8 | 5 | 7 | 7 | 7 | 2 | 11 | 0 | 4 | 3 |
| 1763 | 11 | 6 | 2 | 7 | 10 | 7 | 2 | 9 | 1 | 6 | 4 | 0 | 4 | 10 |
| 1764 | 2 | 8 | 5 | 11 | 2 | 7 | 9 | 8 | 7 | 4 | 3 | 3 | 2 | 5 |
| 1765 | 4 | 8 | 10 | 9 | 1 | 5 | 8 | 1 | 5 | 2 | 10 | 11 | 6 | 9 |
| 1766 | 9 | 9 | 7 | 2 | 11 | 2 | 10 | 9 | 9 | 3 | 2 | 7 | 7 | 3 |
| 1767 | 10 | 2 | 11 | 0 | 11 | 1 | 8 | 5 | 8 | 8 | 10 | 0 | 9 | 10 |
| 1768 | 7 | 4 | 2 | 11 | 6 | 5 | 11 | 11 | 4 | 10 | 3 | 5 | 4 | 2 |
| 1769 | 1 | 5 | 10 | 2 | 8 | 7 | 2 | 4 | 9 | 0 | 3 | 1 | 10 | 9 |
| 1770 | 9 | 1 | 4 | 9 | 5 | 6 | 3 | 10 | 1 | 3 | 1 | 9 | 8 | 2 |
| 1771 | 1 | 7 | 8 | 0 | 6 | 9 | 5 | 6 | 8 | 5 | 6 | 8 | 9 | 5 |
| 1772 | 1 | 6 | 10 | 1 | 11 | 6 | 10 | 3 | 3 | 11 | 4 | 1 | 3 | 0 |
| 1773 | 3 | 8 | 10 | 9 | 11 | 11 | 2 | 2 | 6 | 9 | 1 | 4 | 8 | 0 |
| 1774 | 10 | 3 | 6 | 1 | 8 | 2 | 11 | 0 | 4 | 0 | 10 | 3 | 7 | 5 |
| 1775 | 7 | 8 | 2 | 2 | 2 | 1 | 0 | 9 | 9 | 2 | 11 | 11 | 11 | 2 |
| 1776 | 5 | 5 | 7 | 4 | 0 | 5 | 7 | 3 | 1 | 5 | 7 | 4 | 1 | 6 |
| 1777 | 11 | 9 | 1 | 4 | 7 | 2 | 9 | 5 | 3 | 6 | 4 | 9 | 5 | 11 |
| 1778 | 8 | 4 | 8 | 0 | 9 | 2 | 9 | 1 | 6 | 7 | 10 | 7 | 5 | 5 |
| 1779 | 3 | 6 | 2 | 4 | 2 | 3 | 3 | 8 | 2 | 4 | 10 | 2 | 10 | 4 |
| 1780 | 5 | 0 | 0 | 2 | 2 | 11 | 0 | 6 | 0 | 6 | 5 | 1 | 1 | 6 |
| 1781 | 5 | 3 | 1 | 3 | 9 | 8 | 4 | 7 | 4 | 5 | 11 | 3 | 10 | 4 |
| 1782 | 11 | 10 | 8 | 1 | 6 | 0 | 0 | 0 | 4 | 5 | 11 | 11 | 1 | 6 |
| 1783 | 3 | 8 | 9 | 8 | 8 | 5 | 6 | 6 | 3 | 9 | 8 | 2 | 1 | 8 |
| 1784 | 8 | 1 | 5 | 3 | 1 | 5 | 10 | 1 | 0 | 7 | 3 | 9 | 3 | 7 |
| 1785 | 2 | 0 | 10 | 0 | 6 | 6 | 8 | 0 | 11 | 7 | 1 | 4 | 6 | 2 |
| 1786 | 2 | 11 | 5 | 8 | 8 | 9 | 0 | 8 | 5 | 10 | 7 | 4 | 7 | 6 |
| 1787 | 0 | 2 | 8 | 7 | 3 | 4 | 0 | 7 | 11 | 6 | 8 | 4 | 4 | 0 |
| 1788 | 4 | 5 | 6 | 0 | 0 | 9 | 8 | 5 | 2 | 3 | 1 | 3 | 4 | 7 |
| 1789 | 4 | 2 | 2 | 9 | 6 | 2 | 0 | 3 | 11 | 2 | 4 | 10 | 5 | 1 |
| 1790 | 7 | 1 | 10 | 8 | 8 | 11 | 5 | 0 | 1 | 3 | 4 | 0 | 11 | 9 |
| 1791 | 1 | 5 | 7 | 6 | 9 | 5 | 6 | 0 | 8 | 7 | 1 | 6 | 11 | 1 |
| 1792 | 4 | 7 | 1 | 11 | 2 | 3 | 0 | 2 | 3 | 2 | 5 | 7 | 3 | 4 |
| 1793 | 10 | 8 | 6 | 6 | 4 | 11 | 7 | 4 | 0 | 1 | 2 | 3 | 10 | 0 |
| 1794 | 9 | 4 | 7 | 2 | 5 | 2 | 8 | 6 | 4 | 10 | 3 | 9 | 2 | 1 |
| 1795 | 8 | 0 | 2 | 10 | 3 | 10 | 1 | 0 | 9 | 6 | 1 | 5 | 8 | 6 |
| 1796 | 3 | 1 | 2 | 7 | 4 | 0 | 5 | 8 | 6 | 7 | 11 | 6 | 7 | 2 |
| 1797 | 11 | 10 | 1 | 5 | 0 | 8 | 11 | 0 | 8 | 9 | 4 | 8 | 1 | 11 |
| 1798 | 10 | 7 | 5 | 3 | 6 | 6 | 6 | 5 | 4 | 6 | 8 | 0 | 5 | 10 |
| 1799 | 6 | 5 | 0 | 11 | 1 | 7 | 7 | 1 | 6 | 11 | 10 | 11 | 9 | 7 |
| 1800 | 0 | 9 | 9 | 5 | 10 | 7 | 2 | 5 | 3 | 8 | 0 | 9 | 11 | 2 |
| 1801 | 5 | 6 | 8 | 9 | 1 | 3 | 8 | 3 | 1 | 9 | 0 | 4 | 0 | 5 |
| 1802 | 8 | 8 | 11 | 11 | 11 | 9 | 10 | 10 | 8 | 1 | 3 | 6 | 6 | 4 |
| 1803 | 1 | 6 | 9 | 10 | 5 | 9 | 2 | 4 | 7 | 6 | 11 | 10 | 3 | 10 |
| 1804 | 9 | 10 | 7 | 6 | 11 | 10 | 0 | 10 | 1 | 8 | 9 | 11 | 3 | 9 |
| 1805 | 2 | 11 | 3 | 10 | 11 | 3 | 11 | 6 | 9 | 0 | 5 | 3 | 0 | 7 |
| 1806 | 0 | 4 | 8 | 4 | 0 | 1 | 3 | 11 | 10 | 3 | 7 | 8 | 8 | 3 |
| 1807 | 10 | 6 | 7 | 7 | 11 | 0 | 4 | 6 | 11 | 1 | 10 | 4 | 8 | 8 |
| 1808 | 6 | 11 | 2 | 6 | 6 | 9 | 3 | 0 | 6 | 8 | 7 | 0 | 4 | 0 |
| 1809 | 6 | 2 | 10 | 8 | 9 | 2 | 6 | 0 | 10 | 10 | 9 | 3 | 3 | 4 |
| 1810 | 5 | 8 | 8 | 4 | 7 | 5 | 7 | 8 | 9 | 6 | 9 | 10 | 9 | 11 |
| 1811 | 2 | 3 | 10 | 0 | 5 | 7 | 7 | 5 | 2 | 1 | 9 | 2 | 7 | 1 |
| 1812 | 4 | 2 | 0 | 10 | 4 | 11 | 3 | 3 | 1 | 7 | 8 | 1 | 3 | 6 |
| 1813 | 4 | 5 | 7 | 10 | 7 | 10 | 5 | 7 | 7 | 10 | 6 | 4 | 10 | 7 |
| 1814 | 1 | 3 | 6 | 9 | 3 | 0 | 1 | 7 | 5 | 9 | 2 | 8 | 7 | 4 |
| 1815 | 10 | 1 | 0 | 2 | 4 | 9 | 4 | 1 | 5 | 3 | 7 | 7 | 11 | 5 |
| 1816 | 11 | 5 | 9 | 10 | 10 | 5 | 11 | 3 | 0 | 1 | 9 | 0 | 8 | 4 |
| 1817 | 7 | 2 | 6 | 3 | 9 | 6 | 8 | 8 | 7 | 0 | 6 | 7 | 11 | 9 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1818 | 5 | 5 | 0 | 1 | 2 | 11 | 1 | 11 | 11 | 4 | 7 | 9 | 10 | 8 |
| 1819 | 1 | 6 | 3 | 8 | 4 | 5 | 9 | 7 | 9 | 11 | 4 | 6 | 1 | 8 |
| 1820 | 1 | 7 | 3 | 7 | 7 | 3 | 5 | 0 | 4 | 4 | 3 | 5 | 6 | 5 |
| 1821 | 3 | 8 | 10 | 4 | 8 | 1 | 9 | 2 | 5 | 7 | 4 | 2 | 6 | 7 |
| 1822 | 0 | 6 | 3 | 2 | 3 | 4 | 3 | 9 | 7 | 0 | 2 | 1 | 6 | 0 |
| 1823 | 5 | 9 | 5 | 3 | 2 | 1 | 3 | 10 | 0 | 2 | 11 | 4 | 6 | 9 |
| 1824 | 9 | 7 | 0 | 6 | 10 | 0 | 9 | 0 | 2 | 2 | 2 | 4 | 9 | 2 |
| 1825 | 4 | 7 | 0 | 4 | 9 | 8 | 7 | 11 | 7 | 1 | 4 | 6 | 2 | 10 |
| 1826 | 7 | 2 | 4 | 1 | 1 | 2 | 4 | 2 | 8 | 1 | 2 | 0 | 1 | 6 |
| 1827 | 8 | 9 | 3 | 10 | 1 | 8 | 2 | 11 | 11 | 5 | 10 | 2 | 6 | 1 |
| 1828 | 1 | 5 | 9 | 1 | 9 | 1 | 4 | 9 | 3 | 0 | 10 | 2 | 0 | 5 |
| 1829 | 4 | 5 | 2 | 4 | 3 | 1 | 8 | 10 | 2 | 6 | 5 | 2 | 3 | 11 |
| 1830 | 6 | 3 | 1 | 8 | 4 | 10 | 4 | 9 | 1 | 0 | 0 | 4 | 1 | 6 |
| 1831 | 11 | 1 | 6 | 7 | 5 | 3 | 6 | 2 | 9 | 8 | 2 | 9 | 10 | 3 |
| 1832 | 0 | 6 | 3 | 4 | 2 | 5 | 0 | 5 | 10 | 5 | 6 | 4 | 3 | 9 |
| 1833 | 4 | 4 | 2 | 9 | 5 | 8 | 4 | 7 | 1 | 8 | 11 | 5 | 9 | 5 |
| 1834 | 8 | 3 | 6 | 11 | 8 | 3 | 9 | 8 | 6 | 6 | 10 | 6 | 8 | 8 |
| 1835 | 5 | 8 | 2 | 9 | 3 | 9 | 3 | 1 | 3 | 3 | 10 | 6 | 9 | 8 |
| 1836 | 5 | 7 | 7 | 0 | 9 | 10 | 5 | 6 | 2 | 8 | 10 | 9 | 6 | 11 |
| 1837 | 6 | 1 | 9 | 8 | 5 | 4 | 0 | 3 | 11 | 0 | 6 | 11 | 3 | 3 |
| 1838 | 1 | 3 | 10 | 3 | 8 | 9 | 8 | 11 | 9 | 6 | 9 | 8 | 11 | 6 |
| 1839 | 7 | 1 | 8 | 4 | 2 | 0 | 2 | 7 | 11 | 9 | 0 | 2 | 9 | 8 |
| 1840 | 3 | 7 | 2 | 9 | 11 | 5 | 7 | 6 | 8 | 5 | 8 | 1 | 11 | 4 |
| 1841 | 1 | 6 | 2 | 0 | 6 | 7 | 8 | 3 | 8 | 0 | 1 | 2 | 5 | 0 |
| 1842 | 7 | 8 | 2 | 5 | 8 | 6 | 5 | 7 | 10 | 3 | 9 | 1 | 7 | 1 |
| 1843 | 10 | 7 | 5 | 7 | 3 | 8 | 3 | 3 | 6 | 5 | 2 | 8 | 2 | 8 |
| 1844 | 4 | 7 | 3 | 3 | 8 | 9 | 1 | 5 | 1 | 1 | 5 | 9 | 10 | 2 |
| 1845 | 8 | 0 | 10 | 9 | 7 | 3 | 6 | 8 | 3 | 5 | 0 | 7 | 4 | 7 |
| 1846 | 2 | 4 | 6 | 8 | 2 | 2 | 7 | 5 | 9 | 10 | 10 | 8 | 5 | 11 |
| 1847 | 7 | 10 | 4 | 11 | 5 | 6 | 9 | 3 | 1 | 7 | 10 | 11 | 1 | 5 |
| 1848 | 6 | 7 | 10 | 0 | 2 | 1 | 1 | 11 | 4 | 7 | 8 | 6 | 4 | 5 |
| 1849 | 3 | 7 | 10 | 0 | 11 | 11 | 10 | 1 | 0 | 4 | 5 | 10 | 6 | 8 |
| 1850 | 0 | 0 | 5 | 8 | 2 | 6 | 1 | 6 | 8 | 1 | 7 | 6 | 1 | 10 |
| 1851 | 0 | 2 | 10 | 6 | 1 | 10 | 1 | 2 | 6 | 2 | 11 | 5 | 10 | 3 |
| 1852 | 9 | 2 | 4 | 4 | 10 | 2 | 3 | 10 | 7 | 4 | 8 | 3 | 4 | 1 |
| 1853 | 6 | 4 | 1 | 5 | 8 | 5 | 9 | 6 | 0 | 2 | 0 | 3 | 6 | 0 |
| 1854 | 5 | 4 | 4 | 6 | 1 | 7 | 2 | 10 | 4 | 7 | 4 | 7 | 9 | 5 |
| 1855 | 2 | 5 | 1 | 6 | 8 | 4 | 9 | 9 | 6 | 10 | 3 | 9 | 5 | 10 |
| 1856 | 10 | 0 | 11 | 4 | 5 | 3 | 1 | 2 | 2 | 5 | 5 | 11 | 5 | 5 |
| 1857 | 7 | 10 | 1 | 7 | 8 | 2 | 8 | 1 | 4 | 4 | 11 | 0 | 11 | 2 |
| 1858 | 0 | 2 | 2 | 0 | 6 | 1 | 5 | 2 | 1 | 10 | 8 | 10 | 1 | 4 |
| 1859 | 11 | 3 | 1 | 9 | 3 | 7 | 5 | 6 | 9 | 3 | 1 | 2 | 4 | 11 |
| 1860 | 6 | 9 | 0 | 6 | 5 | 11 | 4 | 11 | 5 | 10 | 1 | 11 | 0 | 4 |
| 1861 | 10 | 4 | 11 | 0 | 3 | 6 | 0 | 8 | 2 | 10 | 1 | 3 | 3 | 2 |
| 1862 | 7 | 9 | 7 | 7 | 6 | 9 | 10 | 0 | 4 | 0 | 2 | 1 | 1 | 11 |
| 1863 | 10 | 4 | 0 | 1 | 11 | 4 | 3 | 2 | 2 | 1 | 8 | 8 | 0 | 1 |
| 1864 | 5 | 10 | 4 | 10 | 3 | 5 | 7 | 0 | 6 | 9 | 3 | 0 | 7 | 10 |
| 1865 | 5 | 7 | 6 | 0 | 5 | 5 | 2 | 1 | 5 | 2 | 11 | 7 | 0 | 0 |
| 1866 | 11 | 10 | 9 | 6 | 7 | 3 | 8 | 1 | 1 | 1 | 6 | 10 | 1 | 7 |
| 1867 | 3 | 2 | 2 | 1 | 9 | 10 | 3 | 5 | 11 | 11 | 1 | 7 | 6 | 2 |
| 1868 | 4 | 3 | 10 | 8 | 0 | 7 | 3 | 1 | 0 | 7 | 11 | 0 | 2 | 3 |
| 1869 | 8 | 3 | 5 | 10 | 8 | 8 | 4 | 4 | 5 | 1 | 11 | 0 | 4 | 0 |
| 1870 | 11 | 1 | 4 | 3 | 11 | 6 | 7 | 4 | 0 | 0 | 10 | 9 | 2 | 10 |
| 1871 | 0 | 5 | 5 | 1 | 0 | 2 | 5 | 8 | 10 | 2 | 4 | 5 | 1 | 2 |
| 1872 | 2 | 6 | 8 | 5 | 11 | 9 | 9 | 4 | 2 | 0 | 2 | 11 | 11 | 5 |
| 1873 | 2 | 4 | 1 | 11 | 3 | 9 | 1 | 6 | 11 | 0 | 11 | 4 | 2 | 9 |
| 1874 | 9 | 5 | 8 | 4 | 11 | 8 | 8 | 11 | 5 | 9 | 6 | 0 | 10 | 4 |
| 1875 | 9 | 11 | 6 | 0 | 5 | 2 | 10 | 7 | 6 | 7 | 0 | 3 | 11 | 4 |
| 1876 | 8 | 5 | 8 | 3 | 0 | 9 | 4 | 10 | 4 | 9 | 10 | 7 | 8 | 6 |
| 1877 | 3 | 6 | 10 | 9 | 0 | 4 | 8 | 10 | 11 | 10 | 8 | 8 | 5 | 7 |
| 1878 | 7 | 0 | 2 | 7 | 6 | 6 | 6 | 8 | 0 | 9 | 4 | 3 | 2 | 0 |
| 1879 | 4 | 6 | 0 | 3 | 5 | 10 | 6 | 2 | 2 | 9 | 7 | 4 | 1 | 8 |
| 1880 | 7 | 9 | 0 | 2 | 5 | 10 | 3 | 10 | 10 | 6 | 10 | 2 | 5 | 10 |
| 1881 | 8 | 7 | 11 | 6 | 4 | 4 | 2 | 5 | 2 | 8 | 5 | 3 | 4 | 8 |
| 1882 | 3 | 10 | 3 | 2 | 9 | 3 | 6 | 2 | 4 | 3 | 4 | 8 | 5 | 9 |
| 1883 | 10 | 2 | 3 | 6 | 1 | 3 | 11 | 7 | 11 | 9 | 2 | 1 | 8 | 9 |
| 1884 | 10 | 10 | 9 | 9 | 0 | 1 | 9 | 0 | 9 | 0 | 0 | 1 | 10 | 4 |
| 1885 | 2 | 9 | 0 | 3 | 9 | 5 | 0 | 5 | 4 | 4 | 11 | 7 | 7 | 11 |
| 1886 | 1 | 4 | 5 | 8 | 10 | 8 | 6 | 10 | 9 | 5 | 1 | 11 | 9 | 6 |
| 1887 | 9 | 3 | 3 | 7 | 11 | 7 | 4 | 3 | 6 | 6 | 7 | 5 | 9 | 4 |
| 1888 | 4 | 8 | 11 | 6 | 7 | 10 | 9 | 4 | 1 | 0 | 7 | 8 | 0 | 4 |
| 1889 | 11 | 2 | 6 | 2 | 8 | 11 | 11 | 4 | 9 | 4 | 11 | 8 | 9 | 4 |
| 1890 | 6 | 8 | 6 | 10 | 5 | 8 | 7 | 10 | 2 | 2 | 0 | 8 | 2 | 2 |
| 1891 | 4 | 9 | 11 | 1 | 10 | 3 | 0 | 1 | 8 | 7 | 4 | 2 | 8 | 1 |
| 1892 | 8 | 8 | 7 | 5 | 4 | 10 | 6 | 8 | 5 | 2 | 8 | 5 | 7 | 11 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1893 | 1 | 6 | 4 | 8 | 1 | 4 | 7 | 9 | 5 | 7 | 8 | 9 | 3 | 2 |
| 1894 | 11 | 1 | 11 | 9 | 1 | 3 | 7 | 8 | 6 | 3 | 5 | 8 | 3 | 6 |
| 1895 | 3 | 5 | 1 | 4 | 4 | 6 | 8 | 5 | 3 | 10 | 7 | 6 | 9 | 1 |
| 1896 | 9 | 2 | 11 | 10 | 0 | 1 | 11 | 11 | 4 | 0 | 9 | 7 | 3 | 11 |
| 1897 | 8 | 4 | 7 | 8 | 3 | 9 | 2 | 5 | 5 | 5 | 7 | 1 | 8 | 7 |
| 1898 | 3 | 11 | 7 | 11 | 4 | 2 | 5 | 0 | 4 | 5 | 8 | 2 | 3 | 8 |
| 1899 | 3 | 3 | 4 | 5 | 11 | 6 | 2 | 7 | 8 | 11 | 3 | 3 | 10 | 11 |
| 1900 | 7 | 1 | 10 | 8 | 9 | 6 | 1 | 1 | 2 | 11 | 0 | 9 | 0 | 2 |
| 1901 | 7 | 0 | 1 | 8 | 8 | 5 | 0 | 0 | 11 | 5 | 5 | 10 | 2 | 8 |
| 1902 | 10 | 9 | 1 | 5 | 2 | 4 | 10 | 9 | 3 | 9 | 9 | 5 | 7 | 9 |
| 1903 | 7 | 5 | 10 | 9 | 1 | 8 | 10 | 6 | 10 | 8 | 9 | 6 | 1 | 7 |
| 1904 | 9 | 2 | 5 | 7 | 5 | 9 | 0 | 4 | 4 | 8 | 1 | 5 | 11 | 0 |
| 1905 | 5 | 3 | 11 | 4 | 4 | 8 | 11 | 11 | 10 | 8 | 8 | 5 | 6 | 9 |
| 1906 | 7 | 4 | 3 | 10 | 6 | 2 | 10 | 2 | 3 | 2 | 7 | 4 | 8 | 1 |
| 1907 | 1 | 9 | 7 | 10 | 9 | 11 | 9 | 1 | 6 | 2 | 7 | 0 | 10 | 6 |
| 1908 | 7 | 8 | 10 | 5 | 7 | 1 | 1 | 4 | 7 | 10 | 10 | 0 | 8 | 3 |
| 1909 | 10 | 7 | 11 | 8 | 9 | 2 | 2 | 6 | 0 | 4 | 6 | 5 | 8 | 10 |
| 1910 | 8 | 0 | 8 | 10 | 1 | 0 | 8 | 8 | 2 | 11 | 6 | 10 | 7 | 8 |
| 1911 | 5 | 8 | 0 | 8 | 6 | 7 | 2 | 8 | 8 | 9 | 11 | 5 | 11 | 4 |
| 1912 | 10 | 5 | 8 | 9 | 10 | 1 | 3 | 4 | 7 | 2 | 4 | 6 | 11 | 11 |
| 1913 | 6 | 1 | 10 | 1 | 4 | 2 | 8 | 7 | 6 | 6 | 3 | 5 | 5 | 8 |
| 1914 | 11 | 3 | 1 | 10 | 6 | 11 | 6 | 11 | 1 | 9 | 6 | 7 | 8 | 10 |
| 1915 | 4 | 11 | 6 | 9 | 3 | 3 | 3 | 0 | 0 | 1 | 0 | 2 | 5 | 6 |
| 1916 | 8 | 1 | 4 | 6 | 11 | 10 | 8 | 3 | 3 | 3 | 11 | 4 | 6 | 2 |
| 1917 | 6 | 1 | 1 | 1 | 1 | 0 | 4 | 5 | 4 | 5 | 4 | 9 | 8 | 10 |
| 1918 | 9 | 8 | 10 | 3 | 4 | 4 | 6 | 9 | 9 | 1 | 0 | 0 | 6 | 1 |
| 1919 | 8 | 10 | 5 | 11 | 4 | 3 | 10 | 7 | 7 | 3 | 2 | 9 | 0 | 5 |
| 1920 | 0 | 10 | 8 | 11 | 9 | 11 | 10 | 6 | 4 | 2 | 5 | 11 | 11 | 0 |
| 1921 | 5 | 9 | 1 | 6 | 3 | 1 | 6 | 3 | 3 | 10 | 6 | 1 | 11 | 7 |
| 1922 | 0 | 4 | 11 | 2 | 10 | 7 | 11 | 9 | 1 | 11 | 10 | 2 | 2 | 11 |
| 1923 | 4 | 11 | 8 | 7 | 11 | 5 | 2 | 9 | 2 | 7 | 9 | 5 | 6 | 3 |
| 1924 | 10 | 5 | 7 | 4 | 0 | 7 | 11 | 9 | 8 | 4 | 1 | 5 | 9 | 5 |
| 1925 | 1 | 0 | 7 | 3 | 5 | 1 | 4 | 5 | 10 | 6 | 5 | 1 | 6 | 1 |
| 1926 | 9 | 5 | 1 | 2 | 6 | 11 | 1 | 5 | 8 | 11 | 2 | 10 | 2 | 3 |
| 1927 | 7 | 7 | 6 | 9 | 9 | 7 | 6 | 2 | 8 | 2 | 9 | 11 | 7 | 10 |
| 1928 | 5 | 4 | 4 | 3 | 9 | 3 | 8 | 5 | 0 | 3 | 8 | 1 | 1 | 8 |
| 1929 | 0 | 8 | 1 | 9 | 7 | 8 | 3 | 4 | 5 | 11 | 9 | 9 | 6 | 5 |
| 1930 | 2 | 3 | 6 | 7 | 4 | 9 | 9 | 0 | 10 | 5 | 11 | 0 | 0 | 10 |
| 1931 | 5 | 5 | 10 | 8 | 6 | 6 | 9 | 0 | 0 | 5 | 2 | 6 | 5 | 5 |
| 1932 | 9 | 7 | 9 | 1 | 0 | 6 | 11 | 2 | 9 | 10 | 8 | 11 | 4 | 3 |
| 1933 | 8 | 11 | 3 | 3 | 6 | 0 | 9 | 2 | 7 | 10 | 11 | 3 | 7 | 10 |
| 1934 | 4 | 11 | 4 | 11 | 9 | 11 | 4 | 8 | 3 | 6 | 6 | 1 | 7 | 10 |
| 1935 | 5 | 0 | 9 | 0 | 0 | 8 | 0 | 1 | 10 | 6 | 1 | 2 | 7 | 11 |
| 1936 | 7 | 8 | 3 | 1 | 0 | 10 | 0 | 11 | 3 | 5 | 1 | 5 | 5 | 7 |
| 1937 | 6 | 6 | 2 | 3 | 7 | 7 | 4 | 4 | 4 | 11 | 2 | 3 | 1 | 1 |
| 1938 | 5 | 10 | 2 | 10 | 6 | 4 | 5 | 7 | 5 | 5 | 5 | 2 | 2 | 6 |
| 1939 | 10 | 2 | 5 | 10 | 8 | 10 | 7 | 5 | 7 | 8 | 7 | 9 | 2 | 6 |
| 1940 | 10 | 0 | 1 | 7 | 11 | 2 | 11 | 8 | 3 | 11 | 1 | 11 | 0 | 11 |
| 1941 | 11 | 10 | 5 | 1 | 8 | 7 | 10 | 0 | 2 | 10 | 0 | 4 | 5 | 9 |
| 1942 | 0 | 7 | 4 | 1 | 9 | 0 | 2 | 3 | 6 | 1 | 7 | 7 | 7 | 9 |
| 1943 | 1 | 8 | 11 | 9 | 2 | 8 | 5 | 6 | 4 | 1 | 4 | 7 | 0 | 1 |
| 1944 | 6 | 8 | 4 | 2 | 8 | 6 | 10 | 5 | 11 | 8 | 3 | 4 | 1 | 2 |
| 1945 | 1 | 0 | 10 | 6 | 10 | 9 | 5 | 5 | 5 | 7 | 0 | 11 | 10 | 0 |
| 1946 | 2 | 0 | 11 | 2 | 8 | 5 | 10 | 8 | 5 | 7 | 2 | 0 | 11 | 9 |
| 1947 | 2 | 0 | 3 | 5 | 3 | 8 | 7 | 4 | 3 | 6 | 8 | 9 | 0 | 9 |
| 1948 | 7 | 3 | 2 | 7 | 0 | 4 | 7 | 11 | 2 | 11 | 10 | 4 | 10 | 5 |
| 1949 | 9 | 6 | 10 | 2 | 3 | 1 | 7 | 8 | 8 | 4 | 1 | 9 | 7 | 4 |
| 1950 | 4 | 10 | 4 | 0 | 3 | 10 | 2 | 2 | 3 | 11 | 9 | 9 | 4 | 0 |
| 1951 | 9 | 2 | 9 | 9 | 1 | 9 | 8 | 6 | 0 | 4 | 4 | 0 | 7 | 9 |
| 1952 | 1 | 11 | 8 | 8 | 5 | 3 | 10 | 3 | 8 | 1 | 10 | 10 | 7 | 2 |
| 1953 | 9 | 9 | 7 | 3 | 10 | 9 | 7 | 7 | 2 | 9 | 11 | 0 | 5 | 5 |
| 1954 | 2 | 7 | 7 | 5 | 3 | 6 | 11 | 10 | 5 | 7 | 1 | 8 | 10 | 6 |
| 1955 | 4 | 0 | 2 | 3 | 3 | 4 | 11 | 7 | 10 | 1 | 10 | 10 | 11 | 9 |
| 1956 | 4 | 9 | 10 | 2 | 0 | 2 | 1 | 6 | 9 | 4 | 8 | 4 | 6 | 11 |
| 1957 | 10 | 9 | 5 | 8 | 7 | 3 | 1 | 3 | 9 | 6 | 11 | 3 | 3 | 1 |
| 1958 | 7 | 4 | 9 | 10 | 3 | 11 | 7 | 7 | 0 | 0 | 6 | 6 | 0 | 6 |
| 1959 | 2 | 5 | 11 | 2 | 2 | 11 | 2 | 7 | 7 | 8 | 8 | 8 | 3 | 2 |
| 1960 | 2 | 9 | 8 | 3 | 8 | 2 | 9 | 0 | 3 | 3 | 1 | 3 | 10 | 9 |
| 1961 | 4 | 3 | 4 | 7 | 4 | 2 | 10 | 9 | 11 | 10 | 5 | 3 | 8 | 7 |
| 1962 | 11 | 4 | 10 | 2 | 4 | 6 | 4 | 10 | 7 | 6 | 6 | 0 | 4 | 2 |
| 1963 | 3 | 3 | 5 | 7 | 3 | 2 | 8 | 10 | 10 | 8 | 6 | 9 | 9 | 5 |
| 1964 | 0 | 2 | 9 | 6 | 9 | 9 | 9 | 3 | 7 | 9 | 0 | 6 | 4 | 8 |
| 1965 | 4 | 11 | 9 | 4 | 9 | 5 | 5 | 3 | 5 | 5 | 3 | 7 | 9 | 5 |
| 1966 | 0 | 2 | 11 | 10 | 5 | 0 | 0 | 8 | 9 | 3 | 10 | 6 | 10 | 5 |
| 1967 | 1 | 8 | 6 | 1 | 10 | 6 | 0 | 8 | 0 | 4 | 7 | 0 | 6 | 11 |

-continued

Example #6 of a group-based CS hopping pattern

| m | $n_{cs}(n)$ | | | | | | | | | | | | | |
|---|---|---|---|---|---|---|---|---|---|---|---|---|---|---|
| 1968 | 0 | 0 | 3 | 11 | 0 | 1 | 2 | 1 | 9 | 8 | 3 | 10 | 9 | 5 |
| 1969 | 2 | 6 | 5 | 4 | 11 | 8 | 2 | 10 | 11 | 2 | 5 | 7 | 1 | 3 |
| 1970 | 6 | 5 | 4 | 8 | 7 | 9 | 8 | 1 | 9 | 7 | 1 | 1 | 0 | 0 |
| 1971 | 2 | 2 | 3 | 1 | 6 | 11 | 4 | 0 | 1 | 8 | 4 | 4 | 2 | 7 |
| 1972 | 5 | 0 | 2 | 11 | 9 | 3 | 0 | 4 | 7 | 7 | 9 | 8 | 6 | 10 |
| 1973 | 9 | 10 | 0 | 1 | 0 | 8 | 5 | 3 | 11 | 7 | 9 | 10 | 8 | 0 |
| 1974 | 3 | 2 | 0 | 7 | 2 | 3 | 2 | 10 | 9 | 0 | 0 | 0 | 7 | 6 |
| 1975 | 0 | 4 | 3 | 0 | 7 | 10 | 8 | 9 | 0 | 9 | 7 | 11 | 7 | 5 |
| 1976 | 3 | 1 | 0 | 2 | 6 | 8 | 1 | 4 | 11 | 10 | 6 | 1 | 4 | 11 |
| 1977 | 8 | 2 | 3 | 5 | 5 | 1 | 6 | 5 | 8 | 4 | 0 | 2 | 3 | 5 |
| 1978 | 11 | 9 | 9 | 11 | 6 | 6 | 10 | 8 | 10 | 6 | 9 | 4 | 6 | 6 |
| 1979 | 2 | 4 | 0 | 1 | 2 | 5 | 2 | 4 | 5 | 9 | 5 | 6 | 4 | 10 |
| 1980 | 8 | 8 | 7 | 0 | 3 | 5 | 5 | 7 | 6 | 4 | 2 | 7 | 4 | 6 |
| 1981 | 3 | 4 | 11 | 7 | 8 | 0 | 10 | 10 | 3 | 5 | 10 | 3 | 1 | 10 |
| 1982 | 11 | 10 | 3 | 2 | 6 | 5 | 11 | 6 | 3 | 8 | 3 | 11 | 6 | 8 |
| 1983 | 3 | 4 | 4 | 1 | 5 | 0 | 9 | 0 | 10 | 3 | 5 | 9 | 11 | 6 |
| 1984 | 0 | 9 | 10 | 5 | 4 | 9 | 0 | 0 | 0 | 6 | 1 | 4 | 2 | 1 |
| 1985 | 11 | 6 | 0 | 10 | 9 | 6 | 5 | 4 | 9 | 8 | 7 | 5 | 7 | 2 |
| 1986 | 6 | 7 | 8 | 7 | 6 | 7 | 0 | 4 | 2 | 3 | 4 | 9 | 4 | 6 |
| 1987 | 2 | 10 | 4 | 0 | 10 | 8 | 4 | 11 | 0 | 0 | 7 | 8 | 3 | 1 |
| 1988 | 6 | 6 | 11 | 7 | 9 | 4 | 1 | 0 | 1 | 2 | 2 | 6 | 0 | 6 |
| 1989 | 7 | 11 | 7 | 11 | 2 | 6 | 11 | 5 | 11 | 1 | 4 | 0 | 6 | 9 |
| 1990 | 10 | 0 | 7 | 6 | 5 | 8 | 0 | 9 | 7 | 3 | 6 | 9 | 8 | 0 |
| 1991 | 7 | 10 | 10 | 2 | 11 | 0 | 11 | 9 | 5 | 0 | 4 | 4 | 3 | 5 |
| 1992 | 2 | 1 | 7 | 3 | 0 | 11 | 1 | 3 | 9 | 10 | 2 | 2 | 8 | 9 |
| 1993 | 0 | 4 | 1 | 11 | 5 | 7 | 6 | 8 | 5 | 1 | 3 | 1 | 5 | 2 |
| 1994 | 9 | 6 | 0 | 10 | 3 | 0 | 3 | 5 | 10 | 10 | 3 | 10 | 0 | 11 |
| 1995 | 0 | 10 | 0 | 5 | 7 | 4 | 9 | 6 | 7 | 11 | 6 | 7 | 0 | 6 |
| 1996 | 11 | 0 | 1 | 3 | 4 | 0 | 2 | 11 | 4 | 6 | 0 | 11 | 2 | 3 |
| 1997 | 2 | 9 | 10 | 9 | 10 | 4 | 5 | 2 | 10 | 6 | 7 | 3 | 9 | 11 |
| 1998 | 3 | 11 | 9 | 4 | 6 | 2 | 0 | 6 | 3 | 0 | 9 | 9 | 7 | 4 |
| 1999 | 7 | 11 | 4 | 8 | 11 | 1 | 6 | 1 | 4 | 9 | 5 | 7 | 7 | 4 |
| 2000 | 10 | 5 | 11 | 10 | 11 | 11 | 0 | 0 | 3 | 6 | 2 | 0 | 1 | 7 |
| 2001 | 7 | 1 | 8 | 1 | 3 | 6 | 3 | 6 | 4 | 1 | 11 | 1 | 10 | 7 |
| 2002 | 10 | 11 | 6 | 11 | 2 | 8 | 8 | 11 | 3 | 3 | 10 | 11 | 4 | 3 |
| 2003 | 10 | 2 | 9 | 8 | 2 | 7 | 11 | 10 | 4 | 2 | 7 | 2 | 11 | 1 |
| 2004 | 4 | 9 | 0 | 5 | 0 | 0 | 5 | 4 | 6 | 0 | 5 | 1 | 5 | 8 |
| 2005 | 6 | 10 | 6 | 3 | 10 | 1 | 6 | 0 | 11 | 7 | 3 | 7 | 0 | 1 |
| 2006 | 5 | 7 | 3 | 4 | 3 | 3 | 9 | 4 | 11 | 10 | 7 | 10 | 2 | 3 |
| 2007 | 11 | 11 | 0 | 3 | 9 | 9 | 8 | 7 | 8 | 10 | 1 | 10 | 10 | 1 |
| 2008 | 5 | 1 | 3 | 9 | 10 | 10 | 3 | 7 | 0 | 8 | 3 | 3 | 3 | 10 |
| 2009 | 7 | 3 | 11 | 9 | 11 | 10 | 1 | 8 | 10 | 10 | 3 | 1 | 2 | 8 |
| 2010 | 6 | 6 | 11 | 6 | 2 | 2 | 2 | 3 | 4 | 5 | 1 | 0 | 2 | 7 |
| 2011 | 3 | 0 | 0 | 11 | 8 | 6 | 3 | 9 | 2 | 4 | 4 | 4 | 4 | 3 |
| 2012 | 11 | 7 | 5 | 8 | 0 | 1 | 6 | 2 | 7 | 4 | 10 | 10 | 2 | 11 |
| 2013 | 0 | 0 | 1 | 0 | 0 | 3 | 9 | 7 | 1 | 5 | 4 | 0 | 3 | 6 |
| 2014 | 3 | 2 | 5 | 11 | 6 | 11 | 5 | 1 | 5 | 3 | 3 | 8 | 10 | 3 |
| 2015 | 10 | 5 | 11 | 9 | 6 | 5 | 6 | 10 | 10 | 11 | 5 | 3 | 0 | 9 |
| 2016 | 2 | 11 | 8 | 5 | 7 | 4 | 5 | 10 | 1 | 1 | 9 | 4 | 4 | 4 |
| 2017 | 11 | 11 | 1 | 1 | 2 | 10 | 7 | 9 | 2 | 6 | 8 | 0 | 9 | 7 |
| 2018 | 10 | 10 | 10 | 10 | 0 | 6 | 0 | 2 | 1 | 9 | 5 | 6 | 11 | 1 |
| 2019 | 8 | 4 | 9 | 1 | 1 | 8 | 7 | 1 | 4 | 4 | 3 | 8 | 1 | 8 |
| 2020 | 9 | 9 | 6 | 8 | 11 | 11 | 11 | 2 | 1 | 5 | 4 | 9 | 0 | 8 |
| 2021 | 11 | 8 | 1 | 4 | 0 | 2 | 4 | 7 | 7 | 7 | 2 | 5 | 10 | 9 |
| 2022 | 2 | 4 | 9 | 2 | 9 | 5 | 1 | 9 | 8 | 6 | 8 | 11 | 5 | 1 |
| 2023 | 5 | 1 | 0 | 4 | 10 | 6 | 10 | 6 | 8 | 0 | 8 | 10 | 8 | 6 |
| 2024 | 5 | 7 | 5 | 10 | 1 | 11 | 8 | 2 | 8 | 0 | 4 | 1 | 6 | 3 |
| 2025 | 0 | 5 | 7 | 3 | 8 | 0 | 4 | 1 | 8 | 5 | 6 | 11 | 11 | 11 |
| 2026 | 11 | 3 | 10 | 4 | 10 | 10 | 9 | 10 | 6 | 3 | 0 | 1 | 9 | 9 |
| 2027 | 8 | 9 | 2 | 5 | 7 | 2 | 9 | 10 | 6 | 9 | 11 | 2 | 2 | 3 |
| 2028 | 11 | 10 | 0 | 0 | 6 | 1 | 0 | 9 | 6 | 2 | 4 | 7 | 10 | 9 |
| 2029 | 7 | 2 | 5 | 0 | 9 | 5 | 2 | 6 | 9 | 3 | 2 | 3 | 9 | 2 |
| 2030 | 0 | 11 | 2 | 2 | 9 | 8 | 7 | 2 | 3 | 4 | 2 | 4 | 11 | 6 |
| 2031 | 4 | 0 | 1 | 9 | 9 | 4 | 7 | 1 | 5 | 8 | 2 | 1 | 1 | 1 |
| 2032 | 4 | 11 | 11 | 2 | 1 | 4 | 0 | 5 | 6 | 6 | 9 | 11 | 0 | 5 |
| 2033 | 11 | 9 | 5 | 10 | 4 | 7 | 0 | 9 | 5 | 9 | 3 | 10 | 1 | 8 |
| 2034 | 3 | 9 | 6 | 10 | 3 | 4 | 2 | 3 | 0 | 7 | 11 | 5 | 1 | 11 |
| 2035 | 9 | 4 | 10 | 8 | 11 | 3 | 5 | 9 | 3 | 8 | 11 | 1 | 10 | 11 |
| 2036 | 0 | 11 | 10 | 2 | 5 | 11 | 6 | 1 | 10 | 0 | 7 | 6 | 4 | 1 |
| 2037 | 6 | 7 | 0 | 1 | 8 | 5 | 1 | 9 | 10 | 10 | 11 | 5 | 9 | 6 |
| 2038 | 7 | 1 | 7 | 10 | 10 | 7 | 9 | 4 | 4 | 6 | 4 | 11 | 5 | 2 |
| 2039 | 3 | 5 | 2 | 5 | 2 | 8 | 10 | 11 | 6 | 6 | 3 | 8 | 6 | 5 |
| 2040 | 3 | 6 | 11 | 8 | 7 | 1 | 10 | 6 | 7 | 0 | 5 | 2 | 9 | 2 |
| 2041 | 2 | 10 | 8 | 9 | 5 | 1 | 1 | 1 | 1 | 11 | 1 | 0 | 3 | 0 |
| 2042 | 7 | 3 | 10 | 3 | 6 | 3 | 5 | 3 | 5 | 4 | 6 | 9 | 1 | 1 |
| 2043 | 8 | 8 | 4 | 3 | 8 | 8 | 11 | 3 | 7 | 11 | 5 | 8 | 5 | 7 |
| 2044 | 10 | 3 | 3 | 6 | 2 | 6 | 7 | 0 | 2 | 7 | 11 | 9 | 4 | 11 |
| 2045 | 10 | 9 | 3 | 4 | 6 | 10 | 4 | 1 | 11 | 11 | 0 | 6 | 4 | 10 |
| 2046 | 6 | 8 | 5 | 1 | 10 | 4 | 9 | 9 | 4 | 3 | 9 | 6 | 2 | 4 |
| 2047 | 11 | 0 | 10 | 5 | 10 | 0 | 10 | 1 | 9 | 1 | 8 | 5 | 5 | 10 |

Figure 5:
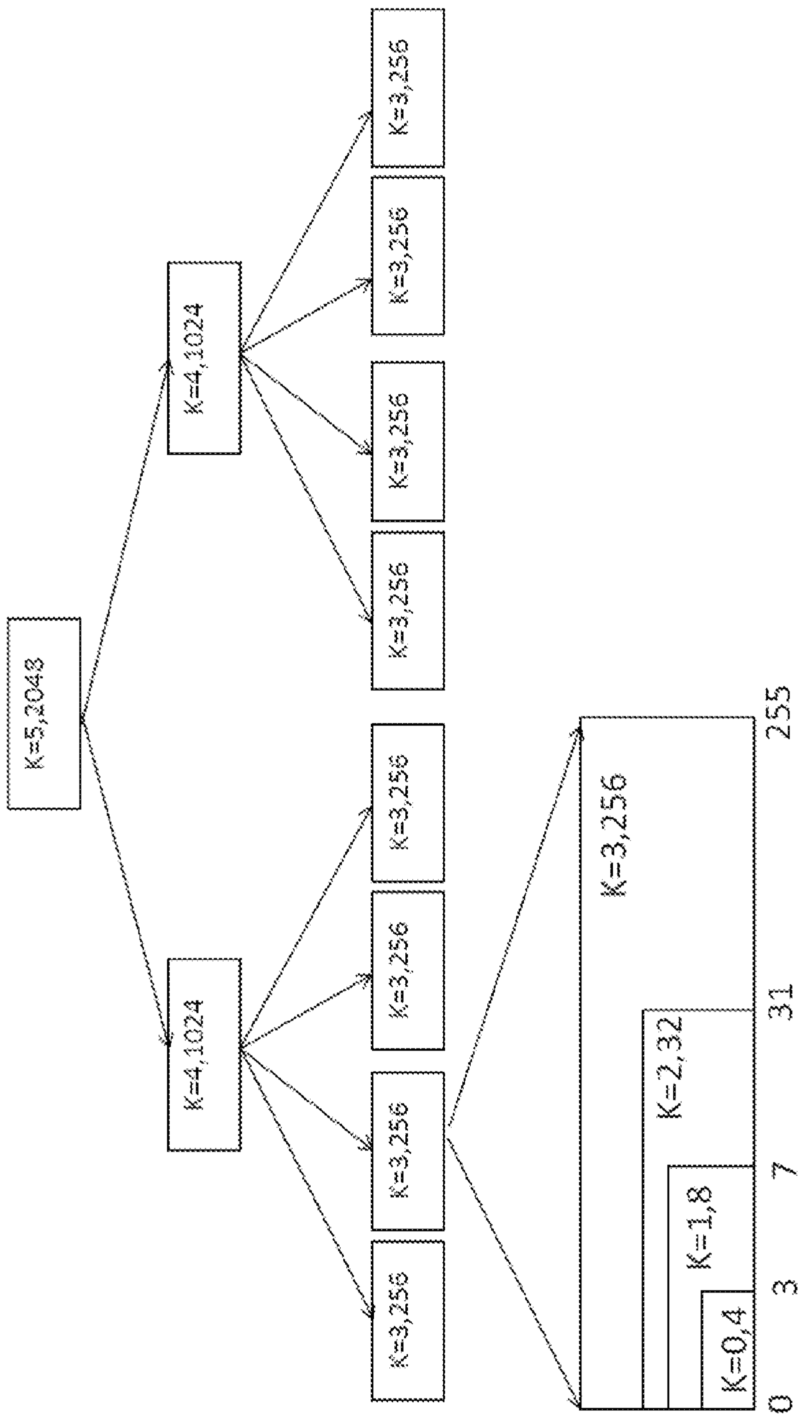
FIG. 5 shows an example of hybrid sequence generation that includes both nested and group-based sequence generation.
Figure 6:
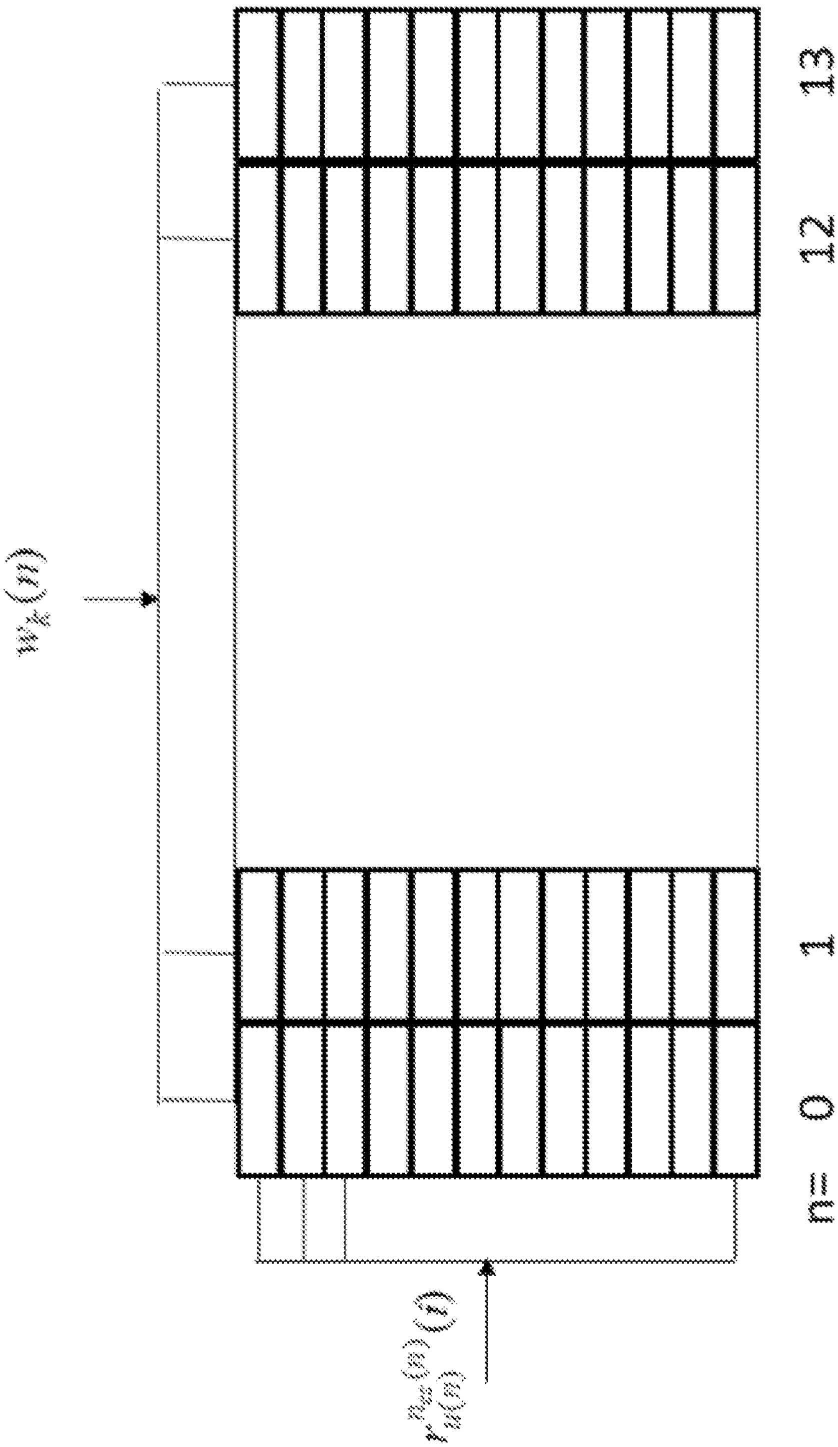
FIG. 6 shows an example of sequence generation for mapping schemes that use different spreading sequences.

For UCI payload sizes smaller than 8 bits, the sequences within each subgroup can be re-ordered in a nested-like structure, as shown in FIG. 5. That is, for each subgroup, K=0 for the first 4 CS hopping sequences, which can be used for 2 bits, and K=1 for the first 8 CS hopping sequences, which can be used for 3 bits. For the first 32 CS hopping sequences, K=2, and the first 16/32 sequences can be used for 4/5 bits, respectively. Without re-ordering within each subgroup, K would be 3 for the 3/4/5 bit scenarios. With this re-ordering, the relationship between K and M is as shown in Table 3 below.

For the nested CS hopping pattern design, there is only one sequence group that can satisfy the relationship between K and M, as shown in Table 2 with an optimized K value. However, for the group-based CS hopping pattern design, there are multiple sequence groups that can satisfy the relationship between K and M, as shown in Table 3. For a UCI payload size less than or equal to 8, there are 8 subgroups. Therefore, UE multiplexing can be achieved. The multiplexing capacity is achieved with sub-optimized K values. For example, K=0 for 3 bits in the nested design and K=1 for 3 bits in the group-based design.

TABLE 3

Example indices for group-based design of CS hopping sequences

| M | K | $CSSeq_{index}$ |
|---|---|---|
| 2 | 0 | 0~3; 256~259; 512~515; 768~771; 1024~1027; 1280~1283; 1536~1539; 1792~1795 |
| 3 | 1 | 0~7; 256~263; 512~519; 768~775; 1024~1031; 1280~1287; 1536~1543; 1792~1799 |
| 4 | 2 | 0~15; 256~271; 512~527; 768~783; 1024~1039; 1280~1295; 1536~1551; 1792~1807 |
| 5 | 2 | 0~31; 256~287; 512~543; 738~799; 1024~1055; 1280~1311; 1536~1567; 1792~1823 |
| 6 | 3 | 0~63; 256~319; 512~575; 768~831; 1024~1087; 1280~1343; 1536~1599; 1792~1855 |
| 7 | 3 | 0~127; 256~383; 512~639; 768~895; 1024~1151; 1280~1407; 1536~1663; 1792~1919 |
| 8 | 3 | 0~255; 256~511; 512~767; 768~1023; 1024~1279; 1280~1535; 1536~1791; 1792~2047 |
| 9 | 4 | 0~511; 512~1023; 1024~1535; 1536~2047 |
| 10 | 4 | 0~1023; 1024~2047 |
| 11 | 5 | 0~2047 |

In some embodiments, and as described above, the CS hopping sequence can be initially design for N=14, i.e., the parent CS hopping pattern. If the number of the OFDM symbols occupied by the PUCCH is less than 14, the CS hopping pattern with N=14 can be reused by truncating the CS hopping sequences with length 14 to the number of OFDM symbols that the PUCCH occupies. That is, only the first N elements in the CS hopping sequence are used to generate the mapping sequence z(·).

Additional Exemplary Embodiments that Use Different Cyclic Shifts

In some embodiments, the design of the CS hopping pattern for different UCI payload sizes is based on a set of orthogonal resources. In some embodiments, the orthogonal resources include at least two of resources from CS, orthogonal cover code (OCC), RB, OFDM symbol and base sequence. Each bit state of M information bits is represented by a different orthogonal resource. In some embodiments, define the total number of {CS, OCC, RB and base sequence} used for carrying the information bits as {I, J, Q, P} and the index {CS index, OCC index, RB index and base sequence index} as {i, j, m, n} respectively. i=0, 1, . . . (I−1) is a non-negative integer that indexes a CS in the I CSs. j=0, 1, . . . (J−1) is a non-negative integer that indexes a OCC in the J CSs. q=0, 1, . . . (Q−1) is a non-negative integer that indexes a RB in the Q RBs, p=0, 1, . . . (P−1) is a non-negative integer that indexes a base sequence in the P base sequences, All orthogonal resources indexed by r can be ordered by, e.g., r=p*Q+q*J+j*I+i. In some embodiments, for each UE, it will use the first X=2^M orthogonal resources with lower index for transmitting M bits. In some embodiments, there are total 12 different CSs, 14 OCC, 4 RBs and 4 base sequence are used. That is a total of 2688 orthogonal resources. Then the first 2048 resources will be used for transmitting 11 bits. In some embodiments, for each UE, the starting index r is RRC configured or predefined or DCI indicated. Note that, r=p*Q+q*J+j*I+i is just an example, the orthogonal resource can be indexed by different order among {CS, OCC, RB and base sequence}. In some embodiments, the orthogonal resource can be indexed by different order among {CS, OCC, RB and base sequence, OFDM symbol}.

In some embodiments, the cyclic shift used in symbol index n can be expressed by at least one of the following functions of m:

$n_{cs}(m,n)=\text{floor}(m/L)$;

$n_{cs}(m,n)=\text{mod}(m,L)$;

$n_{cs}(m,n)=\text{mod}(n_{cs}(m,0)+n_{cs}(m,1),L)$;

$n_{cs}(m\ n)=\text{floor}(m/L\hat{}2)$;

$n_{cs}(m,n)=\text{mod}(\text{floor}(m/L\hat{}2),L)$;

$n_{cs}(m,n)=\text{mod}(\text{floor}(m/L)+\text{floor}(m/L\hat{}2),L)$; or $n_{cs}(m,n)=\text{mod}(\text{mod}(m,L)+\text{floor}(m/L\hat{}2),L)$.

Herein, m is orthogonal resource index, m=0, 1, . . . 2^M−1. L is the sequence length. In some embodiments, L is 12 or 24.

In some embodiments, and assuming N=4, the cyclic shift used in symbol index n can be expressed by any four functions from the following list of candidate functions:

$n_{cs}(m,n)=\text{floor}(m/L)$;

$n_{cs}(m,n)=\text{mod}(m,L)$;

$n_{cs}(m,n)=\text{mod}(n_{cs}(m,0)+n_{cs}(m,1),L)$;

$n_{cs}(m,n)=\text{floor}(m/L\hat{}2)$;

$n_{cs}(m,n)=\text{mod}(\text{floor}(m/L\hat{}2),L)$;

$n_{cs}(m,n)=\text{mod}(\text{floor}(m/L)+\text{floor}(m/L\hat{}2),L)$; or $n_{cs}(m,n)=\text{mod}(\text{mod}(m,L)+\text{floor}(m/L\hat{}2),L)$.

Herein, m is orthogonal resource index, m=0, 1, . . . $2^M$−1. L is the sequence length. In some embodiments, L is 12 or 24.

In this embodiment, and assuming N=4, there are 144*12=1728 orthogonal resources which can ensure the minimum value of K is 2. Herein, at most 10 bits can be indicated by 1024 orthogonal resources from the 1728 orthogonal resources. If the target UCI payload is 11 bits, the additional bit can be indicated by allocating an additional RB.

In some embodiments, a CS hopping pattern with N symbols can be defined as a basic pattern. In an example, the CS hopping pattern with length N=4 is a basic pattern.

For a PUCCH with K symbols (with K>N), the CS hopping pattern can be repeated based on the basic pattern to meet the target length. In an example, if the target length is not an integral multiple of N, the CS mapping on the first mod(K, N) symbols of the N symbols are used for last mod(K, N) symbols out of the K symbols.

For a PUCCH with K symbols (with K<N), the CS hopping pattern can be truncated based on the basic pattern to meet the target length. In an example, the CS mapping on first K symbols of the N symbols are used.

Exemplary Embodiments that Use Spreading Sequences

In some embodiments, a PUCCH format can be configured to occupy 1 resource block (RB) in the frequency-domain and 14 symbols in the time-domain. The short sequence used in the frequency-domain is a length-12 sequence. The short sequence is defined by a cyclic shift $n_{cs}$ of a base sequence $\bar{r}_u(\mathbf{1})$ according to Equation 1. The low-PAPR sequences defined in current NR specification can be reused for the base sequence $\bar{r}_u(i)$, as defined in Equation 2, and wherein the value of φ(i) is as shown in Table 1.

In these embodiments, an orthogonal sequence $w_k(n)$ can be used in time domain. For example, the short sequence $r_u^{\alpha}(n)$ shall be block wise spread with an orthogonal sequence $w_k(m)$ according to:

$$z(nM_{ZC}+i)=w_k(n)\cdot r_u^{\alpha}(i) \quad \text{(Eqn. 4)}$$
$$i=0,1,\ldots,M_{ZC}-1$$
$$n=0,1,\ldots,N-1$$

Herein, N is the number of OFDM symbols used for the PUCCH format (with N=14 in this example) and k is the index of the orthogonal sequence to use. In some embodiments, the sequence z(·) can be mapped in a frequency-first time-second order over the assigned resource of the PUCCH. In other embodiments, it may be mapped in a time-first, frequency-second order over the assigned resource of the PUCCH.

In this manner, different uplink control information can be indicated by different combinations of (u,$n_{cs}$,k) to generate the sequence z(·) for PUCCH transmission.

Some embodiments of the disclosed technology define a mapping between the input uplink control information and the combination of short sequence used in the frequency-domain and orthogonal sequences (or pseudo-orthogonal sequences) used in time-domain for a PUCCH.

In some embodiments, orthogonal sequence $w_k^{(n)}$ can be defined as:

$$w_k(n) = e^{j(2\pi nk/N)} \quad k = 0, 1, \ldots, N-1 \quad n = 0, 1, \ldots, N-1 \tag{Eqn. 5}$$

The orthogonal sequences defined in Equation 5 are Discrete Fourier Transform (DFT)-based sequences which are applicable to any number of symbols in the time-domain. If the number of symbols in the time-domain equals to $2^p$, where p is an integer, then Walsh/Hadamard sequence can also be considered.

In some embodiments, pseudo-orthogonal sequences can also be considered as the block-wise spreading code. If pseudo orthogonal sequences are used, the sequences can be truncated from Walsh/Hadamard sequences to the desired length, i.e., from 16 to 14. Table 4 gives an example of the truncated Hadamard sequences with sequence length of 14.

TABLE 4

Example truncated Hadamard sequence with length 14

| k | $w_k(n)$ | | | | | | | | | | | | | |
|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 |
| 1 | 1 | −1 | 1 | −1 | 1 | −1 | 1 | −1 | 1 | −1 | 1 | −1 | 1 | −1 |
| 2 | 1 | 1 | −1 | −1 | 1 | 1 | −1 | −1 | 1 | 1 | −1 | −1 | 1 | 1 |
| 3 | 1 | −1 | −1 | 1 | 1 | −1 | −1 | 1 | 1 | −1 | −1 | 1 | 1 | −1 |
| 4 | 1 | 1 | 1 | 1 | −1 | −1 | −1 | −1 | 1 | 1 | 1 | 1 | −1 | −1 |
| 5 | 1 | −1 | 1 | −1 | −1 | 1 | −1 | 1 | 1 | −1 | 1 | −1 | −1 | 1 |
| 6 | 1 | 1 | −1 | −1 | −1 | −1 | 1 | 1 | 1 | 1 | −1 | −1 | −1 | −1 |
| 7 | 1 | −1 | −1 | 1 | −1 | 1 | 1 | −1 | 1 | −1 | −1 | 1 | −1 | 1 |
| 8 | 1 | 1 | 1 | 1 | 1 | 1 | 1 | 1 | −1 | −1 | −1 | −1 | −1 | −1 |
| 9 | 1 | −1 | 1 | −1 | 1 | −1 | 1 | −1 | −1 | 1 | −1 | 1 | −1 | 1 |
| 10 | 1 | 1 | −1 | −1 | 1 | 1 | −1 | −1 | −1 | −1 | 1 | 1 | −1 | −1 |
| 11 | 1 | −1 | −1 | 1 | 1 | −1 | −1 | 1 | −1 | 1 | 1 | −1 | −1 | 1 |
| 12 | 1 | 1 | 1 | 1 | −1 | −1 | −1 | −1 | −1 | −1 | −1 | −1 | 1 | 1 |
| 13 | 1 | −1 | 1 | −1 | −1 | 1 | −1 | 1 | −1 | 1 | −1 | 1 | 1 | −1 |

In some embodiments, and to support varying payload sizes from 3 to 11 bits, a different number of base sequences, cyclic shifts and orthogonal sequences can be used. For a specific payload size, the number of base sequences, cyclic shifts and orthogonal sequences can also be different.

For example, denote M as the number of UCI payload, the number of target combinations to carry the UCI is $N_{CombT}=2^M$. And denote $N_u$, $N_{CS}$, $N_{OCC}$ as the number of base sequences, cyclic shifts and orthogonal sequences to use respectively. Table 5 lists the possible value of $N_u$, $N_{CS}$, $N_{OCC}$ for different M assuming the UCI is transmitted on a PUCCH with 1 RB in the frequency-domain and 14 symbols in the time-domain. In this case, the maximum number of cyclic shifts is 12, which equals to the length of the short sequence, and the number of orthogonal sequences is 14, which equals to the number of symbols in the time-domain of the PUCCH. The number of available combinations equals to $N_{comb,A}=N_u \times N_{CS} \times N_{OCC}$, which is configured to be larger than the number of target combinations.

TABLE 5

Example values of $N_u$, $N_{CS}$, $N_{OCC}$ for different M

| M | $N_{Comb}$, T | $N_u$ | $N_{CS}$ | $N_{OCC}$ | $N_{Comb,A}$ |
|---|---|---|---|---|---|
| 11 | 2048 | 13 | 12 | 14 | 2184 |
| 11 | 2048 | 25 | 6 | 14 | 2100 |
| 10 | 1024 | 7 | 12 | 14 | 1176 |
| 10 | 1024 | 13 | 6 | 14 | 1092 |
| 9 | 512 | 4 | 12 | 14 | 672 |
| 9 | 512 | 7 | 6 | 14 | 588 |
| 8 | 256 | 2 | 12 | 14 | 336 |
| 8 | 256 | 4 | 6 | 14 | 336 |
| 7 | 128 | 1 | 12 | 14 | 168 |
| 7 | 128 | 2 | 6 | 14 | 168 |
| 6 | 64 | 1 | 12 | 14 | 168 |
| 6 | 64 | 1 | 6 | 14 | 84 |
| 6 | 64 | 2 | 4 | 14 | 112 |
| 5 | 32 | 1 | 4 | 14 | 56 |
| 5 | 32 | 1 | 6 | 14 | 84 |
| 5 | 32 | 1 | 4 | 14 | 56 |
| 5 | 32 | 1 | 3 | 14 | 42 |
| 4 | 16 | 1 | 12 | 14 | 168 |
| 4 | 16 | 1 | 6 | 14 | 84 |
| 4 | 16 | 1 | 4 | 14 | 56 |
| 4 | 16 | 1 | 3 | 14 | 42 |
| 4 | 16 | 1 | 2 | 14 | 28 |
| 3 | 8 | 1 | 12 | 14 | 168 |
| 3 | 8 | 1 | 6 | 14 | 84 |
| 3 | 8 | 1 | 4 | 14 | 56 |
| 3 | 8 | 1 | 3 | 14 | 42 |
| 3 | 8 | 1 | 2 | 14 | 28 |
| 3 | 8 | 1 | 1 | 14 | 14 |

As shown in Table 5, if the short sequences defined in NR specification are reused, there are at most 30 base sequences are available. And in NR specification, only 1 base sequence can be used in a cell and different base sequences are used in different cells. The adoption of this design philosophy results in at most 7 bits UCI being indicated based on the embodiments that use different cyclic shifts, and described above.

In some embodiments, $(u, n_{cs}, k)$ can be determined in the following procedure.

Denote $(a_0, a_1, \ldots, a_6)$ as the UCI bits to be transmitted, and calculate the decimal value corresponding to the UCI bits based on:

$$V_{dec} = \sum_{i=0}^{6} a_i \cdot 2^i \text{ or} \tag{Eqn. 6}$$

$$V_{dec} = \sum_{i=0}^{6} a_i \cdot 2^{(6-i)} \tag{Eqn. 7}$$

Herein, the index of base sequence u is determined as specified in current NR specification (TS 38.211), which do not duplicate here. The cyclic shift and the index of orthogonal sequence are determined using Equation 8 shown below (with $N_{CS}=12$).

$$\begin{cases} n_{cs} = \mathrm{mod}(V_{dec}, N_{CS}) \\ k = \lfloor V_{dec} / N_{CS} \rfloor \end{cases} \tag{Eqn. 8}$$

For an example, if Equation 6 is applied when calculating the decimal value of the UCI bits, then $V_{dec}=122$. Then, based on Equation 8, $n_{cs}=2, k=10$.

For another example, if Equation 7 is applied when calculating the decimal value of the UCI bits, then $V_{dec}=^{47}$. Then, based on Equation 8, $n_{cs}=11, k=3$.

Subsequently, in both these examples, and based on Equation 4, the sequence z(·) to be mapped over the assigned resource for PUCCH transmission can be obtained.

In some embodiments, a cell-specific cyclic shift hopping may also be applied in addition to the above operation. That is, the cyclic shift $n_{cs}$ varies as a function of the symbol and slot number in a cell-specific manner.

Exemplary Embodiments that Indicate a Repetition Parameter for PUCCH

In current NR specification, the PUCCH may be semi-statically configured with repetition transmissions. The repetition parameter can be configured to be {1, 2, 4, 8}. The repetition parameter for PUCCH is configured based on large-scale characteristics of propagation condition. Such a semi-static configuration cannot be adaptive to the instantaneous radio channel condition. To ensure the reliability of PUCCH, a conservative repetition factor is typically adopted. However, this wastes radio resources which otherwise can be used for accommodating more coverage limited UE. In this regard, dynamic indication of the PUCCH repetition can advantageously improve throughput.

In the current NR specification, PUCCH repetition is based on slot level, i.e., there is only one repetition within one slot. The repetition number for PUCCH is configured Radio Resource Control (RRC) parameter of nrofSlots in PUCCH-FormatConfig as shown below. It is applied to all PUCCH resources with the same PUCCH format. For instance, if the PUCCH repetition number is configured by nrofSlots as 2 for PUCCH format 1, all PUCCH format 1 resources are of the same repetition number.

In some embodiments, there can be more than one PUCCH repetitions in one slot. In some embodiments, the parameter repetitionNum represents the PUCCH repetition number within a slot. In other embodiments, the parameter repetitionNum represents the PUCCH repetition number within a slot and across slots.

Exemplary Methods for the Disclosed Technology

Embodiments of the disclosed technology advantageously result in providing enhanced performance for low code rates and small to medium payload sizes.

According to some embodiments, the following characteristics are exhibited, amongst others, by various implementations described in this document.

1) There are N OFDM symbols or DFT-S-OFDM symbols for a PUCCH channel, i.e. symbol(n), n=0, 1, 2, . . . N−1. In an example, N=14.
2) A base sequence u(n) with cyclic shift $n_{cs}(n)$ is transmitted in symbol(n), n=0, 1, 2, . . . , N−1. Furthermore u(n)=u(n'),n,n'=0, 1, 2, . . . N−1,n≠n', i.e., the base sequence used in each symbol is identical.
3) The combination set m {<u(n,m),$n_{cs}$(n,m)>n=0, 1, 2, . . . , N−1} is used to represent one information symbol (or bit). In an example, there are combination sets for M bits information, and m=0, 1, . . . , $2^M$-1. When u(n,m)=u(n',m),n,n'=0, 1, 2, . . . , N−1,n≠n', the combination set m can be simplified as {<$n_{cs}$(n,m)>n=0, 1, 2, . . . , N−1}.
4) There are at most K identical elements in the same location between any two combination sets in the $2^M$ combination sets, and their relationship is described as:

```
PUCCH-FormatConfig ::=          SEQUENCE {
   interslotFrequencyHopping       ENUMERATED {enabled}     OPTIONAL, -- Need R
   additionalDMRS                  ENUMERATED {true}        OPTIONAL, -- Need R
   maxCodeRate                     PUCCH-MaxCodeRate        OPTIONAL, -- Need R
   nrofSlots                       ENUMERATED {n2,n4,n8}    OPTIONAL, -- Need S
   pi2BPSK                         ENUMERATED {enabled}     OPTIONAL, -- Need R
   simultaneousHARQ-ACK-CSI        ENUMERATED {true}        OPTIONAL -- Need R
}
```

In some embodiments, and to dynamically indicate the repetition number of PUCCH, a new information element (IE) indicating the repetition number can be added to each PUCCH resource set or each PUCCH resource. in one embodiment, a parameter repetitionNum is newly added in PUCCH-ResourceSet and/or PUCCH-Resource as follows:

| M (2^M) | K |
|---|---|
| 2 (4) | 0 |
| 3 (8) | 0 |

```
PUCCH-ResourceSet ::=          SEQUENCE {
    pucch-ResourceSetId        PUCCH-ResourceSetId,
    resourceList               SEQUENCE (SIZE (1..maxNrofPUCCH-ResourcesPerSet) ) OF PUCCH-ResourceId,
   maxPayloadSize             INTEGER (4..256)                    OPTIONAL -- Need R
   repetitionNum              ENUMERATED {n2,n4,n8}               OPTIONAL, -- Need S
}
PUCCH-Resource ::=             SEQUENCE {
    pucch-ResourceId               PUCCH-ResourceId,
    startingPRB                    PRB-Id,
    intraSlotFrequencyHopping      ENUMERATED { enabled }          OPTIONAL, -- Need R
   secondHopPRB                   PRB-Id                          OPTIONAL, -- Need R
   repetitionNum                  ENUMERATED {n2,n4,n8}           OPTIONAL, -- Need S
    format                         CHOICE {
      format0                        PUCCH-format0,
      format1                        PUCCH-format1,
      format2                        PUCCH-format2,
      format3                        PUCCH-format3,
      format4                        PUCCH-format4
    }
}
```

-continued

| M (2^M) | K |
|---|---|
| 4 (16) | 1 |
| 5 (32) | 2 |
| 6 (64) | 2 |
| 7 (128) | 3 |
| 8 (256) | 3 |
| 9 (512) | 4 |
| 10 (1024) | 4 |
| 11 (2048) | 4 |

5) When the UCI payload is M bit, there are $2^M$ combination sets. When the UCI payload is M' bit, there are $2^{M'}$ combination sets, where M<M' and the $2^M$ combination sets is a subset of the $2^{M'}$ combination sets.

6) $2^M$ combination sets is divided into G groups. There are $2^M/G$ combination sets in each group. In some embodiments, there are at most K identical elements in the same location between any two combination sets in the $2^M$ combination sets. In other embodiments, there are at most K' identical elements in the same location between any two combination sets in the $2^M/G$ combination sets, and K' is identical for each group (or sub-group). Different groups are allocated to different UEs.

7) Each of the G groups can be divided into smaller sub-groups (e.g., as shown in the examples in FIGS. 4 and 5).

8) Different sub-groups are allocated to different UEs (or wireless devices).

Figure 7:
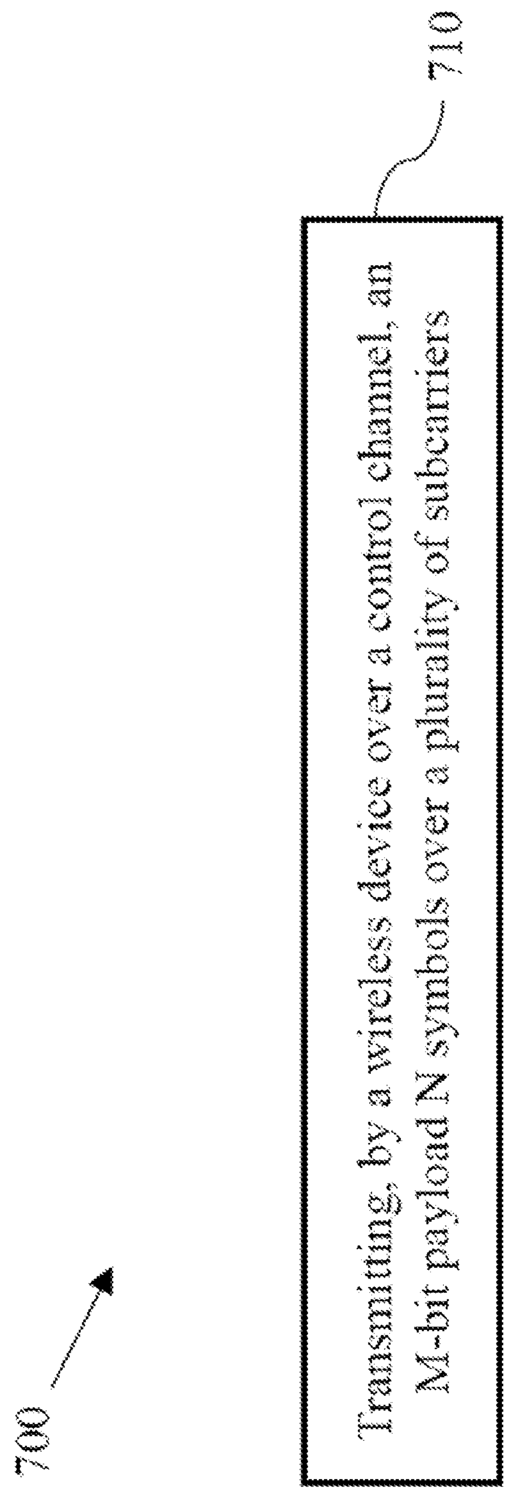
FIG. 7 shows an example of a wireless communication method.

FIG. 7 shows an example of a wireless communication method 700 for mapping schemes for uplink control signals in mobile communication technology. The method 700 includes, at operation 710, transmitting, by a wireless device over a control channel, an M-bit payload on N symbols over a plurality of subcarriers. In some embodiments, M and N are positive integers, each of the N symbols is represented using a base sequence (u(n, m)) and a cyclic shift ($n_{cs}$ (n, m)) of the base sequence, n=0, 1, . . . (N−1) is a non-negative integer that indexes a symbol in the N symbols, and m=0, 1, . . . ($2^M$−1) is a non-negative integer that indexes a combination set in $2^M$ combination sets.

Figure 8:
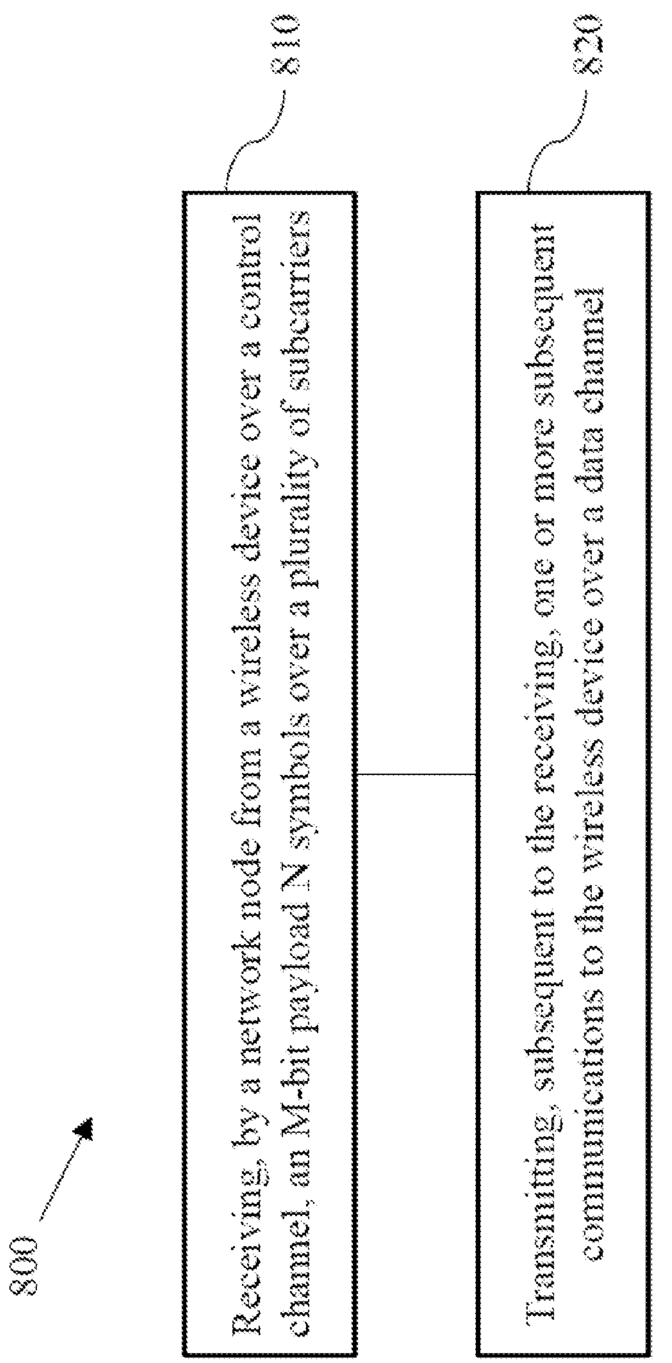
FIG. 8 shows another example of a wireless communication method.

FIG. 8 shows another example of a wireless communication method 800 for mapping schemes for uplink control signals in mobile communication technology. The method 800 includes, at operation 810, receiving, by a network node from a wireless device over a control channel, an M-bit payload on N symbols over a plurality of subcarriers.

The method 800 includes, at operation 820, transmitting, subsequent to the receiving, one or more subsequent communications to the wireless device over a data channel. In some embodiments, M and N are positive integers, each of the N symbols is represented using a base sequence (u(n, m)) and a cyclic shift ($n_{CS}$ (n, m)) of the base sequence, n=0, 1, . . . (N−1) is a non-negative integer that indexes a symbol in the N symbols, and wherein m=0, 1, . . . ($2^M$−1) is a non-negative integer that indexes a combination set in $2^M$ combination sets.

In some embodiments, the $2^M$ combination sets are configured or predefined such that at most K elements are identical between any two combination sets of the $2^M$ combination sets, and wherein K is a non-negative integer.

In some embodiments, the $2^M$ combination sets are a subset of 2M combination sets, wherein M' is a positive integer, and wherein M'>M.

In some embodiments, each of the at most K elements has an identical relative location in each of the any two combination sets.

In some embodiments, the $2^M$ combination sets are divided into G groups with $2^M/G$ combination sets in each of the G groups, and wherein G is a positive integer.

In some embodiments, the G groups are allocated to different user devices that are in communication with the network node.

In some embodiments, at least one of the G groups is divided into G' groups with $(2^M/G)/G'$ combination sets in each of the G' groups, wherein at most K' elements are identical between any two combination sets in each of the G' groups, and wherein G' and K' are non-negative integers.

In some embodiments, within the $2^M/G$ combination sets of any of the G groups, at most K' elements are identical between any two combination sets of the $2^M/G$ combination sets, and wherein K' is a non-negative integer.

In some embodiments, K' is less than or equal to K.

In some embodiments, each of the at most K' elements has an identical relative location in each of the any two combination sets.

In some embodiments, each of the $2^M$ combination sets corresponds to a cyclic shift (CS) hopping sequence.

In some embodiments, the transmitting is performed over a set of resources of the control channel, and wherein a mapping over the set of resources is in a frequency-first time-second order.

In some embodiments, the control channel is a physical uplink control channel (PUCCH).

In some embodiments, the N symbols are modulated using an orthogonal frequency division multiplexing (OFDM) modulation over the plurality of subcarriers.

In some embodiments, the N symbols are modulated using Discrete Fourier Transform spread orthogonal frequency division multiplexing (DFT-S-OFDM) modulation over the plurality of subcarriers.

In some embodiments, N≤14 and 2≤M≤11.

In some embodiments, N=14 and M=11, and the $2^M$ combination sets are selected from a predefined table.

Implementations for the Disclosed Technology

Figure 9:
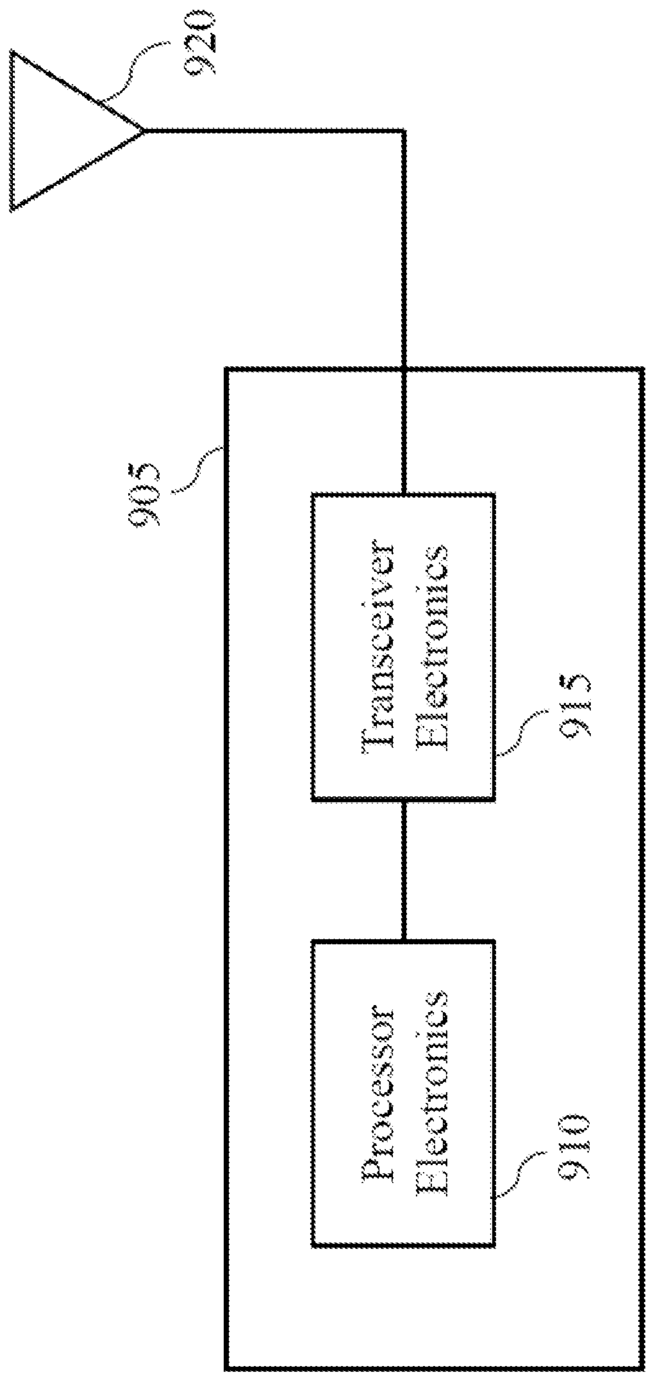
FIG. 9 is a block diagram representation of a portion of an apparatus that can be used to implement methods and/or techniques of the presently disclosed technology.

FIG. 9 is a block diagram representation of a portion of an apparatus, in accordance with some embodiments of the presently disclosed technology. An apparatus 905, such as a base station or a wireless device (or UE), can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the apparatus 905.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A method for wireless communication, comprising:

transmitting, by a wireless device over a control channel, an M-bit payload on N symbols over a plurality of subcarriers, wherein M and N are positive integers, wherein M is greater than 2, wherein each of the N symbols is represented using a base sequence and a cyclic shift ($n_{cs}(n, m)$) of the base sequence, wherein n=0, 1, . . . (N−1) is a non-negative integer that indexes a symbol in the N symbols, and wherein m=0, 1, . . . ($2^M$−1) is a non-negative integer that indexes a combination set in $2^M$ combination sets.

2. The method of claim 1, wherein the $2^M$ combination sets are configured or predefined such that at most K elements are identical between any two combination sets of the $2^M$ combination sets, and wherein K is a non-negative integer.

3. The method of claim 2, wherein a relationship between M and K is given as:

| M (2^M) | K |
|---|---|
| 2 (4) | 0 |
| 3 (8) | 0 |
| 4 (16) | 1 |
| 5 (32) | 2 |
| 6 (64) | 2 |
| 7 (128) | 3 |
| 8 (256) | 3 |
| 9 (512) | 4 |
| 10 (1024) | 4 |
| 11 (2048) | 4 |

4. The method of claim 2, wherein each of the at most K elements has an identical relative location in each of the any two combination sets.

5. The method of claim 1, wherein the $2^M$ combination sets are divided into G groups with $2^M$/G combination sets in each of the G groups, wherein at least one of the G groups is divided into G' groups with ($2^M$/G)/G' combination sets in each of the G' groups, wherein at most K' elements are identical between any two combination sets in each of the G' groups, wherein G' and K' are non-negative integers, and wherein G is a positive integer.

6. A method for wireless communication, comprising:

receiving, by a network node from a wireless device over a control channel, an M-bit payload on N symbols over a plurality of subcarriers; and transmitting, subsequent to the receiving, one or more subsequent communications to the wireless device over a data channel, wherein M and N are positive integers, wherein M is greater than 2, wherein each of the N symbols is represented using a base sequence and a cyclic shift ($n_{cs}(n, m)$) of the base sequence, wherein n=0, 1, . . . (N−1) is a non-negative integer that indexes a symbol in the N symbols, and wherein m=0, 1, . . . ($2^M$−1) is a non-negative integer that indexes a combination set in $2^M$ combination sets.

7. The method of claim 6, wherein the $2^M$ combination sets are configured or predefined such that at most K elements are identical between any two combination sets of the $2^M$ combination sets, and wherein K is a non-negative integer.

8. The method of claim 7, wherein a relationship between M and K is given as:

| M (2^M) | K |
|---|---|
| 2 (4) | 0 |
| 3 (8) | 0 |
| 4 (16) | 1 |
| 5 (32) | 2 |
| 6 (64) | 2 |
| 7 (128) | 3 |
| 8 (256) | 3 |
| 9 (512) | 4 |
| 10 (1024) | 4 |
| 11 (2048) | 4 |

9. The method of claim 7, wherein each of the at most K elements has an identical relative location in each of the any two combination sets.

10. The method of claim 6, wherein the $2^M$ combination sets are divided into G groups with $2^M$/G combination sets in each of the G groups, wherein at least one of the G groups is divided into G' groups with ($2^M$/G)/G' combination sets in each of the G' groups, wherein at most K' elements are identical between any two combination sets in each of the G' groups, wherein G' and K' are non-negative integers, and wherein G is a positive integer.

11. An apparatus for wireless communication comprising a processor and a memory storing instructions, execution of which by the processor causes the apparatus to:

transmit, over a control channel, an M-bit payload on N symbols over a plurality of subcarriers, wherein M and N are positive integers, wherein M is greater than 2, wherein each of the N symbols is represented using a base sequence and a cyclic shift ($n_{cs}$(n, m)) of the base sequence, wherein n=0, 1, . . . (N−1) is a non-negative integer that indexes a symbol in the N symbols, and wherein m=0, 1, . . . ($2^M$−1) is a non-negative integer that indexes a combination set in $2^M$ combination sets.

12. The apparatus of claim 1, wherein the $2^M$ combination sets are configured or predefined such that at most K elements are identical between any two combination sets of the $2^M$ combination sets, and wherein K is a non-negative integer.

13. The apparatus of claim 12, wherein a relationship between M and K is given as:

| M (2^M) | K |
|---|---|
| 2 (4) | 0 |
| 3 (8) | 0 |
| 4 (16) | 1 |
| 5 (32) | 2 |
| 6 (64) | 2 |
| 7 (128) | 3 |
| 8 (256) | 3 |
| 9 (512) | 4 |
| 10 (1024) | 4 |
| 11 (2048) | 4 |

14. The apparatus of claim 12, wherein each of the at most K elements has an identical relative location in each of the any two combination sets.

15. The apparatus of claim 11, wherein the $2^M$ combination sets are divided into G groups with $2^M$/G combination sets in each of the G groups, wherein at least one of the G groups is divided into G' groups with ($2^M$/G)/G' combination sets in each of the G' groups, wherein at most K' elements are identical between any two combination sets in each of the G' groups, wherein G' and K' are non-negative integers, and wherein G is a positive integer.

16. An apparatus for wireless communication comprising a processor and a memory storing instructions, execution of which by the processor causes the apparatus to:

receive, from a wireless device over a control channel, an M-bit payload on N symbols over a plurality of subcarriers; and transmit, subsequent to receiving the M-bit payload, one or more subsequent communications to the wireless device over a data channel, wherein M and N are positive integers, wherein M is greater than 2, wherein each of the N symbols is represented using a base sequence (u (n, m)) and a cyclic shift ($n_{cs}$(n, m)) of the base sequence, wherein n=0, 1, . . . (N−1) is a non-negative integer that indexes a symbol in the N symbols, and wherein m=0, 1, . . . ($2^M$−1) is a non-negative integer that indexes a combination set in $2^M$ combination sets.

17. The apparatus of claim 16, wherein the $2^M$ combination sets are configured or predefined such that at most K elements are identical between any two combination sets of the $2^M$ combination sets, and wherein K is a non-negative integer.

18. The apparatus of claim 17, wherein a relationship between M and K is given as:

| M(2 ^ M) | K |
|---|---|
| 3 (8) | 0 |
| 4 (16) | 1 |
| 5 (32) | 2 |
| 6 (64) | 2 |
| 7 (128) | 3 |
| 8 (256) | 3 |
| 9 (512) | 4 |
| 10 (1024) | 4 |
| 11 (2048) | 4. |

19. The apparatus of claim 17, wherein each of the at most K elements has an identical relative location in each of the any two combination sets.

20. The apparatus of claim 16, wherein the $2^M$ combination sets are divided into G groups with $2^M$/G combination sets in each of the G groups, wherein at least one of the G groups is divided into G' groups with ($2^M$/G)/G' combination sets in each of the G' groups, wherein at most K' elements are identical between any two combination sets in each of the G' groups, wherein G' and K' are non-negative integers, and wherein G is a positive integer.

* * * * *